US011849727B2

(12) United States Patent
Bedoukian

(10) Patent No.: US 11,849,727 B2
(45) Date of Patent: Dec. 26, 2023

(54) SYNERGISTIC FORMULATIONS FOR CONTROL AND REPELLENCY OF BITING ARTHROPODS

(71) Applicant: Bedoukian Research, Inc., Danbury, CT (US)

(72) Inventor: Robert H. Bedoukian, West Redding, CT (US)

(73) Assignee: BEDOUKIAN RESEARCH, INC., Danbury, CT (US)

( * ) Notice: Subject to any disclaimer, the term of this patent is extended or adjusted under 35 U.S.C. 154(b) by 244 days.

(21) Appl. No.: 16/990,515

(22) Filed: Aug. 11, 2020

(65) Prior Publication Data

US 2020/0367497 A1 Nov. 26, 2020

Related U.S. Application Data

(63) Continuation-in-part of application No. 14/540,612, filed on Nov. 13, 2014, now abandoned.

(Continued)

(51) Int. Cl.
*A01N 43/40* (2006.01)
*A01N 31/06* (2006.01)

(Continued)

(52) U.S. Cl.
CPC ............. *A01N 43/40* (2013.01); *A01N 31/06* (2013.01); *A01N 37/18* (2013.01); *A01N 37/36* (2013.01); *A01N 37/42* (2013.01); *A01N 43/16* (2013.01)

(58) Field of Classification Search
CPC ........ A01N 43/40; A01N 31/06; A01N 37/18; A01N 37/36; A01N 37/42; A01N 43/16; A01N 47/16
See application file for complete search history.

(56) References Cited

U.S. PATENT DOCUMENTS 5,610,194 A 3/1997 Polefka et al.
6,147,091 A 11/2000 Krueger et al.

(Continued)

FOREIGN PATENT DOCUMENTS

CA 1191084 7/1985
CN 1093221 A 10/1994

(Continued)

OTHER PUBLICATIONS

Mexican Office Action for the corresponding Mexican application MX/a/2016/006059 dated Sep. 23, 2021, 13 pages.

(Continued)

*Primary Examiner* — Savitha M Rao
*Assistant Examiner* — Andrew P Lee
(74) *Attorney, Agent, or Firm* — Ohlandt, Greeley and Perle, LLP

(57) ABSTRACT

Control or repellency of biting arthropods, particularly biting insects, is accomplished by bringing the biting arthropods into contact with combinations of compounds identical or related to those found on human/animal skin or in plants acting synergistically with one another, or in combination with conventional repellents like N,N-diethyl-3-methylbenzamide (DEET®), para-menthane-3,8-diol (PMD), sec-butyl-2-(2-hydroxyethyl) piperidine carboxylate ("Picaridin"), or other nitrogen containing repellents selected from amines, amides and nitrogen containing heterocyclic compounds, or any synergistic combination of DEET®, PMD, Picaridin, or other nitrogen containing repellents selected from amines, amides and nitrogen containing heterocyclic compounds.

22 Claims, 484 Drawing Sheets

| 1% DEET Avg | 1% PMD Avg | Additive Repellency - Expected | Additive Repellency - Actual |
|---|---|---|---|
| 52.9% | 26.35% | 79.24% | 70.54% |

| 1.5% PMD | 0.5% DEET | Additive Repellency - Expected | Additive Repellency - Actual |
|---|---|---|---|
| 34.6% | 29.55% | 64.16% | 71.21% |

| 1% PMD Avg | 0.5% Geranyl Acetone Avg | Additive Repellency – Expected | Additive Repellency - Actual |
|---|---|---|---|
| 26.4% | 26.69% | 53.04% | 66.74% |

| 0.5% Geranyl Acetone Avg | 0.5% DEET | Additive Repellency – Expected | Additive Repellency - Actual |
|---|---|---|---|
| 26.7% | 29.55% | 56.24% | 90.43% |

Related U.S. Application Data

(60) Provisional application No. 61/962,663, filed on Nov. 13, 2013.

(51) Int. Cl.

| | |
|---|---|
| ***A01N 37/18*** | (2006.01) |
| ***A01N 37/36*** | (2006.01) |
| ***A01N 37/42*** | (2006.01) |
| ***A01N 43/16*** | (2006.01) |

(56) References Cited

U.S. PATENT DOCUMENTS

| | | | | |
|---|---|---|---|---|
| 8,551,510 | B2 | 10/2013 | Bedoukian | |
| 8,685,471 | B2 | 4/2014 | Enan | |
| 8,795,699 | B2 | 8/2014 | Kroepke et al. | |
| 9,314,029 | B2 | 4/2016 | Bedoukian | |
| 2006/0182775 | A1* | 8/2006 | Everett | A01N 65/08 424/769 |
| 2008/0305135 | A1 | 12/2008 | Kroepke et al. | |
| 2008/0319015 | A1 | 12/2008 | Gruenewald | |
| 2009/0306217 | A1 | 12/2009 | Pickett et al. | |
| 2011/0076244 | A1 | 3/2011 | Hammer | |
| 2012/0045525 | A1 | 2/2012 | Ma | |
| 2012/0046359 | A1 | 2/2012 | Bedoukian | |
| 2013/0136704 | A1 | 5/2013 | Komatsuki et al. | |
| 2013/0165479 | A1 | 6/2013 | Gomtsyan et al. | |
| 2014/0323561 | A1 | 10/2014 | Bedoukian | |
| 2015/0133406 | A1 | 5/2015 | Bedoukian | |
| 2017/0238555 | A1 | 8/2017 | Street et al. | |
| 2020/0022367 | A1 | 1/2020 | Bedoukian | |

FOREIGN PATENT DOCUMENTS

| | | | |
|---|---|---|---|
| CN | 1246276 | A | 3/2000 |
| CN | 104334022 | A | 2/2015 |
| CN | 105722390 | A | 6/2016 |
| JP | 2000119109 | A | 4/2000 |
| JP | 2000-509402 | A | 7/2000 |
| JP | 200509402 | A | 7/2000 |
| JP | 2005053813 | A | 3/2005 |
| JP | 2006001864 | | 1/2006 |
| JP | 2007119356 | | 5/2007 |
| JP | 2007119375 | | 5/2007 |
| JP | 2009510101 | A | 3/2009 |
| JP | 2009-520707 | A | 5/2009 |
| JP | 2009114117 | | 5/2009 |
| JP | 2009520707 | A | 5/2009 |
| JP | 2009120549 | A | 6/2009 |
| JP | 2009543870 | A | 12/2009 |
| JP | 2010116340 | A | 5/2010 |
| JP | 2013006823 | A | 1/2013 |
| JP | 2013112634 | A | 6/2013 |
| JP | 2013534522 | A | 9/2013 |
| JP | 2015-515980 | A | 6/2015 |
| JP | 2015-523319 | A | 8/2015 |
| JP | 2016-537348 | A | 12/2016 |
| JP | 2018-177792 | A | 11/2018 |
| JP | 2019-34906 | A | 3/2019 |
| JP | 2019034906 | A | 3/2019 |
| WO | 2006105842 | A1 | 10/2006 |
| WO | 2007041307 | A1 | 4/2007 |
| WO | 2008011054 | A2 | 1/2008 |
| WO | 2013112989 | A1 | 8/2013 |
| WO | 2013/165479 | A1 | 11/2013 |
| WO | 2013165477 | A1 | 11/2013 |
| WO | 2013165478 | A1 | 11/2013 |
| WO | 2013165479 | A1 | 11/2013 |
| WO | 2015061318 | A1 | 4/2015 |
| WO | 2015073671 | A1 | 5/2015 |
| WO | 2019055408 | A1 | 3/2019 |
| WO | 2021071896 | A1 | 4/2021 |

OTHER PUBLICATIONS

Toloza et al. , "The fumigant and repellent activity of aliphatic lactones against pediculus humanus capitis", (Anoplura:pediculidae), Mem Inst Osawaldo Cruz, 2006, 101(1), pp. 55-56.

Voskamp et al. , "Olfactory responses to attractants and repellents in tsetse", Medical and Veterinary Entomology, 1999, 13, 99. 386-392, Blackwell Science Ltd.

Brazilian Office Action for the corresponding Brazilian application BR 11 2016 009095-0 dated Mar. 5, 2022, 10 pages.

European Search Report dated Jan. 18, 2022 for European Appl. No. 21190779.5.

Bedoukian Robert H.; "Experimental Report"; European Paten Register of EP3068221; dated Dec. 2, 2019; pp. 1-76; URL:https://register.epo.org/application.

Chinese Office Action for the corresponding Chinese application 201480061735.3 dated Nov. 5, 2020, 29 pages.

Brazilian Office Action for the corresponding Brazilian application BR 11 2016 009095-0 dated Dec. 15, 2020, 10 pages.

Bedoukian, Robert H. "Experimental Report" European Patent Register of EP3068221, dated Dec. 2, 2019, XP55876806, European Patent Register.

Extended European Search Report for corresponding European application EP21190779.5, 14 pages, dated Jan. 18, 2022.

International Search Report for corresponding International (PCT) application PCT/US21/44340, 4 pages, dated Jan. 19, 2022.

International Written Opinion for corresponding International (PCT) application PCT/US21/44340, 6 pages, dated Jan. 19, 2022.

Xu et al "DEET and other repellents are inhibitors of mosquito odorant receptors for oviposition attractants", Insect Biochemistry and Molecular Biology, Aug. 22, 2019 vo. 113, p. 1-6.

Mexican Office Action for the corresponding Mexican application MX/a/2016/006059 dated Feb. 18, 2022, 5 pages.

European Office Action for the corresponding European application 14861892.9 dated Nov. 24, 2020, 10 pages.

Innocent et al"Constituents of the essential oil of *Suregada zanzibariensis* leaves are repellent to the mosquito, *Anopheles gambiae* s.s." Journal of Insect Science, Jan. 1, 2010, pp. 1-8, vol. 10, Downloaded from https://academic.oup.com/jinsectscience/article/10/1/57/842817 Jan. 7, 2021.

Japanese Office Action for the corresponding Japanese application JP2019-052270 dated Mar. 16, 2021, 8 pages.

Brazilian Office Action for the corresponding Brazilian application BR 11 2016 009095-0 dated Oct. 5, 2021, 10 pages.

International Search Report dated Jan. 27, 2015 from corresponding PCT/US2014/065454, 3 pages.

Written Opinion dated Jan. 27, 2015 from corresponding PCT/US2014/065454, 11 pages.

Chinese First Office Action dated Jan. 25, 2017 from corresponding Chinese Patent Application No. 201480061735.3, 16 pages.

Chinese Second Office Action for corresponding CN Application No. 201480061735.3, dated Jul. 14, 2017, 12 pages.

Walker,"Study ID's Several Bed Bug Repellents that Could Keep Your Luggage Pest Free", Entomology Today, https://entomologytoday.org/2018/02/12/study-bed-bug-repellents-keep-luggage-pest-free/.

Anderson et al, "Repellency of Naturally Occurring or Related Compounds DEET, and Para-Menthane-3,8-Diol to Bed Bugs (Hemiptera:Cimicidae)", Journal of Medical Entomology, XX(X), Jan. 7, 2018, Oxford University Press.

Japanese Notification of Reasons of Refusal, for the corresponding application JP2016-530015, dated Feb. 6, 2018, 16 pages.

Chinese Third Office Action for corresponding CN Application No. 201480061735.3, dated Feb. 24, 2018, 12 pages.

Japanese Patent Office Action for the corresponding application JP2016-530015, dated Nov. 20, 2018, 15 pages.

European Patent Office Communication for the corresponding application EP 14 861 892.9, dated May 8, 2018, 6 pages.

(56) References Cited

OTHER PUBLICATIONS

Extended European Search Report for the corresponding application EP 14 861 892.9, dated May 12, 2017, 8 pages.
European Patent Office Communication for the corresponding application EP 14 861 892.9, dated May 22, 2019, 5 pages.
Brazilian Patent Office Action for the corresponding application BR112016009095-0 dated Jul. 17, 2019, 4 pages.
European Patent Office Communication for the corresponding application EP 14 861 892.9, dated Feb. 27, 2020, 12 pages.
Voskamp et al "Olfactory Responses to Attractants and Repellents in Tste", Medical and Veterinary Entomology, 1999 (13) pp. 386-392, Blackwell Sciences Ltd.
Toloza et al "The Fumigant and Repellent Activity of Aliphatic Lactones Against Pediculus humanus capitis Anoplura: Pediculidae", Mem. Inst. Oswaldo Cruz. vol. 101 (1) pp. 55-56, Feb. 2006.
Japanese Office Action for the corresponding divisional application JP2019-052270 dated Apr. 3, 2020, 6 pages.
Chinese Office Action for the corresponding Chinese application 201480061735.3 dated Apr. 20, 2020, 26 pages.
Indonesian Office Action for the corresponding Indonesian application P00201602444 dated Jan. 20, 2020, 5 pages.
Logan, et al.; "Arm-in-Cage Testing of Natural Human-derived Mosquito Repellents"; BioMed Central, Malaria Journal, Aug. 20, 2010, 11 pages. (www.ncbi.nlm.nih.gov/pmc/articles/PMC2931528).
Ramirez, et al.; "Repellents Inhibit P450 Enzymes in Stegomyia (Aedes) Aegypti"; PLOS One, Nov. 13, 2012, 10 pages. (http://journals.plos.org/plosone/article?id=10.137/journal. pone. 0048698).
Rothamsted Research, Ltd., "Pest Repellent Comprising Geranylacetone"; Reference: Patent 166, University of Aberdeen, United Kingdom, 2 pages. (www./rothamsted.ac.uk/sites/default/files/attachments/2013-10-9/Rothamsted).
"Experimental report, European Paten Register of EP3068221 (WO 2015/073671 A1)", Bedoukian Robert H., European Patent register, pp. 1-76; https://register.epo.org/application?number=EP14861892&lng=en&tab=doclist.
Chinese Office Action dated Nov. 24, 2022 for Japanese Appl. No. 202110207640.X.
International Preliminary Report on Patentability (IPRP) dated Oct. 6, 2022 for PCT Appl. No. PCT/US2021/044340.
Chinese Office Action (English translation) dated Jul. 20, 2023 for Chinese Appl. No. 202110207640.X.
Japanese Office Action (English translation) dated Jun. 15, 2023 for Japanese Appl. No. 2021-129766.

* cited by examiner

Fig. 1

| 1% DEET Avg | 1% PMD Avg | Additive Repellency - Expected | Additive Repellency - Actual |
|---|---|---|---|
| 52.9% | 26.35% | 79.24% | 70.54% |

| 1.5% PMD | 0.5% DEET | Additive Repellency - Expected | Additive Repellency - Actual |
|---|---|---|---|
| 34.6% | 29.55% | 64.16% | 71.21% |

| 1% PMD Avg | 0.5% Geranyl Acetone Avg | Additive Repellency – Expected | Additive Repellency - Actual |
|---|---|---|---|
| 26.4% | 26.69% | 53.04% | 66.74% |

| 0.5% Geranyl Acetone Avg | 0.5% DEET | Additive Repellency – Expected | Additive Repellency - Actual |
|---|---|---|---|
| 26.7% | 29.55% | 56.24% | 90.43% |

Fig. 2

DEET

| ED* | Dose (% DEET) | Lower limit (% DEET) | Upper limit (% DEET) |
|---|---|---|---|
| 25 | 0.0351 | 0.0208 | 0.0465 |
| 50 | 0.1263 | 0.0867 | 0.1744 |
| 75 | 0.4552 | 0.3382 | 0.7017 |
| 90 | 1.4431 | 1.0915 | 2.5909 |
| 95 | 2.8783 | 2.1653 | 5.7534 |

*ED = effective dose required to repel the listed percent of mosquitoes. Top dose tested was 1.76% DEET or 0.022 mg/cm$^2$.

PMD

| ED* | Dose (% PMD) | Lower limit (% PMD) | Upper limit (% PMD) |
|---|---|---|---|
| 25 | 0.1275 | 0.0934 | 0.1602 |
| 50 | 0.4128 | 0.3236 | 0.5135 |
| 75 | 1.3362 | 1.075 | 1.7163 |
| 90 | 3.8464 | 3.058 | 5.2663 |
| 95 | 7.2415 | 5.6528 | 10.4174 |

*ED = effective dose required to repel the listed percent of mosquitoes. Top dose tested was 22.04% PMD or 0.275 mg/cm$^2$.

Fig. 2 (Cont.)

Geranyl Acetone

| ED* | Dose (% Geranyl Acetone) | Lower limit (% Geranyl Acetone) | Upper limit (% Geranyl Acetone) |
|---|---|---|---|
| 25 | 0.736 | 0.4774 | 0.967 |
| 50 | 2.831 | 2.0599 | 3.7014 |
| 75 | 10.889 | 8.3445 | 15.0896 |
| 90 | 36.608 | 27.8712 | 56.3769 |
| 95 | 75.631 | 56.4389 | 126.0811 |

*ED = effective dose required to repel the listed percent of mosquitoes.

Top dose tested was 88.14% Geranyl Acetone or 1.1 mg/cm$^2$.

Lactic Acid

| ED* | Dose (% Lactic Acid) | Lower limit (% Lactic Acid) | Upper limit (% Lactic Acid) |
|---|---|---|---|
| 25 | 2.794 | 1.7457 | 3.901 |
| 50 | 6.143 | 4.1746 | 9.2682 |
| 75 | 13.51 | 9.8895 | 22.2278 |
| 90 | 27.45 | 21.3288 | 49.2247 |
| 95 | 41.96 | 33.6754 | 79.4707 |

*ED = effective dose required to repel the listed percent of mosquitoes.

Top dose tested was 38.4% Lactic Acid or 0.48 mg/cm$^2$.

Fig. 2 (Cont.)

Gamma Dodecalactone

| ED | Dose (% γ Dodecalactone) | Lower limit (% γ Dodecalactone) | Upper limit (% γ Dodecalactone) |
|---|---|---|---|
| 25 | 0.4177 | 0.281 | 0.5485 |
| 50 | 1.8022 | 1.3403 | 2.3328 |
| 75 | 7.7764 | 6.0143 | 10.5477 |
| 90 | 28.994 | 22.0652 | 43.1787 |
| 95 | 63.726 | 47.2986 | 101.917 |

*ED = effective dose required to repel the listed percent of mosquitoes. Top dose tested was 88.14% Gamma Dodecalactone or 1.1 mg/cm$^2$.

Fig. 3

DEET: Geranyl Acetone – Calculations based on DEET Dosage

| ED | Dose (% DEET) | Dose (% gA) | Lower limit (% DEET) | Lower limit (% gA) | Upper limit (% DEET) | Upper limit (% gA) |
|---|---|---|---|---|---|---|
| 25 | 0.0075 | 0.0752 | 0.0061 | 0.0607 | 0.0091 | 0.0907 |
| 50 | 0.0283 | 0.2827 | 0.0248 | 0.2477 | 0.032 | 0.3197 |
| 75 | 0.1062 | 1.0625 | 0.094 | 0.9402 | 0.1211 | 1.2112 |
| 90 | 0.3498 | 3.4984 | 0.2929 | 2.9289 | 0.4284 | 4.2835 |
| 95 | 0.7138 | 7.1381 | 0.5715 | 5.7151 | 0.9227 | 9.2272 |

*ED = effective dose required to repel the listed percent of mosquitoes. Top dose tested was 1.0% DEET + 10.0% Geranyl Acetone or 0.0125 mg/cm$^2$ DEET + 0.125 mg/cm$^2$ Geranyl Acetone. Calculations were based on DEET dosage used.

PMD: Geranyl Acetone – Calculations based on PMD Dosage

| ED | Dose (% PMD) | Dose (% gA) | Lower limit (% PMD) | Lower limit (% gA) | Upper limit (% PMD) | Upper limit (% gA) |
|---|---|---|---|---|---|---|
| 25 | 0.0056 | 0.0186 | 0.0009 | 0.0029 | 0.0055 | 0.0183 |
| 50 | 0.0262 | 0.0873 | 0.0077 | 0.0257 | 0.0354 | 0.118 |
| 75 | 0.1233 | 0.4109 | 0.0623 | 0.2076 | 0.2535 | 0.8449 |
| 90 | 0.497 | 1.6564 | 0.3653 | 1.2173 | 1.6674 | 5.5563 |
| 95 | 1.1448 | 3.8149 | 1.0081 | 3.3595 | 5.3747 | 17.9079 |

*ED = effective dose required to repel the listed percent of mosquitoes. Top dose tested was 1.5% PMD + 5.0% Geranyl Acetone or 0.0187 mg/cm$^2$ PMD + 0.062 mg/cm$^2$ Geranyl Acetone. Calculations were based on PMD dose used.

Fig. 3 (Cont.)

DEET: Lactic Acid – Calculations based on DEET Dosage

| ED | Dose (% DEET) | Dose (% LA) | Lower limit (% DEET) | Lower limit (% LA) | Upper limit (% DEET) | Upper limit (% LA) |
|---|---|---|---|---|---|---|
| 25 | 0.0129 | 0.0156 | 0.0082 | 0.0102 | 0.0172 | 0.0206 |
| 50 | 0.0546 | 0.0655 | 0.0384 | 0.0471 | 0.0744 | 0.0876 |
| 75 | 0.231 | 0.2757 | 0.1714 | 0.2074 | 0.3382 | 0.3903 |
| 90 | 0.8467 | 1.0049 | 0.6325 | 0.7575 | 1.3757 | 1.5557 |
| 95 | 1.8421 | 2.179 | 1.3632 | 1.6235 | 3.2278 | 3.6045 |

*ED = effective dose required to repel the listed percent of mosquitoes. Top dose tested was 2.0% DEET + 2.4% Lactic Acid or 0.025 mg/cm$^2$ DEET + 0.030 mg/cm$^2$ Lactic Acid. Calculations were based on DEET dose used.

PMD: Lactic Acid – Calculations based on PMD Dosage

| ED | Dose (% PMD) | Dose (% LA) | Lower limit (% PMD) | Lower limit (% LA) | Upper limit (% PMD) | Upper limit (% LA) |
|---|---|---|---|---|---|---|
| 25 | 0.0294 | 0.0121 | 0.0243 | 0.0085 | 0.0346 | 0.0154 |
| 50 | 0.0966 | 0.0383 | 0.0859 | 0.0297 | 0.1079 | 0.0481 |
| 75 | 0.3173 | 0.1215 | 0.2802 | 0.097 | 0.3639 | 0.1613 |
| 90 | 0.9258 | 0.3433 | 0.7697 | 0.2673 | 1.1467 | 0.5051 |
| 95 | 1.7572 | 0.6392 | 1.3974 | 0.4834 | 2.2982 | 1.014 |

*ED = effective dose required to repel the listed percent of mosquitoes. Top dose tested was 1.5% PMD + 0.6% Lactic Acid or 0.0187 mg/cm$^2$ PMD + 0.0075 mg/cm$^2$ Lactic Acid. Calculations were based on PMD dose used.

Fig. 3 (Cont.)

DEET: Gamma Dodecalactone – Calculations based on DEET Dosage

| ED | Dose (% DEET) | Dose (% γD) | Lower limit (% DEET) | Lower limit (%γD) | Upper limit (% DEET) | Upper limit (%γD) |
|---|---|---|---|---|---|---|
| 25 | 0.0015 | 0.0152 | 0.0002 | 0.0024 | 0.0018 | 0.0176 |
| 50 | 0.0129 | 0.1294 | 0.0043 | 0.0429 | 0.0196 | 0.1963 |
| 75 | 0.1105 | 1.1051 | 0.0627 | 0.6268 | 0.263 | 2.6293 |
| 90 | 0.7617 | 7.6158 | 0.5849 | 5.848 | 3.2582 | 32.5661 |
| 95 | 2.4179 | 24.1757 | 2.1055 | 21.0477 | 15.5349 | 155.2425 |

*ED = effective dose required to repel the listed percent of mosquitoes. Top dose tested was 1.0% DEET + 10.0% γ Dodecalactone or 0.0125 mg/cm$^2$ DEET + 0.12 mg/cm$^2$ γ Dodecalatone. Calculations were based on DEET dose used.

PMD: Gamma Dodecalactone – Calculations based on PMD Dosage

| ED | Dose (% PMD) | Dose (% γD) | Lower limit (% PMD) | Lower limit (%γD) | Upper limit (% PMD) | Upper limit (%γD) |
|---|---|---|---|---|---|---|
| 25 | 0.0086 | 0.0259 | 0.0064 | 0.0186 | 0.0111 | 0.034 |
| 50 | 0.0266 | 0.0854 | 0.022 | 0.0698 | 0.0312 | 0.1013 |
| 75 | 0.0818 | 0.2812 | 0.0728 | 0.2488 | 0.0919 | 0.3173 |
| 90 | 0.2252 | 0.8221 | 0.1947 | 0.7051 | 0.2665 | 0.9829 |
| 95 | 0.4128 | 1.562 | 0.3417 | 1.2775 | 0.5174 | 1.9902 |

*ED = effective dose required to repel the listed percent of mosquitoes. Top dose tested was 0.75% PMD + 3.25% γ Dodecalactone or 0.0009 mg/cm$^2$ PMD + 0.0312 mg/cm$^2$ γ Dodecalatone. Calculations were based on PMD dose used.

Fig. 3 (Cont.)

DEET: PMD – Calculations based on DEET Dosage

| ED | Dose (% DEET) | Dose (% PMD) | Lower limit (% DEET) | Lower limit (% PMD) | Upper limit (% DEET) | Upper limit (% PMD) |
|---|---|---|---|---|---|---|
| 25 | 0.0053 | 0.0159 | 0.0033 | 0.0099 | 0.007 | 0.0209 |
| 50 | 0.0179 | 0.0537 | 0.0129 | 0.0386 | 0.023 | 0.0691 |
| 75 | 0.0604 | 0.1813 | 0.0467 | 0.1401 | 0.0816 | 0.2449 |
| 90 | 0.1807 | 0.5421 | 0.1394 | 0.4181 | 0.273 | 0.819 |
| 95 | 0.348 | 1.0441 | 0.2626 | 0.7879 | 0.574 | 1.722 |

*ED = effective dose required to repel the listed percent of mosquitoes. Top dose tested was 0.5% DEET + 1.5% PMD or 0.00624 mg/cm$^2$ DEET + 0.01872 mg/cm$^2$ PMD. Calculations were based on DEET dose used.

DEET: PMD – Calculations based on PMD Dosage

| ED | Dose (% PMD) | Dose (% DEET) | Lower limit (% PMD) | Lower limit (% DEET) | Upper limit (% PMD) | Upper limit (% DEET) |
|---|---|---|---|---|---|---|
| 25 | 0.0159 | 0.0053 | 0.0099 | 0.0033 | 0.0209 | 0.007 |
| 50 | 0.0537 | 0.0179 | 0.0386 | 0.0129 | 0.0691 | 0.023 |
| 75 | 0.1813 | 0.0604 | 0.1401 | 0.0467 | 0.2449 | 0.0816 |
| 90 | 0.5421 | 0.1807 | 0.4181 | 0.1394 | 0.819 | 0.273 |
| 95 | 1.0441 | 0.348 | 0.7879 | 0.2626 | 1.722 | 0.574 |

*ED = effective dose required to repel the listed percent of mosquitoes. Top dose tested was 0.5% DEET + 1.5% PMD or 0.00624 mg/cm$^2$ DEET + 0.01872 mg/cm$^2$ PMD. Calculations were based on PMD dose used.

Fig. 4

DEET Combinations – Calculations based on DEET dose

| No | Line name | ED50 (% DEET) | Lower limit (% DEET) | Upper limit (% DEET) | 1 | 2 | 3 | 4 | 5 | Index | RR | Slope | ED90 (%AI) |
|---|---|---|---|---|---|---|---|---|---|---|---|---|---|
| 1 | DEET: Gamma Dodecalactone | 0.013 | 0.0043 | 0.02 | * | * | | | | 100 | 1 | 0.72 | 0.762 |
| 2 | DEET:PMD | 0.018 | 0.013 | 0.023 | * | * | | | | 72.22 | 1.39 | 1.28 | 0.181 |
| 3 | DEET: Geranyl Acetone | 0.028 | 0.025 | 0.032 | | | * | | | 46.43 | 2.15 | 1.17 | 0.35 |
| 4 | DEET: Lactic Acid | 0.055 | 0.038 | 0.074 | | | | * | | 23.64 | 4.23 | 1.08 | 0.847 |
| 5 | DEET | 0.126 | 0.087 | 0.174 | | | | | * | 10.32 | 9.69 | 1.21 | 1.443 |

Fig. 4 (Cont.)

PMD Combinations -- Calculations based on PMD dose

| No | Line name | ED50 (% PMD) | Lower limit (% PMD) | Upper limit (% PMD) | 1 | 2 | 3 | 4 | 5 | Index | RR | Slope | ED90 (%AI) |
|---|---|---|---|---|---|---|---|---|---|---|---|---|---|
| 1 | DEET:PMD | 0.018 | 0.013 | 0.023 | * | * | * | | | 100 | 1 | 1.28 | 0.181 |
| 2 | PMD: Geranyl Acetone | 0.026 | 0.0077 | 0.035 | * | * | * | | | 69.23 | 1.444 | 1.00 | 0.497 |
| 3 | PMD: Gamma Dodecalactone | 0.027 | 0.022 | 0.031 | * | * | * | | | 66.67 | 1.5 | 1.38 | 0.225 |
| 4 | PMD: Lactic Acid | 0.097 | 0.086 | 0.108 | | | | * | | 18.56 | 5.39 | 1.31 | 0.926 |
| 5 | PMD | 0.413 | 0.324 | 0.514 | | | | | * | 4.36 | 22.94 | 1.32 | 3.846 |

Fig. 5

DEET Combinations -- Calculations based on DEET dose

| Treatment | DEET | PMD | EXPECTED - DEET:PMD | ACTUAL - DEET:PMD |
|---|---|---|---|---|
| Dose (% Active) | 0.0351 | 0.1275 | 0.1626 | 0.1626 |
| % Repelled | 25 | 25 | 50 | 88.93 |

| Treatment | DEET | Lactic Acid | EXPECTED - DEET:Lactic Acid | ACTUAL - DEET:Lactic Acid |
|---|---|---|---|---|
| Dose (% Active) | 0.0351 | 2.7938 | 2.8289 | 2.8289 |
| % Repelled | 25 | 25 | 50 | 96.73 |

Fig. 5 (Cont.)

DEET Combinations – Calculations based on DEET dose

| Treatment | DEET | Geranyl Acetone | EXPECTED - DEET:Geranyl Acetone | ACTUAL - DEET:Geranyl Acetone |
|---|---|---|---|---|
| Dose (% Active) | 0.0351 | 0.736 | 0.7711 | 0.7711 |
| % Repelled | 25 | 25 | 50 | 95.37 |

| Treatment | DEET | Gamma Dodecalactone | EXPECTED - DEET: Gamma Dodecalactone | ACTUAL - DEET: Gamma Dodecalactone |
|---|---|---|---|---|
| Dose (% Active) | 0.0351 | 0.4177 | 0.4528 | 0.4528 |
| % Repelled | 25 | 25 | 50 | 86.819 |

Fig. 5 (Cont.)

PMD Combinations -- Calculations based on PMD dose

| Treatment | DEET | PMD | EXPECTED - DEET:PMD | ACTUAL - DEET:PMD |
|---|---|---|---|---|
| Dose (% Active) | 0.0351 | 0.1275 | 0.1626 | 0.1626 |
| % Repelled | 25 | 25 | 50 | 73.046 |

| Treatment | PMD | Lactic Acid | EXPECTED - PMD:Lactic Acid | ACTUAL - PMD:Lactic Acid |
|---|---|---|---|---|
| Dose (% Active) | 0.1275 | 2.7938 | 2.9213 | 2.9213 |
| % Repelled | 25 | 25 | 50 | 97.3 |

Fig. 5 (Cont.)

PMD Combinations – Calculations based on PMD dose

| Treatment | PMD | Geranyl Acetone | EXPECTED - PMD:Geranyl Acetone | ACTUAL - PMD:Geranyl Acetone |
|---|---|---|---|---|
| Dose (% Active) | 0.1275 | 0.736 | 0.8635 | 0.8635 |
| % Repelled | 25 | 25 | 50 | 93.586 |

| Treatment | PMD | Gamma Dodecalactone | EXPECTED - PMD: Gamma Dodecalactone | ACTUAL - PMD: Gamma Dodecalactone |
|---|---|---|---|---|
| Dose (% Active) | 0.1275 | 0.4177 | 0.5452 | 0.5452 |
| % Repelled | 25 | 25 | 50 | 96.469 |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 2 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 3 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 4 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 5 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 6 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 7 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 8 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 9 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 10 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 11 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 12 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 13 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 14 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 15 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 16 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 17 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 18 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 19 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 20 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 21 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 22 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 23 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 24 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 25 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 26 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 27 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 28 | 0.00% | 0.25% | 0.00% | 0.25% | 0.00% | 9% | 12% | 14% | 18% | 10% | 13% | 15% | 20% | 11% | 14% | 11% | 11% | 12% | 12% |
| 29 | 0.25% | 0.25% | 0.00% | 0.25% | 0.00% | 11% | 14% | 15% | 20% | 12% | 16% | 16% | 21% | 12% | 16% | 13% | 13% | 13% | 13% |
| 30 | 9.00% | 0.25% | 0.00% | 0.25% | 0.00% | 9% | 12% | 14% | 18% | 10% | 13% | 15% | 20% | 11% | 14% | 11% | 11% | 12% | 12% |
| 31 | 1.00% | 1.00% | 0.00% | 0.25% | 0.00% | 16% | 21% | 19% | 25% | 19% | 25% | 21% | 27% | 17% | 22% | 18% | 18% | 19% | 19% |
| 32 | 1.00% | 9.00% | 0.00% | 0.25% | 0.00% | 24% | 31% | 27% | 35% | 25% | 33% | 28% | 36% | 24% | 31% | 25% | 25% | 26% | 26% |
| 33 | 0.00% | 0.00% | 0.25% | 0.25% | 0.00% | 10% | 13% | 13% | 17% | 13% | 17% | 17% | 22% | 14% | 18% | 12% | 12% | 15% | 15% |
| 34 | 0.25% | 0.00% | 0.25% | 0.25% | 0.00% | 12% | 16% | 14% | 18% | 15% | 20% | 18% | 23% | 15% | 20% | 14% | 14% | 16% | 16% |
| 35 | 0.00% | 0.25% | 0.25% | 0.25% | 0.00% | 14% | 18% | 18% | 23% | 17% | 22% | 22% | 29% | 18% | 23% | 16% | 16% | 19% | 19% |
| 36 | 0.25% | 0.25% | 0.25% | 0.25% | 0.00% | 16% | 21% | 19% | 25% | 19% | 25% | 23% | 30% | 19% | 25% | 18% | 18% | 20% | 20% |
| 37 | 1.00% | 0.25% | 0.25% | 0.25% | 0.00% | 18% | 23% | 20% | 26% | 22% | 29% | 25% | 33% | 21% | 27% | 20% | 20% | 23% | 23% |
| 38 | 9.00% | 0.25% | 0.25% | 0.25% | 0.00% | 14% | 18% | 18% | 23% | 17% | 22% | 22% | 29% | 18% | 23% | 16% | 16% | 19% | 19% |
| 39 | 0.25% | 1.00% | 0.25% | 0.25% | 0.00% | 19% | 25% | 22% | 29% | 23% | 30% | 26% | 34% | 22% | 29% | 21% | 21% | 24% | 24% |
| 40 | 9.00% | 1.00% | 0.25% | 0.25% | 0.00% | 17% | 22% | 21% | 27% | 21% | 27% | 25% | 33% | 21% | 27% | 20% | 20% | 22% | 22% |
| 41 | 0.25% | 9.00% | 0.25% | 0.25% | 0.00% | 27% | 35% | 30% | 39% | 29% | 38% | 33% | 43% | 29% | 38% | 29% | 29% | 30% | 30% |
| 42 | 1.00% | 9.00% | 0.25% | 0.25% | 0.00% | 29% | 38% | 31% | 40% | 32% | 42% | 35% | 46% | 31% | 40% | 31% | 31% | 33% | 33% |
| 43 | 9.00% | 9.00% | 0.25% | 0.25% | 0.00% | 25% | 33% | 29% | 38% | 27% | 35% | 32% | 42% | 28% | 36% | 27% | 27% | 29% | 29% |
| 44 | 0.00% | 0.00% | 1.00% | 0.25% | 0.00% | 15% | 20% | 20% | 26% | 18% | 23% | 19% | 25% | 19% | 25% | 18% | 18% | 19% | 19% |
| 45 | 1.00% | 0.00% | 1.00% | 0.25% | 0.00% | 19% | 25% | 22% | 29% | 23% | 30% | 22% | 29% | 22% | 29% | 21% | 21% | 22% | 22% |
| 46 | 0.00% | 0.25% | 1.00% | 0.25% | 0.00% | 19% | 25% | 25% | 33% | 22% | 29% | 24% | 31% | 23% | 30% | 22% | 22% | 23% | 23% |
| 47 | 0.25% | 0.25% | 1.00% | 0.25% | 0.00% | 21% | 27% | 26% | 34% | 24% | 31% | 25% | 33% | 24% | 31% | 24% | 24% | 24% | 24% |
| 48 | 1.00% | 0.25% | 1.00% | 0.25% | 0.00% | 23% | 30% | 27% | 35% | 27% | 35% | 27% | 35% | 26% | 34% | 26% | 26% | 27% | 27% |
| 49 | 9.00% | 0.25% | 1.00% | 0.25% | 0.00% | 19% | 25% | 25% | 33% | 22% | 29% | 24% | 31% | 23% | 30% | 22% | 22% | 23% | 23% |
| 50 | 0.00% | 1.00% | 1.00% | 0.25% | 0.00% | 22% | 29% | 28% | 36% | 26% | 34% | 27% | 35% | 26% | 34% | 25% | 25% | 26% | 26% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 51 | 0.25% | 1.00% | 1.00% | 0.25% | 0.00% | 24% | 31% | 29% | 38% | 28% | 36% | 28% | 36% | 27% | 35% | 27% | 27% | 28% | 28% |
| 52 | 1.00% | 1.00% | 1.00% | 0.25% | 0.00% | 26% | 34% | 30% | 39% | 31% | 40% | 30% | 39% | 29% | 38% | 29% | 29% | 30% | 30% |
| 53 | 9.00% | 1.00% | 1.00% | 0.25% | 0.00% | 22% | 29% | 28% | 36% | 26% | 34% | 27% | 35% | 26% | 34% | 25% | 25% | 26% | 26% |
| 54 | 0.00% | 9.00% | 1.00% | 0.25% | 0.00% | 30% | 39% | 36% | 47% | 32% | 42% | 34% | 44% | 33% | 43% | 33% | 33% | 33% | 33% |
| 55 | 0.25% | 9.00% | 1.00% | 0.25% | 0.00% | 32% | 42% | 37% | 48% | 34% | 44% | 35% | 46% | 34% | 44% | 34% | 34% | 34% | 34% |
| 56 | 1.00% | 9.00% | 1.00% | 0.25% | 0.00% | 34% | 44% | 38% | 49% | 37% | 48% | 37% | 48% | 36% | 47% | 36% | 36% | 37% | 37% |
| 57 | 0.25% | 0.25% | 9.00% | 0.25% | 0.00% | 31% | 40% | 34% | 44% | 38% | 49% | 32% | 42% | 38% | 49% | 34% | 34% | 36% | 36% |
| 58 | 1.00% | 0.25% | 9.00% | 0.25% | 0.00% | 33% | 43% | 35% | 46% | 41% | 53% | 34% | 44% | 40% | 52% | 36% | 36% | 38% | 38% |
| 59 | 9.00% | 0.25% | 9.00% | 0.25% | 0.00% | 29% | 38% | 33% | 43% | 36% | 47% | 31% | 40% | 37% | 48% | 33% | 33% | 35% | 35% |
| 60 | 0.00% | 1.00% | 9.00% | 0.25% | 0.00% | 32% | 42% | 36% | 47% | 40% | 52% | 34% | 44% | 40% | 52% | 36% | 36% | 38% | 38% |
| 61 | 0.25% | 1.00% | 9.00% | 0.25% | 0.00% | 34% | 44% | 37% | 48% | 42% | 55% | 35% | 46% | 41% | 53% | 38% | 38% | 39% | 39% |
| 62 | 9.00% | 1.00% | 9.00% | 0.25% | 0.00% | 32% | 42% | 36% | 47% | 40% | 52% | 34% | 44% | 40% | 52% | 36% | 36% | 38% | 38% |
| 63 | 1.00% | 9.00% | 9.00% | 0.25% | 0.00% | 44% | 57% | 46% | 60% | 51% | 66% | 44% | 57% | 50% | 65% | 47% | 47% | 48% | 48% |
| 64 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 65 | 1.00% | 0.25% | 0.00% | 1.00% | 0.00% | 28% | 36% | 28% | 36% | 27% | 35% | 28% | 36% | 29% | 38% | 28% | 28% | 28% | 28% |
| 66 | 0.00% | 1.00% | 0.00% | 1.00% | 0.00% | 27% | 35% | 29% | 38% | 26% | 34% | 28% | 36% | 29% | 38% | 27% | 27% | 28% | 28% |
| 67 | 0.25% | 1.00% | 0.00% | 1.00% | 0.00% | 29% | 38% | 30% | 39% | 28% | 36% | 29% | 38% | 30% | 39% | 29% | 29% | 29% | 29% |
| 68 | 1.00% | 1.00% | 0.00% | 1.00% | 0.00% | 31% | 40% | 31% | 40% | 31% | 40% | 31% | 40% | 32% | 42% | 31% | 31% | 31% | 31% |
| 69 | 0.00% | 0.00% | 0.25% | 1.00% | 0.00% | 25% | 33% | 25% | 33% | 25% | 33% | 27% | 35% | 29% | 38% | 25% | 25% | 27% | 27% |
| 70 | 1.00% | 0.00% | 0.25% | 1.00% | 0.00% | 29% | 38% | 27% | 35% | 30% | 39% | 30% | 39% | 32% | 42% | 29% | 29% | 31% | 31% |
| 71 | 0.25% | 0.25% | 0.25% | 1.00% | 0.00% | 31% | 40% | 31% | 40% | 31% | 40% | 33% | 43% | 34% | 44% | 31% | 31% | 33% | 33% |
| 72 | 1.00% | 0.25% | 0.25% | 1.00% | 0.00% | 33% | 43% | 32% | 42% | 34% | 44% | 35% | 46% | 36% | 47% | 33% | 33% | 35% | 35% |
| 73 | 9.00% | 0.25% | 0.25% | 1.00% | 0.00% | 29% | 38% | 30% | 39% | 29% | 38% | 32% | 42% | 33% | 43% | 29% | 29% | 31% | 31% |
| 74 | 0.00% | 1.00% | 0.25% | 1.00% | 0.00% | 32% | 42% | 33% | 43% | 33% | 43% | 35% | 46% | 36% | 47% | 33% | 33% | 35% | 35% |
| 75 | 0.25% | 1.00% | 0.25% | 1.00% | 0.00% | 34% | 44% | 34% | 44% | 35% | 46% | 36% | 47% | 37% | 48% | 34% | 34% | 36% | 36% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 76 | 1.00% | 1.00% | 0.25% | 1.00% | 0.00% | 36% | 47% | 35% | 46% | 38% | 49% | 38% | 49% | 39% | 51% | 36% | 36% | 38% | 38% |
| 77 | 9.00% | 1.00% | 0.25% | 1.00% | 0.00% | 32% | 42% | 33% | 43% | 33% | 43% | 35% | 46% | 36% | 47% | 33% | 33% | 35% | 35% |
| 78 | 0.25% | 9.00% | 0.25% | 1.00% | 0.00% | 42% | 55% | 42% | 55% | 41% | 53% | 43% | 56% | 44% | 57% | 42% | 42% | 43% | 43% |
| 79 | 1.00% | 9.00% | 0.25% | 1.00% | 0.00% | 44% | 57% | 43% | 56% | 44% | 57% | 45% | 59% | 46% | 60% | 44% | 44% | 45% | 45% |
| 80 | 9.00% | 9.00% | 0.25% | 1.00% | 0.00% | 40% | 52% | 41% | 53% | 39% | 51% | 42% | 55% | 43% | 56% | 40% | 40% | 41% | 41% |
| 81 | 0.00% | 0.00% | 1.00% | 1.00% | 0.00% | 30% | 39% | 32% | 42% | 30% | 39% | 29% | 38% | 34% | 44% | 31% | 31% | 31% | 31% |
| 82 | 0.25% | 0.00% | 1.00% | 1.00% | 0.00% | 32% | 42% | 33% | 43% | 32% | 42% | 30% | 39% | 35% | 46% | 32% | 32% | 32% | 32% |
| 83 | 1.00% | 0.00% | 1.00% | 1.00% | 0.00% | 34% | 44% | 34% | 44% | 35% | 46% | 32% | 42% | 37% | 48% | 34% | 34% | 35% | 35% |
| 84 | 0.00% | 0.25% | 1.00% | 1.00% | 0.00% | 34% | 44% | 37% | 48% | 34% | 44% | 34% | 44% | 38% | 49% | 35% | 35% | 35% | 35% |
| 85 | 1.00% | 0.25% | 1.00% | 1.00% | 0.00% | 38% | 49% | 39% | 51% | 39% | 51% | 37% | 48% | 41% | 53% | 39% | 39% | 39% | 39% |
| 86 | 9.00% | 0.25% | 1.00% | 1.00% | 0.00% | 34% | 44% | 37% | 48% | 34% | 44% | 34% | 44% | 38% | 49% | 35% | 35% | 35% | 35% |
| 87 | 0.00% | 1.00% | 1.00% | 1.00% | 0.00% | 37% | 48% | 40% | 52% | 38% | 49% | 37% | 48% | 41% | 53% | 38% | 38% | 39% | 39% |
| 88 | 0.25% | 1.00% | 1.00% | 1.00% | 0.00% | 39% | 51% | 41% | 53% | 40% | 52% | 38% | 49% | 42% | 55% | 40% | 40% | 40% | 40% |
| 89 | 1.00% | 1.00% | 1.00% | 1.00% | 0.00% | 41% | 53% | 42% | 55% | 43% | 56% | 40% | 52% | 44% | 57% | 42% | 42% | 42% | 42% |
| 90 | 9.00% | 1.00% | 1.00% | 1.00% | 0.00% | 37% | 48% | 40% | 52% | 38% | 49% | 37% | 48% | 41% | 53% | 38% | 38% | 39% | 39% |
| 91 | 0.00% | 9.00% | 1.00% | 1.00% | 0.00% | 45% | 59% | 48% | 62% | 44% | 57% | 44% | 57% | 48% | 62% | 46% | 46% | 45% | 45% |
| 92 | 0.25% | 9.00% | 1.00% | 1.00% | 0.00% | 47% | 61% | 49% | 64% | 46% | 60% | 45% | 59% | 49% | 64% | 47% | 47% | 47% | 47% |
| 93 | 1.00% | 9.00% | 1.00% | 1.00% | 0.00% | 49% | 64% | 50% | 65% | 49% | 64% | 47% | 61% | 51% | 66% | 49% | 49% | 49% | 49% |
| 94 | 0.25% | 0.25% | 9.00% | 1.00% | 0.00% | 46% | 60% | 46% | 60% | 50% | 65% | 42% | 55% | 53% | 69% | 47% | 47% | 48% | 48% |
| 95 | 1.00% | 0.25% | 9.00% | 1.00% | 0.00% | 48% | 62% | 47% | 61% | 53% | 69% | 44% | 57% | 55% | 72% | 49% | 49% | 51% | 51% |
| 96 | 9.00% | 0.25% | 9.00% | 1.00% | 0.00% | 44% | 57% | 45% | 59% | 48% | 62% | 41% | 53% | 52% | 68% | 46% | 46% | 47% | 47% |
| 97 | 0.25% | 1.00% | 9.00% | 1.00% | 0.00% | 49% | 64% | 49% | 64% | 54% | 70% | 45% | 59% | 56% | 73% | 51% | 51% | 52% | 52% |
| 98 | 0.00% | 0.25% | 0.00% | 9.00% | 0.00% | 44% | 57% | 40% | 52% | 40% | 52% | 45% | 59% | 39% | 51% | 41% | 41% | 41% | 41% |
| 99 | 0.00% | 0.00% | 0.25% | 9.00% | 0.00% | 44% | 57% | 40% | 52% | 40% | 52% | 45% | 59% | 39% | 51% | 41% | 41% | 41% | 41% |
| 100 | 0.25% | 0.00% | 0.25% | 9.00% | 0.00% | 45% | 59% | 39% | 51% | 43% | 56% | 47% | 61% | 42% | 55% | 42% | 42% | 44% | 44% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 101 | 0.00% | 0.25% | 0.25% | 9.00% | 0.00% | 47% | 61% | 40% | 52% | 45% | 59% | 48% | 62% | 43% | 56% | 44% | 44% | 45% | 45% |
| 102 | 0.25% | 0.25% | 0.25% | 9.00% | 0.00% | 49% | 64% | 44% | 57% | 47% | 61% | 52% | 68% | 46% | 60% | 47% | 47% | 48% | 48% |
| 103 | 1.00% | 0.25% | 0.25% | 9.00% | 0.00% | 51% | 66% | 45% | 59% | 49% | 64% | 53% | 69% | 47% | 61% | 48% | 48% | 50% | 50% |
| 104 | 9.00% | 0.25% | 0.25% | 9.00% | 0.00% | 53% | 69% | 46% | 60% | 52% | 68% | 55% | 72% | 49% | 64% | 50% | 50% | 52% | 52% |
| 105 | 0.00% | 1.00% | 0.25% | 9.00% | 0.00% | 49% | 64% | 44% | 57% | 47% | 61% | 52% | 68% | 46% | 60% | 47% | 47% | 48% | 48% |
| 106 | 0.25% | 1.00% | 0.25% | 9.00% | 0.00% | 52% | 68% | 47% | 61% | 51% | 66% | 55% | 72% | 49% | 64% | 50% | 50% | 52% | 52% |
| 107 | 1.00% | 1.00% | 0.25% | 9.00% | 0.00% | 54% | 70% | 48% | 62% | 53% | 69% | 56% | 73% | 50% | 65% | 52% | 52% | 53% | 53% |
| 108 | 0.25% | 9.00% | 0.25% | 9.00% | 0.00% | 56% | 73% | 49% | 64% | 56% | 73% | 58% | 75% | 52% | 68% | 54% | 54% | 55% | 55% |
| 109 | 0.25% | 0.00% | 1.00% | 9.00% | 0.00% | 62% | 81% | 56% | 73% | 59% | 77% | 63% | 82% | 57% | 74% | 59% | 59% | 60% | 60% |
| 110 | 1.00% | 0.25% | 1.00% | 9.00% | 0.00% | 52% | 68% | 47% | 61% | 50% | 65% | 50% | 65% | 48% | 62% | 50% | 50% | 49% | 49% |
| 111 | 9.00% | 0.25% | 1.00% | 9.00% | 0.00% | 58% | 75% | 53% | 69% | 57% | 74% | 57% | 74% | 54% | 70% | 56% | 56% | 56% | 56% |
| 112 | 0.00% | 1.00% | 1.00% | 9.00% | 0.00% | 54% | 70% | 51% | 66% | 52% | 68% | 54% | 70% | 51% | 66% | 52% | 52% | 52% | 52% |
| 113 | 0.25% | 1.00% | 1.00% | 9.00% | 0.00% | 57% | 74% | 54% | 70% | 56% | 73% | 57% | 74% | 54% | 70% | 56% | 56% | 56% | 56% |
| 114 | 1.00% | 1.00% | 1.00% | 9.00% | 0.00% | 59% | 77% | 55% | 72% | 58% | 75% | 58% | 75% | 55% | 72% | 57% | 57% | 57% | 57% |
| 115 | 0.25% | 0.25% | 9.00% | 9.00% | 0.00% | 59% | 77% | 55% | 72% | 58% | 75% | 58% | 75% | 55% | 72% | 57% | 57% | 57% | 57% |
| 116 | 0.25% | 0.25% | 0.00% | 0.00% | 0.25% | 61% | 79% | 56% | 73% | 61% | 79% | 60% | 78% | 57% | 74% | 59% | 59% | 59% | 59% |
| 117 | 1.00% | 0.25% | 0.00% | 0.00% | 0.25% | 66% | 86% | 60% | 78% | 68% | 88% | 62% | 81% | 66% | 86% | 65% | 65% | 65% | 65% |
| 118 | 0.25% | 1.00% | 0.00% | 0.00% | 0.25% | 6% | 8% | 6% | 8% | 6% | 8% | 6% | 8% | 5% | 7% | 6% | 6% | 6% | 6% |
| 119 | 1.00% | 1.00% | 0.00% | 0.00% | 0.25% | 8% | 10% | 7% | 9% | 9% | 12% | 8% | 10% | 7% | 9% | 8% | 8% | 8% | 8% |
| 120 | 0.25% | 0.00% | 0.25% | 0.00% | 0.25% | 14% | 18% | 12% | 16% | 16% | 21% | 16% | 21% | 16% | 21% | 14% | 14% | 16% | 16% |
| 121 | 1.00% | 0.00% | 0.25% | 0.00% | 0.25% | 16% | 21% | 13% | 17% | 19% | 25% | 18% | 23% | 18% | 23% | 16% | 16% | 18% | 18% |
| 122 | 0.00% | 0.25% | 0.25% | 0.00% | 0.25% | 16% | 21% | 16% | 21% | 18% | 23% | 20% | 26% | 19% | 25% | 17% | 17% | 19% | 19% |
| 123 | 0.25% | 0.25% | 0.25% | 0.00% | 0.25% | 18% | 23% | 17% | 22% | 20% | 26% | 21% | 27% | 20% | 26% | 18% | 18% | 20% | 20% |
| 124 | 0.00% | 1.00% | 0.25% | 0.00% | 0.25% | 19% | 25% | 19% | 25% | 22% | 29% | 23% | 30% | 22% | 29% | 20% | 20% | 22% | 22% |
| 125 | 1.00% | 1.00% | 0.25% | 0.00% | 0.25% | 23% | 30% | 21% | 27% | 27% | 35% | 26% | 34% | 25% | 33% | 24% | 24% | 26% | 26% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 126 | 1.00% | 9.00% | 0.25% | 0.00% | 0.25% | 31% | 40% | 29% | 38% | 33% | 43% | 33% | 43% | 32% | 42% | 31% | 31% | 33% | 33% |
| 127 | 0.25% | 0.00% | 1.00% | 0.00% | 0.25% | 19% | 25% | 19% | 25% | 21% | 27% | 18% | 23% | 21% | 27% | 20% | 20% | 20% | 20% |
| 128 | 1.00% | 0.00% | 1.00% | 0.00% | 0.25% | 21% | 27% | 20% | 26% | 24% | 31% | 20% | 26% | 23% | 30% | 22% | 22% | 22% | 22% |
| 129 | 0.00% | 0.25% | 1.00% | 0.00% | 0.25% | 21% | 27% | 23% | 30% | 23% | 30% | 22% | 29% | 24% | 31% | 22% | 22% | 23% | 23% |
| 130 | 1.00% | 0.25% | 1.00% | 0.00% | 0.25% | 25% | 33% | 25% | 33% | 28% | 36% | 25% | 33% | 27% | 35% | 26% | 26% | 27% | 27% |
| 131 | 0.00% | 1.00% | 1.00% | 0.00% | 0.25% | 24% | 31% | 26% | 34% | 27% | 35% | 25% | 33% | 27% | 35% | 26% | 26% | 26% | 26% |
| 132 | 0.25% | 1.00% | 1.00% | 0.00% | 0.25% | 26% | 34% | 27% | 35% | 29% | 38% | 26% | 34% | 28% | 36% | 27% | 27% | 28% | 28% |
| 133 | 1.00% | 1.00% | 1.00% | 0.00% | 0.25% | 28% | 36% | 28% | 36% | 32% | 42% | 28% | 36% | 30% | 39% | 29% | 29% | 30% | 30% |
| 134 | 9.00% | 1.00% | 1.00% | 0.00% | 0.25% | 24% | 31% | 26% | 34% | 27% | 35% | 25% | 33% | 27% | 35% | 26% | 26% | 26% | 26% |
| 135 | 1.00% | 9.00% | 1.00% | 0.00% | 0.25% | 36% | 47% | 36% | 47% | 38% | 49% | 35% | 46% | 37% | 48% | 37% | 37% | 37% | 37% |
| 136 | 0.25% | 0.00% | 9.00% | 0.00% | 0.25% | 29% | 38% | 27% | 35% | 35% | 46% | 25% | 33% | 35% | 46% | 30% | 30% | 32% | 32% |
| 137 | 0.00% | 0.25% | 9.00% | 0.00% | 0.25% | 31% | 40% | 31% | 40% | 37% | 48% | 29% | 38% | 38% | 49% | 33% | 33% | 35% | 35% |
| 138 | 0.25% | 0.25% | 9.00% | 0.00% | 0.25% | 33% | 43% | 32% | 42% | 39% | 51% | 30% | 39% | 39% | 51% | 35% | 35% | 36% | 36% |
| 139 | 1.00% | 0.25% | 9.00% | 0.00% | 0.25% | 35% | 46% | 33% | 43% | 42% | 55% | 32% | 42% | 41% | 53% | 37% | 37% | 38% | 38% |
| 140 | 0.25% | 1.00% | 9.00% | 0.00% | 0.25% | 36% | 47% | 35% | 46% | 43% | 56% | 33% | 43% | 42% | 55% | 38% | 38% | 39% | 39% |
| 141 | 0.25% | 0.00% | 0.00% | 0.25% | 0.25% | 14% | 18% | 17% | 22% | 15% | 20% | 19% | 25% | 16% | 21% | 15% | 15% | 17% | 17% |
| 142 | 1.00% | 0.00% | 0.00% | 0.25% | 0.25% | 16% | 21% | 18% | 23% | 18% | 23% | 21% | 27% | 18% | 23% | 17% | 17% | 19% | 19% |
| 143 | 0.00% | 0.25% | 0.00% | 0.25% | 0.25% | 16% | 21% | 21% | 27% | 17% | 22% | 23% | 30% | 19% | 25% | 18% | 18% | 20% | 20% |
| 144 | 0.25% | 0.25% | 0.00% | 0.25% | 0.25% | 18% | 23% | 22% | 29% | 19% | 25% | 24% | 31% | 20% | 26% | 20% | 20% | 21% | 21% |
| 145 | 9.00% | 0.25% | 0.00% | 0.25% | 0.25% | 16% | 21% | 21% | 27% | 17% | 22% | 23% | 30% | 19% | 25% | 18% | 18% | 20% | 20% |
| 146 | 1.00% | 1.00% | 0.00% | 0.25% | 0.25% | 23% | 30% | 26% | 34% | 26% | 34% | 29% | 38% | 25% | 33% | 25% | 25% | 27% | 27% |
| 147 | 1.00% | 9.00% | 0.00% | 0.25% | 0.25% | 31% | 40% | 34% | 44% | 32% | 42% | 36% | 47% | 32% | 42% | 32% | 32% | 33% | 33% |
| 148 | 0.00% | 0.00% | 0.25% | 0.25% | 0.25% | 17% | 22% | 20% | 26% | 20% | 26% | 25% | 33% | 22% | 29% | 19% | 19% | 22% | 22% |
| 149 | 0.25% | 0.00% | 0.25% | 0.25% | 0.25% | 19% | 25% | 21% | 27% | 22% | 29% | 26% | 34% | 23% | 30% | 21% | 21% | 24% | 24% |
| 150 | 0.00% | 0.25% | 0.25% | 0.25% | 0.25% | 21% | 27% | 25% | 33% | 24% | 31% | 30% | 39% | 26% | 34% | 23% | 23% | 27% | 27% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 151 | 0.25% | 0.25% | 0.25% | 0.25% | 0.25% | 23% | 30% | 26% | 34% | 26% | 34% | 31% | 40% | 27% | 35% | 25% | 25% | 28% | 28% |
| 152 | 1.00% | 0.25% | 0.25% | 0.25% | 0.25% | 25% | 33% | 27% | 35% | 29% | 38% | 33% | 43% | 29% | 38% | 27% | 27% | 30% | 30% |
| 153 | 9.00% | 0.25% | 0.25% | 0.25% | 0.25% | 21% | 27% | 25% | 33% | 24% | 31% | 30% | 39% | 26% | 34% | 23% | 23% | 27% | 27% |
| 154 | 0.25% | 1.00% | 0.25% | 0.25% | 0.25% | 26% | 34% | 29% | 38% | 30% | 39% | 34% | 44% | 30% | 39% | 28% | 28% | 31% | 31% |
| 155 | 9.00% | 1.00% | 0.25% | 0.25% | 0.25% | 24% | 31% | 28% | 36% | 28% | 36% | 33% | 43% | 29% | 38% | 27% | 27% | 30% | 30% |
| 156 | 0.25% | 9.00% | 0.25% | 0.25% | 0.25% | 34% | 44% | 37% | 48% | 36% | 47% | 41% | 53% | 37% | 48% | 36% | 36% | 38% | 38% |
| 157 | 1.00% | 9.00% | 0.25% | 0.25% | 0.25% | 36% | 47% | 38% | 49% | 39% | 51% | 43% | 56% | 39% | 51% | 38% | 38% | 40% | 40% |
| 158 | 9.00% | 9.00% | 0.25% | 0.25% | 0.25% | 32% | 42% | 36% | 47% | 34% | 44% | 40% | 52% | 36% | 47% | 34% | 34% | 37% | 37% |
| 159 | 0.00% | 0.00% | 1.00% | 0.25% | 0.25% | 22% | 29% | 27% | 35% | 25% | 33% | 27% | 35% | 27% | 35% | 25% | 25% | 26% | 26% |
| 160 | 1.00% | 0.00% | 1.00% | 0.25% | 0.25% | 26% | 34% | 29% | 38% | 30% | 39% | 30% | 39% | 30% | 39% | 28% | 28% | 30% | 30% |
| 161 | 0.00% | 0.25% | 1.00% | 0.25% | 0.25% | 26% | 34% | 32% | 42% | 29% | 38% | 32% | 42% | 31% | 40% | 29% | 29% | 31% | 31% |
| 162 | 0.25% | 0.25% | 1.00% | 0.25% | 0.25% | 28% | 36% | 33% | 43% | 31% | 40% | 33% | 43% | 32% | 42% | 31% | 31% | 32% | 32% |
| 163 | 1.00% | 0.25% | 1.00% | 0.25% | 0.25% | 30% | 39% | 34% | 44% | 34% | 44% | 35% | 46% | 34% | 44% | 33% | 33% | 34% | 34% |
| 164 | 9.00% | 0.25% | 1.00% | 0.25% | 0.25% | 26% | 34% | 32% | 42% | 29% | 38% | 32% | 42% | 31% | 40% | 29% | 29% | 31% | 31% |
| 165 | 0.00% | 1.00% | 1.00% | 0.25% | 0.25% | 29% | 38% | 35% | 46% | 33% | 43% | 35% | 46% | 34% | 44% | 32% | 32% | 34% | 34% |
| 166 | 0.25% | 1.00% | 1.00% | 0.25% | 0.25% | 31% | 40% | 36% | 47% | 35% | 46% | 36% | 47% | 35% | 46% | 34% | 34% | 35% | 35% |
| 167 | 1.00% | 1.00% | 1.00% | 0.25% | 0.25% | 33% | 43% | 37% | 48% | 38% | 49% | 38% | 49% | 37% | 48% | 36% | 36% | 38% | 38% |
| 168 | 9.00% | 1.00% | 1.00% | 0.25% | 0.25% | 29% | 38% | 35% | 46% | 33% | 43% | 35% | 46% | 34% | 44% | 32% | 32% | 34% | 34% |
| 169 | 0.00% | 9.00% | 1.00% | 0.25% | 0.25% | 37% | 48% | 43% | 56% | 39% | 51% | 42% | 55% | 41% | 53% | 40% | 40% | 41% | 41% |
| 170 | 0.25% | 9.00% | 1.00% | 0.25% | 0.25% | 39% | 51% | 44% | 57% | 41% | 53% | 43% | 56% | 42% | 55% | 41% | 41% | 42% | 42% |
| 171 | 1.00% | 9.00% | 1.00% | 0.25% | 0.25% | 41% | 53% | 45% | 59% | 44% | 57% | 45% | 59% | 44% | 57% | 43% | 43% | 44% | 44% |
| 172 | 0.25% | 0.25% | 9.00% | 0.25% | 0.25% | 38% | 49% | 41% | 53% | 45% | 59% | 40% | 52% | 46% | 60% | 41% | 41% | 44% | 44% |
| 173 | 1.00% | 0.25% | 9.00% | 0.25% | 0.25% | 40% | 52% | 42% | 55% | 48% | 62% | 42% | 55% | 48% | 62% | 43% | 43% | 46% | 46% |
| 174 | 9.00% | 0.25% | 9.00% | 0.25% | 0.25% | 36% | 47% | 40% | 52% | 43% | 56% | 39% | 51% | 45% | 59% | 40% | 40% | 42% | 42% |
| 175 | 0.00% | 1.00% | 9.00% | 0.25% | 0.25% | 39% | 51% | 43% | 56% | 47% | 61% | 42% | 55% | 48% | 62% | 43% | 43% | 46% | 46% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 176 | 0.25% | 1.00% | 9.00% | 0.25% | 0.25% | 41% | 53% | 44% | 57% | 49% | 64% | 43% | 56% | 49% | 64% | 45% | 45% | 47% | 47% |
| 177 | 9.00% | 1.00% | 9.00% | 0.25% | 0.25% | 39% | 51% | 43% | 56% | 47% | 61% | 42% | 55% | 48% | 62% | 43% | 43% | 46% | 46% |
| 178 | 1.00% | 9.00% | 9.00% | 0.25% | 0.25% | 51% | 66% | 53% | 69% | 58% | 75% | 52% | 68% | 58% | 75% | 54% | 54% | 56% | 56% |
| 179 | 0.25% | 0.00% | 0.00% | 1.00% | 0.25% | 29% | 38% | 29% | 38% | 27% | 35% | 29% | 38% | 31% | 40% | 28% | 28% | 29% | 29% |
| 180 | 1.00% | 0.25% | 0.00% | 1.00% | 0.25% | 35% | 46% | 35% | 46% | 34% | 44% | 36% | 47% | 37% | 48% | 35% | 35% | 36% | 36% |
| 181 | 0.00% | 1.00% | 0.00% | 1.00% | 0.25% | 34% | 44% | 36% | 47% | 33% | 43% | 36% | 47% | 37% | 48% | 34% | 34% | 35% | 35% |
| 182 | 0.25% | 1.00% | 0.00% | 1.00% | 0.25% | 36% | 47% | 37% | 48% | 35% | 46% | 37% | 48% | 38% | 49% | 36% | 36% | 37% | 37% |
| 183 | 1.00% | 1.00% | 0.00% | 1.00% | 0.25% | 38% | 49% | 38% | 49% | 38% | 49% | 39% | 51% | 40% | 52% | 38% | 38% | 39% | 39% |
| 184 | 0.00% | 0.00% | 0.25% | 1.00% | 0.25% | 32% | 42% | 32% | 42% | 32% | 42% | 35% | 46% | 37% | 48% | 32% | 32% | 35% | 35% |
| 185 | 1.00% | 0.00% | 0.25% | 1.00% | 0.25% | 36% | 47% | 34% | 44% | 37% | 48% | 38% | 49% | 40% | 52% | 36% | 36% | 38% | 38% |
| 186 | 0.25% | 0.25% | 0.25% | 1.00% | 0.25% | 38% | 49% | 38% | 49% | 38% | 49% | 41% | 53% | 42% | 55% | 38% | 38% | 40% | 40% |
| 187 | 1.00% | 0.25% | 0.25% | 1.00% | 0.25% | 40% | 52% | 39% | 51% | 41% | 53% | 43% | 56% | 44% | 57% | 40% | 40% | 43% | 43% |
| 188 | 9.00% | 0.25% | 0.25% | 1.00% | 0.25% | 36% | 47% | 37% | 48% | 36% | 47% | 40% | 52% | 41% | 53% | 36% | 36% | 39% | 39% |
| 189 | 0.00% | 1.00% | 0.25% | 1.00% | 0.25% | 39% | 51% | 40% | 52% | 40% | 52% | 43% | 56% | 44% | 57% | 40% | 40% | 42% | 42% |
| 190 | 0.25% | 1.00% | 0.25% | 1.00% | 0.25% | 41% | 53% | 41% | 53% | 42% | 55% | 44% | 57% | 45% | 59% | 41% | 41% | 44% | 44% |
| 191 | 1.00% | 1.00% | 0.25% | 1.00% | 0.25% | 43% | 56% | 42% | 55% | 45% | 59% | 46% | 60% | 47% | 61% | 43% | 43% | 46% | 46% |
| 192 | 9.00% | 1.00% | 0.25% | 1.00% | 0.25% | 39% | 51% | 40% | 52% | 40% | 52% | 43% | 56% | 44% | 57% | 40% | 40% | 42% | 42% |
| 193 | 0.25% | 9.00% | 0.25% | 1.00% | 0.25% | 49% | 64% | 49% | 64% | 48% | 62% | 51% | 66% | 52% | 68% | 49% | 49% | 50% | 50% |
| 194 | 1.00% | 9.00% | 0.25% | 1.00% | 0.25% | 51% | 66% | 50% | 65% | 51% | 66% | 53% | 69% | 54% | 70% | 51% | 51% | 53% | 53% |
| 195 | 9.00% | 9.00% | 0.25% | 1.00% | 0.25% | 47% | 61% | 48% | 62% | 46% | 60% | 50% | 65% | 51% | 66% | 47% | 47% | 49% | 49% |
| 196 | 0.00% | 0.00% | 1.00% | 1.00% | 0.25% | 37% | 48% | 39% | 51% | 37% | 48% | 37% | 48% | 42% | 55% | 38% | 38% | 39% | 39% |
| 197 | 0.25% | 0.00% | 1.00% | 1.00% | 0.25% | 39% | 51% | 40% | 52% | 39% | 51% | 38% | 49% | 43% | 56% | 39% | 39% | 40% | 40% |
| 198 | 1.00% | 0.00% | 1.00% | 1.00% | 0.25% | 41% | 53% | 41% | 53% | 42% | 55% | 40% | 52% | 45% | 59% | 41% | 41% | 42% | 42% |
| 199 | 0.00% | 0.25% | 1.00% | 1.00% | 0.25% | 41% | 53% | 44% | 57% | 41% | 53% | 42% | 55% | 46% | 60% | 42% | 42% | 43% | 43% |
| 200 | 1.00% | 0.25% | 1.00% | 1.00% | 0.25% | 45% | 59% | 46% | 60% | 46% | 60% | 45% | 59% | 49% | 64% | 46% | 46% | 47% | 47% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 201 | 9.00% | 0.25% | 1.00% | 1.00% | 0.25% | 41% | 53% | 44% | 57% | 41% | 53% | 42% | 55% | 46% | 60% | 42% | 42% | 43% | 43% |
| 202 | 0.00% | 1.00% | 1.00% | 1.00% | 0.25% | 44% | 57% | 47% | 61% | 45% | 59% | 45% | 59% | 49% | 64% | 45% | 45% | 46% | 46% |
| 203 | 0.25% | 1.00% | 1.00% | 1.00% | 0.25% | 46% | 60% | 48% | 62% | 47% | 61% | 46% | 60% | 50% | 65% | 47% | 47% | 48% | 48% |
| 204 | 1.00% | 1.00% | 1.00% | 1.00% | 0.25% | 48% | 62% | 49% | 64% | 50% | 65% | 48% | 62% | 52% | 68% | 49% | 49% | 50% | 50% |
| 205 | 9.00% | 1.00% | 1.00% | 1.00% | 0.25% | 44% | 57% | 47% | 61% | 45% | 59% | 45% | 59% | 49% | 64% | 45% | 45% | 46% | 46% |
| 206 | 0.00% | 9.00% | 1.00% | 1.00% | 0.25% | 52% | 68% | 55% | 72% | 51% | 66% | 52% | 68% | 56% | 73% | 53% | 53% | 53% | 53% |
| 207 | 0.25% | 9.00% | 1.00% | 1.00% | 0.25% | 54% | 70% | 56% | 73% | 53% | 69% | 53% | 69% | 57% | 74% | 54% | 54% | 54% | 54% |
| 208 | 1.00% | 9.00% | 1.00% | 1.00% | 0.25% | 56% | 73% | 57% | 74% | 56% | 73% | 55% | 72% | 59% | 77% | 56% | 56% | 57% | 57% |
| 209 | 0.25% | 0.25% | 9.00% | 1.00% | 0.25% | 53% | 69% | 53% | 69% | 57% | 74% | 50% | 65% | 61% | 79% | 54% | 54% | 56% | 56% |
| 210 | 1.00% | 0.25% | 9.00% | 1.00% | 0.25% | 55% | 72% | 54% | 70% | 60% | 78% | 52% | 68% | 63% | 82% | 56% | 56% | 58% | 58% |
| 211 | 9.00% | 0.25% | 9.00% | 1.00% | 0.25% | 51% | 66% | 52% | 68% | 55% | 72% | 49% | 64% | 60% | 78% | 53% | 53% | 55% | 55% |
| 212 | 0.25% | 1.00% | 9.00% | 1.00% | 0.25% | 56% | 73% | 56% | 73% | 61% | 79% | 53% | 69% | 64% | 83% | 58% | 58% | 59% | 59% |
| 213 | 0.00% | 0.25% | 0.00% | 9.00% | 0.25% | 51% | 66% | 47% | 61% | 47% | 61% | 53% | 69% | 47% | 61% | 48% | 48% | 49% | 49% |
| 214 | 0.00% | 0.00% | 0.25% | 9.00% | 0.25% | 52% | 68% | 46% | 60% | 50% | 65% | 55% | 72% | 50% | 65% | 49% | 49% | 52% | 52% |
| 215 | 0.25% | 0.00% | 0.25% | 9.00% | 0.25% | 54% | 70% | 47% | 61% | 52% | 68% | 56% | 73% | 51% | 66% | 51% | 51% | 53% | 53% |
| 216 | 0.00% | 0.25% | 0.25% | 9.00% | 0.25% | 56% | 73% | 51% | 66% | 54% | 70% | 60% | 78% | 54% | 70% | 54% | 54% | 56% | 56% |
| 217 | 0.25% | 0.25% | 0.25% | 9.00% | 0.25% | 58% | 75% | 52% | 68% | 56% | 73% | 61% | 79% | 55% | 72% | 55% | 55% | 57% | 57% |
| 218 | 1.00% | 0.25% | 0.25% | 9.00% | 0.25% | 60% | 78% | 53% | 69% | 59% | 77% | 63% | 82% | 57% | 74% | 57% | 57% | 60% | 60% |
| 219 | 9.00% | 0.25% | 0.25% | 9.00% | 0.25% | 56% | 73% | 51% | 66% | 54% | 70% | 60% | 78% | 54% | 70% | 54% | 54% | 56% | 56% |
| 220 | 0.00% | 1.00% | 0.25% | 9.00% | 0.25% | 59% | 77% | 54% | 70% | 58% | 75% | 63% | 82% | 57% | 74% | 57% | 57% | 59% | 59% |
| 221 | 0.25% | 1.00% | 0.25% | 9.00% | 0.25% | 61% | 79% | 55% | 72% | 60% | 78% | 64% | 83% | 58% | 75% | 59% | 59% | 61% | 61% |
| 222 | 1.00% | 1.00% | 0.25% | 9.00% | 0.25% | 63% | 82% | 56% | 73% | 63% | 82% | 66% | 86% | 60% | 78% | 61% | 61% | 63% | 63% |
| 223 | 0.25% | 9.00% | 0.25% | 9.00% | 0.25% | 69% | 90% | 63% | 82% | 66% | 86% | 71% | 92% | 65% | 85% | 66% | 66% | 67% | 67% |
| 224 | 0.25% | 0.00% | 1.00% | 9.00% | 0.25% | 59% | 77% | 54% | 70% | 57% | 74% | 58% | 75% | 56% | 73% | 57% | 57% | 57% | 57% |
| 225 | 1.00% | 0.25% | 1.00% | 9.00% | 0.25% | 65% | 85% | 60% | 78% | 64% | 83% | 65% | 85% | 62% | 81% | 63% | 63% | 64% | 64% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 226 | 9.00% | 0.25% | 1.00% | 9.00% | 0.25% | 61% | 79% | 58% | 75% | 59% | 77% | 62% | 81% | 59% | 77% | 59% | 59% | 60% | 60% |
| 227 | 0.00% | 1.00% | 1.00% | 9.00% | 0.25% | 64% | 83% | 61% | 79% | 63% | 82% | 65% | 85% | 62% | 81% | 63% | 63% | 63% | 63% |
| 228 | 0.25% | 1.00% | 1.00% | 9.00% | 0.25% | 66% | 86% | 62% | 81% | 65% | 85% | 66% | 86% | 63% | 82% | 64% | 64% | 65% | 65% |
| 229 | 1.00% | 1.00% | 1.00% | 9.00% | 0.25% | 68% | 88% | 63% | 82% | 68% | 88% | 68% | 88% | 65% | 85% | 66% | 66% | 67% | 67% |
| 230 | 0.25% | 0.25% | 9.00% | 9.00% | 0.25% | 73% | 95% | 67% | 87% | 75% | 98% | 70% | 91% | 74% | 96% | 72% | 72% | 73% | 73% |
| 231 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 232 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 233 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 234 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 235 | 0.25% | 0.00% | 0.25% | 0.00% | 1.00% | 22% | 29% | 21% | 27% | 25% | 33% | 22% | 29% | 27% | 35% | 23% | 23% | 25% | 25% |
| 236 | 1.00% | 0.00% | 0.25% | 0.00% | 1.00% | 24% | 31% | 22% | 29% | 28% | 36% | 24% | 31% | 29% | 38% | 25% | 25% | 27% | 27% |
| 237 | 0.00% | 0.25% | 0.25% | 0.00% | 1.00% | 24% | 31% | 25% | 33% | 27% | 35% | 26% | 34% | 30% | 39% | 25% | 25% | 28% | 28% |
| 238 | 0.25% | 0.25% | 0.25% | 0.00% | 1.00% | 26% | 34% | 26% | 34% | 29% | 38% | 27% | 35% | 31% | 40% | 27% | 27% | 29% | 29% |
| 239 | 0.00% | 1.00% | 0.25% | 0.00% | 1.00% | 27% | 35% | 28% | 36% | 31% | 40% | 29% | 38% | 33% | 43% | 29% | 29% | 31% | 31% |
| 240 | 1.00% | 1.00% | 0.25% | 0.00% | 1.00% | 31% | 40% | 30% | 39% | 36% | 47% | 32% | 42% | 36% | 47% | 32% | 32% | 35% | 35% |
| 241 | 1.00% | 9.00% | 0.25% | 0.00% | 1.00% | 39% | 51% | 38% | 49% | 42% | 55% | 39% | 51% | 43% | 56% | 40% | 40% | 41% | 41% |
| 242 | 0.25% | 0.00% | 1.00% | 0.00% | 1.00% | 27% | 35% | 28% | 36% | 30% | 39% | 24% | 31% | 32% | 42% | 28% | 28% | 29% | 29% |
| 243 | 1.00% | 0.00% | 1.00% | 0.00% | 1.00% | 29% | 38% | 29% | 38% | 33% | 43% | 26% | 34% | 34% | 44% | 30% | 30% | 31% | 31% |
| 244 | 0.00% | 0.25% | 1.00% | 0.00% | 1.00% | 29% | 38% | 32% | 42% | 32% | 42% | 28% | 36% | 35% | 46% | 31% | 31% | 32% | 32% |
| 245 | 1.00% | 0.25% | 1.00% | 0.00% | 1.00% | 33% | 43% | 34% | 44% | 37% | 48% | 31% | 40% | 38% | 49% | 35% | 35% | 35% | 35% |
| 246 | 0.00% | 1.00% | 1.00% | 0.00% | 1.00% | 32% | 42% | 35% | 46% | 36% | 47% | 31% | 40% | 38% | 49% | 34% | 34% | 35% | 35% |
| 247 | 0.25% | 1.00% | 1.00% | 0.00% | 1.00% | 34% | 44% | 36% | 47% | 38% | 49% | 32% | 42% | 39% | 51% | 36% | 36% | 36% | 36% |
| 248 | 1.00% | 1.00% | 1.00% | 0.00% | 1.00% | 36% | 47% | 37% | 48% | 41% | 53% | 34% | 44% | 41% | 53% | 38% | 38% | 39% | 39% |
| 249 | 9.00% | 1.00% | 1.00% | 0.00% | 1.00% | 32% | 42% | 35% | 46% | 36% | 47% | 31% | 40% | 38% | 49% | 34% | 34% | 35% | 35% |
| 250 | 1.00% | 9.00% | 1.00% | 0.00% | 1.00% | 44% | 57% | 45% | 59% | 47% | 61% | 41% | 53% | 48% | 62% | 45% | 45% | 45% | 45% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 251 | 0.25% | 0.00% | 9.00% | 0.00% | 1.00% | 37% | 48% | 36% | 47% | 44% | 57% | 31% | 40% | 46% | 60% | 39% | 39% | 40% | 40% |
| 252 | 0.00% | 0.25% | 9.00% | 0.00% | 1.00% | 39% | 51% | 40% | 52% | 46% | 60% | 35% | 46% | 49% | 64% | 42% | 42% | 43% | 43% |
| 253 | 0.25% | 0.25% | 9.00% | 0.00% | 1.00% | 41% | 53% | 41% | 53% | 48% | 62% | 36% | 47% | 50% | 65% | 43% | 43% | 45% | 45% |
| 254 | 1.00% | 0.25% | 9.00% | 0.00% | 1.00% | 43% | 56% | 42% | 55% | 51% | 66% | 38% | 49% | 52% | 68% | 45% | 45% | 47% | 47% |
| 255 | 0.25% | 1.00% | 9.00% | 0.00% | 1.00% | 44% | 57% | 44% | 57% | 52% | 68% | 39% | 51% | 53% | 69% | 47% | 47% | 48% | 48% |
| 256 | 0.25% | 0.00% | 0.00% | 0.25% | 1.00% | 22% | 29% | 26% | 34% | 24% | 31% | 25% | 33% | 27% | 35% | 24% | 24% | 25% | 25% |
| 257 | 1.00% | 0.00% | 0.00% | 0.25% | 1.00% | 24% | 31% | 27% | 35% | 27% | 35% | 27% | 35% | 29% | 38% | 26% | 26% | 28% | 28% |
| 258 | 0.00% | 0.25% | 0.00% | 0.25% | 1.00% | 24% | 31% | 30% | 39% | 26% | 34% | 29% | 38% | 30% | 39% | 27% | 27% | 28% | 28% |
| 259 | 0.25% | 0.25% | 0.00% | 0.25% | 1.00% | 26% | 34% | 31% | 40% | 28% | 36% | 30% | 39% | 31% | 40% | 28% | 28% | 30% | 30% |
| 260 | 9.00% | 0.25% | 0.00% | 0.25% | 1.00% | 24% | 31% | 30% | 39% | 26% | 34% | 29% | 38% | 30% | 39% | 27% | 27% | 28% | 28% |
| 261 | 1.00% | 1.00% | 0.00% | 0.25% | 1.00% | 31% | 40% | 35% | 46% | 35% | 46% | 35% | 46% | 36% | 47% | 34% | 34% | 35% | 35% |
| 262 | 1.00% | 9.00% | 0.00% | 0.25% | 1.00% | 39% | 51% | 43% | 56% | 41% | 53% | 42% | 55% | 43% | 56% | 41% | 41% | 42% | 42% |
| 263 | 0.00% | 0.00% | 0.25% | 0.25% | 1.00% | 25% | 33% | 29% | 38% | 29% | 38% | 31% | 40% | 33% | 43% | 28% | 28% | 31% | 31% |
| 264 | 0.25% | 0.00% | 0.25% | 0.25% | 1.00% | 27% | 35% | 30% | 39% | 31% | 40% | 32% | 42% | 34% | 44% | 29% | 29% | 32% | 32% |
| 265 | 0.00% | 0.25% | 0.25% | 0.25% | 1.00% | 29% | 38% | 34% | 44% | 33% | 43% | 36% | 47% | 37% | 48% | 32% | 32% | 35% | 35% |
| 266 | 0.25% | 0.25% | 0.25% | 0.25% | 1.00% | 31% | 40% | 35% | 46% | 35% | 46% | 37% | 48% | 38% | 49% | 34% | 34% | 37% | 37% |
| 267 | 1.00% | 0.25% | 0.25% | 0.25% | 1.00% | 33% | 43% | 36% | 47% | 38% | 49% | 39% | 51% | 40% | 52% | 36% | 36% | 39% | 39% |
| 268 | 9.00% | 0.25% | 0.25% | 0.25% | 1.00% | 29% | 38% | 34% | 44% | 33% | 43% | 36% | 47% | 37% | 48% | 32% | 32% | 35% | 35% |
| 269 | 0.25% | 1.00% | 0.25% | 0.25% | 1.00% | 34% | 44% | 38% | 49% | 39% | 51% | 40% | 52% | 41% | 53% | 37% | 37% | 40% | 40% |
| 270 | 9.00% | 1.00% | 0.25% | 0.25% | 1.00% | 32% | 42% | 37% | 48% | 37% | 48% | 39% | 51% | 40% | 52% | 35% | 35% | 39% | 39% |
| 271 | 0.25% | 9.00% | 0.25% | 0.25% | 1.00% | 42% | 55% | 46% | 60% | 45% | 59% | 47% | 61% | 48% | 62% | 44% | 44% | 47% | 47% |
| 272 | 1.00% | 9.00% | 0.25% | 0.25% | 1.00% | 44% | 57% | 47% | 61% | 48% | 62% | 49% | 64% | 50% | 65% | 46% | 46% | 49% | 49% |
| 273 | 9.00% | 9.00% | 0.25% | 0.25% | 1.00% | 40% | 52% | 45% | 59% | 43% | 56% | 46% | 60% | 47% | 61% | 43% | 43% | 45% | 45% |
| 274 | 0.00% | 0.00% | 1.00% | 0.25% | 1.00% | 30% | 39% | 36% | 47% | 34% | 44% | 33% | 43% | 38% | 49% | 33% | 33% | 35% | 35% |
| 275 | 1.00% | 0.00% | 1.00% | 0.25% | 1.00% | 34% | 44% | 38% | 49% | 39% | 51% | 36% | 47% | 41% | 53% | 37% | 37% | 39% | 39% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 276 | 0.00% | 0.25% | 1.00% | 0.25% | 1.00% | 34% | 44% | 41% | 53% | 38% | 49% | 38% | 49% | 42% | 55% | 38% | 38% | 39% | 39% |
| 277 | 0.25% | 0.25% | 1.00% | 0.25% | 1.00% | 36% | 47% | 42% | 55% | 40% | 52% | 39% | 51% | 43% | 56% | 39% | 39% | 41% | 41% |
| 278 | 1.00% | 0.25% | 1.00% | 0.25% | 1.00% | 38% | 49% | 43% | 56% | 43% | 56% | 41% | 53% | 45% | 59% | 41% | 41% | 43% | 43% |
| 279 | 9.00% | 0.25% | 1.00% | 0.25% | 1.00% | 34% | 44% | 41% | 53% | 38% | 49% | 38% | 49% | 42% | 55% | 38% | 38% | 39% | 39% |
| 280 | 0.00% | 1.00% | 1.00% | 0.25% | 1.00% | 37% | 48% | 44% | 57% | 42% | 55% | 41% | 53% | 45% | 59% | 41% | 41% | 43% | 43% |
| 281 | 0.25% | 1.00% | 1.00% | 0.25% | 1.00% | 39% | 51% | 45% | 59% | 44% | 57% | 42% | 55% | 46% | 60% | 43% | 43% | 44% | 44% |
| 282 | 1.00% | 1.00% | 1.00% | 0.25% | 1.00% | 41% | 53% | 46% | 60% | 47% | 61% | 44% | 57% | 48% | 62% | 45% | 45% | 46% | 46% |
| 283 | 9.00% | 1.00% | 1.00% | 0.25% | 1.00% | 37% | 48% | 44% | 57% | 42% | 55% | 41% | 53% | 45% | 59% | 41% | 41% | 43% | 43% |
| 284 | 0.00% | 9.00% | 1.00% | 0.25% | 1.00% | 45% | 59% | 52% | 68% | 48% | 62% | 48% | 62% | 52% | 68% | 48% | 48% | 49% | 49% |
| 285 | 0.25% | 9.00% | 1.00% | 0.25% | 1.00% | 47% | 61% | 53% | 69% | 50% | 65% | 49% | 64% | 53% | 69% | 50% | 50% | 51% | 51% |
| 286 | 1.00% | 9.00% | 1.00% | 0.25% | 1.00% | 49% | 64% | 54% | 70% | 53% | 69% | 51% | 66% | 55% | 72% | 52% | 52% | 53% | 53% |
| 287 | 0.25% | 0.25% | 9.00% | 0.25% | 1.00% | 46% | 60% | 50% | 65% | 54% | 70% | 46% | 60% | 57% | 74% | 50% | 50% | 52% | 52% |
| 288 | 1.00% | 0.25% | 9.00% | 0.25% | 1.00% | 48% | 62% | 51% | 66% | 57% | 74% | 48% | 62% | 59% | 77% | 52% | 52% | 55% | 55% |
| 289 | 9.00% | 0.25% | 9.00% | 0.25% | 1.00% | 44% | 57% | 49% | 64% | 52% | 68% | 45% | 59% | 56% | 73% | 48% | 48% | 51% | 51% |
| 290 | 0.00% | 1.00% | 9.00% | 0.25% | 1.00% | 47% | 61% | 52% | 68% | 56% | 73% | 48% | 62% | 59% | 77% | 52% | 52% | 54% | 54% |
| 291 | 0.25% | 1.00% | 9.00% | 0.25% | 1.00% | 49% | 64% | 53% | 69% | 58% | 75% | 49% | 64% | 60% | 78% | 53% | 53% | 56% | 56% |
| 292 | 9.00% | 1.00% | 9.00% | 0.25% | 1.00% | 47% | 61% | 52% | 68% | 56% | 73% | 48% | 62% | 59% | 77% | 52% | 52% | 54% | 54% |
| 293 | 1.00% | 9.00% | 9.00% | 0.25% | 1.00% | 59% | 77% | 62% | 81% | 67% | 87% | 58% | 75% | 69% | 90% | 63% | 63% | 65% | 65% |
| 294 | 0.25% | 0.00% | 0.00% | 1.00% | 1.00% | 37% | 48% | 38% | 49% | 36% | 47% | 35% | 46% | 42% | 55% | 37% | 37% | 38% | 38% |
| 295 | 1.00% | 0.25% | 0.00% | 1.00% | 1.00% | 43% | 56% | 44% | 57% | 43% | 56% | 42% | 55% | 48% | 62% | 43% | 43% | 44% | 44% |
| 296 | 0.00% | 1.00% | 0.00% | 1.00% | 1.00% | 42% | 55% | 45% | 59% | 42% | 55% | 42% | 55% | 48% | 62% | 43% | 43% | 44% | 44% |
| 297 | 0.25% | 1.00% | 0.00% | 1.00% | 1.00% | 44% | 57% | 46% | 60% | 44% | 57% | 43% | 56% | 49% | 64% | 45% | 45% | 45% | 45% |
| 298 | 1.00% | 1.00% | 0.00% | 1.00% | 1.00% | 46% | 60% | 47% | 61% | 47% | 61% | 45% | 59% | 51% | 66% | 47% | 47% | 48% | 48% |
| 299 | 0.00% | 0.00% | 0.25% | 1.00% | 1.00% | 40% | 52% | 41% | 53% | 41% | 53% | 41% | 53% | 48% | 62% | 41% | 41% | 43% | 43% |
| 300 | 1.00% | 0.00% | 0.25% | 1.00% | 1.00% | 44% | 57% | 43% | 56% | 46% | 60% | 44% | 57% | 51% | 66% | 44% | 44% | 47% | 47% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 301 | 0.25% | 0.25% | 0.25% | 1.00% | 1.00% | 46% | 60% | 47% | 61% | 47% | 61% | 47% | 61% | 53% | 69% | 47% | 47% | 49% | 49% |
| 302 | 1.00% | 0.25% | 0.25% | 1.00% | 1.00% | 48% | 62% | 48% | 62% | 50% | 65% | 49% | 64% | 55% | 72% | 49% | 49% | 51% | 51% |
| 303 | 9.00% | 0.25% | 0.25% | 1.00% | 1.00% | 44% | 57% | 46% | 60% | 45% | 59% | 46% | 60% | 52% | 68% | 45% | 45% | 48% | 48% |
| 304 | 0.00% | 1.00% | 0.25% | 1.00% | 1.00% | 47% | 61% | 49% | 64% | 49% | 64% | 49% | 64% | 55% | 72% | 48% | 48% | 51% | 51% |
| 305 | 0.25% | 1.00% | 0.25% | 1.00% | 1.00% | 49% | 64% | 50% | 65% | 51% | 66% | 50% | 65% | 56% | 73% | 50% | 50% | 52% | 52% |
| 306 | 1.00% | 1.00% | 0.25% | 1.00% | 1.00% | 51% | 66% | 51% | 66% | 54% | 70% | 52% | 68% | 58% | 75% | 52% | 52% | 55% | 55% |
| 307 | 9.00% | 1.00% | 0.25% | 1.00% | 1.00% | 47% | 61% | 49% | 64% | 49% | 64% | 49% | 64% | 55% | 72% | 48% | 48% | 51% | 51% |
| 308 | 0.25% | 9.00% | 0.25% | 1.00% | 1.00% | 57% | 74% | 58% | 75% | 57% | 74% | 57% | 74% | 63% | 82% | 57% | 57% | 59% | 59% |
| 309 | 1.00% | 9.00% | 0.25% | 1.00% | 1.00% | 59% | 77% | 59% | 77% | 60% | 78% | 59% | 77% | 65% | 85% | 59% | 59% | 61% | 61% |
| 310 | 9.00% | 9.00% | 0.25% | 1.00% | 1.00% | 55% | 72% | 57% | 74% | 55% | 72% | 56% | 73% | 62% | 81% | 56% | 56% | 58% | 58% |
| 311 | 0.00% | 0.00% | 1.00% | 1.00% | 1.00% | 45% | 59% | 48% | 62% | 46% | 60% | 43% | 56% | 53% | 69% | 46% | 46% | 47% | 47% |
| 312 | 0.25% | 0.00% | 1.00% | 1.00% | 1.00% | 47% | 61% | 49% | 64% | 48% | 62% | 44% | 57% | 54% | 70% | 48% | 48% | 49% | 49% |
| 313 | 1.00% | 0.00% | 1.00% | 1.00% | 1.00% | 49% | 64% | 50% | 65% | 51% | 66% | 46% | 60% | 56% | 73% | 50% | 50% | 51% | 51% |
| 314 | 0.00% | 0.25% | 1.00% | 1.00% | 1.00% | 49% | 64% | 53% | 69% | 50% | 65% | 48% | 62% | 57% | 74% | 51% | 51% | 52% | 52% |
| 315 | 1.00% | 0.25% | 1.00% | 1.00% | 1.00% | 53% | 69% | 55% | 72% | 55% | 72% | 51% | 66% | 60% | 78% | 54% | 54% | 55% | 55% |
| 316 | 9.00% | 0.25% | 1.00% | 1.00% | 1.00% | 49% | 64% | 53% | 69% | 50% | 65% | 48% | 62% | 57% | 74% | 51% | 51% | 52% | 52% |
| 317 | 0.00% | 1.00% | 1.00% | 1.00% | 1.00% | 52% | 68% | 56% | 73% | 54% | 70% | 51% | 66% | 60% | 78% | 54% | 54% | 55% | 55% |
| 318 | 0.25% | 1.00% | 1.00% | 1.00% | 1.00% | 54% | 70% | 57% | 74% | 56% | 73% | 52% | 68% | 61% | 79% | 56% | 56% | 56% | 56% |
| 319 | 1.00% | 1.00% | 1.00% | 1.00% | 1.00% | 56% | 73% | 58% | 75% | 59% | 77% | 54% | 70% | 63% | 82% | 58% | 58% | 59% | 59% |
| 320 | 9.00% | 1.00% | 1.00% | 1.00% | 1.00% | 52% | 68% | 56% | 73% | 54% | 70% | 51% | 66% | 60% | 78% | 54% | 54% | 55% | 55% |
| 321 | 0.00% | 9.00% | 1.00% | 1.00% | 1.00% | 60% | 78% | 64% | 83% | 60% | 78% | 58% | 75% | 67% | 87% | 61% | 61% | 62% | 62% |
| 322 | 0.25% | 9.00% | 1.00% | 1.00% | 1.00% | 62% | 81% | 65% | 85% | 62% | 81% | 59% | 77% | 68% | 88% | 63% | 63% | 63% | 63% |
| 323 | 1.00% | 9.00% | 1.00% | 1.00% | 1.00% | 64% | 83% | 66% | 86% | 65% | 85% | 61% | 79% | 70% | 91% | 65% | 65% | 65% | 65% |
| 324 | 0.25% | 0.25% | 9.00% | 1.00% | 1.00% | 61% | 79% | 62% | 81% | 66% | 86% | 56% | 73% | 72% | 94% | 63% | 63% | 65% | 65% |
| 325 | 1.00% | 0.25% | 9.00% | 1.00% | 1.00% | 63% | 82% | 63% | 82% | 69% | 90% | 58% | 75% | 74% | 96% | 65% | 65% | 67% | 67% |

Fig. 6

| Formula # | Delta Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 326 | 9.00% | 0.25% | 9.00% | 1.00% | 1.00% | 59% | 77% | 61% | 79% | 64% | 83% | 55% | 72% | 71% | 92% | 61% | 61% | 63% | 63% |
| 327 | 0.25% | 1.00% | 9.00% | 1.00% | 1.00% | 64% | 83% | 65% | 85% | 70% | 91% | 59% | 77% | 75% | 98% | 66% | 66% | 68% | 68% |
| 328 | 0.00% | 0.25% | 0.00% | 9.00% | 1.00% | 59% | 77% | 56% | 73% | 56% | 73% | 59% | 77% | 58% | 75% | 57% | 57% | 58% | 58% |
| 329 | 0.00% | 0.00% | 0.25% | 9.00% | 1.00% | 60% | 78% | 55% | 72% | 59% | 77% | 61% | 79% | 61% | 79% | 58% | 58% | 60% | 60% |
| 330 | 0.25% | 0.00% | 0.25% | 9.00% | 1.00% | 62% | 81% | 56% | 73% | 61% | 79% | 62% | 81% | 62% | 81% | 60% | 60% | 62% | 62% |
| 331 | 0.00% | 0.25% | 0.25% | 9.00% | 1.00% | 64% | 83% | 60% | 78% | 63% | 82% | 66% | 86% | 65% | 85% | 62% | 62% | 65% | 65% |
| 332 | 0.25% | 0.25% | 0.25% | 9.00% | 1.00% | 66% | 86% | 61% | 79% | 65% | 85% | 67% | 87% | 66% | 86% | 64% | 64% | 66% | 66% |
| 333 | 1.00% | 0.25% | 0.25% | 9.00% | 1.00% | 68% | 88% | 62% | 81% | 68% | 88% | 69% | 90% | 68% | 88% | 66% | 66% | 68% | 68% |
| 334 | 9.00% | 0.25% | 0.25% | 9.00% | 1.00% | 64% | 83% | 60% | 78% | 63% | 82% | 66% | 86% | 65% | 85% | 62% | 62% | 65% | 65% |
| 335 | 0.00% | 1.00% | 0.25% | 9.00% | 1.00% | 67% | 87% | 63% | 82% | 67% | 87% | 69% | 90% | 68% | 88% | 66% | 66% | 68% | 68% |
| 336 | 0.25% | 1.00% | 0.25% | 9.00% | 1.00% | 69% | 90% | 64% | 83% | 69% | 90% | 70% | 91% | 69% | 90% | 67% | 67% | 69% | 69% |
| 337 | 1.00% | 1.00% | 0.25% | 9.00% | 1.00% | 71% | 92% | 65% | 85% | 72% | 94% | 72% | 94% | 71% | 92% | 69% | 69% | 72% | 72% |
| 338 | 0.25% | 9.00% | 0.25% | 9.00% | 1.00% | 77% | 100% | 72% | 94% | 75% | 98% | 77% | 100% | 76% | 99% | 75% | 75% | 76% | 76% |
| 339 | 0.25% | 0.00% | 1.00% | 9.00% | 1.00% | 67% | 87% | 63% | 82% | 66% | 86% | 64% | 83% | 67% | 87% | 65% | 65% | 66% | 66% |
| 340 | 1.00% | 0.25% | 1.00% | 9.00% | 1.00% | 73% | 95% | 69% | 90% | 73% | 95% | 71% | 92% | 73% | 95% | 72% | 72% | 72% | 72% |
| 341 | 9.00% | 0.25% | 1.00% | 9.00% | 1.00% | 69% | 90% | 67% | 87% | 68% | 88% | 68% | 88% | 70% | 91% | 68% | 68% | 69% | 69% |
| 342 | 0.00% | 1.00% | 1.00% | 9.00% | 1.00% | 72% | 94% | 70% | 91% | 72% | 94% | 71% | 92% | 73% | 95% | 71% | 71% | 72% | 72% |
| 343 | 0.25% | 1.00% | 1.00% | 9.00% | 1.00% | 74% | 96% | 71% | 92% | 74% | 96% | 72% | 94% | 74% | 96% | 73% | 73% | 73% | 73% |
| 344 | 1.00% | 1.00% | 1.00% | 9.00% | 1.00% | 76% | 99% | 72% | 94% | 77% | 100% | 74% | 96% | 76% | 99% | 75% | 75% | 76% | 76% |
| 345 | 0.25% | 0.25% | 9.00% | 9.00% | 1.00% | 81% | 100% | 76% | 99% | 84% | 100% | 76% | 99% | 85% | 100% | 80% | 80% | 82% | 82% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 346 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 347 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 348 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 349 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 350 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 351 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 352 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 353 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 354 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 355 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 356 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 357 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 358 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 359 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 360 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 361 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 362 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 363 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 364 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 365 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 366 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 367 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 368 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 369 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 370 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 371 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 372 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 373 | 0.00% | 0.25% | 0.00% | 0.25% | 0.00% | 7% | 9% | 11% | 14% | 6% | 8% | 10% | 13% | 9% | 12% | 8% | 8% | 8% | 8% |
| 374 | 0.25% | 0.25% | 0.00% | 0.25% | 0.00% | 9% | 12% | 12% | 16% | 8% | 10% | 11% | 14% | 10% | 13% | 10% | 10% | 10% | 10% |
| 375 | 9.00% | 0.25% | 0.00% | 0.25% | 0.00% | 7% | 9% | 11% | 14% | 6% | 8% | 10% | 13% | 9% | 12% | 8% | 8% | 8% | 8% |
| 376 | 1.00% | 1.00% | 0.00% | 0.25% | 0.00% | 14% | 18% | 16% | 21% | 15% | 20% | 16% | 21% | 15% | 20% | 15% | 15% | 15% | 15% |
| 377 | 1.00% | 9.00% | 0.00% | 0.25% | 0.00% | 22% | 29% | 24% | 31% | 21% | 27% | 23% | 30% | 22% | 29% | 22% | 22% | 22% | 22% |
| 378 | 0.00% | 0.00% | 0.25% | 0.25% | 0.00% | 8% | 10% | 10% | 13% | 9% | 12% | 12% | 16% | 12% | 16% | 9% | 9% | 11% | 11% |
| 379 | 0.25% | 0.00% | 0.25% | 0.25% | 0.00% | 10% | 13% | 11% | 14% | 11% | 14% | 13% | 17% | 13% | 17% | 11% | 11% | 12% | 12% |
| 380 | 0.00% | 0.25% | 0.25% | 0.25% | 0.00% | 12% | 16% | 15% | 20% | 13% | 17% | 17% | 22% | 16% | 21% | 13% | 13% | 15% | 15% |
| 381 | 0.25% | 0.25% | 0.25% | 0.25% | 0.00% | 14% | 18% | 16% | 21% | 15% | 20% | 18% | 23% | 17% | 22% | 15% | 15% | 17% | 17% |
| 382 | 1.00% | 0.25% | 0.25% | 0.25% | 0.00% | 16% | 21% | 17% | 22% | 18% | 23% | 20% | 26% | 19% | 25% | 17% | 17% | 19% | 19% |
| 383 | 9.00% | 0.25% | 0.25% | 0.25% | 0.00% | 12% | 16% | 15% | 20% | 13% | 17% | 17% | 22% | 16% | 21% | 13% | 13% | 15% | 15% |
| 384 | 0.25% | 1.00% | 0.25% | 0.25% | 0.00% | 17% | 22% | 19% | 25% | 19% | 25% | 21% | 27% | 20% | 26% | 18% | 18% | 20% | 20% |
| 385 | 9.00% | 1.00% | 0.25% | 0.25% | 0.00% | 15% | 20% | 18% | 23% | 17% | 22% | 20% | 26% | 19% | 25% | 17% | 17% | 19% | 19% |
| 386 | 0.25% | 9.00% | 0.25% | 0.25% | 0.00% | 25% | 33% | 27% | 35% | 25% | 33% | 28% | 36% | 27% | 35% | 26% | 26% | 27% | 27% |
| 387 | 1.00% | 9.00% | 0.25% | 0.25% | 0.00% | 27% | 35% | 28% | 36% | 28% | 36% | 30% | 39% | 29% | 38% | 28% | 28% | 29% | 29% |
| 388 | 9.00% | 9.00% | 0.25% | 0.25% | 0.00% | 23% | 30% | 26% | 34% | 23% | 30% | 27% | 35% | 26% | 34% | 24% | 24% | 25% | 25% |
| 389 | 0.00% | 0.00% | 1.00% | 0.25% | 0.00% | 13% | 17% | 17% | 22% | 14% | 18% | 14% | 18% | 17% | 22% | 15% | 15% | 15% | 15% |
| 390 | 1.00% | 0.00% | 1.00% | 0.25% | 0.00% | 17% | 22% | 19% | 25% | 19% | 25% | 17% | 22% | 20% | 26% | 18% | 18% | 19% | 19% |
| 391 | 0.00% | 0.25% | 1.00% | 0.25% | 0.00% | 17% | 22% | 22% | 29% | 18% | 23% | 19% | 25% | 21% | 27% | 19% | 19% | 19% | 19% |
| 392 | 0.25% | 0.25% | 1.00% | 0.25% | 0.00% | 19% | 25% | 23% | 30% | 20% | 26% | 20% | 26% | 22% | 29% | 21% | 21% | 21% | 21% |
| 393 | 1.00% | 0.25% | 1.00% | 0.25% | 0.00% | 21% | 27% | 24% | 31% | 23% | 30% | 22% | 29% | 24% | 31% | 23% | 23% | 23% | 23% |
| 394 | 9.00% | 0.25% | 1.00% | 0.25% | 0.00% | 17% | 22% | 22% | 29% | 18% | 23% | 19% | 25% | 21% | 27% | 19% | 19% | 19% | 19% |
| 395 | 0.00% | 1.00% | 1.00% | 0.25% | 0.00% | 20% | 26% | 25% | 33% | 22% | 29% | 22% | 29% | 24% | 31% | 22% | 22% | 23% | 23% |
| 396 | 0.25% | 1.00% | 1.00% | 0.25% | 0.00% | 22% | 29% | 26% | 34% | 24% | 31% | 23% | 30% | 25% | 33% | 24% | 24% | 24% | 24% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 397 | 1.00% | 1.00% | 1.00% | 0.25% | 0.00% | 24% | 31% | 27% | 35% | 27% | 35% | 25% | 33% | 27% | 35% | 26% | 26% | 26% | 26% |
| 398 | 9.00% | 1.00% | 1.00% | 0.25% | 0.00% | 20% | 26% | 25% | 33% | 22% | 29% | 22% | 29% | 24% | 31% | 22% | 22% | 23% | 23% |
| 399 | 0.00% | 9.00% | 1.00% | 0.25% | 0.00% | 28% | 36% | 33% | 43% | 28% | 36% | 29% | 38% | 31% | 40% | 30% | 30% | 29% | 29% |
| 400 | 0.25% | 9.00% | 1.00% | 0.25% | 0.00% | 30% | 39% | 34% | 44% | 30% | 39% | 30% | 39% | 32% | 42% | 31% | 31% | 31% | 31% |
| 401 | 1.00% | 9.00% | 1.00% | 0.25% | 0.00% | 32% | 42% | 35% | 46% | 33% | 43% | 32% | 42% | 34% | 44% | 33% | 33% | 33% | 33% |
| 402 | 0.25% | 0.25% | 9.00% | 0.25% | 0.00% | 29% | 38% | 31% | 40% | 34% | 44% | 27% | 35% | 36% | 47% | 31% | 31% | 32% | 32% |
| 403 | 1.00% | 0.25% | 9.00% | 0.25% | 0.00% | 31% | 40% | 32% | 42% | 37% | 48% | 29% | 38% | 38% | 49% | 33% | 33% | 35% | 35% |
| 404 | 9.00% | 0.25% | 9.00% | 0.25% | 0.00% | 27% | 35% | 30% | 39% | 32% | 42% | 26% | 34% | 35% | 46% | 30% | 30% | 31% | 31% |
| 405 | 0.00% | 1.00% | 9.00% | 0.25% | 0.00% | 30% | 39% | 33% | 43% | 36% | 47% | 29% | 38% | 38% | 49% | 33% | 33% | 34% | 34% |
| 406 | 0.25% | 1.00% | 9.00% | 0.25% | 0.00% | 32% | 42% | 34% | 44% | 38% | 49% | 30% | 39% | 39% | 51% | 35% | 35% | 36% | 36% |
| 407 | 9.00% | 1.00% | 9.00% | 0.25% | 0.00% | 30% | 39% | 33% | 43% | 36% | 47% | 29% | 38% | 38% | 49% | 33% | 33% | 34% | 34% |
| 408 | 1.00% | 9.00% | 9.00% | 0.25% | 0.00% | 42% | 55% | 43% | 56% | 47% | 61% | 39% | 51% | 48% | 62% | 44% | 44% | 45% | 45% |
| 409 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 410 | 1.00% | 0.25% | 0.00% | 1.00% | 0.00% | 22% | 29% | 20% | 26% | 21% | 27% | 20% | 26% | 24% | 31% | 21% | 21% | 22% | 22% |
| 411 | 0.00% | 1.00% | 0.00% | 1.00% | 0.00% | 21% | 27% | 21% | 27% | 20% | 26% | 20% | 26% | 24% | 31% | 21% | 21% | 21% | 21% |
| 412 | 0.25% | 1.00% | 0.00% | 1.00% | 0.00% | 23% | 30% | 22% | 29% | 22% | 29% | 21% | 27% | 25% | 33% | 22% | 22% | 23% | 23% |
| 413 | 1.00% | 1.00% | 0.00% | 1.00% | 0.00% | 25% | 33% | 23% | 30% | 25% | 33% | 23% | 30% | 27% | 35% | 24% | 24% | 25% | 25% |
| 414 | 0.00% | 0.00% | 0.25% | 1.00% | 0.00% | 19% | 25% | 17% | 22% | 19% | 25% | 19% | 25% | 24% | 31% | 18% | 18% | 21% | 21% |
| 415 | 1.00% | 0.00% | 0.25% | 1.00% | 0.00% | 23% | 30% | 19% | 25% | 24% | 31% | 22% | 29% | 27% | 35% | 22% | 22% | 24% | 24% |
| 416 | 0.25% | 0.25% | 0.25% | 1.00% | 0.00% | 25% | 33% | 23% | 30% | 25% | 33% | 25% | 33% | 29% | 38% | 24% | 24% | 26% | 26% |
| 417 | 1.00% | 0.25% | 0.25% | 1.00% | 0.00% | 27% | 35% | 24% | 31% | 28% | 36% | 27% | 35% | 31% | 40% | 26% | 26% | 29% | 29% |
| 418 | 9.00% | 0.25% | 0.25% | 1.00% | 0.00% | 23% | 30% | 22% | 29% | 23% | 30% | 24% | 31% | 28% | 36% | 23% | 23% | 25% | 25% |
| 419 | 0.00% | 1.00% | 0.25% | 1.00% | 0.00% | 26% | 34% | 25% | 33% | 27% | 35% | 27% | 35% | 31% | 40% | 26% | 26% | 28% | 28% |
| 420 | 0.25% | 1.00% | 0.25% | 1.00% | 0.00% | 28% | 36% | 26% | 34% | 29% | 38% | 28% | 36% | 32% | 42% | 28% | 28% | 30% | 30% |
| 421 | 1.00% | 1.00% | 0.25% | 1.00% | 0.00% | 30% | 39% | 27% | 35% | 32% | 42% | 30% | 39% | 34% | 44% | 30% | 30% | 32% | 32% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 422 | 9.00% | 1.00% | 0.25% | 1.00% | 0.00% | 26% | 34% | 25% | 33% | 27% | 35% | 27% | 35% | 31% | 40% | 26% | 26% | 28% | 28% |
| 423 | 0.25% | 9.00% | 0.25% | 1.00% | 0.00% | 36% | 47% | 34% | 44% | 35% | 46% | 35% | 46% | 39% | 51% | 35% | 35% | 36% | 36% |
| 424 | 1.00% | 9.00% | 0.25% | 1.00% | 0.00% | 38% | 49% | 35% | 46% | 38% | 49% | 37% | 48% | 41% | 53% | 37% | 37% | 39% | 39% |
| 425 | 9.00% | 9.00% | 0.25% | 1.00% | 0.00% | 34% | 44% | 33% | 43% | 33% | 43% | 34% | 44% | 38% | 49% | 33% | 33% | 35% | 35% |
| 426 | 0.00% | 0.00% | 1.00% | 1.00% | 0.00% | 24% | 31% | 24% | 31% | 24% | 31% | 21% | 27% | 29% | 38% | 24% | 24% | 25% | 25% |
| 427 | 0.25% | 0.00% | 1.00% | 1.00% | 0.00% | 26% | 34% | 25% | 33% | 26% | 34% | 22% | 29% | 30% | 39% | 26% | 26% | 26% | 26% |
| 428 | 1.00% | 0.00% | 1.00% | 1.00% | 0.00% | 28% | 36% | 26% | 34% | 29% | 38% | 24% | 31% | 32% | 42% | 28% | 28% | 28% | 28% |
| 429 | 0.00% | 0.25% | 1.00% | 1.00% | 0.00% | 28% | 36% | 29% | 38% | 28% | 36% | 26% | 34% | 33% | 43% | 28% | 28% | 29% | 29% |
| 430 | 1.00% | 0.25% | 1.00% | 1.00% | 0.00% | 32% | 42% | 31% | 40% | 33% | 43% | 29% | 38% | 36% | 47% | 32% | 32% | 33% | 33% |
| 431 | 9.00% | 0.25% | 1.00% | 1.00% | 0.00% | 28% | 36% | 29% | 38% | 28% | 36% | 26% | 34% | 33% | 43% | 28% | 28% | 29% | 29% |
| 432 | 0.00% | 1.00% | 1.00% | 1.00% | 0.00% | 31% | 40% | 32% | 42% | 32% | 42% | 29% | 38% | 36% | 47% | 32% | 32% | 32% | 32% |
| 433 | 0.25% | 1.00% | 1.00% | 1.00% | 0.00% | 33% | 43% | 33% | 43% | 34% | 44% | 30% | 39% | 37% | 48% | 33% | 33% | 34% | 34% |
| 434 | 1.00% | 1.00% | 1.00% | 1.00% | 0.00% | 35% | 46% | 34% | 44% | 37% | 48% | 32% | 42% | 39% | 51% | 35% | 35% | 36% | 36% |
| 435 | 9.00% | 1.00% | 1.00% | 1.00% | 0.00% | 31% | 40% | 32% | 42% | 32% | 42% | 29% | 38% | 36% | 47% | 32% | 32% | 32% | 32% |
| 436 | 0.00% | 9.00% | 1.00% | 1.00% | 0.00% | 39% | 51% | 40% | 52% | 38% | 49% | 36% | 47% | 43% | 56% | 39% | 39% | 39% | 39% |
| 437 | 0.25% | 9.00% | 1.00% | 1.00% | 0.00% | 41% | 53% | 41% | 53% | 40% | 52% | 37% | 48% | 44% | 57% | 41% | 41% | 40% | 40% |
| 438 | 1.00% | 9.00% | 1.00% | 1.00% | 0.00% | 43% | 56% | 42% | 55% | 43% | 56% | 39% | 51% | 46% | 60% | 43% | 43% | 43% | 43% |
| 439 | 0.25% | 0.25% | 9.00% | 1.00% | 0.00% | 40% | 52% | 38% | 49% | 44% | 57% | 34% | 44% | 48% | 62% | 41% | 41% | 42% | 42% |
| 440 | 1.00% | 0.25% | 9.00% | 1.00% | 0.00% | 42% | 55% | 39% | 51% | 47% | 61% | 36% | 47% | 50% | 65% | 43% | 43% | 44% | 44% |
| 441 | 9.00% | 0.25% | 9.00% | 1.00% | 0.00% | 38% | 49% | 37% | 48% | 42% | 55% | 33% | 43% | 47% | 61% | 39% | 39% | 41% | 41% |
| 442 | 0.25% | 1.00% | 9.00% | 1.00% | 0.00% | 43% | 56% | 41% | 53% | 48% | 62% | 37% | 48% | 51% | 66% | 44% | 44% | 45% | 45% |
| 443 | 0.00% | 0.25% | 0.00% | 9.00% | 0.00% | 31% | 40% | 27% | 35% | 26% | 34% | 30% | 39% | 31% | 40% | 28% | 28% | 29% | 29% |
| 444 | 0.00% | 0.00% | 0.25% | 9.00% | 0.00% | 32% | 42% | 26% | 34% | 29% | 38% | 32% | 42% | 34% | 44% | 29% | 29% | 32% | 32% |
| 445 | 0.25% | 0.00% | 0.25% | 9.00% | 0.00% | 34% | 44% | 27% | 35% | 31% | 40% | 33% | 43% | 35% | 46% | 31% | 31% | 33% | 33% |
| 446 | 0.00% | 0.25% | 0.25% | 9.00% | 0.00% | 36% | 47% | 31% | 40% | 33% | 43% | 37% | 48% | 38% | 49% | 33% | 33% | 36% | 36% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 447 | 0.25% | 0.25% | 0.25% | 9.00% | 0.00% | 38% | 49% | 32% | 42% | 35% | 46% | 38% | 49% | 39% | 51% | 35% | 35% | 37% | 37% |
| 448 | 1.00% | 0.25% | 0.25% | 9.00% | 0.00% | 40% | 52% | 33% | 43% | 38% | 49% | 40% | 52% | 41% | 53% | 37% | 37% | 40% | 40% |
| 449 | 9.00% | 0.25% | 0.25% | 9.00% | 0.00% | 36% | 47% | 31% | 40% | 33% | 43% | 37% | 48% | 38% | 49% | 33% | 33% | 36% | 36% |
| 450 | 0.00% | 1.00% | 0.25% | 9.00% | 0.00% | 39% | 51% | 34% | 44% | 37% | 48% | 40% | 52% | 41% | 53% | 37% | 37% | 39% | 39% |
| 451 | 0.25% | 1.00% | 0.25% | 9.00% | 0.00% | 41% | 53% | 35% | 46% | 39% | 51% | 41% | 53% | 42% | 55% | 38% | 38% | 41% | 41% |
| 452 | 1.00% | 1.00% | 0.25% | 9.00% | 0.00% | 43% | 56% | 36% | 47% | 42% | 55% | 43% | 56% | 44% | 57% | 40% | 40% | 43% | 43% |
| 453 | 0.25% | 9.00% | 0.25% | 9.00% | 0.00% | 49% | 64% | 43% | 56% | 45% | 59% | 48% | 62% | 49% | 64% | 46% | 46% | 47% | 47% |
| 454 | 0.25% | 0.00% | 1.00% | 9.00% | 0.00% | 39% | 51% | 34% | 44% | 36% | 47% | 35% | 46% | 40% | 52% | 36% | 36% | 37% | 37% |
| 455 | 1.00% | 0.25% | 1.00% | 9.00% | 0.00% | 45% | 59% | 40% | 52% | 43% | 56% | 42% | 55% | 46% | 60% | 43% | 43% | 44% | 44% |
| 456 | 9.00% | 0.25% | 1.00% | 9.00% | 0.00% | 41% | 53% | 38% | 49% | 38% | 49% | 39% | 51% | 43% | 56% | 39% | 39% | 40% | 40% |
| 457 | 0.00% | 1.00% | 1.00% | 9.00% | 0.00% | 44% | 57% | 41% | 53% | 42% | 55% | 42% | 55% | 46% | 60% | 42% | 42% | 43% | 43% |
| 458 | 0.25% | 1.00% | 1.00% | 9.00% | 0.00% | 46% | 60% | 42% | 55% | 44% | 57% | 43% | 56% | 47% | 61% | 44% | 44% | 45% | 45% |
| 459 | 1.00% | 1.00% | 1.00% | 9.00% | 0.00% | 48% | 62% | 43% | 56% | 47% | 61% | 45% | 59% | 49% | 64% | 46% | 46% | 47% | 47% |
| 460 | 0.25% | 0.25% | 9.00% | 9.00% | 0.00% | 53% | 69% | 47% | 61% | 54% | 70% | 47% | 61% | 58% | 75% | 51% | 51% | 53% | 53% |
| 461 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 462 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 463 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 464 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 465 | 0.25% | 0.00% | 0.25% | 0.00% | 0.25% | 14% | 18% | 12% | 16% | 16% | 21% | 16% | 21% | 16% | 21% | 14% | 14% | 16% | 16% |
| 466 | 1.00% | 0.00% | 0.25% | 0.00% | 0.25% | 16% | 21% | 13% | 17% | 19% | 25% | 18% | 23% | 18% | 23% | 16% | 16% | 18% | 18% |
| 467 | 0.00% | 0.25% | 0.25% | 0.00% | 0.25% | 16% | 21% | 16% | 21% | 18% | 23% | 20% | 26% | 19% | 25% | 17% | 17% | 19% | 19% |
| 468 | 0.25% | 0.25% | 0.25% | 0.00% | 0.25% | 18% | 23% | 17% | 22% | 20% | 26% | 21% | 27% | 20% | 26% | 18% | 18% | 20% | 20% |
| 469 | 0.00% | 1.00% | 0.25% | 0.00% | 0.25% | 19% | 25% | 19% | 25% | 22% | 29% | 23% | 30% | 22% | 29% | 20% | 20% | 22% | 22% |
| 470 | 1.00% | 1.00% | 0.25% | 0.00% | 0.25% | 23% | 30% | 21% | 27% | 27% | 35% | 26% | 34% | 25% | 33% | 24% | 24% | 26% | 26% |
| 471 | 1.00% | 9.00% | 0.25% | 0.00% | 0.25% | 31% | 40% | 29% | 38% | 33% | 43% | 33% | 43% | 32% | 42% | 31% | 31% | 33% | 33% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 472 | 0.25% | 0.00% | 1.00% | 0.00% | 0.25% | 19% | 25% | 19% | 25% | 21% | 27% | 18% | 23% | 21% | 27% | 20% | 20% | 20% | 20% |
| 473 | 1.00% | 0.00% | 1.00% | 0.00% | 0.25% | 21% | 27% | 20% | 26% | 24% | 31% | 20% | 26% | 23% | 30% | 22% | 22% | 22% | 22% |
| 474 | 0.00% | 0.25% | 1.00% | 0.00% | 0.25% | 21% | 27% | 23% | 30% | 23% | 30% | 22% | 29% | 24% | 31% | 22% | 22% | 23% | 23% |
| 475 | 1.00% | 0.25% | 1.00% | 0.00% | 0.25% | 25% | 33% | 25% | 33% | 28% | 36% | 25% | 33% | 27% | 35% | 26% | 26% | 27% | 27% |
| 476 | 0.00% | 1.00% | 1.00% | 0.00% | 0.25% | 24% | 31% | 26% | 34% | 27% | 35% | 25% | 33% | 27% | 35% | 26% | 26% | 26% | 26% |
| 477 | 0.25% | 1.00% | 1.00% | 0.00% | 0.25% | 26% | 34% | 27% | 35% | 29% | 38% | 26% | 34% | 28% | 36% | 27% | 27% | 28% | 28% |
| 478 | 1.00% | 1.00% | 1.00% | 0.00% | 0.25% | 28% | 36% | 28% | 36% | 32% | 42% | 28% | 36% | 30% | 39% | 29% | 29% | 30% | 30% |
| 479 | 9.00% | 1.00% | 1.00% | 0.00% | 0.25% | 24% | 31% | 26% | 34% | 27% | 35% | 25% | 33% | 27% | 35% | 26% | 26% | 26% | 26% |
| 480 | 1.00% | 9.00% | 1.00% | 0.00% | 0.25% | 36% | 47% | 36% | 47% | 38% | 49% | 35% | 46% | 37% | 48% | 37% | 37% | 37% | 37% |
| 481 | 0.25% | 0.00% | 9.00% | 0.00% | 0.25% | 29% | 38% | 27% | 35% | 35% | 46% | 25% | 33% | 35% | 46% | 30% | 30% | 32% | 32% |
| 482 | 0.00% | 0.25% | 9.00% | 0.00% | 0.25% | 31% | 40% | 31% | 40% | 37% | 48% | 29% | 38% | 38% | 49% | 33% | 33% | 35% | 35% |
| 483 | 0.25% | 0.25% | 9.00% | 0.00% | 0.25% | 33% | 43% | 32% | 42% | 39% | 51% | 30% | 39% | 39% | 51% | 35% | 35% | 36% | 36% |
| 484 | 1.00% | 0.25% | 9.00% | 0.00% | 0.25% | 35% | 46% | 33% | 43% | 42% | 55% | 32% | 42% | 41% | 53% | 37% | 37% | 38% | 38% |
| 485 | 0.25% | 1.00% | 9.00% | 0.00% | 0.25% | 36% | 47% | 35% | 46% | 43% | 56% | 33% | 43% | 42% | 55% | 38% | 38% | 39% | 39% |
| 486 | 0.25% | 0.00% | 0.00% | 0.25% | 0.25% | 12% | 16% | 14% | 18% | 11% | 14% | 14% | 18% | 14% | 18% | 12% | 12% | 13% | 13% |
| 487 | 1.00% | 0.00% | 0.00% | 0.25% | 0.25% | 14% | 18% | 15% | 20% | 14% | 18% | 16% | 21% | 16% | 21% | 14% | 14% | 15% | 15% |
| 488 | 0.00% | 0.25% | 0.00% | 0.25% | 0.25% | 14% | 18% | 18% | 23% | 13% | 17% | 18% | 23% | 17% | 22% | 15% | 15% | 16% | 16% |
| 489 | 0.25% | 0.25% | 0.00% | 0.25% | 0.25% | 16% | 21% | 19% | 25% | 15% | 20% | 19% | 25% | 18% | 23% | 17% | 17% | 17% | 17% |
| 490 | 9.00% | 0.25% | 0.00% | 0.25% | 0.25% | 14% | 18% | 18% | 23% | 13% | 17% | 18% | 23% | 17% | 22% | 15% | 15% | 16% | 16% |
| 491 | 1.00% | 1.00% | 0.00% | 0.25% | 0.25% | 21% | 27% | 23% | 30% | 22% | 29% | 24% | 31% | 23% | 30% | 22% | 22% | 23% | 23% |
| 492 | 1.00% | 9.00% | 0.00% | 0.25% | 0.25% | 29% | 38% | 31% | 40% | 28% | 36% | 31% | 40% | 30% | 39% | 29% | 29% | 30% | 30% |
| 493 | 0.00% | 0.00% | 0.25% | 0.25% | 0.25% | 15% | 20% | 17% | 22% | 16% | 21% | 20% | 26% | 20% | 26% | 16% | 16% | 19% | 19% |
| 494 | 0.25% | 0.00% | 0.25% | 0.25% | 0.25% | 17% | 22% | 18% | 23% | 18% | 23% | 21% | 27% | 21% | 27% | 18% | 18% | 20% | 20% |
| 495 | 0.00% | 0.25% | 0.25% | 0.25% | 0.25% | 19% | 25% | 22% | 29% | 20% | 26% | 25% | 33% | 24% | 31% | 20% | 20% | 23% | 23% |
| 496 | 0.25% | 0.25% | 0.25% | 0.25% | 0.25% | 21% | 27% | 23% | 30% | 22% | 29% | 26% | 34% | 25% | 33% | 22% | 22% | 24% | 24% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 497 | 1.00% | 0.25% | 0.25% | 0.25% | 0.25% | 23% | 30% | 24% | 31% | 25% | 33% | 28% | 36% | 27% | 35% | 24% | 24% | 27% | 27% |
| 498 | 9.00% | 0.25% | 0.25% | 0.25% | 0.25% | 19% | 25% | 22% | 29% | 20% | 26% | 25% | 33% | 24% | 31% | 20% | 20% | 23% | 23% |
| 499 | 0.25% | 1.00% | 0.25% | 0.25% | 0.25% | 24% | 31% | 26% | 34% | 26% | 34% | 29% | 38% | 28% | 36% | 25% | 25% | 28% | 28% |
| 500 | 9.00% | 1.00% | 0.25% | 0.25% | 0.25% | 22% | 29% | 25% | 33% | 24% | 31% | 28% | 36% | 27% | 35% | 24% | 24% | 26% | 26% |
| 501 | 0.25% | 9.00% | 0.25% | 0.25% | 0.25% | 32% | 42% | 34% | 44% | 32% | 42% | 36% | 47% | 35% | 46% | 33% | 33% | 34% | 34% |
| 502 | 1.00% | 9.00% | 0.25% | 0.25% | 0.25% | 34% | 44% | 35% | 46% | 35% | 46% | 38% | 49% | 37% | 48% | 35% | 35% | 37% | 37% |
| 503 | 9.00% | 9.00% | 0.25% | 0.25% | 0.25% | 30% | 39% | 33% | 43% | 30% | 39% | 35% | 46% | 34% | 44% | 31% | 31% | 33% | 33% |
| 504 | 0.00% | 0.00% | 1.00% | 0.25% | 0.25% | 20% | 26% | 24% | 31% | 21% | 27% | 22% | 29% | 25% | 33% | 22% | 22% | 23% | 23% |
| 505 | 1.00% | 0.00% | 1.00% | 0.25% | 0.25% | 24% | 31% | 26% | 34% | 26% | 34% | 25% | 33% | 28% | 36% | 25% | 25% | 26% | 26% |
| 506 | 0.00% | 0.25% | 1.00% | 0.25% | 0.25% | 24% | 31% | 29% | 38% | 25% | 33% | 27% | 35% | 29% | 38% | 26% | 26% | 27% | 27% |
| 507 | 0.25% | 0.25% | 1.00% | 0.25% | 0.25% | 26% | 34% | 30% | 39% | 27% | 35% | 28% | 36% | 30% | 39% | 28% | 28% | 28% | 28% |
| 508 | 1.00% | 0.25% | 1.00% | 0.25% | 0.25% | 28% | 36% | 31% | 40% | 30% | 39% | 30% | 39% | 32% | 42% | 30% | 30% | 31% | 31% |
| 509 | 9.00% | 0.25% | 1.00% | 0.25% | 0.25% | 24% | 31% | 29% | 38% | 25% | 33% | 27% | 35% | 29% | 38% | 26% | 26% | 27% | 27% |
| 510 | 0.00% | 1.00% | 1.00% | 0.25% | 0.25% | 27% | 35% | 32% | 42% | 29% | 38% | 30% | 39% | 32% | 42% | 29% | 29% | 30% | 30% |
| 511 | 0.25% | 1.00% | 1.00% | 0.25% | 0.25% | 29% | 38% | 33% | 43% | 31% | 40% | 31% | 40% | 33% | 43% | 31% | 31% | 32% | 32% |
| 512 | 1.00% | 1.00% | 1.00% | 0.25% | 0.25% | 31% | 40% | 34% | 44% | 34% | 44% | 33% | 43% | 35% | 46% | 33% | 33% | 34% | 34% |
| 513 | 9.00% | 1.00% | 1.00% | 0.25% | 0.25% | 27% | 35% | 32% | 42% | 29% | 38% | 30% | 39% | 32% | 42% | 29% | 29% | 30% | 30% |
| 514 | 0.00% | 9.00% | 1.00% | 0.25% | 0.25% | 35% | 46% | 40% | 52% | 35% | 46% | 37% | 48% | 39% | 51% | 37% | 37% | 37% | 37% |
| 515 | 0.25% | 9.00% | 1.00% | 0.25% | 0.25% | 37% | 48% | 41% | 53% | 37% | 48% | 38% | 49% | 40% | 52% | 38% | 38% | 38% | 38% |
| 516 | 1.00% | 9.00% | 1.00% | 0.25% | 0.25% | 39% | 51% | 42% | 55% | 40% | 52% | 40% | 52% | 42% | 55% | 40% | 40% | 41% | 41% |
| 517 | 0.25% | 0.25% | 9.00% | 0.25% | 0.25% | 36% | 47% | 38% | 49% | 41% | 53% | 35% | 46% | 44% | 57% | 38% | 38% | 40% | 40% |
| 518 | 1.00% | 0.25% | 9.00% | 0.25% | 0.25% | 38% | 49% | 39% | 51% | 44% | 57% | 37% | 48% | 46% | 60% | 40% | 40% | 42% | 42% |
| 519 | 9.00% | 0.25% | 9.00% | 0.25% | 0.25% | 34% | 44% | 37% | 48% | 39% | 51% | 34% | 44% | 43% | 56% | 37% | 37% | 39% | 39% |
| 520 | 0.00% | 1.00% | 9.00% | 0.25% | 0.25% | 37% | 48% | 40% | 52% | 43% | 56% | 37% | 48% | 46% | 60% | 40% | 40% | 42% | 42% |
| 521 | 0.25% | 1.00% | 9.00% | 0.25% | 0.25% | 39% | 51% | 41% | 53% | 45% | 59% | 38% | 49% | 47% | 61% | 42% | 42% | 43% | 43% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 522 | 9.00% | 1.00% | 9.00% | 0.25% | 0.25% | 37% | 48% | 40% | 52% | 43% | 56% | 37% | 48% | 46% | 60% | 40% | 40% | 42% | 42% |
| 523 | 1.00% | 9.00% | 9.00% | 0.25% | 0.25% | 49% | 64% | 50% | 65% | 54% | 70% | 47% | 61% | 56% | 73% | 51% | 51% | 52% | 52% |
| 524 | 0.25% | 0.00% | 0.00% | 1.00% | 0.25% | 23% | 30% | 21% | 27% | 21% | 27% | 21% | 27% | 26% | 34% | 22% | 22% | 23% | 23% |
| 525 | 1.00% | 0.25% | 0.00% | 1.00% | 0.25% | 29% | 38% | 27% | 35% | 28% | 36% | 28% | 36% | 32% | 42% | 28% | 28% | 29% | 29% |
| 526 | 0.00% | 1.00% | 0.00% | 1.00% | 0.25% | 28% | 36% | 28% | 36% | 27% | 35% | 28% | 36% | 32% | 42% | 28% | 28% | 29% | 29% |
| 527 | 0.25% | 1.00% | 0.00% | 1.00% | 0.25% | 30% | 39% | 29% | 38% | 29% | 38% | 29% | 38% | 33% | 43% | 29% | 29% | 30% | 30% |
| 528 | 1.00% | 1.00% | 0.00% | 1.00% | 0.25% | 32% | 42% | 30% | 39% | 32% | 42% | 31% | 40% | 35% | 46% | 31% | 31% | 33% | 33% |
| 529 | 0.00% | 0.00% | 0.25% | 1.00% | 0.25% | 26% | 34% | 24% | 31% | 26% | 34% | 27% | 35% | 32% | 42% | 25% | 25% | 28% | 28% |
| 530 | 1.00% | 0.00% | 0.25% | 1.00% | 0.25% | 30% | 39% | 26% | 34% | 31% | 40% | 30% | 39% | 35% | 46% | 29% | 29% | 32% | 32% |
| 531 | 0.25% | 0.25% | 0.25% | 1.00% | 0.25% | 32% | 42% | 30% | 39% | 32% | 42% | 33% | 43% | 37% | 48% | 31% | 31% | 34% | 34% |
| 532 | 1.00% | 0.25% | 0.25% | 1.00% | 0.25% | 34% | 44% | 31% | 40% | 35% | 46% | 35% | 46% | 39% | 51% | 33% | 33% | 36% | 36% |
| 533 | 9.00% | 0.25% | 0.25% | 1.00% | 0.25% | 30% | 39% | 29% | 38% | 30% | 39% | 32% | 42% | 36% | 47% | 30% | 30% | 33% | 33% |
| 534 | 0.00% | 1.00% | 0.25% | 1.00% | 0.25% | 33% | 43% | 32% | 42% | 34% | 44% | 35% | 46% | 39% | 51% | 33% | 33% | 36% | 36% |
| 535 | 0.25% | 1.00% | 0.25% | 1.00% | 0.25% | 35% | 46% | 33% | 43% | 36% | 47% | 36% | 47% | 40% | 52% | 35% | 35% | 37% | 37% |
| 536 | 1.00% | 1.00% | 0.25% | 1.00% | 0.25% | 37% | 48% | 34% | 44% | 39% | 51% | 38% | 49% | 42% | 55% | 37% | 37% | 40% | 40% |
| 537 | 9.00% | 1.00% | 0.25% | 1.00% | 0.25% | 33% | 43% | 32% | 42% | 34% | 44% | 35% | 46% | 39% | 51% | 33% | 33% | 36% | 36% |
| 538 | 0.25% | 9.00% | 0.25% | 1.00% | 0.25% | 43% | 56% | 41% | 53% | 42% | 55% | 43% | 56% | 47% | 61% | 42% | 42% | 44% | 44% |
| 539 | 1.00% | 9.00% | 0.25% | 1.00% | 0.25% | 45% | 59% | 42% | 55% | 45% | 59% | 45% | 59% | 49% | 64% | 44% | 44% | 46% | 46% |
| 540 | 9.00% | 9.00% | 0.25% | 1.00% | 0.25% | 41% | 53% | 40% | 52% | 40% | 52% | 42% | 55% | 46% | 60% | 40% | 40% | 43% | 43% |
| 541 | 0.00% | 0.00% | 1.00% | 1.00% | 0.25% | 31% | 40% | 31% | 40% | 31% | 40% | 29% | 38% | 37% | 48% | 31% | 31% | 32% | 32% |
| 542 | 0.25% | 0.00% | 1.00% | 1.00% | 0.25% | 33% | 43% | 32% | 42% | 33% | 43% | 30% | 39% | 38% | 49% | 33% | 33% | 34% | 34% |
| 543 | 1.00% | 0.00% | 1.00% | 1.00% | 0.25% | 35% | 46% | 33% | 43% | 36% | 47% | 32% | 42% | 40% | 52% | 35% | 35% | 36% | 36% |
| 544 | 0.00% | 0.25% | 1.00% | 1.00% | 0.25% | 35% | 46% | 36% | 47% | 35% | 46% | 34% | 44% | 41% | 53% | 35% | 35% | 37% | 37% |
| 545 | 1.00% | 0.25% | 1.00% | 1.00% | 0.25% | 39% | 51% | 38% | 49% | 40% | 52% | 37% | 48% | 44% | 57% | 39% | 39% | 40% | 40% |
| 546 | 9.00% | 0.25% | 1.00% | 1.00% | 0.25% | 35% | 46% | 36% | 47% | 35% | 46% | 34% | 44% | 41% | 53% | 35% | 35% | 37% | 37% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 547 | 0.00% | 1.00% | 1.00% | 1.00% | 0.25% | 38% | 49% | 39% | 51% | 39% | 51% | 37% | 48% | 44% | 57% | 39% | 39% | 40% | 40% |
| 548 | 0.25% | 1.00% | 1.00% | 1.00% | 0.25% | 40% | 52% | 40% | 52% | 41% | 53% | 38% | 49% | 45% | 59% | 40% | 40% | 41% | 41% |
| 549 | 1.00% | 1.00% | 1.00% | 1.00% | 0.25% | 42% | 55% | 41% | 53% | 44% | 57% | 40% | 52% | 47% | 61% | 42% | 42% | 44% | 44% |
| 550 | 9.00% | 1.00% | 1.00% | 1.00% | 0.25% | 38% | 49% | 39% | 51% | 39% | 51% | 37% | 48% | 44% | 57% | 39% | 39% | 40% | 40% |
| 551 | 0.00% | 9.00% | 1.00% | 1.00% | 0.25% | 46% | 60% | 47% | 61% | 45% | 59% | 44% | 57% | 51% | 66% | 46% | 46% | 47% | 47% |
| 552 | 0.25% | 9.00% | 1.00% | 1.00% | 0.25% | 48% | 62% | 48% | 62% | 47% | 61% | 45% | 59% | 52% | 68% | 48% | 48% | 48% | 48% |
| 553 | 1.00% | 9.00% | 1.00% | 1.00% | 0.25% | 50% | 65% | 49% | 64% | 50% | 65% | 47% | 61% | 54% | 70% | 50% | 50% | 50% | 50% |
| 554 | 0.25% | 0.25% | 9.00% | 1.00% | 0.25% | 47% | 61% | 45% | 59% | 51% | 66% | 42% | 55% | 56% | 73% | 48% | 48% | 50% | 50% |
| 555 | 1.00% | 0.25% | 9.00% | 1.00% | 0.25% | 49% | 64% | 46% | 60% | 54% | 70% | 44% | 57% | 58% | 75% | 50% | 50% | 52% | 52% |
| 556 | 9.00% | 0.25% | 9.00% | 1.00% | 0.25% | 45% | 59% | 44% | 57% | 49% | 64% | 41% | 53% | 55% | 72% | 46% | 46% | 48% | 48% |
| 557 | 0.25% | 1.00% | 9.00% | 1.00% | 0.25% | 50% | 65% | 48% | 62% | 55% | 72% | 45% | 59% | 59% | 77% | 51% | 51% | 53% | 53% |
| 558 | 0.00% | 0.25% | 0.00% | 9.00% | 0.25% | 38% | 49% | 34% | 44% | 33% | 43% | 38% | 49% | 39% | 51% | 35% | 35% | 37% | 37% |
| 559 | 0.00% | 0.00% | 0.25% | 9.00% | 0.25% | 39% | 51% | 33% | 43% | 36% | 47% | 40% | 52% | 42% | 55% | 36% | 36% | 39% | 39% |
| 560 | 0.25% | 0.00% | 0.25% | 9.00% | 0.25% | 41% | 53% | 34% | 44% | 38% | 49% | 41% | 53% | 43% | 56% | 38% | 38% | 41% | 41% |
| 561 | 0.00% | 0.25% | 0.25% | 9.00% | 0.25% | 43% | 56% | 38% | 49% | 40% | 52% | 45% | 59% | 46% | 60% | 40% | 40% | 44% | 44% |
| 562 | 0.25% | 0.25% | 0.25% | 9.00% | 0.25% | 45% | 59% | 39% | 51% | 42% | 55% | 46% | 60% | 47% | 61% | 42% | 42% | 45% | 45% |
| 563 | 1.00% | 0.25% | 0.25% | 9.00% | 0.25% | 47% | 61% | 40% | 52% | 45% | 59% | 48% | 62% | 49% | 64% | 44% | 44% | 47% | 47% |
| 564 | 9.00% | 0.25% | 0.25% | 9.00% | 0.25% | 43% | 56% | 38% | 49% | 40% | 52% | 45% | 59% | 46% | 60% | 40% | 40% | 44% | 44% |
| 565 | 0.00% | 1.00% | 0.25% | 9.00% | 0.25% | 46% | 60% | 41% | 53% | 44% | 57% | 48% | 62% | 49% | 64% | 44% | 44% | 47% | 47% |
| 566 | 0.25% | 1.00% | 0.25% | 9.00% | 0.25% | 48% | 62% | 42% | 55% | 46% | 60% | 49% | 64% | 50% | 65% | 45% | 45% | 48% | 48% |
| 567 | 1.00% | 1.00% | 0.25% | 9.00% | 0.25% | 50% | 65% | 43% | 56% | 49% | 64% | 51% | 66% | 52% | 68% | 47% | 47% | 51% | 51% |
| 568 | 0.25% | 9.00% | 0.25% | 9.00% | 0.25% | 56% | 73% | 50% | 65% | 52% | 68% | 56% | 73% | 57% | 74% | 53% | 53% | 55% | 55% |
| 569 | 0.25% | 0.00% | 1.00% | 9.00% | 0.25% | 46% | 60% | 41% | 53% | 43% | 56% | 43% | 56% | 48% | 62% | 43% | 43% | 45% | 45% |
| 570 | 1.00% | 0.25% | 1.00% | 9.00% | 0.25% | 52% | 68% | 47% | 61% | 50% | 65% | 50% | 65% | 54% | 70% | 50% | 50% | 51% | 51% |
| 571 | 9.00% | 0.25% | 1.00% | 9.00% | 0.25% | 48% | 62% | 45% | 59% | 45% | 59% | 47% | 61% | 51% | 66% | 46% | 46% | 48% | 48% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 572 | 0.00% | 1.00% | 1.00% | 9.00% | 0.25% | 51% | 66% | 48% | 62% | 49% | 64% | 50% | 65% | 54% | 70% | 49% | 49% | 51% | 51% |
| 573 | 0.25% | 1.00% | 1.00% | 9.00% | 0.25% | 53% | 69% | 49% | 64% | 51% | 66% | 51% | 66% | 55% | 72% | 51% | 51% | 52% | 52% |
| 574 | 1.00% | 1.00% | 1.00% | 9.00% | 0.25% | 55% | 72% | 50% | 65% | 54% | 70% | 53% | 69% | 57% | 74% | 53% | 53% | 55% | 55% |
| 575 | 0.25% | 0.25% | 9.00% | 9.00% | 0.25% | 60% | 78% | 54% | 70% | 61% | 79% | 55% | 72% | 66% | 86% | 58% | 58% | 61% | 61% |
| 576 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 577 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 578 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 579 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 580 | 0.25% | 0.00% | 0.25% | 0.00% | 1.00% | 22% | 29% | 21% | 27% | 25% | 33% | 22% | 29% | 27% | 35% | 23% | 23% | 25% | 25% |
| 581 | 1.00% | 0.00% | 0.25% | 0.00% | 1.00% | 24% | 31% | 22% | 29% | 28% | 36% | 24% | 31% | 29% | 38% | 25% | 25% | 27% | 27% |
| 582 | 0.00% | 0.25% | 0.25% | 0.00% | 1.00% | 24% | 31% | 25% | 33% | 27% | 35% | 26% | 34% | 30% | 39% | 25% | 25% | 28% | 28% |
| 583 | 0.25% | 0.25% | 0.25% | 0.00% | 1.00% | 26% | 34% | 26% | 34% | 29% | 38% | 27% | 35% | 31% | 40% | 27% | 27% | 29% | 29% |
| 584 | 0.00% | 1.00% | 0.25% | 0.00% | 1.00% | 27% | 35% | 28% | 36% | 31% | 40% | 29% | 38% | 33% | 43% | 29% | 29% | 31% | 31% |
| 585 | 1.00% | 1.00% | 0.25% | 0.00% | 1.00% | 31% | 40% | 30% | 39% | 36% | 47% | 32% | 42% | 36% | 47% | 32% | 32% | 35% | 35% |
| 586 | 1.00% | 9.00% | 0.25% | 0.00% | 1.00% | 39% | 51% | 38% | 49% | 42% | 55% | 39% | 51% | 43% | 56% | 40% | 40% | 41% | 41% |
| 587 | 0.25% | 0.00% | 1.00% | 0.00% | 1.00% | 27% | 35% | 28% | 36% | 30% | 39% | 24% | 31% | 32% | 42% | 28% | 28% | 29% | 29% |
| 588 | 1.00% | 0.00% | 1.00% | 0.00% | 1.00% | 29% | 38% | 29% | 38% | 33% | 43% | 26% | 34% | 34% | 44% | 30% | 30% | 31% | 31% |
| 589 | 0.00% | 0.25% | 1.00% | 0.00% | 1.00% | 29% | 38% | 32% | 42% | 32% | 42% | 28% | 36% | 35% | 46% | 31% | 31% | 32% | 32% |
| 590 | 1.00% | 0.25% | 1.00% | 0.00% | 1.00% | 33% | 43% | 34% | 44% | 37% | 48% | 31% | 40% | 38% | 49% | 35% | 35% | 35% | 35% |
| 591 | 0.00% | 1.00% | 1.00% | 0.00% | 1.00% | 32% | 42% | 35% | 46% | 36% | 47% | 31% | 40% | 38% | 49% | 34% | 34% | 35% | 35% |
| 592 | 0.25% | 1.00% | 1.00% | 0.00% | 1.00% | 34% | 44% | 36% | 47% | 38% | 49% | 32% | 42% | 39% | 51% | 36% | 36% | 36% | 36% |
| 593 | 1.00% | 1.00% | 1.00% | 0.00% | 1.00% | 36% | 47% | 37% | 48% | 41% | 53% | 34% | 44% | 41% | 53% | 38% | 38% | 39% | 39% |
| 594 | 9.00% | 1.00% | 1.00% | 0.00% | 1.00% | 32% | 42% | 35% | 46% | 36% | 47% | 31% | 40% | 38% | 49% | 34% | 34% | 35% | 35% |
| 595 | 1.00% | 9.00% | 1.00% | 0.00% | 1.00% | 44% | 57% | 45% | 59% | 47% | 61% | 41% | 53% | 48% | 62% | 45% | 45% | 45% | 45% |
| 596 | 0.25% | 0.00% | 9.00% | 0.00% | 1.00% | 37% | 48% | 36% | 47% | 44% | 57% | 31% | 40% | 46% | 60% | 39% | 39% | 40% | 40% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 597 | 0.00% | 0.25% | 9.00% | 0.00% | 1.00% | 39% | 51% | 40% | 52% | 46% | 60% | 35% | 46% | 49% | 64% | 42% | 42% | 43% | 43% |
| 598 | 0.25% | 0.25% | 9.00% | 0.00% | 1.00% | 41% | 53% | 41% | 53% | 48% | 62% | 36% | 47% | 50% | 65% | 43% | 43% | 45% | 45% |
| 599 | 1.00% | 0.25% | 9.00% | 0.00% | 1.00% | 43% | 56% | 42% | 55% | 51% | 66% | 38% | 49% | 52% | 68% | 45% | 45% | 47% | 47% |
| 600 | 0.25% | 1.00% | 9.00% | 0.00% | 1.00% | 44% | 57% | 44% | 57% | 52% | 68% | 39% | 51% | 53% | 69% | 47% | 47% | 48% | 48% |
| 601 | 0.25% | 0.00% | 0.00% | 0.25% | 1.00% | 20% | 26% | 23% | 30% | 20% | 26% | 20% | 26% | 25% | 33% | 21% | 21% | 22% | 22% |
| 602 | 1.00% | 0.00% | 0.00% | 0.25% | 1.00% | 22% | 29% | 24% | 31% | 23% | 30% | 22% | 29% | 27% | 35% | 23% | 23% | 24% | 24% |
| 603 | 0.00% | 0.25% | 0.00% | 0.25% | 1.00% | 22% | 29% | 27% | 35% | 22% | 29% | 24% | 31% | 28% | 36% | 24% | 24% | 25% | 25% |
| 604 | 0.25% | 0.25% | 0.00% | 0.25% | 1.00% | 24% | 31% | 28% | 36% | 24% | 31% | 25% | 33% | 29% | 38% | 25% | 25% | 26% | 26% |
| 605 | 9.00% | 0.25% | 0.00% | 0.25% | 1.00% | 22% | 29% | 27% | 35% | 22% | 29% | 24% | 31% | 28% | 36% | 24% | 24% | 25% | 25% |
| 606 | 1.00% | 1.00% | 0.00% | 0.25% | 1.00% | 29% | 38% | 32% | 42% | 31% | 40% | 30% | 39% | 34% | 44% | 31% | 31% | 32% | 32% |
| 607 | 1.00% | 9.00% | 0.00% | 0.25% | 1.00% | 37% | 48% | 40% | 52% | 37% | 48% | 37% | 48% | 41% | 53% | 38% | 38% | 38% | 38% |
| 608 | 0.00% | 0.00% | 0.25% | 0.25% | 1.00% | 23% | 30% | 26% | 34% | 25% | 33% | 26% | 34% | 31% | 40% | 25% | 25% | 27% | 27% |
| 609 | 0.25% | 0.00% | 0.25% | 0.25% | 1.00% | 25% | 33% | 27% | 35% | 27% | 35% | 27% | 35% | 32% | 42% | 26% | 26% | 29% | 29% |
| 610 | 0.00% | 0.25% | 0.25% | 0.25% | 1.00% | 27% | 35% | 31% | 40% | 29% | 38% | 31% | 40% | 35% | 46% | 29% | 29% | 32% | 32% |
| 611 | 0.25% | 0.25% | 0.25% | 0.25% | 1.00% | 29% | 38% | 32% | 42% | 31% | 40% | 32% | 42% | 36% | 47% | 31% | 31% | 33% | 33% |
| 612 | 1.00% | 0.25% | 0.25% | 0.25% | 1.00% | 31% | 40% | 33% | 43% | 34% | 44% | 34% | 44% | 38% | 49% | 33% | 33% | 35% | 35% |
| 613 | 9.00% | 0.25% | 0.25% | 0.25% | 1.00% | 27% | 35% | 31% | 40% | 29% | 38% | 31% | 40% | 35% | 46% | 29% | 29% | 32% | 32% |
| 614 | 0.25% | 1.00% | 0.25% | 0.25% | 1.00% | 32% | 42% | 35% | 46% | 35% | 46% | 35% | 46% | 39% | 51% | 34% | 34% | 36% | 36% |
| 615 | 9.00% | 1.00% | 0.25% | 0.25% | 1.00% | 30% | 39% | 34% | 44% | 33% | 43% | 34% | 44% | 38% | 49% | 32% | 32% | 35% | 35% |
| 616 | 0.25% | 9.00% | 0.25% | 0.25% | 1.00% | 40% | 52% | 43% | 56% | 41% | 53% | 42% | 55% | 46% | 60% | 41% | 41% | 43% | 43% |
| 617 | 1.00% | 9.00% | 0.25% | 0.25% | 1.00% | 42% | 55% | 44% | 57% | 44% | 57% | 44% | 57% | 48% | 62% | 43% | 43% | 45% | 45% |
| 618 | 9.00% | 9.00% | 0.25% | 0.25% | 1.00% | 38% | 49% | 42% | 55% | 39% | 51% | 41% | 53% | 45% | 59% | 40% | 40% | 42% | 42% |
| 619 | 0.00% | 0.00% | 1.00% | 0.25% | 1.00% | 28% | 36% | 33% | 43% | 30% | 39% | 28% | 36% | 36% | 47% | 30% | 30% | 31% | 31% |
| 620 | 1.00% | 0.00% | 1.00% | 0.25% | 1.00% | 32% | 42% | 35% | 46% | 35% | 46% | 31% | 40% | 39% | 51% | 34% | 34% | 35% | 35% |
| 621 | 0.00% | 0.25% | 1.00% | 0.25% | 1.00% | 32% | 42% | 38% | 49% | 34% | 44% | 33% | 43% | 40% | 52% | 35% | 35% | 36% | 36% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 622 | 0.25% | 0.25% | 1.00% | 0.25% | 1.00% | 34% | 44% | 39% | 51% | 36% | 47% | 34% | 44% | 41% | 53% | 36% | 36% | 37% | 37% |
| 623 | 1.00% | 0.25% | 1.00% | 0.25% | 1.00% | 36% | 47% | 40% | 52% | 39% | 51% | 36% | 47% | 43% | 56% | 38% | 38% | 39% | 39% |
| 624 | 9.00% | 0.25% | 1.00% | 0.25% | 1.00% | 32% | 42% | 38% | 49% | 34% | 44% | 33% | 43% | 40% | 52% | 35% | 35% | 36% | 36% |
| 625 | 0.00% | 1.00% | 1.00% | 0.25% | 1.00% | 35% | 46% | 41% | 53% | 38% | 49% | 36% | 47% | 43% | 56% | 38% | 38% | 39% | 39% |
| 626 | 0.25% | 1.00% | 1.00% | 0.25% | 1.00% | 37% | 48% | 42% | 55% | 40% | 52% | 37% | 48% | 44% | 57% | 40% | 40% | 40% | 40% |
| 627 | 1.00% | 1.00% | 1.00% | 0.25% | 1.00% | 39% | 51% | 43% | 56% | 43% | 56% | 39% | 51% | 46% | 60% | 42% | 42% | 43% | 43% |
| 628 | 9.00% | 1.00% | 1.00% | 0.25% | 1.00% | 35% | 46% | 41% | 53% | 38% | 49% | 36% | 47% | 43% | 56% | 38% | 38% | 39% | 39% |
| 629 | 0.00% | 9.00% | 1.00% | 0.25% | 1.00% | 43% | 56% | 49% | 64% | 44% | 57% | 43% | 56% | 50% | 65% | 45% | 45% | 46% | 46% |
| 630 | 0.25% | 9.00% | 1.00% | 0.25% | 1.00% | 45% | 59% | 50% | 65% | 46% | 60% | 44% | 57% | 51% | 66% | 47% | 47% | 47% | 47% |
| 631 | 1.00% | 9.00% | 1.00% | 0.25% | 1.00% | 47% | 61% | 51% | 66% | 49% | 64% | 46% | 60% | 53% | 69% | 49% | 49% | 49% | 49% |
| 632 | 0.25% | 0.25% | 9.00% | 0.25% | 1.00% | 44% | 57% | 47% | 61% | 50% | 65% | 41% | 53% | 55% | 72% | 47% | 47% | 49% | 49% |
| 633 | 1.00% | 0.25% | 9.00% | 0.25% | 1.00% | 46% | 60% | 48% | 62% | 53% | 69% | 43% | 56% | 57% | 74% | 49% | 49% | 51% | 51% |
| 634 | 9.00% | 0.25% | 9.00% | 0.25% | 1.00% | 42% | 55% | 46% | 60% | 48% | 62% | 40% | 52% | 54% | 70% | 45% | 45% | 47% | 47% |
| 635 | 0.00% | 1.00% | 9.00% | 0.25% | 1.00% | 45% | 59% | 49% | 64% | 52% | 68% | 43% | 56% | 57% | 74% | 49% | 49% | 51% | 51% |
| 636 | 0.25% | 1.00% | 9.00% | 0.25% | 1.00% | 47% | 61% | 50% | 65% | 54% | 70% | 44% | 57% | 58% | 75% | 50% | 50% | 52% | 52% |
| 637 | 9.00% | 1.00% | 9.00% | 0.25% | 1.00% | 45% | 59% | 49% | 64% | 52% | 68% | 43% | 56% | 57% | 74% | 49% | 49% | 51% | 51% |
| 638 | 1.00% | 9.00% | 9.00% | 0.25% | 1.00% | 57% | 74% | 59% | 77% | 63% | 82% | 53% | 69% | 67% | 87% | 60% | 60% | 61% | 61% |
| 639 | 0.25% | 0.00% | 0.00% | 1.00% | 1.00% | 31% | 40% | 30% | 39% | 30% | 39% | 27% | 35% | 37% | 48% | 30% | 30% | 31% | 31% |
| 640 | 1.00% | 0.25% | 0.00% | 1.00% | 1.00% | 37% | 48% | 36% | 47% | 37% | 48% | 34% | 44% | 43% | 56% | 37% | 37% | 38% | 38% |
| 641 | 0.00% | 1.00% | 0.00% | 1.00% | 1.00% | 36% | 47% | 37% | 48% | 36% | 47% | 34% | 44% | 43% | 56% | 36% | 36% | 38% | 38% |
| 642 | 0.25% | 1.00% | 0.00% | 1.00% | 1.00% | 38% | 49% | 38% | 49% | 38% | 49% | 35% | 46% | 44% | 57% | 38% | 38% | 39% | 39% |
| 643 | 1.00% | 1.00% | 0.00% | 1.00% | 1.00% | 40% | 52% | 39% | 51% | 41% | 53% | 37% | 48% | 46% | 60% | 40% | 40% | 41% | 41% |
| 644 | 0.00% | 0.00% | 0.25% | 1.00% | 1.00% | 34% | 44% | 33% | 43% | 35% | 46% | 33% | 43% | 43% | 56% | 34% | 34% | 37% | 37% |
| 645 | 1.00% | 0.00% | 0.25% | 1.00% | 1.00% | 38% | 49% | 35% | 46% | 40% | 52% | 36% | 47% | 46% | 60% | 38% | 38% | 41% | 41% |
| 646 | 0.25% | 0.25% | 0.25% | 1.00% | 1.00% | 40% | 52% | 39% | 51% | 41% | 53% | 39% | 51% | 48% | 62% | 40% | 40% | 43% | 43% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 647 | 1.00% | 0.25% | 0.25% | 1.00% | 1.00% | 42% | 55% | 40% | 52% | 44% | 57% | 41% | 53% | 50% | 65% | 42% | 42% | 45% | 45% |
| 648 | 9.00% | 0.25% | 0.25% | 1.00% | 1.00% | 38% | 49% | 38% | 49% | 39% | 51% | 38% | 49% | 47% | 61% | 38% | 38% | 41% | 41% |
| 649 | 0.00% | 1.00% | 0.25% | 1.00% | 1.00% | 41% | 53% | 41% | 53% | 43% | 56% | 41% | 53% | 50% | 65% | 42% | 42% | 45% | 45% |
| 650 | 0.25% | 1.00% | 0.25% | 1.00% | 1.00% | 43% | 56% | 42% | 55% | 45% | 59% | 42% | 55% | 51% | 66% | 43% | 43% | 46% | 46% |
| 651 | 1.00% | 1.00% | 0.25% | 1.00% | 1.00% | 45% | 59% | 43% | 56% | 48% | 62% | 44% | 57% | 53% | 69% | 45% | 45% | 48% | 48% |
| 652 | 9.00% | 1.00% | 0.25% | 1.00% | 1.00% | 41% | 53% | 41% | 53% | 43% | 56% | 41% | 53% | 50% | 65% | 42% | 42% | 45% | 45% |
| 653 | 0.25% | 9.00% | 0.25% | 1.00% | 1.00% | 51% | 66% | 50% | 65% | 51% | 66% | 49% | 64% | 58% | 75% | 51% | 51% | 53% | 53% |
| 654 | 1.00% | 9.00% | 0.25% | 1.00% | 1.00% | 53% | 69% | 51% | 66% | 54% | 70% | 51% | 66% | 60% | 78% | 53% | 53% | 55% | 55% |
| 655 | 9.00% | 9.00% | 0.25% | 1.00% | 1.00% | 49% | 64% | 49% | 64% | 49% | 64% | 48% | 62% | 57% | 74% | 49% | 49% | 51% | 51% |
| 656 | 0.00% | 0.00% | 1.00% | 1.00% | 1.00% | 39% | 51% | 40% | 52% | 40% | 52% | 35% | 46% | 48% | 62% | 40% | 40% | 41% | 41% |
| 657 | 0.25% | 0.00% | 1.00% | 1.00% | 1.00% | 41% | 53% | 41% | 53% | 42% | 55% | 36% | 47% | 49% | 64% | 41% | 41% | 42% | 42% |
| 658 | 1.00% | 0.00% | 1.00% | 1.00% | 1.00% | 43% | 56% | 42% | 55% | 45% | 59% | 38% | 49% | 51% | 66% | 43% | 43% | 45% | 45% |
| 659 | 0.00% | 0.25% | 1.00% | 1.00% | 1.00% | 43% | 56% | 45% | 59% | 44% | 57% | 40% | 52% | 52% | 68% | 44% | 44% | 45% | 45% |
| 660 | 1.00% | 0.25% | 1.00% | 1.00% | 1.00% | 47% | 61% | 47% | 61% | 49% | 64% | 43% | 56% | 55% | 72% | 48% | 48% | 49% | 49% |
| 661 | 9.00% | 0.25% | 1.00% | 1.00% | 1.00% | 43% | 56% | 45% | 59% | 44% | 57% | 40% | 52% | 52% | 68% | 44% | 44% | 45% | 45% |
| 662 | 0.00% | 1.00% | 1.00% | 1.00% | 1.00% | 46% | 60% | 48% | 62% | 48% | 62% | 43% | 56% | 55% | 72% | 47% | 47% | 49% | 49% |
| 663 | 0.25% | 1.00% | 1.00% | 1.00% | 1.00% | 48% | 62% | 49% | 64% | 50% | 65% | 44% | 57% | 56% | 73% | 49% | 49% | 50% | 50% |
| 664 | 1.00% | 1.00% | 1.00% | 1.00% | 1.00% | 50% | 65% | 50% | 65% | 53% | 69% | 46% | 60% | 58% | 75% | 51% | 51% | 52% | 52% |
| 665 | 9.00% | 1.00% | 1.00% | 1.00% | 1.00% | 46% | 60% | 48% | 62% | 48% | 62% | 43% | 56% | 55% | 72% | 47% | 47% | 49% | 49% |
| 666 | 0.00% | 9.00% | 1.00% | 1.00% | 1.00% | 54% | 70% | 56% | 73% | 54% | 70% | 50% | 65% | 62% | 81% | 55% | 55% | 55% | 55% |
| 667 | 0.25% | 9.00% | 1.00% | 1.00% | 1.00% | 56% | 73% | 57% | 74% | 56% | 73% | 51% | 66% | 63% | 82% | 56% | 56% | 57% | 57% |
| 668 | 1.00% | 9.00% | 1.00% | 1.00% | 1.00% | 58% | 75% | 58% | 75% | 59% | 77% | 53% | 69% | 65% | 85% | 58% | 58% | 59% | 59% |
| 669 | 0.25% | 0.25% | 9.00% | 1.00% | 1.00% | 55% | 72% | 54% | 70% | 60% | 78% | 48% | 62% | 67% | 87% | 56% | 56% | 58% | 58% |
| 670 | 1.00% | 0.25% | 9.00% | 1.00% | 1.00% | 57% | 74% | 55% | 72% | 63% | 82% | 50% | 65% | 69% | 90% | 58% | 58% | 61% | 61% |
| 671 | 9.00% | 0.25% | 9.00% | 1.00% | 1.00% | 53% | 69% | 53% | 69% | 58% | 75% | 47% | 61% | 66% | 86% | 55% | 55% | 57% | 57% |

Fig. 7

| Formula # | Delta Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 672 | 0.25% | 1.00% | 9.00% | 1.00% | 1.00% | 58% | 75% | 57% | 74% | 64% | 83% | 51% | 66% | 70% | 91% | 60% | 60% | 62% | 62% |
| 673 | 0.00% | 0.25% | 0.00% | 9.00% | 1.00% | 46% | 60% | 43% | 56% | 42% | 55% | 44% | 57% | 50% | 65% | 44% | 44% | 45% | 45% |
| 674 | 0.00% | 0.00% | 0.25% | 9.00% | 1.00% | 47% | 61% | 42% | 55% | 45% | 59% | 46% | 60% | 53% | 69% | 45% | 45% | 48% | 48% |
| 675 | 0.25% | 0.00% | 0.25% | 9.00% | 1.00% | 49% | 64% | 43% | 56% | 47% | 61% | 47% | 61% | 54% | 70% | 46% | 46% | 49% | 49% |
| 676 | 0.00% | 0.25% | 0.25% | 9.00% | 1.00% | 51% | 66% | 47% | 61% | 49% | 64% | 51% | 66% | 57% | 74% | 49% | 49% | 52% | 52% |
| 677 | 0.25% | 0.25% | 0.25% | 9.00% | 1.00% | 53% | 69% | 48% | 62% | 51% | 66% | 52% | 68% | 58% | 75% | 51% | 51% | 54% | 54% |
| 678 | 1.00% | 0.25% | 0.25% | 9.00% | 1.00% | 55% | 72% | 49% | 64% | 54% | 70% | 54% | 70% | 60% | 78% | 53% | 53% | 56% | 56% |
| 679 | 9.00% | 0.25% | 0.25% | 9.00% | 1.00% | 51% | 66% | 47% | 61% | 49% | 64% | 51% | 66% | 57% | 74% | 49% | 49% | 52% | 52% |
| 680 | 0.00% | 1.00% | 0.25% | 9.00% | 1.00% | 54% | 70% | 50% | 65% | 53% | 69% | 54% | 70% | 60% | 78% | 52% | 52% | 56% | 56% |
| 681 | 0.25% | 1.00% | 0.25% | 9.00% | 1.00% | 56% | 73% | 51% | 66% | 55% | 72% | 55% | 72% | 61% | 79% | 54% | 54% | 57% | 57% |
| 682 | 1.00% | 1.00% | 0.25% | 9.00% | 1.00% | 58% | 75% | 52% | 68% | 58% | 75% | 57% | 74% | 63% | 82% | 56% | 56% | 59% | 59% |
| 683 | 0.25% | 9.00% | 0.25% | 9.00% | 1.00% | 64% | 83% | 59% | 77% | 61% | 79% | 62% | 81% | 68% | 88% | 61% | 61% | 64% | 64% |
| 684 | 0.25% | 0.00% | 1.00% | 9.00% | 1.00% | 54% | 70% | 50% | 65% | 52% | 68% | 49% | 64% | 59% | 77% | 52% | 52% | 53% | 53% |
| 685 | 1.00% | 0.25% | 1.00% | 9.00% | 1.00% | 60% | 78% | 56% | 73% | 59% | 77% | 56% | 73% | 65% | 85% | 58% | 58% | 60% | 60% |
| 686 | 9.00% | 0.25% | 1.00% | 9.00% | 1.00% | 56% | 73% | 54% | 70% | 54% | 70% | 53% | 69% | 62% | 81% | 55% | 55% | 56% | 56% |
| 687 | 0.00% | 1.00% | 1.00% | 9.00% | 1.00% | 59% | 77% | 57% | 74% | 58% | 75% | 56% | 73% | 65% | 85% | 58% | 58% | 60% | 60% |
| 688 | 0.25% | 1.00% | 1.00% | 9.00% | 1.00% | 61% | 79% | 58% | 75% | 60% | 78% | 57% | 74% | 66% | 86% | 60% | 60% | 61% | 61% |
| 689 | 1.00% | 1.00% | 1.00% | 9.00% | 1.00% | 63% | 82% | 59% | 77% | 63% | 82% | 59% | 77% | 68% | 88% | 62% | 62% | 63% | 63% |
| 690 | 0.25% | 0.25% | 9.00% | 9.00% | 1.00% | 68% | 88% | 63% | 82% | 70% | 91% | 61% | 79% | 77% | 100% | 67% | 67% | 69% | 69% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 691 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 692 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 693 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 694 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 695 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 696 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 697 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 698 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 699 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 700 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 701 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 702 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 703 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 704 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 705 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 706 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 707 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 708 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 709 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 710 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 711 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 712 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 713 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 714 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 715 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 716 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 717 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 718 | 0.00% | 0.25% | 0.00% | 0.25% | 0.00% | 11% | 14% | 10% | 13% | 9% | 12% | 15% | 20% | 10% | 13% | 10% | 10% | 11% | 11% |
| 719 | 0.25% | 0.25% | 0.00% | 0.25% | 0.00% | 13% | 17% | 11% | 14% | 11% | 14% | 16% | 21% | 11% | 14% | 12% | 12% | 13% | 13% |
| 720 | 9.00% | 0.25% | 0.00% | 0.25% | 0.00% | 11% | 14% | 10% | 13% | 9% | 12% | 15% | 20% | 10% | 13% | 10% | 10% | 11% | 11% |
| 721 | 1.00% | 1.00% | 0.00% | 0.25% | 0.00% | 18% | 23% | 15% | 20% | 18% | 23% | 21% | 27% | 16% | 21% | 17% | 17% | 18% | 18% |
| 722 | 1.00% | 9.00% | 0.00% | 0.25% | 0.00% | 26% | 34% | 23% | 30% | 24% | 31% | 28% | 36% | 23% | 30% | 24% | 24% | 25% | 25% |
| 723 | 0.00% | 0.00% | 0.25% | 0.25% | 0.00% | 12% | 16% | 9% | 12% | 12% | 16% | 17% | 22% | 13% | 17% | 11% | 11% | 14% | 14% |
| 724 | 0.25% | 0.00% | 0.25% | 0.25% | 0.00% | 14% | 18% | 10% | 13% | 14% | 18% | 18% | 23% | 14% | 18% | 13% | 13% | 15% | 15% |
| 725 | 0.00% | 0.25% | 0.25% | 0.25% | 0.00% | 16% | 21% | 14% | 18% | 16% | 21% | 22% | 29% | 17% | 22% | 15% | 15% | 18% | 18% |
| 726 | 0.25% | 0.25% | 0.25% | 0.25% | 0.00% | 18% | 23% | 15% | 20% | 18% | 23% | 23% | 30% | 18% | 23% | 17% | 17% | 20% | 20% |
| 727 | 1.00% | 0.25% | 0.25% | 0.25% | 0.00% | 20% | 26% | 16% | 21% | 21% | 27% | 25% | 33% | 20% | 26% | 19% | 19% | 22% | 22% |
| 728 | 9.00% | 0.25% | 0.25% | 0.25% | 0.00% | 16% | 21% | 14% | 18% | 16% | 21% | 22% | 29% | 17% | 22% | 15% | 15% | 18% | 18% |
| 729 | 0.25% | 1.00% | 0.25% | 0.25% | 0.00% | 21% | 27% | 18% | 23% | 22% | 29% | 26% | 34% | 21% | 27% | 20% | 20% | 23% | 23% |
| 730 | 9.00% | 1.00% | 0.25% | 0.25% | 0.00% | 19% | 25% | 17% | 22% | 20% | 26% | 25% | 33% | 20% | 26% | 19% | 19% | 22% | 22% |
| 731 | 0.25% | 9.00% | 0.25% | 0.25% | 0.00% | 29% | 38% | 26% | 34% | 28% | 36% | 33% | 43% | 28% | 36% | 28% | 28% | 30% | 30% |
| 732 | 1.00% | 9.00% | 0.25% | 0.25% | 0.00% | 31% | 40% | 27% | 35% | 31% | 40% | 35% | 46% | 30% | 39% | 30% | 30% | 32% | 32% |
| 733 | 9.00% | 9.00% | 0.25% | 0.25% | 0.00% | 27% | 35% | 25% | 33% | 26% | 34% | 32% | 42% | 27% | 35% | 26% | 26% | 28% | 28% |
| 734 | 0.00% | 0.00% | 1.00% | 0.25% | 0.00% | 17% | 22% | 16% | 21% | 17% | 22% | 19% | 25% | 18% | 23% | 17% | 17% | 18% | 18% |
| 735 | 1.00% | 0.00% | 1.00% | 0.25% | 0.00% | 21% | 27% | 18% | 23% | 22% | 29% | 22% | 29% | 21% | 27% | 20% | 20% | 22% | 22% |
| 736 | 0.00% | 0.25% | 1.00% | 0.25% | 0.00% | 21% | 27% | 21% | 27% | 21% | 27% | 24% | 31% | 22% | 29% | 21% | 21% | 22% | 22% |
| 737 | 0.25% | 0.25% | 1.00% | 0.25% | 0.00% | 23% | 30% | 22% | 29% | 23% | 30% | 25% | 33% | 23% | 30% | 23% | 23% | 24% | 24% |
| 738 | 1.00% | 0.25% | 1.00% | 0.25% | 0.00% | 25% | 33% | 23% | 30% | 26% | 34% | 27% | 35% | 25% | 33% | 25% | 25% | 26% | 26% |
| 739 | 9.00% | 0.25% | 1.00% | 0.25% | 0.00% | 21% | 27% | 21% | 27% | 21% | 27% | 24% | 31% | 22% | 29% | 21% | 21% | 22% | 22% |
| 740 | 0.00% | 1.00% | 1.00% | 0.25% | 0.00% | 24% | 31% | 24% | 31% | 25% | 33% | 27% | 35% | 25% | 33% | 24% | 24% | 26% | 26% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 741 | 0.25% | 1.00% | 1.00% | 0.25% | 0.00% | 26% | 34% | 25% | 33% | 27% | 35% | 28% | 36% | 26% | 34% | 26% | 26% | 27% | 27% |
| 742 | 1.00% | 1.00% | 1.00% | 0.25% | 0.00% | 28% | 36% | 26% | 34% | 30% | 39% | 30% | 39% | 28% | 36% | 28% | 28% | 29% | 29% |
| 743 | 9.00% | 1.00% | 1.00% | 0.25% | 0.00% | 24% | 31% | 24% | 31% | 25% | 33% | 27% | 35% | 25% | 33% | 24% | 24% | 26% | 26% |
| 744 | 0.00% | 9.00% | 1.00% | 0.25% | 0.00% | 32% | 42% | 32% | 42% | 31% | 40% | 34% | 44% | 32% | 42% | 32% | 32% | 32% | 32% |
| 745 | 0.25% | 9.00% | 1.00% | 0.25% | 0.00% | 34% | 44% | 33% | 43% | 33% | 43% | 35% | 46% | 33% | 43% | 33% | 33% | 34% | 34% |
| 746 | 1.00% | 9.00% | 1.00% | 0.25% | 0.00% | 36% | 47% | 34% | 44% | 36% | 47% | 37% | 48% | 35% | 46% | 35% | 35% | 36% | 36% |
| 747 | 0.25% | 0.25% | 9.00% | 0.25% | 0.00% | 33% | 43% | 30% | 39% | 37% | 48% | 32% | 42% | 37% | 48% | 33% | 33% | 35% | 35% |
| 748 | 1.00% | 0.25% | 9.00% | 0.25% | 0.00% | 35% | 46% | 31% | 40% | 40% | 52% | 34% | 44% | 39% | 51% | 35% | 35% | 38% | 38% |
| 749 | 9.00% | 0.25% | 9.00% | 0.25% | 0.00% | 31% | 40% | 29% | 38% | 35% | 46% | 31% | 40% | 36% | 47% | 32% | 32% | 34% | 34% |
| 750 | 0.00% | 1.00% | 9.00% | 0.25% | 0.00% | 34% | 44% | 32% | 42% | 39% | 51% | 34% | 44% | 39% | 51% | 35% | 35% | 37% | 37% |
| 751 | 0.25% | 1.00% | 9.00% | 0.25% | 0.00% | 36% | 47% | 33% | 43% | 41% | 53% | 35% | 46% | 40% | 52% | 37% | 37% | 39% | 39% |
| 752 | 9.00% | 1.00% | 9.00% | 0.25% | 0.00% | 34% | 44% | 32% | 42% | 39% | 51% | 34% | 44% | 39% | 51% | 35% | 35% | 37% | 37% |
| 753 | 1.00% | 9.00% | 9.00% | 0.25% | 0.00% | 46% | 60% | 42% | 55% | 50% | 65% | 44% | 57% | 49% | 64% | 46% | 46% | 48% | 48% |
| 754 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 755 | 1.00% | 0.25% | 0.00% | 1.00% | 0.00% | 23% | 30% | 19% | 25% | 21% | 27% | 25% | 33% | 22% | 29% | 21% | 21% | 23% | 23% |
| 756 | 0.00% | 1.00% | 0.00% | 1.00% | 0.00% | 22% | 29% | 20% | 26% | 20% | 26% | 25% | 33% | 22% | 29% | 21% | 21% | 22% | 22% |
| 757 | 0.25% | 1.00% | 0.00% | 1.00% | 0.00% | 24% | 31% | 21% | 27% | 22% | 29% | 26% | 34% | 23% | 30% | 22% | 22% | 24% | 24% |
| 758 | 1.00% | 1.00% | 0.00% | 1.00% | 0.00% | 26% | 34% | 22% | 29% | 25% | 33% | 28% | 36% | 25% | 33% | 24% | 24% | 26% | 26% |
| 759 | 0.00% | 0.00% | 0.25% | 1.00% | 0.00% | 20% | 26% | 16% | 21% | 19% | 25% | 24% | 31% | 22% | 29% | 18% | 18% | 22% | 22% |
| 760 | 1.00% | 0.00% | 0.25% | 1.00% | 0.00% | 24% | 31% | 18% | 23% | 24% | 31% | 27% | 35% | 25% | 33% | 22% | 22% | 25% | 25% |
| 761 | 0.25% | 0.25% | 0.25% | 1.00% | 0.00% | 26% | 34% | 22% | 29% | 25% | 33% | 30% | 39% | 27% | 35% | 24% | 24% | 27% | 27% |
| 762 | 1.00% | 0.25% | 0.25% | 1.00% | 0.00% | 28% | 36% | 23% | 30% | 28% | 36% | 32% | 42% | 29% | 38% | 26% | 26% | 30% | 30% |
| 763 | 9.00% | 0.25% | 0.25% | 1.00% | 0.00% | 24% | 31% | 21% | 27% | 23% | 30% | 29% | 38% | 26% | 34% | 23% | 23% | 26% | 26% |
| 764 | 0.00% | 1.00% | 0.25% | 1.00% | 0.00% | 27% | 35% | 24% | 31% | 27% | 35% | 32% | 42% | 29% | 38% | 26% | 26% | 29% | 29% |
| 765 | 0.25% | 1.00% | 0.25% | 1.00% | 0.00% | 29% | 38% | 25% | 33% | 29% | 38% | 33% | 43% | 30% | 39% | 28% | 28% | 31% | 31% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 766 | 1.00% | 1.00% | 0.25% | 1.00% | 0.00% | 31% | 40% | 26% | 34% | 32% | 42% | 35% | 46% | 32% | 42% | 30% | 30% | 33% | 33% |
| 767 | 9.00% | 1.00% | 0.25% | 1.00% | 0.00% | 27% | 35% | 24% | 31% | 27% | 35% | 32% | 42% | 29% | 38% | 26% | 26% | 29% | 29% |
| 768 | 0.25% | 9.00% | 0.25% | 1.00% | 0.00% | 37% | 48% | 33% | 43% | 35% | 46% | 40% | 52% | 37% | 48% | 35% | 35% | 37% | 37% |
| 769 | 1.00% | 9.00% | 0.25% | 1.00% | 0.00% | 39% | 51% | 34% | 44% | 38% | 49% | 42% | 55% | 39% | 51% | 37% | 37% | 40% | 40% |
| 770 | 9.00% | 9.00% | 0.25% | 1.00% | 0.00% | 35% | 46% | 32% | 42% | 33% | 43% | 39% | 51% | 36% | 47% | 33% | 33% | 36% | 36% |
| 771 | 0.00% | 0.00% | 1.00% | 1.00% | 0.00% | 25% | 33% | 23% | 30% | 24% | 31% | 26% | 34% | 27% | 35% | 24% | 24% | 26% | 26% |
| 772 | 0.25% | 0.00% | 1.00% | 1.00% | 0.00% | 27% | 35% | 24% | 31% | 26% | 34% | 27% | 35% | 28% | 36% | 26% | 26% | 27% | 27% |
| 773 | 1.00% | 0.00% | 1.00% | 1.00% | 0.00% | 29% | 38% | 25% | 33% | 29% | 38% | 29% | 38% | 30% | 39% | 28% | 28% | 29% | 29% |
| 774 | 0.00% | 0.25% | 1.00% | 1.00% | 0.00% | 29% | 38% | 28% | 36% | 28% | 36% | 31% | 40% | 31% | 40% | 28% | 28% | 30% | 30% |
| 775 | 1.00% | 0.25% | 1.00% | 1.00% | 0.00% | 33% | 43% | 30% | 39% | 33% | 43% | 34% | 44% | 34% | 44% | 32% | 32% | 34% | 34% |
| 776 | 9.00% | 0.25% | 1.00% | 1.00% | 0.00% | 29% | 38% | 28% | 36% | 28% | 36% | 31% | 40% | 31% | 40% | 28% | 28% | 30% | 30% |
| 777 | 0.00% | 1.00% | 1.00% | 1.00% | 0.00% | 32% | 42% | 31% | 40% | 32% | 42% | 34% | 44% | 34% | 44% | 32% | 32% | 33% | 33% |
| 778 | 0.25% | 1.00% | 1.00% | 1.00% | 0.00% | 34% | 44% | 32% | 42% | 34% | 44% | 35% | 46% | 35% | 46% | 33% | 33% | 35% | 35% |
| 779 | 1.00% | 1.00% | 1.00% | 1.00% | 0.00% | 36% | 47% | 33% | 43% | 37% | 48% | 37% | 48% | 37% | 48% | 35% | 35% | 37% | 37% |
| 780 | 9.00% | 1.00% | 1.00% | 1.00% | 0.00% | 32% | 42% | 31% | 40% | 32% | 42% | 34% | 44% | 34% | 44% | 32% | 32% | 33% | 33% |
| 781 | 0.00% | 9.00% | 1.00% | 1.00% | 0.00% | 40% | 52% | 39% | 51% | 38% | 49% | 41% | 53% | 41% | 53% | 39% | 39% | 40% | 40% |
| 782 | 0.25% | 9.00% | 1.00% | 1.00% | 0.00% | 42% | 55% | 40% | 52% | 40% | 52% | 42% | 55% | 42% | 55% | 41% | 41% | 41% | 41% |
| 783 | 1.00% | 9.00% | 1.00% | 1.00% | 0.00% | 44% | 57% | 41% | 53% | 43% | 56% | 44% | 57% | 44% | 57% | 43% | 43% | 44% | 44% |
| 784 | 0.25% | 0.25% | 9.00% | 1.00% | 0.00% | 41% | 53% | 37% | 48% | 44% | 57% | 39% | 51% | 46% | 60% | 41% | 41% | 43% | 43% |
| 785 | 1.00% | 0.25% | 9.00% | 1.00% | 0.00% | 43% | 56% | 38% | 49% | 47% | 61% | 41% | 53% | 48% | 62% | 43% | 43% | 45% | 45% |
| 786 | 9.00% | 0.25% | 9.00% | 1.00% | 0.00% | 39% | 51% | 36% | 47% | 42% | 55% | 38% | 49% | 45% | 59% | 39% | 39% | 42% | 42% |
| 787 | 0.25% | 1.00% | 9.00% | 1.00% | 0.00% | 44% | 57% | 40% | 52% | 48% | 62% | 42% | 55% | 49% | 64% | 44% | 44% | 46% | 46% |
| 788 | 0.00% | 0.25% | 0.00% | 9.00% | 0.00% | 41% | 53% | 37% | 48% | 32% | 42% | 44% | 57% | 39% | 51% | 37% | 37% | 38% | 38% |
| 789 | 0.00% | 0.00% | 0.25% | 9.00% | 0.00% | 42% | 55% | 36% | 47% | 35% | 46% | 46% | 60% | 42% | 55% | 38% | 38% | 41% | 41% |
| 790 | 0.25% | 0.00% | 0.25% | 9.00% | 0.00% | 44% | 57% | 37% | 48% | 37% | 48% | 47% | 61% | 43% | 56% | 39% | 39% | 42% | 42% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 791 | 0.00% | 0.25% | 0.25% | 9.00% | 0.00% | 46% | 60% | 41% | 53% | 39% | 51% | 51% | 66% | 46% | 60% | 42% | 42% | 45% | 45% |
| 792 | 0.25% | 0.25% | 0.25% | 9.00% | 0.00% | 48% | 62% | 42% | 55% | 41% | 53% | 52% | 68% | 47% | 61% | 44% | 44% | 47% | 47% |
| 793 | 1.00% | 0.25% | 0.25% | 9.00% | 0.00% | 50% | 65% | 43% | 56% | 44% | 57% | 54% | 70% | 49% | 64% | 46% | 46% | 49% | 49% |
| 794 | 9.00% | 0.25% | 0.25% | 9.00% | 0.00% | 46% | 60% | 41% | 53% | 39% | 51% | 51% | 66% | 46% | 60% | 42% | 42% | 45% | 45% |
| 795 | 0.00% | 1.00% | 0.25% | 9.00% | 0.00% | 49% | 64% | 44% | 57% | 43% | 56% | 54% | 70% | 49% | 64% | 45% | 45% | 49% | 49% |
| 796 | 0.25% | 1.00% | 0.25% | 9.00% | 0.00% | 51% | 66% | 45% | 59% | 45% | 59% | 55% | 72% | 50% | 65% | 47% | 47% | 50% | 50% |
| 797 | 1.00% | 1.00% | 0.25% | 9.00% | 0.00% | 53% | 69% | 46% | 60% | 48% | 62% | 57% | 74% | 52% | 68% | 49% | 49% | 52% | 52% |
| 798 | 0.25% | 9.00% | 0.25% | 9.00% | 0.00% | 59% | 77% | 53% | 69% | 51% | 66% | 62% | 81% | 57% | 74% | 54% | 54% | 57% | 57% |
| 799 | 0.25% | 0.00% | 1.00% | 9.00% | 0.00% | 49% | 64% | 44% | 57% | 42% | 55% | 49% | 64% | 48% | 62% | 45% | 45% | 46% | 46% |
| 800 | 1.00% | 0.25% | 1.00% | 9.00% | 0.00% | 55% | 72% | 50% | 65% | 49% | 64% | 56% | 73% | 54% | 70% | 51% | 51% | 53% | 53% |
| 801 | 9.00% | 0.25% | 1.00% | 9.00% | 0.00% | 51% | 66% | 48% | 62% | 44% | 57% | 53% | 69% | 51% | 66% | 48% | 48% | 49% | 49% |
| 802 | 0.00% | 1.00% | 1.00% | 9.00% | 0.00% | 54% | 70% | 51% | 66% | 48% | 62% | 56% | 73% | 54% | 70% | 51% | 51% | 53% | 53% |
| 803 | 0.25% | 1.00% | 1.00% | 9.00% | 0.00% | 56% | 73% | 52% | 68% | 50% | 65% | 57% | 74% | 55% | 72% | 53% | 53% | 54% | 54% |
| 804 | 1.00% | 1.00% | 1.00% | 9.00% | 0.00% | 58% | 75% | 53% | 69% | 53% | 69% | 59% | 77% | 57% | 74% | 55% | 55% | 56% | 56% |
| 805 | 0.25% | 0.25% | 9.00% | 9.00% | 0.00% | 63% | 82% | 57% | 74% | 60% | 78% | 61% | 79% | 66% | 86% | 60% | 60% | 62% | 62% |
| 806 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 807 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 808 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 809 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 810 | 0.25% | 0.00% | 0.25% | 0.00% | 0.25% | 14% | 18% | 12% | 16% | 16% | 21% | 16% | 21% | 16% | 21% | 14% | 14% | 16% | 16% |
| 811 | 1.00% | 0.00% | 0.25% | 0.00% | 0.25% | 16% | 21% | 13% | 17% | 19% | 25% | 18% | 23% | 18% | 23% | 16% | 16% | 18% | 18% |
| 812 | 0.00% | 0.25% | 0.25% | 0.00% | 0.25% | 16% | 21% | 16% | 21% | 18% | 23% | 20% | 26% | 19% | 25% | 17% | 17% | 19% | 19% |
| 813 | 0.25% | 0.25% | 0.25% | 0.00% | 0.25% | 18% | 23% | 17% | 22% | 20% | 26% | 21% | 27% | 20% | 26% | 18% | 18% | 20% | 20% |
| 814 | 0.00% | 1.00% | 0.25% | 0.00% | 0.25% | 19% | 25% | 19% | 25% | 22% | 29% | 23% | 30% | 22% | 29% | 20% | 20% | 22% | 22% |
| 815 | 1.00% | 1.00% | 0.25% | 0.00% | 0.25% | 23% | 30% | 21% | 27% | 27% | 35% | 26% | 34% | 25% | 33% | 24% | 24% | 26% | 26% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 816 | 1.00% | 9.00% | 0.25% | 0.00% | 0.25% | 31% | 40% | 29% | 38% | 33% | 43% | 33% | 43% | 32% | 42% | 31% | 31% | 33% | 33% |
| 817 | 0.25% | 0.00% | 1.00% | 0.00% | 0.25% | 19% | 25% | 19% | 25% | 21% | 27% | 18% | 23% | 21% | 27% | 20% | 20% | 20% | 20% |
| 818 | 1.00% | 0.00% | 1.00% | 0.00% | 0.25% | 21% | 27% | 20% | 26% | 24% | 31% | 20% | 26% | 23% | 30% | 22% | 22% | 22% | 22% |
| 819 | 0.00% | 0.25% | 1.00% | 0.00% | 0.25% | 21% | 27% | 23% | 30% | 23% | 30% | 22% | 29% | 24% | 31% | 22% | 22% | 23% | 23% |
| 820 | 1.00% | 0.25% | 1.00% | 0.00% | 0.25% | 25% | 33% | 25% | 33% | 28% | 36% | 25% | 33% | 27% | 35% | 26% | 26% | 27% | 27% |
| 821 | 0.00% | 1.00% | 1.00% | 0.00% | 0.25% | 24% | 31% | 26% | 34% | 27% | 35% | 25% | 33% | 27% | 35% | 26% | 26% | 26% | 26% |
| 822 | 0.25% | 1.00% | 1.00% | 0.00% | 0.25% | 26% | 34% | 27% | 35% | 29% | 38% | 26% | 34% | 28% | 36% | 27% | 27% | 28% | 28% |
| 823 | 1.00% | 1.00% | 1.00% | 0.00% | 0.25% | 28% | 36% | 28% | 36% | 32% | 42% | 28% | 36% | 30% | 39% | 29% | 29% | 30% | 30% |
| 824 | 9.00% | 1.00% | 1.00% | 0.00% | 0.25% | 24% | 31% | 26% | 34% | 27% | 35% | 25% | 33% | 27% | 35% | 26% | 26% | 26% | 26% |
| 825 | 1.00% | 9.00% | 1.00% | 0.00% | 0.25% | 36% | 47% | 36% | 47% | 38% | 49% | 35% | 46% | 37% | 48% | 37% | 37% | 37% | 37% |
| 826 | 0.25% | 0.00% | 9.00% | 0.00% | 0.25% | 29% | 38% | 27% | 35% | 35% | 46% | 25% | 33% | 35% | 46% | 30% | 30% | 32% | 32% |
| 827 | 0.00% | 0.25% | 9.00% | 0.00% | 0.25% | 31% | 40% | 31% | 40% | 37% | 48% | 29% | 38% | 38% | 49% | 33% | 33% | 35% | 35% |
| 828 | 0.25% | 0.25% | 9.00% | 0.00% | 0.25% | 33% | 43% | 32% | 42% | 39% | 51% | 30% | 39% | 39% | 51% | 35% | 35% | 36% | 36% |
| 829 | 1.00% | 0.25% | 9.00% | 0.00% | 0.25% | 35% | 46% | 33% | 43% | 42% | 55% | 32% | 42% | 41% | 53% | 37% | 37% | 38% | 38% |
| 830 | 0.25% | 1.00% | 9.00% | 0.00% | 0.25% | 36% | 47% | 35% | 46% | 43% | 56% | 33% | 43% | 42% | 55% | 38% | 38% | 39% | 39% |
| 831 | 0.25% | 0.00% | 0.00% | 0.25% | 0.25% | 16% | 21% | 13% | 17% | 14% | 18% | 19% | 25% | 15% | 20% | 14% | 14% | 16% | 16% |
| 832 | 1.00% | 0.00% | 0.00% | 0.25% | 0.25% | 18% | 23% | 14% | 18% | 17% | 22% | 21% | 27% | 17% | 22% | 16% | 16% | 18% | 18% |
| 833 | 0.00% | 0.25% | 0.00% | 0.25% | 0.25% | 18% | 23% | 17% | 22% | 16% | 21% | 23% | 30% | 18% | 23% | 17% | 17% | 19% | 19% |
| 834 | 0.25% | 0.25% | 0.00% | 0.25% | 0.25% | 20% | 26% | 18% | 23% | 18% | 23% | 24% | 31% | 19% | 25% | 19% | 19% | 20% | 20% |
| 835 | 9.00% | 0.25% | 0.00% | 0.25% | 0.25% | 18% | 23% | 17% | 22% | 16% | 21% | 23% | 30% | 18% | 23% | 17% | 17% | 19% | 19% |
| 836 | 1.00% | 1.00% | 0.00% | 0.25% | 0.25% | 25% | 33% | 22% | 29% | 25% | 33% | 29% | 38% | 24% | 31% | 24% | 24% | 26% | 26% |
| 837 | 1.00% | 9.00% | 0.00% | 0.25% | 0.25% | 33% | 43% | 30% | 39% | 31% | 40% | 36% | 47% | 31% | 40% | 31% | 31% | 33% | 33% |
| 838 | 0.00% | 0.00% | 0.25% | 0.25% | 0.25% | 19% | 25% | 16% | 21% | 19% | 25% | 25% | 33% | 21% | 27% | 18% | 18% | 22% | 22% |
| 839 | 0.25% | 0.00% | 0.25% | 0.25% | 0.25% | 21% | 27% | 17% | 22% | 21% | 27% | 26% | 34% | 22% | 29% | 20% | 20% | 23% | 23% |
| 840 | 0.00% | 0.25% | 0.25% | 0.25% | 0.25% | 23% | 30% | 21% | 27% | 23% | 30% | 30% | 39% | 25% | 33% | 22% | 22% | 26% | 26% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 841 | 0.25% | 0.25% | 0.25% | 0.25% | 0.25% | 25% | 33% | 22% | 29% | 25% | 33% | 31% | 40% | 26% | 34% | 24% | 24% | 27% | 27% |
| 842 | 1.00% | 0.25% | 0.25% | 0.25% | 0.25% | 27% | 35% | 23% | 30% | 28% | 36% | 33% | 43% | 28% | 36% | 26% | 26% | 30% | 30% |
| 843 | 9.00% | 0.25% | 0.25% | 0.25% | 0.25% | 23% | 30% | 21% | 27% | 23% | 30% | 30% | 39% | 25% | 33% | 22% | 22% | 26% | 26% |
| 844 | 0.25% | 1.00% | 0.25% | 0.25% | 0.25% | 28% | 36% | 25% | 33% | 29% | 38% | 34% | 44% | 29% | 38% | 27% | 27% | 31% | 31% |
| 845 | 9.00% | 1.00% | 0.25% | 0.25% | 0.25% | 26% | 34% | 24% | 31% | 27% | 35% | 33% | 43% | 28% | 36% | 26% | 26% | 29% | 29% |
| 846 | 0.25% | 9.00% | 0.25% | 0.25% | 0.25% | 36% | 47% | 33% | 43% | 35% | 46% | 41% | 53% | 36% | 47% | 35% | 35% | 37% | 37% |
| 847 | 1.00% | 9.00% | 0.25% | 0.25% | 0.25% | 38% | 49% | 34% | 44% | 38% | 49% | 43% | 56% | 38% | 49% | 37% | 37% | 40% | 40% |
| 848 | 9.00% | 9.00% | 0.25% | 0.25% | 0.25% | 34% | 44% | 32% | 42% | 33% | 43% | 40% | 52% | 35% | 46% | 33% | 33% | 36% | 36% |
| 849 | 0.00% | 0.00% | 1.00% | 0.25% | 0.25% | 24% | 31% | 23% | 30% | 24% | 31% | 27% | 35% | 26% | 34% | 24% | 24% | 26% | 26% |
| 850 | 1.00% | 0.00% | 1.00% | 0.25% | 0.25% | 28% | 36% | 25% | 33% | 29% | 38% | 30% | 39% | 29% | 38% | 27% | 27% | 29% | 29% |
| 851 | 0.00% | 0.25% | 1.00% | 0.25% | 0.25% | 28% | 36% | 28% | 36% | 28% | 36% | 32% | 42% | 30% | 39% | 28% | 28% | 30% | 30% |
| 852 | 0.25% | 0.25% | 1.00% | 0.25% | 0.25% | 30% | 39% | 29% | 38% | 30% | 39% | 33% | 43% | 31% | 40% | 30% | 30% | 31% | 31% |
| 853 | 1.00% | 0.25% | 1.00% | 0.25% | 0.25% | 32% | 42% | 30% | 39% | 33% | 43% | 35% | 46% | 33% | 43% | 32% | 32% | 34% | 34% |
| 854 | 9.00% | 0.25% | 1.00% | 0.25% | 0.25% | 28% | 36% | 28% | 36% | 28% | 36% | 32% | 42% | 30% | 39% | 28% | 28% | 30% | 30% |
| 855 | 0.00% | 1.00% | 1.00% | 0.25% | 0.25% | 31% | 40% | 31% | 40% | 32% | 42% | 35% | 46% | 33% | 43% | 31% | 31% | 33% | 33% |
| 856 | 0.25% | 1.00% | 1.00% | 0.25% | 0.25% | 33% | 43% | 32% | 42% | 34% | 44% | 36% | 47% | 34% | 44% | 33% | 33% | 35% | 35% |
| 857 | 1.00% | 1.00% | 1.00% | 0.25% | 0.25% | 35% | 46% | 33% | 43% | 37% | 48% | 38% | 49% | 36% | 47% | 35% | 35% | 37% | 37% |
| 858 | 9.00% | 1.00% | 1.00% | 0.25% | 0.25% | 31% | 40% | 31% | 40% | 32% | 42% | 35% | 46% | 33% | 43% | 31% | 31% | 33% | 33% |
| 859 | 0.00% | 9.00% | 1.00% | 0.25% | 0.25% | 39% | 51% | 39% | 51% | 38% | 49% | 42% | 55% | 40% | 52% | 39% | 39% | 40% | 40% |
| 860 | 0.25% | 9.00% | 1.00% | 0.25% | 0.25% | 41% | 53% | 40% | 52% | 40% | 52% | 43% | 56% | 41% | 53% | 40% | 40% | 41% | 41% |
| 861 | 1.00% | 9.00% | 1.00% | 0.25% | 0.25% | 43% | 56% | 41% | 53% | 43% | 56% | 45% | 59% | 43% | 56% | 42% | 42% | 44% | 44% |
| 862 | 0.25% | 0.25% | 9.00% | 0.25% | 0.25% | 40% | 52% | 37% | 48% | 44% | 57% | 40% | 52% | 45% | 59% | 40% | 40% | 43% | 43% |
| 863 | 1.00% | 0.25% | 9.00% | 0.25% | 0.25% | 42% | 55% | 38% | 49% | 47% | 61% | 42% | 55% | 47% | 61% | 42% | 42% | 45% | 45% |
| 864 | 9.00% | 0.25% | 9.00% | 0.25% | 0.25% | 38% | 49% | 36% | 47% | 42% | 55% | 39% | 51% | 44% | 57% | 39% | 39% | 42% | 42% |
| 865 | 0.00% | 1.00% | 9.00% | 0.25% | 0.25% | 41% | 53% | 39% | 51% | 46% | 60% | 42% | 55% | 47% | 61% | 42% | 42% | 45% | 45% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 866 | 0.25% | 1.00% | 9.00% | 0.25% | 0.25% | 43% | 56% | 40% | 52% | 48% | 62% | 43% | 56% | 48% | 62% | 44% | 44% | 46% | 46% |
| 867 | 9.00% | 1.00% | 9.00% | 0.25% | 0.25% | 41% | 53% | 39% | 51% | 46% | 60% | 42% | 55% | 47% | 61% | 42% | 42% | 45% | 45% |
| 868 | 1.00% | 9.00% | 9.00% | 0.25% | 0.25% | 53% | 69% | 49% | 64% | 57% | 74% | 52% | 68% | 57% | 74% | 53% | 53% | 55% | 55% |
| 869 | 0.25% | 0.00% | 0.00% | 1.00% | 0.25% | 24% | 31% | 20% | 26% | 21% | 27% | 26% | 34% | 24% | 31% | 22% | 22% | 24% | 24% |
| 870 | 1.00% | 0.25% | 0.00% | 1.00% | 0.25% | 30% | 39% | 26% | 34% | 28% | 36% | 33% | 43% | 30% | 39% | 28% | 28% | 30% | 30% |
| 871 | 0.00% | 1.00% | 0.00% | 1.00% | 0.25% | 29% | 38% | 27% | 35% | 27% | 35% | 33% | 43% | 30% | 39% | 28% | 28% | 30% | 30% |
| 872 | 0.25% | 1.00% | 0.00% | 1.00% | 0.25% | 31% | 40% | 28% | 36% | 29% | 38% | 34% | 44% | 31% | 40% | 29% | 29% | 31% | 31% |
| 873 | 1.00% | 1.00% | 0.00% | 1.00% | 0.25% | 33% | 43% | 29% | 38% | 32% | 42% | 36% | 47% | 33% | 43% | 31% | 31% | 34% | 34% |
| 874 | 0.00% | 0.00% | 0.25% | 1.00% | 0.25% | 27% | 35% | 23% | 30% | 26% | 34% | 32% | 42% | 30% | 39% | 25% | 25% | 29% | 29% |
| 875 | 1.00% | 0.00% | 0.25% | 1.00% | 0.25% | 31% | 40% | 25% | 33% | 31% | 40% | 35% | 46% | 33% | 43% | 29% | 29% | 33% | 33% |
| 876 | 0.25% | 0.25% | 0.25% | 1.00% | 0.25% | 33% | 43% | 29% | 38% | 32% | 42% | 38% | 49% | 35% | 46% | 31% | 31% | 35% | 35% |
| 877 | 1.00% | 0.25% | 0.25% | 1.00% | 0.25% | 35% | 46% | 30% | 39% | 35% | 46% | 40% | 52% | 37% | 48% | 33% | 33% | 37% | 37% |
| 878 | 9.00% | 0.25% | 0.25% | 1.00% | 0.25% | 31% | 40% | 28% | 36% | 30% | 39% | 37% | 48% | 34% | 44% | 30% | 30% | 34% | 34% |
| 879 | 0.00% | 1.00% | 0.25% | 1.00% | 0.25% | 34% | 44% | 31% | 40% | 34% | 44% | 40% | 52% | 37% | 48% | 33% | 33% | 37% | 37% |
| 880 | 0.25% | 1.00% | 0.25% | 1.00% | 0.25% | 36% | 47% | 32% | 42% | 36% | 47% | 41% | 53% | 38% | 49% | 35% | 35% | 38% | 38% |
| 881 | 1.00% | 1.00% | 0.25% | 1.00% | 0.25% | 38% | 49% | 33% | 43% | 39% | 51% | 43% | 56% | 40% | 52% | 37% | 37% | 41% | 41% |
| 882 | 9.00% | 1.00% | 0.25% | 1.00% | 0.25% | 34% | 44% | 31% | 40% | 34% | 44% | 40% | 52% | 37% | 48% | 33% | 33% | 37% | 37% |
| 883 | 0.25% | 9.00% | 0.25% | 1.00% | 0.25% | 44% | 57% | 40% | 52% | 42% | 55% | 48% | 62% | 45% | 59% | 42% | 42% | 45% | 45% |
| 884 | 1.00% | 9.00% | 0.25% | 1.00% | 0.25% | 46% | 60% | 41% | 53% | 45% | 59% | 50% | 65% | 47% | 61% | 44% | 44% | 47% | 47% |
| 885 | 9.00% | 9.00% | 0.25% | 1.00% | 0.25% | 42% | 55% | 39% | 51% | 40% | 52% | 47% | 61% | 44% | 57% | 40% | 40% | 44% | 44% |
| 886 | 0.00% | 0.00% | 1.00% | 1.00% | 0.25% | 32% | 42% | 30% | 39% | 31% | 40% | 34% | 44% | 35% | 46% | 31% | 31% | 33% | 33% |
| 887 | 0.25% | 0.00% | 1.00% | 1.00% | 0.25% | 34% | 44% | 31% | 40% | 33% | 43% | 35% | 46% | 36% | 47% | 33% | 33% | 35% | 35% |
| 888 | 1.00% | 0.00% | 1.00% | 1.00% | 0.25% | 36% | 47% | 32% | 42% | 36% | 47% | 37% | 48% | 38% | 49% | 35% | 35% | 37% | 37% |
| 889 | 0.00% | 0.25% | 1.00% | 1.00% | 0.25% | 36% | 47% | 35% | 46% | 35% | 46% | 39% | 51% | 39% | 51% | 35% | 35% | 38% | 38% |
| 890 | 1.00% | 0.25% | 1.00% | 1.00% | 0.25% | 40% | 52% | 37% | 48% | 40% | 52% | 42% | 55% | 42% | 55% | 39% | 39% | 41% | 41% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 891 | 9.00% | 0.25% | 1.00% | 1.00% | 0.25% | 36% | 47% | 35% | 46% | 35% | 46% | 39% | 51% | 39% | 51% | 35% | 35% | 38% | 38% |
| 892 | 0.00% | 1.00% | 1.00% | 1.00% | 0.25% | 39% | 51% | 38% | 49% | 39% | 51% | 42% | 55% | 42% | 55% | 39% | 39% | 41% | 41% |
| 893 | 0.25% | 1.00% | 1.00% | 1.00% | 0.25% | 41% | 53% | 39% | 51% | 41% | 53% | 43% | 56% | 43% | 56% | 40% | 40% | 42% | 42% |
| 894 | 1.00% | 1.00% | 1.00% | 1.00% | 0.25% | 43% | 56% | 40% | 52% | 44% | 57% | 45% | 59% | 45% | 59% | 42% | 42% | 45% | 45% |
| 895 | 9.00% | 1.00% | 1.00% | 1.00% | 0.25% | 39% | 51% | 38% | 49% | 39% | 51% | 42% | 55% | 42% | 55% | 39% | 39% | 41% | 41% |
| 896 | 0.00% | 9.00% | 1.00% | 1.00% | 0.25% | 47% | 61% | 46% | 60% | 45% | 59% | 49% | 64% | 49% | 64% | 46% | 46% | 48% | 48% |
| 897 | 0.25% | 9.00% | 1.00% | 1.00% | 0.25% | 49% | 64% | 47% | 61% | 47% | 61% | 50% | 65% | 50% | 65% | 48% | 48% | 49% | 49% |
| 898 | 1.00% | 9.00% | 1.00% | 1.00% | 0.25% | 51% | 66% | 48% | 62% | 50% | 65% | 52% | 68% | 52% | 68% | 50% | 50% | 51% | 51% |
| 899 | 0.25% | 0.25% | 9.00% | 1.00% | 0.25% | 48% | 62% | 44% | 57% | 51% | 66% | 47% | 61% | 54% | 70% | 48% | 48% | 51% | 51% |
| 900 | 1.00% | 0.25% | 9.00% | 1.00% | 0.25% | 50% | 65% | 45% | 59% | 54% | 70% | 49% | 64% | 56% | 73% | 50% | 50% | 53% | 53% |
| 901 | 9.00% | 0.25% | 9.00% | 1.00% | 0.25% | 46% | 60% | 43% | 56% | 49% | 64% | 46% | 60% | 53% | 69% | 46% | 46% | 49% | 49% |
| 902 | 0.25% | 1.00% | 9.00% | 1.00% | 0.25% | 51% | 66% | 47% | 61% | 55% | 72% | 50% | 65% | 57% | 74% | 51% | 51% | 54% | 54% |
| 903 | 0.00% | 0.25% | 0.00% | 9.00% | 0.25% | 48% | 62% | 44% | 57% | 39% | 51% | 52% | 68% | 47% | 61% | 44% | 44% | 46% | 46% |
| 904 | 0.00% | 0.00% | 0.25% | 9.00% | 0.25% | 49% | 64% | 43% | 56% | 42% | 55% | 54% | 70% | 50% | 65% | 45% | 45% | 49% | 49% |
| 905 | 0.25% | 0.00% | 0.25% | 9.00% | 0.25% | 51% | 66% | 44% | 57% | 44% | 57% | 55% | 72% | 51% | 66% | 46% | 46% | 50% | 50% |
| 906 | 0.00% | 0.25% | 0.25% | 9.00% | 0.25% | 53% | 69% | 48% | 62% | 46% | 60% | 59% | 77% | 54% | 70% | 49% | 49% | 53% | 53% |
| 907 | 0.25% | 0.25% | 0.25% | 9.00% | 0.25% | 55% | 72% | 49% | 64% | 48% | 62% | 60% | 78% | 55% | 72% | 51% | 51% | 54% | 54% |
| 908 | 1.00% | 0.25% | 0.25% | 9.00% | 0.25% | 57% | 74% | 50% | 65% | 51% | 66% | 62% | 81% | 57% | 74% | 53% | 53% | 57% | 57% |
| 909 | 9.00% | 0.25% | 0.25% | 9.00% | 0.25% | 53% | 69% | 48% | 62% | 46% | 60% | 59% | 77% | 54% | 70% | 49% | 49% | 53% | 53% |
| 910 | 0.00% | 1.00% | 0.25% | 9.00% | 0.25% | 56% | 73% | 51% | 66% | 50% | 65% | 62% | 81% | 57% | 74% | 52% | 52% | 56% | 56% |
| 911 | 0.25% | 1.00% | 0.25% | 9.00% | 0.25% | 58% | 75% | 52% | 68% | 52% | 68% | 63% | 82% | 58% | 75% | 54% | 54% | 58% | 58% |
| 912 | 1.00% | 1.00% | 0.25% | 9.00% | 0.25% | 60% | 78% | 53% | 69% | 55% | 72% | 65% | 85% | 60% | 78% | 56% | 56% | 60% | 60% |
| 913 | 0.25% | 9.00% | 0.25% | 9.00% | 0.25% | 66% | 86% | 60% | 78% | 58% | 75% | 70% | 91% | 65% | 85% | 61% | 61% | 64% | 64% |
| 914 | 0.25% | 0.00% | 1.00% | 9.00% | 0.25% | 56% | 73% | 51% | 66% | 49% | 64% | 57% | 74% | 56% | 73% | 52% | 52% | 54% | 54% |
| 915 | 1.00% | 0.25% | 1.00% | 9.00% | 0.25% | 62% | 81% | 57% | 74% | 56% | 73% | 64% | 83% | 62% | 81% | 58% | 58% | 61% | 61% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 916 | 9.00% | 0.25% | 1.00% | 9.00% | 0.25% | 58% | 75% | 55% | 72% | 51% | 66% | 61% | 79% | 59% | 77% | 55% | 55% | 57% | 57% |
| 917 | 0.00% | 1.00% | 1.00% | 9.00% | 0.25% | 61% | 79% | 58% | 75% | 55% | 72% | 64% | 83% | 62% | 81% | 58% | 58% | 60% | 60% |
| 918 | 0.25% | 1.00% | 1.00% | 9.00% | 0.25% | 63% | 82% | 59% | 77% | 57% | 74% | 65% | 85% | 63% | 82% | 60% | 60% | 62% | 62% |
| 919 | 1.00% | 1.00% | 1.00% | 9.00% | 0.25% | 65% | 85% | 60% | 78% | 60% | 78% | 67% | 87% | 65% | 85% | 62% | 62% | 64% | 64% |
| 920 | 0.25% | 0.25% | 9.00% | 9.00% | 0.25% | 70% | 91% | 64% | 83% | 67% | 87% | 69% | 90% | 74% | 96% | 67% | 67% | 70% | 70% |
| 921 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 922 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 923 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 924 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 925 | 0.25% | 0.00% | 0.25% | 0.00% | 1.00% | 22% | 29% | 21% | 27% | 25% | 33% | 22% | 29% | 27% | 35% | 23% | 23% | 25% | 25% |
| 926 | 1.00% | 0.00% | 0.25% | 0.00% | 1.00% | 24% | 31% | 22% | 29% | 28% | 36% | 24% | 31% | 29% | 38% | 25% | 25% | 27% | 27% |
| 927 | 0.00% | 0.25% | 0.25% | 0.00% | 1.00% | 24% | 31% | 25% | 33% | 27% | 35% | 26% | 34% | 30% | 39% | 25% | 25% | 28% | 28% |
| 928 | 0.25% | 0.25% | 0.25% | 0.00% | 1.00% | 26% | 34% | 26% | 34% | 29% | 38% | 27% | 35% | 31% | 40% | 27% | 27% | 29% | 29% |
| 929 | 0.00% | 1.00% | 0.25% | 0.00% | 1.00% | 27% | 35% | 28% | 36% | 31% | 40% | 29% | 38% | 33% | 43% | 29% | 29% | 31% | 31% |
| 930 | 1.00% | 1.00% | 0.25% | 0.00% | 1.00% | 31% | 40% | 30% | 39% | 36% | 47% | 32% | 42% | 36% | 47% | 32% | 32% | 35% | 35% |
| 931 | 1.00% | 9.00% | 0.25% | 0.00% | 1.00% | 39% | 51% | 38% | 49% | 42% | 55% | 39% | 51% | 43% | 56% | 40% | 40% | 41% | 41% |
| 932 | 0.25% | 0.00% | 1.00% | 0.00% | 1.00% | 27% | 35% | 28% | 36% | 30% | 39% | 24% | 31% | 32% | 42% | 28% | 28% | 29% | 29% |
| 933 | 1.00% | 0.00% | 1.00% | 0.00% | 1.00% | 29% | 38% | 29% | 38% | 33% | 43% | 26% | 34% | 34% | 44% | 30% | 30% | 31% | 31% |
| 934 | 0.00% | 0.25% | 1.00% | 0.00% | 1.00% | 29% | 38% | 32% | 42% | 32% | 42% | 28% | 36% | 35% | 46% | 31% | 31% | 32% | 32% |
| 935 | 1.00% | 0.25% | 1.00% | 0.00% | 1.00% | 33% | 43% | 34% | 44% | 37% | 48% | 31% | 40% | 38% | 49% | 35% | 35% | 35% | 35% |
| 936 | 0.00% | 1.00% | 1.00% | 0.00% | 1.00% | 32% | 42% | 35% | 46% | 36% | 47% | 31% | 40% | 38% | 49% | 34% | 34% | 35% | 35% |
| 937 | 0.25% | 1.00% | 1.00% | 0.00% | 1.00% | 34% | 44% | 36% | 47% | 38% | 49% | 32% | 42% | 39% | 51% | 36% | 36% | 36% | 36% |
| 938 | 1.00% | 1.00% | 1.00% | 0.00% | 1.00% | 36% | 47% | 37% | 48% | 41% | 53% | 34% | 44% | 41% | 53% | 38% | 38% | 39% | 39% |
| 939 | 9.00% | 1.00% | 1.00% | 0.00% | 1.00% | 32% | 42% | 35% | 46% | 36% | 47% | 31% | 40% | 38% | 49% | 34% | 34% | 35% | 35% |
| 940 | 1.00% | 9.00% | 1.00% | 0.00% | 1.00% | 44% | 57% | 45% | 59% | 47% | 61% | 41% | 53% | 48% | 62% | 45% | 45% | 45% | 45% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 941 | 0.25% | 0.00% | 9.00% | 0.00% | 1.00% | 37% | 48% | 36% | 47% | 44% | 57% | 31% | 40% | 46% | 60% | 39% | 39% | 40% | 40% |
| 942 | 0.00% | 0.25% | 9.00% | 0.00% | 1.00% | 39% | 51% | 40% | 52% | 46% | 60% | 35% | 46% | 49% | 64% | 42% | 42% | 43% | 43% |
| 943 | 0.25% | 0.25% | 9.00% | 0.00% | 1.00% | 41% | 53% | 41% | 53% | 48% | 62% | 36% | 47% | 50% | 65% | 43% | 43% | 45% | 45% |
| 944 | 1.00% | 0.25% | 9.00% | 0.00% | 1.00% | 43% | 56% | 42% | 55% | 51% | 66% | 38% | 49% | 52% | 68% | 45% | 45% | 47% | 47% |
| 945 | 0.25% | 1.00% | 9.00% | 0.00% | 1.00% | 44% | 57% | 44% | 57% | 52% | 68% | 39% | 51% | 53% | 69% | 47% | 47% | 48% | 48% |
| 946 | 0.25% | 0.00% | 0.00% | 0.25% | 1.00% | 24% | 31% | 22% | 29% | 23% | 30% | 25% | 33% | 26% | 34% | 23% | 23% | 25% | 25% |
| 947 | 1.00% | 0.00% | 0.00% | 0.25% | 1.00% | 26% | 34% | 23% | 30% | 26% | 34% | 27% | 35% | 28% | 36% | 25% | 25% | 27% | 27% |
| 948 | 0.00% | 0.25% | 0.00% | 0.25% | 1.00% | 26% | 34% | 26% | 34% | 25% | 33% | 29% | 38% | 29% | 38% | 26% | 26% | 28% | 28% |
| 949 | 0.25% | 0.25% | 0.00% | 0.25% | 1.00% | 28% | 36% | 27% | 35% | 27% | 35% | 30% | 39% | 30% | 39% | 27% | 27% | 29% | 29% |
| 950 | 9.00% | 0.25% | 0.00% | 0.25% | 1.00% | 26% | 34% | 26% | 34% | 25% | 33% | 29% | 38% | 29% | 38% | 26% | 26% | 28% | 28% |
| 951 | 1.00% | 1.00% | 0.00% | 0.25% | 1.00% | 33% | 43% | 31% | 40% | 34% | 44% | 35% | 46% | 35% | 46% | 33% | 33% | 35% | 35% |
| 952 | 1.00% | 9.00% | 0.00% | 0.25% | 1.00% | 41% | 53% | 39% | 51% | 40% | 52% | 42% | 55% | 42% | 55% | 40% | 40% | 41% | 41% |
| 953 | 0.00% | 0.00% | 0.25% | 0.25% | 1.00% | 27% | 35% | 25% | 33% | 28% | 36% | 31% | 40% | 32% | 42% | 27% | 27% | 30% | 30% |
| 954 | 0.25% | 0.00% | 0.25% | 0.25% | 1.00% | 29% | 38% | 26% | 34% | 30% | 39% | 32% | 42% | 33% | 43% | 28% | 28% | 32% | 32% |
| 955 | 0.00% | 0.25% | 0.25% | 0.25% | 1.00% | 31% | 40% | 30% | 39% | 32% | 42% | 36% | 47% | 36% | 47% | 31% | 31% | 35% | 35% |
| 956 | 0.25% | 0.25% | 0.25% | 0.25% | 1.00% | 33% | 43% | 31% | 40% | 34% | 44% | 37% | 48% | 37% | 48% | 33% | 33% | 36% | 36% |
| 957 | 1.00% | 0.25% | 0.25% | 0.25% | 1.00% | 35% | 46% | 32% | 42% | 37% | 48% | 39% | 51% | 39% | 51% | 35% | 35% | 38% | 38% |
| 958 | 9.00% | 0.25% | 0.25% | 0.25% | 1.00% | 31% | 40% | 30% | 39% | 32% | 42% | 36% | 47% | 36% | 47% | 31% | 31% | 35% | 35% |
| 959 | 0.25% | 1.00% | 0.25% | 0.25% | 1.00% | 36% | 47% | 34% | 44% | 38% | 49% | 40% | 52% | 40% | 52% | 36% | 36% | 39% | 39% |
| 960 | 9.00% | 1.00% | 0.25% | 0.25% | 1.00% | 34% | 44% | 33% | 43% | 36% | 47% | 39% | 51% | 39% | 51% | 34% | 34% | 38% | 38% |
| 961 | 0.25% | 9.00% | 0.25% | 0.25% | 1.00% | 44% | 57% | 42% | 55% | 44% | 57% | 47% | 61% | 47% | 61% | 43% | 43% | 46% | 46% |
| 962 | 1.00% | 9.00% | 0.25% | 0.25% | 1.00% | 46% | 60% | 43% | 56% | 47% | 61% | 49% | 64% | 49% | 64% | 45% | 45% | 48% | 48% |
| 963 | 9.00% | 9.00% | 0.25% | 0.25% | 1.00% | 42% | 55% | 41% | 53% | 42% | 55% | 46% | 60% | 46% | 60% | 42% | 42% | 45% | 45% |
| 964 | 0.00% | 0.00% | 1.00% | 0.25% | 1.00% | 32% | 42% | 32% | 42% | 33% | 43% | 33% | 43% | 37% | 48% | 32% | 32% | 34% | 34% |
| 965 | 1.00% | 0.00% | 1.00% | 0.25% | 1.00% | 36% | 47% | 34% | 44% | 38% | 49% | 36% | 47% | 40% | 52% | 36% | 36% | 38% | 38% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 966 | 0.00% | 0.25% | 1.00% | 0.25% | 1.00% | 36% | 47% | 37% | 48% | 37% | 48% | 38% | 49% | 41% | 53% | 37% | 37% | 39% | 39% |
| 967 | 0.25% | 0.25% | 1.00% | 0.25% | 1.00% | 38% | 49% | 38% | 49% | 39% | 51% | 39% | 51% | 42% | 55% | 38% | 38% | 40% | 40% |
| 968 | 1.00% | 0.25% | 1.00% | 0.25% | 1.00% | 40% | 52% | 39% | 51% | 42% | 55% | 41% | 53% | 44% | 57% | 40% | 40% | 42% | 42% |
| 969 | 9.00% | 0.25% | 1.00% | 0.25% | 1.00% | 36% | 47% | 37% | 48% | 37% | 48% | 38% | 49% | 41% | 53% | 37% | 37% | 39% | 39% |
| 970 | 0.00% | 1.00% | 1.00% | 0.25% | 1.00% | 39% | 51% | 40% | 52% | 41% | 53% | 41% | 53% | 44% | 57% | 40% | 40% | 42% | 42% |
| 971 | 0.25% | 1.00% | 1.00% | 0.25% | 1.00% | 41% | 53% | 41% | 53% | 43% | 56% | 42% | 55% | 45% | 59% | 42% | 42% | 43% | 43% |
| 972 | 1.00% | 1.00% | 1.00% | 0.25% | 1.00% | 43% | 56% | 42% | 55% | 46% | 60% | 44% | 57% | 47% | 61% | 44% | 44% | 46% | 46% |
| 973 | 9.00% | 1.00% | 1.00% | 0.25% | 1.00% | 39% | 51% | 40% | 52% | 41% | 53% | 41% | 53% | 44% | 57% | 40% | 40% | 42% | 42% |
| 974 | 0.00% | 9.00% | 1.00% | 0.25% | 1.00% | 47% | 61% | 48% | 62% | 47% | 61% | 48% | 62% | 51% | 66% | 47% | 47% | 49% | 49% |
| 975 | 0.25% | 9.00% | 1.00% | 0.25% | 1.00% | 49% | 64% | 49% | 64% | 49% | 64% | 49% | 64% | 52% | 68% | 49% | 49% | 50% | 50% |
| 976 | 1.00% | 9.00% | 1.00% | 0.25% | 1.00% | 51% | 66% | 50% | 65% | 52% | 68% | 51% | 66% | 54% | 70% | 51% | 51% | 52% | 52% |
| 977 | 0.25% | 0.25% | 9.00% | 0.25% | 1.00% | 48% | 62% | 46% | 60% | 53% | 69% | 46% | 60% | 56% | 73% | 49% | 49% | 52% | 52% |
| 978 | 1.00% | 0.25% | 9.00% | 0.25% | 1.00% | 50% | 65% | 47% | 61% | 56% | 73% | 48% | 62% | 58% | 75% | 51% | 51% | 54% | 54% |
| 979 | 9.00% | 0.25% | 9.00% | 0.25% | 1.00% | 46% | 60% | 45% | 59% | 51% | 66% | 45% | 59% | 55% | 72% | 47% | 47% | 50% | 50% |
| 980 | 0.00% | 1.00% | 9.00% | 0.25% | 1.00% | 49% | 64% | 48% | 62% | 55% | 72% | 48% | 62% | 58% | 75% | 51% | 51% | 54% | 54% |
| 981 | 0.25% | 1.00% | 9.00% | 0.25% | 1.00% | 51% | 66% | 49% | 64% | 57% | 74% | 49% | 64% | 59% | 77% | 52% | 52% | 55% | 55% |
| 982 | 9.00% | 1.00% | 9.00% | 0.25% | 1.00% | 49% | 64% | 48% | 62% | 55% | 72% | 48% | 62% | 58% | 75% | 51% | 51% | 54% | 54% |
| 983 | 1.00% | 9.00% | 9.00% | 0.25% | 1.00% | 61% | 79% | 58% | 75% | 66% | 86% | 58% | 75% | 68% | 88% | 62% | 62% | 64% | 64% |
| 984 | 0.25% | 0.00% | 0.00% | 1.00% | 1.00% | 32% | 42% | 29% | 38% | 30% | 39% | 32% | 42% | 35% | 46% | 30% | 30% | 32% | 32% |
| 985 | 1.00% | 0.25% | 0.00% | 1.00% | 1.00% | 38% | 49% | 35% | 46% | 37% | 48% | 39% | 51% | 41% | 53% | 37% | 37% | 39% | 39% |
| 986 | 0.00% | 1.00% | 0.00% | 1.00% | 1.00% | 37% | 48% | 36% | 47% | 36% | 47% | 39% | 51% | 41% | 53% | 36% | 36% | 39% | 39% |
| 987 | 0.25% | 1.00% | 0.00% | 1.00% | 1.00% | 39% | 51% | 37% | 48% | 38% | 49% | 40% | 52% | 42% | 55% | 38% | 38% | 40% | 40% |
| 988 | 1.00% | 1.00% | 0.00% | 1.00% | 1.00% | 41% | 53% | 38% | 49% | 41% | 53% | 42% | 55% | 44% | 57% | 40% | 40% | 42% | 42% |
| 989 | 0.00% | 0.00% | 0.25% | 1.00% | 1.00% | 35% | 46% | 32% | 42% | 35% | 46% | 38% | 49% | 41% | 53% | 34% | 34% | 38% | 38% |
| 990 | 1.00% | 0.00% | 0.25% | 1.00% | 1.00% | 39% | 51% | 34% | 44% | 40% | 52% | 41% | 53% | 44% | 57% | 38% | 38% | 42% | 42% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 991 | 0.25% | 0.25% | 0.25% | 1.00% | 1.00% | 41% | 53% | 38% | 49% | 41% | 53% | 44% | 57% | 46% | 60% | 40% | 40% | 44% | 44% |
| 992 | 1.00% | 0.25% | 0.25% | 1.00% | 1.00% | 43% | 56% | 39% | 51% | 44% | 57% | 46% | 60% | 48% | 62% | 42% | 42% | 46% | 46% |
| 993 | 9.00% | 0.25% | 0.25% | 1.00% | 1.00% | 39% | 51% | 37% | 48% | 39% | 51% | 43% | 56% | 45% | 59% | 38% | 38% | 42% | 42% |
| 994 | 0.00% | 1.00% | 0.25% | 1.00% | 1.00% | 42% | 55% | 40% | 52% | 43% | 56% | 46% | 60% | 48% | 62% | 42% | 42% | 46% | 46% |
| 995 | 0.25% | 1.00% | 0.25% | 1.00% | 1.00% | 44% | 57% | 41% | 53% | 45% | 59% | 47% | 61% | 49% | 64% | 43% | 43% | 47% | 47% |
| 996 | 1.00% | 1.00% | 0.25% | 1.00% | 1.00% | 46% | 60% | 42% | 55% | 48% | 62% | 49% | 64% | 51% | 66% | 45% | 45% | 49% | 49% |
| 997 | 9.00% | 1.00% | 0.25% | 1.00% | 1.00% | 42% | 55% | 40% | 52% | 43% | 56% | 46% | 60% | 48% | 62% | 42% | 42% | 46% | 46% |
| 998 | 0.25% | 9.00% | 0.25% | 1.00% | 1.00% | 52% | 68% | 49% | 64% | 51% | 66% | 54% | 70% | 56% | 73% | 51% | 51% | 54% | 54% |
| 999 | 1.00% | 9.00% | 0.25% | 1.00% | 1.00% | 54% | 70% | 50% | 65% | 54% | 70% | 56% | 73% | 58% | 75% | 53% | 53% | 56% | 56% |
| 1000 | 9.00% | 9.00% | 0.25% | 1.00% | 1.00% | 50% | 65% | 48% | 62% | 49% | 64% | 53% | 69% | 55% | 72% | 49% | 49% | 52% | 52% |
| 1001 | 0.00% | 0.00% | 1.00% | 1.00% | 1.00% | 40% | 52% | 39% | 51% | 40% | 52% | 40% | 52% | 46% | 60% | 40% | 40% | 42% | 42% |
| 1002 | 0.25% | 0.00% | 1.00% | 1.00% | 1.00% | 42% | 55% | 40% | 52% | 42% | 55% | 41% | 53% | 47% | 61% | 41% | 41% | 43% | 43% |
| 1003 | 1.00% | 0.00% | 1.00% | 1.00% | 1.00% | 44% | 57% | 41% | 53% | 45% | 59% | 43% | 56% | 49% | 64% | 43% | 43% | 46% | 46% |
| 1004 | 0.00% | 0.25% | 1.00% | 1.00% | 1.00% | 44% | 57% | 44% | 57% | 44% | 57% | 45% | 59% | 50% | 65% | 44% | 44% | 46% | 46% |
| 1005 | 1.00% | 0.25% | 1.00% | 1.00% | 1.00% | 48% | 62% | 46% | 60% | 49% | 64% | 48% | 62% | 53% | 69% | 48% | 48% | 50% | 50% |
| 1006 | 9.00% | 0.25% | 1.00% | 1.00% | 1.00% | 44% | 57% | 44% | 57% | 44% | 57% | 45% | 59% | 50% | 65% | 44% | 44% | 46% | 46% |
| 1007 | 0.00% | 1.00% | 1.00% | 1.00% | 1.00% | 47% | 61% | 47% | 61% | 48% | 62% | 48% | 62% | 53% | 69% | 47% | 47% | 50% | 50% |
| 1008 | 0.25% | 1.00% | 1.00% | 1.00% | 1.00% | 49% | 64% | 48% | 62% | 50% | 65% | 49% | 64% | 54% | 70% | 49% | 49% | 51% | 51% |
| 1009 | 1.00% | 1.00% | 1.00% | 1.00% | 1.00% | 51% | 66% | 49% | 64% | 53% | 69% | 51% | 66% | 56% | 73% | 51% | 51% | 53% | 53% |
| 1010 | 9.00% | 1.00% | 1.00% | 1.00% | 1.00% | 47% | 61% | 47% | 61% | 48% | 62% | 48% | 62% | 53% | 69% | 47% | 47% | 50% | 50% |
| 1011 | 0.00% | 9.00% | 1.00% | 1.00% | 1.00% | 55% | 72% | 55% | 72% | 54% | 70% | 55% | 72% | 60% | 78% | 55% | 55% | 56% | 56% |
| 1012 | 0.25% | 9.00% | 1.00% | 1.00% | 1.00% | 57% | 74% | 56% | 73% | 56% | 73% | 56% | 73% | 61% | 79% | 56% | 56% | 58% | 58% |
| 1013 | 1.00% | 9.00% | 1.00% | 1.00% | 1.00% | 59% | 77% | 57% | 74% | 59% | 77% | 58% | 75% | 63% | 82% | 58% | 58% | 60% | 60% |
| 1014 | 0.25% | 0.25% | 9.00% | 1.00% | 1.00% | 56% | 73% | 53% | 69% | 60% | 78% | 53% | 69% | 65% | 85% | 56% | 56% | 59% | 59% |
| 1015 | 1.00% | 0.25% | 9.00% | 1.00% | 1.00% | 58% | 75% | 54% | 70% | 63% | 82% | 55% | 72% | 67% | 87% | 58% | 58% | 62% | 62% |

Fig. 8

| Formula # | Delta Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1016 | 9.00% | 0.25% | 9.00% | 1.00% | 1.00% | 54% | 70% | 52% | 68% | 58% | 75% | 52% | 68% | 64% | 83% | 55% | 55% | 58% | 58% |
| 1017 | 0.25% | 1.00% | 9.00% | 1.00% | 1.00% | 59% | 77% | 56% | 73% | 64% | 83% | 56% | 73% | 68% | 88% | 60% | 60% | 63% | 63% |
| 1018 | 0.00% | 0.25% | 0.00% | 9.00% | 1.00% | 56% | 73% | 53% | 69% | 48% | 62% | 58% | 75% | 58% | 75% | 52% | 52% | 55% | 55% |
| 1019 | 0.00% | 0.00% | 0.25% | 9.00% | 1.00% | 57% | 74% | 52% | 68% | 51% | 66% | 60% | 78% | 61% | 79% | 53% | 53% | 57% | 57% |
| 1020 | 0.25% | 0.00% | 0.25% | 9.00% | 1.00% | 59% | 77% | 53% | 69% | 53% | 69% | 61% | 79% | 62% | 81% | 55% | 55% | 59% | 59% |
| 1021 | 0.00% | 0.25% | 0.25% | 9.00% | 1.00% | 61% | 79% | 57% | 74% | 55% | 72% | 65% | 85% | 65% | 85% | 58% | 58% | 62% | 62% |
| 1022 | 0.25% | 0.25% | 0.25% | 9.00% | 1.00% | 63% | 82% | 58% | 75% | 57% | 74% | 66% | 86% | 66% | 86% | 59% | 59% | 63% | 63% |
| 1023 | 1.00% | 0.25% | 0.25% | 9.00% | 1.00% | 65% | 85% | 59% | 77% | 60% | 78% | 68% | 88% | 68% | 88% | 61% | 61% | 65% | 65% |
| 1024 | 9.00% | 0.25% | 0.25% | 9.00% | 1.00% | 61% | 79% | 57% | 74% | 55% | 72% | 65% | 85% | 65% | 85% | 58% | 58% | 62% | 62% |
| 1025 | 0.00% | 1.00% | 0.25% | 9.00% | 1.00% | 64% | 83% | 60% | 78% | 59% | 77% | 68% | 88% | 68% | 88% | 61% | 61% | 65% | 65% |
| 1026 | 0.25% | 1.00% | 0.25% | 9.00% | 1.00% | 66% | 86% | 61% | 79% | 61% | 79% | 69% | 90% | 69% | 90% | 63% | 63% | 66% | 66% |
| 1027 | 1.00% | 1.00% | 0.25% | 9.00% | 1.00% | 68% | 88% | 62% | 81% | 64% | 83% | 71% | 92% | 71% | 92% | 65% | 65% | 69% | 69% |
| 1028 | 0.25% | 9.00% | 0.25% | 9.00% | 1.00% | 74% | 96% | 69% | 90% | 67% | 87% | 76% | 99% | 76% | 99% | 70% | 70% | 73% | 73% |
| 1029 | 0.25% | 0.00% | 1.00% | 9.00% | 1.00% | 64% | 83% | 60% | 78% | 58% | 75% | 63% | 82% | 67% | 87% | 61% | 61% | 63% | 63% |
| 1030 | 1.00% | 0.25% | 1.00% | 9.00% | 1.00% | 70% | 91% | 66% | 86% | 65% | 85% | 70% | 91% | 73% | 95% | 67% | 67% | 69% | 69% |
| 1031 | 9.00% | 0.25% | 1.00% | 9.00% | 1.00% | 66% | 86% | 64% | 83% | 60% | 78% | 67% | 87% | 70% | 91% | 63% | 63% | 66% | 66% |
| 1032 | 0.00% | 1.00% | 1.00% | 9.00% | 1.00% | 69% | 90% | 67% | 87% | 64% | 83% | 70% | 91% | 73% | 95% | 67% | 67% | 69% | 69% |
| 1033 | 0.25% | 1.00% | 1.00% | 9.00% | 1.00% | 71% | 92% | 68% | 88% | 66% | 86% | 71% | 92% | 74% | 96% | 68% | 68% | 70% | 70% |
| 1034 | 1.00% | 1.00% | 1.00% | 9.00% | 1.00% | 73% | 95% | 69% | 90% | 69% | 90% | 73% | 95% | 76% | 99% | 70% | 70% | 73% | 73% |
| 1035 | 0.25% | 0.25% | 9.00% | 9.00% | 1.00% | 78% | 100% | 73% | 95% | 76% | 99% | 75% | 98% | 85% | 100% | 76% | 76% | 79% | 79% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1036 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 1037 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 1038 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 1039 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 1040 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 1041 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 1042 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 1043 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 1044 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 1045 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 1046 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 1047 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 1048 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 1049 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 1050 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 1051 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 1052 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 1053 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 1054 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 1055 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 1056 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 1057 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 1058 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 1059 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 1060 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1061 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 1062 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 1063 | 0.00% | 0.25% | 0.00% | 0.25% | 0.00% | 12% | 16% | 13% | 17% | 13% | 17% | 12% | 16% | 11% | 14% | 13% | 13% | 12% | 12% |
| 1064 | 0.25% | 0.25% | 0.00% | 0.25% | 0.00% | 14% | 18% | 14% | 18% | 15% | 20% | 13% | 17% | 12% | 16% | 14% | 14% | 13% | 13% |
| 1065 | 9.00% | 0.25% | 0.00% | 0.25% | 0.00% | 12% | 16% | 13% | 17% | 13% | 17% | 12% | 16% | 11% | 14% | 13% | 13% | 12% | 12% |
| 1066 | 1.00% | 1.00% | 0.00% | 0.25% | 0.00% | 19% | 25% | 18% | 23% | 22% | 29% | 18% | 23% | 17% | 22% | 20% | 20% | 19% | 19% |
| 1067 | 1.00% | 9.00% | 0.00% | 0.25% | 0.00% | 27% | 35% | 26% | 34% | 28% | 36% | 25% | 33% | 24% | 31% | 27% | 27% | 26% | 26% |
| 1068 | 0.00% | 0.00% | 0.25% | 0.25% | 0.00% | 13% | 17% | 12% | 16% | 16% | 21% | 14% | 18% | 14% | 18% | 14% | 14% | 15% | 15% |
| 1069 | 0.25% | 0.00% | 0.25% | 0.25% | 0.00% | 15% | 20% | 13% | 17% | 18% | 23% | 15% | 20% | 15% | 20% | 15% | 15% | 16% | 16% |
| 1070 | 0.00% | 0.25% | 0.25% | 0.25% | 0.00% | 17% | 22% | 17% | 22% | 20% | 26% | 19% | 25% | 18% | 23% | 18% | 18% | 19% | 19% |
| 1071 | 0.25% | 0.25% | 0.25% | 0.25% | 0.00% | 19% | 25% | 18% | 23% | 22% | 29% | 20% | 26% | 19% | 25% | 20% | 20% | 20% | 20% |
| 1072 | 1.00% | 0.25% | 0.25% | 0.25% | 0.00% | 21% | 27% | 19% | 25% | 25% | 33% | 22% | 29% | 21% | 27% | 22% | 22% | 23% | 23% |
| 1073 | 9.00% | 0.25% | 0.25% | 0.25% | 0.00% | 17% | 22% | 17% | 22% | 20% | 26% | 19% | 25% | 18% | 23% | 18% | 18% | 19% | 19% |
| 1074 | 0.25% | 1.00% | 0.25% | 0.25% | 0.00% | 22% | 29% | 21% | 27% | 26% | 34% | 23% | 30% | 22% | 29% | 23% | 23% | 24% | 24% |
| 1075 | 9.00% | 1.00% | 0.25% | 0.25% | 0.00% | 20% | 26% | 20% | 26% | 24% | 31% | 22% | 29% | 21% | 27% | 21% | 21% | 22% | 22% |
| 1076 | 0.25% | 9.00% | 0.25% | 0.25% | 0.00% | 30% | 39% | 29% | 38% | 32% | 42% | 30% | 39% | 29% | 38% | 30% | 30% | 30% | 30% |
| 1077 | 1.00% | 9.00% | 0.25% | 0.25% | 0.00% | 32% | 42% | 30% | 39% | 35% | 46% | 32% | 42% | 31% | 40% | 32% | 32% | 33% | 33% |
| 1078 | 9.00% | 9.00% | 0.25% | 0.25% | 0.00% | 28% | 36% | 28% | 36% | 30% | 39% | 29% | 38% | 28% | 36% | 29% | 29% | 29% | 29% |
| 1079 | 0.00% | 0.00% | 1.00% | 0.25% | 0.00% | 18% | 23% | 19% | 25% | 21% | 27% | 16% | 21% | 19% | 25% | 19% | 19% | 19% | 19% |
| 1080 | 1.00% | 0.00% | 1.00% | 0.25% | 0.00% | 22% | 29% | 21% | 27% | 26% | 34% | 19% | 25% | 22% | 29% | 23% | 23% | 22% | 22% |
| 1081 | 0.00% | 0.25% | 1.00% | 0.25% | 0.00% | 22% | 29% | 24% | 31% | 25% | 33% | 21% | 27% | 23% | 30% | 24% | 24% | 23% | 23% |
| 1082 | 0.25% | 0.25% | 1.00% | 0.25% | 0.00% | 24% | 31% | 25% | 33% | 27% | 35% | 22% | 29% | 24% | 31% | 25% | 25% | 24% | 24% |
| 1083 | 1.00% | 0.25% | 1.00% | 0.25% | 0.00% | 26% | 34% | 26% | 34% | 30% | 39% | 24% | 31% | 26% | 34% | 27% | 27% | 27% | 27% |
| 1084 | 9.00% | 0.25% | 1.00% | 0.25% | 0.00% | 22% | 29% | 24% | 31% | 25% | 33% | 21% | 27% | 23% | 30% | 24% | 24% | 23% | 23% |
| 1085 | 0.00% | 1.00% | 1.00% | 0.25% | 0.00% | 25% | 33% | 27% | 35% | 29% | 38% | 24% | 31% | 26% | 34% | 27% | 27% | 26% | 26% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1086 | 0.25% | 1.00% | 1.00% | 0.25% | 0.00% | 27% | 35% | 28% | 36% | 31% | 40% | 25% | 33% | 27% | 35% | 29% | 29% | 28% | 28% |
| 1087 | 1.00% | 1.00% | 1.00% | 0.25% | 0.00% | 29% | 38% | 29% | 38% | 34% | 44% | 27% | 35% | 29% | 38% | 31% | 31% | 30% | 30% |
| 1088 | 9.00% | 1.00% | 1.00% | 0.25% | 0.00% | 25% | 33% | 27% | 35% | 29% | 38% | 24% | 31% | 26% | 34% | 27% | 27% | 26% | 26% |
| 1089 | 0.00% | 9.00% | 1.00% | 0.25% | 0.00% | 33% | 43% | 35% | 46% | 35% | 46% | 31% | 40% | 33% | 43% | 34% | 34% | 33% | 33% |
| 1090 | 0.25% | 9.00% | 1.00% | 0.25% | 0.00% | 35% | 46% | 36% | 47% | 37% | 48% | 32% | 42% | 34% | 44% | 36% | 36% | 34% | 34% |
| 1091 | 1.00% | 9.00% | 1.00% | 0.25% | 0.00% | 37% | 48% | 37% | 48% | 40% | 52% | 34% | 44% | 36% | 47% | 38% | 38% | 37% | 37% |
| 1092 | 0.25% | 0.25% | 9.00% | 0.25% | 0.00% | 34% | 44% | 33% | 43% | 41% | 53% | 29% | 38% | 38% | 49% | 36% | 36% | 36% | 36% |
| 1093 | 1.00% | 0.25% | 9.00% | 0.25% | 0.00% | 36% | 47% | 34% | 44% | 44% | 57% | 31% | 40% | 40% | 52% | 38% | 38% | 38% | 38% |
| 1094 | 9.00% | 0.25% | 9.00% | 0.25% | 0.00% | 32% | 42% | 32% | 42% | 39% | 51% | 28% | 36% | 37% | 48% | 34% | 34% | 35% | 35% |
| 1095 | 0.00% | 1.00% | 9.00% | 0.25% | 0.00% | 35% | 46% | 35% | 46% | 43% | 56% | 31% | 40% | 40% | 52% | 38% | 38% | 38% | 38% |
| 1096 | 0.25% | 1.00% | 9.00% | 0.25% | 0.00% | 37% | 48% | 36% | 47% | 45% | 59% | 32% | 42% | 41% | 53% | 39% | 39% | 39% | 39% |
| 1097 | 9.00% | 1.00% | 9.00% | 0.25% | 0.00% | 35% | 46% | 35% | 46% | 43% | 56% | 31% | 40% | 40% | 52% | 38% | 38% | 38% | 38% |
| 1098 | 1.00% | 9.00% | 9.00% | 0.25% | 0.00% | 47% | 61% | 45% | 59% | 54% | 70% | 41% | 53% | 50% | 65% | 49% | 49% | 48% | 48% |
| 1099 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 1100 | 1.00% | 0.25% | 0.00% | 1.00% | 0.00% | 33% | 43% | 28% | 36% | 31% | 40% | 30% | 39% | 27% | 35% | 31% | 31% | 29% | 29% |
| 1101 | 0.00% | 1.00% | 0.00% | 1.00% | 0.00% | 32% | 42% | 29% | 38% | 30% | 39% | 30% | 39% | 27% | 35% | 30% | 30% | 29% | 29% |
| 1102 | 0.25% | 1.00% | 0.00% | 1.00% | 0.00% | 34% | 44% | 30% | 39% | 32% | 42% | 31% | 40% | 28% | 36% | 32% | 32% | 30% | 30% |
| 1103 | 1.00% | 1.00% | 0.00% | 1.00% | 0.00% | 36% | 47% | 31% | 40% | 35% | 46% | 33% | 43% | 30% | 39% | 34% | 34% | 33% | 33% |
| 1104 | 0.00% | 0.00% | 0.25% | 1.00% | 0.00% | 30% | 39% | 25% | 33% | 29% | 38% | 29% | 38% | 27% | 35% | 28% | 28% | 28% | 28% |
| 1105 | 1.00% | 0.00% | 0.25% | 1.00% | 0.00% | 34% | 44% | 27% | 35% | 34% | 44% | 32% | 42% | 30% | 39% | 32% | 32% | 32% | 32% |
| 1106 | 0.25% | 0.25% | 0.25% | 1.00% | 0.00% | 36% | 47% | 31% | 40% | 35% | 46% | 35% | 46% | 32% | 42% | 34% | 34% | 34% | 34% |
| 1107 | 1.00% | 0.25% | 0.25% | 1.00% | 0.00% | 38% | 49% | 32% | 42% | 38% | 49% | 37% | 48% | 34% | 44% | 36% | 36% | 36% | 36% |
| 1108 | 9.00% | 0.25% | 0.25% | 1.00% | 0.00% | 34% | 44% | 30% | 39% | 33% | 43% | 34% | 44% | 31% | 40% | 32% | 32% | 33% | 33% |
| 1109 | 0.00% | 1.00% | 0.25% | 1.00% | 0.00% | 37% | 48% | 33% | 43% | 37% | 48% | 37% | 48% | 34% | 44% | 36% | 36% | 36% | 36% |
| 1110 | 0.25% | 1.00% | 0.25% | 1.00% | 0.00% | 39% | 51% | 34% | 44% | 39% | 51% | 38% | 49% | 35% | 46% | 37% | 37% | 37% | 37% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1111 | 1.00% | 1.00% | 0.25% | 1.00% | 0.00% | 41% | 53% | 35% | 46% | 42% | 55% | 40% | 52% | 37% | 48% | 39% | 39% | 40% | 40% |
| 1112 | 9.00% | 1.00% | 0.25% | 1.00% | 0.00% | 37% | 48% | 33% | 43% | 37% | 48% | 37% | 48% | 34% | 44% | 36% | 36% | 36% | 36% |
| 1113 | 0.25% | 9.00% | 0.25% | 1.00% | 0.00% | 47% | 61% | 42% | 55% | 45% | 59% | 45% | 59% | 42% | 55% | 45% | 45% | 44% | 44% |
| 1114 | 1.00% | 9.00% | 0.25% | 1.00% | 0.00% | 49% | 64% | 43% | 56% | 48% | 62% | 47% | 61% | 44% | 57% | 47% | 47% | 46% | 46% |
| 1115 | 9.00% | 9.00% | 0.25% | 1.00% | 0.00% | 45% | 59% | 41% | 53% | 43% | 56% | 44% | 57% | 41% | 53% | 43% | 43% | 43% | 43% |
| 1116 | 0.00% | 0.00% | 1.00% | 1.00% | 0.00% | 35% | 46% | 32% | 42% | 34% | 44% | 31% | 40% | 32% | 42% | 34% | 34% | 32% | 32% |
| 1117 | 0.25% | 0.00% | 1.00% | 1.00% | 0.00% | 37% | 48% | 33% | 43% | 36% | 47% | 32% | 42% | 33% | 43% | 35% | 35% | 34% | 34% |
| 1118 | 1.00% | 0.00% | 1.00% | 1.00% | 0.00% | 39% | 51% | 34% | 44% | 39% | 51% | 34% | 44% | 35% | 46% | 37% | 37% | 36% | 36% |
| 1119 | 0.00% | 0.25% | 1.00% | 1.00% | 0.00% | 39% | 51% | 37% | 48% | 38% | 49% | 36% | 47% | 36% | 47% | 38% | 38% | 37% | 37% |
| 1120 | 1.00% | 0.25% | 1.00% | 1.00% | 0.00% | 43% | 56% | 39% | 51% | 43% | 56% | 39% | 51% | 39% | 51% | 42% | 42% | 40% | 40% |
| 1121 | 9.00% | 0.25% | 1.00% | 1.00% | 0.00% | 39% | 51% | 37% | 48% | 38% | 49% | 36% | 47% | 36% | 47% | 38% | 38% | 37% | 37% |
| 1122 | 0.00% | 1.00% | 1.00% | 1.00% | 0.00% | 42% | 55% | 40% | 52% | 42% | 55% | 39% | 51% | 39% | 51% | 41% | 41% | 40% | 40% |
| 1123 | 0.25% | 1.00% | 1.00% | 1.00% | 0.00% | 44% | 57% | 41% | 53% | 44% | 57% | 40% | 52% | 40% | 52% | 43% | 43% | 41% | 41% |
| 1124 | 1.00% | 1.00% | 1.00% | 1.00% | 0.00% | 46% | 60% | 42% | 55% | 47% | 61% | 42% | 55% | 42% | 55% | 45% | 45% | 44% | 44% |
| 1125 | 9.00% | 1.00% | 1.00% | 1.00% | 0.00% | 42% | 55% | 40% | 52% | 42% | 55% | 39% | 51% | 39% | 51% | 41% | 41% | 40% | 40% |
| 1126 | 0.00% | 9.00% | 1.00% | 1.00% | 0.00% | 50% | 65% | 48% | 62% | 48% | 62% | 46% | 60% | 46% | 60% | 49% | 49% | 47% | 47% |
| 1127 | 0.25% | 9.00% | 1.00% | 1.00% | 0.00% | 52% | 68% | 49% | 64% | 50% | 65% | 47% | 61% | 47% | 61% | 50% | 50% | 48% | 48% |
| 1128 | 1.00% | 9.00% | 1.00% | 1.00% | 0.00% | 54% | 70% | 50% | 65% | 53% | 69% | 49% | 64% | 49% | 64% | 52% | 52% | 50% | 50% |
| 1129 | 0.25% | 0.25% | 9.00% | 1.00% | 0.00% | 51% | 66% | 46% | 60% | 54% | 70% | 44% | 57% | 51% | 66% | 50% | 50% | 50% | 50% |
| 1130 | 1.00% | 0.25% | 9.00% | 1.00% | 0.00% | 53% | 69% | 47% | 61% | 57% | 74% | 46% | 60% | 53% | 69% | 52% | 52% | 52% | 52% |
| 1131 | 9.00% | 0.25% | 9.00% | 1.00% | 0.00% | 49% | 64% | 45% | 59% | 52% | 68% | 43% | 56% | 50% | 65% | 49% | 49% | 48% | 48% |
| 1132 | 0.25% | 1.00% | 9.00% | 1.00% | 0.00% | 54% | 70% | 49% | 64% | 58% | 75% | 47% | 61% | 54% | 70% | 54% | 54% | 53% | 53% |
| 1133 | 0.00% | 0.25% | 0.00% | 9.00% | 0.00% | 46% | 60% | 40% | 52% | 38% | 49% | 43% | 56% | 38% | 49% | 41% | 41% | 40% | 40% |
| 1134 | 0.00% | 0.00% | 0.25% | 9.00% | 0.00% | 47% | 61% | 39% | 51% | 41% | 53% | 45% | 59% | 41% | 53% | 42% | 42% | 42% | 42% |
| 1135 | 0.25% | 0.00% | 0.25% | 9.00% | 0.00% | 49% | 64% | 40% | 52% | 43% | 56% | 46% | 60% | 42% | 55% | 44% | 44% | 44% | 44% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1136 | 0.00% | 0.25% | 0.25% | 9.00% | 0.00% | 51% | 66% | 44% | 57% | 45% | 59% | 50% | 65% | 45% | 59% | 47% | 47% | 47% | 47% |
| 1137 | 0.25% | 0.25% | 0.25% | 9.00% | 0.00% | 53% | 69% | 45% | 59% | 47% | 61% | 51% | 66% | 46% | 60% | 48% | 48% | 48% | 48% |
| 1138 | 1.00% | 0.25% | 0.25% | 9.00% | 0.00% | 55% | 72% | 46% | 60% | 50% | 65% | 53% | 69% | 48% | 62% | 50% | 50% | 50% | 50% |
| 1139 | 9.00% | 0.25% | 0.25% | 9.00% | 0.00% | 51% | 66% | 44% | 57% | 45% | 59% | 50% | 65% | 45% | 59% | 47% | 47% | 47% | 47% |
| 1140 | 0.00% | 1.00% | 0.25% | 9.00% | 0.00% | 54% | 70% | 47% | 61% | 49% | 64% | 53% | 69% | 48% | 62% | 50% | 50% | 50% | 50% |
| 1141 | 0.25% | 1.00% | 0.25% | 9.00% | 0.00% | 56% | 73% | 48% | 62% | 51% | 66% | 54% | 70% | 49% | 64% | 52% | 52% | 51% | 51% |
| 1142 | 1.00% | 1.00% | 0.25% | 9.00% | 0.00% | 58% | 75% | 49% | 64% | 54% | 70% | 56% | 73% | 51% | 66% | 54% | 54% | 54% | 54% |
| 1143 | 0.25% | 9.00% | 0.25% | 9.00% | 0.00% | 64% | 83% | 56% | 73% | 57% | 74% | 61% | 79% | 56% | 73% | 59% | 59% | 58% | 58% |
| 1144 | 0.25% | 0.00% | 1.00% | 9.00% | 0.00% | 54% | 70% | 47% | 61% | 48% | 62% | 48% | 62% | 47% | 61% | 50% | 50% | 48% | 48% |
| 1145 | 1.00% | 0.25% | 1.00% | 9.00% | 0.00% | 60% | 78% | 53% | 69% | 55% | 72% | 55% | 72% | 53% | 69% | 56% | 56% | 54% | 54% |
| 1146 | 9.00% | 0.25% | 1.00% | 9.00% | 0.00% | 56% | 73% | 51% | 66% | 50% | 65% | 52% | 68% | 50% | 65% | 52% | 52% | 51% | 51% |
| 1147 | 0.00% | 1.00% | 1.00% | 9.00% | 0.00% | 59% | 77% | 54% | 70% | 54% | 70% | 55% | 72% | 53% | 69% | 56% | 56% | 54% | 54% |
| 1148 | 0.25% | 1.00% | 1.00% | 9.00% | 0.00% | 61% | 79% | 55% | 72% | 56% | 73% | 56% | 73% | 54% | 70% | 57% | 57% | 55% | 55% |
| 1149 | 1.00% | 1.00% | 1.00% | 9.00% | 0.00% | 63% | 82% | 56% | 73% | 59% | 77% | 58% | 75% | 56% | 73% | 59% | 59% | 58% | 58% |
| 1150 | 0.25% | 0.25% | 9.00% | 9.00% | 0.00% | 68% | 88% | 60% | 78% | 66% | 86% | 60% | 78% | 65% | 85% | 65% | 65% | 64% | 64% |
| 1151 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 1152 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 1153 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 1154 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 1155 | 0.25% | 0.00% | 0.25% | 0.00% | 0.25% | 14% | 18% | 12% | 16% | 16% | 21% | 16% | 21% | 16% | 21% | 14% | 14% | 16% | 16% |
| 1156 | 1.00% | 0.00% | 0.25% | 0.00% | 0.25% | 16% | 21% | 13% | 17% | 19% | 25% | 18% | 23% | 18% | 23% | 16% | 16% | 18% | 18% |
| 1157 | 0.00% | 0.25% | 0.25% | 0.00% | 0.25% | 16% | 21% | 16% | 21% | 18% | 23% | 20% | 26% | 19% | 25% | 17% | 17% | 19% | 19% |
| 1158 | 0.25% | 0.25% | 0.25% | 0.00% | 0.25% | 18% | 23% | 17% | 22% | 20% | 26% | 21% | 27% | 20% | 26% | 18% | 18% | 20% | 20% |
| 1159 | 0.00% | 1.00% | 0.25% | 0.00% | 0.25% | 19% | 25% | 19% | 25% | 22% | 29% | 23% | 30% | 22% | 29% | 20% | 20% | 22% | 22% |
| 1160 | 1.00% | 1.00% | 0.25% | 0.00% | 0.25% | 23% | 30% | 21% | 27% | 27% | 35% | 26% | 34% | 25% | 33% | 24% | 24% | 26% | 26% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1161 | 1.00% | 9.00% | 0.25% | 0.00% | 0.25% | 31% | 40% | 29% | 38% | 33% | 43% | 33% | 43% | 32% | 42% | 31% | 31% | 33% | 33% |
| 1162 | 0.25% | 0.00% | 1.00% | 0.00% | 0.25% | 19% | 25% | 19% | 25% | 21% | 27% | 18% | 23% | 21% | 27% | 20% | 20% | 20% | 20% |
| 1163 | 1.00% | 0.00% | 1.00% | 0.00% | 0.25% | 21% | 27% | 20% | 26% | 24% | 31% | 20% | 26% | 23% | 30% | 22% | 22% | 22% | 22% |
| 1164 | 0.00% | 0.25% | 1.00% | 0.00% | 0.25% | 21% | 27% | 23% | 30% | 23% | 30% | 22% | 29% | 24% | 31% | 22% | 22% | 23% | 23% |
| 1165 | 1.00% | 0.25% | 1.00% | 0.00% | 0.25% | 25% | 33% | 25% | 33% | 28% | 36% | 25% | 33% | 27% | 35% | 26% | 26% | 27% | 27% |
| 1166 | 0.00% | 1.00% | 1.00% | 0.00% | 0.25% | 24% | 31% | 26% | 34% | 27% | 35% | 25% | 33% | 27% | 35% | 26% | 26% | 26% | 26% |
| 1167 | 0.25% | 1.00% | 1.00% | 0.00% | 0.25% | 26% | 34% | 27% | 35% | 29% | 38% | 26% | 34% | 28% | 36% | 27% | 27% | 28% | 28% |
| 1168 | 1.00% | 1.00% | 1.00% | 0.00% | 0.25% | 28% | 36% | 28% | 36% | 32% | 42% | 28% | 36% | 30% | 39% | 29% | 29% | 30% | 30% |
| 1169 | 9.00% | 1.00% | 1.00% | 0.00% | 0.25% | 24% | 31% | 26% | 34% | 27% | 35% | 25% | 33% | 27% | 35% | 26% | 26% | 26% | 26% |
| 1170 | 1.00% | 9.00% | 1.00% | 0.00% | 0.25% | 36% | 47% | 36% | 47% | 38% | 49% | 35% | 46% | 37% | 48% | 37% | 37% | 37% | 37% |
| 1171 | 0.25% | 0.00% | 9.00% | 0.00% | 0.25% | 29% | 38% | 27% | 35% | 35% | 46% | 25% | 33% | 35% | 46% | 30% | 30% | 32% | 32% |
| 1172 | 0.00% | 0.25% | 9.00% | 0.00% | 0.25% | 31% | 40% | 31% | 40% | 37% | 48% | 29% | 38% | 38% | 49% | 33% | 33% | 35% | 35% |
| 1173 | 0.25% | 0.25% | 9.00% | 0.00% | 0.25% | 33% | 43% | 32% | 42% | 39% | 51% | 30% | 39% | 39% | 51% | 35% | 35% | 36% | 36% |
| 1174 | 1.00% | 0.25% | 9.00% | 0.00% | 0.25% | 35% | 46% | 33% | 43% | 42% | 55% | 32% | 42% | 41% | 53% | 37% | 37% | 38% | 38% |
| 1175 | 0.25% | 1.00% | 9.00% | 0.00% | 0.25% | 36% | 47% | 35% | 46% | 43% | 56% | 33% | 43% | 42% | 55% | 38% | 38% | 39% | 39% |
| 1176 | 0.25% | 0.00% | 0.00% | 0.25% | 0.25% | 17% | 22% | 16% | 21% | 18% | 23% | 16% | 21% | 16% | 21% | 17% | 17% | 17% | 17% |
| 1177 | 1.00% | 0.00% | 0.00% | 0.25% | 0.25% | 19% | 25% | 17% | 22% | 21% | 27% | 18% | 23% | 18% | 23% | 19% | 19% | 19% | 19% |
| 1178 | 0.00% | 0.25% | 0.00% | 0.25% | 0.25% | 19% | 25% | 20% | 26% | 20% | 26% | 20% | 26% | 19% | 25% | 20% | 20% | 20% | 20% |
| 1179 | 0.25% | 0.25% | 0.00% | 0.25% | 0.25% | 21% | 27% | 21% | 27% | 22% | 29% | 21% | 27% | 20% | 26% | 21% | 21% | 21% | 21% |
| 1180 | 9.00% | 0.25% | 0.00% | 0.25% | 0.25% | 19% | 25% | 20% | 26% | 20% | 26% | 20% | 26% | 19% | 25% | 20% | 20% | 20% | 20% |
| 1181 | 1.00% | 1.00% | 0.00% | 0.25% | 0.25% | 26% | 34% | 25% | 33% | 29% | 38% | 26% | 34% | 25% | 33% | 27% | 27% | 27% | 27% |
| 1182 | 1.00% | 9.00% | 0.00% | 0.25% | 0.25% | 34% | 44% | 33% | 43% | 35% | 46% | 33% | 43% | 32% | 42% | 34% | 34% | 33% | 33% |
| 1183 | 0.00% | 0.00% | 0.25% | 0.25% | 0.25% | 20% | 26% | 19% | 25% | 23% | 30% | 22% | 29% | 22% | 29% | 21% | 21% | 22% | 22% |
| 1184 | 0.25% | 0.00% | 0.25% | 0.25% | 0.25% | 22% | 29% | 20% | 26% | 25% | 33% | 23% | 30% | 23% | 30% | 22% | 22% | 24% | 24% |
| 1185 | 0.00% | 0.25% | 0.25% | 0.25% | 0.25% | 24% | 31% | 24% | 31% | 27% | 35% | 27% | 35% | 26% | 34% | 25% | 25% | 27% | 27% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1186 | 0.25% | 0.25% | 0.25% | 0.25% | 0.25% | 26% | 34% | 25% | 33% | 29% | 38% | 28% | 36% | 27% | 35% | 27% | 27% | 28% | 28% |
| 1187 | 1.00% | 0.25% | 0.25% | 0.25% | 0.25% | 28% | 36% | 26% | 34% | 32% | 42% | 30% | 39% | 29% | 38% | 29% | 29% | 30% | 30% |
| 1188 | 9.00% | 0.25% | 0.25% | 0.25% | 0.25% | 24% | 31% | 24% | 31% | 27% | 35% | 27% | 35% | 26% | 34% | 25% | 25% | 27% | 27% |
| 1189 | 0.25% | 1.00% | 0.25% | 0.25% | 0.25% | 29% | 38% | 28% | 36% | 33% | 43% | 31% | 40% | 30% | 39% | 30% | 30% | 31% | 31% |
| 1190 | 9.00% | 1.00% | 0.25% | 0.25% | 0.25% | 27% | 35% | 27% | 35% | 31% | 40% | 30% | 39% | 29% | 38% | 28% | 28% | 30% | 30% |
| 1191 | 0.25% | 9.00% | 0.25% | 0.25% | 0.25% | 37% | 48% | 36% | 47% | 39% | 51% | 38% | 49% | 37% | 48% | 37% | 37% | 38% | 38% |
| 1192 | 1.00% | 9.00% | 0.25% | 0.25% | 0.25% | 39% | 51% | 37% | 48% | 42% | 55% | 40% | 52% | 39% | 51% | 39% | 39% | 40% | 40% |
| 1193 | 9.00% | 9.00% | 0.25% | 0.25% | 0.25% | 35% | 46% | 35% | 46% | 37% | 48% | 37% | 48% | 36% | 47% | 36% | 36% | 37% | 37% |
| 1194 | 0.00% | 0.00% | 1.00% | 0.25% | 0.25% | 25% | 33% | 26% | 34% | 28% | 36% | 24% | 31% | 27% | 35% | 26% | 26% | 26% | 26% |
| 1195 | 1.00% | 0.00% | 1.00% | 0.25% | 0.25% | 29% | 38% | 28% | 36% | 33% | 43% | 27% | 35% | 30% | 39% | 30% | 30% | 30% | 30% |
| 1196 | 0.00% | 0.25% | 1.00% | 0.25% | 0.25% | 29% | 38% | 31% | 40% | 32% | 42% | 29% | 38% | 31% | 40% | 31% | 31% | 31% | 31% |
| 1197 | 0.25% | 0.25% | 1.00% | 0.25% | 0.25% | 31% | 40% | 32% | 42% | 34% | 44% | 30% | 39% | 32% | 42% | 32% | 32% | 32% | 32% |
| 1198 | 1.00% | 0.25% | 1.00% | 0.25% | 0.25% | 33% | 43% | 33% | 43% | 37% | 48% | 32% | 42% | 34% | 44% | 34% | 34% | 34% | 34% |
| 1199 | 9.00% | 0.25% | 1.00% | 0.25% | 0.25% | 29% | 38% | 31% | 40% | 32% | 42% | 29% | 38% | 31% | 40% | 31% | 31% | 31% | 31% |
| 1200 | 0.00% | 1.00% | 1.00% | 0.25% | 0.25% | 32% | 42% | 34% | 44% | 36% | 47% | 32% | 42% | 34% | 44% | 34% | 34% | 34% | 34% |
| 1201 | 0.25% | 1.00% | 1.00% | 0.25% | 0.25% | 34% | 44% | 35% | 46% | 38% | 49% | 33% | 43% | 35% | 46% | 36% | 36% | 35% | 35% |
| 1202 | 1.00% | 1.00% | 1.00% | 0.25% | 0.25% | 36% | 47% | 36% | 47% | 41% | 53% | 35% | 46% | 37% | 48% | 38% | 38% | 38% | 38% |
| 1203 | 9.00% | 1.00% | 1.00% | 0.25% | 0.25% | 32% | 42% | 34% | 44% | 36% | 47% | 32% | 42% | 34% | 44% | 34% | 34% | 34% | 34% |
| 1204 | 0.00% | 9.00% | 1.00% | 0.25% | 0.25% | 40% | 52% | 42% | 55% | 42% | 55% | 39% | 51% | 41% | 53% | 41% | 41% | 41% | 41% |
| 1205 | 0.25% | 9.00% | 1.00% | 0.25% | 0.25% | 42% | 55% | 43% | 56% | 44% | 57% | 40% | 52% | 42% | 55% | 43% | 43% | 42% | 42% |
| 1206 | 1.00% | 9.00% | 1.00% | 0.25% | 0.25% | 44% | 57% | 44% | 57% | 47% | 61% | 42% | 55% | 44% | 57% | 45% | 45% | 44% | 44% |
| 1207 | 0.25% | 0.25% | 9.00% | 0.25% | 0.25% | 41% | 53% | 40% | 52% | 48% | 62% | 37% | 48% | 46% | 60% | 43% | 43% | 44% | 44% |
| 1208 | 1.00% | 0.25% | 9.00% | 0.25% | 0.25% | 43% | 56% | 41% | 53% | 51% | 66% | 39% | 51% | 48% | 62% | 45% | 45% | 46% | 46% |
| 1209 | 9.00% | 0.25% | 9.00% | 0.25% | 0.25% | 39% | 51% | 39% | 51% | 46% | 60% | 36% | 47% | 45% | 59% | 41% | 41% | 42% | 42% |
| 1210 | 0.00% | 1.00% | 9.00% | 0.25% | 0.25% | 42% | 55% | 42% | 55% | 50% | 65% | 39% | 51% | 48% | 62% | 45% | 45% | 46% | 46% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1211 | 0.25% | 1.00% | 9.00% | 0.25% | 0.25% | 44% | 57% | 43% | 56% | 52% | 68% | 40% | 52% | 49% | 64% | 46% | 46% | 47% | 47% |
| 1212 | 9.00% | 1.00% | 9.00% | 0.25% | 0.25% | 42% | 55% | 42% | 55% | 50% | 65% | 39% | 51% | 48% | 62% | 45% | 45% | 46% | 46% |
| 1213 | 1.00% | 9.00% | 9.00% | 0.25% | 0.25% | 54% | 70% | 52% | 68% | 61% | 79% | 49% | 64% | 58% | 75% | 56% | 56% | 56% | 56% |
| 1214 | 0.25% | 0.00% | 0.00% | 1.00% | 0.25% | 34% | 44% | 29% | 38% | 31% | 40% | 31% | 40% | 29% | 38% | 31% | 31% | 30% | 30% |
| 1215 | 1.00% | 0.25% | 0.00% | 1.00% | 0.25% | 40% | 52% | 35% | 46% | 38% | 49% | 38% | 49% | 35% | 46% | 38% | 38% | 37% | 37% |
| 1216 | 0.00% | 1.00% | 0.00% | 1.00% | 0.25% | 39% | 51% | 36% | 47% | 37% | 48% | 38% | 49% | 35% | 46% | 37% | 37% | 37% | 37% |
| 1217 | 0.25% | 1.00% | 0.00% | 1.00% | 0.25% | 41% | 53% | 37% | 48% | 39% | 51% | 39% | 51% | 36% | 47% | 39% | 39% | 38% | 38% |
| 1218 | 1.00% | 1.00% | 0.00% | 1.00% | 0.25% | 43% | 56% | 38% | 49% | 42% | 55% | 41% | 53% | 38% | 49% | 41% | 41% | 40% | 40% |
| 1219 | 0.00% | 0.00% | 0.25% | 1.00% | 0.25% | 37% | 48% | 32% | 42% | 36% | 47% | 37% | 48% | 35% | 46% | 35% | 35% | 36% | 36% |
| 1220 | 1.00% | 0.00% | 0.25% | 1.00% | 0.25% | 41% | 53% | 34% | 44% | 41% | 53% | 40% | 52% | 38% | 49% | 39% | 39% | 40% | 40% |
| 1221 | 0.25% | 0.25% | 0.25% | 1.00% | 0.25% | 43% | 56% | 38% | 49% | 42% | 55% | 43% | 56% | 40% | 52% | 41% | 41% | 42% | 42% |
| 1222 | 1.00% | 0.25% | 0.25% | 1.00% | 0.25% | 45% | 59% | 39% | 51% | 45% | 59% | 45% | 59% | 42% | 55% | 43% | 43% | 44% | 44% |
| 1223 | 9.00% | 0.25% | 0.25% | 1.00% | 0.25% | 41% | 53% | 37% | 48% | 40% | 52% | 42% | 55% | 39% | 51% | 39% | 39% | 40% | 40% |
| 1224 | 0.00% | 1.00% | 0.25% | 1.00% | 0.25% | 44% | 57% | 40% | 52% | 44% | 57% | 45% | 59% | 42% | 55% | 43% | 43% | 44% | 44% |
| 1225 | 0.25% | 1.00% | 0.25% | 1.00% | 0.25% | 46% | 60% | 41% | 53% | 46% | 60% | 46% | 60% | 43% | 56% | 44% | 44% | 45% | 45% |
| 1226 | 1.00% | 1.00% | 0.25% | 1.00% | 0.25% | 48% | 62% | 42% | 55% | 49% | 64% | 48% | 62% | 45% | 59% | 46% | 46% | 47% | 47% |
| 1227 | 9.00% | 1.00% | 0.25% | 1.00% | 0.25% | 44% | 57% | 40% | 52% | 44% | 57% | 45% | 59% | 42% | 55% | 43% | 43% | 44% | 44% |
| 1228 | 0.25% | 9.00% | 0.25% | 1.00% | 0.25% | 54% | 70% | 49% | 64% | 52% | 68% | 53% | 69% | 50% | 65% | 52% | 52% | 52% | 52% |
| 1229 | 1.00% | 9.00% | 0.25% | 1.00% | 0.25% | 56% | 73% | 50% | 65% | 55% | 72% | 55% | 72% | 52% | 68% | 54% | 54% | 54% | 54% |
| 1230 | 9.00% | 9.00% | 0.25% | 1.00% | 0.25% | 52% | 68% | 48% | 62% | 50% | 65% | 52% | 68% | 49% | 64% | 50% | 50% | 50% | 50% |
| 1231 | 0.00% | 0.00% | 1.00% | 1.00% | 0.25% | 42% | 55% | 39% | 51% | 41% | 53% | 39% | 51% | 40% | 52% | 41% | 41% | 40% | 40% |
| 1232 | 0.25% | 0.00% | 1.00% | 1.00% | 0.25% | 44% | 57% | 40% | 52% | 43% | 56% | 40% | 52% | 41% | 53% | 42% | 42% | 41% | 41% |
| 1233 | 1.00% | 0.00% | 1.00% | 1.00% | 0.25% | 46% | 60% | 41% | 53% | 46% | 60% | 42% | 55% | 43% | 56% | 44% | 44% | 44% | 44% |
| 1234 | 0.00% | 0.25% | 1.00% | 1.00% | 0.25% | 46% | 60% | 44% | 57% | 45% | 59% | 44% | 57% | 44% | 57% | 45% | 45% | 44% | 44% |
| 1235 | 1.00% | 0.25% | 1.00% | 1.00% | 0.25% | 50% | 65% | 46% | 60% | 50% | 65% | 47% | 61% | 47% | 61% | 49% | 49% | 48% | 48% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1236 | 9.00% | 0.25% | 1.00% | 1.00% | 0.25% | 46% | 60% | 44% | 57% | 45% | 59% | 44% | 57% | 44% | 57% | 45% | 45% | 44% | 44% |
| 1237 | 0.00% | 1.00% | 1.00% | 1.00% | 0.25% | 49% | 64% | 47% | 61% | 49% | 64% | 47% | 61% | 47% | 61% | 48% | 48% | 48% | 48% |
| 1238 | 0.25% | 1.00% | 1.00% | 1.00% | 0.25% | 51% | 66% | 48% | 62% | 51% | 66% | 48% | 62% | 48% | 62% | 50% | 50% | 49% | 49% |
| 1239 | 1.00% | 1.00% | 1.00% | 1.00% | 0.25% | 53% | 69% | 49% | 64% | 54% | 70% | 50% | 65% | 50% | 65% | 52% | 52% | 51% | 51% |
| 1240 | 9.00% | 1.00% | 1.00% | 1.00% | 0.25% | 49% | 64% | 47% | 61% | 49% | 64% | 47% | 61% | 47% | 61% | 48% | 48% | 48% | 48% |
| 1241 | 0.00% | 9.00% | 1.00% | 1.00% | 0.25% | 57% | 74% | 55% | 72% | 55% | 72% | 54% | 70% | 54% | 70% | 56% | 56% | 54% | 54% |
| 1242 | 0.25% | 9.00% | 1.00% | 1.00% | 0.25% | 59% | 77% | 56% | 73% | 57% | 74% | 55% | 72% | 55% | 72% | 57% | 57% | 56% | 56% |
| 1243 | 1.00% | 9.00% | 1.00% | 1.00% | 0.25% | 61% | 79% | 57% | 74% | 60% | 78% | 57% | 74% | 57% | 74% | 59% | 59% | 58% | 58% |
| 1244 | 0.25% | 0.25% | 9.00% | 1.00% | 0.25% | 58% | 75% | 53% | 69% | 61% | 79% | 52% | 68% | 59% | 77% | 57% | 57% | 57% | 57% |
| 1245 | 1.00% | 0.25% | 9.00% | 1.00% | 0.25% | 60% | 78% | 54% | 70% | 64% | 83% | 54% | 70% | 61% | 79% | 59% | 59% | 60% | 60% |
| 1246 | 9.00% | 0.25% | 9.00% | 1.00% | 0.25% | 56% | 73% | 52% | 68% | 59% | 77% | 51% | 66% | 58% | 75% | 56% | 56% | 56% | 56% |
| 1247 | 0.25% | 1.00% | 9.00% | 1.00% | 0.25% | 61% | 79% | 56% | 73% | 65% | 85% | 55% | 72% | 62% | 81% | 61% | 61% | 61% | 61% |
| 1248 | 0.00% | 0.25% | 0.00% | 9.00% | 0.25% | 53% | 69% | 47% | 61% | 45% | 59% | 51% | 66% | 46% | 60% | 48% | 48% | 47% | 47% |
| 1249 | 0.00% | 0.00% | 0.25% | 9.00% | 0.25% | 54% | 70% | 46% | 60% | 48% | 62% | 53% | 69% | 49% | 64% | 49% | 49% | 50% | 50% |
| 1250 | 0.25% | 0.00% | 0.25% | 9.00% | 0.25% | 56% | 73% | 47% | 61% | 50% | 65% | 54% | 70% | 50% | 65% | 51% | 51% | 51% | 51% |
| 1251 | 0.00% | 0.25% | 0.25% | 9.00% | 0.25% | 58% | 75% | 51% | 66% | 52% | 68% | 58% | 75% | 53% | 69% | 54% | 54% | 54% | 54% |
| 1252 | 0.25% | 0.25% | 0.25% | 9.00% | 0.25% | 60% | 78% | 52% | 68% | 54% | 70% | 59% | 77% | 54% | 70% | 55% | 55% | 56% | 56% |
| 1253 | 1.00% | 0.25% | 0.25% | 9.00% | 0.25% | 62% | 81% | 53% | 69% | 57% | 74% | 61% | 79% | 56% | 73% | 57% | 57% | 58% | 58% |
| 1254 | 9.00% | 0.25% | 0.25% | 9.00% | 0.25% | 58% | 75% | 51% | 66% | 52% | 68% | 58% | 75% | 53% | 69% | 54% | 54% | 54% | 54% |
| 1255 | 0.00% | 1.00% | 0.25% | 9.00% | 0.25% | 61% | 79% | 54% | 70% | 56% | 73% | 61% | 79% | 56% | 73% | 57% | 57% | 58% | 58% |
| 1256 | 0.25% | 1.00% | 0.25% | 9.00% | 0.25% | 63% | 82% | 55% | 72% | 58% | 75% | 62% | 81% | 57% | 74% | 59% | 59% | 59% | 59% |
| 1257 | 1.00% | 1.00% | 0.25% | 9.00% | 0.25% | 65% | 85% | 56% | 73% | 61% | 79% | 64% | 83% | 59% | 77% | 61% | 61% | 61% | 61% |
| 1258 | 0.25% | 9.00% | 0.25% | 9.00% | 0.25% | 71% | 92% | 63% | 82% | 64% | 83% | 69% | 90% | 64% | 83% | 66% | 66% | 66% | 66% |
| 1259 | 0.25% | 0.00% | 1.00% | 9.00% | 0.25% | 61% | 79% | 54% | 70% | 55% | 72% | 56% | 73% | 55% | 72% | 57% | 57% | 55% | 55% |
| 1260 | 1.00% | 0.25% | 1.00% | 9.00% | 0.25% | 67% | 87% | 60% | 78% | 62% | 81% | 63% | 82% | 61% | 79% | 63% | 63% | 62% | 62% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1261 | 9.00% | 0.25% | 1.00% | 9.00% | 0.25% | 63% | 82% | 58% | 75% | 57% | 74% | 60% | 78% | 58% | 75% | 59% | 59% | 58% | 58% |
| 1262 | 0.00% | 1.00% | 1.00% | 9.00% | 0.25% | 66% | 86% | 61% | 79% | 61% | 79% | 63% | 82% | 61% | 79% | 63% | 63% | 62% | 62% |
| 1263 | 0.25% | 1.00% | 1.00% | 9.00% | 0.25% | 68% | 88% | 62% | 81% | 63% | 82% | 64% | 83% | 62% | 81% | 64% | 64% | 63% | 63% |
| 1264 | 1.00% | 1.00% | 1.00% | 9.00% | 0.25% | 70% | 91% | 63% | 82% | 66% | 86% | 66% | 86% | 64% | 83% | 66% | 66% | 65% | 65% |
| 1265 | 0.25% | 0.25% | 9.00% | 9.00% | 0.25% | 75% | 98% | 67% | 87% | 73% | 95% | 68% | 88% | 73% | 95% | 72% | 72% | 71% | 71% |
| 1266 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 1267 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 1268 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 1269 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 1270 | 0.25% | 0.00% | 0.25% | 0.00% | 1.00% | 22% | 29% | 21% | 27% | 25% | 33% | 22% | 29% | 27% | 35% | 23% | 23% | 25% | 25% |
| 1271 | 1.00% | 0.00% | 0.25% | 0.00% | 1.00% | 24% | 31% | 22% | 29% | 28% | 36% | 24% | 31% | 29% | 38% | 25% | 25% | 27% | 27% |
| 1272 | 0.00% | 0.25% | 0.25% | 0.00% | 1.00% | 24% | 31% | 25% | 33% | 27% | 35% | 26% | 34% | 30% | 39% | 25% | 25% | 28% | 28% |
| 1273 | 0.25% | 0.25% | 0.25% | 0.00% | 1.00% | 26% | 34% | 26% | 34% | 29% | 38% | 27% | 35% | 31% | 40% | 27% | 27% | 29% | 29% |
| 1274 | 0.00% | 1.00% | 0.25% | 0.00% | 1.00% | 27% | 35% | 28% | 36% | 31% | 40% | 29% | 38% | 33% | 43% | 29% | 29% | 31% | 31% |
| 1275 | 1.00% | 1.00% | 0.25% | 0.00% | 1.00% | 31% | 40% | 30% | 39% | 36% | 47% | 32% | 42% | 36% | 47% | 32% | 32% | 35% | 35% |
| 1276 | 1.00% | 9.00% | 0.25% | 0.00% | 1.00% | 39% | 51% | 38% | 49% | 42% | 55% | 39% | 51% | 43% | 56% | 40% | 40% | 41% | 41% |
| 1277 | 0.25% | 0.00% | 1.00% | 0.00% | 1.00% | 27% | 35% | 28% | 36% | 30% | 39% | 24% | 31% | 32% | 42% | 28% | 28% | 29% | 29% |
| 1278 | 1.00% | 0.00% | 1.00% | 0.00% | 1.00% | 29% | 38% | 29% | 38% | 33% | 43% | 26% | 34% | 34% | 44% | 30% | 30% | 31% | 31% |
| 1279 | 0.00% | 0.25% | 1.00% | 0.00% | 1.00% | 29% | 38% | 32% | 42% | 32% | 42% | 28% | 36% | 35% | 46% | 31% | 31% | 32% | 32% |
| 1280 | 1.00% | 0.25% | 1.00% | 0.00% | 1.00% | 33% | 43% | 34% | 44% | 37% | 48% | 31% | 40% | 38% | 49% | 35% | 35% | 35% | 35% |
| 1281 | 0.00% | 1.00% | 1.00% | 0.00% | 1.00% | 32% | 42% | 35% | 46% | 36% | 47% | 31% | 40% | 38% | 49% | 34% | 34% | 35% | 35% |
| 1282 | 0.25% | 1.00% | 1.00% | 0.00% | 1.00% | 34% | 44% | 36% | 47% | 38% | 49% | 32% | 42% | 39% | 51% | 36% | 36% | 36% | 36% |
| 1283 | 1.00% | 1.00% | 1.00% | 0.00% | 1.00% | 36% | 47% | 37% | 48% | 41% | 53% | 34% | 44% | 41% | 53% | 38% | 38% | 39% | 39% |
| 1284 | 9.00% | 1.00% | 1.00% | 0.00% | 1.00% | 32% | 42% | 35% | 46% | 36% | 47% | 31% | 40% | 38% | 49% | 34% | 34% | 35% | 35% |
| 1285 | 1.00% | 9.00% | 1.00% | 0.00% | 1.00% | 44% | 57% | 45% | 59% | 47% | 61% | 41% | 53% | 48% | 62% | 45% | 45% | 45% | 45% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1286 | 0.25% | 0.00% | 9.00% | 0.00% | 1.00% | 37% | 48% | 36% | 47% | 44% | 57% | 31% | 40% | 46% | 60% | 39% | 39% | 40% | 40% |
| 1287 | 0.00% | 0.25% | 9.00% | 0.00% | 1.00% | 39% | 51% | 40% | 52% | 46% | 60% | 35% | 46% | 49% | 64% | 42% | 42% | 43% | 43% |
| 1288 | 0.25% | 0.25% | 9.00% | 0.00% | 1.00% | 41% | 53% | 41% | 53% | 48% | 62% | 36% | 47% | 50% | 65% | 43% | 43% | 45% | 45% |
| 1289 | 1.00% | 0.25% | 9.00% | 0.00% | 1.00% | 43% | 56% | 42% | 55% | 51% | 66% | 38% | 49% | 52% | 68% | 45% | 45% | 47% | 47% |
| 1290 | 0.25% | 1.00% | 9.00% | 0.00% | 1.00% | 44% | 57% | 44% | 57% | 52% | 68% | 39% | 51% | 53% | 69% | 47% | 47% | 48% | 48% |
| 1291 | 0.25% | 0.00% | 0.00% | 0.25% | 1.00% | 25% | 33% | 25% | 33% | 27% | 35% | 22% | 29% | 27% | 35% | 26% | 26% | 25% | 25% |
| 1292 | 1.00% | 0.00% | 0.00% | 0.25% | 1.00% | 27% | 35% | 26% | 34% | 30% | 39% | 24% | 31% | 29% | 38% | 28% | 28% | 28% | 28% |
| 1293 | 0.00% | 0.25% | 0.00% | 0.25% | 1.00% | 27% | 35% | 29% | 38% | 29% | 38% | 26% | 34% | 30% | 39% | 28% | 28% | 28% | 28% |
| 1294 | 0.25% | 0.25% | 0.00% | 0.25% | 1.00% | 29% | 38% | 30% | 39% | 31% | 40% | 27% | 35% | 31% | 40% | 30% | 30% | 30% | 30% |
| 1295 | 9.00% | 0.25% | 0.00% | 0.25% | 1.00% | 27% | 35% | 29% | 38% | 29% | 38% | 26% | 34% | 30% | 39% | 28% | 28% | 28% | 28% |
| 1296 | 1.00% | 1.00% | 0.00% | 0.25% | 1.00% | 34% | 44% | 34% | 44% | 38% | 49% | 32% | 42% | 36% | 47% | 35% | 35% | 35% | 35% |
| 1297 | 1.00% | 9.00% | 0.00% | 0.25% | 1.00% | 42% | 55% | 42% | 55% | 44% | 57% | 39% | 51% | 43% | 56% | 43% | 43% | 42% | 42% |
| 1298 | 0.00% | 0.00% | 0.25% | 0.25% | 1.00% | 28% | 36% | 28% | 36% | 32% | 42% | 28% | 36% | 33% | 43% | 29% | 29% | 31% | 31% |
| 1299 | 0.25% | 0.00% | 0.25% | 0.25% | 1.00% | 30% | 39% | 29% | 38% | 34% | 44% | 29% | 38% | 34% | 44% | 31% | 31% | 32% | 32% |
| 1300 | 0.00% | 0.25% | 0.25% | 0.25% | 1.00% | 32% | 42% | 33% | 43% | 36% | 47% | 33% | 43% | 37% | 48% | 34% | 34% | 35% | 35% |
| 1301 | 0.25% | 0.25% | 0.25% | 0.25% | 1.00% | 34% | 44% | 34% | 44% | 38% | 49% | 34% | 44% | 38% | 49% | 35% | 35% | 37% | 37% |
| 1302 | 1.00% | 0.25% | 0.25% | 0.25% | 1.00% | 36% | 47% | 35% | 46% | 41% | 53% | 36% | 47% | 40% | 52% | 37% | 37% | 39% | 39% |
| 1303 | 9.00% | 0.25% | 0.25% | 0.25% | 1.00% | 32% | 42% | 33% | 43% | 36% | 47% | 33% | 43% | 37% | 48% | 34% | 34% | 35% | 35% |
| 1304 | 0.25% | 1.00% | 0.25% | 0.25% | 1.00% | 37% | 48% | 37% | 48% | 42% | 55% | 37% | 48% | 41% | 53% | 39% | 39% | 40% | 40% |
| 1305 | 9.00% | 1.00% | 0.25% | 0.25% | 1.00% | 35% | 46% | 36% | 47% | 40% | 52% | 36% | 47% | 40% | 52% | 37% | 37% | 39% | 39% |
| 1306 | 0.25% | 9.00% | 0.25% | 0.25% | 1.00% | 45% | 59% | 45% | 59% | 48% | 62% | 44% | 57% | 48% | 62% | 46% | 46% | 47% | 47% |
| 1307 | 1.00% | 9.00% | 0.25% | 0.25% | 1.00% | 47% | 61% | 46% | 60% | 51% | 66% | 46% | 60% | 50% | 65% | 48% | 48% | 49% | 49% |
| 1308 | 9.00% | 9.00% | 0.25% | 0.25% | 1.00% | 43% | 56% | 44% | 57% | 46% | 60% | 43% | 56% | 47% | 61% | 44% | 44% | 45% | 45% |
| 1309 | 0.00% | 0.00% | 1.00% | 0.25% | 1.00% | 33% | 43% | 35% | 46% | 37% | 48% | 30% | 39% | 38% | 49% | 35% | 35% | 35% | 35% |
| 1310 | 1.00% | 0.00% | 1.00% | 0.25% | 1.00% | 37% | 48% | 37% | 48% | 42% | 55% | 33% | 43% | 41% | 53% | 39% | 39% | 39% | 39% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1311 | 0.00% | 0.25% | 1.00% | 0.25% | 1.00% | 37% | 48% | 40% | 52% | 41% | 53% | 35% | 46% | 42% | 55% | 39% | 39% | 39% | 39% |
| 1312 | 0.25% | 0.25% | 1.00% | 0.25% | 1.00% | 39% | 51% | 41% | 53% | 43% | 56% | 36% | 47% | 43% | 56% | 41% | 41% | 41% | 41% |
| 1313 | 1.00% | 0.25% | 1.00% | 0.25% | 1.00% | 41% | 53% | 42% | 55% | 46% | 60% | 38% | 49% | 45% | 59% | 43% | 43% | 43% | 43% |
| 1314 | 9.00% | 0.25% | 1.00% | 0.25% | 1.00% | 37% | 48% | 40% | 52% | 41% | 53% | 35% | 46% | 42% | 55% | 39% | 39% | 39% | 39% |
| 1315 | 0.00% | 1.00% | 1.00% | 0.25% | 1.00% | 40% | 52% | 43% | 56% | 45% | 59% | 38% | 49% | 45% | 59% | 43% | 43% | 43% | 43% |
| 1316 | 0.25% | 1.00% | 1.00% | 0.25% | 1.00% | 42% | 55% | 44% | 57% | 47% | 61% | 39% | 51% | 46% | 60% | 44% | 44% | 44% | 44% |
| 1317 | 1.00% | 1.00% | 1.00% | 0.25% | 1.00% | 44% | 57% | 45% | 59% | 50% | 65% | 41% | 53% | 48% | 62% | 46% | 46% | 46% | 46% |
| 1318 | 9.00% | 1.00% | 1.00% | 0.25% | 1.00% | 40% | 52% | 43% | 56% | 45% | 59% | 38% | 49% | 45% | 59% | 43% | 43% | 43% | 43% |
| 1319 | 0.00% | 9.00% | 1.00% | 0.25% | 1.00% | 48% | 62% | 51% | 66% | 51% | 66% | 45% | 59% | 52% | 68% | 50% | 50% | 49% | 49% |
| 1320 | 0.25% | 9.00% | 1.00% | 0.25% | 1.00% | 50% | 65% | 52% | 68% | 53% | 69% | 46% | 60% | 53% | 69% | 52% | 52% | 51% | 51% |
| 1321 | 1.00% | 9.00% | 1.00% | 0.25% | 1.00% | 52% | 68% | 53% | 69% | 56% | 73% | 48% | 62% | 55% | 72% | 54% | 54% | 53% | 53% |
| 1322 | 0.25% | 0.25% | 9.00% | 0.25% | 1.00% | 49% | 64% | 49% | 64% | 57% | 74% | 43% | 56% | 57% | 74% | 52% | 52% | 52% | 52% |
| 1323 | 1.00% | 0.25% | 9.00% | 0.25% | 1.00% | 51% | 66% | 50% | 65% | 60% | 78% | 45% | 59% | 59% | 77% | 54% | 54% | 55% | 55% |
| 1324 | 9.00% | 0.25% | 9.00% | 0.25% | 1.00% | 47% | 61% | 48% | 62% | 55% | 72% | 42% | 55% | 56% | 73% | 50% | 50% | 51% | 51% |
| 1325 | 0.00% | 1.00% | 9.00% | 0.25% | 1.00% | 50% | 65% | 51% | 66% | 59% | 77% | 45% | 59% | 59% | 77% | 53% | 53% | 54% | 54% |
| 1326 | 0.25% | 1.00% | 9.00% | 0.25% | 1.00% | 52% | 68% | 52% | 68% | 61% | 79% | 46% | 60% | 60% | 78% | 55% | 55% | 56% | 56% |
| 1327 | 9.00% | 1.00% | 9.00% | 0.25% | 1.00% | 50% | 65% | 51% | 66% | 59% | 77% | 45% | 59% | 59% | 77% | 53% | 53% | 54% | 54% |
| 1328 | 1.00% | 9.00% | 9.00% | 0.25% | 1.00% | 62% | 81% | 61% | 79% | 70% | 91% | 55% | 72% | 69% | 90% | 64% | 64% | 65% | 65% |
| 1329 | 0.25% | 0.00% | 0.00% | 1.00% | 1.00% | 42% | 55% | 38% | 49% | 40% | 52% | 37% | 48% | 40% | 52% | 40% | 40% | 39% | 39% |
| 1330 | 1.00% | 0.25% | 0.00% | 1.00% | 1.00% | 48% | 62% | 44% | 57% | 47% | 61% | 44% | 57% | 46% | 60% | 46% | 46% | 46% | 46% |
| 1331 | 0.00% | 1.00% | 0.00% | 1.00% | 1.00% | 47% | 61% | 45% | 59% | 46% | 60% | 44% | 57% | 46% | 60% | 46% | 46% | 45% | 45% |
| 1332 | 0.25% | 1.00% | 0.00% | 1.00% | 1.00% | 49% | 64% | 46% | 60% | 48% | 62% | 45% | 59% | 47% | 61% | 48% | 48% | 47% | 47% |
| 1333 | 1.00% | 1.00% | 0.00% | 1.00% | 1.00% | 51% | 66% | 47% | 61% | 51% | 66% | 47% | 61% | 49% | 64% | 50% | 50% | 49% | 49% |
| 1334 | 0.00% | 0.00% | 0.25% | 1.00% | 1.00% | 45% | 59% | 41% | 53% | 45% | 59% | 43% | 56% | 46% | 60% | 44% | 44% | 45% | 45% |
| 1335 | 1.00% | 0.00% | 0.25% | 1.00% | 1.00% | 49% | 64% | 43% | 56% | 50% | 65% | 46% | 60% | 49% | 64% | 47% | 47% | 48% | 48% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1336 | 0.25% | 0.25% | 0.25% | 1.00% | 1.00% | 51% | 66% | 47% | 61% | 51% | 66% | 49% | 64% | 51% | 66% | 50% | 50% | 50% | 50% |
| 1337 | 1.00% | 0.25% | 0.25% | 1.00% | 1.00% | 53% | 69% | 48% | 62% | 54% | 70% | 51% | 66% | 53% | 69% | 52% | 52% | 53% | 53% |
| 1338 | 9.00% | 0.25% | 0.25% | 1.00% | 1.00% | 49% | 64% | 46% | 60% | 49% | 64% | 48% | 62% | 50% | 65% | 48% | 48% | 49% | 49% |
| 1339 | 0.00% | 1.00% | 0.25% | 1.00% | 1.00% | 52% | 68% | 49% | 64% | 53% | 69% | 51% | 66% | 53% | 69% | 51% | 51% | 52% | 52% |
| 1340 | 0.25% | 1.00% | 0.25% | 1.00% | 1.00% | 54% | 70% | 50% | 65% | 55% | 72% | 52% | 68% | 54% | 70% | 53% | 53% | 54% | 54% |
| 1341 | 1.00% | 1.00% | 0.25% | 1.00% | 1.00% | 56% | 73% | 51% | 66% | 58% | 75% | 54% | 70% | 56% | 73% | 55% | 55% | 56% | 56% |
| 1342 | 9.00% | 1.00% | 0.25% | 1.00% | 1.00% | 52% | 68% | 49% | 64% | 53% | 69% | 51% | 66% | 53% | 69% | 51% | 51% | 52% | 52% |
| 1343 | 0.25% | 9.00% | 0.25% | 1.00% | 1.00% | 62% | 81% | 58% | 75% | 61% | 79% | 59% | 77% | 61% | 79% | 60% | 60% | 60% | 60% |
| 1344 | 1.00% | 9.00% | 0.25% | 1.00% | 1.00% | 64% | 83% | 59% | 77% | 64% | 83% | 61% | 79% | 63% | 82% | 62% | 62% | 63% | 63% |
| 1345 | 9.00% | 9.00% | 0.25% | 1.00% | 1.00% | 60% | 78% | 57% | 74% | 59% | 77% | 58% | 75% | 60% | 78% | 59% | 59% | 59% | 59% |
| 1346 | 0.00% | 0.00% | 1.00% | 1.00% | 1.00% | 50% | 65% | 48% | 62% | 50% | 65% | 45% | 59% | 51% | 66% | 49% | 49% | 49% | 49% |
| 1347 | 0.25% | 0.00% | 1.00% | 1.00% | 1.00% | 52% | 68% | 49% | 64% | 52% | 68% | 46% | 60% | 52% | 68% | 51% | 51% | 50% | 50% |
| 1348 | 1.00% | 0.00% | 1.00% | 1.00% | 1.00% | 54% | 70% | 50% | 65% | 55% | 72% | 48% | 62% | 54% | 70% | 53% | 53% | 52% | 52% |
| 1349 | 0.00% | 0.25% | 1.00% | 1.00% | 1.00% | 54% | 70% | 53% | 69% | 54% | 70% | 50% | 65% | 55% | 72% | 54% | 54% | 53% | 53% |
| 1350 | 1.00% | 0.25% | 1.00% | 1.00% | 1.00% | 58% | 75% | 55% | 72% | 59% | 77% | 53% | 69% | 58% | 75% | 57% | 57% | 57% | 57% |
| 1351 | 9.00% | 0.25% | 1.00% | 1.00% | 1.00% | 54% | 70% | 53% | 69% | 54% | 70% | 50% | 65% | 55% | 72% | 54% | 54% | 53% | 53% |
| 1352 | 0.00% | 1.00% | 1.00% | 1.00% | 1.00% | 57% | 74% | 56% | 73% | 58% | 75% | 53% | 69% | 58% | 75% | 57% | 57% | 56% | 56% |
| 1353 | 0.25% | 1.00% | 1.00% | 1.00% | 1.00% | 59% | 77% | 57% | 74% | 60% | 78% | 54% | 70% | 59% | 77% | 59% | 59% | 58% | 58% |
| 1354 | 1.00% | 1.00% | 1.00% | 1.00% | 1.00% | 61% | 79% | 58% | 75% | 63% | 82% | 56% | 73% | 61% | 79% | 61% | 61% | 60% | 60% |
| 1355 | 9.00% | 1.00% | 1.00% | 1.00% | 1.00% | 57% | 74% | 56% | 73% | 58% | 75% | 53% | 69% | 58% | 75% | 57% | 57% | 56% | 56% |
| 1356 | 0.00% | 9.00% | 1.00% | 1.00% | 1.00% | 65% | 85% | 64% | 83% | 64% | 83% | 60% | 78% | 65% | 85% | 64% | 64% | 63% | 63% |
| 1357 | 0.25% | 9.00% | 1.00% | 1.00% | 1.00% | 67% | 87% | 65% | 85% | 66% | 86% | 61% | 79% | 66% | 86% | 66% | 66% | 64% | 64% |
| 1358 | 1.00% | 9.00% | 1.00% | 1.00% | 1.00% | 69% | 90% | 66% | 86% | 69% | 90% | 63% | 82% | 68% | 88% | 68% | 68% | 67% | 67% |
| 1359 | 0.25% | 0.25% | 9.00% | 1.00% | 1.00% | 66% | 86% | 62% | 81% | 70% | 91% | 58% | 75% | 70% | 91% | 66% | 66% | 66% | 66% |
| 1360 | 1.00% | 0.25% | 9.00% | 1.00% | 1.00% | 68% | 88% | 63% | 82% | 73% | 95% | 60% | 78% | 72% | 94% | 68% | 68% | 68% | 68% |

Fig. 9

| Formula # | Delta Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1361 | 9.00% | 0.25% | 9.00% | 1.00% | 1.00% | 64% | 83% | 61% | 79% | 68% | 88% | 57% | 74% | 69% | 90% | 64% | 64% | 65% | 65% |
| 1362 | 0.25% | 1.00% | 9.00% | 1.00% | 1.00% | 69% | 90% | 65% | 85% | 74% | 96% | 61% | 79% | 73% | 95% | 69% | 69% | 69% | 69% |
| 1363 | 0.00% | 0.25% | 0.00% | 9.00% | 1.00% | 61% | 79% | 56% | 73% | 54% | 70% | 57% | 74% | 57% | 74% | 57% | 57% | 56% | 56% |
| 1364 | 0.00% | 0.00% | 0.25% | 9.00% | 1.00% | 62% | 81% | 55% | 72% | 57% | 74% | 59% | 77% | 60% | 78% | 58% | 58% | 59% | 59% |
| 1365 | 0.25% | 0.00% | 0.25% | 9.00% | 1.00% | 64% | 83% | 56% | 73% | 59% | 77% | 60% | 78% | 61% | 79% | 60% | 60% | 60% | 60% |
| 1366 | 0.00% | 0.25% | 0.25% | 9.00% | 1.00% | 66% | 86% | 60% | 78% | 61% | 79% | 64% | 83% | 64% | 83% | 62% | 62% | 63% | 63% |
| 1367 | 0.25% | 0.25% | 0.25% | 9.00% | 1.00% | 68% | 88% | 61% | 79% | 63% | 82% | 65% | 85% | 65% | 85% | 64% | 64% | 64% | 64% |
| 1368 | 1.00% | 0.25% | 0.25% | 9.00% | 1.00% | 70% | 91% | 62% | 81% | 66% | 86% | 67% | 87% | 67% | 87% | 66% | 66% | 67% | 67% |
| 1369 | 9.00% | 0.25% | 0.25% | 9.00% | 1.00% | 66% | 86% | 60% | 78% | 61% | 79% | 64% | 83% | 64% | 83% | 62% | 62% | 63% | 63% |
| 1370 | 0.00% | 1.00% | 0.25% | 9.00% | 1.00% | 69% | 90% | 63% | 82% | 65% | 85% | 67% | 87% | 67% | 87% | 66% | 66% | 66% | 66% |
| 1371 | 0.25% | 1.00% | 0.25% | 9.00% | 1.00% | 71% | 92% | 64% | 83% | 67% | 87% | 68% | 88% | 68% | 88% | 67% | 67% | 68% | 68% |
| 1372 | 1.00% | 1.00% | 0.25% | 9.00% | 1.00% | 73% | 95% | 65% | 85% | 70% | 91% | 70% | 91% | 70% | 91% | 69% | 69% | 70% | 70% |
| 1373 | 0.25% | 9.00% | 0.25% | 9.00% | 1.00% | 79% | 100 % | 72% | 94% | 73% | 95% | 75% | 98% | 75% | 98% | 75% | 75% | 74% | 74% |
| 1374 | 0.25% | 0.00% | 1.00% | 9.00% | 1.00% | 69% | 90% | 63% | 82% | 64% | 83% | 62% | 81% | 66% | 86% | 65% | 65% | 64% | 64% |
| 1375 | 1.00% | 0.25% | 1.00% | 9.00% | 1.00% | 75% | 98% | 69% | 90% | 71% | 92% | 69% | 90% | 72% | 94% | 72% | 72% | 71% | 71% |
| 1376 | 9.00% | 0.25% | 1.00% | 9.00% | 1.00% | 71% | 92% | 67% | 87% | 66% | 86% | 66% | 86% | 69% | 90% | 68% | 68% | 67% | 67% |
| 1377 | 0.00% | 1.00% | 1.00% | 9.00% | 1.00% | 74% | 96% | 70% | 91% | 70% | 91% | 69% | 90% | 72% | 94% | 71% | 71% | 70% | 70% |
| 1378 | 0.25% | 1.00% | 1.00% | 9.00% | 1.00% | 76% | 99% | 71% | 92% | 72% | 94% | 70% | 91% | 73% | 95% | 73% | 73% | 72% | 72% |
| 1379 | 1.00% | 1.00% | 1.00% | 9.00% | 1.00% | 78% | 100 % | 72% | 94% | 75% | 98% | 72% | 94% | 75% | 98% | 75% | 75% | 74% | 74% |
| 1380 | 0.25% | 0.25% | 9.00% | 9.00% | 1.00% | 83% | 100 % | 76% | 99% | 82% | 100 % | 74% | 96% | 84% | 100 % | 80% | 80% | 80% | 80% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1381 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 1382 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 1383 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 1384 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 1385 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 1386 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 1387 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 1388 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 1389 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 1390 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 1391 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 1392 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 1393 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 1394 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 1395 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 1396 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 1397 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 1398 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 1399 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 1400 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 1401 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 1402 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 1403 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 1404 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 1405 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1406 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 1407 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 1408 | 0.00% | 0.25% | 0.00% | 0.25% | 0.00% | 9% | 12% | 14% | 18% | 10% | 13% | 15% | 20% | 11% | 14% | 11% | 11% | 12% | 12% |
| 1409 | 0.25% | 0.25% | 0.00% | 0.25% | 0.00% | 11% | 14% | 15% | 20% | 12% | 16% | 16% | 21% | 12% | 16% | 13% | 13% | 13% | 13% |
| 1410 | 9.00% | 0.25% | 0.00% | 0.25% | 0.00% | 9% | 12% | 14% | 18% | 10% | 13% | 15% | 20% | 11% | 14% | 11% | 11% | 12% | 12% |
| 1411 | 1.00% | 1.00% | 0.00% | 0.25% | 0.00% | 16% | 21% | 19% | 25% | 19% | 25% | 21% | 27% | 17% | 22% | 18% | 18% | 19% | 19% |
| 1412 | 1.00% | 9.00% | 0.00% | 0.25% | 0.00% | 24% | 31% | 27% | 35% | 25% | 33% | 28% | 36% | 24% | 31% | 25% | 25% | 26% | 26% |
| 1413 | 0.00% | 0.00% | 0.25% | 0.25% | 0.00% | 9% | 12% | 15% | 20% | 10% | 13% | 13% | 17% | 12% | 16% | 11% | 11% | 12% | 12% |
| 1414 | 0.25% | 0.00% | 0.25% | 0.25% | 0.00% | 11% | 14% | 16% | 21% | 12% | 16% | 14% | 18% | 13% | 17% | 13% | 13% | 13% | 13% |
| 1415 | 0.00% | 0.25% | 0.25% | 0.25% | 0.00% | 13% | 17% | 20% | 26% | 14% | 18% | 18% | 23% | 16% | 21% | 16% | 16% | 16% | 16% |
| 1416 | 0.25% | 0.25% | 0.25% | 0.25% | 0.00% | 15% | 20% | 21% | 27% | 16% | 21% | 19% | 25% | 17% | 22% | 17% | 17% | 17% | 17% |
| 1417 | 1.00% | 0.25% | 0.25% | 0.25% | 0.00% | 17% | 22% | 22% | 29% | 19% | 25% | 21% | 27% | 19% | 25% | 19% | 19% | 20% | 20% |
| 1418 | 9.00% | 0.25% | 0.25% | 0.25% | 0.00% | 13% | 17% | 20% | 26% | 14% | 18% | 18% | 23% | 16% | 21% | 16% | 16% | 16% | 16% |
| 1419 | 0.25% | 1.00% | 0.25% | 0.25% | 0.00% | 18% | 23% | 24% | 31% | 20% | 26% | 22% | 29% | 20% | 26% | 21% | 21% | 21% | 21% |
| 1420 | 9.00% | 1.00% | 0.25% | 0.25% | 0.00% | 16% | 21% | 23% | 30% | 18% | 23% | 21% | 27% | 19% | 25% | 19% | 19% | 19% | 19% |
| 1421 | 0.25% | 9.00% | 0.25% | 0.25% | 0.00% | 26% | 34% | 32% | 42% | 26% | 34% | 29% | 38% | 27% | 35% | 28% | 28% | 27% | 27% |
| 1422 | 1.00% | 9.00% | 0.25% | 0.25% | 0.00% | 28% | 36% | 33% | 43% | 29% | 38% | 31% | 40% | 29% | 38% | 30% | 30% | 30% | 30% |
| 1423 | 9.00% | 9.00% | 0.25% | 0.25% | 0.00% | 24% | 31% | 31% | 40% | 24% | 31% | 28% | 36% | 26% | 34% | 26% | 26% | 26% | 26% |
| 1424 | 0.00% | 0.00% | 1.00% | 0.25% | 0.00% | 14% | 18% | 18% | 23% | 16% | 21% | 19% | 25% | 16% | 21% | 16% | 16% | 17% | 17% |
| 1425 | 1.00% | 0.00% | 1.00% | 0.25% | 0.00% | 18% | 23% | 20% | 26% | 21% | 27% | 22% | 29% | 19% | 25% | 20% | 20% | 21% | 21% |
| 1426 | 0.00% | 0.25% | 1.00% | 0.25% | 0.00% | 18% | 23% | 23% | 30% | 20% | 26% | 24% | 31% | 20% | 26% | 20% | 20% | 21% | 21% |
| 1427 | 0.25% | 0.25% | 1.00% | 0.25% | 0.00% | 20% | 26% | 24% | 31% | 22% | 29% | 25% | 33% | 21% | 27% | 22% | 22% | 23% | 23% |
| 1428 | 1.00% | 0.25% | 1.00% | 0.25% | 0.00% | 22% | 29% | 25% | 33% | 25% | 33% | 27% | 35% | 23% | 30% | 24% | 24% | 25% | 25% |
| 1429 | 9.00% | 0.25% | 1.00% | 0.25% | 0.00% | 18% | 23% | 23% | 30% | 20% | 26% | 24% | 31% | 20% | 26% | 20% | 20% | 21% | 21% |
| 1430 | 0.00% | 1.00% | 1.00% | 0.25% | 0.00% | 21% | 27% | 26% | 34% | 24% | 31% | 27% | 35% | 23% | 30% | 24% | 24% | 25% | 25% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1431 | 0.25% | 1.00% | 1.00% | 0.25% | 0.00% | 23% | 30% | 27% | 35% | 26% | 34% | 28% | 36% | 24% | 31% | 25% | 25% | 26% | 26% |
| 1432 | 1.00% | 1.00% | 1.00% | 0.25% | 0.00% | 25% | 33% | 28% | 36% | 29% | 38% | 30% | 39% | 26% | 34% | 27% | 27% | 28% | 28% |
| 1433 | 9.00% | 1.00% | 1.00% | 0.25% | 0.00% | 21% | 27% | 26% | 34% | 24% | 31% | 27% | 35% | 23% | 30% | 24% | 24% | 25% | 25% |
| 1434 | 0.00% | 9.00% | 1.00% | 0.25% | 0.00% | 29% | 38% | 34% | 44% | 30% | 39% | 34% | 44% | 30% | 39% | 31% | 31% | 31% | 31% |
| 1435 | 0.25% | 9.00% | 1.00% | 0.25% | 0.00% | 31% | 40% | 35% | 46% | 32% | 42% | 35% | 46% | 31% | 40% | 33% | 33% | 33% | 33% |
| 1436 | 1.00% | 9.00% | 1.00% | 0.25% | 0.00% | 33% | 43% | 36% | 47% | 35% | 46% | 37% | 48% | 33% | 43% | 35% | 35% | 35% | 35% |
| 1437 | 0.25% | 0.25% | 9.00% | 0.25% | 0.00% | 30% | 39% | 29% | 38% | 27% | 35% | 36% | 47% | 31% | 40% | 29% | 29% | 31% | 31% |
| 1438 | 1.00% | 0.25% | 9.00% | 0.25% | 0.00% | 32% | 42% | 30% | 39% | 30% | 39% | 38% | 49% | 33% | 43% | 31% | 31% | 34% | 34% |
| 1439 | 9.00% | 0.25% | 9.00% | 0.25% | 0.00% | 28% | 36% | 28% | 36% | 25% | 33% | 35% | 46% | 30% | 39% | 27% | 27% | 30% | 30% |
| 1440 | 0.00% | 1.00% | 9.00% | 0.25% | 0.00% | 31% | 40% | 31% | 40% | 29% | 38% | 38% | 49% | 33% | 43% | 30% | 30% | 33% | 33% |
| 1441 | 0.25% | 1.00% | 9.00% | 0.25% | 0.00% | 33% | 43% | 32% | 42% | 31% | 40% | 39% | 51% | 34% | 44% | 32% | 32% | 35% | 35% |
| 1442 | 9.00% | 1.00% | 9.00% | 0.25% | 0.00% | 31% | 40% | 31% | 40% | 29% | 38% | 38% | 49% | 33% | 43% | 30% | 30% | 33% | 33% |
| 1443 | 1.00% | 9.00% | 9.00% | 0.25% | 0.00% | 43% | 56% | 41% | 53% | 40% | 52% | 48% | 62% | 43% | 56% | 41% | 41% | 44% | 44% |
| 1444 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 1445 | 1.00% | 0.25% | 0.00% | 1.00% | 0.00% | 28% | 36% | 28% | 36% | 27% | 35% | 28% | 36% | 29% | 38% | 28% | 28% | 28% | 28% |
| 1446 | 0.00% | 1.00% | 0.00% | 1.00% | 0.00% | 27% | 35% | 29% | 38% | 26% | 34% | 28% | 36% | 29% | 38% | 27% | 27% | 28% | 28% |
| 1447 | 0.25% | 1.00% | 0.00% | 1.00% | 0.00% | 29% | 38% | 30% | 39% | 28% | 36% | 29% | 38% | 30% | 39% | 29% | 29% | 29% | 29% |
| 1448 | 1.00% | 1.00% | 0.00% | 1.00% | 0.00% | 31% | 40% | 31% | 40% | 31% | 40% | 31% | 40% | 32% | 42% | 31% | 31% | 31% | 31% |
| 1449 | 0.00% | 0.00% | 0.25% | 1.00% | 0.00% | 24% | 31% | 27% | 35% | 22% | 29% | 23% | 30% | 27% | 35% | 24% | 24% | 24% | 24% |
| 1450 | 1.00% | 0.00% | 0.25% | 1.00% | 0.00% | 28% | 36% | 29% | 38% | 27% | 35% | 26% | 34% | 30% | 39% | 28% | 28% | 28% | 28% |
| 1451 | 0.25% | 0.25% | 0.25% | 1.00% | 0.00% | 30% | 39% | 33% | 43% | 28% | 36% | 29% | 38% | 32% | 42% | 30% | 30% | 30% | 30% |
| 1452 | 1.00% | 0.25% | 0.25% | 1.00% | 0.00% | 32% | 42% | 34% | 44% | 31% | 40% | 31% | 40% | 34% | 44% | 32% | 32% | 32% | 32% |
| 1453 | 9.00% | 0.25% | 0.25% | 1.00% | 0.00% | 28% | 36% | 32% | 42% | 26% | 34% | 28% | 36% | 31% | 40% | 29% | 29% | 28% | 28% |
| 1454 | 0.00% | 1.00% | 0.25% | 1.00% | 0.00% | 31% | 40% | 35% | 46% | 30% | 39% | 31% | 40% | 34% | 44% | 32% | 32% | 32% | 32% |
| 1455 | 0.25% | 1.00% | 0.25% | 1.00% | 0.00% | 33% | 43% | 36% | 47% | 32% | 42% | 32% | 42% | 35% | 46% | 34% | 34% | 33% | 33% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1456 | 1.00% | 1.00% | 0.25% | 1.00% | 0.00% | 35% | 46% | 37% | 48% | 35% | 46% | 34% | 44% | 37% | 48% | 36% | 36% | 35% | 35% |
| 1457 | 9.00% | 1.00% | 0.25% | 1.00% | 0.00% | 31% | 40% | 35% | 46% | 30% | 39% | 31% | 40% | 34% | 44% | 32% | 32% | 32% | 32% |
| 1458 | 0.25% | 9.00% | 0.25% | 1.00% | 0.00% | 41% | 53% | 44% | 57% | 38% | 49% | 39% | 51% | 42% | 55% | 41% | 41% | 40% | 40% |
| 1459 | 1.00% | 9.00% | 0.25% | 1.00% | 0.00% | 43% | 56% | 45% | 59% | 41% | 53% | 41% | 53% | 44% | 57% | 43% | 43% | 42% | 42% |
| 1460 | 9.00% | 9.00% | 0.25% | 1.00% | 0.00% | 39% | 51% | 43% | 56% | 36% | 47% | 38% | 49% | 41% | 53% | 39% | 39% | 38% | 38% |
| 1461 | 0.00% | 0.00% | 1.00% | 1.00% | 0.00% | 29% | 38% | 30% | 39% | 28% | 36% | 29% | 38% | 31% | 40% | 29% | 29% | 29% | 29% |
| 1462 | 0.25% | 0.00% | 1.00% | 1.00% | 0.00% | 31% | 40% | 31% | 40% | 30% | 39% | 30% | 39% | 32% | 42% | 31% | 31% | 31% | 31% |
| 1463 | 1.00% | 0.00% | 1.00% | 1.00% | 0.00% | 33% | 43% | 32% | 42% | 33% | 43% | 32% | 42% | 34% | 44% | 33% | 33% | 33% | 33% |
| 1464 | 0.00% | 0.25% | 1.00% | 1.00% | 0.00% | 33% | 43% | 35% | 46% | 32% | 42% | 34% | 44% | 35% | 46% | 33% | 33% | 34% | 34% |
| 1465 | 1.00% | 0.25% | 1.00% | 1.00% | 0.00% | 37% | 48% | 37% | 48% | 37% | 48% | 37% | 48% | 38% | 49% | 37% | 37% | 37% | 37% |
| 1466 | 9.00% | 0.25% | 1.00% | 1.00% | 0.00% | 33% | 43% | 35% | 46% | 32% | 42% | 34% | 44% | 35% | 46% | 33% | 33% | 34% | 34% |
| 1467 | 0.00% | 1.00% | 1.00% | 1.00% | 0.00% | 36% | 47% | 38% | 49% | 36% | 47% | 37% | 48% | 38% | 49% | 37% | 37% | 37% | 37% |
| 1468 | 0.25% | 1.00% | 1.00% | 1.00% | 0.00% | 38% | 49% | 39% | 51% | 38% | 49% | 38% | 49% | 39% | 51% | 38% | 38% | 38% | 38% |
| 1469 | 1.00% | 1.00% | 1.00% | 1.00% | 0.00% | 40% | 52% | 40% | 52% | 41% | 53% | 40% | 52% | 41% | 53% | 40% | 40% | 41% | 41% |
| 1470 | 9.00% | 1.00% | 1.00% | 1.00% | 0.00% | 36% | 47% | 38% | 49% | 36% | 47% | 37% | 48% | 38% | 49% | 37% | 37% | 37% | 37% |
| 1471 | 0.00% | 9.00% | 1.00% | 1.00% | 0.00% | 44% | 57% | 46% | 60% | 42% | 55% | 44% | 57% | 45% | 59% | 44% | 44% | 44% | 44% |
| 1472 | 0.25% | 9.00% | 1.00% | 1.00% | 0.00% | 46% | 60% | 47% | 61% | 44% | 57% | 45% | 59% | 46% | 60% | 46% | 46% | 45% | 45% |
| 1473 | 1.00% | 9.00% | 1.00% | 1.00% | 0.00% | 48% | 62% | 48% | 62% | 47% | 61% | 47% | 61% | 48% | 62% | 48% | 48% | 47% | 47% |
| 1474 | 0.25% | 0.25% | 9.00% | 1.00% | 0.00% | 45% | 59% | 41% | 53% | 39% | 51% | 46% | 60% | 46% | 60% | 42% | 42% | 44% | 44% |
| 1475 | 1.00% | 0.25% | 9.00% | 1.00% | 0.00% | 47% | 61% | 42% | 55% | 42% | 55% | 48% | 62% | 48% | 62% | 44% | 44% | 46% | 46% |
| 1476 | 9.00% | 0.25% | 9.00% | 1.00% | 0.00% | 43% | 56% | 40% | 52% | 37% | 48% | 45% | 59% | 45% | 59% | 40% | 40% | 42% | 42% |
| 1477 | 0.25% | 1.00% | 9.00% | 1.00% | 0.00% | 48% | 62% | 44% | 57% | 43% | 56% | 49% | 64% | 49% | 64% | 45% | 45% | 47% | 47% |
| 1478 | 0.00% | 0.25% | 0.00% | 9.00% | 0.00% | 44% | 57% | 40% | 52% | 40% | 52% | 45% | 59% | 39% | 51% | 41% | 41% | 41% | 41% |
| 1479 | 0.00% | 0.00% | 0.25% | 9.00% | 0.00% | 44% | 57% | 41% | 53% | 40% | 52% | 43% | 56% | 40% | 52% | 42% | 42% | 41% | 41% |
| 1480 | 0.25% | 0.00% | 0.25% | 9.00% | 0.00% | 46% | 60% | 42% | 55% | 42% | 55% | 44% | 57% | 41% | 53% | 43% | 43% | 42% | 42% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1481 | 0.00% | 0.25% | 0.25% | 9.00% | 0.00% | 48% | 62% | 46% | 60% | 44% | 57% | 48% | 62% | 44% | 57% | 46% | 46% | 45% | 45% |
| 1482 | 0.25% | 0.25% | 0.25% | 9.00% | 0.00% | 50% | 65% | 47% | 61% | 46% | 60% | 49% | 64% | 45% | 59% | 48% | 48% | 47% | 47% |
| 1483 | 1.00% | 0.25% | 0.25% | 9.00% | 0.00% | 52% | 68% | 48% | 62% | 49% | 64% | 51% | 66% | 47% | 61% | 50% | 50% | 49% | 49% |
| 1484 | 9.00% | 0.25% | 0.25% | 9.00% | 0.00% | 48% | 62% | 46% | 60% | 44% | 57% | 48% | 62% | 44% | 57% | 46% | 46% | 45% | 45% |
| 1485 | 0.00% | 1.00% | 0.25% | 9.00% | 0.00% | 51% | 66% | 49% | 64% | 48% | 62% | 51% | 66% | 47% | 61% | 49% | 49% | 49% | 49% |
| 1486 | 0.25% | 1.00% | 0.25% | 9.00% | 0.00% | 53% | 69% | 50% | 65% | 50% | 65% | 52% | 68% | 48% | 62% | 51% | 51% | 50% | 50% |
| 1487 | 1.00% | 1.00% | 0.25% | 9.00% | 0.00% | 55% | 72% | 51% | 66% | 53% | 69% | 54% | 70% | 50% | 65% | 53% | 53% | 52% | 52% |
| 1488 | 0.25% | 9.00% | 0.25% | 9.00% | 0.00% | 61% | 79% | 58% | 75% | 56% | 73% | 59% | 77% | 55% | 72% | 58% | 58% | 57% | 57% |
| 1489 | 0.25% | 0.00% | 1.00% | 9.00% | 0.00% | 51% | 66% | 45% | 59% | 48% | 62% | 50% | 65% | 45% | 59% | 48% | 48% | 48% | 48% |
| 1490 | 1.00% | 0.25% | 1.00% | 9.00% | 0.00% | 57% | 74% | 51% | 66% | 55% | 72% | 57% | 74% | 51% | 66% | 54% | 54% | 54% | 54% |
| 1491 | 9.00% | 0.25% | 1.00% | 9.00% | 0.00% | 53% | 69% | 49% | 64% | 50% | 65% | 54% | 70% | 48% | 62% | 51% | 51% | 51% | 51% |
| 1492 | 0.00% | 1.00% | 1.00% | 9.00% | 0.00% | 56% | 73% | 52% | 68% | 54% | 70% | 57% | 74% | 51% | 66% | 54% | 54% | 54% | 54% |
| 1493 | 0.25% | 1.00% | 1.00% | 9.00% | 0.00% | 58% | 75% | 53% | 69% | 56% | 73% | 58% | 75% | 52% | 68% | 56% | 56% | 55% | 55% |
| 1494 | 1.00% | 1.00% | 1.00% | 9.00% | 0.00% | 60% | 78% | 54% | 70% | 59% | 77% | 60% | 78% | 54% | 70% | 58% | 58% | 58% | 58% |
| 1495 | 0.25% | 0.25% | 9.00% | 9.00% | 0.00% | 65% | 85% | 55% | 72% | 57% | 74% | 66% | 86% | 59% | 77% | 59% | 59% | 61% | 61% |
| 1496 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 1497 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 1498 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 1499 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 1500 | 0.25% | 0.00% | 0.25% | 0.00% | 0.25% | 12% | 16% | 14% | 18% | 12% | 16% | 9% | 12% | 13% | 17% | 13% | 13% | 11% | 11% |
| 1501 | 1.00% | 0.00% | 0.25% | 0.00% | 0.25% | 14% | 18% | 15% | 20% | 15% | 20% | 11% | 14% | 15% | 20% | 15% | 15% | 14% | 14% |
| 1502 | 0.00% | 0.25% | 0.25% | 0.00% | 0.25% | 14% | 18% | 18% | 23% | 14% | 18% | 13% | 17% | 16% | 21% | 15% | 15% | 14% | 14% |
| 1503 | 0.25% | 0.25% | 0.25% | 0.00% | 0.25% | 16% | 21% | 19% | 25% | 16% | 21% | 14% | 18% | 17% | 22% | 17% | 17% | 16% | 16% |
| 1504 | 0.00% | 1.00% | 0.25% | 0.00% | 0.25% | 17% | 22% | 21% | 27% | 18% | 23% | 16% | 21% | 19% | 25% | 19% | 19% | 18% | 18% |
| 1505 | 1.00% | 1.00% | 0.25% | 0.00% | 0.25% | 21% | 27% | 23% | 30% | 23% | 30% | 19% | 25% | 22% | 29% | 22% | 22% | 21% | 21% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1506 | 1.00% | 9.00% | 0.25% | 0.00% | 0.25% | 29% | 38% | 31% | 40% | 29% | 38% | 26% | 34% | 29% | 38% | 30% | 30% | 28% | 28% |
| 1507 | 0.25% | 0.00% | 1.00% | 0.00% | 0.25% | 17% | 22% | 17% | 22% | 18% | 23% | 15% | 20% | 17% | 22% | 17% | 17% | 17% | 17% |
| 1508 | 1.00% | 0.00% | 1.00% | 0.00% | 0.25% | 19% | 25% | 18% | 23% | 21% | 27% | 17% | 22% | 19% | 25% | 19% | 19% | 19% | 19% |
| 1509 | 0.00% | 0.25% | 1.00% | 0.00% | 0.25% | 19% | 25% | 21% | 27% | 20% | 26% | 19% | 25% | 20% | 26% | 20% | 20% | 20% | 20% |
| 1510 | 1.00% | 0.25% | 1.00% | 0.00% | 0.25% | 23% | 30% | 23% | 30% | 25% | 33% | 22% | 29% | 23% | 30% | 24% | 24% | 23% | 23% |
| 1511 | 0.00% | 1.00% | 1.00% | 0.00% | 0.25% | 22% | 29% | 24% | 31% | 24% | 31% | 22% | 29% | 23% | 30% | 23% | 23% | 23% | 23% |
| 1512 | 0.25% | 1.00% | 1.00% | 0.00% | 0.25% | 24% | 31% | 25% | 33% | 26% | 34% | 23% | 30% | 24% | 31% | 25% | 25% | 24% | 24% |
| 1513 | 1.00% | 1.00% | 1.00% | 0.00% | 0.25% | 26% | 34% | 26% | 34% | 29% | 38% | 25% | 33% | 26% | 34% | 27% | 27% | 27% | 27% |
| 1514 | 9.00% | 1.00% | 1.00% | 0.00% | 0.25% | 22% | 29% | 24% | 31% | 24% | 31% | 22% | 29% | 23% | 30% | 23% | 23% | 23% | 23% |
| 1515 | 1.00% | 9.00% | 1.00% | 0.00% | 0.25% | 34% | 44% | 34% | 44% | 35% | 46% | 32% | 42% | 33% | 43% | 34% | 34% | 33% | 33% |
| 1516 | 0.25% | 0.00% | 9.00% | 0.00% | 0.25% | 27% | 35% | 22% | 29% | 23% | 30% | 26% | 34% | 27% | 35% | 24% | 24% | 25% | 25% |
| 1517 | 0.00% | 0.25% | 9.00% | 0.00% | 0.25% | 29% | 38% | 26% | 34% | 25% | 33% | 30% | 39% | 30% | 39% | 27% | 27% | 28% | 28% |
| 1518 | 0.25% | 0.25% | 9.00% | 0.00% | 0.25% | 31% | 40% | 27% | 35% | 27% | 35% | 31% | 40% | 31% | 40% | 28% | 28% | 30% | 30% |
| 1519 | 1.00% | 0.25% | 9.00% | 0.00% | 0.25% | 33% | 43% | 28% | 36% | 30% | 39% | 33% | 43% | 33% | 43% | 30% | 30% | 32% | 32% |
| 1520 | 0.25% | 1.00% | 9.00% | 0.00% | 0.25% | 34% | 44% | 30% | 39% | 31% | 40% | 34% | 44% | 34% | 44% | 32% | 32% | 33% | 33% |
| 1521 | 0.25% | 0.00% | 0.00% | 0.25% | 0.25% | 13% | 17% | 17% | 22% | 14% | 18% | 16% | 21% | 15% | 20% | 15% | 15% | 15% | 15% |
| 1522 | 1.00% | 0.00% | 0.00% | 0.25% | 0.25% | 15% | 20% | 18% | 23% | 17% | 22% | 18% | 23% | 17% | 22% | 17% | 17% | 17% | 17% |
| 1523 | 0.00% | 0.25% | 0.00% | 0.25% | 0.25% | 15% | 20% | 21% | 27% | 16% | 21% | 20% | 26% | 18% | 23% | 17% | 17% | 18% | 18% |
| 1524 | 0.25% | 0.25% | 0.00% | 0.25% | 0.25% | 17% | 22% | 22% | 29% | 18% | 23% | 21% | 27% | 19% | 25% | 19% | 19% | 19% | 19% |
| 1525 | 9.00% | 0.25% | 0.00% | 0.25% | 0.25% | 15% | 20% | 21% | 27% | 16% | 21% | 20% | 26% | 18% | 23% | 17% | 17% | 18% | 18% |
| 1526 | 1.00% | 1.00% | 0.00% | 0.25% | 0.25% | 22% | 29% | 26% | 34% | 25% | 33% | 26% | 34% | 24% | 31% | 24% | 24% | 25% | 25% |
| 1527 | 1.00% | 9.00% | 0.00% | 0.25% | 0.25% | 30% | 39% | 34% | 44% | 31% | 40% | 33% | 43% | 31% | 40% | 32% | 32% | 32% | 32% |
| 1528 | 0.00% | 0.00% | 0.25% | 0.25% | 0.25% | 15% | 20% | 22% | 29% | 16% | 21% | 18% | 23% | 19% | 25% | 18% | 18% | 18% | 18% |
| 1529 | 0.25% | 0.00% | 0.25% | 0.25% | 0.25% | 17% | 22% | 23% | 30% | 18% | 23% | 19% | 25% | 20% | 26% | 19% | 19% | 19% | 19% |
| 1530 | 0.00% | 0.25% | 0.25% | 0.25% | 0.25% | 19% | 25% | 27% | 35% | 20% | 26% | 23% | 30% | 23% | 30% | 22% | 22% | 22% | 22% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1531 | 0.25% | 0.25% | 0.25% | 0.25% | 0.25% | 21% | 27% | 28% | 36% | 22% | 29% | 24% | 31% | 24% | 31% | 24% | 24% | 23% | 23% |
| 1532 | 1.00% | 0.25% | 0.25% | 0.25% | 0.25% | 23% | 30% | 29% | 38% | 25% | 33% | 26% | 34% | 26% | 34% | 26% | 26% | 26% | 26% |
| 1533 | 9.00% | 0.25% | 0.25% | 0.25% | 0.25% | 19% | 25% | 27% | 35% | 20% | 26% | 23% | 30% | 23% | 30% | 22% | 22% | 22% | 22% |
| 1534 | 0.25% | 1.00% | 0.25% | 0.25% | 0.25% | 24% | 31% | 31% | 40% | 26% | 34% | 27% | 35% | 27% | 35% | 27% | 27% | 27% | 27% |
| 1535 | 9.00% | 1.00% | 0.25% | 0.25% | 0.25% | 22% | 29% | 30% | 39% | 24% | 31% | 26% | 34% | 26% | 34% | 25% | 25% | 25% | 25% |
| 1536 | 0.25% | 9.00% | 0.25% | 0.25% | 0.25% | 32% | 42% | 39% | 51% | 32% | 42% | 34% | 44% | 34% | 44% | 34% | 34% | 33% | 33% |
| 1537 | 1.00% | 9.00% | 0.25% | 0.25% | 0.25% | 34% | 44% | 40% | 52% | 35% | 46% | 36% | 47% | 36% | 47% | 36% | 36% | 36% | 36% |
| 1538 | 9.00% | 9.00% | 0.25% | 0.25% | 0.25% | 30% | 39% | 38% | 49% | 30% | 39% | 33% | 43% | 33% | 43% | 33% | 33% | 32% | 32% |
| 1539 | 0.00% | 0.00% | 1.00% | 0.25% | 0.25% | 20% | 26% | 25% | 33% | 22% | 29% | 24% | 31% | 23% | 30% | 22% | 22% | 23% | 23% |
| 1540 | 1.00% | 0.00% | 1.00% | 0.25% | 0.25% | 24% | 31% | 27% | 35% | 27% | 35% | 27% | 35% | 26% | 34% | 26% | 26% | 27% | 27% |
| 1541 | 0.00% | 0.25% | 1.00% | 0.25% | 0.25% | 24% | 31% | 30% | 39% | 26% | 34% | 29% | 38% | 27% | 35% | 27% | 27% | 27% | 27% |
| 1542 | 0.25% | 0.25% | 1.00% | 0.25% | 0.25% | 26% | 34% | 31% | 40% | 28% | 36% | 30% | 39% | 28% | 36% | 28% | 28% | 29% | 29% |
| 1543 | 1.00% | 0.25% | 1.00% | 0.25% | 0.25% | 28% | 36% | 32% | 42% | 31% | 40% | 32% | 42% | 30% | 39% | 30% | 30% | 31% | 31% |
| 1544 | 9.00% | 0.25% | 1.00% | 0.25% | 0.25% | 24% | 31% | 30% | 39% | 26% | 34% | 29% | 38% | 27% | 35% | 27% | 27% | 27% | 27% |
| 1545 | 0.00% | 1.00% | 1.00% | 0.25% | 0.25% | 27% | 35% | 33% | 43% | 30% | 39% | 32% | 42% | 30% | 39% | 30% | 30% | 31% | 31% |
| 1546 | 0.25% | 1.00% | 1.00% | 0.25% | 0.25% | 29% | 38% | 34% | 44% | 32% | 42% | 33% | 43% | 31% | 40% | 32% | 32% | 32% | 32% |
| 1547 | 1.00% | 1.00% | 1.00% | 0.25% | 0.25% | 31% | 40% | 35% | 46% | 35% | 46% | 35% | 46% | 33% | 43% | 34% | 34% | 34% | 34% |
| 1548 | 9.00% | 1.00% | 1.00% | 0.25% | 0.25% | 27% | 35% | 33% | 43% | 30% | 39% | 32% | 42% | 30% | 39% | 30% | 30% | 31% | 31% |
| 1549 | 0.00% | 9.00% | 1.00% | 0.25% | 0.25% | 35% | 46% | 41% | 53% | 36% | 47% | 39% | 51% | 37% | 48% | 37% | 37% | 37% | 37% |
| 1550 | 0.25% | 9.00% | 1.00% | 0.25% | 0.25% | 37% | 48% | 42% | 55% | 38% | 49% | 40% | 52% | 38% | 49% | 39% | 39% | 39% | 39% |
| 1551 | 1.00% | 9.00% | 1.00% | 0.25% | 0.25% | 39% | 51% | 43% | 56% | 41% | 53% | 42% | 55% | 40% | 52% | 41% | 41% | 41% | 41% |
| 1552 | 0.25% | 0.25% | 9.00% | 0.25% | 0.25% | 36% | 47% | 36% | 47% | 33% | 43% | 41% | 53% | 38% | 49% | 35% | 35% | 37% | 37% |
| 1553 | 1.00% | 0.25% | 9.00% | 0.25% | 0.25% | 38% | 49% | 37% | 48% | 36% | 47% | 43% | 56% | 40% | 52% | 37% | 37% | 40% | 40% |
| 1554 | 9.00% | 0.25% | 9.00% | 0.25% | 0.25% | 34% | 44% | 35% | 46% | 31% | 40% | 40% | 52% | 37% | 48% | 33% | 33% | 36% | 36% |
| 1555 | 0.00% | 1.00% | 9.00% | 0.25% | 0.25% | 37% | 48% | 38% | 49% | 35% | 46% | 43% | 56% | 40% | 52% | 37% | 37% | 39% | 39% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1556 | 0.25% | 1.00% | 9.00% | 0.25% | 0.25% | 39% | 51% | 39% | 51% | 37% | 48% | 44% | 57% | 41% | 53% | 38% | 38% | 41% | 41% |
| 1557 | 9.00% | 1.00% | 9.00% | 0.25% | 0.25% | 37% | 48% | 38% | 49% | 35% | 46% | 43% | 56% | 40% | 52% | 37% | 37% | 39% | 39% |
| 1558 | 1.00% | 9.00% | 9.00% | 0.25% | 0.25% | 49% | 64% | 48% | 62% | 46% | 60% | 53% | 69% | 50% | 65% | 48% | 48% | 50% | 50% |
| 1559 | 0.25% | 0.00% | 0.00% | 1.00% | 0.25% | 28% | 36% | 29% | 38% | 26% | 34% | 26% | 34% | 30% | 39% | 28% | 28% | 27% | 27% |
| 1560 | 1.00% | 0.25% | 0.00% | 1.00% | 0.25% | 34% | 44% | 35% | 46% | 33% | 43% | 33% | 43% | 36% | 47% | 34% | 34% | 34% | 34% |
| 1561 | 0.00% | 1.00% | 0.00% | 1.00% | 0.25% | 33% | 43% | 36% | 47% | 32% | 42% | 33% | 43% | 36% | 47% | 34% | 34% | 34% | 34% |
| 1562 | 0.25% | 1.00% | 0.00% | 1.00% | 0.25% | 35% | 46% | 37% | 48% | 34% | 44% | 34% | 44% | 37% | 48% | 35% | 35% | 35% | 35% |
| 1563 | 1.00% | 1.00% | 0.00% | 1.00% | 0.25% | 37% | 48% | 38% | 49% | 37% | 48% | 36% | 47% | 39% | 51% | 37% | 37% | 37% | 37% |
| 1564 | 0.00% | 0.00% | 0.25% | 1.00% | 0.25% | 30% | 39% | 34% | 44% | 28% | 36% | 28% | 36% | 34% | 44% | 31% | 31% | 30% | 30% |
| 1565 | 1.00% | 0.00% | 0.25% | 1.00% | 0.25% | 34% | 44% | 36% | 47% | 33% | 43% | 31% | 40% | 37% | 48% | 34% | 34% | 34% | 34% |
| 1566 | 0.25% | 0.25% | 0.25% | 1.00% | 0.25% | 36% | 47% | 40% | 52% | 34% | 44% | 34% | 44% | 39% | 51% | 37% | 37% | 36% | 36% |
| 1567 | 1.00% | 0.25% | 0.25% | 1.00% | 0.25% | 38% | 49% | 41% | 53% | 37% | 48% | 36% | 47% | 41% | 53% | 39% | 39% | 38% | 38% |
| 1568 | 9.00% | 0.25% | 0.25% | 1.00% | 0.25% | 34% | 44% | 39% | 51% | 32% | 42% | 33% | 43% | 38% | 49% | 35% | 35% | 34% | 34% |
| 1569 | 0.00% | 1.00% | 0.25% | 1.00% | 0.25% | 37% | 48% | 42% | 55% | 36% | 47% | 36% | 47% | 41% | 53% | 38% | 38% | 38% | 38% |
| 1570 | 0.25% | 1.00% | 0.25% | 1.00% | 0.25% | 39% | 51% | 43% | 56% | 38% | 49% | 37% | 48% | 42% | 55% | 40% | 40% | 39% | 39% |
| 1571 | 1.00% | 1.00% | 0.25% | 1.00% | 0.25% | 41% | 53% | 44% | 57% | 41% | 53% | 39% | 51% | 44% | 57% | 42% | 42% | 41% | 41% |
| 1572 | 9.00% | 1.00% | 0.25% | 1.00% | 0.25% | 37% | 48% | 42% | 55% | 36% | 47% | 36% | 47% | 41% | 53% | 38% | 38% | 38% | 38% |
| 1573 | 0.25% | 9.00% | 0.25% | 1.00% | 0.25% | 47% | 61% | 51% | 66% | 44% | 57% | 44% | 57% | 49% | 64% | 47% | 47% | 46% | 46% |
| 1574 | 1.00% | 9.00% | 0.25% | 1.00% | 0.25% | 49% | 64% | 52% | 68% | 47% | 61% | 46% | 60% | 51% | 66% | 49% | 49% | 48% | 48% |
| 1575 | 9.00% | 9.00% | 0.25% | 1.00% | 0.25% | 45% | 59% | 50% | 65% | 42% | 55% | 43% | 56% | 48% | 62% | 46% | 46% | 44% | 44% |
| 1576 | 0.00% | 0.00% | 1.00% | 1.00% | 0.25% | 35% | 46% | 37% | 48% | 34% | 44% | 34% | 44% | 38% | 49% | 35% | 35% | 35% | 35% |
| 1577 | 0.25% | 0.00% | 1.00% | 1.00% | 0.25% | 37% | 48% | 38% | 49% | 36% | 47% | 35% | 46% | 39% | 51% | 37% | 37% | 37% | 37% |
| 1578 | 1.00% | 0.00% | 1.00% | 1.00% | 0.25% | 39% | 51% | 39% | 51% | 39% | 51% | 37% | 48% | 41% | 53% | 39% | 39% | 39% | 39% |
| 1579 | 0.00% | 0.25% | 1.00% | 1.00% | 0.25% | 39% | 51% | 42% | 55% | 38% | 49% | 39% | 51% | 42% | 55% | 40% | 40% | 40% | 40% |
| 1580 | 1.00% | 0.25% | 1.00% | 1.00% | 0.25% | 43% | 56% | 44% | 57% | 43% | 56% | 42% | 55% | 45% | 59% | 43% | 43% | 43% | 43% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1581 | 9.00% | 0.25% | 1.00% | 1.00% | 0.25% | 39% | 51% | 42% | 55% | 38% | 49% | 39% | 51% | 42% | 55% | 40% | 40% | 40% | 40% |
| 1582 | 0.00% | 1.00% | 1.00% | 1.00% | 0.25% | 42% | 55% | 45% | 59% | 42% | 55% | 42% | 55% | 45% | 59% | 43% | 43% | 43% | 43% |
| 1583 | 0.25% | 1.00% | 1.00% | 1.00% | 0.25% | 44% | 57% | 46% | 60% | 44% | 57% | 43% | 56% | 46% | 60% | 45% | 45% | 44% | 44% |
| 1584 | 1.00% | 1.00% | 1.00% | 1.00% | 0.25% | 46% | 60% | 47% | 61% | 47% | 61% | 45% | 59% | 48% | 62% | 47% | 47% | 47% | 47% |
| 1585 | 9.00% | 1.00% | 1.00% | 1.00% | 0.25% | 42% | 55% | 45% | 59% | 42% | 55% | 42% | 55% | 45% | 59% | 43% | 43% | 43% | 43% |
| 1586 | 0.00% | 9.00% | 1.00% | 1.00% | 0.25% | 50% | 65% | 53% | 69% | 48% | 62% | 49% | 64% | 52% | 68% | 50% | 50% | 50% | 50% |
| 1587 | 0.25% | 9.00% | 1.00% | 1.00% | 0.25% | 52% | 68% | 54% | 70% | 50% | 65% | 50% | 65% | 53% | 69% | 52% | 52% | 51% | 51% |
| 1588 | 1.00% | 9.00% | 1.00% | 1.00% | 0.25% | 54% | 70% | 55% | 72% | 53% | 69% | 52% | 68% | 55% | 72% | 54% | 54% | 53% | 53% |
| 1589 | 0.25% | 0.25% | 9.00% | 1.00% | 0.25% | 51% | 66% | 48% | 62% | 45% | 59% | 51% | 66% | 53% | 69% | 48% | 48% | 50% | 50% |
| 1590 | 1.00% | 0.25% | 9.00% | 1.00% | 0.25% | 53% | 69% | 49% | 64% | 48% | 62% | 53% | 69% | 55% | 72% | 50% | 50% | 52% | 52% |
| 1591 | 9.00% | 0.25% | 9.00% | 1.00% | 0.25% | 49% | 64% | 47% | 61% | 43% | 56% | 50% | 65% | 52% | 68% | 46% | 46% | 48% | 48% |
| 1592 | 0.25% | 1.00% | 9.00% | 1.00% | 0.25% | 54% | 70% | 51% | 66% | 49% | 64% | 54% | 70% | 56% | 73% | 51% | 51% | 53% | 53% |
| 1593 | 0.00% | 0.25% | 0.00% | 9.00% | 0.25% | 50% | 65% | 47% | 61% | 46% | 60% | 50% | 65% | 46% | 60% | 48% | 48% | 47% | 47% |
| 1594 | 0.00% | 0.00% | 0.25% | 9.00% | 0.25% | 50% | 65% | 48% | 62% | 46% | 60% | 48% | 62% | 47% | 61% | 48% | 48% | 47% | 47% |
| 1595 | 0.25% | 0.00% | 0.25% | 9.00% | 0.25% | 52% | 68% | 49% | 64% | 48% | 62% | 49% | 64% | 48% | 62% | 50% | 50% | 48% | 48% |
| 1596 | 0.00% | 0.25% | 0.25% | 9.00% | 0.25% | 54% | 70% | 53% | 69% | 50% | 65% | 53% | 69% | 51% | 66% | 52% | 52% | 51% | 51% |
| 1597 | 0.25% | 0.25% | 0.25% | 9.00% | 0.25% | 56% | 73% | 54% | 70% | 52% | 68% | 54% | 70% | 52% | 68% | 54% | 54% | 53% | 53% |
| 1598 | 1.00% | 0.25% | 0.25% | 9.00% | 0.25% | 58% | 75% | 55% | 72% | 55% | 72% | 56% | 73% | 54% | 70% | 56% | 56% | 55% | 55% |
| 1599 | 9.00% | 0.25% | 0.25% | 9.00% | 0.25% | 54% | 70% | 53% | 69% | 50% | 65% | 53% | 69% | 51% | 66% | 52% | 52% | 51% | 51% |
| 1600 | 0.00% | 1.00% | 0.25% | 9.00% | 0.25% | 57% | 74% | 56% | 73% | 54% | 70% | 56% | 73% | 54% | 70% | 56% | 56% | 55% | 55% |
| 1601 | 0.25% | 1.00% | 0.25% | 9.00% | 0.25% | 59% | 77% | 57% | 74% | 56% | 73% | 57% | 74% | 55% | 72% | 57% | 57% | 56% | 56% |
| 1602 | 1.00% | 1.00% | 0.25% | 9.00% | 0.25% | 61% | 79% | 58% | 75% | 59% | 77% | 59% | 77% | 57% | 74% | 59% | 59% | 58% | 58% |
| 1603 | 0.25% | 9.00% | 0.25% | 9.00% | 0.25% | 67% | 87% | 65% | 85% | 62% | 81% | 64% | 83% | 62% | 81% | 65% | 65% | 63% | 63% |
| 1604 | 0.25% | 0.00% | 1.00% | 9.00% | 0.25% | 57% | 74% | 52% | 68% | 54% | 70% | 55% | 72% | 52% | 68% | 54% | 54% | 54% | 54% |
| 1605 | 1.00% | 0.25% | 1.00% | 9.00% | 0.25% | 63% | 82% | 58% | 75% | 61% | 79% | 62% | 81% | 58% | 75% | 61% | 61% | 60% | 60% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1606 | 9.00% | 0.25% | 1.00% | 9.00% | 0.25% | 59% | 77% | 56% | 73% | 56% | 73% | 59% | 77% | 55% | 72% | 57% | 57% | 57% | 57% |
| 1607 | 0.00% | 1.00% | 1.00% | 9.00% | 0.25% | 62% | 81% | 59% | 77% | 60% | 78% | 62% | 81% | 58% | 75% | 60% | 60% | 60% | 60% |
| 1608 | 0.25% | 1.00% | 1.00% | 9.00% | 0.25% | 64% | 83% | 60% | 78% | 62% | 81% | 63% | 82% | 59% | 77% | 62% | 62% | 61% | 61% |
| 1609 | 1.00% | 1.00% | 1.00% | 9.00% | 0.25% | 66% | 86% | 61% | 79% | 65% | 85% | 65% | 85% | 61% | 79% | 64% | 64% | 64% | 64% |
| 1610 | 0.25% | 0.25% | 9.00% | 9.00% | 0.25% | 71% | 92% | 62% | 81% | 63% | 82% | 71% | 92% | 66% | 86% | 65% | 65% | 67% | 67% |
| 1611 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 1612 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 1613 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 1614 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 1615 | 0.25% | 0.00% | 0.25% | 0.00% | 1.00% | 17% | 22% | 20% | 26% | 17% | 22% | 14% | 18% | 24% | 31% | 18% | 18% | 18% | 18% |
| 1616 | 1.00% | 0.00% | 0.25% | 0.00% | 1.00% | 19% | 25% | 21% | 27% | 20% | 26% | 16% | 21% | 26% | 34% | 20% | 20% | 21% | 21% |
| 1617 | 0.00% | 0.25% | 0.25% | 0.00% | 1.00% | 19% | 25% | 24% | 31% | 19% | 25% | 18% | 23% | 27% | 35% | 21% | 21% | 21% | 21% |
| 1618 | 0.25% | 0.25% | 0.25% | 0.00% | 1.00% | 21% | 27% | 25% | 33% | 21% | 27% | 19% | 25% | 28% | 36% | 22% | 22% | 23% | 23% |
| 1619 | 0.00% | 1.00% | 0.25% | 0.00% | 1.00% | 22% | 29% | 27% | 35% | 23% | 30% | 21% | 27% | 30% | 39% | 24% | 24% | 25% | 25% |
| 1620 | 1.00% | 1.00% | 0.25% | 0.00% | 1.00% | 26% | 34% | 29% | 38% | 28% | 36% | 24% | 31% | 33% | 43% | 28% | 28% | 28% | 28% |
| 1621 | 1.00% | 9.00% | 0.25% | 0.00% | 1.00% | 34% | 44% | 37% | 48% | 34% | 44% | 31% | 40% | 40% | 52% | 35% | 35% | 35% | 35% |
| 1622 | 0.25% | 0.00% | 1.00% | 0.00% | 1.00% | 22% | 29% | 23% | 30% | 23% | 30% | 20% | 26% | 28% | 36% | 23% | 23% | 24% | 24% |
| 1623 | 1.00% | 0.00% | 1.00% | 0.00% | 1.00% | 24% | 31% | 24% | 31% | 26% | 34% | 22% | 29% | 30% | 39% | 25% | 25% | 26% | 26% |
| 1624 | 0.00% | 0.25% | 1.00% | 0.00% | 1.00% | 24% | 31% | 27% | 35% | 25% | 33% | 24% | 31% | 31% | 40% | 25% | 25% | 27% | 27% |
| 1625 | 1.00% | 0.25% | 1.00% | 0.00% | 1.00% | 28% | 36% | 29% | 38% | 30% | 39% | 27% | 35% | 34% | 44% | 29% | 29% | 30% | 30% |
| 1626 | 0.00% | 1.00% | 1.00% | 0.00% | 1.00% | 27% | 35% | 30% | 39% | 29% | 38% | 27% | 35% | 34% | 44% | 29% | 29% | 30% | 30% |
| 1627 | 0.25% | 1.00% | 1.00% | 0.00% | 1.00% | 29% | 38% | 31% | 40% | 31% | 40% | 28% | 36% | 35% | 46% | 30% | 30% | 31% | 31% |
| 1628 | 1.00% | 1.00% | 1.00% | 0.00% | 1.00% | 31% | 40% | 32% | 42% | 34% | 44% | 30% | 39% | 37% | 48% | 32% | 32% | 34% | 34% |
| 1629 | 9.00% | 1.00% | 1.00% | 0.00% | 1.00% | 27% | 35% | 30% | 39% | 29% | 38% | 27% | 35% | 34% | 44% | 29% | 29% | 30% | 30% |
| 1630 | 1.00% | 9.00% | 1.00% | 0.00% | 1.00% | 39% | 51% | 40% | 52% | 40% | 52% | 37% | 48% | 44% | 57% | 40% | 40% | 40% | 40% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1631 | 0.25% | 0.00% | 9.00% | 0.00% | 1.00% | 32% | 42% | 28% | 36% | 28% | 36% | 31% | 40% | 38% | 49% | 29% | 29% | 32% | 32% |
| 1632 | 0.00% | 0.25% | 9.00% | 0.00% | 1.00% | 34% | 44% | 32% | 42% | 30% | 39% | 35% | 46% | 41% | 53% | 32% | 32% | 35% | 35% |
| 1633 | 0.25% | 0.25% | 9.00% | 0.00% | 1.00% | 36% | 47% | 33% | 43% | 32% | 42% | 36% | 47% | 42% | 55% | 34% | 34% | 37% | 37% |
| 1634 | 1.00% | 0.25% | 9.00% | 0.00% | 1.00% | 38% | 49% | 34% | 44% | 35% | 46% | 38% | 49% | 44% | 57% | 36% | 36% | 39% | 39% |
| 1635 | 0.25% | 1.00% | 9.00% | 0.00% | 1.00% | 39% | 51% | 36% | 47% | 36% | 47% | 39% | 51% | 45% | 59% | 37% | 37% | 40% | 40% |
| 1636 | 0.25% | 0.00% | 0.00% | 0.25% | 1.00% | 18% | 23% | 23% | 30% | 19% | 25% | 21% | 27% | 26% | 34% | 20% | 20% | 22% | 22% |
| 1637 | 1.00% | 0.00% | 0.00% | 0.25% | 1.00% | 20% | 26% | 24% | 31% | 22% | 29% | 23% | 30% | 28% | 36% | 22% | 22% | 24% | 24% |
| 1638 | 0.00% | 0.25% | 0.00% | 0.25% | 1.00% | 20% | 26% | 27% | 35% | 21% | 27% | 25% | 33% | 29% | 38% | 23% | 23% | 25% | 25% |
| 1639 | 0.25% | 0.25% | 0.00% | 0.25% | 1.00% | 22% | 29% | 28% | 36% | 23% | 30% | 26% | 34% | 30% | 39% | 24% | 24% | 26% | 26% |
| 1640 | 9.00% | 0.25% | 0.00% | 0.25% | 1.00% | 20% | 26% | 27% | 35% | 21% | 27% | 25% | 33% | 29% | 38% | 23% | 23% | 25% | 25% |
| 1641 | 1.00% | 1.00% | 0.00% | 0.25% | 1.00% | 27% | 35% | 32% | 42% | 30% | 39% | 31% | 40% | 35% | 46% | 30% | 30% | 32% | 32% |
| 1642 | 1.00% | 9.00% | 0.00% | 0.25% | 1.00% | 35% | 46% | 40% | 52% | 36% | 47% | 38% | 49% | 42% | 55% | 37% | 37% | 39% | 39% |
| 1643 | 0.00% | 0.00% | 0.25% | 0.25% | 1.00% | 20% | 26% | 28% | 36% | 21% | 27% | 23% | 30% | 30% | 39% | 23% | 23% | 25% | 25% |
| 1644 | 0.25% | 0.00% | 0.25% | 0.25% | 1.00% | 22% | 29% | 29% | 38% | 23% | 30% | 24% | 31% | 31% | 40% | 25% | 25% | 26% | 26% |
| 1645 | 0.00% | 0.25% | 0.25% | 0.25% | 1.00% | 24% | 31% | 33% | 43% | 25% | 33% | 28% | 36% | 34% | 44% | 27% | 27% | 29% | 29% |
| 1646 | 0.25% | 0.25% | 0.25% | 0.25% | 1.00% | 26% | 34% | 34% | 44% | 27% | 35% | 29% | 38% | 35% | 46% | 29% | 29% | 30% | 30% |
| 1647 | 1.00% | 0.25% | 0.25% | 0.25% | 1.00% | 28% | 36% | 35% | 46% | 30% | 39% | 31% | 40% | 37% | 48% | 31% | 31% | 33% | 33% |
| 1648 | 9.00% | 0.25% | 0.25% | 0.25% | 1.00% | 24% | 31% | 33% | 43% | 25% | 33% | 28% | 36% | 34% | 44% | 27% | 27% | 29% | 29% |
| 1649 | 0.25% | 1.00% | 0.25% | 0.25% | 1.00% | 29% | 38% | 37% | 48% | 31% | 40% | 32% | 42% | 38% | 49% | 32% | 32% | 34% | 34% |
| 1650 | 9.00% | 1.00% | 0.25% | 0.25% | 1.00% | 27% | 35% | 36% | 47% | 29% | 38% | 31% | 40% | 37% | 48% | 31% | 31% | 32% | 32% |
| 1651 | 0.25% | 9.00% | 0.25% | 0.25% | 1.00% | 37% | 48% | 45% | 59% | 37% | 48% | 39% | 51% | 45% | 59% | 40% | 40% | 40% | 40% |
| 1652 | 1.00% | 9.00% | 0.25% | 0.25% | 1.00% | 39% | 51% | 46% | 60% | 40% | 52% | 41% | 53% | 47% | 61% | 42% | 42% | 43% | 43% |
| 1653 | 9.00% | 9.00% | 0.25% | 0.25% | 1.00% | 35% | 46% | 44% | 57% | 35% | 46% | 38% | 49% | 44% | 57% | 38% | 38% | 39% | 39% |
| 1654 | 0.00% | 0.00% | 1.00% | 0.25% | 1.00% | 25% | 33% | 31% | 40% | 27% | 35% | 29% | 38% | 34% | 44% | 28% | 28% | 30% | 30% |
| 1655 | 1.00% | 0.00% | 1.00% | 0.25% | 1.00% | 29% | 38% | 33% | 43% | 32% | 42% | 32% | 42% | 37% | 48% | 31% | 31% | 34% | 34% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1656 | 0.00% | 0.25% | 1.00% | 0.25% | 1.00% | 29% | 38% | 36% | 47% | 31% | 40% | 34% | 44% | 38% | 49% | 32% | 32% | 34% | 34% |
| 1657 | 0.25% | 0.25% | 1.00% | 0.25% | 1.00% | 31% | 40% | 37% | 48% | 33% | 43% | 35% | 46% | 39% | 51% | 34% | 34% | 36% | 36% |
| 1658 | 1.00% | 0.25% | 1.00% | 0.25% | 1.00% | 33% | 43% | 38% | 49% | 36% | 47% | 37% | 48% | 41% | 53% | 36% | 36% | 38% | 38% |
| 1659 | 9.00% | 0.25% | 1.00% | 0.25% | 1.00% | 29% | 38% | 36% | 47% | 31% | 40% | 34% | 44% | 38% | 49% | 32% | 32% | 34% | 34% |
| 1660 | 0.00% | 1.00% | 1.00% | 0.25% | 1.00% | 32% | 42% | 39% | 51% | 35% | 46% | 37% | 48% | 41% | 53% | 35% | 35% | 38% | 38% |
| 1661 | 0.25% | 1.00% | 1.00% | 0.25% | 1.00% | 34% | 44% | 40% | 52% | 37% | 48% | 38% | 49% | 42% | 55% | 37% | 37% | 39% | 39% |
| 1662 | 1.00% | 1.00% | 1.00% | 0.25% | 1.00% | 36% | 47% | 41% | 53% | 40% | 52% | 40% | 52% | 44% | 57% | 39% | 39% | 41% | 41% |
| 1663 | 9.00% | 1.00% | 1.00% | 0.25% | 1.00% | 32% | 42% | 39% | 51% | 35% | 46% | 37% | 48% | 41% | 53% | 35% | 35% | 38% | 38% |
| 1664 | 0.00% | 9.00% | 1.00% | 0.25% | 1.00% | 40% | 52% | 47% | 61% | 41% | 53% | 44% | 57% | 48% | 62% | 43% | 43% | 44% | 44% |
| 1665 | 0.25% | 9.00% | 1.00% | 0.25% | 1.00% | 42% | 55% | 48% | 62% | 43% | 56% | 45% | 59% | 49% | 64% | 44% | 44% | 46% | 46% |
| 1666 | 1.00% | 9.00% | 1.00% | 0.25% | 1.00% | 44% | 57% | 49% | 64% | 46% | 60% | 47% | 61% | 51% | 66% | 46% | 46% | 48% | 48% |
| 1667 | 0.25% | 0.25% | 9.00% | 0.25% | 1.00% | 41% | 53% | 42% | 55% | 38% | 49% | 46% | 60% | 49% | 64% | 40% | 40% | 44% | 44% |
| 1668 | 1.00% | 0.25% | 9.00% | 0.25% | 1.00% | 43% | 56% | 43% | 56% | 41% | 53% | 48% | 62% | 51% | 66% | 42% | 42% | 47% | 47% |
| 1669 | 9.00% | 0.25% | 9.00% | 0.25% | 1.00% | 39% | 51% | 41% | 53% | 36% | 47% | 45% | 59% | 48% | 62% | 39% | 39% | 43% | 43% |
| 1670 | 0.00% | 1.00% | 9.00% | 0.25% | 1.00% | 42% | 55% | 44% | 57% | 40% | 52% | 48% | 62% | 51% | 66% | 42% | 42% | 46% | 46% |
| 1671 | 0.25% | 1.00% | 9.00% | 0.25% | 1.00% | 44% | 57% | 45% | 59% | 42% | 55% | 49% | 64% | 52% | 68% | 44% | 44% | 48% | 48% |
| 1672 | 9.00% | 1.00% | 9.00% | 0.25% | 1.00% | 42% | 55% | 44% | 57% | 40% | 52% | 48% | 62% | 51% | 66% | 42% | 42% | 46% | 46% |
| 1673 | 1.00% | 9.00% | 9.00% | 0.25% | 1.00% | 54% | 70% | 54% | 70% | 51% | 66% | 58% | 75% | 61% | 79% | 53% | 53% | 57% | 57% |
| 1674 | 0.25% | 0.00% | 0.00% | 1.00% | 1.00% | 33% | 43% | 35% | 46% | 31% | 40% | 31% | 40% | 41% | 53% | 33% | 33% | 34% | 34% |
| 1675 | 1.00% | 0.25% | 0.00% | 1.00% | 1.00% | 39% | 51% | 41% | 53% | 38% | 49% | 38% | 49% | 47% | 61% | 39% | 39% | 41% | 41% |
| 1676 | 0.00% | 1.00% | 0.00% | 1.00% | 1.00% | 38% | 49% | 42% | 55% | 37% | 48% | 38% | 49% | 47% | 61% | 39% | 39% | 41% | 41% |
| 1677 | 0.25% | 1.00% | 0.00% | 1.00% | 1.00% | 40% | 52% | 43% | 56% | 39% | 51% | 39% | 51% | 48% | 62% | 41% | 41% | 42% | 42% |
| 1678 | 1.00% | 1.00% | 0.00% | 1.00% | 1.00% | 42% | 55% | 44% | 57% | 42% | 55% | 41% | 53% | 50% | 65% | 43% | 43% | 44% | 44% |
| 1679 | 0.00% | 0.00% | 0.25% | 1.00% | 1.00% | 35% | 46% | 40% | 52% | 33% | 43% | 33% | 43% | 45% | 59% | 36% | 36% | 37% | 37% |
| 1680 | 1.00% | 0.00% | 0.25% | 1.00% | 1.00% | 39% | 51% | 42% | 55% | 38% | 49% | 36% | 47% | 48% | 62% | 40% | 40% | 41% | 41% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1681 | 0.25% | 0.25% | 0.25% | 1.00% | 1.00% | 41% | 53% | 46% | 60% | 39% | 51% | 39% | 51% | 50% | 65% | 42% | 42% | 43% | 43% |
| 1682 | 1.00% | 0.25% | 0.25% | 1.00% | 1.00% | 43% | 56% | 47% | 61% | 42% | 55% | 41% | 53% | 52% | 68% | 44% | 44% | 45% | 45% |
| 1683 | 9.00% | 0.25% | 0.25% | 1.00% | 1.00% | 39% | 51% | 45% | 59% | 37% | 48% | 38% | 49% | 49% | 64% | 40% | 40% | 41% | 41% |
| 1684 | 0.00% | 1.00% | 0.25% | 1.00% | 1.00% | 42% | 55% | 48% | 62% | 41% | 53% | 41% | 53% | 52% | 68% | 44% | 44% | 45% | 45% |
| 1685 | 0.25% | 1.00% | 0.25% | 1.00% | 1.00% | 44% | 57% | 49% | 64% | 43% | 56% | 42% | 55% | 53% | 69% | 45% | 45% | 46% | 46% |
| 1686 | 1.00% | 1.00% | 0.25% | 1.00% | 1.00% | 46% | 60% | 50% | 65% | 46% | 60% | 44% | 57% | 55% | 72% | 47% | 47% | 48% | 48% |
| 1687 | 9.00% | 1.00% | 0.25% | 1.00% | 1.00% | 42% | 55% | 48% | 62% | 41% | 53% | 41% | 53% | 52% | 68% | 44% | 44% | 45% | 45% |
| 1688 | 0.25% | 9.00% | 0.25% | 1.00% | 1.00% | 52% | 68% | 57% | 74% | 49% | 64% | 49% | 64% | 60% | 78% | 53% | 53% | 53% | 53% |
| 1689 | 1.00% | 9.00% | 0.25% | 1.00% | 1.00% | 54% | 70% | 58% | 75% | 52% | 68% | 51% | 66% | 62% | 81% | 55% | 55% | 55% | 55% |
| 1690 | 9.00% | 9.00% | 0.25% | 1.00% | 1.00% | 50% | 65% | 56% | 73% | 47% | 61% | 48% | 62% | 59% | 77% | 51% | 51% | 51% | 51% |
| 1691 | 0.00% | 0.00% | 1.00% | 1.00% | 1.00% | 40% | 52% | 43% | 56% | 39% | 51% | 39% | 51% | 49% | 64% | 41% | 41% | 42% | 42% |
| 1692 | 0.25% | 0.00% | 1.00% | 1.00% | 1.00% | 42% | 55% | 44% | 57% | 41% | 53% | 40% | 52% | 50% | 65% | 42% | 42% | 44% | 44% |
| 1693 | 1.00% | 0.00% | 1.00% | 1.00% | 1.00% | 44% | 57% | 45% | 59% | 44% | 57% | 42% | 55% | 52% | 68% | 44% | 44% | 46% | 46% |
| 1694 | 0.00% | 0.25% | 1.00% | 1.00% | 1.00% | 44% | 57% | 48% | 62% | 43% | 56% | 44% | 57% | 53% | 69% | 45% | 45% | 47% | 47% |
| 1695 | 1.00% | 0.25% | 1.00% | 1.00% | 1.00% | 48% | 62% | 50% | 65% | 48% | 62% | 47% | 61% | 56% | 73% | 49% | 49% | 50% | 50% |
| 1696 | 9.00% | 0.25% | 1.00% | 1.00% | 1.00% | 44% | 57% | 48% | 62% | 43% | 56% | 44% | 57% | 53% | 69% | 45% | 45% | 47% | 47% |
| 1697 | 0.00% | 1.00% | 1.00% | 1.00% | 1.00% | 47% | 61% | 51% | 66% | 47% | 61% | 47% | 61% | 56% | 73% | 48% | 48% | 50% | 50% |
| 1698 | 0.25% | 1.00% | 1.00% | 1.00% | 1.00% | 49% | 64% | 52% | 68% | 49% | 64% | 48% | 62% | 57% | 74% | 50% | 50% | 51% | 51% |
| 1699 | 1.00% | 1.00% | 1.00% | 1.00% | 1.00% | 51% | 66% | 53% | 69% | 52% | 68% | 50% | 65% | 59% | 77% | 52% | 52% | 54% | 54% |
| 1700 | 9.00% | 1.00% | 1.00% | 1.00% | 1.00% | 47% | 61% | 51% | 66% | 47% | 61% | 47% | 61% | 56% | 73% | 48% | 48% | 50% | 50% |
| 1701 | 0.00% | 9.00% | 1.00% | 1.00% | 1.00% | 55% | 72% | 59% | 77% | 53% | 69% | 54% | 70% | 63% | 82% | 56% | 56% | 57% | 57% |
| 1702 | 0.25% | 9.00% | 1.00% | 1.00% | 1.00% | 57% | 74% | 60% | 78% | 55% | 72% | 55% | 72% | 64% | 83% | 57% | 57% | 58% | 58% |
| 1703 | 1.00% | 9.00% | 1.00% | 1.00% | 1.00% | 59% | 77% | 61% | 79% | 58% | 75% | 57% | 74% | 66% | 86% | 59% | 59% | 60% | 60% |
| 1704 | 0.25% | 0.25% | 9.00% | 1.00% | 1.00% | 56% | 73% | 54% | 70% | 50% | 65% | 56% | 73% | 64% | 83% | 53% | 53% | 57% | 57% |
| 1705 | 1.00% | 0.25% | 9.00% | 1.00% | 1.00% | 58% | 75% | 55% | 72% | 53% | 69% | 58% | 75% | 66% | 86% | 55% | 55% | 59% | 59% |

Fig. 10

| Formula # | Gamma Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1706 | 9.00% | 0.25% | 9.00% | 1.00% | 1.00% | 54% | 70% | 53% | 69% | 48% | 62% | 55% | 72% | 63% | 82% | 52% | 52% | 55% | 55% |
| 1707 | 0.25% | 1.00% | 9.00% | 1.00% | 1.00% | 59% | 77% | 57% | 74% | 54% | 70% | 59% | 77% | 67% | 87% | 57% | 57% | 60% | 60% |
| 1708 | 0.00% | 0.25% | 0.00% | 9.00% | 1.00% | 55% | 72% | 53% | 69% | 51% | 66% | 55% | 72% | 57% | 74% | 53% | 53% | 54% | 54% |
| 1709 | 0.00% | 0.00% | 0.25% | 9.00% | 1.00% | 55% | 72% | 54% | 70% | 51% | 66% | 53% | 69% | 58% | 75% | 53% | 53% | 54% | 54% |
| 1710 | 0.25% | 0.00% | 0.25% | 9.00% | 1.00% | 57% | 74% | 55% | 72% | 53% | 69% | 54% | 70% | 59% | 77% | 55% | 55% | 55% | 55% |
| 1711 | 0.00% | 0.25% | 0.25% | 9.00% | 1.00% | 59% | 77% | 59% | 77% | 55% | 72% | 58% | 75% | 62% | 81% | 58% | 58% | 58% | 58% |
| 1712 | 0.25% | 0.25% | 0.25% | 9.00% | 1.00% | 61% | 79% | 60% | 78% | 57% | 74% | 59% | 77% | 63% | 82% | 59% | 59% | 60% | 60% |
| 1713 | 1.00% | 0.25% | 0.25% | 9.00% | 1.00% | 63% | 82% | 61% | 79% | 60% | 78% | 61% | 79% | 65% | 85% | 61% | 61% | 62% | 62% |
| 1714 | 9.00% | 0.25% | 0.25% | 9.00% | 1.00% | 59% | 77% | 59% | 77% | 55% | 72% | 58% | 75% | 62% | 81% | 58% | 58% | 58% | 58% |
| 1715 | 0.00% | 1.00% | 0.25% | 9.00% | 1.00% | 62% | 81% | 62% | 81% | 59% | 77% | 61% | 79% | 65% | 85% | 61% | 61% | 62% | 62% |
| 1716 | 0.25% | 1.00% | 0.25% | 9.00% | 1.00% | 64% | 83% | 63% | 82% | 61% | 79% | 62% | 81% | 66% | 86% | 63% | 63% | 63% | 63% |
| 1717 | 1.00% | 1.00% | 0.25% | 9.00% | 1.00% | 66% | 86% | 64% | 83% | 64% | 83% | 64% | 83% | 68% | 88% | 65% | 65% | 65% | 65% |
| 1718 | 0.25% | 9.00% | 0.25% | 9.00% | 1.00% | 72% | 94% | 71% | 92% | 67% | 87% | 69% | 90% | 73% | 95% | 70% | 70% | 70% | 70% |
| 1719 | 0.25% | 0.00% | 1.00% | 9.00% | 1.00% | 62% | 81% | 58% | 75% | 59% | 77% | 60% | 78% | 63% | 82% | 60% | 60% | 61% | 61% |
| 1720 | 1.00% | 0.25% | 1.00% | 9.00% | 1.00% | 68% | 88% | 64% | 83% | 66% | 86% | 67% | 87% | 69% | 90% | 66% | 66% | 67% | 67% |
| 1721 | 9.00% | 0.25% | 1.00% | 9.00% | 1.00% | 64% | 83% | 62% | 81% | 61% | 79% | 64% | 83% | 66% | 86% | 62% | 62% | 64% | 64% |
| 1722 | 0.00% | 1.00% | 1.00% | 9.00% | 1.00% | 67% | 87% | 65% | 85% | 65% | 85% | 67% | 87% | 69% | 90% | 66% | 66% | 67% | 67% |
| 1723 | 0.25% | 1.00% | 1.00% | 9.00% | 1.00% | 69% | 90% | 66% | 86% | 67% | 87% | 68% | 88% | 70% | 91% | 67% | 67% | 68% | 68% |
| 1724 | 1.00% | 1.00% | 1.00% | 9.00% | 1.00% | 71% | 92% | 67% | 87% | 70% | 91% | 70% | 91% | 72% | 94% | 69% | 69% | 71% | 71% |
| 1725 | 0.25% | 0.25% | 9.00% | 9.00% | 1.00% | 76% | 99% | 68% | 88% | 68% | 88% | 76% | 99% | 77% | 100% | 71% | 71% | 74% | 74% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1726 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 1727 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 1728 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 1729 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 1730 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 1731 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 1732 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 1733 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 1734 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 1735 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 1736 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 1737 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 1738 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 1739 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 1740 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 1741 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 1742 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 1743 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 1744 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 1745 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 1746 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 1747 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 1748 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 1749 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 1750 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1751 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 1752 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 1753 | 0.00% | 0.25% | 0.00% | 0.25% | 0.00% | 11% | 14% | 10% | 13% | 9% | 12% | 15% | 20% | 10% | 13% | 10% | 10% | 11% | 11% |
| 1754 | 0.25% | 0.25% | 0.00% | 0.25% | 0.00% | 13% | 17% | 11% | 14% | 11% | 14% | 16% | 21% | 11% | 14% | 12% | 12% | 13% | 13% |
| 1755 | 9.00% | 0.25% | 0.00% | 0.25% | 0.00% | 11% | 14% | 10% | 13% | 9% | 12% | 15% | 20% | 10% | 13% | 10% | 10% | 11% | 11% |
| 1756 | 1.00% | 1.00% | 0.00% | 0.25% | 0.00% | 18% | 23% | 15% | 20% | 18% | 23% | 21% | 27% | 16% | 21% | 17% | 17% | 18% | 18% |
| 1757 | 1.00% | 9.00% | 0.00% | 0.25% | 0.00% | 26% | 34% | 23% | 30% | 24% | 31% | 28% | 36% | 23% | 30% | 24% | 24% | 25% | 25% |
| 1758 | 0.00% | 0.00% | 0.25% | 0.25% | 0.00% | 11% | 14% | 11% | 14% | 9% | 12% | 13% | 17% | 11% | 14% | 10% | 10% | 11% | 11% |
| 1759 | 0.25% | 0.00% | 0.25% | 0.25% | 0.00% | 13% | 17% | 12% | 16% | 11% | 14% | 14% | 18% | 12% | 16% | 12% | 12% | 12% | 12% |
| 1760 | 0.00% | 0.25% | 0.25% | 0.25% | 0.00% | 15% | 20% | 16% | 21% | 13% | 17% | 18% | 23% | 15% | 20% | 15% | 15% | 15% | 15% |
| 1761 | 0.25% | 0.25% | 0.25% | 0.25% | 0.00% | 17% | 22% | 17% | 22% | 15% | 20% | 19% | 25% | 16% | 21% | 16% | 16% | 17% | 17% |
| 1762 | 1.00% | 0.25% | 0.25% | 0.25% | 0.00% | 19% | 25% | 18% | 23% | 18% | 23% | 21% | 27% | 18% | 23% | 18% | 18% | 19% | 19% |
| 1763 | 9.00% | 0.25% | 0.25% | 0.25% | 0.00% | 15% | 20% | 16% | 21% | 13% | 17% | 18% | 23% | 15% | 20% | 15% | 15% | 15% | 15% |
| 1764 | 0.25% | 1.00% | 0.25% | 0.25% | 0.00% | 20% | 26% | 20% | 26% | 19% | 25% | 22% | 29% | 19% | 25% | 20% | 20% | 20% | 20% |
| 1765 | 9.00% | 1.00% | 0.25% | 0.25% | 0.00% | 18% | 23% | 19% | 25% | 17% | 22% | 21% | 27% | 18% | 23% | 18% | 18% | 19% | 19% |
| 1766 | 0.25% | 9.00% | 0.25% | 0.25% | 0.00% | 28% | 36% | 28% | 36% | 25% | 33% | 29% | 38% | 26% | 34% | 27% | 27% | 27% | 27% |
| 1767 | 1.00% | 9.00% | 0.25% | 0.25% | 0.00% | 30% | 39% | 29% | 38% | 28% | 36% | 31% | 40% | 28% | 36% | 29% | 29% | 29% | 29% |
| 1768 | 9.00% | 9.00% | 0.25% | 0.25% | 0.00% | 26% | 34% | 27% | 35% | 23% | 30% | 28% | 36% | 25% | 33% | 25% | 25% | 25% | 25% |
| 1769 | 0.00% | 0.00% | 1.00% | 0.25% | 0.00% | 16% | 21% | 14% | 18% | 15% | 20% | 19% | 25% | 15% | 20% | 15% | 15% | 16% | 16% |
| 1770 | 1.00% | 0.00% | 1.00% | 0.25% | 0.00% | 20% | 26% | 16% | 21% | 20% | 26% | 22% | 29% | 18% | 23% | 19% | 19% | 20% | 20% |
| 1771 | 0.00% | 0.25% | 1.00% | 0.25% | 0.00% | 20% | 26% | 19% | 25% | 19% | 25% | 24% | 31% | 19% | 25% | 19% | 19% | 21% | 21% |
| 1772 | 0.25% | 0.25% | 1.00% | 0.25% | 0.00% | 22% | 29% | 20% | 26% | 21% | 27% | 25% | 33% | 20% | 26% | 21% | 21% | 22% | 22% |
| 1773 | 1.00% | 0.25% | 1.00% | 0.25% | 0.00% | 24% | 31% | 21% | 27% | 24% | 31% | 27% | 35% | 22% | 29% | 23% | 23% | 24% | 24% |
| 1774 | 9.00% | 0.25% | 1.00% | 0.25% | 0.00% | 20% | 26% | 19% | 25% | 19% | 25% | 24% | 31% | 19% | 25% | 19% | 19% | 21% | 21% |
| 1775 | 0.00% | 1.00% | 1.00% | 0.25% | 0.00% | 23% | 30% | 22% | 29% | 23% | 30% | 27% | 35% | 22% | 29% | 23% | 23% | 24% | 24% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1776 | 0.25% | 1.00% | 1.00% | 0.25% | 0.00% | 25% | 33% | 23% | 30% | 25% | 33% | 28% | 36% | 23% | 30% | 24% | 24% | 25% | 25% |
| 1777 | 1.00% | 1.00% | 1.00% | 0.25% | 0.00% | 27% | 35% | 24% | 31% | 28% | 36% | 30% | 39% | 25% | 33% | 26% | 26% | 28% | 28% |
| 1778 | 9.00% | 1.00% | 1.00% | 0.25% | 0.00% | 23% | 30% | 22% | 29% | 23% | 30% | 27% | 35% | 22% | 29% | 23% | 23% | 24% | 24% |
| 1779 | 0.00% | 9.00% | 1.00% | 0.25% | 0.00% | 31% | 40% | 30% | 39% | 29% | 38% | 34% | 44% | 29% | 38% | 30% | 30% | 31% | 31% |
| 1780 | 0.25% | 9.00% | 1.00% | 0.25% | 0.00% | 33% | 43% | 31% | 40% | 31% | 40% | 35% | 46% | 30% | 39% | 32% | 32% | 32% | 32% |
| 1781 | 1.00% | 9.00% | 1.00% | 0.25% | 0.00% | 35% | 46% | 32% | 42% | 34% | 44% | 37% | 48% | 32% | 42% | 34% | 34% | 34% | 34% |
| 1782 | 0.25% | 0.25% | 9.00% | 0.25% | 0.00% | 32% | 42% | 25% | 33% | 26% | 34% | 36% | 47% | 30% | 39% | 28% | 28% | 31% | 31% |
| 1783 | 1.00% | 0.25% | 9.00% | 0.25% | 0.00% | 34% | 44% | 26% | 34% | 29% | 38% | 38% | 49% | 32% | 42% | 30% | 30% | 33% | 33% |
| 1784 | 9.00% | 0.25% | 9.00% | 0.25% | 0.00% | 30% | 39% | 24% | 31% | 24% | 31% | 35% | 46% | 29% | 38% | 26% | 26% | 29% | 29% |
| 1785 | 0.00% | 1.00% | 9.00% | 0.25% | 0.00% | 33% | 43% | 27% | 35% | 28% | 36% | 38% | 49% | 32% | 42% | 29% | 29% | 33% | 33% |
| 1786 | 0.25% | 1.00% | 9.00% | 0.25% | 0.00% | 35% | 46% | 28% | 36% | 30% | 39% | 39% | 51% | 33% | 43% | 31% | 31% | 34% | 34% |
| 1787 | 9.00% | 1.00% | 9.00% | 0.25% | 0.00% | 33% | 43% | 27% | 35% | 28% | 36% | 38% | 49% | 32% | 42% | 29% | 29% | 33% | 33% |
| 1788 | 1.00% | 9.00% | 9.00% | 0.25% | 0.00% | 45% | 59% | 37% | 48% | 39% | 51% | 48% | 62% | 42% | 55% | 40% | 40% | 43% | 43% |
| 1789 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 1790 | 1.00% | 0.25% | 0.00% | 1.00% | 0.00% | 23% | 30% | 19% | 25% | 21% | 27% | 25% | 33% | 22% | 29% | 21% | 21% | 23% | 23% |
| 1791 | 0.00% | 1.00% | 0.00% | 1.00% | 0.00% | 22% | 29% | 20% | 26% | 20% | 26% | 25% | 33% | 22% | 29% | 21% | 21% | 22% | 22% |
| 1792 | 0.25% | 1.00% | 0.00% | 1.00% | 0.00% | 24% | 31% | 21% | 27% | 22% | 29% | 26% | 34% | 23% | 30% | 22% | 22% | 24% | 24% |
| 1793 | 1.00% | 1.00% | 0.00% | 1.00% | 0.00% | 26% | 34% | 22% | 29% | 25% | 33% | 28% | 36% | 25% | 33% | 24% | 24% | 26% | 26% |
| 1794 | 0.00% | 0.00% | 0.25% | 1.00% | 0.00% | 19% | 25% | 18% | 23% | 16% | 21% | 20% | 26% | 20% | 26% | 18% | 18% | 19% | 19% |
| 1795 | 1.00% | 0.00% | 0.25% | 1.00% | 0.00% | 23% | 30% | 20% | 26% | 21% | 27% | 23% | 30% | 23% | 30% | 21% | 21% | 22% | 22% |
| 1796 | 0.25% | 0.25% | 0.25% | 1.00% | 0.00% | 25% | 33% | 24% | 31% | 22% | 29% | 26% | 34% | 25% | 33% | 24% | 24% | 24% | 24% |
| 1797 | 1.00% | 0.25% | 0.25% | 1.00% | 0.00% | 27% | 35% | 25% | 33% | 25% | 33% | 28% | 36% | 27% | 35% | 26% | 26% | 27% | 27% |
| 1798 | 9.00% | 0.25% | 0.25% | 1.00% | 0.00% | 23% | 30% | 23% | 30% | 20% | 26% | 25% | 33% | 24% | 31% | 22% | 22% | 23% | 23% |
| 1799 | 0.00% | 1.00% | 0.25% | 1.00% | 0.00% | 26% | 34% | 26% | 34% | 24% | 31% | 28% | 36% | 27% | 35% | 25% | 25% | 26% | 26% |
| 1800 | 0.25% | 1.00% | 0.25% | 1.00% | 0.00% | 28% | 36% | 27% | 35% | 26% | 34% | 29% | 38% | 28% | 36% | 27% | 27% | 28% | 28% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1801 | 1.00% | 1.00% | 0.25% | 1.00% | 0.00% | 30% | 39% | 28% | 36% | 29% | 38% | 31% | 40% | 30% | 39% | 29% | 29% | 30% | 30% |
| 1802 | 9.00% | 1.00% | 0.25% | 1.00% | 0.00% | 26% | 34% | 26% | 34% | 24% | 31% | 28% | 36% | 27% | 35% | 25% | 25% | 26% | 26% |
| 1803 | 0.25% | 9.00% | 0.25% | 1.00% | 0.00% | 36% | 47% | 35% | 46% | 32% | 42% | 36% | 47% | 35% | 46% | 34% | 34% | 34% | 34% |
| 1804 | 1.00% | 9.00% | 0.25% | 1.00% | 0.00% | 38% | 49% | 36% | 47% | 35% | 46% | 38% | 49% | 37% | 48% | 36% | 36% | 37% | 37% |
| 1805 | 9.00% | 9.00% | 0.25% | 1.00% | 0.00% | 34% | 44% | 34% | 44% | 30% | 39% | 35% | 46% | 34% | 44% | 33% | 33% | 33% | 33% |
| 1806 | 0.00% | 0.00% | 1.00% | 1.00% | 0.00% | 24% | 31% | 21% | 27% | 22% | 29% | 26% | 34% | 24% | 31% | 22% | 22% | 24% | 24% |
| 1807 | 0.25% | 0.00% | 1.00% | 1.00% | 0.00% | 26% | 34% | 22% | 29% | 24% | 31% | 27% | 35% | 25% | 33% | 24% | 24% | 25% | 25% |
| 1808 | 1.00% | 0.00% | 1.00% | 1.00% | 0.00% | 28% | 36% | 23% | 30% | 27% | 35% | 29% | 38% | 27% | 35% | 26% | 26% | 28% | 28% |
| 1809 | 0.00% | 0.25% | 1.00% | 1.00% | 0.00% | 28% | 36% | 26% | 34% | 26% | 34% | 31% | 40% | 28% | 36% | 27% | 27% | 28% | 28% |
| 1810 | 1.00% | 0.25% | 1.00% | 1.00% | 0.00% | 32% | 42% | 28% | 36% | 31% | 40% | 34% | 44% | 31% | 40% | 30% | 30% | 32% | 32% |
| 1811 | 9.00% | 0.25% | 1.00% | 1.00% | 0.00% | 28% | 36% | 26% | 34% | 26% | 34% | 31% | 40% | 28% | 36% | 27% | 27% | 28% | 28% |
| 1812 | 0.00% | 1.00% | 1.00% | 1.00% | 0.00% | 31% | 40% | 29% | 38% | 30% | 39% | 34% | 44% | 31% | 40% | 30% | 30% | 32% | 32% |
| 1813 | 0.25% | 1.00% | 1.00% | 1.00% | 0.00% | 33% | 43% | 30% | 39% | 32% | 42% | 35% | 46% | 32% | 42% | 32% | 32% | 33% | 33% |
| 1814 | 1.00% | 1.00% | 1.00% | 1.00% | 0.00% | 35% | 46% | 31% | 40% | 35% | 46% | 37% | 48% | 34% | 44% | 34% | 34% | 35% | 35% |
| 1815 | 9.00% | 1.00% | 1.00% | 1.00% | 0.00% | 31% | 40% | 29% | 38% | 30% | 39% | 34% | 44% | 31% | 40% | 30% | 30% | 32% | 32% |
| 1816 | 0.00% | 9.00% | 1.00% | 1.00% | 0.00% | 39% | 51% | 37% | 48% | 36% | 47% | 41% | 53% | 38% | 49% | 37% | 37% | 38% | 38% |
| 1817 | 0.25% | 9.00% | 1.00% | 1.00% | 0.00% | 41% | 53% | 38% | 49% | 38% | 49% | 42% | 55% | 39% | 51% | 39% | 39% | 40% | 40% |
| 1818 | 1.00% | 9.00% | 1.00% | 1.00% | 0.00% | 43% | 56% | 39% | 51% | 41% | 53% | 44% | 57% | 41% | 53% | 41% | 41% | 42% | 42% |
| 1819 | 0.25% | 0.25% | 9.00% | 1.00% | 0.00% | 40% | 52% | 32% | 42% | 33% | 43% | 43% | 56% | 39% | 51% | 35% | 35% | 38% | 38% |
| 1820 | 1.00% | 0.25% | 9.00% | 1.00% | 0.00% | 42% | 55% | 33% | 43% | 36% | 47% | 45% | 59% | 41% | 53% | 37% | 37% | 41% | 41% |
| 1821 | 9.00% | 0.25% | 9.00% | 1.00% | 0.00% | 38% | 49% | 31% | 40% | 31% | 40% | 42% | 55% | 38% | 49% | 33% | 33% | 37% | 37% |
| 1822 | 0.25% | 1.00% | 9.00% | 1.00% | 0.00% | 43% | 56% | 35% | 46% | 37% | 48% | 46% | 60% | 42% | 55% | 38% | 38% | 42% | 42% |
| 1823 | 0.00% | 0.25% | 0.00% | 9.00% | 0.00% | 41% | 53% | 37% | 48% | 32% | 42% | 44% | 57% | 39% | 51% | 37% | 37% | 38% | 38% |
| 1824 | 0.00% | 0.00% | 0.25% | 9.00% | 0.00% | 41% | 53% | 38% | 49% | 32% | 42% | 42% | 55% | 40% | 52% | 37% | 37% | 38% | 38% |
| 1825 | 0.25% | 0.00% | 0.25% | 9.00% | 0.00% | 43% | 56% | 39% | 51% | 34% | 44% | 43% | 56% | 41% | 53% | 39% | 39% | 39% | 39% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1826 | 0.00% | 0.25% | 0.25% | 9.00% | 0.00% | 45% | 59% | 43% | 56% | 36% | 47% | 47% | 61% | 44% | 57% | 41% | 41% | 42% | 42% |
| 1827 | 0.25% | 0.25% | 0.25% | 9.00% | 0.00% | 47% | 61% | 44% | 57% | 38% | 49% | 48% | 62% | 45% | 59% | 43% | 43% | 44% | 44% |
| 1828 | 1.00% | 0.25% | 0.25% | 9.00% | 0.00% | 49% | 64% | 45% | 59% | 41% | 53% | 50% | 65% | 47% | 61% | 45% | 45% | 46% | 46% |
| 1829 | 9.00% | 0.25% | 0.25% | 9.00% | 0.00% | 45% | 59% | 43% | 56% | 36% | 47% | 47% | 61% | 44% | 57% | 41% | 41% | 42% | 42% |
| 1830 | 0.00% | 1.00% | 0.25% | 9.00% | 0.00% | 48% | 62% | 46% | 60% | 40% | 52% | 50% | 65% | 47% | 61% | 45% | 45% | 46% | 46% |
| 1831 | 0.25% | 1.00% | 0.25% | 9.00% | 0.00% | 50% | 65% | 47% | 61% | 42% | 55% | 51% | 66% | 48% | 62% | 46% | 46% | 47% | 47% |
| 1832 | 1.00% | 1.00% | 0.25% | 9.00% | 0.00% | 52% | 68% | 48% | 62% | 45% | 59% | 53% | 69% | 50% | 65% | 48% | 48% | 49% | 49% |
| 1833 | 0.25% | 9.00% | 0.25% | 9.00% | 0.00% | 58% | 75% | 55% | 72% | 48% | 62% | 58% | 75% | 55% | 72% | 54% | 54% | 54% | 54% |
| 1834 | 0.25% | 0.00% | 1.00% | 9.00% | 0.00% | 48% | 62% | 42% | 55% | 40% | 52% | 49% | 64% | 45% | 59% | 43% | 43% | 45% | 45% |
| 1835 | 1.00% | 0.25% | 1.00% | 9.00% | 0.00% | 54% | 70% | 48% | 62% | 47% | 61% | 56% | 73% | 51% | 66% | 50% | 50% | 51% | 51% |
| 1836 | 9.00% | 0.25% | 1.00% | 9.00% | 0.00% | 50% | 65% | 46% | 60% | 42% | 55% | 53% | 69% | 48% | 62% | 46% | 46% | 48% | 48% |
| 1837 | 0.00% | 1.00% | 1.00% | 9.00% | 0.00% | 53% | 69% | 49% | 64% | 46% | 60% | 56% | 73% | 51% | 66% | 49% | 49% | 51% | 51% |
| 1838 | 0.25% | 1.00% | 1.00% | 9.00% | 0.00% | 55% | 72% | 50% | 65% | 48% | 62% | 57% | 74% | 52% | 68% | 51% | 51% | 52% | 52% |
| 1839 | 1.00% | 1.00% | 1.00% | 9.00% | 0.00% | 57% | 74% | 51% | 66% | 51% | 66% | 59% | 77% | 54% | 70% | 53% | 53% | 55% | 55% |
| 1840 | 0.25% | 0.25% | 9.00% | 9.00% | 0.00% | 62% | 81% | 52% | 68% | 49% | 64% | 65% | 85% | 59% | 77% | 54% | 54% | 58% | 58% |
| 1841 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 1842 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 1843 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 1844 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 1845 | 0.25% | 0.00% | 0.25% | 0.00% | 0.25% | 12% | 16% | 14% | 18% | 12% | 16% | 9% | 12% | 13% | 17% | 13% | 13% | 11% | 11% |
| 1846 | 1.00% | 0.00% | 0.25% | 0.00% | 0.25% | 14% | 18% | 15% | 20% | 15% | 20% | 11% | 14% | 15% | 20% | 15% | 15% | 14% | 14% |
| 1847 | 0.00% | 0.25% | 0.25% | 0.00% | 0.25% | 14% | 18% | 18% | 23% | 14% | 18% | 13% | 17% | 16% | 21% | 15% | 15% | 14% | 14% |
| 1848 | 0.25% | 0.25% | 0.25% | 0.00% | 0.25% | 16% | 21% | 19% | 25% | 16% | 21% | 14% | 18% | 17% | 22% | 17% | 17% | 16% | 16% |
| 1849 | 0.00% | 1.00% | 0.25% | 0.00% | 0.25% | 17% | 22% | 21% | 27% | 18% | 23% | 16% | 21% | 19% | 25% | 19% | 19% | 18% | 18% |
| 1850 | 1.00% | 1.00% | 0.25% | 0.00% | 0.25% | 21% | 27% | 23% | 30% | 23% | 30% | 19% | 25% | 22% | 29% | 22% | 22% | 21% | 21% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1851 | 1.00% | 9.00% | 0.25% | 0.00% | 0.25% | 29% | 38% | 31% | 40% | 29% | 38% | 26% | 34% | 29% | 38% | 30% | 30% | 28% | 28% |
| 1852 | 0.25% | 0.00% | 1.00% | 0.00% | 0.25% | 17% | 22% | 17% | 22% | 18% | 23% | 15% | 20% | 17% | 22% | 17% | 17% | 17% | 17% |
| 1853 | 1.00% | 0.00% | 1.00% | 0.00% | 0.25% | 19% | 25% | 18% | 23% | 21% | 27% | 17% | 22% | 19% | 25% | 19% | 19% | 19% | 19% |
| 1854 | 0.00% | 0.25% | 1.00% | 0.00% | 0.25% | 19% | 25% | 21% | 27% | 20% | 26% | 19% | 25% | 20% | 26% | 20% | 20% | 20% | 20% |
| 1855 | 1.00% | 0.25% | 1.00% | 0.00% | 0.25% | 23% | 30% | 23% | 30% | 25% | 33% | 22% | 29% | 23% | 30% | 24% | 24% | 23% | 23% |
| 1856 | 0.00% | 1.00% | 1.00% | 0.00% | 0.25% | 22% | 29% | 24% | 31% | 24% | 31% | 22% | 29% | 23% | 30% | 23% | 23% | 23% | 23% |
| 1857 | 0.25% | 1.00% | 1.00% | 0.00% | 0.25% | 24% | 31% | 25% | 33% | 26% | 34% | 23% | 30% | 24% | 31% | 25% | 25% | 24% | 24% |
| 1858 | 1.00% | 1.00% | 1.00% | 0.00% | 0.25% | 26% | 34% | 26% | 34% | 29% | 38% | 25% | 33% | 26% | 34% | 27% | 27% | 27% | 27% |
| 1859 | 9.00% | 1.00% | 1.00% | 0.00% | 0.25% | 22% | 29% | 24% | 31% | 24% | 31% | 22% | 29% | 23% | 30% | 23% | 23% | 23% | 23% |
| 1860 | 1.00% | 9.00% | 1.00% | 0.00% | 0.25% | 34% | 44% | 34% | 44% | 35% | 46% | 32% | 42% | 33% | 43% | 34% | 34% | 33% | 33% |
| 1861 | 0.25% | 0.00% | 9.00% | 0.00% | 0.25% | 27% | 35% | 22% | 29% | 23% | 30% | 26% | 34% | 27% | 35% | 24% | 24% | 25% | 25% |
| 1862 | 0.00% | 0.25% | 9.00% | 0.00% | 0.25% | 29% | 38% | 26% | 34% | 25% | 33% | 30% | 39% | 30% | 39% | 27% | 27% | 28% | 28% |
| 1863 | 0.25% | 0.25% | 9.00% | 0.00% | 0.25% | 31% | 40% | 27% | 35% | 27% | 35% | 31% | 40% | 31% | 40% | 28% | 28% | 30% | 30% |
| 1864 | 1.00% | 0.25% | 9.00% | 0.00% | 0.25% | 33% | 43% | 28% | 36% | 30% | 39% | 33% | 43% | 33% | 43% | 30% | 30% | 32% | 32% |
| 1865 | 0.25% | 1.00% | 9.00% | 0.00% | 0.25% | 34% | 44% | 30% | 39% | 31% | 40% | 34% | 44% | 34% | 44% | 32% | 32% | 33% | 33% |
| 1866 | 0.25% | 0.00% | 0.00% | 0.25% | 0.25% | 15% | 20% | 13% | 17% | 13% | 17% | 16% | 21% | 14% | 18% | 14% | 14% | 14% | 14% |
| 1867 | 1.00% | 0.00% | 0.00% | 0.25% | 0.25% | 17% | 22% | 14% | 18% | 16% | 21% | 18% | 23% | 16% | 21% | 16% | 16% | 17% | 17% |
| 1868 | 0.00% | 0.25% | 0.00% | 0.25% | 0.25% | 17% | 22% | 17% | 22% | 15% | 20% | 20% | 26% | 17% | 22% | 16% | 16% | 17% | 17% |
| 1869 | 0.25% | 0.25% | 0.00% | 0.25% | 0.25% | 19% | 25% | 18% | 23% | 17% | 22% | 21% | 27% | 18% | 23% | 18% | 18% | 19% | 19% |
| 1870 | 9.00% | 0.25% | 0.00% | 0.25% | 0.25% | 17% | 22% | 17% | 22% | 15% | 20% | 20% | 26% | 17% | 22% | 16% | 16% | 17% | 17% |
| 1871 | 1.00% | 1.00% | 0.00% | 0.25% | 0.25% | 24% | 31% | 22% | 29% | 24% | 31% | 26% | 34% | 23% | 30% | 23% | 23% | 24% | 24% |
| 1872 | 1.00% | 9.00% | 0.00% | 0.25% | 0.25% | 32% | 42% | 30% | 39% | 30% | 39% | 33% | 43% | 30% | 39% | 31% | 31% | 31% | 31% |
| 1873 | 0.00% | 0.00% | 0.25% | 0.25% | 0.25% | 17% | 22% | 18% | 23% | 15% | 20% | 18% | 23% | 18% | 23% | 17% | 17% | 17% | 17% |
| 1874 | 0.25% | 0.00% | 0.25% | 0.25% | 0.25% | 19% | 25% | 19% | 25% | 17% | 22% | 19% | 25% | 19% | 25% | 18% | 18% | 18% | 18% |
| 1875 | 0.00% | 0.25% | 0.25% | 0.25% | 0.25% | 21% | 27% | 23% | 30% | 19% | 25% | 23% | 30% | 22% | 29% | 21% | 21% | 21% | 21% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1876 | 0.25% | 0.25% | 0.25% | 0.25% | 0.25% | 23% | 30% | 24% | 31% | 21% | 27% | 24% | 31% | 23% | 30% | 23% | 23% | 23% | 23% |
| 1877 | 1.00% | 0.25% | 0.25% | 0.25% | 0.25% | 25% | 33% | 25% | 33% | 24% | 31% | 26% | 34% | 25% | 33% | 25% | 25% | 25% | 25% |
| 1878 | 9.00% | 0.25% | 0.25% | 0.25% | 0.25% | 21% | 27% | 23% | 30% | 19% | 25% | 23% | 30% | 22% | 29% | 21% | 21% | 21% | 21% |
| 1879 | 0.25% | 1.00% | 0.25% | 0.25% | 0.25% | 26% | 34% | 27% | 35% | 25% | 33% | 27% | 35% | 26% | 34% | 26% | 26% | 26% | 26% |
| 1880 | 9.00% | 1.00% | 0.25% | 0.25% | 0.25% | 24% | 31% | 26% | 34% | 23% | 30% | 26% | 34% | 25% | 33% | 24% | 24% | 25% | 25% |
| 1881 | 0.25% | 9.00% | 0.25% | 0.25% | 0.25% | 34% | 44% | 35% | 46% | 31% | 40% | 34% | 44% | 33% | 43% | 33% | 33% | 33% | 33% |
| 1882 | 1.00% | 9.00% | 0.25% | 0.25% | 0.25% | 36% | 47% | 36% | 47% | 34% | 44% | 36% | 47% | 35% | 46% | 35% | 35% | 35% | 35% |
| 1883 | 9.00% | 9.00% | 0.25% | 0.25% | 0.25% | 32% | 42% | 34% | 44% | 29% | 38% | 33% | 43% | 32% | 42% | 32% | 32% | 31% | 31% |
| 1884 | 0.00% | 0.00% | 1.00% | 0.25% | 0.25% | 22% | 29% | 21% | 27% | 21% | 27% | 24% | 31% | 22% | 29% | 21% | 21% | 22% | 22% |
| 1885 | 1.00% | 0.00% | 1.00% | 0.25% | 0.25% | 26% | 34% | 23% | 30% | 26% | 34% | 27% | 35% | 25% | 33% | 25% | 25% | 26% | 26% |
| 1886 | 0.00% | 0.25% | 1.00% | 0.25% | 0.25% | 26% | 34% | 26% | 34% | 25% | 33% | 29% | 38% | 26% | 34% | 26% | 26% | 27% | 27% |
| 1887 | 0.25% | 0.25% | 1.00% | 0.25% | 0.25% | 28% | 36% | 27% | 35% | 27% | 35% | 30% | 39% | 27% | 35% | 27% | 27% | 28% | 28% |
| 1888 | 1.00% | 0.25% | 1.00% | 0.25% | 0.25% | 30% | 39% | 28% | 36% | 30% | 39% | 32% | 42% | 29% | 38% | 29% | 29% | 30% | 30% |
| 1889 | 9.00% | 0.25% | 1.00% | 0.25% | 0.25% | 26% | 34% | 26% | 34% | 25% | 33% | 29% | 38% | 26% | 34% | 26% | 26% | 27% | 27% |
| 1890 | 0.00% | 1.00% | 1.00% | 0.25% | 0.25% | 29% | 38% | 29% | 38% | 29% | 38% | 32% | 42% | 29% | 38% | 29% | 29% | 30% | 30% |
| 1891 | 0.25% | 1.00% | 1.00% | 0.25% | 0.25% | 31% | 40% | 30% | 39% | 31% | 40% | 33% | 43% | 30% | 39% | 31% | 31% | 31% | 31% |
| 1892 | 1.00% | 1.00% | 1.00% | 0.25% | 0.25% | 33% | 43% | 31% | 40% | 34% | 44% | 35% | 46% | 32% | 42% | 33% | 33% | 34% | 34% |
| 1893 | 9.00% | 1.00% | 1.00% | 0.25% | 0.25% | 29% | 38% | 29% | 38% | 29% | 38% | 32% | 42% | 29% | 38% | 29% | 29% | 30% | 30% |
| 1894 | 0.00% | 9.00% | 1.00% | 0.25% | 0.25% | 37% | 48% | 37% | 48% | 35% | 46% | 39% | 51% | 36% | 47% | 36% | 36% | 37% | 37% |
| 1895 | 0.25% | 9.00% | 1.00% | 0.25% | 0.25% | 39% | 51% | 38% | 49% | 37% | 48% | 40% | 52% | 37% | 48% | 38% | 38% | 38% | 38% |
| 1896 | 1.00% | 9.00% | 1.00% | 0.25% | 0.25% | 41% | 53% | 39% | 51% | 40% | 52% | 42% | 55% | 39% | 51% | 40% | 40% | 40% | 40% |
| 1897 | 0.25% | 0.25% | 9.00% | 0.25% | 0.25% | 38% | 49% | 32% | 42% | 32% | 42% | 41% | 53% | 37% | 48% | 34% | 34% | 37% | 37% |
| 1898 | 1.00% | 0.25% | 9.00% | 0.25% | 0.25% | 40% | 52% | 33% | 43% | 35% | 46% | 43% | 56% | 39% | 51% | 36% | 36% | 39% | 39% |
| 1899 | 9.00% | 0.25% | 9.00% | 0.25% | 0.25% | 36% | 47% | 31% | 40% | 30% | 39% | 40% | 52% | 36% | 47% | 32% | 32% | 35% | 35% |
| 1900 | 0.00% | 1.00% | 9.00% | 0.25% | 0.25% | 39% | 51% | 34% | 44% | 34% | 44% | 43% | 56% | 39% | 51% | 36% | 36% | 39% | 39% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1901 | 0.25% | 1.00% | 9.00% | 0.25% | 0.25% | 41% | 53% | 35% | 46% | 36% | 47% | 44% | 57% | 40% | 52% | 37% | 37% | 40% | 40% |
| 1902 | 9.00% | 1.00% | 9.00% | 0.25% | 0.25% | 39% | 51% | 34% | 44% | 34% | 44% | 43% | 56% | 39% | 51% | 36% | 36% | 39% | 39% |
| 1903 | 1.00% | 9.00% | 9.00% | 0.25% | 0.25% | 51% | 66% | 44% | 57% | 45% | 59% | 53% | 69% | 49% | 64% | 47% | 47% | 49% | 49% |
| 1904 | 0.25% | 0.00% | 0.00% | 1.00% | 0.25% | 23% | 30% | 20% | 26% | 20% | 26% | 23% | 30% | 23% | 30% | 21% | 21% | 22% | 22% |
| 1905 | 1.00% | 0.25% | 0.00% | 1.00% | 0.25% | 29% | 38% | 26% | 34% | 27% | 35% | 30% | 39% | 29% | 38% | 27% | 27% | 29% | 29% |
| 1906 | 0.00% | 1.00% | 0.00% | 1.00% | 0.25% | 28% | 36% | 27% | 35% | 26% | 34% | 30% | 39% | 29% | 38% | 27% | 27% | 28% | 28% |
| 1907 | 0.25% | 1.00% | 0.00% | 1.00% | 0.25% | 30% | 39% | 28% | 36% | 28% | 36% | 31% | 40% | 30% | 39% | 29% | 29% | 30% | 30% |
| 1908 | 1.00% | 1.00% | 0.00% | 1.00% | 0.25% | 32% | 42% | 29% | 38% | 31% | 40% | 33% | 43% | 32% | 42% | 31% | 31% | 32% | 32% |
| 1909 | 0.00% | 0.00% | 0.25% | 1.00% | 0.25% | 25% | 33% | 25% | 33% | 22% | 29% | 25% | 33% | 27% | 35% | 24% | 24% | 25% | 25% |
| 1910 | 1.00% | 0.00% | 0.25% | 1.00% | 0.25% | 29% | 38% | 27% | 35% | 27% | 35% | 28% | 36% | 30% | 39% | 28% | 28% | 28% | 28% |
| 1911 | 0.25% | 0.25% | 0.25% | 1.00% | 0.25% | 31% | 40% | 31% | 40% | 28% | 36% | 31% | 40% | 32% | 42% | 30% | 30% | 30% | 30% |
| 1912 | 1.00% | 0.25% | 0.25% | 1.00% | 0.25% | 33% | 43% | 32% | 42% | 31% | 40% | 33% | 43% | 34% | 44% | 32% | 32% | 33% | 33% |
| 1913 | 9.00% | 0.25% | 0.25% | 1.00% | 0.25% | 29% | 38% | 30% | 39% | 26% | 34% | 30% | 39% | 31% | 40% | 28% | 28% | 29% | 29% |
| 1914 | 0.00% | 1.00% | 0.25% | 1.00% | 0.25% | 32% | 42% | 33% | 43% | 30% | 39% | 33% | 43% | 34% | 44% | 32% | 32% | 32% | 32% |
| 1915 | 0.25% | 1.00% | 0.25% | 1.00% | 0.25% | 34% | 44% | 34% | 44% | 32% | 42% | 34% | 44% | 35% | 46% | 33% | 33% | 34% | 34% |
| 1916 | 1.00% | 1.00% | 0.25% | 1.00% | 0.25% | 36% | 47% | 35% | 46% | 35% | 46% | 36% | 47% | 37% | 48% | 35% | 35% | 36% | 36% |
| 1917 | 9.00% | 1.00% | 0.25% | 1.00% | 0.25% | 32% | 42% | 33% | 43% | 30% | 39% | 33% | 43% | 34% | 44% | 32% | 32% | 32% | 32% |
| 1918 | 0.25% | 9.00% | 0.25% | 1.00% | 0.25% | 42% | 55% | 42% | 55% | 38% | 49% | 41% | 53% | 42% | 55% | 41% | 41% | 40% | 40% |
| 1919 | 1.00% | 9.00% | 0.25% | 1.00% | 0.25% | 44% | 57% | 43% | 56% | 41% | 53% | 43% | 56% | 44% | 57% | 43% | 43% | 43% | 43% |
| 1920 | 9.00% | 9.00% | 0.25% | 1.00% | 0.25% | 40% | 52% | 41% | 53% | 36% | 47% | 40% | 52% | 41% | 53% | 39% | 39% | 39% | 39% |
| 1921 | 0.00% | 0.00% | 1.00% | 1.00% | 0.25% | 30% | 39% | 28% | 36% | 28% | 36% | 31% | 40% | 31% | 40% | 29% | 29% | 30% | 30% |
| 1922 | 0.25% | 0.00% | 1.00% | 1.00% | 0.25% | 32% | 42% | 29% | 38% | 30% | 39% | 32% | 42% | 32% | 42% | 30% | 30% | 31% | 31% |
| 1923 | 1.00% | 0.00% | 1.00% | 1.00% | 0.25% | 34% | 44% | 30% | 39% | 33% | 43% | 34% | 44% | 34% | 44% | 32% | 32% | 34% | 34% |
| 1924 | 0.00% | 0.25% | 1.00% | 1.00% | 0.25% | 34% | 44% | 33% | 43% | 32% | 42% | 36% | 47% | 35% | 46% | 33% | 33% | 34% | 34% |
| 1925 | 1.00% | 0.25% | 1.00% | 1.00% | 0.25% | 38% | 49% | 35% | 46% | 37% | 48% | 39% | 51% | 38% | 49% | 37% | 37% | 38% | 38% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1926 | 9.00% | 0.25% | 1.00% | 1.00% | 0.25% | 34% | 44% | 33% | 43% | 32% | 42% | 36% | 47% | 35% | 46% | 33% | 33% | 34% | 34% |
| 1927 | 0.00% | 1.00% | 1.00% | 1.00% | 0.25% | 37% | 48% | 36% | 47% | 36% | 47% | 39% | 51% | 38% | 49% | 36% | 36% | 38% | 38% |
| 1928 | 0.25% | 1.00% | 1.00% | 1.00% | 0.25% | 39% | 51% | 37% | 48% | 38% | 49% | 40% | 52% | 39% | 51% | 38% | 38% | 39% | 39% |
| 1929 | 1.00% | 1.00% | 1.00% | 1.00% | 0.25% | 41% | 53% | 38% | 49% | 41% | 53% | 42% | 55% | 41% | 53% | 40% | 40% | 41% | 41% |
| 1930 | 9.00% | 1.00% | 1.00% | 1.00% | 0.25% | 37% | 48% | 36% | 47% | 36% | 47% | 39% | 51% | 38% | 49% | 36% | 36% | 38% | 38% |
| 1931 | 0.00% | 9.00% | 1.00% | 1.00% | 0.25% | 45% | 59% | 44% | 57% | 42% | 55% | 46% | 60% | 45% | 59% | 44% | 44% | 44% | 44% |
| 1932 | 0.25% | 9.00% | 1.00% | 1.00% | 0.25% | 47% | 61% | 45% | 59% | 44% | 57% | 47% | 61% | 46% | 60% | 45% | 45% | 46% | 46% |
| 1933 | 1.00% | 9.00% | 1.00% | 1.00% | 0.25% | 49% | 64% | 46% | 60% | 47% | 61% | 49% | 64% | 48% | 62% | 47% | 47% | 48% | 48% |
| 1934 | 0.25% | 0.25% | 9.00% | 1.00% | 0.25% | 46% | 60% | 39% | 51% | 39% | 51% | 48% | 62% | 46% | 60% | 41% | 41% | 44% | 44% |
| 1935 | 1.00% | 0.25% | 9.00% | 1.00% | 0.25% | 48% | 62% | 40% | 52% | 42% | 55% | 50% | 65% | 48% | 62% | 43% | 43% | 47% | 47% |
| 1936 | 9.00% | 0.25% | 9.00% | 1.00% | 0.25% | 44% | 57% | 38% | 49% | 37% | 48% | 47% | 61% | 45% | 59% | 40% | 40% | 43% | 43% |
| 1937 | 0.25% | 1.00% | 9.00% | 1.00% | 0.25% | 49% | 64% | 42% | 55% | 43% | 56% | 51% | 66% | 49% | 64% | 45% | 45% | 48% | 48% |
| 1938 | 0.00% | 0.25% | 0.00% | 9.00% | 0.25% | 47% | 61% | 44% | 57% | 38% | 49% | 49% | 64% | 46% | 60% | 43% | 43% | 44% | 44% |
| 1939 | 0.00% | 0.00% | 0.25% | 9.00% | 0.25% | 47% | 61% | 45% | 59% | 38% | 49% | 47% | 61% | 47% | 61% | 43% | 43% | 44% | 44% |
| 1940 | 0.25% | 0.00% | 0.25% | 9.00% | 0.25% | 49% | 64% | 46% | 60% | 40% | 52% | 48% | 62% | 48% | 62% | 45% | 45% | 45% | 45% |
| 1941 | 0.00% | 0.25% | 0.25% | 9.00% | 0.25% | 51% | 66% | 50% | 65% | 42% | 55% | 52% | 68% | 51% | 66% | 48% | 48% | 48% | 48% |
| 1942 | 0.25% | 0.25% | 0.25% | 9.00% | 0.25% | 53% | 69% | 51% | 66% | 44% | 57% | 53% | 69% | 52% | 68% | 49% | 49% | 50% | 50% |
| 1943 | 1.00% | 0.25% | 0.25% | 9.00% | 0.25% | 55% | 72% | 52% | 68% | 47% | 61% | 55% | 72% | 54% | 70% | 51% | 51% | 52% | 52% |
| 1944 | 9.00% | 0.25% | 0.25% | 9.00% | 0.25% | 51% | 66% | 50% | 65% | 42% | 55% | 52% | 68% | 51% | 66% | 48% | 48% | 48% | 48% |
| 1945 | 0.00% | 1.00% | 0.25% | 9.00% | 0.25% | 54% | 70% | 53% | 69% | 46% | 60% | 55% | 72% | 54% | 70% | 51% | 51% | 52% | 52% |
| 1946 | 0.25% | 1.00% | 0.25% | 9.00% | 0.25% | 56% | 73% | 54% | 70% | 48% | 62% | 56% | 73% | 55% | 72% | 53% | 53% | 53% | 53% |
| 1947 | 1.00% | 1.00% | 0.25% | 9.00% | 0.25% | 58% | 75% | 55% | 72% | 51% | 66% | 58% | 75% | 57% | 74% | 55% | 55% | 55% | 55% |
| 1948 | 0.25% | 9.00% | 0.25% | 9.00% | 0.25% | 64% | 83% | 62% | 81% | 54% | 70% | 63% | 82% | 62% | 81% | 60% | 60% | 60% | 60% |
| 1949 | 0.25% | 0.00% | 1.00% | 9.00% | 0.25% | 54% | 70% | 49% | 64% | 46% | 60% | 54% | 70% | 52% | 68% | 50% | 50% | 51% | 51% |
| 1950 | 1.00% | 0.25% | 1.00% | 9.00% | 0.25% | 60% | 78% | 55% | 72% | 53% | 69% | 61% | 79% | 58% | 75% | 56% | 56% | 57% | 57% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1951 | 9.00% | 0.25% | 1.00% | 9.00% | 0.25% | 56% | 73% | 53% | 69% | 48% | 62% | 58% | 75% | 55% | 72% | 52% | 52% | 54% | 54% |
| 1952 | 0.00% | 1.00% | 1.00% | 9.00% | 0.25% | 59% | 77% | 56% | 73% | 52% | 68% | 61% | 79% | 58% | 75% | 56% | 56% | 57% | 57% |
| 1953 | 0.25% | 1.00% | 1.00% | 9.00% | 0.25% | 61% | 79% | 57% | 74% | 54% | 70% | 62% | 81% | 59% | 77% | 57% | 57% | 58% | 58% |
| 1954 | 1.00% | 1.00% | 1.00% | 9.00% | 0.25% | 63% | 82% | 58% | 75% | 57% | 74% | 64% | 83% | 61% | 79% | 59% | 59% | 61% | 61% |
| 1955 | 0.25% | 0.25% | 9.00% | 9.00% | 0.25% | 68% | 88% | 59% | 77% | 55% | 72% | 70% | 91% | 66% | 86% | 61% | 61% | 64% | 64% |
| 1956 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 1957 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 1958 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 1959 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 1960 | 0.25% | 0.00% | 0.25% | 0.00% | 1.00% | 17% | 22% | 20% | 26% | 17% | 22% | 14% | 18% | 24% | 31% | 18% | 18% | 18% | 18% |
| 1961 | 1.00% | 0.00% | 0.25% | 0.00% | 1.00% | 19% | 25% | 21% | 27% | 20% | 26% | 16% | 21% | 26% | 34% | 20% | 20% | 21% | 21% |
| 1962 | 0.00% | 0.25% | 0.25% | 0.00% | 1.00% | 19% | 25% | 24% | 31% | 19% | 25% | 18% | 23% | 27% | 35% | 21% | 21% | 21% | 21% |
| 1963 | 0.25% | 0.25% | 0.25% | 0.00% | 1.00% | 21% | 27% | 25% | 33% | 21% | 27% | 19% | 25% | 28% | 36% | 22% | 22% | 23% | 23% |
| 1964 | 0.00% | 1.00% | 0.25% | 0.00% | 1.00% | 22% | 29% | 27% | 35% | 23% | 30% | 21% | 27% | 30% | 39% | 24% | 24% | 25% | 25% |
| 1965 | 1.00% | 1.00% | 0.25% | 0.00% | 1.00% | 26% | 34% | 29% | 38% | 28% | 36% | 24% | 31% | 33% | 43% | 28% | 28% | 28% | 28% |
| 1966 | 1.00% | 9.00% | 0.25% | 0.00% | 1.00% | 34% | 44% | 37% | 48% | 34% | 44% | 31% | 40% | 40% | 52% | 35% | 35% | 35% | 35% |
| 1967 | 0.25% | 0.00% | 1.00% | 0.00% | 1.00% | 22% | 29% | 23% | 30% | 23% | 30% | 20% | 26% | 28% | 36% | 23% | 23% | 24% | 24% |
| 1968 | 1.00% | 0.00% | 1.00% | 0.00% | 1.00% | 24% | 31% | 24% | 31% | 26% | 34% | 22% | 29% | 30% | 39% | 25% | 25% | 26% | 26% |
| 1969 | 0.00% | 0.25% | 1.00% | 0.00% | 1.00% | 24% | 31% | 27% | 35% | 25% | 33% | 24% | 31% | 31% | 40% | 25% | 25% | 27% | 27% |
| 1970 | 1.00% | 0.25% | 1.00% | 0.00% | 1.00% | 28% | 36% | 29% | 38% | 30% | 39% | 27% | 35% | 34% | 44% | 29% | 29% | 30% | 30% |
| 1971 | 0.00% | 1.00% | 1.00% | 0.00% | 1.00% | 27% | 35% | 30% | 39% | 29% | 38% | 27% | 35% | 34% | 44% | 29% | 29% | 30% | 30% |
| 1972 | 0.25% | 1.00% | 1.00% | 0.00% | 1.00% | 29% | 38% | 31% | 40% | 31% | 40% | 28% | 36% | 35% | 46% | 30% | 30% | 31% | 31% |
| 1973 | 1.00% | 1.00% | 1.00% | 0.00% | 1.00% | 31% | 40% | 32% | 42% | 34% | 44% | 30% | 39% | 37% | 48% | 32% | 32% | 34% | 34% |
| 1974 | 9.00% | 1.00% | 1.00% | 0.00% | 1.00% | 27% | 35% | 30% | 39% | 29% | 38% | 27% | 35% | 34% | 44% | 29% | 29% | 30% | 30% |
| 1975 | 1.00% | 9.00% | 1.00% | 0.00% | 1.00% | 39% | 51% | 40% | 52% | 40% | 52% | 37% | 48% | 44% | 57% | 40% | 40% | 40% | 40% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 1976 | 0.25% | 0.00% | 9.00% | 0.00% | 1.00% | 32% | 42% | 28% | 36% | 28% | 36% | 31% | 40% | 38% | 49% | 29% | 29% | 32% | 32% |
| 1977 | 0.00% | 0.25% | 9.00% | 0.00% | 1.00% | 34% | 44% | 32% | 42% | 30% | 39% | 35% | 46% | 41% | 53% | 32% | 32% | 35% | 35% |
| 1978 | 0.25% | 0.25% | 9.00% | 0.00% | 1.00% | 36% | 47% | 33% | 43% | 32% | 42% | 36% | 47% | 42% | 55% | 34% | 34% | 37% | 37% |
| 1979 | 1.00% | 0.25% | 9.00% | 0.00% | 1.00% | 38% | 49% | 34% | 44% | 35% | 46% | 38% | 49% | 44% | 57% | 36% | 36% | 39% | 39% |
| 1980 | 0.25% | 1.00% | 9.00% | 0.00% | 1.00% | 39% | 51% | 36% | 47% | 36% | 47% | 39% | 51% | 45% | 59% | 37% | 37% | 40% | 40% |
| 1981 | 0.25% | 0.00% | 0.00% | 0.25% | 1.00% | 20% | 26% | 19% | 25% | 18% | 23% | 21% | 27% | 25% | 33% | 19% | 19% | 21% | 21% |
| 1982 | 1.00% | 0.00% | 0.00% | 0.25% | 1.00% | 22% | 29% | 20% | 26% | 21% | 27% | 23% | 30% | 27% | 35% | 21% | 21% | 24% | 24% |
| 1983 | 0.00% | 0.25% | 0.00% | 0.25% | 1.00% | 22% | 29% | 23% | 30% | 20% | 26% | 25% | 33% | 28% | 36% | 22% | 22% | 24% | 24% |
| 1984 | 0.25% | 0.25% | 0.00% | 0.25% | 1.00% | 24% | 31% | 24% | 31% | 22% | 29% | 26% | 34% | 29% | 38% | 23% | 23% | 26% | 26% |
| 1985 | 9.00% | 0.25% | 0.00% | 0.25% | 1.00% | 22% | 29% | 23% | 30% | 20% | 26% | 25% | 33% | 28% | 36% | 22% | 22% | 24% | 24% |
| 1986 | 1.00% | 1.00% | 0.00% | 0.25% | 1.00% | 29% | 38% | 28% | 36% | 29% | 38% | 31% | 40% | 34% | 44% | 29% | 29% | 31% | 31% |
| 1987 | 1.00% | 9.00% | 0.00% | 0.25% | 1.00% | 37% | 48% | 36% | 47% | 35% | 46% | 38% | 49% | 41% | 53% | 36% | 36% | 38% | 38% |
| 1988 | 0.00% | 0.00% | 0.25% | 0.25% | 1.00% | 22% | 29% | 24% | 31% | 20% | 26% | 23% | 30% | 29% | 38% | 22% | 22% | 24% | 24% |
| 1989 | 0.25% | 0.00% | 0.25% | 0.25% | 1.00% | 24% | 31% | 25% | 33% | 22% | 29% | 24% | 31% | 30% | 39% | 24% | 24% | 25% | 25% |
| 1990 | 0.00% | 0.25% | 0.25% | 0.25% | 1.00% | 26% | 34% | 29% | 38% | 24% | 31% | 28% | 36% | 33% | 43% | 26% | 26% | 28% | 28% |
| 1991 | 0.25% | 0.25% | 0.25% | 0.25% | 1.00% | 28% | 36% | 30% | 39% | 26% | 34% | 29% | 38% | 34% | 44% | 28% | 28% | 30% | 30% |
| 1992 | 1.00% | 0.25% | 0.25% | 0.25% | 1.00% | 30% | 39% | 31% | 40% | 29% | 38% | 31% | 40% | 36% | 47% | 30% | 30% | 32% | 32% |
| 1993 | 9.00% | 0.25% | 0.25% | 0.25% | 1.00% | 26% | 34% | 29% | 38% | 24% | 31% | 28% | 36% | 33% | 43% | 26% | 26% | 28% | 28% |
| 1994 | 0.25% | 1.00% | 0.25% | 0.25% | 1.00% | 31% | 40% | 33% | 43% | 30% | 39% | 32% | 42% | 37% | 48% | 31% | 31% | 33% | 33% |
| 1995 | 9.00% | 1.00% | 0.25% | 0.25% | 1.00% | 29% | 38% | 32% | 42% | 28% | 36% | 31% | 40% | 36% | 47% | 30% | 30% | 32% | 32% |
| 1996 | 0.25% | 9.00% | 0.25% | 0.25% | 1.00% | 39% | 51% | 41% | 53% | 36% | 47% | 39% | 51% | 44% | 57% | 39% | 39% | 40% | 40% |
| 1997 | 1.00% | 9.00% | 0.25% | 0.25% | 1.00% | 41% | 53% | 42% | 55% | 39% | 51% | 41% | 53% | 46% | 60% | 41% | 41% | 42% | 42% |
| 1998 | 9.00% | 9.00% | 0.25% | 0.25% | 1.00% | 37% | 48% | 40% | 52% | 34% | 44% | 38% | 49% | 43% | 56% | 37% | 37% | 38% | 38% |
| 1999 | 0.00% | 0.00% | 1.00% | 0.25% | 1.00% | 27% | 35% | 27% | 35% | 26% | 34% | 29% | 38% | 33% | 43% | 27% | 27% | 29% | 29% |
| 2000 | 1.00% | 0.00% | 1.00% | 0.25% | 1.00% | 31% | 40% | 29% | 38% | 31% | 40% | 32% | 42% | 36% | 47% | 30% | 30% | 33% | 33% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2001 | 0.00% | 0.25% | 1.00% | 0.25% | 1.00% | 31% | 40% | 32% | 42% | 30% | 39% | 34% | 44% | 37% | 48% | 31% | 31% | 34% | 34% |
| 2002 | 0.25% | 0.25% | 1.00% | 0.25% | 1.00% | 33% | 43% | 33% | 43% | 32% | 42% | 35% | 46% | 38% | 49% | 33% | 33% | 35% | 35% |
| 2003 | 1.00% | 0.25% | 1.00% | 0.25% | 1.00% | 35% | 46% | 34% | 44% | 35% | 46% | 37% | 48% | 40% | 52% | 35% | 35% | 37% | 37% |
| 2004 | 9.00% | 0.25% | 1.00% | 0.25% | 1.00% | 31% | 40% | 32% | 42% | 30% | 39% | 34% | 44% | 37% | 48% | 31% | 31% | 34% | 34% |
| 2005 | 0.00% | 1.00% | 1.00% | 0.25% | 1.00% | 34% | 44% | 35% | 46% | 34% | 44% | 37% | 48% | 40% | 52% | 34% | 34% | 37% | 37% |
| 2006 | 0.25% | 1.00% | 1.00% | 0.25% | 1.00% | 36% | 47% | 36% | 47% | 36% | 47% | 38% | 49% | 41% | 53% | 36% | 36% | 38% | 38% |
| 2007 | 1.00% | 1.00% | 1.00% | 0.25% | 1.00% | 38% | 49% | 37% | 48% | 39% | 51% | 40% | 52% | 43% | 56% | 38% | 38% | 41% | 41% |
| 2008 | 9.00% | 1.00% | 1.00% | 0.25% | 1.00% | 34% | 44% | 35% | 46% | 34% | 44% | 37% | 48% | 40% | 52% | 34% | 34% | 37% | 37% |
| 2009 | 0.00% | 9.00% | 1.00% | 0.25% | 1.00% | 42% | 55% | 43% | 56% | 40% | 52% | 44% | 57% | 47% | 61% | 42% | 42% | 44% | 44% |
| 2010 | 0.25% | 9.00% | 1.00% | 0.25% | 1.00% | 44% | 57% | 44% | 57% | 42% | 55% | 45% | 59% | 48% | 62% | 43% | 43% | 45% | 45% |
| 2011 | 1.00% | 9.00% | 1.00% | 0.25% | 1.00% | 46% | 60% | 45% | 59% | 45% | 59% | 47% | 61% | 50% | 65% | 45% | 45% | 47% | 47% |
| 2012 | 0.25% | 0.25% | 9.00% | 0.25% | 1.00% | 43% | 56% | 38% | 49% | 37% | 48% | 46% | 60% | 48% | 62% | 39% | 39% | 44% | 44% |
| 2013 | 1.00% | 0.25% | 9.00% | 0.25% | 1.00% | 45% | 59% | 39% | 51% | 40% | 52% | 48% | 62% | 50% | 65% | 41% | 41% | 46% | 46% |
| 2014 | 9.00% | 0.25% | 9.00% | 0.25% | 1.00% | 41% | 53% | 37% | 48% | 35% | 46% | 45% | 59% | 47% | 61% | 38% | 38% | 42% | 42% |
| 2015 | 0.00% | 1.00% | 9.00% | 0.25% | 1.00% | 44% | 57% | 40% | 52% | 39% | 51% | 48% | 62% | 50% | 65% | 41% | 41% | 46% | 46% |
| 2016 | 0.25% | 1.00% | 9.00% | 0.25% | 1.00% | 46% | 60% | 41% | 53% | 41% | 53% | 49% | 64% | 51% | 66% | 43% | 43% | 47% | 47% |
| 2017 | 9.00% | 1.00% | 9.00% | 0.25% | 1.00% | 44% | 57% | 40% | 52% | 39% | 51% | 48% | 62% | 50% | 65% | 41% | 41% | 46% | 46% |
| 2018 | 1.00% | 9.00% | 9.00% | 0.25% | 1.00% | 56% | 73% | 50% | 65% | 50% | 65% | 58% | 75% | 60% | 78% | 52% | 52% | 56% | 56% |
| 2019 | 0.25% | 0.00% | 0.00% | 1.00% | 1.00% | 28% | 36% | 26% | 34% | 25% | 33% | 28% | 36% | 34% | 44% | 26% | 26% | 29% | 29% |
| 2020 | 1.00% | 0.25% | 0.00% | 1.00% | 1.00% | 34% | 44% | 32% | 42% | 32% | 42% | 35% | 46% | 40% | 52% | 33% | 33% | 36% | 36% |
| 2021 | 0.00% | 1.00% | 0.00% | 1.00% | 1.00% | 33% | 43% | 33% | 43% | 31% | 40% | 35% | 46% | 40% | 52% | 32% | 32% | 35% | 35% |
| 2022 | 0.25% | 1.00% | 0.00% | 1.00% | 1.00% | 35% | 46% | 34% | 44% | 33% | 43% | 36% | 47% | 41% | 53% | 34% | 34% | 37% | 37% |
| 2023 | 1.00% | 1.00% | 0.00% | 1.00% | 1.00% | 37% | 48% | 35% | 46% | 36% | 47% | 38% | 49% | 43% | 56% | 36% | 36% | 39% | 39% |
| 2024 | 0.00% | 0.00% | 0.25% | 1.00% | 1.00% | 30% | 39% | 31% | 40% | 27% | 35% | 30% | 39% | 38% | 49% | 29% | 29% | 32% | 32% |
| 2025 | 1.00% | 0.00% | 0.25% | 1.00% | 1.00% | 34% | 44% | 33% | 43% | 32% | 42% | 33% | 43% | 41% | 53% | 33% | 33% | 35% | 35% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2026 | 0.25% | 0.25% | 0.25% | 1.00% | 1.00% | 36% | 47% | 37% | 48% | 33% | 43% | 36% | 47% | 43% | 56% | 35% | 35% | 37% | 37% |
| 2027 | 1.00% | 0.25% | 0.25% | 1.00% | 1.00% | 38% | 49% | 38% | 49% | 36% | 47% | 38% | 49% | 45% | 59% | 37% | 37% | 40% | 40% |
| 2028 | 9.00% | 0.25% | 0.25% | 1.00% | 1.00% | 34% | 44% | 36% | 47% | 31% | 40% | 35% | 46% | 42% | 55% | 34% | 34% | 36% | 36% |
| 2029 | 0.00% | 1.00% | 0.25% | 1.00% | 1.00% | 37% | 48% | 39% | 51% | 35% | 46% | 38% | 49% | 45% | 59% | 37% | 37% | 39% | 39% |
| 2030 | 0.25% | 1.00% | 0.25% | 1.00% | 1.00% | 39% | 51% | 40% | 52% | 37% | 48% | 39% | 51% | 46% | 60% | 39% | 39% | 41% | 41% |
| 2031 | 1.00% | 1.00% | 0.25% | 1.00% | 1.00% | 41% | 53% | 41% | 53% | 40% | 52% | 41% | 53% | 48% | 62% | 41% | 41% | 43% | 43% |
| 2032 | 9.00% | 1.00% | 0.25% | 1.00% | 1.00% | 37% | 48% | 39% | 51% | 35% | 46% | 38% | 49% | 45% | 59% | 37% | 37% | 39% | 39% |
| 2033 | 0.25% | 9.00% | 0.25% | 1.00% | 1.00% | 47% | 61% | 48% | 62% | 43% | 56% | 46% | 60% | 53% | 69% | 46% | 46% | 47% | 47% |
| 2034 | 1.00% | 9.00% | 0.25% | 1.00% | 1.00% | 49% | 64% | 49% | 64% | 46% | 60% | 48% | 62% | 55% | 72% | 48% | 48% | 50% | 50% |
| 2035 | 9.00% | 9.00% | 0.25% | 1.00% | 1.00% | 45% | 59% | 47% | 61% | 41% | 53% | 45% | 59% | 52% | 68% | 44% | 44% | 46% | 46% |
| 2036 | 0.00% | 0.00% | 1.00% | 1.00% | 1.00% | 35% | 46% | 34% | 44% | 33% | 43% | 36% | 47% | 42% | 55% | 34% | 34% | 37% | 37% |
| 2037 | 0.25% | 0.00% | 1.00% | 1.00% | 1.00% | 37% | 48% | 35% | 46% | 35% | 46% | 37% | 48% | 43% | 56% | 36% | 36% | 38% | 38% |
| 2038 | 1.00% | 0.00% | 1.00% | 1.00% | 1.00% | 39% | 51% | 36% | 47% | 38% | 49% | 39% | 51% | 45% | 59% | 38% | 38% | 41% | 41% |
| 2039 | 0.00% | 0.25% | 1.00% | 1.00% | 1.00% | 39% | 51% | 39% | 51% | 37% | 48% | 41% | 53% | 46% | 60% | 38% | 38% | 41% | 41% |
| 2040 | 1.00% | 0.25% | 1.00% | 1.00% | 1.00% | 43% | 56% | 41% | 53% | 42% | 55% | 44% | 57% | 49% | 64% | 42% | 42% | 45% | 45% |
| 2041 | 9.00% | 0.25% | 1.00% | 1.00% | 1.00% | 39% | 51% | 39% | 51% | 37% | 48% | 41% | 53% | 46% | 60% | 38% | 38% | 41% | 41% |
| 2042 | 0.00% | 1.00% | 1.00% | 1.00% | 1.00% | 42% | 55% | 42% | 55% | 41% | 53% | 44% | 57% | 49% | 64% | 42% | 42% | 45% | 45% |
| 2043 | 0.25% | 1.00% | 1.00% | 1.00% | 1.00% | 44% | 57% | 43% | 56% | 43% | 56% | 45% | 59% | 50% | 65% | 43% | 43% | 46% | 46% |
| 2044 | 1.00% | 1.00% | 1.00% | 1.00% | 1.00% | 46% | 60% | 44% | 57% | 46% | 60% | 47% | 61% | 52% | 68% | 45% | 45% | 48% | 48% |
| 2045 | 9.00% | 1.00% | 1.00% | 1.00% | 1.00% | 42% | 55% | 42% | 55% | 41% | 53% | 44% | 57% | 49% | 64% | 42% | 42% | 45% | 45% |
| 2046 | 0.00% | 9.00% | 1.00% | 1.00% | 1.00% | 50% | 65% | 50% | 65% | 47% | 61% | 51% | 66% | 56% | 73% | 49% | 49% | 51% | 51% |
| 2047 | 0.25% | 9.00% | 1.00% | 1.00% | 1.00% | 52% | 68% | 51% | 66% | 49% | 64% | 52% | 68% | 57% | 74% | 51% | 51% | 53% | 53% |
| 2048 | 1.00% | 9.00% | 1.00% | 1.00% | 1.00% | 54% | 70% | 52% | 68% | 52% | 68% | 54% | 70% | 59% | 77% | 53% | 53% | 55% | 55% |
| 2049 | 0.25% | 0.25% | 9.00% | 1.00% | 1.00% | 51% | 66% | 45% | 59% | 44% | 57% | 53% | 69% | 57% | 74% | 47% | 47% | 51% | 51% |
| 2050 | 1.00% | 0.25% | 9.00% | 1.00% | 1.00% | 53% | 69% | 46% | 60% | 47% | 61% | 55% | 72% | 59% | 77% | 49% | 49% | 54% | 54% |

Fig. 11

| Formula # | Gamma Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2051 | 9.00% | 0.25% | 9.00% | 1.00% | 1.00% | 49% | 64% | 44% | 57% | 42% | 55% | 52% | 68% | 56% | 73% | 45% | 45% | 50% | 50% |
| 2052 | 0.25% | 1.00% | 9.00% | 1.00% | 1.00% | 54% | 70% | 48% | 62% | 48% | 62% | 56% | 73% | 60% | 78% | 50% | 50% | 55% | 55% |
| 2053 | 0.00% | 0.25% | 0.00% | 9.00% | 1.00% | 52% | 68% | 50% | 65% | 43% | 56% | 54% | 70% | 57% | 74% | 48% | 48% | 51% | 51% |
| 2054 | 0.00% | 0.00% | 0.25% | 9.00% | 1.00% | 52% | 68% | 51% | 66% | 43% | 56% | 52% | 68% | 58% | 75% | 49% | 49% | 51% | 51% |
| 2055 | 0.25% | 0.00% | 0.25% | 9.00% | 1.00% | 54% | 70% | 52% | 68% | 45% | 59% | 53% | 69% | 59% | 77% | 50% | 50% | 52% | 52% |
| 2056 | 0.00% | 0.25% | 0.25% | 9.00% | 1.00% | 56% | 73% | 56% | 73% | 47% | 61% | 57% | 74% | 62% | 81% | 53% | 53% | 55% | 55% |
| 2057 | 0.25% | 0.25% | 0.25% | 9.00% | 1.00% | 58% | 75% | 57% | 74% | 49% | 64% | 58% | 75% | 63% | 82% | 55% | 55% | 57% | 57% |
| 2058 | 1.00% | 0.25% | 0.25% | 9.00% | 1.00% | 60% | 78% | 58% | 75% | 52% | 68% | 60% | 78% | 65% | 85% | 57% | 57% | 59% | 59% |
| 2059 | 9.00% | 0.25% | 0.25% | 9.00% | 1.00% | 56% | 73% | 56% | 73% | 47% | 61% | 57% | 74% | 62% | 81% | 53% | 53% | 55% | 55% |
| 2060 | 0.00% | 1.00% | 0.25% | 9.00% | 1.00% | 59% | 77% | 59% | 77% | 51% | 66% | 60% | 78% | 65% | 85% | 56% | 56% | 59% | 59% |
| 2061 | 0.25% | 1.00% | 0.25% | 9.00% | 1.00% | 61% | 79% | 60% | 78% | 53% | 69% | 61% | 79% | 66% | 86% | 58% | 58% | 60% | 60% |
| 2062 | 1.00% | 1.00% | 0.25% | 9.00% | 1.00% | 63% | 82% | 61% | 79% | 56% | 73% | 63% | 82% | 68% | 88% | 60% | 60% | 62% | 62% |
| 2063 | 0.25% | 9.00% | 0.25% | 9.00% | 1.00% | 69% | 90% | 68% | 88% | 59% | 77% | 68% | 88% | 73% | 95% | 65% | 65% | 67% | 67% |
| 2064 | 0.25% | 0.00% | 1.00% | 9.00% | 1.00% | 59% | 77% | 55% | 72% | 51% | 66% | 59% | 77% | 63% | 82% | 55% | 55% | 58% | 58% |
| 2065 | 1.00% | 0.25% | 1.00% | 9.00% | 1.00% | 65% | 85% | 61% | 79% | 58% | 75% | 66% | 86% | 69% | 90% | 61% | 61% | 64% | 64% |
| 2066 | 9.00% | 0.25% | 1.00% | 9.00% | 1.00% | 61% | 79% | 59% | 77% | 53% | 69% | 63% | 82% | 66% | 86% | 58% | 58% | 61% | 61% |
| 2067 | 0.00% | 1.00% | 1.00% | 9.00% | 1.00% | 64% | 83% | 62% | 81% | 57% | 74% | 66% | 86% | 69% | 90% | 61% | 61% | 64% | 64% |
| 2068 | 0.25% | 1.00% | 1.00% | 9.00% | 1.00% | 66% | 86% | 63% | 82% | 59% | 77% | 67% | 87% | 70% | 91% | 63% | 63% | 65% | 65% |
| 2069 | 1.00% | 1.00% | 1.00% | 9.00% | 1.00% | 68% | 88% | 64% | 83% | 62% | 81% | 69% | 90% | 72% | 94% | 65% | 65% | 68% | 68% |
| 2070 | 0.25% | 0.25% | 9.00% | 9.00% | 1.00% | 73% | 95% | 65% | 85% | 60% | 78% | 75% | 98% | 77% | 100% | 66% | 66% | 71% | 71% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2071 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 2072 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 2073 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 2074 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 2075 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 2076 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 2077 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 2078 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 2079 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 2080 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 2081 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 2082 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 2083 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 2084 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 2085 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 2086 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 2087 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 2088 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 2089 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 2090 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 2091 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 2092 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 2093 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 2094 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 2095 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2096 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 2097 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 2098 | 0.00% | 0.25% | 0.00% | 0.25% | 0.00% | 12% | 16% | 13% | 17% | 13% | 17% | 12% | 16% | 11% | 14% | 13% | 13% | 12% | 12% |
| 2099 | 0.25% | 0.25% | 0.00% | 0.25% | 0.00% | 14% | 18% | 14% | 18% | 15% | 20% | 13% | 17% | 12% | 16% | 14% | 14% | 13% | 13% |
| 2100 | 9.00% | 0.25% | 0.00% | 0.25% | 0.00% | 12% | 16% | 13% | 17% | 13% | 17% | 12% | 16% | 11% | 14% | 13% | 13% | 12% | 12% |
| 2101 | 1.00% | 1.00% | 0.00% | 0.25% | 0.00% | 19% | 25% | 18% | 23% | 22% | 29% | 18% | 23% | 17% | 22% | 20% | 20% | 19% | 19% |
| 2102 | 1.00% | 9.00% | 0.00% | 0.25% | 0.00% | 27% | 35% | 26% | 34% | 28% | 36% | 25% | 33% | 24% | 31% | 27% | 27% | 26% | 26% |
| 2103 | 0.00% | 0.00% | 0.25% | 0.25% | 0.00% | 12% | 16% | 14% | 18% | 13% | 17% | 10% | 13% | 12% | 16% | 13% | 13% | 12% | 12% |
| 2104 | 0.25% | 0.00% | 0.25% | 0.25% | 0.00% | 14% | 18% | 15% | 20% | 15% | 20% | 11% | 14% | 13% | 17% | 15% | 15% | 13% | 13% |
| 2105 | 0.00% | 0.25% | 0.25% | 0.25% | 0.00% | 16% | 21% | 19% | 25% | 17% | 22% | 15% | 20% | 16% | 21% | 17% | 17% | 16% | 16% |
| 2106 | 0.25% | 0.25% | 0.25% | 0.25% | 0.00% | 18% | 23% | 20% | 26% | 19% | 25% | 16% | 21% | 17% | 22% | 19% | 19% | 17% | 17% |
| 2107 | 1.00% | 0.25% | 0.25% | 0.25% | 0.00% | 20% | 26% | 21% | 27% | 22% | 29% | 18% | 23% | 19% | 25% | 21% | 21% | 20% | 20% |
| 2108 | 9.00% | 0.25% | 0.25% | 0.25% | 0.00% | 16% | 21% | 19% | 25% | 17% | 22% | 15% | 20% | 16% | 21% | 17% | 17% | 16% | 16% |
| 2109 | 0.25% | 1.00% | 0.25% | 0.25% | 0.00% | 21% | 27% | 23% | 30% | 23% | 30% | 19% | 25% | 20% | 26% | 22% | 22% | 21% | 21% |
| 2110 | 9.00% | 1.00% | 0.25% | 0.25% | 0.00% | 19% | 25% | 22% | 29% | 21% | 27% | 18% | 23% | 19% | 25% | 21% | 21% | 19% | 19% |
| 2111 | 0.25% | 9.00% | 0.25% | 0.25% | 0.00% | 29% | 38% | 31% | 40% | 29% | 38% | 26% | 34% | 27% | 35% | 30% | 30% | 27% | 27% |
| 2112 | 1.00% | 9.00% | 0.25% | 0.25% | 0.00% | 31% | 40% | 32% | 42% | 32% | 42% | 28% | 36% | 29% | 38% | 32% | 32% | 30% | 30% |
| 2113 | 9.00% | 9.00% | 0.25% | 0.25% | 0.00% | 27% | 35% | 30% | 39% | 27% | 35% | 25% | 33% | 26% | 34% | 28% | 28% | 26% | 26% |
| 2114 | 0.00% | 0.00% | 1.00% | 0.25% | 0.00% | 17% | 22% | 17% | 22% | 19% | 25% | 16% | 21% | 16% | 21% | 18% | 18% | 17% | 17% |
| 2115 | 1.00% | 0.00% | 1.00% | 0.25% | 0.00% | 21% | 27% | 19% | 25% | 24% | 31% | 19% | 25% | 19% | 25% | 21% | 21% | 21% | 21% |
| 2116 | 0.00% | 0.25% | 1.00% | 0.25% | 0.00% | 21% | 27% | 22% | 29% | 23% | 30% | 21% | 27% | 20% | 26% | 22% | 22% | 21% | 21% |
| 2117 | 0.25% | 0.25% | 1.00% | 0.25% | 0.00% | 23% | 30% | 23% | 30% | 25% | 33% | 22% | 29% | 21% | 27% | 24% | 24% | 23% | 23% |
| 2118 | 1.00% | 0.25% | 1.00% | 0.25% | 0.00% | 25% | 33% | 24% | 31% | 28% | 36% | 24% | 31% | 23% | 30% | 26% | 26% | 25% | 25% |
| 2119 | 9.00% | 0.25% | 1.00% | 0.25% | 0.00% | 21% | 27% | 22% | 29% | 23% | 30% | 21% | 27% | 20% | 26% | 22% | 22% | 21% | 21% |
| 2120 | 0.00% | 1.00% | 1.00% | 0.25% | 0.00% | 24% | 31% | 25% | 33% | 27% | 35% | 24% | 31% | 23% | 30% | 25% | 25% | 25% | 25% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2121 | 0.25% | 1.00% | 1.00% | 0.25% | 0.00% | 26% | 34% | 26% | 34% | 29% | 38% | 25% | 33% | 24% | 31% | 27% | 27% | 26% | 26% |
| 2122 | 1.00% | 1.00% | 1.00% | 0.25% | 0.00% | 28% | 36% | 27% | 35% | 32% | 42% | 27% | 35% | 26% | 34% | 29% | 29% | 28% | 28% |
| 2123 | 9.00% | 1.00% | 1.00% | 0.25% | 0.00% | 24% | 31% | 25% | 33% | 27% | 35% | 24% | 31% | 23% | 30% | 25% | 25% | 25% | 25% |
| 2124 | 0.00% | 9.00% | 1.00% | 0.25% | 0.00% | 32% | 42% | 33% | 43% | 33% | 43% | 31% | 40% | 30% | 39% | 33% | 33% | 31% | 31% |
| 2125 | 0.25% | 9.00% | 1.00% | 0.25% | 0.00% | 34% | 44% | 34% | 44% | 35% | 46% | 32% | 42% | 31% | 40% | 34% | 34% | 33% | 33% |
| 2126 | 1.00% | 9.00% | 1.00% | 0.25% | 0.00% | 36% | 47% | 35% | 46% | 38% | 49% | 34% | 44% | 33% | 43% | 36% | 36% | 35% | 35% |
| 2127 | 0.25% | 0.25% | 9.00% | 0.25% | 0.00% | 33% | 43% | 28% | 36% | 30% | 39% | 33% | 43% | 31% | 40% | 30% | 30% | 31% | 31% |
| 2128 | 1.00% | 0.25% | 9.00% | 0.25% | 0.00% | 35% | 46% | 29% | 38% | 33% | 43% | 35% | 46% | 33% | 43% | 32% | 32% | 34% | 34% |
| 2129 | 9.00% | 0.25% | 9.00% | 0.25% | 0.00% | 31% | 40% | 27% | 35% | 28% | 36% | 32% | 42% | 30% | 39% | 29% | 29% | 30% | 30% |
| 2130 | 0.00% | 1.00% | 9.00% | 0.25% | 0.00% | 34% | 44% | 30% | 39% | 32% | 42% | 35% | 46% | 33% | 43% | 32% | 32% | 33% | 33% |
| 2131 | 0.25% | 1.00% | 9.00% | 0.25% | 0.00% | 36% | 47% | 31% | 40% | 34% | 44% | 36% | 47% | 34% | 44% | 34% | 34% | 35% | 35% |
| 2132 | 9.00% | 1.00% | 9.00% | 0.25% | 0.00% | 34% | 44% | 30% | 39% | 32% | 42% | 35% | 46% | 33% | 43% | 32% | 32% | 33% | 33% |
| 2133 | 1.00% | 9.00% | 9.00% | 0.25% | 0.00% | 46% | 60% | 40% | 52% | 43% | 56% | 45% | 59% | 43% | 56% | 43% | 43% | 44% | 44% |
| 2134 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 2135 | 1.00% | 0.25% | 0.00% | 1.00% | 0.00% | 33% | 43% | 28% | 36% | 31% | 40% | 30% | 39% | 27% | 35% | 31% | 31% | 29% | 29% |
| 2136 | 0.00% | 1.00% | 0.00% | 1.00% | 0.00% | 32% | 42% | 29% | 38% | 30% | 39% | 30% | 39% | 27% | 35% | 30% | 30% | 29% | 29% |
| 2137 | 0.25% | 1.00% | 0.00% | 1.00% | 0.00% | 34% | 44% | 30% | 39% | 32% | 42% | 31% | 40% | 28% | 36% | 32% | 32% | 30% | 30% |
| 2138 | 1.00% | 1.00% | 0.00% | 1.00% | 0.00% | 36% | 47% | 31% | 40% | 35% | 46% | 33% | 43% | 30% | 39% | 34% | 34% | 33% | 33% |
| 2139 | 0.00% | 0.00% | 0.25% | 1.00% | 0.00% | 29% | 38% | 27% | 35% | 26% | 34% | 25% | 33% | 25% | 33% | 27% | 27% | 25% | 25% |
| 2140 | 1.00% | 0.00% | 0.25% | 1.00% | 0.00% | 33% | 43% | 29% | 38% | 31% | 40% | 28% | 36% | 28% | 36% | 31% | 31% | 29% | 29% |
| 2141 | 0.25% | 0.25% | 0.25% | 1.00% | 0.00% | 35% | 46% | 33% | 43% | 32% | 42% | 31% | 40% | 30% | 39% | 33% | 33% | 31% | 31% |
| 2142 | 1.00% | 0.25% | 0.25% | 1.00% | 0.00% | 37% | 48% | 34% | 44% | 35% | 46% | 33% | 43% | 32% | 42% | 35% | 35% | 33% | 33% |
| 2143 | 9.00% | 0.25% | 0.25% | 1.00% | 0.00% | 33% | 43% | 32% | 42% | 30% | 39% | 30% | 39% | 29% | 38% | 32% | 32% | 30% | 30% |
| 2144 | 0.00% | 1.00% | 0.25% | 1.00% | 0.00% | 36% | 47% | 35% | 46% | 34% | 44% | 33% | 43% | 32% | 42% | 35% | 35% | 33% | 33% |
| 2145 | 0.25% | 1.00% | 0.25% | 1.00% | 0.00% | 38% | 49% | 36% | 47% | 36% | 47% | 34% | 44% | 33% | 43% | 37% | 37% | 34% | 34% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2146 | 1.00% | 1.00% | 0.25% | 1.00% | 0.00% | 40% | 52% | 37% | 48% | 39% | 51% | 36% | 47% | 35% | 46% | 39% | 39% | 37% | 37% |
| 2147 | 9.00% | 1.00% | 0.25% | 1.00% | 0.00% | 36% | 47% | 35% | 46% | 34% | 44% | 33% | 43% | 32% | 42% | 35% | 35% | 33% | 33% |
| 2148 | 0.25% | 9.00% | 0.25% | 1.00% | 0.00% | 46% | 60% | 44% | 57% | 42% | 55% | 41% | 53% | 40% | 52% | 44% | 44% | 41% | 41% |
| 2149 | 1.00% | 9.00% | 0.25% | 1.00% | 0.00% | 48% | 62% | 45% | 59% | 45% | 59% | 43% | 56% | 42% | 55% | 46% | 46% | 43% | 43% |
| 2150 | 9.00% | 9.00% | 0.25% | 1.00% | 0.00% | 44% | 57% | 43% | 56% | 40% | 52% | 40% | 52% | 39% | 51% | 42% | 42% | 40% | 40% |
| 2151 | 0.00% | 0.00% | 1.00% | 1.00% | 0.00% | 34% | 44% | 30% | 39% | 32% | 42% | 31% | 40% | 29% | 38% | 32% | 32% | 31% | 31% |
| 2152 | 0.25% | 0.00% | 1.00% | 1.00% | 0.00% | 36% | 47% | 31% | 40% | 34% | 44% | 32% | 42% | 30% | 39% | 34% | 34% | 32% | 32% |
| 2153 | 1.00% | 0.00% | 1.00% | 1.00% | 0.00% | 38% | 49% | 32% | 42% | 37% | 48% | 34% | 44% | 32% | 42% | 36% | 36% | 34% | 34% |
| 2154 | 0.00% | 0.25% | 1.00% | 1.00% | 0.00% | 38% | 49% | 35% | 46% | 36% | 47% | 36% | 47% | 33% | 43% | 36% | 36% | 35% | 35% |
| 2155 | 1.00% | 0.25% | 1.00% | 1.00% | 0.00% | 42% | 55% | 37% | 48% | 41% | 53% | 39% | 51% | 36% | 47% | 40% | 40% | 39% | 39% |
| 2156 | 9.00% | 0.25% | 1.00% | 1.00% | 0.00% | 38% | 49% | 35% | 46% | 36% | 47% | 36% | 47% | 33% | 43% | 36% | 36% | 35% | 35% |
| 2157 | 0.00% | 1.00% | 1.00% | 1.00% | 0.00% | 41% | 53% | 38% | 49% | 40% | 52% | 39% | 51% | 36% | 47% | 40% | 40% | 38% | 38% |
| 2158 | 0.25% | 1.00% | 1.00% | 1.00% | 0.00% | 43% | 56% | 39% | 51% | 42% | 55% | 40% | 52% | 37% | 48% | 41% | 41% | 40% | 40% |
| 2159 | 1.00% | 1.00% | 1.00% | 1.00% | 0.00% | 45% | 59% | 40% | 52% | 45% | 59% | 42% | 55% | 39% | 51% | 43% | 43% | 42% | 42% |
| 2160 | 9.00% | 1.00% | 1.00% | 1.00% | 0.00% | 41% | 53% | 38% | 49% | 40% | 52% | 39% | 51% | 36% | 47% | 40% | 40% | 38% | 38% |
| 2161 | 0.00% | 9.00% | 1.00% | 1.00% | 0.00% | 49% | 64% | 46% | 60% | 46% | 60% | 46% | 60% | 43% | 56% | 47% | 47% | 45% | 45% |
| 2162 | 0.25% | 9.00% | 1.00% | 1.00% | 0.00% | 51% | 66% | 47% | 61% | 48% | 62% | 47% | 61% | 44% | 57% | 49% | 49% | 46% | 46% |
| 2163 | 1.00% | 9.00% | 1.00% | 1.00% | 0.00% | 53% | 69% | 48% | 62% | 51% | 66% | 49% | 64% | 46% | 60% | 51% | 51% | 49% | 49% |
| 2164 | 0.25% | 0.25% | 9.00% | 1.00% | 0.00% | 50% | 65% | 41% | 53% | 43% | 56% | 48% | 62% | 44% | 57% | 45% | 45% | 45% | 45% |
| 2165 | 1.00% | 0.25% | 9.00% | 1.00% | 0.00% | 52% | 68% | 42% | 55% | 46% | 60% | 50% | 65% | 46% | 60% | 47% | 47% | 47% | 47% |
| 2166 | 9.00% | 0.25% | 9.00% | 1.00% | 0.00% | 48% | 62% | 40% | 52% | 41% | 53% | 47% | 61% | 43% | 56% | 43% | 43% | 44% | 44% |
| 2167 | 0.25% | 1.00% | 9.00% | 1.00% | 0.00% | 53% | 69% | 44% | 57% | 47% | 61% | 51% | 66% | 47% | 61% | 48% | 48% | 48% | 48% |
| 2168 | 0.00% | 0.25% | 0.00% | 9.00% | 0.00% | 46% | 60% | 40% | 52% | 38% | 49% | 43% | 56% | 38% | 49% | 41% | 41% | 40% | 40% |
| 2169 | 0.00% | 0.00% | 0.25% | 9.00% | 0.00% | 46% | 60% | 41% | 53% | 38% | 49% | 41% | 53% | 39% | 51% | 42% | 42% | 39% | 39% |
| 2170 | 0.25% | 0.00% | 0.25% | 9.00% | 0.00% | 48% | 62% | 42% | 55% | 40% | 52% | 42% | 55% | 40% | 52% | 43% | 43% | 41% | 41% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2171 | 0.00% | 0.25% | 0.25% | 9.00% | 0.00% | 50% | 65% | 46% | 60% | 42% | 55% | 46% | 60% | 43% | 56% | 46% | 46% | 44% | 44% |
| 2172 | 0.25% | 0.25% | 0.25% | 9.00% | 0.00% | 52% | 68% | 47% | 61% | 44% | 57% | 47% | 61% | 44% | 57% | 48% | 48% | 45% | 45% |
| 2173 | 1.00% | 0.25% | 0.25% | 9.00% | 0.00% | 54% | 70% | 48% | 62% | 47% | 61% | 49% | 64% | 46% | 60% | 50% | 50% | 47% | 47% |
| 2174 | 9.00% | 0.25% | 0.25% | 9.00% | 0.00% | 50% | 65% | 46% | 60% | 42% | 55% | 46% | 60% | 43% | 56% | 46% | 46% | 44% | 44% |
| 2175 | 0.00% | 1.00% | 0.25% | 9.00% | 0.00% | 53% | 69% | 49% | 64% | 46% | 60% | 49% | 64% | 46% | 60% | 49% | 49% | 47% | 47% |
| 2176 | 0.25% | 1.00% | 0.25% | 9.00% | 0.00% | 55% | 72% | 50% | 65% | 48% | 62% | 50% | 65% | 47% | 61% | 51% | 51% | 48% | 48% |
| 2177 | 1.00% | 1.00% | 0.25% | 9.00% | 0.00% | 57% | 74% | 51% | 66% | 51% | 66% | 52% | 68% | 49% | 64% | 53% | 53% | 51% | 51% |
| 2178 | 0.25% | 9.00% | 0.25% | 9.00% | 0.00% | 63% | 82% | 58% | 75% | 54% | 70% | 57% | 74% | 54% | 70% | 58% | 58% | 55% | 55% |
| 2179 | 0.25% | 0.00% | 1.00% | 9.00% | 0.00% | 53% | 69% | 45% | 59% | 46% | 60% | 48% | 62% | 44% | 57% | 48% | 48% | 46% | 46% |
| 2180 | 1.00% | 0.25% | 1.00% | 9.00% | 0.00% | 59% | 77% | 51% | 66% | 53% | 69% | 55% | 72% | 50% | 65% | 54% | 54% | 53% | 53% |
| 2181 | 9.00% | 0.25% | 1.00% | 9.00% | 0.00% | 55% | 72% | 49% | 64% | 48% | 62% | 52% | 68% | 47% | 61% | 51% | 51% | 49% | 49% |
| 2182 | 0.00% | 1.00% | 1.00% | 9.00% | 0.00% | 58% | 75% | 52% | 68% | 52% | 68% | 55% | 72% | 50% | 65% | 54% | 54% | 52% | 52% |
| 2183 | 0.25% | 1.00% | 1.00% | 9.00% | 0.00% | 60% | 78% | 53% | 69% | 54% | 70% | 56% | 73% | 51% | 66% | 56% | 56% | 54% | 54% |
| 2184 | 1.00% | 1.00% | 1.00% | 9.00% | 0.00% | 62% | 81% | 54% | 70% | 57% | 74% | 58% | 75% | 53% | 69% | 58% | 58% | 56% | 56% |
| 2185 | 0.25% | 0.25% | 9.00% | 9.00% | 0.00% | 67% | 87% | 55% | 72% | 55% | 72% | 64% | 83% | 58% | 75% | 59% | 59% | 59% | 59% |
| 2186 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 2187 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 2188 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 2189 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 2190 | 0.25% | 0.00% | 0.25% | 0.00% | 0.25% | 12% | 16% | 14% | 18% | 12% | 16% | 9% | 12% | 13% | 17% | 13% | 13% | 11% | 11% |
| 2191 | 1.00% | 0.00% | 0.25% | 0.00% | 0.25% | 14% | 18% | 15% | 20% | 15% | 20% | 11% | 14% | 15% | 20% | 15% | 15% | 14% | 14% |
| 2192 | 0.00% | 0.25% | 0.25% | 0.00% | 0.25% | 14% | 18% | 18% | 23% | 14% | 18% | 13% | 17% | 16% | 21% | 15% | 15% | 14% | 14% |
| 2193 | 0.25% | 0.25% | 0.25% | 0.00% | 0.25% | 16% | 21% | 19% | 25% | 16% | 21% | 14% | 18% | 17% | 22% | 17% | 17% | 16% | 16% |
| 2194 | 0.00% | 1.00% | 0.25% | 0.00% | 0.25% | 17% | 22% | 21% | 27% | 18% | 23% | 16% | 21% | 19% | 25% | 19% | 19% | 18% | 18% |
| 2195 | 1.00% | 1.00% | 0.25% | 0.00% | 0.25% | 21% | 27% | 23% | 30% | 23% | 30% | 19% | 25% | 22% | 29% | 22% | 22% | 21% | 21% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2196 | 1.00% | 9.00% | 0.25% | 0.00% | 0.25% | 29% | 38% | 31% | 40% | 29% | 38% | 26% | 34% | 29% | 38% | 30% | 30% | 28% | 28% |
| 2197 | 0.25% | 0.00% | 1.00% | 0.00% | 0.25% | 17% | 22% | 17% | 22% | 18% | 23% | 15% | 20% | 17% | 22% | 17% | 17% | 17% | 17% |
| 2198 | 1.00% | 0.00% | 1.00% | 0.00% | 0.25% | 19% | 25% | 18% | 23% | 21% | 27% | 17% | 22% | 19% | 25% | 19% | 19% | 19% | 19% |
| 2199 | 0.00% | 0.25% | 1.00% | 0.00% | 0.25% | 19% | 25% | 21% | 27% | 20% | 26% | 19% | 25% | 20% | 26% | 20% | 20% | 20% | 20% |
| 2200 | 1.00% | 0.25% | 1.00% | 0.00% | 0.25% | 23% | 30% | 23% | 30% | 25% | 33% | 22% | 29% | 23% | 30% | 24% | 24% | 23% | 23% |
| 2201 | 0.00% | 1.00% | 1.00% | 0.00% | 0.25% | 22% | 29% | 24% | 31% | 24% | 31% | 22% | 29% | 23% | 30% | 23% | 23% | 23% | 23% |
| 2202 | 0.25% | 1.00% | 1.00% | 0.00% | 0.25% | 24% | 31% | 25% | 33% | 26% | 34% | 23% | 30% | 24% | 31% | 25% | 25% | 24% | 24% |
| 2203 | 1.00% | 1.00% | 1.00% | 0.00% | 0.25% | 26% | 34% | 26% | 34% | 29% | 38% | 25% | 33% | 26% | 34% | 27% | 27% | 27% | 27% |
| 2204 | 9.00% | 1.00% | 1.00% | 0.00% | 0.25% | 22% | 29% | 24% | 31% | 24% | 31% | 22% | 29% | 23% | 30% | 23% | 23% | 23% | 23% |
| 2205 | 1.00% | 9.00% | 1.00% | 0.00% | 0.25% | 34% | 44% | 34% | 44% | 35% | 46% | 32% | 42% | 33% | 43% | 34% | 34% | 33% | 33% |
| 2206 | 0.25% | 0.00% | 9.00% | 0.00% | 0.25% | 27% | 35% | 22% | 29% | 23% | 30% | 26% | 34% | 27% | 35% | 24% | 24% | 25% | 25% |
| 2207 | 0.00% | 0.25% | 9.00% | 0.00% | 0.25% | 29% | 38% | 26% | 34% | 25% | 33% | 30% | 39% | 30% | 39% | 27% | 27% | 28% | 28% |
| 2208 | 0.25% | 0.25% | 9.00% | 0.00% | 0.25% | 31% | 40% | 27% | 35% | 27% | 35% | 31% | 40% | 31% | 40% | 28% | 28% | 30% | 30% |
| 2209 | 1.00% | 0.25% | 9.00% | 0.00% | 0.25% | 33% | 43% | 28% | 36% | 30% | 39% | 33% | 43% | 33% | 43% | 30% | 30% | 32% | 32% |
| 2210 | 0.25% | 1.00% | 9.00% | 0.00% | 0.25% | 34% | 44% | 30% | 39% | 31% | 40% | 34% | 44% | 34% | 44% | 32% | 32% | 33% | 33% |
| 2211 | 0.25% | 0.00% | 0.00% | 0.25% | 0.25% | 16% | 21% | 16% | 21% | 17% | 22% | 13% | 17% | 15% | 20% | 16% | 16% | 15% | 15% |
| 2212 | 1.00% | 0.00% | 0.00% | 0.25% | 0.25% | 18% | 23% | 17% | 22% | 20% | 26% | 15% | 20% | 17% | 22% | 18% | 18% | 17% | 17% |
| 2213 | 0.00% | 0.25% | 0.00% | 0.25% | 0.25% | 18% | 23% | 20% | 26% | 19% | 25% | 17% | 22% | 18% | 23% | 19% | 19% | 18% | 18% |
| 2214 | 0.25% | 0.25% | 0.00% | 0.25% | 0.25% | 20% | 26% | 21% | 27% | 21% | 27% | 18% | 23% | 19% | 25% | 21% | 21% | 19% | 19% |
| 2215 | 9.00% | 0.25% | 0.00% | 0.25% | 0.25% | 18% | 23% | 20% | 26% | 19% | 25% | 17% | 22% | 18% | 23% | 19% | 19% | 18% | 18% |
| 2216 | 1.00% | 1.00% | 0.00% | 0.25% | 0.25% | 25% | 33% | 25% | 33% | 28% | 36% | 23% | 30% | 24% | 31% | 26% | 26% | 25% | 25% |
| 2217 | 1.00% | 9.00% | 0.00% | 0.25% | 0.25% | 33% | 43% | 33% | 43% | 34% | 44% | 30% | 39% | 31% | 40% | 33% | 33% | 32% | 32% |
| 2218 | 0.00% | 0.00% | 0.25% | 0.25% | 0.25% | 18% | 23% | 21% | 27% | 19% | 25% | 15% | 20% | 19% | 25% | 19% | 19% | 18% | 18% |
| 2219 | 0.25% | 0.00% | 0.25% | 0.25% | 0.25% | 20% | 26% | 22% | 29% | 21% | 27% | 16% | 21% | 20% | 26% | 21% | 21% | 19% | 19% |
| 2220 | 0.00% | 0.25% | 0.25% | 0.25% | 0.25% | 22% | 29% | 26% | 34% | 23% | 30% | 20% | 26% | 23% | 30% | 24% | 24% | 22% | 22% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2221 | 0.25% | 0.25% | 0.25% | 0.25% | 0.25% | 24% | 31% | 27% | 35% | 25% | 33% | 21% | 27% | 24% | 31% | 25% | 25% | 23% | 23% |
| 2222 | 1.00% | 0.25% | 0.25% | 0.25% | 0.25% | 26% | 34% | 28% | 36% | 28% | 36% | 23% | 30% | 26% | 34% | 27% | 27% | 26% | 26% |
| 2223 | 9.00% | 0.25% | 0.25% | 0.25% | 0.25% | 22% | 29% | 26% | 34% | 23% | 30% | 20% | 26% | 23% | 30% | 24% | 24% | 22% | 22% |
| 2224 | 0.25% | 1.00% | 0.25% | 0.25% | 0.25% | 27% | 35% | 30% | 39% | 29% | 38% | 24% | 31% | 27% | 35% | 29% | 29% | 27% | 27% |
| 2225 | 9.00% | 1.00% | 0.25% | 0.25% | 0.25% | 25% | 33% | 29% | 38% | 27% | 35% | 23% | 30% | 26% | 34% | 27% | 27% | 25% | 25% |
| 2226 | 0.25% | 9.00% | 0.25% | 0.25% | 0.25% | 35% | 46% | 38% | 49% | 35% | 46% | 31% | 40% | 34% | 44% | 36% | 36% | 33% | 33% |
| 2227 | 1.00% | 9.00% | 0.25% | 0.25% | 0.25% | 37% | 48% | 39% | 51% | 38% | 49% | 33% | 43% | 36% | 47% | 38% | 38% | 36% | 36% |
| 2228 | 9.00% | 9.00% | 0.25% | 0.25% | 0.25% | 33% | 43% | 37% | 48% | 33% | 43% | 30% | 39% | 33% | 43% | 34% | 34% | 32% | 32% |
| 2229 | 0.00% | 0.00% | 1.00% | 0.25% | 0.25% | 23% | 30% | 24% | 31% | 25% | 33% | 21% | 27% | 23% | 30% | 24% | 24% | 23% | 23% |
| 2230 | 1.00% | 0.00% | 1.00% | 0.25% | 0.25% | 27% | 35% | 26% | 34% | 30% | 39% | 24% | 31% | 26% | 34% | 28% | 28% | 27% | 27% |
| 2231 | 0.00% | 0.25% | 1.00% | 0.25% | 0.25% | 27% | 35% | 29% | 38% | 29% | 38% | 26% | 34% | 27% | 35% | 28% | 28% | 27% | 27% |
| 2232 | 0.25% | 0.25% | 1.00% | 0.25% | 0.25% | 29% | 38% | 30% | 39% | 31% | 40% | 27% | 35% | 28% | 36% | 30% | 30% | 29% | 29% |
| 2233 | 1.00% | 0.25% | 1.00% | 0.25% | 0.25% | 31% | 40% | 31% | 40% | 34% | 44% | 29% | 38% | 30% | 39% | 32% | 32% | 31% | 31% |
| 2234 | 9.00% | 0.25% | 1.00% | 0.25% | 0.25% | 27% | 35% | 29% | 38% | 29% | 38% | 26% | 34% | 27% | 35% | 28% | 28% | 27% | 27% |
| 2235 | 0.00% | 1.00% | 1.00% | 0.25% | 0.25% | 30% | 39% | 32% | 42% | 33% | 43% | 29% | 38% | 30% | 39% | 32% | 32% | 31% | 31% |
| 2236 | 0.25% | 1.00% | 1.00% | 0.25% | 0.25% | 32% | 42% | 33% | 43% | 35% | 46% | 30% | 39% | 31% | 40% | 33% | 33% | 32% | 32% |
| 2237 | 1.00% | 1.00% | 1.00% | 0.25% | 0.25% | 34% | 44% | 34% | 44% | 38% | 49% | 32% | 42% | 33% | 43% | 35% | 35% | 34% | 34% |
| 2238 | 9.00% | 1.00% | 1.00% | 0.25% | 0.25% | 30% | 39% | 32% | 42% | 33% | 43% | 29% | 38% | 30% | 39% | 32% | 32% | 31% | 31% |
| 2239 | 0.00% | 9.00% | 1.00% | 0.25% | 0.25% | 38% | 49% | 40% | 52% | 39% | 51% | 36% | 47% | 37% | 48% | 39% | 39% | 37% | 37% |
| 2240 | 0.25% | 9.00% | 1.00% | 0.25% | 0.25% | 40% | 52% | 41% | 53% | 41% | 53% | 37% | 48% | 38% | 49% | 41% | 41% | 39% | 39% |
| 2241 | 1.00% | 9.00% | 1.00% | 0.25% | 0.25% | 42% | 55% | 42% | 55% | 44% | 57% | 39% | 51% | 40% | 52% | 43% | 43% | 41% | 41% |
| 2242 | 0.25% | 0.25% | 9.00% | 0.25% | 0.25% | 39% | 51% | 35% | 46% | 36% | 47% | 38% | 49% | 38% | 49% | 37% | 37% | 37% | 37% |
| 2243 | 1.00% | 0.25% | 9.00% | 0.25% | 0.25% | 41% | 53% | 36% | 47% | 39% | 51% | 40% | 52% | 40% | 52% | 39% | 39% | 40% | 40% |
| 2244 | 9.00% | 0.25% | 9.00% | 0.25% | 0.25% | 37% | 48% | 34% | 44% | 34% | 44% | 37% | 48% | 37% | 48% | 35% | 35% | 36% | 36% |
| 2245 | 0.00% | 1.00% | 9.00% | 0.25% | 0.25% | 40% | 52% | 37% | 48% | 38% | 49% | 40% | 52% | 40% | 52% | 38% | 38% | 39% | 39% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2246 | 0.25% | 1.00% | 9.00% | 0.25% | 0.25% | 42% | 55% | 38% | 49% | 40% | 52% | 41% | 53% | 41% | 53% | 40% | 40% | 41% | 41% |
| 2247 | 9.00% | 1.00% | 9.00% | 0.25% | 0.25% | 40% | 52% | 37% | 48% | 38% | 49% | 40% | 52% | 40% | 52% | 38% | 38% | 39% | 39% |
| 2248 | 1.00% | 9.00% | 9.00% | 0.25% | 0.25% | 52% | 68% | 47% | 61% | 49% | 64% | 50% | 65% | 50% | 65% | 49% | 49% | 50% | 50% |
| 2249 | 0.25% | 0.00% | 0.00% | 1.00% | 0.25% | 33% | 43% | 29% | 38% | 30% | 39% | 28% | 36% | 28% | 36% | 31% | 31% | 29% | 29% |
| 2250 | 1.00% | 0.25% | 0.00% | 1.00% | 0.25% | 39% | 51% | 35% | 46% | 37% | 48% | 35% | 46% | 34% | 44% | 37% | 37% | 35% | 35% |
| 2251 | 0.00% | 1.00% | 0.00% | 1.00% | 0.25% | 38% | 49% | 36% | 47% | 36% | 47% | 35% | 46% | 34% | 44% | 37% | 37% | 35% | 35% |
| 2252 | 0.25% | 1.00% | 0.00% | 1.00% | 0.25% | 40% | 52% | 37% | 48% | 38% | 49% | 36% | 47% | 35% | 46% | 38% | 38% | 36% | 36% |
| 2253 | 1.00% | 1.00% | 0.00% | 1.00% | 0.25% | 42% | 55% | 38% | 49% | 41% | 53% | 38% | 49% | 37% | 48% | 40% | 40% | 39% | 39% |
| 2254 | 0.00% | 0.00% | 0.25% | 1.00% | 0.25% | 35% | 46% | 34% | 44% | 32% | 42% | 30% | 39% | 32% | 42% | 34% | 34% | 31% | 31% |
| 2255 | 1.00% | 0.00% | 0.25% | 1.00% | 0.25% | 39% | 51% | 36% | 47% | 37% | 48% | 33% | 43% | 35% | 46% | 37% | 37% | 35% | 35% |
| 2256 | 0.25% | 0.25% | 0.25% | 1.00% | 0.25% | 41% | 53% | 40% | 52% | 38% | 49% | 36% | 47% | 37% | 48% | 40% | 40% | 37% | 37% |
| 2257 | 1.00% | 0.25% | 0.25% | 1.00% | 0.25% | 43% | 56% | 41% | 53% | 41% | 53% | 38% | 49% | 39% | 51% | 42% | 42% | 39% | 39% |
| 2258 | 9.00% | 0.25% | 0.25% | 1.00% | 0.25% | 39% | 51% | 39% | 51% | 36% | 47% | 35% | 46% | 36% | 47% | 38% | 38% | 36% | 36% |
| 2259 | 0.00% | 1.00% | 0.25% | 1.00% | 0.25% | 42% | 55% | 42% | 55% | 40% | 52% | 38% | 49% | 39% | 51% | 41% | 41% | 39% | 39% |
| 2260 | 0.25% | 1.00% | 0.25% | 1.00% | 0.25% | 44% | 57% | 43% | 56% | 42% | 55% | 39% | 51% | 40% | 52% | 43% | 43% | 40% | 40% |
| 2261 | 1.00% | 1.00% | 0.25% | 1.00% | 0.25% | 46% | 60% | 44% | 57% | 45% | 59% | 41% | 53% | 42% | 55% | 45% | 45% | 43% | 43% |
| 2262 | 9.00% | 1.00% | 0.25% | 1.00% | 0.25% | 42% | 55% | 42% | 55% | 40% | 52% | 38% | 49% | 39% | 51% | 41% | 41% | 39% | 39% |
| 2263 | 0.25% | 9.00% | 0.25% | 1.00% | 0.25% | 52% | 68% | 51% | 66% | 48% | 62% | 46% | 60% | 47% | 61% | 50% | 50% | 47% | 47% |
| 2264 | 1.00% | 9.00% | 0.25% | 1.00% | 0.25% | 54% | 70% | 52% | 68% | 51% | 66% | 48% | 62% | 49% | 64% | 52% | 52% | 49% | 49% |
| 2265 | 9.00% | 9.00% | 0.25% | 1.00% | 0.25% | 50% | 65% | 50% | 65% | 46% | 60% | 45% | 59% | 46% | 60% | 49% | 49% | 46% | 46% |
| 2266 | 0.00% | 0.00% | 1.00% | 1.00% | 0.25% | 40% | 52% | 37% | 48% | 38% | 49% | 36% | 47% | 36% | 47% | 38% | 38% | 37% | 37% |
| 2267 | 0.25% | 0.00% | 1.00% | 1.00% | 0.25% | 42% | 55% | 38% | 49% | 40% | 52% | 37% | 48% | 37% | 48% | 40% | 40% | 38% | 38% |
| 2268 | 1.00% | 0.00% | 1.00% | 1.00% | 0.25% | 44% | 57% | 39% | 51% | 43% | 56% | 39% | 51% | 39% | 51% | 42% | 42% | 40% | 40% |
| 2269 | 0.00% | 0.25% | 1.00% | 1.00% | 0.25% | 44% | 57% | 42% | 55% | 42% | 55% | 41% | 53% | 40% | 52% | 43% | 43% | 41% | 41% |
| 2270 | 1.00% | 0.25% | 1.00% | 1.00% | 0.25% | 48% | 62% | 44% | 57% | 47% | 61% | 44% | 57% | 43% | 56% | 46% | 46% | 45% | 45% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2271 | 9.00% | 0.25% | 1.00% | 1.00% | 0.25% | 44% | 57% | 42% | 55% | 42% | 55% | 41% | 53% | 40% | 52% | 43% | 43% | 41% | 41% |
| 2272 | 0.00% | 1.00% | 1.00% | 1.00% | 0.25% | 47% | 61% | 45% | 59% | 46% | 60% | 44% | 57% | 43% | 56% | 46% | 46% | 44% | 44% |
| 2273 | 0.25% | 1.00% | 1.00% | 1.00% | 0.25% | 49% | 64% | 46% | 60% | 48% | 62% | 45% | 59% | 44% | 57% | 48% | 48% | 46% | 46% |
| 2274 | 1.00% | 1.00% | 1.00% | 1.00% | 0.25% | 51% | 66% | 47% | 61% | 51% | 66% | 47% | 61% | 46% | 60% | 50% | 50% | 48% | 48% |
| 2275 | 9.00% | 1.00% | 1.00% | 1.00% | 0.25% | 47% | 61% | 45% | 59% | 46% | 60% | 44% | 57% | 43% | 56% | 46% | 46% | 44% | 44% |
| 2276 | 0.00% | 9.00% | 1.00% | 1.00% | 0.25% | 55% | 72% | 53% | 69% | 52% | 68% | 51% | 66% | 50% | 65% | 53% | 53% | 51% | 51% |
| 2277 | 0.25% | 9.00% | 1.00% | 1.00% | 0.25% | 57% | 74% | 54% | 70% | 54% | 70% | 52% | 68% | 51% | 66% | 55% | 55% | 52% | 52% |
| 2278 | 1.00% | 9.00% | 1.00% | 1.00% | 0.25% | 59% | 77% | 55% | 72% | 57% | 74% | 54% | 70% | 53% | 69% | 57% | 57% | 55% | 55% |
| 2279 | 0.25% | 0.25% | 9.00% | 1.00% | 0.25% | 56% | 73% | 48% | 62% | 49% | 64% | 53% | 69% | 51% | 66% | 51% | 51% | 51% | 51% |
| 2280 | 1.00% | 0.25% | 9.00% | 1.00% | 0.25% | 58% | 75% | 49% | 64% | 52% | 68% | 55% | 72% | 53% | 69% | 53% | 53% | 53% | 53% |
| 2281 | 9.00% | 0.25% | 9.00% | 1.00% | 0.25% | 54% | 70% | 47% | 61% | 47% | 61% | 52% | 68% | 50% | 65% | 49% | 49% | 50% | 50% |
| 2282 | 0.25% | 1.00% | 9.00% | 1.00% | 0.25% | 59% | 77% | 51% | 66% | 53% | 69% | 56% | 73% | 54% | 70% | 54% | 54% | 54% | 54% |
| 2283 | 0.00% | 0.25% | 0.00% | 9.00% | 0.25% | 52% | 68% | 47% | 61% | 44% | 57% | 48% | 62% | 45% | 59% | 48% | 48% | 46% | 46% |
| 2284 | 0.00% | 0.00% | 0.25% | 9.00% | 0.25% | 52% | 68% | 48% | 62% | 44% | 57% | 46% | 60% | 46% | 60% | 48% | 48% | 45% | 45% |
| 2285 | 0.25% | 0.00% | 0.25% | 9.00% | 0.25% | 54% | 70% | 49% | 64% | 46% | 60% | 47% | 61% | 47% | 61% | 50% | 50% | 47% | 47% |
| 2286 | 0.00% | 0.25% | 0.25% | 9.00% | 0.25% | 56% | 73% | 53% | 69% | 48% | 62% | 51% | 66% | 50% | 65% | 52% | 52% | 50% | 50% |
| 2287 | 0.25% | 0.25% | 0.25% | 9.00% | 0.25% | 58% | 75% | 54% | 70% | 50% | 65% | 52% | 68% | 51% | 66% | 54% | 54% | 51% | 51% |
| 2288 | 1.00% | 0.25% | 0.25% | 9.00% | 0.25% | 60% | 78% | 55% | 72% | 53% | 69% | 54% | 70% | 53% | 69% | 56% | 56% | 53% | 53% |
| 2289 | 9.00% | 0.25% | 0.25% | 9.00% | 0.25% | 56% | 73% | 53% | 69% | 48% | 62% | 51% | 66% | 50% | 65% | 52% | 52% | 50% | 50% |
| 2290 | 0.00% | 1.00% | 0.25% | 9.00% | 0.25% | 59% | 77% | 56% | 73% | 52% | 68% | 54% | 70% | 53% | 69% | 56% | 56% | 53% | 53% |
| 2291 | 0.25% | 1.00% | 0.25% | 9.00% | 0.25% | 61% | 79% | 57% | 74% | 54% | 70% | 55% | 72% | 54% | 70% | 57% | 57% | 54% | 54% |
| 2292 | 1.00% | 1.00% | 0.25% | 9.00% | 0.25% | 63% | 82% | 58% | 75% | 57% | 74% | 57% | 74% | 56% | 73% | 59% | 59% | 57% | 57% |
| 2293 | 0.25% | 9.00% | 0.25% | 9.00% | 0.25% | 69% | 90% | 65% | 85% | 60% | 78% | 62% | 81% | 61% | 79% | 65% | 65% | 61% | 61% |
| 2294 | 0.25% | 0.00% | 1.00% | 9.00% | 0.25% | 59% | 77% | 52% | 68% | 52% | 68% | 53% | 69% | 51% | 66% | 54% | 54% | 52% | 52% |
| 2295 | 1.00% | 0.25% | 1.00% | 9.00% | 0.25% | 65% | 85% | 58% | 75% | 59% | 77% | 60% | 78% | 57% | 74% | 61% | 61% | 59% | 59% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2296 | 9.00% | 0.25% | 1.00% | 9.00% | 0.25% | 61% | 79% | 56% | 73% | 54% | 70% | 57% | 74% | 54% | 70% | 57% | 57% | 55% | 55% |
| 2297 | 0.00% | 1.00% | 1.00% | 9.00% | 0.25% | 64% | 83% | 59% | 77% | 58% | 75% | 60% | 78% | 57% | 74% | 60% | 60% | 58% | 58% |
| 2298 | 0.25% | 1.00% | 1.00% | 9.00% | 0.25% | 66% | 86% | 60% | 78% | 60% | 78% | 61% | 79% | 58% | 75% | 62% | 62% | 60% | 60% |
| 2299 | 1.00% | 1.00% | 1.00% | 9.00% | 0.25% | 68% | 88% | 61% | 79% | 63% | 82% | 63% | 82% | 60% | 78% | 64% | 64% | 62% | 62% |
| 2300 | 0.25% | 0.25% | 9.00% | 9.00% | 0.25% | 73% | 95% | 62% | 81% | 61% | 79% | 69% | 90% | 65% | 85% | 65% | 65% | 65% | 65% |
| 2301 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 2302 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 2303 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 2304 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 2305 | 0.25% | 0.00% | 0.25% | 0.00% | 1.00% | 17% | 22% | 20% | 26% | 17% | 22% | 14% | 18% | 24% | 31% | 18% | 18% | 18% | 18% |
| 2306 | 1.00% | 0.00% | 0.25% | 0.00% | 1.00% | 19% | 25% | 21% | 27% | 20% | 26% | 16% | 21% | 26% | 34% | 20% | 20% | 21% | 21% |
| 2307 | 0.00% | 0.25% | 0.25% | 0.00% | 1.00% | 19% | 25% | 24% | 31% | 19% | 25% | 18% | 23% | 27% | 35% | 21% | 21% | 21% | 21% |
| 2308 | 0.25% | 0.25% | 0.25% | 0.00% | 1.00% | 21% | 27% | 25% | 33% | 21% | 27% | 19% | 25% | 28% | 36% | 22% | 22% | 23% | 23% |
| 2309 | 0.00% | 1.00% | 0.25% | 0.00% | 1.00% | 22% | 29% | 27% | 35% | 23% | 30% | 21% | 27% | 30% | 39% | 24% | 24% | 25% | 25% |
| 2310 | 1.00% | 1.00% | 0.25% | 0.00% | 1.00% | 26% | 34% | 29% | 38% | 28% | 36% | 24% | 31% | 33% | 43% | 28% | 28% | 28% | 28% |
| 2311 | 1.00% | 9.00% | 0.25% | 0.00% | 1.00% | 34% | 44% | 37% | 48% | 34% | 44% | 31% | 40% | 40% | 52% | 35% | 35% | 35% | 35% |
| 2312 | 0.25% | 0.00% | 1.00% | 0.00% | 1.00% | 22% | 29% | 23% | 30% | 23% | 30% | 20% | 26% | 28% | 36% | 23% | 23% | 24% | 24% |
| 2313 | 1.00% | 0.00% | 1.00% | 0.00% | 1.00% | 24% | 31% | 24% | 31% | 26% | 34% | 22% | 29% | 30% | 39% | 25% | 25% | 26% | 26% |
| 2314 | 0.00% | 0.25% | 1.00% | 0.00% | 1.00% | 24% | 31% | 27% | 35% | 25% | 33% | 24% | 31% | 31% | 40% | 25% | 25% | 27% | 27% |
| 2315 | 1.00% | 0.25% | 1.00% | 0.00% | 1.00% | 28% | 36% | 29% | 38% | 30% | 39% | 27% | 35% | 34% | 44% | 29% | 29% | 30% | 30% |
| 2316 | 0.00% | 1.00% | 1.00% | 0.00% | 1.00% | 27% | 35% | 30% | 39% | 29% | 38% | 27% | 35% | 34% | 44% | 29% | 29% | 30% | 30% |
| 2317 | 0.25% | 1.00% | 1.00% | 0.00% | 1.00% | 29% | 38% | 31% | 40% | 31% | 40% | 28% | 36% | 35% | 46% | 30% | 30% | 31% | 31% |
| 2318 | 1.00% | 1.00% | 1.00% | 0.00% | 1.00% | 31% | 40% | 32% | 42% | 34% | 44% | 30% | 39% | 37% | 48% | 32% | 32% | 34% | 34% |
| 2319 | 9.00% | 1.00% | 1.00% | 0.00% | 1.00% | 27% | 35% | 30% | 39% | 29% | 38% | 27% | 35% | 34% | 44% | 29% | 29% | 30% | 30% |
| 2320 | 1.00% | 9.00% | 1.00% | 0.00% | 1.00% | 39% | 51% | 40% | 52% | 40% | 52% | 37% | 48% | 44% | 57% | 40% | 40% | 40% | 40% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2321 | 0.25% | 0.00% | 9.00% | 0.00% | 1.00% | 32% | 42% | 28% | 36% | 28% | 36% | 31% | 40% | 38% | 49% | 29% | 29% | 32% | 32% |
| 2322 | 0.00% | 0.25% | 9.00% | 0.00% | 1.00% | 34% | 44% | 32% | 42% | 30% | 39% | 35% | 46% | 41% | 53% | 32% | 32% | 35% | 35% |
| 2323 | 0.25% | 0.25% | 9.00% | 0.00% | 1.00% | 36% | 47% | 33% | 43% | 32% | 42% | 36% | 47% | 42% | 55% | 34% | 34% | 37% | 37% |
| 2324 | 1.00% | 0.25% | 9.00% | 0.00% | 1.00% | 38% | 49% | 34% | 44% | 35% | 46% | 38% | 49% | 44% | 57% | 36% | 36% | 39% | 39% |
| 2325 | 0.25% | 1.00% | 9.00% | 0.00% | 1.00% | 39% | 51% | 36% | 47% | 36% | 47% | 39% | 51% | 45% | 59% | 37% | 37% | 40% | 40% |
| 2326 | 0.25% | 0.00% | 0.00% | 0.25% | 1.00% | 21% | 27% | 22% | 29% | 22% | 29% | 18% | 23% | 26% | 34% | 22% | 22% | 22% | 22% |
| 2327 | 1.00% | 0.00% | 0.00% | 0.25% | 1.00% | 23% | 30% | 23% | 30% | 25% | 33% | 20% | 26% | 28% | 36% | 24% | 24% | 24% | 24% |
| 2328 | 0.00% | 0.25% | 0.00% | 0.25% | 1.00% | 23% | 30% | 26% | 34% | 24% | 31% | 22% | 29% | 29% | 38% | 24% | 24% | 25% | 25% |
| 2329 | 0.25% | 0.25% | 0.00% | 0.25% | 1.00% | 25% | 33% | 27% | 35% | 26% | 34% | 23% | 30% | 30% | 39% | 26% | 26% | 26% | 26% |
| 2330 | 9.00% | 0.25% | 0.00% | 0.25% | 1.00% | 23% | 30% | 26% | 34% | 24% | 31% | 22% | 29% | 29% | 38% | 24% | 24% | 25% | 25% |
| 2331 | 1.00% | 1.00% | 0.00% | 0.25% | 1.00% | 30% | 39% | 31% | 40% | 33% | 43% | 28% | 36% | 35% | 46% | 31% | 31% | 32% | 32% |
| 2332 | 1.00% | 9.00% | 0.00% | 0.25% | 1.00% | 38% | 49% | 39% | 51% | 39% | 51% | 35% | 46% | 42% | 55% | 39% | 39% | 39% | 39% |
| 2333 | 0.00% | 0.00% | 0.25% | 0.25% | 1.00% | 23% | 30% | 27% | 35% | 24% | 31% | 20% | 26% | 30% | 39% | 25% | 25% | 25% | 25% |
| 2334 | 0.25% | 0.00% | 0.25% | 0.25% | 1.00% | 25% | 33% | 28% | 36% | 26% | 34% | 21% | 27% | 31% | 40% | 26% | 26% | 26% | 26% |
| 2335 | 0.00% | 0.25% | 0.25% | 0.25% | 1.00% | 27% | 35% | 32% | 42% | 28% | 36% | 25% | 33% | 34% | 44% | 29% | 29% | 29% | 29% |
| 2336 | 0.25% | 0.25% | 0.25% | 0.25% | 1.00% | 29% | 38% | 33% | 43% | 30% | 39% | 26% | 34% | 35% | 46% | 31% | 31% | 30% | 30% |
| 2337 | 1.00% | 0.25% | 0.25% | 0.25% | 1.00% | 31% | 40% | 34% | 44% | 33% | 43% | 28% | 36% | 37% | 48% | 33% | 33% | 33% | 33% |
| 2338 | 9.00% | 0.25% | 0.25% | 0.25% | 1.00% | 27% | 35% | 32% | 42% | 28% | 36% | 25% | 33% | 34% | 44% | 29% | 29% | 29% | 29% |
| 2339 | 0.25% | 1.00% | 0.25% | 0.25% | 1.00% | 32% | 42% | 36% | 47% | 34% | 44% | 29% | 38% | 38% | 49% | 34% | 34% | 34% | 34% |
| 2340 | 9.00% | 1.00% | 0.25% | 0.25% | 1.00% | 30% | 39% | 35% | 46% | 32% | 42% | 28% | 36% | 37% | 48% | 32% | 32% | 32% | 32% |
| 2341 | 0.25% | 9.00% | 0.25% | 0.25% | 1.00% | 40% | 52% | 44% | 57% | 40% | 52% | 36% | 47% | 45% | 59% | 41% | 41% | 40% | 40% |
| 2342 | 1.00% | 9.00% | 0.25% | 0.25% | 1.00% | 42% | 55% | 45% | 59% | 43% | 56% | 38% | 49% | 47% | 61% | 43% | 43% | 43% | 43% |
| 2343 | 9.00% | 9.00% | 0.25% | 0.25% | 1.00% | 38% | 49% | 43% | 56% | 38% | 49% | 35% | 46% | 44% | 57% | 40% | 40% | 39% | 39% |
| 2344 | 0.00% | 0.00% | 1.00% | 0.25% | 1.00% | 28% | 36% | 30% | 39% | 30% | 39% | 26% | 34% | 34% | 44% | 29% | 29% | 30% | 30% |
| 2345 | 1.00% | 0.00% | 1.00% | 0.25% | 1.00% | 32% | 42% | 32% | 42% | 35% | 46% | 29% | 38% | 37% | 48% | 33% | 33% | 34% | 34% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2346 | 0.00% | 0.25% | 1.00% | 0.25% | 1.00% | 32% | 42% | 35% | 46% | 34% | 44% | 31% | 40% | 38% | 49% | 34% | 34% | 34% | 34% |
| 2347 | 0.25% | 0.25% | 1.00% | 0.25% | 1.00% | 34% | 44% | 36% | 47% | 36% | 47% | 32% | 42% | 39% | 51% | 35% | 35% | 36% | 36% |
| 2348 | 1.00% | 0.25% | 1.00% | 0.25% | 1.00% | 36% | 47% | 37% | 48% | 39% | 51% | 34% | 44% | 41% | 53% | 37% | 37% | 38% | 38% |
| 2349 | 9.00% | 0.25% | 1.00% | 0.25% | 1.00% | 32% | 42% | 35% | 46% | 34% | 44% | 31% | 40% | 38% | 49% | 34% | 34% | 34% | 34% |
| 2350 | 0.00% | 1.00% | 1.00% | 0.25% | 1.00% | 35% | 46% | 38% | 49% | 38% | 49% | 34% | 44% | 41% | 53% | 37% | 37% | 38% | 38% |
| 2351 | 0.25% | 1.00% | 1.00% | 0.25% | 1.00% | 37% | 48% | 39% | 51% | 40% | 52% | 35% | 46% | 42% | 55% | 39% | 39% | 39% | 39% |
| 2352 | 1.00% | 1.00% | 1.00% | 0.25% | 1.00% | 39% | 51% | 40% | 52% | 43% | 56% | 37% | 48% | 44% | 57% | 41% | 41% | 41% | 41% |
| 2353 | 9.00% | 1.00% | 1.00% | 0.25% | 1.00% | 35% | 46% | 38% | 49% | 38% | 49% | 34% | 44% | 41% | 53% | 37% | 37% | 38% | 38% |
| 2354 | 0.00% | 9.00% | 1.00% | 0.25% | 1.00% | 43% | 56% | 46% | 60% | 44% | 57% | 41% | 53% | 48% | 62% | 44% | 44% | 44% | 44% |
| 2355 | 0.25% | 9.00% | 1.00% | 0.25% | 1.00% | 45% | 59% | 47% | 61% | 46% | 60% | 42% | 55% | 49% | 64% | 46% | 46% | 46% | 46% |
| 2356 | 1.00% | 9.00% | 1.00% | 0.25% | 1.00% | 47% | 61% | 48% | 62% | 49% | 64% | 44% | 57% | 51% | 66% | 48% | 48% | 48% | 48% |
| 2357 | 0.25% | 0.25% | 9.00% | 0.25% | 1.00% | 44% | 57% | 41% | 53% | 41% | 53% | 43% | 56% | 49% | 64% | 42% | 42% | 44% | 44% |
| 2358 | 1.00% | 0.25% | 9.00% | 0.25% | 1.00% | 46% | 60% | 42% | 55% | 44% | 57% | 45% | 59% | 51% | 66% | 44% | 44% | 47% | 47% |
| 2359 | 9.00% | 0.25% | 9.00% | 0.25% | 1.00% | 42% | 55% | 40% | 52% | 39% | 51% | 42% | 55% | 48% | 62% | 40% | 40% | 43% | 43% |
| 2360 | 0.00% | 1.00% | 9.00% | 0.25% | 1.00% | 45% | 59% | 43% | 56% | 43% | 56% | 45% | 59% | 51% | 66% | 44% | 44% | 46% | 46% |
| 2361 | 0.25% | 1.00% | 9.00% | 0.25% | 1.00% | 47% | 61% | 44% | 57% | 45% | 59% | 46% | 60% | 52% | 68% | 45% | 45% | 48% | 48% |
| 2362 | 9.00% | 1.00% | 9.00% | 0.25% | 1.00% | 45% | 59% | 43% | 56% | 43% | 56% | 45% | 59% | 51% | 66% | 44% | 44% | 46% | 46% |
| 2363 | 1.00% | 9.00% | 9.00% | 0.25% | 1.00% | 57% | 74% | 53% | 69% | 54% | 70% | 55% | 72% | 61% | 79% | 55% | 55% | 57% | 57% |
| 2364 | 0.25% | 0.00% | 0.00% | 1.00% | 1.00% | 38% | 49% | 35% | 46% | 35% | 46% | 33% | 43% | 39% | 51% | 36% | 36% | 36% | 36% |
| 2365 | 1.00% | 0.25% | 0.00% | 1.00% | 1.00% | 44% | 57% | 41% | 53% | 42% | 55% | 40% | 52% | 45% | 59% | 42% | 42% | 42% | 42% |
| 2366 | 0.00% | 1.00% | 0.00% | 1.00% | 1.00% | 43% | 56% | 42% | 55% | 41% | 53% | 40% | 52% | 45% | 59% | 42% | 42% | 42% | 42% |
| 2367 | 0.25% | 1.00% | 0.00% | 1.00% | 1.00% | 45% | 59% | 43% | 56% | 43% | 56% | 41% | 53% | 46% | 60% | 44% | 44% | 43% | 43% |
| 2368 | 1.00% | 1.00% | 0.00% | 1.00% | 1.00% | 47% | 61% | 44% | 57% | 46% | 60% | 43% | 56% | 48% | 62% | 46% | 46% | 46% | 46% |
| 2369 | 0.00% | 0.00% | 0.25% | 1.00% | 1.00% | 40% | 52% | 40% | 52% | 37% | 48% | 35% | 46% | 43% | 56% | 39% | 39% | 38% | 38% |
| 2370 | 1.00% | 0.00% | 0.25% | 1.00% | 1.00% | 44% | 57% | 42% | 55% | 42% | 55% | 38% | 49% | 46% | 60% | 43% | 43% | 42% | 42% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2371 | 0.25% | 0.25% | 0.25% | 1.00% | 1.00% | 46% | 60% | 46% | 60% | 43% | 56% | 41% | 53% | 48% | 62% | 45% | 45% | 44% | 44% |
| 2372 | 1.00% | 0.25% | 0.25% | 1.00% | 1.00% | 48% | 62% | 47% | 61% | 46% | 60% | 43% | 56% | 50% | 65% | 47% | 47% | 46% | 46% |
| 2373 | 9.00% | 0.25% | 0.25% | 1.00% | 1.00% | 44% | 57% | 45% | 59% | 41% | 53% | 40% | 52% | 47% | 61% | 43% | 43% | 43% | 43% |
| 2374 | 0.00% | 1.00% | 0.25% | 1.00% | 1.00% | 47% | 61% | 48% | 62% | 45% | 59% | 43% | 56% | 50% | 65% | 47% | 47% | 46% | 46% |
| 2375 | 0.25% | 1.00% | 0.25% | 1.00% | 1.00% | 49% | 64% | 49% | 64% | 47% | 61% | 44% | 57% | 51% | 66% | 48% | 48% | 47% | 47% |
| 2376 | 1.00% | 1.00% | 0.25% | 1.00% | 1.00% | 51% | 66% | 50% | 65% | 50% | 65% | 46% | 60% | 53% | 69% | 50% | 50% | 50% | 50% |
| 2377 | 9.00% | 1.00% | 0.25% | 1.00% | 1.00% | 47% | 61% | 48% | 62% | 45% | 59% | 43% | 56% | 50% | 65% | 47% | 47% | 46% | 46% |
| 2378 | 0.25% | 9.00% | 0.25% | 1.00% | 1.00% | 57% | 74% | 57% | 74% | 53% | 69% | 51% | 66% | 58% | 75% | 56% | 56% | 54% | 54% |
| 2379 | 1.00% | 9.00% | 0.25% | 1.00% | 1.00% | 59% | 77% | 58% | 75% | 56% | 73% | 53% | 69% | 60% | 78% | 58% | 58% | 56% | 56% |
| 2380 | 9.00% | 9.00% | 0.25% | 1.00% | 1.00% | 55% | 72% | 56% | 73% | 51% | 66% | 50% | 65% | 57% | 74% | 54% | 54% | 53% | 53% |
| 2381 | 0.00% | 0.00% | 1.00% | 1.00% | 1.00% | 45% | 59% | 43% | 56% | 43% | 56% | 41% | 53% | 47% | 61% | 44% | 44% | 44% | 44% |
| 2382 | 0.25% | 0.00% | 1.00% | 1.00% | 1.00% | 47% | 61% | 44% | 57% | 45% | 59% | 42% | 55% | 48% | 62% | 45% | 45% | 45% | 45% |
| 2383 | 1.00% | 0.00% | 1.00% | 1.00% | 1.00% | 49% | 64% | 45% | 59% | 48% | 62% | 44% | 57% | 50% | 65% | 47% | 47% | 47% | 47% |
| 2384 | 0.00% | 0.25% | 1.00% | 1.00% | 1.00% | 49% | 64% | 48% | 62% | 47% | 61% | 46% | 60% | 51% | 66% | 48% | 48% | 48% | 48% |
| 2385 | 1.00% | 0.25% | 1.00% | 1.00% | 1.00% | 53% | 69% | 50% | 65% | 52% | 68% | 49% | 64% | 54% | 70% | 52% | 52% | 52% | 52% |
| 2386 | 9.00% | 0.25% | 1.00% | 1.00% | 1.00% | 49% | 64% | 48% | 62% | 47% | 61% | 46% | 60% | 51% | 66% | 48% | 48% | 48% | 48% |
| 2387 | 0.00% | 1.00% | 1.00% | 1.00% | 1.00% | 52% | 68% | 51% | 66% | 51% | 66% | 49% | 64% | 54% | 70% | 51% | 51% | 51% | 51% |
| 2388 | 0.25% | 1.00% | 1.00% | 1.00% | 1.00% | 54% | 70% | 52% | 68% | 53% | 69% | 50% | 65% | 55% | 72% | 53% | 53% | 53% | 53% |
| 2389 | 1.00% | 1.00% | 1.00% | 1.00% | 1.00% | 56% | 73% | 53% | 69% | 56% | 73% | 52% | 68% | 57% | 74% | 55% | 55% | 55% | 55% |
| 2390 | 9.00% | 1.00% | 1.00% | 1.00% | 1.00% | 52% | 68% | 51% | 66% | 51% | 66% | 49% | 64% | 54% | 70% | 51% | 51% | 51% | 51% |
| 2391 | 0.00% | 9.00% | 1.00% | 1.00% | 1.00% | 60% | 78% | 59% | 77% | 57% | 74% | 56% | 73% | 61% | 79% | 59% | 59% | 58% | 58% |
| 2392 | 0.25% | 9.00% | 1.00% | 1.00% | 1.00% | 62% | 81% | 60% | 78% | 59% | 77% | 57% | 74% | 62% | 81% | 60% | 60% | 59% | 59% |
| 2393 | 1.00% | 9.00% | 1.00% | 1.00% | 1.00% | 64% | 83% | 61% | 79% | 62% | 81% | 59% | 77% | 64% | 83% | 62% | 62% | 62% | 62% |
| 2394 | 0.25% | 0.25% | 9.00% | 1.00% | 1.00% | 61% | 79% | 54% | 70% | 54% | 70% | 58% | 75% | 62% | 81% | 56% | 56% | 58% | 58% |
| 2395 | 1.00% | 0.25% | 9.00% | 1.00% | 1.00% | 63% | 82% | 55% | 72% | 57% | 74% | 60% | 78% | 64% | 83% | 58% | 58% | 60% | 60% |

Fig. 12

| Formula # | Gamma Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2396 | 9.00% | 0.25% | 9.00% | 1.00% | 1.00% | 59% | 77% | 53% | 69% | 52% | 68% | 57% | 74% | 61% | 79% | 55% | 55% | 57% | 57% |
| 2397 | 0.25% | 1.00% | 9.00% | 1.00% | 1.00% | 64% | 83% | 57% | 74% | 58% | 75% | 61% | 79% | 65% | 85% | 60% | 60% | 61% | 61% |
| 2398 | 0.00% | 0.25% | 0.00% | 9.00% | 1.00% | 57% | 74% | 53% | 69% | 49% | 64% | 53% | 69% | 56% | 73% | 53% | 53% | 53% | 53% |
| 2399 | 0.00% | 0.00% | 0.25% | 9.00% | 1.00% | 57% | 74% | 54% | 70% | 49% | 64% | 51% | 66% | 57% | 74% | 53% | 53% | 52% | 52% |
| 2400 | 0.25% | 0.00% | 0.25% | 9.00% | 1.00% | 59% | 77% | 55% | 72% | 51% | 66% | 52% | 68% | 58% | 75% | 55% | 55% | 54% | 54% |
| 2401 | 0.00% | 0.25% | 0.25% | 9.00% | 1.00% | 61% | 79% | 59% | 77% | 53% | 69% | 56% | 73% | 61% | 79% | 58% | 58% | 57% | 57% |
| 2402 | 0.25% | 0.25% | 0.25% | 9.00% | 1.00% | 63% | 82% | 60% | 78% | 55% | 72% | 57% | 74% | 62% | 81% | 59% | 59% | 58% | 58% |
| 2403 | 1.00% | 0.25% | 0.25% | 9.00% | 1.00% | 65% | 85% | 61% | 79% | 58% | 75% | 59% | 77% | 64% | 83% | 61% | 61% | 60% | 60% |
| 2404 | 9.00% | 0.25% | 0.25% | 9.00% | 1.00% | 61% | 79% | 59% | 77% | 53% | 69% | 56% | 73% | 61% | 79% | 58% | 58% | 57% | 57% |
| 2405 | 0.00% | 1.00% | 0.25% | 9.00% | 1.00% | 64% | 83% | 62% | 81% | 57% | 74% | 59% | 77% | 64% | 83% | 61% | 61% | 60% | 60% |
| 2406 | 0.25% | 1.00% | 0.25% | 9.00% | 1.00% | 66% | 86% | 63% | 82% | 59% | 77% | 60% | 78% | 65% | 85% | 63% | 63% | 61% | 61% |
| 2407 | 1.00% | 1.00% | 0.25% | 9.00% | 1.00% | 68% | 88% | 64% | 83% | 62% | 81% | 62% | 81% | 67% | 87% | 65% | 65% | 64% | 64% |
| 2408 | 0.25% | 9.00% | 0.25% | 9.00% | 1.00% | 74% | 96% | 71% | 92% | 65% | 85% | 67% | 87% | 72% | 94% | 70% | 70% | 68% | 68% |
| 2409 | 0.25% | 0.00% | 1.00% | 9.00% | 1.00% | 64% | 83% | 58% | 75% | 57% | 74% | 58% | 75% | 62% | 81% | 60% | 60% | 59% | 59% |
| 2410 | 1.00% | 0.25% | 1.00% | 9.00% | 1.00% | 70% | 91% | 64% | 83% | 64% | 83% | 65% | 85% | 68% | 88% | 66% | 66% | 66% | 66% |
| 2411 | 9.00% | 0.25% | 1.00% | 9.00% | 1.00% | 66% | 86% | 62% | 81% | 59% | 77% | 62% | 81% | 65% | 85% | 62% | 62% | 62% | 62% |
| 2412 | 0.00% | 1.00% | 1.00% | 9.00% | 1.00% | 69% | 90% | 65% | 85% | 63% | 82% | 65% | 85% | 68% | 88% | 66% | 66% | 65% | 65% |
| 2413 | 0.25% | 1.00% | 1.00% | 9.00% | 1.00% | 71% | 92% | 66% | 86% | 65% | 85% | 66% | 86% | 69% | 90% | 67% | 67% | 67% | 67% |
| 2414 | 1.00% | 1.00% | 1.00% | 9.00% | 1.00% | 73% | 95% | 67% | 87% | 68% | 88% | 68% | 88% | 71% | 92% | 69% | 69% | 69% | 69% |
| 2415 | 0.25% | 0.25% | 9.00% | 9.00% | 1.00% | 78% | 100% | 68% | 88% | 66% | 86% | 74% | 96% | 76% | 99% | 71% | 71% | 72% | 72% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2416 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 2417 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 2418 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 2419 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 2420 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 2421 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 2422 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 2423 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 2424 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 2425 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 2426 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 2427 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 2428 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 2429 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 2430 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 2431 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 2432 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 2433 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 2434 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 2435 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 2436 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 2437 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 2438 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 2439 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 2440 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2441 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 2442 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 2443 | 0.00% | 0.25% | 0.00% | 0.25% | 0.00% | 7% | 9% | 11% | 14% | 6% | 8% | 10% | 13% | 9% | 12% | 8% | 8% | 8% | 8% |
| 2444 | 0.25% | 0.25% | 0.00% | 0.25% | 0.00% | 9% | 12% | 12% | 16% | 8% | 10% | 11% | 14% | 10% | 13% | 10% | 10% | 10% | 10% |
| 2445 | 9.00% | 0.25% | 0.00% | 0.25% | 0.00% | 7% | 9% | 11% | 14% | 6% | 8% | 10% | 13% | 9% | 12% | 8% | 8% | 8% | 8% |
| 2446 | 1.00% | 1.00% | 0.00% | 0.25% | 0.00% | 14% | 18% | 16% | 21% | 15% | 20% | 16% | 21% | 15% | 20% | 15% | 15% | 15% | 15% |
| 2447 | 1.00% | 9.00% | 0.00% | 0.25% | 0.00% | 22% | 29% | 24% | 31% | 21% | 27% | 23% | 30% | 22% | 29% | 22% | 22% | 22% | 22% |
| 2448 | 0.00% | 0.00% | 0.25% | 0.25% | 0.00% | 7% | 9% | 12% | 16% | 6% | 8% | 8% | 10% | 10% | 13% | 8% | 8% | 8% | 8% |
| 2449 | 0.25% | 0.00% | 0.25% | 0.25% | 0.00% | 9% | 12% | 13% | 17% | 8% | 10% | 9% | 12% | 11% | 14% | 10% | 10% | 9% | 9% |
| 2450 | 0.00% | 0.25% | 0.25% | 0.25% | 0.00% | 11% | 14% | 17% | 22% | 10% | 13% | 13% | 17% | 14% | 18% | 13% | 13% | 12% | 12% |
| 2451 | 0.25% | 0.25% | 0.25% | 0.25% | 0.00% | 13% | 17% | 18% | 23% | 12% | 16% | 14% | 18% | 15% | 20% | 14% | 14% | 14% | 14% |
| 2452 | 1.00% | 0.25% | 0.25% | 0.25% | 0.00% | 15% | 20% | 19% | 25% | 15% | 20% | 16% | 21% | 17% | 22% | 16% | 16% | 16% | 16% |
| 2453 | 9.00% | 0.25% | 0.25% | 0.25% | 0.00% | 11% | 14% | 17% | 22% | 10% | 13% | 13% | 17% | 14% | 18% | 13% | 13% | 12% | 12% |
| 2454 | 0.25% | 1.00% | 0.25% | 0.25% | 0.00% | 16% | 21% | 21% | 27% | 16% | 21% | 17% | 22% | 18% | 23% | 18% | 18% | 17% | 17% |
| 2455 | 9.00% | 1.00% | 0.25% | 0.25% | 0.00% | 14% | 18% | 20% | 26% | 14% | 18% | 16% | 21% | 17% | 22% | 16% | 16% | 16% | 16% |
| 2456 | 0.25% | 9.00% | 0.25% | 0.25% | 0.00% | 24% | 31% | 29% | 38% | 22% | 29% | 24% | 31% | 25% | 33% | 25% | 25% | 24% | 24% |
| 2457 | 1.00% | 9.00% | 0.25% | 0.25% | 0.00% | 26% | 34% | 30% | 39% | 25% | 33% | 26% | 34% | 27% | 35% | 27% | 27% | 26% | 26% |
| 2458 | 9.00% | 9.00% | 0.25% | 0.25% | 0.00% | 22% | 29% | 28% | 36% | 20% | 26% | 23% | 30% | 24% | 31% | 23% | 23% | 22% | 22% |
| 2459 | 0.00% | 0.00% | 1.00% | 0.25% | 0.00% | 12% | 16% | 15% | 20% | 12% | 16% | 14% | 18% | 14% | 18% | 13% | 13% | 13% | 13% |
| 2460 | 1.00% | 0.00% | 1.00% | 0.25% | 0.00% | 16% | 21% | 17% | 22% | 17% | 22% | 17% | 22% | 17% | 22% | 17% | 17% | 17% | 17% |
| 2461 | 0.00% | 0.25% | 1.00% | 0.25% | 0.00% | 16% | 21% | 20% | 26% | 16% | 21% | 19% | 25% | 18% | 23% | 17% | 17% | 18% | 18% |
| 2462 | 0.25% | 0.25% | 1.00% | 0.25% | 0.00% | 18% | 23% | 21% | 27% | 18% | 23% | 20% | 26% | 19% | 25% | 19% | 19% | 19% | 19% |
| 2463 | 1.00% | 0.25% | 1.00% | 0.25% | 0.00% | 20% | 26% | 22% | 29% | 21% | 27% | 22% | 29% | 21% | 27% | 21% | 21% | 21% | 21% |
| 2464 | 9.00% | 0.25% | 1.00% | 0.25% | 0.00% | 16% | 21% | 20% | 26% | 16% | 21% | 19% | 25% | 18% | 23% | 17% | 17% | 18% | 18% |
| 2465 | 0.00% | 1.00% | 1.00% | 0.25% | 0.00% | 19% | 25% | 23% | 30% | 20% | 26% | 22% | 29% | 21% | 27% | 21% | 21% | 21% | 21% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2466 | 0.25% | 1.00% | 1.00% | 0.25% | 0.00% | 21% | 27% | 24% | 31% | 22% | 29% | 23% | 30% | 22% | 29% | 22% | 22% | 22% | 22% |
| 2467 | 1.00% | 1.00% | 1.00% | 0.25% | 0.00% | 23% | 30% | 25% | 33% | 25% | 33% | 25% | 33% | 24% | 31% | 24% | 24% | 25% | 25% |
| 2468 | 9.00% | 1.00% | 1.00% | 0.25% | 0.00% | 19% | 25% | 23% | 30% | 20% | 26% | 22% | 29% | 21% | 27% | 21% | 21% | 21% | 21% |
| 2469 | 0.00% | 9.00% | 1.00% | 0.25% | 0.00% | 27% | 35% | 31% | 40% | 26% | 34% | 29% | 38% | 28% | 36% | 28% | 28% | 28% | 28% |
| 2470 | 0.25% | 9.00% | 1.00% | 0.25% | 0.00% | 29% | 38% | 32% | 42% | 28% | 36% | 30% | 39% | 29% | 38% | 30% | 30% | 29% | 29% |
| 2471 | 1.00% | 9.00% | 1.00% | 0.25% | 0.00% | 31% | 40% | 33% | 43% | 31% | 40% | 32% | 42% | 31% | 40% | 32% | 32% | 31% | 31% |
| 2472 | 0.25% | 0.25% | 9.00% | 0.25% | 0.00% | 28% | 36% | 26% | 34% | 23% | 30% | 31% | 40% | 29% | 38% | 26% | 26% | 28% | 28% |
| 2473 | 1.00% | 0.25% | 9.00% | 0.25% | 0.00% | 30% | 39% | 27% | 35% | 26% | 34% | 33% | 43% | 31% | 40% | 28% | 28% | 30% | 30% |
| 2474 | 9.00% | 0.25% | 9.00% | 0.25% | 0.00% | 26% | 34% | 25% | 33% | 21% | 27% | 30% | 39% | 28% | 36% | 24% | 24% | 26% | 26% |
| 2475 | 0.00% | 1.00% | 9.00% | 0.25% | 0.00% | 29% | 38% | 28% | 36% | 25% | 33% | 33% | 43% | 31% | 40% | 27% | 27% | 30% | 30% |
| 2476 | 0.25% | 1.00% | 9.00% | 0.25% | 0.00% | 31% | 40% | 29% | 38% | 27% | 35% | 34% | 44% | 32% | 42% | 29% | 29% | 31% | 31% |
| 2477 | 9.00% | 1.00% | 9.00% | 0.25% | 0.00% | 29% | 38% | 28% | 36% | 25% | 33% | 33% | 43% | 31% | 40% | 27% | 27% | 30% | 30% |
| 2478 | 1.00% | 9.00% | 9.00% | 0.25% | 0.00% | 41% | 53% | 38% | 49% | 36% | 47% | 43% | 56% | 41% | 53% | 38% | 38% | 40% | 40% |
| 2479 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 2480 | 1.00% | 0.25% | 0.00% | 1.00% | 0.00% | 22% | 29% | 20% | 26% | 21% | 27% | 20% | 26% | 24% | 31% | 21% | 21% | 22% | 22% |
| 2481 | 0.00% | 1.00% | 0.00% | 1.00% | 0.00% | 21% | 27% | 21% | 27% | 20% | 26% | 20% | 26% | 24% | 31% | 21% | 21% | 21% | 21% |
| 2482 | 0.25% | 1.00% | 0.00% | 1.00% | 0.00% | 23% | 30% | 22% | 29% | 22% | 29% | 21% | 27% | 25% | 33% | 22% | 22% | 23% | 23% |
| 2483 | 1.00% | 1.00% | 0.00% | 1.00% | 0.00% | 25% | 33% | 23% | 30% | 25% | 33% | 23% | 30% | 27% | 35% | 24% | 24% | 25% | 25% |
| 2484 | 0.00% | 0.00% | 0.25% | 1.00% | 0.00% | 18% | 23% | 19% | 25% | 16% | 21% | 15% | 20% | 22% | 29% | 18% | 18% | 18% | 18% |
| 2485 | 1.00% | 0.00% | 0.25% | 1.00% | 0.00% | 22% | 29% | 21% | 27% | 21% | 27% | 18% | 23% | 25% | 33% | 21% | 21% | 21% | 21% |
| 2486 | 0.25% | 0.25% | 0.25% | 1.00% | 0.00% | 24% | 31% | 25% | 33% | 22% | 29% | 21% | 27% | 27% | 35% | 24% | 24% | 23% | 23% |
| 2487 | 1.00% | 0.25% | 0.25% | 1.00% | 0.00% | 26% | 34% | 26% | 34% | 25% | 33% | 23% | 30% | 29% | 38% | 26% | 26% | 26% | 26% |
| 2488 | 9.00% | 0.25% | 0.25% | 1.00% | 0.00% | 22% | 29% | 24% | 31% | 20% | 26% | 20% | 26% | 26% | 34% | 22% | 22% | 22% | 22% |
| 2489 | 0.00% | 1.00% | 0.25% | 1.00% | 0.00% | 25% | 33% | 27% | 35% | 24% | 31% | 23% | 30% | 29% | 38% | 25% | 25% | 25% | 25% |
| 2490 | 0.25% | 1.00% | 0.25% | 1.00% | 0.00% | 27% | 35% | 28% | 36% | 26% | 34% | 24% | 31% | 30% | 39% | 27% | 27% | 27% | 27% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2491 | 1.00% | 1.00% | 0.25% | 1.00% | 0.00% | 29% | 38% | 29% | 38% | 29% | 38% | 26% | 34% | 32% | 42% | 29% | 29% | 29% | 29% |
| 2492 | 9.00% | 1.00% | 0.25% | 1.00% | 0.00% | 25% | 33% | 27% | 35% | 24% | 31% | 23% | 30% | 29% | 38% | 25% | 25% | 25% | 25% |
| 2493 | 0.25% | 9.00% | 0.25% | 1.00% | 0.00% | 35% | 46% | 36% | 47% | 32% | 42% | 31% | 40% | 37% | 48% | 34% | 34% | 33% | 33% |
| 2494 | 1.00% | 9.00% | 0.25% | 1.00% | 0.00% | 37% | 48% | 37% | 48% | 35% | 46% | 33% | 43% | 39% | 51% | 36% | 36% | 36% | 36% |
| 2495 | 9.00% | 9.00% | 0.25% | 1.00% | 0.00% | 33% | 43% | 35% | 46% | 30% | 39% | 30% | 39% | 36% | 47% | 33% | 33% | 32% | 32% |
| 2496 | 0.00% | 0.00% | 1.00% | 1.00% | 0.00% | 23% | 30% | 22% | 29% | 22% | 29% | 21% | 27% | 26% | 34% | 22% | 22% | 23% | 23% |
| 2497 | 0.25% | 0.00% | 1.00% | 1.00% | 0.00% | 25% | 33% | 23% | 30% | 24% | 31% | 22% | 29% | 27% | 35% | 24% | 24% | 24% | 24% |
| 2498 | 1.00% | 0.00% | 1.00% | 1.00% | 0.00% | 27% | 35% | 24% | 31% | 27% | 35% | 24% | 31% | 29% | 38% | 26% | 26% | 27% | 27% |
| 2499 | 0.00% | 0.25% | 1.00% | 1.00% | 0.00% | 27% | 35% | 27% | 35% | 26% | 34% | 26% | 34% | 30% | 39% | 27% | 27% | 27% | 27% |
| 2500 | 1.00% | 0.25% | 1.00% | 1.00% | 0.00% | 31% | 40% | 29% | 38% | 31% | 40% | 29% | 38% | 33% | 43% | 30% | 30% | 31% | 31% |
| 2501 | 9.00% | 0.25% | 1.00% | 1.00% | 0.00% | 27% | 35% | 27% | 35% | 26% | 34% | 26% | 34% | 30% | 39% | 27% | 27% | 27% | 27% |
| 2502 | 0.00% | 1.00% | 1.00% | 1.00% | 0.00% | 30% | 39% | 30% | 39% | 30% | 39% | 29% | 38% | 33% | 43% | 30% | 30% | 31% | 31% |
| 2503 | 0.25% | 1.00% | 1.00% | 1.00% | 0.00% | 32% | 42% | 31% | 40% | 32% | 42% | 30% | 39% | 34% | 44% | 32% | 32% | 32% | 32% |
| 2504 | 1.00% | 1.00% | 1.00% | 1.00% | 0.00% | 34% | 44% | 32% | 42% | 35% | 46% | 32% | 42% | 36% | 47% | 34% | 34% | 34% | 34% |
| 2505 | 9.00% | 1.00% | 1.00% | 1.00% | 0.00% | 30% | 39% | 30% | 39% | 30% | 39% | 29% | 38% | 33% | 43% | 30% | 30% | 31% | 31% |
| 2506 | 0.00% | 9.00% | 1.00% | 1.00% | 0.00% | 38% | 49% | 38% | 49% | 36% | 47% | 36% | 47% | 40% | 52% | 37% | 37% | 37% | 37% |
| 2507 | 0.25% | 9.00% | 1.00% | 1.00% | 0.00% | 40% | 52% | 39% | 51% | 38% | 49% | 37% | 48% | 41% | 53% | 39% | 39% | 39% | 39% |
| 2508 | 1.00% | 9.00% | 1.00% | 1.00% | 0.00% | 42% | 55% | 40% | 52% | 41% | 53% | 39% | 51% | 43% | 56% | 41% | 41% | 41% | 41% |
| 2509 | 0.25% | 0.25% | 9.00% | 1.00% | 0.00% | 39% | 51% | 33% | 43% | 33% | 43% | 38% | 49% | 41% | 53% | 35% | 35% | 37% | 37% |
| 2510 | 1.00% | 0.25% | 9.00% | 1.00% | 0.00% | 41% | 53% | 34% | 44% | 36% | 47% | 40% | 52% | 43% | 56% | 37% | 37% | 40% | 40% |
| 2511 | 9.00% | 0.25% | 9.00% | 1.00% | 0.00% | 37% | 48% | 32% | 42% | 31% | 40% | 37% | 48% | 40% | 52% | 33% | 33% | 36% | 36% |
| 2512 | 0.25% | 1.00% | 9.00% | 1.00% | 0.00% | 42% | 55% | 36% | 47% | 37% | 48% | 41% | 53% | 44% | 57% | 38% | 38% | 41% | 41% |
| 2513 | 0.00% | 0.25% | 0.00% | 9.00% | 0.00% | 31% | 40% | 27% | 35% | 26% | 34% | 30% | 39% | 31% | 40% | 28% | 28% | 29% | 29% |
| 2514 | 0.00% | 0.00% | 0.25% | 9.00% | 0.00% | 31% | 40% | 28% | 36% | 26% | 34% | 28% | 36% | 32% | 42% | 28% | 28% | 29% | 29% |
| 2515 | 0.25% | 0.00% | 0.25% | 9.00% | 0.00% | 33% | 43% | 29% | 38% | 28% | 36% | 29% | 38% | 33% | 43% | 30% | 30% | 30% | 30% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2516 | 0.00% | 0.25% | 0.25% | 9.00% | 0.00% | 35% | 46% | 33% | 43% | 30% | 39% | 33% | 43% | 36% | 47% | 33% | 33% | 33% | 33% |
| 2517 | 0.25% | 0.25% | 0.25% | 9.00% | 0.00% | 37% | 48% | 34% | 44% | 32% | 42% | 34% | 44% | 37% | 48% | 34% | 34% | 34% | 34% |
| 2518 | 1.00% | 0.25% | 0.25% | 9.00% | 0.00% | 39% | 51% | 35% | 46% | 35% | 46% | 36% | 47% | 39% | 51% | 36% | 36% | 37% | 37% |
| 2519 | 9.00% | 0.25% | 0.25% | 9.00% | 0.00% | 35% | 46% | 33% | 43% | 30% | 39% | 33% | 43% | 36% | 47% | 33% | 33% | 33% | 33% |
| 2520 | 0.00% | 1.00% | 0.25% | 9.00% | 0.00% | 38% | 49% | 36% | 47% | 34% | 44% | 36% | 47% | 39% | 51% | 36% | 36% | 36% | 36% |
| 2521 | 0.25% | 1.00% | 0.25% | 9.00% | 0.00% | 40% | 52% | 37% | 48% | 36% | 47% | 37% | 48% | 40% | 52% | 38% | 38% | 38% | 38% |
| 2522 | 1.00% | 1.00% | 0.25% | 9.00% | 0.00% | 42% | 55% | 38% | 49% | 39% | 51% | 39% | 51% | 42% | 55% | 40% | 40% | 40% | 40% |
| 2523 | 0.25% | 9.00% | 0.25% | 9.00% | 0.00% | 48% | 62% | 45% | 59% | 42% | 55% | 44% | 57% | 47% | 61% | 45% | 45% | 44% | 44% |
| 2524 | 0.25% | 0.00% | 1.00% | 9.00% | 0.00% | 38% | 49% | 32% | 42% | 34% | 44% | 35% | 46% | 37% | 48% | 35% | 35% | 35% | 35% |
| 2525 | 1.00% | 0.25% | 1.00% | 9.00% | 0.00% | 44% | 57% | 38% | 49% | 41% | 53% | 42% | 55% | 43% | 56% | 41% | 41% | 42% | 42% |
| 2526 | 9.00% | 0.25% | 1.00% | 9.00% | 0.00% | 40% | 52% | 36% | 47% | 36% | 47% | 39% | 51% | 40% | 52% | 37% | 37% | 38% | 38% |
| 2527 | 0.00% | 1.00% | 1.00% | 9.00% | 0.00% | 43% | 56% | 39% | 51% | 40% | 52% | 42% | 55% | 43% | 56% | 41% | 41% | 42% | 42% |
| 2528 | 0.25% | 1.00% | 1.00% | 9.00% | 0.00% | 45% | 59% | 40% | 52% | 42% | 55% | 43% | 56% | 44% | 57% | 42% | 42% | 43% | 43% |
| 2529 | 1.00% | 1.00% | 1.00% | 9.00% | 0.00% | 47% | 61% | 41% | 53% | 45% | 59% | 45% | 59% | 46% | 60% | 44% | 44% | 45% | 45% |
| 2530 | 0.25% | 0.25% | 9.00% | 9.00% | 0.00% | 52% | 68% | 42% | 55% | 43% | 56% | 51% | 66% | 51% | 66% | 46% | 46% | 48% | 48% |
| 2531 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 2532 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 2533 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 2534 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 2535 | 0.25% | 0.00% | 0.25% | 0.00% | 0.25% | 12% | 16% | 14% | 18% | 12% | 16% | 9% | 12% | 13% | 17% | 13% | 13% | 11% | 11% |
| 2536 | 1.00% | 0.00% | 0.25% | 0.00% | 0.25% | 14% | 18% | 15% | 20% | 15% | 20% | 11% | 14% | 15% | 20% | 15% | 15% | 14% | 14% |
| 2537 | 0.00% | 0.25% | 0.25% | 0.00% | 0.25% | 14% | 18% | 18% | 23% | 14% | 18% | 13% | 17% | 16% | 21% | 15% | 15% | 14% | 14% |
| 2538 | 0.25% | 0.25% | 0.25% | 0.00% | 0.25% | 16% | 21% | 19% | 25% | 16% | 21% | 14% | 18% | 17% | 22% | 17% | 17% | 16% | 16% |
| 2539 | 0.00% | 1.00% | 0.25% | 0.00% | 0.25% | 17% | 22% | 21% | 27% | 18% | 23% | 16% | 21% | 19% | 25% | 19% | 19% | 18% | 18% |
| 2540 | 1.00% | 1.00% | 0.25% | 0.00% | 0.25% | 21% | 27% | 23% | 30% | 23% | 30% | 19% | 25% | 22% | 29% | 22% | 22% | 21% | 21% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2541 | 1.00% | 9.00% | 0.25% | 0.00% | 0.25% | 29% | 38% | 31% | 40% | 29% | 38% | 26% | 34% | 29% | 38% | 30% | 30% | 28% | 28% |
| 2542 | 0.25% | 0.00% | 1.00% | 0.00% | 0.25% | 17% | 22% | 17% | 22% | 18% | 23% | 15% | 20% | 17% | 22% | 17% | 17% | 17% | 17% |
| 2543 | 1.00% | 0.00% | 1.00% | 0.00% | 0.25% | 19% | 25% | 18% | 23% | 21% | 27% | 17% | 22% | 19% | 25% | 19% | 19% | 19% | 19% |
| 2544 | 0.00% | 0.25% | 1.00% | 0.00% | 0.25% | 19% | 25% | 21% | 27% | 20% | 26% | 19% | 25% | 20% | 26% | 20% | 20% | 20% | 20% |
| 2545 | 1.00% | 0.25% | 1.00% | 0.00% | 0.25% | 23% | 30% | 23% | 30% | 25% | 33% | 22% | 29% | 23% | 30% | 24% | 24% | 23% | 23% |
| 2546 | 0.00% | 1.00% | 1.00% | 0.00% | 0.25% | 22% | 29% | 24% | 31% | 24% | 31% | 22% | 29% | 23% | 30% | 23% | 23% | 23% | 23% |
| 2547 | 0.25% | 1.00% | 1.00% | 0.00% | 0.25% | 24% | 31% | 25% | 33% | 26% | 34% | 23% | 30% | 24% | 31% | 25% | 25% | 24% | 24% |
| 2548 | 1.00% | 1.00% | 1.00% | 0.00% | 0.25% | 26% | 34% | 26% | 34% | 29% | 38% | 25% | 33% | 26% | 34% | 27% | 27% | 27% | 27% |
| 2549 | 9.00% | 1.00% | 1.00% | 0.00% | 0.25% | 22% | 29% | 24% | 31% | 24% | 31% | 22% | 29% | 23% | 30% | 23% | 23% | 23% | 23% |
| 2550 | 1.00% | 9.00% | 1.00% | 0.00% | 0.25% | 34% | 44% | 34% | 44% | 35% | 46% | 32% | 42% | 33% | 43% | 34% | 34% | 33% | 33% |
| 2551 | 0.25% | 0.00% | 9.00% | 0.00% | 0.25% | 27% | 35% | 22% | 29% | 23% | 30% | 26% | 34% | 27% | 35% | 24% | 24% | 25% | 25% |
| 2552 | 0.00% | 0.25% | 9.00% | 0.00% | 0.25% | 29% | 38% | 26% | 34% | 25% | 33% | 30% | 39% | 30% | 39% | 27% | 27% | 28% | 28% |
| 2553 | 0.25% | 0.25% | 9.00% | 0.00% | 0.25% | 31% | 40% | 27% | 35% | 27% | 35% | 31% | 40% | 31% | 40% | 28% | 28% | 30% | 30% |
| 2554 | 1.00% | 0.25% | 9.00% | 0.00% | 0.25% | 33% | 43% | 28% | 36% | 30% | 39% | 33% | 43% | 33% | 43% | 30% | 30% | 32% | 32% |
| 2555 | 0.25% | 1.00% | 9.00% | 0.00% | 0.25% | 34% | 44% | 30% | 39% | 31% | 40% | 34% | 44% | 34% | 44% | 32% | 32% | 33% | 33% |
| 2556 | 0.25% | 0.00% | 0.00% | 0.25% | 0.25% | 11% | 14% | 14% | 18% | 10% | 13% | 11% | 14% | 13% | 17% | 12% | 12% | 11% | 11% |
| 2557 | 1.00% | 0.00% | 0.00% | 0.25% | 0.25% | 13% | 17% | 15% | 20% | 13% | 17% | 13% | 17% | 15% | 20% | 14% | 14% | 14% | 14% |
| 2558 | 0.00% | 0.25% | 0.00% | 0.25% | 0.25% | 13% | 17% | 18% | 23% | 12% | 16% | 15% | 20% | 16% | 21% | 14% | 14% | 14% | 14% |
| 2559 | 0.25% | 0.25% | 0.00% | 0.25% | 0.25% | 15% | 20% | 19% | 25% | 14% | 18% | 16% | 21% | 17% | 22% | 16% | 16% | 16% | 16% |
| 2560 | 9.00% | 0.25% | 0.00% | 0.25% | 0.25% | 13% | 17% | 18% | 23% | 12% | 16% | 15% | 20% | 16% | 21% | 14% | 14% | 14% | 14% |
| 2561 | 1.00% | 1.00% | 0.00% | 0.25% | 0.25% | 20% | 26% | 23% | 30% | 21% | 27% | 21% | 27% | 22% | 29% | 21% | 21% | 21% | 21% |
| 2562 | 1.00% | 9.00% | 0.00% | 0.25% | 0.25% | 28% | 36% | 31% | 40% | 27% | 35% | 28% | 36% | 29% | 38% | 29% | 29% | 28% | 28% |
| 2563 | 0.00% | 0.00% | 0.25% | 0.25% | 0.25% | 13% | 17% | 19% | 25% | 12% | 16% | 13% | 17% | 17% | 22% | 15% | 15% | 14% | 14% |
| 2564 | 0.25% | 0.00% | 0.25% | 0.25% | 0.25% | 15% | 20% | 20% | 26% | 14% | 18% | 14% | 18% | 18% | 23% | 16% | 16% | 15% | 15% |
| 2565 | 0.00% | 0.25% | 0.25% | 0.25% | 0.25% | 17% | 22% | 24% | 31% | 16% | 21% | 18% | 23% | 21% | 27% | 19% | 19% | 18% | 18% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2566 | 0.25% | 0.25% | 0.25% | 0.25% | 0.25% | 19% | 25% | 25% | 33% | 18% | 23% | 19% | 25% | 22% | 29% | 21% | 21% | 20% | 20% |
| 2567 | 1.00% | 0.25% | 0.25% | 0.25% | 0.25% | 21% | 27% | 26% | 34% | 21% | 27% | 21% | 27% | 24% | 31% | 23% | 23% | 22% | 22% |
| 2568 | 9.00% | 0.25% | 0.25% | 0.25% | 0.25% | 17% | 22% | 24% | 31% | 16% | 21% | 18% | 23% | 21% | 27% | 19% | 19% | 18% | 18% |
| 2569 | 0.25% | 1.00% | 0.25% | 0.25% | 0.25% | 22% | 29% | 28% | 36% | 22% | 29% | 22% | 29% | 25% | 33% | 24% | 24% | 23% | 23% |
| 2570 | 9.00% | 1.00% | 0.25% | 0.25% | 0.25% | 20% | 26% | 27% | 35% | 20% | 26% | 21% | 27% | 24% | 31% | 22% | 22% | 22% | 22% |
| 2571 | 0.25% | 9.00% | 0.25% | 0.25% | 0.25% | 30% | 39% | 36% | 47% | 28% | 36% | 29% | 38% | 32% | 42% | 31% | 31% | 30% | 30% |
| 2572 | 1.00% | 9.00% | 0.25% | 0.25% | 0.25% | 32% | 42% | 37% | 48% | 31% | 40% | 31% | 40% | 34% | 44% | 33% | 33% | 32% | 32% |
| 2573 | 9.00% | 9.00% | 0.25% | 0.25% | 0.25% | 28% | 36% | 35% | 46% | 26% | 34% | 28% | 36% | 31% | 40% | 30% | 30% | 28% | 28% |
| 2574 | 0.00% | 0.00% | 1.00% | 0.25% | 0.25% | 18% | 23% | 22% | 29% | 18% | 23% | 19% | 25% | 21% | 27% | 19% | 19% | 19% | 19% |
| 2575 | 1.00% | 0.00% | 1.00% | 0.25% | 0.25% | 22% | 29% | 24% | 31% | 23% | 30% | 22% | 29% | 24% | 31% | 23% | 23% | 23% | 23% |
| 2576 | 0.00% | 0.25% | 1.00% | 0.25% | 0.25% | 22% | 29% | 27% | 35% | 22% | 29% | 24% | 31% | 25% | 33% | 24% | 24% | 24% | 24% |
| 2577 | 0.25% | 0.25% | 1.00% | 0.25% | 0.25% | 24% | 31% | 28% | 36% | 24% | 31% | 25% | 33% | 26% | 34% | 25% | 25% | 25% | 25% |
| 2578 | 1.00% | 0.25% | 1.00% | 0.25% | 0.25% | 26% | 34% | 29% | 38% | 27% | 35% | 27% | 35% | 28% | 36% | 27% | 27% | 27% | 27% |
| 2579 | 9.00% | 0.25% | 1.00% | 0.25% | 0.25% | 22% | 29% | 27% | 35% | 22% | 29% | 24% | 31% | 25% | 33% | 24% | 24% | 24% | 24% |
| 2580 | 0.00% | 1.00% | 1.00% | 0.25% | 0.25% | 25% | 33% | 30% | 39% | 26% | 34% | 27% | 35% | 28% | 36% | 27% | 27% | 27% | 27% |
| 2581 | 0.25% | 1.00% | 1.00% | 0.25% | 0.25% | 27% | 35% | 31% | 40% | 28% | 36% | 28% | 36% | 29% | 38% | 29% | 29% | 28% | 28% |
| 2582 | 1.00% | 1.00% | 1.00% | 0.25% | 0.25% | 29% | 38% | 32% | 42% | 31% | 40% | 30% | 39% | 31% | 40% | 31% | 31% | 31% | 31% |
| 2583 | 9.00% | 1.00% | 1.00% | 0.25% | 0.25% | 25% | 33% | 30% | 39% | 26% | 34% | 27% | 35% | 28% | 36% | 27% | 27% | 27% | 27% |
| 2584 | 0.00% | 9.00% | 1.00% | 0.25% | 0.25% | 33% | 43% | 38% | 49% | 32% | 42% | 34% | 44% | 35% | 46% | 34% | 34% | 34% | 34% |
| 2585 | 0.25% | 9.00% | 1.00% | 0.25% | 0.25% | 35% | 46% | 39% | 51% | 34% | 44% | 35% | 46% | 36% | 47% | 36% | 36% | 35% | 35% |
| 2586 | 1.00% | 9.00% | 1.00% | 0.25% | 0.25% | 37% | 48% | 40% | 52% | 37% | 48% | 37% | 48% | 38% | 49% | 38% | 38% | 37% | 37% |
| 2587 | 0.25% | 0.25% | 9.00% | 0.25% | 0.25% | 34% | 44% | 33% | 43% | 29% | 38% | 36% | 47% | 36% | 47% | 32% | 32% | 34% | 34% |
| 2588 | 1.00% | 0.25% | 9.00% | 0.25% | 0.25% | 36% | 47% | 34% | 44% | 32% | 42% | 38% | 49% | 38% | 49% | 34% | 34% | 36% | 36% |
| 2589 | 9.00% | 0.25% | 9.00% | 0.25% | 0.25% | 32% | 42% | 32% | 42% | 27% | 35% | 35% | 46% | 35% | 46% | 30% | 30% | 32% | 32% |
| 2590 | 0.00% | 1.00% | 9.00% | 0.25% | 0.25% | 35% | 46% | 35% | 46% | 31% | 40% | 38% | 49% | 38% | 49% | 34% | 34% | 36% | 36% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2591 | 0.25% | 1.00% | 9.00% | 0.25% | 0.25% | 37% | 48% | 36% | 47% | 33% | 43% | 39% | 51% | 39% | 51% | 35% | 35% | 37% | 37% |
| 2592 | 9.00% | 1.00% | 9.00% | 0.25% | 0.25% | 35% | 46% | 35% | 46% | 31% | 40% | 38% | 49% | 38% | 49% | 34% | 34% | 36% | 36% |
| 2593 | 1.00% | 9.00% | 9.00% | 0.25% | 0.25% | 47% | 61% | 45% | 59% | 42% | 55% | 48% | 62% | 48% | 62% | 45% | 45% | 46% | 46% |
| 2594 | 0.25% | 0.00% | 0.00% | 1.00% | 0.25% | 22% | 29% | 21% | 27% | 20% | 26% | 18% | 23% | 25% | 33% | 21% | 21% | 21% | 21% |
| 2595 | 1.00% | 0.25% | 0.00% | 1.00% | 0.25% | 28% | 36% | 27% | 35% | 27% | 35% | 25% | 33% | 31% | 40% | 27% | 27% | 28% | 28% |
| 2596 | 0.00% | 1.00% | 0.00% | 1.00% | 0.25% | 27% | 35% | 28% | 36% | 26% | 34% | 25% | 33% | 31% | 40% | 27% | 27% | 27% | 27% |
| 2597 | 0.25% | 1.00% | 0.00% | 1.00% | 0.25% | 29% | 38% | 29% | 38% | 28% | 36% | 26% | 34% | 32% | 42% | 29% | 29% | 29% | 29% |
| 2598 | 1.00% | 1.00% | 0.00% | 1.00% | 0.25% | 31% | 40% | 30% | 39% | 31% | 40% | 28% | 36% | 34% | 44% | 31% | 31% | 31% | 31% |
| 2599 | 0.00% | 0.00% | 0.25% | 1.00% | 0.25% | 24% | 31% | 26% | 34% | 22% | 29% | 20% | 26% | 29% | 38% | 24% | 24% | 24% | 24% |
| 2600 | 1.00% | 0.00% | 0.25% | 1.00% | 0.25% | 28% | 36% | 28% | 36% | 27% | 35% | 23% | 30% | 32% | 42% | 28% | 28% | 27% | 27% |
| 2601 | 0.25% | 0.25% | 0.25% | 1.00% | 0.25% | 30% | 39% | 32% | 42% | 28% | 36% | 26% | 34% | 34% | 44% | 30% | 30% | 29% | 29% |
| 2602 | 1.00% | 0.25% | 0.25% | 1.00% | 0.25% | 32% | 42% | 33% | 43% | 31% | 40% | 28% | 36% | 36% | 47% | 32% | 32% | 32% | 32% |
| 2603 | 9.00% | 0.25% | 0.25% | 1.00% | 0.25% | 28% | 36% | 31% | 40% | 26% | 34% | 25% | 33% | 33% | 43% | 28% | 28% | 28% | 28% |
| 2604 | 0.00% | 1.00% | 0.25% | 1.00% | 0.25% | 31% | 40% | 34% | 44% | 30% | 39% | 28% | 36% | 36% | 47% | 32% | 32% | 31% | 31% |
| 2605 | 0.25% | 1.00% | 0.25% | 1.00% | 0.25% | 33% | 43% | 35% | 46% | 32% | 42% | 29% | 38% | 37% | 48% | 33% | 33% | 33% | 33% |
| 2606 | 1.00% | 1.00% | 0.25% | 1.00% | 0.25% | 35% | 46% | 36% | 47% | 35% | 46% | 31% | 40% | 39% | 51% | 35% | 35% | 35% | 35% |
| 2607 | 9.00% | 1.00% | 0.25% | 1.00% | 0.25% | 31% | 40% | 34% | 44% | 30% | 39% | 28% | 36% | 36% | 47% | 32% | 32% | 31% | 31% |
| 2608 | 0.25% | 9.00% | 0.25% | 1.00% | 0.25% | 41% | 53% | 43% | 56% | 38% | 49% | 36% | 47% | 44% | 57% | 41% | 41% | 39% | 39% |
| 2609 | 1.00% | 9.00% | 0.25% | 1.00% | 0.25% | 43% | 56% | 44% | 57% | 41% | 53% | 38% | 49% | 46% | 60% | 43% | 43% | 42% | 42% |
| 2610 | 9.00% | 9.00% | 0.25% | 1.00% | 0.25% | 39% | 51% | 42% | 55% | 36% | 47% | 35% | 46% | 43% | 56% | 39% | 39% | 38% | 38% |
| 2611 | 0.00% | 0.00% | 1.00% | 1.00% | 0.25% | 29% | 38% | 29% | 38% | 28% | 36% | 26% | 34% | 33% | 43% | 29% | 29% | 29% | 29% |
| 2612 | 0.25% | 0.00% | 1.00% | 1.00% | 0.25% | 31% | 40% | 30% | 39% | 30% | 39% | 27% | 35% | 34% | 44% | 30% | 30% | 30% | 30% |
| 2613 | 1.00% | 0.00% | 1.00% | 1.00% | 0.25% | 33% | 43% | 31% | 40% | 33% | 43% | 29% | 38% | 36% | 47% | 32% | 32% | 33% | 33% |
| 2614 | 0.00% | 0.25% | 1.00% | 1.00% | 0.25% | 33% | 43% | 34% | 44% | 32% | 42% | 31% | 40% | 37% | 48% | 33% | 33% | 33% | 33% |
| 2615 | 1.00% | 0.25% | 1.00% | 1.00% | 0.25% | 37% | 48% | 36% | 47% | 37% | 48% | 34% | 44% | 40% | 52% | 37% | 37% | 37% | 37% |

Fig. 13

| Formula # | Gamma Dodecalactone | Propyl Dihydrojasmonate | Methyl Dihydrojasmonate | IR3535 | Lactic Acid | MOSQUITO Expected Repellency | MOSQUITO Actual Repellency | TICK Expected Repellency | TICK Expected Actual Repellency | BITING FLY Expected Repellency | BITING FLY Actual Repellency | BITING MIDGE Expected Repellency | BITING MIDGE Actual Repellency | BED BUG Expected Repellency | BED BUG Actual Repellency | LICE Expected Repellency | LICE Actual Repellency | MITES Expected Repellency | MITES Actual Repellency |
|---|---|---|---|---|---|---|---|---|---|---|---|---|---|---|---|---|---|---|---|
| 2616 | 9.00% | 0.25% | 1.00% | 1.00% | 0.25% | 33% | 43% | 34% | 44% | 32% | 42% | 31% | 40% | 37% | 48% | 33% | 33% | 33% | 33% |
| 2617 | 0.00% | 1.00% | 1.00% | 1.00% | 0.25% | 36% | 47% | 37% | 48% | 36% | 47% | 34% | 44% | 40% | 52% | 36% | 36% | 37% | 37% |
| 2618 | 0.25% | 1.00% | 1.00% | 1.00% | 0.25% | 38% | 49% | 38% | 49% | 38% | 49% | 35% | 46% | 41% | 53% | 38% | 38% | 38% | 38% |
| 2619 | 1.00% | 1.00% | 1.00% | 1.00% | 0.25% | 40% | 52% | 39% | 51% | 41% | 53% | 37% | 48% | 43% | 56% | 40% | 40% | 40% | 40% |
| 2620 | 9.00% | 1.00% | 1.00% | 1.00% | 0.25% | 36% | 47% | 37% | 48% | 36% | 47% | 34% | 44% | 40% | 52% | 36% | 36% | 37% | 37% |
| 2621 | 0.00% | 9.00% | 1.00% | 1.00% | 0.25% | 44% | 57% | 45% | 59% | 42% | 55% | 41% | 53% | 47% | 61% | 44% | 44% | 43% | 43% |
| 2622 | 0.25% | 9.00% | 1.00% | 1.00% | 0.25% | 46% | 60% | 46% | 60% | 44% | 57% | 42% | 55% | 48% | 62% | 45% | 45% | 45% | 45% |
| 2623 | 1.00% | 9.00% | 1.00% | 1.00% | 0.25% | 48% | 62% | 47% | 61% | 47% | 61% | 44% | 57% | 50% | 65% | 47% | 47% | 47% | 47% |
| 2624 | 0.25% | 0.25% | 9.00% | 1.00% | 0.25% | 45% | 59% | 40% | 52% | 39% | 51% | 43% | 56% | 48% | 62% | 41% | 41% | 43% | 43% |
| 2625 | 1.00% | 0.25% | 9.00% | 1.00% | 0.25% | 47% | 61% | 41% | 53% | 42% | 55% | 45% | 59% | 50% | 65% | 43% | 43% | 46% | 46% |
| 2626 | 9.00% | 0.25% | 9.00% | 1.00% | 0.25% | 43% | 56% | 39% | 51% | 37% | 48% | 42% | 55% | 47% | 61% | 40% | 40% | 42% | 42% |
| 2627 | 0.25% | 1.00% | 9.00% | 1.00% | 0.25% | 48% | 62% | 43% | 56% | 43% | 56% | 46% | 60% | 51% | 66% | 45% | 45% | 47% | 47% |
| 2628 | 0.00% | 0.25% | 0.00% | 9.00% | 0.25% | 37% | 48% | 34% | 44% | 32% | 42% | 35% | 46% | 38% | 49% | 34% | 34% | 35% | 35% |
| 2629 | 0.00% | 0.00% | 0.25% | 9.00% | 0.25% | 37% | 48% | 35% | 46% | 32% | 42% | 33% | 43% | 39% | 51% | 35% | 35% | 35% | 35% |
| 2630 | 0.25% | 0.00% | 0.25% | 9.00% | 0.25% | 39% | 51% | 36% | 47% | 34% | 44% | 34% | 44% | 40% | 52% | 36% | 36% | 36% | 36% |
| 2631 | 0.00% | 0.25% | 0.25% | 9.00% | 0.25% | 41% | 53% | 40% | 52% | 36% | 47% | 38% | 49% | 43% | 56% | 39% | 39% | 39% | 39% |
| 2632 | 0.25% | 0.25% | 0.25% | 9.00% | 0.25% | 43% | 56% | 41% | 53% | 38% | 49% | 39% | 51% | 44% | 57% | 41% | 41% | 40% | 40% |
| 2633 | 1.00% | 0.25% | 0.25% | 9.00% | 0.25% | 45% | 59% | 42% | 55% | 41% | 53% | 41% | 53% | 46% | 60% | 43% | 43% | 43% | 43% |
| 2634 | 9.00% | 0.25% | 0.25% | 9.00% | 0.25% | 41% | 53% | 40% | 52% | 36% | 47% | 38% | 49% | 43% | 56% | 39% | 39% | 39% | 39% |
| 2635 | 0.00% | 1.00% | 0.25% | 9.00% | 0.25% | 44% | 57% | 43% | 56% | 40% | 52% | 41% | 53% | 46% | 60% | 42% | 42% | 42% | 42% |
| 2636 | 0.25% | 1.00% | 0.25% | 9.00% | 0.25% | 46% | 60% | 44% | 57% | 42% | 55% | 42% | 55% | 47% | 61% | 44% | 44% | 44% | 44% |
| 2637 | 1.00% | 1.00% | 0.25% | 9.00% | 0.25% | 48% | 62% | 45% | 59% | 45% | 59% | 44% | 57% | 49% | 64% | 46% | 46% | 46% | 46% |
| 2638 | 0.25% | 9.00% | 0.25% | 9.00% | 0.25% | 54% | 70% | 52% | 68% | 48% | 62% | 49% | 64% | 54% | 70% | 51% | 51% | 50% | 50% |
| 2639 | 0.25% | 0.00% | 1.00% | 9.00% | 0.25% | 44% | 57% | 39% | 51% | 40% | 52% | 40% | 52% | 44% | 57% | 41% | 41% | 41% | 41% |
| 2640 | 1.00% | 0.25% | 1.00% | 9.00% | 0.25% | 50% | 65% | 45% | 59% | 47% | 61% | 47% | 61% | 50% | 65% | 47% | 47% | 48% | 48% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2641 | 9.00% | 0.25% | 1.00% | 9.00% | 0.25% | 46% | 60% | 43% | 56% | 42% | 55% | 44% | 57% | 47% | 61% | 44% | 44% | 44% | 44% |
| 2642 | 0.00% | 1.00% | 1.00% | 9.00% | 0.25% | 49% | 64% | 46% | 60% | 46% | 60% | 47% | 61% | 50% | 65% | 47% | 47% | 48% | 48% |
| 2643 | 0.25% | 1.00% | 1.00% | 9.00% | 0.25% | 51% | 66% | 47% | 61% | 48% | 62% | 48% | 62% | 51% | 66% | 49% | 49% | 49% | 49% |
| 2644 | 1.00% | 1.00% | 1.00% | 9.00% | 0.25% | 53% | 69% | 48% | 62% | 51% | 66% | 50% | 65% | 53% | 69% | 51% | 51% | 51% | 51% |
| 2645 | 0.25% | 0.25% | 9.00% | 9.00% | 0.25% | 58% | 75% | 49% | 64% | 49% | 64% | 56% | 73% | 58% | 75% | 52% | 52% | 54% | 54% |
| 2646 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 2647 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 2648 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 2649 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 2650 | 0.25% | 0.00% | 0.25% | 0.00% | 1.00% | 17% | 22% | 20% | 26% | 17% | 22% | 14% | 18% | 24% | 31% | 18% | 18% | 18% | 18% |
| 2651 | 1.00% | 0.00% | 0.25% | 0.00% | 1.00% | 19% | 25% | 21% | 27% | 20% | 26% | 16% | 21% | 26% | 34% | 20% | 20% | 21% | 21% |
| 2652 | 0.00% | 0.25% | 0.25% | 0.00% | 1.00% | 19% | 25% | 24% | 31% | 19% | 25% | 18% | 23% | 27% | 35% | 21% | 21% | 21% | 21% |
| 2653 | 0.25% | 0.25% | 0.25% | 0.00% | 1.00% | 21% | 27% | 25% | 33% | 21% | 27% | 19% | 25% | 28% | 36% | 22% | 22% | 23% | 23% |
| 2654 | 0.00% | 1.00% | 0.25% | 0.00% | 1.00% | 22% | 29% | 27% | 35% | 23% | 30% | 21% | 27% | 30% | 39% | 24% | 24% | 25% | 25% |
| 2655 | 1.00% | 1.00% | 0.25% | 0.00% | 1.00% | 26% | 34% | 29% | 38% | 28% | 36% | 24% | 31% | 33% | 43% | 28% | 28% | 28% | 28% |
| 2656 | 1.00% | 9.00% | 0.25% | 0.00% | 1.00% | 34% | 44% | 37% | 48% | 34% | 44% | 31% | 40% | 40% | 52% | 35% | 35% | 35% | 35% |
| 2657 | 0.25% | 0.00% | 1.00% | 0.00% | 1.00% | 22% | 29% | 23% | 30% | 23% | 30% | 20% | 26% | 28% | 36% | 23% | 23% | 24% | 24% |
| 2658 | 1.00% | 0.00% | 1.00% | 0.00% | 1.00% | 24% | 31% | 24% | 31% | 26% | 34% | 22% | 29% | 30% | 39% | 25% | 25% | 26% | 26% |
| 2659 | 0.00% | 0.25% | 1.00% | 0.00% | 1.00% | 24% | 31% | 27% | 35% | 25% | 33% | 24% | 31% | 31% | 40% | 25% | 25% | 27% | 27% |
| 2660 | 1.00% | 0.25% | 1.00% | 0.00% | 1.00% | 28% | 36% | 29% | 38% | 30% | 39% | 27% | 35% | 34% | 44% | 29% | 29% | 30% | 30% |
| 2661 | 0.00% | 1.00% | 1.00% | 0.00% | 1.00% | 27% | 35% | 30% | 39% | 29% | 38% | 27% | 35% | 34% | 44% | 29% | 29% | 30% | 30% |
| 2662 | 0.25% | 1.00% | 1.00% | 0.00% | 1.00% | 29% | 38% | 31% | 40% | 31% | 40% | 28% | 36% | 35% | 46% | 30% | 30% | 31% | 31% |
| 2663 | 1.00% | 1.00% | 1.00% | 0.00% | 1.00% | 31% | 40% | 32% | 42% | 34% | 44% | 30% | 39% | 37% | 48% | 32% | 32% | 34% | 34% |
| 2664 | 9.00% | 1.00% | 1.00% | 0.00% | 1.00% | 27% | 35% | 30% | 39% | 29% | 38% | 27% | 35% | 34% | 44% | 29% | 29% | 30% | 30% |
| 2665 | 1.00% | 9.00% | 1.00% | 0.00% | 1.00% | 39% | 51% | 40% | 52% | 40% | 52% | 37% | 48% | 44% | 57% | 40% | 40% | 40% | 40% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2666 | 0.25% | 0.00% | 9.00% | 0.00% | 1.00% | 32% | 42% | 28% | 36% | 28% | 36% | 31% | 40% | 38% | 49% | 29% | 29% | 32% | 32% |
| 2667 | 0.00% | 0.25% | 9.00% | 0.00% | 1.00% | 34% | 44% | 32% | 42% | 30% | 39% | 35% | 46% | 41% | 53% | 32% | 32% | 35% | 35% |
| 2668 | 0.25% | 0.25% | 9.00% | 0.00% | 1.00% | 36% | 47% | 33% | 43% | 32% | 42% | 36% | 47% | 42% | 55% | 34% | 34% | 37% | 37% |
| 2669 | 1.00% | 0.25% | 9.00% | 0.00% | 1.00% | 38% | 49% | 34% | 44% | 35% | 46% | 38% | 49% | 44% | 57% | 36% | 36% | 39% | 39% |
| 2670 | 0.25% | 1.00% | 9.00% | 0.00% | 1.00% | 39% | 51% | 36% | 47% | 36% | 47% | 39% | 51% | 45% | 59% | 37% | 37% | 40% | 40% |
| 2671 | 0.25% | 0.00% | 0.00% | 0.25% | 1.00% | 16% | 21% | 20% | 26% | 15% | 20% | 16% | 21% | 24% | 31% | 17% | 17% | 18% | 18% |
| 2672 | 1.00% | 0.00% | 0.00% | 0.25% | 1.00% | 18% | 23% | 21% | 27% | 18% | 23% | 18% | 23% | 26% | 34% | 19% | 19% | 21% | 21% |
| 2673 | 0.00% | 0.25% | 0.00% | 0.25% | 1.00% | 18% | 23% | 24% | 31% | 17% | 22% | 20% | 26% | 27% | 35% | 20% | 20% | 21% | 21% |
| 2674 | 0.25% | 0.25% | 0.00% | 0.25% | 1.00% | 20% | 26% | 25% | 33% | 19% | 25% | 21% | 27% | 28% | 36% | 21% | 21% | 23% | 23% |
| 2675 | 9.00% | 0.25% | 0.00% | 0.25% | 1.00% | 18% | 23% | 24% | 31% | 17% | 22% | 20% | 26% | 27% | 35% | 20% | 20% | 21% | 21% |
| 2676 | 1.00% | 1.00% | 0.00% | 0.25% | 1.00% | 25% | 33% | 29% | 38% | 26% | 34% | 26% | 34% | 33% | 43% | 27% | 27% | 28% | 28% |
| 2677 | 1.00% | 9.00% | 0.00% | 0.25% | 1.00% | 33% | 43% | 37% | 48% | 32% | 42% | 33% | 43% | 40% | 52% | 34% | 34% | 35% | 35% |
| 2678 | 0.00% | 0.00% | 0.25% | 0.25% | 1.00% | 18% | 23% | 25% | 33% | 17% | 22% | 18% | 23% | 28% | 36% | 20% | 20% | 21% | 21% |
| 2679 | 0.25% | 0.00% | 0.25% | 0.25% | 1.00% | 20% | 26% | 26% | 34% | 19% | 25% | 19% | 25% | 29% | 38% | 22% | 22% | 22% | 22% |
| 2680 | 0.00% | 0.25% | 0.25% | 0.25% | 1.00% | 22% | 29% | 30% | 39% | 21% | 27% | 23% | 30% | 32% | 42% | 24% | 24% | 25% | 25% |
| 2681 | 0.25% | 0.25% | 0.25% | 0.25% | 1.00% | 24% | 31% | 31% | 40% | 23% | 30% | 24% | 31% | 33% | 43% | 26% | 26% | 27% | 27% |
| 2682 | 1.00% | 0.25% | 0.25% | 0.25% | 1.00% | 26% | 34% | 32% | 42% | 26% | 34% | 26% | 34% | 35% | 46% | 28% | 28% | 29% | 29% |
| 2683 | 9.00% | 0.25% | 0.25% | 0.25% | 1.00% | 22% | 29% | 30% | 39% | 21% | 27% | 23% | 30% | 32% | 42% | 24% | 24% | 25% | 25% |
| 2684 | 0.25% | 1.00% | 0.25% | 0.25% | 1.00% | 27% | 35% | 34% | 44% | 27% | 35% | 27% | 35% | 36% | 47% | 29% | 29% | 30% | 30% |
| 2685 | 9.00% | 1.00% | 0.25% | 0.25% | 1.00% | 25% | 33% | 33% | 43% | 25% | 33% | 26% | 34% | 35% | 46% | 28% | 28% | 29% | 29% |
| 2686 | 0.25% | 9.00% | 0.25% | 0.25% | 1.00% | 35% | 46% | 42% | 55% | 33% | 43% | 34% | 44% | 43% | 56% | 37% | 37% | 37% | 37% |
| 2687 | 1.00% | 9.00% | 0.25% | 0.25% | 1.00% | 37% | 48% | 43% | 56% | 36% | 47% | 36% | 47% | 45% | 59% | 39% | 39% | 39% | 39% |
| 2688 | 9.00% | 9.00% | 0.25% | 0.25% | 1.00% | 33% | 43% | 41% | 53% | 31% | 40% | 33% | 43% | 42% | 55% | 35% | 35% | 35% | 35% |
| 2689 | 0.00% | 0.00% | 1.00% | 0.25% | 1.00% | 23% | 30% | 28% | 36% | 23% | 30% | 24% | 31% | 32% | 42% | 25% | 25% | 26% | 26% |
| 2690 | 1.00% | 0.00% | 1.00% | 0.25% | 1.00% | 27% | 35% | 30% | 39% | 28% | 36% | 27% | 35% | 35% | 46% | 28% | 28% | 30% | 30% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2691 | 0.00% | 0.25% | 1.00% | 0.25% | 1.00% | 27% | 35% | 33% | 43% | 27% | 35% | 29% | 38% | 36% | 47% | 29% | 29% | 31% | 31% |
| 2692 | 0.25% | 0.25% | 1.00% | 0.25% | 1.00% | 29% | 38% | 34% | 44% | 29% | 38% | 30% | 39% | 37% | 48% | 31% | 31% | 32% | 32% |
| 2693 | 1.00% | 0.25% | 1.00% | 0.25% | 1.00% | 31% | 40% | 35% | 46% | 32% | 42% | 32% | 42% | 39% | 51% | 33% | 33% | 34% | 34% |
| 2694 | 9.00% | 0.25% | 1.00% | 0.25% | 1.00% | 27% | 35% | 33% | 43% | 27% | 35% | 29% | 38% | 36% | 47% | 29% | 29% | 31% | 31% |
| 2695 | 0.00% | 1.00% | 1.00% | 0.25% | 1.00% | 30% | 39% | 36% | 47% | 31% | 40% | 32% | 42% | 39% | 51% | 32% | 32% | 34% | 34% |
| 2696 | 0.25% | 1.00% | 1.00% | 0.25% | 1.00% | 32% | 42% | 37% | 48% | 33% | 43% | 33% | 43% | 40% | 52% | 34% | 34% | 35% | 35% |
| 2697 | 1.00% | 1.00% | 1.00% | 0.25% | 1.00% | 34% | 44% | 38% | 49% | 36% | 47% | 35% | 46% | 42% | 55% | 36% | 36% | 38% | 38% |
| 2698 | 9.00% | 1.00% | 1.00% | 0.25% | 1.00% | 30% | 39% | 36% | 47% | 31% | 40% | 32% | 42% | 39% | 51% | 32% | 32% | 34% | 34% |
| 2699 | 0.00% | 9.00% | 1.00% | 0.25% | 1.00% | 38% | 49% | 44% | 57% | 37% | 48% | 39% | 51% | 46% | 60% | 40% | 40% | 41% | 41% |
| 2700 | 0.25% | 9.00% | 1.00% | 0.25% | 1.00% | 40% | 52% | 45% | 59% | 39% | 51% | 40% | 52% | 47% | 61% | 41% | 41% | 42% | 42% |
| 2701 | 1.00% | 9.00% | 1.00% | 0.25% | 1.00% | 42% | 55% | 46% | 60% | 42% | 55% | 42% | 55% | 49% | 64% | 43% | 43% | 44% | 44% |
| 2702 | 0.25% | 0.25% | 9.00% | 0.25% | 1.00% | 39% | 51% | 39% | 51% | 34% | 44% | 41% | 53% | 47% | 61% | 37% | 37% | 41% | 41% |
| 2703 | 1.00% | 0.25% | 9.00% | 0.25% | 1.00% | 41% | 53% | 40% | 52% | 37% | 48% | 43% | 56% | 49% | 64% | 39% | 39% | 43% | 43% |
| 2704 | 9.00% | 0.25% | 9.00% | 0.25% | 1.00% | 37% | 48% | 38% | 49% | 32% | 42% | 40% | 52% | 46% | 60% | 36% | 36% | 39% | 39% |
| 2705 | 0.00% | 1.00% | 9.00% | 0.25% | 1.00% | 40% | 52% | 41% | 53% | 36% | 47% | 43% | 56% | 49% | 64% | 39% | 39% | 43% | 43% |
| 2706 | 0.25% | 1.00% | 9.00% | 0.25% | 1.00% | 42% | 55% | 42% | 55% | 38% | 49% | 44% | 57% | 50% | 65% | 41% | 41% | 44% | 44% |
| 2707 | 9.00% | 1.00% | 9.00% | 0.25% | 1.00% | 40% | 52% | 41% | 53% | 36% | 47% | 43% | 56% | 49% | 64% | 39% | 39% | 43% | 43% |
| 2708 | 1.00% | 9.00% | 9.00% | 0.25% | 1.00% | 52% | 68% | 51% | 66% | 47% | 61% | 53% | 69% | 59% | 77% | 50% | 50% | 53% | 53% |
| 2709 | 0.25% | 0.00% | 0.00% | 1.00% | 1.00% | 27% | 35% | 27% | 35% | 25% | 33% | 23% | 30% | 36% | 47% | 26% | 26% | 28% | 28% |
| 2710 | 1.00% | 0.25% | 0.00% | 1.00% | 1.00% | 33% | 43% | 33% | 43% | 32% | 42% | 30% | 39% | 42% | 55% | 33% | 33% | 35% | 35% |
| 2711 | 0.00% | 1.00% | 0.00% | 1.00% | 1.00% | 32% | 42% | 34% | 44% | 31% | 40% | 30% | 39% | 42% | 55% | 32% | 32% | 34% | 34% |
| 2712 | 0.25% | 1.00% | 0.00% | 1.00% | 1.00% | 34% | 44% | 35% | 46% | 33% | 43% | 31% | 40% | 43% | 56% | 34% | 34% | 36% | 36% |
| 2713 | 1.00% | 1.00% | 0.00% | 1.00% | 1.00% | 36% | 47% | 36% | 47% | 36% | 47% | 33% | 43% | 45% | 59% | 36% | 36% | 38% | 38% |
| 2714 | 0.00% | 0.00% | 0.25% | 1.00% | 1.00% | 29% | 38% | 32% | 42% | 27% | 35% | 25% | 33% | 40% | 52% | 29% | 29% | 31% | 31% |
| 2715 | 1.00% | 0.00% | 0.25% | 1.00% | 1.00% | 33% | 43% | 34% | 44% | 32% | 42% | 28% | 36% | 43% | 56% | 33% | 33% | 34% | 34% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2716 | 0.25% | 0.25% | 0.25% | 1.00% | 1.00% | 35% | 46% | 38% | 49% | 33% | 43% | 31% | 40% | 45% | 59% | 35% | 35% | 36% | 36% |
| 2717 | 1.00% | 0.25% | 0.25% | 1.00% | 1.00% | 37% | 48% | 39% | 51% | 36% | 47% | 33% | 43% | 47% | 61% | 37% | 37% | 39% | 39% |
| 2718 | 9.00% | 0.25% | 0.25% | 1.00% | 1.00% | 33% | 43% | 37% | 48% | 31% | 40% | 30% | 39% | 44% | 57% | 34% | 34% | 35% | 35% |
| 2719 | 0.00% | 1.00% | 0.25% | 1.00% | 1.00% | 36% | 47% | 40% | 52% | 35% | 46% | 33% | 43% | 47% | 61% | 37% | 37% | 38% | 38% |
| 2720 | 0.25% | 1.00% | 0.25% | 1.00% | 1.00% | 38% | 49% | 41% | 53% | 37% | 48% | 34% | 44% | 48% | 62% | 39% | 39% | 40% | 40% |
| 2721 | 1.00% | 1.00% | 0.25% | 1.00% | 1.00% | 40% | 52% | 42% | 55% | 40% | 52% | 36% | 47% | 50% | 65% | 41% | 41% | 42% | 42% |
| 2722 | 9.00% | 1.00% | 0.25% | 1.00% | 1.00% | 36% | 47% | 40% | 52% | 35% | 46% | 33% | 43% | 47% | 61% | 37% | 37% | 38% | 38% |
| 2723 | 0.25% | 9.00% | 0.25% | 1.00% | 1.00% | 46% | 60% | 49% | 64% | 43% | 56% | 41% | 53% | 55% | 72% | 46% | 46% | 46% | 46% |
| 2724 | 1.00% | 9.00% | 0.25% | 1.00% | 1.00% | 48% | 62% | 50% | 65% | 46% | 60% | 43% | 56% | 57% | 74% | 48% | 48% | 49% | 49% |
| 2725 | 9.00% | 9.00% | 0.25% | 1.00% | 1.00% | 44% | 57% | 48% | 62% | 41% | 53% | 40% | 52% | 54% | 70% | 44% | 44% | 45% | 45% |
| 2726 | 0.00% | 0.00% | 1.00% | 1.00% | 1.00% | 34% | 44% | 35% | 46% | 33% | 43% | 31% | 40% | 44% | 57% | 34% | 34% | 36% | 36% |
| 2727 | 0.25% | 0.00% | 1.00% | 1.00% | 1.00% | 36% | 47% | 36% | 47% | 35% | 46% | 32% | 42% | 45% | 59% | 36% | 36% | 37% | 37% |
| 2728 | 1.00% | 0.00% | 1.00% | 1.00% | 1.00% | 38% | 49% | 37% | 48% | 38% | 49% | 34% | 44% | 47% | 61% | 38% | 38% | 40% | 40% |
| 2729 | 0.00% | 0.25% | 1.00% | 1.00% | 1.00% | 38% | 49% | 40% | 52% | 37% | 48% | 36% | 47% | 48% | 62% | 38% | 38% | 40% | 40% |
| 2730 | 1.00% | 0.25% | 1.00% | 1.00% | 1.00% | 42% | 55% | 42% | 55% | 42% | 55% | 39% | 51% | 51% | 66% | 42% | 42% | 44% | 44% |
| 2731 | 9.00% | 0.25% | 1.00% | 1.00% | 1.00% | 38% | 49% | 40% | 52% | 37% | 48% | 36% | 47% | 48% | 62% | 38% | 38% | 40% | 40% |
| 2732 | 0.00% | 1.00% | 1.00% | 1.00% | 1.00% | 41% | 53% | 43% | 56% | 41% | 53% | 39% | 51% | 51% | 66% | 42% | 42% | 44% | 44% |
| 2733 | 0.25% | 1.00% | 1.00% | 1.00% | 1.00% | 43% | 56% | 44% | 57% | 43% | 56% | 40% | 52% | 52% | 68% | 43% | 43% | 45% | 45% |
| 2734 | 1.00% | 1.00% | 1.00% | 1.00% | 1.00% | 45% | 59% | 45% | 59% | 46% | 60% | 42% | 55% | 54% | 70% | 45% | 45% | 47% | 47% |
| 2735 | 9.00% | 1.00% | 1.00% | 1.00% | 1.00% | 41% | 53% | 43% | 56% | 41% | 53% | 39% | 51% | 51% | 66% | 42% | 42% | 44% | 44% |
| 2736 | 0.00% | 9.00% | 1.00% | 1.00% | 1.00% | 49% | 64% | 51% | 66% | 47% | 61% | 46% | 60% | 58% | 75% | 49% | 49% | 50% | 50% |
| 2737 | 0.25% | 9.00% | 1.00% | 1.00% | 1.00% | 51% | 66% | 52% | 68% | 49% | 64% | 47% | 61% | 59% | 77% | 51% | 51% | 52% | 52% |
| 2738 | 1.00% | 9.00% | 1.00% | 1.00% | 1.00% | 53% | 69% | 53% | 69% | 52% | 68% | 49% | 64% | 61% | 79% | 53% | 53% | 54% | 54% |
| 2739 | 0.25% | 0.25% | 9.00% | 1.00% | 1.00% | 50% | 65% | 46% | 60% | 44% | 57% | 48% | 62% | 59% | 77% | 47% | 47% | 50% | 50% |
| 2740 | 1.00% | 0.25% | 9.00% | 1.00% | 1.00% | 52% | 68% | 47% | 61% | 47% | 61% | 50% | 65% | 61% | 79% | 49% | 49% | 53% | 53% |

Fig. 13

| Formula # | Gamma Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2741 | 9.00% | 0.25% | 9.00% | 1.00% | 1.00% | 48% | 62% | 45% | 59% | 42% | 55% | 47% | 61% | 58% | 75% | 45% | 45% | 49% | 49% |
| 2742 | 0.25% | 1.00% | 9.00% | 1.00% | 1.00% | 53% | 69% | 49% | 64% | 48% | 62% | 51% | 66% | 62% | 81% | 50% | 50% | 54% | 54% |
| 2743 | 0.00% | 0.25% | 0.00% | 9.00% | 1.00% | 42% | 55% | 40% | 52% | 37% | 48% | 40% | 52% | 49% | 64% | 40% | 40% | 42% | 42% |
| 2744 | 0.00% | 0.00% | 0.25% | 9.00% | 1.00% | 42% | 55% | 41% | 53% | 37% | 48% | 38% | 49% | 50% | 65% | 40% | 40% | 42% | 42% |
| 2745 | 0.25% | 0.00% | 0.25% | 9.00% | 1.00% | 44% | 57% | 42% | 55% | 39% | 51% | 39% | 51% | 51% | 66% | 42% | 42% | 43% | 43% |
| 2746 | 0.00% | 0.25% | 0.25% | 9.00% | 1.00% | 46% | 60% | 46% | 60% | 41% | 53% | 43% | 56% | 54% | 70% | 44% | 44% | 46% | 46% |
| 2747 | 0.25% | 0.25% | 0.25% | 9.00% | 1.00% | 48% | 62% | 47% | 61% | 43% | 56% | 44% | 57% | 55% | 72% | 46% | 46% | 47% | 47% |
| 2748 | 1.00% | 0.25% | 0.25% | 9.00% | 1.00% | 50% | 65% | 48% | 62% | 46% | 60% | 46% | 60% | 57% | 74% | 48% | 48% | 50% | 50% |
| 2749 | 9.00% | 0.25% | 0.25% | 9.00% | 1.00% | 46% | 60% | 46% | 60% | 41% | 53% | 43% | 56% | 54% | 70% | 44% | 44% | 46% | 46% |
| 2750 | 0.00% | 1.00% | 0.25% | 9.00% | 1.00% | 49% | 64% | 49% | 64% | 45% | 59% | 46% | 60% | 57% | 74% | 48% | 48% | 49% | 49% |
| 2751 | 0.25% | 1.00% | 0.25% | 9.00% | 1.00% | 51% | 66% | 50% | 65% | 47% | 61% | 47% | 61% | 58% | 75% | 49% | 49% | 51% | 51% |
| 2752 | 1.00% | 1.00% | 0.25% | 9.00% | 1.00% | 53% | 69% | 51% | 66% | 50% | 65% | 49% | 64% | 60% | 78% | 51% | 51% | 53% | 53% |
| 2753 | 0.25% | 9.00% | 0.25% | 9.00% | 1.00% | 59% | 77% | 58% | 75% | 53% | 69% | 54% | 70% | 65% | 85% | 57% | 57% | 57% | 57% |
| 2754 | 0.25% | 0.00% | 1.00% | 9.00% | 1.00% | 49% | 64% | 45% | 59% | 45% | 59% | 45% | 59% | 55% | 72% | 46% | 46% | 48% | 48% |
| 2755 | 1.00% | 0.25% | 1.00% | 9.00% | 1.00% | 55% | 72% | 51% | 66% | 52% | 68% | 52% | 68% | 61% | 79% | 53% | 53% | 55% | 55% |
| 2756 | 9.00% | 0.25% | 1.00% | 9.00% | 1.00% | 51% | 66% | 49% | 64% | 47% | 61% | 49% | 64% | 58% | 75% | 49% | 49% | 51% | 51% |
| 2757 | 0.00% | 1.00% | 1.00% | 9.00% | 1.00% | 54% | 70% | 52% | 68% | 51% | 66% | 52% | 68% | 61% | 79% | 52% | 52% | 55% | 55% |
| 2758 | 0.25% | 1.00% | 1.00% | 9.00% | 1.00% | 56% | 73% | 53% | 69% | 53% | 69% | 53% | 69% | 62% | 81% | 54% | 54% | 56% | 56% |
| 2759 | 1.00% | 1.00% | 1.00% | 9.00% | 1.00% | 58% | 75% | 54% | 70% | 56% | 73% | 55% | 72% | 64% | 83% | 56% | 56% | 58% | 58% |
| 2760 | 0.25% | 0.25% | 9.00% | 9.00% | 1.00% | 63% | 82% | 55% | 72% | 54% | 70% | 61% | 79% | 69% | 90% | 57% | 57% | 61% | 61% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2761 | 0.25% | 0.25% | 0.00% | 0.00% | 0.00% | 5% | 7% | 5% | 7% | 7% | 9% | 4% | 5% | 4% | 5% | 6% | 6% | 5% | 5% |
| 2762 | 1.00% | 0.25% | 0.00% | 0.00% | 0.00% | 7% | 9% | 6% | 8% | 10% | 13% | 6% | 8% | 6% | 8% | 8% | 8% | 7% | 7% |
| 2763 | 0.25% | 1.00% | 0.00% | 0.00% | 0.00% | 8% | 10% | 8% | 10% | 11% | 14% | 8% | 10% | 10% | 13% | 9% | 9% | 10% | 10% |
| 2764 | 1.00% | 1.00% | 0.00% | 0.00% | 0.00% | 10% | 13% | 9% | 12% | 14% | 18% | 10% | 13% | 12% | 16% | 11% | 11% | 12% | 12% |
| 2765 | 0.25% | 0.00% | 0.25% | 0.00% | 0.00% | 7% | 8% | 5% | 7% | 5% | 7% | 4% | 5% | 4% | 5% | 6% | 6% | 4% | 4% |
| 2766 | 1.00% | 0.00% | 0.25% | 0.00% | 0.00% | 9% | 11% | 6% | 8% | 8% | 10% | 6% | 8% | 6% | 8% | 8% | 8% | 7% | 7% |
| 2767 | 0.00% | 0.25% | 0.25% | 0.00% | 0.00% | 8% | 10% | 8% | 10% | 8% | 10% | 6% | 8% | 6% | 8% | 8% | 8% | 7% | 7% |
| 2768 | 0.25% | 0.25% | 0.25% | 0.00% | 0.00% | 10% | 12% | 9% | 12% | 10% | 13% | 7% | 9% | 7% | 9% | 10% | 10% | 8% | 8% |
| 2769 | 0.00% | 1.00% | 0.25% | 0.00% | 0.00% | 11% | 14% | 11% | 14% | 12% | 16% | 10% | 13% | 12% | 16% | 11% | 11% | 11% | 11% |
| 2770 | 1.00% | 1.00% | 0.25% | 0.00% | 0.00% | 15% | 19% | 13% | 17% | 17% | 22% | 13% | 17% | 15% | 20% | 15% | 15% | 15% | 15% |
| 2771 | 1.00% | 9.00% | 0.25% | 0.00% | 0.00% | 19% | 24% | 17% | 22% | 21% | 27% | 16% | 21% | 21% | 27% | 19% | 19% | 19% | 19% |
| 2772 | 0.25% | 0.00% | 1.00% | 0.00% | 0.00% | 13% | 17% | 13% | 17% | 9% | 12% | 10% | 13% | 12% | 16% | 12% | 12% | 10% | 10% |
| 2773 | 1.00% | 0.00% | 1.00% | 0.00% | 0.00% | 15% | 20% | 14% | 18% | 12% | 16% | 12% | 16% | 14% | 18% | 14% | 14% | 13% | 13% |
| 2774 | 0.00% | 0.25% | 1.00% | 0.00% | 0.00% | 14% | 18% | 16% | 21% | 12% | 16% | 12% | 16% | 14% | 18% | 14% | 14% | 13% | 13% |
| 2775 | 1.00% | 0.25% | 1.00% | 0.00% | 0.00% | 18% | 23% | 18% | 23% | 17% | 22% | 15% | 20% | 17% | 22% | 18% | 18% | 16% | 16% |
| 2776 | 0.00% | 1.00% | 1.00% | 0.00% | 0.00% | 17% | 22% | 19% | 25% | 16% | 21% | 16% | 21% | 20% | 26% | 17% | 17% | 17% | 17% |
| 2777 | 0.25% | 1.00% | 1.00% | 0.00% | 0.00% | 19% | 25% | 20% | 26% | 18% | 23% | 17% | 22% | 21% | 27% | 19% | 19% | 19% | 19% |
| 2778 | 1.00% | 1.00% | 1.00% | 0.00% | 0.00% | 21% | 27% | 21% | 27% | 21% | 27% | 19% | 25% | 23% | 30% | 21% | 21% | 21% | 21% |
| 2779 | 9.00% | 1.00% | 1.00% | 0.00% | 0.00% | 17% | 22% | 19% | 25% | 16% | 21% | 16% | 21% | 20% | 26% | 17% | 17% | 17% | 17% |
| 2780 | 1.00% | 9.00% | 1.00% | 0.00% | 0.00% | 25% | 33% | 25% | 33% | 25% | 33% | 22% | 29% | 29% | 38% | 25% | 25% | 25% | 25% |
| 2781 | 0.25% | 0.00% | 9.00% | 0.00% | 0.00% | 24% | 31% | 26% | 34% | 17% | 22% | 20% | 26% | 26% | 34% | 22% | 22% | 21% | 21% |
| 2782 | 0.00% | 0.25% | 9.00% | 0.00% | 0.00% | 25% | 33% | 29% | 38% | 20% | 26% | 22% | 29% | 28% | 36% | 25% | 25% | 23% | 23% |
| 2783 | 0.25% | 0.25% | 9.00% | 0.00% | 0.00% | 27% | 35% | 30% | 39% | 22% | 29% | 23% | 30% | 29% | 38% | 26% | 26% | 25% | 25% |
| 2784 | 1.00% | 0.25% | 9.00% | 0.00% | 0.00% | 29% | 38% | 31% | 40% | 25% | 33% | 25% | 33% | 31% | 40% | 28% | 28% | 27% | 27% |
| 2785 | 0.25% | 1.00% | 9.00% | 0.00% | 0.00% | 30% | 39% | 33% | 43% | 26% | 34% | 27% | 35% | 35% | 46% | 30% | 30% | 29% | 29% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2786 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 2787 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 2788 | 0.00% | 0.25% | 0.00% | 0.25% | 0.00% | 8% | 10% | 13% | 17% | 11% | 14% | 13% | 17% | 10% | 13% | 11% | 11% | 11% | 11% |
| 2789 | 0.25% | 0.25% | 0.00% | 0.25% | 0.00% | 10% | 13% | 14% | 18% | 13% | 17% | 14% | 18% | 11% | 14% | 12% | 12% | 13% | 13% |
| 2790 | 9.00% | 0.25% | 0.00% | 0.25% | 0.00% | 8% | 10% | 13% | 17% | 11% | 14% | 13% | 17% | 10% | 13% | 11% | 11% | 11% | 11% |
| 2791 | 1.00% | 1.00% | 0.00% | 0.25% | 0.00% | 15% | 20% | 18% | 23% | 20% | 26% | 20% | 26% | 19% | 25% | 18% | 18% | 20% | 20% |
| 2792 | 1.00% | 9.00% | 0.00% | 0.25% | 0.00% | 19% | 25% | 22% | 29% | 24% | 31% | 23% | 30% | 25% | 33% | 22% | 22% | 24% | 24% |
| 2793 | 0.00% | 0.00% | 0.25% | 0.25% | 0.00% | 10% | 12% | 13% | 17% | 9% | 12% | 13% | 17% | 10% | 13% | 11% | 11% | 11% | 11% |
| 2794 | 0.25% | 0.00% | 0.25% | 0.25% | 0.00% | 12% | 15% | 14% | 18% | 11% | 14% | 14% | 18% | 11% | 14% | 12% | 12% | 12% | 12% |
| 2795 | 0.00% | 0.25% | 0.25% | 0.25% | 0.00% | 13% | 16% | 17% | 22% | 14% | 18% | 16% | 21% | 13% | 17% | 15% | 15% | 14% | 14% |
| 2796 | 0.25% | 0.25% | 0.25% | 0.25% | 0.00% | 15% | 19% | 18% | 23% | 16% | 21% | 17% | 22% | 14% | 18% | 16% | 16% | 16% | 16% |
| 2797 | 1.00% | 0.25% | 0.25% | 0.25% | 0.00% | 17% | 21% | 19% | 25% | 19% | 25% | 19% | 25% | 16% | 21% | 18% | 18% | 18% | 18% |
| 2798 | 9.00% | 0.25% | 0.25% | 0.25% | 0.00% | 13% | 16% | 17% | 22% | 14% | 18% | 16% | 21% | 13% | 17% | 15% | 15% | 14% | 14% |
| 2799 | 0.25% | 1.00% | 0.25% | 0.25% | 0.00% | 18% | 23% | 21% | 27% | 20% | 26% | 21% | 27% | 20% | 26% | 20% | 20% | 20% | 20% |
| 2800 | 9.00% | 1.00% | 0.25% | 0.25% | 0.00% | 16% | 20% | 20% | 26% | 18% | 23% | 20% | 26% | 19% | 25% | 18% | 18% | 19% | 19% |
| 2801 | 0.25% | 9.00% | 0.25% | 0.25% | 0.00% | 22% | 28% | 25% | 33% | 24% | 31% | 24% | 31% | 26% | 34% | 24% | 24% | 25% | 25% |
| 2802 | 1.00% | 9.00% | 0.25% | 0.25% | 0.00% | 24% | 31% | 26% | 34% | 27% | 35% | 26% | 34% | 28% | 36% | 26% | 26% | 27% | 27% |
| 2803 | 9.00% | 9.00% | 0.25% | 0.25% | 0.00% | 20% | 25% | 24% | 31% | 22% | 29% | 23% | 30% | 25% | 33% | 22% | 22% | 23% | 23% |
| 2804 | 0.00% | 0.00% | 1.00% | 0.25% | 0.00% | 16% | 21% | 21% | 27% | 13% | 17% | 19% | 25% | 18% | 23% | 17% | 17% | 17% | 17% |
| 2805 | 1.00% | 0.00% | 1.00% | 0.25% | 0.00% | 20% | 26% | 23% | 30% | 18% | 23% | 22% | 29% | 21% | 27% | 20% | 20% | 20% | 20% |
| 2806 | 0.00% | 0.25% | 1.00% | 0.25% | 0.00% | 19% | 25% | 25% | 33% | 18% | 23% | 22% | 29% | 21% | 27% | 21% | 21% | 20% | 20% |
| 2807 | 0.25% | 0.25% | 1.00% | 0.25% | 0.00% | 21% | 27% | 26% | 34% | 20% | 26% | 23% | 30% | 22% | 29% | 22% | 22% | 22% | 22% |
| 2808 | 1.00% | 0.25% | 1.00% | 0.25% | 0.00% | 23% | 30% | 27% | 35% | 23% | 30% | 25% | 33% | 24% | 31% | 24% | 24% | 24% | 24% |
| 2809 | 9.00% | 0.25% | 1.00% | 0.25% | 0.00% | 19% | 25% | 25% | 33% | 18% | 23% | 22% | 29% | 21% | 27% | 21% | 21% | 20% | 20% |
| 2810 | 0.00% | 1.00% | 1.00% | 0.25% | 0.00% | 22% | 29% | 28% | 36% | 22% | 29% | 26% | 34% | 27% | 35% | 24% | 24% | 25% | 25% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2811 | 0.25% | 1.00% | 1.00% | 0.25% | 0.00% | 24% | 31% | 29% | 38% | 24% | 31% | 27% | 35% | 28% | 36% | 26% | 26% | 26% | 26% |
| 2812 | 1.00% | 1.00% | 1.00% | 0.25% | 0.00% | 26% | 34% | 30% | 39% | 27% | 35% | 29% | 38% | 30% | 39% | 28% | 28% | 29% | 29% |
| 2813 | 9.00% | 1.00% | 1.00% | 0.25% | 0.00% | 22% | 29% | 28% | 36% | 22% | 29% | 26% | 34% | 27% | 35% | 24% | 24% | 25% | 25% |
| 2814 | 0.00% | 9.00% | 1.00% | 0.25% | 0.00% | 26% | 34% | 32% | 42% | 26% | 34% | 29% | 38% | 33% | 43% | 28% | 28% | 29% | 29% |
| 2815 | 0.25% | 9.00% | 1.00% | 0.25% | 0.00% | 28% | 36% | 33% | 43% | 28% | 36% | 30% | 39% | 34% | 44% | 30% | 30% | 31% | 31% |
| 2816 | 1.00% | 9.00% | 1.00% | 0.25% | 0.00% | 30% | 39% | 34% | 44% | 31% | 40% | 32% | 42% | 36% | 47% | 32% | 32% | 33% | 33% |
| 2817 | 0.25% | 0.25% | 9.00% | 0.25% | 0.00% | 32% | 42% | 39% | 51% | 28% | 36% | 33% | 43% | 36% | 47% | 33% | 33% | 32% | 32% |
| 2818 | 1.00% | 0.25% | 9.00% | 0.25% | 0.00% | 34% | 44% | 40% | 52% | 31% | 40% | 35% | 46% | 38% | 49% | 35% | 35% | 35% | 35% |
| 2819 | 9.00% | 0.25% | 9.00% | 0.25% | 0.00% | 30% | 39% | 38% | 49% | 26% | 34% | 32% | 42% | 35% | 46% | 31% | 31% | 31% | 31% |
| 2820 | 0.00% | 1.00% | 9.00% | 0.25% | 0.00% | 33% | 43% | 41% | 53% | 30% | 39% | 36% | 47% | 41% | 53% | 35% | 35% | 36% | 36% |
| 2821 | 0.25% | 1.00% | 9.00% | 0.25% | 0.00% | 35% | 46% | 42% | 55% | 32% | 42% | 37% | 48% | 42% | 55% | 36% | 36% | 37% | 37% |
| 2822 | 9.00% | 1.00% | 9.00% | 0.25% | 0.00% | 33% | 43% | 41% | 53% | 30% | 39% | 36% | 47% | 41% | 53% | 35% | 35% | 36% | 36% |
| 2823 | 1.00% | 9.00% | 9.00% | 0.25% | 0.00% | 41% | 53% | 47% | 61% | 39% | 51% | 42% | 55% | 50% | 65% | 42% | 42% | 44% | 44% |
| 2824 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 2825 | 1.00% | 0.25% | 0.00% | 1.00% | 0.00% | 27% | 35% | 27% | 35% | 28% | 36% | 26% | 34% | 28% | 36% | 27% | 27% | 27% | 27% |
| 2826 | 0.00% | 1.00% | 0.00% | 1.00% | 0.00% | 26% | 34% | 28% | 36% | 27% | 35% | 27% | 35% | 31% | 40% | 27% | 27% | 28% | 28% |
| 2827 | 0.25% | 1.00% | 0.00% | 1.00% | 0.00% | 28% | 36% | 29% | 38% | 29% | 38% | 28% | 36% | 32% | 42% | 29% | 29% | 30% | 30% |
| 2828 | 1.00% | 1.00% | 0.00% | 1.00% | 0.00% | 30% | 39% | 30% | 39% | 32% | 42% | 30% | 39% | 34% | 44% | 31% | 31% | 32% | 32% |
| 2829 | 0.00% | 0.00% | 0.25% | 1.00% | 0.00% | 25% | 32% | 25% | 33% | 21% | 27% | 23% | 30% | 25% | 33% | 24% | 24% | 23% | 23% |
| 2830 | 1.00% | 0.00% | 0.25% | 1.00% | 0.00% | 29% | 37% | 27% | 35% | 26% | 34% | 26% | 34% | 28% | 36% | 27% | 27% | 27% | 27% |
| 2831 | 0.25% | 0.25% | 0.25% | 1.00% | 0.00% | 30% | 38% | 30% | 39% | 28% | 36% | 27% | 35% | 29% | 38% | 29% | 29% | 28% | 28% |
| 2832 | 1.00% | 0.25% | 0.25% | 1.00% | 0.00% | 32% | 41% | 31% | 40% | 31% | 40% | 29% | 38% | 31% | 40% | 31% | 31% | 30% | 30% |
| 2833 | 9.00% | 0.25% | 0.25% | 1.00% | 0.00% | 28% | 36% | 29% | 38% | 26% | 34% | 26% | 34% | 28% | 36% | 28% | 28% | 27% | 27% |
| 2834 | 0.00% | 1.00% | 0.25% | 1.00% | 0.00% | 31% | 40% | 32% | 42% | 30% | 39% | 30% | 39% | 34% | 44% | 31% | 31% | 31% | 31% |
| 2835 | 0.25% | 1.00% | 0.25% | 1.00% | 0.00% | 33% | 42% | 33% | 43% | 32% | 42% | 31% | 40% | 35% | 46% | 33% | 33% | 33% | 33% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2836 | 1.00% | 1.00% | 0.25% | 1.00% | 0.00% | 35% | 45% | 34% | 44% | 35% | 46% | 33% | 43% | 37% | 48% | 35% | 35% | 35% | 35% |
| 2837 | 9.00% | 1.00% | 0.25% | 1.00% | 0.00% | 31% | 40% | 32% | 42% | 30% | 39% | 30% | 39% | 34% | 44% | 31% | 31% | 31% | 31% |
| 2838 | 0.25% | 9.00% | 0.25% | 1.00% | 0.00% | 37% | 47% | 37% | 48% | 36% | 47% | 34% | 44% | 41% | 53% | 37% | 37% | 37% | 37% |
| 2839 | 1.00% | 9.00% | 0.25% | 1.00% | 0.00% | 39% | 50% | 38% | 49% | 39% | 51% | 36% | 47% | 43% | 56% | 39% | 39% | 39% | 39% |
| 2840 | 9.00% | 9.00% | 0.25% | 1.00% | 0.00% | 35% | 45% | 36% | 47% | 34% | 44% | 33% | 43% | 40% | 52% | 35% | 35% | 36% | 36% |
| 2841 | 0.00% | 0.00% | 1.00% | 1.00% | 0.00% | 31% | 40% | 33% | 43% | 25% | 33% | 29% | 38% | 33% | 43% | 30% | 30% | 29% | 29% |
| 2842 | 0.25% | 0.00% | 1.00% | 1.00% | 0.00% | 33% | 43% | 34% | 44% | 27% | 35% | 30% | 39% | 34% | 44% | 31% | 31% | 30% | 30% |
| 2843 | 1.00% | 0.00% | 1.00% | 1.00% | 0.00% | 35% | 46% | 35% | 46% | 30% | 39% | 32% | 42% | 36% | 47% | 33% | 33% | 33% | 33% |
| 2844 | 0.00% | 0.25% | 1.00% | 1.00% | 0.00% | 34% | 44% | 37% | 48% | 30% | 39% | 32% | 42% | 36% | 47% | 34% | 34% | 33% | 33% |
| 2845 | 1.00% | 0.25% | 1.00% | 1.00% | 0.00% | 38% | 49% | 39% | 51% | 35% | 46% | 35% | 46% | 39% | 51% | 37% | 37% | 36% | 36% |
| 2846 | 9.00% | 0.25% | 1.00% | 1.00% | 0.00% | 34% | 44% | 37% | 48% | 30% | 39% | 32% | 42% | 36% | 47% | 34% | 34% | 33% | 33% |
| 2847 | 0.00% | 1.00% | 1.00% | 1.00% | 0.00% | 37% | 48% | 40% | 52% | 34% | 44% | 36% | 47% | 42% | 55% | 37% | 37% | 37% | 37% |
| 2848 | 0.25% | 1.00% | 1.00% | 1.00% | 0.00% | 39% | 51% | 41% | 53% | 36% | 47% | 37% | 48% | 43% | 56% | 39% | 39% | 39% | 39% |
| 2849 | 1.00% | 1.00% | 1.00% | 1.00% | 0.00% | 41% | 53% | 42% | 55% | 39% | 51% | 39% | 51% | 45% | 59% | 41% | 41% | 41% | 41% |
| 2850 | 9.00% | 1.00% | 1.00% | 1.00% | 0.00% | 37% | 48% | 40% | 52% | 34% | 44% | 36% | 47% | 42% | 55% | 37% | 37% | 37% | 37% |
| 2851 | 0.00% | 9.00% | 1.00% | 1.00% | 0.00% | 41% | 53% | 44% | 57% | 38% | 49% | 39% | 51% | 48% | 62% | 41% | 41% | 42% | 42% |
| 2852 | 0.25% | 9.00% | 1.00% | 1.00% | 0.00% | 43% | 56% | 45% | 59% | 40% | 52% | 40% | 52% | 49% | 64% | 43% | 43% | 43% | 43% |
| 2853 | 1.00% | 9.00% | 1.00% | 1.00% | 0.00% | 45% | 59% | 46% | 60% | 43% | 56% | 42% | 55% | 51% | 66% | 45% | 45% | 45% | 45% |
| 2854 | 0.25% | 0.25% | 9.00% | 1.00% | 0.00% | 47% | 61% | 51% | 66% | 40% | 52% | 43% | 56% | 51% | 66% | 46% | 46% | 45% | 45% |
| 2855 | 1.00% | 0.25% | 9.00% | 1.00% | 0.00% | 49% | 64% | 52% | 68% | 43% | 56% | 45% | 59% | 53% | 69% | 48% | 48% | 47% | 47% |
| 2856 | 9.00% | 0.25% | 9.00% | 1.00% | 0.00% | 45% | 59% | 50% | 65% | 38% | 49% | 42% | 55% | 50% | 65% | 44% | 44% | 43% | 43% |
| 2857 | 0.25% | 1.00% | 9.00% | 1.00% | 0.00% | 50% | 65% | 54% | 70% | 44% | 57% | 47% | 61% | 57% | 74% | 49% | 49% | 49% | 49% |
| 2858 | 0.00% | 0.25% | 0.00% | 9.00% | 0.00% | 43% | 56% | 39% | 51% | 41% | 53% | 43% | 56% | 38% | 49% | 41% | 41% | 41% | 41% |
| 2859 | 0.00% | 0.00% | 0.25% | 9.00% | 0.00% | 45% | 58% | 39% | 51% | 39% | 51% | 43% | 56% | 38% | 49% | 41% | 41% | 40% | 40% |
| 2860 | 0.25% | 0.00% | 0.25% | 9.00% | 0.00% | 47% | 60% | 40% | 52% | 41% | 53% | 44% | 57% | 39% | 51% | 43% | 43% | 41% | 41% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2861 | 0.00% | 0.25% | 0.25% | 9.00% | 0.00% | 48% | 62% | 43% | 56% | 44% | 57% | 46% | 60% | 41% | 53% | 45% | 45% | 44% | 44% |
| 2862 | 0.25% | 0.25% | 0.25% | 9.00% | 0.00% | 50% | 64% | 44% | 57% | 46% | 60% | 47% | 61% | 42% | 55% | 47% | 47% | 45% | 45% |
| 2863 | 1.00% | 0.25% | 0.25% | 9.00% | 0.00% | 52% | 67% | 45% | 59% | 49% | 64% | 49% | 64% | 44% | 57% | 49% | 49% | 47% | 47% |
| 2864 | 9.00% | 0.25% | 0.25% | 9.00% | 0.00% | 48% | 62% | 43% | 56% | 44% | 57% | 46% | 60% | 41% | 53% | 45% | 45% | 44% | 44% |
| 2865 | 0.00% | 1.00% | 0.25% | 9.00% | 0.00% | 51% | 66% | 46% | 60% | 48% | 62% | 50% | 65% | 47% | 61% | 48% | 48% | 48% | 48% |
| 2866 | 0.25% | 1.00% | 0.25% | 9.00% | 0.00% | 53% | 68% | 47% | 61% | 50% | 65% | 51% | 66% | 48% | 62% | 50% | 50% | 50% | 50% |
| 2867 | 1.00% | 1.00% | 0.25% | 9.00% | 0.00% | 55% | 71% | 48% | 62% | 53% | 69% | 53% | 69% | 50% | 65% | 52% | 52% | 52% | 52% |
| 2868 | 0.25% | 9.00% | 0.25% | 9.00% | 0.00% | 57% | 73% | 51% | 66% | 54% | 70% | 54% | 70% | 54% | 70% | 54% | 54% | 54% | 54% |
| 2869 | 0.25% | 0.00% | 1.00% | 9.00% | 0.00% | 53% | 69% | 48% | 62% | 45% | 59% | 50% | 65% | 47% | 61% | 49% | 49% | 47% | 47% |
| 2870 | 1.00% | 0.25% | 1.00% | 9.00% | 0.00% | 58% | 75% | 53% | 69% | 53% | 69% | 55% | 72% | 52% | 68% | 55% | 55% | 53% | 53% |
| 2871 | 9.00% | 0.25% | 1.00% | 9.00% | 0.00% | 54% | 70% | 51% | 66% | 48% | 62% | 52% | 68% | 49% | 64% | 51% | 51% | 50% | 50% |
| 2872 | 0.00% | 1.00% | 1.00% | 9.00% | 0.00% | 57% | 74% | 54% | 70% | 52% | 68% | 56% | 73% | 55% | 72% | 54% | 54% | 54% | 54% |
| 2873 | 0.25% | 1.00% | 1.00% | 9.00% | 0.00% | 59% | 77% | 55% | 72% | 54% | 70% | 57% | 74% | 56% | 73% | 56% | 56% | 56% | 56% |
| 2874 | 1.00% | 1.00% | 1.00% | 9.00% | 0.00% | 61% | 79% | 56% | 73% | 57% | 74% | 59% | 77% | 58% | 75% | 58% | 58% | 58% | 58% |
| 2875 | 0.25% | 0.25% | 9.00% | 9.00% | 0.00% | 67% | 87% | 65% | 85% | 58% | 75% | 63% | 82% | 64% | 83% | 63% | 63% | 62% | 62% |
| 2876 | 0.25% | 0.25% | 0.00% | 0.00% | 0.25% | 12% | 16% | 12% | 16% | 14% | 18% | 12% | 16% | 12% | 16% | 13% | 13% | 13% | 13% |
| 2877 | 1.00% | 0.25% | 0.00% | 0.00% | 0.25% | 14% | 18% | 13% | 17% | 17% | 22% | 14% | 18% | 14% | 18% | 15% | 15% | 15% | 15% |
| 2878 | 0.25% | 1.00% | 0.00% | 0.00% | 0.25% | 15% | 20% | 15% | 20% | 18% | 23% | 16% | 21% | 18% | 23% | 16% | 16% | 17% | 17% |
| 2879 | 1.00% | 1.00% | 0.00% | 0.00% | 0.25% | 17% | 22% | 16% | 21% | 21% | 27% | 18% | 23% | 20% | 26% | 18% | 18% | 20% | 20% |
| 2880 | 0.25% | 0.00% | 0.25% | 0.00% | 0.25% | 14% | 18% | 12% | 16% | 12% | 16% | 12% | 16% | 12% | 16% | 13% | 13% | 12% | 12% |
| 2881 | 1.00% | 0.00% | 0.25% | 0.00% | 0.25% | 16% | 20% | 13% | 17% | 15% | 20% | 14% | 18% | 14% | 18% | 15% | 15% | 14% | 14% |
| 2882 | 0.00% | 0.25% | 0.25% | 0.00% | 0.25% | 15% | 19% | 15% | 20% | 15% | 20% | 14% | 18% | 14% | 18% | 15% | 15% | 14% | 14% |
| 2883 | 0.25% | 0.25% | 0.25% | 0.00% | 0.25% | 17% | 21% | 16% | 21% | 17% | 22% | 15% | 20% | 15% | 20% | 17% | 17% | 16% | 16% |
| 2884 | 0.00% | 1.00% | 0.25% | 0.00% | 0.25% | 18% | 23% | 18% | 23% | 19% | 25% | 18% | 23% | 20% | 26% | 18% | 18% | 19% | 19% |
| 2885 | 1.00% | 1.00% | 0.25% | 0.00% | 0.25% | 22% | 28% | 20% | 26% | 24% | 31% | 21% | 27% | 23% | 30% | 22% | 22% | 23% | 23% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2886 | 1.00% | 9.00% | 0.25% | 0.00% | 0.25% | 26% | 33% | 24% | 31% | 28% | 36% | 24% | 31% | 29% | 38% | 26% | 26% | 27% | 27% |
| 2887 | 0.25% | 0.00% | 1.00% | 0.00% | 0.25% | 20% | 26% | 20% | 26% | 16% | 21% | 18% | 23% | 20% | 26% | 19% | 19% | 18% | 18% |
| 2888 | 1.00% | 0.00% | 1.00% | 0.00% | 0.25% | 22% | 29% | 21% | 27% | 19% | 25% | 20% | 26% | 22% | 29% | 21% | 21% | 20% | 20% |
| 2889 | 0.00% | 0.25% | 1.00% | 0.00% | 0.25% | 21% | 27% | 23% | 30% | 19% | 25% | 20% | 26% | 22% | 29% | 21% | 21% | 20% | 20% |
| 2890 | 1.00% | 0.25% | 1.00% | 0.00% | 0.25% | 25% | 33% | 25% | 33% | 24% | 31% | 23% | 30% | 25% | 33% | 25% | 25% | 24% | 24% |
| 2891 | 0.00% | 1.00% | 1.00% | 0.00% | 0.25% | 24% | 31% | 26% | 34% | 23% | 30% | 24% | 31% | 28% | 36% | 24% | 24% | 25% | 25% |
| 2892 | 0.25% | 1.00% | 1.00% | 0.00% | 0.25% | 26% | 34% | 27% | 35% | 25% | 33% | 25% | 33% | 29% | 38% | 26% | 26% | 26% | 26% |
| 2893 | 1.00% | 1.00% | 1.00% | 0.00% | 0.25% | 28% | 36% | 28% | 36% | 28% | 36% | 27% | 35% | 31% | 40% | 28% | 28% | 29% | 29% |
| 2894 | 9.00% | 1.00% | 1.00% | 0.00% | 0.25% | 24% | 31% | 26% | 34% | 23% | 30% | 24% | 31% | 28% | 36% | 24% | 24% | 25% | 25% |
| 2895 | 1.00% | 9.00% | 1.00% | 0.00% | 0.25% | 32% | 42% | 32% | 42% | 32% | 42% | 30% | 39% | 37% | 48% | 32% | 32% | 33% | 33% |
| 2896 | 0.25% | 0.00% | 9.00% | 0.00% | 0.25% | 31% | 40% | 33% | 43% | 24% | 31% | 28% | 36% | 34% | 44% | 29% | 29% | 29% | 29% |
| 2897 | 0.00% | 0.25% | 9.00% | 0.00% | 0.25% | 32% | 42% | 36% | 47% | 27% | 35% | 30% | 39% | 36% | 47% | 32% | 32% | 31% | 31% |
| 2898 | 0.25% | 0.25% | 9.00% | 0.00% | 0.25% | 34% | 44% | 37% | 48% | 29% | 38% | 31% | 40% | 37% | 48% | 33% | 33% | 32% | 32% |
| 2899 | 1.00% | 0.25% | 9.00% | 0.00% | 0.25% | 36% | 47% | 38% | 49% | 32% | 42% | 33% | 43% | 39% | 51% | 35% | 35% | 35% | 35% |
| 2900 | 0.25% | 1.00% | 9.00% | 0.00% | 0.25% | 37% | 48% | 40% | 52% | 33% | 43% | 35% | 46% | 43% | 56% | 37% | 37% | 37% | 37% |
| 2901 | 0.25% | 0.00% | 0.00% | 0.25% | 0.25% | 14% | 18% | 17% | 22% | 15% | 20% | 19% | 25% | 16% | 21% | 15% | 15% | 17% | 17% |
| 2902 | 1.00% | 0.00% | 0.00% | 0.25% | 0.25% | 16% | 21% | 18% | 23% | 18% | 23% | 21% | 27% | 18% | 23% | 17% | 17% | 19% | 19% |
| 2903 | 0.00% | 0.25% | 0.00% | 0.25% | 0.25% | 15% | 20% | 20% | 26% | 18% | 23% | 21% | 27% | 18% | 23% | 18% | 18% | 19% | 19% |
| 2904 | 0.25% | 0.25% | 0.00% | 0.25% | 0.25% | 17% | 22% | 21% | 27% | 20% | 26% | 22% | 29% | 19% | 25% | 19% | 19% | 20% | 20% |
| 2905 | 9.00% | 0.25% | 0.00% | 0.25% | 0.25% | 15% | 20% | 20% | 26% | 18% | 23% | 21% | 27% | 18% | 23% | 18% | 18% | 19% | 19% |
| 2906 | 1.00% | 1.00% | 0.00% | 0.25% | 0.25% | 22% | 29% | 25% | 33% | 27% | 35% | 28% | 36% | 27% | 35% | 25% | 25% | 27% | 27% |
| 2907 | 1.00% | 9.00% | 0.00% | 0.25% | 0.25% | 26% | 34% | 29% | 38% | 31% | 40% | 31% | 40% | 33% | 43% | 29% | 29% | 32% | 32% |
| 2908 | 0.00% | 0.00% | 0.25% | 0.25% | 0.25% | 17% | 21% | 20% | 26% | 16% | 21% | 21% | 27% | 18% | 23% | 18% | 18% | 18% | 18% |
| 2909 | 0.25% | 0.00% | 0.25% | 0.25% | 0.25% | 19% | 24% | 21% | 27% | 18% | 23% | 22% | 29% | 19% | 25% | 19% | 19% | 20% | 20% |
| 2910 | 0.00% | 0.25% | 0.25% | 0.25% | 0.25% | 20% | 25% | 24% | 31% | 21% | 27% | 24% | 31% | 21% | 27% | 22% | 22% | 22% | 22% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2911 | 0.25% | 0.25% | 0.25% | 0.25% | 0.25% | 22% | 28% | 25% | 33% | 23% | 30% | 25% | 33% | 22% | 29% | 23% | 23% | 23% | 23% |
| 2912 | 1.00% | 0.25% | 0.25% | 0.25% | 0.25% | 24% | 31% | 26% | 34% | 26% | 34% | 27% | 35% | 24% | 31% | 25% | 25% | 26% | 26% |
| 2913 | 9.00% | 0.25% | 0.25% | 0.25% | 0.25% | 20% | 25% | 24% | 31% | 21% | 27% | 24% | 31% | 21% | 27% | 22% | 22% | 22% | 22% |
| 2914 | 0.25% | 1.00% | 0.25% | 0.25% | 0.25% | 25% | 32% | 28% | 36% | 27% | 35% | 29% | 38% | 28% | 36% | 27% | 27% | 28% | 28% |
| 2915 | 9.00% | 1.00% | 0.25% | 0.25% | 0.25% | 23% | 29% | 27% | 35% | 25% | 33% | 28% | 36% | 27% | 35% | 25% | 25% | 27% | 27% |
| 2916 | 0.25% | 9.00% | 0.25% | 0.25% | 0.25% | 29% | 37% | 32% | 42% | 31% | 40% | 32% | 42% | 34% | 44% | 31% | 31% | 32% | 32% |
| 2917 | 1.00% | 9.00% | 0.25% | 0.25% | 0.25% | 31% | 40% | 33% | 43% | 34% | 44% | 34% | 44% | 36% | 47% | 33% | 33% | 35% | 35% |
| 2918 | 9.00% | 9.00% | 0.25% | 0.25% | 0.25% | 27% | 34% | 31% | 40% | 29% | 38% | 31% | 40% | 33% | 43% | 29% | 29% | 31% | 31% |
| 2919 | 0.00% | 0.00% | 1.00% | 0.25% | 0.25% | 23% | 30% | 28% | 36% | 20% | 26% | 27% | 35% | 26% | 34% | 24% | 24% | 24% | 24% |
| 2920 | 1.00% | 0.00% | 1.00% | 0.25% | 0.25% | 27% | 35% | 30% | 39% | 25% | 33% | 30% | 39% | 29% | 38% | 27% | 27% | 28% | 28% |
| 2921 | 0.00% | 0.25% | 1.00% | 0.25% | 0.25% | 26% | 34% | 32% | 42% | 25% | 33% | 30% | 39% | 29% | 38% | 28% | 28% | 28% | 28% |
| 2922 | 0.25% | 0.25% | 1.00% | 0.25% | 0.25% | 28% | 36% | 33% | 43% | 27% | 35% | 31% | 40% | 30% | 39% | 29% | 29% | 29% | 29% |
| 2923 | 1.00% | 0.25% | 1.00% | 0.25% | 0.25% | 30% | 39% | 34% | 44% | 30% | 39% | 33% | 43% | 32% | 42% | 31% | 31% | 32% | 32% |
| 2924 | 9.00% | 0.25% | 1.00% | 0.25% | 0.25% | 26% | 34% | 32% | 42% | 25% | 33% | 30% | 39% | 29% | 38% | 28% | 28% | 28% | 28% |
| 2925 | 0.00% | 1.00% | 1.00% | 0.25% | 0.25% | 29% | 38% | 35% | 46% | 29% | 38% | 34% | 44% | 35% | 46% | 31% | 31% | 33% | 33% |
| 2926 | 0.25% | 1.00% | 1.00% | 0.25% | 0.25% | 31% | 40% | 36% | 47% | 31% | 40% | 35% | 46% | 36% | 47% | 33% | 33% | 34% | 34% |
| 2927 | 1.00% | 1.00% | 1.00% | 0.25% | 0.25% | 33% | 43% | 37% | 48% | 34% | 44% | 37% | 48% | 38% | 49% | 35% | 35% | 36% | 36% |
| 2928 | 9.00% | 1.00% | 1.00% | 0.25% | 0.25% | 29% | 38% | 35% | 46% | 29% | 38% | 34% | 44% | 35% | 46% | 31% | 31% | 33% | 33% |
| 2929 | 0.00% | 9.00% | 1.00% | 0.25% | 0.25% | 33% | 43% | 39% | 51% | 33% | 43% | 37% | 48% | 41% | 53% | 35% | 35% | 37% | 37% |
| 2930 | 0.25% | 9.00% | 1.00% | 0.25% | 0.25% | 35% | 46% | 40% | 52% | 35% | 46% | 38% | 49% | 42% | 55% | 37% | 37% | 38% | 38% |
| 2931 | 1.00% | 9.00% | 1.00% | 0.25% | 0.25% | 37% | 48% | 41% | 53% | 38% | 49% | 40% | 52% | 44% | 57% | 39% | 39% | 41% | 41% |
| 2932 | 0.25% | 0.25% | 9.00% | 0.25% | 0.25% | 39% | 51% | 46% | 60% | 35% | 46% | 41% | 53% | 44% | 57% | 40% | 40% | 40% | 40% |
| 2933 | 1.00% | 0.25% | 9.00% | 0.25% | 0.25% | 41% | 53% | 47% | 61% | 38% | 49% | 43% | 56% | 46% | 60% | 42% | 42% | 42% | 42% |
| 2934 | 9.00% | 0.25% | 9.00% | 0.25% | 0.25% | 37% | 48% | 45% | 59% | 33% | 43% | 40% | 52% | 43% | 56% | 38% | 38% | 39% | 39% |
| 2935 | 0.00% | 1.00% | 9.00% | 0.25% | 0.25% | 40% | 52% | 48% | 62% | 37% | 48% | 44% | 57% | 49% | 64% | 42% | 42% | 43% | 43% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2936 | 0.25% | 1.00% | 9.00% | 0.25% | 0.25% | 42% | 55% | 49% | 64% | 39% | 51% | 45% | 59% | 50% | 65% | 43% | 43% | 45% | 45% |
| 2937 | 9.00% | 1.00% | 9.00% | 0.25% | 0.25% | 40% | 52% | 48% | 62% | 37% | 48% | 44% | 57% | 49% | 64% | 42% | 42% | 43% | 43% |
| 2938 | 1.00% | 9.00% | 9.00% | 0.25% | 0.25% | 48% | 62% | 54% | 70% | 46% | 60% | 50% | 65% | 58% | 75% | 49% | 49% | 51% | 51% |
| 2939 | 0.25% | 0.00% | 0.00% | 1.00% | 0.25% | 29% | 38% | 29% | 38% | 27% | 35% | 29% | 38% | 31% | 40% | 28% | 28% | 29% | 29% |
| 2940 | 1.00% | 0.25% | 0.00% | 1.00% | 0.25% | 34% | 44% | 34% | 44% | 35% | 46% | 34% | 44% | 36% | 47% | 34% | 34% | 35% | 35% |
| 2941 | 0.00% | 1.00% | 0.00% | 1.00% | 0.25% | 33% | 43% | 35% | 46% | 34% | 44% | 35% | 46% | 39% | 51% | 34% | 34% | 36% | 36% |
| 2942 | 0.25% | 1.00% | 0.00% | 1.00% | 0.25% | 35% | 46% | 36% | 47% | 36% | 47% | 36% | 47% | 40% | 52% | 36% | 36% | 37% | 37% |
| 2943 | 1.00% | 1.00% | 0.00% | 1.00% | 0.25% | 37% | 48% | 37% | 48% | 39% | 51% | 38% | 49% | 42% | 55% | 38% | 38% | 40% | 40% |
| 2944 | 0.00% | 0.00% | 0.25% | 1.00% | 0.25% | 32% | 41% | 32% | 42% | 28% | 36% | 31% | 40% | 33% | 43% | 31% | 31% | 31% | 31% |
| 2945 | 1.00% | 0.00% | 0.25% | 1.00% | 0.25% | 36% | 46% | 34% | 44% | 33% | 43% | 34% | 44% | 36% | 47% | 34% | 34% | 34% | 34% |
| 2946 | 0.25% | 0.25% | 0.25% | 1.00% | 0.25% | 37% | 47% | 37% | 48% | 35% | 46% | 35% | 46% | 37% | 48% | 36% | 36% | 36% | 36% |
| 2947 | 1.00% | 0.25% | 0.25% | 1.00% | 0.25% | 39% | 50% | 38% | 49% | 38% | 49% | 37% | 48% | 39% | 51% | 38% | 38% | 38% | 38% |
| 2948 | 9.00% | 0.25% | 0.25% | 1.00% | 0.25% | 35% | 45% | 36% | 47% | 33% | 43% | 34% | 44% | 36% | 47% | 35% | 35% | 34% | 34% |
| 2949 | 0.00% | 1.00% | 0.25% | 1.00% | 0.25% | 38% | 49% | 39% | 51% | 37% | 48% | 38% | 49% | 42% | 55% | 38% | 38% | 39% | 39% |
| 2950 | 0.25% | 1.00% | 0.25% | 1.00% | 0.25% | 40% | 51% | 40% | 52% | 39% | 51% | 39% | 51% | 43% | 56% | 40% | 40% | 40% | 40% |
| 2951 | 1.00% | 1.00% | 0.25% | 1.00% | 0.25% | 42% | 54% | 41% | 53% | 42% | 55% | 41% | 53% | 45% | 59% | 42% | 42% | 43% | 43% |
| 2952 | 9.00% | 1.00% | 0.25% | 1.00% | 0.25% | 38% | 49% | 39% | 51% | 37% | 48% | 38% | 49% | 42% | 55% | 38% | 38% | 39% | 39% |
| 2953 | 0.25% | 9.00% | 0.25% | 1.00% | 0.25% | 44% | 57% | 44% | 57% | 43% | 56% | 42% | 55% | 49% | 64% | 44% | 44% | 45% | 45% |
| 2954 | 1.00% | 9.00% | 0.25% | 1.00% | 0.25% | 46% | 59% | 45% | 59% | 46% | 60% | 44% | 57% | 51% | 66% | 46% | 46% | 47% | 47% |
| 2955 | 9.00% | 9.00% | 0.25% | 1.00% | 0.25% | 42% | 54% | 43% | 56% | 41% | 53% | 41% | 53% | 48% | 62% | 42% | 42% | 43% | 43% |
| 2956 | 0.00% | 0.00% | 1.00% | 1.00% | 0.25% | 38% | 49% | 40% | 52% | 32% | 42% | 37% | 48% | 41% | 53% | 37% | 37% | 37% | 37% |
| 2957 | 0.25% | 0.00% | 1.00% | 1.00% | 0.25% | 40% | 52% | 41% | 53% | 34% | 44% | 38% | 49% | 42% | 55% | 38% | 38% | 38% | 38% |
| 2958 | 1.00% | 0.00% | 1.00% | 1.00% | 0.25% | 42% | 55% | 42% | 55% | 37% | 48% | 40% | 52% | 44% | 57% | 40% | 40% | 40% | 40% |
| 2959 | 0.00% | 0.25% | 1.00% | 1.00% | 0.25% | 41% | 53% | 44% | 57% | 37% | 48% | 40% | 52% | 44% | 57% | 41% | 41% | 40% | 40% |
| 2960 | 1.00% | 0.25% | 1.00% | 1.00% | 0.25% | 45% | 59% | 46% | 60% | 42% | 55% | 43% | 56% | 47% | 61% | 44% | 44% | 44% | 44% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2961 | 9.00% | 0.25% | 1.00% | 1.00% | 0.25% | 41% | 53% | 44% | 57% | 37% | 48% | 40% | 52% | 44% | 57% | 41% | 41% | 40% | 40% |
| 2962 | 0.00% | 1.00% | 1.00% | 1.00% | 0.25% | 44% | 57% | 47% | 61% | 41% | 53% | 44% | 57% | 50% | 65% | 44% | 44% | 45% | 45% |
| 2963 | 0.25% | 1.00% | 1.00% | 1.00% | 0.25% | 46% | 60% | 48% | 62% | 43% | 56% | 45% | 59% | 51% | 66% | 46% | 46% | 46% | 46% |
| 2964 | 1.00% | 1.00% | 1.00% | 1.00% | 0.25% | 48% | 62% | 49% | 64% | 46% | 60% | 47% | 61% | 53% | 69% | 48% | 48% | 49% | 49% |
| 2965 | 9.00% | 1.00% | 1.00% | 1.00% | 0.25% | 44% | 57% | 47% | 61% | 41% | 53% | 44% | 57% | 50% | 65% | 44% | 44% | 45% | 45% |
| 2966 | 0.00% | 9.00% | 1.00% | 1.00% | 0.25% | 48% | 62% | 51% | 66% | 45% | 59% | 47% | 61% | 56% | 73% | 48% | 48% | 49% | 49% |
| 2967 | 0.25% | 9.00% | 1.00% | 1.00% | 0.25% | 50% | 65% | 52% | 68% | 47% | 61% | 48% | 62% | 57% | 74% | 50% | 50% | 51% | 51% |
| 2968 | 1.00% | 9.00% | 1.00% | 1.00% | 0.25% | 52% | 68% | 53% | 69% | 50% | 65% | 50% | 65% | 59% | 77% | 52% | 52% | 53% | 53% |
| 2969 | 0.25% | 0.25% | 9.00% | 1.00% | 0.25% | 54% | 70% | 58% | 75% | 47% | 61% | 51% | 66% | 59% | 77% | 53% | 53% | 52% | 52% |
| 2970 | 1.00% | 0.25% | 9.00% | 1.00% | 0.25% | 56% | 73% | 59% | 77% | 50% | 65% | 53% | 69% | 61% | 79% | 55% | 55% | 55% | 55% |
| 2971 | 9.00% | 0.25% | 9.00% | 1.00% | 0.25% | 52% | 68% | 57% | 74% | 45% | 59% | 50% | 65% | 58% | 75% | 51% | 51% | 51% | 51% |
| 2972 | 0.25% | 1.00% | 9.00% | 1.00% | 0.25% | 57% | 74% | 61% | 79% | 51% | 66% | 55% | 72% | 65% | 85% | 56% | 56% | 57% | 57% |
| 2973 | 0.00% | 0.25% | 0.00% | 9.00% | 0.25% | 50% | 65% | 46% | 60% | 48% | 62% | 51% | 66% | 46% | 60% | 48% | 48% | 48% | 48% |
| 2974 | 0.00% | 0.00% | 0.25% | 9.00% | 0.25% | 52% | 67% | 46% | 60% | 46% | 60% | 51% | 66% | 46% | 60% | 48% | 48% | 48% | 48% |
| 2975 | 0.25% | 0.00% | 0.25% | 9.00% | 0.25% | 54% | 70% | 47% | 61% | 48% | 62% | 52% | 68% | 47% | 61% | 50% | 50% | 49% | 49% |
| 2976 | 0.00% | 0.25% | 0.25% | 9.00% | 0.25% | 55% | 71% | 50% | 65% | 51% | 66% | 54% | 70% | 49% | 64% | 52% | 52% | 51% | 51% |
| 2977 | 0.25% | 0.25% | 0.25% | 9.00% | 0.25% | 57% | 73% | 51% | 66% | 53% | 69% | 55% | 72% | 50% | 65% | 54% | 54% | 53% | 53% |
| 2978 | 1.00% | 0.25% | 0.25% | 9.00% | 0.25% | 59% | 76% | 52% | 68% | 56% | 73% | 57% | 74% | 52% | 68% | 56% | 56% | 55% | 55% |
| 2979 | 9.00% | 0.25% | 0.25% | 9.00% | 0.25% | 55% | 71% | 50% | 65% | 51% | 66% | 54% | 70% | 49% | 64% | 52% | 52% | 51% | 51% |
| 2980 | 0.00% | 1.00% | 0.25% | 9.00% | 0.25% | 58% | 75% | 53% | 69% | 55% | 72% | 58% | 75% | 55% | 72% | 55% | 55% | 56% | 56% |
| 2981 | 0.25% | 1.00% | 0.25% | 9.00% | 0.25% | 60% | 77% | 54% | 70% | 57% | 74% | 59% | 77% | 56% | 73% | 57% | 57% | 57% | 57% |
| 2982 | 1.00% | 1.00% | 0.25% | 9.00% | 0.25% | 62% | 80% | 55% | 72% | 60% | 78% | 61% | 79% | 58% | 75% | 59% | 59% | 60% | 60% |
| 2983 | 0.25% | 9.00% | 0.25% | 9.00% | 0.25% | 64% | 83% | 58% | 75% | 61% | 79% | 62% | 81% | 62% | 81% | 61% | 61% | 62% | 62% |
| 2984 | 0.25% | 0.00% | 1.00% | 9.00% | 0.25% | 60% | 78% | 55% | 72% | 52% | 68% | 58% | 75% | 55% | 72% | 56% | 56% | 55% | 55% |
| 2985 | 1.00% | 0.25% | 1.00% | 9.00% | 0.25% | 65% | 85% | 60% | 78% | 60% | 78% | 63% | 82% | 60% | 78% | 62% | 62% | 61% | 61% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 2986 | 9.00% | 0.25% | 1.00% | 9.00% | 0.25% | 61% | 79% | 58% | 75% | 55% | 72% | 60% | 78% | 57% | 74% | 58% | 58% | 57% | 57% |
| 2987 | 0.00% | 1.00% | 1.00% | 9.00% | 0.25% | 64% | 83% | 61% | 79% | 59% | 77% | 64% | 83% | 63% | 82% | 61% | 61% | 62% | 62% |
| 2988 | 0.25% | 1.00% | 1.00% | 9.00% | 0.25% | 66% | 86% | 62% | 81% | 61% | 79% | 65% | 85% | 64% | 83% | 63% | 63% | 63% | 63% |
| 2989 | 1.00% | 1.00% | 1.00% | 9.00% | 0.25% | 68% | 88% | 63% | 82% | 64% | 83% | 67% | 87% | 66% | 86% | 65% | 65% | 66% | 66% |
| 2990 | 0.25% | 0.25% | 9.00% | 9.00% | 0.25% | 74% | 96% | 72% | 94% | 65% | 85% | 71% | 92% | 72% | 94% | 70% | 70% | 69% | 69% |
| 2991 | 0.25% | 0.25% | 0.00% | 0.00% | 1.00% | 20% | 26% | 21% | 27% | 23% | 30% | 18% | 23% | 23% | 30% | 21% | 21% | 21% | 21% |
| 2992 | 1.00% | 0.25% | 0.00% | 0.00% | 1.00% | 22% | 29% | 22% | 29% | 26% | 34% | 20% | 26% | 25% | 33% | 23% | 23% | 24% | 24% |
| 2993 | 0.25% | 1.00% | 0.00% | 0.00% | 1.00% | 23% | 30% | 24% | 31% | 27% | 35% | 22% | 29% | 29% | 38% | 25% | 25% | 26% | 26% |
| 2994 | 1.00% | 1.00% | 0.00% | 0.00% | 1.00% | 25% | 33% | 25% | 33% | 30% | 39% | 24% | 31% | 31% | 40% | 27% | 27% | 28% | 28% |
| 2995 | 0.25% | 0.00% | 0.25% | 0.00% | 1.00% | 22% | 28% | 21% | 27% | 21% | 27% | 18% | 23% | 23% | 30% | 21% | 21% | 21% | 21% |
| 2996 | 1.00% | 0.00% | 0.25% | 0.00% | 1.00% | 24% | 31% | 22% | 29% | 24% | 31% | 20% | 26% | 25% | 33% | 23% | 23% | 23% | 23% |
| 2997 | 0.00% | 0.25% | 0.25% | 0.00% | 1.00% | 23% | 29% | 24% | 31% | 24% | 31% | 20% | 26% | 25% | 33% | 24% | 24% | 23% | 23% |
| 2998 | 0.25% | 0.25% | 0.25% | 0.00% | 1.00% | 25% | 32% | 25% | 33% | 26% | 34% | 21% | 27% | 26% | 34% | 25% | 25% | 24% | 24% |
| 2999 | 0.00% | 1.00% | 0.25% | 0.00% | 1.00% | 26% | 33% | 27% | 35% | 28% | 36% | 24% | 31% | 31% | 40% | 27% | 27% | 28% | 28% |
| 3000 | 1.00% | 1.00% | 0.25% | 0.00% | 1.00% | 30% | 38% | 29% | 38% | 33% | 43% | 27% | 35% | 34% | 44% | 31% | 31% | 31% | 31% |
| 3001 | 1.00% | 9.00% | 0.25% | 0.00% | 1.00% | 34% | 44% | 33% | 43% | 37% | 48% | 30% | 39% | 40% | 52% | 35% | 35% | 36% | 36% |
| 3002 | 0.25% | 0.00% | 1.00% | 0.00% | 1.00% | 28% | 36% | 29% | 38% | 25% | 33% | 24% | 31% | 31% | 40% | 27% | 27% | 27% | 27% |
| 3003 | 1.00% | 0.00% | 1.00% | 0.00% | 1.00% | 30% | 39% | 30% | 39% | 28% | 36% | 26% | 34% | 33% | 43% | 29% | 29% | 29% | 29% |
| 3004 | 0.00% | 0.25% | 1.00% | 0.00% | 1.00% | 29% | 38% | 32% | 42% | 28% | 36% | 26% | 34% | 33% | 43% | 30% | 30% | 29% | 29% |
| 3005 | 1.00% | 0.25% | 1.00% | 0.00% | 1.00% | 33% | 43% | 34% | 44% | 33% | 43% | 29% | 38% | 36% | 47% | 33% | 33% | 33% | 33% |
| 3006 | 0.00% | 1.00% | 1.00% | 0.00% | 1.00% | 32% | 42% | 35% | 46% | 32% | 42% | 30% | 39% | 39% | 51% | 33% | 33% | 34% | 34% |
| 3007 | 0.25% | 1.00% | 1.00% | 0.00% | 1.00% | 34% | 44% | 36% | 47% | 34% | 44% | 31% | 40% | 40% | 52% | 35% | 35% | 35% | 35% |
| 3008 | 1.00% | 1.00% | 1.00% | 0.00% | 1.00% | 36% | 47% | 37% | 48% | 37% | 48% | 33% | 43% | 42% | 55% | 37% | 37% | 37% | 37% |
| 3009 | 9.00% | 1.00% | 1.00% | 0.00% | 1.00% | 32% | 42% | 35% | 46% | 32% | 42% | 30% | 39% | 39% | 51% | 33% | 33% | 34% | 34% |
| 3010 | 1.00% | 9.00% | 1.00% | 0.00% | 1.00% | 40% | 52% | 41% | 53% | 41% | 53% | 36% | 47% | 48% | 62% | 41% | 41% | 42% | 42% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3011 | 0.25% | 0.00% | 9.00% | 0.00% | 1.00% | 39% | 51% | 42% | 55% | 33% | 43% | 34% | 44% | 45% | 59% | 38% | 38% | 37% | 37% |
| 3012 | 0.00% | 0.25% | 9.00% | 0.00% | 1.00% | 40% | 52% | 45% | 59% | 36% | 47% | 36% | 47% | 47% | 61% | 40% | 40% | 40% | 40% |
| 3013 | 0.25% | 0.25% | 9.00% | 0.00% | 1.00% | 42% | 55% | 46% | 60% | 38% | 49% | 37% | 48% | 48% | 62% | 42% | 42% | 41% | 41% |
| 3014 | 1.00% | 0.25% | 9.00% | 0.00% | 1.00% | 44% | 57% | 47% | 61% | 41% | 53% | 39% | 51% | 50% | 65% | 44% | 44% | 43% | 43% |
| 3015 | 0.25% | 1.00% | 9.00% | 0.00% | 1.00% | 45% | 59% | 49% | 64% | 42% | 55% | 41% | 53% | 54% | 70% | 45% | 45% | 46% | 46% |
| 3016 | 0.25% | 0.00% | 0.00% | 0.25% | 1.00% | 22% | 29% | 26% | 34% | 24% | 31% | 25% | 33% | 27% | 35% | 24% | 24% | 25% | 25% |
| 3017 | 1.00% | 0.00% | 0.00% | 0.25% | 1.00% | 24% | 31% | 27% | 35% | 27% | 35% | 27% | 35% | 29% | 38% | 26% | 26% | 28% | 28% |
| 3018 | 0.00% | 0.25% | 0.00% | 0.25% | 1.00% | 23% | 30% | 29% | 38% | 27% | 35% | 27% | 35% | 29% | 38% | 26% | 26% | 28% | 28% |
| 3019 | 0.25% | 0.25% | 0.00% | 0.25% | 1.00% | 25% | 33% | 30% | 39% | 29% | 38% | 28% | 36% | 30% | 39% | 28% | 28% | 29% | 29% |
| 3020 | 9.00% | 0.25% | 0.00% | 0.25% | 1.00% | 23% | 30% | 29% | 38% | 27% | 35% | 27% | 35% | 29% | 38% | 26% | 26% | 28% | 28% |
| 3021 | 1.00% | 1.00% | 0.00% | 0.25% | 1.00% | 30% | 39% | 34% | 44% | 36% | 47% | 34% | 44% | 38% | 49% | 33% | 33% | 36% | 36% |
| 3022 | 1.00% | 9.00% | 0.00% | 0.25% | 1.00% | 34% | 44% | 38% | 49% | 40% | 52% | 37% | 48% | 44% | 57% | 37% | 37% | 40% | 40% |
| 3023 | 0.00% | 0.00% | 0.25% | 0.25% | 1.00% | 25% | 32% | 29% | 38% | 25% | 33% | 27% | 35% | 29% | 38% | 26% | 26% | 27% | 27% |
| 3024 | 0.25% | 0.00% | 0.25% | 0.25% | 1.00% | 27% | 34% | 30% | 39% | 27% | 35% | 28% | 36% | 30% | 39% | 28% | 28% | 28% | 28% |
| 3025 | 0.00% | 0.25% | 0.25% | 0.25% | 1.00% | 28% | 36% | 33% | 43% | 30% | 39% | 30% | 39% | 32% | 42% | 30% | 30% | 31% | 31% |
| 3026 | 0.25% | 0.25% | 0.25% | 0.25% | 1.00% | 30% | 38% | 34% | 44% | 32% | 42% | 31% | 40% | 33% | 43% | 32% | 32% | 32% | 32% |
| 3027 | 1.00% | 0.25% | 0.25% | 0.25% | 1.00% | 32% | 41% | 35% | 46% | 35% | 46% | 33% | 43% | 35% | 46% | 34% | 34% | 34% | 34% |
| 3028 | 9.00% | 0.25% | 0.25% | 0.25% | 1.00% | 28% | 36% | 33% | 43% | 30% | 39% | 30% | 39% | 32% | 42% | 30% | 30% | 31% | 31% |
| 3029 | 0.25% | 1.00% | 0.25% | 0.25% | 1.00% | 33% | 42% | 37% | 48% | 36% | 47% | 35% | 46% | 39% | 51% | 35% | 35% | 37% | 37% |
| 3030 | 9.00% | 1.00% | 0.25% | 0.25% | 1.00% | 31% | 40% | 36% | 47% | 34% | 44% | 34% | 44% | 38% | 49% | 34% | 34% | 35% | 35% |
| 3031 | 0.25% | 9.00% | 0.25% | 0.25% | 1.00% | 37% | 47% | 41% | 53% | 40% | 52% | 38% | 49% | 45% | 59% | 39% | 39% | 41% | 41% |
| 3032 | 1.00% | 9.00% | 0.25% | 0.25% | 1.00% | 39% | 50% | 42% | 55% | 43% | 56% | 40% | 52% | 47% | 61% | 41% | 41% | 43% | 43% |
| 3033 | 9.00% | 9.00% | 0.25% | 0.25% | 1.00% | 35% | 45% | 40% | 52% | 38% | 49% | 37% | 48% | 44% | 57% | 38% | 38% | 40% | 40% |
| 3034 | 0.00% | 0.00% | 1.00% | 0.25% | 1.00% | 31% | 40% | 37% | 48% | 29% | 38% | 33% | 43% | 37% | 48% | 32% | 32% | 33% | 33% |
| 3035 | 1.00% | 0.00% | 1.00% | 0.25% | 1.00% | 35% | 46% | 39% | 51% | 34% | 44% | 36% | 47% | 40% | 52% | 36% | 36% | 37% | 37% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3036 | 0.00% | 0.25% | 1.00% | 0.25% | 1.00% | 34% | 44% | 41% | 53% | 34% | 44% | 36% | 47% | 40% | 52% | 36% | 36% | 37% | 37% |
| 3037 | 0.25% | 0.25% | 1.00% | 0.25% | 1.00% | 36% | 47% | 42% | 55% | 36% | 47% | 37% | 48% | 41% | 53% | 38% | 38% | 38% | 38% |
| 3038 | 1.00% | 0.25% | 1.00% | 0.25% | 1.00% | 38% | 49% | 43% | 56% | 39% | 51% | 39% | 51% | 43% | 56% | 40% | 40% | 40% | 40% |
| 3039 | 9.00% | 0.25% | 1.00% | 0.25% | 1.00% | 34% | 44% | 41% | 53% | 34% | 44% | 36% | 47% | 40% | 52% | 36% | 36% | 37% | 37% |
| 3040 | 0.00% | 1.00% | 1.00% | 0.25% | 1.00% | 37% | 48% | 44% | 57% | 38% | 49% | 40% | 52% | 46% | 60% | 40% | 40% | 41% | 41% |
| 3041 | 0.25% | 1.00% | 1.00% | 0.25% | 1.00% | 39% | 51% | 45% | 59% | 40% | 52% | 41% | 53% | 47% | 61% | 41% | 41% | 43% | 43% |
| 3042 | 1.00% | 1.00% | 1.00% | 0.25% | 1.00% | 41% | 53% | 46% | 60% | 43% | 56% | 43% | 56% | 49% | 64% | 43% | 43% | 45% | 45% |
| 3043 | 9.00% | 1.00% | 1.00% | 0.25% | 1.00% | 37% | 48% | 44% | 57% | 38% | 49% | 40% | 52% | 46% | 60% | 40% | 40% | 41% | 41% |
| 3044 | 0.00% | 9.00% | 1.00% | 0.25% | 1.00% | 41% | 53% | 48% | 62% | 42% | 55% | 43% | 56% | 52% | 68% | 44% | 44% | 46% | 46% |
| 3045 | 0.25% | 9.00% | 1.00% | 0.25% | 1.00% | 43% | 56% | 49% | 64% | 44% | 57% | 44% | 57% | 53% | 69% | 45% | 45% | 47% | 47% |
| 3046 | 1.00% | 9.00% | 1.00% | 0.25% | 1.00% | 45% | 59% | 50% | 65% | 47% | 61% | 46% | 60% | 55% | 72% | 47% | 47% | 49% | 49% |
| 3047 | 0.25% | 0.25% | 9.00% | 0.25% | 1.00% | 47% | 61% | 55% | 72% | 44% | 57% | 47% | 61% | 55% | 72% | 49% | 49% | 49% | 49% |
| 3048 | 1.00% | 0.25% | 9.00% | 0.25% | 1.00% | 49% | 64% | 56% | 73% | 47% | 61% | 49% | 64% | 57% | 74% | 51% | 51% | 51% | 51% |
| 3049 | 9.00% | 0.25% | 9.00% | 0.25% | 1.00% | 45% | 59% | 54% | 70% | 42% | 55% | 46% | 60% | 54% | 70% | 47% | 47% | 47% | 47% |
| 3050 | 0.00% | 1.00% | 9.00% | 0.25% | 1.00% | 48% | 62% | 57% | 74% | 46% | 60% | 50% | 65% | 60% | 78% | 50% | 50% | 52% | 52% |
| 3051 | 0.25% | 1.00% | 9.00% | 0.25% | 1.00% | 50% | 65% | 58% | 75% | 48% | 62% | 51% | 66% | 61% | 79% | 52% | 52% | 53% | 53% |
| 3052 | 9.00% | 1.00% | 9.00% | 0.25% | 1.00% | 48% | 62% | 57% | 74% | 46% | 60% | 50% | 65% | 60% | 78% | 50% | 50% | 52% | 52% |
| 3053 | 1.00% | 9.00% | 9.00% | 0.25% | 1.00% | 56% | 73% | 63% | 82% | 55% | 72% | 56% | 73% | 69% | 90% | 58% | 58% | 60% | 60% |
| 3054 | 0.25% | 0.00% | 0.00% | 1.00% | 1.00% | 37% | 48% | 38% | 49% | 36% | 47% | 35% | 46% | 42% | 55% | 37% | 37% | 38% | 38% |
| 3055 | 1.00% | 0.25% | 0.00% | 1.00% | 1.00% | 42% | 55% | 43% | 56% | 44% | 57% | 40% | 52% | 47% | 61% | 43% | 43% | 44% | 44% |
| 3056 | 0.00% | 1.00% | 0.00% | 1.00% | 1.00% | 41% | 53% | 44% | 57% | 43% | 56% | 41% | 53% | 50% | 65% | 43% | 43% | 45% | 45% |
| 3057 | 0.25% | 1.00% | 0.00% | 1.00% | 1.00% | 43% | 56% | 45% | 59% | 45% | 59% | 42% | 55% | 51% | 66% | 44% | 44% | 46% | 46% |
| 3058 | 1.00% | 1.00% | 0.00% | 1.00% | 1.00% | 45% | 59% | 46% | 60% | 48% | 62% | 44% | 57% | 53% | 69% | 46% | 46% | 48% | 48% |
| 3059 | 0.00% | 0.00% | 0.25% | 1.00% | 1.00% | 40% | 51% | 41% | 53% | 37% | 48% | 37% | 48% | 44% | 57% | 39% | 39% | 39% | 39% |
| 3060 | 1.00% | 0.00% | 0.25% | 1.00% | 1.00% | 44% | 57% | 43% | 56% | 42% | 55% | 40% | 52% | 47% | 61% | 43% | 43% | 43% | 43% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3061 | 0.25% | 0.25% | 0.25% | 1.00% | 1.00% | 45% | 58% | 46% | 60% | 44% | 57% | 41% | 53% | 48% | 62% | 45% | 45% | 44% | 44% |
| 3062 | 1.00% | 0.25% | 0.25% | 1.00% | 1.00% | 47% | 60% | 47% | 61% | 47% | 61% | 43% | 56% | 50% | 65% | 47% | 47% | 47% | 47% |
| 3063 | 9.00% | 0.25% | 0.25% | 1.00% | 1.00% | 43% | 55% | 45% | 59% | 42% | 55% | 40% | 52% | 47% | 61% | 43% | 43% | 43% | 43% |
| 3064 | 0.00% | 1.00% | 0.25% | 1.00% | 1.00% | 46% | 59% | 48% | 62% | 46% | 60% | 44% | 57% | 53% | 69% | 47% | 47% | 48% | 48% |
| 3065 | 0.25% | 1.00% | 0.25% | 1.00% | 1.00% | 48% | 62% | 49% | 64% | 48% | 62% | 45% | 59% | 54% | 70% | 48% | 48% | 49% | 49% |
| 3066 | 1.00% | 1.00% | 0.25% | 1.00% | 1.00% | 50% | 64% | 50% | 65% | 51% | 66% | 47% | 61% | 56% | 73% | 50% | 50% | 51% | 51% |
| 3067 | 9.00% | 1.00% | 0.25% | 1.00% | 1.00% | 46% | 59% | 48% | 62% | 46% | 60% | 44% | 57% | 53% | 69% | 47% | 47% | 48% | 48% |
| 3068 | 0.25% | 9.00% | 0.25% | 1.00% | 1.00% | 52% | 67% | 53% | 69% | 52% | 68% | 48% | 62% | 60% | 78% | 52% | 52% | 53% | 53% |
| 3069 | 1.00% | 9.00% | 0.25% | 1.00% | 1.00% | 54% | 70% | 54% | 70% | 55% | 72% | 50% | 65% | 62% | 81% | 54% | 54% | 56% | 56% |
| 3070 | 9.00% | 9.00% | 0.25% | 1.00% | 1.00% | 50% | 64% | 52% | 68% | 50% | 65% | 47% | 61% | 59% | 77% | 51% | 51% | 52% | 52% |
| 3071 | 0.00% | 0.00% | 1.00% | 1.00% | 1.00% | 46% | 60% | 49% | 64% | 41% | 53% | 43% | 56% | 52% | 68% | 45% | 45% | 45% | 45% |
| 3072 | 0.25% | 0.00% | 1.00% | 1.00% | 1.00% | 48% | 62% | 50% | 65% | 43% | 56% | 44% | 57% | 53% | 69% | 47% | 47% | 47% | 47% |
| 3073 | 1.00% | 0.00% | 1.00% | 1.00% | 1.00% | 50% | 65% | 51% | 66% | 46% | 60% | 46% | 60% | 55% | 72% | 49% | 49% | 49% | 49% |
| 3074 | 0.00% | 0.25% | 1.00% | 1.00% | 1.00% | 49% | 64% | 53% | 69% | 46% | 60% | 46% | 60% | 55% | 72% | 49% | 49% | 49% | 49% |
| 3075 | 1.00% | 0.25% | 1.00% | 1.00% | 1.00% | 53% | 69% | 55% | 72% | 51% | 66% | 49% | 64% | 58% | 75% | 53% | 53% | 53% | 53% |
| 3076 | 9.00% | 0.25% | 1.00% | 1.00% | 1.00% | 49% | 64% | 53% | 69% | 46% | 60% | 46% | 60% | 55% | 72% | 49% | 49% | 49% | 49% |
| 3077 | 0.00% | 1.00% | 1.00% | 1.00% | 1.00% | 52% | 68% | 56% | 73% | 50% | 65% | 50% | 65% | 61% | 79% | 53% | 53% | 54% | 54% |
| 3078 | 0.25% | 1.00% | 1.00% | 1.00% | 1.00% | 54% | 70% | 57% | 74% | 52% | 68% | 51% | 66% | 62% | 81% | 54% | 54% | 55% | 55% |
| 3079 | 1.00% | 1.00% | 1.00% | 1.00% | 1.00% | 56% | 73% | 58% | 75% | 55% | 72% | 53% | 69% | 64% | 83% | 56% | 56% | 57% | 57% |
| 3080 | 9.00% | 1.00% | 1.00% | 1.00% | 1.00% | 52% | 68% | 56% | 73% | 50% | 65% | 50% | 65% | 61% | 79% | 53% | 53% | 54% | 54% |
| 3081 | 0.00% | 9.00% | 1.00% | 1.00% | 1.00% | 56% | 73% | 60% | 78% | 54% | 70% | 53% | 69% | 67% | 87% | 57% | 57% | 58% | 58% |
| 3082 | 0.25% | 9.00% | 1.00% | 1.00% | 1.00% | 58% | 75% | 61% | 79% | 56% | 73% | 54% | 70% | 68% | 88% | 58% | 58% | 59% | 59% |
| 3083 | 1.00% | 9.00% | 1.00% | 1.00% | 1.00% | 60% | 78% | 62% | 81% | 59% | 77% | 56% | 73% | 70% | 91% | 60% | 60% | 62% | 62% |
| 3084 | 0.25% | 0.25% | 9.00% | 1.00% | 1.00% | 62% | 81% | 67% | 87% | 56% | 73% | 57% | 74% | 70% | 91% | 62% | 62% | 61% | 61% |
| 3085 | 1.00% | 0.25% | 9.00% | 1.00% | 1.00% | 64% | 83% | 68% | 88% | 59% | 77% | 59% | 77% | 72% | 94% | 64% | 64% | 63% | 63% |

Fig. 14

| Formula # | Delta Dodecalactone | Propyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3086 | 9.00% | 0.25% | 9.00% | 1.00% | 1.00% | 60% | 78% | 66% | 86% | 54% | 70% | 56% | 73% | 69% | 90% | 60% | 60% | 60% | 60% |
| 3087 | 0.25% | 1.00% | 9.00% | 1.00% | 1.00% | 65% | 85% | 70% | 91% | 60% | 78% | 61% | 79% | 76% | 99% | 65% | 65% | 66% | 66% |
| 3088 | 0.00% | 0.25% | 0.00% | 9.00% | 1.00% | 58% | 75% | 55% | 72% | 57% | 74% | 57% | 74% | 57% | 74% | 57% | 57% | 57% | 57% |
| 3089 | 0.00% | 0.00% | 0.25% | 9.00% | 1.00% | 60% | 77% | 55% | 72% | 55% | 72% | 57% | 74% | 57% | 74% | 57% | 57% | 56% | 56% |
| 3090 | 0.25% | 0.00% | 0.25% | 9.00% | 1.00% | 62% | 80% | 56% | 73% | 57% | 74% | 58% | 75% | 58% | 75% | 58% | 58% | 58% | 58% |
| 3091 | 0.00% | 0.25% | 0.25% | 9.00% | 1.00% | 63% | 81% | 59% | 77% | 60% | 78% | 60% | 78% | 60% | 78% | 61% | 61% | 60% | 60% |
| 3092 | 0.25% | 0.25% | 0.25% | 9.00% | 1.00% | 65% | 84% | 60% | 78% | 62% | 81% | 61% | 79% | 61% | 79% | 62% | 62% | 61% | 61% |
| 3093 | 1.00% | 0.25% | 0.25% | 9.00% | 1.00% | 67% | 86% | 61% | 79% | 65% | 85% | 63% | 82% | 63% | 82% | 64% | 64% | 64% | 64% |
| 3094 | 9.00% | 0.25% | 0.25% | 9.00% | 1.00% | 63% | 81% | 59% | 77% | 60% | 78% | 60% | 78% | 60% | 78% | 61% | 61% | 60% | 60% |
| 3095 | 0.00% | 1.00% | 0.25% | 9.00% | 1.00% | 66% | 85% | 62% | 81% | 64% | 83% | 64% | 83% | 66% | 86% | 64% | 64% | 65% | 65% |
| 3096 | 0.25% | 1.00% | 0.25% | 9.00% | 1.00% | 68% | 88% | 63% | 82% | 66% | 86% | 65% | 85% | 67% | 87% | 66% | 66% | 66% | 66% |
| 3097 | 1.00% | 1.00% | 0.25% | 9.00% | 1.00% | 70% | 90% | 64% | 83% | 69% | 90% | 67% | 87% | 69% | 90% | 68% | 68% | 68% | 68% |
| 3098 | 0.25% | 9.00% | 0.25% | 9.00% | 1.00% | 72% | 93% | 67% | 87% | 70% | 91% | 68% | 88% | 73% | 95% | 70% | 70% | 70% | 70% |
| 3099 | 0.25% | 0.00% | 1.00% | 9.00% | 1.00% | 68% | 88% | 64% | 83% | 61% | 79% | 64% | 83% | 66% | 86% | 64% | 64% | 64% | 64% |
| 3100 | 1.00% | 0.25% | 1.00% | 9.00% | 1.00% | 73% | 95% | 69% | 90% | 69% | 90% | 69% | 90% | 71% | 92% | 70% | 70% | 70% | 70% |
| 3101 | 9.00% | 0.25% | 1.00% | 9.00% | 1.00% | 69% | 90% | 67% | 87% | 64% | 83% | 66% | 86% | 68% | 88% | 67% | 67% | 66% | 66% |
| 3102 | 0.00% | 1.00% | 1.00% | 9.00% | 1.00% | 72% | 94% | 70% | 91% | 68% | 88% | 70% | 91% | 74% | 96% | 70% | 70% | 71% | 71% |
| 3103 | 0.25% | 1.00% | 1.00% | 9.00% | 1.00% | 74% | 96% | 71% | 92% | 70% | 91% | 71% | 92% | 75% | 98% | 72% | 72% | 72% | 72% |
| 3104 | 1.00% | 1.00% | 1.00% | 9.00% | 1.00% | 76% | 99% | 72% | 94% | 73% | 95% | 73% | 95% | 77% | 100% | 74% | 74% | 74% | 74% |
| 3105 | 0.25% | 0.25% | 9.00% | 9.00% | 1.00% | 82% | 100% | 81% | 100% | 74% | 96% | 77% | 100% | 83% | 100% | 79% | 79% | 78% | 78% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3106 | 0.25% | 0.25% | 0.00% | 0.00% | 0.00% | 5% | 7% | 5% | 7% | 7% | 9% | 4% | 5% | 4% | 5% | 6% | 6% | 5% | 5% |
| 3107 | 1.00% | 0.25% | 0.00% | 0.00% | 0.00% | 7% | 9% | 6% | 8% | 10% | 13% | 6% | 8% | 6% | 8% | 8% | 8% | 7% | 7% |
| 3108 | 0.25% | 1.00% | 0.00% | 0.00% | 0.00% | 8% | 10% | 8% | 10% | 11% | 14% | 8% | 10% | 10% | 13% | 9% | 9% | 10% | 10% |
| 3109 | 1.00% | 1.00% | 0.00% | 0.00% | 0.00% | 10% | 13% | 9% | 12% | 14% | 18% | 10% | 13% | 12% | 16% | 11% | 11% | 12% | 12% |
| 3110 | 0.25% | 0.00% | 0.25% | 0.00% | 0.00% | 7% | 8% | 5% | 7% | 5% | 7% | 4% | 5% | 4% | 5% | 6% | 6% | 4% | 4% |
| 3111 | 1.00% | 0.00% | 0.25% | 0.00% | 0.00% | 9% | 11% | 6% | 8% | 8% | 10% | 6% | 8% | 6% | 8% | 8% | 8% | 7% | 7% |
| 3112 | 0.00% | 0.25% | 0.25% | 0.00% | 0.00% | 8% | 10% | 8% | 10% | 8% | 10% | 6% | 8% | 6% | 8% | 8% | 8% | 7% | 7% |
| 3113 | 0.25% | 0.25% | 0.25% | 0.00% | 0.00% | 10% | 12% | 9% | 12% | 10% | 13% | 7% | 9% | 7% | 9% | 10% | 10% | 8% | 8% |
| 3114 | 0.00% | 1.00% | 0.25% | 0.00% | 0.00% | 11% | 14% | 11% | 14% | 12% | 16% | 10% | 13% | 12% | 16% | 11% | 11% | 11% | 11% |
| 3115 | 1.00% | 1.00% | 0.25% | 0.00% | 0.00% | 15% | 19% | 13% | 17% | 17% | 22% | 13% | 17% | 15% | 20% | 15% | 15% | 15% | 15% |
| 3116 | 1.00% | 9.00% | 0.25% | 0.00% | 0.00% | 19% | 24% | 17% | 22% | 21% | 27% | 16% | 21% | 21% | 27% | 19% | 19% | 19% | 19% |
| 3117 | 0.25% | 0.00% | 1.00% | 0.00% | 0.00% | 13% | 17% | 13% | 17% | 9% | 12% | 10% | 13% | 12% | 16% | 12% | 12% | 10% | 10% |
| 3118 | 1.00% | 0.00% | 1.00% | 0.00% | 0.00% | 15% | 20% | 14% | 18% | 12% | 16% | 12% | 16% | 14% | 18% | 14% | 14% | 13% | 13% |
| 3119 | 0.00% | 0.25% | 1.00% | 0.00% | 0.00% | 14% | 18% | 16% | 21% | 12% | 16% | 12% | 16% | 14% | 18% | 14% | 14% | 13% | 13% |
| 3120 | 1.00% | 0.25% | 1.00% | 0.00% | 0.00% | 18% | 23% | 18% | 23% | 17% | 22% | 15% | 20% | 17% | 22% | 18% | 18% | 16% | 16% |
| 3121 | 0.00% | 1.00% | 1.00% | 0.00% | 0.00% | 17% | 22% | 19% | 25% | 16% | 21% | 16% | 21% | 20% | 26% | 17% | 17% | 17% | 17% |
| 3122 | 0.25% | 1.00% | 1.00% | 0.00% | 0.00% | 19% | 25% | 20% | 26% | 18% | 23% | 17% | 22% | 21% | 27% | 19% | 19% | 19% | 19% |
| 3123 | 1.00% | 1.00% | 1.00% | 0.00% | 0.00% | 21% | 27% | 21% | 27% | 21% | 27% | 19% | 25% | 23% | 30% | 21% | 21% | 21% | 21% |
| 3124 | 9.00% | 1.00% | 1.00% | 0.00% | 0.00% | 17% | 22% | 19% | 25% | 16% | 21% | 16% | 21% | 20% | 26% | 17% | 17% | 17% | 17% |
| 3125 | 1.00% | 9.00% | 1.00% | 0.00% | 0.00% | 25% | 33% | 25% | 33% | 25% | 33% | 22% | 29% | 29% | 38% | 25% | 25% | 25% | 25% |
| 3126 | 0.25% | 0.00% | 9.00% | 0.00% | 0.00% | 24% | 31% | 26% | 34% | 17% | 22% | 20% | 26% | 26% | 34% | 22% | 22% | 21% | 21% |
| 3127 | 0.00% | 0.25% | 9.00% | 0.00% | 0.00% | 25% | 33% | 29% | 38% | 20% | 26% | 22% | 29% | 28% | 36% | 25% | 25% | 23% | 23% |
| 3128 | 0.25% | 0.25% | 9.00% | 0.00% | 0.00% | 27% | 35% | 30% | 39% | 22% | 29% | 23% | 30% | 29% | 38% | 26% | 26% | 25% | 25% |
| 3129 | 1.00% | 0.25% | 9.00% | 0.00% | 0.00% | 29% | 38% | 31% | 40% | 25% | 33% | 25% | 33% | 31% | 40% | 28% | 28% | 27% | 27% |
| 3130 | 0.25% | 1.00% | 9.00% | 0.00% | 0.00% | 30% | 39% | 33% | 43% | 26% | 34% | 27% | 35% | 35% | 46% | 30% | 30% | 29% | 29% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3131 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 3132 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 3133 | 0.00% | 0.25% | 0.00% | 0.25% | 0.00% | 10% | 13% | 9% | 12% | 10% | 13% | 13% | 17% | 9% | 12% | 10% | 10% | 11% | 11% |
| 3134 | 0.25% | 0.25% | 0.00% | 0.25% | 0.00% | 12% | 16% | 10% | 13% | 12% | 16% | 14% | 18% | 10% | 13% | 11% | 11% | 12% | 12% |
| 3135 | 9.00% | 0.25% | 0.00% | 0.25% | 0.00% | 10% | 13% | 9% | 12% | 10% | 13% | 13% | 17% | 9% | 12% | 10% | 10% | 11% | 11% |
| 3136 | 1.00% | 1.00% | 0.00% | 0.25% | 0.00% | 17% | 22% | 14% | 18% | 19% | 25% | 20% | 26% | 18% | 23% | 17% | 17% | 19% | 19% |
| 3137 | 1.00% | 9.00% | 0.00% | 0.25% | 0.00% | 21% | 27% | 18% | 23% | 23% | 30% | 23% | 30% | 24% | 31% | 21% | 21% | 23% | 23% |
| 3138 | 0.00% | 0.00% | 0.25% | 0.25% | 0.00% | 12% | 15% | 9% | 12% | 8% | 10% | 13% | 17% | 9% | 12% | 10% | 10% | 10% | 10% |
| 3139 | 0.25% | 0.00% | 0.25% | 0.25% | 0.00% | 14% | 18% | 10% | 13% | 10% | 13% | 14% | 18% | 10% | 13% | 11% | 11% | 11% | 11% |
| 3140 | 0.00% | 0.25% | 0.25% | 0.25% | 0.00% | 15% | 19% | 13% | 17% | 13% | 17% | 16% | 21% | 12% | 16% | 14% | 14% | 14% | 14% |
| 3141 | 0.25% | 0.25% | 0.25% | 0.25% | 0.00% | 17% | 21% | 14% | 18% | 15% | 20% | 17% | 22% | 13% | 17% | 15% | 15% | 15% | 15% |
| 3142 | 1.00% | 0.25% | 0.25% | 0.25% | 0.00% | 19% | 24% | 15% | 20% | 18% | 23% | 19% | 25% | 15% | 20% | 17% | 17% | 17% | 17% |
| 3143 | 9.00% | 0.25% | 0.25% | 0.25% | 0.00% | 15% | 19% | 13% | 17% | 13% | 17% | 16% | 21% | 12% | 16% | 14% | 14% | 14% | 14% |
| 3144 | 0.25% | 1.00% | 0.25% | 0.25% | 0.00% | 20% | 25% | 17% | 22% | 19% | 25% | 21% | 27% | 19% | 25% | 19% | 19% | 20% | 20% |
| 3145 | 9.00% | 1.00% | 0.25% | 0.25% | 0.00% | 18% | 23% | 16% | 21% | 17% | 22% | 20% | 26% | 18% | 23% | 17% | 17% | 18% | 18% |
| 3146 | 0.25% | 9.00% | 0.25% | 0.25% | 0.00% | 24% | 31% | 21% | 27% | 23% | 30% | 24% | 31% | 25% | 33% | 23% | 23% | 24% | 24% |
| 3147 | 1.00% | 9.00% | 0.25% | 0.25% | 0.00% | 26% | 33% | 22% | 29% | 26% | 34% | 26% | 34% | 27% | 35% | 25% | 25% | 26% | 26% |
| 3148 | 9.00% | 9.00% | 0.25% | 0.25% | 0.00% | 22% | 28% | 20% | 26% | 21% | 27% | 23% | 30% | 24% | 31% | 21% | 21% | 23% | 23% |
| 3149 | 0.00% | 0.00% | 1.00% | 0.25% | 0.00% | 18% | 23% | 17% | 22% | 12% | 16% | 19% | 25% | 17% | 22% | 16% | 16% | 16% | 16% |
| 3150 | 1.00% | 0.00% | 1.00% | 0.25% | 0.00% | 22% | 29% | 19% | 25% | 17% | 22% | 22% | 29% | 20% | 26% | 19% | 19% | 20% | 20% |
| 3151 | 0.00% | 0.25% | 1.00% | 0.25% | 0.00% | 21% | 27% | 21% | 27% | 17% | 22% | 22% | 29% | 20% | 26% | 20% | 20% | 20% | 20% |
| 3152 | 0.25% | 0.25% | 1.00% | 0.25% | 0.00% | 23% | 30% | 22% | 29% | 19% | 25% | 23% | 30% | 21% | 27% | 21% | 21% | 21% | 21% |
| 3153 | 1.00% | 0.25% | 1.00% | 0.25% | 0.00% | 25% | 33% | 23% | 30% | 22% | 29% | 25% | 33% | 23% | 30% | 23% | 23% | 23% | 23% |
| 3154 | 9.00% | 0.25% | 1.00% | 0.25% | 0.00% | 21% | 27% | 21% | 27% | 17% | 22% | 22% | 29% | 20% | 26% | 20% | 20% | 20% | 20% |
| 3155 | 0.00% | 1.00% | 1.00% | 0.25% | 0.00% | 24% | 31% | 24% | 31% | 21% | 27% | 26% | 34% | 26% | 34% | 23% | 23% | 24% | 24% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3156 | 0.25% | 1.00% | 1.00% | 0.25% | 0.00% | 26% | 34% | 25% | 33% | 23% | 30% | 27% | 35% | 27% | 35% | 25% | 25% | 26% | 26% |
| 3157 | 1.00% | 1.00% | 1.00% | 0.25% | 0.00% | 28% | 36% | 26% | 34% | 26% | 34% | 29% | 38% | 29% | 38% | 27% | 27% | 28% | 28% |
| 3158 | 9.00% | 1.00% | 1.00% | 0.25% | 0.00% | 24% | 31% | 24% | 31% | 21% | 27% | 26% | 34% | 26% | 34% | 23% | 23% | 24% | 24% |
| 3159 | 0.00% | 9.00% | 1.00% | 0.25% | 0.00% | 28% | 36% | 28% | 36% | 25% | 33% | 29% | 38% | 32% | 42% | 27% | 27% | 29% | 29% |
| 3160 | 0.25% | 9.00% | 1.00% | 0.25% | 0.00% | 30% | 39% | 29% | 38% | 27% | 35% | 30% | 39% | 33% | 43% | 29% | 29% | 30% | 30% |
| 3161 | 1.00% | 9.00% | 1.00% | 0.25% | 0.00% | 32% | 42% | 30% | 39% | 30% | 39% | 32% | 42% | 35% | 46% | 31% | 31% | 32% | 32% |
| 3162 | 0.25% | 0.25% | 9.00% | 0.25% | 0.00% | 34% | 44% | 35% | 46% | 27% | 35% | 33% | 43% | 35% | 46% | 32% | 32% | 32% | 32% |
| 3163 | 1.00% | 0.25% | 9.00% | 0.25% | 0.00% | 36% | 47% | 36% | 47% | 30% | 39% | 35% | 46% | 37% | 48% | 34% | 34% | 34% | 34% |
| 3164 | 9.00% | 0.25% | 9.00% | 0.25% | 0.00% | 32% | 42% | 34% | 44% | 25% | 33% | 32% | 42% | 34% | 44% | 30% | 30% | 30% | 30% |
| 3165 | 0.00% | 1.00% | 9.00% | 0.25% | 0.00% | 35% | 46% | 37% | 48% | 29% | 38% | 36% | 47% | 40% | 52% | 34% | 34% | 35% | 35% |
| 3166 | 0.25% | 1.00% | 9.00% | 0.25% | 0.00% | 37% | 48% | 38% | 49% | 31% | 40% | 37% | 48% | 41% | 53% | 35% | 35% | 36% | 36% |
| 3167 | 9.00% | 1.00% | 9.00% | 0.25% | 0.00% | 35% | 46% | 37% | 48% | 29% | 38% | 36% | 47% | 40% | 52% | 34% | 34% | 35% | 35% |
| 3168 | 1.00% | 9.00% | 9.00% | 0.25% | 0.00% | 43% | 56% | 43% | 56% | 38% | 49% | 42% | 55% | 49% | 64% | 41% | 41% | 43% | 43% |
| 3169 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 3170 | 1.00% | 0.25% | 0.00% | 1.00% | 0.00% | 22% | 29% | 18% | 23% | 22% | 29% | 23% | 30% | 21% | 27% | 21% | 21% | 22% | 22% |
| 3171 | 0.00% | 1.00% | 0.00% | 1.00% | 0.00% | 21% | 27% | 19% | 25% | 21% | 27% | 24% | 31% | 24% | 31% | 20% | 20% | 23% | 23% |
| 3172 | 0.25% | 1.00% | 0.00% | 1.00% | 0.00% | 23% | 30% | 20% | 26% | 23% | 30% | 25% | 33% | 25% | 33% | 22% | 22% | 24% | 24% |
| 3173 | 1.00% | 1.00% | 0.00% | 1.00% | 0.00% | 25% | 33% | 21% | 27% | 26% | 34% | 27% | 35% | 27% | 35% | 24% | 24% | 27% | 27% |
| 3174 | 0.00% | 0.00% | 0.25% | 1.00% | 0.00% | 20% | 25% | 16% | 21% | 15% | 20% | 20% | 26% | 18% | 23% | 17% | 17% | 18% | 18% |
| 3175 | 1.00% | 0.00% | 0.25% | 1.00% | 0.00% | 24% | 31% | 18% | 23% | 20% | 26% | 23% | 30% | 21% | 27% | 21% | 21% | 21% | 21% |
| 3176 | 0.25% | 0.25% | 0.25% | 1.00% | 0.00% | 25% | 32% | 21% | 27% | 22% | 29% | 24% | 31% | 22% | 29% | 23% | 23% | 23% | 23% |
| 3177 | 1.00% | 0.25% | 0.25% | 1.00% | 0.00% | 27% | 34% | 22% | 29% | 25% | 33% | 26% | 34% | 24% | 31% | 25% | 25% | 25% | 25% |
| 3178 | 9.00% | 0.25% | 0.25% | 1.00% | 0.00% | 23% | 29% | 20% | 26% | 20% | 26% | 23% | 30% | 21% | 27% | 21% | 21% | 21% | 21% |
| 3179 | 0.00% | 1.00% | 0.25% | 1.00% | 0.00% | 26% | 33% | 23% | 30% | 24% | 31% | 27% | 35% | 27% | 35% | 24% | 24% | 26% | 26% |
| 3180 | 0.25% | 1.00% | 0.25% | 1.00% | 0.00% | 28% | 36% | 24% | 31% | 26% | 34% | 28% | 36% | 28% | 36% | 26% | 26% | 27% | 27% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3181 | 1.00% | 1.00% | 0.25% | 1.00% | 0.00% | 30% | 38% | 25% | 33% | 29% | 38% | 30% | 39% | 30% | 39% | 28% | 28% | 30% | 30% |
| 3182 | 9.00% | 1.00% | 0.25% | 1.00% | 0.00% | 26% | 33% | 23% | 30% | 24% | 31% | 27% | 35% | 27% | 35% | 24% | 24% | 26% | 26% |
| 3183 | 0.25% | 9.00% | 0.25% | 1.00% | 0.00% | 32% | 41% | 28% | 36% | 30% | 39% | 31% | 40% | 34% | 44% | 30% | 30% | 32% | 32% |
| 3184 | 1.00% | 9.00% | 0.25% | 1.00% | 0.00% | 34% | 44% | 29% | 38% | 33% | 43% | 33% | 43% | 36% | 47% | 32% | 32% | 34% | 34% |
| 3185 | 9.00% | 9.00% | 0.25% | 1.00% | 0.00% | 30% | 38% | 27% | 35% | 28% | 36% | 30% | 39% | 33% | 43% | 28% | 28% | 30% | 30% |
| 3186 | 0.00% | 0.00% | 1.00% | 1.00% | 0.00% | 26% | 34% | 24% | 31% | 19% | 25% | 26% | 34% | 26% | 34% | 23% | 23% | 24% | 24% |
| 3187 | 0.25% | 0.00% | 1.00% | 1.00% | 0.00% | 28% | 36% | 25% | 33% | 21% | 27% | 27% | 35% | 27% | 35% | 25% | 25% | 25% | 25% |
| 3188 | 1.00% | 0.00% | 1.00% | 1.00% | 0.00% | 30% | 39% | 26% | 34% | 24% | 31% | 29% | 38% | 29% | 38% | 27% | 27% | 27% | 27% |
| 3189 | 0.00% | 0.25% | 1.00% | 1.00% | 0.00% | 29% | 38% | 28% | 36% | 24% | 31% | 29% | 38% | 29% | 38% | 27% | 27% | 27% | 27% |
| 3190 | 1.00% | 0.25% | 1.00% | 1.00% | 0.00% | 33% | 43% | 30% | 39% | 29% | 38% | 32% | 42% | 32% | 42% | 31% | 31% | 31% | 31% |
| 3191 | 9.00% | 0.25% | 1.00% | 1.00% | 0.00% | 29% | 38% | 28% | 36% | 24% | 31% | 29% | 38% | 29% | 38% | 27% | 27% | 27% | 27% |
| 3192 | 0.00% | 1.00% | 1.00% | 1.00% | 0.00% | 32% | 42% | 31% | 40% | 28% | 36% | 33% | 43% | 35% | 46% | 30% | 30% | 32% | 32% |
| 3193 | 0.25% | 1.00% | 1.00% | 1.00% | 0.00% | 34% | 44% | 32% | 42% | 30% | 39% | 34% | 44% | 36% | 47% | 32% | 32% | 33% | 33% |
| 3194 | 1.00% | 1.00% | 1.00% | 1.00% | 0.00% | 36% | 47% | 33% | 43% | 33% | 43% | 36% | 47% | 38% | 49% | 34% | 34% | 36% | 36% |
| 3195 | 9.00% | 1.00% | 1.00% | 1.00% | 0.00% | 32% | 42% | 31% | 40% | 28% | 36% | 33% | 43% | 35% | 46% | 30% | 30% | 32% | 32% |
| 3196 | 0.00% | 9.00% | 1.00% | 1.00% | 0.00% | 36% | 47% | 35% | 46% | 32% | 42% | 36% | 47% | 41% | 53% | 34% | 34% | 36% | 36% |
| 3197 | 0.25% | 9.00% | 1.00% | 1.00% | 0.00% | 38% | 49% | 36% | 47% | 34% | 44% | 37% | 48% | 42% | 55% | 36% | 36% | 38% | 38% |
| 3198 | 1.00% | 9.00% | 1.00% | 1.00% | 0.00% | 40% | 52% | 37% | 48% | 37% | 48% | 39% | 51% | 44% | 57% | 38% | 38% | 40% | 40% |
| 3199 | 0.25% | 0.25% | 9.00% | 1.00% | 0.00% | 42% | 55% | 42% | 55% | 34% | 44% | 40% | 52% | 44% | 57% | 39% | 39% | 39% | 39% |
| 3200 | 1.00% | 0.25% | 9.00% | 1.00% | 0.00% | 44% | 57% | 43% | 56% | 37% | 48% | 42% | 55% | 46% | 60% | 41% | 41% | 42% | 42% |
| 3201 | 9.00% | 0.25% | 9.00% | 1.00% | 0.00% | 40% | 52% | 41% | 53% | 32% | 42% | 39% | 51% | 43% | 56% | 38% | 38% | 38% | 38% |
| 3202 | 0.25% | 1.00% | 9.00% | 1.00% | 0.00% | 45% | 59% | 45% | 59% | 38% | 49% | 44% | 57% | 50% | 65% | 43% | 43% | 44% | 44% |
| 3203 | 0.00% | 0.25% | 0.00% | 9.00% | 0.00% | 40% | 52% | 36% | 47% | 33% | 43% | 42% | 55% | 38% | 49% | 36% | 36% | 38% | 38% |
| 3204 | 0.00% | 0.00% | 0.25% | 9.00% | 0.00% | 42% | 54% | 36% | 47% | 31% | 40% | 42% | 55% | 38% | 49% | 36% | 36% | 37% | 37% |
| 3205 | 0.25% | 0.00% | 0.25% | 9.00% | 0.00% | 44% | 57% | 37% | 48% | 33% | 43% | 43% | 56% | 39% | 51% | 38% | 38% | 38% | 38% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3206 | 0.00% | 0.25% | 0.25% | 9.00% | 0.00% | 45% | 58% | 40% | 52% | 36% | 47% | 45% | 59% | 41% | 53% | 40% | 40% | 41% | 41% |
| 3207 | 0.25% | 0.25% | 0.25% | 9.00% | 0.00% | 47% | 60% | 41% | 53% | 38% | 49% | 46% | 60% | 42% | 55% | 42% | 42% | 42% | 42% |
| 3208 | 1.00% | 0.25% | 0.25% | 9.00% | 0.00% | 49% | 63% | 42% | 55% | 41% | 53% | 48% | 62% | 44% | 57% | 44% | 44% | 44% | 44% |
| 3209 | 9.00% | 0.25% | 0.25% | 9.00% | 0.00% | 45% | 58% | 40% | 52% | 36% | 47% | 45% | 59% | 41% | 53% | 40% | 40% | 41% | 41% |
| 3210 | 0.00% | 1.00% | 0.25% | 9.00% | 0.00% | 48% | 62% | 43% | 56% | 40% | 52% | 49% | 64% | 47% | 61% | 44% | 44% | 45% | 45% |
| 3211 | 0.25% | 1.00% | 0.25% | 9.00% | 0.00% | 50% | 64% | 44% | 57% | 42% | 55% | 50% | 65% | 48% | 62% | 45% | 45% | 47% | 47% |
| 3212 | 1.00% | 1.00% | 0.25% | 9.00% | 0.00% | 52% | 67% | 45% | 59% | 45% | 59% | 52% | 68% | 50% | 65% | 47% | 47% | 49% | 49% |
| 3213 | 0.25% | 9.00% | 0.25% | 9.00% | 0.00% | 54% | 70% | 48% | 62% | 46% | 60% | 53% | 69% | 54% | 70% | 49% | 49% | 51% | 51% |
| 3214 | 0.25% | 0.00% | 1.00% | 9.00% | 0.00% | 50% | 65% | 45% | 59% | 37% | 48% | 49% | 64% | 47% | 61% | 44% | 44% | 44% | 44% |
| 3215 | 1.00% | 0.25% | 1.00% | 9.00% | 0.00% | 55% | 72% | 50% | 65% | 45% | 59% | 54% | 70% | 52% | 68% | 50% | 50% | 50% | 50% |
| 3216 | 9.00% | 0.25% | 1.00% | 9.00% | 0.00% | 51% | 66% | 48% | 62% | 40% | 52% | 51% | 66% | 49% | 64% | 46% | 46% | 47% | 47% |
| 3217 | 0.00% | 1.00% | 1.00% | 9.00% | 0.00% | 54% | 70% | 51% | 66% | 44% | 57% | 55% | 72% | 55% | 72% | 50% | 50% | 51% | 51% |
| 3218 | 0.25% | 1.00% | 1.00% | 9.00% | 0.00% | 56% | 73% | 52% | 68% | 46% | 60% | 56% | 73% | 56% | 73% | 51% | 51% | 53% | 53% |
| 3219 | 1.00% | 1.00% | 1.00% | 9.00% | 0.00% | 58% | 75% | 53% | 69% | 49% | 64% | 58% | 75% | 58% | 75% | 53% | 53% | 55% | 55% |
| 3220 | 0.25% | 0.25% | 9.00% | 9.00% | 0.00% | 64% | 83% | 62% | 81% | 50% | 65% | 62% | 81% | 64% | 83% | 59% | 59% | 59% | 59% |
| 3221 | 0.25% | 0.25% | 0.00% | 0.00% | 0.25% | 12% | 16% | 12% | 16% | 14% | 18% | 12% | 16% | 12% | 16% | 13% | 13% | 13% | 13% |
| 3222 | 1.00% | 0.25% | 0.00% | 0.00% | 0.25% | 14% | 18% | 13% | 17% | 17% | 22% | 14% | 18% | 14% | 18% | 15% | 15% | 15% | 15% |
| 3223 | 0.25% | 1.00% | 0.00% | 0.00% | 0.25% | 15% | 20% | 15% | 20% | 18% | 23% | 16% | 21% | 18% | 23% | 16% | 16% | 17% | 17% |
| 3224 | 1.00% | 1.00% | 0.00% | 0.00% | 0.25% | 17% | 22% | 16% | 21% | 21% | 27% | 18% | 23% | 20% | 26% | 18% | 18% | 20% | 20% |
| 3225 | 0.25% | 0.00% | 0.25% | 0.00% | 0.25% | 14% | 18% | 12% | 16% | 12% | 16% | 12% | 16% | 12% | 16% | 13% | 13% | 12% | 12% |
| 3226 | 1.00% | 0.00% | 0.25% | 0.00% | 0.25% | 16% | 20% | 13% | 17% | 15% | 20% | 14% | 18% | 14% | 18% | 15% | 15% | 14% | 14% |
| 3227 | 0.00% | 0.25% | 0.25% | 0.00% | 0.25% | 15% | 19% | 15% | 20% | 15% | 20% | 14% | 18% | 14% | 18% | 15% | 15% | 14% | 14% |
| 3228 | 0.25% | 0.25% | 0.25% | 0.00% | 0.25% | 17% | 21% | 16% | 21% | 17% | 22% | 15% | 20% | 15% | 20% | 17% | 17% | 16% | 16% |
| 3229 | 0.00% | 1.00% | 0.25% | 0.00% | 0.25% | 18% | 23% | 18% | 23% | 19% | 25% | 18% | 23% | 20% | 26% | 18% | 18% | 19% | 19% |
| 3230 | 1.00% | 1.00% | 0.25% | 0.00% | 0.25% | 22% | 28% | 20% | 26% | 24% | 31% | 21% | 27% | 23% | 30% | 22% | 22% | 23% | 23% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3231 | 1.00% | 9.00% | 0.25% | 0.00% | 0.25% | 26% | 33% | 24% | 31% | 28% | 36% | 24% | 31% | 29% | 38% | 26% | 26% | 27% | 27% |
| 3232 | 0.25% | 0.00% | 1.00% | 0.00% | 0.25% | 20% | 26% | 20% | 26% | 16% | 21% | 18% | 23% | 20% | 26% | 19% | 19% | 18% | 18% |
| 3233 | 1.00% | 0.00% | 1.00% | 0.00% | 0.25% | 22% | 29% | 21% | 27% | 19% | 25% | 20% | 26% | 22% | 29% | 21% | 21% | 20% | 20% |
| 3234 | 0.00% | 0.25% | 1.00% | 0.00% | 0.25% | 21% | 27% | 23% | 30% | 19% | 25% | 20% | 26% | 22% | 29% | 21% | 21% | 20% | 20% |
| 3235 | 1.00% | 0.25% | 1.00% | 0.00% | 0.25% | 25% | 33% | 25% | 33% | 24% | 31% | 23% | 30% | 25% | 33% | 25% | 25% | 24% | 24% |
| 3236 | 0.00% | 1.00% | 1.00% | 0.00% | 0.25% | 24% | 31% | 26% | 34% | 23% | 30% | 24% | 31% | 28% | 36% | 24% | 24% | 25% | 25% |
| 3237 | 0.25% | 1.00% | 1.00% | 0.00% | 0.25% | 26% | 34% | 27% | 35% | 25% | 33% | 25% | 33% | 29% | 38% | 26% | 26% | 26% | 26% |
| 3238 | 1.00% | 1.00% | 1.00% | 0.00% | 0.25% | 28% | 36% | 28% | 36% | 28% | 36% | 27% | 35% | 31% | 40% | 28% | 28% | 29% | 29% |
| 3239 | 9.00% | 1.00% | 1.00% | 0.00% | 0.25% | 24% | 31% | 26% | 34% | 23% | 30% | 24% | 31% | 28% | 36% | 24% | 24% | 25% | 25% |
| 3240 | 1.00% | 9.00% | 1.00% | 0.00% | 0.25% | 32% | 42% | 32% | 42% | 32% | 42% | 30% | 39% | 37% | 48% | 32% | 32% | 33% | 33% |
| 3241 | 0.25% | 0.00% | 9.00% | 0.00% | 0.25% | 31% | 40% | 33% | 43% | 24% | 31% | 28% | 36% | 34% | 44% | 29% | 29% | 29% | 29% |
| 3242 | 0.00% | 0.25% | 9.00% | 0.00% | 0.25% | 32% | 42% | 36% | 47% | 27% | 35% | 30% | 39% | 36% | 47% | 32% | 32% | 31% | 31% |
| 3243 | 0.25% | 0.25% | 9.00% | 0.00% | 0.25% | 34% | 44% | 37% | 48% | 29% | 38% | 31% | 40% | 37% | 48% | 33% | 33% | 32% | 32% |
| 3244 | 1.00% | 0.25% | 9.00% | 0.00% | 0.25% | 36% | 47% | 38% | 49% | 32% | 42% | 33% | 43% | 39% | 51% | 35% | 35% | 35% | 35% |
| 3245 | 0.25% | 1.00% | 9.00% | 0.00% | 0.25% | 37% | 48% | 40% | 52% | 33% | 43% | 35% | 46% | 43% | 56% | 37% | 37% | 37% | 37% |
| 3246 | 0.25% | 0.00% | 0.00% | 0.25% | 0.25% | 16% | 21% | 13% | 17% | 14% | 18% | 19% | 25% | 15% | 20% | 14% | 14% | 16% | 16% |
| 3247 | 1.00% | 0.00% | 0.00% | 0.25% | 0.25% | 18% | 23% | 14% | 18% | 17% | 22% | 21% | 27% | 17% | 22% | 16% | 16% | 18% | 18% |
| 3248 | 0.00% | 0.25% | 0.00% | 0.25% | 0.25% | 17% | 22% | 16% | 21% | 17% | 22% | 21% | 27% | 17% | 22% | 17% | 17% | 18% | 18% |
| 3249 | 0.25% | 0.25% | 0.00% | 0.25% | 0.25% | 19% | 25% | 17% | 22% | 19% | 25% | 22% | 29% | 18% | 23% | 18% | 18% | 20% | 20% |
| 3250 | 9.00% | 0.25% | 0.00% | 0.25% | 0.25% | 17% | 22% | 16% | 21% | 17% | 22% | 21% | 27% | 17% | 22% | 17% | 17% | 18% | 18% |
| 3251 | 1.00% | 1.00% | 0.00% | 0.25% | 0.25% | 24% | 31% | 21% | 27% | 26% | 34% | 28% | 36% | 26% | 34% | 24% | 24% | 27% | 27% |
| 3252 | 1.00% | 9.00% | 0.00% | 0.25% | 0.25% | 28% | 36% | 25% | 33% | 30% | 39% | 31% | 40% | 32% | 42% | 28% | 28% | 31% | 31% |
| 3253 | 0.00% | 0.00% | 0.25% | 0.25% | 0.25% | 19% | 24% | 16% | 21% | 15% | 20% | 21% | 27% | 17% | 22% | 17% | 17% | 18% | 18% |
| 3254 | 0.25% | 0.00% | 0.25% | 0.25% | 0.25% | 21% | 27% | 17% | 22% | 17% | 22% | 22% | 29% | 18% | 23% | 18% | 18% | 19% | 19% |
| 3255 | 0.00% | 0.25% | 0.25% | 0.25% | 0.25% | 22% | 28% | 20% | 26% | 20% | 26% | 24% | 31% | 20% | 26% | 21% | 21% | 21% | 21% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3256 | 0.25% | 0.25% | 0.25% | 0.25% | 0.25% | 24% | 31% | 21% | 27% | 22% | 29% | 25% | 33% | 21% | 27% | 22% | 22% | 23% | 23% |
| 3257 | 1.00% | 0.25% | 0.25% | 0.25% | 0.25% | 26% | 33% | 22% | 29% | 25% | 33% | 27% | 35% | 23% | 30% | 24% | 24% | 25% | 25% |
| 3258 | 9.00% | 0.25% | 0.25% | 0.25% | 0.25% | 22% | 28% | 20% | 26% | 20% | 26% | 24% | 31% | 20% | 26% | 21% | 21% | 21% | 21% |
| 3259 | 0.25% | 1.00% | 0.25% | 0.25% | 0.25% | 27% | 34% | 24% | 31% | 26% | 34% | 29% | 38% | 27% | 35% | 26% | 26% | 27% | 27% |
| 3260 | 9.00% | 1.00% | 0.25% | 0.25% | 0.25% | 25% | 32% | 23% | 30% | 24% | 31% | 28% | 36% | 26% | 34% | 24% | 24% | 26% | 26% |
| 3261 | 0.25% | 9.00% | 0.25% | 0.25% | 0.25% | 31% | 40% | 28% | 36% | 30% | 39% | 32% | 42% | 33% | 43% | 30% | 30% | 32% | 32% |
| 3262 | 1.00% | 9.00% | 0.25% | 0.25% | 0.25% | 33% | 42% | 29% | 38% | 33% | 43% | 34% | 44% | 35% | 46% | 32% | 32% | 34% | 34% |
| 3263 | 9.00% | 9.00% | 0.25% | 0.25% | 0.25% | 29% | 37% | 27% | 35% | 28% | 36% | 31% | 40% | 32% | 42% | 28% | 28% | 30% | 30% |
| 3264 | 0.00% | 0.00% | 1.00% | 0.25% | 0.25% | 25% | 33% | 24% | 31% | 19% | 25% | 27% | 35% | 25% | 33% | 23% | 23% | 24% | 24% |
| 3265 | 1.00% | 0.00% | 1.00% | 0.25% | 0.25% | 29% | 38% | 26% | 34% | 24% | 31% | 30% | 39% | 28% | 36% | 26% | 26% | 27% | 27% |
| 3266 | 0.00% | 0.25% | 1.00% | 0.25% | 0.25% | 28% | 36% | 28% | 36% | 24% | 31% | 30% | 39% | 28% | 36% | 27% | 27% | 27% | 27% |
| 3267 | 0.25% | 0.25% | 1.00% | 0.25% | 0.25% | 30% | 39% | 29% | 38% | 26% | 34% | 31% | 40% | 29% | 38% | 28% | 28% | 29% | 29% |
| 3268 | 1.00% | 0.25% | 1.00% | 0.25% | 0.25% | 32% | 42% | 30% | 39% | 29% | 38% | 33% | 43% | 31% | 40% | 30% | 30% | 31% | 31% |
| 3269 | 9.00% | 0.25% | 1.00% | 0.25% | 0.25% | 28% | 36% | 28% | 36% | 24% | 31% | 30% | 39% | 28% | 36% | 27% | 27% | 27% | 27% |
| 3270 | 0.00% | 1.00% | 1.00% | 0.25% | 0.25% | 31% | 40% | 31% | 40% | 28% | 36% | 34% | 44% | 34% | 44% | 30% | 30% | 32% | 32% |
| 3271 | 0.25% | 1.00% | 1.00% | 0.25% | 0.25% | 33% | 43% | 32% | 42% | 30% | 39% | 35% | 46% | 35% | 46% | 32% | 32% | 33% | 33% |
| 3272 | 1.00% | 1.00% | 1.00% | 0.25% | 0.25% | 35% | 46% | 33% | 43% | 33% | 43% | 37% | 48% | 37% | 48% | 34% | 34% | 36% | 36% |
| 3273 | 9.00% | 1.00% | 1.00% | 0.25% | 0.25% | 31% | 40% | 31% | 40% | 28% | 36% | 34% | 44% | 34% | 44% | 30% | 30% | 32% | 32% |
| 3274 | 0.00% | 9.00% | 1.00% | 0.25% | 0.25% | 35% | 46% | 35% | 46% | 32% | 42% | 37% | 48% | 40% | 52% | 34% | 34% | 36% | 36% |
| 3275 | 0.25% | 9.00% | 1.00% | 0.25% | 0.25% | 37% | 48% | 36% | 47% | 34% | 44% | 38% | 49% | 41% | 53% | 36% | 36% | 38% | 38% |
| 3276 | 1.00% | 9.00% | 1.00% | 0.25% | 0.25% | 39% | 51% | 37% | 48% | 37% | 48% | 40% | 52% | 43% | 56% | 38% | 38% | 40% | 40% |
| 3277 | 0.25% | 0.25% | 9.00% | 0.25% | 0.25% | 41% | 53% | 42% | 55% | 34% | 44% | 41% | 53% | 43% | 56% | 39% | 39% | 39% | 39% |
| 3278 | 1.00% | 0.25% | 9.00% | 0.25% | 0.25% | 43% | 56% | 43% | 56% | 37% | 48% | 43% | 56% | 45% | 59% | 41% | 41% | 42% | 42% |
| 3279 | 9.00% | 0.25% | 9.00% | 0.25% | 0.25% | 39% | 51% | 41% | 53% | 32% | 42% | 40% | 52% | 42% | 55% | 37% | 37% | 38% | 38% |
| 3280 | 0.00% | 1.00% | 9.00% | 0.25% | 0.25% | 42% | 55% | 44% | 57% | 36% | 47% | 44% | 57% | 48% | 62% | 41% | 41% | 43% | 43% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3281 | 0.25% | 1.00% | 9.00% | 0.25% | 0.25% | 44% | 57% | 45% | 59% | 38% | 49% | 45% | 59% | 49% | 64% | 42% | 42% | 44% | 44% |
| 3282 | 9.00% | 1.00% | 9.00% | 0.25% | 0.25% | 42% | 55% | 44% | 57% | 36% | 47% | 44% | 57% | 48% | 62% | 41% | 41% | 43% | 43% |
| 3283 | 1.00% | 9.00% | 9.00% | 0.25% | 0.25% | 50% | 65% | 50% | 65% | 45% | 59% | 50% | 65% | 57% | 74% | 48% | 48% | 51% | 51% |
| 3284 | 0.25% | 0.00% | 0.00% | 1.00% | 0.25% | 24% | 31% | 20% | 26% | 21% | 27% | 26% | 34% | 24% | 31% | 22% | 22% | 24% | 24% |
| 3285 | 1.00% | 0.25% | 0.00% | 1.00% | 0.25% | 29% | 38% | 25% | 33% | 29% | 38% | 31% | 40% | 29% | 38% | 28% | 28% | 30% | 30% |
| 3286 | 0.00% | 1.00% | 0.00% | 1.00% | 0.25% | 28% | 36% | 26% | 34% | 28% | 36% | 32% | 42% | 32% | 42% | 27% | 27% | 31% | 31% |
| 3287 | 0.25% | 1.00% | 0.00% | 1.00% | 0.25% | 30% | 39% | 27% | 35% | 30% | 39% | 33% | 43% | 33% | 43% | 29% | 29% | 32% | 32% |
| 3288 | 1.00% | 1.00% | 0.00% | 1.00% | 0.25% | 32% | 42% | 28% | 36% | 33% | 43% | 35% | 46% | 35% | 46% | 31% | 31% | 34% | 34% |
| 3289 | 0.00% | 0.00% | 0.25% | 1.00% | 0.25% | 27% | 34% | 23% | 30% | 22% | 29% | 28% | 36% | 26% | 34% | 24% | 24% | 25% | 25% |
| 3290 | 1.00% | 0.00% | 0.25% | 1.00% | 0.25% | 31% | 40% | 25% | 33% | 27% | 35% | 31% | 40% | 29% | 38% | 28% | 28% | 29% | 29% |
| 3291 | 0.25% | 0.25% | 0.25% | 1.00% | 0.25% | 32% | 41% | 28% | 36% | 29% | 38% | 32% | 42% | 30% | 39% | 30% | 30% | 30% | 30% |
| 3292 | 1.00% | 0.25% | 0.25% | 1.00% | 0.25% | 34% | 44% | 29% | 38% | 32% | 42% | 34% | 44% | 32% | 42% | 32% | 32% | 33% | 33% |
| 3293 | 9.00% | 0.25% | 0.25% | 1.00% | 0.25% | 30% | 38% | 27% | 35% | 27% | 35% | 31% | 40% | 29% | 38% | 28% | 28% | 29% | 29% |
| 3294 | 0.00% | 1.00% | 0.25% | 1.00% | 0.25% | 33% | 42% | 30% | 39% | 31% | 40% | 35% | 46% | 35% | 46% | 31% | 31% | 34% | 34% |
| 3295 | 0.25% | 1.00% | 0.25% | 1.00% | 0.25% | 35% | 45% | 31% | 40% | 33% | 43% | 36% | 47% | 36% | 47% | 33% | 33% | 35% | 35% |
| 3296 | 1.00% | 1.00% | 0.25% | 1.00% | 0.25% | 37% | 47% | 32% | 42% | 36% | 47% | 38% | 49% | 38% | 49% | 35% | 35% | 37% | 37% |
| 3297 | 9.00% | 1.00% | 0.25% | 1.00% | 0.25% | 33% | 42% | 30% | 39% | 31% | 40% | 35% | 46% | 35% | 46% | 31% | 31% | 34% | 34% |
| 3298 | 0.25% | 9.00% | 0.25% | 1.00% | 0.25% | 39% | 50% | 35% | 46% | 37% | 48% | 39% | 51% | 42% | 55% | 37% | 37% | 39% | 39% |
| 3299 | 1.00% | 9.00% | 0.25% | 1.00% | 0.25% | 41% | 53% | 36% | 47% | 40% | 52% | 41% | 53% | 44% | 57% | 39% | 39% | 42% | 42% |
| 3300 | 9.00% | 9.00% | 0.25% | 1.00% | 0.25% | 37% | 47% | 34% | 44% | 35% | 46% | 38% | 49% | 41% | 53% | 35% | 35% | 38% | 38% |
| 3301 | 0.00% | 0.00% | 1.00% | 1.00% | 0.25% | 33% | 43% | 31% | 40% | 26% | 34% | 34% | 44% | 34% | 44% | 30% | 30% | 31% | 31% |
| 3302 | 0.25% | 0.00% | 1.00% | 1.00% | 0.25% | 35% | 46% | 32% | 42% | 28% | 36% | 35% | 46% | 35% | 46% | 32% | 32% | 33% | 33% |
| 3303 | 1.00% | 0.00% | 1.00% | 1.00% | 0.25% | 37% | 48% | 33% | 43% | 31% | 40% | 37% | 48% | 37% | 48% | 34% | 34% | 35% | 35% |
| 3304 | 0.00% | 0.25% | 1.00% | 1.00% | 0.25% | 36% | 47% | 35% | 46% | 31% | 40% | 37% | 48% | 37% | 48% | 34% | 34% | 35% | 35% |
| 3305 | 1.00% | 0.25% | 1.00% | 1.00% | 0.25% | 40% | 52% | 37% | 48% | 36% | 47% | 40% | 52% | 40% | 52% | 38% | 38% | 39% | 39% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3306 | 9.00% | 0.25% | 1.00% | 1.00% | 0.25% | 36% | 47% | 35% | 46% | 31% | 40% | 37% | 48% | 37% | 48% | 34% | 34% | 35% | 35% |
| 3307 | 0.00% | 1.00% | 1.00% | 1.00% | 0.25% | 39% | 51% | 38% | 49% | 35% | 46% | 41% | 53% | 43% | 56% | 37% | 37% | 40% | 40% |
| 3308 | 0.25% | 1.00% | 1.00% | 1.00% | 0.25% | 41% | 53% | 39% | 51% | 37% | 48% | 42% | 55% | 44% | 57% | 39% | 39% | 41% | 41% |
| 3309 | 1.00% | 1.00% | 1.00% | 1.00% | 0.25% | 43% | 56% | 40% | 52% | 40% | 52% | 44% | 57% | 46% | 60% | 41% | 41% | 43% | 43% |
| 3310 | 9.00% | 1.00% | 1.00% | 1.00% | 0.25% | 39% | 51% | 38% | 49% | 35% | 46% | 41% | 53% | 43% | 56% | 37% | 37% | 40% | 40% |
| 3311 | 0.00% | 9.00% | 1.00% | 1.00% | 0.25% | 43% | 56% | 42% | 55% | 39% | 51% | 44% | 57% | 49% | 64% | 41% | 41% | 44% | 44% |
| 3312 | 0.25% | 9.00% | 1.00% | 1.00% | 0.25% | 45% | 59% | 43% | 56% | 41% | 53% | 45% | 59% | 50% | 65% | 43% | 43% | 45% | 45% |
| 3313 | 1.00% | 9.00% | 1.00% | 1.00% | 0.25% | 47% | 61% | 44% | 57% | 44% | 57% | 47% | 61% | 52% | 68% | 45% | 45% | 48% | 48% |
| 3314 | 0.25% | 0.25% | 9.00% | 1.00% | 0.25% | 49% | 64% | 49% | 64% | 41% | 53% | 48% | 62% | 52% | 68% | 46% | 46% | 47% | 47% |
| 3315 | 1.00% | 0.25% | 9.00% | 1.00% | 0.25% | 51% | 66% | 50% | 65% | 44% | 57% | 50% | 65% | 54% | 70% | 48% | 48% | 49% | 49% |
| 3316 | 9.00% | 0.25% | 9.00% | 1.00% | 0.25% | 47% | 61% | 48% | 62% | 39% | 51% | 47% | 61% | 51% | 66% | 45% | 45% | 46% | 46% |
| 3317 | 0.25% | 1.00% | 9.00% | 1.00% | 0.25% | 52% | 68% | 52% | 68% | 45% | 59% | 52% | 68% | 58% | 75% | 50% | 50% | 52% | 52% |
| 3318 | 0.00% | 0.25% | 0.00% | 9.00% | 0.25% | 47% | 61% | 43% | 56% | 40% | 52% | 50% | 65% | 46% | 60% | 43% | 43% | 45% | 45% |
| 3319 | 0.00% | 0.00% | 0.25% | 9.00% | 0.25% | 49% | 63% | 43% | 56% | 38% | 49% | 50% | 65% | 46% | 60% | 43% | 43% | 45% | 45% |
| 3320 | 0.25% | 0.00% | 0.25% | 9.00% | 0.25% | 51% | 66% | 44% | 57% | 40% | 52% | 51% | 66% | 47% | 61% | 45% | 45% | 46% | 46% |
| 3321 | 0.00% | 0.25% | 0.25% | 9.00% | 0.25% | 52% | 67% | 47% | 61% | 43% | 56% | 53% | 69% | 49% | 64% | 47% | 47% | 48% | 48% |
| 3322 | 0.25% | 0.25% | 0.25% | 9.00% | 0.25% | 54% | 70% | 48% | 62% | 45% | 59% | 54% | 70% | 50% | 65% | 49% | 49% | 50% | 50% |
| 3323 | 1.00% | 0.25% | 0.25% | 9.00% | 0.25% | 56% | 72% | 49% | 64% | 48% | 62% | 56% | 73% | 52% | 68% | 51% | 51% | 52% | 52% |
| 3324 | 9.00% | 0.25% | 0.25% | 9.00% | 0.25% | 52% | 67% | 47% | 61% | 43% | 56% | 53% | 69% | 49% | 64% | 47% | 47% | 48% | 48% |
| 3325 | 0.00% | 1.00% | 0.25% | 9.00% | 0.25% | 55% | 71% | 50% | 65% | 47% | 61% | 57% | 74% | 55% | 72% | 51% | 51% | 53% | 53% |
| 3326 | 0.25% | 1.00% | 0.25% | 9.00% | 0.25% | 57% | 73% | 51% | 66% | 49% | 64% | 58% | 75% | 56% | 73% | 52% | 52% | 54% | 54% |
| 3327 | 1.00% | 1.00% | 0.25% | 9.00% | 0.25% | 59% | 76% | 52% | 68% | 52% | 68% | 60% | 78% | 58% | 75% | 54% | 54% | 57% | 57% |
| 3328 | 0.25% | 9.00% | 0.25% | 9.00% | 0.25% | 61% | 79% | 55% | 72% | 53% | 69% | 61% | 79% | 62% | 81% | 56% | 56% | 59% | 59% |
| 3329 | 0.25% | 0.00% | 1.00% | 9.00% | 0.25% | 57% | 74% | 52% | 68% | 44% | 57% | 57% | 74% | 55% | 72% | 51% | 51% | 52% | 52% |
| 3330 | 1.00% | 0.25% | 1.00% | 9.00% | 0.25% | 62% | 81% | 57% | 74% | 52% | 68% | 62% | 81% | 60% | 78% | 57% | 57% | 58% | 58% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3331 | 9.00% | 0.25% | 1.00% | 9.00% | 0.25% | 58% | 75% | 55% | 72% | 47% | 61% | 59% | 77% | 57% | 74% | 53% | 53% | 54% | 54% |
| 3332 | 0.00% | 1.00% | 1.00% | 9.00% | 0.25% | 61% | 79% | 58% | 75% | 51% | 66% | 63% | 82% | 63% | 82% | 57% | 57% | 59% | 59% |
| 3333 | 0.25% | 1.00% | 1.00% | 9.00% | 0.25% | 63% | 82% | 59% | 77% | 53% | 69% | 64% | 83% | 64% | 83% | 58% | 58% | 60% | 60% |
| 3334 | 1.00% | 1.00% | 1.00% | 9.00% | 0.25% | 65% | 85% | 60% | 78% | 56% | 73% | 66% | 86% | 66% | 86% | 60% | 60% | 63% | 63% |
| 3335 | 0.25% | 0.25% | 9.00% | 9.00% | 0.25% | 71% | 92% | 69% | 90% | 57% | 74% | 70% | 91% | 72% | 94% | 66% | 66% | 66% | 66% |
| 3336 | 0.25% | 0.25% | 0.00% | 0.00% | 1.00% | 20% | 26% | 21% | 27% | 23% | 30% | 18% | 23% | 23% | 30% | 21% | 21% | 21% | 21% |
| 3337 | 1.00% | 0.25% | 0.00% | 0.00% | 1.00% | 22% | 29% | 22% | 29% | 26% | 34% | 20% | 26% | 25% | 33% | 23% | 23% | 24% | 24% |
| 3338 | 0.25% | 1.00% | 0.00% | 0.00% | 1.00% | 23% | 30% | 24% | 31% | 27% | 35% | 22% | 29% | 29% | 38% | 25% | 25% | 26% | 26% |
| 3339 | 1.00% | 1.00% | 0.00% | 0.00% | 1.00% | 25% | 33% | 25% | 33% | 30% | 39% | 24% | 31% | 31% | 40% | 27% | 27% | 28% | 28% |
| 3340 | 0.25% | 0.00% | 0.25% | 0.00% | 1.00% | 22% | 28% | 21% | 27% | 21% | 27% | 18% | 23% | 23% | 30% | 21% | 21% | 21% | 21% |
| 3341 | 1.00% | 0.00% | 0.25% | 0.00% | 1.00% | 24% | 31% | 22% | 29% | 24% | 31% | 20% | 26% | 25% | 33% | 23% | 23% | 23% | 23% |
| 3342 | 0.00% | 0.25% | 0.25% | 0.00% | 1.00% | 23% | 29% | 24% | 31% | 24% | 31% | 20% | 26% | 25% | 33% | 24% | 24% | 23% | 23% |
| 3343 | 0.25% | 0.25% | 0.25% | 0.00% | 1.00% | 25% | 32% | 25% | 33% | 26% | 34% | 21% | 27% | 26% | 34% | 25% | 25% | 24% | 24% |
| 3344 | 0.00% | 1.00% | 0.25% | 0.00% | 1.00% | 26% | 33% | 27% | 35% | 28% | 36% | 24% | 31% | 31% | 40% | 27% | 27% | 28% | 28% |
| 3345 | 1.00% | 1.00% | 0.25% | 0.00% | 1.00% | 30% | 38% | 29% | 38% | 33% | 43% | 27% | 35% | 34% | 44% | 31% | 31% | 31% | 31% |
| 3346 | 1.00% | 9.00% | 0.25% | 0.00% | 1.00% | 34% | 44% | 33% | 43% | 37% | 48% | 30% | 39% | 40% | 52% | 35% | 35% | 36% | 36% |
| 3347 | 0.25% | 0.00% | 1.00% | 0.00% | 1.00% | 28% | 36% | 29% | 38% | 25% | 33% | 24% | 31% | 31% | 40% | 27% | 27% | 27% | 27% |
| 3348 | 1.00% | 0.00% | 1.00% | 0.00% | 1.00% | 30% | 39% | 30% | 39% | 28% | 36% | 26% | 34% | 33% | 43% | 29% | 29% | 29% | 29% |
| 3349 | 0.00% | 0.25% | 1.00% | 0.00% | 1.00% | 29% | 38% | 32% | 42% | 28% | 36% | 26% | 34% | 33% | 43% | 30% | 30% | 29% | 29% |
| 3350 | 1.00% | 0.25% | 1.00% | 0.00% | 1.00% | 33% | 43% | 34% | 44% | 33% | 43% | 29% | 38% | 36% | 47% | 33% | 33% | 33% | 33% |
| 3351 | 0.00% | 1.00% | 1.00% | 0.00% | 1.00% | 32% | 42% | 35% | 46% | 32% | 42% | 30% | 39% | 39% | 51% | 33% | 33% | 34% | 34% |
| 3352 | 0.25% | 1.00% | 1.00% | 0.00% | 1.00% | 34% | 44% | 36% | 47% | 34% | 44% | 31% | 40% | 40% | 52% | 35% | 35% | 35% | 35% |
| 3353 | 1.00% | 1.00% | 1.00% | 0.00% | 1.00% | 36% | 47% | 37% | 48% | 37% | 48% | 33% | 43% | 42% | 55% | 37% | 37% | 37% | 37% |
| 3354 | 9.00% | 1.00% | 1.00% | 0.00% | 1.00% | 32% | 42% | 35% | 46% | 32% | 42% | 30% | 39% | 39% | 51% | 33% | 33% | 34% | 34% |
| 3355 | 1.00% | 9.00% | 1.00% | 0.00% | 1.00% | 40% | 52% | 41% | 53% | 41% | 53% | 36% | 47% | 48% | 62% | 41% | 41% | 42% | 42% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3356 | 0.25% | 0.00% | 9.00% | 0.00% | 1.00% | 39% | 51% | 42% | 55% | 33% | 43% | 34% | 44% | 45% | 59% | 38% | 38% | 37% | 37% |
| 3357 | 0.00% | 0.25% | 9.00% | 0.00% | 1.00% | 40% | 52% | 45% | 59% | 36% | 47% | 36% | 47% | 47% | 61% | 40% | 40% | 40% | 40% |
| 3358 | 0.25% | 0.25% | 9.00% | 0.00% | 1.00% | 42% | 55% | 46% | 60% | 38% | 49% | 37% | 48% | 48% | 62% | 42% | 42% | 41% | 41% |
| 3359 | 1.00% | 0.25% | 9.00% | 0.00% | 1.00% | 44% | 57% | 47% | 61% | 41% | 53% | 39% | 51% | 50% | 65% | 44% | 44% | 43% | 43% |
| 3360 | 0.25% | 1.00% | 9.00% | 0.00% | 1.00% | 45% | 59% | 49% | 64% | 42% | 55% | 41% | 53% | 54% | 70% | 45% | 45% | 46% | 46% |
| 3361 | 0.25% | 0.00% | 0.00% | 0.25% | 1.00% | 24% | 31% | 22% | 29% | 23% | 30% | 25% | 33% | 26% | 34% | 23% | 23% | 25% | 25% |
| 3362 | 1.00% | 0.00% | 0.00% | 0.25% | 1.00% | 26% | 34% | 23% | 30% | 26% | 34% | 27% | 35% | 28% | 36% | 25% | 25% | 27% | 27% |
| 3363 | 0.00% | 0.25% | 0.00% | 0.25% | 1.00% | 25% | 33% | 25% | 33% | 26% | 34% | 27% | 35% | 28% | 36% | 25% | 25% | 27% | 27% |
| 3364 | 0.25% | 0.25% | 0.00% | 0.25% | 1.00% | 27% | 35% | 26% | 34% | 28% | 36% | 28% | 36% | 29% | 38% | 27% | 27% | 28% | 28% |
| 3365 | 9.00% | 0.25% | 0.00% | 0.25% | 1.00% | 25% | 33% | 25% | 33% | 26% | 34% | 27% | 35% | 28% | 36% | 25% | 25% | 27% | 27% |
| 3366 | 1.00% | 1.00% | 0.00% | 0.25% | 1.00% | 32% | 42% | 30% | 39% | 35% | 46% | 34% | 44% | 37% | 48% | 32% | 32% | 35% | 35% |
| 3367 | 1.00% | 9.00% | 0.00% | 0.25% | 1.00% | 36% | 47% | 34% | 44% | 39% | 51% | 37% | 48% | 43% | 56% | 36% | 36% | 40% | 40% |
| 3368 | 0.00% | 0.00% | 0.25% | 0.25% | 1.00% | 27% | 34% | 25% | 33% | 24% | 31% | 27% | 35% | 28% | 36% | 25% | 25% | 26% | 26% |
| 3369 | 0.25% | 0.00% | 0.25% | 0.25% | 1.00% | 29% | 37% | 26% | 34% | 26% | 34% | 28% | 36% | 29% | 38% | 27% | 27% | 28% | 28% |
| 3370 | 0.00% | 0.25% | 0.25% | 0.25% | 1.00% | 30% | 38% | 29% | 38% | 29% | 38% | 30% | 39% | 31% | 40% | 29% | 29% | 30% | 30% |
| 3371 | 0.25% | 0.25% | 0.25% | 0.25% | 1.00% | 32% | 41% | 30% | 39% | 31% | 40% | 31% | 40% | 32% | 42% | 31% | 31% | 31% | 31% |
| 3372 | 1.00% | 0.25% | 0.25% | 0.25% | 1.00% | 34% | 44% | 31% | 40% | 34% | 44% | 33% | 43% | 34% | 44% | 33% | 33% | 34% | 34% |
| 3373 | 9.00% | 0.25% | 0.25% | 0.25% | 1.00% | 30% | 38% | 29% | 38% | 29% | 38% | 30% | 39% | 31% | 40% | 29% | 29% | 30% | 30% |
| 3374 | 0.25% | 1.00% | 0.25% | 0.25% | 1.00% | 35% | 45% | 33% | 43% | 35% | 46% | 35% | 46% | 38% | 49% | 34% | 34% | 36% | 36% |
| 3375 | 9.00% | 1.00% | 0.25% | 0.25% | 1.00% | 33% | 42% | 32% | 42% | 33% | 43% | 34% | 44% | 37% | 48% | 33% | 33% | 35% | 35% |
| 3376 | 0.25% | 9.00% | 0.25% | 0.25% | 1.00% | 39% | 50% | 37% | 48% | 39% | 51% | 38% | 49% | 44% | 57% | 38% | 38% | 40% | 40% |
| 3377 | 1.00% | 9.00% | 0.25% | 0.25% | 1.00% | 41% | 53% | 38% | 49% | 42% | 55% | 40% | 52% | 46% | 60% | 40% | 40% | 43% | 43% |
| 3378 | 9.00% | 9.00% | 0.25% | 0.25% | 1.00% | 37% | 47% | 36% | 47% | 37% | 48% | 37% | 48% | 43% | 56% | 37% | 37% | 39% | 39% |
| 3379 | 0.00% | 0.00% | 1.00% | 0.25% | 1.00% | 33% | 43% | 33% | 43% | 28% | 36% | 33% | 43% | 36% | 47% | 31% | 31% | 32% | 32% |
| 3380 | 1.00% | 0.00% | 1.00% | 0.25% | 1.00% | 37% | 48% | 35% | 46% | 33% | 43% | 36% | 47% | 39% | 51% | 35% | 35% | 36% | 36% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3381 | 0.00% | 0.25% | 1.00% | 0.25% | 1.00% | 36% | 47% | 37% | 48% | 33% | 43% | 36% | 47% | 39% | 51% | 35% | 35% | 36% | 36% |
| 3382 | 0.25% | 0.25% | 1.00% | 0.25% | 1.00% | 38% | 49% | 38% | 49% | 35% | 46% | 37% | 48% | 40% | 52% | 37% | 37% | 37% | 37% |
| 3383 | 1.00% | 0.25% | 1.00% | 0.25% | 1.00% | 40% | 52% | 39% | 51% | 38% | 49% | 39% | 51% | 42% | 55% | 39% | 39% | 40% | 40% |
| 3384 | 9.00% | 0.25% | 1.00% | 0.25% | 1.00% | 36% | 47% | 37% | 48% | 33% | 43% | 36% | 47% | 39% | 51% | 35% | 35% | 36% | 36% |
| 3385 | 0.00% | 1.00% | 1.00% | 0.25% | 1.00% | 39% | 51% | 40% | 52% | 37% | 48% | 40% | 52% | 45% | 59% | 39% | 39% | 41% | 41% |
| 3386 | 0.25% | 1.00% | 1.00% | 0.25% | 1.00% | 41% | 53% | 41% | 53% | 39% | 51% | 41% | 53% | 46% | 60% | 40% | 40% | 42% | 42% |
| 3387 | 1.00% | 1.00% | 1.00% | 0.25% | 1.00% | 43% | 56% | 42% | 55% | 42% | 55% | 43% | 56% | 48% | 62% | 42% | 42% | 44% | 44% |
| 3388 | 9.00% | 1.00% | 1.00% | 0.25% | 1.00% | 39% | 51% | 40% | 52% | 37% | 48% | 40% | 52% | 45% | 59% | 39% | 39% | 41% | 41% |
| 3389 | 0.00% | 9.00% | 1.00% | 0.25% | 1.00% | 43% | 56% | 44% | 57% | 41% | 53% | 43% | 56% | 51% | 66% | 43% | 43% | 45% | 45% |
| 3390 | 0.25% | 9.00% | 1.00% | 0.25% | 1.00% | 45% | 59% | 45% | 59% | 43% | 56% | 44% | 57% | 52% | 68% | 44% | 44% | 46% | 46% |
| 3391 | 1.00% | 9.00% | 1.00% | 0.25% | 1.00% | 47% | 61% | 46% | 60% | 46% | 60% | 46% | 60% | 54% | 70% | 46% | 46% | 49% | 49% |
| 3392 | 0.25% | 0.25% | 9.00% | 0.25% | 1.00% | 49% | 64% | 51% | 66% | 43% | 56% | 47% | 61% | 54% | 70% | 48% | 48% | 48% | 48% |
| 3393 | 1.00% | 0.25% | 9.00% | 0.25% | 1.00% | 51% | 66% | 52% | 68% | 46% | 60% | 49% | 64% | 56% | 73% | 50% | 50% | 50% | 50% |
| 3394 | 9.00% | 0.25% | 9.00% | 0.25% | 1.00% | 47% | 61% | 50% | 65% | 41% | 53% | 46% | 60% | 53% | 69% | 46% | 46% | 47% | 47% |
| 3395 | 0.00% | 1.00% | 9.00% | 0.25% | 1.00% | 50% | 65% | 53% | 69% | 45% | 59% | 50% | 65% | 59% | 77% | 49% | 49% | 51% | 51% |
| 3396 | 0.25% | 1.00% | 9.00% | 0.25% | 1.00% | 52% | 68% | 54% | 70% | 47% | 61% | 51% | 66% | 60% | 78% | 51% | 51% | 53% | 53% |
| 3397 | 9.00% | 1.00% | 9.00% | 0.25% | 1.00% | 50% | 65% | 53% | 69% | 45% | 59% | 50% | 65% | 59% | 77% | 49% | 49% | 51% | 51% |
| 3398 | 1.00% | 9.00% | 9.00% | 0.25% | 1.00% | 58% | 75% | 59% | 77% | 54% | 70% | 56% | 73% | 68% | 88% | 57% | 57% | 59% | 59% |
| 3399 | 0.25% | 0.00% | 0.00% | 1.00% | 1.00% | 32% | 42% | 29% | 38% | 30% | 39% | 32% | 42% | 35% | 46% | 30% | 30% | 32% | 32% |
| 3400 | 1.00% | 0.25% | 0.00% | 1.00% | 1.00% | 37% | 48% | 34% | 44% | 38% | 49% | 37% | 48% | 40% | 52% | 36% | 36% | 38% | 38% |
| 3401 | 0.00% | 1.00% | 0.00% | 1.00% | 1.00% | 36% | 47% | 35% | 46% | 37% | 48% | 38% | 49% | 43% | 56% | 36% | 36% | 39% | 39% |
| 3402 | 0.25% | 1.00% | 0.00% | 1.00% | 1.00% | 38% | 49% | 36% | 47% | 39% | 51% | 39% | 51% | 44% | 57% | 38% | 38% | 41% | 41% |
| 3403 | 1.00% | 1.00% | 0.00% | 1.00% | 1.00% | 40% | 52% | 37% | 48% | 42% | 55% | 41% | 53% | 46% | 60% | 40% | 40% | 43% | 43% |
| 3404 | 0.00% | 0.00% | 0.25% | 1.00% | 1.00% | 35% | 45% | 32% | 42% | 31% | 40% | 34% | 44% | 37% | 48% | 33% | 33% | 34% | 34% |
| 3405 | 1.00% | 0.00% | 0.25% | 1.00% | 1.00% | 39% | 50% | 34% | 44% | 36% | 47% | 37% | 48% | 40% | 52% | 36% | 36% | 38% | 38% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3406 | 0.25% | 0.25% | 0.25% | 1.00% | 1.00% | 40% | 51% | 37% | 48% | 38% | 49% | 38% | 49% | 41% | 53% | 38% | 38% | 39% | 39% |
| 3407 | 1.00% | 0.25% | 0.25% | 1.00% | 1.00% | 42% | 54% | 38% | 49% | 41% | 53% | 40% | 52% | 43% | 56% | 40% | 40% | 41% | 41% |
| 3408 | 9.00% | 0.25% | 0.25% | 1.00% | 1.00% | 38% | 49% | 36% | 47% | 36% | 47% | 37% | 48% | 40% | 52% | 37% | 37% | 38% | 38% |
| 3409 | 0.00% | 1.00% | 0.25% | 1.00% | 1.00% | 41% | 53% | 39% | 51% | 40% | 52% | 41% | 53% | 46% | 60% | 40% | 40% | 42% | 42% |
| 3410 | 0.25% | 1.00% | 0.25% | 1.00% | 1.00% | 43% | 55% | 40% | 52% | 42% | 55% | 42% | 55% | 47% | 61% | 42% | 42% | 44% | 44% |
| 3411 | 1.00% | 1.00% | 0.25% | 1.00% | 1.00% | 45% | 58% | 41% | 53% | 45% | 59% | 44% | 57% | 49% | 64% | 44% | 44% | 46% | 46% |
| 3412 | 9.00% | 1.00% | 0.25% | 1.00% | 1.00% | 41% | 53% | 39% | 51% | 40% | 52% | 41% | 53% | 46% | 60% | 40% | 40% | 42% | 42% |
| 3413 | 0.25% | 9.00% | 0.25% | 1.00% | 1.00% | 47% | 60% | 44% | 57% | 46% | 60% | 45% | 59% | 53% | 69% | 46% | 46% | 48% | 48% |
| 3414 | 1.00% | 9.00% | 0.25% | 1.00% | 1.00% | 49% | 63% | 45% | 59% | 49% | 64% | 47% | 61% | 55% | 72% | 48% | 48% | 50% | 50% |
| 3415 | 9.00% | 9.00% | 0.25% | 1.00% | 1.00% | 45% | 58% | 43% | 56% | 44% | 57% | 44% | 57% | 52% | 68% | 44% | 44% | 47% | 47% |
| 3416 | 0.00% | 0.00% | 1.00% | 1.00% | 1.00% | 41% | 53% | 40% | 52% | 35% | 46% | 40% | 52% | 45% | 59% | 39% | 39% | 40% | 40% |
| 3417 | 0.25% | 0.00% | 1.00% | 1.00% | 1.00% | 43% | 56% | 41% | 53% | 37% | 48% | 41% | 53% | 46% | 60% | 40% | 40% | 41% | 41% |
| 3418 | 1.00% | 0.00% | 1.00% | 1.00% | 1.00% | 45% | 59% | 42% | 55% | 40% | 52% | 43% | 56% | 48% | 62% | 42% | 42% | 44% | 44% |
| 3419 | 0.00% | 0.25% | 1.00% | 1.00% | 1.00% | 44% | 57% | 44% | 57% | 40% | 52% | 43% | 56% | 48% | 62% | 43% | 43% | 44% | 44% |
| 3420 | 1.00% | 0.25% | 1.00% | 1.00% | 1.00% | 48% | 62% | 46% | 60% | 45% | 59% | 46% | 60% | 51% | 66% | 46% | 46% | 47% | 47% |
| 3421 | 9.00% | 0.25% | 1.00% | 1.00% | 1.00% | 44% | 57% | 44% | 57% | 40% | 52% | 43% | 56% | 48% | 62% | 43% | 43% | 44% | 44% |
| 3422 | 0.00% | 1.00% | 1.00% | 1.00% | 1.00% | 47% | 61% | 47% | 61% | 44% | 57% | 47% | 61% | 54% | 70% | 46% | 46% | 48% | 48% |
| 3423 | 0.25% | 1.00% | 1.00% | 1.00% | 1.00% | 49% | 64% | 48% | 62% | 46% | 60% | 48% | 62% | 55% | 72% | 48% | 48% | 50% | 50% |
| 3424 | 1.00% | 1.00% | 1.00% | 1.00% | 1.00% | 51% | 66% | 49% | 64% | 49% | 64% | 50% | 65% | 57% | 74% | 50% | 50% | 52% | 52% |
| 3425 | 9.00% | 1.00% | 1.00% | 1.00% | 1.00% | 47% | 61% | 47% | 61% | 44% | 57% | 47% | 61% | 54% | 70% | 46% | 46% | 48% | 48% |
| 3426 | 0.00% | 9.00% | 1.00% | 1.00% | 1.00% | 51% | 66% | 51% | 66% | 48% | 62% | 50% | 65% | 60% | 78% | 50% | 50% | 53% | 53% |
| 3427 | 0.25% | 9.00% | 1.00% | 1.00% | 1.00% | 53% | 69% | 52% | 68% | 50% | 65% | 51% | 66% | 61% | 79% | 52% | 52% | 54% | 54% |
| 3428 | 1.00% | 9.00% | 1.00% | 1.00% | 1.00% | 55% | 72% | 53% | 69% | 53% | 69% | 53% | 69% | 63% | 82% | 54% | 54% | 56% | 56% |
| 3429 | 0.25% | 0.25% | 9.00% | 1.00% | 1.00% | 57% | 74% | 58% | 75% | 50% | 65% | 54% | 70% | 63% | 82% | 55% | 55% | 56% | 56% |
| 3430 | 1.00% | 0.25% | 9.00% | 1.00% | 1.00% | 59% | 77% | 59% | 77% | 53% | 69% | 56% | 73% | 65% | 85% | 57% | 57% | 58% | 58% |

Fig. 15

| Formula # | Delta Dodecalactone | Propyl Dihydrojasmolate | Apritone | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3431 | 9.00% | 0.25% | 9.00% | 1.00% | 1.00% | 55% | 72% | 57% | 74% | 48% | 62% | 53% | 69% | 62% | 81% | 53% | 53% | 54% | 54% |
| 3432 | 0.25% | 1.00% | 9.00% | 1.00% | 1.00% | 60% | 78% | 61% | 79% | 54% | 70% | 58% | 75% | 69% | 90% | 58% | 58% | 60% | 60% |
| 3433 | 0.00% | 0.25% | 0.00% | 9.00% | 1.00% | 55% | 72% | 52% | 68% | 49% | 64% | 56% | 73% | 57% | 74% | 52% | 52% | 54% | 54% |
| 3434 | 0.00% | 0.00% | 0.25% | 9.00% | 1.00% | 57% | 73% | 52% | 68% | 47% | 61% | 56% | 73% | 57% | 74% | 52% | 52% | 53% | 53% |
| 3435 | 0.25% | 0.00% | 0.25% | 9.00% | 1.00% | 59% | 76% | 53% | 69% | 49% | 64% | 57% | 74% | 58% | 75% | 54% | 54% | 55% | 55% |
| 3436 | 0.00% | 0.25% | 0.25% | 9.00% | 1.00% | 60% | 77% | 56% | 73% | 52% | 68% | 59% | 77% | 60% | 78% | 56% | 56% | 57% | 57% |
| 3437 | 0.25% | 0.25% | 0.25% | 9.00% | 1.00% | 62% | 80% | 57% | 74% | 54% | 70% | 60% | 78% | 61% | 79% | 58% | 58% | 58% | 58% |
| 3438 | 1.00% | 0.25% | 0.25% | 9.00% | 1.00% | 64% | 83% | 58% | 75% | 57% | 74% | 62% | 81% | 63% | 82% | 60% | 60% | 61% | 61% |
| 3439 | 9.00% | 0.25% | 0.25% | 9.00% | 1.00% | 60% | 77% | 56% | 73% | 52% | 68% | 59% | 77% | 60% | 78% | 56% | 56% | 57% | 57% |
| 3440 | 0.00% | 1.00% | 0.25% | 9.00% | 1.00% | 63% | 81% | 59% | 77% | 56% | 73% | 63% | 82% | 66% | 86% | 59% | 59% | 62% | 62% |
| 3441 | 0.25% | 1.00% | 0.25% | 9.00% | 1.00% | 65% | 84% | 60% | 78% | 58% | 75% | 64% | 83% | 67% | 87% | 61% | 61% | 63% | 63% |
| 3442 | 1.00% | 1.00% | 0.25% | 9.00% | 1.00% | 67% | 86% | 61% | 79% | 61% | 79% | 66% | 86% | 69% | 90% | 63% | 63% | 65% | 65% |
| 3443 | 0.25% | 9.00% | 0.25% | 9.00% | 1.00% | 69% | 89% | 64% | 83% | 62% | 81% | 67% | 87% | 73% | 95% | 65% | 65% | 67% | 67% |
| 3444 | 0.25% | 0.00% | 1.00% | 9.00% | 1.00% | 65% | 85% | 61% | 79% | 53% | 69% | 63% | 82% | 66% | 86% | 60% | 60% | 61% | 61% |
| 3445 | 1.00% | 0.25% | 1.00% | 9.00% | 1.00% | 70% | 91% | 66% | 86% | 61% | 79% | 68% | 88% | 71% | 92% | 66% | 66% | 67% | 67% |
| 3446 | 9.00% | 0.25% | 1.00% | 9.00% | 1.00% | 66% | 86% | 64% | 83% | 56% | 73% | 65% | 85% | 68% | 88% | 62% | 62% | 63% | 63% |
| 3447 | 0.00% | 1.00% | 1.00% | 9.00% | 1.00% | 69% | 90% | 67% | 87% | 60% | 78% | 69% | 90% | 74% | 96% | 65% | 65% | 68% | 68% |
| 3448 | 0.25% | 1.00% | 1.00% | 9.00% | 1.00% | 71% | 92% | 68% | 88% | 62% | 81% | 70% | 91% | 75% | 98% | 67% | 67% | 69% | 69% |
| 3449 | 1.00% | 1.00% | 1.00% | 9.00% | 1.00% | 73% | 95% | 69% | 90% | 65% | 85% | 72% | 94% | 77% | 100% | 69% | 69% | 71% | 71% |
| 3450 | 0.25% | 0.25% | 9.00% | 9.00% | 1.00% | 79% | 100% | 78% | 100% | 66% | 86% | 76% | 99% | 83% | 100% | 74% | 74% | 75% | 75% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3451 | 0.25% | 0.25% | 0.00% | 0.00% | 0.00% | 5% | 7% | 5% | 7% | 7% | 9% | 4% | 5% | 4% | 5% | 6% | 6% | 5% | 5% |
| 3452 | 1.00% | 0.25% | 0.00% | 0.00% | 0.00% | 7% | 9% | 6% | 8% | 10% | 13% | 6% | 8% | 6% | 8% | 8% | 8% | 7% | 7% |
| 3453 | 0.25% | 1.00% | 0.00% | 0.00% | 0.00% | 8% | 10% | 8% | 10% | 11% | 14% | 8% | 10% | 10% | 13% | 9% | 9% | 10% | 10% |
| 3454 | 1.00% | 1.00% | 0.00% | 0.00% | 0.00% | 10% | 13% | 9% | 12% | 14% | 18% | 10% | 13% | 12% | 16% | 11% | 11% | 12% | 12% |
| 3455 | 0.25% | 0.00% | 0.25% | 0.00% | 0.00% | 7% | 8% | 5% | 7% | 5% | 7% | 4% | 5% | 4% | 5% | 6% | 6% | 4% | 4% |
| 3456 | 1.00% | 0.00% | 0.25% | 0.00% | 0.00% | 9% | 11% | 6% | 8% | 8% | 10% | 6% | 8% | 6% | 8% | 8% | 8% | 7% | 7% |
| 3457 | 0.00% | 0.25% | 0.25% | 0.00% | 0.00% | 8% | 10% | 8% | 10% | 8% | 10% | 6% | 8% | 6% | 8% | 8% | 8% | 7% | 7% |
| 3458 | 0.25% | 0.25% | 0.25% | 0.00% | 0.00% | 10% | 12% | 9% | 12% | 10% | 13% | 7% | 9% | 7% | 9% | 10% | 10% | 8% | 8% |
| 3459 | 0.00% | 1.00% | 0.25% | 0.00% | 0.00% | 11% | 14% | 11% | 14% | 12% | 16% | 10% | 13% | 12% | 16% | 11% | 11% | 11% | 11% |
| 3460 | 1.00% | 1.00% | 0.25% | 0.00% | 0.00% | 15% | 19% | 13% | 17% | 17% | 22% | 13% | 17% | 15% | 20% | 15% | 15% | 15% | 15% |
| 3461 | 1.00% | 9.00% | 0.25% | 0.00% | 0.00% | 19% | 24% | 17% | 22% | 21% | 27% | 16% | 21% | 21% | 27% | 19% | 19% | 19% | 19% |
| 3462 | 0.25% | 0.00% | 1.00% | 0.00% | 0.00% | 13% | 17% | 13% | 17% | 9% | 12% | 10% | 13% | 12% | 16% | 12% | 12% | 10% | 10% |
| 3463 | 1.00% | 0.00% | 1.00% | 0.00% | 0.00% | 15% | 20% | 14% | 18% | 12% | 16% | 12% | 16% | 14% | 18% | 14% | 14% | 13% | 13% |
| 3464 | 0.00% | 0.25% | 1.00% | 0.00% | 0.00% | 14% | 18% | 16% | 21% | 12% | 16% | 12% | 16% | 14% | 18% | 14% | 14% | 13% | 13% |
| 3465 | 1.00% | 0.25% | 1.00% | 0.00% | 0.00% | 18% | 23% | 18% | 23% | 17% | 22% | 15% | 20% | 17% | 22% | 18% | 18% | 16% | 16% |
| 3466 | 0.00% | 1.00% | 1.00% | 0.00% | 0.00% | 17% | 22% | 19% | 25% | 16% | 21% | 16% | 21% | 20% | 26% | 17% | 17% | 17% | 17% |
| 3467 | 0.25% | 1.00% | 1.00% | 0.00% | 0.00% | 19% | 25% | 20% | 26% | 18% | 23% | 17% | 22% | 21% | 27% | 19% | 19% | 19% | 19% |
| 3468 | 1.00% | 1.00% | 1.00% | 0.00% | 0.00% | 21% | 27% | 21% | 27% | 21% | 27% | 19% | 25% | 23% | 30% | 21% | 21% | 21% | 21% |
| 3469 | 9.00% | 1.00% | 1.00% | 0.00% | 0.00% | 17% | 22% | 19% | 25% | 16% | 21% | 16% | 21% | 20% | 26% | 17% | 17% | 17% | 17% |
| 3470 | 1.00% | 9.00% | 1.00% | 0.00% | 0.00% | 25% | 33% | 25% | 33% | 25% | 33% | 22% | 29% | 29% | 38% | 25% | 25% | 25% | 25% |
| 3471 | 0.25% | 0.00% | 9.00% | 0.00% | 0.00% | 24% | 31% | 26% | 34% | 17% | 22% | 20% | 26% | 26% | 34% | 22% | 22% | 21% | 21% |
| 3472 | 0.00% | 0.25% | 9.00% | 0.00% | 0.00% | 25% | 33% | 29% | 38% | 20% | 26% | 22% | 29% | 28% | 36% | 25% | 25% | 23% | 23% |
| 3473 | 0.25% | 0.25% | 9.00% | 0.00% | 0.00% | 27% | 35% | 30% | 39% | 22% | 29% | 23% | 30% | 29% | 38% | 26% | 26% | 25% | 25% |
| 3474 | 1.00% | 0.25% | 9.00% | 0.00% | 0.00% | 29% | 38% | 31% | 40% | 25% | 33% | 25% | 33% | 31% | 40% | 28% | 28% | 27% | 27% |
| 3475 | 0.25% | 1.00% | 9.00% | 0.00% | 0.00% | 30% | 39% | 33% | 43% | 26% | 34% | 27% | 35% | 35% | 46% | 30% | 30% | 29% | 29% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3476 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 3477 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 3478 | 0.00% | 0.25% | 0.00% | 0.25% | 0.00% | 6% | 8% | 10% | 13% | 7% | 9% | 8% | 10% | 8% | 10% | 8% | 8% | 8% | 8% |
| 3479 | 0.25% | 0.25% | 0.00% | 0.25% | 0.00% | 8% | 10% | 11% | 14% | 9% | 12% | 9% | 12% | 9% | 12% | 9% | 9% | 9% | 9% |
| 3480 | 9.00% | 0.25% | 0.00% | 0.25% | 0.00% | 6% | 8% | 10% | 13% | 7% | 9% | 8% | 10% | 8% | 10% | 8% | 8% | 8% | 8% |
| 3481 | 1.00% | 1.00% | 0.00% | 0.25% | 0.00% | 13% | 17% | 15% | 20% | 16% | 21% | 15% | 20% | 17% | 22% | 15% | 15% | 16% | 16% |
| 3482 | 1.00% | 9.00% | 0.00% | 0.25% | 0.00% | 17% | 22% | 19% | 25% | 20% | 26% | 18% | 23% | 23% | 30% | 19% | 19% | 20% | 20% |
| 3483 | 0.00% | 0.00% | 0.25% | 0.25% | 0.00% | 8% | 10% | 10% | 13% | 5% | 7% | 8% | 10% | 8% | 10% | 8% | 8% | 7% | 7% |
| 3484 | 0.25% | 0.00% | 0.25% | 0.25% | 0.00% | 10% | 12% | 11% | 14% | 7% | 9% | 9% | 12% | 9% | 12% | 9% | 9% | 8% | 8% |
| 3485 | 0.00% | 0.25% | 0.25% | 0.25% | 0.00% | 11% | 14% | 14% | 18% | 10% | 13% | 11% | 14% | 11% | 14% | 12% | 12% | 11% | 11% |
| 3486 | 0.25% | 0.25% | 0.25% | 0.25% | 0.00% | 13% | 16% | 15% | 20% | 12% | 16% | 12% | 16% | 12% | 16% | 13% | 13% | 12% | 12% |
| 3487 | 1.00% | 0.25% | 0.25% | 0.25% | 0.00% | 15% | 19% | 16% | 21% | 15% | 20% | 14% | 18% | 14% | 18% | 15% | 15% | 14% | 14% |
| 3488 | 9.00% | 0.25% | 0.25% | 0.25% | 0.00% | 11% | 14% | 14% | 18% | 10% | 13% | 11% | 14% | 11% | 14% | 12% | 12% | 11% | 11% |
| 3489 | 0.25% | 1.00% | 0.25% | 0.25% | 0.00% | 16% | 20% | 18% | 23% | 16% | 21% | 16% | 21% | 18% | 23% | 17% | 17% | 17% | 17% |
| 3490 | 9.00% | 1.00% | 0.25% | 0.25% | 0.00% | 14% | 18% | 17% | 22% | 14% | 18% | 15% | 20% | 17% | 22% | 15% | 15% | 15% | 15% |
| 3491 | 0.25% | 9.00% | 0.25% | 0.25% | 0.00% | 20% | 25% | 22% | 29% | 20% | 26% | 19% | 25% | 24% | 31% | 21% | 21% | 21% | 21% |
| 3492 | 1.00% | 9.00% | 0.25% | 0.25% | 0.00% | 22% | 28% | 23% | 30% | 23% | 30% | 21% | 27% | 26% | 34% | 23% | 23% | 23% | 23% |
| 3493 | 9.00% | 9.00% | 0.25% | 0.25% | 0.00% | 18% | 23% | 21% | 27% | 18% | 23% | 18% | 23% | 23% | 30% | 19% | 19% | 20% | 20% |
| 3494 | 0.00% | 0.00% | 1.00% | 0.25% | 0.00% | 14% | 18% | 18% | 23% | 9% | 12% | 14% | 18% | 16% | 21% | 14% | 14% | 13% | 13% |
| 3495 | 1.00% | 0.00% | 1.00% | 0.25% | 0.00% | 18% | 23% | 20% | 26% | 14% | 18% | 17% | 22% | 19% | 25% | 17% | 17% | 17% | 17% |
| 3496 | 0.00% | 0.25% | 1.00% | 0.25% | 0.00% | 17% | 22% | 22% | 29% | 14% | 18% | 17% | 22% | 19% | 25% | 18% | 18% | 17% | 17% |
| 3497 | 0.25% | 0.25% | 1.00% | 0.25% | 0.00% | 19% | 25% | 23% | 30% | 16% | 21% | 18% | 23% | 20% | 26% | 19% | 19% | 18% | 18% |
| 3498 | 1.00% | 0.25% | 1.00% | 0.25% | 0.00% | 21% | 27% | 24% | 31% | 19% | 25% | 20% | 26% | 22% | 29% | 21% | 21% | 20% | 20% |
| 3499 | 9.00% | 0.25% | 1.00% | 0.25% | 0.00% | 17% | 22% | 22% | 29% | 14% | 18% | 17% | 22% | 19% | 25% | 18% | 18% | 17% | 17% |
| 3500 | 0.00% | 1.00% | 1.00% | 0.25% | 0.00% | 20% | 26% | 25% | 33% | 18% | 23% | 21% | 27% | 25% | 33% | 21% | 21% | 21% | 21% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3501 | 0.25% | 1.00% | 1.00% | 0.25% | 0.00% | 22% | 29% | 26% | 34% | 20% | 26% | 22% | 29% | 26% | 34% | 23% | 23% | 23% | 23% |
| 3502 | 1.00% | 1.00% | 1.00% | 0.25% | 0.00% | 24% | 31% | 27% | 35% | 23% | 30% | 24% | 31% | 28% | 36% | 25% | 25% | 25% | 25% |
| 3503 | 9.00% | 1.00% | 1.00% | 0.25% | 0.00% | 20% | 26% | 25% | 33% | 18% | 23% | 21% | 27% | 25% | 33% | 21% | 21% | 21% | 21% |
| 3504 | 0.00% | 9.00% | 1.00% | 0.25% | 0.00% | 24% | 31% | 29% | 38% | 22% | 29% | 24% | 31% | 31% | 40% | 25% | 25% | 26% | 26% |
| 3505 | 0.25% | 9.00% | 1.00% | 0.25% | 0.00% | 26% | 34% | 30% | 39% | 24% | 31% | 25% | 33% | 32% | 42% | 27% | 27% | 27% | 27% |
| 3506 | 1.00% | 9.00% | 1.00% | 0.25% | 0.00% | 28% | 36% | 31% | 40% | 27% | 35% | 27% | 35% | 34% | 44% | 29% | 29% | 29% | 29% |
| 3507 | 0.25% | 0.25% | 9.00% | 0.25% | 0.00% | 30% | 39% | 36% | 47% | 24% | 31% | 28% | 36% | 34% | 44% | 30% | 30% | 29% | 29% |
| 3508 | 1.00% | 0.25% | 9.00% | 0.25% | 0.00% | 32% | 42% | 37% | 48% | 27% | 35% | 30% | 39% | 36% | 47% | 32% | 32% | 31% | 31% |
| 3509 | 9.00% | 0.25% | 9.00% | 0.25% | 0.00% | 28% | 36% | 35% | 46% | 22% | 29% | 27% | 35% | 33% | 43% | 28% | 28% | 27% | 27% |
| 3510 | 0.00% | 1.00% | 9.00% | 0.25% | 0.00% | 31% | 40% | 38% | 49% | 26% | 34% | 31% | 40% | 39% | 51% | 32% | 32% | 32% | 32% |
| 3511 | 0.25% | 1.00% | 9.00% | 0.25% | 0.00% | 33% | 43% | 39% | 51% | 28% | 36% | 32% | 42% | 40% | 52% | 33% | 33% | 33% | 33% |
| 3512 | 9.00% | 1.00% | 9.00% | 0.25% | 0.00% | 31% | 40% | 38% | 49% | 26% | 34% | 31% | 40% | 39% | 51% | 32% | 32% | 32% | 32% |
| 3513 | 1.00% | 9.00% | 9.00% | 0.25% | 0.00% | 39% | 51% | 44% | 57% | 35% | 46% | 37% | 48% | 48% | 62% | 39% | 39% | 40% | 40% |
| 3514 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 3515 | 1.00% | 0.25% | 0.00% | 1.00% | 0.00% | 21% | 27% | 19% | 25% | 22% | 29% | 18% | 23% | 23% | 30% | 21% | 21% | 21% | 21% |
| 3516 | 0.00% | 1.00% | 0.00% | 1.00% | 0.00% | 20% | 26% | 20% | 26% | 21% | 27% | 19% | 25% | 26% | 34% | 20% | 20% | 22% | 22% |
| 3517 | 0.25% | 1.00% | 0.00% | 1.00% | 0.00% | 22% | 29% | 21% | 27% | 23% | 30% | 20% | 26% | 27% | 35% | 22% | 22% | 23% | 23% |
| 3518 | 1.00% | 1.00% | 0.00% | 1.00% | 0.00% | 24% | 31% | 22% | 29% | 26% | 34% | 22% | 29% | 29% | 38% | 24% | 24% | 26% | 26% |
| 3519 | 0.00% | 0.00% | 0.25% | 1.00% | 0.00% | 19% | 24% | 17% | 22% | 15% | 20% | 15% | 20% | 20% | 26% | 17% | 17% | 17% | 17% |
| 3520 | 1.00% | 0.00% | 0.25% | 1.00% | 0.00% | 23% | 29% | 19% | 25% | 20% | 26% | 18% | 23% | 23% | 30% | 21% | 21% | 20% | 20% |
| 3521 | 0.25% | 0.25% | 0.25% | 1.00% | 0.00% | 24% | 31% | 22% | 29% | 22% | 29% | 19% | 25% | 24% | 31% | 23% | 23% | 22% | 22% |
| 3522 | 1.00% | 0.25% | 0.25% | 1.00% | 0.00% | 26% | 33% | 23% | 30% | 25% | 33% | 21% | 27% | 26% | 34% | 25% | 25% | 24% | 24% |
| 3523 | 9.00% | 0.25% | 0.25% | 1.00% | 0.00% | 22% | 28% | 21% | 27% | 20% | 26% | 18% | 23% | 23% | 30% | 21% | 21% | 20% | 20% |
| 3524 | 0.00% | 1.00% | 0.25% | 1.00% | 0.00% | 25% | 32% | 24% | 31% | 24% | 31% | 22% | 29% | 29% | 38% | 24% | 24% | 25% | 25% |
| 3525 | 0.25% | 1.00% | 0.25% | 1.00% | 0.00% | 27% | 34% | 25% | 33% | 26% | 34% | 23% | 30% | 30% | 39% | 26% | 26% | 26% | 26% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3526 | 1.00% | 1.00% | 0.25% | 1.00% | 0.00% | 29% | 37% | 26% | 34% | 29% | 38% | 25% | 33% | 32% | 42% | 28% | 28% | 29% | 29% |
| 3527 | 9.00% | 1.00% | 0.25% | 1.00% | 0.00% | 25% | 32% | 24% | 31% | 24% | 31% | 22% | 29% | 29% | 38% | 24% | 24% | 25% | 25% |
| 3528 | 0.25% | 9.00% | 0.25% | 1.00% | 0.00% | 31% | 40% | 29% | 38% | 30% | 39% | 26% | 34% | 36% | 47% | 30% | 30% | 31% | 31% |
| 3529 | 1.00% | 9.00% | 0.25% | 1.00% | 0.00% | 33% | 42% | 30% | 39% | 33% | 43% | 28% | 36% | 38% | 49% | 32% | 32% | 33% | 33% |
| 3530 | 9.00% | 9.00% | 0.25% | 1.00% | 0.00% | 29% | 37% | 28% | 36% | 28% | 36% | 25% | 33% | 35% | 46% | 28% | 28% | 29% | 29% |
| 3531 | 0.00% | 0.00% | 1.00% | 1.00% | 0.00% | 25% | 33% | 25% | 33% | 19% | 25% | 21% | 27% | 28% | 36% | 23% | 23% | 23% | 23% |
| 3532 | 0.25% | 0.00% | 1.00% | 1.00% | 0.00% | 27% | 35% | 26% | 34% | 21% | 27% | 22% | 29% | 29% | 38% | 25% | 25% | 24% | 24% |
| 3533 | 1.00% | 0.00% | 1.00% | 1.00% | 0.00% | 29% | 38% | 27% | 35% | 24% | 31% | 24% | 31% | 31% | 40% | 27% | 27% | 26% | 26% |
| 3534 | 0.00% | 0.25% | 1.00% | 1.00% | 0.00% | 28% | 36% | 29% | 38% | 24% | 31% | 24% | 31% | 31% | 40% | 27% | 27% | 26% | 26% |
| 3535 | 1.00% | 0.25% | 1.00% | 1.00% | 0.00% | 32% | 42% | 31% | 40% | 29% | 38% | 27% | 35% | 34% | 44% | 31% | 31% | 30% | 30% |
| 3536 | 9.00% | 0.25% | 1.00% | 1.00% | 0.00% | 28% | 36% | 29% | 38% | 24% | 31% | 24% | 31% | 31% | 40% | 27% | 27% | 26% | 26% |
| 3537 | 0.00% | 1.00% | 1.00% | 1.00% | 0.00% | 31% | 40% | 32% | 42% | 28% | 36% | 28% | 36% | 37% | 48% | 30% | 30% | 31% | 31% |
| 3538 | 0.25% | 1.00% | 1.00% | 1.00% | 0.00% | 33% | 43% | 33% | 43% | 30% | 39% | 29% | 38% | 38% | 49% | 32% | 32% | 32% | 32% |
| 3539 | 1.00% | 1.00% | 1.00% | 1.00% | 0.00% | 35% | 46% | 34% | 44% | 33% | 43% | 31% | 40% | 40% | 52% | 34% | 34% | 35% | 35% |
| 3540 | 9.00% | 1.00% | 1.00% | 1.00% | 0.00% | 31% | 40% | 32% | 42% | 28% | 36% | 28% | 36% | 37% | 48% | 30% | 30% | 31% | 31% |
| 3541 | 0.00% | 9.00% | 1.00% | 1.00% | 0.00% | 35% | 46% | 36% | 47% | 32% | 42% | 31% | 40% | 43% | 56% | 34% | 34% | 35% | 35% |
| 3542 | 0.25% | 9.00% | 1.00% | 1.00% | 0.00% | 37% | 48% | 37% | 48% | 34% | 44% | 32% | 42% | 44% | 57% | 36% | 36% | 37% | 37% |
| 3543 | 1.00% | 9.00% | 1.00% | 1.00% | 0.00% | 39% | 51% | 38% | 49% | 37% | 48% | 34% | 44% | 46% | 60% | 38% | 38% | 39% | 39% |
| 3544 | 0.25% | 0.25% | 9.00% | 1.00% | 0.00% | 41% | 53% | 43% | 56% | 34% | 44% | 35% | 46% | 46% | 60% | 39% | 39% | 38% | 38% |
| 3545 | 1.00% | 0.25% | 9.00% | 1.00% | 0.00% | 43% | 56% | 44% | 57% | 37% | 48% | 37% | 48% | 48% | 62% | 41% | 41% | 41% | 41% |
| 3546 | 9.00% | 0.25% | 9.00% | 1.00% | 0.00% | 39% | 51% | 42% | 55% | 32% | 42% | 34% | 44% | 45% | 59% | 38% | 38% | 37% | 37% |
| 3547 | 0.25% | 1.00% | 9.00% | 1.00% | 0.00% | 44% | 57% | 46% | 60% | 38% | 49% | 39% | 51% | 52% | 68% | 43% | 43% | 43% | 43% |
| 3548 | 0.00% | 0.25% | 0.00% | 9.00% | 0.00% | 30% | 39% | 26% | 34% | 27% | 35% | 28% | 36% | 30% | 39% | 28% | 28% | 28% | 28% |
| 3549 | 0.00% | 0.00% | 0.25% | 9.00% | 0.00% | 32% | 41% | 26% | 34% | 25% | 33% | 28% | 36% | 30% | 39% | 28% | 28% | 28% | 28% |
| 3550 | 0.25% | 0.00% | 0.25% | 9.00% | 0.00% | 34% | 44% | 27% | 35% | 27% | 35% | 29% | 38% | 31% | 40% | 29% | 29% | 29% | 29% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3551 | 0.00% | 0.25% | 0.25% | 9.00% | 0.00% | 35% | 45% | 30% | 39% | 30% | 39% | 31% | 40% | 33% | 43% | 32% | 32% | 31% | 31% |
| 3552 | 0.25% | 0.25% | 0.25% | 9.00% | 0.00% | 37% | 47% | 31% | 40% | 32% | 42% | 32% | 42% | 34% | 44% | 33% | 33% | 33% | 33% |
| 3553 | 1.00% | 0.25% | 0.25% | 9.00% | 0.00% | 39% | 50% | 32% | 42% | 35% | 46% | 34% | 44% | 36% | 47% | 35% | 35% | 35% | 35% |
| 3554 | 9.00% | 0.25% | 0.25% | 9.00% | 0.00% | 35% | 45% | 30% | 39% | 30% | 39% | 31% | 40% | 33% | 43% | 32% | 32% | 31% | 31% |
| 3555 | 0.00% | 1.00% | 0.25% | 9.00% | 0.00% | 38% | 49% | 33% | 43% | 34% | 44% | 35% | 46% | 39% | 51% | 35% | 35% | 36% | 36% |
| 3556 | 0.25% | 1.00% | 0.25% | 9.00% | 0.00% | 40% | 51% | 34% | 44% | 36% | 47% | 36% | 47% | 40% | 52% | 37% | 37% | 37% | 37% |
| 3557 | 1.00% | 1.00% | 0.25% | 9.00% | 0.00% | 42% | 54% | 35% | 46% | 39% | 51% | 38% | 49% | 42% | 55% | 39% | 39% | 40% | 40% |
| 3558 | 0.25% | 9.00% | 0.25% | 9.00% | 0.00% | 44% | 57% | 38% | 49% | 40% | 52% | 39% | 51% | 46% | 60% | 41% | 41% | 42% | 42% |
| 3559 | 0.25% | 0.00% | 1.00% | 9.00% | 0.00% | 40% | 52% | 35% | 46% | 31% | 40% | 35% | 46% | 39% | 51% | 35% | 35% | 35% | 35% |
| 3560 | 1.00% | 0.25% | 1.00% | 9.00% | 0.00% | 45% | 59% | 40% | 52% | 39% | 51% | 40% | 52% | 44% | 57% | 41% | 41% | 41% | 41% |
| 3561 | 9.00% | 0.25% | 1.00% | 9.00% | 0.00% | 41% | 53% | 38% | 49% | 34% | 44% | 37% | 48% | 41% | 53% | 38% | 38% | 37% | 37% |
| 3562 | 0.00% | 1.00% | 1.00% | 9.00% | 0.00% | 44% | 57% | 41% | 53% | 38% | 49% | 41% | 53% | 47% | 61% | 41% | 41% | 42% | 42% |
| 3563 | 0.25% | 1.00% | 1.00% | 9.00% | 0.00% | 46% | 60% | 42% | 55% | 40% | 52% | 42% | 55% | 48% | 62% | 43% | 43% | 43% | 43% |
| 3564 | 1.00% | 1.00% | 1.00% | 9.00% | 0.00% | 48% | 62% | 43% | 56% | 43% | 56% | 44% | 57% | 50% | 65% | 45% | 45% | 46% | 46% |
| 3565 | 0.25% | 0.25% | 9.00% | 9.00% | 0.00% | 54% | 70% | 52% | 68% | 44% | 57% | 48% | 62% | 56% | 73% | 50% | 50% | 49% | 49% |
| 3566 | 0.25% | 0.25% | 0.00% | 0.00% | 0.25% | 12% | 16% | 12% | 16% | 14% | 18% | 12% | 16% | 12% | 16% | 13% | 13% | 13% | 13% |
| 3567 | 1.00% | 0.25% | 0.00% | 0.00% | 0.25% | 14% | 18% | 13% | 17% | 17% | 22% | 14% | 18% | 14% | 18% | 15% | 15% | 15% | 15% |
| 3568 | 0.25% | 1.00% | 0.00% | 0.00% | 0.25% | 15% | 20% | 15% | 20% | 18% | 23% | 16% | 21% | 18% | 23% | 16% | 16% | 17% | 17% |
| 3569 | 1.00% | 1.00% | 0.00% | 0.00% | 0.25% | 17% | 22% | 16% | 21% | 21% | 27% | 18% | 23% | 20% | 26% | 18% | 18% | 20% | 20% |
| 3570 | 0.25% | 0.00% | 0.25% | 0.00% | 0.25% | 14% | 18% | 12% | 16% | 12% | 16% | 12% | 16% | 12% | 16% | 13% | 13% | 12% | 12% |
| 3571 | 1.00% | 0.00% | 0.25% | 0.00% | 0.25% | 16% | 20% | 13% | 17% | 15% | 20% | 14% | 18% | 14% | 18% | 15% | 15% | 14% | 14% |
| 3572 | 0.00% | 0.25% | 0.25% | 0.00% | 0.25% | 15% | 19% | 15% | 20% | 15% | 20% | 14% | 18% | 14% | 18% | 15% | 15% | 14% | 14% |
| 3573 | 0.25% | 0.25% | 0.25% | 0.00% | 0.25% | 17% | 21% | 16% | 21% | 17% | 22% | 15% | 20% | 15% | 20% | 17% | 17% | 16% | 16% |
| 3574 | 0.00% | 1.00% | 0.25% | 0.00% | 0.25% | 18% | 23% | 18% | 23% | 19% | 25% | 18% | 23% | 20% | 26% | 18% | 18% | 19% | 19% |
| 3575 | 1.00% | 1.00% | 0.25% | 0.00% | 0.25% | 22% | 28% | 20% | 26% | 24% | 31% | 21% | 27% | 23% | 30% | 22% | 22% | 23% | 23% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3576 | 1.00% | 9.00% | 0.25% | 0.00% | 0.25% | 26% | 33% | 24% | 31% | 28% | 36% | 24% | 31% | 29% | 38% | 26% | 26% | 27% | 27% |
| 3577 | 0.25% | 0.00% | 1.00% | 0.00% | 0.25% | 20% | 26% | 20% | 26% | 16% | 21% | 18% | 23% | 20% | 26% | 19% | 19% | 18% | 18% |
| 3578 | 1.00% | 0.00% | 1.00% | 0.00% | 0.25% | 22% | 29% | 21% | 27% | 19% | 25% | 20% | 26% | 22% | 29% | 21% | 21% | 20% | 20% |
| 3579 | 0.00% | 0.25% | 1.00% | 0.00% | 0.25% | 21% | 27% | 23% | 30% | 19% | 25% | 20% | 26% | 22% | 29% | 21% | 21% | 20% | 20% |
| 3580 | 1.00% | 0.25% | 1.00% | 0.00% | 0.25% | 25% | 33% | 25% | 33% | 24% | 31% | 23% | 30% | 25% | 33% | 25% | 25% | 24% | 24% |
| 3581 | 0.00% | 1.00% | 1.00% | 0.00% | 0.25% | 24% | 31% | 26% | 34% | 23% | 30% | 24% | 31% | 28% | 36% | 24% | 24% | 25% | 25% |
| 3582 | 0.25% | 1.00% | 1.00% | 0.00% | 0.25% | 26% | 34% | 27% | 35% | 25% | 33% | 25% | 33% | 29% | 38% | 26% | 26% | 26% | 26% |
| 3583 | 1.00% | 1.00% | 1.00% | 0.00% | 0.25% | 28% | 36% | 28% | 36% | 28% | 36% | 27% | 35% | 31% | 40% | 28% | 28% | 29% | 29% |
| 3584 | 9.00% | 1.00% | 1.00% | 0.00% | 0.25% | 24% | 31% | 26% | 34% | 23% | 30% | 24% | 31% | 28% | 36% | 24% | 24% | 25% | 25% |
| 3585 | 1.00% | 9.00% | 1.00% | 0.00% | 0.25% | 32% | 42% | 32% | 42% | 32% | 42% | 30% | 39% | 37% | 48% | 32% | 32% | 33% | 33% |
| 3586 | 0.25% | 0.00% | 9.00% | 0.00% | 0.25% | 31% | 40% | 33% | 43% | 24% | 31% | 28% | 36% | 34% | 44% | 29% | 29% | 29% | 29% |
| 3587 | 0.00% | 0.25% | 9.00% | 0.00% | 0.25% | 32% | 42% | 36% | 47% | 27% | 35% | 30% | 39% | 36% | 47% | 32% | 32% | 31% | 31% |
| 3588 | 0.25% | 0.25% | 9.00% | 0.00% | 0.25% | 34% | 44% | 37% | 48% | 29% | 38% | 31% | 40% | 37% | 48% | 33% | 33% | 32% | 32% |
| 3589 | 1.00% | 0.25% | 9.00% | 0.00% | 0.25% | 36% | 47% | 38% | 49% | 32% | 42% | 33% | 43% | 39% | 51% | 35% | 35% | 35% | 35% |
| 3590 | 0.25% | 1.00% | 9.00% | 0.00% | 0.25% | 37% | 48% | 40% | 52% | 33% | 43% | 35% | 46% | 43% | 56% | 37% | 37% | 37% | 37% |
| 3591 | 0.25% | 0.00% | 0.00% | 0.25% | 0.25% | 12% | 16% | 14% | 18% | 11% | 14% | 14% | 18% | 14% | 18% | 12% | 12% | 13% | 13% |
| 3592 | 1.00% | 0.00% | 0.00% | 0.25% | 0.25% | 14% | 18% | 15% | 20% | 14% | 18% | 16% | 21% | 16% | 21% | 14% | 14% | 15% | 15% |
| 3593 | 0.00% | 0.25% | 0.00% | 0.25% | 0.25% | 13% | 17% | 17% | 22% | 14% | 18% | 16% | 21% | 16% | 21% | 15% | 15% | 15% | 15% |
| 3594 | 0.25% | 0.25% | 0.00% | 0.25% | 0.25% | 15% | 20% | 18% | 23% | 16% | 21% | 17% | 22% | 17% | 22% | 16% | 16% | 17% | 17% |
| 3595 | 9.00% | 0.25% | 0.00% | 0.25% | 0.25% | 13% | 17% | 17% | 22% | 14% | 18% | 16% | 21% | 16% | 21% | 15% | 15% | 15% | 15% |
| 3596 | 1.00% | 1.00% | 0.00% | 0.25% | 0.25% | 20% | 26% | 22% | 29% | 23% | 30% | 23% | 30% | 25% | 33% | 22% | 22% | 24% | 24% |
| 3597 | 1.00% | 9.00% | 0.00% | 0.25% | 0.25% | 24% | 31% | 26% | 34% | 27% | 35% | 26% | 34% | 31% | 40% | 26% | 26% | 28% | 28% |
| 3598 | 0.00% | 0.00% | 0.25% | 0.25% | 0.25% | 15% | 19% | 17% | 22% | 12% | 16% | 16% | 21% | 16% | 21% | 15% | 15% | 15% | 15% |
| 3599 | 0.25% | 0.00% | 0.25% | 0.25% | 0.25% | 17% | 21% | 18% | 23% | 14% | 18% | 17% | 22% | 17% | 22% | 16% | 16% | 16% | 16% |
| 3600 | 0.00% | 0.25% | 0.25% | 0.25% | 0.25% | 18% | 23% | 21% | 27% | 17% | 22% | 19% | 25% | 19% | 25% | 19% | 19% | 18% | 18% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3601 | 0.25% | 0.25% | 0.25% | 0.25% | 0.25% | 20% | 25% | 22% | 29% | 19% | 25% | 20% | 26% | 20% | 26% | 20% | 20% | 20% | 20% |
| 3602 | 1.00% | 0.25% | 0.25% | 0.25% | 0.25% | 22% | 28% | 23% | 30% | 22% | 29% | 22% | 29% | 22% | 29% | 22% | 22% | 22% | 22% |
| 3603 | 9.00% | 0.25% | 0.25% | 0.25% | 0.25% | 18% | 23% | 21% | 27% | 17% | 22% | 19% | 25% | 19% | 25% | 19% | 19% | 18% | 18% |
| 3604 | 0.25% | 1.00% | 0.25% | 0.25% | 0.25% | 23% | 29% | 25% | 33% | 23% | 30% | 24% | 31% | 26% | 34% | 24% | 24% | 24% | 24% |
| 3605 | 9.00% | 1.00% | 0.25% | 0.25% | 0.25% | 21% | 27% | 24% | 31% | 21% | 27% | 23% | 30% | 25% | 33% | 22% | 22% | 23% | 23% |
| 3606 | 0.25% | 9.00% | 0.25% | 0.25% | 0.25% | 27% | 34% | 29% | 38% | 27% | 35% | 27% | 35% | 32% | 42% | 28% | 28% | 29% | 29% |
| 3607 | 1.00% | 9.00% | 0.25% | 0.25% | 0.25% | 29% | 37% | 30% | 39% | 30% | 39% | 29% | 38% | 34% | 44% | 30% | 30% | 31% | 31% |
| 3608 | 9.00% | 9.00% | 0.25% | 0.25% | 0.25% | 25% | 32% | 28% | 36% | 25% | 33% | 26% | 34% | 31% | 40% | 26% | 26% | 27% | 27% |
| 3609 | 0.00% | 0.00% | 1.00% | 0.25% | 0.25% | 21% | 27% | 25% | 33% | 16% | 21% | 22% | 29% | 24% | 31% | 21% | 21% | 21% | 21% |
| 3610 | 1.00% | 0.00% | 1.00% | 0.25% | 0.25% | 25% | 33% | 27% | 35% | 21% | 27% | 25% | 33% | 27% | 35% | 24% | 24% | 24% | 24% |
| 3611 | 0.00% | 0.25% | 1.00% | 0.25% | 0.25% | 24% | 31% | 29% | 38% | 21% | 27% | 25% | 33% | 27% | 35% | 25% | 25% | 24% | 24% |
| 3612 | 0.25% | 0.25% | 1.00% | 0.25% | 0.25% | 26% | 34% | 30% | 39% | 23% | 30% | 26% | 34% | 28% | 36% | 26% | 26% | 26% | 26% |
| 3613 | 1.00% | 0.25% | 1.00% | 0.25% | 0.25% | 28% | 36% | 31% | 40% | 26% | 34% | 28% | 36% | 30% | 39% | 28% | 28% | 28% | 28% |
| 3614 | 9.00% | 0.25% | 1.00% | 0.25% | 0.25% | 24% | 31% | 29% | 38% | 21% | 27% | 25% | 33% | 27% | 35% | 25% | 25% | 24% | 24% |
| 3615 | 0.00% | 1.00% | 1.00% | 0.25% | 0.25% | 27% | 35% | 32% | 42% | 25% | 33% | 29% | 38% | 33% | 43% | 28% | 28% | 29% | 29% |
| 3616 | 0.25% | 1.00% | 1.00% | 0.25% | 0.25% | 29% | 38% | 33% | 43% | 27% | 35% | 30% | 39% | 34% | 44% | 30% | 30% | 30% | 30% |
| 3617 | 1.00% | 1.00% | 1.00% | 0.25% | 0.25% | 31% | 40% | 34% | 44% | 30% | 39% | 32% | 42% | 36% | 47% | 32% | 32% | 33% | 33% |
| 3618 | 9.00% | 1.00% | 1.00% | 0.25% | 0.25% | 27% | 35% | 32% | 42% | 25% | 33% | 29% | 38% | 33% | 43% | 28% | 28% | 29% | 29% |
| 3619 | 0.00% | 9.00% | 1.00% | 0.25% | 0.25% | 31% | 40% | 36% | 47% | 29% | 38% | 32% | 42% | 39% | 51% | 32% | 32% | 33% | 33% |
| 3620 | 0.25% | 9.00% | 1.00% | 0.25% | 0.25% | 33% | 43% | 37% | 48% | 31% | 40% | 33% | 43% | 40% | 52% | 34% | 34% | 35% | 35% |
| 3621 | 1.00% | 9.00% | 1.00% | 0.25% | 0.25% | 35% | 46% | 38% | 49% | 34% | 44% | 35% | 46% | 42% | 55% | 36% | 36% | 37% | 37% |
| 3622 | 0.25% | 0.25% | 9.00% | 0.25% | 0.25% | 37% | 48% | 43% | 56% | 31% | 40% | 36% | 47% | 42% | 55% | 37% | 37% | 36% | 36% |
| 3623 | 1.00% | 0.25% | 9.00% | 0.25% | 0.25% | 39% | 51% | 44% | 57% | 34% | 44% | 38% | 49% | 44% | 57% | 39% | 39% | 39% | 39% |
| 3624 | 9.00% | 0.25% | 9.00% | 0.25% | 0.25% | 35% | 46% | 42% | 55% | 29% | 38% | 35% | 46% | 41% | 53% | 35% | 35% | 35% | 35% |
| 3625 | 0.00% | 1.00% | 9.00% | 0.25% | 0.25% | 38% | 49% | 45% | 59% | 33% | 43% | 39% | 51% | 47% | 61% | 39% | 39% | 40% | 40% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3626 | 0.25% | 1.00% | 9.00% | 0.25% | 0.25% | 40% | 52% | 46% | 60% | 35% | 46% | 40% | 52% | 48% | 62% | 40% | 40% | 41% | 41% |
| 3627 | 9.00% | 1.00% | 9.00% | 0.25% | 0.25% | 38% | 49% | 45% | 59% | 33% | 43% | 39% | 51% | 47% | 61% | 39% | 39% | 40% | 40% |
| 3628 | 1.00% | 9.00% | 9.00% | 0.25% | 0.25% | 46% | 60% | 51% | 66% | 42% | 55% | 45% | 59% | 56% | 73% | 46% | 46% | 48% | 48% |
| 3629 | 0.25% | 0.00% | 0.00% | 1.00% | 0.25% | 23% | 30% | 21% | 27% | 21% | 27% | 21% | 27% | 26% | 34% | 22% | 22% | 23% | 23% |
| 3630 | 1.00% | 0.25% | 0.00% | 1.00% | 0.25% | 28% | 36% | 26% | 34% | 29% | 38% | 26% | 34% | 31% | 40% | 28% | 28% | 29% | 29% |
| 3631 | 0.00% | 1.00% | 0.00% | 1.00% | 0.25% | 27% | 35% | 27% | 35% | 28% | 36% | 27% | 35% | 34% | 44% | 27% | 27% | 30% | 30% |
| 3632 | 0.25% | 1.00% | 0.00% | 1.00% | 0.25% | 29% | 38% | 28% | 36% | 30% | 39% | 28% | 36% | 35% | 46% | 29% | 29% | 31% | 31% |
| 3633 | 1.00% | 1.00% | 0.00% | 1.00% | 0.25% | 31% | 40% | 29% | 38% | 33% | 43% | 30% | 39% | 37% | 48% | 31% | 31% | 33% | 33% |
| 3634 | 0.00% | 0.00% | 0.25% | 1.00% | 0.25% | 26% | 33% | 24% | 31% | 22% | 29% | 23% | 30% | 28% | 36% | 24% | 24% | 24% | 24% |
| 3635 | 1.00% | 0.00% | 0.25% | 1.00% | 0.25% | 30% | 38% | 26% | 34% | 27% | 35% | 26% | 34% | 31% | 40% | 28% | 28% | 28% | 28% |
| 3636 | 0.25% | 0.25% | 0.25% | 1.00% | 0.25% | 31% | 40% | 29% | 38% | 29% | 38% | 27% | 35% | 32% | 42% | 30% | 30% | 29% | 29% |
| 3637 | 1.00% | 0.25% | 0.25% | 1.00% | 0.25% | 33% | 42% | 30% | 39% | 32% | 42% | 29% | 38% | 34% | 44% | 32% | 32% | 32% | 32% |
| 3638 | 9.00% | 0.25% | 0.25% | 1.00% | 0.25% | 29% | 37% | 28% | 36% | 27% | 35% | 26% | 34% | 31% | 40% | 28% | 28% | 28% | 28% |
| 3639 | 0.00% | 1.00% | 0.25% | 1.00% | 0.25% | 32% | 41% | 31% | 40% | 31% | 40% | 30% | 39% | 37% | 48% | 31% | 31% | 33% | 33% |
| 3640 | 0.25% | 1.00% | 0.25% | 1.00% | 0.25% | 34% | 44% | 32% | 42% | 33% | 43% | 31% | 40% | 38% | 49% | 33% | 33% | 34% | 34% |
| 3641 | 1.00% | 1.00% | 0.25% | 1.00% | 0.25% | 36% | 46% | 33% | 43% | 36% | 47% | 33% | 43% | 40% | 52% | 35% | 35% | 36% | 36% |
| 3642 | 9.00% | 1.00% | 0.25% | 1.00% | 0.25% | 32% | 41% | 31% | 40% | 31% | 40% | 30% | 39% | 37% | 48% | 31% | 31% | 33% | 33% |
| 3643 | 0.25% | 9.00% | 0.25% | 1.00% | 0.25% | 38% | 49% | 36% | 47% | 37% | 48% | 34% | 44% | 44% | 57% | 37% | 37% | 38% | 38% |
| 3644 | 1.00% | 9.00% | 0.25% | 1.00% | 0.25% | 40% | 51% | 37% | 48% | 40% | 52% | 36% | 47% | 46% | 60% | 39% | 39% | 41% | 41% |
| 3645 | 9.00% | 9.00% | 0.25% | 1.00% | 0.25% | 36% | 46% | 35% | 46% | 35% | 46% | 33% | 43% | 43% | 56% | 35% | 35% | 37% | 37% |
| 3646 | 0.00% | 0.00% | 1.00% | 1.00% | 0.25% | 32% | 42% | 32% | 42% | 26% | 34% | 29% | 38% | 36% | 47% | 30% | 30% | 30% | 30% |
| 3647 | 0.25% | 0.00% | 1.00% | 1.00% | 0.25% | 34% | 44% | 33% | 43% | 28% | 36% | 30% | 39% | 37% | 48% | 32% | 32% | 32% | 32% |
| 3648 | 1.00% | 0.00% | 1.00% | 1.00% | 0.25% | 36% | 47% | 34% | 44% | 31% | 40% | 32% | 42% | 39% | 51% | 34% | 34% | 34% | 34% |
| 3649 | 0.00% | 0.25% | 1.00% | 1.00% | 0.25% | 35% | 46% | 36% | 47% | 31% | 40% | 32% | 42% | 39% | 51% | 34% | 34% | 34% | 34% |
| 3650 | 1.00% | 0.25% | 1.00% | 1.00% | 0.25% | 39% | 51% | 38% | 49% | 36% | 47% | 35% | 46% | 42% | 55% | 38% | 38% | 38% | 38% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3651 | 9.00% | 0.25% | 1.00% | 1.00% | 0.25% | 35% | 46% | 36% | 47% | 31% | 40% | 32% | 42% | 39% | 51% | 34% | 34% | 34% | 34% |
| 3652 | 0.00% | 1.00% | 1.00% | 1.00% | 0.25% | 38% | 49% | 39% | 51% | 35% | 46% | 36% | 47% | 45% | 59% | 37% | 37% | 39% | 39% |
| 3653 | 0.25% | 1.00% | 1.00% | 1.00% | 0.25% | 40% | 52% | 40% | 52% | 37% | 48% | 37% | 48% | 46% | 60% | 39% | 39% | 40% | 40% |
| 3654 | 1.00% | 1.00% | 1.00% | 1.00% | 0.25% | 42% | 55% | 41% | 53% | 40% | 52% | 39% | 51% | 48% | 62% | 41% | 41% | 42% | 42% |
| 3655 | 9.00% | 1.00% | 1.00% | 1.00% | 0.25% | 38% | 49% | 39% | 51% | 35% | 46% | 36% | 47% | 45% | 59% | 37% | 37% | 39% | 39% |
| 3656 | 0.00% | 9.00% | 1.00% | 1.00% | 0.25% | 42% | 55% | 43% | 56% | 39% | 51% | 39% | 51% | 51% | 66% | 41% | 41% | 43% | 43% |
| 3657 | 0.25% | 9.00% | 1.00% | 1.00% | 0.25% | 44% | 57% | 44% | 57% | 41% | 53% | 40% | 52% | 52% | 68% | 43% | 43% | 44% | 44% |
| 3658 | 1.00% | 9.00% | 1.00% | 1.00% | 0.25% | 46% | 60% | 45% | 59% | 44% | 57% | 42% | 55% | 54% | 70% | 45% | 45% | 47% | 47% |
| 3659 | 0.25% | 0.25% | 9.00% | 1.00% | 0.25% | 48% | 62% | 50% | 65% | 41% | 53% | 43% | 56% | 54% | 70% | 46% | 46% | 46% | 46% |
| 3660 | 1.00% | 0.25% | 9.00% | 1.00% | 0.25% | 50% | 65% | 51% | 66% | 44% | 57% | 45% | 59% | 56% | 73% | 48% | 48% | 48% | 48% |
| 3661 | 9.00% | 0.25% | 9.00% | 1.00% | 0.25% | 46% | 60% | 49% | 64% | 39% | 51% | 42% | 55% | 53% | 69% | 45% | 45% | 45% | 45% |
| 3662 | 0.25% | 1.00% | 9.00% | 1.00% | 0.25% | 51% | 66% | 53% | 69% | 45% | 59% | 47% | 61% | 60% | 78% | 50% | 50% | 51% | 51% |
| 3663 | 0.00% | 0.25% | 0.00% | 9.00% | 0.25% | 37% | 48% | 33% | 43% | 34% | 44% | 36% | 47% | 38% | 49% | 35% | 35% | 36% | 36% |
| 3664 | 0.00% | 0.00% | 0.25% | 9.00% | 0.25% | 39% | 50% | 33% | 43% | 32% | 42% | 36% | 47% | 38% | 49% | 35% | 35% | 35% | 35% |
| 3665 | 0.25% | 0.00% | 0.25% | 9.00% | 0.25% | 41% | 53% | 34% | 44% | 34% | 44% | 37% | 48% | 39% | 51% | 36% | 36% | 37% | 37% |
| 3666 | 0.00% | 0.25% | 0.25% | 9.00% | 0.25% | 42% | 54% | 37% | 48% | 37% | 48% | 39% | 51% | 41% | 53% | 39% | 39% | 39% | 39% |
| 3667 | 0.25% | 0.25% | 0.25% | 9.00% | 0.25% | 44% | 57% | 38% | 49% | 39% | 51% | 40% | 52% | 42% | 55% | 40% | 40% | 40% | 40% |
| 3668 | 1.00% | 0.25% | 0.25% | 9.00% | 0.25% | 46% | 59% | 39% | 51% | 42% | 55% | 42% | 55% | 44% | 57% | 42% | 42% | 43% | 43% |
| 3669 | 9.00% | 0.25% | 0.25% | 9.00% | 0.25% | 42% | 54% | 37% | 48% | 37% | 48% | 39% | 51% | 41% | 53% | 39% | 39% | 39% | 39% |
| 3670 | 0.00% | 1.00% | 0.25% | 9.00% | 0.25% | 45% | 58% | 40% | 52% | 41% | 53% | 43% | 56% | 47% | 61% | 42% | 42% | 44% | 44% |
| 3671 | 0.25% | 1.00% | 0.25% | 9.00% | 0.25% | 47% | 60% | 41% | 53% | 43% | 56% | 44% | 57% | 48% | 62% | 44% | 44% | 45% | 45% |
| 3672 | 1.00% | 1.00% | 0.25% | 9.00% | 0.25% | 49% | 63% | 42% | 55% | 46% | 60% | 46% | 60% | 50% | 65% | 46% | 46% | 47% | 47% |
| 3673 | 0.25% | 9.00% | 0.25% | 9.00% | 0.25% | 51% | 66% | 45% | 59% | 47% | 61% | 47% | 61% | 54% | 70% | 48% | 48% | 49% | 49% |
| 3674 | 0.25% | 0.00% | 1.00% | 9.00% | 0.25% | 47% | 61% | 42% | 55% | 38% | 49% | 43% | 56% | 47% | 61% | 42% | 42% | 43% | 43% |
| 3675 | 1.00% | 0.25% | 1.00% | 9.00% | 0.25% | 52% | 68% | 47% | 61% | 46% | 60% | 48% | 62% | 52% | 68% | 48% | 48% | 49% | 49% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3676 | 9.00% | 0.25% | 1.00% | 9.00% | 0.25% | 48% | 62% | 45% | 59% | 41% | 53% | 45% | 59% | 49% | 64% | 45% | 45% | 45% | 45% |
| 3677 | 0.00% | 1.00% | 1.00% | 9.00% | 0.25% | 51% | 66% | 48% | 62% | 45% | 59% | 49% | 64% | 55% | 72% | 48% | 48% | 50% | 50% |
| 3678 | 0.25% | 1.00% | 1.00% | 9.00% | 0.25% | 53% | 69% | 49% | 64% | 47% | 61% | 50% | 65% | 56% | 73% | 50% | 50% | 51% | 51% |
| 3679 | 1.00% | 1.00% | 1.00% | 9.00% | 0.25% | 55% | 72% | 50% | 65% | 50% | 65% | 52% | 68% | 58% | 75% | 52% | 52% | 53% | 53% |
| 3680 | 0.25% | 0.25% | 9.00% | 9.00% | 0.25% | 61% | 79% | 59% | 77% | 51% | 66% | 56% | 73% | 64% | 83% | 57% | 57% | 57% | 57% |
| 3681 | 0.25% | 0.25% | 0.00% | 0.00% | 1.00% | 20% | 26% | 21% | 27% | 23% | 30% | 18% | 23% | 23% | 30% | 21% | 21% | 21% | 21% |
| 3682 | 1.00% | 0.25% | 0.00% | 0.00% | 1.00% | 22% | 29% | 22% | 29% | 26% | 34% | 20% | 26% | 25% | 33% | 23% | 23% | 24% | 24% |
| 3683 | 0.25% | 1.00% | 0.00% | 0.00% | 1.00% | 23% | 30% | 24% | 31% | 27% | 35% | 22% | 29% | 29% | 38% | 25% | 25% | 26% | 26% |
| 3684 | 1.00% | 1.00% | 0.00% | 0.00% | 1.00% | 25% | 33% | 25% | 33% | 30% | 39% | 24% | 31% | 31% | 40% | 27% | 27% | 28% | 28% |
| 3685 | 0.25% | 0.00% | 0.25% | 0.00% | 1.00% | 22% | 28% | 21% | 27% | 21% | 27% | 18% | 23% | 23% | 30% | 21% | 21% | 21% | 21% |
| 3686 | 1.00% | 0.00% | 0.25% | 0.00% | 1.00% | 24% | 31% | 22% | 29% | 24% | 31% | 20% | 26% | 25% | 33% | 23% | 23% | 23% | 23% |
| 3687 | 0.00% | 0.25% | 0.25% | 0.00% | 1.00% | 23% | 29% | 24% | 31% | 24% | 31% | 20% | 26% | 25% | 33% | 24% | 24% | 23% | 23% |
| 3688 | 0.25% | 0.25% | 0.25% | 0.00% | 1.00% | 25% | 32% | 25% | 33% | 26% | 34% | 21% | 27% | 26% | 34% | 25% | 25% | 24% | 24% |
| 3689 | 0.00% | 1.00% | 0.25% | 0.00% | 1.00% | 26% | 33% | 27% | 35% | 28% | 36% | 24% | 31% | 31% | 40% | 27% | 27% | 28% | 28% |
| 3690 | 1.00% | 1.00% | 0.25% | 0.00% | 1.00% | 30% | 38% | 29% | 38% | 33% | 43% | 27% | 35% | 34% | 44% | 31% | 31% | 31% | 31% |
| 3691 | 1.00% | 9.00% | 0.25% | 0.00% | 1.00% | 34% | 44% | 33% | 43% | 37% | 48% | 30% | 39% | 40% | 52% | 35% | 35% | 36% | 36% |
| 3692 | 0.25% | 0.00% | 1.00% | 0.00% | 1.00% | 28% | 36% | 29% | 38% | 25% | 33% | 24% | 31% | 31% | 40% | 27% | 27% | 27% | 27% |
| 3693 | 1.00% | 0.00% | 1.00% | 0.00% | 1.00% | 30% | 39% | 30% | 39% | 28% | 36% | 26% | 34% | 33% | 43% | 29% | 29% | 29% | 29% |
| 3694 | 0.00% | 0.25% | 1.00% | 0.00% | 1.00% | 29% | 38% | 32% | 42% | 28% | 36% | 26% | 34% | 33% | 43% | 30% | 30% | 29% | 29% |
| 3695 | 1.00% | 0.25% | 1.00% | 0.00% | 1.00% | 33% | 43% | 34% | 44% | 33% | 43% | 29% | 38% | 36% | 47% | 33% | 33% | 33% | 33% |
| 3696 | 0.00% | 1.00% | 1.00% | 0.00% | 1.00% | 32% | 42% | 35% | 46% | 32% | 42% | 30% | 39% | 39% | 51% | 33% | 33% | 34% | 34% |
| 3697 | 0.25% | 1.00% | 1.00% | 0.00% | 1.00% | 34% | 44% | 36% | 47% | 34% | 44% | 31% | 40% | 40% | 52% | 35% | 35% | 35% | 35% |
| 3698 | 1.00% | 1.00% | 1.00% | 0.00% | 1.00% | 36% | 47% | 37% | 48% | 37% | 48% | 33% | 43% | 42% | 55% | 37% | 37% | 37% | 37% |
| 3699 | 9.00% | 1.00% | 1.00% | 0.00% | 1.00% | 32% | 42% | 35% | 46% | 32% | 42% | 30% | 39% | 39% | 51% | 33% | 33% | 34% | 34% |
| 3700 | 1.00% | 9.00% | 1.00% | 0.00% | 1.00% | 40% | 52% | 41% | 53% | 41% | 53% | 36% | 47% | 48% | 62% | 41% | 41% | 42% | 42% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3701 | 0.25% | 0.00% | 9.00% | 0.00% | 1.00% | 39% | 51% | 42% | 55% | 33% | 43% | 34% | 44% | 45% | 59% | 38% | 38% | 37% | 37% |
| 3702 | 0.00% | 0.25% | 9.00% | 0.00% | 1.00% | 40% | 52% | 45% | 59% | 36% | 47% | 36% | 47% | 47% | 61% | 40% | 40% | 40% | 40% |
| 3703 | 0.25% | 0.25% | 9.00% | 0.00% | 1.00% | 42% | 55% | 46% | 60% | 38% | 49% | 37% | 48% | 48% | 62% | 42% | 42% | 41% | 41% |
| 3704 | 1.00% | 0.25% | 9.00% | 0.00% | 1.00% | 44% | 57% | 47% | 61% | 41% | 53% | 39% | 51% | 50% | 65% | 44% | 44% | 43% | 43% |
| 3705 | 0.25% | 1.00% | 9.00% | 0.00% | 1.00% | 45% | 59% | 49% | 64% | 42% | 55% | 41% | 53% | 54% | 70% | 45% | 45% | 46% | 46% |
| 3706 | 0.25% | 0.00% | 0.00% | 0.25% | 1.00% | 20% | 26% | 23% | 30% | 20% | 26% | 20% | 26% | 25% | 33% | 21% | 21% | 22% | 22% |
| 3707 | 1.00% | 0.00% | 0.00% | 0.25% | 1.00% | 22% | 29% | 24% | 31% | 23% | 30% | 22% | 29% | 27% | 35% | 23% | 23% | 24% | 24% |
| 3708 | 0.00% | 0.25% | 0.00% | 0.25% | 1.00% | 21% | 27% | 26% | 34% | 23% | 30% | 22% | 29% | 27% | 35% | 23% | 23% | 24% | 24% |
| 3709 | 0.25% | 0.25% | 0.00% | 0.25% | 1.00% | 23% | 30% | 27% | 35% | 25% | 33% | 23% | 30% | 28% | 36% | 25% | 25% | 25% | 25% |
| 3710 | 9.00% | 0.25% | 0.00% | 0.25% | 1.00% | 21% | 27% | 26% | 34% | 23% | 30% | 22% | 29% | 27% | 35% | 23% | 23% | 24% | 24% |
| 3711 | 1.00% | 1.00% | 0.00% | 0.25% | 1.00% | 28% | 36% | 31% | 40% | 32% | 42% | 29% | 38% | 36% | 47% | 30% | 30% | 32% | 32% |
| 3712 | 1.00% | 9.00% | 0.00% | 0.25% | 1.00% | 32% | 42% | 35% | 46% | 36% | 47% | 32% | 42% | 42% | 55% | 34% | 34% | 37% | 37% |
| 3713 | 0.00% | 0.00% | 0.25% | 0.25% | 1.00% | 23% | 29% | 26% | 34% | 21% | 27% | 22% | 29% | 27% | 35% | 23% | 23% | 23% | 23% |
| 3714 | 0.25% | 0.00% | 0.25% | 0.25% | 1.00% | 25% | 32% | 27% | 35% | 23% | 30% | 23% | 30% | 28% | 36% | 25% | 25% | 25% | 25% |
| 3715 | 0.00% | 0.25% | 0.25% | 0.25% | 1.00% | 26% | 33% | 30% | 39% | 26% | 34% | 25% | 33% | 30% | 39% | 27% | 27% | 27% | 27% |
| 3716 | 0.25% | 0.25% | 0.25% | 0.25% | 1.00% | 28% | 36% | 31% | 40% | 28% | 36% | 26% | 34% | 31% | 40% | 29% | 29% | 28% | 28% |
| 3717 | 1.00% | 0.25% | 0.25% | 0.25% | 1.00% | 30% | 38% | 32% | 42% | 31% | 40% | 28% | 36% | 33% | 43% | 31% | 31% | 31% | 31% |
| 3718 | 9.00% | 0.25% | 0.25% | 0.25% | 1.00% | 26% | 33% | 30% | 39% | 26% | 34% | 25% | 33% | 30% | 39% | 27% | 27% | 27% | 27% |
| 3719 | 0.25% | 1.00% | 0.25% | 0.25% | 1.00% | 31% | 40% | 34% | 44% | 32% | 42% | 30% | 39% | 37% | 48% | 32% | 32% | 33% | 33% |
| 3720 | 9.00% | 1.00% | 0.25% | 0.25% | 1.00% | 29% | 37% | 33% | 43% | 30% | 39% | 29% | 38% | 36% | 47% | 31% | 31% | 32% | 32% |
| 3721 | 0.25% | 9.00% | 0.25% | 0.25% | 1.00% | 35% | 45% | 38% | 49% | 36% | 47% | 33% | 43% | 43% | 56% | 36% | 36% | 37% | 37% |
| 3722 | 1.00% | 9.00% | 0.25% | 0.25% | 1.00% | 37% | 47% | 39% | 51% | 39% | 51% | 35% | 46% | 45% | 59% | 38% | 38% | 40% | 40% |
| 3723 | 9.00% | 9.00% | 0.25% | 0.25% | 1.00% | 33% | 42% | 37% | 48% | 34% | 44% | 32% | 42% | 42% | 55% | 35% | 35% | 36% | 36% |
| 3724 | 0.00% | 0.00% | 1.00% | 0.25% | 1.00% | 29% | 38% | 34% | 44% | 25% | 33% | 28% | 36% | 35% | 46% | 29% | 29% | 29% | 29% |
| 3725 | 1.00% | 0.00% | 1.00% | 0.25% | 1.00% | 33% | 43% | 36% | 47% | 30% | 39% | 31% | 40% | 38% | 49% | 33% | 33% | 33% | 33% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3726 | 0.00% | 0.25% | 1.00% | 0.25% | 1.00% | 32% | 42% | 38% | 49% | 30% | 39% | 31% | 40% | 38% | 49% | 33% | 33% | 33% | 33% |
| 3727 | 0.25% | 0.25% | 1.00% | 0.25% | 1.00% | 34% | 44% | 39% | 51% | 32% | 42% | 32% | 42% | 39% | 51% | 35% | 35% | 34% | 34% |
| 3728 | 1.00% | 0.25% | 1.00% | 0.25% | 1.00% | 36% | 47% | 40% | 52% | 35% | 46% | 34% | 44% | 41% | 53% | 37% | 37% | 37% | 37% |
| 3729 | 9.00% | 0.25% | 1.00% | 0.25% | 1.00% | 32% | 42% | 38% | 49% | 30% | 39% | 31% | 40% | 38% | 49% | 33% | 33% | 33% | 33% |
| 3730 | 0.00% | 1.00% | 1.00% | 0.25% | 1.00% | 35% | 46% | 41% | 53% | 34% | 44% | 35% | 46% | 44% | 57% | 37% | 37% | 38% | 38% |
| 3731 | 0.25% | 1.00% | 1.00% | 0.25% | 1.00% | 37% | 48% | 42% | 55% | 36% | 47% | 36% | 47% | 45% | 59% | 38% | 38% | 39% | 39% |
| 3732 | 1.00% | 1.00% | 1.00% | 0.25% | 1.00% | 39% | 51% | 43% | 56% | 39% | 51% | 38% | 49% | 47% | 61% | 40% | 40% | 41% | 41% |
| 3733 | 9.00% | 1.00% | 1.00% | 0.25% | 1.00% | 35% | 46% | 41% | 53% | 34% | 44% | 35% | 46% | 44% | 57% | 37% | 37% | 38% | 38% |
| 3734 | 0.00% | 9.00% | 1.00% | 0.25% | 1.00% | 39% | 51% | 45% | 59% | 38% | 49% | 38% | 49% | 50% | 65% | 41% | 41% | 42% | 42% |
| 3735 | 0.25% | 9.00% | 1.00% | 0.25% | 1.00% | 41% | 53% | 46% | 60% | 40% | 52% | 39% | 51% | 51% | 66% | 42% | 42% | 43% | 43% |
| 3736 | 1.00% | 9.00% | 1.00% | 0.25% | 1.00% | 43% | 56% | 47% | 61% | 43% | 56% | 41% | 53% | 53% | 69% | 44% | 44% | 46% | 46% |
| 3737 | 0.25% | 0.25% | 9.00% | 0.25% | 1.00% | 45% | 59% | 52% | 68% | 40% | 52% | 42% | 55% | 53% | 69% | 46% | 46% | 45% | 45% |
| 3738 | 1.00% | 0.25% | 9.00% | 0.25% | 1.00% | 47% | 61% | 53% | 69% | 43% | 56% | 44% | 57% | 55% | 72% | 48% | 48% | 47% | 47% |
| 3739 | 9.00% | 0.25% | 9.00% | 0.25% | 1.00% | 43% | 56% | 51% | 66% | 38% | 49% | 41% | 53% | 52% | 68% | 44% | 44% | 44% | 44% |
| 3740 | 0.00% | 1.00% | 9.00% | 0.25% | 1.00% | 46% | 60% | 54% | 70% | 42% | 55% | 45% | 59% | 58% | 75% | 47% | 47% | 48% | 48% |
| 3741 | 0.25% | 1.00% | 9.00% | 0.25% | 1.00% | 48% | 62% | 55% | 72% | 44% | 57% | 46% | 60% | 59% | 77% | 49% | 49% | 50% | 50% |
| 3742 | 9.00% | 1.00% | 9.00% | 0.25% | 1.00% | 46% | 60% | 54% | 70% | 42% | 55% | 45% | 59% | 58% | 75% | 47% | 47% | 48% | 48% |
| 3743 | 1.00% | 9.00% | 9.00% | 0.25% | 1.00% | 54% | 70% | 60% | 78% | 51% | 66% | 51% | 66% | 67% | 87% | 55% | 55% | 56% | 56% |
| 3744 | 0.25% | 0.00% | 0.00% | 1.00% | 1.00% | 31% | 40% | 30% | 39% | 30% | 39% | 27% | 35% | 37% | 48% | 30% | 30% | 31% | 31% |
| 3745 | 1.00% | 0.25% | 0.00% | 1.00% | 1.00% | 36% | 47% | 35% | 46% | 38% | 49% | 32% | 42% | 42% | 55% | 36% | 36% | 37% | 37% |
| 3746 | 0.00% | 1.00% | 0.00% | 1.00% | 1.00% | 35% | 46% | 36% | 47% | 37% | 48% | 33% | 43% | 45% | 59% | 36% | 36% | 38% | 38% |
| 3747 | 0.25% | 1.00% | 0.00% | 1.00% | 1.00% | 37% | 48% | 37% | 48% | 39% | 51% | 34% | 44% | 46% | 60% | 38% | 38% | 40% | 40% |
| 3748 | 1.00% | 1.00% | 0.00% | 1.00% | 1.00% | 39% | 51% | 38% | 49% | 42% | 55% | 36% | 47% | 48% | 62% | 40% | 40% | 42% | 42% |
| 3749 | 0.00% | 0.00% | 0.25% | 1.00% | 1.00% | 34% | 44% | 33% | 43% | 31% | 40% | 29% | 38% | 39% | 51% | 33% | 33% | 33% | 33% |
| 3750 | 1.00% | 0.00% | 0.25% | 1.00% | 1.00% | 38% | 49% | 35% | 46% | 36% | 47% | 32% | 42% | 42% | 55% | 36% | 36% | 37% | 37% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3751 | 0.25% | 0.25% | 0.25% | 1.00% | 1.00% | 39% | 50% | 38% | 49% | 38% | 49% | 33% | 43% | 43% | 56% | 38% | 38% | 38% | 38% |
| 3752 | 1.00% | 0.25% | 0.25% | 1.00% | 1.00% | 41% | 53% | 39% | 51% | 41% | 53% | 35% | 46% | 45% | 59% | 40% | 40% | 40% | 40% |
| 3753 | 9.00% | 0.25% | 0.25% | 1.00% | 1.00% | 37% | 47% | 37% | 48% | 36% | 47% | 32% | 42% | 42% | 55% | 37% | 37% | 37% | 37% |
| 3754 | 0.00% | 1.00% | 0.25% | 1.00% | 1.00% | 40% | 51% | 40% | 52% | 40% | 52% | 36% | 47% | 48% | 62% | 40% | 40% | 41% | 41% |
| 3755 | 0.25% | 1.00% | 0.25% | 1.00% | 1.00% | 42% | 54% | 41% | 53% | 42% | 55% | 37% | 48% | 49% | 64% | 42% | 42% | 43% | 43% |
| 3756 | 1.00% | 1.00% | 0.25% | 1.00% | 1.00% | 44% | 57% | 42% | 55% | 45% | 59% | 39% | 51% | 51% | 66% | 44% | 44% | 45% | 45% |
| 3757 | 9.00% | 1.00% | 0.25% | 1.00% | 1.00% | 40% | 51% | 40% | 52% | 40% | 52% | 36% | 47% | 48% | 62% | 40% | 40% | 41% | 41% |
| 3758 | 0.25% | 9.00% | 0.25% | 1.00% | 1.00% | 46% | 59% | 45% | 59% | 46% | 60% | 40% | 52% | 55% | 72% | 46% | 46% | 47% | 47% |
| 3759 | 1.00% | 9.00% | 0.25% | 1.00% | 1.00% | 48% | 62% | 46% | 60% | 49% | 64% | 42% | 55% | 57% | 74% | 48% | 48% | 49% | 49% |
| 3760 | 9.00% | 9.00% | 0.25% | 1.00% | 1.00% | 44% | 57% | 44% | 57% | 44% | 57% | 39% | 51% | 54% | 70% | 44% | 44% | 46% | 46% |
| 3761 | 0.00% | 0.00% | 1.00% | 1.00% | 1.00% | 40% | 52% | 41% | 53% | 35% | 46% | 35% | 46% | 47% | 61% | 39% | 39% | 39% | 39% |
| 3762 | 0.25% | 0.00% | 1.00% | 1.00% | 1.00% | 42% | 55% | 42% | 55% | 37% | 48% | 36% | 47% | 48% | 62% | 40% | 40% | 40% | 40% |
| 3763 | 1.00% | 0.00% | 1.00% | 1.00% | 1.00% | 44% | 57% | 43% | 56% | 40% | 52% | 38% | 49% | 50% | 65% | 42% | 42% | 43% | 43% |
| 3764 | 0.00% | 0.25% | 1.00% | 1.00% | 1.00% | 43% | 56% | 45% | 59% | 40% | 52% | 38% | 49% | 50% | 65% | 43% | 43% | 43% | 43% |
| 3765 | 1.00% | 0.25% | 1.00% | 1.00% | 1.00% | 47% | 61% | 47% | 61% | 45% | 59% | 41% | 53% | 53% | 69% | 46% | 46% | 46% | 46% |
| 3766 | 9.00% | 0.25% | 1.00% | 1.00% | 1.00% | 43% | 56% | 45% | 59% | 40% | 52% | 38% | 49% | 50% | 65% | 43% | 43% | 43% | 43% |
| 3767 | 0.00% | 1.00% | 1.00% | 1.00% | 1.00% | 46% | 60% | 48% | 62% | 44% | 57% | 42% | 55% | 56% | 73% | 46% | 46% | 47% | 47% |
| 3768 | 0.25% | 1.00% | 1.00% | 1.00% | 1.00% | 48% | 62% | 49% | 64% | 46% | 60% | 43% | 56% | 57% | 74% | 48% | 48% | 49% | 49% |
| 3769 | 1.00% | 1.00% | 1.00% | 1.00% | 1.00% | 50% | 65% | 50% | 65% | 49% | 64% | 45% | 59% | 59% | 77% | 50% | 50% | 51% | 51% |
| 3770 | 9.00% | 1.00% | 1.00% | 1.00% | 1.00% | 46% | 60% | 48% | 62% | 44% | 57% | 42% | 55% | 56% | 73% | 46% | 46% | 47% | 47% |
| 3771 | 0.00% | 9.00% | 1.00% | 1.00% | 1.00% | 50% | 65% | 52% | 68% | 48% | 62% | 45% | 59% | 62% | 81% | 50% | 50% | 52% | 52% |
| 3772 | 0.25% | 9.00% | 1.00% | 1.00% | 1.00% | 52% | 68% | 53% | 69% | 50% | 65% | 46% | 60% | 63% | 82% | 52% | 52% | 53% | 53% |
| 3773 | 1.00% | 9.00% | 1.00% | 1.00% | 1.00% | 54% | 70% | 54% | 70% | 53% | 69% | 48% | 62% | 65% | 85% | 54% | 54% | 55% | 55% |
| 3774 | 0.25% | 0.25% | 9.00% | 1.00% | 1.00% | 56% | 73% | 59% | 77% | 50% | 65% | 49% | 64% | 65% | 85% | 55% | 55% | 55% | 55% |
| 3775 | 1.00% | 0.25% | 9.00% | 1.00% | 1.00% | 58% | 75% | 60% | 78% | 53% | 69% | 51% | 66% | 67% | 87% | 57% | 57% | 57% | 57% |

Fig. 16

| Formula # | Delta Dodecalactone | Propyl Dihydrojasmolate | Apritone | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3776 | 9.00% | 0.25% | 9.00% | 1.00% | 1.00% | 54% | 70% | 58% | 75% | 48% | 62% | 48% | 62% | 64% | 83% | 53% | 53% | 53% | 53% |
| 3777 | 0.25% | 1.00% | 9.00% | 1.00% | 1.00% | 59% | 77% | 62% | 81% | 54% | 70% | 53% | 69% | 71% | 92% | 58% | 58% | 59% | 59% |
| 3778 | 0.00% | 0.25% | 0.00% | 9.00% | 1.00% | 45% | 59% | 42% | 55% | 43% | 56% | 42% | 55% | 49% | 64% | 43% | 43% | 45% | 45% |
| 3779 | 0.00% | 0.00% | 0.25% | 9.00% | 1.00% | 47% | 60% | 42% | 55% | 41% | 53% | 42% | 55% | 49% | 64% | 43% | 43% | 44% | 44% |
| 3780 | 0.25% | 0.00% | 0.25% | 9.00% | 1.00% | 49% | 63% | 43% | 56% | 43% | 56% | 43% | 56% | 50% | 65% | 45% | 45% | 45% | 45% |
| 3781 | 0.00% | 0.25% | 0.25% | 9.00% | 1.00% | 50% | 64% | 46% | 60% | 46% | 60% | 45% | 59% | 52% | 68% | 47% | 47% | 48% | 48% |
| 3782 | 0.25% | 0.25% | 0.25% | 9.00% | 1.00% | 52% | 67% | 47% | 61% | 48% | 62% | 46% | 60% | 53% | 69% | 49% | 49% | 49% | 49% |
| 3783 | 1.00% | 0.25% | 0.25% | 9.00% | 1.00% | 54% | 70% | 48% | 62% | 51% | 66% | 48% | 62% | 55% | 72% | 51% | 51% | 51% | 51% |
| 3784 | 9.00% | 0.25% | 0.25% | 9.00% | 1.00% | 50% | 64% | 46% | 60% | 46% | 60% | 45% | 59% | 52% | 68% | 47% | 47% | 48% | 48% |
| 3785 | 0.00% | 1.00% | 0.25% | 9.00% | 1.00% | 53% | 68% | 49% | 64% | 50% | 65% | 49% | 64% | 58% | 75% | 51% | 51% | 52% | 52% |
| 3786 | 0.25% | 1.00% | 0.25% | 9.00% | 1.00% | 55% | 71% | 50% | 65% | 52% | 68% | 50% | 65% | 59% | 77% | 52% | 52% | 54% | 54% |
| 3787 | 1.00% | 1.00% | 0.25% | 9.00% | 1.00% | 57% | 73% | 51% | 66% | 55% | 72% | 52% | 68% | 61% | 79% | 54% | 54% | 56% | 56% |
| 3788 | 0.25% | 9.00% | 0.25% | 9.00% | 1.00% | 59% | 76% | 54% | 70% | 56% | 73% | 53% | 69% | 65% | 85% | 56% | 56% | 58% | 58% |
| 3789 | 0.25% | 0.00% | 1.00% | 9.00% | 1.00% | 55% | 72% | 51% | 66% | 47% | 61% | 49% | 64% | 58% | 75% | 51% | 51% | 51% | 51% |
| 3790 | 1.00% | 0.25% | 1.00% | 9.00% | 1.00% | 60% | 78% | 56% | 73% | 55% | 72% | 54% | 70% | 63% | 82% | 57% | 57% | 57% | 57% |
| 3791 | 9.00% | 0.25% | 1.00% | 9.00% | 1.00% | 56% | 73% | 54% | 70% | 50% | 65% | 51% | 66% | 60% | 78% | 53% | 53% | 54% | 54% |
| 3792 | 0.00% | 1.00% | 1.00% | 9.00% | 1.00% | 59% | 77% | 57% | 74% | 54% | 70% | 55% | 72% | 66% | 86% | 57% | 57% | 58% | 58% |
| 3793 | 0.25% | 1.00% | 1.00% | 9.00% | 1.00% | 61% | 79% | 58% | 75% | 56% | 73% | 56% | 73% | 67% | 87% | 58% | 58% | 60% | 60% |
| 3794 | 1.00% | 1.00% | 1.00% | 9.00% | 1.00% | 63% | 82% | 59% | 77% | 59% | 77% | 58% | 75% | 69% | 90% | 60% | 60% | 62% | 62% |
| 3795 | 0.25% | 0.25% | 9.00% | 9.00% | 1.00% | 69% | 90% | 68% | 88% | 60% | 78% | 62% | 81% | 75% | 98% | 66% | 66% | 66% | 66% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3796 | 0.25% | 0.25% | 0.00% | 0.00% | 0.00% | 5% | 7% | 5% | 7% | 7% | 9% | 4% | 5% | 4% | 5% | 6% | 6% | 5% | 5% |
| 3797 | 1.00% | 0.25% | 0.00% | 0.00% | 0.00% | 7% | 9% | 6% | 8% | 10% | 13% | 6% | 8% | 6% | 8% | 8% | 8% | 7% | 7% |
| 3798 | 0.25% | 1.00% | 0.00% | 0.00% | 0.00% | 8% | 10% | 8% | 10% | 11% | 14% | 8% | 10% | 10% | 13% | 9% | 9% | 10% | 10% |
| 3799 | 1.00% | 1.00% | 0.00% | 0.00% | 0.00% | 10% | 13% | 9% | 12% | 14% | 18% | 10% | 13% | 12% | 16% | 11% | 11% | 12% | 12% |
| 3800 | 0.25% | 0.00% | 0.25% | 0.00% | 0.00% | 7% | 8% | 5% | 7% | 5% | 7% | 4% | 5% | 4% | 5% | 6% | 6% | 4% | 4% |
| 3801 | 1.00% | 0.00% | 0.25% | 0.00% | 0.00% | 9% | 11% | 6% | 8% | 8% | 10% | 6% | 8% | 6% | 8% | 8% | 8% | 7% | 7% |
| 3802 | 0.00% | 0.25% | 0.25% | 0.00% | 0.00% | 8% | 10% | 8% | 10% | 8% | 10% | 6% | 8% | 6% | 8% | 8% | 8% | 7% | 7% |
| 3803 | 0.25% | 0.25% | 0.25% | 0.00% | 0.00% | 10% | 12% | 9% | 12% | 10% | 13% | 7% | 9% | 7% | 9% | 10% | 10% | 8% | 8% |
| 3804 | 0.00% | 1.00% | 0.25% | 0.00% | 0.00% | 11% | 14% | 11% | 14% | 12% | 16% | 10% | 13% | 12% | 16% | 11% | 11% | 11% | 11% |
| 3805 | 1.00% | 1.00% | 0.25% | 0.00% | 0.00% | 15% | 19% | 13% | 17% | 17% | 22% | 13% | 17% | 15% | 20% | 15% | 15% | 15% | 15% |
| 3806 | 1.00% | 9.00% | 0.25% | 0.00% | 0.00% | 19% | 24% | 17% | 22% | 21% | 27% | 16% | 21% | 21% | 27% | 19% | 19% | 19% | 19% |
| 3807 | 0.25% | 0.00% | 1.00% | 0.00% | 0.00% | 13% | 17% | 13% | 17% | 9% | 12% | 10% | 13% | 12% | 16% | 12% | 12% | 10% | 10% |
| 3808 | 1.00% | 0.00% | 1.00% | 0.00% | 0.00% | 15% | 20% | 14% | 18% | 12% | 16% | 12% | 16% | 14% | 18% | 14% | 14% | 13% | 13% |
| 3809 | 0.00% | 0.25% | 1.00% | 0.00% | 0.00% | 14% | 18% | 16% | 21% | 12% | 16% | 12% | 16% | 14% | 18% | 14% | 14% | 13% | 13% |
| 3810 | 1.00% | 0.25% | 1.00% | 0.00% | 0.00% | 18% | 23% | 18% | 23% | 17% | 22% | 15% | 20% | 17% | 22% | 18% | 18% | 16% | 16% |
| 3811 | 0.00% | 1.00% | 1.00% | 0.00% | 0.00% | 17% | 22% | 19% | 25% | 16% | 21% | 16% | 21% | 20% | 26% | 17% | 17% | 17% | 17% |
| 3812 | 0.25% | 1.00% | 1.00% | 0.00% | 0.00% | 19% | 25% | 20% | 26% | 18% | 23% | 17% | 22% | 21% | 27% | 19% | 19% | 19% | 19% |
| 3813 | 1.00% | 1.00% | 1.00% | 0.00% | 0.00% | 21% | 27% | 21% | 27% | 21% | 27% | 19% | 25% | 23% | 30% | 21% | 21% | 21% | 21% |
| 3814 | 9.00% | 1.00% | 1.00% | 0.00% | 0.00% | 17% | 22% | 19% | 25% | 16% | 21% | 16% | 21% | 20% | 26% | 17% | 17% | 17% | 17% |
| 3815 | 1.00% | 9.00% | 1.00% | 0.00% | 0.00% | 25% | 33% | 25% | 33% | 25% | 33% | 22% | 29% | 29% | 38% | 25% | 25% | 25% | 25% |
| 3816 | 0.25% | 0.00% | 9.00% | 0.00% | 0.00% | 24% | 31% | 26% | 34% | 17% | 22% | 20% | 26% | 26% | 34% | 22% | 22% | 21% | 21% |
| 3817 | 0.00% | 0.25% | 9.00% | 0.00% | 0.00% | 25% | 33% | 29% | 38% | 20% | 26% | 22% | 29% | 28% | 36% | 25% | 25% | 23% | 23% |
| 3818 | 0.25% | 0.25% | 9.00% | 0.00% | 0.00% | 27% | 35% | 30% | 39% | 22% | 29% | 23% | 30% | 29% | 38% | 26% | 26% | 25% | 25% |
| 3819 | 1.00% | 0.25% | 9.00% | 0.00% | 0.00% | 29% | 38% | 31% | 40% | 25% | 33% | 25% | 33% | 31% | 40% | 28% | 28% | 27% | 27% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3820 | 0.25% | 1.00% | 9.00% | 0.00% | 0.00% | 30% | 39% | 33% | 43% | 26% | 34% | 27% | 35% | 35% | 46% | 30% | 30% | 29% | 29% |
| 3821 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 3822 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 3823 | 0.00% | 0.25% | 0.00% | 0.25% | 0.00% | 11% | 14% | 12% | 16% | 14% | 18% | 10% | 13% | 10% | 13% | 12% | 12% | 11% | 11% |
| 3824 | 0.25% | 0.25% | 0.00% | 0.25% | 0.00% | 13% | 17% | 13% | 17% | 16% | 21% | 11% | 14% | 11% | 14% | 14% | 14% | 13% | 13% |
| 3825 | 9.00% | 0.25% | 0.00% | 0.25% | 0.00% | 11% | 14% | 12% | 16% | 14% | 18% | 10% | 13% | 10% | 13% | 12% | 12% | 11% | 11% |
| 3826 | 1.00% | 1.00% | 0.00% | 0.25% | 0.00% | 18% | 23% | 17% | 22% | 23% | 30% | 17% | 22% | 19% | 25% | 19% | 19% | 20% | 20% |
| 3827 | 1.00% | 9.00% | 0.00% | 0.25% | 0.00% | 22% | 29% | 21% | 27% | 27% | 35% | 20% | 26% | 25% | 33% | 23% | 23% | 24% | 24% |
| 3828 | 0.00% | 0.00% | 0.25% | 0.25% | 0.00% | 13% | 16% | 12% | 16% | 12% | 16% | 10% | 13% | 10% | 13% | 12% | 12% | 11% | 11% |
| 3829 | 0.25% | 0.00% | 0.25% | 0.25% | 0.00% | 15% | 19% | 13% | 17% | 14% | 18% | 11% | 14% | 11% | 14% | 14% | 14% | 12% | 12% |
| 3830 | 0.00% | 0.25% | 0.25% | 0.25% | 0.00% | 16% | 20% | 16% | 21% | 17% | 22% | 13% | 17% | 13% | 17% | 16% | 16% | 14% | 14% |
| 3831 | 0.25% | 0.25% | 0.25% | 0.25% | 0.00% | 18% | 23% | 17% | 22% | 19% | 25% | 14% | 18% | 14% | 18% | 18% | 18% | 16% | 16% |
| 3832 | 1.00% | 0.25% | 0.25% | 0.25% | 0.00% | 20% | 25% | 18% | 23% | 22% | 29% | 16% | 21% | 16% | 21% | 20% | 20% | 18% | 18% |
| 3833 | 9.00% | 0.25% | 0.25% | 0.25% | 0.00% | 16% | 20% | 16% | 21% | 17% | 22% | 13% | 17% | 13% | 17% | 16% | 16% | 14% | 14% |
| 3834 | 0.25% | 1.00% | 0.25% | 0.25% | 0.00% | 21% | 27% | 20% | 26% | 23% | 30% | 18% | 23% | 20% | 26% | 21% | 21% | 20% | 20% |
| 3835 | 9.00% | 1.00% | 0.25% | 0.25% | 0.00% | 19% | 24% | 19% | 25% | 21% | 27% | 17% | 22% | 19% | 25% | 20% | 20% | 19% | 19% |
| 3836 | 0.25% | 9.00% | 0.25% | 0.25% | 0.00% | 25% | 32% | 24% | 31% | 27% | 35% | 21% | 27% | 26% | 34% | 25% | 25% | 25% | 25% |
| 3837 | 1.00% | 9.00% | 0.25% | 0.25% | 0.00% | 27% | 34% | 25% | 33% | 30% | 39% | 23% | 30% | 28% | 36% | 27% | 27% | 27% | 27% |
| 3838 | 9.00% | 9.00% | 0.25% | 0.25% | 0.00% | 23% | 29% | 23% | 30% | 25% | 33% | 20% | 26% | 25% | 33% | 24% | 24% | 23% | 23% |
| 3839 | 0.00% | 0.00% | 1.00% | 0.25% | 0.00% | 19% | 25% | 20% | 26% | 16% | 21% | 16% | 21% | 18% | 23% | 18% | 18% | 17% | 17% |
| 3840 | 1.00% | 0.00% | 1.00% | 0.25% | 0.00% | 23% | 30% | 22% | 29% | 21% | 27% | 19% | 25% | 21% | 27% | 22% | 22% | 20% | 20% |
| 3841 | 0.00% | 0.25% | 1.00% | 0.25% | 0.00% | 22% | 29% | 24% | 31% | 21% | 27% | 19% | 25% | 21% | 27% | 22% | 22% | 20% | 20% |
| 3842 | 0.25% | 0.25% | 1.00% | 0.25% | 0.00% | 24% | 31% | 25% | 33% | 23% | 30% | 20% | 26% | 22% | 29% | 24% | 24% | 22% | 22% |
| 3843 | 1.00% | 0.25% | 1.00% | 0.25% | 0.00% | 26% | 34% | 26% | 34% | 26% | 34% | 22% | 29% | 24% | 31% | 26% | 26% | 24% | 24% |
| 3844 | 9.00% | 0.25% | 1.00% | 0.25% | 0.00% | 22% | 29% | 24% | 31% | 21% | 27% | 19% | 25% | 21% | 27% | 22% | 22% | 20% | 20% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3845 | 0.00% | 1.00% | 1.00% | 0.25% | 0.00% | 25% | 33% | 27% | 35% | 25% | 33% | 23% | 30% | 27% | 35% | 26% | 26% | 25% | 25% |
| 3846 | 0.25% | 1.00% | 1.00% | 0.25% | 0.00% | 27% | 35% | 28% | 36% | 27% | 35% | 24% | 31% | 28% | 36% | 27% | 27% | 26% | 26% |
| 3847 | 1.00% | 1.00% | 1.00% | 0.25% | 0.00% | 29% | 38% | 29% | 38% | 30% | 39% | 26% | 34% | 30% | 39% | 29% | 29% | 29% | 29% |
| 3848 | 9.00% | 1.00% | 1.00% | 0.25% | 0.00% | 25% | 33% | 27% | 35% | 25% | 33% | 23% | 30% | 27% | 35% | 26% | 26% | 25% | 25% |
| 3849 | 0.00% | 9.00% | 1.00% | 0.25% | 0.00% | 29% | 38% | 31% | 40% | 29% | 38% | 26% | 34% | 33% | 43% | 30% | 30% | 29% | 29% |
| 3850 | 0.25% | 9.00% | 1.00% | 0.25% | 0.00% | 31% | 40% | 32% | 42% | 31% | 40% | 27% | 35% | 34% | 44% | 31% | 31% | 31% | 31% |
| 3851 | 1.00% | 9.00% | 1.00% | 0.25% | 0.00% | 33% | 43% | 33% | 43% | 34% | 44% | 29% | 38% | 36% | 47% | 33% | 33% | 33% | 33% |
| 3852 | 0.25% | 0.25% | 9.00% | 0.25% | 0.00% | 35% | 46% | 38% | 49% | 31% | 40% | 30% | 39% | 36% | 47% | 35% | 35% | 32% | 32% |
| 3853 | 1.00% | 0.25% | 9.00% | 0.25% | 0.00% | 37% | 48% | 39% | 51% | 34% | 44% | 32% | 42% | 38% | 49% | 37% | 37% | 35% | 35% |
| 3854 | 9.00% | 0.25% | 9.00% | 0.25% | 0.00% | 33% | 43% | 37% | 48% | 29% | 38% | 29% | 38% | 35% | 46% | 33% | 33% | 31% | 31% |
| 3855 | 0.00% | 1.00% | 9.00% | 0.25% | 0.00% | 36% | 47% | 40% | 52% | 33% | 43% | 33% | 43% | 41% | 53% | 36% | 36% | 36% | 36% |
| 3856 | 0.25% | 1.00% | 9.00% | 0.25% | 0.00% | 38% | 49% | 41% | 53% | 35% | 46% | 34% | 44% | 42% | 55% | 38% | 38% | 37% | 37% |
| 3857 | 9.00% | 1.00% | 9.00% | 0.25% | 0.00% | 36% | 47% | 40% | 52% | 33% | 43% | 33% | 43% | 41% | 53% | 36% | 36% | 36% | 36% |
| 3858 | 1.00% | 9.00% | 9.00% | 0.25% | 0.00% | 44% | 57% | 46% | 60% | 42% | 55% | 39% | 51% | 50% | 65% | 44% | 44% | 44% | 44% |
| 3859 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 3860 | 1.00% | 0.25% | 0.00% | 1.00% | 0.00% | 32% | 42% | 27% | 35% | 32% | 42% | 28% | 36% | 26% | 34% | 30% | 30% | 29% | 29% |
| 3861 | 0.00% | 1.00% | 0.00% | 1.00% | 0.00% | 31% | 40% | 28% | 36% | 31% | 40% | 29% | 38% | 29% | 38% | 30% | 30% | 30% | 30% |
| 3862 | 0.25% | 1.00% | 0.00% | 1.00% | 0.00% | 33% | 43% | 29% | 38% | 33% | 43% | 30% | 39% | 30% | 39% | 32% | 32% | 31% | 31% |
| 3863 | 1.00% | 1.00% | 0.00% | 1.00% | 0.00% | 35% | 46% | 30% | 39% | 36% | 47% | 32% | 42% | 32% | 42% | 34% | 34% | 33% | 33% |
| 3864 | 0.00% | 0.00% | 0.25% | 1.00% | 0.00% | 30% | 38% | 25% | 33% | 25% | 33% | 25% | 33% | 23% | 30% | 27% | 27% | 24% | 24% |
| 3865 | 1.00% | 0.00% | 0.25% | 1.00% | 0.00% | 34% | 44% | 27% | 35% | 30% | 39% | 28% | 36% | 26% | 34% | 30% | 30% | 28% | 28% |
| 3866 | 0.25% | 0.25% | 0.25% | 1.00% | 0.00% | 35% | 45% | 30% | 39% | 32% | 42% | 29% | 38% | 27% | 35% | 32% | 32% | 29% | 29% |
| 3867 | 1.00% | 0.25% | 0.25% | 1.00% | 0.00% | 37% | 47% | 31% | 40% | 35% | 46% | 31% | 40% | 29% | 38% | 34% | 34% | 32% | 32% |
| 3868 | 9.00% | 0.25% | 0.25% | 1.00% | 0.00% | 33% | 42% | 29% | 38% | 30% | 39% | 28% | 36% | 26% | 34% | 31% | 31% | 28% | 28% |
| 3869 | 0.00% | 1.00% | 0.25% | 1.00% | 0.00% | 36% | 46% | 32% | 42% | 34% | 44% | 32% | 42% | 32% | 42% | 34% | 34% | 33% | 33% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3870 | 0.25% | 1.00% | 0.25% | 1.00% | 0.00% | 38% | 49% | 33% | 43% | 36% | 47% | 33% | 43% | 33% | 43% | 36% | 36% | 34% | 34% |
| 3871 | 1.00% | 1.00% | 0.25% | 1.00% | 0.00% | 40% | 51% | 34% | 44% | 39% | 51% | 35% | 46% | 35% | 46% | 38% | 38% | 36% | 36% |
| 3872 | 9.00% | 1.00% | 0.25% | 1.00% | 0.00% | 36% | 46% | 32% | 42% | 34% | 44% | 32% | 42% | 32% | 42% | 34% | 34% | 33% | 33% |
| 3873 | 0.25% | 9.00% | 0.25% | 1.00% | 0.00% | 42% | 54% | 37% | 48% | 40% | 52% | 36% | 47% | 39% | 51% | 40% | 40% | 38% | 38% |
| 3874 | 1.00% | 9.00% | 0.25% | 1.00% | 0.00% | 44% | 57% | 38% | 49% | 43% | 56% | 38% | 49% | 41% | 53% | 42% | 42% | 41% | 41% |
| 3875 | 9.00% | 9.00% | 0.25% | 1.00% | 0.00% | 40% | 51% | 36% | 47% | 38% | 49% | 35% | 46% | 38% | 49% | 38% | 38% | 37% | 37% |
| 3876 | 0.00% | 0.00% | 1.00% | 1.00% | 0.00% | 36% | 47% | 33% | 43% | 29% | 38% | 31% | 40% | 31% | 40% | 33% | 33% | 30% | 30% |
| 3877 | 0.25% | 0.00% | 1.00% | 1.00% | 0.00% | 38% | 49% | 34% | 44% | 31% | 40% | 32% | 42% | 32% | 42% | 34% | 34% | 32% | 32% |
| 3878 | 1.00% | 0.00% | 1.00% | 1.00% | 0.00% | 40% | 52% | 35% | 46% | 34% | 44% | 34% | 44% | 34% | 44% | 36% | 36% | 34% | 34% |
| 3879 | 0.00% | 0.25% | 1.00% | 1.00% | 0.00% | 39% | 51% | 37% | 48% | 34% | 44% | 34% | 44% | 34% | 44% | 37% | 37% | 34% | 34% |
| 3880 | 1.00% | 0.25% | 1.00% | 1.00% | 0.00% | 43% | 56% | 39% | 51% | 39% | 51% | 37% | 48% | 37% | 48% | 40% | 40% | 38% | 38% |
| 3881 | 9.00% | 0.25% | 1.00% | 1.00% | 0.00% | 39% | 51% | 37% | 48% | 34% | 44% | 34% | 44% | 34% | 44% | 37% | 37% | 34% | 34% |
| 3882 | 0.00% | 1.00% | 1.00% | 1.00% | 0.00% | 42% | 55% | 40% | 52% | 38% | 49% | 38% | 49% | 40% | 52% | 40% | 40% | 39% | 39% |
| 3883 | 0.25% | 1.00% | 1.00% | 1.00% | 0.00% | 44% | 57% | 41% | 53% | 40% | 52% | 39% | 51% | 41% | 53% | 42% | 42% | 40% | 40% |
| 3884 | 1.00% | 1.00% | 1.00% | 1.00% | 0.00% | 46% | 60% | 42% | 55% | 43% | 56% | 41% | 53% | 43% | 56% | 44% | 44% | 42% | 42% |
| 3885 | 9.00% | 1.00% | 1.00% | 1.00% | 0.00% | 42% | 55% | 40% | 52% | 38% | 49% | 38% | 49% | 40% | 52% | 40% | 40% | 39% | 39% |
| 3886 | 0.00% | 9.00% | 1.00% | 1.00% | 0.00% | 46% | 60% | 44% | 57% | 42% | 55% | 41% | 53% | 46% | 60% | 44% | 44% | 43% | 43% |
| 3887 | 0.25% | 9.00% | 1.00% | 1.00% | 0.00% | 48% | 62% | 45% | 59% | 44% | 57% | 42% | 55% | 47% | 61% | 46% | 46% | 44% | 44% |
| 3888 | 1.00% | 9.00% | 1.00% | 1.00% | 0.00% | 50% | 65% | 46% | 60% | 47% | 61% | 44% | 57% | 49% | 64% | 48% | 48% | 47% | 47% |
| 3889 | 0.25% | 0.25% | 9.00% | 1.00% | 0.00% | 52% | 68% | 51% | 66% | 44% | 57% | 45% | 59% | 49% | 64% | 49% | 49% | 46% | 46% |
| 3890 | 1.00% | 0.25% | 9.00% | 1.00% | 0.00% | 54% | 70% | 52% | 68% | 47% | 61% | 47% | 61% | 51% | 66% | 51% | 51% | 48% | 48% |
| 3891 | 9.00% | 0.25% | 9.00% | 1.00% | 0.00% | 50% | 65% | 50% | 65% | 42% | 55% | 44% | 57% | 48% | 62% | 47% | 47% | 45% | 45% |
| 3892 | 0.25% | 1.00% | 9.00% | 1.00% | 0.00% | 55% | 72% | 54% | 70% | 48% | 62% | 49% | 64% | 55% | 72% | 52% | 52% | 51% | 51% |
| 3893 | 0.00% | 0.25% | 0.00% | 9.00% | 0.00% | 45% | 59% | 39% | 51% | 39% | 51% | 41% | 53% | 37% | 48% | 41% | 41% | 39% | 39% |
| 3894 | 0.00% | 0.00% | 0.25% | 9.00% | 0.00% | 47% | 60% | 39% | 51% | 37% | 48% | 41% | 53% | 37% | 48% | 41% | 41% | 38% | 38% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3895 | 0.25% | 0.00% | 0.25% | 9.00% | 0.00% | 49% | 63% | 40% | 52% | 39% | 51% | 42% | 55% | 38% | 49% | 43% | 43% | 40% | 40% |
| 3896 | 0.00% | 0.25% | 0.25% | 9.00% | 0.00% | 50% | 64% | 43% | 56% | 42% | 55% | 44% | 57% | 40% | 52% | 45% | 45% | 42% | 42% |
| 3897 | 0.25% | 0.25% | 0.25% | 9.00% | 0.00% | 52% | 67% | 44% | 57% | 44% | 57% | 45% | 59% | 41% | 53% | 47% | 47% | 43% | 43% |
| 3898 | 1.00% | 0.25% | 0.25% | 9.00% | 0.00% | 54% | 70% | 45% | 59% | 47% | 61% | 47% | 61% | 43% | 56% | 49% | 49% | 46% | 46% |
| 3899 | 9.00% | 0.25% | 0.25% | 9.00% | 0.00% | 50% | 64% | 43% | 56% | 42% | 55% | 44% | 57% | 40% | 52% | 45% | 45% | 42% | 42% |
| 3900 | 0.00% | 1.00% | 0.25% | 9.00% | 0.00% | 53% | 68% | 46% | 60% | 46% | 60% | 48% | 62% | 46% | 60% | 48% | 48% | 47% | 47% |
| 3901 | 0.25% | 1.00% | 0.25% | 9.00% | 0.00% | 55% | 71% | 47% | 61% | 48% | 62% | 49% | 64% | 47% | 61% | 50% | 50% | 48% | 48% |
| 3902 | 1.00% | 1.00% | 0.25% | 9.00% | 0.00% | 57% | 73% | 48% | 62% | 51% | 66% | 51% | 66% | 49% | 64% | 52% | 52% | 50% | 50% |
| 3903 | 0.25% | 9.00% | 0.25% | 9.00% | 0.00% | 59% | 76% | 51% | 66% | 52% | 68% | 52% | 68% | 53% | 69% | 54% | 54% | 52% | 52% |
| 3904 | 0.25% | 0.00% | 1.00% | 9.00% | 0.00% | 55% | 72% | 48% | 62% | 43% | 56% | 48% | 62% | 46% | 60% | 49% | 49% | 46% | 46% |
| 3905 | 1.00% | 0.25% | 1.00% | 9.00% | 0.00% | 60% | 78% | 53% | 69% | 51% | 66% | 53% | 69% | 51% | 66% | 55% | 55% | 52% | 52% |
| 3906 | 9.00% | 0.25% | 1.00% | 9.00% | 0.00% | 56% | 73% | 51% | 66% | 46% | 60% | 50% | 65% | 48% | 62% | 51% | 51% | 48% | 48% |
| 3907 | 0.00% | 1.00% | 1.00% | 9.00% | 0.00% | 59% | 77% | 54% | 70% | 50% | 65% | 54% | 70% | 54% | 70% | 54% | 54% | 53% | 53% |
| 3908 | 0.25% | 1.00% | 1.00% | 9.00% | 0.00% | 61% | 79% | 55% | 72% | 52% | 68% | 55% | 72% | 55% | 72% | 56% | 56% | 54% | 54% |
| 3909 | 1.00% | 1.00% | 1.00% | 9.00% | 0.00% | 63% | 82% | 56% | 73% | 55% | 72% | 57% | 74% | 57% | 74% | 58% | 58% | 56% | 56% |
| 3910 | 0.25% | 0.25% | 9.00% | 9.00% | 0.00% | 69% | 90% | 65% | 85% | 56% | 73% | 61% | 79% | 63% | 82% | 63% | 63% | 60% | 60% |
| 3911 | 0.25% | 0.25% | 0.00% | 0.00% | 0.25% | 12% | 16% | 12% | 16% | 14% | 18% | 12% | 16% | 12% | 16% | 13% | 13% | 13% | 13% |
| 3912 | 1.00% | 0.25% | 0.00% | 0.00% | 0.25% | 14% | 18% | 13% | 17% | 17% | 22% | 14% | 18% | 14% | 18% | 15% | 15% | 15% | 15% |
| 3913 | 0.25% | 1.00% | 0.00% | 0.00% | 0.25% | 15% | 20% | 15% | 20% | 18% | 23% | 16% | 21% | 18% | 23% | 16% | 16% | 17% | 17% |
| 3914 | 1.00% | 1.00% | 0.00% | 0.00% | 0.25% | 17% | 22% | 16% | 21% | 21% | 27% | 18% | 23% | 20% | 26% | 18% | 18% | 20% | 20% |
| 3915 | 0.25% | 0.00% | 0.25% | 0.00% | 0.25% | 14% | 18% | 12% | 16% | 12% | 16% | 12% | 16% | 12% | 16% | 13% | 13% | 12% | 12% |
| 3916 | 1.00% | 0.00% | 0.25% | 0.00% | 0.25% | 16% | 20% | 13% | 17% | 15% | 20% | 14% | 18% | 14% | 18% | 15% | 15% | 14% | 14% |
| 3917 | 0.00% | 0.25% | 0.25% | 0.00% | 0.25% | 15% | 19% | 15% | 20% | 15% | 20% | 14% | 18% | 14% | 18% | 15% | 15% | 14% | 14% |
| 3918 | 0.25% | 0.25% | 0.25% | 0.00% | 0.25% | 17% | 21% | 16% | 21% | 17% | 22% | 15% | 20% | 15% | 20% | 17% | 17% | 16% | 16% |
| 3919 | 0.00% | 1.00% | 0.25% | 0.00% | 0.25% | 18% | 23% | 18% | 23% | 19% | 25% | 18% | 23% | 20% | 26% | 18% | 18% | 19% | 19% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3920 | 1.00% | 1.00% | 0.25% | 0.00% | 0.25% | 22% | 28% | 20% | 26% | 24% | 31% | 21% | 27% | 23% | 30% | 22% | 22% | 23% | 23% |
| 3921 | 1.00% | 9.00% | 0.25% | 0.00% | 0.25% | 26% | 33% | 24% | 31% | 28% | 36% | 24% | 31% | 29% | 38% | 26% | 26% | 27% | 27% |
| 3922 | 0.25% | 0.00% | 1.00% | 0.00% | 0.25% | 20% | 26% | 20% | 26% | 16% | 21% | 18% | 23% | 20% | 26% | 19% | 19% | 18% | 18% |
| 3923 | 1.00% | 0.00% | 1.00% | 0.00% | 0.25% | 22% | 29% | 21% | 27% | 19% | 25% | 20% | 26% | 22% | 29% | 21% | 21% | 20% | 20% |
| 3924 | 0.00% | 0.25% | 1.00% | 0.00% | 0.25% | 21% | 27% | 23% | 30% | 19% | 25% | 20% | 26% | 22% | 29% | 21% | 21% | 20% | 20% |
| 3925 | 1.00% | 0.25% | 1.00% | 0.00% | 0.25% | 25% | 33% | 25% | 33% | 24% | 31% | 23% | 30% | 25% | 33% | 25% | 25% | 24% | 24% |
| 3926 | 0.00% | 1.00% | 1.00% | 0.00% | 0.25% | 24% | 31% | 26% | 34% | 23% | 30% | 24% | 31% | 28% | 36% | 24% | 24% | 25% | 25% |
| 3927 | 0.25% | 1.00% | 1.00% | 0.00% | 0.25% | 26% | 34% | 27% | 35% | 25% | 33% | 25% | 33% | 29% | 38% | 26% | 26% | 26% | 26% |
| 3928 | 1.00% | 1.00% | 1.00% | 0.00% | 0.25% | 28% | 36% | 28% | 36% | 28% | 36% | 27% | 35% | 31% | 40% | 28% | 28% | 29% | 29% |
| 3929 | 9.00% | 1.00% | 1.00% | 0.00% | 0.25% | 24% | 31% | 26% | 34% | 23% | 30% | 24% | 31% | 28% | 36% | 24% | 24% | 25% | 25% |
| 3930 | 1.00% | 9.00% | 1.00% | 0.00% | 0.25% | 32% | 42% | 32% | 42% | 32% | 42% | 30% | 39% | 37% | 48% | 32% | 32% | 33% | 33% |
| 3931 | 0.25% | 0.00% | 9.00% | 0.00% | 0.25% | 31% | 40% | 33% | 43% | 24% | 31% | 28% | 36% | 34% | 44% | 29% | 29% | 29% | 29% |
| 3932 | 0.00% | 0.25% | 9.00% | 0.00% | 0.25% | 32% | 42% | 36% | 47% | 27% | 35% | 30% | 39% | 36% | 47% | 32% | 32% | 31% | 31% |
| 3933 | 0.25% | 0.25% | 9.00% | 0.00% | 0.25% | 34% | 44% | 37% | 48% | 29% | 38% | 31% | 40% | 37% | 48% | 33% | 33% | 32% | 32% |
| 3934 | 1.00% | 0.25% | 9.00% | 0.00% | 0.25% | 36% | 47% | 38% | 49% | 32% | 42% | 33% | 43% | 39% | 51% | 35% | 35% | 35% | 35% |
| 3935 | 0.25% | 1.00% | 9.00% | 0.00% | 0.25% | 37% | 48% | 40% | 52% | 33% | 43% | 35% | 46% | 43% | 56% | 37% | 37% | 37% | 37% |
| 3936 | 0.25% | 0.00% | 0.00% | 0.25% | 0.25% | 17% | 22% | 16% | 21% | 18% | 23% | 16% | 21% | 16% | 21% | 17% | 17% | 17% | 17% |
| 3937 | 1.00% | 0.00% | 0.00% | 0.25% | 0.25% | 19% | 25% | 17% | 22% | 21% | 27% | 18% | 23% | 18% | 23% | 19% | 19% | 19% | 19% |
| 3938 | 0.00% | 0.25% | 0.00% | 0.25% | 0.25% | 18% | 23% | 19% | 25% | 21% | 27% | 18% | 23% | 18% | 23% | 19% | 19% | 19% | 19% |
| 3939 | 0.25% | 0.25% | 0.00% | 0.25% | 0.25% | 20% | 26% | 20% | 26% | 23% | 30% | 19% | 25% | 19% | 25% | 21% | 21% | 20% | 20% |
| 3940 | 9.00% | 0.25% | 0.00% | 0.25% | 0.25% | 18% | 23% | 19% | 25% | 21% | 27% | 18% | 23% | 18% | 23% | 19% | 19% | 19% | 19% |
| 3941 | 1.00% | 1.00% | 0.00% | 0.25% | 0.25% | 25% | 33% | 24% | 31% | 30% | 39% | 25% | 33% | 27% | 35% | 26% | 26% | 27% | 27% |
| 3942 | 1.00% | 9.00% | 0.00% | 0.25% | 0.25% | 29% | 38% | 28% | 36% | 34% | 44% | 28% | 36% | 33% | 43% | 30% | 30% | 32% | 32% |
| 3943 | 0.00% | 0.00% | 0.25% | 0.25% | 0.25% | 20% | 25% | 19% | 25% | 19% | 25% | 18% | 23% | 18% | 23% | 19% | 19% | 18% | 18% |
| 3944 | 0.25% | 0.00% | 0.25% | 0.25% | 0.25% | 22% | 28% | 20% | 26% | 21% | 27% | 19% | 25% | 19% | 25% | 21% | 21% | 20% | 20% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3945 | 0.00% | 0.25% | 0.25% | 0.25% | 0.25% | 23% | 29% | 23% | 30% | 24% | 31% | 21% | 27% | 21% | 27% | 23% | 23% | 22% | 22% |
| 3946 | 0.25% | 0.25% | 0.25% | 0.25% | 0.25% | 25% | 32% | 24% | 31% | 26% | 34% | 22% | 29% | 22% | 29% | 25% | 25% | 23% | 23% |
| 3947 | 1.00% | 0.25% | 0.25% | 0.25% | 0.25% | 27% | 34% | 25% | 33% | 29% | 38% | 24% | 31% | 24% | 31% | 27% | 27% | 26% | 26% |
| 3948 | 9.00% | 0.25% | 0.25% | 0.25% | 0.25% | 23% | 29% | 23% | 30% | 24% | 31% | 21% | 27% | 21% | 27% | 23% | 23% | 22% | 22% |
| 3949 | 0.25% | 1.00% | 0.25% | 0.25% | 0.25% | 28% | 36% | 27% | 35% | 30% | 39% | 26% | 34% | 28% | 36% | 28% | 28% | 28% | 28% |
| 3950 | 9.00% | 1.00% | 0.25% | 0.25% | 0.25% | 26% | 33% | 26% | 34% | 28% | 36% | 25% | 33% | 27% | 35% | 27% | 27% | 27% | 27% |
| 3951 | 0.25% | 9.00% | 0.25% | 0.25% | 0.25% | 32% | 41% | 31% | 40% | 34% | 44% | 29% | 38% | 34% | 44% | 32% | 32% | 32% | 32% |
| 3952 | 1.00% | 9.00% | 0.25% | 0.25% | 0.25% | 34% | 44% | 32% | 42% | 37% | 48% | 31% | 40% | 36% | 47% | 34% | 34% | 35% | 35% |
| 3953 | 9.00% | 9.00% | 0.25% | 0.25% | 0.25% | 30% | 38% | 30% | 39% | 32% | 42% | 28% | 36% | 33% | 43% | 31% | 31% | 31% | 31% |
| 3954 | 0.00% | 0.00% | 1.00% | 0.25% | 0.25% | 26% | 34% | 27% | 35% | 23% | 30% | 24% | 31% | 26% | 34% | 25% | 25% | 24% | 24% |
| 3955 | 1.00% | 0.00% | 1.00% | 0.25% | 0.25% | 30% | 39% | 29% | 38% | 28% | 36% | 27% | 35% | 29% | 38% | 29% | 29% | 28% | 28% |
| 3956 | 0.00% | 0.25% | 1.00% | 0.25% | 0.25% | 29% | 38% | 31% | 40% | 28% | 36% | 27% | 35% | 29% | 38% | 29% | 29% | 28% | 28% |
| 3957 | 0.25% | 0.25% | 1.00% | 0.25% | 0.25% | 31% | 40% | 32% | 42% | 30% | 39% | 28% | 36% | 30% | 39% | 31% | 31% | 29% | 29% |
| 3958 | 1.00% | 0.25% | 1.00% | 0.25% | 0.25% | 33% | 43% | 33% | 43% | 33% | 43% | 30% | 39% | 32% | 42% | 33% | 33% | 32% | 32% |
| 3959 | 9.00% | 0.25% | 1.00% | 0.25% | 0.25% | 29% | 38% | 31% | 40% | 28% | 36% | 27% | 35% | 29% | 38% | 29% | 29% | 28% | 28% |
| 3960 | 0.00% | 1.00% | 1.00% | 0.25% | 0.25% | 32% | 42% | 34% | 44% | 32% | 42% | 31% | 40% | 35% | 46% | 33% | 33% | 33% | 33% |
| 3961 | 0.25% | 1.00% | 1.00% | 0.25% | 0.25% | 34% | 44% | 35% | 46% | 34% | 44% | 32% | 42% | 36% | 47% | 34% | 34% | 34% | 34% |
| 3962 | 1.00% | 1.00% | 1.00% | 0.25% | 0.25% | 36% | 47% | 36% | 47% | 37% | 48% | 34% | 44% | 38% | 49% | 36% | 36% | 36% | 36% |
| 3963 | 9.00% | 1.00% | 1.00% | 0.25% | 0.25% | 32% | 42% | 34% | 44% | 32% | 42% | 31% | 40% | 35% | 46% | 33% | 33% | 33% | 33% |
| 3964 | 0.00% | 9.00% | 1.00% | 0.25% | 0.25% | 36% | 47% | 38% | 49% | 36% | 47% | 34% | 44% | 41% | 53% | 37% | 37% | 37% | 37% |
| 3965 | 0.25% | 9.00% | 1.00% | 0.25% | 0.25% | 38% | 49% | 39% | 51% | 38% | 49% | 35% | 46% | 42% | 55% | 38% | 38% | 38% | 38% |
| 3966 | 1.00% | 9.00% | 1.00% | 0.25% | 0.25% | 40% | 52% | 40% | 52% | 41% | 53% | 37% | 48% | 44% | 57% | 40% | 40% | 41% | 41% |
| 3967 | 0.25% | 0.25% | 9.00% | 0.25% | 0.25% | 42% | 55% | 45% | 59% | 38% | 49% | 38% | 49% | 44% | 57% | 42% | 42% | 40% | 40% |
| 3968 | 1.00% | 0.25% | 9.00% | 0.25% | 0.25% | 44% | 57% | 46% | 60% | 41% | 53% | 40% | 52% | 46% | 60% | 44% | 44% | 42% | 42% |
| 3969 | 9.00% | 0.25% | 9.00% | 0.25% | 0.25% | 40% | 52% | 44% | 57% | 36% | 47% | 37% | 48% | 43% | 56% | 40% | 40% | 39% | 39% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3970 | 0.00% | 1.00% | 9.00% | 0.25% | 0.25% | 43% | 56% | 47% | 61% | 40% | 52% | 41% | 53% | 49% | 64% | 43% | 43% | 43% | 43% |
| 3971 | 0.25% | 1.00% | 9.00% | 0.25% | 0.25% | 45% | 59% | 48% | 62% | 42% | 55% | 42% | 55% | 50% | 65% | 45% | 45% | 45% | 45% |
| 3972 | 9.00% | 1.00% | 9.00% | 0.25% | 0.25% | 43% | 56% | 47% | 61% | 40% | 52% | 41% | 53% | 49% | 64% | 43% | 43% | 43% | 43% |
| 3973 | 1.00% | 9.00% | 9.00% | 0.25% | 0.25% | 51% | 66% | 53% | 69% | 49% | 64% | 47% | 61% | 58% | 75% | 51% | 51% | 51% | 51% |
| 3974 | 0.25% | 0.00% | 0.00% | 1.00% | 0.25% | 34% | 44% | 29% | 38% | 31% | 40% | 31% | 40% | 29% | 38% | 31% | 31% | 30% | 30% |
| 3975 | 1.00% | 0.25% | 0.00% | 1.00% | 0.25% | 39% | 51% | 34% | 44% | 39% | 51% | 36% | 47% | 34% | 44% | 37% | 37% | 36% | 36% |
| 3976 | 0.00% | 1.00% | 0.00% | 1.00% | 0.25% | 38% | 49% | 35% | 46% | 38% | 49% | 37% | 48% | 37% | 48% | 37% | 37% | 37% | 37% |
| 3977 | 0.25% | 1.00% | 0.00% | 1.00% | 0.25% | 40% | 52% | 36% | 47% | 40% | 52% | 38% | 49% | 38% | 49% | 39% | 39% | 39% | 39% |
| 3978 | 1.00% | 1.00% | 0.00% | 1.00% | 0.25% | 42% | 55% | 37% | 48% | 43% | 56% | 40% | 52% | 40% | 52% | 41% | 41% | 41% | 41% |
| 3979 | 0.00% | 0.00% | 0.25% | 1.00% | 0.25% | 37% | 47% | 32% | 42% | 32% | 42% | 33% | 43% | 31% | 40% | 34% | 34% | 32% | 32% |
| 3980 | 1.00% | 0.00% | 0.25% | 1.00% | 0.25% | 41% | 53% | 34% | 44% | 37% | 48% | 36% | 47% | 34% | 44% | 37% | 37% | 36% | 36% |
| 3981 | 0.25% | 0.25% | 0.25% | 1.00% | 0.25% | 42% | 54% | 37% | 48% | 39% | 51% | 37% | 48% | 35% | 46% | 39% | 39% | 37% | 37% |
| 3982 | 1.00% | 0.25% | 0.25% | 1.00% | 0.25% | 44% | 57% | 38% | 49% | 42% | 55% | 39% | 51% | 37% | 48% | 41% | 41% | 39% | 39% |
| 3983 | 9.00% | 0.25% | 0.25% | 1.00% | 0.25% | 40% | 51% | 36% | 47% | 37% | 48% | 36% | 47% | 34% | 44% | 38% | 38% | 36% | 36% |
| 3984 | 0.00% | 1.00% | 0.25% | 1.00% | 0.25% | 43% | 55% | 39% | 51% | 41% | 53% | 40% | 52% | 40% | 52% | 41% | 41% | 40% | 40% |
| 3985 | 0.25% | 1.00% | 0.25% | 1.00% | 0.25% | 45% | 58% | 40% | 52% | 43% | 56% | 41% | 53% | 41% | 53% | 43% | 43% | 42% | 42% |
| 3986 | 1.00% | 1.00% | 0.25% | 1.00% | 0.25% | 47% | 60% | 41% | 53% | 46% | 60% | 43% | 56% | 43% | 56% | 45% | 45% | 44% | 44% |
| 3987 | 9.00% | 1.00% | 0.25% | 1.00% | 0.25% | 43% | 55% | 39% | 51% | 41% | 53% | 40% | 52% | 40% | 52% | 41% | 41% | 40% | 40% |
| 3988 | 0.25% | 9.00% | 0.25% | 1.00% | 0.25% | 49% | 63% | 44% | 57% | 47% | 61% | 44% | 57% | 47% | 61% | 47% | 47% | 46% | 46% |
| 3989 | 1.00% | 9.00% | 0.25% | 1.00% | 0.25% | 51% | 66% | 45% | 59% | 50% | 65% | 46% | 60% | 49% | 64% | 49% | 49% | 48% | 48% |
| 3990 | 9.00% | 9.00% | 0.25% | 1.00% | 0.25% | 47% | 60% | 43% | 56% | 45% | 59% | 43% | 56% | 46% | 60% | 45% | 45% | 45% | 45% |
| 3991 | 0.00% | 0.00% | 1.00% | 1.00% | 0.25% | 43% | 56% | 40% | 52% | 36% | 47% | 39% | 51% | 39% | 51% | 40% | 40% | 38% | 38% |
| 3992 | 0.25% | 0.00% | 1.00% | 1.00% | 0.25% | 45% | 59% | 41% | 53% | 38% | 49% | 40% | 52% | 40% | 52% | 41% | 41% | 39% | 39% |
| 3993 | 1.00% | 0.00% | 1.00% | 1.00% | 0.25% | 47% | 61% | 42% | 55% | 41% | 53% | 42% | 55% | 42% | 55% | 43% | 43% | 42% | 42% |
| 3994 | 0.00% | 0.25% | 1.00% | 1.00% | 0.25% | 46% | 60% | 44% | 57% | 41% | 53% | 42% | 55% | 42% | 55% | 44% | 44% | 42% | 42% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 3995 | 1.00% | 0.25% | 1.00% | 1.00% | 0.25% | 50% | 65% | 46% | 60% | 46% | 60% | 45% | 59% | 45% | 59% | 47% | 47% | 45% | 45% |
| 3996 | 9.00% | 0.25% | 1.00% | 1.00% | 0.25% | 46% | 60% | 44% | 57% | 41% | 53% | 42% | 55% | 42% | 55% | 44% | 44% | 42% | 42% |
| 3997 | 0.00% | 1.00% | 1.00% | 1.00% | 0.25% | 49% | 64% | 47% | 61% | 45% | 59% | 46% | 60% | 48% | 62% | 47% | 47% | 46% | 46% |
| 3998 | 0.25% | 1.00% | 1.00% | 1.00% | 0.25% | 51% | 66% | 48% | 62% | 47% | 61% | 47% | 61% | 49% | 64% | 49% | 49% | 48% | 48% |
| 3999 | 1.00% | 1.00% | 1.00% | 1.00% | 0.25% | 53% | 69% | 49% | 64% | 50% | 65% | 49% | 64% | 51% | 66% | 51% | 51% | 50% | 50% |
| 4000 | 9.00% | 1.00% | 1.00% | 1.00% | 0.25% | 49% | 64% | 47% | 61% | 45% | 59% | 46% | 60% | 48% | 62% | 47% | 47% | 46% | 46% |
| 4001 | 0.00% | 9.00% | 1.00% | 1.00% | 0.25% | 53% | 69% | 51% | 66% | 49% | 64% | 49% | 64% | 54% | 70% | 51% | 51% | 51% | 51% |
| 4002 | 0.25% | 9.00% | 1.00% | 1.00% | 0.25% | 55% | 72% | 52% | 68% | 51% | 66% | 50% | 65% | 55% | 72% | 53% | 53% | 52% | 52% |
| 4003 | 1.00% | 9.00% | 1.00% | 1.00% | 0.25% | 57% | 74% | 53% | 69% | 54% | 70% | 52% | 68% | 57% | 74% | 55% | 55% | 54% | 54% |
| 4004 | 0.25% | 0.25% | 9.00% | 1.00% | 0.25% | 59% | 77% | 58% | 75% | 51% | 66% | 53% | 69% | 57% | 74% | 56% | 56% | 54% | 54% |
| 4005 | 1.00% | 0.25% | 9.00% | 1.00% | 0.25% | 61% | 79% | 59% | 77% | 54% | 70% | 55% | 72% | 59% | 77% | 58% | 58% | 56% | 56% |
| 4006 | 9.00% | 0.25% | 9.00% | 1.00% | 0.25% | 57% | 74% | 57% | 74% | 49% | 64% | 52% | 68% | 56% | 73% | 54% | 54% | 52% | 52% |
| 4007 | 0.25% | 1.00% | 9.00% | 1.00% | 0.25% | 62% | 81% | 61% | 79% | 55% | 72% | 57% | 74% | 63% | 82% | 59% | 59% | 58% | 58% |
| 4008 | 0.00% | 0.25% | 0.00% | 9.00% | 0.25% | 52% | 68% | 46% | 60% | 46% | 60% | 49% | 64% | 45% | 59% | 48% | 48% | 47% | 47% |
| 4009 | 0.00% | 0.00% | 0.25% | 9.00% | 0.25% | 54% | 70% | 46% | 60% | 44% | 57% | 49% | 64% | 45% | 59% | 48% | 48% | 46% | 46% |
| 4010 | 0.25% | 0.00% | 0.25% | 9.00% | 0.25% | 56% | 72% | 47% | 61% | 46% | 60% | 50% | 65% | 46% | 60% | 50% | 50% | 47% | 47% |
| 4011 | 0.00% | 0.25% | 0.25% | 9.00% | 0.25% | 57% | 73% | 50% | 65% | 49% | 64% | 52% | 68% | 48% | 62% | 52% | 52% | 50% | 50% |
| 4012 | 0.25% | 0.25% | 0.25% | 9.00% | 0.25% | 59% | 76% | 51% | 66% | 51% | 66% | 53% | 69% | 49% | 64% | 54% | 54% | 51% | 51% |
| 4013 | 1.00% | 0.25% | 0.25% | 9.00% | 0.25% | 61% | 79% | 52% | 68% | 54% | 70% | 55% | 72% | 51% | 66% | 56% | 56% | 53% | 53% |
| 4014 | 9.00% | 0.25% | 0.25% | 9.00% | 0.25% | 57% | 73% | 50% | 65% | 49% | 64% | 52% | 68% | 48% | 62% | 52% | 52% | 50% | 50% |
| 4015 | 0.00% | 1.00% | 0.25% | 9.00% | 0.25% | 60% | 77% | 53% | 69% | 53% | 69% | 56% | 73% | 54% | 70% | 55% | 55% | 54% | 54% |
| 4016 | 0.25% | 1.00% | 0.25% | 9.00% | 0.25% | 62% | 80% | 54% | 70% | 55% | 72% | 57% | 74% | 55% | 72% | 57% | 57% | 56% | 56% |
| 4017 | 1.00% | 1.00% | 0.25% | 9.00% | 0.25% | 64% | 83% | 55% | 72% | 58% | 75% | 59% | 77% | 57% | 74% | 59% | 59% | 58% | 58% |
| 4018 | 0.25% | 9.00% | 0.25% | 9.00% | 0.25% | 66% | 85% | 58% | 75% | 59% | 77% | 60% | 78% | 61% | 79% | 61% | 61% | 60% | 60% |
| 4019 | 0.25% | 0.00% | 1.00% | 9.00% | 0.25% | 62% | 81% | 55% | 72% | 50% | 65% | 56% | 73% | 54% | 70% | 56% | 56% | 53% | 53% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4020 | 1.00% | 0.25% | 1.00% | 9.00% | 0.25% | 67% | 87% | 60% | 78% | 58% | 75% | 61% | 79% | 59% | 77% | 62% | 62% | 59% | 59% |
| 4021 | 9.00% | 0.25% | 1.00% | 9.00% | 0.25% | 63% | 82% | 58% | 75% | 53% | 69% | 58% | 75% | 56% | 73% | 58% | 58% | 56% | 56% |
| 4022 | 0.00% | 1.00% | 1.00% | 9.00% | 0.25% | 66% | 86% | 61% | 79% | 57% | 74% | 62% | 81% | 62% | 81% | 61% | 61% | 60% | 60% |
| 4023 | 0.25% | 1.00% | 1.00% | 9.00% | 0.25% | 68% | 88% | 62% | 81% | 59% | 77% | 63% | 82% | 63% | 82% | 63% | 63% | 62% | 62% |
| 4024 | 1.00% | 1.00% | 1.00% | 9.00% | 0.25% | 70% | 91% | 63% | 82% | 62% | 81% | 65% | 85% | 65% | 85% | 65% | 65% | 64% | 64% |
| 4025 | 0.25% | 0.25% | 9.00% | 9.00% | 0.25% | 76% | 99% | 72% | 94% | 63% | 82% | 69% | 90% | 71% | 92% | 70% | 70% | 68% | 68% |
| 4026 | 0.25% | 0.25% | 0.00% | 0.00% | 1.00% | 20% | 26% | 21% | 27% | 23% | 30% | 18% | 23% | 23% | 30% | 21% | 21% | 21% | 21% |
| 4027 | 1.00% | 0.25% | 0.00% | 0.00% | 1.00% | 22% | 29% | 22% | 29% | 26% | 34% | 20% | 26% | 25% | 33% | 23% | 23% | 24% | 24% |
| 4028 | 0.25% | 1.00% | 0.00% | 0.00% | 1.00% | 23% | 30% | 24% | 31% | 27% | 35% | 22% | 29% | 29% | 38% | 25% | 25% | 26% | 26% |
| 4029 | 1.00% | 1.00% | 0.00% | 0.00% | 1.00% | 25% | 33% | 25% | 33% | 30% | 39% | 24% | 31% | 31% | 40% | 27% | 27% | 28% | 28% |
| 4030 | 0.25% | 0.00% | 0.25% | 0.00% | 1.00% | 22% | 28% | 21% | 27% | 21% | 27% | 18% | 23% | 23% | 30% | 21% | 21% | 21% | 21% |
| 4031 | 1.00% | 0.00% | 0.25% | 0.00% | 1.00% | 24% | 31% | 22% | 29% | 24% | 31% | 20% | 26% | 25% | 33% | 23% | 23% | 23% | 23% |
| 4032 | 0.00% | 0.25% | 0.25% | 0.00% | 1.00% | 23% | 29% | 24% | 31% | 24% | 31% | 20% | 26% | 25% | 33% | 24% | 24% | 23% | 23% |
| 4033 | 0.25% | 0.25% | 0.25% | 0.00% | 1.00% | 25% | 32% | 25% | 33% | 26% | 34% | 21% | 27% | 26% | 34% | 25% | 25% | 24% | 24% |
| 4034 | 0.00% | 1.00% | 0.25% | 0.00% | 1.00% | 26% | 33% | 27% | 35% | 28% | 36% | 24% | 31% | 31% | 40% | 27% | 27% | 28% | 28% |
| 4035 | 1.00% | 1.00% | 0.25% | 0.00% | 1.00% | 30% | 38% | 29% | 38% | 33% | 43% | 27% | 35% | 34% | 44% | 31% | 31% | 31% | 31% |
| 4036 | 1.00% | 9.00% | 0.25% | 0.00% | 1.00% | 34% | 44% | 33% | 43% | 37% | 48% | 30% | 39% | 40% | 52% | 35% | 35% | 36% | 36% |
| 4037 | 0.25% | 0.00% | 1.00% | 0.00% | 1.00% | 28% | 36% | 29% | 38% | 25% | 33% | 24% | 31% | 31% | 40% | 27% | 27% | 27% | 27% |
| 4038 | 1.00% | 0.00% | 1.00% | 0.00% | 1.00% | 30% | 39% | 30% | 39% | 28% | 36% | 26% | 34% | 33% | 43% | 29% | 29% | 29% | 29% |
| 4039 | 0.00% | 0.25% | 1.00% | 0.00% | 1.00% | 29% | 38% | 32% | 42% | 28% | 36% | 26% | 34% | 33% | 43% | 30% | 30% | 29% | 29% |
| 4040 | 1.00% | 0.25% | 1.00% | 0.00% | 1.00% | 33% | 43% | 34% | 44% | 33% | 43% | 29% | 38% | 36% | 47% | 33% | 33% | 33% | 33% |
| 4041 | 0.00% | 1.00% | 1.00% | 0.00% | 1.00% | 32% | 42% | 35% | 46% | 32% | 42% | 30% | 39% | 39% | 51% | 33% | 33% | 34% | 34% |
| 4042 | 0.25% | 1.00% | 1.00% | 0.00% | 1.00% | 34% | 44% | 36% | 47% | 34% | 44% | 31% | 40% | 40% | 52% | 35% | 35% | 35% | 35% |
| 4043 | 1.00% | 1.00% | 1.00% | 0.00% | 1.00% | 36% | 47% | 37% | 48% | 37% | 48% | 33% | 43% | 42% | 55% | 37% | 37% | 37% | 37% |
| 4044 | 9.00% | 1.00% | 1.00% | 0.00% | 1.00% | 32% | 42% | 35% | 46% | 32% | 42% | 30% | 39% | 39% | 51% | 33% | 33% | 34% | 34% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4045 | 1.00% | 9.00% | 1.00% | 0.00% | 1.00% | 40% | 52% | 41% | 53% | 41% | 53% | 36% | 47% | 48% | 62% | 41% | 41% | 42% | 42% |
| 4046 | 0.25% | 0.00% | 9.00% | 0.00% | 1.00% | 39% | 51% | 42% | 55% | 33% | 43% | 34% | 44% | 45% | 59% | 38% | 38% | 37% | 37% |
| 4047 | 0.00% | 0.25% | 9.00% | 0.00% | 1.00% | 40% | 52% | 45% | 59% | 36% | 47% | 36% | 47% | 47% | 61% | 40% | 40% | 40% | 40% |
| 4048 | 0.25% | 0.25% | 9.00% | 0.00% | 1.00% | 42% | 55% | 46% | 60% | 38% | 49% | 37% | 48% | 48% | 62% | 42% | 42% | 41% | 41% |
| 4049 | 1.00% | 0.25% | 9.00% | 0.00% | 1.00% | 44% | 57% | 47% | 61% | 41% | 53% | 39% | 51% | 50% | 65% | 44% | 44% | 43% | 43% |
| 4050 | 0.25% | 1.00% | 9.00% | 0.00% | 1.00% | 45% | 59% | 49% | 64% | 42% | 55% | 41% | 53% | 54% | 70% | 45% | 45% | 46% | 46% |
| 4051 | 0.25% | 0.00% | 0.00% | 0.25% | 1.00% | 25% | 33% | 25% | 33% | 27% | 35% | 22% | 29% | 27% | 35% | 26% | 26% | 25% | 25% |
| 4052 | 1.00% | 0.00% | 0.00% | 0.25% | 1.00% | 27% | 35% | 26% | 34% | 30% | 39% | 24% | 31% | 29% | 38% | 28% | 28% | 28% | 28% |
| 4053 | 0.00% | 0.25% | 0.00% | 0.25% | 1.00% | 26% | 34% | 28% | 36% | 30% | 39% | 24% | 31% | 29% | 38% | 28% | 28% | 28% | 28% |
| 4054 | 0.25% | 0.25% | 0.00% | 0.25% | 1.00% | 28% | 36% | 29% | 38% | 32% | 42% | 25% | 33% | 30% | 39% | 30% | 30% | 29% | 29% |
| 4055 | 9.00% | 0.25% | 0.00% | 0.25% | 1.00% | 26% | 34% | 28% | 36% | 30% | 39% | 24% | 31% | 29% | 38% | 28% | 28% | 28% | 28% |
| 4056 | 1.00% | 1.00% | 0.00% | 0.25% | 1.00% | 33% | 43% | 33% | 43% | 39% | 51% | 31% | 40% | 38% | 49% | 35% | 35% | 36% | 36% |
| 4057 | 1.00% | 9.00% | 0.00% | 0.25% | 1.00% | 37% | 48% | 37% | 48% | 43% | 56% | 34% | 44% | 44% | 57% | 39% | 39% | 40% | 40% |
| 4058 | 0.00% | 0.00% | 0.25% | 0.25% | 1.00% | 28% | 36% | 28% | 36% | 28% | 36% | 24% | 31% | 29% | 38% | 28% | 28% | 27% | 27% |
| 4059 | 0.25% | 0.00% | 0.25% | 0.25% | 1.00% | 30% | 38% | 29% | 38% | 30% | 39% | 25% | 33% | 30% | 39% | 30% | 30% | 28% | 28% |
| 4060 | 0.00% | 0.25% | 0.25% | 0.25% | 1.00% | 31% | 40% | 32% | 42% | 33% | 43% | 27% | 35% | 32% | 42% | 32% | 32% | 31% | 31% |
| 4061 | 0.25% | 0.25% | 0.25% | 0.25% | 1.00% | 33% | 42% | 33% | 43% | 35% | 46% | 28% | 36% | 33% | 43% | 34% | 34% | 32% | 32% |
| 4062 | 1.00% | 0.25% | 0.25% | 0.25% | 1.00% | 35% | 45% | 34% | 44% | 38% | 49% | 30% | 39% | 35% | 46% | 36% | 36% | 34% | 34% |
| 4063 | 9.00% | 0.25% | 0.25% | 0.25% | 1.00% | 31% | 40% | 32% | 42% | 33% | 43% | 27% | 35% | 32% | 42% | 32% | 32% | 31% | 31% |
| 4064 | 0.25% | 1.00% | 0.25% | 0.25% | 1.00% | 36% | 46% | 36% | 47% | 39% | 51% | 32% | 42% | 39% | 51% | 37% | 37% | 37% | 37% |
| 4065 | 9.00% | 1.00% | 0.25% | 0.25% | 1.00% | 34% | 44% | 35% | 46% | 37% | 48% | 31% | 40% | 38% | 49% | 35% | 35% | 35% | 35% |
| 4066 | 0.25% | 9.00% | 0.25% | 0.25% | 1.00% | 40% | 51% | 40% | 52% | 43% | 56% | 35% | 46% | 45% | 59% | 41% | 41% | 41% | 41% |
| 4067 | 1.00% | 9.00% | 0.25% | 0.25% | 1.00% | 42% | 54% | 41% | 53% | 46% | 60% | 37% | 48% | 47% | 61% | 43% | 43% | 43% | 43% |
| 4068 | 9.00% | 9.00% | 0.25% | 0.25% | 1.00% | 38% | 49% | 39% | 51% | 41% | 53% | 34% | 44% | 44% | 57% | 39% | 39% | 40% | 40% |
| 4069 | 0.00% | 0.00% | 1.00% | 0.25% | 1.00% | 34% | 44% | 36% | 47% | 32% | 42% | 30% | 39% | 37% | 48% | 34% | 34% | 33% | 33% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4070 | 1.00% | 0.00% | 1.00% | 0.25% | 1.00% | 38% | 49% | 38% | 49% | 37% | 48% | 33% | 43% | 40% | 52% | 38% | 38% | 37% | 37% |
| 4071 | 0.00% | 0.25% | 1.00% | 0.25% | 1.00% | 37% | 48% | 40% | 52% | 37% | 48% | 33% | 43% | 40% | 52% | 38% | 38% | 37% | 37% |
| 4072 | 0.25% | 0.25% | 1.00% | 0.25% | 1.00% | 39% | 51% | 41% | 53% | 39% | 51% | 34% | 44% | 41% | 53% | 40% | 40% | 38% | 38% |
| 4073 | 1.00% | 0.25% | 1.00% | 0.25% | 1.00% | 41% | 53% | 42% | 55% | 42% | 55% | 36% | 47% | 43% | 56% | 42% | 42% | 40% | 40% |
| 4074 | 9.00% | 0.25% | 1.00% | 0.25% | 1.00% | 37% | 48% | 40% | 52% | 37% | 48% | 33% | 43% | 40% | 52% | 38% | 38% | 37% | 37% |
| 4075 | 0.00% | 1.00% | 1.00% | 0.25% | 1.00% | 40% | 52% | 43% | 56% | 41% | 53% | 37% | 48% | 46% | 60% | 41% | 41% | 41% | 41% |
| 4076 | 0.25% | 1.00% | 1.00% | 0.25% | 1.00% | 42% | 55% | 44% | 57% | 43% | 56% | 38% | 49% | 47% | 61% | 43% | 43% | 43% | 43% |
| 4077 | 1.00% | 1.00% | 1.00% | 0.25% | 1.00% | 44% | 57% | 45% | 59% | 46% | 60% | 40% | 52% | 49% | 64% | 45% | 45% | 45% | 45% |
| 4078 | 9.00% | 1.00% | 1.00% | 0.25% | 1.00% | 40% | 52% | 43% | 56% | 41% | 53% | 37% | 48% | 46% | 60% | 41% | 41% | 41% | 41% |
| 4079 | 0.00% | 9.00% | 1.00% | 0.25% | 1.00% | 44% | 57% | 47% | 61% | 45% | 59% | 40% | 52% | 52% | 68% | 45% | 45% | 46% | 46% |
| 4080 | 0.25% | 9.00% | 1.00% | 0.25% | 1.00% | 46% | 60% | 48% | 62% | 47% | 61% | 41% | 53% | 53% | 69% | 47% | 47% | 47% | 47% |
| 4081 | 1.00% | 9.00% | 1.00% | 0.25% | 1.00% | 48% | 62% | 49% | 64% | 50% | 65% | 43% | 56% | 55% | 72% | 49% | 49% | 49% | 49% |
| 4082 | 0.25% | 0.25% | 9.00% | 0.25% | 1.00% | 50% | 65% | 54% | 70% | 47% | 61% | 44% | 57% | 55% | 72% | 50% | 50% | 49% | 49% |
| 4083 | 1.00% | 0.25% | 9.00% | 0.25% | 1.00% | 52% | 68% | 55% | 72% | 50% | 65% | 46% | 60% | 57% | 74% | 52% | 52% | 51% | 51% |
| 4084 | 9.00% | 0.25% | 9.00% | 0.25% | 1.00% | 48% | 62% | 53% | 69% | 45% | 59% | 43% | 56% | 54% | 70% | 49% | 49% | 47% | 47% |
| 4085 | 0.00% | 1.00% | 9.00% | 0.25% | 1.00% | 51% | 66% | 56% | 73% | 49% | 64% | 47% | 61% | 60% | 78% | 52% | 52% | 52% | 52% |
| 4086 | 0.25% | 1.00% | 9.00% | 0.25% | 1.00% | 53% | 69% | 57% | 74% | 51% | 66% | 48% | 62% | 61% | 79% | 54% | 54% | 53% | 53% |
| 4087 | 9.00% | 1.00% | 9.00% | 0.25% | 1.00% | 51% | 66% | 56% | 73% | 49% | 64% | 47% | 61% | 60% | 78% | 52% | 52% | 52% | 52% |
| 4088 | 1.00% | 9.00% | 9.00% | 0.25% | 1.00% | 59% | 77% | 62% | 81% | 58% | 75% | 53% | 69% | 69% | 90% | 60% | 60% | 60% | 60% |
| 4089 | 0.25% | 0.00% | 0.00% | 1.00% | 1.00% | 42% | 55% | 38% | 49% | 40% | 52% | 37% | 48% | 40% | 52% | 40% | 40% | 39% | 39% |
| 4090 | 1.00% | 0.25% | 0.00% | 1.00% | 1.00% | 47% | 61% | 43% | 56% | 48% | 62% | 42% | 55% | 45% | 59% | 46% | 46% | 45% | 45% |
| 4091 | 0.00% | 1.00% | 0.00% | 1.00% | 1.00% | 46% | 60% | 44% | 57% | 47% | 61% | 43% | 56% | 48% | 62% | 46% | 46% | 46% | 46% |
| 4092 | 0.25% | 1.00% | 0.00% | 1.00% | 1.00% | 48% | 62% | 45% | 59% | 49% | 64% | 44% | 57% | 49% | 64% | 47% | 47% | 47% | 47% |
| 4093 | 1.00% | 1.00% | 0.00% | 1.00% | 1.00% | 50% | 65% | 46% | 60% | 52% | 68% | 46% | 60% | 51% | 66% | 49% | 49% | 50% | 50% |
| 4094 | 0.00% | 0.00% | 0.25% | 1.00% | 1.00% | 45% | 58% | 41% | 53% | 41% | 53% | 39% | 51% | 42% | 55% | 42% | 42% | 41% | 41% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4095 | 1.00% | 0.00% | 0.25% | 1.00% | 1.00% | 49% | 63% | 43% | 56% | 46% | 60% | 42% | 55% | 45% | 59% | 46% | 46% | 44% | 44% |
| 4096 | 0.25% | 0.25% | 0.25% | 1.00% | 1.00% | 50% | 64% | 46% | 60% | 48% | 62% | 43% | 56% | 46% | 60% | 48% | 48% | 46% | 46% |
| 4097 | 1.00% | 0.25% | 0.25% | 1.00% | 1.00% | 52% | 67% | 47% | 61% | 51% | 66% | 45% | 59% | 48% | 62% | 50% | 50% | 48% | 48% |
| 4098 | 9.00% | 0.25% | 0.25% | 1.00% | 1.00% | 48% | 62% | 45% | 59% | 46% | 60% | 42% | 55% | 45% | 59% | 46% | 46% | 44% | 44% |
| 4099 | 0.00% | 1.00% | 0.25% | 1.00% | 1.00% | 51% | 66% | 48% | 62% | 50% | 65% | 46% | 60% | 51% | 66% | 50% | 50% | 49% | 49% |
| 4100 | 0.25% | 1.00% | 0.25% | 1.00% | 1.00% | 53% | 68% | 49% | 64% | 52% | 68% | 47% | 61% | 52% | 68% | 51% | 51% | 50% | 50% |
| 4101 | 1.00% | 1.00% | 0.25% | 1.00% | 1.00% | 55% | 71% | 50% | 65% | 55% | 72% | 49% | 64% | 54% | 70% | 53% | 53% | 53% | 53% |
| 4102 | 9.00% | 1.00% | 0.25% | 1.00% | 1.00% | 51% | 66% | 48% | 62% | 50% | 65% | 46% | 60% | 51% | 66% | 50% | 50% | 49% | 49% |
| 4103 | 0.25% | 9.00% | 0.25% | 1.00% | 1.00% | 57% | 73% | 53% | 69% | 56% | 73% | 50% | 65% | 58% | 75% | 55% | 55% | 55% | 55% |
| 4104 | 1.00% | 9.00% | 0.25% | 1.00% | 1.00% | 59% | 76% | 54% | 70% | 59% | 77% | 52% | 68% | 60% | 78% | 57% | 57% | 57% | 57% |
| 4105 | 9.00% | 9.00% | 0.25% | 1.00% | 1.00% | 55% | 71% | 52% | 68% | 54% | 70% | 49% | 64% | 57% | 74% | 54% | 54% | 53% | 53% |
| 4106 | 0.00% | 0.00% | 1.00% | 1.00% | 1.00% | 51% | 66% | 49% | 64% | 45% | 59% | 45% | 59% | 50% | 65% | 48% | 48% | 47% | 47% |
| 4107 | 0.25% | 0.00% | 1.00% | 1.00% | 1.00% | 53% | 69% | 50% | 65% | 47% | 61% | 46% | 60% | 51% | 66% | 50% | 50% | 48% | 48% |
| 4108 | 1.00% | 0.00% | 1.00% | 1.00% | 1.00% | 55% | 72% | 51% | 66% | 50% | 65% | 48% | 62% | 53% | 69% | 52% | 52% | 50% | 50% |
| 4109 | 0.00% | 0.25% | 1.00% | 1.00% | 1.00% | 54% | 70% | 53% | 69% | 50% | 65% | 48% | 62% | 53% | 69% | 52% | 52% | 50% | 50% |
| 4110 | 1.00% | 0.25% | 1.00% | 1.00% | 1.00% | 58% | 75% | 55% | 72% | 55% | 72% | 51% | 66% | 56% | 73% | 56% | 56% | 54% | 54% |
| 4111 | 9.00% | 0.25% | 1.00% | 1.00% | 1.00% | 54% | 70% | 53% | 69% | 50% | 65% | 48% | 62% | 53% | 69% | 52% | 52% | 50% | 50% |
| 4112 | 0.00% | 1.00% | 1.00% | 1.00% | 1.00% | 57% | 74% | 56% | 73% | 54% | 70% | 52% | 68% | 59% | 77% | 56% | 56% | 55% | 55% |
| 4113 | 0.25% | 1.00% | 1.00% | 1.00% | 1.00% | 59% | 77% | 57% | 74% | 56% | 73% | 53% | 69% | 60% | 78% | 57% | 57% | 56% | 56% |
| 4114 | 1.00% | 1.00% | 1.00% | 1.00% | 1.00% | 61% | 79% | 58% | 75% | 59% | 77% | 55% | 72% | 62% | 81% | 59% | 59% | 59% | 59% |
| 4115 | 9.00% | 1.00% | 1.00% | 1.00% | 1.00% | 57% | 74% | 56% | 73% | 54% | 70% | 52% | 68% | 59% | 77% | 56% | 56% | 55% | 55% |
| 4116 | 0.00% | 9.00% | 1.00% | 1.00% | 1.00% | 61% | 79% | 60% | 78% | 58% | 75% | 55% | 72% | 65% | 85% | 60% | 60% | 59% | 59% |
| 4117 | 0.25% | 9.00% | 1.00% | 1.00% | 1.00% | 63% | 82% | 61% | 79% | 60% | 78% | 56% | 73% | 66% | 86% | 61% | 61% | 61% | 61% |
| 4118 | 1.00% | 9.00% | 1.00% | 1.00% | 1.00% | 65% | 85% | 62% | 81% | 63% | 82% | 58% | 75% | 68% | 88% | 63% | 63% | 63% | 63% |
| 4119 | 0.25% | 0.25% | 9.00% | 1.00% | 1.00% | 67% | 87% | 67% | 87% | 60% | 78% | 59% | 77% | 68% | 88% | 65% | 65% | 62% | 62% |

Fig. 17

| Formula # | Delta Dodecalactone | Propyl Dihydrojasmolate | Apritone | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4120 | 1.00% | 0.25% | 9.00% | 1.00% | 1.00% | 69% | 90% | 68% | 88% | 63% | 82% | 61% | 79% | 70% | 91% | 67% | 67% | 65% | 65% |
| 4121 | 9.00% | 0.25% | 9.00% | 1.00% | 1.00% | 65% | 85% | 66% | 86% | 58% | 75% | 58% | 75% | 67% | 87% | 63% | 63% | 61% | 61% |
| 4122 | 0.25% | 1.00% | 9.00% | 1.00% | 1.00% | 70% | 91% | 70% | 91% | 64% | 83% | 63% | 82% | 74% | 96% | 68% | 68% | 67% | 67% |
| 4123 | 0.00% | 0.25% | 0.00% | 9.00% | 1.00% | 60% | 78% | 55% | 72% | 55% | 72% | 55% | 72% | 56% | 73% | 57% | 57% | 55% | 55% |
| 4124 | 0.00% | 0.00% | 0.25% | 9.00% | 1.00% | 62% | 80% | 55% | 72% | 53% | 69% | 55% | 72% | 56% | 73% | 57% | 57% | 55% | 55% |
| 4125 | 0.25% | 0.00% | 0.25% | 9.00% | 1.00% | 64% | 83% | 56% | 73% | 55% | 72% | 56% | 73% | 57% | 74% | 58% | 58% | 56% | 56% |
| 4126 | 0.00% | 0.25% | 0.25% | 9.00% | 1.00% | 65% | 84% | 59% | 77% | 58% | 75% | 58% | 75% | 59% | 77% | 61% | 61% | 58% | 58% |
| 4127 | 0.25% | 0.25% | 0.25% | 9.00% | 1.00% | 67% | 86% | 60% | 78% | 60% | 78% | 59% | 77% | 60% | 78% | 62% | 62% | 60% | 60% |
| 4128 | 1.00% | 0.25% | 0.25% | 9.00% | 1.00% | 69% | 89% | 61% | 79% | 63% | 82% | 61% | 79% | 62% | 81% | 64% | 64% | 62% | 62% |
| 4129 | 9.00% | 0.25% | 0.25% | 9.00% | 1.00% | 65% | 84% | 59% | 77% | 58% | 75% | 58% | 75% | 59% | 77% | 61% | 61% | 58% | 58% |
| 4130 | 0.00% | 1.00% | 0.25% | 9.00% | 1.00% | 68% | 88% | 62% | 81% | 62% | 81% | 62% | 81% | 65% | 85% | 64% | 64% | 63% | 63% |
| 4131 | 0.25% | 1.00% | 0.25% | 9.00% | 1.00% | 70% | 90% | 63% | 82% | 64% | 83% | 63% | 82% | 66% | 86% | 66% | 66% | 64% | 64% |
| 4132 | 1.00% | 1.00% | 0.25% | 9.00% | 1.00% | 72% | 93% | 64% | 83% | 67% | 87% | 65% | 85% | 68% | 88% | 68% | 68% | 67% | 67% |
| 4133 | 0.25% | 9.00% | 0.25% | 9.00% | 1.00% | 74% | 96% | 67% | 87% | 68% | 88% | 66% | 86% | 72% | 94% | 70% | 70% | 69% | 69% |
| 4134 | 0.25% | 0.00% | 1.00% | 9.00% | 1.00% | 70% | 91% | 64% | 83% | 59% | 77% | 62% | 81% | 65% | 85% | 64% | 64% | 62% | 62% |
| 4135 | 1.00% | 0.25% | 1.00% | 9.00% | 1.00% | 75% | 98% | 69% | 90% | 67% | 87% | 67% | 87% | 70% | 91% | 70% | 70% | 68% | 68% |
| 4136 | 9.00% | 0.25% | 1.00% | 9.00% | 1.00% | 71% | 92% | 67% | 87% | 62% | 81% | 64% | 83% | 67% | 87% | 67% | 67% | 64% | 64% |
| 4137 | 0.00% | 1.00% | 1.00% | 9.00% | 1.00% | 74% | 96% | 70% | 91% | 66% | 86% | 68% | 88% | 73% | 95% | 70% | 70% | 69% | 69% |
| 4138 | 0.25% | 1.00% | 1.00% | 9.00% | 1.00% | 76% | 99% | 71% | 92% | 68% | 88% | 69% | 90% | 74% | 96% | 72% | 72% | 70% | 70% |
| 4139 | 1.00% | 1.00% | 1.00% | 9.00% | 1.00% | 78% | 100% | 72% | 94% | 71% | 92% | 71% | 92% | 76% | 99% | 74% | 74% | 73% | 73% |
| 4140 | 0.25% | 0.25% | 9.00% | 9.00% | 1.00% | 84% | 100% | 81% | 105% | 72% | 94% | 75% | 98% | 82% | 100% | 79% | 79% | 76% | 76% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4141 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 4142 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 4143 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 4144 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 4145 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 4146 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 4147 | 0.00% | 0.25% | 0.25% | 0.00% | 0.00% | 9% | 12% | 13% | 17% | 10% | 13% | 10% | 13% | 11% | 14% | 11% | 11% | 10% | 10% |
| 4148 | 0.25% | 0.25% | 0.25% | 0.00% | 0.00% | 11% | 14% | 14% | 18% | 12% | 16% | 11% | 14% | 12% | 16% | 12% | 12% | 12% | 12% |
| 4149 | 0.00% | 1.00% | 0.25% | 0.00% | 0.00% | 17% | 22% | 21% | 27% | 13% | 17% | 15% | 20% | 21% | 27% | 17% | 17% | 16% | 16% |
| 4150 | 1.00% | 1.00% | 0.25% | 0.00% | 0.00% | 21% | 27% | 23% | 30% | 18% | 23% | 18% | 23% | 24% | 31% | 21% | 21% | 20% | 20% |
| 4151 | 1.00% | 9.00% | 0.25% | 0.00% | 0.00% | 34% | 44% | 33% | 43% | 22% | 29% | 29% | 38% | 34% | 44% | 30% | 30% | 28% | 28% |
| 4152 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 4153 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 4154 | 0.00% | 0.25% | 1.00% | 0.00% | 0.00% | 14% | 18% | 16% | 21% | 16% | 21% | 16% | 21% | 15% | 20% | 15% | 15% | 16% | 16% |
| 4155 | 1.00% | 0.25% | 1.00% | 0.00% | 0.00% | 18% | 23% | 18% | 23% | 21% | 27% | 19% | 25% | 18% | 23% | 19% | 19% | 19% | 19% |
| 4156 | 0.00% | 1.00% | 1.00% | 0.00% | 0.00% | 22% | 29% | 24% | 31% | 19% | 25% | 21% | 27% | 25% | 33% | 22% | 22% | 22% | 22% |
| 4157 | 0.25% | 1.00% | 1.00% | 0.00% | 0.00% | 24% | 31% | 25% | 33% | 21% | 27% | 22% | 29% | 26% | 34% | 23% | 23% | 23% | 23% |
| 4158 | 1.00% | 1.00% | 1.00% | 0.00% | 0.00% | 26% | 34% | 26% | 34% | 24% | 31% | 24% | 31% | 28% | 36% | 25% | 25% | 25% | 25% |
| 4159 | 9.00% | 1.00% | 1.00% | 0.00% | 0.00% | 22% | 29% | 24% | 31% | 19% | 25% | 21% | 27% | 25% | 33% | 22% | 22% | 22% | 22% |
| 4160 | 1.00% | 9.00% | 1.00% | 0.00% | 0.00% | 39% | 51% | 36% | 47% | 28% | 36% | 35% | 46% | 38% | 49% | 34% | 34% | 34% | 34% |
| 4161 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 4162 | 0.00% | 0.25% | 9.00% | 0.00% | 0.00% | 24% | 31% | 21% | 27% | 21% | 27% | 27% | 35% | 25% | 33% | 22% | 22% | 24% | 24% |
| 4163 | 0.25% | 0.25% | 9.00% | 0.00% | 0.00% | 26% | 34% | 22% | 29% | 23% | 30% | 28% | 36% | 26% | 34% | 24% | 24% | 26% | 26% |
| 4164 | 1.00% | 0.25% | 9.00% | 0.00% | 0.00% | 28% | 36% | 23% | 30% | 26% | 34% | 30% | 39% | 28% | 36% | 26% | 26% | 28% | 28% |
| 4165 | 0.25% | 1.00% | 9.00% | 0.00% | 0.00% | 34% | 44% | 30% | 39% | 26% | 34% | 33% | 43% | 36% | 47% | 30% | 30% | 32% | 32% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4166 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 4167 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 4168 | 0.00% | 0.25% | 0.00% | 0.25% | 0.00% | 10% | 13% | 16% | 21% | 12% | 16% | 17% | 22% | 13% | 17% | 13% | 13% | 14% | 14% |
| 4169 | 0.25% | 0.25% | 0.00% | 0.25% | 0.00% | 12% | 16% | 17% | 22% | 14% | 18% | 18% | 23% | 14% | 18% | 14% | 14% | 15% | 15% |
| 4170 | 9.00% | 0.25% | 0.00% | 0.25% | 0.00% | 10% | 13% | 16% | 21% | 12% | 16% | 17% | 22% | 13% | 17% | 13% | 13% | 14% | 14% |
| 4171 | 1.00% | 1.00% | 0.00% | 0.25% | 0.00% | 22% | 29% | 26% | 34% | 20% | 26% | 25% | 33% | 26% | 34% | 23% | 23% | 24% | 24% |
| 4172 | 1.00% | 9.00% | 0.00% | 0.25% | 0.00% | 35% | 46% | 36% | 47% | 24% | 31% | 36% | 47% | 36% | 47% | 32% | 32% | 32% | 32% |
| 4173 | 0.00% | 0.00% | 0.25% | 0.25% | 0.00% | 9% | 12% | 15% | 20% | 10% | 13% | 13% | 17% | 12% | 16% | 11% | 11% | 12% | 12% |
| 4174 | 0.25% | 0.00% | 0.25% | 0.25% | 0.00% | 11% | 14% | 16% | 21% | 12% | 16% | 14% | 18% | 13% | 17% | 13% | 13% | 13% | 13% |
| 4175 | 0.00% | 0.25% | 0.25% | 0.25% | 0.00% | 14% | 18% | 22% | 29% | 16% | 21% | 20% | 26% | 18% | 23% | 17% | 17% | 18% | 18% |
| 4176 | 0.25% | 0.25% | 0.25% | 0.25% | 0.00% | 16% | 21% | 23% | 30% | 18% | 23% | 21% | 27% | 19% | 25% | 19% | 19% | 19% | 19% |
| 4177 | 1.00% | 0.25% | 0.25% | 0.25% | 0.00% | 18% | 23% | 24% | 31% | 21% | 27% | 23% | 30% | 21% | 27% | 21% | 21% | 22% | 22% |
| 4178 | 9.00% | 0.25% | 0.25% | 0.25% | 0.00% | 14% | 18% | 22% | 29% | 16% | 21% | 20% | 26% | 18% | 23% | 17% | 17% | 18% | 18% |
| 4179 | 0.25% | 1.00% | 0.25% | 0.25% | 0.00% | 24% | 31% | 31% | 40% | 21% | 27% | 26% | 34% | 29% | 38% | 25% | 25% | 25% | 25% |
| 4180 | 9.00% | 1.00% | 0.25% | 0.25% | 0.00% | 22% | 29% | 30% | 39% | 19% | 25% | 25% | 33% | 28% | 36% | 24% | 24% | 24% | 24% |
| 4181 | 0.25% | 9.00% | 0.25% | 0.25% | 0.00% | 37% | 48% | 41% | 53% | 25% | 33% | 37% | 48% | 39% | 51% | 34% | 34% | 34% | 34% |
| 4182 | 1.00% | 9.00% | 0.25% | 0.25% | 0.00% | 39% | 51% | 42% | 55% | 28% | 36% | 39% | 51% | 41% | 53% | 36% | 36% | 36% | 36% |
| 4183 | 9.00% | 9.00% | 0.25% | 0.25% | 0.00% | 35% | 46% | 40% | 52% | 23% | 30% | 36% | 47% | 38% | 49% | 33% | 33% | 32% | 32% |
| 4184 | 0.00% | 0.00% | 1.00% | 0.25% | 0.00% | 14% | 18% | 18% | 23% | 16% | 21% | 19% | 25% | 16% | 21% | 16% | 16% | 17% | 17% |
| 4185 | 1.00% | 0.00% | 1.00% | 0.25% | 0.00% | 18% | 23% | 20% | 26% | 21% | 27% | 22% | 29% | 19% | 25% | 20% | 20% | 21% | 21% |
| 4186 | 0.00% | 0.25% | 1.00% | 0.25% | 0.00% | 19% | 25% | 25% | 33% | 22% | 29% | 26% | 34% | 22% | 29% | 22% | 22% | 23% | 23% |
| 4187 | 0.25% | 0.25% | 1.00% | 0.25% | 0.00% | 21% | 27% | 26% | 34% | 24% | 31% | 27% | 35% | 23% | 30% | 24% | 24% | 25% | 25% |
| 4188 | 1.00% | 0.25% | 1.00% | 0.25% | 0.00% | 23% | 30% | 27% | 35% | 27% | 35% | 29% | 38% | 25% | 33% | 26% | 26% | 27% | 27% |
| 4189 | 9.00% | 0.25% | 1.00% | 0.25% | 0.00% | 19% | 25% | 25% | 33% | 22% | 29% | 26% | 34% | 22% | 29% | 22% | 22% | 23% | 23% |
| 4190 | 0.00% | 1.00% | 1.00% | 0.25% | 0.00% | 27% | 35% | 33% | 43% | 25% | 33% | 31% | 40% | 32% | 42% | 28% | 28% | 29% | 29% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4191 | 0.25% | 1.00% | 1.00% | 0.25% | 0.00% | 29% | 38% | 34% | 44% | 27% | 35% | 32% | 42% | 33% | 43% | 30% | 30% | 31% | 31% |
| 4192 | 1.00% | 1.00% | 1.00% | 0.25% | 0.00% | 31% | 40% | 35% | 46% | 30% | 39% | 34% | 44% | 35% | 46% | 32% | 32% | 33% | 33% |
| 4193 | 9.00% | 1.00% | 1.00% | 0.25% | 0.00% | 27% | 35% | 33% | 43% | 25% | 33% | 31% | 40% | 32% | 42% | 28% | 28% | 29% | 29% |
| 4194 | 0.00% | 9.00% | 1.00% | 0.25% | 0.00% | 40% | 52% | 43% | 56% | 29% | 38% | 42% | 55% | 42% | 55% | 37% | 37% | 38% | 38% |
| 4195 | 0.25% | 9.00% | 1.00% | 0.25% | 0.00% | 42% | 55% | 44% | 57% | 31% | 40% | 43% | 56% | 43% | 56% | 39% | 39% | 39% | 39% |
| 4196 | 1.00% | 9.00% | 1.00% | 0.25% | 0.00% | 44% | 57% | 45% | 59% | 34% | 44% | 45% | 59% | 45% | 59% | 41% | 41% | 41% | 41% |
| 4197 | 0.25% | 0.25% | 9.00% | 0.25% | 0.00% | 31% | 40% | 31% | 40% | 29% | 38% | 38% | 49% | 33% | 43% | 30% | 30% | 33% | 33% |
| 4198 | 1.00% | 0.25% | 9.00% | 0.25% | 0.00% | 33% | 43% | 32% | 42% | 32% | 42% | 40% | 52% | 35% | 46% | 32% | 32% | 36% | 36% |
| 4199 | 9.00% | 0.25% | 9.00% | 0.25% | 0.00% | 29% | 38% | 30% | 39% | 27% | 35% | 37% | 48% | 32% | 42% | 29% | 29% | 32% | 32% |
| 4200 | 0.00% | 1.00% | 9.00% | 0.25% | 0.00% | 37% | 48% | 38% | 49% | 30% | 39% | 42% | 55% | 42% | 55% | 35% | 35% | 38% | 38% |
| 4201 | 0.25% | 1.00% | 9.00% | 0.25% | 0.00% | 39% | 51% | 39% | 51% | 32% | 42% | 43% | 56% | 43% | 56% | 37% | 37% | 39% | 39% |
| 4202 | 9.00% | 1.00% | 9.00% | 0.25% | 0.00% | 37% | 48% | 38% | 49% | 30% | 39% | 42% | 55% | 42% | 55% | 35% | 35% | 38% | 38% |
| 4203 | 1.00% | 9.00% | 9.00% | 0.25% | 0.00% | 54% | 70% | 50% | 65% | 39% | 51% | 56% | 73% | 55% | 72% | 48% | 48% | 50% | 50% |
| 4204 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 4205 | 1.00% | 0.25% | 0.00% | 1.00% | 0.00% | 29% | 38% | 30% | 39% | 29% | 38% | 30% | 39% | 31% | 40% | 29% | 29% | 30% | 30% |
| 4206 | 0.00% | 1.00% | 0.00% | 1.00% | 0.00% | 33% | 43% | 36% | 47% | 27% | 35% | 32% | 42% | 38% | 49% | 32% | 32% | 32% | 32% |
| 4207 | 0.25% | 1.00% | 0.00% | 1.00% | 0.00% | 35% | 46% | 37% | 48% | 29% | 38% | 33% | 43% | 39% | 51% | 34% | 34% | 34% | 34% |
| 4208 | 1.00% | 1.00% | 0.00% | 1.00% | 0.00% | 37% | 48% | 38% | 49% | 32% | 42% | 35% | 46% | 41% | 53% | 36% | 36% | 36% | 36% |
| 4209 | 0.00% | 0.00% | 0.25% | 1.00% | 0.00% | 24% | 31% | 27% | 35% | 22% | 29% | 23% | 30% | 27% | 35% | 24% | 24% | 24% | 24% |
| 4210 | 1.00% | 0.00% | 0.25% | 1.00% | 0.00% | 28% | 36% | 29% | 38% | 27% | 35% | 26% | 34% | 30% | 39% | 28% | 28% | 28% | 28% |
| 4211 | 0.25% | 0.25% | 0.25% | 1.00% | 0.00% | 31% | 40% | 35% | 46% | 30% | 39% | 31% | 40% | 34% | 44% | 32% | 32% | 32% | 32% |
| 4212 | 1.00% | 0.25% | 0.25% | 1.00% | 0.00% | 33% | 43% | 36% | 47% | 33% | 43% | 33% | 43% | 36% | 47% | 34% | 34% | 34% | 34% |
| 4213 | 9.00% | 0.25% | 0.25% | 1.00% | 0.00% | 29% | 38% | 34% | 44% | 28% | 36% | 30% | 39% | 33% | 43% | 30% | 30% | 30% | 30% |
| 4214 | 0.00% | 1.00% | 0.25% | 1.00% | 0.00% | 37% | 48% | 42% | 55% | 31% | 40% | 35% | 46% | 43% | 56% | 37% | 37% | 36% | 36% |
| 4215 | 0.25% | 1.00% | 0.25% | 1.00% | 0.00% | 39% | 51% | 43% | 56% | 33% | 43% | 36% | 47% | 44% | 57% | 38% | 38% | 38% | 38% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4216 | 1.00% | 1.00% | 0.25% | 1.00% | 0.00% | 41% | 53% | 44% | 57% | 36% | 47% | 38% | 49% | 46% | 60% | 40% | 40% | 40% | 40% |
| 4217 | 9.00% | 1.00% | 0.25% | 1.00% | 0.00% | 37% | 48% | 42% | 55% | 31% | 40% | 35% | 46% | 43% | 56% | 37% | 37% | 36% | 36% |
| 4218 | 0.25% | 9.00% | 0.25% | 1.00% | 0.00% | 52% | 68% | 53% | 69% | 37% | 48% | 47% | 61% | 54% | 70% | 47% | 47% | 46% | 46% |
| 4219 | 1.00% | 9.00% | 0.25% | 1.00% | 0.00% | 54% | 70% | 54% | 70% | 40% | 52% | 49% | 64% | 56% | 73% | 49% | 49% | 48% | 48% |
| 4220 | 9.00% | 9.00% | 0.25% | 1.00% | 0.00% | 50% | 65% | 52% | 68% | 35% | 46% | 46% | 60% | 53% | 69% | 46% | 46% | 45% | 45% |
| 4221 | 0.00% | 0.00% | 1.00% | 1.00% | 0.00% | 29% | 38% | 30% | 39% | 28% | 36% | 29% | 38% | 31% | 40% | 29% | 29% | 29% | 29% |
| 4222 | 0.25% | 0.00% | 1.00% | 1.00% | 0.00% | 31% | 40% | 31% | 40% | 30% | 39% | 30% | 39% | 32% | 42% | 31% | 31% | 31% | 31% |
| 4223 | 1.00% | 0.00% | 1.00% | 1.00% | 0.00% | 33% | 43% | 32% | 42% | 33% | 43% | 32% | 42% | 34% | 44% | 33% | 33% | 33% | 33% |
| 4224 | 0.00% | 0.25% | 1.00% | 1.00% | 0.00% | 34% | 44% | 37% | 48% | 34% | 44% | 36% | 47% | 37% | 48% | 35% | 35% | 36% | 36% |
| 4225 | 1.00% | 0.25% | 1.00% | 1.00% | 0.00% | 38% | 49% | 39% | 51% | 39% | 51% | 39% | 51% | 40% | 52% | 39% | 39% | 39% | 39% |
| 4226 | 9.00% | 0.25% | 1.00% | 1.00% | 0.00% | 34% | 44% | 37% | 48% | 34% | 44% | 36% | 47% | 37% | 48% | 35% | 35% | 36% | 36% |
| 4227 | 0.00% | 1.00% | 1.00% | 1.00% | 0.00% | 42% | 55% | 45% | 59% | 37% | 48% | 41% | 53% | 47% | 61% | 41% | 41% | 42% | 42% |
| 4228 | 0.25% | 1.00% | 1.00% | 1.00% | 0.00% | 44% | 57% | 46% | 60% | 39% | 51% | 42% | 55% | 48% | 62% | 43% | 43% | 43% | 43% |
| 4229 | 1.00% | 1.00% | 1.00% | 1.00% | 0.00% | 46% | 60% | 47% | 61% | 42% | 55% | 44% | 57% | 50% | 65% | 45% | 45% | 45% | 45% |
| 4230 | 9.00% | 1.00% | 1.00% | 1.00% | 0.00% | 42% | 55% | 45% | 59% | 37% | 48% | 41% | 53% | 47% | 61% | 41% | 41% | 42% | 42% |
| 4231 | 0.00% | 9.00% | 1.00% | 1.00% | 0.00% | 55% | 72% | 55% | 72% | 41% | 53% | 52% | 68% | 57% | 74% | 50% | 50% | 50% | 50% |
| 4232 | 0.25% | 9.00% | 1.00% | 1.00% | 0.00% | 57% | 74% | 56% | 73% | 43% | 56% | 53% | 69% | 58% | 75% | 52% | 52% | 51% | 51% |
| 4233 | 1.00% | 9.00% | 1.00% | 1.00% | 0.00% | 59% | 77% | 57% | 74% | 46% | 60% | 55% | 72% | 60% | 78% | 54% | 54% | 54% | 54% |
| 4234 | 0.25% | 0.25% | 9.00% | 1.00% | 0.00% | 46% | 60% | 43% | 56% | 41% | 53% | 48% | 62% | 48% | 62% | 43% | 43% | 46% | 46% |
| 4235 | 1.00% | 0.25% | 9.00% | 1.00% | 0.00% | 48% | 62% | 44% | 57% | 44% | 57% | 50% | 65% | 50% | 65% | 45% | 45% | 48% | 48% |
| 4236 | 9.00% | 0.25% | 9.00% | 1.00% | 0.00% | 44% | 57% | 42% | 55% | 39% | 51% | 47% | 61% | 47% | 61% | 42% | 42% | 44% | 44% |
| 4237 | 0.25% | 1.00% | 9.00% | 1.00% | 0.00% | 54% | 70% | 51% | 66% | 44% | 57% | 53% | 69% | 58% | 75% | 50% | 50% | 52% | 52% |
| 4238 | 0.00% | 0.25% | 0.00% | 9.00% | 0.00% | 45% | 59% | 42% | 55% | 42% | 55% | 47% | 61% | 41% | 53% | 43% | 43% | 43% | 43% |
| 4239 | 0.00% | 0.00% | 0.25% | 9.00% | 0.00% | 44% | 57% | 41% | 53% | 40% | 52% | 43% | 56% | 40% | 52% | 42% | 42% | 41% | 41% |
| 4240 | 0.25% | 0.00% | 0.25% | 9.00% | 0.00% | 46% | 60% | 42% | 55% | 42% | 55% | 44% | 57% | 41% | 53% | 43% | 43% | 42% | 42% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4241 | 0.00% | 0.25% | 0.25% | 9.00% | 0.00% | 49% | 64% | 48% | 62% | 46% | 60% | 50% | 65% | 46% | 60% | 48% | 48% | 47% | 47% |
| 4242 | 0.25% | 0.25% | 0.25% | 9.00% | 0.00% | 51% | 66% | 49% | 64% | 48% | 62% | 51% | 66% | 47% | 61% | 49% | 49% | 49% | 49% |
| 4243 | 1.00% | 0.25% | 0.25% | 9.00% | 0.00% | 53% | 69% | 50% | 65% | 51% | 66% | 53% | 69% | 49% | 64% | 51% | 51% | 51% | 51% |
| 4244 | 9.00% | 0.25% | 0.25% | 9.00% | 0.00% | 49% | 64% | 48% | 62% | 46% | 60% | 50% | 65% | 46% | 60% | 48% | 48% | 47% | 47% |
| 4245 | 0.00% | 1.00% | 0.25% | 9.00% | 0.00% | 57% | 74% | 56% | 73% | 49% | 64% | 55% | 72% | 56% | 73% | 54% | 54% | 53% | 53% |
| 4246 | 0.25% | 1.00% | 0.25% | 9.00% | 0.00% | 59% | 77% | 57% | 74% | 51% | 66% | 56% | 73% | 57% | 74% | 56% | 56% | 55% | 55% |
| 4247 | 1.00% | 1.00% | 0.25% | 9.00% | 0.00% | 61% | 79% | 58% | 75% | 54% | 70% | 58% | 75% | 59% | 77% | 58% | 58% | 57% | 57% |
| 4248 | 0.25% | 9.00% | 0.25% | 9.00% | 0.00% | 72% | 94% | 67% | 87% | 55% | 72% | 67% | 87% | 67% | 87% | 65% | 65% | 63% | 63% |
| 4249 | 0.25% | 0.00% | 1.00% | 9.00% | 0.00% | 51% | 66% | 45% | 59% | 48% | 62% | 50% | 65% | 45% | 59% | 48% | 48% | 48% | 48% |
| 4250 | 1.00% | 0.25% | 1.00% | 9.00% | 0.00% | 58% | 75% | 53% | 69% | 57% | 74% | 59% | 77% | 53% | 69% | 56% | 56% | 56% | 56% |
| 4251 | 9.00% | 0.25% | 1.00% | 9.00% | 0.00% | 54% | 70% | 51% | 66% | 52% | 68% | 56% | 73% | 50% | 65% | 52% | 52% | 53% | 53% |
| 4252 | 0.00% | 1.00% | 1.00% | 9.00% | 0.00% | 62% | 81% | 59% | 77% | 55% | 72% | 61% | 79% | 60% | 78% | 59% | 59% | 59% | 59% |
| 4253 | 0.25% | 1.00% | 1.00% | 9.00% | 0.00% | 64% | 83% | 60% | 78% | 57% | 74% | 62% | 81% | 61% | 79% | 60% | 60% | 60% | 60% |
| 4254 | 1.00% | 1.00% | 1.00% | 9.00% | 0.00% | 66% | 86% | 61% | 79% | 60% | 78% | 64% | 83% | 63% | 82% | 62% | 62% | 62% | 62% |
| 4255 | 0.25% | 0.25% | 9.00% | 9.00% | 0.00% | 66% | 86% | 57% | 74% | 59% | 77% | 68% | 88% | 61% | 79% | 61% | 61% | 63% | 63% |
| 4256 | 0.25% | 0.25% | 0.00% | 0.00% | 0.25% | 14% | 18% | 15% | 20% | 15% | 20% | 16% | 21% | 15% | 20% | 15% | 15% | 15% | 15% |
| 4257 | 1.00% | 0.25% | 0.00% | 0.00% | 0.25% | 16% | 21% | 16% | 21% | 18% | 23% | 18% | 23% | 17% | 22% | 17% | 17% | 18% | 18% |
| 4258 | 0.25% | 1.00% | 0.00% | 0.00% | 0.25% | 22% | 29% | 23% | 30% | 18% | 23% | 21% | 27% | 25% | 33% | 21% | 21% | 21% | 21% |
| 4259 | 1.00% | 1.00% | 0.00% | 0.00% | 0.25% | 24% | 31% | 24% | 31% | 21% | 27% | 23% | 30% | 27% | 35% | 23% | 23% | 24% | 24% |
| 4260 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 4261 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 4262 | 0.00% | 0.25% | 0.25% | 0.00% | 0.25% | 16% | 21% | 20% | 26% | 17% | 22% | 18% | 23% | 19% | 25% | 18% | 18% | 18% | 18% |
| 4263 | 0.25% | 0.25% | 0.25% | 0.00% | 0.25% | 18% | 23% | 21% | 27% | 19% | 25% | 19% | 25% | 20% | 26% | 19% | 19% | 19% | 19% |
| 4264 | 0.00% | 1.00% | 0.25% | 0.00% | 0.25% | 24% | 31% | 28% | 36% | 20% | 26% | 23% | 30% | 29% | 38% | 24% | 24% | 24% | 24% |
| 4265 | 1.00% | 1.00% | 0.25% | 0.00% | 0.25% | 28% | 36% | 30% | 39% | 25% | 33% | 26% | 34% | 32% | 42% | 28% | 28% | 28% | 28% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4266 | 1.00% | 9.00% | 0.25% | 0.00% | 0.25% | 41% | 53% | 40% | 52% | 29% | 38% | 37% | 48% | 42% | 55% | 37% | 37% | 36% | 36% |
| 4267 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 4268 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 4269 | 0.00% | 0.25% | 1.00% | 0.00% | 0.25% | 21% | 27% | 23% | 30% | 23% | 30% | 24% | 31% | 23% | 30% | 22% | 22% | 23% | 23% |
| 4270 | 1.00% | 0.25% | 1.00% | 0.00% | 0.25% | 25% | 33% | 25% | 33% | 28% | 36% | 27% | 35% | 26% | 34% | 26% | 26% | 27% | 27% |
| 4271 | 0.00% | 1.00% | 1.00% | 0.00% | 0.25% | 29% | 38% | 31% | 40% | 26% | 34% | 29% | 38% | 33% | 43% | 29% | 29% | 29% | 29% |
| 4272 | 0.25% | 1.00% | 1.00% | 0.00% | 0.25% | 31% | 40% | 32% | 42% | 28% | 36% | 30% | 39% | 34% | 44% | 30% | 30% | 31% | 31% |
| 4273 | 1.00% | 1.00% | 1.00% | 0.00% | 0.25% | 33% | 43% | 33% | 43% | 31% | 40% | 32% | 42% | 36% | 47% | 32% | 32% | 33% | 33% |
| 4274 | 9.00% | 1.00% | 1.00% | 0.00% | 0.25% | 29% | 38% | 31% | 40% | 26% | 34% | 29% | 38% | 33% | 43% | 29% | 29% | 29% | 29% |
| 4275 | 1.00% | 9.00% | 1.00% | 0.00% | 0.25% | 46% | 60% | 43% | 56% | 35% | 46% | 43% | 56% | 46% | 60% | 41% | 41% | 41% | 41% |
| 4276 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 4277 | 0.00% | 0.25% | 9.00% | 0.00% | 0.25% | 31% | 40% | 28% | 36% | 28% | 36% | 35% | 46% | 33% | 43% | 29% | 29% | 32% | 32% |
| 4278 | 0.25% | 0.25% | 9.00% | 0.00% | 0.25% | 33% | 43% | 29% | 38% | 30% | 39% | 36% | 47% | 34% | 44% | 31% | 31% | 33% | 33% |
| 4279 | 1.00% | 0.25% | 9.00% | 0.00% | 0.25% | 35% | 46% | 30% | 39% | 33% | 43% | 38% | 49% | 36% | 47% | 33% | 33% | 36% | 36% |
| 4280 | 0.25% | 1.00% | 9.00% | 0.00% | 0.25% | 41% | 53% | 37% | 48% | 33% | 43% | 41% | 53% | 44% | 57% | 37% | 37% | 39% | 39% |
| 4281 | 0.25% | 0.00% | 0.00% | 0.25% | 0.25% | 14% | 18% | 17% | 22% | 15% | 20% | 19% | 25% | 16% | 21% | 15% | 15% | 17% | 17% |
| 4282 | 1.00% | 0.00% | 0.00% | 0.25% | 0.25% | 16% | 21% | 18% | 23% | 18% | 23% | 21% | 27% | 18% | 23% | 17% | 17% | 19% | 19% |
| 4283 | 0.00% | 0.25% | 0.00% | 0.25% | 0.25% | 17% | 22% | 23% | 30% | 19% | 25% | 25% | 33% | 21% | 27% | 20% | 20% | 22% | 22% |
| 4284 | 0.25% | 0.25% | 0.00% | 0.25% | 0.25% | 19% | 25% | 24% | 31% | 21% | 27% | 26% | 34% | 22% | 29% | 21% | 21% | 23% | 23% |
| 4285 | 9.00% | 0.25% | 0.00% | 0.25% | 0.25% | 17% | 22% | 23% | 30% | 19% | 25% | 25% | 33% | 21% | 27% | 20% | 20% | 22% | 22% |
| 4286 | 1.00% | 1.00% | 0.00% | 0.25% | 0.25% | 29% | 38% | 33% | 43% | 27% | 35% | 33% | 43% | 34% | 44% | 30% | 30% | 31% | 31% |
| 4287 | 1.00% | 9.00% | 0.00% | 0.25% | 0.25% | 42% | 55% | 43% | 56% | 31% | 40% | 44% | 57% | 44% | 57% | 39% | 39% | 40% | 40% |
| 4288 | 0.00% | 0.00% | 0.25% | 0.25% | 0.25% | 16% | 21% | 22% | 29% | 17% | 22% | 21% | 27% | 20% | 26% | 18% | 18% | 19% | 19% |
| 4289 | 0.25% | 0.00% | 0.25% | 0.25% | 0.25% | 18% | 23% | 23% | 30% | 19% | 25% | 22% | 29% | 21% | 27% | 20% | 20% | 21% | 21% |
| 4290 | 0.00% | 0.25% | 0.25% | 0.25% | 0.25% | 21% | 27% | 29% | 38% | 23% | 30% | 28% | 36% | 26% | 34% | 24% | 24% | 26% | 26% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4291 | 0.25% | 0.25% | 0.25% | 0.25% | 0.25% | 23% | 30% | 30% | 39% | 25% | 33% | 29% | 38% | 27% | 35% | 26% | 26% | 27% | 27% |
| 4292 | 1.00% | 0.25% | 0.25% | 0.25% | 0.25% | 25% | 33% | 31% | 40% | 28% | 36% | 31% | 40% | 29% | 38% | 28% | 28% | 29% | 29% |
| 4293 | 9.00% | 0.25% | 0.25% | 0.25% | 0.25% | 21% | 27% | 29% | 38% | 23% | 30% | 28% | 36% | 26% | 34% | 24% | 24% | 26% | 26% |
| 4294 | 0.25% | 1.00% | 0.25% | 0.25% | 0.25% | 31% | 40% | 38% | 49% | 28% | 36% | 34% | 44% | 37% | 48% | 32% | 32% | 33% | 33% |
| 4295 | 9.00% | 1.00% | 0.25% | 0.25% | 0.25% | 29% | 38% | 37% | 48% | 26% | 34% | 33% | 43% | 36% | 47% | 31% | 31% | 32% | 32% |
| 4296 | 0.25% | 9.00% | 0.25% | 0.25% | 0.25% | 44% | 57% | 48% | 62% | 32% | 42% | 45% | 59% | 47% | 61% | 41% | 41% | 41% | 41% |
| 4297 | 1.00% | 9.00% | 0.25% | 0.25% | 0.25% | 46% | 60% | 49% | 64% | 35% | 46% | 47% | 61% | 49% | 64% | 43% | 43% | 44% | 44% |
| 4298 | 9.00% | 9.00% | 0.25% | 0.25% | 0.25% | 42% | 55% | 47% | 61% | 30% | 39% | 44% | 57% | 46% | 60% | 40% | 40% | 40% | 40% |
| 4299 | 0.00% | 0.00% | 1.00% | 0.25% | 0.25% | 21% | 27% | 25% | 33% | 23% | 30% | 27% | 35% | 24% | 31% | 23% | 23% | 25% | 25% |
| 4300 | 1.00% | 0.00% | 1.00% | 0.25% | 0.25% | 25% | 33% | 27% | 35% | 28% | 36% | 30% | 39% | 27% | 35% | 27% | 27% | 28% | 28% |
| 4301 | 0.00% | 0.25% | 1.00% | 0.25% | 0.25% | 26% | 34% | 32% | 42% | 29% | 38% | 34% | 44% | 30% | 39% | 29% | 29% | 31% | 31% |
| 4302 | 0.25% | 0.25% | 1.00% | 0.25% | 0.25% | 28% | 36% | 33% | 43% | 31% | 40% | 35% | 46% | 31% | 40% | 31% | 31% | 32% | 32% |
| 4303 | 1.00% | 0.25% | 1.00% | 0.25% | 0.25% | 30% | 39% | 34% | 44% | 34% | 44% | 37% | 48% | 33% | 43% | 33% | 33% | 35% | 35% |
| 4304 | 9.00% | 0.25% | 1.00% | 0.25% | 0.25% | 26% | 34% | 32% | 42% | 29% | 38% | 34% | 44% | 30% | 39% | 29% | 29% | 31% | 31% |
| 4305 | 0.00% | 1.00% | 1.00% | 0.25% | 0.25% | 34% | 44% | 40% | 52% | 32% | 42% | 39% | 51% | 40% | 52% | 35% | 35% | 37% | 37% |
| 4306 | 0.25% | 1.00% | 1.00% | 0.25% | 0.25% | 36% | 47% | 41% | 53% | 34% | 44% | 40% | 52% | 41% | 53% | 37% | 37% | 38% | 38% |
| 4307 | 1.00% | 1.00% | 1.00% | 0.25% | 0.25% | 38% | 49% | 42% | 55% | 37% | 48% | 42% | 55% | 43% | 56% | 39% | 39% | 41% | 41% |
| 4308 | 9.00% | 1.00% | 1.00% | 0.25% | 0.25% | 34% | 44% | 40% | 52% | 32% | 42% | 39% | 51% | 40% | 52% | 35% | 35% | 37% | 37% |
| 4309 | 0.00% | 9.00% | 1.00% | 0.25% | 0.25% | 47% | 61% | 50% | 65% | 36% | 47% | 50% | 65% | 50% | 65% | 44% | 44% | 45% | 45% |
| 4310 | 0.25% | 9.00% | 1.00% | 0.25% | 0.25% | 49% | 64% | 51% | 66% | 38% | 49% | 51% | 66% | 51% | 66% | 46% | 46% | 47% | 47% |
| 4311 | 1.00% | 9.00% | 1.00% | 0.25% | 0.25% | 51% | 66% | 52% | 68% | 41% | 53% | 53% | 69% | 53% | 69% | 48% | 48% | 49% | 49% |
| 4312 | 0.25% | 0.25% | 9.00% | 0.25% | 0.25% | 38% | 49% | 38% | 49% | 36% | 47% | 46% | 60% | 41% | 53% | 37% | 37% | 41% | 41% |
| 4313 | 1.00% | 0.25% | 9.00% | 0.25% | 0.25% | 40% | 52% | 39% | 51% | 39% | 51% | 48% | 62% | 43% | 56% | 39% | 39% | 43% | 43% |
| 4314 | 9.00% | 0.25% | 9.00% | 0.25% | 0.25% | 36% | 47% | 37% | 48% | 34% | 44% | 45% | 59% | 40% | 52% | 36% | 36% | 40% | 40% |
| 4315 | 0.00% | 1.00% | 9.00% | 0.25% | 0.25% | 44% | 57% | 45% | 59% | 37% | 48% | 50% | 65% | 50% | 65% | 42% | 42% | 46% | 46% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4316 | 0.25% | 1.00% | 9.00% | 0.25% | 0.25% | 46% | 60% | 46% | 60% | 39% | 51% | 51% | 66% | 51% | 66% | 44% | 44% | 47% | 47% |
| 4317 | 9.00% | 1.00% | 9.00% | 0.25% | 0.25% | 44% | 57% | 45% | 59% | 37% | 48% | 50% | 65% | 50% | 65% | 42% | 42% | 46% | 46% |
| 4318 | 1.00% | 9.00% | 9.00% | 0.25% | 0.25% | 61% | 79% | 57% | 74% | 46% | 60% | 64% | 83% | 63% | 82% | 55% | 55% | 58% | 58% |
| 4319 | 0.25% | 0.00% | 0.00% | 1.00% | 0.25% | 29% | 38% | 29% | 38% | 27% | 35% | 29% | 38% | 31% | 40% | 28% | 28% | 29% | 29% |
| 4320 | 1.00% | 0.25% | 0.00% | 1.00% | 0.25% | 36% | 47% | 37% | 48% | 36% | 47% | 38% | 49% | 39% | 51% | 36% | 36% | 38% | 38% |
| 4321 | 0.00% | 1.00% | 0.00% | 1.00% | 0.25% | 40% | 52% | 43% | 56% | 34% | 44% | 40% | 52% | 46% | 60% | 39% | 39% | 40% | 40% |
| 4322 | 0.25% | 1.00% | 0.00% | 1.00% | 0.25% | 42% | 55% | 44% | 57% | 36% | 47% | 41% | 53% | 47% | 61% | 41% | 41% | 41% | 41% |
| 4323 | 1.00% | 1.00% | 0.00% | 1.00% | 0.25% | 44% | 57% | 45% | 59% | 39% | 51% | 43% | 56% | 49% | 64% | 43% | 43% | 44% | 44% |
| 4324 | 0.00% | 0.00% | 0.25% | 1.00% | 0.25% | 31% | 40% | 34% | 44% | 29% | 38% | 31% | 40% | 35% | 46% | 31% | 31% | 32% | 32% |
| 4325 | 1.00% | 0.00% | 0.25% | 1.00% | 0.25% | 35% | 46% | 36% | 47% | 34% | 44% | 34% | 44% | 38% | 49% | 35% | 35% | 35% | 35% |
| 4326 | 0.25% | 0.25% | 0.25% | 1.00% | 0.25% | 38% | 49% | 42% | 55% | 37% | 48% | 39% | 51% | 42% | 55% | 39% | 39% | 39% | 39% |
| 4327 | 1.00% | 0.25% | 0.25% | 1.00% | 0.25% | 40% | 52% | 43% | 56% | 40% | 52% | 41% | 53% | 44% | 57% | 41% | 41% | 42% | 42% |
| 4328 | 9.00% | 0.25% | 0.25% | 1.00% | 0.25% | 36% | 47% | 41% | 53% | 35% | 46% | 38% | 49% | 41% | 53% | 37% | 37% | 38% | 38% |
| 4329 | 0.00% | 1.00% | 0.25% | 1.00% | 0.25% | 44% | 57% | 49% | 64% | 38% | 49% | 43% | 56% | 51% | 66% | 44% | 44% | 44% | 44% |
| 4330 | 0.25% | 1.00% | 0.25% | 1.00% | 0.25% | 46% | 60% | 50% | 65% | 40% | 52% | 44% | 57% | 52% | 68% | 45% | 45% | 45% | 45% |
| 4331 | 1.00% | 1.00% | 0.25% | 1.00% | 0.25% | 48% | 62% | 51% | 66% | 43% | 56% | 46% | 60% | 54% | 70% | 47% | 47% | 48% | 48% |
| 4332 | 9.00% | 1.00% | 0.25% | 1.00% | 0.25% | 44% | 57% | 49% | 64% | 38% | 49% | 43% | 56% | 51% | 66% | 44% | 44% | 44% | 44% |
| 4333 | 0.25% | 9.00% | 0.25% | 1.00% | 0.25% | 59% | 77% | 60% | 78% | 44% | 57% | 55% | 72% | 62% | 81% | 54% | 54% | 54% | 54% |
| 4334 | 1.00% | 9.00% | 0.25% | 1.00% | 0.25% | 61% | 79% | 61% | 79% | 47% | 61% | 57% | 74% | 64% | 83% | 56% | 56% | 56% | 56% |
| 4335 | 9.00% | 9.00% | 0.25% | 1.00% | 0.25% | 57% | 74% | 59% | 77% | 42% | 55% | 54% | 70% | 61% | 79% | 53% | 53% | 52% | 52% |
| 4336 | 0.00% | 0.00% | 1.00% | 1.00% | 0.25% | 36% | 47% | 37% | 48% | 35% | 46% | 37% | 48% | 39% | 51% | 36% | 36% | 37% | 37% |
| 4337 | 0.25% | 0.00% | 1.00% | 1.00% | 0.25% | 38% | 49% | 38% | 49% | 37% | 48% | 38% | 49% | 40% | 52% | 38% | 38% | 38% | 38% |
| 4338 | 1.00% | 0.00% | 1.00% | 1.00% | 0.25% | 40% | 52% | 39% | 51% | 40% | 52% | 40% | 52% | 42% | 55% | 40% | 40% | 41% | 41% |
| 4339 | 0.00% | 0.25% | 1.00% | 1.00% | 0.25% | 41% | 53% | 44% | 57% | 41% | 53% | 44% | 57% | 45% | 59% | 42% | 42% | 43% | 43% |
| 4340 | 1.00% | 0.25% | 1.00% | 1.00% | 0.25% | 45% | 59% | 46% | 60% | 46% | 60% | 47% | 61% | 48% | 62% | 46% | 46% | 47% | 47% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4341 | 9.00% | 0.25% | 1.00% | 1.00% | 0.25% | 41% | 53% | 44% | 57% | 41% | 53% | 44% | 57% | 45% | 59% | 42% | 42% | 43% | 43% |
| 4342 | 0.00% | 1.00% | 1.00% | 1.00% | 0.25% | 49% | 64% | 52% | 68% | 44% | 57% | 49% | 64% | 55% | 72% | 48% | 48% | 49% | 49% |
| 4343 | 0.25% | 1.00% | 1.00% | 1.00% | 0.25% | 51% | 66% | 53% | 69% | 46% | 60% | 50% | 65% | 56% | 73% | 50% | 50% | 51% | 51% |
| 4344 | 1.00% | 1.00% | 1.00% | 1.00% | 0.25% | 53% | 69% | 54% | 70% | 49% | 64% | 52% | 68% | 58% | 75% | 52% | 52% | 53% | 53% |
| 4345 | 9.00% | 1.00% | 1.00% | 1.00% | 0.25% | 49% | 64% | 52% | 68% | 44% | 57% | 49% | 64% | 55% | 72% | 48% | 48% | 49% | 49% |
| 4346 | 0.00% | 9.00% | 1.00% | 1.00% | 0.25% | 62% | 81% | 62% | 81% | 48% | 62% | 60% | 78% | 65% | 85% | 57% | 57% | 58% | 58% |
| 4347 | 0.25% | 9.00% | 1.00% | 1.00% | 0.25% | 64% | 83% | 63% | 82% | 50% | 65% | 61% | 79% | 66% | 86% | 59% | 59% | 59% | 59% |
| 4348 | 1.00% | 9.00% | 1.00% | 1.00% | 0.25% | 66% | 86% | 64% | 83% | 53% | 69% | 63% | 82% | 68% | 88% | 61% | 61% | 61% | 61% |
| 4349 | 0.25% | 0.25% | 9.00% | 1.00% | 0.25% | 53% | 69% | 50% | 65% | 48% | 62% | 56% | 73% | 56% | 73% | 50% | 50% | 53% | 53% |
| 4350 | 1.00% | 0.25% | 9.00% | 1.00% | 0.25% | 55% | 72% | 51% | 66% | 51% | 66% | 58% | 75% | 58% | 75% | 52% | 52% | 56% | 56% |
| 4351 | 9.00% | 0.25% | 9.00% | 1.00% | 0.25% | 51% | 66% | 49% | 64% | 46% | 60% | 55% | 72% | 55% | 72% | 49% | 49% | 52% | 52% |
| 4352 | 0.25% | 1.00% | 9.00% | 1.00% | 0.25% | 61% | 79% | 58% | 75% | 51% | 66% | 61% | 79% | 66% | 86% | 57% | 57% | 59% | 59% |
| 4353 | 0.00% | 0.25% | 0.00% | 9.00% | 0.25% | 52% | 68% | 49% | 64% | 49% | 64% | 55% | 72% | 49% | 64% | 50% | 50% | 51% | 51% |
| 4354 | 0.00% | 0.00% | 0.25% | 9.00% | 0.25% | 51% | 66% | 48% | 62% | 47% | 61% | 51% | 66% | 48% | 62% | 49% | 49% | 49% | 49% |
| 4355 | 0.25% | 0.00% | 0.25% | 9.00% | 0.25% | 53% | 69% | 49% | 64% | 49% | 64% | 52% | 68% | 49% | 64% | 50% | 50% | 50% | 50% |
| 4356 | 0.00% | 0.25% | 0.25% | 9.00% | 0.25% | 56% | 73% | 55% | 72% | 53% | 69% | 58% | 75% | 54% | 70% | 55% | 55% | 55% | 55% |
| 4357 | 0.25% | 0.25% | 0.25% | 9.00% | 0.25% | 58% | 75% | 56% | 73% | 55% | 72% | 59% | 77% | 55% | 72% | 56% | 56% | 56% | 56% |
| 4358 | 1.00% | 0.25% | 0.25% | 9.00% | 0.25% | 60% | 78% | 57% | 74% | 58% | 75% | 61% | 79% | 57% | 74% | 58% | 58% | 59% | 59% |
| 4359 | 9.00% | 0.25% | 0.25% | 9.00% | 0.25% | 56% | 73% | 55% | 72% | 53% | 69% | 58% | 75% | 54% | 70% | 55% | 55% | 55% | 55% |
| 4360 | 0.00% | 1.00% | 0.25% | 9.00% | 0.25% | 64% | 83% | 63% | 82% | 56% | 73% | 63% | 82% | 64% | 83% | 61% | 61% | 61% | 61% |
| 4361 | 0.25% | 1.00% | 0.25% | 9.00% | 0.25% | 66% | 86% | 64% | 83% | 58% | 75% | 64% | 83% | 65% | 85% | 63% | 63% | 62% | 62% |
| 4362 | 1.00% | 1.00% | 0.25% | 9.00% | 0.25% | 68% | 88% | 65% | 85% | 61% | 79% | 66% | 86% | 67% | 87% | 65% | 65% | 65% | 65% |
| 4363 | 0.25% | 9.00% | 0.25% | 9.00% | 0.25% | 79% | 103% | 74% | 96% | 62% | 81% | 75% | 98% | 75% | 98% | 72% | 72% | 71% | 71% |
| 4364 | 0.25% | 0.00% | 1.00% | 9.00% | 0.25% | 58% | 75% | 52% | 68% | 55% | 72% | 58% | 75% | 53% | 69% | 55% | 55% | 55% | 55% |
| 4365 | 1.00% | 0.25% | 1.00% | 9.00% | 0.25% | 65% | 85% | 60% | 78% | 64% | 83% | 67% | 87% | 61% | 79% | 63% | 63% | 64% | 64% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4366 | 9.00% | 0.25% | 1.00% | 9.00% | 0.25% | 61% | 79% | 58% | 75% | 59% | 77% | 64% | 83% | 58% | 75% | 59% | 59% | 60% | 60% |
| 4367 | 0.00% | 1.00% | 1.00% | 9.00% | 0.25% | 69% | 90% | 66% | 86% | 62% | 81% | 69% | 90% | 68% | 88% | 66% | 66% | 66% | 66% |
| 4368 | 0.25% | 1.00% | 1.00% | 9.00% | 0.25% | 71% | 92% | 67% | 87% | 64% | 83% | 70% | 91% | 69% | 90% | 67% | 67% | 68% | 68% |
| 4369 | 1.00% | 1.00% | 1.00% | 9.00% | 0.25% | 73% | 95% | 68% | 88% | 67% | 87% | 72% | 94% | 71% | 92% | 69% | 69% | 70% | 70% |
| 4370 | 0.25% | 0.25% | 9.00% | 9.00% | 0.25% | 73% | 95% | 64% | 83% | 66% | 86% | 76% | 99% | 69% | 90% | 68% | 68% | 70% | 70% |
| 4371 | 0.25% | 0.25% | 0.00% | 0.00% | 1.00% | 22% | 29% | 24% | 31% | 24% | 31% | 22% | 29% | 26% | 34% | 23% | 23% | 24% | 24% |
| 4372 | 1.00% | 0.25% | 0.00% | 0.00% | 1.00% | 24% | 31% | 25% | 33% | 27% | 35% | 24% | 31% | 28% | 36% | 25% | 25% | 26% | 26% |
| 4373 | 0.25% | 1.00% | 0.00% | 0.00% | 1.00% | 30% | 39% | 32% | 42% | 27% | 35% | 27% | 35% | 36% | 47% | 30% | 30% | 30% | 30% |
| 4374 | 1.00% | 1.00% | 0.00% | 0.00% | 1.00% | 32% | 42% | 33% | 43% | 30% | 39% | 29% | 38% | 38% | 49% | 32% | 32% | 32% | 32% |
| 4375 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 4376 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 4377 | 0.00% | 0.25% | 0.25% | 0.00% | 1.00% | 24% | 31% | 29% | 38% | 26% | 34% | 24% | 31% | 30% | 39% | 26% | 26% | 27% | 27% |
| 4378 | 0.25% | 0.25% | 0.25% | 0.00% | 1.00% | 26% | 34% | 30% | 39% | 28% | 36% | 25% | 33% | 31% | 40% | 28% | 28% | 28% | 28% |
| 4379 | 0.00% | 1.00% | 0.25% | 0.00% | 1.00% | 32% | 42% | 37% | 48% | 29% | 38% | 29% | 38% | 40% | 52% | 33% | 33% | 33% | 33% |
| 4380 | 1.00% | 1.00% | 0.25% | 0.00% | 1.00% | 36% | 47% | 39% | 51% | 34% | 44% | 32% | 42% | 43% | 56% | 36% | 36% | 36% | 36% |
| 4381 | 1.00% | 9.00% | 0.25% | 0.00% | 1.00% | 49% | 64% | 49% | 64% | 38% | 49% | 43% | 56% | 53% | 69% | 45% | 45% | 45% | 45% |
| 4382 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 4383 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 4384 | 0.00% | 0.25% | 1.00% | 0.00% | 1.00% | 29% | 38% | 32% | 42% | 32% | 42% | 30% | 39% | 34% | 44% | 31% | 31% | 32% | 32% |
| 4385 | 1.00% | 0.25% | 1.00% | 0.00% | 1.00% | 33% | 43% | 34% | 44% | 37% | 48% | 33% | 43% | 37% | 48% | 35% | 35% | 36% | 36% |
| 4386 | 0.00% | 1.00% | 1.00% | 0.00% | 1.00% | 37% | 48% | 40% | 52% | 35% | 46% | 35% | 46% | 44% | 57% | 37% | 37% | 38% | 38% |
| 4387 | 0.25% | 1.00% | 1.00% | 0.00% | 1.00% | 39% | 51% | 41% | 53% | 37% | 48% | 36% | 47% | 45% | 59% | 39% | 39% | 39% | 39% |
| 4388 | 1.00% | 1.00% | 1.00% | 0.00% | 1.00% | 41% | 53% | 42% | 55% | 40% | 52% | 38% | 49% | 47% | 61% | 41% | 41% | 42% | 42% |
| 4389 | 9.00% | 1.00% | 1.00% | 0.00% | 1.00% | 37% | 48% | 40% | 52% | 35% | 46% | 35% | 46% | 44% | 57% | 37% | 37% | 38% | 38% |
| 4390 | 1.00% | 9.00% | 1.00% | 0.00% | 1.00% | 54% | 70% | 52% | 68% | 44% | 57% | 49% | 64% | 57% | 74% | 50% | 50% | 50% | 50% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4391 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 4392 | 0.00% | 0.25% | 9.00% | 0.00% | 1.00% | 39% | 51% | 37% | 48% | 37% | 48% | 41% | 53% | 44% | 57% | 38% | 38% | 41% | 41% |
| 4393 | 0.25% | 0.25% | 9.00% | 0.00% | 1.00% | 41% | 53% | 38% | 49% | 39% | 51% | 42% | 55% | 45% | 59% | 39% | 39% | 42% | 42% |
| 4394 | 1.00% | 0.25% | 9.00% | 0.00% | 1.00% | 43% | 56% | 39% | 51% | 42% | 55% | 44% | 57% | 47% | 61% | 41% | 41% | 44% | 44% |
| 4395 | 0.25% | 1.00% | 9.00% | 0.00% | 1.00% | 49% | 64% | 46% | 60% | 42% | 55% | 47% | 61% | 55% | 72% | 46% | 46% | 48% | 48% |
| 4396 | 0.25% | 0.00% | 0.00% | 0.25% | 1.00% | 22% | 29% | 26% | 34% | 24% | 31% | 25% | 33% | 27% | 35% | 24% | 24% | 25% | 25% |
| 4397 | 1.00% | 0.00% | 0.00% | 0.25% | 1.00% | 24% | 31% | 27% | 35% | 27% | 35% | 27% | 35% | 29% | 38% | 26% | 26% | 28% | 28% |
| 4398 | 0.00% | 0.25% | 0.00% | 0.25% | 1.00% | 25% | 33% | 32% | 42% | 28% | 36% | 31% | 40% | 32% | 42% | 28% | 28% | 30% | 30% |
| 4399 | 0.25% | 0.25% | 0.00% | 0.25% | 1.00% | 27% | 35% | 33% | 43% | 30% | 39% | 32% | 42% | 33% | 43% | 30% | 30% | 32% | 32% |
| 4400 | 9.00% | 0.25% | 0.00% | 0.25% | 1.00% | 25% | 33% | 32% | 42% | 28% | 36% | 31% | 40% | 32% | 42% | 28% | 28% | 30% | 30% |
| 4401 | 1.00% | 1.00% | 0.00% | 0.25% | 1.00% | 37% | 48% | 42% | 55% | 36% | 47% | 39% | 51% | 45% | 59% | 38% | 38% | 40% | 40% |
| 4402 | 1.00% | 9.00% | 0.00% | 0.25% | 1.00% | 50% | 65% | 52% | 68% | 40% | 52% | 50% | 65% | 55% | 72% | 47% | 47% | 48% | 48% |
| 4403 | 0.00% | 0.00% | 0.25% | 0.25% | 1.00% | 24% | 31% | 31% | 40% | 26% | 34% | 27% | 35% | 31% | 40% | 27% | 27% | 28% | 28% |
| 4404 | 0.25% | 0.00% | 0.25% | 0.25% | 1.00% | 26% | 34% | 32% | 42% | 28% | 36% | 28% | 36% | 32% | 42% | 29% | 29% | 29% | 29% |
| 4405 | 0.00% | 0.25% | 0.25% | 0.25% | 1.00% | 29% | 38% | 38% | 49% | 32% | 42% | 34% | 44% | 37% | 48% | 33% | 33% | 34% | 34% |
| 4406 | 0.25% | 0.25% | 0.25% | 0.25% | 1.00% | 31% | 40% | 39% | 51% | 34% | 44% | 35% | 46% | 38% | 49% | 35% | 35% | 36% | 36% |
| 4407 | 1.00% | 0.25% | 0.25% | 0.25% | 1.00% | 33% | 43% | 40% | 52% | 37% | 48% | 37% | 48% | 40% | 52% | 37% | 37% | 38% | 38% |
| 4408 | 9.00% | 0.25% | 0.25% | 0.25% | 1.00% | 29% | 38% | 38% | 49% | 32% | 42% | 34% | 44% | 37% | 48% | 33% | 33% | 34% | 34% |
| 4409 | 0.25% | 1.00% | 0.25% | 0.25% | 1.00% | 39% | 51% | 47% | 61% | 37% | 48% | 40% | 52% | 48% | 62% | 41% | 41% | 42% | 42% |
| 4410 | 9.00% | 1.00% | 0.25% | 0.25% | 1.00% | 37% | 48% | 46% | 60% | 35% | 46% | 39% | 51% | 47% | 61% | 39% | 39% | 40% | 40% |
| 4411 | 0.25% | 9.00% | 0.25% | 0.25% | 1.00% | 52% | 68% | 57% | 74% | 41% | 53% | 51% | 66% | 58% | 75% | 50% | 50% | 50% | 50% |
| 4412 | 1.00% | 9.00% | 0.25% | 0.25% | 1.00% | 54% | 70% | 58% | 75% | 44% | 57% | 53% | 69% | 60% | 78% | 52% | 52% | 52% | 52% |
| 4413 | 9.00% | 9.00% | 0.25% | 0.25% | 1.00% | 50% | 65% | 56% | 73% | 39% | 51% | 50% | 65% | 57% | 74% | 48% | 48% | 49% | 49% |
| 4414 | 0.00% | 0.00% | 1.00% | 0.25% | 1.00% | 29% | 38% | 34% | 44% | 32% | 42% | 33% | 43% | 35% | 46% | 32% | 32% | 33% | 33% |
| 4415 | 1.00% | 0.00% | 1.00% | 0.25% | 1.00% | 33% | 43% | 36% | 47% | 37% | 48% | 36% | 47% | 38% | 49% | 35% | 35% | 37% | 37% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4416 | 0.00% | 0.25% | 1.00% | 0.25% | 1.00% | 34% | 44% | 41% | 53% | 38% | 49% | 40% | 52% | 41% | 53% | 38% | 38% | 40% | 40% |
| 4417 | 0.25% | 0.25% | 1.00% | 0.25% | 1.00% | 36% | 47% | 42% | 55% | 40% | 52% | 41% | 53% | 42% | 55% | 39% | 39% | 41% | 41% |
| 4418 | 1.00% | 0.25% | 1.00% | 0.25% | 1.00% | 38% | 49% | 43% | 56% | 43% | 56% | 43% | 56% | 44% | 57% | 41% | 41% | 43% | 43% |
| 4419 | 9.00% | 0.25% | 1.00% | 0.25% | 1.00% | 34% | 44% | 41% | 53% | 38% | 49% | 40% | 52% | 41% | 53% | 38% | 38% | 40% | 40% |
| 4420 | 0.00% | 1.00% | 1.00% | 0.25% | 1.00% | 42% | 55% | 49% | 64% | 41% | 53% | 45% | 59% | 51% | 66% | 44% | 44% | 46% | 46% |
| 4421 | 0.25% | 1.00% | 1.00% | 0.25% | 1.00% | 44% | 57% | 50% | 65% | 43% | 56% | 46% | 60% | 52% | 68% | 46% | 46% | 47% | 47% |
| 4422 | 1.00% | 1.00% | 1.00% | 0.25% | 1.00% | 46% | 60% | 51% | 66% | 46% | 60% | 48% | 62% | 54% | 70% | 48% | 48% | 49% | 49% |
| 4423 | 9.00% | 1.00% | 1.00% | 0.25% | 1.00% | 42% | 55% | 49% | 64% | 41% | 53% | 45% | 59% | 51% | 66% | 44% | 44% | 46% | 46% |
| 4424 | 0.00% | 9.00% | 1.00% | 0.25% | 1.00% | 55% | 72% | 59% | 77% | 45% | 59% | 56% | 73% | 61% | 79% | 53% | 53% | 54% | 54% |
| 4425 | 0.25% | 9.00% | 1.00% | 0.25% | 1.00% | 57% | 74% | 60% | 78% | 47% | 61% | 57% | 74% | 62% | 81% | 55% | 55% | 55% | 55% |
| 4426 | 1.00% | 9.00% | 1.00% | 0.25% | 1.00% | 59% | 77% | 61% | 79% | 50% | 65% | 59% | 77% | 64% | 83% | 57% | 57% | 58% | 58% |
| 4427 | 0.25% | 0.25% | 9.00% | 0.25% | 1.00% | 46% | 60% | 47% | 61% | 45% | 59% | 52% | 68% | 52% | 68% | 46% | 46% | 50% | 50% |
| 4428 | 1.00% | 0.25% | 9.00% | 0.25% | 1.00% | 48% | 62% | 48% | 62% | 48% | 62% | 54% | 70% | 54% | 70% | 48% | 48% | 52% | 52% |
| 4429 | 9.00% | 0.25% | 9.00% | 0.25% | 1.00% | 44% | 57% | 46% | 60% | 43% | 56% | 51% | 66% | 51% | 66% | 44% | 44% | 48% | 48% |
| 4430 | 0.00% | 1.00% | 9.00% | 0.25% | 1.00% | 52% | 68% | 54% | 70% | 46% | 60% | 56% | 73% | 61% | 79% | 51% | 51% | 54% | 54% |
| 4431 | 0.25% | 1.00% | 9.00% | 0.25% | 1.00% | 54% | 70% | 55% | 72% | 48% | 62% | 57% | 74% | 62% | 81% | 52% | 52% | 56% | 56% |
| 4432 | 9.00% | 1.00% | 9.00% | 0.25% | 1.00% | 52% | 68% | 54% | 70% | 46% | 60% | 56% | 73% | 61% | 79% | 51% | 51% | 54% | 54% |
| 4433 | 1.00% | 9.00% | 9.00% | 0.25% | 1.00% | 69% | 90% | 66% | 86% | 55% | 72% | 70% | 91% | 74% | 96% | 63% | 63% | 66% | 66% |
| 4434 | 0.25% | 0.00% | 0.00% | 1.00% | 1.00% | 37% | 48% | 38% | 49% | 36% | 47% | 35% | 46% | 42% | 55% | 37% | 37% | 38% | 38% |
| 4435 | 1.00% | 0.25% | 0.00% | 1.00% | 1.00% | 44% | 57% | 46% | 60% | 45% | 59% | 44% | 57% | 50% | 65% | 45% | 45% | 46% | 46% |
| 4436 | 0.00% | 1.00% | 0.00% | 1.00% | 1.00% | 48% | 62% | 52% | 68% | 43% | 56% | 46% | 60% | 57% | 74% | 48% | 48% | 49% | 49% |
| 4437 | 0.25% | 1.00% | 0.00% | 1.00% | 1.00% | 50% | 65% | 53% | 69% | 45% | 59% | 47% | 61% | 58% | 75% | 49% | 49% | 50% | 50% |
| 4438 | 1.00% | 1.00% | 0.00% | 1.00% | 1.00% | 52% | 68% | 54% | 70% | 48% | 62% | 49% | 64% | 60% | 78% | 51% | 51% | 52% | 52% |
| 4439 | 0.00% | 0.00% | 0.25% | 1.00% | 1.00% | 39% | 51% | 43% | 56% | 38% | 49% | 37% | 48% | 46% | 60% | 40% | 40% | 40% | 40% |
| 4440 | 1.00% | 0.00% | 0.25% | 1.00% | 1.00% | 43% | 56% | 45% | 59% | 43% | 56% | 40% | 52% | 49% | 64% | 44% | 44% | 44% | 44% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4441 | 0.25% | 0.25% | 0.25% | 1.00% | 1.00% | 46% | 60% | 51% | 66% | 46% | 60% | 45% | 59% | 53% | 69% | 48% | 48% | 48% | 48% |
| 4442 | 1.00% | 0.25% | 0.25% | 1.00% | 1.00% | 48% | 62% | 52% | 68% | 49% | 64% | 47% | 61% | 55% | 72% | 50% | 50% | 50% | 50% |
| 4443 | 9.00% | 0.25% | 0.25% | 1.00% | 1.00% | 44% | 57% | 50% | 65% | 44% | 57% | 44% | 57% | 52% | 68% | 46% | 46% | 47% | 47% |
| 4444 | 0.00% | 1.00% | 0.25% | 1.00% | 1.00% | 52% | 68% | 58% | 75% | 47% | 61% | 49% | 64% | 62% | 81% | 52% | 52% | 53% | 53% |
| 4445 | 0.25% | 1.00% | 0.25% | 1.00% | 1.00% | 54% | 70% | 59% | 77% | 49% | 64% | 50% | 65% | 63% | 82% | 54% | 54% | 54% | 54% |
| 4446 | 1.00% | 1.00% | 0.25% | 1.00% | 1.00% | 56% | 73% | 60% | 78% | 52% | 68% | 52% | 68% | 65% | 85% | 56% | 56% | 56% | 56% |
| 4447 | 9.00% | 1.00% | 0.25% | 1.00% | 1.00% | 52% | 68% | 58% | 75% | 47% | 61% | 49% | 64% | 62% | 81% | 52% | 52% | 53% | 53% |
| 4448 | 0.25% | 9.00% | 0.25% | 1.00% | 1.00% | 67% | 87% | 69% | 90% | 53% | 69% | 61% | 79% | 73% | 95% | 63% | 63% | 62% | 62% |
| 4449 | 1.00% | 9.00% | 0.25% | 1.00% | 1.00% | 69% | 90% | 70% | 91% | 56% | 73% | 63% | 82% | 75% | 98% | 65% | 65% | 65% | 65% |
| 4450 | 9.00% | 9.00% | 0.25% | 1.00% | 1.00% | 65% | 85% | 68% | 88% | 51% | 66% | 60% | 78% | 72% | 94% | 61% | 61% | 61% | 61% |
| 4451 | 0.00% | 0.00% | 1.00% | 1.00% | 1.00% | 44% | 57% | 46% | 60% | 44% | 57% | 43% | 56% | 50% | 65% | 45% | 45% | 46% | 46% |
| 4452 | 0.25% | 0.00% | 1.00% | 1.00% | 1.00% | 46% | 60% | 47% | 61% | 46% | 60% | 44% | 57% | 51% | 66% | 46% | 46% | 47% | 47% |
| 4453 | 1.00% | 0.00% | 1.00% | 1.00% | 1.00% | 48% | 62% | 48% | 62% | 49% | 64% | 46% | 60% | 53% | 69% | 48% | 48% | 49% | 49% |
| 4454 | 0.00% | 0.25% | 1.00% | 1.00% | 1.00% | 49% | 64% | 53% | 69% | 50% | 65% | 50% | 65% | 56% | 73% | 51% | 51% | 52% | 52% |
| 4455 | 1.00% | 0.25% | 1.00% | 1.00% | 1.00% | 53% | 69% | 55% | 72% | 55% | 72% | 53% | 69% | 59% | 77% | 54% | 54% | 56% | 56% |
| 4456 | 9.00% | 0.25% | 1.00% | 1.00% | 1.00% | 49% | 64% | 53% | 69% | 50% | 65% | 50% | 65% | 56% | 73% | 51% | 51% | 52% | 52% |
| 4457 | 0.00% | 1.00% | 1.00% | 1.00% | 1.00% | 57% | 74% | 61% | 79% | 53% | 69% | 55% | 72% | 66% | 86% | 57% | 57% | 58% | 58% |
| 4458 | 0.25% | 1.00% | 1.00% | 1.00% | 1.00% | 59% | 77% | 62% | 81% | 55% | 72% | 56% | 73% | 67% | 87% | 59% | 59% | 59% | 59% |
| 4459 | 1.00% | 1.00% | 1.00% | 1.00% | 1.00% | 61% | 79% | 63% | 82% | 58% | 75% | 58% | 75% | 69% | 90% | 61% | 61% | 62% | 62% |
| 4460 | 9.00% | 1.00% | 1.00% | 1.00% | 1.00% | 57% | 74% | 61% | 79% | 53% | 69% | 55% | 72% | 66% | 86% | 57% | 57% | 58% | 58% |
| 4461 | 0.00% | 9.00% | 1.00% | 1.00% | 1.00% | 70% | 91% | 71% | 92% | 57% | 74% | 66% | 86% | 76% | 99% | 66% | 66% | 66% | 66% |
| 4462 | 0.25% | 9.00% | 1.00% | 1.00% | 1.00% | 72% | 94% | 72% | 94% | 59% | 77% | 67% | 87% | 77% | 100 % | 68% | 68% | 68% | 68% |
| 4463 | 1.00% | 9.00% | 1.00% | 1.00% | 1.00% | 74% | 96% | 73% | 95% | 62% | 81% | 69% | 90% | 79% | 103 % | 70% | 70% | 70% | 70% |
| 4464 | 0.25% | 0.25% | 9.00% | 1.00% | 1.00% | 61% | 79% | 59% | 77% | 57% | 74% | 62% | 81% | 67% | 87% | 59% | 59% | 62% | 62% |
| 4465 | 1.00% | 0.25% | 9.00% | 1.00% | 1.00% | 63% | 82% | 60% | 78% | 60% | 78% | 64% | 83% | 69% | 90% | 61% | 61% | 64% | 64% |

Fig. 18

| Formula # | Delta Dodecalactone | Methyl Apritone | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4466 | 9.00% | 0.25% | 9.00% | 1.00% | 1.00% | 59% | 77% | 58% | 75% | 55% | 72% | 61% | 79% | 66% | 86% | 57% | 57% | 61% | 61% |
| 4467 | 0.25% | 1.00% | 9.00% | 1.00% | 1.00% | 69% | 90% | 67% | 87% | 60% | 78% | 67% | 87% | 77% | 100% | 65% | 65% | 68% | 68% |
| 4468 | 0.00% | 0.25% | 0.00% | 9.00% | 1.00% | 60% | 78% | 58% | 75% | 58% | 75% | 61% | 79% | 60% | 78% | 59% | 59% | 60% | 60% |
| 4469 | 0.00% | 0.00% | 0.25% | 9.00% | 1.00% | 59% | 77% | 57% | 74% | 56% | 73% | 57% | 74% | 59% | 77% | 57% | 57% | 57% | 57% |
| 4470 | 0.25% | 0.00% | 0.25% | 9.00% | 1.00% | 61% | 79% | 58% | 75% | 58% | 75% | 58% | 75% | 60% | 78% | 59% | 59% | 59% | 59% |
| 4471 | 0.00% | 0.25% | 0.25% | 9.00% | 1.00% | 64% | 83% | 64% | 83% | 62% | 81% | 64% | 83% | 65% | 85% | 63% | 63% | 64% | 64% |
| 4472 | 0.25% | 0.25% | 0.25% | 9.00% | 1.00% | 66% | 86% | 65% | 85% | 64% | 83% | 65% | 85% | 66% | 86% | 65% | 65% | 65% | 65% |
| 4473 | 1.00% | 0.25% | 0.25% | 9.00% | 1.00% | 68% | 88% | 66% | 86% | 67% | 87% | 67% | 87% | 68% | 88% | 67% | 67% | 67% | 67% |
| 4474 | 9.00% | 0.25% | 0.25% | 9.00% | 1.00% | 64% | 83% | 64% | 83% | 62% | 81% | 64% | 83% | 65% | 85% | 63% | 63% | 64% | 64% |
| 4475 | 0.00% | 1.00% | 0.25% | 9.00% | 1.00% | 72% | 94% | 72% | 94% | 65% | 85% | 69% | 90% | 75% | 98% | 70% | 70% | 70% | 70% |
| 4476 | 0.25% | 1.00% | 0.25% | 9.00% | 1.00% | 74% | 96% | 73% | 95% | 67% | 87% | 70% | 91% | 76% | 99% | 71% | 71% | 71% | 71% |
| 4477 | 1.00% | 1.00% | 0.25% | 9.00% | 1.00% | 76% | 99% | 74% | 96% | 70% | 91% | 72% | 94% | 78% | 100% | 73% | 73% | 73% | 73% |
| 4478 | 0.25% | 9.00% | 0.25% | 9.00% | 1.00% | 87% | 100% | 83% | 100% | 71% | 92% | 81% | 100% | 86% | 100% | 80% | 80% | 79% | 79% |
| 4479 | 0.25% | 0.00% | 1.00% | 9.00% | 1.00% | 66% | 86% | 61% | 79% | 64% | 83% | 64% | 83% | 64% | 83% | 64% | 64% | 64% | 64% |
| 4480 | 1.00% | 0.25% | 1.00% | 9.00% | 1.00% | 73% | 95% | 69% | 90% | 73% | 95% | 73% | 95% | 72% | 94% | 72% | 72% | 73% | 73% |
| 4481 | 9.00% | 0.25% | 1.00% | 9.00% | 1.00% | 69% | 90% | 67% | 87% | 68% | 88% | 70% | 91% | 69% | 90% | 68% | 68% | 69% | 69% |
| 4482 | 0.00% | 1.00% | 1.00% | 9.00% | 1.00% | 77% | 100% | 75% | 98% | 71% | 92% | 75% | 98% | 79% | 100% | 74% | 74% | 75% | 75% |
| 4483 | 0.25% | 1.00% | 1.00% | 9.00% | 1.00% | 79% | 100% | 76% | 99% | 73% | 95% | 76% | 99% | 80% | 100% | 76% | 76% | 76% | 76% |
| 4484 | 1.00% | 1.00% | 1.00% | 9.00% | 1.00% | 81% | 100% | 77% | 100% | 76% | 99% | 78% | 100% | 82% | 100% | 78% | 78% | 79% | 79% |
| 4485 | 0.25% | 0.25% | 9.00% | 9.00% | 1.00% | 81% | 100% | 73% | 95% | 75% | 98% | 82% | 100% | 80% | 100% | 76% | 76% | 79% | 79% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4486 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 4487 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 4488 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 4489 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 4490 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 4491 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 4492 | 0.00% | 0.25% | 0.25% | 0.00% | 0.00% | 9% | 12% | 13% | 17% | 10% | 13% | 10% | 13% | 11% | 14% | 11% | 11% | 10% | 10% |
| 4493 | 0.25% | 0.25% | 0.25% | 0.00% | 0.00% | 11% | 14% | 14% | 18% | 12% | 16% | 11% | 14% | 12% | 16% | 12% | 12% | 12% | 12% |
| 4494 | 0.00% | 1.00% | 0.25% | 0.00% | 0.00% | 17% | 22% | 21% | 27% | 13% | 17% | 15% | 20% | 21% | 27% | 17% | 17% | 16% | 16% |
| 4495 | 1.00% | 1.00% | 0.25% | 0.00% | 0.00% | 21% | 27% | 23% | 30% | 18% | 23% | 18% | 23% | 24% | 31% | 21% | 21% | 20% | 20% |
| 4496 | 1.00% | 9.00% | 0.25% | 0.00% | 0.00% | 34% | 44% | 33% | 43% | 22% | 29% | 29% | 38% | 34% | 44% | 30% | 30% | 28% | 28% |
| 4497 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 4498 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 4499 | 0.00% | 0.25% | 1.00% | 0.00% | 0.00% | 14% | 18% | 16% | 21% | 16% | 21% | 16% | 21% | 15% | 20% | 15% | 15% | 16% | 16% |
| 4500 | 1.00% | 0.25% | 1.00% | 0.00% | 0.00% | 18% | 23% | 18% | 23% | 21% | 27% | 19% | 25% | 18% | 23% | 19% | 19% | 19% | 19% |
| 4501 | 0.00% | 1.00% | 1.00% | 0.00% | 0.00% | 22% | 29% | 24% | 31% | 19% | 25% | 21% | 27% | 25% | 33% | 22% | 22% | 22% | 22% |
| 4502 | 0.25% | 1.00% | 1.00% | 0.00% | 0.00% | 24% | 31% | 25% | 33% | 21% | 27% | 22% | 29% | 26% | 34% | 23% | 23% | 23% | 23% |
| 4503 | 1.00% | 1.00% | 1.00% | 0.00% | 0.00% | 26% | 34% | 26% | 34% | 24% | 31% | 24% | 31% | 28% | 36% | 25% | 25% | 25% | 25% |
| 4504 | 9.00% | 1.00% | 1.00% | 0.00% | 0.00% | 22% | 29% | 24% | 31% | 19% | 25% | 21% | 27% | 25% | 33% | 22% | 22% | 22% | 22% |
| 4505 | 1.00% | 9.00% | 1.00% | 0.00% | 0.00% | 39% | 51% | 36% | 47% | 28% | 36% | 35% | 46% | 38% | 49% | 34% | 34% | 34% | 34% |
| 4506 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 4507 | 0.00% | 0.25% | 9.00% | 0.00% | 0.00% | 24% | 31% | 21% | 27% | 21% | 27% | 27% | 35% | 25% | 33% | 22% | 22% | 24% | 24% |
| 4508 | 0.25% | 0.25% | 9.00% | 0.00% | 0.00% | 26% | 34% | 22% | 29% | 23% | 30% | 28% | 36% | 26% | 34% | 24% | 24% | 26% | 26% |
| 4509 | 1.00% | 0.25% | 9.00% | 0.00% | 0.00% | 28% | 36% | 23% | 30% | 26% | 34% | 30% | 39% | 28% | 36% | 26% | 26% | 28% | 28% |
| 4510 | 0.25% | 1.00% | 9.00% | 0.00% | 0.00% | 34% | 44% | 30% | 39% | 26% | 34% | 33% | 43% | 36% | 47% | 30% | 30% | 32% | 32% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4511 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 4512 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 4513 | 0.00% | 0.25% | 0.00% | 0.25% | 0.00% | 12% | 16% | 12% | 16% | 11% | 14% | 17% | 22% | 12% | 16% | 12% | 12% | 13% | 13% |
| 4514 | 0.25% | 0.25% | 0.00% | 0.25% | 0.00% | 14% | 18% | 13% | 17% | 13% | 17% | 18% | 23% | 13% | 17% | 13% | 13% | 15% | 15% |
| 4515 | 9.00% | 0.25% | 0.00% | 0.25% | 0.00% | 12% | 16% | 12% | 16% | 11% | 14% | 17% | 22% | 12% | 16% | 12% | 12% | 13% | 13% |
| 4516 | 1.00% | 1.00% | 0.00% | 0.25% | 0.00% | 24% | 31% | 22% | 29% | 19% | 25% | 25% | 33% | 25% | 33% | 22% | 22% | 23% | 23% |
| 4517 | 1.00% | 9.00% | 0.00% | 0.25% | 0.00% | 37% | 48% | 32% | 42% | 23% | 30% | 36% | 47% | 35% | 46% | 31% | 31% | 31% | 31% |
| 4518 | 0.00% | 0.00% | 0.25% | 0.25% | 0.00% | 11% | 14% | 11% | 14% | 9% | 12% | 13% | 17% | 11% | 14% | 10% | 10% | 11% | 11% |
| 4519 | 0.25% | 0.00% | 0.25% | 0.25% | 0.00% | 13% | 17% | 12% | 16% | 11% | 14% | 14% | 18% | 12% | 16% | 12% | 12% | 12% | 12% |
| 4520 | 0.00% | 0.25% | 0.25% | 0.25% | 0.00% | 16% | 21% | 18% | 23% | 15% | 20% | 20% | 26% | 17% | 22% | 16% | 16% | 17% | 17% |
| 4521 | 0.25% | 0.25% | 0.25% | 0.25% | 0.00% | 18% | 23% | 19% | 25% | 17% | 22% | 21% | 27% | 18% | 23% | 18% | 18% | 19% | 19% |
| 4522 | 1.00% | 0.25% | 0.25% | 0.25% | 0.00% | 20% | 26% | 20% | 26% | 20% | 26% | 23% | 30% | 20% | 26% | 20% | 20% | 21% | 21% |
| 4523 | 9.00% | 0.25% | 0.25% | 0.25% | 0.00% | 16% | 21% | 18% | 23% | 15% | 20% | 20% | 26% | 17% | 22% | 16% | 16% | 17% | 17% |
| 4524 | 0.25% | 1.00% | 0.25% | 0.25% | 0.00% | 26% | 34% | 27% | 35% | 20% | 26% | 26% | 34% | 28% | 36% | 24% | 24% | 25% | 25% |
| 4525 | 9.00% | 1.00% | 0.25% | 0.25% | 0.00% | 24% | 31% | 26% | 34% | 18% | 23% | 25% | 33% | 27% | 35% | 23% | 23% | 23% | 23% |
| 4526 | 0.25% | 9.00% | 0.25% | 0.25% | 0.00% | 39% | 51% | 37% | 48% | 24% | 31% | 37% | 48% | 38% | 49% | 33% | 33% | 33% | 33% |
| 4527 | 1.00% | 9.00% | 0.25% | 0.25% | 0.00% | 41% | 53% | 38% | 49% | 27% | 35% | 39% | 51% | 40% | 52% | 35% | 35% | 35% | 35% |
| 4528 | 9.00% | 9.00% | 0.25% | 0.25% | 0.00% | 37% | 48% | 36% | 47% | 22% | 29% | 36% | 47% | 37% | 48% | 32% | 32% | 32% | 32% |
| 4529 | 0.00% | 0.00% | 1.00% | 0.25% | 0.00% | 16% | 21% | 14% | 18% | 15% | 20% | 19% | 25% | 15% | 20% | 15% | 15% | 16% | 16% |
| 4530 | 1.00% | 0.00% | 1.00% | 0.25% | 0.00% | 20% | 26% | 16% | 21% | 20% | 26% | 22% | 29% | 18% | 23% | 19% | 19% | 20% | 20% |
| 4531 | 0.00% | 0.25% | 1.00% | 0.25% | 0.00% | 21% | 27% | 21% | 27% | 21% | 27% | 26% | 34% | 21% | 27% | 21% | 21% | 23% | 23% |
| 4532 | 0.25% | 0.25% | 1.00% | 0.25% | 0.00% | 23% | 30% | 22% | 29% | 23% | 30% | 27% | 35% | 22% | 29% | 23% | 23% | 24% | 24% |
| 4533 | 1.00% | 0.25% | 1.00% | 0.25% | 0.00% | 25% | 33% | 23% | 30% | 26% | 34% | 29% | 38% | 24% | 31% | 25% | 25% | 26% | 26% |
| 4534 | 9.00% | 0.25% | 1.00% | 0.25% | 0.00% | 21% | 27% | 21% | 27% | 21% | 27% | 26% | 34% | 21% | 27% | 21% | 21% | 23% | 23% |
| 4535 | 0.00% | 1.00% | 1.00% | 0.25% | 0.00% | 29% | 38% | 29% | 38% | 24% | 31% | 31% | 40% | 31% | 40% | 27% | 27% | 29% | 29% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4536 | 0.25% | 1.00% | 1.00% | 0.25% | 0.00% | 31% | 40% | 30% | 39% | 26% | 34% | 32% | 42% | 32% | 42% | 29% | 29% | 30% | 30% |
| 4537 | 1.00% | 1.00% | 1.00% | 0.25% | 0.00% | 33% | 43% | 31% | 40% | 29% | 38% | 34% | 44% | 34% | 44% | 31% | 31% | 32% | 32% |
| 4538 | 9.00% | 1.00% | 1.00% | 0.25% | 0.00% | 29% | 38% | 29% | 38% | 24% | 31% | 31% | 40% | 31% | 40% | 27% | 27% | 29% | 29% |
| 4539 | 0.00% | 9.00% | 1.00% | 0.25% | 0.00% | 42% | 55% | 39% | 51% | 28% | 36% | 42% | 55% | 41% | 53% | 36% | 36% | 37% | 37% |
| 4540 | 0.25% | 9.00% | 1.00% | 0.25% | 0.00% | 44% | 57% | 40% | 52% | 30% | 39% | 43% | 56% | 42% | 55% | 38% | 38% | 38% | 38% |
| 4541 | 1.00% | 9.00% | 1.00% | 0.25% | 0.00% | 46% | 60% | 41% | 53% | 33% | 43% | 45% | 59% | 44% | 57% | 40% | 40% | 41% | 41% |
| 4542 | 0.25% | 0.25% | 9.00% | 0.25% | 0.00% | 33% | 43% | 27% | 35% | 28% | 36% | 38% | 49% | 32% | 42% | 29% | 29% | 33% | 33% |
| 4543 | 1.00% | 0.25% | 9.00% | 0.25% | 0.00% | 35% | 46% | 28% | 36% | 31% | 40% | 40% | 52% | 34% | 44% | 31% | 31% | 35% | 35% |
| 4544 | 9.00% | 0.25% | 9.00% | 0.25% | 0.00% | 31% | 40% | 26% | 34% | 26% | 34% | 37% | 48% | 31% | 40% | 28% | 28% | 31% | 31% |
| 4545 | 0.00% | 1.00% | 9.00% | 0.25% | 0.00% | 39% | 51% | 34% | 44% | 29% | 38% | 42% | 55% | 41% | 53% | 34% | 34% | 37% | 37% |
| 4546 | 0.25% | 1.00% | 9.00% | 0.25% | 0.00% | 41% | 53% | 35% | 46% | 31% | 40% | 43% | 56% | 42% | 55% | 36% | 36% | 39% | 39% |
| 4547 | 9.00% | 1.00% | 9.00% | 0.25% | 0.00% | 39% | 51% | 34% | 44% | 29% | 38% | 42% | 55% | 41% | 53% | 34% | 34% | 37% | 37% |
| 4548 | 1.00% | 9.00% | 9.00% | 0.25% | 0.00% | 56% | 73% | 46% | 60% | 38% | 49% | 56% | 73% | 54% | 70% | 47% | 47% | 49% | 49% |
| 4549 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 4550 | 1.00% | 0.25% | 0.00% | 1.00% | 0.00% | 24% | 31% | 21% | 27% | 23% | 30% | 27% | 35% | 24% | 31% | 23% | 23% | 25% | 25% |
| 4551 | 0.00% | 1.00% | 0.00% | 1.00% | 0.00% | 28% | 36% | 27% | 35% | 21% | 27% | 29% | 38% | 31% | 40% | 25% | 25% | 27% | 27% |
| 4552 | 0.25% | 1.00% | 0.00% | 1.00% | 0.00% | 30% | 39% | 28% | 36% | 23% | 30% | 30% | 39% | 32% | 42% | 27% | 27% | 28% | 28% |
| 4553 | 1.00% | 1.00% | 0.00% | 1.00% | 0.00% | 32% | 42% | 29% | 38% | 26% | 34% | 32% | 42% | 34% | 44% | 29% | 29% | 31% | 31% |
| 4554 | 0.00% | 0.00% | 0.25% | 1.00% | 0.00% | 19% | 25% | 18% | 23% | 16% | 21% | 20% | 26% | 20% | 26% | 18% | 18% | 19% | 19% |
| 4555 | 1.00% | 0.00% | 0.25% | 1.00% | 0.00% | 23% | 30% | 20% | 26% | 21% | 27% | 23% | 30% | 23% | 30% | 21% | 21% | 22% | 22% |
| 4556 | 0.25% | 0.25% | 0.25% | 1.00% | 0.00% | 26% | 34% | 26% | 34% | 24% | 31% | 28% | 36% | 27% | 35% | 25% | 25% | 26% | 26% |
| 4557 | 1.00% | 0.25% | 0.25% | 1.00% | 0.00% | 28% | 36% | 27% | 35% | 27% | 35% | 30% | 39% | 29% | 38% | 27% | 27% | 29% | 29% |
| 4558 | 9.00% | 0.25% | 0.25% | 1.00% | 0.00% | 24% | 31% | 25% | 33% | 22% | 29% | 27% | 35% | 26% | 34% | 24% | 24% | 25% | 25% |
| 4559 | 0.00% | 1.00% | 0.25% | 1.00% | 0.00% | 32% | 42% | 33% | 43% | 25% | 33% | 32% | 42% | 36% | 47% | 30% | 30% | 31% | 31% |
| 4560 | 0.25% | 1.00% | 0.25% | 1.00% | 0.00% | 34% | 44% | 34% | 44% | 27% | 35% | 33% | 43% | 37% | 48% | 32% | 32% | 32% | 32% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4561 | 1.00% | 1.00% | 0.25% | 1.00% | 0.00% | 36% | 47% | 35% | 46% | 30% | 39% | 35% | 46% | 39% | 51% | 34% | 34% | 35% | 35% |
| 4562 | 9.00% | 1.00% | 0.25% | 1.00% | 0.00% | 32% | 42% | 33% | 43% | 25% | 33% | 32% | 42% | 36% | 47% | 30% | 30% | 31% | 31% |
| 4563 | 0.25% | 9.00% | 0.25% | 1.00% | 0.00% | 47% | 61% | 44% | 57% | 31% | 40% | 44% | 57% | 47% | 61% | 41% | 41% | 41% | 41% |
| 4564 | 1.00% | 9.00% | 0.25% | 1.00% | 0.00% | 49% | 64% | 45% | 59% | 34% | 44% | 46% | 60% | 49% | 64% | 43% | 43% | 43% | 43% |
| 4565 | 9.00% | 9.00% | 0.25% | 1.00% | 0.00% | 45% | 59% | 43% | 56% | 29% | 38% | 43% | 56% | 46% | 60% | 39% | 39% | 39% | 39% |
| 4566 | 0.00% | 0.00% | 1.00% | 1.00% | 0.00% | 24% | 31% | 21% | 27% | 22% | 29% | 26% | 34% | 24% | 31% | 22% | 22% | 24% | 24% |
| 4567 | 0.25% | 0.00% | 1.00% | 1.00% | 0.00% | 26% | 34% | 22% | 29% | 24% | 31% | 27% | 35% | 25% | 33% | 24% | 24% | 25% | 25% |
| 4568 | 1.00% | 0.00% | 1.00% | 1.00% | 0.00% | 28% | 36% | 23% | 30% | 27% | 35% | 29% | 38% | 27% | 35% | 26% | 26% | 28% | 28% |
| 4569 | 0.00% | 0.25% | 1.00% | 1.00% | 0.00% | 29% | 38% | 28% | 36% | 28% | 36% | 33% | 43% | 30% | 39% | 28% | 28% | 30% | 30% |
| 4570 | 1.00% | 0.25% | 1.00% | 1.00% | 0.00% | 33% | 43% | 30% | 39% | 33% | 43% | 36% | 47% | 33% | 43% | 32% | 32% | 34% | 34% |
| 4571 | 9.00% | 0.25% | 1.00% | 1.00% | 0.00% | 29% | 38% | 28% | 36% | 28% | 36% | 33% | 43% | 30% | 39% | 28% | 28% | 30% | 30% |
| 4572 | 0.00% | 1.00% | 1.00% | 1.00% | 0.00% | 37% | 48% | 36% | 47% | 31% | 40% | 38% | 49% | 40% | 52% | 35% | 35% | 36% | 36% |
| 4573 | 0.25% | 1.00% | 1.00% | 1.00% | 0.00% | 39% | 51% | 37% | 48% | 33% | 43% | 39% | 51% | 41% | 53% | 36% | 36% | 38% | 38% |
| 4574 | 1.00% | 1.00% | 1.00% | 1.00% | 0.00% | 41% | 53% | 38% | 49% | 36% | 47% | 41% | 53% | 43% | 56% | 38% | 38% | 40% | 40% |
| 4575 | 9.00% | 1.00% | 1.00% | 1.00% | 0.00% | 37% | 48% | 36% | 47% | 31% | 40% | 38% | 49% | 40% | 52% | 35% | 35% | 36% | 36% |
| 4576 | 0.00% | 9.00% | 1.00% | 1.00% | 0.00% | 50% | 65% | 46% | 60% | 35% | 46% | 49% | 64% | 50% | 65% | 44% | 44% | 45% | 45% |
| 4577 | 0.25% | 9.00% | 1.00% | 1.00% | 0.00% | 52% | 68% | 47% | 61% | 37% | 48% | 50% | 65% | 51% | 66% | 45% | 45% | 46% | 46% |
| 4578 | 1.00% | 9.00% | 1.00% | 1.00% | 0.00% | 54% | 70% | 48% | 62% | 40% | 52% | 52% | 68% | 53% | 69% | 47% | 47% | 48% | 48% |
| 4579 | 0.25% | 0.25% | 9.00% | 1.00% | 0.00% | 41% | 53% | 34% | 44% | 35% | 46% | 45% | 59% | 41% | 53% | 37% | 37% | 40% | 40% |
| 4580 | 1.00% | 0.25% | 9.00% | 1.00% | 0.00% | 43% | 56% | 35% | 46% | 38% | 49% | 47% | 61% | 43% | 56% | 39% | 39% | 43% | 43% |
| 4581 | 9.00% | 0.25% | 9.00% | 1.00% | 0.00% | 39% | 51% | 33% | 43% | 33% | 43% | 44% | 57% | 40% | 52% | 35% | 35% | 39% | 39% |
| 4582 | 0.25% | 1.00% | 9.00% | 1.00% | 0.00% | 49% | 64% | 42% | 55% | 38% | 49% | 50% | 65% | 51% | 66% | 43% | 43% | 46% | 46% |
| 4583 | 0.00% | 0.25% | 0.00% | 9.00% | 0.00% | 42% | 55% | 39% | 51% | 34% | 44% | 46% | 60% | 41% | 53% | 38% | 38% | 40% | 40% |
| 4584 | 0.00% | 0.00% | 0.25% | 9.00% | 0.00% | 41% | 53% | 38% | 49% | 32% | 42% | 42% | 55% | 40% | 52% | 37% | 37% | 38% | 38% |
| 4585 | 0.25% | 0.00% | 0.25% | 9.00% | 0.00% | 43% | 56% | 39% | 51% | 34% | 44% | 43% | 56% | 41% | 53% | 39% | 39% | 39% | 39% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4586 | 0.00% | 0.25% | 0.25% | 9.00% | 0.00% | 46% | 60% | 45% | 59% | 38% | 49% | 49% | 64% | 46% | 60% | 43% | 43% | 44% | 44% |
| 4587 | 0.25% | 0.25% | 0.25% | 9.00% | 0.00% | 48% | 62% | 46% | 60% | 40% | 52% | 50% | 65% | 47% | 61% | 45% | 45% | 46% | 46% |
| 4588 | 1.00% | 0.25% | 0.25% | 9.00% | 0.00% | 50% | 65% | 47% | 61% | 43% | 56% | 52% | 68% | 49% | 64% | 47% | 47% | 48% | 48% |
| 4589 | 9.00% | 0.25% | 0.25% | 9.00% | 0.00% | 46% | 60% | 45% | 59% | 38% | 49% | 49% | 64% | 46% | 60% | 43% | 43% | 44% | 44% |
| 4590 | 0.00% | 1.00% | 0.25% | 9.00% | 0.00% | 54% | 70% | 53% | 69% | 41% | 53% | 54% | 70% | 56% | 73% | 49% | 49% | 50% | 50% |
| 4591 | 0.25% | 1.00% | 0.25% | 9.00% | 0.00% | 56% | 73% | 54% | 70% | 43% | 56% | 55% | 72% | 57% | 74% | 51% | 51% | 52% | 52% |
| 4592 | 1.00% | 1.00% | 0.25% | 9.00% | 0.00% | 58% | 75% | 55% | 72% | 46% | 60% | 57% | 74% | 59% | 77% | 53% | 53% | 54% | 54% |
| 4593 | 0.25% | 9.00% | 0.25% | 9.00% | 0.00% | 69% | 90% | 64% | 83% | 47% | 61% | 66% | 86% | 67% | 87% | 60% | 60% | 60% | 60% |
| 4594 | 0.25% | 0.00% | 1.00% | 9.00% | 0.00% | 48% | 62% | 42% | 55% | 40% | 52% | 49% | 64% | 45% | 59% | 43% | 43% | 45% | 45% |
| 4595 | 1.00% | 0.25% | 1.00% | 9.00% | 0.00% | 55% | 72% | 50% | 65% | 49% | 64% | 58% | 75% | 53% | 69% | 51% | 51% | 53% | 53% |
| 4596 | 9.00% | 0.25% | 1.00% | 9.00% | 0.00% | 51% | 66% | 48% | 62% | 44% | 57% | 55% | 72% | 50% | 65% | 48% | 48% | 50% | 50% |
| 4597 | 0.00% | 1.00% | 1.00% | 9.00% | 0.00% | 59% | 77% | 56% | 73% | 47% | 61% | 60% | 78% | 60% | 78% | 54% | 54% | 56% | 56% |
| 4598 | 0.25% | 1.00% | 1.00% | 9.00% | 0.00% | 61% | 79% | 57% | 74% | 49% | 64% | 61% | 79% | 61% | 79% | 56% | 56% | 57% | 57% |
| 4599 | 1.00% | 1.00% | 1.00% | 9.00% | 0.00% | 63% | 82% | 58% | 75% | 52% | 68% | 63% | 82% | 63% | 82% | 58% | 58% | 59% | 59% |
| 4600 | 0.25% | 0.25% | 9.00% | 9.00% | 0.00% | 63% | 82% | 54% | 70% | 51% | 66% | 67% | 87% | 61% | 79% | 56% | 56% | 60% | 60% |
| 4601 | 0.25% | 0.25% | 0.00% | 0.00% | 0.25% | 14% | 18% | 15% | 20% | 15% | 20% | 16% | 21% | 15% | 20% | 15% | 15% | 15% | 15% |
| 4602 | 1.00% | 0.25% | 0.00% | 0.00% | 0.25% | 16% | 21% | 16% | 21% | 18% | 23% | 18% | 23% | 17% | 22% | 17% | 17% | 18% | 18% |
| 4603 | 0.25% | 1.00% | 0.00% | 0.00% | 0.25% | 22% | 29% | 23% | 30% | 18% | 23% | 21% | 27% | 25% | 33% | 21% | 21% | 21% | 21% |
| 4604 | 1.00% | 1.00% | 0.00% | 0.00% | 0.25% | 24% | 31% | 24% | 31% | 21% | 27% | 23% | 30% | 27% | 35% | 23% | 23% | 24% | 24% |
| 4605 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 4606 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 4607 | 0.00% | 0.25% | 0.25% | 0.00% | 0.25% | 16% | 21% | 20% | 26% | 17% | 22% | 18% | 23% | 19% | 25% | 18% | 18% | 18% | 18% |
| 4608 | 0.25% | 0.25% | 0.25% | 0.00% | 0.25% | 18% | 23% | 21% | 27% | 19% | 25% | 19% | 25% | 20% | 26% | 19% | 19% | 19% | 19% |
| 4609 | 0.00% | 1.00% | 0.25% | 0.00% | 0.25% | 24% | 31% | 28% | 36% | 20% | 26% | 23% | 30% | 29% | 38% | 24% | 24% | 24% | 24% |
| 4610 | 1.00% | 1.00% | 0.25% | 0.00% | 0.25% | 28% | 36% | 30% | 39% | 25% | 33% | 26% | 34% | 32% | 42% | 28% | 28% | 28% | 28% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4611 | 1.00% | 9.00% | 0.25% | 0.00% | 0.25% | 41% | 53% | 40% | 52% | 29% | 38% | 37% | 48% | 42% | 55% | 37% | 37% | 36% | 36% |
| 4612 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 4613 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 4614 | 0.00% | 0.25% | 1.00% | 0.00% | 0.25% | 21% | 27% | 23% | 30% | 23% | 30% | 24% | 31% | 23% | 30% | 22% | 22% | 23% | 23% |
| 4615 | 1.00% | 0.25% | 1.00% | 0.00% | 0.25% | 25% | 33% | 25% | 33% | 28% | 36% | 27% | 35% | 26% | 34% | 26% | 26% | 27% | 27% |
| 4616 | 0.00% | 1.00% | 1.00% | 0.00% | 0.25% | 29% | 38% | 31% | 40% | 26% | 34% | 29% | 38% | 33% | 43% | 29% | 29% | 29% | 29% |
| 4617 | 0.25% | 1.00% | 1.00% | 0.00% | 0.25% | 31% | 40% | 32% | 42% | 28% | 36% | 30% | 39% | 34% | 44% | 30% | 30% | 31% | 31% |
| 4618 | 1.00% | 1.00% | 1.00% | 0.00% | 0.25% | 33% | 43% | 33% | 43% | 31% | 40% | 32% | 42% | 36% | 47% | 32% | 32% | 33% | 33% |
| 4619 | 9.00% | 1.00% | 1.00% | 0.00% | 0.25% | 29% | 38% | 31% | 40% | 26% | 34% | 29% | 38% | 33% | 43% | 29% | 29% | 29% | 29% |
| 4620 | 1.00% | 9.00% | 1.00% | 0.00% | 0.25% | 46% | 60% | 43% | 56% | 35% | 46% | 43% | 56% | 46% | 60% | 41% | 41% | 41% | 41% |
| 4621 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 4622 | 0.00% | 0.25% | 9.00% | 0.00% | 0.25% | 31% | 40% | 28% | 36% | 28% | 36% | 35% | 46% | 33% | 43% | 29% | 29% | 32% | 32% |
| 4623 | 0.25% | 0.25% | 9.00% | 0.00% | 0.25% | 33% | 43% | 29% | 38% | 30% | 39% | 36% | 47% | 34% | 44% | 31% | 31% | 33% | 33% |
| 4624 | 1.00% | 0.25% | 9.00% | 0.00% | 0.25% | 35% | 46% | 30% | 39% | 33% | 43% | 38% | 49% | 36% | 47% | 33% | 33% | 36% | 36% |
| 4625 | 0.25% | 1.00% | 9.00% | 0.00% | 0.25% | 41% | 53% | 37% | 48% | 33% | 43% | 41% | 53% | 44% | 57% | 37% | 37% | 39% | 39% |
| 4626 | 0.25% | 0.00% | 0.00% | 0.25% | 0.25% | 16% | 21% | 13% | 17% | 14% | 18% | 19% | 25% | 15% | 20% | 14% | 14% | 16% | 16% |
| 4627 | 1.00% | 0.00% | 0.00% | 0.25% | 0.25% | 18% | 23% | 14% | 18% | 17% | 22% | 21% | 27% | 17% | 22% | 16% | 16% | 18% | 18% |
| 4628 | 0.00% | 0.25% | 0.00% | 0.25% | 0.25% | 19% | 25% | 19% | 25% | 18% | 23% | 25% | 33% | 20% | 26% | 19% | 19% | 21% | 21% |
| 4629 | 0.25% | 0.25% | 0.00% | 0.25% | 0.25% | 21% | 27% | 20% | 26% | 20% | 26% | 26% | 34% | 21% | 27% | 20% | 20% | 22% | 22% |
| 4630 | 9.00% | 0.25% | 0.00% | 0.25% | 0.25% | 19% | 25% | 19% | 25% | 18% | 23% | 25% | 33% | 20% | 26% | 19% | 19% | 21% | 21% |
| 4631 | 1.00% | 1.00% | 0.00% | 0.25% | 0.25% | 31% | 40% | 29% | 38% | 26% | 34% | 33% | 43% | 33% | 43% | 29% | 29% | 31% | 31% |
| 4632 | 1.00% | 9.00% | 0.00% | 0.25% | 0.25% | 44% | 57% | 39% | 51% | 30% | 39% | 44% | 57% | 43% | 56% | 38% | 38% | 39% | 39% |
| 4633 | 0.00% | 0.00% | 0.25% | 0.25% | 0.25% | 18% | 23% | 18% | 23% | 16% | 21% | 21% | 27% | 19% | 25% | 17% | 17% | 19% | 19% |
| 4634 | 0.25% | 0.00% | 0.25% | 0.25% | 0.25% | 20% | 26% | 19% | 25% | 18% | 23% | 22% | 29% | 20% | 26% | 19% | 19% | 20% | 20% |
| 4635 | 0.00% | 0.25% | 0.25% | 0.25% | 0.25% | 23% | 30% | 25% | 33% | 22% | 29% | 28% | 36% | 25% | 33% | 23% | 23% | 25% | 25% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4636 | 0.25% | 0.25% | 0.25% | 0.25% | 0.25% | 25% | 33% | 26% | 34% | 24% | 31% | 29% | 38% | 26% | 34% | 25% | 25% | 26% | 26% |
| 4637 | 1.00% | 0.25% | 0.25% | 0.25% | 0.25% | 27% | 35% | 27% | 35% | 27% | 35% | 31% | 40% | 28% | 36% | 27% | 27% | 29% | 29% |
| 4638 | 9.00% | 0.25% | 0.25% | 0.25% | 0.25% | 23% | 30% | 25% | 33% | 22% | 29% | 28% | 36% | 25% | 33% | 23% | 23% | 25% | 25% |
| 4639 | 0.25% | 1.00% | 0.25% | 0.25% | 0.25% | 33% | 43% | 34% | 44% | 27% | 35% | 34% | 44% | 36% | 47% | 31% | 31% | 32% | 32% |
| 4640 | 9.00% | 1.00% | 0.25% | 0.25% | 0.25% | 31% | 40% | 33% | 43% | 25% | 33% | 33% | 43% | 35% | 46% | 30% | 30% | 31% | 31% |
| 4641 | 0.25% | 9.00% | 0.25% | 0.25% | 0.25% | 46% | 60% | 44% | 57% | 31% | 40% | 45% | 59% | 46% | 60% | 40% | 40% | 41% | 41% |
| 4642 | 1.00% | 9.00% | 0.25% | 0.25% | 0.25% | 48% | 62% | 45% | 59% | 34% | 44% | 47% | 61% | 48% | 62% | 42% | 42% | 43% | 43% |
| 4643 | 9.00% | 9.00% | 0.25% | 0.25% | 0.25% | 44% | 57% | 43% | 56% | 29% | 38% | 44% | 57% | 45% | 59% | 39% | 39% | 39% | 39% |
| 4644 | 0.00% | 0.00% | 1.00% | 0.25% | 0.25% | 23% | 30% | 21% | 27% | 22% | 29% | 27% | 35% | 23% | 30% | 22% | 22% | 24% | 24% |
| 4645 | 1.00% | 0.00% | 1.00% | 0.25% | 0.25% | 27% | 35% | 23% | 30% | 27% | 35% | 30% | 39% | 26% | 34% | 26% | 26% | 28% | 28% |
| 4646 | 0.00% | 0.25% | 1.00% | 0.25% | 0.25% | 28% | 36% | 28% | 36% | 28% | 36% | 34% | 44% | 29% | 38% | 28% | 28% | 30% | 30% |
| 4647 | 0.25% | 0.25% | 1.00% | 0.25% | 0.25% | 30% | 39% | 29% | 38% | 30% | 39% | 35% | 46% | 30% | 39% | 30% | 30% | 32% | 32% |
| 4648 | 1.00% | 0.25% | 1.00% | 0.25% | 0.25% | 32% | 42% | 30% | 39% | 33% | 43% | 37% | 48% | 32% | 42% | 32% | 32% | 34% | 34% |
| 4649 | 9.00% | 0.25% | 1.00% | 0.25% | 0.25% | 28% | 36% | 28% | 36% | 28% | 36% | 34% | 44% | 29% | 38% | 28% | 28% | 30% | 30% |
| 4650 | 0.00% | 1.00% | 1.00% | 0.25% | 0.25% | 36% | 47% | 36% | 47% | 31% | 40% | 39% | 51% | 39% | 51% | 34% | 34% | 36% | 36% |
| 4651 | 0.25% | 1.00% | 1.00% | 0.25% | 0.25% | 38% | 49% | 37% | 48% | 33% | 43% | 40% | 52% | 40% | 52% | 36% | 36% | 38% | 38% |
| 4652 | 1.00% | 1.00% | 1.00% | 0.25% | 0.25% | 40% | 52% | 38% | 49% | 36% | 47% | 42% | 55% | 42% | 55% | 38% | 38% | 40% | 40% |
| 4653 | 9.00% | 1.00% | 1.00% | 0.25% | 0.25% | 36% | 47% | 36% | 47% | 31% | 40% | 39% | 51% | 39% | 51% | 34% | 34% | 36% | 36% |
| 4654 | 0.00% | 9.00% | 1.00% | 0.25% | 0.25% | 49% | 64% | 46% | 60% | 35% | 46% | 50% | 65% | 49% | 64% | 43% | 43% | 45% | 45% |
| 4655 | 0.25% | 9.00% | 1.00% | 0.25% | 0.25% | 51% | 66% | 47% | 61% | 37% | 48% | 51% | 66% | 50% | 65% | 45% | 45% | 46% | 46% |
| 4656 | 1.00% | 9.00% | 1.00% | 0.25% | 0.25% | 53% | 69% | 48% | 62% | 40% | 52% | 53% | 69% | 52% | 68% | 47% | 47% | 48% | 48% |
| 4657 | 0.25% | 0.25% | 9.00% | 0.25% | 0.25% | 40% | 52% | 34% | 44% | 35% | 46% | 46% | 60% | 40% | 52% | 36% | 36% | 40% | 40% |
| 4658 | 1.00% | 0.25% | 9.00% | 0.25% | 0.25% | 42% | 55% | 35% | 46% | 38% | 49% | 48% | 62% | 42% | 55% | 38% | 38% | 43% | 43% |
| 4659 | 9.00% | 0.25% | 9.00% | 0.25% | 0.25% | 38% | 49% | 33% | 43% | 33% | 43% | 45% | 59% | 39% | 51% | 35% | 35% | 39% | 39% |
| 4660 | 0.00% | 1.00% | 9.00% | 0.25% | 0.25% | 46% | 60% | 41% | 53% | 36% | 47% | 50% | 65% | 49% | 64% | 41% | 41% | 45% | 45% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4661 | 0.25% | 1.00% | 9.00% | 0.25% | 0.25% | 48% | 62% | 42% | 55% | 38% | 49% | 51% | 66% | 50% | 65% | 43% | 43% | 46% | 46% |
| 4662 | 9.00% | 1.00% | 9.00% | 0.25% | 0.25% | 46% | 60% | 41% | 53% | 36% | 47% | 50% | 65% | 49% | 64% | 41% | 41% | 45% | 45% |
| 4663 | 1.00% | 9.00% | 9.00% | 0.25% | 0.25% | 63% | 82% | 53% | 69% | 45% | 59% | 64% | 83% | 62% | 81% | 54% | 54% | 57% | 57% |
| 4664 | 0.25% | 0.00% | 0.00% | 1.00% | 0.25% | 24% | 31% | 20% | 26% | 21% | 27% | 26% | 34% | 24% | 31% | 22% | 22% | 24% | 24% |
| 4665 | 1.00% | 0.25% | 0.00% | 1.00% | 0.25% | 31% | 40% | 28% | 36% | 30% | 39% | 35% | 46% | 32% | 42% | 30% | 30% | 32% | 32% |
| 4666 | 0.00% | 1.00% | 0.00% | 1.00% | 0.25% | 35% | 46% | 34% | 44% | 28% | 36% | 37% | 48% | 39% | 51% | 32% | 32% | 35% | 35% |
| 4667 | 0.25% | 1.00% | 0.00% | 1.00% | 0.25% | 37% | 48% | 35% | 46% | 30% | 39% | 38% | 49% | 40% | 52% | 34% | 34% | 36% | 36% |
| 4668 | 1.00% | 1.00% | 0.00% | 1.00% | 0.25% | 39% | 51% | 36% | 47% | 33% | 43% | 40% | 52% | 42% | 55% | 36% | 36% | 38% | 38% |
| 4669 | 0.00% | 0.00% | 0.25% | 1.00% | 0.25% | 26% | 34% | 25% | 33% | 23% | 30% | 28% | 36% | 28% | 36% | 25% | 25% | 26% | 26% |
| 4670 | 1.00% | 0.00% | 0.25% | 1.00% | 0.25% | 30% | 39% | 27% | 35% | 28% | 36% | 31% | 40% | 31% | 40% | 28% | 28% | 30% | 30% |
| 4671 | 0.25% | 0.25% | 0.25% | 1.00% | 0.25% | 33% | 43% | 33% | 43% | 31% | 40% | 36% | 47% | 35% | 46% | 32% | 32% | 34% | 34% |
| 4672 | 1.00% | 0.25% | 0.25% | 1.00% | 0.25% | 35% | 46% | 34% | 44% | 34% | 44% | 38% | 49% | 37% | 48% | 34% | 34% | 36% | 36% |
| 4673 | 9.00% | 0.25% | 0.25% | 1.00% | 0.25% | 31% | 40% | 32% | 42% | 29% | 38% | 35% | 46% | 34% | 44% | 31% | 31% | 33% | 33% |
| 4674 | 0.00% | 1.00% | 0.25% | 1.00% | 0.25% | 39% | 51% | 40% | 52% | 32% | 42% | 40% | 52% | 44% | 57% | 37% | 37% | 39% | 39% |
| 4675 | 0.25% | 1.00% | 0.25% | 1.00% | 0.25% | 41% | 53% | 41% | 53% | 34% | 44% | 41% | 53% | 45% | 59% | 39% | 39% | 40% | 40% |
| 4676 | 1.00% | 1.00% | 0.25% | 1.00% | 0.25% | 43% | 56% | 42% | 55% | 37% | 48% | 43% | 56% | 47% | 61% | 41% | 41% | 42% | 42% |
| 4677 | 9.00% | 1.00% | 0.25% | 1.00% | 0.25% | 39% | 51% | 40% | 52% | 32% | 42% | 40% | 52% | 44% | 57% | 37% | 37% | 39% | 39% |
| 4678 | 0.25% | 9.00% | 0.25% | 1.00% | 0.25% | 54% | 70% | 51% | 66% | 38% | 49% | 52% | 68% | 55% | 72% | 48% | 48% | 48% | 48% |
| 4679 | 1.00% | 9.00% | 0.25% | 1.00% | 0.25% | 56% | 73% | 52% | 68% | 41% | 53% | 54% | 70% | 57% | 74% | 50% | 50% | 51% | 51% |
| 4680 | 9.00% | 9.00% | 0.25% | 1.00% | 0.25% | 52% | 68% | 50% | 65% | 36% | 47% | 51% | 66% | 54% | 70% | 46% | 46% | 47% | 47% |
| 4681 | 0.00% | 0.00% | 1.00% | 1.00% | 0.25% | 31% | 40% | 28% | 36% | 29% | 38% | 34% | 44% | 32% | 42% | 29% | 29% | 32% | 32% |
| 4682 | 0.25% | 0.00% | 1.00% | 1.00% | 0.25% | 33% | 43% | 29% | 38% | 31% | 40% | 35% | 46% | 33% | 43% | 31% | 31% | 33% | 33% |
| 4683 | 1.00% | 0.00% | 1.00% | 1.00% | 0.25% | 35% | 46% | 30% | 39% | 34% | 44% | 37% | 48% | 35% | 46% | 33% | 33% | 35% | 35% |
| 4684 | 0.00% | 0.25% | 1.00% | 1.00% | 0.25% | 36% | 47% | 35% | 46% | 35% | 46% | 41% | 53% | 38% | 49% | 35% | 35% | 38% | 38% |
| 4685 | 1.00% | 0.25% | 1.00% | 1.00% | 0.25% | 40% | 52% | 37% | 48% | 40% | 52% | 44% | 57% | 41% | 53% | 39% | 39% | 42% | 42% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4686 | 9.00% | 0.25% | 1.00% | 1.00% | 0.25% | 36% | 47% | 35% | 46% | 35% | 46% | 41% | 53% | 38% | 49% | 35% | 35% | 38% | 38% |
| 4687 | 0.00% | 1.00% | 1.00% | 1.00% | 0.25% | 44% | 57% | 43% | 56% | 38% | 49% | 46% | 60% | 48% | 62% | 42% | 42% | 44% | 44% |
| 4688 | 0.25% | 1.00% | 1.00% | 1.00% | 0.25% | 46% | 60% | 44% | 57% | 40% | 52% | 47% | 61% | 49% | 64% | 43% | 43% | 45% | 45% |
| 4689 | 1.00% | 1.00% | 1.00% | 1.00% | 0.25% | 48% | 62% | 45% | 59% | 43% | 56% | 49% | 64% | 51% | 66% | 45% | 45% | 48% | 48% |
| 4690 | 9.00% | 1.00% | 1.00% | 1.00% | 0.25% | 44% | 57% | 43% | 56% | 38% | 49% | 46% | 60% | 48% | 62% | 42% | 42% | 44% | 44% |
| 4691 | 0.00% | 9.00% | 1.00% | 1.00% | 0.25% | 57% | 74% | 53% | 69% | 42% | 55% | 57% | 74% | 58% | 75% | 51% | 51% | 52% | 52% |
| 4692 | 0.25% | 9.00% | 1.00% | 1.00% | 0.25% | 59% | 77% | 54% | 70% | 44% | 57% | 58% | 75% | 59% | 77% | 52% | 52% | 54% | 54% |
| 4693 | 1.00% | 9.00% | 1.00% | 1.00% | 0.25% | 61% | 79% | 55% | 72% | 47% | 61% | 60% | 78% | 61% | 79% | 54% | 54% | 56% | 56% |
| 4694 | 0.25% | 0.25% | 9.00% | 1.00% | 0.25% | 48% | 62% | 41% | 53% | 42% | 55% | 53% | 69% | 49% | 64% | 44% | 44% | 48% | 48% |
| 4695 | 1.00% | 0.25% | 9.00% | 1.00% | 0.25% | 50% | 65% | 42% | 55% | 45% | 59% | 55% | 72% | 51% | 66% | 46% | 46% | 50% | 50% |
| 4696 | 9.00% | 0.25% | 9.00% | 1.00% | 0.25% | 46% | 60% | 40% | 52% | 40% | 52% | 52% | 68% | 48% | 62% | 42% | 42% | 47% | 47% |
| 4697 | 0.25% | 1.00% | 9.00% | 1.00% | 0.25% | 56% | 73% | 49% | 64% | 45% | 59% | 58% | 75% | 59% | 77% | 50% | 50% | 54% | 54% |
| 4698 | 0.00% | 0.25% | 0.00% | 9.00% | 0.25% | 49% | 64% | 46% | 60% | 41% | 53% | 54% | 70% | 49% | 64% | 45% | 45% | 48% | 48% |
| 4699 | 0.00% | 0.00% | 0.25% | 9.00% | 0.25% | 48% | 62% | 45% | 59% | 39% | 51% | 50% | 65% | 48% | 62% | 44% | 44% | 46% | 46% |
| 4700 | 0.25% | 0.00% | 0.25% | 9.00% | 0.25% | 50% | 65% | 46% | 60% | 41% | 53% | 51% | 66% | 49% | 64% | 46% | 46% | 47% | 47% |
| 4701 | 0.00% | 0.25% | 0.25% | 9.00% | 0.25% | 53% | 69% | 52% | 68% | 45% | 59% | 57% | 74% | 54% | 70% | 50% | 50% | 52% | 52% |
| 4702 | 0.25% | 0.25% | 0.25% | 9.00% | 0.25% | 55% | 72% | 53% | 69% | 47% | 61% | 58% | 75% | 55% | 72% | 52% | 52% | 53% | 53% |
| 4703 | 1.00% | 0.25% | 0.25% | 9.00% | 0.25% | 57% | 74% | 54% | 70% | 50% | 65% | 60% | 78% | 57% | 74% | 54% | 54% | 56% | 56% |
| 4704 | 9.00% | 0.25% | 0.25% | 9.00% | 0.25% | 53% | 69% | 52% | 68% | 45% | 59% | 57% | 74% | 54% | 70% | 50% | 50% | 52% | 52% |
| 4705 | 0.00% | 1.00% | 0.25% | 9.00% | 0.25% | 61% | 79% | 60% | 78% | 48% | 62% | 62% | 81% | 64% | 83% | 56% | 56% | 58% | 58% |
| 4706 | 0.25% | 1.00% | 0.25% | 9.00% | 0.25% | 63% | 82% | 61% | 79% | 50% | 65% | 63% | 82% | 65% | 85% | 58% | 58% | 59% | 59% |
| 4707 | 1.00% | 1.00% | 0.25% | 9.00% | 0.25% | 65% | 85% | 62% | 81% | 53% | 69% | 65% | 85% | 67% | 87% | 60% | 60% | 62% | 62% |
| 4708 | 0.25% | 9.00% | 0.25% | 9.00% | 0.25% | 76% | 99% | 71% | 92% | 54% | 70% | 74% | 96% | 75% | 98% | 67% | 67% | 68% | 68% |
| 4709 | 0.25% | 0.00% | 1.00% | 9.00% | 0.25% | 55% | 72% | 49% | 64% | 47% | 61% | 57% | 74% | 53% | 69% | 50% | 50% | 52% | 52% |
| 4710 | 1.00% | 0.25% | 1.00% | 9.00% | 0.25% | 62% | 81% | 57% | 74% | 56% | 73% | 66% | 86% | 61% | 79% | 58% | 58% | 61% | 61% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4711 | 9.00% | 0.25% | 1.00% | 9.00% | 0.25% | 58% | 75% | 55% | 72% | 51% | 66% | 63% | 82% | 58% | 75% | 55% | 55% | 57% | 57% |
| 4712 | 0.00% | 1.00% | 1.00% | 9.00% | 0.25% | 66% | 86% | 63% | 82% | 54% | 70% | 68% | 88% | 68% | 88% | 61% | 61% | 63% | 63% |
| 4713 | 0.25% | 1.00% | 1.00% | 9.00% | 0.25% | 68% | 88% | 64% | 83% | 56% | 73% | 69% | 90% | 69% | 90% | 63% | 63% | 65% | 65% |
| 4714 | 1.00% | 1.00% | 1.00% | 9.00% | 0.25% | 70% | 91% | 65% | 85% | 59% | 77% | 71% | 92% | 71% | 92% | 65% | 65% | 67% | 67% |
| 4715 | 0.25% | 0.25% | 9.00% | 9.00% | 0.25% | 70% | 91% | 61% | 79% | 58% | 75% | 75% | 98% | 69% | 90% | 63% | 63% | 67% | 67% |
| 4716 | 0.25% | 0.25% | 0.00% | 0.00% | 1.00% | 22% | 29% | 24% | 31% | 24% | 31% | 22% | 29% | 26% | 34% | 23% | 23% | 24% | 24% |
| 4717 | 1.00% | 0.25% | 0.00% | 0.00% | 1.00% | 24% | 31% | 25% | 33% | 27% | 35% | 24% | 31% | 28% | 36% | 25% | 25% | 26% | 26% |
| 4718 | 0.25% | 1.00% | 0.00% | 0.00% | 1.00% | 30% | 39% | 32% | 42% | 27% | 35% | 27% | 35% | 36% | 47% | 30% | 30% | 30% | 30% |
| 4719 | 1.00% | 1.00% | 0.00% | 0.00% | 1.00% | 32% | 42% | 33% | 43% | 30% | 39% | 29% | 38% | 38% | 49% | 32% | 32% | 32% | 32% |
| 4720 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 4721 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 4722 | 0.00% | 0.25% | 0.25% | 0.00% | 1.00% | 24% | 31% | 29% | 38% | 26% | 34% | 24% | 31% | 30% | 39% | 26% | 26% | 27% | 27% |
| 4723 | 0.25% | 0.25% | 0.25% | 0.00% | 1.00% | 26% | 34% | 30% | 39% | 28% | 36% | 25% | 33% | 31% | 40% | 28% | 28% | 28% | 28% |
| 4724 | 0.00% | 1.00% | 0.25% | 0.00% | 1.00% | 32% | 42% | 37% | 48% | 29% | 38% | 29% | 38% | 40% | 52% | 33% | 33% | 33% | 33% |
| 4725 | 1.00% | 1.00% | 0.25% | 0.00% | 1.00% | 36% | 47% | 39% | 51% | 34% | 44% | 32% | 42% | 43% | 56% | 36% | 36% | 36% | 36% |
| 4726 | 1.00% | 9.00% | 0.25% | 0.00% | 1.00% | 49% | 64% | 49% | 64% | 38% | 49% | 43% | 56% | 53% | 69% | 45% | 45% | 45% | 45% |
| 4727 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 4728 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 4729 | 0.00% | 0.25% | 1.00% | 0.00% | 1.00% | 29% | 38% | 32% | 42% | 32% | 42% | 30% | 39% | 34% | 44% | 31% | 31% | 32% | 32% |
| 4730 | 1.00% | 0.25% | 1.00% | 0.00% | 1.00% | 33% | 43% | 34% | 44% | 37% | 48% | 33% | 43% | 37% | 48% | 35% | 35% | 36% | 36% |
| 4731 | 0.00% | 1.00% | 1.00% | 0.00% | 1.00% | 37% | 48% | 40% | 52% | 35% | 46% | 35% | 46% | 44% | 57% | 37% | 37% | 38% | 38% |
| 4732 | 0.25% | 1.00% | 1.00% | 0.00% | 1.00% | 39% | 51% | 41% | 53% | 37% | 48% | 36% | 47% | 45% | 59% | 39% | 39% | 39% | 39% |
| 4733 | 1.00% | 1.00% | 1.00% | 0.00% | 1.00% | 41% | 53% | 42% | 55% | 40% | 52% | 38% | 49% | 47% | 61% | 41% | 41% | 42% | 42% |
| 4734 | 9.00% | 1.00% | 1.00% | 0.00% | 1.00% | 37% | 48% | 40% | 52% | 35% | 46% | 35% | 46% | 44% | 57% | 37% | 37% | 38% | 38% |
| 4735 | 1.00% | 9.00% | 1.00% | 0.00% | 1.00% | 54% | 70% | 52% | 68% | 44% | 57% | 49% | 64% | 57% | 74% | 50% | 50% | 50% | 50% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4736 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 4737 | 0.00% | 0.25% | 9.00% | 0.00% | 1.00% | 39% | 51% | 37% | 48% | 37% | 48% | 41% | 53% | 44% | 57% | 38% | 38% | 41% | 41% |
| 4738 | 0.25% | 0.25% | 9.00% | 0.00% | 1.00% | 41% | 53% | 38% | 49% | 39% | 51% | 42% | 55% | 45% | 59% | 39% | 39% | 42% | 42% |
| 4739 | 1.00% | 0.25% | 9.00% | 0.00% | 1.00% | 43% | 56% | 39% | 51% | 42% | 55% | 44% | 57% | 47% | 61% | 41% | 41% | 44% | 44% |
| 4740 | 0.25% | 1.00% | 9.00% | 0.00% | 1.00% | 49% | 64% | 46% | 60% | 42% | 55% | 47% | 61% | 55% | 72% | 46% | 46% | 48% | 48% |
| 4741 | 0.25% | 0.00% | 0.00% | 0.25% | 1.00% | 24% | 31% | 22% | 29% | 23% | 30% | 25% | 33% | 26% | 34% | 23% | 23% | 25% | 25% |
| 4742 | 1.00% | 0.00% | 0.00% | 0.25% | 1.00% | 26% | 34% | 23% | 30% | 26% | 34% | 27% | 35% | 28% | 36% | 25% | 25% | 27% | 27% |
| 4743 | 0.00% | 0.25% | 0.00% | 0.25% | 1.00% | 27% | 35% | 28% | 36% | 27% | 35% | 31% | 40% | 31% | 40% | 27% | 27% | 30% | 30% |
| 4744 | 0.25% | 0.25% | 0.00% | 0.25% | 1.00% | 29% | 38% | 29% | 38% | 29% | 38% | 32% | 42% | 32% | 42% | 29% | 29% | 31% | 31% |
| 4745 | 9.00% | 0.25% | 0.00% | 0.25% | 1.00% | 27% | 35% | 28% | 36% | 27% | 35% | 31% | 40% | 31% | 40% | 27% | 27% | 30% | 30% |
| 4746 | 1.00% | 1.00% | 0.00% | 0.25% | 1.00% | 39% | 51% | 38% | 49% | 35% | 46% | 39% | 51% | 44% | 57% | 37% | 37% | 39% | 39% |
| 4747 | 1.00% | 9.00% | 0.00% | 0.25% | 1.00% | 52% | 68% | 48% | 62% | 39% | 51% | 50% | 65% | 54% | 70% | 46% | 46% | 48% | 48% |
| 4748 | 0.00% | 0.00% | 0.25% | 0.25% | 1.00% | 26% | 34% | 27% | 35% | 25% | 33% | 27% | 35% | 30% | 39% | 26% | 26% | 27% | 27% |
| 4749 | 0.25% | 0.00% | 0.25% | 0.25% | 1.00% | 28% | 36% | 28% | 36% | 27% | 35% | 28% | 36% | 31% | 40% | 28% | 28% | 29% | 29% |
| 4750 | 0.00% | 0.25% | 0.25% | 0.25% | 1.00% | 31% | 40% | 34% | 44% | 31% | 40% | 34% | 44% | 36% | 47% | 32% | 32% | 34% | 34% |
| 4751 | 0.25% | 0.25% | 0.25% | 0.25% | 1.00% | 33% | 43% | 35% | 46% | 33% | 43% | 35% | 46% | 37% | 48% | 34% | 34% | 35% | 35% |
| 4752 | 1.00% | 0.25% | 0.25% | 0.25% | 1.00% | 35% | 46% | 36% | 47% | 36% | 47% | 37% | 48% | 39% | 51% | 36% | 36% | 37% | 37% |
| 4753 | 9.00% | 0.25% | 0.25% | 0.25% | 1.00% | 31% | 40% | 34% | 44% | 31% | 40% | 34% | 44% | 36% | 47% | 32% | 32% | 34% | 34% |
| 4754 | 0.25% | 1.00% | 0.25% | 0.25% | 1.00% | 41% | 53% | 43% | 56% | 36% | 47% | 40% | 52% | 47% | 61% | 40% | 40% | 41% | 41% |
| 4755 | 9.00% | 1.00% | 0.25% | 0.25% | 1.00% | 39% | 51% | 42% | 55% | 34% | 44% | 39% | 51% | 46% | 60% | 38% | 38% | 40% | 40% |
| 4756 | 0.25% | 9.00% | 0.25% | 0.25% | 1.00% | 54% | 70% | 53% | 69% | 40% | 52% | 51% | 66% | 57% | 74% | 49% | 49% | 49% | 49% |
| 4757 | 1.00% | 9.00% | 0.25% | 0.25% | 1.00% | 56% | 73% | 54% | 70% | 43% | 56% | 53% | 69% | 59% | 77% | 51% | 51% | 52% | 52% |
| 4758 | 9.00% | 9.00% | 0.25% | 0.25% | 1.00% | 52% | 68% | 52% | 68% | 38% | 49% | 50% | 65% | 56% | 73% | 47% | 47% | 48% | 48% |
| 4759 | 0.00% | 0.00% | 1.00% | 0.25% | 1.00% | 31% | 40% | 30% | 39% | 31% | 40% | 33% | 43% | 34% | 44% | 31% | 31% | 33% | 33% |
| 4760 | 1.00% | 0.00% | 1.00% | 0.25% | 1.00% | 35% | 46% | 32% | 42% | 36% | 47% | 36% | 47% | 37% | 48% | 34% | 34% | 36% | 36% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4761 | 0.00% | 0.25% | 1.00% | 0.25% | 1.00% | 36% | 47% | 37% | 48% | 37% | 48% | 40% | 52% | 40% | 52% | 37% | 37% | 39% | 39% |
| 4762 | 0.25% | 0.25% | 1.00% | 0.25% | 1.00% | 38% | 49% | 38% | 49% | 39% | 51% | 41% | 53% | 41% | 53% | 38% | 38% | 40% | 40% |
| 4763 | 1.00% | 0.25% | 1.00% | 0.25% | 1.00% | 40% | 52% | 39% | 51% | 42% | 55% | 43% | 56% | 43% | 56% | 40% | 40% | 43% | 43% |
| 4764 | 9.00% | 0.25% | 1.00% | 0.25% | 1.00% | 36% | 47% | 37% | 48% | 37% | 48% | 40% | 52% | 40% | 52% | 37% | 37% | 39% | 39% |
| 4765 | 0.00% | 1.00% | 1.00% | 0.25% | 1.00% | 44% | 57% | 45% | 59% | 40% | 52% | 45% | 59% | 50% | 65% | 43% | 43% | 45% | 45% |
| 4766 | 0.25% | 1.00% | 1.00% | 0.25% | 1.00% | 46% | 60% | 46% | 60% | 42% | 55% | 46% | 60% | 51% | 66% | 45% | 45% | 46% | 46% |
| 4767 | 1.00% | 1.00% | 1.00% | 0.25% | 1.00% | 48% | 62% | 47% | 61% | 45% | 59% | 48% | 62% | 53% | 69% | 47% | 47% | 49% | 49% |
| 4768 | 9.00% | 1.00% | 1.00% | 0.25% | 1.00% | 44% | 57% | 45% | 59% | 40% | 52% | 45% | 59% | 50% | 65% | 43% | 43% | 45% | 45% |
| 4769 | 0.00% | 9.00% | 1.00% | 0.25% | 1.00% | 57% | 74% | 55% | 72% | 44% | 57% | 56% | 73% | 60% | 78% | 52% | 52% | 53% | 53% |
| 4770 | 0.25% | 9.00% | 1.00% | 0.25% | 1.00% | 59% | 77% | 56% | 73% | 46% | 60% | 57% | 74% | 61% | 79% | 54% | 54% | 55% | 55% |
| 4771 | 1.00% | 9.00% | 1.00% | 0.25% | 1.00% | 61% | 79% | 57% | 74% | 49% | 64% | 59% | 77% | 63% | 82% | 56% | 56% | 57% | 57% |
| 4772 | 0.25% | 0.25% | 9.00% | 0.25% | 1.00% | 48% | 62% | 43% | 56% | 44% | 57% | 52% | 68% | 51% | 66% | 45% | 45% | 49% | 49% |
| 4773 | 1.00% | 0.25% | 9.00% | 0.25% | 1.00% | 50% | 65% | 44% | 57% | 47% | 61% | 54% | 70% | 53% | 69% | 47% | 47% | 51% | 51% |
| 4774 | 9.00% | 0.25% | 9.00% | 0.25% | 1.00% | 46% | 60% | 42% | 55% | 42% | 55% | 51% | 66% | 50% | 65% | 43% | 43% | 48% | 48% |
| 4775 | 0.00% | 1.00% | 9.00% | 0.25% | 1.00% | 54% | 70% | 50% | 65% | 45% | 59% | 56% | 73% | 60% | 78% | 50% | 50% | 54% | 54% |
| 4776 | 0.25% | 1.00% | 9.00% | 0.25% | 1.00% | 56% | 73% | 51% | 66% | 47% | 61% | 57% | 74% | 61% | 79% | 51% | 51% | 55% | 55% |
| 4777 | 9.00% | 1.00% | 9.00% | 0.25% | 1.00% | 54% | 70% | 50% | 65% | 45% | 59% | 56% | 73% | 60% | 78% | 50% | 50% | 54% | 54% |
| 4778 | 1.00% | 9.00% | 9.00% | 0.25% | 1.00% | 71% | 92% | 62% | 81% | 54% | 70% | 70% | 91% | 73% | 95% | 62% | 62% | 66% | 66% |
| 4779 | 0.25% | 0.00% | 0.00% | 1.00% | 1.00% | 32% | 42% | 29% | 38% | 30% | 39% | 32% | 42% | 35% | 46% | 30% | 30% | 32% | 32% |
| 4780 | 1.00% | 0.25% | 0.00% | 1.00% | 1.00% | 39% | 51% | 37% | 48% | 39% | 51% | 41% | 53% | 43% | 56% | 38% | 38% | 41% | 41% |
| 4781 | 0.00% | 1.00% | 0.00% | 1.00% | 1.00% | 43% | 56% | 43% | 56% | 37% | 48% | 43% | 56% | 50% | 65% | 41% | 41% | 43% | 43% |
| 4782 | 0.25% | 1.00% | 0.00% | 1.00% | 1.00% | 45% | 59% | 44% | 57% | 39% | 51% | 44% | 57% | 51% | 66% | 43% | 43% | 45% | 45% |
| 4783 | 1.00% | 1.00% | 0.00% | 1.00% | 1.00% | 47% | 61% | 45% | 59% | 42% | 55% | 46% | 60% | 53% | 69% | 45% | 45% | 47% | 47% |
| 4784 | 0.00% | 0.00% | 0.25% | 1.00% | 1.00% | 34% | 44% | 34% | 44% | 32% | 42% | 34% | 44% | 39% | 51% | 33% | 33% | 35% | 35% |
| 4785 | 1.00% | 0.00% | 0.25% | 1.00% | 1.00% | 38% | 49% | 36% | 47% | 37% | 48% | 37% | 48% | 42% | 55% | 37% | 37% | 39% | 39% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4786 | 0.25% | 0.25% | 0.25% | 1.00% | 1.00% | 41% | 53% | 42% | 55% | 40% | 52% | 42% | 55% | 46% | 60% | 41% | 41% | 43% | 43% |
| 4787 | 1.00% | 0.25% | 0.25% | 1.00% | 1.00% | 43% | 56% | 43% | 56% | 43% | 56% | 44% | 57% | 48% | 62% | 43% | 43% | 45% | 45% |
| 4788 | 9.00% | 0.25% | 0.25% | 1.00% | 1.00% | 39% | 51% | 41% | 53% | 38% | 49% | 41% | 53% | 45% | 59% | 39% | 39% | 41% | 41% |
| 4789 | 0.00% | 1.00% | 0.25% | 1.00% | 1.00% | 47% | 61% | 49% | 64% | 41% | 53% | 46% | 60% | 55% | 72% | 46% | 46% | 47% | 47% |
| 4790 | 0.25% | 1.00% | 0.25% | 1.00% | 1.00% | 49% | 64% | 50% | 65% | 43% | 56% | 47% | 61% | 56% | 73% | 47% | 47% | 49% | 49% |
| 4791 | 1.00% | 1.00% | 0.25% | 1.00% | 1.00% | 51% | 66% | 51% | 66% | 46% | 60% | 49% | 64% | 58% | 75% | 49% | 49% | 51% | 51% |
| 4792 | 9.00% | 1.00% | 0.25% | 1.00% | 1.00% | 47% | 61% | 49% | 64% | 41% | 53% | 46% | 60% | 55% | 72% | 46% | 46% | 47% | 47% |
| 4793 | 0.25% | 9.00% | 0.25% | 1.00% | 1.00% | 62% | 81% | 60% | 78% | 47% | 61% | 58% | 75% | 66% | 86% | 56% | 56% | 57% | 57% |
| 4794 | 1.00% | 9.00% | 0.25% | 1.00% | 1.00% | 64% | 83% | 61% | 79% | 50% | 65% | 60% | 78% | 68% | 88% | 58% | 58% | 59% | 59% |
| 4795 | 9.00% | 9.00% | 0.25% | 1.00% | 1.00% | 60% | 78% | 59% | 77% | 45% | 59% | 57% | 74% | 65% | 85% | 55% | 55% | 56% | 56% |
| 4796 | 0.00% | 0.00% | 1.00% | 1.00% | 1.00% | 39% | 51% | 37% | 48% | 38% | 49% | 40% | 52% | 43% | 56% | 38% | 38% | 40% | 40% |
| 4797 | 0.25% | 0.00% | 1.00% | 1.00% | 1.00% | 41% | 53% | 38% | 49% | 40% | 52% | 41% | 53% | 44% | 57% | 40% | 40% | 42% | 42% |
| 4798 | 1.00% | 0.00% | 1.00% | 1.00% | 1.00% | 43% | 56% | 39% | 51% | 43% | 56% | 43% | 56% | 46% | 60% | 42% | 42% | 44% | 44% |
| 4799 | 0.00% | 0.25% | 1.00% | 1.00% | 1.00% | 44% | 57% | 44% | 57% | 44% | 57% | 47% | 61% | 49% | 64% | 44% | 44% | 47% | 47% |
| 4800 | 1.00% | 0.25% | 1.00% | 1.00% | 1.00% | 48% | 62% | 46% | 60% | 49% | 64% | 50% | 65% | 52% | 68% | 48% | 48% | 50% | 50% |
| 4801 | 9.00% | 0.25% | 1.00% | 1.00% | 1.00% | 44% | 57% | 44% | 57% | 44% | 57% | 47% | 61% | 49% | 64% | 44% | 44% | 47% | 47% |
| 4802 | 0.00% | 1.00% | 1.00% | 1.00% | 1.00% | 52% | 68% | 52% | 68% | 47% | 61% | 52% | 68% | 59% | 77% | 50% | 50% | 53% | 53% |
| 4803 | 0.25% | 1.00% | 1.00% | 1.00% | 1.00% | 54% | 70% | 53% | 69% | 49% | 64% | 53% | 69% | 60% | 78% | 52% | 52% | 54% | 54% |
| 4804 | 1.00% | 1.00% | 1.00% | 1.00% | 1.00% | 56% | 73% | 54% | 70% | 52% | 68% | 55% | 72% | 62% | 81% | 54% | 54% | 56% | 56% |
| 4805 | 9.00% | 1.00% | 1.00% | 1.00% | 1.00% | 52% | 68% | 52% | 68% | 47% | 61% | 52% | 68% | 59% | 77% | 50% | 50% | 53% | 53% |
| 4806 | 0.00% | 9.00% | 1.00% | 1.00% | 1.00% | 65% | 85% | 62% | 81% | 51% | 66% | 63% | 82% | 69% | 90% | 59% | 59% | 61% | 61% |
| 4807 | 0.25% | 9.00% | 1.00% | 1.00% | 1.00% | 67% | 87% | 63% | 82% | 53% | 69% | 64% | 83% | 70% | 91% | 61% | 61% | 62% | 62% |
| 4808 | 1.00% | 9.00% | 1.00% | 1.00% | 1.00% | 69% | 90% | 64% | 83% | 56% | 73% | 66% | 86% | 72% | 94% | 63% | 63% | 65% | 65% |
| 4809 | 0.25% | 0.25% | 9.00% | 1.00% | 1.00% | 56% | 73% | 50% | 65% | 51% | 66% | 59% | 77% | 60% | 78% | 52% | 52% | 57% | 57% |
| 4810 | 1.00% | 0.25% | 9.00% | 1.00% | 1.00% | 58% | 75% | 51% | 66% | 54% | 70% | 61% | 79% | 62% | 81% | 54% | 54% | 59% | 59% |

Fig. 19

| Formula # | Delta Dodecalactone | Methyl Apritone | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4811 | 9.00% | 0.25% | 9.00% | 1.00% | 1.00% | 54% | 70% | 49% | 64% | 49% | 64% | 58% | 75% | 59% | 77% | 51% | 51% | 55% | 55% |
| 4812 | 0.25% | 1.00% | 9.00% | 1.00% | 1.00% | 64% | 83% | 58% | 75% | 54% | 70% | 64% | 83% | 70% | 91% | 59% | 59% | 63% | 63% |
| 4813 | 0.00% | 0.25% | 0.00% | 9.00% | 1.00% | 57% | 74% | 55% | 72% | 50% | 65% | 60% | 78% | 60% | 78% | 54% | 54% | 57% | 57% |
| 4814 | 0.00% | 0.00% | 0.25% | 9.00% | 1.00% | 56% | 73% | 54% | 70% | 48% | 62% | 56% | 73% | 59% | 77% | 53% | 53% | 54% | 54% |
| 4815 | 0.25% | 0.00% | 0.25% | 9.00% | 1.00% | 58% | 75% | 55% | 72% | 50% | 65% | 57% | 74% | 60% | 78% | 54% | 54% | 56% | 56% |
| 4816 | 0.00% | 0.25% | 0.25% | 9.00% | 1.00% | 61% | 79% | 61% | 79% | 54% | 70% | 63% | 82% | 65% | 85% | 59% | 59% | 61% | 61% |
| 4817 | 0.25% | 0.25% | 0.25% | 9.00% | 1.00% | 63% | 82% | 62% | 81% | 56% | 73% | 64% | 83% | 66% | 86% | 60% | 60% | 62% | 62% |
| 4818 | 1.00% | 0.25% | 0.25% | 9.00% | 1.00% | 65% | 85% | 63% | 82% | 59% | 77% | 66% | 86% | 68% | 88% | 62% | 62% | 64% | 64% |
| 4819 | 9.00% | 0.25% | 0.25% | 9.00% | 1.00% | 61% | 79% | 61% | 79% | 54% | 70% | 63% | 82% | 65% | 85% | 59% | 59% | 61% | 61% |
| 4820 | 0.00% | 1.00% | 0.25% | 9.00% | 1.00% | 69% | 90% | 69% | 90% | 57% | 74% | 68% | 88% | 75% | 98% | 65% | 65% | 67% | 67% |
| 4821 | 0.25% | 1.00% | 0.25% | 9.00% | 1.00% | 71% | 92% | 70% | 91% | 59% | 77% | 69% | 90% | 76% | 99% | 67% | 67% | 68% | 68% |
| 4822 | 1.00% | 1.00% | 0.25% | 9.00% | 1.00% | 73% | 95% | 71% | 92% | 62% | 81% | 71% | 92% | 78% | 100% | 69% | 69% | 70% | 70% |
| 4823 | 0.25% | 9.00% | 0.25% | 9.00% | 1.00% | 84% | 100% | 80% | 100% | 63% | 82% | 80% | 100% | 86% | 100% | 76% | 76% | 76% | 76% |
| 4824 | 0.25% | 0.00% | 1.00% | 9.00% | 1.00% | 63% | 82% | 58% | 75% | 56% | 73% | 63% | 82% | 64% | 83% | 59% | 59% | 61% | 61% |
| 4825 | 1.00% | 0.25% | 1.00% | 9.00% | 1.00% | 70% | 91% | 66% | 86% | 65% | 85% | 72% | 94% | 72% | 94% | 67% | 67% | 70% | 70% |
| 4826 | 9.00% | 0.25% | 1.00% | 9.00% | 1.00% | 66% | 86% | 64% | 83% | 60% | 78% | 69% | 90% | 69% | 90% | 63% | 63% | 66% | 66% |
| 4827 | 0.00% | 1.00% | 1.00% | 9.00% | 1.00% | 74% | 96% | 72% | 94% | 63% | 82% | 74% | 96% | 79% | 100% | 70% | 70% | 72% | 72% |
| 4828 | 0.25% | 1.00% | 1.00% | 9.00% | 1.00% | 76% | 99% | 73% | 95% | 65% | 85% | 75% | 98% | 80% | 100% | 71% | 71% | 73% | 73% |
| 4829 | 1.00% | 1.00% | 1.00% | 9.00% | 1.00% | 78% | 100% | 74% | 96% | 68% | 88% | 77% | 100% | 82% | 100% | 73% | 73% | 76% | 76% |
| 4830 | 0.25% | 0.25% | 9.00% | 9.00% | 1.00% | 78% | 100% | 70% | 91% | 67% | 87% | 81% | 100% | 80% | 100% | 72% | 72% | 76% | 76% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4831 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 4832 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 4833 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 4834 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 4835 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 4836 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 4837 | 0.00% | 0.25% | 0.25% | 0.00% | 0.00% | 9% | 12% | 13% | 17% | 10% | 13% | 10% | 13% | 11% | 14% | 11% | 11% | 10% | 10% |
| 4838 | 0.25% | 0.25% | 0.25% | 0.00% | 0.00% | 11% | 14% | 14% | 18% | 12% | 16% | 11% | 14% | 12% | 16% | 12% | 12% | 12% | 12% |
| 4839 | 0.00% | 1.00% | 0.25% | 0.00% | 0.00% | 17% | 22% | 21% | 27% | 13% | 17% | 15% | 20% | 21% | 27% | 17% | 17% | 16% | 16% |
| 4840 | 1.00% | 1.00% | 0.25% | 0.00% | 0.00% | 21% | 27% | 23% | 30% | 18% | 23% | 18% | 23% | 24% | 31% | 21% | 21% | 20% | 20% |
| 4841 | 1.00% | 9.00% | 0.25% | 0.00% | 0.00% | 34% | 44% | 33% | 43% | 22% | 29% | 29% | 38% | 34% | 44% | 30% | 30% | 28% | 28% |
| 4842 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 4843 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 4844 | 0.00% | 0.25% | 1.00% | 0.00% | 0.00% | 14% | 18% | 16% | 21% | 16% | 21% | 16% | 21% | 15% | 20% | 15% | 15% | 16% | 16% |
| 4845 | 1.00% | 0.25% | 1.00% | 0.00% | 0.00% | 18% | 23% | 18% | 23% | 21% | 27% | 19% | 25% | 18% | 23% | 19% | 19% | 19% | 19% |
| 4846 | 0.00% | 1.00% | 1.00% | 0.00% | 0.00% | 22% | 29% | 24% | 31% | 19% | 25% | 21% | 27% | 25% | 33% | 22% | 22% | 22% | 22% |
| 4847 | 0.25% | 1.00% | 1.00% | 0.00% | 0.00% | 24% | 31% | 25% | 33% | 21% | 27% | 22% | 29% | 26% | 34% | 23% | 23% | 23% | 23% |
| 4848 | 1.00% | 1.00% | 1.00% | 0.00% | 0.00% | 26% | 34% | 26% | 34% | 24% | 31% | 24% | 31% | 28% | 36% | 25% | 25% | 25% | 25% |
| 4849 | 9.00% | 1.00% | 1.00% | 0.00% | 0.00% | 22% | 29% | 24% | 31% | 19% | 25% | 21% | 27% | 25% | 33% | 22% | 22% | 22% | 22% |
| 4850 | 1.00% | 9.00% | 1.00% | 0.00% | 0.00% | 39% | 51% | 36% | 47% | 28% | 36% | 35% | 46% | 38% | 49% | 34% | 34% | 34% | 34% |
| 4851 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 4852 | 0.00% | 0.25% | 9.00% | 0.00% | 0.00% | 24% | 31% | 21% | 27% | 21% | 27% | 27% | 35% | 25% | 33% | 22% | 22% | 24% | 24% |
| 4853 | 0.25% | 0.25% | 9.00% | 0.00% | 0.00% | 26% | 34% | 22% | 29% | 23% | 30% | 28% | 36% | 26% | 34% | 24% | 24% | 26% | 26% |
| 4854 | 1.00% | 0.25% | 9.00% | 0.00% | 0.00% | 28% | 36% | 23% | 30% | 26% | 34% | 30% | 39% | 28% | 36% | 26% | 26% | 28% | 28% |
| 4855 | 0.25% | 1.00% | 9.00% | 0.00% | 0.00% | 34% | 44% | 30% | 39% | 26% | 34% | 33% | 43% | 36% | 47% | 30% | 30% | 32% | 32% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4856 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 4857 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 4858 | 0.00% | 0.25% | 0.00% | 0.25% | 0.00% | 13% | 17% | 15% | 20% | 15% | 20% | 14% | 18% | 13% | 17% | 14% | 14% | 14% | 14% |
| 4859 | 0.25% | 0.25% | 0.00% | 0.25% | 0.00% | 15% | 20% | 16% | 21% | 17% | 22% | 15% | 20% | 14% | 18% | 16% | 16% | 15% | 15% |
| 4860 | 9.00% | 0.25% | 0.00% | 0.25% | 0.00% | 13% | 17% | 15% | 20% | 15% | 20% | 14% | 18% | 13% | 17% | 14% | 14% | 14% | 14% |
| 4861 | 1.00% | 1.00% | 0.00% | 0.25% | 0.00% | 25% | 33% | 25% | 33% | 23% | 30% | 22% | 29% | 26% | 34% | 24% | 24% | 24% | 24% |
| 4862 | 1.00% | 9.00% | 0.00% | 0.25% | 0.00% | 38% | 49% | 35% | 46% | 27% | 35% | 33% | 43% | 36% | 47% | 33% | 33% | 32% | 32% |
| 4863 | 0.00% | 0.00% | 0.25% | 0.25% | 0.00% | 12% | 16% | 14% | 18% | 13% | 17% | 10% | 13% | 12% | 16% | 13% | 13% | 12% | 12% |
| 4864 | 0.25% | 0.00% | 0.25% | 0.25% | 0.00% | 14% | 18% | 15% | 20% | 15% | 20% | 11% | 14% | 13% | 17% | 15% | 15% | 13% | 13% |
| 4865 | 0.00% | 0.25% | 0.25% | 0.25% | 0.00% | 17% | 22% | 21% | 27% | 19% | 25% | 17% | 22% | 18% | 23% | 19% | 19% | 18% | 18% |
| 4866 | 0.25% | 0.25% | 0.25% | 0.25% | 0.00% | 19% | 25% | 22% | 29% | 21% | 27% | 18% | 23% | 19% | 25% | 21% | 21% | 19% | 19% |
| 4867 | 1.00% | 0.25% | 0.25% | 0.25% | 0.00% | 21% | 27% | 23% | 30% | 24% | 31% | 20% | 26% | 21% | 27% | 23% | 23% | 22% | 22% |
| 4868 | 9.00% | 0.25% | 0.25% | 0.25% | 0.00% | 17% | 22% | 21% | 27% | 19% | 25% | 17% | 22% | 18% | 23% | 19% | 19% | 18% | 18% |
| 4869 | 0.25% | 1.00% | 0.25% | 0.25% | 0.00% | 27% | 35% | 30% | 39% | 24% | 31% | 23% | 30% | 29% | 38% | 27% | 27% | 25% | 25% |
| 4870 | 9.00% | 1.00% | 0.25% | 0.25% | 0.00% | 25% | 33% | 29% | 38% | 22% | 29% | 22% | 29% | 28% | 36% | 25% | 25% | 24% | 24% |
| 4871 | 0.25% | 9.00% | 0.25% | 0.25% | 0.00% | 40% | 52% | 40% | 52% | 28% | 36% | 34% | 44% | 39% | 51% | 36% | 36% | 34% | 34% |
| 4872 | 1.00% | 9.00% | 0.25% | 0.25% | 0.00% | 42% | 55% | 41% | 53% | 31% | 40% | 36% | 47% | 41% | 53% | 38% | 38% | 36% | 36% |
| 4873 | 9.00% | 9.00% | 0.25% | 0.25% | 0.00% | 38% | 49% | 39% | 51% | 26% | 34% | 33% | 43% | 38% | 49% | 34% | 34% | 32% | 32% |
| 4874 | 0.00% | 0.00% | 1.00% | 0.25% | 0.00% | 17% | 22% | 17% | 22% | 19% | 25% | 16% | 21% | 16% | 21% | 18% | 18% | 17% | 17% |
| 4875 | 1.00% | 0.00% | 1.00% | 0.25% | 0.00% | 21% | 27% | 19% | 25% | 24% | 31% | 19% | 25% | 19% | 25% | 21% | 21% | 21% | 21% |
| 4876 | 0.00% | 0.25% | 1.00% | 0.25% | 0.00% | 22% | 29% | 24% | 31% | 25% | 33% | 23% | 30% | 22% | 29% | 24% | 24% | 23% | 23% |
| 4877 | 0.25% | 0.25% | 1.00% | 0.25% | 0.00% | 24% | 31% | 25% | 33% | 27% | 35% | 24% | 31% | 23% | 30% | 25% | 25% | 25% | 25% |
| 4878 | 1.00% | 0.25% | 1.00% | 0.25% | 0.00% | 26% | 34% | 26% | 34% | 30% | 39% | 26% | 34% | 25% | 33% | 27% | 27% | 27% | 27% |
| 4879 | 9.00% | 0.25% | 1.00% | 0.25% | 0.00% | 22% | 29% | 24% | 31% | 25% | 33% | 23% | 30% | 22% | 29% | 24% | 24% | 23% | 23% |
| 4880 | 0.00% | 1.00% | 1.00% | 0.25% | 0.00% | 30% | 39% | 32% | 42% | 28% | 36% | 28% | 36% | 32% | 42% | 30% | 30% | 29% | 29% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4881 | 0.25% | 1.00% | 1.00% | 0.25% | 0.00% | 32% | 42% | 33% | 43% | 30% | 39% | 29% | 38% | 33% | 43% | 32% | 32% | 31% | 31% |
| 4882 | 1.00% | 1.00% | 1.00% | 0.25% | 0.00% | 34% | 44% | 34% | 44% | 33% | 43% | 31% | 40% | 35% | 46% | 34% | 34% | 33% | 33% |
| 4883 | 9.00% | 1.00% | 1.00% | 0.25% | 0.00% | 30% | 39% | 32% | 42% | 28% | 36% | 28% | 36% | 32% | 42% | 30% | 30% | 29% | 29% |
| 4884 | 0.00% | 9.00% | 1.00% | 0.25% | 0.00% | 43% | 56% | 42% | 55% | 32% | 42% | 39% | 51% | 42% | 55% | 39% | 39% | 38% | 38% |
| 4885 | 0.25% | 9.00% | 1.00% | 0.25% | 0.00% | 45% | 59% | 43% | 56% | 34% | 44% | 40% | 52% | 43% | 56% | 41% | 41% | 39% | 39% |
| 4886 | 1.00% | 9.00% | 1.00% | 0.25% | 0.00% | 47% | 61% | 44% | 57% | 37% | 48% | 42% | 55% | 45% | 59% | 43% | 43% | 41% | 41% |
| 4887 | 0.25% | 0.25% | 9.00% | 0.25% | 0.00% | 34% | 44% | 30% | 39% | 32% | 42% | 35% | 46% | 33% | 43% | 32% | 32% | 33% | 33% |
| 4888 | 1.00% | 0.25% | 9.00% | 0.25% | 0.00% | 36% | 47% | 31% | 40% | 35% | 46% | 37% | 48% | 35% | 46% | 34% | 34% | 36% | 36% |
| 4889 | 9.00% | 0.25% | 9.00% | 0.25% | 0.00% | 32% | 42% | 29% | 38% | 30% | 39% | 34% | 44% | 32% | 42% | 30% | 30% | 32% | 32% |
| 4890 | 0.00% | 1.00% | 9.00% | 0.25% | 0.00% | 40% | 52% | 37% | 48% | 33% | 43% | 39% | 51% | 42% | 55% | 37% | 37% | 38% | 38% |
| 4891 | 0.25% | 1.00% | 9.00% | 0.25% | 0.00% | 42% | 55% | 38% | 49% | 35% | 46% | 40% | 52% | 43% | 56% | 38% | 38% | 39% | 39% |
| 4892 | 9.00% | 1.00% | 9.00% | 0.25% | 0.00% | 40% | 52% | 37% | 48% | 33% | 43% | 39% | 51% | 42% | 55% | 37% | 37% | 38% | 38% |
| 4893 | 1.00% | 9.00% | 9.00% | 0.25% | 0.00% | 57% | 74% | 49% | 64% | 42% | 55% | 53% | 69% | 55% | 72% | 49% | 49% | 50% | 50% |
| 4894 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 4895 | 1.00% | 0.25% | 0.00% | 1.00% | 0.00% | 34% | 44% | 30% | 39% | 33% | 43% | 32% | 42% | 29% | 38% | 32% | 32% | 31% | 31% |
| 4896 | 0.00% | 1.00% | 0.00% | 1.00% | 0.00% | 38% | 49% | 36% | 47% | 31% | 40% | 34% | 44% | 36% | 47% | 35% | 35% | 34% | 34% |
| 4897 | 0.25% | 1.00% | 0.00% | 1.00% | 0.00% | 40% | 52% | 37% | 48% | 33% | 43% | 35% | 46% | 37% | 48% | 37% | 37% | 35% | 35% |
| 4898 | 1.00% | 1.00% | 0.00% | 1.00% | 0.00% | 42% | 55% | 38% | 49% | 36% | 47% | 37% | 48% | 39% | 51% | 39% | 39% | 37% | 37% |
| 4899 | 0.00% | 0.00% | 0.25% | 1.00% | 0.00% | 29% | 38% | 27% | 35% | 26% | 34% | 25% | 33% | 25% | 33% | 27% | 27% | 25% | 25% |
| 4900 | 1.00% | 0.00% | 0.25% | 1.00% | 0.00% | 33% | 43% | 29% | 38% | 31% | 40% | 28% | 36% | 28% | 36% | 31% | 31% | 29% | 29% |
| 4901 | 0.25% | 0.25% | 0.25% | 1.00% | 0.00% | 36% | 47% | 35% | 46% | 34% | 44% | 33% | 43% | 32% | 42% | 35% | 35% | 33% | 33% |
| 4902 | 1.00% | 0.25% | 0.25% | 1.00% | 0.00% | 38% | 49% | 36% | 47% | 37% | 48% | 35% | 46% | 34% | 44% | 37% | 37% | 35% | 35% |
| 4903 | 9.00% | 0.25% | 0.25% | 1.00% | 0.00% | 34% | 44% | 34% | 44% | 32% | 42% | 32% | 42% | 31% | 40% | 33% | 33% | 32% | 32% |
| 4904 | 0.00% | 1.00% | 0.25% | 1.00% | 0.00% | 42% | 55% | 42% | 55% | 35% | 46% | 37% | 48% | 41% | 53% | 40% | 40% | 38% | 38% |
| 4905 | 0.25% | 1.00% | 0.25% | 1.00% | 0.00% | 44% | 57% | 43% | 56% | 37% | 48% | 38% | 49% | 42% | 55% | 41% | 41% | 39% | 39% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4906 | 1.00% | 1.00% | 0.25% | 1.00% | 0.00% | 46% | 60% | 44% | 57% | 40% | 52% | 40% | 52% | 44% | 57% | 43% | 43% | 41% | 41% |
| 4907 | 9.00% | 1.00% | 0.25% | 1.00% | 0.00% | 42% | 55% | 42% | 55% | 35% | 46% | 37% | 48% | 41% | 53% | 40% | 40% | 38% | 38% |
| 4908 | 0.25% | 9.00% | 0.25% | 1.00% | 0.00% | 57% | 74% | 53% | 69% | 41% | 53% | 49% | 64% | 52% | 68% | 50% | 50% | 47% | 47% |
| 4909 | 1.00% | 9.00% | 0.25% | 1.00% | 0.00% | 59% | 77% | 54% | 70% | 44% | 57% | 51% | 66% | 54% | 70% | 52% | 52% | 50% | 50% |
| 4910 | 9.00% | 9.00% | 0.25% | 1.00% | 0.00% | 55% | 72% | 52% | 68% | 39% | 51% | 48% | 62% | 51% | 66% | 49% | 49% | 46% | 46% |
| 4911 | 0.00% | 0.00% | 1.00% | 1.00% | 0.00% | 34% | 44% | 30% | 39% | 32% | 42% | 31% | 40% | 29% | 38% | 32% | 32% | 31% | 31% |
| 4912 | 0.25% | 0.00% | 1.00% | 1.00% | 0.00% | 36% | 47% | 31% | 40% | 34% | 44% | 32% | 42% | 30% | 39% | 34% | 34% | 32% | 32% |
| 4913 | 1.00% | 0.00% | 1.00% | 1.00% | 0.00% | 38% | 49% | 32% | 42% | 37% | 48% | 34% | 44% | 32% | 42% | 36% | 36% | 34% | 34% |
| 4914 | 0.00% | 0.25% | 1.00% | 1.00% | 0.00% | 39% | 51% | 37% | 48% | 38% | 49% | 38% | 49% | 35% | 46% | 38% | 38% | 37% | 37% |
| 4915 | 1.00% | 0.25% | 1.00% | 1.00% | 0.00% | 43% | 56% | 39% | 51% | 43% | 56% | 41% | 53% | 38% | 49% | 42% | 42% | 41% | 41% |
| 4916 | 9.00% | 0.25% | 1.00% | 1.00% | 0.00% | 39% | 51% | 37% | 48% | 38% | 49% | 38% | 49% | 35% | 46% | 38% | 38% | 37% | 37% |
| 4917 | 0.00% | 1.00% | 1.00% | 1.00% | 0.00% | 47% | 61% | 45% | 59% | 41% | 53% | 43% | 56% | 45% | 59% | 44% | 44% | 43% | 43% |
| 4918 | 0.25% | 1.00% | 1.00% | 1.00% | 0.00% | 49% | 64% | 46% | 60% | 43% | 56% | 44% | 57% | 46% | 60% | 46% | 46% | 44% | 44% |
| 4919 | 1.00% | 1.00% | 1.00% | 1.00% | 0.00% | 51% | 66% | 47% | 61% | 46% | 60% | 46% | 60% | 48% | 62% | 48% | 48% | 47% | 47% |
| 4920 | 9.00% | 1.00% | 1.00% | 1.00% | 0.00% | 47% | 61% | 45% | 59% | 41% | 53% | 43% | 56% | 45% | 59% | 44% | 44% | 43% | 43% |
| 4921 | 0.00% | 9.00% | 1.00% | 1.00% | 0.00% | 60% | 78% | 55% | 72% | 45% | 59% | 54% | 70% | 55% | 72% | 53% | 53% | 51% | 51% |
| 4922 | 0.25% | 9.00% | 1.00% | 1.00% | 0.00% | 62% | 81% | 56% | 73% | 47% | 61% | 55% | 72% | 56% | 73% | 55% | 55% | 53% | 53% |
| 4923 | 1.00% | 9.00% | 1.00% | 1.00% | 0.00% | 64% | 83% | 57% | 74% | 50% | 65% | 57% | 74% | 58% | 75% | 57% | 57% | 55% | 55% |
| 4924 | 0.25% | 0.25% | 9.00% | 1.00% | 0.00% | 51% | 66% | 43% | 56% | 45% | 59% | 50% | 65% | 46% | 60% | 46% | 46% | 47% | 47% |
| 4925 | 1.00% | 0.25% | 9.00% | 1.00% | 0.00% | 53% | 69% | 44% | 57% | 48% | 62% | 52% | 68% | 48% | 62% | 48% | 48% | 49% | 49% |
| 4926 | 9.00% | 0.25% | 9.00% | 1.00% | 0.00% | 49% | 64% | 42% | 55% | 43% | 56% | 49% | 64% | 45% | 59% | 45% | 45% | 46% | 46% |
| 4927 | 0.25% | 1.00% | 9.00% | 1.00% | 0.00% | 59% | 77% | 51% | 66% | 48% | 62% | 55% | 72% | 56% | 73% | 53% | 53% | 53% | 53% |
| 4928 | 0.00% | 0.25% | 0.00% | 9.00% | 0.00% | 47% | 61% | 42% | 55% | 40% | 52% | 45% | 59% | 40% | 52% | 43% | 43% | 42% | 42% |
| 4929 | 0.00% | 0.00% | 0.25% | 9.00% | 0.00% | 46% | 60% | 41% | 53% | 38% | 49% | 41% | 53% | 39% | 51% | 42% | 42% | 39% | 39% |
| 4930 | 0.25% | 0.00% | 0.25% | 9.00% | 0.00% | 48% | 62% | 42% | 55% | 40% | 52% | 42% | 55% | 40% | 52% | 43% | 43% | 41% | 41% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4931 | 0.00% | 0.25% | 0.25% | 9.00% | 0.00% | 51% | 66% | 48% | 62% | 44% | 57% | 48% | 62% | 45% | 59% | 48% | 48% | 46% | 46% |
| 4932 | 0.25% | 0.25% | 0.25% | 9.00% | 0.00% | 53% | 69% | 49% | 64% | 46% | 60% | 49% | 64% | 46% | 60% | 49% | 49% | 47% | 47% |
| 4933 | 1.00% | 0.25% | 0.25% | 9.00% | 0.00% | 55% | 72% | 50% | 65% | 49% | 64% | 51% | 66% | 48% | 62% | 51% | 51% | 49% | 49% |
| 4934 | 9.00% | 0.25% | 0.25% | 9.00% | 0.00% | 51% | 66% | 48% | 62% | 44% | 57% | 48% | 62% | 45% | 59% | 48% | 48% | 46% | 46% |
| 4935 | 0.00% | 1.00% | 0.25% | 9.00% | 0.00% | 59% | 77% | 56% | 73% | 47% | 61% | 53% | 69% | 55% | 72% | 54% | 54% | 52% | 52% |
| 4936 | 0.25% | 1.00% | 0.25% | 9.00% | 0.00% | 61% | 79% | 57% | 74% | 49% | 64% | 54% | 70% | 56% | 73% | 56% | 56% | 53% | 53% |
| 4937 | 1.00% | 1.00% | 0.25% | 9.00% | 0.00% | 63% | 82% | 58% | 75% | 52% | 68% | 56% | 73% | 58% | 75% | 58% | 58% | 55% | 55% |
| 4938 | 0.25% | 9.00% | 0.25% | 9.00% | 0.00% | 74% | 96% | 67% | 87% | 53% | 69% | 65% | 85% | 66% | 86% | 65% | 65% | 61% | 61% |
| 4939 | 0.25% | 0.00% | 1.00% | 9.00% | 0.00% | 53% | 69% | 45% | 59% | 46% | 60% | 48% | 62% | 44% | 57% | 48% | 48% | 46% | 46% |
| 4940 | 1.00% | 0.25% | 1.00% | 9.00% | 0.00% | 60% | 78% | 53% | 69% | 55% | 72% | 57% | 74% | 52% | 68% | 56% | 56% | 55% | 55% |
| 4941 | 9.00% | 0.25% | 1.00% | 9.00% | 0.00% | 56% | 73% | 51% | 66% | 50% | 65% | 54% | 70% | 49% | 64% | 52% | 52% | 51% | 51% |
| 4942 | 0.00% | 1.00% | 1.00% | 9.00% | 0.00% | 64% | 83% | 59% | 77% | 53% | 69% | 59% | 77% | 59% | 77% | 59% | 59% | 57% | 57% |
| 4943 | 0.25% | 1.00% | 1.00% | 9.00% | 0.00% | 66% | 86% | 60% | 78% | 55% | 72% | 60% | 78% | 60% | 78% | 60% | 60% | 58% | 58% |
| 4944 | 1.00% | 1.00% | 1.00% | 9.00% | 0.00% | 68% | 88% | 61% | 79% | 58% | 75% | 62% | 81% | 62% | 81% | 62% | 62% | 61% | 61% |
| 4945 | 0.25% | 0.25% | 9.00% | 9.00% | 0.00% | 68% | 88% | 57% | 74% | 57% | 74% | 66% | 86% | 60% | 78% | 61% | 61% | 61% | 61% |
| 4946 | 0.25% | 0.25% | 0.00% | 0.00% | 0.25% | 14% | 18% | 15% | 20% | 15% | 20% | 16% | 21% | 15% | 20% | 15% | 15% | 15% | 15% |
| 4947 | 1.00% | 0.25% | 0.00% | 0.00% | 0.25% | 16% | 21% | 16% | 21% | 18% | 23% | 18% | 23% | 17% | 22% | 17% | 17% | 18% | 18% |
| 4948 | 0.25% | 1.00% | 0.00% | 0.00% | 0.25% | 22% | 29% | 23% | 30% | 18% | 23% | 21% | 27% | 25% | 33% | 21% | 21% | 21% | 21% |
| 4949 | 1.00% | 1.00% | 0.00% | 0.00% | 0.25% | 24% | 31% | 24% | 31% | 21% | 27% | 23% | 30% | 27% | 35% | 23% | 23% | 24% | 24% |
| 4950 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 4951 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 4952 | 0.00% | 0.25% | 0.25% | 0.00% | 0.25% | 16% | 21% | 20% | 26% | 17% | 22% | 18% | 23% | 19% | 25% | 18% | 18% | 18% | 18% |
| 4953 | 0.25% | 0.25% | 0.25% | 0.00% | 0.25% | 18% | 23% | 21% | 27% | 19% | 25% | 19% | 25% | 20% | 26% | 19% | 19% | 19% | 19% |
| 4954 | 0.00% | 1.00% | 0.25% | 0.00% | 0.25% | 24% | 31% | 28% | 36% | 20% | 26% | 23% | 30% | 29% | 38% | 24% | 24% | 24% | 24% |
| 4955 | 1.00% | 1.00% | 0.25% | 0.00% | 0.25% | 28% | 36% | 30% | 39% | 25% | 33% | 26% | 34% | 32% | 42% | 28% | 28% | 28% | 28% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4956 | 1.00% | 9.00% | 0.25% | 0.00% | 0.25% | 41% | 53% | 40% | 52% | 29% | 38% | 37% | 48% | 42% | 55% | 37% | 37% | 36% | 36% |
| 4957 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 4958 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 4959 | 0.00% | 0.25% | 1.00% | 0.00% | 0.25% | 21% | 27% | 23% | 30% | 23% | 30% | 24% | 31% | 23% | 30% | 22% | 22% | 23% | 23% |
| 4960 | 1.00% | 0.25% | 1.00% | 0.00% | 0.25% | 25% | 33% | 25% | 33% | 28% | 36% | 27% | 35% | 26% | 34% | 26% | 26% | 27% | 27% |
| 4961 | 0.00% | 1.00% | 1.00% | 0.00% | 0.25% | 29% | 38% | 31% | 40% | 26% | 34% | 29% | 38% | 33% | 43% | 29% | 29% | 29% | 29% |
| 4962 | 0.25% | 1.00% | 1.00% | 0.00% | 0.25% | 31% | 40% | 32% | 42% | 28% | 36% | 30% | 39% | 34% | 44% | 30% | 30% | 31% | 31% |
| 4963 | 1.00% | 1.00% | 1.00% | 0.00% | 0.25% | 33% | 43% | 33% | 43% | 31% | 40% | 32% | 42% | 36% | 47% | 32% | 32% | 33% | 33% |
| 4964 | 9.00% | 1.00% | 1.00% | 0.00% | 0.25% | 29% | 38% | 31% | 40% | 26% | 34% | 29% | 38% | 33% | 43% | 29% | 29% | 29% | 29% |
| 4965 | 1.00% | 9.00% | 1.00% | 0.00% | 0.25% | 46% | 60% | 43% | 56% | 35% | 46% | 43% | 56% | 46% | 60% | 41% | 41% | 41% | 41% |
| 4966 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 4967 | 0.00% | 0.25% | 9.00% | 0.00% | 0.25% | 31% | 40% | 28% | 36% | 28% | 36% | 35% | 46% | 33% | 43% | 29% | 29% | 32% | 32% |
| 4968 | 0.25% | 0.25% | 9.00% | 0.00% | 0.25% | 33% | 43% | 29% | 38% | 30% | 39% | 36% | 47% | 34% | 44% | 31% | 31% | 33% | 33% |
| 4969 | 1.00% | 0.25% | 9.00% | 0.00% | 0.25% | 35% | 46% | 30% | 39% | 33% | 43% | 38% | 49% | 36% | 47% | 33% | 33% | 36% | 36% |
| 4970 | 0.25% | 1.00% | 9.00% | 0.00% | 0.25% | 41% | 53% | 37% | 48% | 33% | 43% | 41% | 53% | 44% | 57% | 37% | 37% | 39% | 39% |
| 4971 | 0.25% | 0.00% | 0.00% | 0.25% | 0.25% | 17% | 22% | 16% | 21% | 18% | 23% | 16% | 21% | 16% | 21% | 17% | 17% | 17% | 17% |
| 4972 | 1.00% | 0.00% | 0.00% | 0.25% | 0.25% | 19% | 25% | 17% | 22% | 21% | 27% | 18% | 23% | 18% | 23% | 19% | 19% | 19% | 19% |
| 4973 | 0.00% | 0.25% | 0.00% | 0.25% | 0.25% | 20% | 26% | 22% | 29% | 22% | 29% | 22% | 29% | 21% | 27% | 21% | 21% | 22% | 22% |
| 4974 | 0.25% | 0.25% | 0.00% | 0.25% | 0.25% | 22% | 29% | 23% | 30% | 24% | 31% | 23% | 30% | 22% | 29% | 23% | 23% | 23% | 23% |
| 4975 | 9.00% | 0.25% | 0.00% | 0.25% | 0.25% | 20% | 26% | 22% | 29% | 22% | 29% | 22% | 29% | 21% | 27% | 21% | 21% | 22% | 22% |
| 4976 | 1.00% | 1.00% | 0.00% | 0.25% | 0.25% | 32% | 42% | 32% | 42% | 30% | 39% | 30% | 39% | 34% | 44% | 31% | 31% | 31% | 31% |
| 4977 | 1.00% | 9.00% | 0.00% | 0.25% | 0.25% | 45% | 59% | 42% | 55% | 34% | 44% | 41% | 53% | 44% | 57% | 40% | 40% | 40% | 40% |
| 4978 | 0.00% | 0.00% | 0.25% | 0.25% | 0.25% | 19% | 25% | 21% | 27% | 20% | 26% | 18% | 23% | 20% | 26% | 20% | 20% | 19% | 19% |
| 4979 | 0.25% | 0.00% | 0.25% | 0.25% | 0.25% | 21% | 27% | 22% | 29% | 22% | 29% | 19% | 25% | 21% | 27% | 22% | 22% | 21% | 21% |
| 4980 | 0.00% | 0.25% | 0.25% | 0.25% | 0.25% | 24% | 31% | 28% | 36% | 26% | 34% | 25% | 33% | 26% | 34% | 26% | 26% | 26% | 26% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 4981 | 0.25% | 0.25% | 0.25% | 0.25% | 0.25% | 26% | 34% | 29% | 38% | 28% | 36% | 26% | 34% | 27% | 35% | 28% | 28% | 27% | 27% |
| 4982 | 1.00% | 0.25% | 0.25% | 0.25% | 0.25% | 28% | 36% | 30% | 39% | 31% | 40% | 28% | 36% | 29% | 38% | 30% | 30% | 29% | 29% |
| 4983 | 9.00% | 0.25% | 0.25% | 0.25% | 0.25% | 24% | 31% | 28% | 36% | 26% | 34% | 25% | 33% | 26% | 34% | 26% | 26% | 26% | 26% |
| 4984 | 0.25% | 1.00% | 0.25% | 0.25% | 0.25% | 34% | 44% | 37% | 48% | 31% | 40% | 31% | 40% | 37% | 48% | 34% | 34% | 33% | 33% |
| 4985 | 9.00% | 1.00% | 0.25% | 0.25% | 0.25% | 32% | 42% | 36% | 47% | 29% | 38% | 30% | 39% | 36% | 47% | 32% | 32% | 32% | 32% |
| 4986 | 0.25% | 9.00% | 0.25% | 0.25% | 0.25% | 47% | 61% | 47% | 61% | 35% | 46% | 42% | 55% | 47% | 61% | 43% | 43% | 41% | 41% |
| 4987 | 1.00% | 9.00% | 0.25% | 0.25% | 0.25% | 49% | 64% | 48% | 62% | 38% | 49% | 44% | 57% | 49% | 64% | 45% | 45% | 44% | 44% |
| 4988 | 9.00% | 9.00% | 0.25% | 0.25% | 0.25% | 45% | 59% | 46% | 60% | 33% | 43% | 41% | 53% | 46% | 60% | 41% | 41% | 40% | 40% |
| 4989 | 0.00% | 0.00% | 1.00% | 0.25% | 0.25% | 24% | 31% | 24% | 31% | 26% | 34% | 24% | 31% | 24% | 31% | 25% | 25% | 25% | 25% |
| 4990 | 1.00% | 0.00% | 1.00% | 0.25% | 0.25% | 28% | 36% | 26% | 34% | 31% | 40% | 27% | 35% | 27% | 35% | 28% | 28% | 28% | 28% |
| 4991 | 0.00% | 0.25% | 1.00% | 0.25% | 0.25% | 29% | 38% | 31% | 40% | 32% | 42% | 31% | 40% | 30% | 39% | 31% | 31% | 31% | 31% |
| 4992 | 0.25% | 0.25% | 1.00% | 0.25% | 0.25% | 31% | 40% | 32% | 42% | 34% | 44% | 32% | 42% | 31% | 40% | 32% | 32% | 32% | 32% |
| 4993 | 1.00% | 0.25% | 1.00% | 0.25% | 0.25% | 33% | 43% | 33% | 43% | 37% | 48% | 34% | 44% | 33% | 43% | 34% | 34% | 35% | 35% |
| 4994 | 9.00% | 0.25% | 1.00% | 0.25% | 0.25% | 29% | 38% | 31% | 40% | 32% | 42% | 31% | 40% | 30% | 39% | 31% | 31% | 31% | 31% |
| 4995 | 0.00% | 1.00% | 1.00% | 0.25% | 0.25% | 37% | 48% | 39% | 51% | 35% | 46% | 36% | 47% | 40% | 52% | 37% | 37% | 37% | 37% |
| 4996 | 0.25% | 1.00% | 1.00% | 0.25% | 0.25% | 39% | 51% | 40% | 52% | 37% | 48% | 37% | 48% | 41% | 53% | 39% | 39% | 38% | 38% |
| 4997 | 1.00% | 1.00% | 1.00% | 0.25% | 0.25% | 41% | 53% | 41% | 53% | 40% | 52% | 39% | 51% | 43% | 56% | 41% | 41% | 41% | 41% |
| 4998 | 9.00% | 1.00% | 1.00% | 0.25% | 0.25% | 37% | 48% | 39% | 51% | 35% | 46% | 36% | 47% | 40% | 52% | 37% | 37% | 37% | 37% |
| 4999 | 0.00% | 9.00% | 1.00% | 0.25% | 0.25% | 50% | 65% | 49% | 64% | 39% | 51% | 47% | 61% | 50% | 65% | 46% | 46% | 45% | 45% |
| 5000 | 0.25% | 9.00% | 1.00% | 0.25% | 0.25% | 52% | 68% | 50% | 65% | 41% | 53% | 48% | 62% | 51% | 66% | 48% | 48% | 47% | 47% |
| 5001 | 1.00% | 9.00% | 1.00% | 0.25% | 0.25% | 54% | 70% | 51% | 66% | 44% | 57% | 50% | 65% | 53% | 69% | 50% | 50% | 49% | 49% |
| 5002 | 0.25% | 0.25% | 9.00% | 0.25% | 0.25% | 41% | 53% | 37% | 48% | 39% | 51% | 43% | 56% | 41% | 53% | 39% | 39% | 41% | 41% |
| 5003 | 1.00% | 0.25% | 9.00% | 0.25% | 0.25% | 43% | 56% | 38% | 49% | 42% | 55% | 45% | 59% | 43% | 56% | 41% | 41% | 43% | 43% |
| 5004 | 9.00% | 0.25% | 9.00% | 0.25% | 0.25% | 39% | 51% | 36% | 47% | 37% | 48% | 42% | 55% | 40% | 52% | 37% | 37% | 40% | 40% |
| 5005 | 0.00% | 1.00% | 9.00% | 0.25% | 0.25% | 47% | 61% | 44% | 57% | 40% | 52% | 47% | 61% | 50% | 65% | 44% | 44% | 46% | 46% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5006 | 0.25% | 1.00% | 9.00% | 0.25% | 0.25% | 49% | 64% | 45% | 59% | 42% | 55% | 48% | 62% | 51% | 66% | 45% | 45% | 47% | 47% |
| 5007 | 9.00% | 1.00% | 9.00% | 0.25% | 0.25% | 47% | 61% | 44% | 57% | 40% | 52% | 47% | 61% | 50% | 65% | 44% | 44% | 46% | 46% |
| 5008 | 1.00% | 9.00% | 9.00% | 0.25% | 0.25% | 64% | 83% | 56% | 73% | 49% | 64% | 61% | 79% | 63% | 82% | 56% | 56% | 58% | 58% |
| 5009 | 0.25% | 0.00% | 0.00% | 1.00% | 0.25% | 34% | 44% | 29% | 38% | 31% | 40% | 31% | 40% | 29% | 38% | 31% | 31% | 30% | 30% |
| 5010 | 1.00% | 0.25% | 0.00% | 1.00% | 0.25% | 41% | 53% | 37% | 48% | 40% | 52% | 40% | 52% | 37% | 48% | 39% | 39% | 39% | 39% |
| 5011 | 0.00% | 1.00% | 0.00% | 1.00% | 0.25% | 45% | 59% | 43% | 56% | 38% | 49% | 42% | 55% | 44% | 57% | 42% | 42% | 41% | 41% |
| 5012 | 0.25% | 1.00% | 0.00% | 1.00% | 0.25% | 47% | 61% | 44% | 57% | 40% | 52% | 43% | 56% | 45% | 59% | 44% | 44% | 43% | 43% |
| 5013 | 1.00% | 1.00% | 0.00% | 1.00% | 0.25% | 49% | 64% | 45% | 59% | 43% | 56% | 45% | 59% | 47% | 61% | 46% | 46% | 45% | 45% |
| 5014 | 0.00% | 0.00% | 0.25% | 1.00% | 0.25% | 36% | 47% | 34% | 44% | 33% | 43% | 33% | 43% | 33% | 43% | 34% | 34% | 33% | 33% |
| 5015 | 1.00% | 0.00% | 0.25% | 1.00% | 0.25% | 40% | 52% | 36% | 47% | 38% | 49% | 36% | 47% | 36% | 47% | 38% | 38% | 37% | 37% |
| 5016 | 0.25% | 0.25% | 0.25% | 1.00% | 0.25% | 43% | 56% | 42% | 55% | 41% | 53% | 41% | 53% | 40% | 52% | 42% | 42% | 41% | 41% |
| 5017 | 1.00% | 0.25% | 0.25% | 1.00% | 0.25% | 45% | 59% | 43% | 56% | 44% | 57% | 43% | 56% | 42% | 55% | 44% | 44% | 43% | 43% |
| 5018 | 9.00% | 0.25% | 0.25% | 1.00% | 0.25% | 41% | 53% | 41% | 53% | 39% | 51% | 40% | 52% | 39% | 51% | 40% | 40% | 39% | 39% |
| 5019 | 0.00% | 1.00% | 0.25% | 1.00% | 0.25% | 49% | 64% | 49% | 64% | 42% | 55% | 45% | 59% | 49% | 64% | 47% | 47% | 45% | 45% |
| 5020 | 0.25% | 1.00% | 0.25% | 1.00% | 0.25% | 51% | 66% | 50% | 65% | 44% | 57% | 46% | 60% | 50% | 65% | 48% | 48% | 47% | 47% |
| 5021 | 1.00% | 1.00% | 0.25% | 1.00% | 0.25% | 53% | 69% | 51% | 66% | 47% | 61% | 48% | 62% | 52% | 68% | 50% | 50% | 49% | 49% |
| 5022 | 9.00% | 1.00% | 0.25% | 1.00% | 0.25% | 49% | 64% | 49% | 64% | 42% | 55% | 45% | 59% | 49% | 64% | 47% | 47% | 45% | 45% |
| 5023 | 0.25% | 9.00% | 0.25% | 1.00% | 0.25% | 64% | 83% | 60% | 78% | 48% | 62% | 57% | 74% | 60% | 78% | 57% | 57% | 55% | 55% |
| 5024 | 1.00% | 9.00% | 0.25% | 1.00% | 0.25% | 66% | 86% | 61% | 79% | 51% | 66% | 59% | 77% | 62% | 81% | 59% | 59% | 57% | 57% |
| 5025 | 9.00% | 9.00% | 0.25% | 1.00% | 0.25% | 62% | 81% | 59% | 77% | 46% | 60% | 56% | 73% | 59% | 77% | 56% | 56% | 54% | 54% |
| 5026 | 0.00% | 0.00% | 1.00% | 1.00% | 0.25% | 41% | 53% | 37% | 48% | 39% | 51% | 39% | 51% | 37% | 48% | 39% | 39% | 38% | 38% |
| 5027 | 0.25% | 0.00% | 1.00% | 1.00% | 0.25% | 43% | 56% | 38% | 49% | 41% | 53% | 40% | 52% | 38% | 49% | 41% | 41% | 40% | 40% |
| 5028 | 1.00% | 0.00% | 1.00% | 1.00% | 0.25% | 45% | 59% | 39% | 51% | 44% | 57% | 42% | 55% | 40% | 52% | 43% | 43% | 42% | 42% |
| 5029 | 0.00% | 0.25% | 1.00% | 1.00% | 0.25% | 46% | 60% | 44% | 57% | 45% | 59% | 46% | 60% | 43% | 56% | 45% | 45% | 45% | 45% |
| 5030 | 1.00% | 0.25% | 1.00% | 1.00% | 0.25% | 50% | 65% | 46% | 60% | 50% | 65% | 49% | 64% | 46% | 60% | 49% | 49% | 48% | 48% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5031 | 9.00% | 0.25% | 1.00% | 1.00% | 0.25% | 46% | 60% | 44% | 57% | 45% | 59% | 46% | 60% | 43% | 56% | 45% | 45% | 45% | 45% |
| 5032 | 0.00% | 1.00% | 1.00% | 1.00% | 0.25% | 54% | 70% | 52% | 68% | 48% | 62% | 51% | 66% | 53% | 69% | 51% | 51% | 51% | 51% |
| 5033 | 0.25% | 1.00% | 1.00% | 1.00% | 0.25% | 56% | 73% | 53% | 69% | 50% | 65% | 52% | 68% | 54% | 70% | 53% | 53% | 52% | 52% |
| 5034 | 1.00% | 1.00% | 1.00% | 1.00% | 0.25% | 58% | 75% | 54% | 70% | 53% | 69% | 54% | 70% | 56% | 73% | 55% | 55% | 54% | 54% |
| 5035 | 9.00% | 1.00% | 1.00% | 1.00% | 0.25% | 54% | 70% | 52% | 68% | 48% | 62% | 51% | 66% | 53% | 69% | 51% | 51% | 51% | 51% |
| 5036 | 0.00% | 9.00% | 1.00% | 1.00% | 0.25% | 67% | 87% | 62% | 81% | 52% | 68% | 62% | 81% | 63% | 82% | 60% | 60% | 59% | 59% |
| 5037 | 0.25% | 9.00% | 1.00% | 1.00% | 0.25% | 69% | 90% | 63% | 82% | 54% | 70% | 63% | 82% | 64% | 83% | 62% | 62% | 60% | 60% |
| 5038 | 1.00% | 9.00% | 1.00% | 1.00% | 0.25% | 71% | 92% | 64% | 83% | 57% | 74% | 65% | 85% | 66% | 86% | 64% | 64% | 63% | 63% |
| 5039 | 0.25% | 0.25% | 9.00% | 1.00% | 0.25% | 58% | 75% | 50% | 65% | 52% | 68% | 58% | 75% | 54% | 70% | 53% | 53% | 55% | 55% |
| 5040 | 1.00% | 0.25% | 9.00% | 1.00% | 0.25% | 60% | 78% | 51% | 66% | 55% | 72% | 60% | 78% | 56% | 73% | 55% | 55% | 57% | 57% |
| 5041 | 9.00% | 0.25% | 9.00% | 1.00% | 0.25% | 56% | 73% | 49% | 64% | 50% | 65% | 57% | 74% | 53% | 69% | 52% | 52% | 53% | 53% |
| 5042 | 0.25% | 1.00% | 9.00% | 1.00% | 0.25% | 66% | 86% | 58% | 75% | 55% | 72% | 63% | 82% | 64% | 83% | 60% | 60% | 61% | 61% |
| 5043 | 0.00% | 0.25% | 0.00% | 9.00% | 0.25% | 54% | 70% | 49% | 64% | 47% | 61% | 53% | 69% | 48% | 62% | 50% | 50% | 49% | 49% |
| 5044 | 0.00% | 0.00% | 0.25% | 9.00% | 0.25% | 53% | 69% | 48% | 62% | 45% | 59% | 49% | 64% | 47% | 61% | 49% | 49% | 47% | 47% |
| 5045 | 0.25% | 0.00% | 0.25% | 9.00% | 0.25% | 55% | 72% | 49% | 64% | 47% | 61% | 50% | 65% | 48% | 62% | 50% | 50% | 48% | 48% |
| 5046 | 0.00% | 0.25% | 0.25% | 9.00% | 0.25% | 58% | 75% | 55% | 72% | 51% | 66% | 56% | 73% | 53% | 69% | 55% | 55% | 53% | 53% |
| 5047 | 0.25% | 0.25% | 0.25% | 9.00% | 0.25% | 60% | 78% | 56% | 73% | 53% | 69% | 57% | 74% | 54% | 70% | 56% | 56% | 55% | 55% |
| 5048 | 1.00% | 0.25% | 0.25% | 9.00% | 0.25% | 62% | 81% | 57% | 74% | 56% | 73% | 59% | 77% | 56% | 73% | 58% | 58% | 57% | 57% |
| 5049 | 9.00% | 0.25% | 0.25% | 9.00% | 0.25% | 58% | 75% | 55% | 72% | 51% | 66% | 56% | 73% | 53% | 69% | 55% | 55% | 53% | 53% |
| 5050 | 0.00% | 1.00% | 0.25% | 9.00% | 0.25% | 66% | 86% | 63% | 82% | 54% | 70% | 61% | 79% | 63% | 82% | 61% | 61% | 59% | 59% |
| 5051 | 0.25% | 1.00% | 0.25% | 9.00% | 0.25% | 68% | 88% | 64% | 83% | 56% | 73% | 62% | 81% | 64% | 83% | 63% | 63% | 61% | 61% |
| 5052 | 1.00% | 1.00% | 0.25% | 9.00% | 0.25% | 70% | 91% | 65% | 85% | 59% | 77% | 64% | 83% | 66% | 86% | 65% | 65% | 63% | 63% |
| 5053 | 0.25% | 9.00% | 0.25% | 9.00% | 0.25% | 81% | 105% | 74% | 96% | 60% | 78% | 73% | 95% | 74% | 96% | 72% | 72% | 69% | 69% |
| 5054 | 0.25% | 0.00% | 1.00% | 9.00% | 0.25% | 60% | 78% | 52% | 68% | 53% | 69% | 56% | 73% | 52% | 68% | 55% | 55% | 54% | 54% |
| 5055 | 1.00% | 0.25% | 1.00% | 9.00% | 0.25% | 67% | 87% | 60% | 78% | 62% | 81% | 65% | 85% | 60% | 78% | 63% | 63% | 62% | 62% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5056 | 9.00% | 0.25% | 1.00% | 9.00% | 0.25% | 63% | 82% | 58% | 75% | 57% | 74% | 62% | 81% | 57% | 74% | 59% | 59% | 59% | 59% |
| 5057 | 0.00% | 1.00% | 1.00% | 9.00% | 0.25% | 71% | 92% | 66% | 86% | 60% | 78% | 67% | 87% | 67% | 87% | 66% | 66% | 65% | 65% |
| 5058 | 0.25% | 1.00% | 1.00% | 9.00% | 0.25% | 73% | 95% | 67% | 87% | 62% | 81% | 68% | 88% | 68% | 88% | 67% | 67% | 66% | 66% |
| 5059 | 1.00% | 1.00% | 1.00% | 9.00% | 0.25% | 75% | 98% | 68% | 88% | 65% | 85% | 70% | 91% | 70% | 91% | 69% | 69% | 68% | 68% |
| 5060 | 0.25% | 0.25% | 9.00% | 9.00% | 0.25% | 75% | 98% | 64% | 83% | 64% | 83% | 74% | 96% | 68% | 88% | 68% | 68% | 69% | 69% |
| 5061 | 0.25% | 0.25% | 0.00% | 0.00% | 1.00% | 22% | 29% | 24% | 31% | 24% | 31% | 22% | 29% | 26% | 34% | 23% | 23% | 24% | 24% |
| 5062 | 1.00% | 0.25% | 0.00% | 0.00% | 1.00% | 24% | 31% | 25% | 33% | 27% | 35% | 24% | 31% | 28% | 36% | 25% | 25% | 26% | 26% |
| 5063 | 0.25% | 1.00% | 0.00% | 0.00% | 1.00% | 30% | 39% | 32% | 42% | 27% | 35% | 27% | 35% | 36% | 47% | 30% | 30% | 30% | 30% |
| 5064 | 1.00% | 1.00% | 0.00% | 0.00% | 1.00% | 32% | 42% | 33% | 43% | 30% | 39% | 29% | 38% | 38% | 49% | 32% | 32% | 32% | 32% |
| 5065 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 5066 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 5067 | 0.00% | 0.25% | 0.25% | 0.00% | 1.00% | 24% | 31% | 29% | 38% | 26% | 34% | 24% | 31% | 30% | 39% | 26% | 26% | 27% | 27% |
| 5068 | 0.25% | 0.25% | 0.25% | 0.00% | 1.00% | 26% | 34% | 30% | 39% | 28% | 36% | 25% | 33% | 31% | 40% | 28% | 28% | 28% | 28% |
| 5069 | 0.00% | 1.00% | 0.25% | 0.00% | 1.00% | 32% | 42% | 37% | 48% | 29% | 38% | 29% | 38% | 40% | 52% | 33% | 33% | 33% | 33% |
| 5070 | 1.00% | 1.00% | 0.25% | 0.00% | 1.00% | 36% | 47% | 39% | 51% | 34% | 44% | 32% | 42% | 43% | 56% | 36% | 36% | 36% | 36% |
| 5071 | 1.00% | 9.00% | 0.25% | 0.00% | 1.00% | 49% | 64% | 49% | 64% | 38% | 49% | 43% | 56% | 53% | 69% | 45% | 45% | 45% | 45% |
| 5072 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 5073 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 5074 | 0.00% | 0.25% | 1.00% | 0.00% | 1.00% | 29% | 38% | 32% | 42% | 32% | 42% | 30% | 39% | 34% | 44% | 31% | 31% | 32% | 32% |
| 5075 | 1.00% | 0.25% | 1.00% | 0.00% | 1.00% | 33% | 43% | 34% | 44% | 37% | 48% | 33% | 43% | 37% | 48% | 35% | 35% | 36% | 36% |
| 5076 | 0.00% | 1.00% | 1.00% | 0.00% | 1.00% | 37% | 48% | 40% | 52% | 35% | 46% | 35% | 46% | 44% | 57% | 37% | 37% | 38% | 38% |
| 5077 | 0.25% | 1.00% | 1.00% | 0.00% | 1.00% | 39% | 51% | 41% | 53% | 37% | 48% | 36% | 47% | 45% | 59% | 39% | 39% | 39% | 39% |
| 5078 | 1.00% | 1.00% | 1.00% | 0.00% | 1.00% | 41% | 53% | 42% | 55% | 40% | 52% | 38% | 49% | 47% | 61% | 41% | 41% | 42% | 42% |
| 5079 | 9.00% | 1.00% | 1.00% | 0.00% | 1.00% | 37% | 48% | 40% | 52% | 35% | 46% | 35% | 46% | 44% | 57% | 37% | 37% | 38% | 38% |
| 5080 | 1.00% | 9.00% | 1.00% | 0.00% | 1.00% | 54% | 70% | 52% | 68% | 44% | 57% | 49% | 64% | 57% | 74% | 50% | 50% | 50% | 50% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5081 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 5082 | 0.00% | 0.25% | 9.00% | 0.00% | 1.00% | 39% | 51% | 37% | 48% | 37% | 48% | 41% | 53% | 44% | 57% | 38% | 38% | 41% | 41% |
| 5083 | 0.25% | 0.25% | 9.00% | 0.00% | 1.00% | 41% | 53% | 38% | 49% | 39% | 51% | 42% | 55% | 45% | 59% | 39% | 39% | 42% | 42% |
| 5084 | 1.00% | 0.25% | 9.00% | 0.00% | 1.00% | 43% | 56% | 39% | 51% | 42% | 55% | 44% | 57% | 47% | 61% | 41% | 41% | 44% | 44% |
| 5085 | 0.25% | 1.00% | 9.00% | 0.00% | 1.00% | 49% | 64% | 46% | 60% | 42% | 55% | 47% | 61% | 55% | 72% | 46% | 46% | 48% | 48% |
| 5086 | 0.25% | 0.00% | 0.00% | 0.25% | 1.00% | 25% | 33% | 25% | 33% | 27% | 35% | 22% | 29% | 27% | 35% | 26% | 26% | 25% | 25% |
| 5087 | 1.00% | 0.00% | 0.00% | 0.25% | 1.00% | 27% | 35% | 26% | 34% | 30% | 39% | 24% | 31% | 29% | 38% | 28% | 28% | 28% | 28% |
| 5088 | 0.00% | 0.25% | 0.00% | 0.25% | 1.00% | 28% | 36% | 31% | 40% | 31% | 40% | 28% | 36% | 32% | 42% | 30% | 30% | 30% | 30% |
| 5089 | 0.25% | 0.25% | 0.00% | 0.25% | 1.00% | 30% | 39% | 32% | 42% | 33% | 43% | 29% | 38% | 33% | 43% | 32% | 32% | 32% | 32% |
| 5090 | 9.00% | 0.25% | 0.00% | 0.25% | 1.00% | 28% | 36% | 31% | 40% | 31% | 40% | 28% | 36% | 32% | 42% | 30% | 30% | 30% | 30% |
| 5091 | 1.00% | 1.00% | 0.00% | 0.25% | 1.00% | 40% | 52% | 41% | 53% | 39% | 51% | 36% | 47% | 45% | 59% | 40% | 40% | 40% | 40% |
| 5092 | 1.00% | 9.00% | 0.00% | 0.25% | 1.00% | 53% | 69% | 51% | 66% | 43% | 56% | 47% | 61% | 55% | 72% | 49% | 49% | 48% | 48% |
| 5093 | 0.00% | 0.00% | 0.25% | 0.25% | 1.00% | 27% | 35% | 30% | 39% | 29% | 38% | 24% | 31% | 31% | 40% | 29% | 29% | 28% | 28% |
| 5094 | 0.25% | 0.00% | 0.25% | 0.25% | 1.00% | 29% | 38% | 31% | 40% | 31% | 40% | 25% | 33% | 32% | 42% | 30% | 30% | 29% | 29% |
| 5095 | 0.00% | 0.25% | 0.25% | 0.25% | 1.00% | 32% | 42% | 37% | 48% | 35% | 46% | 31% | 40% | 37% | 48% | 35% | 35% | 34% | 34% |
| 5096 | 0.25% | 0.25% | 0.25% | 0.25% | 1.00% | 34% | 44% | 38% | 49% | 37% | 48% | 32% | 42% | 38% | 49% | 36% | 36% | 36% | 36% |
| 5097 | 1.00% | 0.25% | 0.25% | 0.25% | 1.00% | 36% | 47% | 39% | 51% | 40% | 52% | 34% | 44% | 40% | 52% | 38% | 38% | 38% | 38% |
| 5098 | 9.00% | 0.25% | 0.25% | 0.25% | 1.00% | 32% | 42% | 37% | 48% | 35% | 46% | 31% | 40% | 37% | 48% | 35% | 35% | 34% | 34% |
| 5099 | 0.25% | 1.00% | 0.25% | 0.25% | 1.00% | 42% | 55% | 46% | 60% | 40% | 52% | 37% | 48% | 48% | 62% | 43% | 43% | 42% | 42% |
| 5100 | 9.00% | 1.00% | 0.25% | 0.25% | 1.00% | 40% | 52% | 45% | 59% | 38% | 49% | 36% | 47% | 47% | 61% | 41% | 41% | 40% | 40% |
| 5101 | 0.25% | 9.00% | 0.25% | 0.25% | 1.00% | 55% | 72% | 56% | 73% | 44% | 57% | 48% | 62% | 58% | 75% | 52% | 52% | 50% | 50% |
| 5102 | 1.00% | 9.00% | 0.25% | 0.25% | 1.00% | 57% | 74% | 57% | 74% | 47% | 61% | 50% | 65% | 60% | 78% | 54% | 54% | 52% | 52% |
| 5103 | 9.00% | 9.00% | 0.25% | 0.25% | 1.00% | 53% | 69% | 55% | 72% | 42% | 55% | 47% | 61% | 57% | 74% | 50% | 50% | 49% | 49% |
| 5104 | 0.00% | 0.00% | 1.00% | 0.25% | 1.00% | 32% | 42% | 33% | 43% | 35% | 46% | 30% | 39% | 35% | 46% | 33% | 33% | 33% | 33% |
| 5105 | 1.00% | 0.00% | 1.00% | 0.25% | 1.00% | 36% | 47% | 35% | 46% | 40% | 52% | 33% | 43% | 38% | 49% | 37% | 37% | 37% | 37% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5106 | 0.00% | 0.25% | 1.00% | 0.25% | 1.00% | 37% | 48% | 40% | 52% | 41% | 53% | 37% | 48% | 41% | 53% | 39% | 39% | 40% | 40% |
| 5107 | 0.25% | 0.25% | 1.00% | 0.25% | 1.00% | 39% | 51% | 41% | 53% | 43% | 56% | 38% | 49% | 42% | 55% | 41% | 41% | 41% | 41% |
| 5108 | 1.00% | 0.25% | 1.00% | 0.25% | 1.00% | 41% | 53% | 42% | 55% | 46% | 60% | 40% | 52% | 44% | 57% | 43% | 43% | 43% | 43% |
| 5109 | 9.00% | 0.25% | 1.00% | 0.25% | 1.00% | 37% | 48% | 40% | 52% | 41% | 53% | 37% | 48% | 41% | 53% | 39% | 39% | 40% | 40% |
| 5110 | 0.00% | 1.00% | 1.00% | 0.25% | 1.00% | 45% | 59% | 48% | 62% | 44% | 57% | 42% | 55% | 51% | 66% | 46% | 46% | 46% | 46% |
| 5111 | 0.25% | 1.00% | 1.00% | 0.25% | 1.00% | 47% | 61% | 49% | 64% | 46% | 60% | 43% | 56% | 52% | 68% | 47% | 47% | 47% | 47% |
| 5112 | 1.00% | 1.00% | 1.00% | 0.25% | 1.00% | 49% | 64% | 50% | 65% | 49% | 64% | 45% | 59% | 54% | 70% | 49% | 49% | 49% | 49% |
| 5113 | 9.00% | 1.00% | 1.00% | 0.25% | 1.00% | 45% | 59% | 48% | 62% | 44% | 57% | 42% | 55% | 51% | 66% | 46% | 46% | 46% | 46% |
| 5114 | 0.00% | 9.00% | 1.00% | 0.25% | 1.00% | 58% | 75% | 58% | 75% | 48% | 62% | 53% | 69% | 61% | 79% | 55% | 55% | 54% | 54% |
| 5115 | 0.25% | 9.00% | 1.00% | 0.25% | 1.00% | 60% | 78% | 59% | 77% | 50% | 65% | 54% | 70% | 62% | 81% | 56% | 56% | 55% | 55% |
| 5116 | 1.00% | 9.00% | 1.00% | 0.25% | 1.00% | 62% | 81% | 60% | 78% | 53% | 69% | 56% | 73% | 64% | 83% | 58% | 58% | 58% | 58% |
| 5117 | 0.25% | 0.25% | 9.00% | 0.25% | 1.00% | 49% | 64% | 46% | 60% | 48% | 62% | 49% | 64% | 52% | 68% | 48% | 48% | 50% | 50% |
| 5118 | 1.00% | 0.25% | 9.00% | 0.25% | 1.00% | 51% | 66% | 47% | 61% | 51% | 66% | 51% | 66% | 54% | 70% | 50% | 50% | 52% | 52% |
| 5119 | 9.00% | 0.25% | 9.00% | 0.25% | 1.00% | 47% | 61% | 45% | 59% | 46% | 60% | 48% | 62% | 51% | 66% | 46% | 46% | 48% | 48% |
| 5120 | 0.00% | 1.00% | 9.00% | 0.25% | 1.00% | 55% | 72% | 53% | 69% | 49% | 64% | 53% | 69% | 61% | 79% | 52% | 52% | 54% | 54% |
| 5121 | 0.25% | 1.00% | 9.00% | 0.25% | 1.00% | 57% | 74% | 54% | 70% | 51% | 66% | 54% | 70% | 62% | 81% | 54% | 54% | 56% | 56% |
| 5122 | 9.00% | 1.00% | 9.00% | 0.25% | 1.00% | 55% | 72% | 53% | 69% | 49% | 64% | 53% | 69% | 61% | 79% | 52% | 52% | 54% | 54% |
| 5123 | 1.00% | 9.00% | 9.00% | 0.25% | 1.00% | 72% | 94% | 65% | 85% | 58% | 75% | 67% | 87% | 74% | 96% | 65% | 65% | 66% | 66% |
| 5124 | 0.25% | 0.00% | 0.00% | 1.00% | 1.00% | 42% | 55% | 38% | 49% | 40% | 52% | 37% | 48% | 40% | 52% | 40% | 40% | 39% | 39% |
| 5125 | 1.00% | 0.25% | 0.00% | 1.00% | 1.00% | 49% | 64% | 46% | 60% | 49% | 64% | 46% | 60% | 48% | 62% | 48% | 48% | 48% | 48% |
| 5126 | 0.00% | 1.00% | 0.00% | 1.00% | 1.00% | 53% | 69% | 52% | 68% | 47% | 61% | 48% | 62% | 55% | 72% | 51% | 51% | 50% | 50% |
| 5127 | 0.25% | 1.00% | 0.00% | 1.00% | 1.00% | 55% | 72% | 53% | 69% | 49% | 64% | 49% | 64% | 56% | 73% | 52% | 52% | 51% | 51% |
| 5128 | 1.00% | 1.00% | 0.00% | 1.00% | 1.00% | 57% | 74% | 54% | 70% | 52% | 68% | 51% | 66% | 58% | 75% | 54% | 54% | 54% | 54% |
| 5129 | 0.00% | 0.00% | 0.25% | 1.00% | 1.00% | 44% | 57% | 43% | 56% | 42% | 55% | 39% | 51% | 44% | 57% | 43% | 43% | 42% | 42% |
| 5130 | 1.00% | 0.00% | 0.25% | 1.00% | 1.00% | 48% | 62% | 45% | 59% | 47% | 61% | 42% | 55% | 47% | 61% | 47% | 47% | 45% | 45% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5131 | 0.25% | 0.25% | 0.25% | 1.00% | 1.00% | 51% | 66% | 51% | 66% | 50% | 65% | 47% | 61% | 51% | 66% | 51% | 51% | 49% | 49% |
| 5132 | 1.00% | 0.25% | 0.25% | 1.00% | 1.00% | 53% | 69% | 52% | 68% | 53% | 69% | 49% | 64% | 53% | 69% | 53% | 53% | 52% | 52% |
| 5133 | 9.00% | 0.25% | 0.25% | 1.00% | 1.00% | 49% | 64% | 50% | 65% | 48% | 62% | 46% | 60% | 50% | 65% | 49% | 49% | 48% | 48% |
| 5134 | 0.00% | 1.00% | 0.25% | 1.00% | 1.00% | 57% | 74% | 58% | 75% | 51% | 66% | 51% | 66% | 60% | 78% | 55% | 55% | 54% | 54% |
| 5135 | 0.25% | 1.00% | 0.25% | 1.00% | 1.00% | 59% | 77% | 59% | 77% | 53% | 69% | 52% | 68% | 61% | 79% | 57% | 57% | 55% | 55% |
| 5136 | 1.00% | 1.00% | 0.25% | 1.00% | 1.00% | 61% | 79% | 60% | 78% | 56% | 73% | 54% | 70% | 63% | 82% | 59% | 59% | 58% | 58% |
| 5137 | 9.00% | 1.00% | 0.25% | 1.00% | 1.00% | 57% | 74% | 58% | 75% | 51% | 66% | 51% | 66% | 60% | 78% | 55% | 55% | 54% | 54% |
| 5138 | 0.25% | 9.00% | 0.25% | 1.00% | 1.00% | 72% | 94% | 69% | 90% | 57% | 74% | 63% | 82% | 71% | 92% | 66% | 66% | 64% | 64% |
| 5139 | 1.00% | 9.00% | 0.25% | 1.00% | 1.00% | 74% | 96% | 70% | 91% | 60% | 78% | 65% | 85% | 73% | 95% | 68% | 68% | 66% | 66% |
| 5140 | 9.00% | 9.00% | 0.25% | 1.00% | 1.00% | 70% | 91% | 68% | 88% | 55% | 72% | 62% | 81% | 70% | 91% | 64% | 64% | 62% | 62% |
| 5141 | 0.00% | 0.00% | 1.00% | 1.00% | 1.00% | 49% | 64% | 46% | 60% | 48% | 62% | 45% | 59% | 48% | 62% | 48% | 48% | 47% | 47% |
| 5142 | 0.25% | 0.00% | 1.00% | 1.00% | 1.00% | 51% | 66% | 47% | 61% | 50% | 65% | 46% | 60% | 49% | 64% | 49% | 49% | 48% | 48% |
| 5143 | 1.00% | 0.00% | 1.00% | 1.00% | 1.00% | 53% | 69% | 48% | 62% | 53% | 69% | 48% | 62% | 51% | 66% | 51% | 51% | 51% | 51% |
| 5144 | 0.00% | 0.25% | 1.00% | 1.00% | 1.00% | 54% | 70% | 53% | 69% | 54% | 70% | 52% | 68% | 54% | 70% | 54% | 54% | 53% | 53% |
| 5145 | 1.00% | 0.25% | 1.00% | 1.00% | 1.00% | 58% | 75% | 55% | 72% | 59% | 77% | 55% | 72% | 57% | 74% | 57% | 57% | 57% | 57% |
| 5146 | 9.00% | 0.25% | 1.00% | 1.00% | 1.00% | 54% | 70% | 53% | 69% | 54% | 70% | 52% | 68% | 54% | 70% | 54% | 54% | 53% | 53% |
| 5147 | 0.00% | 1.00% | 1.00% | 1.00% | 1.00% | 62% | 81% | 61% | 79% | 57% | 74% | 57% | 74% | 64% | 83% | 60% | 60% | 59% | 59% |
| 5148 | 0.25% | 1.00% | 1.00% | 1.00% | 1.00% | 64% | 83% | 62% | 81% | 59% | 77% | 58% | 75% | 65% | 85% | 62% | 62% | 61% | 61% |
| 5149 | 1.00% | 1.00% | 1.00% | 1.00% | 1.00% | 66% | 86% | 63% | 82% | 62% | 81% | 60% | 78% | 67% | 87% | 64% | 64% | 63% | 63% |
| 5150 | 9.00% | 1.00% | 1.00% | 1.00% | 1.00% | 62% | 81% | 61% | 79% | 57% | 74% | 57% | 74% | 64% | 83% | 60% | 60% | 59% | 59% |
| 5151 | 0.00% | 9.00% | 1.00% | 1.00% | 1.00% | 75% | 98% | 71% | 92% | 61% | 79% | 68% | 88% | 74% | 96% | 69% | 69% | 68% | 68% |
| 5152 | 0.25% | 9.00% | 1.00% | 1.00% | 1.00% | 77% | 100% | 72% | 94% | 63% | 82% | 69% | 90% | 75% | 98% | 71% | 71% | 69% | 69% |
| 5153 | 1.00% | 9.00% | 1.00% | 1.00% | 1.00% | 79% | 100% | 73% | 95% | 66% | 86% | 71% | 92% | 77% | 100% | 73% | 73% | 71% | 71% |
| 5154 | 0.25% | 0.25% | 9.00% | 1.00% | 1.00% | 66% | 86% | 59% | 77% | 61% | 79% | 64% | 83% | 65% | 85% | 62% | 62% | 63% | 63% |
| 5155 | 1.00% | 0.25% | 9.00% | 1.00% | 1.00% | 68% | 88% | 60% | 78% | 64% | 83% | 66% | 86% | 67% | 87% | 64% | 64% | 66% | 66% |

Fig. 20

| Formula # | Delta Dodecalactone | Methyl Apritone | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5156 | 9.00% | 0.25% | 9.00% | 1.00% | 1.00% | 64% | 83% | 58% | 75% | 59% | 77% | 63% | 82% | 64% | 83% | 60% | 60% | 62% | 62% |
| 5157 | 0.25% | 1.00% | 9.00% | 1.00% | 1.00% | 74% | 96% | 67% | 87% | 64% | 83% | 69% | 90% | 75% | 98% | 68% | 68% | 69% | 69% |
| 5158 | 0.00% | 0.25% | 0.00% | 9.00% | 1.00% | 62% | 81% | 58% | 75% | 56% | 73% | 59% | 77% | 59% | 77% | 59% | 59% | 58% | 58% |
| 5159 | 0.00% | 0.00% | 0.25% | 9.00% | 1.00% | 61% | 79% | 57% | 74% | 54% | 70% | 55% | 72% | 58% | 75% | 57% | 57% | 56% | 56% |
| 5160 | 0.25% | 0.00% | 0.25% | 9.00% | 1.00% | 63% | 82% | 58% | 75% | 56% | 73% | 56% | 73% | 59% | 77% | 59% | 59% | 57% | 57% |
| 5161 | 0.00% | 0.25% | 0.25% | 9.00% | 1.00% | 66% | 86% | 64% | 83% | 60% | 78% | 62% | 81% | 64% | 83% | 63% | 63% | 62% | 62% |
| 5162 | 0.25% | 0.25% | 0.25% | 9.00% | 1.00% | 68% | 88% | 65% | 85% | 62% | 81% | 63% | 82% | 65% | 85% | 65% | 65% | 63% | 63% |
| 5163 | 1.00% | 0.25% | 0.25% | 9.00% | 1.00% | 70% | 91% | 66% | 86% | 65% | 85% | 65% | 85% | 67% | 87% | 67% | 67% | 66% | 66% |
| 5164 | 9.00% | 0.25% | 0.25% | 9.00% | 1.00% | 66% | 86% | 64% | 83% | 60% | 78% | 62% | 81% | 64% | 83% | 63% | 63% | 62% | 62% |
| 5165 | 0.00% | 1.00% | 0.25% | 9.00% | 1.00% | 74% | 96% | 72% | 94% | 63% | 82% | 67% | 87% | 74% | 96% | 70% | 70% | 68% | 68% |
| 5166 | 0.25% | 1.00% | 0.25% | 9.00% | 1.00% | 76% | 99% | 73% | 95% | 65% | 85% | 68% | 88% | 75% | 98% | 71% | 71% | 69% | 69% |
| 5167 | 1.00% | 1.00% | 0.25% | 9.00% | 1.00% | 78% | 100% | 74% | 96% | 68% | 88% | 70% | 91% | 77% | 100% | 73% | 73% | 72% | 72% |
| 5168 | 0.25% | 9.00% | 0.25% | 9.00% | 1.00% | 89% | 100% | 83% | 100% | 69% | 90% | 79% | 100% | 85% | 100% | 80% | 80% | 78% | 78% |
| 5169 | 0.25% | 0.00% | 1.00% | 9.00% | 1.00% | 68% | 88% | 61% | 79% | 62% | 81% | 62% | 81% | 63% | 82% | 64% | 64% | 62% | 62% |
| 5170 | 1.00% | 0.25% | 1.00% | 9.00% | 1.00% | 75% | 98% | 69% | 90% | 71% | 92% | 71% | 92% | 71% | 92% | 72% | 72% | 71% | 71% |
| 5171 | 9.00% | 0.25% | 1.00% | 9.00% | 1.00% | 71% | 92% | 67% | 87% | 66% | 86% | 68% | 88% | 68% | 88% | 68% | 68% | 67% | 67% |
| 5172 | 0.00% | 1.00% | 1.00% | 9.00% | 1.00% | 79% | 100% | 75% | 98% | 69% | 90% | 73% | 95% | 78% | 100% | 74% | 74% | 73% | 73% |
| 5173 | 0.25% | 1.00% | 1.00% | 9.00% | 1.00% | 81% | 100% | 76% | 99% | 71% | 92% | 74% | 96% | 79% | 100% | 76% | 76% | 75% | 75% |
| 5174 | 1.00% | 1.00% | 1.00% | 9.00% | 1.00% | 83% | 100% | 77% | 100% | 74% | 96% | 76% | 99% | 81% | 100% | 78% | 78% | 77% | 77% |
| 5175 | 0.25% | 0.25% | 9.00% | 9.00% | 1.00% | 83% | 100% | 73% | 95% | 73% | 95% | 80% | 100% | 79% | 100% | 76% | 76% | 77% | 77% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5176 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 5177 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 5178 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 5179 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 5180 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 5181 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 5182 | 0.00% | 0.25% | 0.25% | 0.00% | 0.00% | 9% | 12% | 13% | 17% | 10% | 13% | 10% | 13% | 11% | 14% | 11% | 11% | 10% | 10% |
| 5183 | 0.25% | 0.25% | 0.25% | 0.00% | 0.00% | 11% | 14% | 14% | 18% | 12% | 16% | 11% | 14% | 12% | 16% | 12% | 12% | 12% | 12% |
| 5184 | 0.00% | 1.00% | 0.25% | 0.00% | 0.00% | 17% | 22% | 21% | 27% | 13% | 17% | 15% | 20% | 21% | 27% | 17% | 17% | 16% | 16% |
| 5185 | 1.00% | 1.00% | 0.25% | 0.00% | 0.00% | 21% | 27% | 23% | 30% | 18% | 23% | 18% | 23% | 24% | 31% | 21% | 21% | 20% | 20% |
| 5186 | 1.00% | 9.00% | 0.25% | 0.00% | 0.00% | 34% | 44% | 33% | 43% | 22% | 29% | 29% | 38% | 34% | 44% | 30% | 30% | 28% | 28% |
| 5187 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 5188 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 5189 | 0.00% | 0.25% | 1.00% | 0.00% | 0.00% | 14% | 18% | 16% | 21% | 16% | 21% | 16% | 21% | 15% | 20% | 15% | 15% | 16% | 16% |
| 5190 | 1.00% | 0.25% | 1.00% | 0.00% | 0.00% | 18% | 23% | 18% | 23% | 21% | 27% | 19% | 25% | 18% | 23% | 19% | 19% | 19% | 19% |
| 5191 | 0.00% | 1.00% | 1.00% | 0.00% | 0.00% | 22% | 29% | 24% | 31% | 19% | 25% | 21% | 27% | 25% | 33% | 22% | 22% | 22% | 22% |
| 5192 | 0.25% | 1.00% | 1.00% | 0.00% | 0.00% | 24% | 31% | 25% | 33% | 21% | 27% | 22% | 29% | 26% | 34% | 23% | 23% | 23% | 23% |
| 5193 | 1.00% | 1.00% | 1.00% | 0.00% | 0.00% | 26% | 34% | 26% | 34% | 24% | 31% | 24% | 31% | 28% | 36% | 25% | 25% | 25% | 25% |
| 5194 | 9.00% | 1.00% | 1.00% | 0.00% | 0.00% | 22% | 29% | 24% | 31% | 19% | 25% | 21% | 27% | 25% | 33% | 22% | 22% | 22% | 22% |
| 5195 | 1.00% | 9.00% | 1.00% | 0.00% | 0.00% | 39% | 51% | 36% | 47% | 28% | 36% | 35% | 46% | 38% | 49% | 34% | 34% | 34% | 34% |
| 5196 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 5197 | 0.00% | 0.25% | 9.00% | 0.00% | 0.00% | 24% | 31% | 21% | 27% | 21% | 27% | 27% | 35% | 25% | 33% | 22% | 22% | 24% | 24% |
| 5198 | 0.25% | 0.25% | 9.00% | 0.00% | 0.00% | 26% | 34% | 22% | 29% | 23% | 30% | 28% | 36% | 26% | 34% | 24% | 24% | 26% | 26% |
| 5199 | 1.00% | 0.25% | 9.00% | 0.00% | 0.00% | 28% | 36% | 23% | 30% | 26% | 34% | 30% | 39% | 28% | 36% | 26% | 26% | 28% | 28% |
| 5200 | 0.25% | 1.00% | 9.00% | 0.00% | 0.00% | 34% | 44% | 30% | 39% | 26% | 34% | 33% | 43% | 36% | 47% | 30% | 30% | 32% | 32% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5201 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 5202 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 5203 | 0.00% | 0.25% | 0.00% | 0.25% | 0.00% | 8% | 10% | 13% | 17% | 8% | 10% | 12% | 16% | 11% | 14% | 10% | 10% | 10% | 10% |
| 5204 | 0.25% | 0.25% | 0.00% | 0.25% | 0.00% | 10% | 13% | 14% | 18% | 10% | 13% | 13% | 17% | 12% | 16% | 11% | 11% | 12% | 12% |
| 5205 | 9.00% | 0.25% | 0.00% | 0.25% | 0.00% | 8% | 10% | 13% | 17% | 8% | 10% | 12% | 16% | 11% | 14% | 10% | 10% | 10% | 10% |
| 5206 | 1.00% | 1.00% | 0.00% | 0.25% | 0.00% | 20% | 26% | 23% | 30% | 16% | 21% | 20% | 26% | 24% | 31% | 20% | 20% | 20% | 20% |
| 5207 | 1.00% | 9.00% | 0.00% | 0.25% | 0.00% | 33% | 43% | 33% | 43% | 20% | 26% | 31% | 40% | 34% | 44% | 29% | 29% | 28% | 28% |
| 5208 | 0.00% | 0.00% | 0.25% | 0.25% | 0.00% | 7% | 9% | 12% | 16% | 6% | 8% | 8% | 10% | 10% | 13% | 8% | 8% | 8% | 8% |
| 5209 | 0.25% | 0.00% | 0.25% | 0.25% | 0.00% | 9% | 12% | 13% | 17% | 8% | 10% | 9% | 12% | 11% | 14% | 10% | 10% | 9% | 9% |
| 5210 | 0.00% | 0.25% | 0.25% | 0.25% | 0.00% | 12% | 16% | 19% | 25% | 12% | 16% | 15% | 20% | 16% | 21% | 14% | 14% | 14% | 14% |
| 5211 | 0.25% | 0.25% | 0.25% | 0.25% | 0.00% | 14% | 18% | 20% | 26% | 14% | 18% | 16% | 21% | 17% | 22% | 16% | 16% | 16% | 16% |
| 5212 | 1.00% | 0.25% | 0.25% | 0.25% | 0.00% | 16% | 21% | 21% | 27% | 17% | 22% | 18% | 23% | 19% | 25% | 18% | 18% | 18% | 18% |
| 5213 | 9.00% | 0.25% | 0.25% | 0.25% | 0.00% | 12% | 16% | 19% | 25% | 12% | 16% | 15% | 20% | 16% | 21% | 14% | 14% | 14% | 14% |
| 5214 | 0.25% | 1.00% | 0.25% | 0.25% | 0.00% | 22% | 29% | 28% | 36% | 17% | 22% | 21% | 27% | 27% | 35% | 22% | 22% | 22% | 22% |
| 5215 | 9.00% | 1.00% | 0.25% | 0.25% | 0.00% | 20% | 26% | 27% | 35% | 15% | 20% | 20% | 26% | 26% | 34% | 21% | 21% | 20% | 20% |
| 5216 | 0.25% | 9.00% | 0.25% | 0.25% | 0.00% | 35% | 46% | 38% | 49% | 21% | 27% | 32% | 42% | 37% | 48% | 31% | 31% | 30% | 30% |
| 5217 | 1.00% | 9.00% | 0.25% | 0.25% | 0.00% | 37% | 48% | 39% | 51% | 24% | 31% | 34% | 44% | 39% | 51% | 33% | 33% | 32% | 32% |
| 5218 | 9.00% | 9.00% | 0.25% | 0.25% | 0.00% | 33% | 43% | 37% | 48% | 19% | 25% | 31% | 40% | 36% | 47% | 30% | 30% | 29% | 29% |
| 5219 | 0.00% | 0.00% | 1.00% | 0.25% | 0.00% | 12% | 16% | 15% | 20% | 12% | 16% | 14% | 18% | 14% | 18% | 13% | 13% | 13% | 13% |
| 5220 | 1.00% | 0.00% | 1.00% | 0.25% | 0.00% | 16% | 21% | 17% | 22% | 17% | 22% | 17% | 22% | 17% | 22% | 17% | 17% | 17% | 17% |
| 5221 | 0.00% | 0.25% | 1.00% | 0.25% | 0.00% | 17% | 22% | 22% | 29% | 18% | 23% | 21% | 27% | 20% | 26% | 19% | 19% | 20% | 20% |
| 5222 | 0.25% | 0.25% | 1.00% | 0.25% | 0.00% | 19% | 25% | 23% | 30% | 20% | 26% | 22% | 29% | 21% | 27% | 21% | 21% | 21% | 21% |
| 5223 | 1.00% | 0.25% | 1.00% | 0.25% | 0.00% | 21% | 27% | 24% | 31% | 23% | 30% | 24% | 31% | 23% | 30% | 23% | 23% | 23% | 23% |
| 5224 | 9.00% | 0.25% | 1.00% | 0.25% | 0.00% | 17% | 22% | 22% | 29% | 18% | 23% | 21% | 27% | 20% | 26% | 19% | 19% | 20% | 20% |
| 5225 | 0.00% | 1.00% | 1.00% | 0.25% | 0.00% | 25% | 33% | 30% | 39% | 21% | 27% | 26% | 34% | 30% | 39% | 25% | 25% | 26% | 26% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5226 | 0.25% | 1.00% | 1.00% | 0.25% | 0.00% | 27% | 35% | 31% | 40% | 23% | 30% | 27% | 35% | 31% | 40% | 27% | 27% | 27% | 27% |
| 5227 | 1.00% | 1.00% | 1.00% | 0.25% | 0.00% | 29% | 38% | 32% | 42% | 26% | 34% | 29% | 38% | 33% | 43% | 29% | 29% | 29% | 29% |
| 5228 | 9.00% | 1.00% | 1.00% | 0.25% | 0.00% | 25% | 33% | 30% | 39% | 21% | 27% | 26% | 34% | 30% | 39% | 25% | 25% | 26% | 26% |
| 5229 | 0.00% | 9.00% | 1.00% | 0.25% | 0.00% | 38% | 49% | 40% | 52% | 25% | 33% | 37% | 48% | 40% | 52% | 34% | 34% | 34% | 34% |
| 5230 | 0.25% | 9.00% | 1.00% | 0.25% | 0.00% | 40% | 52% | 41% | 53% | 27% | 35% | 38% | 49% | 41% | 53% | 36% | 36% | 35% | 35% |
| 5231 | 1.00% | 9.00% | 1.00% | 0.25% | 0.00% | 42% | 55% | 42% | 55% | 30% | 39% | 40% | 52% | 43% | 56% | 38% | 38% | 38% | 38% |
| 5232 | 0.25% | 0.25% | 9.00% | 0.25% | 0.00% | 29% | 38% | 28% | 36% | 25% | 33% | 33% | 43% | 31% | 40% | 27% | 27% | 30% | 30% |
| 5233 | 1.00% | 0.25% | 9.00% | 0.25% | 0.00% | 31% | 40% | 29% | 38% | 28% | 36% | 35% | 46% | 33% | 43% | 29% | 29% | 32% | 32% |
| 5234 | 9.00% | 0.25% | 9.00% | 0.25% | 0.00% | 27% | 35% | 27% | 35% | 23% | 30% | 32% | 42% | 30% | 39% | 26% | 26% | 28% | 28% |
| 5235 | 0.00% | 1.00% | 9.00% | 0.25% | 0.00% | 35% | 46% | 35% | 46% | 26% | 34% | 37% | 48% | 40% | 52% | 32% | 32% | 34% | 34% |
| 5236 | 0.25% | 1.00% | 9.00% | 0.25% | 0.00% | 37% | 48% | 36% | 47% | 28% | 36% | 38% | 49% | 41% | 53% | 34% | 34% | 36% | 36% |
| 5237 | 9.00% | 1.00% | 9.00% | 0.25% | 0.00% | 35% | 46% | 35% | 46% | 26% | 34% | 37% | 48% | 40% | 52% | 32% | 32% | 34% | 34% |
| 5238 | 1.00% | 9.00% | 9.00% | 0.25% | 0.00% | 52% | 68% | 47% | 61% | 35% | 46% | 51% | 66% | 53% | 69% | 45% | 45% | 46% | 46% |
| 5239 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 5240 | 1.00% | 0.25% | 0.00% | 1.00% | 0.00% | 23% | 30% | 22% | 29% | 23% | 30% | 22% | 29% | 26% | 34% | 23% | 23% | 24% | 24% |
| 5241 | 0.00% | 1.00% | 0.00% | 1.00% | 0.00% | 27% | 35% | 28% | 36% | 21% | 27% | 24% | 31% | 33% | 43% | 25% | 25% | 26% | 26% |
| 5242 | 0.25% | 1.00% | 0.00% | 1.00% | 0.00% | 29% | 38% | 29% | 38% | 23% | 30% | 25% | 33% | 34% | 44% | 27% | 27% | 27% | 27% |
| 5243 | 1.00% | 1.00% | 0.00% | 1.00% | 0.00% | 31% | 40% | 30% | 39% | 26% | 34% | 27% | 35% | 36% | 47% | 29% | 29% | 30% | 30% |
| 5244 | 0.00% | 0.00% | 0.25% | 1.00% | 0.00% | 18% | 23% | 19% | 25% | 16% | 21% | 15% | 20% | 22% | 29% | 18% | 18% | 18% | 18% |
| 5245 | 1.00% | 0.00% | 0.25% | 1.00% | 0.00% | 22% | 29% | 21% | 27% | 21% | 27% | 18% | 23% | 25% | 33% | 21% | 21% | 21% | 21% |
| 5246 | 0.25% | 0.25% | 0.25% | 1.00% | 0.00% | 25% | 33% | 27% | 35% | 24% | 31% | 23% | 30% | 29% | 38% | 25% | 25% | 25% | 25% |
| 5247 | 1.00% | 0.25% | 0.25% | 1.00% | 0.00% | 27% | 35% | 28% | 36% | 27% | 35% | 25% | 33% | 31% | 40% | 27% | 27% | 28% | 28% |
| 5248 | 9.00% | 0.25% | 0.25% | 1.00% | 0.00% | 23% | 30% | 26% | 34% | 22% | 29% | 22% | 29% | 28% | 36% | 24% | 24% | 24% | 24% |
| 5249 | 0.00% | 1.00% | 0.25% | 1.00% | 0.00% | 31% | 40% | 34% | 44% | 25% | 33% | 27% | 35% | 38% | 49% | 30% | 30% | 30% | 30% |
| 5250 | 0.25% | 1.00% | 0.25% | 1.00% | 0.00% | 33% | 43% | 35% | 46% | 27% | 35% | 28% | 36% | 39% | 51% | 32% | 32% | 31% | 31% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5251 | 1.00% | 1.00% | 0.25% | 1.00% | 0.00% | 35% | 46% | 36% | 47% | 30% | 39% | 30% | 39% | 41% | 53% | 34% | 34% | 34% | 34% |
| 5252 | 9.00% | 1.00% | 0.25% | 1.00% | 0.00% | 31% | 40% | 34% | 44% | 25% | 33% | 27% | 35% | 38% | 49% | 30% | 30% | 30% | 30% |
| 5253 | 0.25% | 9.00% | 0.25% | 1.00% | 0.00% | 46% | 60% | 45% | 59% | 31% | 40% | 39% | 51% | 49% | 64% | 41% | 41% | 40% | 40% |
| 5254 | 1.00% | 9.00% | 0.25% | 1.00% | 0.00% | 48% | 62% | 46% | 60% | 34% | 44% | 41% | 53% | 51% | 66% | 43% | 43% | 42% | 42% |
| 5255 | 9.00% | 9.00% | 0.25% | 1.00% | 0.00% | 44% | 57% | 44% | 57% | 29% | 38% | 38% | 49% | 48% | 62% | 39% | 39% | 38% | 38% |
| 5256 | 0.00% | 0.00% | 1.00% | 1.00% | 0.00% | 23% | 30% | 22% | 29% | 22% | 29% | 21% | 27% | 26% | 34% | 22% | 22% | 23% | 23% |
| 5257 | 0.25% | 0.00% | 1.00% | 1.00% | 0.00% | 25% | 33% | 23% | 30% | 24% | 31% | 22% | 29% | 27% | 35% | 24% | 24% | 24% | 24% |
| 5258 | 1.00% | 0.00% | 1.00% | 1.00% | 0.00% | 27% | 35% | 24% | 31% | 27% | 35% | 24% | 31% | 29% | 38% | 26% | 26% | 27% | 27% |
| 5259 | 0.00% | 0.25% | 1.00% | 1.00% | 0.00% | 28% | 36% | 29% | 38% | 28% | 36% | 28% | 36% | 32% | 42% | 28% | 28% | 29% | 29% |
| 5260 | 1.00% | 0.25% | 1.00% | 1.00% | 0.00% | 32% | 42% | 31% | 40% | 33% | 43% | 31% | 40% | 35% | 46% | 32% | 32% | 33% | 33% |
| 5261 | 9.00% | 0.25% | 1.00% | 1.00% | 0.00% | 28% | 36% | 29% | 38% | 28% | 36% | 28% | 36% | 32% | 42% | 28% | 28% | 29% | 29% |
| 5262 | 0.00% | 1.00% | 1.00% | 1.00% | 0.00% | 36% | 47% | 37% | 48% | 31% | 40% | 33% | 43% | 42% | 55% | 35% | 35% | 35% | 35% |
| 5263 | 0.25% | 1.00% | 1.00% | 1.00% | 0.00% | 38% | 49% | 38% | 49% | 33% | 43% | 34% | 44% | 43% | 56% | 36% | 36% | 37% | 37% |
| 5264 | 1.00% | 1.00% | 1.00% | 1.00% | 0.00% | 40% | 52% | 39% | 51% | 36% | 47% | 36% | 47% | 45% | 59% | 38% | 38% | 39% | 39% |
| 5265 | 9.00% | 1.00% | 1.00% | 1.00% | 0.00% | 36% | 47% | 37% | 48% | 31% | 40% | 33% | 43% | 42% | 55% | 35% | 35% | 35% | 35% |
| 5266 | 0.00% | 9.00% | 1.00% | 1.00% | 0.00% | 49% | 64% | 47% | 61% | 35% | 46% | 44% | 57% | 52% | 68% | 44% | 44% | 44% | 44% |
| 5267 | 0.25% | 9.00% | 1.00% | 1.00% | 0.00% | 51% | 66% | 48% | 62% | 37% | 48% | 45% | 59% | 53% | 69% | 45% | 45% | 45% | 45% |
| 5268 | 1.00% | 9.00% | 1.00% | 1.00% | 0.00% | 53% | 69% | 49% | 64% | 40% | 52% | 47% | 61% | 55% | 72% | 47% | 47% | 47% | 47% |
| 5269 | 0.25% | 0.25% | 9.00% | 1.00% | 0.00% | 40% | 52% | 35% | 46% | 35% | 46% | 40% | 52% | 43% | 56% | 37% | 37% | 39% | 39% |
| 5270 | 1.00% | 0.25% | 9.00% | 1.00% | 0.00% | 42% | 55% | 36% | 47% | 38% | 49% | 42% | 55% | 45% | 59% | 39% | 39% | 42% | 42% |
| 5271 | 9.00% | 0.25% | 9.00% | 1.00% | 0.00% | 38% | 49% | 34% | 44% | 33% | 43% | 39% | 51% | 42% | 55% | 35% | 35% | 38% | 38% |
| 5272 | 0.25% | 1.00% | 9.00% | 1.00% | 0.00% | 48% | 62% | 43% | 56% | 38% | 49% | 45% | 59% | 53% | 69% | 43% | 43% | 45% | 45% |
| 5273 | 0.00% | 0.25% | 0.00% | 9.00% | 0.00% | 32% | 42% | 29% | 38% | 28% | 36% | 32% | 42% | 33% | 43% | 30% | 30% | 31% | 31% |
| 5274 | 0.00% | 0.00% | 0.25% | 9.00% | 0.00% | 31% | 40% | 28% | 36% | 26% | 34% | 28% | 36% | 32% | 42% | 28% | 28% | 29% | 29% |
| 5275 | 0.25% | 0.00% | 0.25% | 9.00% | 0.00% | 33% | 43% | 29% | 38% | 28% | 36% | 29% | 38% | 33% | 43% | 30% | 30% | 30% | 30% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5276 | 0.00% | 0.25% | 0.25% | 9.00% | 0.00% | 36% | 47% | 35% | 46% | 32% | 42% | 35% | 46% | 38% | 49% | 34% | 34% | 35% | 35% |
| 5277 | 0.25% | 0.25% | 0.25% | 9.00% | 0.00% | 38% | 49% | 36% | 47% | 34% | 44% | 36% | 47% | 39% | 51% | 36% | 36% | 36% | 36% |
| 5278 | 1.00% | 0.25% | 0.25% | 9.00% | 0.00% | 40% | 52% | 37% | 48% | 37% | 48% | 38% | 49% | 41% | 53% | 38% | 38% | 39% | 39% |
| 5279 | 9.00% | 0.25% | 0.25% | 9.00% | 0.00% | 36% | 47% | 35% | 46% | 32% | 42% | 35% | 46% | 38% | 49% | 34% | 34% | 35% | 35% |
| 5280 | 0.00% | 1.00% | 0.25% | 9.00% | 0.00% | 44% | 57% | 43% | 56% | 35% | 46% | 40% | 52% | 48% | 62% | 41% | 41% | 41% | 41% |
| 5281 | 0.25% | 1.00% | 0.25% | 9.00% | 0.00% | 46% | 60% | 44% | 57% | 37% | 48% | 41% | 53% | 49% | 64% | 42% | 42% | 42% | 42% |
| 5282 | 1.00% | 1.00% | 0.25% | 9.00% | 0.00% | 48% | 62% | 45% | 59% | 40% | 52% | 43% | 56% | 51% | 66% | 44% | 44% | 45% | 45% |
| 5283 | 0.25% | 9.00% | 0.25% | 9.00% | 0.00% | 59% | 77% | 54% | 70% | 41% | 53% | 52% | 68% | 59% | 77% | 51% | 51% | 51% | 51% |
| 5284 | 0.25% | 0.00% | 1.00% | 9.00% | 0.00% | 38% | 49% | 32% | 42% | 34% | 44% | 35% | 46% | 37% | 48% | 35% | 35% | 35% | 35% |
| 5285 | 1.00% | 0.25% | 1.00% | 9.00% | 0.00% | 45% | 59% | 40% | 52% | 43% | 56% | 44% | 57% | 45% | 59% | 43% | 43% | 44% | 44% |
| 5286 | 9.00% | 0.25% | 1.00% | 9.00% | 0.00% | 41% | 53% | 38% | 49% | 38% | 49% | 41% | 53% | 42% | 55% | 39% | 39% | 40% | 40% |
| 5287 | 0.00% | 1.00% | 1.00% | 9.00% | 0.00% | 49% | 64% | 46% | 60% | 41% | 53% | 46% | 60% | 52% | 68% | 45% | 45% | 46% | 46% |
| 5288 | 0.25% | 1.00% | 1.00% | 9.00% | 0.00% | 51% | 66% | 47% | 61% | 43% | 56% | 47% | 61% | 53% | 69% | 47% | 47% | 48% | 48% |
| 5289 | 1.00% | 1.00% | 1.00% | 9.00% | 0.00% | 53% | 69% | 48% | 62% | 46% | 60% | 49% | 64% | 55% | 72% | 49% | 49% | 50% | 50% |
| 5290 | 0.25% | 0.25% | 9.00% | 9.00% | 0.00% | 53% | 69% | 44% | 57% | 45% | 59% | 53% | 69% | 53% | 69% | 47% | 47% | 50% | 50% |
| 5291 | 0.25% | 0.25% | 0.00% | 0.00% | 0.25% | 14% | 18% | 15% | 20% | 15% | 20% | 16% | 21% | 15% | 20% | 15% | 15% | 15% | 15% |
| 5292 | 1.00% | 0.25% | 0.00% | 0.00% | 0.25% | 16% | 21% | 16% | 21% | 18% | 23% | 18% | 23% | 17% | 22% | 17% | 17% | 18% | 18% |
| 5293 | 0.25% | 1.00% | 0.00% | 0.00% | 0.25% | 22% | 29% | 23% | 30% | 18% | 23% | 21% | 27% | 25% | 33% | 21% | 21% | 21% | 21% |
| 5294 | 1.00% | 1.00% | 0.00% | 0.00% | 0.25% | 24% | 31% | 24% | 31% | 21% | 27% | 23% | 30% | 27% | 35% | 23% | 23% | 24% | 24% |
| 5295 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 5296 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 5297 | 0.00% | 0.25% | 0.25% | 0.00% | 0.25% | 16% | 21% | 20% | 26% | 17% | 22% | 18% | 23% | 19% | 25% | 18% | 18% | 18% | 18% |
| 5298 | 0.25% | 0.25% | 0.25% | 0.00% | 0.25% | 18% | 23% | 21% | 27% | 19% | 25% | 19% | 25% | 20% | 26% | 19% | 19% | 19% | 19% |
| 5299 | 0.00% | 1.00% | 0.25% | 0.00% | 0.25% | 24% | 31% | 28% | 36% | 20% | 26% | 23% | 30% | 29% | 38% | 24% | 24% | 24% | 24% |
| 5300 | 1.00% | 1.00% | 0.25% | 0.00% | 0.25% | 28% | 36% | 30% | 39% | 25% | 33% | 26% | 34% | 32% | 42% | 28% | 28% | 28% | 28% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5301 | 1.00% | 9.00% | 0.25% | 0.00% | 0.25% | 41% | 53% | 40% | 52% | 29% | 38% | 37% | 48% | 42% | 55% | 37% | 37% | 36% | 36% |
| 5302 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 5303 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 5304 | 0.00% | 0.25% | 1.00% | 0.00% | 0.25% | 21% | 27% | 23% | 30% | 23% | 30% | 24% | 31% | 23% | 30% | 22% | 22% | 23% | 23% |
| 5305 | 1.00% | 0.25% | 1.00% | 0.00% | 0.25% | 25% | 33% | 25% | 33% | 28% | 36% | 27% | 35% | 26% | 34% | 26% | 26% | 27% | 27% |
| 5306 | 0.00% | 1.00% | 1.00% | 0.00% | 0.25% | 29% | 38% | 31% | 40% | 26% | 34% | 29% | 38% | 33% | 43% | 29% | 29% | 29% | 29% |
| 5307 | 0.25% | 1.00% | 1.00% | 0.00% | 0.25% | 31% | 40% | 32% | 42% | 28% | 36% | 30% | 39% | 34% | 44% | 30% | 30% | 31% | 31% |
| 5308 | 1.00% | 1.00% | 1.00% | 0.00% | 0.25% | 33% | 43% | 33% | 43% | 31% | 40% | 32% | 42% | 36% | 47% | 32% | 32% | 33% | 33% |
| 5309 | 9.00% | 1.00% | 1.00% | 0.00% | 0.25% | 29% | 38% | 31% | 40% | 26% | 34% | 29% | 38% | 33% | 43% | 29% | 29% | 29% | 29% |
| 5310 | 1.00% | 9.00% | 1.00% | 0.00% | 0.25% | 46% | 60% | 43% | 56% | 35% | 46% | 43% | 56% | 46% | 60% | 41% | 41% | 41% | 41% |
| 5311 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 5312 | 0.00% | 0.25% | 9.00% | 0.00% | 0.25% | 31% | 40% | 28% | 36% | 28% | 36% | 35% | 46% | 33% | 43% | 29% | 29% | 32% | 32% |
| 5313 | 0.25% | 0.25% | 9.00% | 0.00% | 0.25% | 33% | 43% | 29% | 38% | 30% | 39% | 36% | 47% | 34% | 44% | 31% | 31% | 33% | 33% |
| 5314 | 1.00% | 0.25% | 9.00% | 0.00% | 0.25% | 35% | 46% | 30% | 39% | 33% | 43% | 38% | 49% | 36% | 47% | 33% | 33% | 36% | 36% |
| 5315 | 0.25% | 1.00% | 9.00% | 0.00% | 0.25% | 41% | 53% | 37% | 48% | 33% | 43% | 41% | 53% | 44% | 57% | 37% | 37% | 39% | 39% |
| 5316 | 0.25% | 0.00% | 0.00% | 0.25% | 0.25% | 12% | 16% | 14% | 18% | 11% | 14% | 14% | 18% | 14% | 18% | 12% | 12% | 13% | 13% |
| 5317 | 1.00% | 0.00% | 0.00% | 0.25% | 0.25% | 14% | 18% | 15% | 20% | 14% | 18% | 16% | 21% | 16% | 21% | 14% | 14% | 15% | 15% |
| 5318 | 0.00% | 0.25% | 0.00% | 0.25% | 0.25% | 15% | 20% | 20% | 26% | 15% | 20% | 20% | 26% | 19% | 25% | 17% | 17% | 18% | 18% |
| 5319 | 0.25% | 0.25% | 0.00% | 0.25% | 0.25% | 17% | 22% | 21% | 27% | 17% | 22% | 21% | 27% | 20% | 26% | 18% | 18% | 19% | 19% |
| 5320 | 9.00% | 0.25% | 0.00% | 0.25% | 0.25% | 15% | 20% | 20% | 26% | 15% | 20% | 20% | 26% | 19% | 25% | 17% | 17% | 18% | 18% |
| 5321 | 1.00% | 1.00% | 0.00% | 0.25% | 0.25% | 27% | 35% | 30% | 39% | 23% | 30% | 28% | 36% | 32% | 42% | 27% | 27% | 28% | 28% |
| 5322 | 1.00% | 9.00% | 0.00% | 0.25% | 0.25% | 40% | 52% | 40% | 52% | 27% | 35% | 39% | 51% | 42% | 55% | 36% | 36% | 36% | 36% |
| 5323 | 0.00% | 0.00% | 0.25% | 0.25% | 0.25% | 14% | 18% | 19% | 25% | 13% | 17% | 16% | 21% | 18% | 23% | 15% | 15% | 16% | 16% |
| 5324 | 0.25% | 0.00% | 0.25% | 0.25% | 0.25% | 16% | 21% | 20% | 26% | 15% | 20% | 17% | 22% | 19% | 25% | 17% | 17% | 17% | 17% |
| 5325 | 0.00% | 0.25% | 0.25% | 0.25% | 0.25% | 19% | 25% | 26% | 34% | 19% | 25% | 23% | 30% | 24% | 31% | 21% | 21% | 22% | 22% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5326 | 0.25% | 0.25% | 0.25% | 0.25% | 0.25% | 21% | 27% | 27% | 35% | 21% | 27% | 24% | 31% | 25% | 33% | 23% | 23% | 23% | 23% |
| 5327 | 1.00% | 0.25% | 0.25% | 0.25% | 0.25% | 23% | 30% | 28% | 36% | 24% | 31% | 26% | 34% | 27% | 35% | 25% | 25% | 26% | 26% |
| 5328 | 9.00% | 0.25% | 0.25% | 0.25% | 0.25% | 19% | 25% | 26% | 34% | 19% | 25% | 23% | 30% | 24% | 31% | 21% | 21% | 22% | 22% |
| 5329 | 0.25% | 1.00% | 0.25% | 0.25% | 0.25% | 29% | 38% | 35% | 46% | 24% | 31% | 29% | 38% | 35% | 46% | 29% | 29% | 29% | 29% |
| 5330 | 9.00% | 1.00% | 0.25% | 0.25% | 0.25% | 27% | 35% | 34% | 44% | 22% | 29% | 28% | 36% | 34% | 44% | 28% | 28% | 28% | 28% |
| 5331 | 0.25% | 9.00% | 0.25% | 0.25% | 0.25% | 42% | 55% | 45% | 59% | 28% | 36% | 40% | 52% | 45% | 59% | 38% | 38% | 38% | 38% |
| 5332 | 1.00% | 9.00% | 0.25% | 0.25% | 0.25% | 44% | 57% | 46% | 60% | 31% | 40% | 42% | 55% | 47% | 61% | 40% | 40% | 40% | 40% |
| 5333 | 9.00% | 9.00% | 0.25% | 0.25% | 0.25% | 40% | 52% | 44% | 57% | 26% | 34% | 39% | 51% | 44% | 57% | 37% | 37% | 36% | 36% |
| 5334 | 0.00% | 0.00% | 1.00% | 0.25% | 0.25% | 19% | 25% | 22% | 29% | 19% | 25% | 22% | 29% | 22% | 29% | 20% | 20% | 21% | 21% |
| 5335 | 1.00% | 0.00% | 1.00% | 0.25% | 0.25% | 23% | 30% | 24% | 31% | 24% | 31% | 25% | 33% | 25% | 33% | 24% | 24% | 25% | 25% |
| 5336 | 0.00% | 0.25% | 1.00% | 0.25% | 0.25% | 24% | 31% | 29% | 38% | 25% | 33% | 29% | 38% | 28% | 36% | 26% | 26% | 27% | 27% |
| 5337 | 0.25% | 0.25% | 1.00% | 0.25% | 0.25% | 26% | 34% | 30% | 39% | 27% | 35% | 30% | 39% | 29% | 38% | 28% | 28% | 29% | 29% |
| 5338 | 1.00% | 0.25% | 1.00% | 0.25% | 0.25% | 28% | 36% | 31% | 40% | 30% | 39% | 32% | 42% | 31% | 40% | 30% | 30% | 31% | 31% |
| 5339 | 9.00% | 0.25% | 1.00% | 0.25% | 0.25% | 24% | 31% | 29% | 38% | 25% | 33% | 29% | 38% | 28% | 36% | 26% | 26% | 27% | 27% |
| 5340 | 0.00% | 1.00% | 1.00% | 0.25% | 0.25% | 32% | 42% | 37% | 48% | 28% | 36% | 34% | 44% | 38% | 49% | 32% | 32% | 33% | 33% |
| 5341 | 0.25% | 1.00% | 1.00% | 0.25% | 0.25% | 34% | 44% | 38% | 49% | 30% | 39% | 35% | 46% | 39% | 51% | 34% | 34% | 35% | 35% |
| 5342 | 1.00% | 1.00% | 1.00% | 0.25% | 0.25% | 36% | 47% | 39% | 51% | 33% | 43% | 37% | 48% | 41% | 53% | 36% | 36% | 37% | 37% |
| 5343 | 9.00% | 1.00% | 1.00% | 0.25% | 0.25% | 32% | 42% | 37% | 48% | 28% | 36% | 34% | 44% | 38% | 49% | 32% | 32% | 33% | 33% |
| 5344 | 0.00% | 9.00% | 1.00% | 0.25% | 0.25% | 45% | 59% | 47% | 61% | 32% | 42% | 45% | 59% | 48% | 62% | 41% | 41% | 42% | 42% |
| 5345 | 0.25% | 9.00% | 1.00% | 0.25% | 0.25% | 47% | 61% | 48% | 62% | 34% | 44% | 46% | 60% | 49% | 64% | 43% | 43% | 43% | 43% |
| 5346 | 1.00% | 9.00% | 1.00% | 0.25% | 0.25% | 49% | 64% | 49% | 64% | 37% | 48% | 48% | 62% | 51% | 66% | 45% | 45% | 45% | 45% |
| 5347 | 0.25% | 0.25% | 9.00% | 0.25% | 0.25% | 36% | 47% | 35% | 46% | 32% | 42% | 41% | 53% | 39% | 51% | 34% | 34% | 37% | 37% |
| 5348 | 1.00% | 0.25% | 9.00% | 0.25% | 0.25% | 38% | 49% | 36% | 47% | 35% | 46% | 43% | 56% | 41% | 53% | 36% | 36% | 40% | 40% |
| 5349 | 9.00% | 0.25% | 9.00% | 0.25% | 0.25% | 34% | 44% | 34% | 44% | 30% | 39% | 40% | 52% | 38% | 49% | 33% | 33% | 36% | 36% |
| 5350 | 0.00% | 1.00% | 9.00% | 0.25% | 0.25% | 42% | 55% | 42% | 55% | 33% | 43% | 45% | 59% | 48% | 62% | 39% | 39% | 42% | 42% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5351 | 0.25% | 1.00% | 9.00% | 0.25% | 0.25% | 44% | 57% | 43% | 56% | 35% | 46% | 46% | 60% | 49% | 64% | 41% | 41% | 43% | 43% |
| 5352 | 9.00% | 1.00% | 9.00% | 0.25% | 0.25% | 42% | 55% | 42% | 55% | 33% | 43% | 45% | 59% | 48% | 62% | 39% | 39% | 42% | 42% |
| 5353 | 1.00% | 9.00% | 9.00% | 0.25% | 0.25% | 59% | 77% | 54% | 70% | 42% | 55% | 59% | 77% | 61% | 79% | 52% | 52% | 54% | 54% |
| 5354 | 0.25% | 0.00% | 0.00% | 1.00% | 0.25% | 23% | 30% | 21% | 27% | 21% | 27% | 21% | 27% | 26% | 34% | 22% | 22% | 23% | 23% |
| 5355 | 1.00% | 0.25% | 0.00% | 1.00% | 0.25% | 30% | 39% | 29% | 38% | 30% | 39% | 30% | 39% | 34% | 44% | 30% | 30% | 31% | 31% |
| 5356 | 0.00% | 1.00% | 0.00% | 1.00% | 0.25% | 34% | 44% | 35% | 46% | 28% | 36% | 32% | 42% | 41% | 53% | 32% | 32% | 34% | 34% |
| 5357 | 0.25% | 1.00% | 0.00% | 1.00% | 0.25% | 36% | 47% | 36% | 47% | 30% | 39% | 33% | 43% | 42% | 55% | 34% | 34% | 35% | 35% |
| 5358 | 1.00% | 1.00% | 0.00% | 1.00% | 0.25% | 38% | 49% | 37% | 48% | 33% | 43% | 35% | 46% | 44% | 57% | 36% | 36% | 37% | 37% |
| 5359 | 0.00% | 0.00% | 0.25% | 1.00% | 0.25% | 25% | 33% | 26% | 34% | 23% | 30% | 23% | 30% | 30% | 39% | 25% | 25% | 25% | 25% |
| 5360 | 1.00% | 0.00% | 0.25% | 1.00% | 0.25% | 29% | 38% | 28% | 36% | 28% | 36% | 26% | 34% | 33% | 43% | 28% | 28% | 29% | 29% |
| 5361 | 0.25% | 0.25% | 0.25% | 1.00% | 0.25% | 32% | 42% | 34% | 44% | 31% | 40% | 31% | 40% | 37% | 48% | 32% | 32% | 33% | 33% |
| 5362 | 1.00% | 0.25% | 0.25% | 1.00% | 0.25% | 34% | 44% | 35% | 46% | 34% | 44% | 33% | 43% | 39% | 51% | 34% | 34% | 35% | 35% |
| 5363 | 9.00% | 0.25% | 0.25% | 1.00% | 0.25% | 30% | 39% | 33% | 43% | 29% | 38% | 30% | 39% | 36% | 47% | 31% | 31% | 32% | 32% |
| 5364 | 0.00% | 1.00% | 0.25% | 1.00% | 0.25% | 38% | 49% | 41% | 53% | 32% | 42% | 35% | 46% | 46% | 60% | 37% | 37% | 38% | 38% |
| 5365 | 0.25% | 1.00% | 0.25% | 1.00% | 0.25% | 40% | 52% | 42% | 55% | 34% | 44% | 36% | 47% | 47% | 61% | 39% | 39% | 39% | 39% |
| 5366 | 1.00% | 1.00% | 0.25% | 1.00% | 0.25% | 42% | 55% | 43% | 56% | 37% | 48% | 38% | 49% | 49% | 64% | 41% | 41% | 41% | 41% |
| 5367 | 9.00% | 1.00% | 0.25% | 1.00% | 0.25% | 38% | 49% | 41% | 53% | 32% | 42% | 35% | 46% | 46% | 60% | 37% | 37% | 38% | 38% |
| 5368 | 0.25% | 9.00% | 0.25% | 1.00% | 0.25% | 53% | 69% | 52% | 68% | 38% | 49% | 47% | 61% | 57% | 74% | 48% | 48% | 47% | 47% |
| 5369 | 1.00% | 9.00% | 0.25% | 1.00% | 0.25% | 55% | 72% | 53% | 69% | 41% | 53% | 49% | 64% | 59% | 77% | 50% | 50% | 50% | 50% |
| 5370 | 9.00% | 9.00% | 0.25% | 1.00% | 0.25% | 51% | 66% | 51% | 66% | 36% | 47% | 46% | 60% | 56% | 73% | 46% | 46% | 46% | 46% |
| 5371 | 0.00% | 0.00% | 1.00% | 1.00% | 0.25% | 30% | 39% | 29% | 38% | 29% | 38% | 29% | 38% | 34% | 44% | 29% | 29% | 31% | 31% |
| 5372 | 0.25% | 0.00% | 1.00% | 1.00% | 0.25% | 32% | 42% | 30% | 39% | 31% | 40% | 30% | 39% | 35% | 46% | 31% | 31% | 32% | 32% |
| 5373 | 1.00% | 0.00% | 1.00% | 1.00% | 0.25% | 34% | 44% | 31% | 40% | 34% | 44% | 32% | 42% | 37% | 48% | 33% | 33% | 34% | 34% |
| 5374 | 0.00% | 0.25% | 1.00% | 1.00% | 0.25% | 35% | 46% | 36% | 47% | 35% | 46% | 36% | 47% | 40% | 52% | 35% | 35% | 37% | 37% |
| 5375 | 1.00% | 0.25% | 1.00% | 1.00% | 0.25% | 39% | 51% | 38% | 49% | 40% | 52% | 39% | 51% | 43% | 56% | 39% | 39% | 41% | 41% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5376 | 9.00% | 0.25% | 1.00% | 1.00% | 0.25% | 35% | 46% | 36% | 47% | 35% | 46% | 36% | 47% | 40% | 52% | 35% | 35% | 37% | 37% |
| 5377 | 0.00% | 1.00% | 1.00% | 1.00% | 0.25% | 43% | 56% | 44% | 57% | 38% | 49% | 41% | 53% | 50% | 65% | 42% | 42% | 43% | 43% |
| 5378 | 0.25% | 1.00% | 1.00% | 1.00% | 0.25% | 45% | 59% | 45% | 59% | 40% | 52% | 42% | 55% | 51% | 66% | 43% | 43% | 44% | 44% |
| 5379 | 1.00% | 1.00% | 1.00% | 1.00% | 0.25% | 47% | 61% | 46% | 60% | 43% | 56% | 44% | 57% | 53% | 69% | 45% | 45% | 47% | 47% |
| 5380 | 9.00% | 1.00% | 1.00% | 1.00% | 0.25% | 43% | 56% | 44% | 57% | 38% | 49% | 41% | 53% | 50% | 65% | 42% | 42% | 43% | 43% |
| 5381 | 0.00% | 9.00% | 1.00% | 1.00% | 0.25% | 56% | 73% | 54% | 70% | 42% | 55% | 52% | 68% | 60% | 78% | 51% | 51% | 51% | 51% |
| 5382 | 0.25% | 9.00% | 1.00% | 1.00% | 0.25% | 58% | 75% | 55% | 72% | 44% | 57% | 53% | 69% | 61% | 79% | 52% | 52% | 53% | 53% |
| 5383 | 1.00% | 9.00% | 1.00% | 1.00% | 0.25% | 60% | 78% | 56% | 73% | 47% | 61% | 55% | 72% | 63% | 82% | 54% | 54% | 55% | 55% |
| 5384 | 0.25% | 0.25% | 9.00% | 1.00% | 0.25% | 47% | 61% | 42% | 55% | 42% | 55% | 48% | 62% | 51% | 66% | 44% | 44% | 47% | 47% |
| 5385 | 1.00% | 0.25% | 9.00% | 1.00% | 0.25% | 49% | 64% | 43% | 56% | 45% | 59% | 50% | 65% | 53% | 69% | 46% | 46% | 49% | 49% |
| 5386 | 9.00% | 0.25% | 9.00% | 1.00% | 0.25% | 45% | 59% | 41% | 53% | 40% | 52% | 47% | 61% | 50% | 65% | 42% | 42% | 46% | 46% |
| 5387 | 0.25% | 1.00% | 9.00% | 1.00% | 0.25% | 55% | 72% | 50% | 65% | 45% | 59% | 53% | 69% | 61% | 79% | 50% | 50% | 53% | 53% |
| 5388 | 0.00% | 0.25% | 0.00% | 9.00% | 0.25% | 39% | 51% | 36% | 47% | 35% | 46% | 40% | 52% | 41% | 53% | 37% | 37% | 39% | 39% |
| 5389 | 0.00% | 0.00% | 0.25% | 9.00% | 0.25% | 38% | 49% | 35% | 46% | 33% | 43% | 36% | 47% | 40% | 52% | 35% | 35% | 36% | 36% |
| 5390 | 0.25% | 0.00% | 0.25% | 9.00% | 0.25% | 40% | 52% | 36% | 47% | 35% | 46% | 37% | 48% | 41% | 53% | 37% | 37% | 38% | 38% |
| 5391 | 0.00% | 0.25% | 0.25% | 9.00% | 0.25% | 43% | 56% | 42% | 55% | 39% | 51% | 43% | 56% | 46% | 60% | 41% | 41% | 43% | 43% |
| 5392 | 0.25% | 0.25% | 0.25% | 9.00% | 0.25% | 45% | 59% | 43% | 56% | 41% | 53% | 44% | 57% | 47% | 61% | 43% | 43% | 44% | 44% |
| 5393 | 1.00% | 0.25% | 0.25% | 9.00% | 0.25% | 47% | 61% | 44% | 57% | 44% | 57% | 46% | 60% | 49% | 64% | 45% | 45% | 46% | 46% |
| 5394 | 9.00% | 0.25% | 0.25% | 9.00% | 0.25% | 43% | 56% | 42% | 55% | 39% | 51% | 43% | 56% | 46% | 60% | 41% | 41% | 43% | 43% |
| 5395 | 0.00% | 1.00% | 0.25% | 9.00% | 0.25% | 51% | 66% | 50% | 65% | 42% | 55% | 48% | 62% | 56% | 73% | 48% | 48% | 49% | 49% |
| 5396 | 0.25% | 1.00% | 0.25% | 9.00% | 0.25% | 53% | 69% | 51% | 66% | 44% | 57% | 49% | 64% | 57% | 74% | 49% | 49% | 50% | 50% |
| 5397 | 1.00% | 1.00% | 0.25% | 9.00% | 0.25% | 55% | 72% | 52% | 68% | 47% | 61% | 51% | 66% | 59% | 77% | 51% | 51% | 52% | 52% |
| 5398 | 0.25% | 9.00% | 0.25% | 9.00% | 0.25% | 66% | 86% | 61% | 79% | 48% | 62% | 60% | 78% | 67% | 87% | 58% | 58% | 58% | 58% |
| 5399 | 0.25% | 0.00% | 1.00% | 9.00% | 0.25% | 45% | 59% | 39% | 51% | 41% | 53% | 43% | 56% | 45% | 59% | 42% | 42% | 43% | 43% |
| 5400 | 1.00% | 0.25% | 1.00% | 9.00% | 0.25% | 52% | 68% | 47% | 61% | 50% | 65% | 52% | 68% | 53% | 69% | 50% | 50% | 52% | 52% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5401 | 9.00% | 0.25% | 1.00% | 9.00% | 0.25% | 48% | 62% | 45% | 59% | 45% | 59% | 49% | 64% | 50% | 65% | 46% | 46% | 48% | 48% |
| 5402 | 0.00% | 1.00% | 1.00% | 9.00% | 0.25% | 56% | 73% | 53% | 69% | 48% | 62% | 54% | 70% | 60% | 78% | 52% | 52% | 54% | 54% |
| 5403 | 0.25% | 1.00% | 1.00% | 9.00% | 0.25% | 58% | 75% | 54% | 70% | 50% | 65% | 55% | 72% | 61% | 79% | 54% | 54% | 55% | 55% |
| 5404 | 1.00% | 1.00% | 1.00% | 9.00% | 0.25% | 60% | 78% | 55% | 72% | 53% | 69% | 57% | 74% | 63% | 82% | 56% | 56% | 58% | 58% |
| 5405 | 0.25% | 0.25% | 9.00% | 9.00% | 0.25% | 60% | 78% | 51% | 66% | 52% | 68% | 61% | 79% | 61% | 79% | 54% | 54% | 58% | 58% |
| 5406 | 0.25% | 0.25% | 0.00% | 0.00% | 1.00% | 22% | 29% | 24% | 31% | 24% | 31% | 22% | 29% | 26% | 34% | 23% | 23% | 24% | 24% |
| 5407 | 1.00% | 0.25% | 0.00% | 0.00% | 1.00% | 24% | 31% | 25% | 33% | 27% | 35% | 24% | 31% | 28% | 36% | 25% | 25% | 26% | 26% |
| 5408 | 0.25% | 1.00% | 0.00% | 0.00% | 1.00% | 30% | 39% | 32% | 42% | 27% | 35% | 27% | 35% | 36% | 47% | 30% | 30% | 30% | 30% |
| 5409 | 1.00% | 1.00% | 0.00% | 0.00% | 1.00% | 32% | 42% | 33% | 43% | 30% | 39% | 29% | 38% | 38% | 49% | 32% | 32% | 32% | 32% |
| 5410 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 5411 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 5412 | 0.00% | 0.25% | 0.25% | 0.00% | 1.00% | 24% | 31% | 29% | 38% | 26% | 34% | 24% | 31% | 30% | 39% | 26% | 26% | 27% | 27% |
| 5413 | 0.25% | 0.25% | 0.25% | 0.00% | 1.00% | 26% | 34% | 30% | 39% | 28% | 36% | 25% | 33% | 31% | 40% | 28% | 28% | 28% | 28% |
| 5414 | 0.00% | 1.00% | 0.25% | 0.00% | 1.00% | 32% | 42% | 37% | 48% | 29% | 38% | 29% | 38% | 40% | 52% | 33% | 33% | 33% | 33% |
| 5415 | 1.00% | 1.00% | 0.25% | 0.00% | 1.00% | 36% | 47% | 39% | 51% | 34% | 44% | 32% | 42% | 43% | 56% | 36% | 36% | 36% | 36% |
| 5416 | 1.00% | 9.00% | 0.25% | 0.00% | 1.00% | 49% | 64% | 49% | 64% | 38% | 49% | 43% | 56% | 53% | 69% | 45% | 45% | 45% | 45% |
| 5417 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 5418 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 5419 | 0.00% | 0.25% | 1.00% | 0.00% | 1.00% | 29% | 38% | 32% | 42% | 32% | 42% | 30% | 39% | 34% | 44% | 31% | 31% | 32% | 32% |
| 5420 | 1.00% | 0.25% | 1.00% | 0.00% | 1.00% | 33% | 43% | 34% | 44% | 37% | 48% | 33% | 43% | 37% | 48% | 35% | 35% | 36% | 36% |
| 5421 | 0.00% | 1.00% | 1.00% | 0.00% | 1.00% | 37% | 48% | 40% | 52% | 35% | 46% | 35% | 46% | 44% | 57% | 37% | 37% | 38% | 38% |
| 5422 | 0.25% | 1.00% | 1.00% | 0.00% | 1.00% | 39% | 51% | 41% | 53% | 37% | 48% | 36% | 47% | 45% | 59% | 39% | 39% | 39% | 39% |
| 5423 | 1.00% | 1.00% | 1.00% | 0.00% | 1.00% | 41% | 53% | 42% | 55% | 40% | 52% | 38% | 49% | 47% | 61% | 41% | 41% | 42% | 42% |
| 5424 | 9.00% | 1.00% | 1.00% | 0.00% | 1.00% | 37% | 48% | 40% | 52% | 35% | 46% | 35% | 46% | 44% | 57% | 37% | 37% | 38% | 38% |
| 5425 | 1.00% | 9.00% | 1.00% | 0.00% | 1.00% | 54% | 70% | 52% | 68% | 44% | 57% | 49% | 64% | 57% | 74% | 50% | 50% | 50% | 50% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5426 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 5427 | 0.00% | 0.25% | 9.00% | 0.00% | 1.00% | 39% | 51% | 37% | 48% | 37% | 48% | 41% | 53% | 44% | 57% | 38% | 38% | 41% | 41% |
| 5428 | 0.25% | 0.25% | 9.00% | 0.00% | 1.00% | 41% | 53% | 38% | 49% | 39% | 51% | 42% | 55% | 45% | 59% | 39% | 39% | 42% | 42% |
| 5429 | 1.00% | 0.25% | 9.00% | 0.00% | 1.00% | 43% | 56% | 39% | 51% | 42% | 55% | 44% | 57% | 47% | 61% | 41% | 41% | 44% | 44% |
| 5430 | 0.25% | 1.00% | 9.00% | 0.00% | 1.00% | 49% | 64% | 46% | 60% | 42% | 55% | 47% | 61% | 55% | 72% | 46% | 46% | 48% | 48% |
| 5431 | 0.25% | 0.00% | 0.00% | 0.25% | 1.00% | 20% | 26% | 23% | 30% | 20% | 26% | 20% | 26% | 25% | 33% | 21% | 21% | 22% | 22% |
| 5432 | 1.00% | 0.00% | 0.00% | 0.25% | 1.00% | 22% | 29% | 24% | 31% | 23% | 30% | 22% | 29% | 27% | 35% | 23% | 23% | 24% | 24% |
| 5433 | 0.00% | 0.25% | 0.00% | 0.25% | 1.00% | 23% | 30% | 29% | 38% | 24% | 31% | 26% | 34% | 30% | 39% | 25% | 25% | 27% | 27% |
| 5434 | 0.25% | 0.25% | 0.00% | 0.25% | 1.00% | 25% | 33% | 30% | 39% | 26% | 34% | 27% | 35% | 31% | 40% | 27% | 27% | 28% | 28% |
| 5435 | 9.00% | 0.25% | 0.00% | 0.25% | 1.00% | 23% | 30% | 29% | 38% | 24% | 31% | 26% | 34% | 30% | 39% | 25% | 25% | 27% | 27% |
| 5436 | 1.00% | 1.00% | 0.00% | 0.25% | 1.00% | 35% | 46% | 39% | 51% | 32% | 42% | 34% | 44% | 43% | 56% | 35% | 35% | 36% | 36% |
| 5437 | 1.00% | 9.00% | 0.00% | 0.25% | 1.00% | 48% | 62% | 49% | 64% | 36% | 47% | 45% | 59% | 53% | 69% | 44% | 44% | 45% | 45% |
| 5438 | 0.00% | 0.00% | 0.25% | 0.25% | 1.00% | 22% | 29% | 28% | 36% | 22% | 29% | 22% | 29% | 29% | 38% | 24% | 24% | 24% | 24% |
| 5439 | 0.25% | 0.00% | 0.25% | 0.25% | 1.00% | 24% | 31% | 29% | 38% | 24% | 31% | 23% | 30% | 30% | 39% | 26% | 26% | 26% | 26% |
| 5440 | 0.00% | 0.25% | 0.25% | 0.25% | 1.00% | 27% | 35% | 35% | 46% | 28% | 36% | 29% | 38% | 35% | 46% | 30% | 30% | 31% | 31% |
| 5441 | 0.25% | 0.25% | 0.25% | 0.25% | 1.00% | 29% | 38% | 36% | 47% | 30% | 39% | 30% | 39% | 36% | 47% | 32% | 32% | 32% | 32% |
| 5442 | 1.00% | 0.25% | 0.25% | 0.25% | 1.00% | 31% | 40% | 37% | 48% | 33% | 43% | 32% | 42% | 38% | 49% | 34% | 34% | 34% | 34% |
| 5443 | 9.00% | 0.25% | 0.25% | 0.25% | 1.00% | 27% | 35% | 35% | 46% | 28% | 36% | 29% | 38% | 35% | 46% | 30% | 30% | 31% | 31% |
| 5444 | 0.25% | 1.00% | 0.25% | 0.25% | 1.00% | 37% | 48% | 44% | 57% | 33% | 43% | 35% | 46% | 46% | 60% | 38% | 38% | 38% | 38% |
| 5445 | 9.00% | 1.00% | 0.25% | 0.25% | 1.00% | 35% | 46% | 43% | 56% | 31% | 40% | 34% | 44% | 45% | 59% | 36% | 36% | 37% | 37% |
| 5446 | 0.25% | 9.00% | 0.25% | 0.25% | 1.00% | 50% | 65% | 54% | 70% | 37% | 48% | 46% | 60% | 56% | 73% | 47% | 47% | 46% | 46% |
| 5447 | 1.00% | 9.00% | 0.25% | 0.25% | 1.00% | 52% | 68% | 55% | 72% | 40% | 52% | 48% | 62% | 58% | 75% | 49% | 49% | 49% | 49% |
| 5448 | 9.00% | 9.00% | 0.25% | 0.25% | 1.00% | 48% | 62% | 53% | 69% | 35% | 46% | 45% | 59% | 55% | 72% | 45% | 45% | 45% | 45% |
| 5449 | 0.00% | 0.00% | 1.00% | 0.25% | 1.00% | 27% | 35% | 31% | 40% | 28% | 36% | 28% | 36% | 33% | 43% | 29% | 29% | 30% | 30% |
| 5450 | 1.00% | 0.00% | 1.00% | 0.25% | 1.00% | 31% | 40% | 33% | 43% | 33% | 43% | 31% | 40% | 36% | 47% | 32% | 32% | 33% | 33% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5451 | 0.00% | 0.25% | 1.00% | 0.25% | 1.00% | 32% | 42% | 38% | 49% | 34% | 44% | 35% | 46% | 39% | 51% | 35% | 35% | 36% | 36% |
| 5452 | 0.25% | 0.25% | 1.00% | 0.25% | 1.00% | 34% | 44% | 39% | 51% | 36% | 47% | 36% | 47% | 40% | 52% | 36% | 36% | 37% | 37% |
| 5453 | 1.00% | 0.25% | 1.00% | 0.25% | 1.00% | 36% | 47% | 40% | 52% | 39% | 51% | 38% | 49% | 42% | 55% | 38% | 38% | 40% | 40% |
| 5454 | 9.00% | 0.25% | 1.00% | 0.25% | 1.00% | 32% | 42% | 38% | 49% | 34% | 44% | 35% | 46% | 39% | 51% | 35% | 35% | 36% | 36% |
| 5455 | 0.00% | 1.00% | 1.00% | 0.25% | 1.00% | 40% | 52% | 46% | 60% | 37% | 48% | 40% | 52% | 49% | 64% | 41% | 41% | 42% | 42% |
| 5456 | 0.25% | 1.00% | 1.00% | 0.25% | 1.00% | 42% | 55% | 47% | 61% | 39% | 51% | 41% | 53% | 50% | 65% | 43% | 43% | 43% | 43% |
| 5457 | 1.00% | 1.00% | 1.00% | 0.25% | 1.00% | 44% | 57% | 48% | 62% | 42% | 55% | 43% | 56% | 52% | 68% | 45% | 45% | 46% | 46% |
| 5458 | 9.00% | 1.00% | 1.00% | 0.25% | 1.00% | 40% | 52% | 46% | 60% | 37% | 48% | 40% | 52% | 49% | 64% | 41% | 41% | 42% | 42% |
| 5459 | 0.00% | 9.00% | 1.00% | 0.25% | 1.00% | 53% | 69% | 56% | 73% | 41% | 53% | 51% | 66% | 59% | 77% | 50% | 50% | 50% | 50% |
| 5460 | 0.25% | 9.00% | 1.00% | 0.25% | 1.00% | 55% | 72% | 57% | 74% | 43% | 56% | 52% | 68% | 60% | 78% | 52% | 52% | 52% | 52% |
| 5461 | 1.00% | 9.00% | 1.00% | 0.25% | 1.00% | 57% | 74% | 58% | 75% | 46% | 60% | 54% | 70% | 62% | 81% | 54% | 54% | 54% | 54% |
| 5462 | 0.25% | 0.25% | 9.00% | 0.25% | 1.00% | 44% | 57% | 44% | 57% | 41% | 53% | 47% | 61% | 50% | 65% | 43% | 43% | 46% | 46% |
| 5463 | 1.00% | 0.25% | 9.00% | 0.25% | 1.00% | 46% | 60% | 45% | 59% | 44% | 57% | 49% | 64% | 52% | 68% | 45% | 45% | 48% | 48% |
| 5464 | 9.00% | 0.25% | 9.00% | 0.25% | 1.00% | 42% | 55% | 43% | 56% | 39% | 51% | 46% | 60% | 49% | 64% | 41% | 41% | 45% | 45% |
| 5465 | 0.00% | 1.00% | 9.00% | 0.25% | 1.00% | 50% | 65% | 51% | 66% | 42% | 55% | 51% | 66% | 59% | 77% | 48% | 48% | 51% | 51% |
| 5466 | 0.25% | 1.00% | 9.00% | 0.25% | 1.00% | 52% | 68% | 52% | 68% | 44% | 57% | 52% | 68% | 60% | 78% | 49% | 49% | 52% | 52% |
| 5467 | 9.00% | 1.00% | 9.00% | 0.25% | 1.00% | 50% | 65% | 51% | 66% | 42% | 55% | 51% | 66% | 59% | 77% | 48% | 48% | 51% | 51% |
| 5468 | 1.00% | 9.00% | 9.00% | 0.25% | 1.00% | 67% | 87% | 63% | 82% | 51% | 66% | 65% | 85% | 72% | 94% | 60% | 60% | 63% | 63% |
| 5469 | 0.25% | 0.00% | 0.00% | 1.00% | 1.00% | 31% | 40% | 30% | 39% | 30% | 39% | 27% | 35% | 37% | 48% | 30% | 30% | 31% | 31% |
| 5470 | 1.00% | 0.25% | 0.00% | 1.00% | 1.00% | 38% | 49% | 38% | 49% | 39% | 51% | 36% | 47% | 45% | 59% | 38% | 38% | 40% | 40% |
| 5471 | 0.00% | 1.00% | 0.00% | 1.00% | 1.00% | 42% | 55% | 44% | 57% | 37% | 48% | 38% | 49% | 52% | 68% | 41% | 41% | 42% | 42% |
| 5472 | 0.25% | 1.00% | 0.00% | 1.00% | 1.00% | 44% | 57% | 45% | 59% | 39% | 51% | 39% | 51% | 53% | 69% | 43% | 43% | 44% | 44% |
| 5473 | 1.00% | 1.00% | 0.00% | 1.00% | 1.00% | 46% | 60% | 46% | 60% | 42% | 55% | 41% | 53% | 55% | 72% | 45% | 45% | 46% | 46% |
| 5474 | 0.00% | 0.00% | 0.25% | 1.00% | 1.00% | 33% | 43% | 35% | 46% | 32% | 42% | 29% | 38% | 41% | 53% | 33% | 33% | 34% | 34% |
| 5475 | 1.00% | 0.00% | 0.25% | 1.00% | 1.00% | 37% | 48% | 37% | 48% | 37% | 48% | 32% | 42% | 44% | 57% | 37% | 37% | 38% | 38% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5476 | 0.25% | 0.25% | 0.25% | 1.00% | 1.00% | 40% | 52% | 43% | 56% | 40% | 52% | 37% | 48% | 48% | 62% | 41% | 41% | 42% | 42% |
| 5477 | 1.00% | 0.25% | 0.25% | 1.00% | 1.00% | 42% | 55% | 44% | 57% | 43% | 56% | 39% | 51% | 50% | 65% | 43% | 43% | 44% | 44% |
| 5478 | 9.00% | 0.25% | 0.25% | 1.00% | 1.00% | 38% | 49% | 42% | 55% | 38% | 49% | 36% | 47% | 47% | 61% | 39% | 39% | 40% | 40% |
| 5479 | 0.00% | 1.00% | 0.25% | 1.00% | 1.00% | 46% | 60% | 50% | 65% | 41% | 53% | 41% | 53% | 57% | 74% | 46% | 46% | 46% | 46% |
| 5480 | 0.25% | 1.00% | 0.25% | 1.00% | 1.00% | 48% | 62% | 51% | 66% | 43% | 56% | 42% | 55% | 58% | 75% | 47% | 47% | 48% | 48% |
| 5481 | 1.00% | 1.00% | 0.25% | 1.00% | 1.00% | 50% | 65% | 52% | 68% | 46% | 60% | 44% | 57% | 60% | 78% | 49% | 49% | 50% | 50% |
| 5482 | 9.00% | 1.00% | 0.25% | 1.00% | 1.00% | 46% | 60% | 50% | 65% | 41% | 53% | 41% | 53% | 57% | 74% | 46% | 46% | 46% | 46% |
| 5483 | 0.25% | 9.00% | 0.25% | 1.00% | 1.00% | 61% | 79% | 61% | 79% | 47% | 61% | 53% | 69% | 68% | 88% | 56% | 56% | 56% | 56% |
| 5484 | 1.00% | 9.00% | 0.25% | 1.00% | 1.00% | 63% | 82% | 62% | 81% | 50% | 65% | 55% | 72% | 70% | 91% | 58% | 58% | 58% | 58% |
| 5485 | 9.00% | 9.00% | 0.25% | 1.00% | 1.00% | 59% | 77% | 60% | 78% | 45% | 59% | 52% | 68% | 67% | 87% | 55% | 55% | 55% | 55% |
| 5486 | 0.00% | 0.00% | 1.00% | 1.00% | 1.00% | 38% | 49% | 38% | 49% | 38% | 49% | 35% | 46% | 45% | 59% | 38% | 38% | 39% | 39% |
| 5487 | 0.25% | 0.00% | 1.00% | 1.00% | 1.00% | 40% | 52% | 39% | 51% | 40% | 52% | 36% | 47% | 46% | 60% | 40% | 40% | 41% | 41% |
| 5488 | 1.00% | 0.00% | 1.00% | 1.00% | 1.00% | 42% | 55% | 40% | 52% | 43% | 56% | 38% | 49% | 48% | 62% | 42% | 42% | 43% | 43% |
| 5489 | 0.00% | 0.25% | 1.00% | 1.00% | 1.00% | 43% | 56% | 45% | 59% | 44% | 57% | 42% | 55% | 51% | 66% | 44% | 44% | 46% | 46% |
| 5490 | 1.00% | 0.25% | 1.00% | 1.00% | 1.00% | 47% | 61% | 47% | 61% | 49% | 64% | 45% | 59% | 54% | 70% | 48% | 48% | 49% | 49% |
| 5491 | 9.00% | 0.25% | 1.00% | 1.00% | 1.00% | 43% | 56% | 45% | 59% | 44% | 57% | 42% | 55% | 51% | 66% | 44% | 44% | 46% | 46% |
| 5492 | 0.00% | 1.00% | 1.00% | 1.00% | 1.00% | 51% | 66% | 53% | 69% | 47% | 61% | 47% | 61% | 61% | 79% | 50% | 50% | 52% | 52% |
| 5493 | 0.25% | 1.00% | 1.00% | 1.00% | 1.00% | 53% | 69% | 54% | 70% | 49% | 64% | 48% | 62% | 62% | 81% | 52% | 52% | 53% | 53% |
| 5494 | 1.00% | 1.00% | 1.00% | 1.00% | 1.00% | 55% | 72% | 55% | 72% | 52% | 68% | 50% | 65% | 64% | 83% | 54% | 54% | 55% | 55% |
| 5495 | 9.00% | 1.00% | 1.00% | 1.00% | 1.00% | 51% | 66% | 53% | 69% | 47% | 61% | 47% | 61% | 61% | 79% | 50% | 50% | 52% | 52% |
| 5496 | 0.00% | 9.00% | 1.00% | 1.00% | 1.00% | 64% | 83% | 63% | 82% | 51% | 66% | 58% | 75% | 71% | 92% | 59% | 59% | 60% | 60% |
| 5497 | 0.25% | 9.00% | 1.00% | 1.00% | 1.00% | 66% | 86% | 64% | 83% | 53% | 69% | 59% | 77% | 72% | 94% | 61% | 61% | 61% | 61% |
| 5498 | 1.00% | 9.00% | 1.00% | 1.00% | 1.00% | 68% | 88% | 65% | 85% | 56% | 73% | 61% | 79% | 74% | 96% | 63% | 63% | 64% | 64% |
| 5499 | 0.25% | 0.25% | 9.00% | 1.00% | 1.00% | 55% | 72% | 51% | 66% | 51% | 66% | 54% | 70% | 62% | 81% | 52% | 52% | 56% | 56% |
| 5500 | 1.00% | 0.25% | 9.00% | 1.00% | 1.00% | 57% | 74% | 52% | 68% | 54% | 70% | 56% | 73% | 64% | 83% | 54% | 54% | 58% | 58% |

Fig. 21

| Formula # | Delta Dodecalactone | Methyl Apritone | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5501 | 9.00% | 0.25% | 9.00% | 1.00% | 1.00% | 53% | 69% | 50% | 65% | 49% | 64% | 53% | 69% | 61% | 79% | 51% | 51% | 54% | 54% |
| 5502 | 0.25% | 1.00% | 9.00% | 1.00% | 1.00% | 63% | 82% | 59% | 77% | 54% | 70% | 59% | 77% | 72% | 94% | 59% | 59% | 62% | 62% |
| 5503 | 0.00% | 0.25% | 0.00% | 9.00% | 1.00% | 47% | 61% | 45% | 59% | 44% | 57% | 46% | 60% | 52% | 68% | 45% | 45% | 47% | 47% |
| 5504 | 0.00% | 0.00% | 0.25% | 9.00% | 1.00% | 46% | 60% | 44% | 57% | 42% | 55% | 42% | 55% | 51% | 66% | 44% | 44% | 45% | 45% |
| 5505 | 0.25% | 0.00% | 0.25% | 9.00% | 1.00% | 48% | 62% | 45% | 59% | 44% | 57% | 43% | 56% | 52% | 68% | 46% | 46% | 46% | 46% |
| 5506 | 0.00% | 0.25% | 0.25% | 9.00% | 1.00% | 51% | 66% | 51% | 66% | 48% | 62% | 49% | 64% | 57% | 74% | 50% | 50% | 51% | 51% |
| 5507 | 0.25% | 0.25% | 0.25% | 9.00% | 1.00% | 53% | 69% | 52% | 68% | 50% | 65% | 50% | 65% | 58% | 75% | 52% | 52% | 53% | 53% |
| 5508 | 1.00% | 0.25% | 0.25% | 9.00% | 1.00% | 55% | 72% | 53% | 69% | 53% | 69% | 52% | 68% | 60% | 78% | 54% | 54% | 55% | 55% |
| 5509 | 9.00% | 0.25% | 0.25% | 9.00% | 1.00% | 51% | 66% | 51% | 66% | 48% | 62% | 49% | 64% | 57% | 74% | 50% | 50% | 51% | 51% |
| 5510 | 0.00% | 1.00% | 0.25% | 9.00% | 1.00% | 59% | 77% | 59% | 77% | 51% | 66% | 54% | 70% | 67% | 87% | 56% | 56% | 57% | 57% |
| 5511 | 0.25% | 1.00% | 0.25% | 9.00% | 1.00% | 61% | 79% | 60% | 78% | 53% | 69% | 55% | 72% | 68% | 88% | 58% | 58% | 59% | 59% |
| 5512 | 1.00% | 1.00% | 0.25% | 9.00% | 1.00% | 63% | 82% | 61% | 79% | 56% | 73% | 57% | 74% | 70% | 91% | 60% | 60% | 61% | 61% |
| 5513 | 0.25% | 9.00% | 0.25% | 9.00% | 1.00% | 74% | 96% | 70% | 91% | 57% | 74% | 66% | 86% | 78% | 100 % | 67% | 67% | 67% | 67% |
| 5514 | 0.25% | 0.00% | 1.00% | 9.00% | 1.00% | 53% | 69% | 48% | 62% | 50% | 65% | 49% | 64% | 56% | 73% | 50% | 50% | 52% | 52% |
| 5515 | 1.00% | 0.25% | 1.00% | 9.00% | 1.00% | 60% | 78% | 56% | 73% | 59% | 77% | 58% | 75% | 64% | 83% | 58% | 58% | 60% | 60% |
| 5516 | 9.00% | 0.25% | 1.00% | 9.00% | 1.00% | 56% | 73% | 54% | 70% | 54% | 70% | 55% | 72% | 61% | 79% | 55% | 55% | 57% | 57% |
| 5517 | 0.00% | 1.00% | 1.00% | 9.00% | 1.00% | 64% | 83% | 62% | 81% | 57% | 74% | 60% | 78% | 71% | 92% | 61% | 61% | 63% | 63% |
| 5518 | 0.25% | 1.00% | 1.00% | 9.00% | 1.00% | 66% | 86% | 63% | 82% | 59% | 77% | 61% | 79% | 72% | 94% | 63% | 63% | 64% | 64% |
| 5519 | 1.00% | 1.00% | 1.00% | 9.00% | 1.00% | 68% | 88% | 64% | 83% | 62% | 81% | 63% | 82% | 74% | 96% | 65% | 65% | 66% | 66% |
| 5520 | 0.25% | 0.25% | 9.00% | 9.00% | 1.00% | 68% | 88% | 60% | 78% | 61% | 79% | 67% | 87% | 72% | 94% | 63% | 63% | 67% | 67% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5521 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 5522 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 5523 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 5524 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 5525 | 0.25% | 0.00% | 0.25% | 0.00% | 0.00% | 5% | 7% | 5% | 7% | 7% | 9% | 4% | 5% | 4% | 5% | 6% | 6% | 5% | 5% |
| 5526 | 1.00% | 0.00% | 0.25% | 0.00% | 0.00% | 7% | 9% | 6% | 8% | 10% | 13% | 6% | 8% | 6% | 8% | 8% | 8% | 7% | 7% |
| 5527 | 0.00% | 0.25% | 0.25% | 0.00% | 0.00% | 8% | 10% | 11% | 14% | 11% | 14% | 10% | 13% | 9% | 12% | 10% | 10% | 10% | 10% |
| 5528 | 0.25% | 0.25% | 0.25% | 0.00% | 0.00% | 10% | 13% | 12% | 16% | 13% | 17% | 11% | 14% | 10% | 13% | 12% | 12% | 11% | 11% |
| 5529 | 0.00% | 1.00% | 0.25% | 0.00% | 0.00% | 16% | 21% | 19% | 25% | 14% | 18% | 15% | 20% | 19% | 25% | 16% | 16% | 16% | 16% |
| 5530 | 1.00% | 1.00% | 0.25% | 0.00% | 0.00% | 20% | 26% | 21% | 27% | 19% | 25% | 18% | 23% | 22% | 29% | 20% | 20% | 20% | 20% |
| 5531 | 1.00% | 9.00% | 0.25% | 0.00% | 0.00% | 33% | 43% | 31% | 40% | 23% | 30% | 29% | 38% | 32% | 42% | 29% | 29% | 28% | 28% |
| 5532 | 0.25% | 0.00% | 1.00% | 0.00% | 0.00% | 8% | 10% | 8% | 10% | 11% | 14% | 8% | 10% | 10% | 13% | 9% | 9% | 10% | 10% |
| 5533 | 1.00% | 0.00% | 1.00% | 0.00% | 0.00% | 10% | 13% | 9% | 12% | 14% | 18% | 10% | 13% | 12% | 16% | 11% | 11% | 12% | 12% |
| 5534 | 0.00% | 0.25% | 1.00% | 0.00% | 0.00% | 11% | 14% | 14% | 18% | 15% | 20% | 14% | 18% | 15% | 20% | 13% | 13% | 15% | 15% |
| 5535 | 1.00% | 0.25% | 1.00% | 0.00% | 0.00% | 15% | 20% | 16% | 21% | 20% | 26% | 17% | 22% | 18% | 23% | 17% | 17% | 18% | 18% |
| 5536 | 0.00% | 1.00% | 1.00% | 0.00% | 0.00% | 19% | 25% | 22% | 29% | 18% | 23% | 19% | 25% | 25% | 33% | 20% | 20% | 21% | 21% |
| 5537 | 0.25% | 1.00% | 1.00% | 0.00% | 0.00% | 21% | 27% | 23% | 30% | 20% | 26% | 20% | 26% | 26% | 34% | 21% | 21% | 22% | 22% |
| 5538 | 1.00% | 1.00% | 1.00% | 0.00% | 0.00% | 23% | 30% | 24% | 31% | 23% | 30% | 22% | 29% | 28% | 36% | 23% | 23% | 24% | 24% |
| 5539 | 9.00% | 1.00% | 1.00% | 0.00% | 0.00% | 19% | 25% | 22% | 29% | 18% | 23% | 19% | 25% | 25% | 33% | 20% | 20% | 21% | 21% |
| 5540 | 1.00% | 9.00% | 1.00% | 0.00% | 0.00% | 36% | 47% | 34% | 44% | 27% | 35% | 33% | 43% | 38% | 49% | 32% | 32% | 33% | 33% |
| 5541 | 0.25% | 0.00% | 9.00% | 0.00% | 0.00% | 12% | 16% | 12% | 16% | 15% | 20% | 11% | 14% | 16% | 21% | 13% | 13% | 14% | 14% |
| 5542 | 0.00% | 0.25% | 9.00% | 0.00% | 0.00% | 15% | 20% | 18% | 23% | 19% | 25% | 17% | 22% | 21% | 27% | 17% | 17% | 19% | 19% |
| 5543 | 0.25% | 0.25% | 9.00% | 0.00% | 0.00% | 17% | 22% | 19% | 25% | 21% | 27% | 18% | 23% | 22% | 29% | 19% | 19% | 20% | 20% |
| 5544 | 1.00% | 0.25% | 9.00% | 0.00% | 0.00% | 19% | 25% | 20% | 26% | 24% | 31% | 20% | 26% | 24% | 31% | 21% | 21% | 23% | 23% |
| 5545 | 0.25% | 1.00% | 9.00% | 0.00% | 0.00% | 25% | 33% | 27% | 35% | 24% | 31% | 23% | 30% | 32% | 42% | 25% | 25% | 26% | 26% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5546 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 5547 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 5548 | 0.00% | 0.25% | 0.00% | 0.25% | 0.00% | 10% | 13% | 16% | 21% | 12% | 16% | 17% | 22% | 13% | 17% | 13% | 13% | 14% | 14% |
| 5549 | 0.25% | 0.25% | 0.00% | 0.25% | 0.00% | 12% | 16% | 17% | 22% | 14% | 18% | 18% | 23% | 14% | 18% | 14% | 14% | 15% | 15% |
| 5550 | 9.00% | 0.25% | 0.00% | 0.25% | 0.00% | 10% | 13% | 16% | 21% | 12% | 16% | 17% | 22% | 13% | 17% | 13% | 13% | 14% | 14% |
| 5551 | 1.00% | 1.00% | 0.00% | 0.25% | 0.00% | 22% | 29% | 26% | 34% | 20% | 26% | 25% | 33% | 26% | 34% | 23% | 23% | 24% | 24% |
| 5552 | 1.00% | 9.00% | 0.00% | 0.25% | 0.00% | 35% | 46% | 36% | 47% | 24% | 31% | 36% | 47% | 36% | 47% | 32% | 32% | 32% | 32% |
| 5553 | 0.00% | 0.00% | 0.25% | 0.25% | 0.00% | 8% | 10% | 13% | 17% | 11% | 14% | 13% | 17% | 10% | 13% | 11% | 11% | 11% | 11% |
| 5554 | 0.25% | 0.00% | 0.25% | 0.25% | 0.00% | 10% | 13% | 14% | 18% | 13% | 17% | 14% | 18% | 11% | 14% | 12% | 12% | 13% | 13% |
| 5555 | 0.00% | 0.25% | 0.25% | 0.25% | 0.00% | 13% | 17% | 20% | 26% | 17% | 22% | 20% | 26% | 16% | 21% | 17% | 17% | 18% | 18% |
| 5556 | 0.25% | 0.25% | 0.25% | 0.25% | 0.00% | 15% | 20% | 21% | 27% | 19% | 25% | 21% | 27% | 17% | 22% | 18% | 18% | 19% | 19% |
| 5557 | 1.00% | 0.25% | 0.25% | 0.25% | 0.00% | 17% | 22% | 22% | 29% | 22% | 29% | 23% | 30% | 19% | 25% | 20% | 20% | 21% | 21% |
| 5558 | 9.00% | 0.25% | 0.25% | 0.25% | 0.00% | 13% | 17% | 20% | 26% | 17% | 22% | 20% | 26% | 16% | 21% | 17% | 17% | 18% | 18% |
| 5559 | 0.25% | 1.00% | 0.25% | 0.25% | 0.00% | 23% | 30% | 29% | 38% | 22% | 29% | 26% | 34% | 27% | 35% | 25% | 25% | 25% | 25% |
| 5560 | 9.00% | 1.00% | 0.25% | 0.25% | 0.00% | 21% | 27% | 28% | 36% | 20% | 26% | 25% | 33% | 26% | 34% | 23% | 23% | 24% | 24% |
| 5561 | 0.25% | 9.00% | 0.25% | 0.25% | 0.00% | 36% | 47% | 39% | 51% | 26% | 34% | 37% | 48% | 37% | 48% | 34% | 34% | 33% | 33% |
| 5562 | 1.00% | 9.00% | 0.25% | 0.25% | 0.00% | 38% | 49% | 40% | 52% | 29% | 38% | 39% | 51% | 39% | 51% | 36% | 36% | 36% | 36% |
| 5563 | 9.00% | 9.00% | 0.25% | 0.25% | 0.00% | 34% | 44% | 38% | 49% | 24% | 31% | 36% | 47% | 36% | 47% | 32% | 32% | 32% | 32% |
| 5564 | 0.00% | 0.00% | 1.00% | 0.25% | 0.00% | 11% | 14% | 16% | 21% | 15% | 20% | 17% | 22% | 16% | 21% | 14% | 14% | 16% | 16% |
| 5565 | 1.00% | 0.00% | 1.00% | 0.25% | 0.00% | 15% | 20% | 18% | 23% | 20% | 26% | 20% | 26% | 19% | 25% | 18% | 18% | 20% | 20% |
| 5566 | 0.00% | 0.25% | 1.00% | 0.25% | 0.00% | 16% | 21% | 23% | 30% | 21% | 27% | 24% | 31% | 22% | 29% | 20% | 20% | 22% | 22% |
| 5567 | 0.25% | 0.25% | 1.00% | 0.25% | 0.00% | 18% | 23% | 24% | 31% | 23% | 30% | 25% | 33% | 23% | 30% | 22% | 22% | 24% | 24% |
| 5568 | 1.00% | 0.25% | 1.00% | 0.25% | 0.00% | 20% | 26% | 25% | 33% | 26% | 34% | 27% | 35% | 25% | 33% | 24% | 24% | 26% | 26% |
| 5569 | 9.00% | 0.25% | 1.00% | 0.25% | 0.00% | 16% | 21% | 23% | 30% | 21% | 27% | 24% | 31% | 22% | 29% | 20% | 20% | 22% | 22% |
| 5570 | 0.00% | 1.00% | 1.00% | 0.25% | 0.00% | 24% | 31% | 31% | 40% | 24% | 31% | 29% | 38% | 32% | 42% | 26% | 26% | 28% | 28% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5571 | 0.25% | 1.00% | 1.00% | 0.25% | 0.00% | 26% | 34% | 32% | 42% | 26% | 34% | 30% | 39% | 33% | 43% | 28% | 28% | 30% | 30% |
| 5572 | 1.00% | 1.00% | 1.00% | 0.25% | 0.00% | 28% | 36% | 33% | 43% | 29% | 38% | 32% | 42% | 35% | 46% | 30% | 30% | 32% | 32% |
| 5573 | 9.00% | 1.00% | 1.00% | 0.25% | 0.00% | 24% | 31% | 31% | 40% | 24% | 31% | 29% | 38% | 32% | 42% | 26% | 26% | 28% | 28% |
| 5574 | 0.00% | 9.00% | 1.00% | 0.25% | 0.00% | 37% | 48% | 41% | 53% | 28% | 36% | 40% | 52% | 42% | 55% | 35% | 35% | 37% | 37% |
| 5575 | 0.25% | 9.00% | 1.00% | 0.25% | 0.00% | 39% | 51% | 42% | 55% | 30% | 39% | 41% | 53% | 43% | 56% | 37% | 37% | 38% | 38% |
| 5576 | 1.00% | 9.00% | 1.00% | 0.25% | 0.00% | 41% | 53% | 43% | 56% | 33% | 43% | 43% | 56% | 45% | 59% | 39% | 39% | 40% | 40% |
| 5577 | 0.25% | 0.25% | 9.00% | 0.25% | 0.00% | 22% | 29% | 28% | 36% | 27% | 35% | 28% | 36% | 29% | 38% | 26% | 26% | 28% | 28% |
| 5578 | 1.00% | 0.25% | 9.00% | 0.25% | 0.00% | 24% | 31% | 29% | 38% | 30% | 39% | 30% | 39% | 31% | 40% | 28% | 28% | 30% | 30% |
| 5579 | 9.00% | 0.25% | 9.00% | 0.25% | 0.00% | 20% | 26% | 27% | 35% | 25% | 33% | 27% | 35% | 28% | 36% | 24% | 24% | 27% | 27% |
| 5580 | 0.00% | 1.00% | 9.00% | 0.25% | 0.00% | 28% | 36% | 35% | 46% | 28% | 36% | 32% | 42% | 38% | 49% | 30% | 30% | 33% | 33% |
| 5581 | 0.25% | 1.00% | 9.00% | 0.25% | 0.00% | 30% | 39% | 36% | 47% | 30% | 39% | 33% | 43% | 39% | 51% | 32% | 32% | 34% | 34% |
| 5582 | 9.00% | 1.00% | 9.00% | 0.25% | 0.00% | 28% | 36% | 35% | 46% | 28% | 36% | 32% | 42% | 38% | 49% | 30% | 30% | 33% | 33% |
| 5583 | 1.00% | 9.00% | 9.00% | 0.25% | 0.00% | 45% | 59% | 47% | 61% | 37% | 48% | 46% | 60% | 51% | 66% | 43% | 43% | 45% | 45% |
| 5584 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 5585 | 1.00% | 0.25% | 0.00% | 1.00% | 0.00% | 29% | 38% | 30% | 39% | 29% | 38% | 30% | 39% | 31% | 40% | 29% | 29% | 30% | 30% |
| 5586 | 0.00% | 1.00% | 0.00% | 1.00% | 0.00% | 33% | 43% | 36% | 47% | 27% | 35% | 32% | 42% | 38% | 49% | 32% | 32% | 32% | 32% |
| 5587 | 0.25% | 1.00% | 0.00% | 1.00% | 0.00% | 35% | 46% | 37% | 48% | 29% | 38% | 33% | 43% | 39% | 51% | 34% | 34% | 34% | 34% |
| 5588 | 1.00% | 1.00% | 0.00% | 1.00% | 0.00% | 37% | 48% | 38% | 49% | 32% | 42% | 35% | 46% | 41% | 53% | 36% | 36% | 36% | 36% |
| 5589 | 0.00% | 0.00% | 0.25% | 1.00% | 0.00% | 23% | 30% | 25% | 33% | 23% | 30% | 23% | 30% | 25% | 33% | 24% | 24% | 24% | 24% |
| 5590 | 1.00% | 0.00% | 0.25% | 1.00% | 0.00% | 27% | 35% | 27% | 35% | 28% | 36% | 26% | 34% | 28% | 36% | 27% | 27% | 27% | 27% |
| 5591 | 0.25% | 0.25% | 0.25% | 1.00% | 0.00% | 30% | 39% | 33% | 43% | 31% | 40% | 31% | 40% | 32% | 42% | 31% | 31% | 31% | 31% |
| 5592 | 1.00% | 0.25% | 0.25% | 1.00% | 0.00% | 32% | 42% | 34% | 44% | 34% | 44% | 33% | 43% | 34% | 44% | 33% | 33% | 34% | 34% |
| 5593 | 9.00% | 0.25% | 0.25% | 1.00% | 0.00% | 28% | 36% | 32% | 42% | 29% | 38% | 30% | 39% | 31% | 40% | 30% | 30% | 30% | 30% |
| 5594 | 0.00% | 1.00% | 0.25% | 1.00% | 0.00% | 36% | 47% | 40% | 52% | 32% | 42% | 35% | 46% | 41% | 53% | 36% | 36% | 36% | 36% |
| 5595 | 0.25% | 1.00% | 0.25% | 1.00% | 0.00% | 38% | 49% | 41% | 53% | 34% | 44% | 36% | 47% | 42% | 55% | 38% | 38% | 37% | 37% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5596 | 1.00% | 1.00% | 0.25% | 1.00% | 0.00% | 40% | 52% | 42% | 55% | 37% | 48% | 38% | 49% | 44% | 57% | 40% | 40% | 40% | 40% |
| 5597 | 9.00% | 1.00% | 0.25% | 1.00% | 0.00% | 36% | 47% | 40% | 52% | 32% | 42% | 35% | 46% | 41% | 53% | 36% | 36% | 36% | 36% |
| 5598 | 0.25% | 9.00% | 0.25% | 1.00% | 0.00% | 51% | 66% | 51% | 66% | 38% | 49% | 47% | 61% | 52% | 68% | 47% | 47% | 46% | 46% |
| 5599 | 1.00% | 9.00% | 0.25% | 1.00% | 0.00% | 53% | 69% | 52% | 68% | 41% | 53% | 49% | 64% | 54% | 70% | 49% | 49% | 48% | 48% |
| 5600 | 9.00% | 9.00% | 0.25% | 1.00% | 0.00% | 49% | 64% | 50% | 65% | 36% | 47% | 46% | 60% | 51% | 66% | 45% | 45% | 44% | 44% |
| 5601 | 0.00% | 0.00% | 1.00% | 1.00% | 0.00% | 26% | 34% | 28% | 36% | 27% | 35% | 27% | 35% | 31% | 40% | 27% | 27% | 28% | 28% |
| 5602 | 0.25% | 0.00% | 1.00% | 1.00% | 0.00% | 28% | 36% | 29% | 38% | 29% | 38% | 28% | 36% | 32% | 42% | 29% | 29% | 30% | 30% |
| 5603 | 1.00% | 0.00% | 1.00% | 1.00% | 0.00% | 30% | 39% | 30% | 39% | 32% | 42% | 30% | 39% | 34% | 44% | 31% | 31% | 32% | 32% |
| 5604 | 0.00% | 0.25% | 1.00% | 1.00% | 0.00% | 31% | 40% | 35% | 46% | 33% | 43% | 34% | 44% | 37% | 48% | 33% | 33% | 35% | 35% |
| 5605 | 1.00% | 0.25% | 1.00% | 1.00% | 0.00% | 35% | 46% | 37% | 48% | 38% | 49% | 37% | 48% | 40% | 52% | 37% | 37% | 38% | 38% |
| 5606 | 9.00% | 0.25% | 1.00% | 1.00% | 0.00% | 31% | 40% | 35% | 46% | 33% | 43% | 34% | 44% | 37% | 48% | 33% | 33% | 35% | 35% |
| 5607 | 0.00% | 1.00% | 1.00% | 1.00% | 0.00% | 39% | 51% | 43% | 56% | 36% | 47% | 39% | 51% | 47% | 61% | 39% | 39% | 41% | 41% |
| 5608 | 0.25% | 1.00% | 1.00% | 1.00% | 0.00% | 41% | 53% | 44% | 57% | 38% | 49% | 40% | 52% | 48% | 62% | 41% | 41% | 42% | 42% |
| 5609 | 1.00% | 1.00% | 1.00% | 1.00% | 0.00% | 43% | 56% | 45% | 59% | 41% | 53% | 42% | 55% | 50% | 65% | 43% | 43% | 44% | 44% |
| 5610 | 9.00% | 1.00% | 1.00% | 1.00% | 0.00% | 39% | 51% | 43% | 56% | 36% | 47% | 39% | 51% | 47% | 61% | 39% | 39% | 41% | 41% |
| 5611 | 0.00% | 9.00% | 1.00% | 1.00% | 0.00% | 52% | 68% | 53% | 69% | 40% | 52% | 50% | 65% | 57% | 74% | 48% | 48% | 49% | 49% |
| 5612 | 0.25% | 9.00% | 1.00% | 1.00% | 0.00% | 54% | 70% | 54% | 70% | 42% | 55% | 51% | 66% | 58% | 75% | 50% | 50% | 50% | 50% |
| 5613 | 1.00% | 9.00% | 1.00% | 1.00% | 0.00% | 56% | 73% | 55% | 72% | 45% | 59% | 53% | 69% | 60% | 78% | 52% | 52% | 53% | 53% |
| 5614 | 0.25% | 0.25% | 9.00% | 1.00% | 0.00% | 37% | 48% | 40% | 52% | 39% | 51% | 38% | 49% | 44% | 57% | 39% | 39% | 40% | 40% |
| 5615 | 1.00% | 0.25% | 9.00% | 1.00% | 0.00% | 39% | 51% | 41% | 53% | 42% | 55% | 40% | 52% | 46% | 60% | 41% | 41% | 43% | 43% |
| 5616 | 9.00% | 0.25% | 9.00% | 1.00% | 0.00% | 35% | 46% | 39% | 51% | 37% | 48% | 37% | 48% | 43% | 56% | 37% | 37% | 39% | 39% |
| 5617 | 0.25% | 1.00% | 9.00% | 1.00% | 0.00% | 45% | 59% | 48% | 62% | 42% | 55% | 43% | 56% | 54% | 70% | 45% | 45% | 46% | 46% |
| 5618 | 0.00% | 0.25% | 0.00% | 9.00% | 0.00% | 45% | 59% | 42% | 55% | 42% | 55% | 47% | 61% | 41% | 53% | 43% | 43% | 43% | 43% |
| 5619 | 0.00% | 0.00% | 0.25% | 9.00% | 0.00% | 43% | 56% | 39% | 51% | 41% | 53% | 43% | 56% | 38% | 49% | 41% | 41% | 41% | 41% |
| 5620 | 0.25% | 0.00% | 0.25% | 9.00% | 0.00% | 45% | 59% | 40% | 52% | 43% | 56% | 44% | 57% | 39% | 51% | 43% | 43% | 42% | 42% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5621 | 0.00% | 0.25% | 0.25% | 9.00% | 0.00% | 48% | 62% | 46% | 60% | 47% | 61% | 50% | 65% | 44% | 57% | 47% | 47% | 47% | 47% |
| 5622 | 0.25% | 0.25% | 0.25% | 9.00% | 0.00% | 50% | 65% | 47% | 61% | 49% | 64% | 51% | 66% | 45% | 59% | 49% | 49% | 48% | 48% |
| 5623 | 1.00% | 0.25% | 0.25% | 9.00% | 0.00% | 52% | 68% | 48% | 62% | 52% | 68% | 53% | 69% | 47% | 61% | 51% | 51% | 51% | 51% |
| 5624 | 9.00% | 0.25% | 0.25% | 9.00% | 0.00% | 48% | 62% | 46% | 60% | 47% | 61% | 50% | 65% | 44% | 57% | 47% | 47% | 47% | 47% |
| 5625 | 0.00% | 1.00% | 0.25% | 9.00% | 0.00% | 56% | 73% | 54% | 70% | 50% | 65% | 55% | 72% | 54% | 70% | 53% | 53% | 53% | 53% |
| 5626 | 0.25% | 1.00% | 0.25% | 9.00% | 0.00% | 58% | 75% | 55% | 72% | 52% | 68% | 56% | 73% | 55% | 72% | 55% | 55% | 54% | 54% |
| 5627 | 1.00% | 1.00% | 0.25% | 9.00% | 0.00% | 60% | 78% | 56% | 73% | 55% | 72% | 58% | 75% | 57% | 74% | 57% | 57% | 57% | 57% |
| 5628 | 0.25% | 9.00% | 0.25% | 9.00% | 0.00% | 71% | 92% | 65% | 85% | 56% | 73% | 67% | 87% | 65% | 85% | 64% | 64% | 63% | 63% |
| 5629 | 0.25% | 0.00% | 1.00% | 9.00% | 0.00% | 48% | 62% | 43% | 56% | 47% | 61% | 48% | 62% | 45% | 59% | 46% | 46% | 47% | 47% |
| 5630 | 1.00% | 0.25% | 1.00% | 9.00% | 0.00% | 55% | 72% | 51% | 66% | 56% | 73% | 57% | 74% | 53% | 69% | 54% | 54% | 55% | 55% |
| 5631 | 9.00% | 0.25% | 1.00% | 9.00% | 0.00% | 51% | 66% | 49% | 64% | 51% | 66% | 54% | 70% | 50% | 65% | 50% | 50% | 52% | 52% |
| 5632 | 0.00% | 1.00% | 1.00% | 9.00% | 0.00% | 59% | 77% | 57% | 74% | 54% | 70% | 59% | 77% | 60% | 78% | 57% | 57% | 58% | 58% |
| 5633 | 0.25% | 1.00% | 1.00% | 9.00% | 0.00% | 61% | 79% | 58% | 75% | 56% | 73% | 60% | 78% | 61% | 79% | 58% | 58% | 59% | 59% |
| 5634 | 1.00% | 1.00% | 1.00% | 9.00% | 0.00% | 63% | 82% | 59% | 77% | 59% | 77% | 62% | 81% | 63% | 82% | 60% | 60% | 61% | 61% |
| 5635 | 0.25% | 0.25% | 9.00% | 9.00% | 0.00% | 57% | 74% | 54% | 70% | 57% | 74% | 58% | 75% | 57% | 74% | 56% | 56% | 57% | 57% |
| 5636 | 0.25% | 0.25% | 0.00% | 0.00% | 0.25% | 13% | 17% | 15% | 20% | 14% | 18% | 13% | 17% | 14% | 18% | 14% | 14% | 14% | 14% |
| 5637 | 1.00% | 0.25% | 0.00% | 0.00% | 0.25% | 15% | 20% | 16% | 21% | 17% | 22% | 15% | 20% | 16% | 21% | 16% | 16% | 16% | 16% |
| 5638 | 0.25% | 1.00% | 0.00% | 0.00% | 0.25% | 21% | 27% | 23% | 30% | 17% | 22% | 18% | 23% | 24% | 31% | 20% | 20% | 20% | 20% |
| 5639 | 1.00% | 1.00% | 0.00% | 0.00% | 0.25% | 23% | 30% | 24% | 31% | 20% | 26% | 20% | 26% | 26% | 34% | 22% | 22% | 22% | 22% |
| 5640 | 0.25% | 0.00% | 0.25% | 0.00% | 0.25% | 11% | 14% | 12% | 16% | 13% | 17% | 9% | 12% | 11% | 14% | 12% | 12% | 11% | 11% |
| 5641 | 1.00% | 0.00% | 0.25% | 0.00% | 0.25% | 13% | 17% | 13% | 17% | 16% | 21% | 11% | 14% | 13% | 17% | 14% | 14% | 13% | 13% |
| 5642 | 0.00% | 0.25% | 0.25% | 0.00% | 0.25% | 14% | 18% | 18% | 23% | 17% | 22% | 15% | 20% | 16% | 21% | 16% | 16% | 16% | 16% |
| 5643 | 0.25% | 0.25% | 0.25% | 0.00% | 0.25% | 16% | 21% | 19% | 25% | 19% | 25% | 16% | 21% | 17% | 22% | 18% | 18% | 17% | 17% |
| 5644 | 0.00% | 1.00% | 0.25% | 0.00% | 0.25% | 22% | 29% | 26% | 34% | 20% | 26% | 20% | 26% | 26% | 34% | 23% | 23% | 22% | 22% |
| 5645 | 1.00% | 1.00% | 0.25% | 0.00% | 0.25% | 26% | 34% | 28% | 36% | 25% | 33% | 23% | 30% | 29% | 38% | 26% | 26% | 26% | 26% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5646 | 1.00% | 9.00% | 0.25% | 0.00% | 0.25% | 39% | 51% | 38% | 49% | 29% | 38% | 34% | 44% | 39% | 51% | 35% | 35% | 34% | 34% |
| 5647 | 0.25% | 0.00% | 1.00% | 0.00% | 0.25% | 14% | 18% | 15% | 20% | 17% | 22% | 13% | 17% | 17% | 22% | 15% | 15% | 16% | 16% |
| 5648 | 1.00% | 0.00% | 1.00% | 0.00% | 0.25% | 16% | 21% | 16% | 21% | 20% | 26% | 15% | 20% | 19% | 25% | 17% | 17% | 18% | 18% |
| 5649 | 0.00% | 0.25% | 1.00% | 0.00% | 0.25% | 17% | 22% | 21% | 27% | 21% | 27% | 19% | 25% | 22% | 29% | 20% | 20% | 21% | 21% |
| 5650 | 1.00% | 0.25% | 1.00% | 0.00% | 0.25% | 21% | 27% | 23% | 30% | 26% | 34% | 22% | 29% | 25% | 33% | 23% | 23% | 24% | 24% |
| 5651 | 0.00% | 1.00% | 1.00% | 0.00% | 0.25% | 25% | 33% | 29% | 38% | 24% | 31% | 24% | 31% | 32% | 42% | 26% | 26% | 27% | 27% |
| 5652 | 0.25% | 1.00% | 1.00% | 0.00% | 0.25% | 27% | 35% | 30% | 39% | 26% | 34% | 25% | 33% | 33% | 43% | 28% | 28% | 28% | 28% |
| 5653 | 1.00% | 1.00% | 1.00% | 0.00% | 0.25% | 29% | 38% | 31% | 40% | 29% | 38% | 27% | 35% | 35% | 46% | 30% | 30% | 30% | 30% |
| 5654 | 9.00% | 1.00% | 1.00% | 0.00% | 0.25% | 25% | 33% | 29% | 38% | 24% | 31% | 24% | 31% | 32% | 42% | 26% | 26% | 27% | 27% |
| 5655 | 1.00% | 9.00% | 1.00% | 0.00% | 0.25% | 42% | 55% | 41% | 53% | 33% | 43% | 38% | 49% | 45% | 59% | 39% | 39% | 39% | 39% |
| 5656 | 0.25% | 0.00% | 9.00% | 0.00% | 0.25% | 18% | 23% | 19% | 25% | 21% | 27% | 16% | 21% | 23% | 30% | 19% | 19% | 20% | 20% |
| 5657 | 0.00% | 0.25% | 9.00% | 0.00% | 0.25% | 21% | 27% | 25% | 33% | 25% | 33% | 22% | 29% | 28% | 36% | 24% | 24% | 25% | 25% |
| 5658 | 0.25% | 0.25% | 9.00% | 0.00% | 0.25% | 23% | 30% | 26% | 34% | 27% | 35% | 23% | 30% | 29% | 38% | 25% | 25% | 26% | 26% |
| 5659 | 1.00% | 0.25% | 9.00% | 0.00% | 0.25% | 25% | 33% | 27% | 35% | 30% | 39% | 25% | 33% | 31% | 40% | 27% | 27% | 29% | 29% |
| 5660 | 0.25% | 1.00% | 9.00% | 0.00% | 0.25% | 31% | 40% | 34% | 44% | 30% | 39% | 28% | 36% | 39% | 51% | 32% | 32% | 32% | 32% |
| 5661 | 0.25% | 0.00% | 0.00% | 0.25% | 0.25% | 13% | 17% | 17% | 22% | 14% | 18% | 16% | 21% | 15% | 20% | 15% | 15% | 15% | 15% |
| 5662 | 1.00% | 0.00% | 0.00% | 0.25% | 0.25% | 15% | 20% | 18% | 23% | 17% | 22% | 18% | 23% | 17% | 22% | 17% | 17% | 17% | 17% |
| 5663 | 0.00% | 0.25% | 0.00% | 0.25% | 0.25% | 16% | 21% | 23% | 30% | 18% | 23% | 22% | 29% | 20% | 26% | 19% | 19% | 20% | 20% |
| 5664 | 0.25% | 0.25% | 0.00% | 0.25% | 0.25% | 18% | 23% | 24% | 31% | 20% | 26% | 23% | 30% | 21% | 27% | 21% | 21% | 21% | 21% |
| 5665 | 9.00% | 0.25% | 0.00% | 0.25% | 0.25% | 16% | 21% | 23% | 30% | 18% | 23% | 22% | 29% | 20% | 26% | 19% | 19% | 20% | 20% |
| 5666 | 1.00% | 1.00% | 0.00% | 0.25% | 0.25% | 28% | 36% | 33% | 43% | 26% | 34% | 30% | 39% | 33% | 43% | 29% | 29% | 30% | 30% |
| 5667 | 1.00% | 9.00% | 0.00% | 0.25% | 0.25% | 41% | 53% | 43% | 56% | 30% | 39% | 41% | 53% | 43% | 56% | 38% | 38% | 38% | 38% |
| 5668 | 0.00% | 0.00% | 0.25% | 0.25% | 0.25% | 14% | 18% | 20% | 26% | 17% | 22% | 18% | 23% | 17% | 22% | 17% | 17% | 17% | 17% |
| 5669 | 0.25% | 0.00% | 0.25% | 0.25% | 0.25% | 16% | 21% | 21% | 27% | 19% | 25% | 19% | 25% | 18% | 23% | 19% | 19% | 19% | 19% |
| 5670 | 0.00% | 0.25% | 0.25% | 0.25% | 0.25% | 19% | 25% | 27% | 35% | 23% | 30% | 25% | 33% | 23% | 30% | 23% | 23% | 24% | 24% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5671 | 0.25% | 0.25% | 0.25% | 0.25% | 0.25% | 21% | 27% | 28% | 36% | 25% | 33% | 26% | 34% | 24% | 31% | 25% | 25% | 25% | 25% |
| 5672 | 1.00% | 0.25% | 0.25% | 0.25% | 0.25% | 23% | 30% | 29% | 38% | 28% | 36% | 28% | 36% | 26% | 34% | 27% | 27% | 27% | 27% |
| 5673 | 9.00% | 0.25% | 0.25% | 0.25% | 0.25% | 19% | 25% | 27% | 35% | 23% | 30% | 25% | 33% | 23% | 30% | 23% | 23% | 24% | 24% |
| 5674 | 0.25% | 1.00% | 0.25% | 0.25% | 0.25% | 29% | 38% | 36% | 47% | 28% | 36% | 31% | 40% | 34% | 44% | 31% | 31% | 31% | 31% |
| 5675 | 9.00% | 1.00% | 0.25% | 0.25% | 0.25% | 27% | 35% | 35% | 46% | 26% | 34% | 30% | 39% | 33% | 43% | 29% | 29% | 30% | 30% |
| 5676 | 0.25% | 9.00% | 0.25% | 0.25% | 0.25% | 42% | 55% | 46% | 60% | 32% | 42% | 42% | 55% | 44% | 57% | 40% | 40% | 39% | 39% |
| 5677 | 1.00% | 9.00% | 0.25% | 0.25% | 0.25% | 44% | 57% | 47% | 61% | 35% | 46% | 44% | 57% | 46% | 60% | 42% | 42% | 42% | 42% |
| 5678 | 9.00% | 9.00% | 0.25% | 0.25% | 0.25% | 40% | 52% | 45% | 59% | 30% | 39% | 41% | 53% | 43% | 56% | 38% | 38% | 38% | 38% |
| 5679 | 0.00% | 0.00% | 1.00% | 0.25% | 0.25% | 17% | 22% | 23% | 30% | 21% | 27% | 22% | 29% | 23% | 30% | 20% | 20% | 22% | 22% |
| 5680 | 1.00% | 0.00% | 1.00% | 0.25% | 0.25% | 21% | 27% | 25% | 33% | 26% | 34% | 25% | 33% | 26% | 34% | 24% | 24% | 26% | 26% |
| 5681 | 0.00% | 0.25% | 1.00% | 0.25% | 0.25% | 22% | 29% | 30% | 39% | 27% | 35% | 29% | 38% | 29% | 38% | 26% | 26% | 28% | 28% |
| 5682 | 0.25% | 0.25% | 1.00% | 0.25% | 0.25% | 24% | 31% | 31% | 40% | 29% | 38% | 30% | 39% | 30% | 39% | 28% | 28% | 30% | 30% |
| 5683 | 1.00% | 0.25% | 1.00% | 0.25% | 0.25% | 26% | 34% | 32% | 42% | 32% | 42% | 32% | 42% | 32% | 42% | 30% | 30% | 32% | 32% |
| 5684 | 9.00% | 0.25% | 1.00% | 0.25% | 0.25% | 22% | 29% | 30% | 39% | 27% | 35% | 29% | 38% | 29% | 38% | 26% | 26% | 28% | 28% |
| 5685 | 0.00% | 1.00% | 1.00% | 0.25% | 0.25% | 30% | 39% | 38% | 49% | 30% | 39% | 34% | 44% | 39% | 51% | 33% | 33% | 34% | 34% |
| 5686 | 0.25% | 1.00% | 1.00% | 0.25% | 0.25% | 32% | 42% | 39% | 51% | 32% | 42% | 35% | 46% | 40% | 52% | 34% | 34% | 36% | 36% |
| 5687 | 1.00% | 1.00% | 1.00% | 0.25% | 0.25% | 34% | 44% | 40% | 52% | 35% | 46% | 37% | 48% | 42% | 55% | 36% | 36% | 38% | 38% |
| 5688 | 9.00% | 1.00% | 1.00% | 0.25% | 0.25% | 30% | 39% | 38% | 49% | 30% | 39% | 34% | 44% | 39% | 51% | 33% | 33% | 34% | 34% |
| 5689 | 0.00% | 9.00% | 1.00% | 0.25% | 0.25% | 43% | 56% | 48% | 62% | 34% | 44% | 45% | 59% | 49% | 64% | 42% | 42% | 43% | 43% |
| 5690 | 0.25% | 9.00% | 1.00% | 0.25% | 0.25% | 45% | 59% | 49% | 64% | 36% | 47% | 46% | 60% | 50% | 65% | 43% | 43% | 44% | 44% |
| 5691 | 1.00% | 9.00% | 1.00% | 0.25% | 0.25% | 47% | 61% | 50% | 65% | 39% | 51% | 48% | 62% | 52% | 68% | 45% | 45% | 46% | 46% |
| 5692 | 0.25% | 0.25% | 9.00% | 0.25% | 0.25% | 28% | 36% | 35% | 46% | 33% | 43% | 33% | 43% | 36% | 47% | 32% | 32% | 34% | 34% |
| 5693 | 1.00% | 0.25% | 9.00% | 0.25% | 0.25% | 30% | 39% | 36% | 47% | 36% | 47% | 35% | 46% | 38% | 49% | 34% | 34% | 36% | 36% |
| 5694 | 9.00% | 0.25% | 9.00% | 0.25% | 0.25% | 26% | 34% | 34% | 44% | 31% | 40% | 32% | 42% | 35% | 46% | 30% | 30% | 33% | 33% |
| 5695 | 0.00% | 1.00% | 9.00% | 0.25% | 0.25% | 34% | 44% | 42% | 55% | 34% | 44% | 37% | 48% | 45% | 59% | 37% | 37% | 39% | 39% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5696 | 0.25% | 1.00% | 9.00% | 0.25% | 0.25% | 36% | 47% | 43% | 56% | 36% | 47% | 38% | 49% | 46% | 60% | 38% | 38% | 40% | 40% |
| 5697 | 9.00% | 1.00% | 9.00% | 0.25% | 0.25% | 34% | 44% | 42% | 55% | 34% | 44% | 37% | 48% | 45% | 59% | 37% | 37% | 39% | 39% |
| 5698 | 1.00% | 9.00% | 9.00% | 0.25% | 0.25% | 51% | 66% | 54% | 70% | 43% | 56% | 51% | 66% | 58% | 75% | 49% | 49% | 51% | 51% |
| 5699 | 0.25% | 0.00% | 0.00% | 1.00% | 0.25% | 28% | 36% | 29% | 38% | 26% | 34% | 26% | 34% | 30% | 39% | 28% | 28% | 27% | 27% |
| 5700 | 1.00% | 0.25% | 0.00% | 1.00% | 0.25% | 35% | 46% | 37% | 48% | 35% | 46% | 35% | 46% | 38% | 49% | 36% | 36% | 36% | 36% |
| 5701 | 0.00% | 1.00% | 0.00% | 1.00% | 0.25% | 39% | 51% | 43% | 56% | 33% | 43% | 37% | 48% | 45% | 59% | 38% | 38% | 38% | 38% |
| 5702 | 0.25% | 1.00% | 0.00% | 1.00% | 0.25% | 41% | 53% | 44% | 57% | 35% | 46% | 38% | 49% | 46% | 60% | 40% | 40% | 40% | 40% |
| 5703 | 1.00% | 1.00% | 0.00% | 1.00% | 0.25% | 43% | 56% | 45% | 59% | 38% | 49% | 40% | 52% | 48% | 62% | 42% | 42% | 42% | 42% |
| 5704 | 0.00% | 0.00% | 0.25% | 1.00% | 0.25% | 29% | 38% | 32% | 42% | 29% | 38% | 28% | 36% | 32% | 42% | 30% | 30% | 30% | 30% |
| 5705 | 1.00% | 0.00% | 0.25% | 1.00% | 0.25% | 33% | 43% | 34% | 44% | 34% | 44% | 31% | 40% | 35% | 46% | 34% | 34% | 33% | 33% |
| 5706 | 0.25% | 0.25% | 0.25% | 1.00% | 0.25% | 36% | 47% | 40% | 52% | 37% | 48% | 36% | 47% | 39% | 51% | 38% | 38% | 37% | 37% |
| 5707 | 1.00% | 0.25% | 0.25% | 1.00% | 0.25% | 38% | 49% | 41% | 53% | 40% | 52% | 38% | 49% | 41% | 53% | 40% | 40% | 40% | 40% |
| 5708 | 9.00% | 0.25% | 0.25% | 1.00% | 0.25% | 34% | 44% | 39% | 51% | 35% | 46% | 35% | 46% | 38% | 49% | 36% | 36% | 36% | 36% |
| 5709 | 0.00% | 1.00% | 0.25% | 1.00% | 0.25% | 42% | 55% | 47% | 61% | 38% | 49% | 40% | 52% | 48% | 62% | 42% | 42% | 42% | 42% |
| 5710 | 0.25% | 1.00% | 0.25% | 1.00% | 0.25% | 44% | 57% | 48% | 62% | 40% | 52% | 41% | 53% | 49% | 64% | 44% | 44% | 43% | 43% |
| 5711 | 1.00% | 1.00% | 0.25% | 1.00% | 0.25% | 46% | 60% | 49% | 64% | 43% | 56% | 43% | 56% | 51% | 66% | 46% | 46% | 46% | 46% |
| 5712 | 9.00% | 1.00% | 0.25% | 1.00% | 0.25% | 42% | 55% | 47% | 61% | 38% | 49% | 40% | 52% | 48% | 62% | 42% | 42% | 42% | 42% |
| 5713 | 0.25% | 9.00% | 0.25% | 1.00% | 0.25% | 57% | 74% | 58% | 75% | 44% | 57% | 52% | 68% | 59% | 77% | 53% | 53% | 52% | 52% |
| 5714 | 1.00% | 9.00% | 0.25% | 1.00% | 0.25% | 59% | 77% | 59% | 77% | 47% | 61% | 54% | 70% | 61% | 79% | 55% | 55% | 54% | 54% |
| 5715 | 9.00% | 9.00% | 0.25% | 1.00% | 0.25% | 55% | 72% | 57% | 74% | 42% | 55% | 51% | 66% | 58% | 75% | 51% | 51% | 50% | 50% |
| 5716 | 0.00% | 0.00% | 1.00% | 1.00% | 0.25% | 32% | 42% | 35% | 46% | 33% | 43% | 32% | 42% | 38% | 49% | 33% | 33% | 34% | 34% |
| 5717 | 0.25% | 0.00% | 1.00% | 1.00% | 0.25% | 34% | 44% | 36% | 47% | 35% | 46% | 33% | 43% | 39% | 51% | 35% | 35% | 36% | 36% |
| 5718 | 1.00% | 0.00% | 1.00% | 1.00% | 0.25% | 36% | 47% | 37% | 48% | 38% | 49% | 35% | 46% | 41% | 53% | 37% | 37% | 38% | 38% |
| 5719 | 0.00% | 0.25% | 1.00% | 1.00% | 0.25% | 37% | 48% | 42% | 55% | 39% | 51% | 39% | 51% | 44% | 57% | 39% | 39% | 41% | 41% |
| 5720 | 1.00% | 0.25% | 1.00% | 1.00% | 0.25% | 41% | 53% | 44% | 57% | 44% | 57% | 42% | 55% | 47% | 61% | 43% | 43% | 44% | 44% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5721 | 9.00% | 0.25% | 1.00% | 1.00% | 0.25% | 37% | 48% | 42% | 55% | 39% | 51% | 39% | 51% | 44% | 57% | 39% | 39% | 41% | 41% |
| 5722 | 0.00% | 1.00% | 1.00% | 1.00% | 0.25% | 45% | 59% | 50% | 65% | 42% | 55% | 44% | 57% | 54% | 70% | 46% | 46% | 47% | 47% |
| 5723 | 0.25% | 1.00% | 1.00% | 1.00% | 0.25% | 47% | 61% | 51% | 66% | 44% | 57% | 45% | 59% | 55% | 72% | 47% | 47% | 48% | 48% |
| 5724 | 1.00% | 1.00% | 1.00% | 1.00% | 0.25% | 49% | 64% | 52% | 68% | 47% | 61% | 47% | 61% | 57% | 74% | 49% | 49% | 50% | 50% |
| 5725 | 9.00% | 1.00% | 1.00% | 1.00% | 0.25% | 45% | 59% | 50% | 65% | 42% | 55% | 44% | 57% | 54% | 70% | 46% | 46% | 47% | 47% |
| 5726 | 0.00% | 9.00% | 1.00% | 1.00% | 0.25% | 58% | 75% | 60% | 78% | 46% | 60% | 55% | 72% | 64% | 83% | 55% | 55% | 55% | 55% |
| 5727 | 0.25% | 9.00% | 1.00% | 1.00% | 0.25% | 60% | 78% | 61% | 79% | 48% | 62% | 56% | 73% | 65% | 85% | 56% | 56% | 56% | 56% |
| 5728 | 1.00% | 9.00% | 1.00% | 1.00% | 0.25% | 62% | 81% | 62% | 81% | 51% | 66% | 58% | 75% | 67% | 87% | 58% | 58% | 59% | 59% |
| 5729 | 0.25% | 0.25% | 9.00% | 1.00% | 0.25% | 43% | 56% | 47% | 61% | 45% | 59% | 43% | 56% | 51% | 66% | 45% | 45% | 46% | 46% |
| 5730 | 1.00% | 0.25% | 9.00% | 1.00% | 0.25% | 45% | 59% | 48% | 62% | 48% | 62% | 45% | 59% | 53% | 69% | 47% | 47% | 49% | 49% |
| 5731 | 9.00% | 0.25% | 9.00% | 1.00% | 0.25% | 41% | 53% | 46% | 60% | 43% | 56% | 42% | 55% | 50% | 65% | 43% | 43% | 45% | 45% |
| 5732 | 0.25% | 1.00% | 9.00% | 1.00% | 0.25% | 51% | 66% | 55% | 72% | 48% | 62% | 48% | 62% | 61% | 79% | 51% | 51% | 52% | 52% |
| 5733 | 0.00% | 0.25% | 0.00% | 9.00% | 0.25% | 51% | 66% | 49% | 64% | 48% | 62% | 52% | 68% | 48% | 62% | 49% | 49% | 49% | 49% |
| 5734 | 0.00% | 0.00% | 0.25% | 9.00% | 0.25% | 49% | 64% | 46% | 60% | 47% | 61% | 48% | 62% | 45% | 59% | 47% | 47% | 47% | 47% |
| 5735 | 0.25% | 0.00% | 0.25% | 9.00% | 0.25% | 51% | 66% | 47% | 61% | 49% | 64% | 49% | 64% | 46% | 60% | 49% | 49% | 48% | 48% |
| 5736 | 0.00% | 0.25% | 0.25% | 9.00% | 0.25% | 54% | 70% | 53% | 69% | 53% | 69% | 55% | 72% | 51% | 66% | 53% | 53% | 53% | 53% |
| 5737 | 0.25% | 0.25% | 0.25% | 9.00% | 0.25% | 56% | 73% | 54% | 70% | 55% | 72% | 56% | 73% | 52% | 68% | 55% | 55% | 54% | 54% |
| 5738 | 1.00% | 0.25% | 0.25% | 9.00% | 0.25% | 58% | 75% | 55% | 72% | 58% | 75% | 58% | 75% | 54% | 70% | 57% | 57% | 57% | 57% |
| 5739 | 9.00% | 0.25% | 0.25% | 9.00% | 0.25% | 54% | 70% | 53% | 69% | 53% | 69% | 55% | 72% | 51% | 66% | 53% | 53% | 53% | 53% |
| 5740 | 0.00% | 1.00% | 0.25% | 9.00% | 0.25% | 62% | 81% | 61% | 79% | 56% | 73% | 60% | 78% | 61% | 79% | 60% | 60% | 59% | 59% |
| 5741 | 0.25% | 1.00% | 0.25% | 9.00% | 0.25% | 64% | 83% | 62% | 81% | 58% | 75% | 61% | 79% | 62% | 81% | 61% | 61% | 60% | 60% |
| 5742 | 1.00% | 1.00% | 0.25% | 9.00% | 0.25% | 66% | 86% | 63% | 82% | 61% | 79% | 63% | 82% | 64% | 83% | 63% | 63% | 63% | 63% |
| 5743 | 0.25% | 9.00% | 0.25% | 9.00% | 0.25% | 77% | 100% | 72% | 94% | 62% | 81% | 72% | 94% | 72% | 94% | 70% | 70% | 69% | 69% |
| 5744 | 0.25% | 0.00% | 1.00% | 9.00% | 0.25% | 54% | 70% | 50% | 65% | 53% | 69% | 53% | 69% | 52% | 68% | 52% | 52% | 53% | 53% |
| 5745 | 1.00% | 0.25% | 1.00% | 9.00% | 0.25% | 61% | 79% | 58% | 75% | 62% | 81% | 62% | 81% | 60% | 78% | 60% | 60% | 61% | 61% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5746 | 9.00% | 0.25% | 1.00% | 9.00% | 0.25% | 57% | 74% | 56% | 73% | 57% | 74% | 59% | 77% | 57% | 74% | 57% | 57% | 58% | 58% |
| 5747 | 0.00% | 1.00% | 1.00% | 9.00% | 0.25% | 65% | 85% | 64% | 83% | 60% | 78% | 64% | 83% | 67% | 87% | 63% | 63% | 64% | 64% |
| 5748 | 0.25% | 1.00% | 1.00% | 9.00% | 0.25% | 67% | 87% | 65% | 85% | 62% | 81% | 65% | 85% | 68% | 88% | 65% | 65% | 65% | 65% |
| 5749 | 1.00% | 1.00% | 1.00% | 9.00% | 0.25% | 69% | 90% | 66% | 86% | 65% | 85% | 67% | 87% | 70% | 91% | 67% | 67% | 67% | 67% |
| 5750 | 0.25% | 0.25% | 9.00% | 9.00% | 0.25% | 63% | 82% | 61% | 79% | 63% | 82% | 63% | 82% | 64% | 83% | 62% | 62% | 63% | 63% |
| 5751 | 0.25% | 0.25% | 0.00% | 0.00% | 1.00% | 18% | 23% | 21% | 27% | 19% | 25% | 18% | 23% | 25% | 33% | 19% | 19% | 21% | 21% |
| 5752 | 1.00% | 0.25% | 0.00% | 0.00% | 1.00% | 20% | 26% | 22% | 29% | 22% | 29% | 20% | 26% | 27% | 35% | 21% | 21% | 23% | 23% |
| 5753 | 0.25% | 1.00% | 0.00% | 0.00% | 1.00% | 26% | 34% | 29% | 38% | 22% | 29% | 23% | 30% | 35% | 46% | 26% | 26% | 27% | 27% |
| 5754 | 1.00% | 1.00% | 0.00% | 0.00% | 1.00% | 28% | 36% | 30% | 39% | 25% | 33% | 25% | 33% | 37% | 48% | 28% | 28% | 29% | 29% |
| 5755 | 0.25% | 0.00% | 0.25% | 0.00% | 1.00% | 16% | 21% | 18% | 23% | 18% | 23% | 14% | 18% | 22% | 29% | 17% | 17% | 18% | 18% |
| 5756 | 1.00% | 0.00% | 0.25% | 0.00% | 1.00% | 18% | 23% | 19% | 25% | 21% | 27% | 16% | 21% | 24% | 31% | 19% | 19% | 20% | 20% |
| 5757 | 0.00% | 0.25% | 0.25% | 0.00% | 1.00% | 19% | 25% | 24% | 31% | 22% | 29% | 20% | 26% | 27% | 35% | 22% | 22% | 23% | 23% |
| 5758 | 0.25% | 0.25% | 0.25% | 0.00% | 1.00% | 21% | 27% | 25% | 33% | 24% | 31% | 21% | 27% | 28% | 36% | 23% | 23% | 24% | 24% |
| 5759 | 0.00% | 1.00% | 0.25% | 0.00% | 1.00% | 27% | 35% | 32% | 42% | 25% | 33% | 25% | 33% | 37% | 48% | 28% | 28% | 29% | 29% |
| 5760 | 1.00% | 1.00% | 0.25% | 0.00% | 1.00% | 31% | 40% | 34% | 44% | 30% | 39% | 28% | 36% | 40% | 52% | 32% | 32% | 33% | 33% |
| 5761 | 1.00% | 9.00% | 0.25% | 0.00% | 1.00% | 44% | 57% | 44% | 57% | 34% | 44% | 39% | 51% | 50% | 65% | 41% | 41% | 41% | 41% |
| 5762 | 0.25% | 0.00% | 1.00% | 0.00% | 1.00% | 19% | 25% | 21% | 27% | 22% | 29% | 18% | 23% | 28% | 36% | 21% | 21% | 23% | 23% |
| 5763 | 1.00% | 0.00% | 1.00% | 0.00% | 1.00% | 21% | 27% | 22% | 29% | 25% | 33% | 20% | 26% | 30% | 39% | 23% | 23% | 25% | 25% |
| 5764 | 0.00% | 0.25% | 1.00% | 0.00% | 1.00% | 22% | 29% | 27% | 35% | 26% | 34% | 24% | 31% | 33% | 43% | 25% | 25% | 28% | 28% |
| 5765 | 1.00% | 0.25% | 1.00% | 0.00% | 1.00% | 26% | 34% | 29% | 38% | 31% | 40% | 27% | 35% | 36% | 47% | 29% | 29% | 31% | 31% |
| 5766 | 0.00% | 1.00% | 1.00% | 0.00% | 1.00% | 30% | 39% | 35% | 46% | 29% | 38% | 29% | 38% | 43% | 56% | 31% | 31% | 34% | 34% |
| 5767 | 0.25% | 1.00% | 1.00% | 0.00% | 1.00% | 32% | 42% | 36% | 47% | 31% | 40% | 30% | 39% | 44% | 57% | 33% | 33% | 35% | 35% |
| 5768 | 1.00% | 1.00% | 1.00% | 0.00% | 1.00% | 34% | 44% | 37% | 48% | 34% | 44% | 32% | 42% | 46% | 60% | 35% | 35% | 37% | 37% |
| 5769 | 9.00% | 1.00% | 1.00% | 0.00% | 1.00% | 30% | 39% | 35% | 46% | 29% | 38% | 29% | 38% | 43% | 56% | 31% | 31% | 34% | 34% |
| 5770 | 1.00% | 9.00% | 1.00% | 0.00% | 1.00% | 47% | 61% | 47% | 61% | 38% | 49% | 43% | 56% | 56% | 73% | 44% | 44% | 46% | 46% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5771 | 0.25% | 0.00% | 9.00% | 0.00% | 1.00% | 23% | 30% | 25% | 33% | 26% | 34% | 21% | 27% | 34% | 44% | 25% | 25% | 27% | 27% |
| 5772 | 0.00% | 0.25% | 9.00% | 0.00% | 1.00% | 26% | 34% | 31% | 40% | 30% | 39% | 27% | 35% | 39% | 51% | 29% | 29% | 32% | 32% |
| 5773 | 0.25% | 0.25% | 9.00% | 0.00% | 1.00% | 28% | 36% | 32% | 42% | 32% | 42% | 28% | 36% | 40% | 52% | 31% | 31% | 33% | 33% |
| 5774 | 1.00% | 0.25% | 9.00% | 0.00% | 1.00% | 30% | 39% | 33% | 43% | 35% | 46% | 30% | 39% | 42% | 55% | 33% | 33% | 36% | 36% |
| 5775 | 0.25% | 1.00% | 9.00% | 0.00% | 1.00% | 36% | 47% | 40% | 52% | 35% | 46% | 33% | 43% | 50% | 65% | 37% | 37% | 39% | 39% |
| 5776 | 0.25% | 0.00% | 0.00% | 0.25% | 1.00% | 18% | 23% | 23% | 30% | 19% | 25% | 21% | 27% | 26% | 34% | 20% | 20% | 22% | 22% |
| 5777 | 1.00% | 0.00% | 0.00% | 0.25% | 1.00% | 20% | 26% | 24% | 31% | 22% | 29% | 23% | 30% | 28% | 36% | 22% | 22% | 24% | 24% |
| 5778 | 0.00% | 0.25% | 0.00% | 0.25% | 1.00% | 21% | 27% | 29% | 38% | 23% | 30% | 27% | 35% | 31% | 40% | 24% | 24% | 27% | 27% |
| 5779 | 0.25% | 0.25% | 0.00% | 0.25% | 1.00% | 23% | 30% | 30% | 39% | 25% | 33% | 28% | 36% | 32% | 42% | 26% | 26% | 28% | 28% |
| 5780 | 9.00% | 0.25% | 0.00% | 0.25% | 1.00% | 21% | 27% | 29% | 38% | 23% | 30% | 27% | 35% | 31% | 40% | 24% | 24% | 27% | 27% |
| 5781 | 1.00% | 1.00% | 0.00% | 0.25% | 1.00% | 33% | 43% | 39% | 51% | 31% | 40% | 35% | 46% | 44% | 57% | 34% | 34% | 37% | 37% |
| 5782 | 1.00% | 9.00% | 0.00% | 0.25% | 1.00% | 46% | 60% | 49% | 64% | 35% | 46% | 46% | 60% | 54% | 70% | 43% | 43% | 45% | 45% |
| 5783 | 0.00% | 0.00% | 0.25% | 0.25% | 1.00% | 19% | 25% | 26% | 34% | 22% | 29% | 23% | 30% | 28% | 36% | 22% | 22% | 24% | 24% |
| 5784 | 0.25% | 0.00% | 0.25% | 0.25% | 1.00% | 21% | 27% | 27% | 35% | 24% | 31% | 24% | 31% | 29% | 38% | 24% | 24% | 26% | 26% |
| 5785 | 0.00% | 0.25% | 0.25% | 0.25% | 1.00% | 24% | 31% | 33% | 43% | 28% | 36% | 30% | 39% | 34% | 44% | 28% | 28% | 31% | 31% |
| 5786 | 0.25% | 0.25% | 0.25% | 0.25% | 1.00% | 26% | 34% | 34% | 44% | 30% | 39% | 31% | 40% | 35% | 46% | 30% | 30% | 32% | 32% |
| 5787 | 1.00% | 0.25% | 0.25% | 0.25% | 1.00% | 28% | 36% | 35% | 46% | 33% | 43% | 33% | 43% | 37% | 48% | 32% | 32% | 34% | 34% |
| 5788 | 9.00% | 0.25% | 0.25% | 0.25% | 1.00% | 24% | 31% | 33% | 43% | 28% | 36% | 30% | 39% | 34% | 44% | 28% | 28% | 31% | 31% |
| 5789 | 0.25% | 1.00% | 0.25% | 0.25% | 1.00% | 34% | 44% | 42% | 55% | 33% | 43% | 36% | 47% | 45% | 59% | 36% | 36% | 38% | 38% |
| 5790 | 9.00% | 1.00% | 0.25% | 0.25% | 1.00% | 32% | 42% | 41% | 53% | 31% | 40% | 35% | 46% | 44% | 57% | 35% | 35% | 37% | 37% |
| 5791 | 0.25% | 9.00% | 0.25% | 0.25% | 1.00% | 47% | 61% | 52% | 68% | 37% | 48% | 47% | 61% | 55% | 72% | 45% | 45% | 46% | 46% |
| 5792 | 1.00% | 9.00% | 0.25% | 0.25% | 1.00% | 49% | 64% | 53% | 69% | 40% | 52% | 49% | 64% | 57% | 74% | 47% | 47% | 49% | 49% |
| 5793 | 9.00% | 9.00% | 0.25% | 0.25% | 1.00% | 45% | 59% | 51% | 66% | 35% | 46% | 46% | 60% | 54% | 70% | 44% | 44% | 45% | 45% |
| 5794 | 0.00% | 0.00% | 1.00% | 0.25% | 1.00% | 22% | 29% | 29% | 38% | 26% | 34% | 27% | 35% | 34% | 44% | 26% | 26% | 29% | 29% |
| 5795 | 1.00% | 0.00% | 1.00% | 0.25% | 1.00% | 26% | 34% | 31% | 40% | 31% | 40% | 30% | 39% | 37% | 48% | 29% | 29% | 33% | 33% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5796 | 0.00% | 0.25% | 1.00% | 0.25% | 1.00% | 27% | 35% | 36% | 47% | 32% | 42% | 34% | 44% | 40% | 52% | 32% | 32% | 35% | 35% |
| 5797 | 0.25% | 0.25% | 1.00% | 0.25% | 1.00% | 29% | 38% | 37% | 48% | 34% | 44% | 35% | 46% | 41% | 53% | 33% | 33% | 37% | 37% |
| 5798 | 1.00% | 0.25% | 1.00% | 0.25% | 1.00% | 31% | 40% | 38% | 49% | 37% | 48% | 37% | 48% | 43% | 56% | 35% | 35% | 39% | 39% |
| 5799 | 9.00% | 0.25% | 1.00% | 0.25% | 1.00% | 27% | 35% | 36% | 47% | 32% | 42% | 34% | 44% | 40% | 52% | 32% | 32% | 35% | 35% |
| 5800 | 0.00% | 1.00% | 1.00% | 0.25% | 1.00% | 35% | 46% | 44% | 57% | 35% | 46% | 39% | 51% | 50% | 65% | 38% | 38% | 41% | 41% |
| 5801 | 0.25% | 1.00% | 1.00% | 0.25% | 1.00% | 37% | 48% | 45% | 59% | 37% | 48% | 40% | 52% | 51% | 66% | 40% | 40% | 43% | 43% |
| 5802 | 1.00% | 1.00% | 1.00% | 0.25% | 1.00% | 39% | 51% | 46% | 60% | 40% | 52% | 42% | 55% | 53% | 69% | 42% | 42% | 45% | 45% |
| 5803 | 9.00% | 1.00% | 1.00% | 0.25% | 1.00% | 35% | 46% | 44% | 57% | 35% | 46% | 39% | 51% | 50% | 65% | 38% | 38% | 41% | 41% |
| 5804 | 0.00% | 9.00% | 1.00% | 0.25% | 1.00% | 48% | 62% | 54% | 70% | 39% | 51% | 50% | 65% | 60% | 78% | 47% | 47% | 50% | 50% |
| 5805 | 0.25% | 9.00% | 1.00% | 0.25% | 1.00% | 50% | 65% | 55% | 72% | 41% | 53% | 51% | 66% | 61% | 79% | 49% | 49% | 51% | 51% |
| 5806 | 1.00% | 9.00% | 1.00% | 0.25% | 1.00% | 52% | 68% | 56% | 73% | 44% | 57% | 53% | 69% | 63% | 82% | 51% | 51% | 53% | 53% |
| 5807 | 0.25% | 0.25% | 9.00% | 0.25% | 1.00% | 33% | 43% | 41% | 53% | 38% | 49% | 38% | 49% | 47% | 61% | 37% | 37% | 41% | 41% |
| 5808 | 1.00% | 0.25% | 9.00% | 0.25% | 1.00% | 35% | 46% | 42% | 55% | 41% | 53% | 40% | 52% | 49% | 64% | 39% | 39% | 43% | 43% |
| 5809 | 9.00% | 0.25% | 9.00% | 0.25% | 1.00% | 31% | 40% | 40% | 52% | 36% | 47% | 37% | 48% | 46% | 60% | 36% | 36% | 40% | 40% |
| 5810 | 0.00% | 1.00% | 9.00% | 0.25% | 1.00% | 39% | 51% | 48% | 62% | 39% | 51% | 42% | 55% | 56% | 73% | 42% | 42% | 46% | 46% |
| 5811 | 0.25% | 1.00% | 9.00% | 0.25% | 1.00% | 41% | 53% | 49% | 64% | 41% | 53% | 43% | 56% | 57% | 74% | 44% | 44% | 47% | 47% |
| 5812 | 9.00% | 1.00% | 9.00% | 0.25% | 1.00% | 39% | 51% | 48% | 62% | 39% | 51% | 42% | 55% | 56% | 73% | 42% | 42% | 46% | 46% |
| 5813 | 1.00% | 9.00% | 9.00% | 0.25% | 1.00% | 56% | 73% | 60% | 78% | 48% | 62% | 56% | 73% | 69% | 90% | 55% | 55% | 58% | 58% |
| 5814 | 0.25% | 0.00% | 0.00% | 1.00% | 1.00% | 33% | 43% | 35% | 46% | 31% | 40% | 31% | 40% | 41% | 53% | 33% | 33% | 34% | 34% |
| 5815 | 1.00% | 0.25% | 0.00% | 1.00% | 1.00% | 40% | 52% | 43% | 56% | 40% | 52% | 40% | 52% | 49% | 64% | 41% | 41% | 43% | 43% |
| 5816 | 0.00% | 1.00% | 0.00% | 1.00% | 1.00% | 44% | 57% | 49% | 64% | 38% | 49% | 42% | 55% | 56% | 73% | 44% | 44% | 45% | 45% |
| 5817 | 0.25% | 1.00% | 0.00% | 1.00% | 1.00% | 46% | 60% | 50% | 65% | 40% | 52% | 43% | 56% | 57% | 74% | 45% | 45% | 47% | 47% |
| 5818 | 1.00% | 1.00% | 0.00% | 1.00% | 1.00% | 48% | 62% | 51% | 66% | 43% | 56% | 45% | 59% | 59% | 77% | 47% | 47% | 49% | 49% |
| 5819 | 0.00% | 0.00% | 0.25% | 1.00% | 1.00% | 34% | 44% | 38% | 49% | 34% | 44% | 33% | 43% | 43% | 56% | 35% | 35% | 37% | 37% |
| 5820 | 1.00% | 0.00% | 0.25% | 1.00% | 1.00% | 38% | 49% | 40% | 52% | 39% | 51% | 36% | 47% | 46% | 60% | 39% | 39% | 40% | 40% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5821 | 0.25% | 0.25% | 0.25% | 1.00% | 1.00% | 41% | 53% | 46% | 60% | 42% | 55% | 41% | 53% | 50% | 65% | 43% | 43% | 44% | 44% |
| 5822 | 1.00% | 0.25% | 0.25% | 1.00% | 1.00% | 43% | 56% | 47% | 61% | 45% | 59% | 43% | 56% | 52% | 68% | 45% | 45% | 47% | 47% |
| 5823 | 9.00% | 0.25% | 0.25% | 1.00% | 1.00% | 39% | 51% | 45% | 59% | 40% | 52% | 40% | 52% | 49% | 64% | 41% | 41% | 43% | 43% |
| 5824 | 0.00% | 1.00% | 0.25% | 1.00% | 1.00% | 47% | 61% | 53% | 69% | 43% | 56% | 45% | 59% | 59% | 77% | 48% | 48% | 49% | 49% |
| 5825 | 0.25% | 1.00% | 0.25% | 1.00% | 1.00% | 49% | 64% | 54% | 70% | 45% | 59% | 46% | 60% | 60% | 78% | 49% | 49% | 50% | 50% |
| 5826 | 1.00% | 1.00% | 0.25% | 1.00% | 1.00% | 51% | 66% | 55% | 72% | 48% | 62% | 48% | 62% | 62% | 81% | 51% | 51% | 53% | 53% |
| 5827 | 9.00% | 1.00% | 0.25% | 1.00% | 1.00% | 47% | 61% | 53% | 69% | 43% | 56% | 45% | 59% | 59% | 77% | 48% | 48% | 49% | 49% |
| 5828 | 0.25% | 9.00% | 0.25% | 1.00% | 1.00% | 62% | 81% | 64% | 83% | 49% | 64% | 57% | 74% | 70% | 91% | 58% | 58% | 59% | 59% |
| 5829 | 1.00% | 9.00% | 0.25% | 1.00% | 1.00% | 64% | 83% | 65% | 85% | 52% | 68% | 59% | 77% | 72% | 94% | 60% | 60% | 61% | 61% |
| 5830 | 9.00% | 9.00% | 0.25% | 1.00% | 1.00% | 60% | 78% | 63% | 82% | 47% | 61% | 56% | 73% | 69% | 90% | 57% | 57% | 57% | 57% |
| 5831 | 0.00% | 0.00% | 1.00% | 1.00% | 1.00% | 37% | 48% | 41% | 53% | 38% | 49% | 37% | 48% | 49% | 64% | 39% | 39% | 41% | 41% |
| 5832 | 0.25% | 0.00% | 1.00% | 1.00% | 1.00% | 39% | 51% | 42% | 55% | 40% | 52% | 38% | 49% | 50% | 65% | 40% | 40% | 43% | 43% |
| 5833 | 1.00% | 0.00% | 1.00% | 1.00% | 1.00% | 41% | 53% | 43% | 56% | 43% | 56% | 40% | 52% | 52% | 68% | 42% | 42% | 45% | 45% |
| 5834 | 0.00% | 0.25% | 1.00% | 1.00% | 1.00% | 42% | 55% | 48% | 62% | 44% | 57% | 44% | 57% | 55% | 72% | 45% | 45% | 48% | 48% |
| 5835 | 1.00% | 0.25% | 1.00% | 1.00% | 1.00% | 46% | 60% | 50% | 65% | 49% | 64% | 47% | 61% | 58% | 75% | 48% | 48% | 51% | 51% |
| 5836 | 9.00% | 0.25% | 1.00% | 1.00% | 1.00% | 42% | 55% | 48% | 62% | 44% | 57% | 44% | 57% | 55% | 72% | 45% | 45% | 48% | 48% |
| 5837 | 0.00% | 1.00% | 1.00% | 1.00% | 1.00% | 50% | 65% | 56% | 73% | 47% | 61% | 49% | 64% | 65% | 85% | 51% | 51% | 54% | 54% |
| 5838 | 0.25% | 1.00% | 1.00% | 1.00% | 1.00% | 52% | 68% | 57% | 74% | 49% | 64% | 50% | 65% | 66% | 86% | 53% | 53% | 55% | 55% |
| 5839 | 1.00% | 1.00% | 1.00% | 1.00% | 1.00% | 54% | 70% | 58% | 75% | 52% | 68% | 52% | 68% | 68% | 88% | 55% | 55% | 57% | 57% |
| 5840 | 9.00% | 1.00% | 1.00% | 1.00% | 1.00% | 50% | 65% | 56% | 73% | 47% | 61% | 49% | 64% | 65% | 85% | 51% | 51% | 54% | 54% |
| 5841 | 0.00% | 9.00% | 1.00% | 1.00% | 1.00% | 63% | 82% | 66% | 86% | 51% | 66% | 60% | 78% | 75% | 98% | 60% | 60% | 62% | 62% |
| 5842 | 0.25% | 9.00% | 1.00% | 1.00% | 1.00% | 65% | 85% | 67% | 87% | 53% | 69% | 61% | 79% | 76% | 99% | 62% | 62% | 63% | 63% |
| 5843 | 1.00% | 9.00% | 1.00% | 1.00% | 1.00% | 67% | 87% | 68% | 88% | 56% | 73% | 63% | 82% | 78% | 100% | 64% | 64% | 66% | 66% |
| 5844 | 0.25% | 0.25% | 9.00% | 1.00% | 1.00% | 48% | 62% | 53% | 69% | 50% | 65% | 48% | 62% | 62% | 81% | 50% | 50% | 53% | 53% |
| 5845 | 1.00% | 0.25% | 9.00% | 1.00% | 1.00% | 50% | 65% | 54% | 70% | 53% | 69% | 50% | 65% | 64% | 83% | 52% | 52% | 56% | 56% |

Fig. 22

| Formula # | Gamma Dodecalactone | Methyl Apritone | Propyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5846 | 9.00% | 0.25% | 9.00% | 1.00% | 1.00% | 46% | 60% | 52% | 68% | 48% | 62% | 47% | 61% | 61% | 79% | 49% | 49% | 52% | 52% |
| 5847 | 0.25% | 1.00% | 9.00% | 1.00% | 1.00% | 56% | 73% | 61% | 79% | 53% | 69% | 53% | 69% | 72% | 94% | 57% | 57% | 59% | 59% |
| 5848 | 0.00% | 0.25% | 0.00% | 9.00% | 1.00% | 56% | 73% | 55% | 72% | 53% | 69% | 57% | 74% | 59% | 77% | 55% | 55% | 56% | 56% |
| 5849 | 0.00% | 0.00% | 0.25% | 9.00% | 1.00% | 54% | 70% | 52% | 68% | 52% | 68% | 53% | 69% | 56% | 73% | 53% | 53% | 54% | 54% |
| 5850 | 0.25% | 0.00% | 0.25% | 9.00% | 1.00% | 56% | 73% | 53% | 69% | 54% | 70% | 54% | 70% | 57% | 74% | 54% | 54% | 55% | 55% |
| 5851 | 0.00% | 0.25% | 0.25% | 9.00% | 1.00% | 59% | 77% | 59% | 77% | 58% | 75% | 60% | 78% | 62% | 81% | 59% | 59% | 60% | 60% |
| 5852 | 0.25% | 0.25% | 0.25% | 9.00% | 1.00% | 61% | 79% | 60% | 78% | 60% | 78% | 61% | 79% | 63% | 82% | 60% | 60% | 61% | 61% |
| 5853 | 1.00% | 0.25% | 0.25% | 9.00% | 1.00% | 63% | 82% | 61% | 79% | 63% | 82% | 63% | 82% | 65% | 85% | 62% | 62% | 64% | 64% |
| 5854 | 9.00% | 0.25% | 0.25% | 9.00% | 1.00% | 59% | 77% | 59% | 77% | 58% | 75% | 60% | 78% | 62% | 81% | 59% | 59% | 60% | 60% |
| 5855 | 0.00% | 1.00% | 0.25% | 9.00% | 1.00% | 67% | 87% | 67% | 87% | 61% | 79% | 65% | 85% | 72% | 94% | 65% | 65% | 66% | 66% |
| 5856 | 0.25% | 1.00% | 0.25% | 9.00% | 1.00% | 69% | 90% | 68% | 88% | 63% | 82% | 66% | 86% | 73% | 95% | 67% | 67% | 67% | 67% |
| 5857 | 1.00% | 1.00% | 0.25% | 9.00% | 1.00% | 71% | 92% | 69% | 90% | 66% | 86% | 68% | 88% | 75% | 98% | 69% | 69% | 70% | 70% |
| 5858 | 0.25% | 9.00% | 0.25% | 9.00% | 1.00% | 82% | 100% | 78% | 100% | 67% | 87% | 77% | 100% | 83% | 100% | 76% | 76% | 76% | 76% |
| 5859 | 0.25% | 0.00% | 1.00% | 9.00% | 1.00% | 59% | 77% | 56% | 73% | 58% | 75% | 58% | 75% | 63% | 82% | 58% | 58% | 60% | 60% |
| 5860 | 1.00% | 0.25% | 1.00% | 9.00% | 1.00% | 66% | 86% | 64% | 83% | 67% | 87% | 67% | 87% | 71% | 92% | 66% | 66% | 68% | 68% |
| 5861 | 9.00% | 0.25% | 1.00% | 9.00% | 1.00% | 62% | 81% | 62% | 81% | 62% | 81% | 64% | 83% | 68% | 88% | 62% | 62% | 65% | 65% |
| 5862 | 0.00% | 1.00% | 1.00% | 9.00% | 1.00% | 70% | 91% | 70% | 91% | 65% | 85% | 69% | 90% | 78% | 100% | 68% | 68% | 71% | 71% |
| 5863 | 0.25% | 1.00% | 1.00% | 9.00% | 1.00% | 72% | 94% | 71% | 92% | 67% | 87% | 70% | 91% | 79% | 100% | 70% | 70% | 72% | 72% |
| 5864 | 1.00% | 1.00% | 1.00% | 9.00% | 1.00% | 74% | 96% | 72% | 94% | 70% | 91% | 72% | 94% | 81% | 100% | 72% | 72% | 74% | 74% |
| 5865 | 0.25% | 0.25% | 9.00% | 9.00% | 1.00% | 68% | 88% | 67% | 87% | 68% | 88% | 68% | 88% | 75% | 98% | 68% | 68% | 70% | 70% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5866 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 5867 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 5868 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 5869 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 5870 | 0.25% | 0.00% | 0.25% | 0.00% | 0.00% | 5% | 7% | 5% | 7% | 7% | 9% | 4% | 5% | 4% | 5% | 6% | 6% | 5% | 5% |
| 5871 | 1.00% | 0.00% | 0.25% | 0.00% | 0.00% | 7% | 9% | 6% | 8% | 10% | 13% | 6% | 8% | 6% | 8% | 8% | 8% | 7% | 7% |
| 5872 | 0.00% | 0.25% | 0.25% | 0.00% | 0.00% | 8% | 10% | 11% | 14% | 11% | 14% | 10% | 13% | 9% | 12% | 10% | 10% | 10% | 10% |
| 5873 | 0.25% | 0.25% | 0.25% | 0.00% | 0.00% | 10% | 13% | 12% | 16% | 13% | 17% | 11% | 14% | 10% | 13% | 12% | 12% | 11% | 11% |
| 5874 | 0.00% | 1.00% | 0.25% | 0.00% | 0.00% | 16% | 21% | 19% | 25% | 14% | 18% | 15% | 20% | 19% | 25% | 16% | 16% | 16% | 16% |
| 5875 | 1.00% | 1.00% | 0.25% | 0.00% | 0.00% | 20% | 26% | 21% | 27% | 19% | 25% | 18% | 23% | 22% | 29% | 20% | 20% | 20% | 20% |
| 5876 | 1.00% | 9.00% | 0.25% | 0.00% | 0.00% | 33% | 43% | 31% | 40% | 23% | 30% | 29% | 38% | 32% | 42% | 29% | 29% | 28% | 28% |
| 5877 | 0.25% | 0.00% | 1.00% | 0.00% | 0.00% | 8% | 10% | 8% | 10% | 11% | 14% | 8% | 10% | 10% | 13% | 9% | 9% | 10% | 10% |
| 5878 | 1.00% | 0.00% | 1.00% | 0.00% | 0.00% | 10% | 13% | 9% | 12% | 14% | 18% | 10% | 13% | 12% | 16% | 11% | 11% | 12% | 12% |
| 5879 | 0.00% | 0.25% | 1.00% | 0.00% | 0.00% | 11% | 14% | 14% | 18% | 15% | 20% | 14% | 18% | 15% | 20% | 13% | 13% | 15% | 15% |
| 5880 | 1.00% | 0.25% | 1.00% | 0.00% | 0.00% | 15% | 20% | 16% | 21% | 20% | 26% | 17% | 22% | 18% | 23% | 17% | 17% | 18% | 18% |
| 5881 | 0.00% | 1.00% | 1.00% | 0.00% | 0.00% | 19% | 25% | 22% | 29% | 18% | 23% | 19% | 25% | 25% | 33% | 20% | 20% | 21% | 21% |
| 5882 | 0.25% | 1.00% | 1.00% | 0.00% | 0.00% | 21% | 27% | 23% | 30% | 20% | 26% | 20% | 26% | 26% | 34% | 21% | 21% | 22% | 22% |
| 5883 | 1.00% | 1.00% | 1.00% | 0.00% | 0.00% | 23% | 30% | 24% | 31% | 23% | 30% | 22% | 29% | 28% | 36% | 23% | 23% | 24% | 24% |
| 5884 | 9.00% | 1.00% | 1.00% | 0.00% | 0.00% | 19% | 25% | 22% | 29% | 18% | 23% | 19% | 25% | 25% | 33% | 20% | 20% | 21% | 21% |
| 5885 | 1.00% | 9.00% | 1.00% | 0.00% | 0.00% | 36% | 47% | 34% | 44% | 27% | 35% | 33% | 43% | 38% | 49% | 32% | 32% | 33% | 33% |
| 5886 | 0.25% | 0.00% | 9.00% | 0.00% | 0.00% | 12% | 16% | 12% | 16% | 15% | 20% | 11% | 14% | 16% | 21% | 13% | 13% | 14% | 14% |
| 5887 | 0.00% | 0.25% | 9.00% | 0.00% | 0.00% | 15% | 20% | 18% | 23% | 19% | 25% | 17% | 22% | 21% | 27% | 17% | 17% | 19% | 19% |
| 5888 | 0.25% | 0.25% | 9.00% | 0.00% | 0.00% | 17% | 22% | 19% | 25% | 21% | 27% | 18% | 23% | 22% | 29% | 19% | 19% | 20% | 20% |
| 5889 | 1.00% | 0.25% | 9.00% | 0.00% | 0.00% | 19% | 25% | 20% | 26% | 24% | 31% | 20% | 26% | 24% | 31% | 21% | 21% | 23% | 23% |
| 5890 | 0.25% | 1.00% | 9.00% | 0.00% | 0.00% | 25% | 33% | 27% | 35% | 24% | 31% | 23% | 30% | 32% | 42% | 25% | 25% | 26% | 26% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5891 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 5892 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 5893 | 0.00% | 0.25% | 0.00% | 0.25% | 0.00% | 12% | 16% | 12% | 16% | 11% | 14% | 17% | 22% | 12% | 16% | 12% | 12% | 13% | 13% |
| 5894 | 0.25% | 0.25% | 0.00% | 0.25% | 0.00% | 14% | 18% | 13% | 17% | 13% | 17% | 18% | 23% | 13% | 17% | 13% | 13% | 15% | 15% |
| 5895 | 9.00% | 0.25% | 0.00% | 0.25% | 0.00% | 12% | 16% | 12% | 16% | 11% | 14% | 17% | 22% | 12% | 16% | 12% | 12% | 13% | 13% |
| 5896 | 1.00% | 1.00% | 0.00% | 0.25% | 0.00% | 24% | 31% | 22% | 29% | 19% | 25% | 25% | 33% | 25% | 33% | 22% | 22% | 23% | 23% |
| 5897 | 1.00% | 9.00% | 0.00% | 0.25% | 0.00% | 37% | 48% | 32% | 42% | 23% | 30% | 36% | 47% | 35% | 46% | 31% | 31% | 31% | 31% |
| 5898 | 0.00% | 0.00% | 0.25% | 0.25% | 0.00% | 10% | 13% | 9% | 12% | 10% | 13% | 13% | 17% | 9% | 12% | 10% | 10% | 11% | 11% |
| 5899 | 0.25% | 0.00% | 0.25% | 0.25% | 0.00% | 12% | 16% | 10% | 13% | 12% | 16% | 14% | 18% | 10% | 13% | 11% | 11% | 12% | 12% |
| 5900 | 0.00% | 0.25% | 0.25% | 0.25% | 0.00% | 15% | 20% | 16% | 21% | 16% | 21% | 20% | 26% | 15% | 20% | 16% | 16% | 17% | 17% |
| 5901 | 0.25% | 0.25% | 0.25% | 0.25% | 0.00% | 17% | 22% | 17% | 22% | 18% | 23% | 21% | 27% | 16% | 21% | 17% | 17% | 18% | 18% |
| 5902 | 1.00% | 0.25% | 0.25% | 0.25% | 0.00% | 19% | 25% | 18% | 23% | 21% | 27% | 23% | 30% | 18% | 23% | 19% | 19% | 21% | 21% |
| 5903 | 9.00% | 0.25% | 0.25% | 0.25% | 0.00% | 15% | 20% | 16% | 21% | 16% | 21% | 20% | 26% | 15% | 20% | 16% | 16% | 17% | 17% |
| 5904 | 0.25% | 1.00% | 0.25% | 0.25% | 0.00% | 25% | 33% | 25% | 33% | 21% | 27% | 26% | 34% | 26% | 34% | 24% | 24% | 24% | 24% |
| 5905 | 9.00% | 1.00% | 0.25% | 0.25% | 0.00% | 23% | 30% | 24% | 31% | 19% | 25% | 25% | 33% | 25% | 33% | 22% | 22% | 23% | 23% |
| 5906 | 0.25% | 9.00% | 0.25% | 0.25% | 0.00% | 38% | 49% | 35% | 46% | 25% | 33% | 37% | 48% | 36% | 47% | 33% | 33% | 33% | 33% |
| 5907 | 1.00% | 9.00% | 0.25% | 0.25% | 0.00% | 40% | 52% | 36% | 47% | 28% | 36% | 39% | 51% | 38% | 49% | 35% | 35% | 35% | 35% |
| 5908 | 9.00% | 9.00% | 0.25% | 0.25% | 0.00% | 36% | 47% | 34% | 44% | 23% | 30% | 36% | 47% | 35% | 46% | 31% | 31% | 31% | 31% |
| 5909 | 0.00% | 0.00% | 1.00% | 0.25% | 0.00% | 13% | 17% | 12% | 16% | 14% | 18% | 17% | 22% | 15% | 20% | 13% | 13% | 15% | 15% |
| 5910 | 1.00% | 0.00% | 1.00% | 0.25% | 0.00% | 17% | 22% | 14% | 18% | 19% | 25% | 20% | 26% | 18% | 23% | 17% | 17% | 19% | 19% |
| 5911 | 0.00% | 0.25% | 1.00% | 0.25% | 0.00% | 18% | 23% | 19% | 25% | 20% | 26% | 24% | 31% | 21% | 27% | 19% | 19% | 22% | 22% |
| 5912 | 0.25% | 0.25% | 1.00% | 0.25% | 0.00% | 20% | 26% | 20% | 26% | 22% | 29% | 25% | 33% | 22% | 29% | 21% | 21% | 23% | 23% |
| 5913 | 1.00% | 0.25% | 1.00% | 0.25% | 0.00% | 22% | 29% | 21% | 27% | 25% | 33% | 27% | 35% | 24% | 31% | 23% | 23% | 25% | 25% |
| 5914 | 9.00% | 0.25% | 1.00% | 0.25% | 0.00% | 18% | 23% | 19% | 25% | 20% | 26% | 24% | 31% | 21% | 27% | 19% | 19% | 22% | 22% |
| 5915 | 0.00% | 1.00% | 1.00% | 0.25% | 0.00% | 26% | 34% | 27% | 35% | 23% | 30% | 29% | 38% | 31% | 40% | 25% | 25% | 28% | 28% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5916 | 0.25% | 1.00% | 1.00% | 0.25% | 0.00% | 28% | 36% | 28% | 36% | 25% | 33% | 30% | 39% | 32% | 42% | 27% | 27% | 29% | 29% |
| 5917 | 1.00% | 1.00% | 1.00% | 0.25% | 0.00% | 30% | 39% | 29% | 38% | 28% | 36% | 32% | 42% | 34% | 44% | 29% | 29% | 31% | 31% |
| 5918 | 9.00% | 1.00% | 1.00% | 0.25% | 0.00% | 26% | 34% | 27% | 35% | 23% | 30% | 29% | 38% | 31% | 40% | 25% | 25% | 28% | 28% |
| 5919 | 0.00% | 9.00% | 1.00% | 0.25% | 0.00% | 39% | 51% | 37% | 48% | 27% | 35% | 40% | 52% | 41% | 53% | 34% | 34% | 36% | 36% |
| 5920 | 0.25% | 9.00% | 1.00% | 0.25% | 0.00% | 41% | 53% | 38% | 49% | 29% | 38% | 41% | 53% | 42% | 55% | 36% | 36% | 37% | 37% |
| 5921 | 1.00% | 9.00% | 1.00% | 0.25% | 0.00% | 43% | 56% | 39% | 51% | 32% | 42% | 43% | 56% | 44% | 57% | 38% | 38% | 40% | 40% |
| 5922 | 0.25% | 0.25% | 9.00% | 0.25% | 0.00% | 24% | 31% | 24% | 31% | 26% | 34% | 28% | 36% | 28% | 36% | 25% | 25% | 27% | 27% |
| 5923 | 1.00% | 0.25% | 9.00% | 0.25% | 0.00% | 26% | 34% | 25% | 33% | 29% | 38% | 30% | 39% | 30% | 39% | 27% | 27% | 30% | 30% |
| 5924 | 9.00% | 0.25% | 9.00% | 0.25% | 0.00% | 22% | 29% | 23% | 30% | 24% | 31% | 27% | 35% | 27% | 35% | 23% | 23% | 26% | 26% |
| 5925 | 0.00% | 1.00% | 9.00% | 0.25% | 0.00% | 30% | 39% | 31% | 40% | 27% | 35% | 32% | 42% | 37% | 48% | 29% | 29% | 32% | 32% |
| 5926 | 0.25% | 1.00% | 9.00% | 0.25% | 0.00% | 32% | 42% | 32% | 42% | 29% | 38% | 33% | 43% | 38% | 49% | 31% | 31% | 33% | 33% |
| 5927 | 9.00% | 1.00% | 9.00% | 0.25% | 0.00% | 30% | 39% | 31% | 40% | 27% | 35% | 32% | 42% | 37% | 48% | 29% | 29% | 32% | 32% |
| 5928 | 1.00% | 9.00% | 9.00% | 0.25% | 0.00% | 47% | 61% | 43% | 56% | 36% | 47% | 46% | 60% | 50% | 65% | 42% | 42% | 44% | 44% |
| 5929 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 5930 | 1.00% | 0.25% | 0.00% | 1.00% | 0.00% | 24% | 31% | 21% | 27% | 23% | 30% | 27% | 35% | 24% | 31% | 23% | 23% | 25% | 25% |
| 5931 | 0.00% | 1.00% | 0.00% | 1.00% | 0.00% | 28% | 36% | 27% | 35% | 21% | 27% | 29% | 38% | 31% | 40% | 25% | 25% | 27% | 27% |
| 5932 | 0.25% | 1.00% | 0.00% | 1.00% | 0.00% | 30% | 39% | 28% | 36% | 23% | 30% | 30% | 39% | 32% | 42% | 27% | 27% | 28% | 28% |
| 5933 | 1.00% | 1.00% | 0.00% | 1.00% | 0.00% | 32% | 42% | 29% | 38% | 26% | 34% | 32% | 42% | 34% | 44% | 29% | 29% | 31% | 31% |
| 5934 | 0.00% | 0.00% | 0.25% | 1.00% | 0.00% | 18% | 23% | 16% | 21% | 17% | 22% | 20% | 26% | 18% | 23% | 17% | 17% | 18% | 18% |
| 5935 | 1.00% | 0.00% | 0.25% | 1.00% | 0.00% | 22% | 29% | 18% | 23% | 22% | 29% | 23% | 30% | 21% | 27% | 21% | 21% | 22% | 22% |
| 5936 | 0.25% | 0.25% | 0.25% | 1.00% | 0.00% | 25% | 33% | 24% | 31% | 25% | 33% | 28% | 36% | 25% | 33% | 25% | 25% | 26% | 26% |
| 5937 | 1.00% | 0.25% | 0.25% | 1.00% | 0.00% | 27% | 35% | 25% | 33% | 28% | 36% | 30% | 39% | 27% | 35% | 27% | 27% | 28% | 28% |
| 5938 | 9.00% | 0.25% | 0.25% | 1.00% | 0.00% | 23% | 30% | 23% | 30% | 23% | 30% | 27% | 35% | 24% | 31% | 23% | 23% | 25% | 25% |
| 5939 | 0.00% | 1.00% | 0.25% | 1.00% | 0.00% | 31% | 40% | 31% | 40% | 26% | 34% | 32% | 42% | 34% | 44% | 29% | 29% | 31% | 31% |
| 5940 | 0.25% | 1.00% | 0.25% | 1.00% | 0.00% | 33% | 43% | 32% | 42% | 28% | 36% | 33% | 43% | 35% | 46% | 31% | 31% | 32% | 32% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5941 | 1.00% | 1.00% | 0.25% | 1.00% | 0.00% | 35% | 46% | 33% | 43% | 31% | 40% | 35% | 46% | 37% | 48% | 33% | 33% | 34% | 34% |
| 5942 | 9.00% | 1.00% | 0.25% | 1.00% | 0.00% | 31% | 40% | 31% | 40% | 26% | 34% | 32% | 42% | 34% | 44% | 29% | 29% | 31% | 31% |
| 5943 | 0.25% | 9.00% | 0.25% | 1.00% | 0.00% | 46% | 60% | 42% | 55% | 32% | 42% | 44% | 57% | 45% | 59% | 40% | 40% | 40% | 40% |
| 5944 | 1.00% | 9.00% | 0.25% | 1.00% | 0.00% | 48% | 62% | 43% | 56% | 35% | 46% | 46% | 60% | 47% | 61% | 42% | 42% | 43% | 43% |
| 5945 | 9.00% | 9.00% | 0.25% | 1.00% | 0.00% | 44% | 57% | 41% | 53% | 30% | 39% | 43% | 56% | 44% | 57% | 38% | 38% | 39% | 39% |
| 5946 | 0.00% | 0.00% | 1.00% | 1.00% | 0.00% | 21% | 27% | 19% | 25% | 21% | 27% | 24% | 31% | 24% | 31% | 20% | 20% | 23% | 23% |
| 5947 | 0.25% | 0.00% | 1.00% | 1.00% | 0.00% | 23% | 30% | 20% | 26% | 23% | 30% | 25% | 33% | 25% | 33% | 22% | 22% | 24% | 24% |
| 5948 | 1.00% | 0.00% | 1.00% | 1.00% | 0.00% | 25% | 33% | 21% | 27% | 26% | 34% | 27% | 35% | 27% | 35% | 24% | 24% | 27% | 27% |
| 5949 | 0.00% | 0.25% | 1.00% | 1.00% | 0.00% | 26% | 34% | 26% | 34% | 27% | 35% | 31% | 40% | 30% | 39% | 26% | 26% | 29% | 29% |
| 5950 | 1.00% | 0.25% | 1.00% | 1.00% | 0.00% | 30% | 39% | 28% | 36% | 32% | 42% | 34% | 44% | 33% | 43% | 30% | 30% | 33% | 33% |
| 5951 | 9.00% | 0.25% | 1.00% | 1.00% | 0.00% | 26% | 34% | 26% | 34% | 27% | 35% | 31% | 40% | 30% | 39% | 26% | 26% | 29% | 29% |
| 5952 | 0.00% | 1.00% | 1.00% | 1.00% | 0.00% | 34% | 44% | 34% | 44% | 30% | 39% | 36% | 47% | 40% | 52% | 33% | 33% | 35% | 35% |
| 5953 | 0.25% | 1.00% | 1.00% | 1.00% | 0.00% | 36% | 47% | 35% | 46% | 32% | 42% | 37% | 48% | 41% | 53% | 34% | 34% | 37% | 37% |
| 5954 | 1.00% | 1.00% | 1.00% | 1.00% | 0.00% | 38% | 49% | 36% | 47% | 35% | 46% | 39% | 51% | 43% | 56% | 36% | 36% | 39% | 39% |
| 5955 | 9.00% | 1.00% | 1.00% | 1.00% | 0.00% | 34% | 44% | 34% | 44% | 30% | 39% | 36% | 47% | 40% | 52% | 33% | 33% | 35% | 35% |
| 5956 | 0.00% | 9.00% | 1.00% | 1.00% | 0.00% | 47% | 61% | 44% | 57% | 34% | 44% | 47% | 61% | 50% | 65% | 42% | 42% | 44% | 44% |
| 5957 | 0.25% | 9.00% | 1.00% | 1.00% | 0.00% | 49% | 64% | 45% | 59% | 36% | 47% | 48% | 62% | 51% | 66% | 43% | 43% | 45% | 45% |
| 5958 | 1.00% | 9.00% | 1.00% | 1.00% | 0.00% | 51% | 66% | 46% | 60% | 39% | 51% | 50% | 65% | 53% | 69% | 45% | 45% | 47% | 47% |
| 5959 | 0.25% | 0.25% | 9.00% | 1.00% | 0.00% | 32% | 42% | 31% | 40% | 33% | 43% | 35% | 46% | 37% | 48% | 32% | 32% | 35% | 35% |
| 5960 | 1.00% | 0.25% | 9.00% | 1.00% | 0.00% | 34% | 44% | 32% | 42% | 36% | 47% | 37% | 48% | 39% | 51% | 34% | 34% | 37% | 37% |
| 5961 | 9.00% | 0.25% | 9.00% | 1.00% | 0.00% | 30% | 39% | 30% | 39% | 31% | 40% | 34% | 44% | 36% | 47% | 30% | 30% | 34% | 34% |
| 5962 | 0.25% | 1.00% | 9.00% | 1.00% | 0.00% | 40% | 52% | 39% | 51% | 36% | 47% | 40% | 52% | 47% | 61% | 38% | 38% | 41% | 41% |
| 5963 | 0.00% | 0.25% | 0.00% | 9.00% | 0.00% | 42% | 55% | 39% | 51% | 34% | 44% | 46% | 60% | 41% | 53% | 38% | 38% | 40% | 40% |
| 5964 | 0.00% | 0.00% | 0.25% | 9.00% | 0.00% | 40% | 52% | 36% | 47% | 33% | 43% | 42% | 55% | 38% | 49% | 36% | 36% | 38% | 38% |
| 5965 | 0.25% | 0.00% | 0.25% | 9.00% | 0.00% | 42% | 55% | 37% | 48% | 35% | 46% | 43% | 56% | 39% | 51% | 38% | 38% | 39% | 39% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5966 | 0.00% | 0.25% | 0.25% | 9.00% | 0.00% | 45% | 59% | 43% | 56% | 39% | 51% | 49% | 64% | 44% | 57% | 42% | 42% | 44% | 44% |
| 5967 | 0.25% | 0.25% | 0.25% | 9.00% | 0.00% | 47% | 61% | 44% | 57% | 41% | 53% | 50% | 65% | 45% | 59% | 44% | 44% | 45% | 45% |
| 5968 | 1.00% | 0.25% | 0.25% | 9.00% | 0.00% | 49% | 64% | 45% | 59% | 44% | 57% | 52% | 68% | 47% | 61% | 46% | 46% | 48% | 48% |
| 5969 | 9.00% | 0.25% | 0.25% | 9.00% | 0.00% | 45% | 59% | 43% | 56% | 39% | 51% | 49% | 64% | 44% | 57% | 42% | 42% | 44% | 44% |
| 5970 | 0.00% | 1.00% | 0.25% | 9.00% | 0.00% | 53% | 69% | 51% | 66% | 42% | 55% | 54% | 70% | 54% | 70% | 49% | 49% | 50% | 50% |
| 5971 | 0.25% | 1.00% | 0.25% | 9.00% | 0.00% | 55% | 72% | 52% | 68% | 44% | 57% | 55% | 72% | 55% | 72% | 50% | 50% | 51% | 51% |
| 5972 | 1.00% | 1.00% | 0.25% | 9.00% | 0.00% | 57% | 74% | 53% | 69% | 47% | 61% | 57% | 74% | 57% | 74% | 52% | 52% | 54% | 54% |
| 5973 | 0.25% | 9.00% | 0.25% | 9.00% | 0.00% | 68% | 88% | 62% | 81% | 48% | 62% | 66% | 86% | 65% | 85% | 59% | 59% | 60% | 60% |
| 5974 | 0.25% | 0.00% | 1.00% | 9.00% | 0.00% | 45% | 59% | 40% | 52% | 39% | 51% | 47% | 61% | 45% | 59% | 41% | 41% | 44% | 44% |
| 5975 | 1.00% | 0.25% | 1.00% | 9.00% | 0.00% | 52% | 68% | 48% | 62% | 48% | 62% | 56% | 73% | 53% | 69% | 49% | 49% | 52% | 52% |
| 5976 | 9.00% | 0.25% | 1.00% | 9.00% | 0.00% | 48% | 62% | 46% | 60% | 43% | 56% | 53% | 69% | 50% | 65% | 46% | 46% | 49% | 49% |
| 5977 | 0.00% | 1.00% | 1.00% | 9.00% | 0.00% | 56% | 73% | 54% | 70% | 46% | 60% | 58% | 75% | 60% | 78% | 52% | 52% | 55% | 55% |
| 5978 | 0.25% | 1.00% | 1.00% | 9.00% | 0.00% | 58% | 75% | 55% | 72% | 48% | 62% | 59% | 77% | 61% | 79% | 54% | 54% | 56% | 56% |
| 5979 | 1.00% | 1.00% | 1.00% | 9.00% | 0.00% | 60% | 78% | 56% | 73% | 51% | 66% | 61% | 79% | 63% | 82% | 56% | 56% | 58% | 58% |
| 5980 | 0.25% | 0.25% | 9.00% | 9.00% | 0.00% | 54% | 70% | 51% | 66% | 49% | 64% | 57% | 74% | 57% | 74% | 51% | 51% | 54% | 54% |
| 5981 | 0.25% | 0.25% | 0.00% | 0.00% | 0.25% | 13% | 17% | 15% | 20% | 14% | 18% | 13% | 17% | 14% | 18% | 14% | 14% | 14% | 14% |
| 5982 | 1.00% | 0.25% | 0.00% | 0.00% | 0.25% | 15% | 20% | 16% | 21% | 17% | 22% | 15% | 20% | 16% | 21% | 16% | 16% | 16% | 16% |
| 5983 | 0.25% | 1.00% | 0.00% | 0.00% | 0.25% | 21% | 27% | 23% | 30% | 17% | 22% | 18% | 23% | 24% | 31% | 20% | 20% | 20% | 20% |
| 5984 | 1.00% | 1.00% | 0.00% | 0.00% | 0.25% | 23% | 30% | 24% | 31% | 20% | 26% | 20% | 26% | 26% | 34% | 22% | 22% | 22% | 22% |
| 5985 | 0.25% | 0.00% | 0.25% | 0.00% | 0.25% | 11% | 14% | 12% | 16% | 13% | 17% | 9% | 12% | 11% | 14% | 12% | 12% | 11% | 11% |
| 5986 | 1.00% | 0.00% | 0.25% | 0.00% | 0.25% | 13% | 17% | 13% | 17% | 16% | 21% | 11% | 14% | 13% | 17% | 14% | 14% | 13% | 13% |
| 5987 | 0.00% | 0.25% | 0.25% | 0.00% | 0.25% | 14% | 18% | 18% | 23% | 17% | 22% | 15% | 20% | 16% | 21% | 16% | 16% | 16% | 16% |
| 5988 | 0.25% | 0.25% | 0.25% | 0.00% | 0.25% | 16% | 21% | 19% | 25% | 19% | 25% | 16% | 21% | 17% | 22% | 18% | 18% | 17% | 17% |
| 5989 | 0.00% | 1.00% | 0.25% | 0.00% | 0.25% | 22% | 29% | 26% | 34% | 20% | 26% | 20% | 26% | 26% | 34% | 23% | 23% | 22% | 22% |
| 5990 | 1.00% | 1.00% | 0.25% | 0.00% | 0.25% | 26% | 34% | 28% | 36% | 25% | 33% | 23% | 30% | 29% | 38% | 26% | 26% | 26% | 26% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 5991 | 1.00% | 9.00% | 0.25% | 0.00% | 0.25% | 39% | 51% | 38% | 49% | 29% | 38% | 34% | 44% | 39% | 51% | 35% | 35% | 34% | 34% |
| 5992 | 0.25% | 0.00% | 1.00% | 0.00% | 0.25% | 14% | 18% | 15% | 20% | 17% | 22% | 13% | 17% | 17% | 22% | 15% | 15% | 16% | 16% |
| 5993 | 1.00% | 0.00% | 1.00% | 0.00% | 0.25% | 16% | 21% | 16% | 21% | 20% | 26% | 15% | 20% | 19% | 25% | 17% | 17% | 18% | 18% |
| 5994 | 0.00% | 0.25% | 1.00% | 0.00% | 0.25% | 17% | 22% | 21% | 27% | 21% | 27% | 19% | 25% | 22% | 29% | 20% | 20% | 21% | 21% |
| 5995 | 1.00% | 0.25% | 1.00% | 0.00% | 0.25% | 21% | 27% | 23% | 30% | 26% | 34% | 22% | 29% | 25% | 33% | 23% | 23% | 24% | 24% |
| 5996 | 0.00% | 1.00% | 1.00% | 0.00% | 0.25% | 25% | 33% | 29% | 38% | 24% | 31% | 24% | 31% | 32% | 42% | 26% | 26% | 27% | 27% |
| 5997 | 0.25% | 1.00% | 1.00% | 0.00% | 0.25% | 27% | 35% | 30% | 39% | 26% | 34% | 25% | 33% | 33% | 43% | 28% | 28% | 28% | 28% |
| 5998 | 1.00% | 1.00% | 1.00% | 0.00% | 0.25% | 29% | 38% | 31% | 40% | 29% | 38% | 27% | 35% | 35% | 46% | 30% | 30% | 30% | 30% |
| 5999 | 9.00% | 1.00% | 1.00% | 0.00% | 0.25% | 25% | 33% | 29% | 38% | 24% | 31% | 24% | 31% | 32% | 42% | 26% | 26% | 27% | 27% |
| 6000 | 1.00% | 9.00% | 1.00% | 0.00% | 0.25% | 42% | 55% | 41% | 53% | 33% | 43% | 38% | 49% | 45% | 59% | 39% | 39% | 39% | 39% |
| 6001 | 0.25% | 0.00% | 9.00% | 0.00% | 0.25% | 18% | 23% | 19% | 25% | 21% | 27% | 16% | 21% | 23% | 30% | 19% | 19% | 20% | 20% |
| 6002 | 0.00% | 0.25% | 9.00% | 0.00% | 0.25% | 21% | 27% | 25% | 33% | 25% | 33% | 22% | 29% | 28% | 36% | 24% | 24% | 25% | 25% |
| 6003 | 0.25% | 0.25% | 9.00% | 0.00% | 0.25% | 23% | 30% | 26% | 34% | 27% | 35% | 23% | 30% | 29% | 38% | 25% | 25% | 26% | 26% |
| 6004 | 1.00% | 0.25% | 9.00% | 0.00% | 0.25% | 25% | 33% | 27% | 35% | 30% | 39% | 25% | 33% | 31% | 40% | 27% | 27% | 29% | 29% |
| 6005 | 0.25% | 1.00% | 9.00% | 0.00% | 0.25% | 31% | 40% | 34% | 44% | 30% | 39% | 28% | 36% | 39% | 51% | 32% | 32% | 32% | 32% |
| 6006 | 0.25% | 0.00% | 0.00% | 0.25% | 0.25% | 15% | 20% | 13% | 17% | 13% | 17% | 16% | 21% | 14% | 18% | 14% | 14% | 14% | 14% |
| 6007 | 1.00% | 0.00% | 0.00% | 0.25% | 0.25% | 17% | 22% | 14% | 18% | 16% | 21% | 18% | 23% | 16% | 21% | 16% | 16% | 17% | 17% |
| 6008 | 0.00% | 0.25% | 0.00% | 0.25% | 0.25% | 18% | 23% | 19% | 25% | 17% | 22% | 22% | 29% | 19% | 25% | 18% | 18% | 19% | 19% |
| 6009 | 0.25% | 0.25% | 0.00% | 0.25% | 0.25% | 20% | 26% | 20% | 26% | 19% | 25% | 23% | 30% | 20% | 26% | 20% | 20% | 21% | 21% |
| 6010 | 9.00% | 0.25% | 0.00% | 0.25% | 0.25% | 18% | 23% | 19% | 25% | 17% | 22% | 22% | 29% | 19% | 25% | 18% | 18% | 19% | 19% |
| 6011 | 1.00% | 1.00% | 0.00% | 0.25% | 0.25% | 30% | 39% | 29% | 38% | 25% | 33% | 30% | 39% | 32% | 42% | 28% | 28% | 29% | 29% |
| 6012 | 1.00% | 9.00% | 0.00% | 0.25% | 0.25% | 43% | 56% | 39% | 51% | 29% | 38% | 41% | 53% | 42% | 55% | 37% | 37% | 37% | 37% |
| 6013 | 0.00% | 0.00% | 0.25% | 0.25% | 0.25% | 16% | 21% | 16% | 21% | 16% | 21% | 18% | 23% | 16% | 21% | 16% | 16% | 17% | 17% |
| 6014 | 0.25% | 0.00% | 0.25% | 0.25% | 0.25% | 18% | 23% | 17% | 22% | 18% | 23% | 19% | 25% | 17% | 22% | 18% | 18% | 18% | 18% |
| 6015 | 0.00% | 0.25% | 0.25% | 0.25% | 0.25% | 21% | 27% | 23% | 30% | 22% | 29% | 25% | 33% | 22% | 29% | 22% | 22% | 23% | 23% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6016 | 0.25% | 0.25% | 0.25% | 0.25% | 0.25% | 23% | 30% | 24% | 31% | 24% | 31% | 26% | 34% | 23% | 30% | 24% | 24% | 24% | 24% |
| 6017 | 1.00% | 0.25% | 0.25% | 0.25% | 0.25% | 25% | 33% | 25% | 33% | 27% | 35% | 28% | 36% | 25% | 33% | 26% | 26% | 27% | 27% |
| 6018 | 9.00% | 0.25% | 0.25% | 0.25% | 0.25% | 21% | 27% | 23% | 30% | 22% | 29% | 25% | 33% | 22% | 29% | 22% | 22% | 23% | 23% |
| 6019 | 0.25% | 1.00% | 0.25% | 0.25% | 0.25% | 31% | 40% | 32% | 42% | 27% | 35% | 31% | 40% | 33% | 43% | 30% | 30% | 30% | 30% |
| 6020 | 9.00% | 1.00% | 0.25% | 0.25% | 0.25% | 29% | 38% | 31% | 40% | 25% | 33% | 30% | 39% | 32% | 42% | 28% | 28% | 29% | 29% |
| 6021 | 0.25% | 9.00% | 0.25% | 0.25% | 0.25% | 44% | 57% | 42% | 55% | 31% | 40% | 42% | 55% | 43% | 56% | 39% | 39% | 39% | 39% |
| 6022 | 1.00% | 9.00% | 0.25% | 0.25% | 0.25% | 46% | 60% | 43% | 56% | 34% | 44% | 44% | 57% | 45% | 59% | 41% | 41% | 41% | 41% |
| 6023 | 9.00% | 9.00% | 0.25% | 0.25% | 0.25% | 42% | 55% | 41% | 53% | 29% | 38% | 41% | 53% | 42% | 55% | 37% | 37% | 37% | 37% |
| 6024 | 0.00% | 0.00% | 1.00% | 0.25% | 0.25% | 19% | 25% | 19% | 25% | 20% | 26% | 22% | 29% | 22% | 29% | 19% | 19% | 21% | 21% |
| 6025 | 1.00% | 0.00% | 1.00% | 0.25% | 0.25% | 23% | 30% | 21% | 27% | 25% | 33% | 25% | 33% | 25% | 33% | 23% | 23% | 25% | 25% |
| 6026 | 0.00% | 0.25% | 1.00% | 0.25% | 0.25% | 24% | 31% | 26% | 34% | 26% | 34% | 29% | 38% | 28% | 36% | 25% | 25% | 28% | 28% |
| 6027 | 0.25% | 0.25% | 1.00% | 0.25% | 0.25% | 26% | 34% | 27% | 35% | 28% | 36% | 30% | 39% | 29% | 38% | 27% | 27% | 29% | 29% |
| 6028 | 1.00% | 0.25% | 1.00% | 0.25% | 0.25% | 28% | 36% | 28% | 36% | 31% | 40% | 32% | 42% | 31% | 40% | 29% | 29% | 31% | 31% |
| 6029 | 9.00% | 0.25% | 1.00% | 0.25% | 0.25% | 24% | 31% | 26% | 34% | 26% | 34% | 29% | 38% | 28% | 36% | 25% | 25% | 28% | 28% |
| 6030 | 0.00% | 1.00% | 1.00% | 0.25% | 0.25% | 32% | 42% | 34% | 44% | 29% | 38% | 34% | 44% | 38% | 49% | 32% | 32% | 34% | 34% |
| 6031 | 0.25% | 1.00% | 1.00% | 0.25% | 0.25% | 34% | 44% | 35% | 46% | 31% | 40% | 35% | 46% | 39% | 51% | 33% | 33% | 35% | 35% |
| 6032 | 1.00% | 1.00% | 1.00% | 0.25% | 0.25% | 36% | 47% | 36% | 47% | 34% | 44% | 37% | 48% | 41% | 53% | 35% | 35% | 37% | 37% |
| 6033 | 9.00% | 1.00% | 1.00% | 0.25% | 0.25% | 32% | 42% | 34% | 44% | 29% | 38% | 34% | 44% | 38% | 49% | 32% | 32% | 34% | 34% |
| 6034 | 0.00% | 9.00% | 1.00% | 0.25% | 0.25% | 45% | 59% | 44% | 57% | 33% | 43% | 45% | 59% | 48% | 62% | 41% | 41% | 42% | 42% |
| 6035 | 0.25% | 9.00% | 1.00% | 0.25% | 0.25% | 47% | 61% | 45% | 59% | 35% | 46% | 46% | 60% | 49% | 64% | 42% | 42% | 43% | 43% |
| 6036 | 1.00% | 9.00% | 1.00% | 0.25% | 0.25% | 49% | 64% | 46% | 60% | 38% | 49% | 48% | 62% | 51% | 66% | 44% | 44% | 46% | 46% |
| 6037 | 0.25% | 0.25% | 9.00% | 0.25% | 0.25% | 30% | 39% | 31% | 40% | 32% | 42% | 33% | 43% | 35% | 46% | 31% | 31% | 33% | 33% |
| 6038 | 1.00% | 0.25% | 9.00% | 0.25% | 0.25% | 32% | 42% | 32% | 42% | 35% | 46% | 35% | 46% | 37% | 48% | 33% | 33% | 36% | 36% |
| 6039 | 9.00% | 0.25% | 9.00% | 0.25% | 0.25% | 28% | 36% | 30% | 39% | 30% | 39% | 32% | 42% | 34% | 44% | 29% | 29% | 32% | 32% |
| 6040 | 0.00% | 1.00% | 9.00% | 0.25% | 0.25% | 36% | 47% | 38% | 49% | 33% | 43% | 37% | 48% | 44% | 57% | 36% | 36% | 38% | 38% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6041 | 0.25% | 1.00% | 9.00% | 0.25% | 0.25% | 38% | 49% | 39% | 51% | 35% | 46% | 38% | 49% | 45% | 59% | 37% | 37% | 39% | 39% |
| 6042 | 9.00% | 1.00% | 9.00% | 0.25% | 0.25% | 36% | 47% | 38% | 49% | 33% | 43% | 37% | 48% | 44% | 57% | 36% | 36% | 38% | 38% |
| 6043 | 1.00% | 9.00% | 9.00% | 0.25% | 0.25% | 53% | 69% | 50% | 65% | 42% | 55% | 51% | 66% | 57% | 74% | 48% | 48% | 50% | 50% |
| 6044 | 0.25% | 0.00% | 0.00% | 1.00% | 0.25% | 23% | 30% | 20% | 26% | 20% | 26% | 23% | 30% | 23% | 30% | 21% | 21% | 22% | 22% |
| 6045 | 1.00% | 0.25% | 0.00% | 1.00% | 0.25% | 30% | 39% | 28% | 36% | 29% | 38% | 32% | 42% | 31% | 40% | 29% | 29% | 31% | 31% |
| 6046 | 0.00% | 1.00% | 0.00% | 1.00% | 0.25% | 34% | 44% | 34% | 44% | 27% | 35% | 34% | 44% | 38% | 49% | 32% | 32% | 33% | 33% |
| 6047 | 0.25% | 1.00% | 0.00% | 1.00% | 0.25% | 36% | 47% | 35% | 46% | 29% | 38% | 35% | 46% | 39% | 51% | 33% | 33% | 34% | 34% |
| 6048 | 1.00% | 1.00% | 0.00% | 1.00% | 0.25% | 38% | 49% | 36% | 47% | 32% | 42% | 37% | 48% | 41% | 53% | 35% | 35% | 37% | 37% |
| 6049 | 0.00% | 0.00% | 0.25% | 1.00% | 0.25% | 24% | 31% | 23% | 30% | 23% | 30% | 25% | 33% | 25% | 33% | 23% | 23% | 24% | 24% |
| 6050 | 1.00% | 0.00% | 0.25% | 1.00% | 0.25% | 28% | 36% | 25% | 33% | 28% | 36% | 28% | 36% | 28% | 36% | 27% | 27% | 28% | 28% |
| 6051 | 0.25% | 0.25% | 0.25% | 1.00% | 0.25% | 31% | 40% | 31% | 40% | 31% | 40% | 33% | 43% | 32% | 42% | 31% | 31% | 32% | 32% |
| 6052 | 1.00% | 0.25% | 0.25% | 1.00% | 0.25% | 33% | 43% | 32% | 42% | 34% | 44% | 35% | 46% | 34% | 44% | 33% | 33% | 34% | 34% |
| 6053 | 9.00% | 0.25% | 0.25% | 1.00% | 0.25% | 29% | 38% | 30% | 39% | 29% | 38% | 32% | 42% | 31% | 40% | 29% | 29% | 31% | 31% |
| 6054 | 0.00% | 1.00% | 0.25% | 1.00% | 0.25% | 37% | 48% | 38% | 49% | 32% | 42% | 37% | 48% | 41% | 53% | 36% | 36% | 37% | 37% |
| 6055 | 0.25% | 1.00% | 0.25% | 1.00% | 0.25% | 39% | 51% | 39% | 51% | 34% | 44% | 38% | 49% | 42% | 55% | 37% | 37% | 38% | 38% |
| 6056 | 1.00% | 1.00% | 0.25% | 1.00% | 0.25% | 41% | 53% | 40% | 52% | 37% | 48% | 40% | 52% | 44% | 57% | 39% | 39% | 40% | 40% |
| 6057 | 9.00% | 1.00% | 0.25% | 1.00% | 0.25% | 37% | 48% | 38% | 49% | 32% | 42% | 37% | 48% | 41% | 53% | 36% | 36% | 37% | 37% |
| 6058 | 0.25% | 9.00% | 0.25% | 1.00% | 0.25% | 52% | 68% | 49% | 64% | 38% | 49% | 49% | 64% | 52% | 68% | 46% | 46% | 46% | 46% |
| 6059 | 1.00% | 9.00% | 0.25% | 1.00% | 0.25% | 54% | 70% | 50% | 65% | 41% | 53% | 51% | 66% | 54% | 70% | 48% | 48% | 49% | 49% |
| 6060 | 9.00% | 9.00% | 0.25% | 1.00% | 0.25% | 50% | 65% | 48% | 62% | 36% | 47% | 48% | 62% | 51% | 66% | 45% | 45% | 45% | 45% |
| 6061 | 0.00% | 0.00% | 1.00% | 1.00% | 0.25% | 27% | 35% | 26% | 34% | 27% | 35% | 29% | 38% | 31% | 40% | 27% | 27% | 29% | 29% |
| 6062 | 0.25% | 0.00% | 1.00% | 1.00% | 0.25% | 29% | 38% | 27% | 35% | 29% | 38% | 30% | 39% | 32% | 42% | 28% | 28% | 30% | 30% |
| 6063 | 1.00% | 0.00% | 1.00% | 1.00% | 0.25% | 31% | 40% | 28% | 36% | 32% | 42% | 32% | 42% | 34% | 44% | 30% | 30% | 33% | 33% |
| 6064 | 0.00% | 0.25% | 1.00% | 1.00% | 0.25% | 32% | 42% | 33% | 43% | 33% | 43% | 36% | 47% | 37% | 48% | 33% | 33% | 35% | 35% |
| 6065 | 1.00% | 0.25% | 1.00% | 1.00% | 0.25% | 36% | 47% | 35% | 46% | 38% | 49% | 39% | 51% | 40% | 52% | 36% | 36% | 39% | 39% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6066 | 9.00% | 0.25% | 1.00% | 1.00% | 0.25% | 32% | 42% | 33% | 43% | 33% | 43% | 36% | 47% | 37% | 48% | 33% | 33% | 35% | 35% |
| 6067 | 0.00% | 1.00% | 1.00% | 1.00% | 0.25% | 40% | 52% | 41% | 53% | 36% | 47% | 41% | 53% | 47% | 61% | 39% | 39% | 41% | 41% |
| 6068 | 0.25% | 1.00% | 1.00% | 1.00% | 0.25% | 42% | 55% | 42% | 55% | 38% | 49% | 42% | 55% | 48% | 62% | 41% | 41% | 43% | 43% |
| 6069 | 1.00% | 1.00% | 1.00% | 1.00% | 0.25% | 44% | 57% | 43% | 56% | 41% | 53% | 44% | 57% | 50% | 65% | 43% | 43% | 45% | 45% |
| 6070 | 9.00% | 1.00% | 1.00% | 1.00% | 0.25% | 40% | 52% | 41% | 53% | 36% | 47% | 41% | 53% | 47% | 61% | 39% | 39% | 41% | 41% |
| 6071 | 0.00% | 9.00% | 1.00% | 1.00% | 0.25% | 53% | 69% | 51% | 66% | 40% | 52% | 52% | 68% | 57% | 74% | 48% | 48% | 50% | 50% |
| 6072 | 0.25% | 9.00% | 1.00% | 1.00% | 0.25% | 55% | 72% | 52% | 68% | 42% | 55% | 53% | 69% | 58% | 75% | 50% | 50% | 51% | 51% |
| 6073 | 1.00% | 9.00% | 1.00% | 1.00% | 0.25% | 57% | 74% | 53% | 69% | 45% | 59% | 55% | 72% | 60% | 78% | 52% | 52% | 53% | 53% |
| 6074 | 0.25% | 0.25% | 9.00% | 1.00% | 0.25% | 38% | 49% | 38% | 49% | 39% | 51% | 40% | 52% | 44% | 57% | 38% | 38% | 41% | 41% |
| 6075 | 1.00% | 0.25% | 9.00% | 1.00% | 0.25% | 40% | 52% | 39% | 51% | 42% | 55% | 42% | 55% | 46% | 60% | 40% | 40% | 43% | 43% |
| 6076 | 9.00% | 0.25% | 9.00% | 1.00% | 0.25% | 36% | 47% | 37% | 48% | 37% | 48% | 39% | 51% | 43% | 56% | 37% | 37% | 40% | 40% |
| 6077 | 0.25% | 1.00% | 9.00% | 1.00% | 0.25% | 46% | 60% | 46% | 60% | 42% | 55% | 45% | 59% | 54% | 70% | 45% | 45% | 47% | 47% |
| 6078 | 0.00% | 0.25% | 0.00% | 9.00% | 0.25% | 48% | 62% | 46% | 60% | 40% | 52% | 51% | 66% | 48% | 62% | 45% | 45% | 46% | 46% |
| 6079 | 0.00% | 0.00% | 0.25% | 9.00% | 0.25% | 46% | 60% | 43% | 56% | 39% | 51% | 47% | 61% | 45% | 59% | 43% | 43% | 44% | 44% |
| 6080 | 0.25% | 0.00% | 0.25% | 9.00% | 0.25% | 48% | 62% | 44% | 57% | 41% | 53% | 48% | 62% | 46% | 60% | 44% | 44% | 45% | 45% |
| 6081 | 0.00% | 0.25% | 0.25% | 9.00% | 0.25% | 51% | 66% | 50% | 65% | 45% | 59% | 54% | 70% | 51% | 66% | 49% | 49% | 50% | 50% |
| 6082 | 0.25% | 0.25% | 0.25% | 9.00% | 0.25% | 53% | 69% | 51% | 66% | 47% | 61% | 55% | 72% | 52% | 68% | 50% | 50% | 51% | 51% |
| 6083 | 1.00% | 0.25% | 0.25% | 9.00% | 0.25% | 55% | 72% | 52% | 68% | 50% | 65% | 57% | 74% | 54% | 70% | 52% | 52% | 54% | 54% |
| 6084 | 9.00% | 0.25% | 0.25% | 9.00% | 0.25% | 51% | 66% | 50% | 65% | 45% | 59% | 54% | 70% | 51% | 66% | 49% | 49% | 50% | 50% |
| 6085 | 0.00% | 1.00% | 0.25% | 9.00% | 0.25% | 59% | 77% | 58% | 75% | 48% | 62% | 59% | 77% | 61% | 79% | 55% | 55% | 56% | 56% |
| 6086 | 0.25% | 1.00% | 0.25% | 9.00% | 0.25% | 61% | 79% | 59% | 77% | 50% | 65% | 60% | 78% | 62% | 81% | 57% | 57% | 57% | 57% |
| 6087 | 1.00% | 1.00% | 0.25% | 9.00% | 0.25% | 63% | 82% | 60% | 78% | 53% | 69% | 62% | 81% | 64% | 83% | 59% | 59% | 60% | 60% |
| 6088 | 0.25% | 9.00% | 0.25% | 9.00% | 0.25% | 74% | 96% | 69% | 90% | 54% | 70% | 71% | 92% | 72% | 94% | 66% | 66% | 66% | 66% |
| 6089 | 0.25% | 0.00% | 1.00% | 9.00% | 0.25% | 51% | 66% | 47% | 61% | 45% | 59% | 52% | 68% | 52% | 68% | 48% | 48% | 50% | 50% |
| 6090 | 1.00% | 0.25% | 1.00% | 9.00% | 0.25% | 58% | 75% | 55% | 72% | 54% | 70% | 61% | 79% | 60% | 78% | 56% | 56% | 58% | 58% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6091 | 9.00% | 0.25% | 1.00% | 9.00% | 0.25% | 54% | 70% | 53% | 69% | 49% | 64% | 58% | 75% | 57% | 74% | 52% | 52% | 55% | 55% |
| 6092 | 0.00% | 1.00% | 1.00% | 9.00% | 0.25% | 62% | 81% | 61% | 79% | 52% | 68% | 63% | 82% | 67% | 87% | 58% | 58% | 61% | 61% |
| 6093 | 0.25% | 1.00% | 1.00% | 9.00% | 0.25% | 64% | 83% | 62% | 81% | 54% | 70% | 64% | 83% | 68% | 88% | 60% | 60% | 62% | 62% |
| 6094 | 1.00% | 1.00% | 1.00% | 9.00% | 0.25% | 66% | 86% | 63% | 82% | 57% | 74% | 66% | 86% | 70% | 91% | 62% | 62% | 64% | 64% |
| 6095 | 0.25% | 0.25% | 9.00% | 9.00% | 0.25% | 60% | 78% | 58% | 75% | 55% | 72% | 62% | 81% | 64% | 83% | 58% | 58% | 60% | 60% |
| 6096 | 0.25% | 0.25% | 0.00% | 0.00% | 1.00% | 18% | 23% | 21% | 27% | 19% | 25% | 18% | 23% | 25% | 33% | 19% | 19% | 21% | 21% |
| 6097 | 1.00% | 0.25% | 0.00% | 0.00% | 1.00% | 20% | 26% | 22% | 29% | 22% | 29% | 20% | 26% | 27% | 35% | 21% | 21% | 23% | 23% |
| 6098 | 0.25% | 1.00% | 0.00% | 0.00% | 1.00% | 26% | 34% | 29% | 38% | 22% | 29% | 23% | 30% | 35% | 46% | 26% | 26% | 27% | 27% |
| 6099 | 1.00% | 1.00% | 0.00% | 0.00% | 1.00% | 28% | 36% | 30% | 39% | 25% | 33% | 25% | 33% | 37% | 48% | 28% | 28% | 29% | 29% |
| 6100 | 0.25% | 0.00% | 0.25% | 0.00% | 1.00% | 16% | 21% | 18% | 23% | 18% | 23% | 14% | 18% | 22% | 29% | 17% | 17% | 18% | 18% |
| 6101 | 1.00% | 0.00% | 0.25% | 0.00% | 1.00% | 18% | 23% | 19% | 25% | 21% | 27% | 16% | 21% | 24% | 31% | 19% | 19% | 20% | 20% |
| 6102 | 0.00% | 0.25% | 0.25% | 0.00% | 1.00% | 19% | 25% | 24% | 31% | 22% | 29% | 20% | 26% | 27% | 35% | 22% | 22% | 23% | 23% |
| 6103 | 0.25% | 0.25% | 0.25% | 0.00% | 1.00% | 21% | 27% | 25% | 33% | 24% | 31% | 21% | 27% | 28% | 36% | 23% | 23% | 24% | 24% |
| 6104 | 0.00% | 1.00% | 0.25% | 0.00% | 1.00% | 27% | 35% | 32% | 42% | 25% | 33% | 25% | 33% | 37% | 48% | 28% | 28% | 29% | 29% |
| 6105 | 1.00% | 1.00% | 0.25% | 0.00% | 1.00% | 31% | 40% | 34% | 44% | 30% | 39% | 28% | 36% | 40% | 52% | 32% | 32% | 33% | 33% |
| 6106 | 1.00% | 9.00% | 0.25% | 0.00% | 1.00% | 44% | 57% | 44% | 57% | 34% | 44% | 39% | 51% | 50% | 65% | 41% | 41% | 41% | 41% |
| 6107 | 0.25% | 0.00% | 1.00% | 0.00% | 1.00% | 19% | 25% | 21% | 27% | 22% | 29% | 18% | 23% | 28% | 36% | 21% | 21% | 23% | 23% |
| 6108 | 1.00% | 0.00% | 1.00% | 0.00% | 1.00% | 21% | 27% | 22% | 29% | 25% | 33% | 20% | 26% | 30% | 39% | 23% | 23% | 25% | 25% |
| 6109 | 0.00% | 0.25% | 1.00% | 0.00% | 1.00% | 22% | 29% | 27% | 35% | 26% | 34% | 24% | 31% | 33% | 43% | 25% | 25% | 28% | 28% |
| 6110 | 1.00% | 0.25% | 1.00% | 0.00% | 1.00% | 26% | 34% | 29% | 38% | 31% | 40% | 27% | 35% | 36% | 47% | 29% | 29% | 31% | 31% |
| 6111 | 0.00% | 1.00% | 1.00% | 0.00% | 1.00% | 30% | 39% | 35% | 46% | 29% | 38% | 29% | 38% | 43% | 56% | 31% | 31% | 34% | 34% |
| 6112 | 0.25% | 1.00% | 1.00% | 0.00% | 1.00% | 32% | 42% | 36% | 47% | 31% | 40% | 30% | 39% | 44% | 57% | 33% | 33% | 35% | 35% |
| 6113 | 1.00% | 1.00% | 1.00% | 0.00% | 1.00% | 34% | 44% | 37% | 48% | 34% | 44% | 32% | 42% | 46% | 60% | 35% | 35% | 37% | 37% |
| 6114 | 9.00% | 1.00% | 1.00% | 0.00% | 1.00% | 30% | 39% | 35% | 46% | 29% | 38% | 29% | 38% | 43% | 56% | 31% | 31% | 34% | 34% |
| 6115 | 1.00% | 9.00% | 1.00% | 0.00% | 1.00% | 47% | 61% | 47% | 61% | 38% | 49% | 43% | 56% | 56% | 73% | 44% | 44% | 46% | 46% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6116 | 0.25% | 0.00% | 9.00% | 0.00% | 1.00% | 23% | 30% | 25% | 33% | 26% | 34% | 21% | 27% | 34% | 44% | 25% | 25% | 27% | 27% |
| 6117 | 0.00% | 0.25% | 9.00% | 0.00% | 1.00% | 26% | 34% | 31% | 40% | 30% | 39% | 27% | 35% | 39% | 51% | 29% | 29% | 32% | 32% |
| 6118 | 0.25% | 0.25% | 9.00% | 0.00% | 1.00% | 28% | 36% | 32% | 42% | 32% | 42% | 28% | 36% | 40% | 52% | 31% | 31% | 33% | 33% |
| 6119 | 1.00% | 0.25% | 9.00% | 0.00% | 1.00% | 30% | 39% | 33% | 43% | 35% | 46% | 30% | 39% | 42% | 55% | 33% | 33% | 36% | 36% |
| 6120 | 0.25% | 1.00% | 9.00% | 0.00% | 1.00% | 36% | 47% | 40% | 52% | 35% | 46% | 33% | 43% | 50% | 65% | 37% | 37% | 39% | 39% |
| 6121 | 0.25% | 0.00% | 0.00% | 0.25% | 1.00% | 20% | 26% | 19% | 25% | 18% | 23% | 21% | 27% | 25% | 33% | 19% | 19% | 21% | 21% |
| 6122 | 1.00% | 0.00% | 0.00% | 0.25% | 1.00% | 22% | 29% | 20% | 26% | 21% | 27% | 23% | 30% | 27% | 35% | 21% | 21% | 24% | 24% |
| 6123 | 0.00% | 0.25% | 0.00% | 0.25% | 1.00% | 23% | 30% | 25% | 33% | 22% | 29% | 27% | 35% | 30% | 39% | 23% | 23% | 26% | 26% |
| 6124 | 0.25% | 0.25% | 0.00% | 0.25% | 1.00% | 25% | 33% | 26% | 34% | 24% | 31% | 28% | 36% | 31% | 40% | 25% | 25% | 28% | 28% |
| 6125 | 9.00% | 0.25% | 0.00% | 0.25% | 1.00% | 23% | 30% | 25% | 33% | 22% | 29% | 27% | 35% | 30% | 39% | 23% | 23% | 26% | 26% |
| 6126 | 1.00% | 1.00% | 0.00% | 0.25% | 1.00% | 35% | 46% | 35% | 46% | 30% | 39% | 35% | 46% | 43% | 56% | 33% | 33% | 36% | 36% |
| 6127 | 1.00% | 9.00% | 0.00% | 0.25% | 1.00% | 48% | 62% | 45% | 59% | 34% | 44% | 46% | 60% | 53% | 69% | 42% | 42% | 44% | 44% |
| 6128 | 0.00% | 0.00% | 0.25% | 0.25% | 1.00% | 21% | 27% | 22% | 29% | 21% | 27% | 23% | 30% | 27% | 35% | 21% | 21% | 24% | 24% |
| 6129 | 0.25% | 0.00% | 0.25% | 0.25% | 1.00% | 23% | 30% | 23% | 30% | 23% | 30% | 24% | 31% | 28% | 36% | 23% | 23% | 25% | 25% |
| 6130 | 0.00% | 0.25% | 0.25% | 0.25% | 1.00% | 26% | 34% | 29% | 38% | 27% | 35% | 30% | 39% | 33% | 43% | 27% | 27% | 30% | 30% |
| 6131 | 0.25% | 0.25% | 0.25% | 0.25% | 1.00% | 28% | 36% | 30% | 39% | 29% | 38% | 31% | 40% | 34% | 44% | 29% | 29% | 31% | 31% |
| 6132 | 1.00% | 0.25% | 0.25% | 0.25% | 1.00% | 30% | 39% | 31% | 40% | 32% | 42% | 33% | 43% | 36% | 47% | 31% | 31% | 34% | 34% |
| 6133 | 9.00% | 0.25% | 0.25% | 0.25% | 1.00% | 26% | 34% | 29% | 38% | 27% | 35% | 30% | 39% | 33% | 43% | 27% | 27% | 30% | 30% |
| 6134 | 0.25% | 1.00% | 0.25% | 0.25% | 1.00% | 36% | 47% | 38% | 49% | 32% | 42% | 36% | 47% | 44% | 57% | 35% | 35% | 37% | 37% |
| 6135 | 9.00% | 1.00% | 0.25% | 0.25% | 1.00% | 34% | 44% | 37% | 48% | 30% | 39% | 35% | 46% | 43% | 56% | 34% | 34% | 36% | 36% |
| 6136 | 0.25% | 9.00% | 0.25% | 0.25% | 1.00% | 49% | 64% | 48% | 62% | 36% | 47% | 47% | 61% | 54% | 70% | 44% | 44% | 46% | 46% |
| 6137 | 1.00% | 9.00% | 0.25% | 0.25% | 1.00% | 51% | 66% | 49% | 64% | 39% | 51% | 49% | 64% | 56% | 73% | 46% | 46% | 48% | 48% |
| 6138 | 9.00% | 9.00% | 0.25% | 0.25% | 1.00% | 47% | 61% | 47% | 61% | 34% | 44% | 46% | 60% | 53% | 69% | 43% | 43% | 44% | 44% |
| 6139 | 0.00% | 0.00% | 1.00% | 0.25% | 1.00% | 24% | 31% | 25% | 33% | 25% | 33% | 27% | 35% | 33% | 43% | 25% | 25% | 28% | 28% |
| 6140 | 1.00% | 0.00% | 1.00% | 0.25% | 1.00% | 28% | 36% | 27% | 35% | 30% | 39% | 30% | 39% | 36% | 47% | 28% | 28% | 32% | 32% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6141 | 0.00% | 0.25% | 1.00% | 0.25% | 1.00% | 29% | 38% | 32% | 42% | 31% | 40% | 34% | 44% | 39% | 51% | 31% | 31% | 35% | 35% |
| 6142 | 0.25% | 0.25% | 1.00% | 0.25% | 1.00% | 31% | 40% | 33% | 43% | 33% | 43% | 35% | 46% | 40% | 52% | 32% | 32% | 36% | 36% |
| 6143 | 1.00% | 0.25% | 1.00% | 0.25% | 1.00% | 33% | 43% | 34% | 44% | 36% | 47% | 37% | 48% | 42% | 55% | 34% | 34% | 38% | 38% |
| 6144 | 9.00% | 0.25% | 1.00% | 0.25% | 1.00% | 29% | 38% | 32% | 42% | 31% | 40% | 34% | 44% | 39% | 51% | 31% | 31% | 35% | 35% |
| 6145 | 0.00% | 1.00% | 1.00% | 0.25% | 1.00% | 37% | 48% | 40% | 52% | 34% | 44% | 39% | 51% | 49% | 64% | 37% | 37% | 41% | 41% |
| 6146 | 0.25% | 1.00% | 1.00% | 0.25% | 1.00% | 39% | 51% | 41% | 53% | 36% | 47% | 40% | 52% | 50% | 65% | 39% | 39% | 42% | 42% |
| 6147 | 1.00% | 1.00% | 1.00% | 0.25% | 1.00% | 41% | 53% | 42% | 55% | 39% | 51% | 42% | 55% | 52% | 68% | 41% | 41% | 44% | 44% |
| 6148 | 9.00% | 1.00% | 1.00% | 0.25% | 1.00% | 37% | 48% | 40% | 52% | 34% | 44% | 39% | 51% | 49% | 64% | 37% | 37% | 41% | 41% |
| 6149 | 0.00% | 9.00% | 1.00% | 0.25% | 1.00% | 50% | 65% | 50% | 65% | 38% | 49% | 50% | 65% | 59% | 77% | 46% | 46% | 49% | 49% |
| 6150 | 0.25% | 9.00% | 1.00% | 0.25% | 1.00% | 52% | 68% | 51% | 66% | 40% | 52% | 51% | 66% | 60% | 78% | 48% | 48% | 50% | 50% |
| 6151 | 1.00% | 9.00% | 1.00% | 0.25% | 1.00% | 54% | 70% | 52% | 68% | 43% | 56% | 53% | 69% | 62% | 81% | 50% | 50% | 53% | 53% |
| 6152 | 0.25% | 0.25% | 9.00% | 0.25% | 1.00% | 35% | 46% | 37% | 48% | 37% | 48% | 38% | 49% | 46% | 60% | 36% | 36% | 40% | 40% |
| 6153 | 1.00% | 0.25% | 9.00% | 0.25% | 1.00% | 37% | 48% | 38% | 49% | 40% | 52% | 40% | 52% | 48% | 62% | 38% | 38% | 43% | 43% |
| 6154 | 9.00% | 0.25% | 9.00% | 0.25% | 1.00% | 33% | 43% | 36% | 47% | 35% | 46% | 37% | 48% | 45% | 59% | 35% | 35% | 39% | 39% |
| 6155 | 0.00% | 1.00% | 9.00% | 0.25% | 1.00% | 41% | 53% | 44% | 57% | 38% | 49% | 42% | 55% | 55% | 72% | 41% | 41% | 45% | 45% |
| 6156 | 0.25% | 1.00% | 9.00% | 0.25% | 1.00% | 43% | 56% | 45% | 59% | 40% | 52% | 43% | 56% | 56% | 73% | 43% | 43% | 46% | 46% |
| 6157 | 9.00% | 1.00% | 9.00% | 0.25% | 1.00% | 41% | 53% | 44% | 57% | 38% | 49% | 42% | 55% | 55% | 72% | 41% | 41% | 45% | 45% |
| 6158 | 1.00% | 9.00% | 9.00% | 0.25% | 1.00% | 58% | 75% | 56% | 73% | 47% | 61% | 56% | 73% | 68% | 88% | 54% | 54% | 57% | 57% |
| 6159 | 0.25% | 0.00% | 0.00% | 1.00% | 1.00% | 28% | 36% | 26% | 34% | 25% | 33% | 28% | 36% | 34% | 44% | 26% | 26% | 29% | 29% |
| 6160 | 1.00% | 0.25% | 0.00% | 1.00% | 1.00% | 35% | 46% | 34% | 44% | 34% | 44% | 37% | 48% | 42% | 55% | 34% | 34% | 38% | 38% |
| 6161 | 0.00% | 1.00% | 0.00% | 1.00% | 1.00% | 39% | 51% | 40% | 52% | 32% | 42% | 39% | 51% | 49% | 64% | 37% | 37% | 40% | 40% |
| 6162 | 0.25% | 1.00% | 0.00% | 1.00% | 1.00% | 41% | 53% | 41% | 53% | 34% | 44% | 40% | 52% | 50% | 65% | 39% | 39% | 41% | 41% |
| 6163 | 1.00% | 1.00% | 0.00% | 1.00% | 1.00% | 43% | 56% | 42% | 55% | 37% | 48% | 42% | 55% | 52% | 68% | 41% | 41% | 44% | 44% |
| 6164 | 0.00% | 0.00% | 0.25% | 1.00% | 1.00% | 29% | 38% | 29% | 38% | 28% | 36% | 30% | 39% | 36% | 47% | 29% | 29% | 31% | 31% |
| 6165 | 1.00% | 0.00% | 0.25% | 1.00% | 1.00% | 33% | 43% | 31% | 40% | 33% | 43% | 33% | 43% | 39% | 51% | 32% | 32% | 35% | 35% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6166 | 0.25% | 0.25% | 0.25% | 1.00% | 1.00% | 36% | 47% | 37% | 48% | 36% | 47% | 38% | 49% | 43% | 56% | 36% | 36% | 39% | 39% |
| 6167 | 1.00% | 0.25% | 0.25% | 1.00% | 1.00% | 38% | 49% | 38% | 49% | 39% | 51% | 40% | 52% | 45% | 59% | 38% | 38% | 41% | 41% |
| 6168 | 9.00% | 0.25% | 0.25% | 1.00% | 1.00% | 34% | 44% | 36% | 47% | 34% | 44% | 37% | 48% | 42% | 55% | 35% | 35% | 38% | 38% |
| 6169 | 0.00% | 1.00% | 0.25% | 1.00% | 1.00% | 42% | 55% | 44% | 57% | 37% | 48% | 42% | 55% | 52% | 68% | 41% | 41% | 44% | 44% |
| 6170 | 0.25% | 1.00% | 0.25% | 1.00% | 1.00% | 44% | 57% | 45% | 59% | 39% | 51% | 43% | 56% | 53% | 69% | 43% | 43% | 45% | 45% |
| 6171 | 1.00% | 1.00% | 0.25% | 1.00% | 1.00% | 46% | 60% | 46% | 60% | 42% | 55% | 45% | 59% | 55% | 72% | 45% | 45% | 47% | 47% |
| 6172 | 9.00% | 1.00% | 0.25% | 1.00% | 1.00% | 42% | 55% | 44% | 57% | 37% | 48% | 42% | 55% | 52% | 68% | 41% | 41% | 44% | 44% |
| 6173 | 0.25% | 9.00% | 0.25% | 1.00% | 1.00% | 57% | 74% | 55% | 72% | 43% | 56% | 54% | 70% | 63% | 82% | 52% | 52% | 53% | 53% |
| 6174 | 1.00% | 9.00% | 0.25% | 1.00% | 1.00% | 59% | 77% | 56% | 73% | 46% | 60% | 56% | 73% | 65% | 85% | 54% | 54% | 56% | 56% |
| 6175 | 9.00% | 9.00% | 0.25% | 1.00% | 1.00% | 55% | 72% | 54% | 70% | 41% | 53% | 53% | 69% | 62% | 81% | 50% | 50% | 52% | 52% |
| 6176 | 0.00% | 0.00% | 1.00% | 1.00% | 1.00% | 32% | 42% | 32% | 42% | 32% | 42% | 34% | 44% | 42% | 55% | 32% | 32% | 36% | 36% |
| 6177 | 0.25% | 0.00% | 1.00% | 1.00% | 1.00% | 34% | 44% | 33% | 43% | 34% | 44% | 35% | 46% | 43% | 56% | 34% | 34% | 37% | 37% |
| 6178 | 1.00% | 0.00% | 1.00% | 1.00% | 1.00% | 36% | 47% | 34% | 44% | 37% | 48% | 37% | 48% | 45% | 59% | 36% | 36% | 40% | 40% |
| 6179 | 0.00% | 0.25% | 1.00% | 1.00% | 1.00% | 37% | 48% | 39% | 51% | 38% | 49% | 41% | 53% | 48% | 62% | 38% | 38% | 42% | 42% |
| 6180 | 1.00% | 0.25% | 1.00% | 1.00% | 1.00% | 41% | 53% | 41% | 53% | 43% | 56% | 44% | 57% | 51% | 66% | 42% | 42% | 46% | 46% |
| 6181 | 9.00% | 0.25% | 1.00% | 1.00% | 1.00% | 37% | 48% | 39% | 51% | 38% | 49% | 41% | 53% | 48% | 62% | 38% | 38% | 42% | 42% |
| 6182 | 0.00% | 1.00% | 1.00% | 1.00% | 1.00% | 45% | 59% | 47% | 61% | 41% | 53% | 46% | 60% | 58% | 75% | 44% | 44% | 48% | 48% |
| 6183 | 0.25% | 1.00% | 1.00% | 1.00% | 1.00% | 47% | 61% | 48% | 62% | 43% | 56% | 47% | 61% | 59% | 77% | 46% | 46% | 50% | 50% |
| 6184 | 1.00% | 1.00% | 1.00% | 1.00% | 1.00% | 49% | 64% | 49% | 64% | 46% | 60% | 49% | 64% | 61% | 79% | 48% | 48% | 52% | 52% |
| 6185 | 9.00% | 1.00% | 1.00% | 1.00% | 1.00% | 45% | 59% | 47% | 61% | 41% | 53% | 46% | 60% | 58% | 75% | 44% | 44% | 48% | 48% |
| 6186 | 0.00% | 9.00% | 1.00% | 1.00% | 1.00% | 58% | 75% | 57% | 74% | 45% | 59% | 57% | 74% | 68% | 88% | 53% | 53% | 57% | 57% |
| 6187 | 0.25% | 9.00% | 1.00% | 1.00% | 1.00% | 60% | 78% | 58% | 75% | 47% | 61% | 58% | 75% | 69% | 90% | 55% | 55% | 58% | 58% |
| 6188 | 1.00% | 9.00% | 1.00% | 1.00% | 1.00% | 62% | 81% | 59% | 77% | 50% | 65% | 60% | 78% | 71% | 92% | 57% | 57% | 60% | 60% |
| 6189 | 0.25% | 0.25% | 9.00% | 1.00% | 1.00% | 43% | 56% | 44% | 57% | 44% | 57% | 45% | 59% | 55% | 72% | 44% | 44% | 48% | 48% |
| 6190 | 1.00% | 0.25% | 9.00% | 1.00% | 1.00% | 45% | 59% | 45% | 59% | 47% | 61% | 47% | 61% | 57% | 74% | 46% | 46% | 50% | 50% |

Fig. 23

| Formula # | Gamma Dodecalactone | Methyl Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6191 | 9.00% | 0.25% | 9.00% | 1.00% | 1.00% | 41% | 53% | 43% | 56% | 42% | 55% | 44% | 57% | 54% | 70% | 42% | 42% | 47% | 47% |
| 6192 | 0.25% | 1.00% | 9.00% | 1.00% | 1.00% | 51% | 66% | 52% | 68% | 47% | 61% | 50% | 65% | 65% | 85% | 50% | 50% | 54% | 54% |
| 6193 | 0.00% | 0.25% | 0.00% | 9.00% | 1.00% | 53% | 69% | 52% | 68% | 45% | 59% | 56% | 73% | 59% | 77% | 50% | 50% | 53% | 53% |
| 6194 | 0.00% | 0.00% | 0.25% | 9.00% | 1.00% | 51% | 66% | 49% | 64% | 44% | 57% | 52% | 68% | 56% | 73% | 48% | 48% | 51% | 51% |
| 6195 | 0.25% | 0.00% | 0.25% | 9.00% | 1.00% | 53% | 69% | 50% | 65% | 46% | 60% | 53% | 69% | 57% | 74% | 50% | 50% | 52% | 52% |
| 6196 | 0.00% | 0.25% | 0.25% | 9.00% | 1.00% | 56% | 73% | 56% | 73% | 50% | 65% | 59% | 77% | 62% | 81% | 54% | 54% | 57% | 57% |
| 6197 | 0.25% | 0.25% | 0.25% | 9.00% | 1.00% | 58% | 75% | 57% | 74% | 52% | 68% | 60% | 78% | 63% | 82% | 56% | 56% | 58% | 58% |
| 6198 | 1.00% | 0.25% | 0.25% | 9.00% | 1.00% | 60% | 78% | 58% | 75% | 55% | 72% | 62% | 81% | 65% | 85% | 58% | 58% | 61% | 61% |
| 6199 | 9.00% | 0.25% | 0.25% | 9.00% | 1.00% | 56% | 73% | 56% | 73% | 50% | 65% | 59% | 77% | 62% | 81% | 54% | 54% | 57% | 57% |
| 6200 | 0.00% | 1.00% | 0.25% | 9.00% | 1.00% | 64% | 83% | 64% | 83% | 53% | 69% | 64% | 83% | 72% | 94% | 60% | 60% | 63% | 63% |
| 6201 | 0.25% | 1.00% | 0.25% | 9.00% | 1.00% | 66% | 86% | 65% | 85% | 55% | 72% | 65% | 85% | 73% | 95% | 62% | 62% | 64% | 64% |
| 6202 | 1.00% | 1.00% | 0.25% | 9.00% | 1.00% | 68% | 88% | 66% | 86% | 58% | 75% | 67% | 87% | 75% | 98% | 64% | 64% | 67% | 67% |
| 6203 | 0.25% | 9.00% | 0.25% | 9.00% | 1.00% | 79% | 100% | 75% | 98% | 59% | 77% | 76% | 99% | 83% | 100% | 71% | 71% | 73% | 73% |
| 6204 | 0.25% | 0.00% | 1.00% | 9.00% | 1.00% | 56% | 73% | 53% | 69% | 50% | 65% | 57% | 74% | 63% | 82% | 53% | 53% | 57% | 57% |
| 6205 | 1.00% | 0.25% | 1.00% | 9.00% | 1.00% | 63% | 82% | 61% | 79% | 59% | 77% | 66% | 86% | 71% | 92% | 61% | 61% | 65% | 65% |
| 6206 | 9.00% | 0.25% | 1.00% | 9.00% | 1.00% | 59% | 77% | 59% | 77% | 54% | 70% | 63% | 82% | 68% | 88% | 57% | 57% | 62% | 62% |
| 6207 | 0.00% | 1.00% | 1.00% | 9.00% | 1.00% | 67% | 87% | 67% | 87% | 57% | 74% | 68% | 88% | 78% | 100% | 64% | 64% | 68% | 68% |
| 6208 | 0.25% | 1.00% | 1.00% | 9.00% | 1.00% | 69% | 90% | 68% | 88% | 59% | 77% | 69% | 90% | 79% | 100% | 65% | 65% | 69% | 69% |
| 6209 | 1.00% | 1.00% | 1.00% | 9.00% | 1.00% | 71% | 92% | 69% | 90% | 62% | 81% | 71% | 92% | 81% | 100% | 67% | 67% | 71% | 71% |
| 6210 | 0.25% | 0.25% | 9.00% | 9.00% | 1.00% | 65% | 85% | 64% | 83% | 60% | 78% | 67% | 87% | 75% | 98% | 63% | 63% | 67% | 67% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6211 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 6212 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 6213 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 6214 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 6215 | 0.25% | 0.00% | 0.25% | 0.00% | 0.00% | 5% | 7% | 5% | 7% | 7% | 9% | 4% | 5% | 4% | 5% | 6% | 6% | 5% | 5% |
| 6216 | 1.00% | 0.00% | 0.25% | 0.00% | 0.00% | 7% | 9% | 6% | 8% | 10% | 13% | 6% | 8% | 6% | 8% | 8% | 8% | 7% | 7% |
| 6217 | 0.00% | 0.25% | 0.25% | 0.00% | 0.00% | 8% | 10% | 11% | 14% | 11% | 14% | 10% | 13% | 9% | 12% | 10% | 10% | 10% | 10% |
| 6218 | 0.25% | 0.25% | 0.25% | 0.00% | 0.00% | 10% | 13% | 12% | 16% | 13% | 17% | 11% | 14% | 10% | 13% | 12% | 12% | 11% | 11% |
| 6219 | 0.00% | 1.00% | 0.25% | 0.00% | 0.00% | 16% | 21% | 19% | 25% | 14% | 18% | 15% | 20% | 19% | 25% | 16% | 16% | 16% | 16% |
| 6220 | 1.00% | 1.00% | 0.25% | 0.00% | 0.00% | 20% | 26% | 21% | 27% | 19% | 25% | 18% | 23% | 22% | 29% | 20% | 20% | 20% | 20% |
| 6221 | 1.00% | 9.00% | 0.25% | 0.00% | 0.00% | 33% | 43% | 31% | 40% | 23% | 30% | 29% | 38% | 32% | 42% | 29% | 29% | 28% | 28% |
| 6222 | 0.25% | 0.00% | 1.00% | 0.00% | 0.00% | 8% | 10% | 8% | 10% | 11% | 14% | 8% | 10% | 10% | 13% | 9% | 9% | 10% | 10% |
| 6223 | 1.00% | 0.00% | 1.00% | 0.00% | 0.00% | 10% | 13% | 9% | 12% | 14% | 18% | 10% | 13% | 12% | 16% | 11% | 11% | 12% | 12% |
| 6224 | 0.00% | 0.25% | 1.00% | 0.00% | 0.00% | 11% | 14% | 14% | 18% | 15% | 20% | 14% | 18% | 15% | 20% | 13% | 13% | 15% | 15% |
| 6225 | 1.00% | 0.25% | 1.00% | 0.00% | 0.00% | 15% | 20% | 16% | 21% | 20% | 26% | 17% | 22% | 18% | 23% | 17% | 17% | 18% | 18% |
| 6226 | 0.00% | 1.00% | 1.00% | 0.00% | 0.00% | 19% | 25% | 22% | 29% | 18% | 23% | 19% | 25% | 25% | 33% | 20% | 20% | 21% | 21% |
| 6227 | 0.25% | 1.00% | 1.00% | 0.00% | 0.00% | 21% | 27% | 23% | 30% | 20% | 26% | 20% | 26% | 26% | 34% | 21% | 21% | 22% | 22% |
| 6228 | 1.00% | 1.00% | 1.00% | 0.00% | 0.00% | 23% | 30% | 24% | 31% | 23% | 30% | 22% | 29% | 28% | 36% | 23% | 23% | 24% | 24% |
| 6229 | 9.00% | 1.00% | 1.00% | 0.00% | 0.00% | 19% | 25% | 22% | 29% | 18% | 23% | 19% | 25% | 25% | 33% | 20% | 20% | 21% | 21% |
| 6230 | 1.00% | 9.00% | 1.00% | 0.00% | 0.00% | 36% | 47% | 34% | 44% | 27% | 35% | 33% | 43% | 38% | 49% | 32% | 32% | 33% | 33% |
| 6231 | 0.25% | 0.00% | 9.00% | 0.00% | 0.00% | 12% | 16% | 12% | 16% | 15% | 20% | 11% | 14% | 16% | 21% | 13% | 13% | 14% | 14% |
| 6232 | 0.00% | 0.25% | 9.00% | 0.00% | 0.00% | 15% | 20% | 18% | 23% | 19% | 25% | 17% | 22% | 21% | 27% | 17% | 17% | 19% | 19% |
| 6233 | 0.25% | 0.25% | 9.00% | 0.00% | 0.00% | 17% | 22% | 19% | 25% | 21% | 27% | 18% | 23% | 22% | 29% | 19% | 19% | 20% | 20% |
| 6234 | 1.00% | 0.25% | 9.00% | 0.00% | 0.00% | 19% | 25% | 20% | 26% | 24% | 31% | 20% | 26% | 24% | 31% | 21% | 21% | 23% | 23% |
| 6235 | 0.25% | 1.00% | 9.00% | 0.00% | 0.00% | 25% | 33% | 27% | 35% | 24% | 31% | 23% | 30% | 32% | 42% | 25% | 25% | 26% | 26% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6236 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 6237 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 6238 | 0.00% | 0.25% | 0.00% | 0.25% | 0.00% | 13% | 17% | 15% | 20% | 15% | 20% | 14% | 18% | 13% | 17% | 14% | 14% | 14% | 14% |
| 6239 | 0.25% | 0.25% | 0.00% | 0.25% | 0.00% | 15% | 20% | 16% | 21% | 17% | 22% | 15% | 20% | 14% | 18% | 16% | 16% | 15% | 15% |
| 6240 | 9.00% | 0.25% | 0.00% | 0.25% | 0.00% | 13% | 17% | 15% | 20% | 15% | 20% | 14% | 18% | 13% | 17% | 14% | 14% | 14% | 14% |
| 6241 | 1.00% | 1.00% | 0.00% | 0.25% | 0.00% | 25% | 33% | 25% | 33% | 23% | 30% | 22% | 29% | 26% | 34% | 24% | 24% | 24% | 24% |
| 6242 | 1.00% | 9.00% | 0.00% | 0.25% | 0.00% | 38% | 49% | 35% | 46% | 27% | 35% | 33% | 43% | 36% | 47% | 33% | 33% | 32% | 32% |
| 6243 | 0.00% | 0.00% | 0.25% | 0.25% | 0.00% | 11% | 14% | 12% | 16% | 14% | 18% | 10% | 13% | 10% | 13% | 12% | 12% | 11% | 11% |
| 6244 | 0.25% | 0.00% | 0.25% | 0.25% | 0.00% | 13% | 17% | 13% | 17% | 16% | 21% | 11% | 14% | 11% | 14% | 14% | 14% | 13% | 13% |
| 6245 | 0.00% | 0.25% | 0.25% | 0.25% | 0.00% | 16% | 21% | 19% | 25% | 20% | 26% | 17% | 22% | 16% | 21% | 18% | 18% | 18% | 18% |
| 6246 | 0.25% | 0.25% | 0.25% | 0.25% | 0.00% | 18% | 23% | 20% | 26% | 22% | 29% | 18% | 23% | 17% | 22% | 20% | 20% | 19% | 19% |
| 6247 | 1.00% | 0.25% | 0.25% | 0.25% | 0.00% | 20% | 26% | 21% | 27% | 25% | 33% | 20% | 26% | 19% | 25% | 22% | 22% | 21% | 21% |
| 6248 | 9.00% | 0.25% | 0.25% | 0.25% | 0.00% | 16% | 21% | 19% | 25% | 20% | 26% | 17% | 22% | 16% | 21% | 18% | 18% | 18% | 18% |
| 6249 | 0.25% | 1.00% | 0.25% | 0.25% | 0.00% | 26% | 34% | 28% | 36% | 25% | 33% | 23% | 30% | 27% | 35% | 26% | 26% | 25% | 25% |
| 6250 | 9.00% | 1.00% | 0.25% | 0.25% | 0.00% | 24% | 31% | 27% | 35% | 23% | 30% | 22% | 29% | 26% | 34% | 25% | 25% | 24% | 24% |
| 6251 | 0.25% | 9.00% | 0.25% | 0.25% | 0.00% | 39% | 51% | 38% | 49% | 29% | 38% | 34% | 44% | 37% | 48% | 35% | 35% | 33% | 33% |
| 6252 | 1.00% | 9.00% | 0.25% | 0.25% | 0.00% | 41% | 53% | 39% | 51% | 32% | 42% | 36% | 47% | 39% | 51% | 37% | 37% | 36% | 36% |
| 6253 | 9.00% | 9.00% | 0.25% | 0.25% | 0.00% | 37% | 48% | 37% | 48% | 27% | 35% | 33% | 43% | 36% | 47% | 34% | 34% | 32% | 32% |
| 6254 | 0.00% | 0.00% | 1.00% | 0.25% | 0.00% | 14% | 18% | 15% | 20% | 18% | 23% | 14% | 18% | 16% | 21% | 16% | 16% | 16% | 16% |
| 6255 | 1.00% | 0.00% | 1.00% | 0.25% | 0.00% | 18% | 23% | 17% | 22% | 23% | 30% | 17% | 22% | 19% | 25% | 19% | 19% | 20% | 20% |
| 6256 | 0.00% | 0.25% | 1.00% | 0.25% | 0.00% | 19% | 25% | 22% | 29% | 24% | 31% | 21% | 27% | 22% | 29% | 22% | 22% | 22% | 22% |
| 6257 | 0.25% | 0.25% | 1.00% | 0.25% | 0.00% | 21% | 27% | 23% | 30% | 26% | 34% | 22% | 29% | 23% | 30% | 23% | 23% | 24% | 24% |
| 6258 | 1.00% | 0.25% | 1.00% | 0.25% | 0.00% | 23% | 30% | 24% | 31% | 29% | 38% | 24% | 31% | 25% | 33% | 25% | 25% | 26% | 26% |
| 6259 | 9.00% | 0.25% | 1.00% | 0.25% | 0.00% | 19% | 25% | 22% | 29% | 24% | 31% | 21% | 27% | 22% | 29% | 22% | 22% | 22% | 22% |
| 6260 | 0.00% | 1.00% | 1.00% | 0.25% | 0.00% | 27% | 35% | 30% | 39% | 27% | 35% | 26% | 34% | 32% | 42% | 28% | 28% | 28% | 28% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6261 | 0.25% | 1.00% | 1.00% | 0.25% | 0.00% | 29% | 38% | 31% | 40% | 29% | 38% | 27% | 35% | 33% | 43% | 30% | 30% | 30% | 30% |
| 6262 | 1.00% | 1.00% | 1.00% | 0.25% | 0.00% | 31% | 40% | 32% | 42% | 32% | 42% | 29% | 38% | 35% | 46% | 32% | 32% | 32% | 32% |
| 6263 | 9.00% | 1.00% | 1.00% | 0.25% | 0.00% | 27% | 35% | 30% | 39% | 27% | 35% | 26% | 34% | 32% | 42% | 28% | 28% | 28% | 28% |
| 6264 | 0.00% | 9.00% | 1.00% | 0.25% | 0.00% | 40% | 52% | 40% | 52% | 31% | 40% | 37% | 48% | 42% | 55% | 37% | 37% | 37% | 37% |
| 6265 | 0.25% | 9.00% | 1.00% | 0.25% | 0.00% | 42% | 55% | 41% | 53% | 33% | 43% | 38% | 49% | 43% | 56% | 39% | 39% | 38% | 38% |
| 6266 | 1.00% | 9.00% | 1.00% | 0.25% | 0.00% | 44% | 57% | 42% | 55% | 36% | 47% | 40% | 52% | 45% | 59% | 41% | 41% | 40% | 40% |
| 6267 | 0.25% | 0.25% | 9.00% | 0.25% | 0.00% | 25% | 33% | 27% | 35% | 30% | 39% | 25% | 33% | 29% | 38% | 27% | 27% | 28% | 28% |
| 6268 | 1.00% | 0.25% | 9.00% | 0.25% | 0.00% | 27% | 35% | 28% | 36% | 33% | 43% | 27% | 35% | 31% | 40% | 29% | 29% | 30% | 30% |
| 6269 | 9.00% | 0.25% | 9.00% | 0.25% | 0.00% | 23% | 30% | 26% | 34% | 28% | 36% | 24% | 31% | 28% | 36% | 26% | 26% | 27% | 27% |
| 6270 | 0.00% | 1.00% | 9.00% | 0.25% | 0.00% | 31% | 40% | 34% | 44% | 31% | 40% | 29% | 38% | 38% | 49% | 32% | 32% | 33% | 33% |
| 6271 | 0.25% | 1.00% | 9.00% | 0.25% | 0.00% | 33% | 43% | 35% | 46% | 33% | 43% | 30% | 39% | 39% | 51% | 34% | 34% | 34% | 34% |
| 6272 | 9.00% | 1.00% | 9.00% | 0.25% | 0.00% | 31% | 40% | 34% | 44% | 31% | 40% | 29% | 38% | 38% | 49% | 32% | 32% | 33% | 33% |
| 6273 | 1.00% | 9.00% | 9.00% | 0.25% | 0.00% | 48% | 62% | 46% | 60% | 40% | 52% | 43% | 56% | 51% | 66% | 45% | 45% | 45% | 45% |
| 6274 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 6275 | 1.00% | 0.25% | 0.00% | 1.00% | 0.00% | 34% | 44% | 30% | 39% | 33% | 43% | 32% | 42% | 29% | 38% | 32% | 32% | 31% | 31% |
| 6276 | 0.00% | 1.00% | 0.00% | 1.00% | 0.00% | 38% | 49% | 36% | 47% | 31% | 40% | 34% | 44% | 36% | 47% | 35% | 35% | 34% | 34% |
| 6277 | 0.25% | 1.00% | 0.00% | 1.00% | 0.00% | 40% | 52% | 37% | 48% | 33% | 43% | 35% | 46% | 37% | 48% | 37% | 37% | 35% | 35% |
| 6278 | 1.00% | 1.00% | 0.00% | 1.00% | 0.00% | 42% | 55% | 38% | 49% | 36% | 47% | 37% | 48% | 39% | 51% | 39% | 39% | 37% | 37% |
| 6279 | 0.00% | 0.00% | 0.25% | 1.00% | 0.00% | 28% | 36% | 25% | 33% | 27% | 35% | 25% | 33% | 23% | 30% | 27% | 27% | 25% | 25% |
| 6280 | 1.00% | 0.00% | 0.25% | 1.00% | 0.00% | 32% | 42% | 27% | 35% | 32% | 42% | 28% | 36% | 26% | 34% | 30% | 30% | 29% | 29% |
| 6281 | 0.25% | 0.25% | 0.25% | 1.00% | 0.00% | 35% | 46% | 33% | 43% | 35% | 46% | 33% | 43% | 30% | 39% | 34% | 34% | 33% | 33% |
| 6282 | 1.00% | 0.25% | 0.25% | 1.00% | 0.00% | 37% | 48% | 34% | 44% | 38% | 49% | 35% | 46% | 32% | 42% | 36% | 36% | 35% | 35% |
| 6283 | 9.00% | 0.25% | 0.25% | 1.00% | 0.00% | 33% | 43% | 32% | 42% | 33% | 43% | 32% | 42% | 29% | 38% | 33% | 33% | 31% | 31% |
| 6284 | 0.00% | 1.00% | 0.25% | 1.00% | 0.00% | 41% | 53% | 40% | 52% | 36% | 47% | 37% | 48% | 39% | 51% | 39% | 39% | 37% | 37% |
| 6285 | 0.25% | 1.00% | 0.25% | 1.00% | 0.00% | 43% | 56% | 41% | 53% | 38% | 49% | 38% | 49% | 40% | 52% | 41% | 41% | 39% | 39% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6286 | 1.00% | 1.00% | 0.25% | 1.00% | 0.00% | 45% | 59% | 42% | 55% | 41% | 53% | 40% | 52% | 42% | 55% | 43% | 43% | 41% | 41% |
| 6287 | 9.00% | 1.00% | 0.25% | 1.00% | 0.00% | 41% | 53% | 40% | 52% | 36% | 47% | 37% | 48% | 39% | 51% | 39% | 39% | 37% | 37% |
| 6288 | 0.25% | 9.00% | 0.25% | 1.00% | 0.00% | 56% | 73% | 51% | 66% | 42% | 55% | 49% | 64% | 50% | 65% | 50% | 50% | 47% | 47% |
| 6289 | 1.00% | 9.00% | 0.25% | 1.00% | 0.00% | 58% | 75% | 52% | 68% | 45% | 59% | 51% | 66% | 52% | 68% | 52% | 52% | 49% | 49% |
| 6290 | 9.00% | 9.00% | 0.25% | 1.00% | 0.00% | 54% | 70% | 50% | 65% | 40% | 52% | 48% | 62% | 49% | 64% | 48% | 48% | 46% | 46% |
| 6291 | 0.00% | 0.00% | 1.00% | 1.00% | 0.00% | 31% | 40% | 28% | 36% | 31% | 40% | 29% | 38% | 29% | 38% | 30% | 30% | 30% | 30% |
| 6292 | 0.25% | 0.00% | 1.00% | 1.00% | 0.00% | 33% | 43% | 29% | 38% | 33% | 43% | 30% | 39% | 30% | 39% | 32% | 32% | 31% | 31% |
| 6293 | 1.00% | 0.00% | 1.00% | 1.00% | 0.00% | 35% | 46% | 30% | 39% | 36% | 47% | 32% | 42% | 32% | 42% | 34% | 34% | 33% | 33% |
| 6294 | 0.00% | 0.25% | 1.00% | 1.00% | 0.00% | 36% | 47% | 35% | 46% | 37% | 48% | 36% | 47% | 35% | 46% | 36% | 36% | 36% | 36% |
| 6295 | 1.00% | 0.25% | 1.00% | 1.00% | 0.00% | 40% | 52% | 37% | 48% | 42% | 55% | 39% | 51% | 38% | 49% | 40% | 40% | 40% | 40% |
| 6296 | 9.00% | 0.25% | 1.00% | 1.00% | 0.00% | 36% | 47% | 35% | 46% | 37% | 48% | 36% | 47% | 35% | 46% | 36% | 36% | 36% | 36% |
| 6297 | 0.00% | 1.00% | 1.00% | 1.00% | 0.00% | 44% | 57% | 43% | 56% | 40% | 52% | 41% | 53% | 45% | 59% | 42% | 42% | 42% | 42% |
| 6298 | 0.25% | 1.00% | 1.00% | 1.00% | 0.00% | 46% | 60% | 44% | 57% | 42% | 55% | 42% | 55% | 46% | 60% | 44% | 44% | 43% | 43% |
| 6299 | 1.00% | 1.00% | 1.00% | 1.00% | 0.00% | 48% | 62% | 45% | 59% | 45% | 59% | 44% | 57% | 48% | 62% | 46% | 46% | 46% | 46% |
| 6300 | 9.00% | 1.00% | 1.00% | 1.00% | 0.00% | 44% | 57% | 43% | 56% | 40% | 52% | 41% | 53% | 45% | 59% | 42% | 42% | 42% | 42% |
| 6301 | 0.00% | 9.00% | 1.00% | 1.00% | 0.00% | 57% | 74% | 53% | 69% | 44% | 57% | 52% | 68% | 55% | 72% | 51% | 51% | 50% | 50% |
| 6302 | 0.25% | 9.00% | 1.00% | 1.00% | 0.00% | 59% | 77% | 54% | 70% | 46% | 60% | 53% | 69% | 56% | 73% | 53% | 53% | 52% | 52% |
| 6303 | 1.00% | 9.00% | 1.00% | 1.00% | 0.00% | 61% | 79% | 55% | 72% | 49% | 64% | 55% | 72% | 58% | 75% | 55% | 55% | 54% | 54% |
| 6304 | 0.25% | 0.25% | 9.00% | 1.00% | 0.00% | 42% | 55% | 40% | 52% | 43% | 56% | 40% | 52% | 42% | 55% | 42% | 42% | 42% | 42% |
| 6305 | 1.00% | 0.25% | 9.00% | 1.00% | 0.00% | 44% | 57% | 41% | 53% | 46% | 60% | 42% | 55% | 44% | 57% | 44% | 44% | 44% | 44% |
| 6306 | 9.00% | 0.25% | 9.00% | 1.00% | 0.00% | 40% | 52% | 39% | 51% | 41% | 53% | 39% | 51% | 41% | 53% | 40% | 40% | 40% | 40% |
| 6307 | 0.25% | 1.00% | 9.00% | 1.00% | 0.00% | 50% | 65% | 48% | 62% | 46% | 60% | 45% | 59% | 52% | 68% | 48% | 48% | 48% | 48% |
| 6308 | 0.00% | 0.25% | 0.00% | 9.00% | 0.00% | 47% | 61% | 42% | 55% | 40% | 52% | 45% | 59% | 40% | 52% | 43% | 43% | 42% | 42% |
| 6309 | 0.00% | 0.00% | 0.25% | 9.00% | 0.00% | 45% | 59% | 39% | 51% | 39% | 51% | 41% | 53% | 37% | 48% | 41% | 41% | 39% | 39% |
| 6310 | 0.25% | 0.00% | 0.25% | 9.00% | 0.00% | 47% | 61% | 40% | 52% | 41% | 53% | 42% | 55% | 38% | 49% | 43% | 43% | 40% | 40% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6311 | 0.00% | 0.25% | 0.25% | 9.00% | 0.00% | 50% | 65% | 46% | 60% | 45% | 59% | 48% | 62% | 43% | 56% | 47% | 47% | 45% | 45% |
| 6312 | 0.25% | 0.25% | 0.25% | 9.00% | 0.00% | 52% | 68% | 47% | 61% | 47% | 61% | 49% | 64% | 44% | 57% | 49% | 49% | 47% | 47% |
| 6313 | 1.00% | 0.25% | 0.25% | 9.00% | 0.00% | 54% | 70% | 48% | 62% | 50% | 65% | 51% | 66% | 46% | 60% | 51% | 51% | 49% | 49% |
| 6314 | 9.00% | 0.25% | 0.25% | 9.00% | 0.00% | 50% | 65% | 46% | 60% | 45% | 59% | 48% | 62% | 43% | 56% | 47% | 47% | 45% | 45% |
| 6315 | 0.00% | 1.00% | 0.25% | 9.00% | 0.00% | 58% | 75% | 54% | 70% | 48% | 62% | 53% | 69% | 53% | 69% | 53% | 53% | 51% | 51% |
| 6316 | 0.25% | 1.00% | 0.25% | 9.00% | 0.00% | 60% | 78% | 55% | 72% | 50% | 65% | 54% | 70% | 54% | 70% | 55% | 55% | 53% | 53% |
| 6317 | 1.00% | 1.00% | 0.25% | 9.00% | 0.00% | 62% | 81% | 56% | 73% | 53% | 69% | 56% | 73% | 56% | 73% | 57% | 57% | 55% | 55% |
| 6318 | 0.25% | 9.00% | 0.25% | 9.00% | 0.00% | 73% | 95% | 65% | 85% | 54% | 70% | 65% | 85% | 64% | 83% | 64% | 64% | 61% | 61% |
| 6319 | 0.25% | 0.00% | 1.00% | 9.00% | 0.00% | 50% | 65% | 43% | 56% | 45% | 59% | 46% | 60% | 44% | 57% | 46% | 46% | 45% | 45% |
| 6320 | 1.00% | 0.25% | 1.00% | 9.00% | 0.00% | 57% | 74% | 51% | 66% | 54% | 70% | 55% | 72% | 52% | 68% | 54% | 54% | 54% | 54% |
| 6321 | 9.00% | 0.25% | 1.00% | 9.00% | 0.00% | 53% | 69% | 49% | 64% | 49% | 64% | 52% | 68% | 49% | 64% | 50% | 50% | 50% | 50% |
| 6322 | 0.00% | 1.00% | 1.00% | 9.00% | 0.00% | 61% | 79% | 57% | 74% | 52% | 68% | 57% | 74% | 59% | 77% | 57% | 57% | 56% | 56% |
| 6323 | 0.25% | 1.00% | 1.00% | 9.00% | 0.00% | 63% | 82% | 58% | 75% | 54% | 70% | 58% | 75% | 60% | 78% | 58% | 58% | 57% | 57% |
| 6324 | 1.00% | 1.00% | 1.00% | 9.00% | 0.00% | 65% | 85% | 59% | 77% | 57% | 74% | 60% | 78% | 62% | 81% | 60% | 60% | 60% | 60% |
| 6325 | 0.25% | 0.25% | 9.00% | 9.00% | 0.00% | 59% | 77% | 54% | 70% | 55% | 72% | 56% | 73% | 56% | 73% | 56% | 56% | 56% | 56% |
| 6326 | 0.25% | 0.25% | 0.00% | 0.00% | 0.25% | 13% | 17% | 15% | 20% | 14% | 18% | 13% | 17% | 14% | 18% | 14% | 14% | 14% | 14% |
| 6327 | 1.00% | 0.25% | 0.00% | 0.00% | 0.25% | 15% | 20% | 16% | 21% | 17% | 22% | 15% | 20% | 16% | 21% | 16% | 16% | 16% | 16% |
| 6328 | 0.25% | 1.00% | 0.00% | 0.00% | 0.25% | 21% | 27% | 23% | 30% | 17% | 22% | 18% | 23% | 24% | 31% | 20% | 20% | 20% | 20% |
| 6329 | 1.00% | 1.00% | 0.00% | 0.00% | 0.25% | 23% | 30% | 24% | 31% | 20% | 26% | 20% | 26% | 26% | 34% | 22% | 22% | 22% | 22% |
| 6330 | 0.25% | 0.00% | 0.25% | 0.00% | 0.25% | 11% | 14% | 12% | 16% | 13% | 17% | 9% | 12% | 11% | 14% | 12% | 12% | 11% | 11% |
| 6331 | 1.00% | 0.00% | 0.25% | 0.00% | 0.25% | 13% | 17% | 13% | 17% | 16% | 21% | 11% | 14% | 13% | 17% | 14% | 14% | 13% | 13% |
| 6332 | 0.00% | 0.25% | 0.25% | 0.00% | 0.25% | 14% | 18% | 18% | 23% | 17% | 22% | 15% | 20% | 16% | 21% | 16% | 16% | 16% | 16% |
| 6333 | 0.25% | 0.25% | 0.25% | 0.00% | 0.25% | 16% | 21% | 19% | 25% | 19% | 25% | 16% | 21% | 17% | 22% | 18% | 18% | 17% | 17% |
| 6334 | 0.00% | 1.00% | 0.25% | 0.00% | 0.25% | 22% | 29% | 26% | 34% | 20% | 26% | 20% | 26% | 26% | 34% | 23% | 23% | 22% | 22% |
| 6335 | 1.00% | 1.00% | 0.25% | 0.00% | 0.25% | 26% | 34% | 28% | 36% | 25% | 33% | 23% | 30% | 29% | 38% | 26% | 26% | 26% | 26% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6336 | 1.00% | 9.00% | 0.25% | 0.00% | 0.25% | 39% | 51% | 38% | 49% | 29% | 38% | 34% | 44% | 39% | 51% | 35% | 35% | 34% | 34% |
| 6337 | 0.25% | 0.00% | 1.00% | 0.00% | 0.25% | 14% | 18% | 15% | 20% | 17% | 22% | 13% | 17% | 17% | 22% | 15% | 15% | 16% | 16% |
| 6338 | 1.00% | 0.00% | 1.00% | 0.00% | 0.25% | 16% | 21% | 16% | 21% | 20% | 26% | 15% | 20% | 19% | 25% | 17% | 17% | 18% | 18% |
| 6339 | 0.00% | 0.25% | 1.00% | 0.00% | 0.25% | 17% | 22% | 21% | 27% | 21% | 27% | 19% | 25% | 22% | 29% | 20% | 20% | 21% | 21% |
| 6340 | 1.00% | 0.25% | 1.00% | 0.00% | 0.25% | 21% | 27% | 23% | 30% | 26% | 34% | 22% | 29% | 25% | 33% | 23% | 23% | 24% | 24% |
| 6341 | 0.00% | 1.00% | 1.00% | 0.00% | 0.25% | 25% | 33% | 29% | 38% | 24% | 31% | 24% | 31% | 32% | 42% | 26% | 26% | 27% | 27% |
| 6342 | 0.25% | 1.00% | 1.00% | 0.00% | 0.25% | 27% | 35% | 30% | 39% | 26% | 34% | 25% | 33% | 33% | 43% | 28% | 28% | 28% | 28% |
| 6343 | 1.00% | 1.00% | 1.00% | 0.00% | 0.25% | 29% | 38% | 31% | 40% | 29% | 38% | 27% | 35% | 35% | 46% | 30% | 30% | 30% | 30% |
| 6344 | 9.00% | 1.00% | 1.00% | 0.00% | 0.25% | 25% | 33% | 29% | 38% | 24% | 31% | 24% | 31% | 32% | 42% | 26% | 26% | 27% | 27% |
| 6345 | 1.00% | 9.00% | 1.00% | 0.00% | 0.25% | 42% | 55% | 41% | 53% | 33% | 43% | 38% | 49% | 45% | 59% | 39% | 39% | 39% | 39% |
| 6346 | 0.25% | 0.00% | 9.00% | 0.00% | 0.25% | 18% | 23% | 19% | 25% | 21% | 27% | 16% | 21% | 23% | 30% | 19% | 19% | 20% | 20% |
| 6347 | 0.00% | 0.25% | 9.00% | 0.00% | 0.25% | 21% | 27% | 25% | 33% | 25% | 33% | 22% | 29% | 28% | 36% | 24% | 24% | 25% | 25% |
| 6348 | 0.25% | 0.25% | 9.00% | 0.00% | 0.25% | 23% | 30% | 26% | 34% | 27% | 35% | 23% | 30% | 29% | 38% | 25% | 25% | 26% | 26% |
| 6349 | 1.00% | 0.25% | 9.00% | 0.00% | 0.25% | 25% | 33% | 27% | 35% | 30% | 39% | 25% | 33% | 31% | 40% | 27% | 27% | 29% | 29% |
| 6350 | 0.25% | 1.00% | 9.00% | 0.00% | 0.25% | 31% | 40% | 34% | 44% | 30% | 39% | 28% | 36% | 39% | 51% | 32% | 32% | 32% | 32% |
| 6351 | 0.25% | 0.00% | 0.00% | 0.25% | 0.25% | 16% | 21% | 16% | 21% | 17% | 22% | 13% | 17% | 15% | 20% | 16% | 16% | 15% | 15% |
| 6352 | 1.00% | 0.00% | 0.00% | 0.25% | 0.25% | 18% | 23% | 17% | 22% | 20% | 26% | 15% | 20% | 17% | 22% | 18% | 18% | 17% | 17% |
| 6353 | 0.00% | 0.25% | 0.00% | 0.25% | 0.25% | 19% | 25% | 22% | 29% | 21% | 27% | 19% | 25% | 20% | 26% | 21% | 21% | 20% | 20% |
| 6354 | 0.25% | 0.25% | 0.00% | 0.25% | 0.25% | 21% | 27% | 23% | 30% | 23% | 30% | 20% | 26% | 21% | 27% | 22% | 22% | 21% | 21% |
| 6355 | 9.00% | 0.25% | 0.00% | 0.25% | 0.25% | 19% | 25% | 22% | 29% | 21% | 27% | 19% | 25% | 20% | 26% | 21% | 21% | 20% | 20% |
| 6356 | 1.00% | 1.00% | 0.00% | 0.25% | 0.25% | 31% | 40% | 32% | 42% | 29% | 38% | 27% | 35% | 33% | 43% | 31% | 31% | 30% | 30% |
| 6357 | 1.00% | 9.00% | 0.00% | 0.25% | 0.25% | 44% | 57% | 42% | 55% | 33% | 43% | 38% | 49% | 43% | 56% | 40% | 40% | 38% | 38% |
| 6358 | 0.00% | 0.00% | 0.25% | 0.25% | 0.25% | 17% | 22% | 19% | 25% | 20% | 26% | 15% | 20% | 17% | 22% | 19% | 19% | 17% | 17% |
| 6359 | 0.25% | 0.00% | 0.25% | 0.25% | 0.25% | 19% | 25% | 20% | 26% | 22% | 29% | 16% | 21% | 18% | 23% | 20% | 20% | 19% | 19% |
| 6360 | 0.00% | 0.25% | 0.25% | 0.25% | 0.25% | 22% | 29% | 26% | 34% | 26% | 34% | 22% | 29% | 23% | 30% | 25% | 25% | 24% | 24% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6361 | 0.25% | 0.25% | 0.25% | 0.25% | 0.25% | 24% | 31% | 27% | 35% | 28% | 36% | 23% | 30% | 24% | 31% | 26% | 26% | 25% | 25% |
| 6362 | 1.00% | 0.25% | 0.25% | 0.25% | 0.25% | 26% | 34% | 28% | 36% | 31% | 40% | 25% | 33% | 26% | 34% | 28% | 28% | 27% | 27% |
| 6363 | 9.00% | 0.25% | 0.25% | 0.25% | 0.25% | 22% | 29% | 26% | 34% | 26% | 34% | 22% | 29% | 23% | 30% | 25% | 25% | 24% | 24% |
| 6364 | 0.25% | 1.00% | 0.25% | 0.25% | 0.25% | 32% | 42% | 35% | 46% | 31% | 40% | 28% | 36% | 34% | 44% | 33% | 33% | 31% | 31% |
| 6365 | 9.00% | 1.00% | 0.25% | 0.25% | 0.25% | 30% | 39% | 34% | 44% | 29% | 38% | 27% | 35% | 33% | 43% | 31% | 31% | 30% | 30% |
| 6366 | 0.25% | 9.00% | 0.25% | 0.25% | 0.25% | 45% | 59% | 45% | 59% | 35% | 46% | 39% | 51% | 44% | 57% | 42% | 42% | 39% | 39% |
| 6367 | 1.00% | 9.00% | 0.25% | 0.25% | 0.25% | 47% | 61% | 46% | 60% | 38% | 49% | 41% | 53% | 46% | 60% | 44% | 44% | 42% | 42% |
| 6368 | 9.00% | 9.00% | 0.25% | 0.25% | 0.25% | 43% | 56% | 44% | 57% | 33% | 43% | 38% | 49% | 43% | 56% | 40% | 40% | 38% | 38% |
| 6369 | 0.00% | 0.00% | 1.00% | 0.25% | 0.25% | 20% | 26% | 22% | 29% | 24% | 31% | 19% | 25% | 23% | 30% | 22% | 22% | 22% | 22% |
| 6370 | 1.00% | 0.00% | 1.00% | 0.25% | 0.25% | 24% | 31% | 24% | 31% | 29% | 38% | 22% | 29% | 26% | 34% | 26% | 26% | 26% | 26% |
| 6371 | 0.00% | 0.25% | 1.00% | 0.25% | 0.25% | 25% | 33% | 29% | 38% | 30% | 39% | 26% | 34% | 29% | 38% | 28% | 28% | 28% | 28% |
| 6372 | 0.25% | 0.25% | 1.00% | 0.25% | 0.25% | 27% | 35% | 30% | 39% | 32% | 42% | 27% | 35% | 30% | 39% | 30% | 30% | 30% | 30% |
| 6373 | 1.00% | 0.25% | 1.00% | 0.25% | 0.25% | 29% | 38% | 31% | 40% | 35% | 46% | 29% | 38% | 32% | 42% | 32% | 32% | 32% | 32% |
| 6374 | 9.00% | 0.25% | 1.00% | 0.25% | 0.25% | 25% | 33% | 29% | 38% | 30% | 39% | 26% | 34% | 29% | 38% | 28% | 28% | 28% | 28% |
| 6375 | 0.00% | 1.00% | 1.00% | 0.25% | 0.25% | 33% | 43% | 37% | 48% | 33% | 43% | 31% | 40% | 39% | 51% | 34% | 34% | 34% | 34% |
| 6376 | 0.25% | 1.00% | 1.00% | 0.25% | 0.25% | 35% | 46% | 38% | 49% | 35% | 46% | 32% | 42% | 40% | 52% | 36% | 36% | 36% | 36% |
| 6377 | 1.00% | 1.00% | 1.00% | 0.25% | 0.25% | 37% | 48% | 39% | 51% | 38% | 49% | 34% | 44% | 42% | 55% | 38% | 38% | 38% | 38% |
| 6378 | 9.00% | 1.00% | 1.00% | 0.25% | 0.25% | 33% | 43% | 37% | 48% | 33% | 43% | 31% | 40% | 39% | 51% | 34% | 34% | 34% | 34% |
| 6379 | 0.00% | 9.00% | 1.00% | 0.25% | 0.25% | 46% | 60% | 47% | 61% | 37% | 48% | 42% | 55% | 49% | 64% | 43% | 43% | 43% | 43% |
| 6380 | 0.25% | 9.00% | 1.00% | 0.25% | 0.25% | 48% | 62% | 48% | 62% | 39% | 51% | 43% | 56% | 50% | 65% | 45% | 45% | 44% | 44% |
| 6381 | 1.00% | 9.00% | 1.00% | 0.25% | 0.25% | 50% | 65% | 49% | 64% | 42% | 55% | 45% | 59% | 52% | 68% | 47% | 47% | 46% | 46% |
| 6382 | 0.25% | 0.25% | 9.00% | 0.25% | 0.25% | 31% | 40% | 34% | 44% | 36% | 47% | 30% | 39% | 36% | 47% | 34% | 34% | 34% | 34% |
| 6383 | 1.00% | 0.25% | 9.00% | 0.25% | 0.25% | 33% | 43% | 35% | 46% | 39% | 51% | 32% | 42% | 38% | 49% | 36% | 36% | 36% | 36% |
| 6384 | 9.00% | 0.25% | 9.00% | 0.25% | 0.25% | 29% | 38% | 33% | 43% | 34% | 44% | 29% | 38% | 35% | 46% | 32% | 32% | 33% | 33% |
| 6385 | 0.00% | 1.00% | 9.00% | 0.25% | 0.25% | 37% | 48% | 41% | 53% | 37% | 48% | 34% | 44% | 45% | 59% | 38% | 38% | 39% | 39% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6386 | 0.25% | 1.00% | 9.00% | 0.25% | 0.25% | 39% | 51% | 42% | 55% | 39% | 51% | 35% | 46% | 46% | 60% | 40% | 40% | 40% | 40% |
| 6387 | 9.00% | 1.00% | 9.00% | 0.25% | 0.25% | 37% | 48% | 41% | 53% | 37% | 48% | 34% | 44% | 45% | 59% | 38% | 38% | 39% | 39% |
| 6388 | 1.00% | 9.00% | 9.00% | 0.25% | 0.25% | 54% | 70% | 53% | 69% | 46% | 60% | 48% | 62% | 58% | 75% | 51% | 51% | 51% | 51% |
| 6389 | 0.25% | 0.00% | 0.00% | 1.00% | 0.25% | 33% | 43% | 29% | 38% | 30% | 39% | 28% | 36% | 28% | 36% | 31% | 31% | 29% | 29% |
| 6390 | 1.00% | 0.25% | 0.00% | 1.00% | 0.25% | 40% | 52% | 37% | 48% | 39% | 51% | 37% | 48% | 36% | 47% | 39% | 39% | 37% | 37% |
| 6391 | 0.00% | 1.00% | 0.00% | 1.00% | 0.25% | 44% | 57% | 43% | 56% | 37% | 48% | 39% | 51% | 43% | 56% | 41% | 41% | 40% | 40% |
| 6392 | 0.25% | 1.00% | 0.00% | 1.00% | 0.25% | 46% | 60% | 44% | 57% | 39% | 51% | 40% | 52% | 44% | 57% | 43% | 43% | 41% | 41% |
| 6393 | 1.00% | 1.00% | 0.00% | 1.00% | 0.25% | 48% | 62% | 45% | 59% | 42% | 55% | 42% | 55% | 46% | 60% | 45% | 45% | 43% | 43% |
| 6394 | 0.00% | 0.00% | 0.25% | 1.00% | 0.25% | 34% | 44% | 32% | 42% | 33% | 43% | 30% | 39% | 30% | 39% | 33% | 33% | 31% | 31% |
| 6395 | 1.00% | 0.00% | 0.25% | 1.00% | 0.25% | 38% | 49% | 34% | 44% | 38% | 49% | 33% | 43% | 33% | 43% | 37% | 37% | 35% | 35% |
| 6396 | 0.25% | 0.25% | 0.25% | 1.00% | 0.25% | 41% | 53% | 40% | 52% | 41% | 53% | 38% | 49% | 37% | 48% | 41% | 41% | 39% | 39% |
| 6397 | 1.00% | 0.25% | 0.25% | 1.00% | 0.25% | 43% | 56% | 41% | 53% | 44% | 57% | 40% | 52% | 39% | 51% | 43% | 43% | 41% | 41% |
| 6398 | 9.00% | 0.25% | 0.25% | 1.00% | 0.25% | 39% | 51% | 39% | 51% | 39% | 51% | 37% | 48% | 36% | 47% | 39% | 39% | 37% | 37% |
| 6399 | 0.00% | 1.00% | 0.25% | 1.00% | 0.25% | 47% | 61% | 47% | 61% | 42% | 55% | 42% | 55% | 46% | 60% | 45% | 45% | 43% | 43% |
| 6400 | 0.25% | 1.00% | 0.25% | 1.00% | 0.25% | 49% | 64% | 48% | 62% | 44% | 57% | 43% | 56% | 47% | 61% | 47% | 47% | 45% | 45% |
| 6401 | 1.00% | 1.00% | 0.25% | 1.00% | 0.25% | 51% | 66% | 49% | 64% | 47% | 61% | 45% | 59% | 49% | 64% | 49% | 49% | 47% | 47% |
| 6402 | 9.00% | 1.00% | 0.25% | 1.00% | 0.25% | 47% | 61% | 47% | 61% | 42% | 55% | 42% | 55% | 46% | 60% | 45% | 45% | 43% | 43% |
| 6403 | 0.25% | 9.00% | 0.25% | 1.00% | 0.25% | 62% | 81% | 58% | 75% | 48% | 62% | 54% | 70% | 57% | 74% | 56% | 56% | 53% | 53% |
| 6404 | 1.00% | 9.00% | 0.25% | 1.00% | 0.25% | 64% | 83% | 59% | 77% | 51% | 66% | 56% | 73% | 59% | 77% | 58% | 58% | 55% | 55% |
| 6405 | 9.00% | 9.00% | 0.25% | 1.00% | 0.25% | 60% | 78% | 57% | 74% | 46% | 60% | 53% | 69% | 56% | 73% | 54% | 54% | 52% | 52% |
| 6406 | 0.00% | 0.00% | 1.00% | 1.00% | 0.25% | 37% | 48% | 35% | 46% | 37% | 48% | 34% | 44% | 36% | 47% | 36% | 36% | 36% | 36% |
| 6407 | 0.25% | 0.00% | 1.00% | 1.00% | 0.25% | 39% | 51% | 36% | 47% | 39% | 51% | 35% | 46% | 37% | 48% | 38% | 38% | 37% | 37% |
| 6408 | 1.00% | 0.00% | 1.00% | 1.00% | 0.25% | 41% | 53% | 37% | 48% | 42% | 55% | 37% | 48% | 39% | 51% | 40% | 40% | 39% | 39% |
| 6409 | 0.00% | 0.25% | 1.00% | 1.00% | 0.25% | 42% | 55% | 42% | 55% | 43% | 56% | 41% | 53% | 42% | 55% | 42% | 42% | 42% | 42% |
| 6410 | 1.00% | 0.25% | 1.00% | 1.00% | 0.25% | 46% | 60% | 44% | 57% | 48% | 62% | 44% | 57% | 45% | 59% | 46% | 46% | 46% | 46% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6411 | 9.00% | 0.25% | 1.00% | 1.00% | 0.25% | 42% | 55% | 42% | 55% | 43% | 56% | 41% | 53% | 42% | 55% | 42% | 42% | 42% | 42% |
| 6412 | 0.00% | 1.00% | 1.00% | 1.00% | 0.25% | 50% | 65% | 50% | 65% | 46% | 60% | 46% | 60% | 52% | 68% | 49% | 49% | 48% | 48% |
| 6413 | 0.25% | 1.00% | 1.00% | 1.00% | 0.25% | 52% | 68% | 51% | 66% | 48% | 62% | 47% | 61% | 53% | 69% | 50% | 50% | 49% | 49% |
| 6414 | 1.00% | 1.00% | 1.00% | 1.00% | 0.25% | 54% | 70% | 52% | 68% | 51% | 66% | 49% | 64% | 55% | 72% | 52% | 52% | 52% | 52% |
| 6415 | 9.00% | 1.00% | 1.00% | 1.00% | 0.25% | 50% | 65% | 50% | 65% | 46% | 60% | 46% | 60% | 52% | 68% | 49% | 49% | 48% | 48% |
| 6416 | 0.00% | 9.00% | 1.00% | 1.00% | 0.25% | 63% | 82% | 60% | 78% | 50% | 65% | 57% | 74% | 62% | 81% | 58% | 58% | 56% | 56% |
| 6417 | 0.25% | 9.00% | 1.00% | 1.00% | 0.25% | 65% | 85% | 61% | 79% | 52% | 68% | 58% | 75% | 63% | 82% | 59% | 59% | 58% | 58% |
| 6418 | 1.00% | 9.00% | 1.00% | 1.00% | 0.25% | 67% | 87% | 62% | 81% | 55% | 72% | 60% | 78% | 65% | 85% | 61% | 61% | 60% | 60% |
| 6419 | 0.25% | 0.25% | 9.00% | 1.00% | 0.25% | 48% | 62% | 47% | 61% | 49% | 64% | 45% | 59% | 49% | 64% | 48% | 48% | 48% | 48% |
| 6420 | 1.00% | 0.25% | 9.00% | 1.00% | 0.25% | 50% | 65% | 48% | 62% | 52% | 68% | 47% | 61% | 51% | 66% | 50% | 50% | 50% | 50% |
| 6421 | 9.00% | 0.25% | 9.00% | 1.00% | 0.25% | 46% | 60% | 46% | 60% | 47% | 61% | 44% | 57% | 48% | 62% | 46% | 46% | 46% | 46% |
| 6422 | 0.25% | 1.00% | 9.00% | 1.00% | 0.25% | 56% | 73% | 55% | 72% | 52% | 68% | 50% | 65% | 59% | 77% | 54% | 54% | 54% | 54% |
| 6423 | 0.00% | 0.25% | 0.00% | 9.00% | 0.25% | 53% | 69% | 49% | 64% | 46% | 60% | 50% | 65% | 47% | 61% | 49% | 49% | 48% | 48% |
| 6424 | 0.00% | 0.00% | 0.25% | 9.00% | 0.25% | 51% | 66% | 46% | 60% | 45% | 59% | 46% | 60% | 44% | 57% | 47% | 47% | 45% | 45% |
| 6425 | 0.25% | 0.00% | 0.25% | 9.00% | 0.25% | 53% | 69% | 47% | 61% | 47% | 61% | 47% | 61% | 45% | 59% | 49% | 49% | 46% | 46% |
| 6426 | 0.00% | 0.25% | 0.25% | 9.00% | 0.25% | 56% | 73% | 53% | 69% | 51% | 66% | 53% | 69% | 50% | 65% | 53% | 53% | 51% | 51% |
| 6427 | 0.25% | 0.25% | 0.25% | 9.00% | 0.25% | 58% | 75% | 54% | 70% | 53% | 69% | 54% | 70% | 51% | 66% | 55% | 55% | 53% | 53% |
| 6428 | 1.00% | 0.25% | 0.25% | 9.00% | 0.25% | 60% | 78% | 55% | 72% | 56% | 73% | 56% | 73% | 53% | 69% | 57% | 57% | 55% | 55% |
| 6429 | 9.00% | 0.25% | 0.25% | 9.00% | 0.25% | 56% | 73% | 53% | 69% | 51% | 66% | 53% | 69% | 50% | 65% | 53% | 53% | 51% | 51% |
| 6430 | 0.00% | 1.00% | 0.25% | 9.00% | 0.25% | 64% | 83% | 61% | 79% | 54% | 70% | 58% | 75% | 60% | 78% | 60% | 60% | 57% | 57% |
| 6431 | 0.25% | 1.00% | 0.25% | 9.00% | 0.25% | 66% | 86% | 62% | 81% | 56% | 73% | 59% | 77% | 61% | 79% | 61% | 61% | 59% | 59% |
| 6432 | 1.00% | 1.00% | 0.25% | 9.00% | 0.25% | 68% | 88% | 63% | 82% | 59% | 77% | 61% | 79% | 63% | 82% | 63% | 63% | 61% | 61% |
| 6433 | 0.25% | 9.00% | 0.25% | 9.00% | 0.25% | 79% | 103% | 72% | 94% | 60% | 78% | 70% | 91% | 71% | 92% | 70% | 70% | 67% | 67% |
| 6434 | 0.25% | 0.00% | 1.00% | 9.00% | 0.25% | 56% | 73% | 50% | 65% | 51% | 66% | 51% | 66% | 51% | 66% | 52% | 52% | 51% | 51% |
| 6435 | 1.00% | 0.25% | 1.00% | 9.00% | 0.25% | 63% | 82% | 58% | 75% | 60% | 78% | 60% | 78% | 59% | 77% | 60% | 60% | 60% | 60% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6436 | 9.00% | 0.25% | 1.00% | 9.00% | 0.25% | 59% | 77% | 56% | 73% | 55% | 72% | 57% | 74% | 56% | 73% | 57% | 57% | 56% | 56% |
| 6437 | 0.00% | 1.00% | 1.00% | 9.00% | 0.25% | 67% | 87% | 64% | 83% | 58% | 75% | 62% | 81% | 66% | 86% | 63% | 63% | 62% | 62% |
| 6438 | 0.25% | 1.00% | 1.00% | 9.00% | 0.25% | 69% | 90% | 65% | 85% | 60% | 78% | 63% | 82% | 67% | 87% | 65% | 65% | 63% | 63% |
| 6439 | 1.00% | 1.00% | 1.00% | 9.00% | 0.25% | 71% | 92% | 66% | 86% | 63% | 82% | 65% | 85% | 69% | 90% | 67% | 67% | 66% | 66% |
| 6440 | 0.25% | 0.25% | 9.00% | 9.00% | 0.25% | 65% | 85% | 61% | 79% | 61% | 79% | 61% | 79% | 63% | 82% | 62% | 62% | 62% | 62% |
| 6441 | 0.25% | 0.25% | 0.00% | 0.00% | 1.00% | 18% | 23% | 21% | 27% | 19% | 25% | 18% | 23% | 25% | 33% | 19% | 19% | 21% | 21% |
| 6442 | 1.00% | 0.25% | 0.00% | 0.00% | 1.00% | 20% | 26% | 22% | 29% | 22% | 29% | 20% | 26% | 27% | 35% | 21% | 21% | 23% | 23% |
| 6443 | 0.25% | 1.00% | 0.00% | 0.00% | 1.00% | 26% | 34% | 29% | 38% | 22% | 29% | 23% | 30% | 35% | 46% | 26% | 26% | 27% | 27% |
| 6444 | 1.00% | 1.00% | 0.00% | 0.00% | 1.00% | 28% | 36% | 30% | 39% | 25% | 33% | 25% | 33% | 37% | 48% | 28% | 28% | 29% | 29% |
| 6445 | 0.25% | 0.00% | 0.25% | 0.00% | 1.00% | 16% | 21% | 18% | 23% | 18% | 23% | 14% | 18% | 22% | 29% | 17% | 17% | 18% | 18% |
| 6446 | 1.00% | 0.00% | 0.25% | 0.00% | 1.00% | 18% | 23% | 19% | 25% | 21% | 27% | 16% | 21% | 24% | 31% | 19% | 19% | 20% | 20% |
| 6447 | 0.00% | 0.25% | 0.25% | 0.00% | 1.00% | 19% | 25% | 24% | 31% | 22% | 29% | 20% | 26% | 27% | 35% | 22% | 22% | 23% | 23% |
| 6448 | 0.25% | 0.25% | 0.25% | 0.00% | 1.00% | 21% | 27% | 25% | 33% | 24% | 31% | 21% | 27% | 28% | 36% | 23% | 23% | 24% | 24% |
| 6449 | 0.00% | 1.00% | 0.25% | 0.00% | 1.00% | 27% | 35% | 32% | 42% | 25% | 33% | 25% | 33% | 37% | 48% | 28% | 28% | 29% | 29% |
| 6450 | 1.00% | 1.00% | 0.25% | 0.00% | 1.00% | 31% | 40% | 34% | 44% | 30% | 39% | 28% | 36% | 40% | 52% | 32% | 32% | 33% | 33% |
| 6451 | 1.00% | 9.00% | 0.25% | 0.00% | 1.00% | 44% | 57% | 44% | 57% | 34% | 44% | 39% | 51% | 50% | 65% | 41% | 41% | 41% | 41% |
| 6452 | 0.25% | 0.00% | 1.00% | 0.00% | 1.00% | 19% | 25% | 21% | 27% | 22% | 29% | 18% | 23% | 28% | 36% | 21% | 21% | 23% | 23% |
| 6453 | 1.00% | 0.00% | 1.00% | 0.00% | 1.00% | 21% | 27% | 22% | 29% | 25% | 33% | 20% | 26% | 30% | 39% | 23% | 23% | 25% | 25% |
| 6454 | 0.00% | 0.25% | 1.00% | 0.00% | 1.00% | 22% | 29% | 27% | 35% | 26% | 34% | 24% | 31% | 33% | 43% | 25% | 25% | 28% | 28% |
| 6455 | 1.00% | 0.25% | 1.00% | 0.00% | 1.00% | 26% | 34% | 29% | 38% | 31% | 40% | 27% | 35% | 36% | 47% | 29% | 29% | 31% | 31% |
| 6456 | 0.00% | 1.00% | 1.00% | 0.00% | 1.00% | 30% | 39% | 35% | 46% | 29% | 38% | 29% | 38% | 43% | 56% | 31% | 31% | 34% | 34% |
| 6457 | 0.25% | 1.00% | 1.00% | 0.00% | 1.00% | 32% | 42% | 36% | 47% | 31% | 40% | 30% | 39% | 44% | 57% | 33% | 33% | 35% | 35% |
| 6458 | 1.00% | 1.00% | 1.00% | 0.00% | 1.00% | 34% | 44% | 37% | 48% | 34% | 44% | 32% | 42% | 46% | 60% | 35% | 35% | 37% | 37% |
| 6459 | 9.00% | 1.00% | 1.00% | 0.00% | 1.00% | 30% | 39% | 35% | 46% | 29% | 38% | 29% | 38% | 43% | 56% | 31% | 31% | 34% | 34% |
| 6460 | 1.00% | 9.00% | 1.00% | 0.00% | 1.00% | 47% | 61% | 47% | 61% | 38% | 49% | 43% | 56% | 56% | 73% | 44% | 44% | 46% | 46% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6461 | 0.25% | 0.00% | 9.00% | 0.00% | 1.00% | 23% | 30% | 25% | 33% | 26% | 34% | 21% | 27% | 34% | 44% | 25% | 25% | 27% | 27% |
| 6462 | 0.00% | 0.25% | 9.00% | 0.00% | 1.00% | 26% | 34% | 31% | 40% | 30% | 39% | 27% | 35% | 39% | 51% | 29% | 29% | 32% | 32% |
| 6463 | 0.25% | 0.25% | 9.00% | 0.00% | 1.00% | 28% | 36% | 32% | 42% | 32% | 42% | 28% | 36% | 40% | 52% | 31% | 31% | 33% | 33% |
| 6464 | 1.00% | 0.25% | 9.00% | 0.00% | 1.00% | 30% | 39% | 33% | 43% | 35% | 46% | 30% | 39% | 42% | 55% | 33% | 33% | 36% | 36% |
| 6465 | 0.25% | 1.00% | 9.00% | 0.00% | 1.00% | 36% | 47% | 40% | 52% | 35% | 46% | 33% | 43% | 50% | 65% | 37% | 37% | 39% | 39% |
| 6466 | 0.25% | 0.00% | 0.00% | 0.25% | 1.00% | 21% | 27% | 22% | 29% | 22% | 29% | 18% | 23% | 26% | 34% | 22% | 22% | 22% | 22% |
| 6467 | 1.00% | 0.00% | 0.00% | 0.25% | 1.00% | 23% | 30% | 23% | 30% | 25% | 33% | 20% | 26% | 28% | 36% | 24% | 24% | 24% | 24% |
| 6468 | 0.00% | 0.25% | 0.00% | 0.25% | 1.00% | 24% | 31% | 28% | 36% | 26% | 34% | 24% | 31% | 31% | 40% | 26% | 26% | 27% | 27% |
| 6469 | 0.25% | 0.25% | 0.00% | 0.25% | 1.00% | 26% | 34% | 29% | 38% | 28% | 36% | 25% | 33% | 32% | 42% | 28% | 28% | 28% | 28% |
| 6470 | 9.00% | 0.25% | 0.00% | 0.25% | 1.00% | 24% | 31% | 28% | 36% | 26% | 34% | 24% | 31% | 31% | 40% | 26% | 26% | 27% | 27% |
| 6471 | 1.00% | 1.00% | 0.00% | 0.25% | 1.00% | 36% | 47% | 38% | 49% | 34% | 44% | 32% | 42% | 44% | 57% | 36% | 36% | 37% | 37% |
| 6472 | 1.00% | 9.00% | 0.00% | 0.25% | 1.00% | 49% | 64% | 48% | 62% | 38% | 49% | 43% | 56% | 54% | 70% | 45% | 45% | 45% | 45% |
| 6473 | 0.00% | 0.00% | 0.25% | 0.25% | 1.00% | 22% | 29% | 25% | 33% | 25% | 33% | 20% | 26% | 28% | 36% | 24% | 24% | 24% | 24% |
| 6474 | 0.25% | 0.00% | 0.25% | 0.25% | 1.00% | 24% | 31% | 26% | 34% | 27% | 35% | 21% | 27% | 29% | 38% | 26% | 26% | 26% | 26% |
| 6475 | 0.00% | 0.25% | 0.25% | 0.25% | 1.00% | 27% | 35% | 32% | 42% | 31% | 40% | 27% | 35% | 34% | 44% | 30% | 30% | 31% | 31% |
| 6476 | 0.25% | 0.25% | 0.25% | 0.25% | 1.00% | 29% | 38% | 33% | 43% | 33% | 43% | 28% | 36% | 35% | 46% | 32% | 32% | 32% | 32% |
| 6477 | 1.00% | 0.25% | 0.25% | 0.25% | 1.00% | 31% | 40% | 34% | 44% | 36% | 47% | 30% | 39% | 37% | 48% | 34% | 34% | 34% | 34% |
| 6478 | 9.00% | 0.25% | 0.25% | 0.25% | 1.00% | 27% | 35% | 32% | 42% | 31% | 40% | 27% | 35% | 34% | 44% | 30% | 30% | 31% | 31% |
| 6479 | 0.25% | 1.00% | 0.25% | 0.25% | 1.00% | 37% | 48% | 41% | 53% | 36% | 47% | 33% | 43% | 45% | 59% | 38% | 38% | 38% | 38% |
| 6480 | 9.00% | 1.00% | 0.25% | 0.25% | 1.00% | 35% | 46% | 40% | 52% | 34% | 44% | 32% | 42% | 44% | 57% | 36% | 36% | 37% | 37% |
| 6481 | 0.25% | 9.00% | 0.25% | 0.25% | 1.00% | 50% | 65% | 51% | 66% | 40% | 52% | 44% | 57% | 55% | 72% | 47% | 47% | 46% | 46% |
| 6482 | 1.00% | 9.00% | 0.25% | 0.25% | 1.00% | 52% | 68% | 52% | 68% | 43% | 56% | 46% | 60% | 57% | 74% | 49% | 49% | 49% | 49% |
| 6483 | 9.00% | 9.00% | 0.25% | 0.25% | 1.00% | 48% | 62% | 50% | 65% | 38% | 49% | 43% | 56% | 54% | 70% | 45% | 45% | 45% | 45% |
| 6484 | 0.00% | 0.00% | 1.00% | 0.25% | 1.00% | 25% | 33% | 28% | 36% | 29% | 38% | 24% | 31% | 34% | 44% | 27% | 27% | 29% | 29% |
| 6485 | 1.00% | 0.00% | 1.00% | 0.25% | 1.00% | 29% | 38% | 30% | 39% | 34% | 44% | 27% | 35% | 37% | 48% | 31% | 31% | 33% | 33% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6486 | 0.00% | 0.25% | 1.00% | 0.25% | 1.00% | 30% | 39% | 35% | 46% | 35% | 46% | 31% | 40% | 40% | 52% | 33% | 33% | 35% | 35% |
| 6487 | 0.25% | 0.25% | 1.00% | 0.25% | 1.00% | 32% | 42% | 36% | 47% | 37% | 48% | 32% | 42% | 41% | 53% | 35% | 35% | 37% | 37% |
| 6488 | 1.00% | 0.25% | 1.00% | 0.25% | 1.00% | 34% | 44% | 37% | 48% | 40% | 52% | 34% | 44% | 43% | 56% | 37% | 37% | 39% | 39% |
| 6489 | 9.00% | 0.25% | 1.00% | 0.25% | 1.00% | 30% | 39% | 35% | 46% | 35% | 46% | 31% | 40% | 40% | 52% | 33% | 33% | 35% | 35% |
| 6490 | 0.00% | 1.00% | 1.00% | 0.25% | 1.00% | 38% | 49% | 43% | 56% | 38% | 49% | 36% | 47% | 50% | 65% | 40% | 40% | 41% | 41% |
| 6491 | 0.25% | 1.00% | 1.00% | 0.25% | 1.00% | 40% | 52% | 44% | 57% | 40% | 52% | 37% | 48% | 51% | 66% | 41% | 41% | 43% | 43% |
| 6492 | 1.00% | 1.00% | 1.00% | 0.25% | 1.00% | 42% | 55% | 45% | 59% | 43% | 56% | 39% | 51% | 53% | 69% | 43% | 43% | 45% | 45% |
| 6493 | 9.00% | 1.00% | 1.00% | 0.25% | 1.00% | 38% | 49% | 43% | 56% | 38% | 49% | 36% | 47% | 50% | 65% | 40% | 40% | 41% | 41% |
| 6494 | 0.00% | 9.00% | 1.00% | 0.25% | 1.00% | 51% | 66% | 53% | 69% | 42% | 55% | 47% | 61% | 60% | 78% | 49% | 49% | 50% | 50% |
| 6495 | 0.25% | 9.00% | 1.00% | 0.25% | 1.00% | 53% | 69% | 54% | 70% | 44% | 57% | 48% | 62% | 61% | 79% | 50% | 50% | 51% | 51% |
| 6496 | 1.00% | 9.00% | 1.00% | 0.25% | 1.00% | 55% | 72% | 55% | 72% | 47% | 61% | 50% | 65% | 63% | 82% | 52% | 52% | 53% | 53% |
| 6497 | 0.25% | 0.25% | 9.00% | 0.25% | 1.00% | 36% | 47% | 40% | 52% | 41% | 53% | 35% | 46% | 47% | 61% | 39% | 39% | 41% | 41% |
| 6498 | 1.00% | 0.25% | 9.00% | 0.25% | 1.00% | 38% | 49% | 41% | 53% | 44% | 57% | 37% | 48% | 49% | 64% | 41% | 41% | 43% | 43% |
| 6499 | 9.00% | 0.25% | 9.00% | 0.25% | 1.00% | 34% | 44% | 39% | 51% | 39% | 51% | 34% | 44% | 46% | 60% | 37% | 37% | 40% | 40% |
| 6500 | 0.00% | 1.00% | 9.00% | 0.25% | 1.00% | 42% | 55% | 47% | 61% | 42% | 55% | 39% | 51% | 56% | 73% | 44% | 44% | 46% | 46% |
| 6501 | 0.25% | 1.00% | 9.00% | 0.25% | 1.00% | 44% | 57% | 48% | 62% | 44% | 57% | 40% | 52% | 57% | 74% | 45% | 45% | 47% | 47% |
| 6502 | 9.00% | 1.00% | 9.00% | 0.25% | 1.00% | 42% | 55% | 47% | 61% | 42% | 55% | 39% | 51% | 56% | 73% | 44% | 44% | 46% | 46% |
| 6503 | 1.00% | 9.00% | 9.00% | 0.25% | 1.00% | 59% | 77% | 59% | 77% | 51% | 66% | 53% | 69% | 69% | 90% | 56% | 56% | 58% | 58% |
| 6504 | 0.25% | 0.00% | 0.00% | 1.00% | 1.00% | 38% | 49% | 35% | 46% | 35% | 46% | 33% | 43% | 39% | 51% | 36% | 36% | 36% | 36% |
| 6505 | 1.00% | 0.25% | 0.00% | 1.00% | 1.00% | 45% | 59% | 43% | 56% | 44% | 57% | 42% | 55% | 47% | 61% | 44% | 44% | 44% | 44% |
| 6506 | 0.00% | 1.00% | 0.00% | 1.00% | 1.00% | 49% | 64% | 49% | 64% | 42% | 55% | 44% | 57% | 54% | 70% | 47% | 47% | 47% | 47% |
| 6507 | 0.25% | 1.00% | 0.00% | 1.00% | 1.00% | 51% | 66% | 50% | 65% | 44% | 57% | 45% | 59% | 55% | 72% | 48% | 48% | 48% | 48% |
| 6508 | 1.00% | 1.00% | 0.00% | 1.00% | 1.00% | 53% | 69% | 51% | 66% | 47% | 61% | 47% | 61% | 57% | 74% | 50% | 50% | 50% | 50% |
| 6509 | 0.00% | 0.00% | 0.25% | 1.00% | 1.00% | 39% | 51% | 38% | 49% | 38% | 49% | 35% | 46% | 41% | 53% | 38% | 38% | 38% | 38% |
| 6510 | 1.00% | 0.00% | 0.25% | 1.00% | 1.00% | 43% | 56% | 40% | 52% | 43% | 56% | 38% | 49% | 44% | 57% | 42% | 42% | 42% | 42% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6511 | 0.25% | 0.25% | 0.25% | 1.00% | 1.00% | 46% | 60% | 46% | 60% | 46% | 60% | 43% | 56% | 48% | 62% | 46% | 46% | 46% | 46% |
| 6512 | 1.00% | 0.25% | 0.25% | 1.00% | 1.00% | 48% | 62% | 47% | 61% | 49% | 64% | 45% | 59% | 50% | 65% | 48% | 48% | 48% | 48% |
| 6513 | 9.00% | 0.25% | 0.25% | 1.00% | 1.00% | 44% | 57% | 45% | 59% | 44% | 57% | 42% | 55% | 47% | 61% | 44% | 44% | 44% | 44% |
| 6514 | 0.00% | 1.00% | 0.25% | 1.00% | 1.00% | 52% | 68% | 53% | 69% | 47% | 61% | 47% | 61% | 57% | 74% | 51% | 51% | 50% | 50% |
| 6515 | 0.25% | 1.00% | 0.25% | 1.00% | 1.00% | 54% | 70% | 54% | 70% | 49% | 64% | 48% | 62% | 58% | 75% | 52% | 52% | 52% | 52% |
| 6516 | 1.00% | 1.00% | 0.25% | 1.00% | 1.00% | 56% | 73% | 55% | 72% | 52% | 68% | 50% | 65% | 60% | 78% | 54% | 54% | 54% | 54% |
| 6517 | 9.00% | 1.00% | 0.25% | 1.00% | 1.00% | 52% | 68% | 53% | 69% | 47% | 61% | 47% | 61% | 57% | 74% | 51% | 51% | 50% | 50% |
| 6518 | 0.25% | 9.00% | 0.25% | 1.00% | 1.00% | 67% | 87% | 64% | 83% | 53% | 69% | 59% | 77% | 68% | 88% | 61% | 61% | 60% | 60% |
| 6519 | 1.00% | 9.00% | 0.25% | 1.00% | 1.00% | 69% | 90% | 65% | 85% | 56% | 73% | 61% | 79% | 70% | 91% | 63% | 63% | 62% | 62% |
| 6520 | 9.00% | 9.00% | 0.25% | 1.00% | 1.00% | 65% | 85% | 63% | 82% | 51% | 66% | 58% | 75% | 67% | 87% | 60% | 60% | 59% | 59% |
| 6521 | 0.00% | 0.00% | 1.00% | 1.00% | 1.00% | 42% | 55% | 41% | 53% | 42% | 55% | 39% | 51% | 47% | 61% | 42% | 42% | 43% | 43% |
| 6522 | 0.25% | 0.00% | 1.00% | 1.00% | 1.00% | 44% | 57% | 42% | 55% | 44% | 57% | 40% | 52% | 48% | 62% | 43% | 43% | 44% | 44% |
| 6523 | 1.00% | 0.00% | 1.00% | 1.00% | 1.00% | 46% | 60% | 43% | 56% | 47% | 61% | 42% | 55% | 50% | 65% | 45% | 45% | 46% | 46% |
| 6524 | 0.00% | 0.25% | 1.00% | 1.00% | 1.00% | 47% | 61% | 48% | 62% | 48% | 62% | 46% | 60% | 53% | 69% | 48% | 48% | 49% | 49% |
| 6525 | 1.00% | 0.25% | 1.00% | 1.00% | 1.00% | 51% | 66% | 50% | 65% | 53% | 69% | 49% | 64% | 56% | 73% | 51% | 51% | 53% | 53% |
| 6526 | 9.00% | 0.25% | 1.00% | 1.00% | 1.00% | 47% | 61% | 48% | 62% | 48% | 62% | 46% | 60% | 53% | 69% | 48% | 48% | 49% | 49% |
| 6527 | 0.00% | 1.00% | 1.00% | 1.00% | 1.00% | 55% | 72% | 56% | 73% | 51% | 66% | 51% | 66% | 63% | 82% | 54% | 54% | 55% | 55% |
| 6528 | 0.25% | 1.00% | 1.00% | 1.00% | 1.00% | 57% | 74% | 57% | 74% | 53% | 69% | 52% | 68% | 64% | 83% | 56% | 56% | 56% | 56% |
| 6529 | 1.00% | 1.00% | 1.00% | 1.00% | 1.00% | 59% | 77% | 58% | 75% | 56% | 73% | 54% | 70% | 66% | 86% | 58% | 58% | 59% | 59% |
| 6530 | 9.00% | 1.00% | 1.00% | 1.00% | 1.00% | 55% | 72% | 56% | 73% | 51% | 66% | 51% | 66% | 63% | 82% | 54% | 54% | 55% | 55% |
| 6531 | 0.00% | 9.00% | 1.00% | 1.00% | 1.00% | 68% | 88% | 66% | 86% | 55% | 72% | 62% | 81% | 73% | 95% | 63% | 63% | 63% | 63% |
| 6532 | 0.25% | 9.00% | 1.00% | 1.00% | 1.00% | 70% | 91% | 67% | 87% | 57% | 74% | 63% | 82% | 74% | 96% | 65% | 65% | 65% | 65% |
| 6533 | 1.00% | 9.00% | 1.00% | 1.00% | 1.00% | 72% | 94% | 68% | 88% | 60% | 78% | 65% | 85% | 76% | 99% | 67% | 67% | 67% | 67% |
| 6534 | 0.25% | 0.25% | 9.00% | 1.00% | 1.00% | 53% | 69% | 53% | 69% | 54% | 70% | 50% | 65% | 60% | 78% | 53% | 53% | 55% | 55% |
| 6535 | 1.00% | 0.25% | 9.00% | 1.00% | 1.00% | 55% | 72% | 54% | 70% | 57% | 74% | 52% | 68% | 62% | 81% | 55% | 55% | 57% | 57% |

Fig. 24

| Formula # | Gamma Dodecalactone | Methyl Apritone | Propyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6536 | 9.00% | 0.25% | 9.00% | 1.00% | 1.00% | 51% | 66% | 52% | 68% | 52% | 68% | 49% | 64% | 59% | 77% | 52% | 52% | 53% | 53% |
| 6537 | 0.25% | 1.00% | 9.00% | 1.00% | 1.00% | 61% | 79% | 61% | 79% | 57% | 74% | 55% | 72% | 70% | 91% | 60% | 60% | 61% | 61% |
| 6538 | 0.00% | 0.25% | 0.00% | 9.00% | 1.00% | 58% | 75% | 55% | 72% | 51% | 66% | 55% | 72% | 58% | 75% | 55% | 55% | 55% | 55% |
| 6539 | 0.00% | 0.00% | 0.25% | 9.00% | 1.00% | 56% | 73% | 52% | 68% | 50% | 65% | 51% | 66% | 55% | 72% | 53% | 53% | 52% | 52% |
| 6540 | 0.25% | 0.00% | 0.25% | 9.00% | 1.00% | 58% | 75% | 53% | 69% | 52% | 68% | 52% | 68% | 56% | 73% | 54% | 54% | 53% | 53% |
| 6541 | 0.00% | 0.25% | 0.25% | 9.00% | 1.00% | 61% | 79% | 59% | 77% | 56% | 73% | 58% | 75% | 61% | 79% | 59% | 59% | 58% | 58% |
| 6542 | 0.25% | 0.25% | 0.25% | 9.00% | 1.00% | 63% | 82% | 60% | 78% | 58% | 75% | 59% | 77% | 62% | 81% | 60% | 60% | 60% | 60% |
| 6543 | 1.00% | 0.25% | 0.25% | 9.00% | 1.00% | 65% | 85% | 61% | 79% | 61% | 79% | 61% | 79% | 64% | 83% | 62% | 62% | 62% | 62% |
| 6544 | 9.00% | 0.25% | 0.25% | 9.00% | 1.00% | 61% | 79% | 59% | 77% | 56% | 73% | 58% | 75% | 61% | 79% | 59% | 59% | 58% | 58% |
| 6545 | 0.00% | 1.00% | 0.25% | 9.00% | 1.00% | 69% | 90% | 67% | 87% | 59% | 77% | 63% | 82% | 71% | 92% | 65% | 65% | 64% | 64% |
| 6546 | 0.25% | 1.00% | 0.25% | 9.00% | 1.00% | 71% | 92% | 68% | 88% | 61% | 79% | 64% | 83% | 72% | 94% | 67% | 67% | 66% | 66% |
| 6547 | 1.00% | 1.00% | 0.25% | 9.00% | 1.00% | 73% | 95% | 69% | 90% | 64% | 83% | 66% | 86% | 74% | 96% | 69% | 69% | 68% | 68% |
| 6548 | 0.25% | 9.00% | 0.25% | 9.00% | 1.00% | 84% | 100% | 78% | 100% | 65% | 85% | 75% | 98% | 82% | 100% | 76% | 76% | 74% | 74% |
| 6549 | 0.25% | 0.00% | 1.00% | 9.00% | 1.00% | 61% | 79% | 56% | 73% | 56% | 73% | 56% | 73% | 62% | 81% | 58% | 58% | 58% | 58% |
| 6550 | 1.00% | 0.25% | 1.00% | 9.00% | 1.00% | 68% | 88% | 64% | 83% | 65% | 85% | 65% | 85% | 70% | 91% | 66% | 66% | 67% | 67% |
| 6551 | 9.00% | 0.25% | 1.00% | 9.00% | 1.00% | 64% | 83% | 62% | 81% | 60% | 78% | 62% | 81% | 67% | 87% | 62% | 62% | 63% | 63% |
| 6552 | 0.00% | 1.00% | 1.00% | 9.00% | 1.00% | 72% | 94% | 70% | 91% | 63% | 82% | 67% | 87% | 77% | 100% | 68% | 68% | 69% | 69% |
| 6553 | 0.25% | 1.00% | 1.00% | 9.00% | 1.00% | 74% | 96% | 71% | 92% | 65% | 85% | 68% | 88% | 78% | 100% | 70% | 70% | 70% | 70% |
| 6554 | 1.00% | 1.00% | 1.00% | 9.00% | 1.00% | 76% | 99% | 72% | 94% | 68% | 88% | 70% | 91% | 80% | 100% | 72% | 72% | 73% | 73% |
| 6555 | 0.25% | 0.25% | 9.00% | 9.00% | 1.00% | 70% | 91% | 67% | 87% | 66% | 86% | 66% | 86% | 74% | 96% | 68% | 68% | 69% | 69% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6556 | 0.25% | 0.25% | 0.00% | 0.00% | 0.00% | 7% | 9% | 8% | 10% | 8% | 10% | 8% | 10% | 7% | 9% | 8% | 8% | 8% | 8% |
| 6557 | 1.00% | 0.25% | 0.00% | 0.00% | 0.00% | 9% | 12% | 9% | 12% | 11% | 14% | 10% | 13% | 9% | 12% | 10% | 10% | 10% | 10% |
| 6558 | 0.25% | 1.00% | 0.00% | 0.00% | 0.00% | 15% | 20% | 16% | 21% | 11% | 14% | 13% | 17% | 17% | 22% | 14% | 14% | 14% | 14% |
| 6559 | 1.00% | 1.00% | 0.00% | 0.00% | 0.00% | 17% | 22% | 17% | 22% | 14% | 18% | 15% | 20% | 19% | 25% | 16% | 16% | 16% | 16% |
| 6560 | 0.25% | 0.00% | 0.25% | 0.00% | 0.00% | 5% | 7% | 5% | 7% | 7% | 9% | 4% | 5% | 4% | 5% | 6% | 6% | 5% | 5% |
| 6561 | 1.00% | 0.00% | 0.25% | 0.00% | 0.00% | 7% | 9% | 6% | 8% | 10% | 13% | 6% | 8% | 6% | 8% | 8% | 8% | 7% | 7% |
| 6562 | 0.00% | 0.25% | 0.25% | 0.00% | 0.00% | 8% | 10% | 11% | 14% | 11% | 14% | 10% | 13% | 9% | 12% | 10% | 10% | 10% | 10% |
| 6563 | 0.25% | 0.25% | 0.25% | 0.00% | 0.00% | 10% | 13% | 12% | 16% | 13% | 17% | 11% | 14% | 10% | 13% | 12% | 12% | 11% | 11% |
| 6564 | 0.00% | 1.00% | 0.25% | 0.00% | 0.00% | 16% | 21% | 19% | 25% | 14% | 18% | 15% | 20% | 19% | 25% | 16% | 16% | 16% | 16% |
| 6565 | 1.00% | 1.00% | 0.25% | 0.00% | 0.00% | 20% | 26% | 21% | 27% | 19% | 25% | 18% | 23% | 22% | 29% | 20% | 20% | 20% | 20% |
| 6566 | 1.00% | 9.00% | 0.25% | 0.00% | 0.00% | 33% | 43% | 31% | 40% | 23% | 30% | 29% | 38% | 32% | 42% | 29% | 29% | 28% | 28% |
| 6567 | 0.25% | 0.00% | 1.00% | 0.00% | 0.00% | 8% | 10% | 8% | 10% | 11% | 14% | 8% | 10% | 10% | 13% | 9% | 9% | 10% | 10% |
| 6568 | 1.00% | 0.00% | 1.00% | 0.00% | 0.00% | 10% | 13% | 9% | 12% | 14% | 18% | 10% | 13% | 12% | 16% | 11% | 11% | 12% | 12% |
| 6569 | 0.00% | 0.25% | 1.00% | 0.00% | 0.00% | 11% | 14% | 14% | 18% | 15% | 20% | 14% | 18% | 15% | 20% | 13% | 13% | 15% | 15% |
| 6570 | 1.00% | 0.25% | 1.00% | 0.00% | 0.00% | 15% | 20% | 16% | 21% | 20% | 26% | 17% | 22% | 18% | 23% | 17% | 17% | 18% | 18% |
| 6571 | 0.00% | 1.00% | 1.00% | 0.00% | 0.00% | 19% | 25% | 22% | 29% | 18% | 23% | 19% | 25% | 25% | 33% | 20% | 20% | 21% | 21% |
| 6572 | 0.25% | 1.00% | 1.00% | 0.00% | 0.00% | 21% | 27% | 23% | 30% | 20% | 26% | 20% | 26% | 26% | 34% | 21% | 21% | 22% | 22% |
| 6573 | 1.00% | 1.00% | 1.00% | 0.00% | 0.00% | 23% | 30% | 24% | 31% | 23% | 30% | 22% | 29% | 28% | 36% | 23% | 23% | 24% | 24% |
| 6574 | 9.00% | 1.00% | 1.00% | 0.00% | 0.00% | 19% | 25% | 22% | 29% | 18% | 23% | 19% | 25% | 25% | 33% | 20% | 20% | 21% | 21% |
| 6575 | 1.00% | 9.00% | 1.00% | 0.00% | 0.00% | 36% | 47% | 34% | 44% | 27% | 35% | 33% | 43% | 38% | 49% | 32% | 32% | 33% | 33% |
| 6576 | 0.25% | 0.00% | 9.00% | 0.00% | 0.00% | 12% | 16% | 12% | 16% | 15% | 20% | 11% | 14% | 16% | 21% | 13% | 13% | 14% | 14% |
| 6577 | 0.00% | 0.25% | 9.00% | 0.00% | 0.00% | 15% | 20% | 18% | 23% | 19% | 25% | 17% | 22% | 21% | 27% | 17% | 17% | 19% | 19% |
| 6578 | 0.25% | 0.25% | 9.00% | 0.00% | 0.00% | 17% | 22% | 19% | 25% | 21% | 27% | 18% | 23% | 22% | 29% | 19% | 19% | 20% | 20% |
| 6579 | 1.00% | 0.25% | 9.00% | 0.00% | 0.00% | 19% | 25% | 20% | 26% | 24% | 31% | 20% | 26% | 24% | 31% | 21% | 21% | 23% | 23% |
| 6580 | 0.25% | 1.00% | 9.00% | 0.00% | 0.00% | 25% | 33% | 27% | 35% | 24% | 31% | 23% | 30% | 32% | 42% | 25% | 25% | 26% | 26% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6581 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 6582 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 6583 | 0.00% | 0.25% | 0.00% | 0.25% | 0.00% | 8% | 10% | 13% | 17% | 8% | 10% | 12% | 16% | 11% | 14% | 10% | 10% | 10% | 10% |
| 6584 | 0.25% | 0.25% | 0.00% | 0.25% | 0.00% | 10% | 13% | 14% | 18% | 10% | 13% | 13% | 17% | 12% | 16% | 11% | 11% | 12% | 12% |
| 6585 | 9.00% | 0.25% | 0.00% | 0.25% | 0.00% | 8% | 10% | 13% | 17% | 8% | 10% | 12% | 16% | 11% | 14% | 10% | 10% | 10% | 10% |
| 6586 | 1.00% | 1.00% | 0.00% | 0.25% | 0.00% | 20% | 26% | 23% | 30% | 16% | 21% | 20% | 26% | 24% | 31% | 20% | 20% | 20% | 20% |
| 6587 | 1.00% | 9.00% | 0.00% | 0.25% | 0.00% | 33% | 43% | 33% | 43% | 20% | 26% | 31% | 40% | 34% | 44% | 29% | 29% | 28% | 28% |
| 6588 | 0.00% | 0.00% | 0.25% | 0.25% | 0.00% | 6% | 8% | 10% | 13% | 7% | 9% | 8% | 10% | 8% | 10% | 8% | 8% | 8% | 8% |
| 6589 | 0.25% | 0.00% | 0.25% | 0.25% | 0.00% | 8% | 10% | 11% | 14% | 9% | 12% | 9% | 12% | 9% | 12% | 9% | 9% | 9% | 9% |
| 6590 | 0.00% | 0.25% | 0.25% | 0.25% | 0.00% | 11% | 14% | 17% | 22% | 13% | 17% | 15% | 20% | 14% | 18% | 14% | 14% | 14% | 14% |
| 6591 | 0.25% | 0.25% | 0.25% | 0.25% | 0.00% | 13% | 17% | 18% | 23% | 15% | 20% | 16% | 21% | 15% | 20% | 15% | 15% | 15% | 15% |
| 6592 | 1.00% | 0.25% | 0.25% | 0.25% | 0.00% | 15% | 20% | 19% | 25% | 18% | 23% | 18% | 23% | 17% | 22% | 17% | 17% | 18% | 18% |
| 6593 | 9.00% | 0.25% | 0.25% | 0.25% | 0.00% | 11% | 14% | 17% | 22% | 13% | 17% | 15% | 20% | 14% | 18% | 14% | 14% | 14% | 14% |
| 6594 | 0.25% | 1.00% | 0.25% | 0.25% | 0.00% | 21% | 27% | 26% | 34% | 18% | 23% | 21% | 27% | 25% | 33% | 22% | 22% | 21% | 21% |
| 6595 | 9.00% | 1.00% | 0.25% | 0.25% | 0.00% | 19% | 25% | 25% | 33% | 16% | 21% | 20% | 26% | 24% | 31% | 20% | 20% | 20% | 20% |
| 6596 | 0.25% | 9.00% | 0.25% | 0.25% | 0.00% | 34% | 44% | 36% | 47% | 22% | 29% | 32% | 42% | 35% | 46% | 31% | 31% | 30% | 30% |
| 6597 | 1.00% | 9.00% | 0.25% | 0.25% | 0.00% | 36% | 47% | 37% | 48% | 25% | 33% | 34% | 44% | 37% | 48% | 33% | 33% | 32% | 32% |
| 6598 | 9.00% | 9.00% | 0.25% | 0.25% | 0.00% | 32% | 42% | 35% | 46% | 20% | 26% | 31% | 40% | 34% | 44% | 29% | 29% | 28% | 28% |
| 6599 | 0.00% | 0.00% | 1.00% | 0.25% | 0.00% | 9% | 12% | 13% | 17% | 11% | 14% | 12% | 16% | 14% | 18% | 11% | 11% | 12% | 12% |
| 6600 | 1.00% | 0.00% | 1.00% | 0.25% | 0.00% | 13% | 17% | 15% | 20% | 16% | 21% | 15% | 20% | 17% | 22% | 15% | 15% | 16% | 16% |
| 6601 | 0.00% | 0.25% | 1.00% | 0.25% | 0.00% | 14% | 18% | 20% | 26% | 17% | 22% | 19% | 25% | 20% | 26% | 17% | 17% | 19% | 19% |
| 6602 | 0.25% | 0.25% | 1.00% | 0.25% | 0.00% | 16% | 21% | 21% | 27% | 19% | 25% | 20% | 26% | 21% | 27% | 19% | 19% | 20% | 20% |
| 6603 | 1.00% | 0.25% | 1.00% | 0.25% | 0.00% | 18% | 23% | 22% | 29% | 22% | 29% | 22% | 29% | 23% | 30% | 21% | 21% | 22% | 22% |
| 6604 | 9.00% | 0.25% | 1.00% | 0.25% | 0.00% | 14% | 18% | 20% | 26% | 17% | 22% | 19% | 25% | 20% | 26% | 17% | 17% | 19% | 19% |
| 6605 | 0.00% | 1.00% | 1.00% | 0.25% | 0.00% | 22% | 29% | 28% | 36% | 20% | 26% | 24% | 31% | 30% | 39% | 23% | 23% | 25% | 25% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6606 | 0.25% | 1.00% | 1.00% | 0.25% | 0.00% | 24% | 31% | 29% | 38% | 22% | 29% | 25% | 33% | 31% | 40% | 25% | 25% | 26% | 26% |
| 6607 | 1.00% | 1.00% | 1.00% | 0.25% | 0.00% | 26% | 34% | 30% | 39% | 25% | 33% | 27% | 35% | 33% | 43% | 27% | 27% | 28% | 28% |
| 6608 | 9.00% | 1.00% | 1.00% | 0.25% | 0.00% | 22% | 29% | 28% | 36% | 20% | 26% | 24% | 31% | 30% | 39% | 23% | 23% | 25% | 25% |
| 6609 | 0.00% | 9.00% | 1.00% | 0.25% | 0.00% | 35% | 46% | 38% | 49% | 24% | 31% | 35% | 46% | 40% | 52% | 32% | 32% | 33% | 33% |
| 6610 | 0.25% | 9.00% | 1.00% | 0.25% | 0.00% | 37% | 48% | 39% | 51% | 26% | 34% | 36% | 47% | 41% | 53% | 34% | 34% | 34% | 34% |
| 6611 | 1.00% | 9.00% | 1.00% | 0.25% | 0.00% | 39% | 51% | 40% | 52% | 29% | 38% | 38% | 49% | 43% | 56% | 36% | 36% | 37% | 37% |
| 6612 | 0.25% | 0.25% | 9.00% | 0.25% | 0.00% | 20% | 26% | 25% | 33% | 23% | 30% | 23% | 30% | 27% | 35% | 23% | 23% | 24% | 24% |
| 6613 | 1.00% | 0.25% | 9.00% | 0.25% | 0.00% | 22% | 29% | 26% | 34% | 26% | 34% | 25% | 33% | 29% | 38% | 25% | 25% | 27% | 27% |
| 6614 | 9.00% | 0.25% | 9.00% | 0.25% | 0.00% | 18% | 23% | 24% | 31% | 21% | 27% | 22% | 29% | 26% | 34% | 21% | 21% | 23% | 23% |
| 6615 | 0.00% | 1.00% | 9.00% | 0.25% | 0.00% | 26% | 34% | 32% | 42% | 24% | 31% | 27% | 35% | 36% | 47% | 27% | 27% | 29% | 29% |
| 6616 | 0.25% | 1.00% | 9.00% | 0.25% | 0.00% | 28% | 36% | 33% | 43% | 26% | 34% | 28% | 36% | 37% | 48% | 29% | 29% | 30% | 30% |
| 6617 | 9.00% | 1.00% | 9.00% | 0.25% | 0.00% | 26% | 34% | 32% | 42% | 24% | 31% | 27% | 35% | 36% | 47% | 27% | 27% | 29% | 29% |
| 6618 | 1.00% | 9.00% | 9.00% | 0.25% | 0.00% | 43% | 56% | 44% | 57% | 33% | 43% | 41% | 53% | 49% | 64% | 40% | 40% | 41% | 41% |
| 6619 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 6620 | 1.00% | 0.25% | 0.00% | 1.00% | 0.00% | 23% | 30% | 22% | 29% | 23% | 30% | 22% | 29% | 26% | 34% | 23% | 23% | 24% | 24% |
| 6621 | 0.00% | 1.00% | 0.00% | 1.00% | 0.00% | 27% | 35% | 28% | 36% | 21% | 27% | 24% | 31% | 33% | 43% | 25% | 25% | 26% | 26% |
| 6622 | 0.25% | 1.00% | 0.00% | 1.00% | 0.00% | 29% | 38% | 29% | 38% | 23% | 30% | 25% | 33% | 34% | 44% | 27% | 27% | 27% | 27% |
| 6623 | 1.00% | 1.00% | 0.00% | 1.00% | 0.00% | 31% | 40% | 30% | 39% | 26% | 34% | 27% | 35% | 36% | 47% | 29% | 29% | 30% | 30% |
| 6624 | 0.00% | 0.00% | 0.25% | 1.00% | 0.00% | 17% | 22% | 17% | 22% | 17% | 22% | 15% | 20% | 20% | 26% | 17% | 17% | 17% | 17% |
| 6625 | 1.00% | 0.00% | 0.25% | 1.00% | 0.00% | 21% | 27% | 19% | 25% | 22% | 29% | 18% | 23% | 23% | 30% | 21% | 21% | 21% | 21% |
| 6626 | 0.25% | 0.25% | 0.25% | 1.00% | 0.00% | 24% | 31% | 25% | 33% | 25% | 33% | 23% | 30% | 27% | 35% | 25% | 25% | 25% | 25% |
| 6627 | 1.00% | 0.25% | 0.25% | 1.00% | 0.00% | 26% | 34% | 26% | 34% | 28% | 36% | 25% | 33% | 29% | 38% | 27% | 27% | 27% | 27% |
| 6628 | 9.00% | 0.25% | 0.25% | 1.00% | 0.00% | 22% | 29% | 24% | 31% | 23% | 30% | 22% | 29% | 26% | 34% | 23% | 23% | 24% | 24% |
| 6629 | 0.00% | 1.00% | 0.25% | 1.00% | 0.00% | 30% | 39% | 32% | 42% | 26% | 34% | 27% | 35% | 36% | 47% | 29% | 29% | 30% | 30% |
| 6630 | 0.25% | 1.00% | 0.25% | 1.00% | 0.00% | 32% | 42% | 33% | 43% | 28% | 36% | 28% | 36% | 37% | 48% | 31% | 31% | 31% | 31% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6631 | 1.00% | 1.00% | 0.25% | 1.00% | 0.00% | 34% | 44% | 34% | 44% | 31% | 40% | 30% | 39% | 39% | 51% | 33% | 33% | 33% | 33% |
| 6632 | 9.00% | 1.00% | 0.25% | 1.00% | 0.00% | 30% | 39% | 32% | 42% | 26% | 34% | 27% | 35% | 36% | 47% | 29% | 29% | 30% | 30% |
| 6633 | 0.25% | 9.00% | 0.25% | 1.00% | 0.00% | 45% | 59% | 43% | 56% | 32% | 42% | 39% | 51% | 47% | 61% | 40% | 40% | 39% | 39% |
| 6634 | 1.00% | 9.00% | 0.25% | 1.00% | 0.00% | 47% | 61% | 44% | 57% | 35% | 46% | 41% | 53% | 49% | 64% | 42% | 42% | 42% | 42% |
| 6635 | 9.00% | 9.00% | 0.25% | 1.00% | 0.00% | 43% | 56% | 42% | 55% | 30% | 39% | 38% | 49% | 46% | 60% | 38% | 38% | 38% | 38% |
| 6636 | 0.00% | 0.00% | 1.00% | 1.00% | 0.00% | 20% | 26% | 20% | 26% | 21% | 27% | 19% | 25% | 26% | 34% | 20% | 20% | 22% | 22% |
| 6637 | 0.25% | 0.00% | 1.00% | 1.00% | 0.00% | 22% | 29% | 21% | 27% | 23% | 30% | 20% | 26% | 27% | 35% | 22% | 22% | 23% | 23% |
| 6638 | 1.00% | 0.00% | 1.00% | 1.00% | 0.00% | 24% | 31% | 22% | 29% | 26% | 34% | 22% | 29% | 29% | 38% | 24% | 24% | 26% | 26% |
| 6639 | 0.00% | 0.25% | 1.00% | 1.00% | 0.00% | 25% | 33% | 27% | 35% | 27% | 35% | 26% | 34% | 32% | 42% | 26% | 26% | 28% | 28% |
| 6640 | 1.00% | 0.25% | 1.00% | 1.00% | 0.00% | 29% | 38% | 29% | 38% | 32% | 42% | 29% | 38% | 35% | 46% | 30% | 30% | 32% | 32% |
| 6641 | 9.00% | 0.25% | 1.00% | 1.00% | 0.00% | 25% | 33% | 27% | 35% | 27% | 35% | 26% | 34% | 32% | 42% | 26% | 26% | 28% | 28% |
| 6642 | 0.00% | 1.00% | 1.00% | 1.00% | 0.00% | 33% | 43% | 35% | 46% | 30% | 39% | 31% | 40% | 42% | 55% | 33% | 33% | 34% | 34% |
| 6643 | 0.25% | 1.00% | 1.00% | 1.00% | 0.00% | 35% | 46% | 36% | 47% | 32% | 42% | 32% | 42% | 43% | 56% | 34% | 34% | 36% | 36% |
| 6644 | 1.00% | 1.00% | 1.00% | 1.00% | 0.00% | 37% | 48% | 37% | 48% | 35% | 46% | 34% | 44% | 45% | 59% | 36% | 36% | 38% | 38% |
| 6645 | 9.00% | 1.00% | 1.00% | 1.00% | 0.00% | 33% | 43% | 35% | 46% | 30% | 39% | 31% | 40% | 42% | 55% | 33% | 33% | 34% | 34% |
| 6646 | 0.00% | 9.00% | 1.00% | 1.00% | 0.00% | 46% | 60% | 45% | 59% | 34% | 44% | 42% | 55% | 52% | 68% | 42% | 42% | 43% | 43% |
| 6647 | 0.25% | 9.00% | 1.00% | 1.00% | 0.00% | 48% | 62% | 46% | 60% | 36% | 47% | 43% | 56% | 53% | 69% | 43% | 43% | 44% | 44% |
| 6648 | 1.00% | 9.00% | 1.00% | 1.00% | 0.00% | 50% | 65% | 47% | 61% | 39% | 51% | 45% | 59% | 55% | 72% | 45% | 45% | 46% | 46% |
| 6649 | 0.25% | 0.25% | 9.00% | 1.00% | 0.00% | 31% | 40% | 32% | 42% | 33% | 43% | 30% | 39% | 39% | 51% | 32% | 32% | 34% | 34% |
| 6650 | 1.00% | 0.25% | 9.00% | 1.00% | 0.00% | 33% | 43% | 33% | 43% | 36% | 47% | 32% | 42% | 41% | 53% | 34% | 34% | 36% | 36% |
| 6651 | 9.00% | 0.25% | 9.00% | 1.00% | 0.00% | 29% | 38% | 31% | 40% | 31% | 40% | 29% | 38% | 38% | 49% | 30% | 30% | 33% | 33% |
| 6652 | 0.25% | 1.00% | 9.00% | 1.00% | 0.00% | 39% | 51% | 40% | 52% | 36% | 47% | 35% | 46% | 49% | 64% | 38% | 38% | 40% | 40% |
| 6653 | 0.00% | 0.25% | 0.00% | 9.00% | 0.00% | 32% | 42% | 29% | 38% | 28% | 36% | 32% | 42% | 33% | 43% | 30% | 30% | 31% | 31% |
| 6654 | 0.00% | 0.00% | 0.25% | 9.00% | 0.00% | 30% | 39% | 26% | 34% | 27% | 35% | 28% | 36% | 30% | 39% | 28% | 28% | 28% | 28% |
| 6655 | 0.25% | 0.00% | 0.25% | 9.00% | 0.00% | 32% | 42% | 27% | 35% | 29% | 38% | 29% | 38% | 31% | 40% | 29% | 29% | 30% | 30% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6656 | 0.00% | 0.25% | 0.25% | 9.00% | 0.00% | 35% | 46% | 33% | 43% | 33% | 43% | 35% | 46% | 36% | 47% | 34% | 34% | 35% | 35% |
| 6657 | 0.25% | 0.25% | 0.25% | 9.00% | 0.00% | 37% | 48% | 34% | 44% | 35% | 46% | 36% | 47% | 37% | 48% | 35% | 35% | 36% | 36% |
| 6658 | 1.00% | 0.25% | 0.25% | 9.00% | 0.00% | 39% | 51% | 35% | 46% | 38% | 49% | 38% | 49% | 39% | 51% | 37% | 37% | 38% | 38% |
| 6659 | 9.00% | 0.25% | 0.25% | 9.00% | 0.00% | 35% | 46% | 33% | 43% | 33% | 43% | 35% | 46% | 36% | 47% | 34% | 34% | 35% | 35% |
| 6660 | 0.00% | 1.00% | 0.25% | 9.00% | 0.00% | 43% | 56% | 41% | 53% | 36% | 47% | 40% | 52% | 46% | 60% | 40% | 40% | 41% | 41% |
| 6661 | 0.25% | 1.00% | 0.25% | 9.00% | 0.00% | 45% | 59% | 42% | 55% | 38% | 49% | 41% | 53% | 47% | 61% | 42% | 42% | 42% | 42% |
| 6662 | 1.00% | 1.00% | 0.25% | 9.00% | 0.00% | 47% | 61% | 43% | 56% | 41% | 53% | 43% | 56% | 49% | 64% | 44% | 44% | 44% | 44% |
| 6663 | 0.25% | 9.00% | 0.25% | 9.00% | 0.00% | 58% | 75% | 52% | 68% | 42% | 55% | 52% | 68% | 57% | 74% | 51% | 51% | 50% | 50% |
| 6664 | 0.25% | 0.00% | 1.00% | 9.00% | 0.00% | 35% | 46% | 30% | 39% | 33% | 43% | 33% | 43% | 37% | 48% | 33% | 33% | 34% | 34% |
| 6665 | 1.00% | 0.25% | 1.00% | 9.00% | 0.00% | 42% | 55% | 38% | 49% | 42% | 55% | 42% | 55% | 45% | 59% | 41% | 41% | 43% | 43% |
| 6666 | 9.00% | 0.25% | 1.00% | 9.00% | 0.00% | 38% | 49% | 36% | 47% | 37% | 48% | 39% | 51% | 42% | 55% | 37% | 37% | 39% | 39% |
| 6667 | 0.00% | 1.00% | 1.00% | 9.00% | 0.00% | 46% | 60% | 44% | 57% | 40% | 52% | 44% | 57% | 52% | 68% | 43% | 43% | 45% | 45% |
| 6668 | 0.25% | 1.00% | 1.00% | 9.00% | 0.00% | 48% | 62% | 45% | 59% | 42% | 55% | 45% | 59% | 53% | 69% | 45% | 45% | 47% | 47% |
| 6669 | 1.00% | 1.00% | 1.00% | 9.00% | 0.00% | 50% | 65% | 46% | 60% | 45% | 59% | 47% | 61% | 55% | 72% | 47% | 47% | 49% | 49% |
| 6670 | 0.25% | 0.25% | 9.00% | 9.00% | 0.00% | 44% | 57% | 41% | 53% | 43% | 56% | 43% | 56% | 49% | 64% | 43% | 43% | 45% | 45% |
| 6671 | 0.25% | 0.25% | 0.00% | 0.00% | 0.25% | 13% | 17% | 15% | 20% | 14% | 18% | 13% | 17% | 14% | 18% | 14% | 14% | 14% | 14% |
| 6672 | 1.00% | 0.25% | 0.00% | 0.00% | 0.25% | 15% | 20% | 16% | 21% | 17% | 22% | 15% | 20% | 16% | 21% | 16% | 16% | 16% | 16% |
| 6673 | 0.25% | 1.00% | 0.00% | 0.00% | 0.25% | 21% | 27% | 23% | 30% | 17% | 22% | 18% | 23% | 24% | 31% | 20% | 20% | 20% | 20% |
| 6674 | 1.00% | 1.00% | 0.00% | 0.00% | 0.25% | 23% | 30% | 24% | 31% | 20% | 26% | 20% | 26% | 26% | 34% | 22% | 22% | 22% | 22% |
| 6675 | 0.25% | 0.00% | 0.25% | 0.00% | 0.25% | 11% | 14% | 12% | 16% | 13% | 17% | 9% | 12% | 11% | 14% | 12% | 12% | 11% | 11% |
| 6676 | 1.00% | 0.00% | 0.25% | 0.00% | 0.25% | 13% | 17% | 13% | 17% | 16% | 21% | 11% | 14% | 13% | 17% | 14% | 14% | 13% | 13% |
| 6677 | 0.00% | 0.25% | 0.25% | 0.00% | 0.25% | 14% | 18% | 18% | 23% | 17% | 22% | 15% | 20% | 16% | 21% | 16% | 16% | 16% | 16% |
| 6678 | 0.25% | 0.25% | 0.25% | 0.00% | 0.25% | 16% | 21% | 19% | 25% | 19% | 25% | 16% | 21% | 17% | 22% | 18% | 18% | 17% | 17% |
| 6679 | 0.00% | 1.00% | 0.25% | 0.00% | 0.25% | 22% | 29% | 26% | 34% | 20% | 26% | 20% | 26% | 26% | 34% | 23% | 23% | 22% | 22% |
| 6680 | 1.00% | 1.00% | 0.25% | 0.00% | 0.25% | 26% | 34% | 28% | 36% | 25% | 33% | 23% | 30% | 29% | 38% | 26% | 26% | 26% | 26% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6681 | 1.00% | 9.00% | 0.25% | 0.00% | 0.25% | 39% | 51% | 38% | 49% | 29% | 38% | 34% | 44% | 39% | 51% | 35% | 35% | 34% | 34% |
| 6682 | 0.25% | 0.00% | 1.00% | 0.00% | 0.25% | 14% | 18% | 15% | 20% | 17% | 22% | 13% | 17% | 17% | 22% | 15% | 15% | 16% | 16% |
| 6683 | 1.00% | 0.00% | 1.00% | 0.00% | 0.25% | 16% | 21% | 16% | 21% | 20% | 26% | 15% | 20% | 19% | 25% | 17% | 17% | 18% | 18% |
| 6684 | 0.00% | 0.25% | 1.00% | 0.00% | 0.25% | 17% | 22% | 21% | 27% | 21% | 27% | 19% | 25% | 22% | 29% | 20% | 20% | 21% | 21% |
| 6685 | 1.00% | 0.25% | 1.00% | 0.00% | 0.25% | 21% | 27% | 23% | 30% | 26% | 34% | 22% | 29% | 25% | 33% | 23% | 23% | 24% | 24% |
| 6686 | 0.00% | 1.00% | 1.00% | 0.00% | 0.25% | 25% | 33% | 29% | 38% | 24% | 31% | 24% | 31% | 32% | 42% | 26% | 26% | 27% | 27% |
| 6687 | 0.25% | 1.00% | 1.00% | 0.00% | 0.25% | 27% | 35% | 30% | 39% | 26% | 34% | 25% | 33% | 33% | 43% | 28% | 28% | 28% | 28% |
| 6688 | 1.00% | 1.00% | 1.00% | 0.00% | 0.25% | 29% | 38% | 31% | 40% | 29% | 38% | 27% | 35% | 35% | 46% | 30% | 30% | 30% | 30% |
| 6689 | 9.00% | 1.00% | 1.00% | 0.00% | 0.25% | 25% | 33% | 29% | 38% | 24% | 31% | 24% | 31% | 32% | 42% | 26% | 26% | 27% | 27% |
| 6690 | 1.00% | 9.00% | 1.00% | 0.00% | 0.25% | 42% | 55% | 41% | 53% | 33% | 43% | 38% | 49% | 45% | 59% | 39% | 39% | 39% | 39% |
| 6691 | 0.25% | 0.00% | 9.00% | 0.00% | 0.25% | 18% | 23% | 19% | 25% | 21% | 27% | 16% | 21% | 23% | 30% | 19% | 19% | 20% | 20% |
| 6692 | 0.00% | 0.25% | 9.00% | 0.00% | 0.25% | 21% | 27% | 25% | 33% | 25% | 33% | 22% | 29% | 28% | 36% | 24% | 24% | 25% | 25% |
| 6693 | 0.25% | 0.25% | 9.00% | 0.00% | 0.25% | 23% | 30% | 26% | 34% | 27% | 35% | 23% | 30% | 29% | 38% | 25% | 25% | 26% | 26% |
| 6694 | 1.00% | 0.25% | 9.00% | 0.00% | 0.25% | 25% | 33% | 27% | 35% | 30% | 39% | 25% | 33% | 31% | 40% | 27% | 27% | 29% | 29% |
| 6695 | 0.25% | 1.00% | 9.00% | 0.00% | 0.25% | 31% | 40% | 34% | 44% | 30% | 39% | 28% | 36% | 39% | 51% | 32% | 32% | 32% | 32% |
| 6696 | 0.25% | 0.00% | 0.00% | 0.25% | 0.25% | 11% | 14% | 14% | 18% | 10% | 13% | 11% | 14% | 13% | 17% | 12% | 12% | 11% | 11% |
| 6697 | 1.00% | 0.00% | 0.00% | 0.25% | 0.25% | 13% | 17% | 15% | 20% | 13% | 17% | 13% | 17% | 15% | 20% | 14% | 14% | 14% | 14% |
| 6698 | 0.00% | 0.25% | 0.00% | 0.25% | 0.25% | 14% | 18% | 20% | 26% | 14% | 18% | 17% | 22% | 18% | 23% | 16% | 16% | 16% | 16% |
| 6699 | 0.25% | 0.25% | 0.00% | 0.25% | 0.25% | 16% | 21% | 21% | 27% | 16% | 21% | 18% | 23% | 19% | 25% | 18% | 18% | 18% | 18% |
| 6700 | 9.00% | 0.25% | 0.00% | 0.25% | 0.25% | 14% | 18% | 20% | 26% | 14% | 18% | 17% | 22% | 18% | 23% | 16% | 16% | 16% | 16% |
| 6701 | 1.00% | 1.00% | 0.00% | 0.25% | 0.25% | 26% | 34% | 30% | 39% | 22% | 29% | 25% | 33% | 31% | 40% | 26% | 26% | 26% | 26% |
| 6702 | 1.00% | 9.00% | 0.00% | 0.25% | 0.25% | 39% | 51% | 40% | 52% | 26% | 34% | 36% | 47% | 41% | 53% | 35% | 35% | 34% | 34% |
| 6703 | 0.00% | 0.00% | 0.25% | 0.25% | 0.25% | 12% | 16% | 17% | 22% | 13% | 17% | 13% | 17% | 15% | 20% | 14% | 14% | 14% | 14% |
| 6704 | 0.25% | 0.00% | 0.25% | 0.25% | 0.25% | 14% | 18% | 18% | 23% | 15% | 20% | 14% | 18% | 16% | 21% | 16% | 16% | 15% | 15% |
| 6705 | 0.00% | 0.25% | 0.25% | 0.25% | 0.25% | 17% | 22% | 24% | 31% | 19% | 25% | 20% | 26% | 21% | 27% | 20% | 20% | 20% | 20% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6706 | 0.25% | 0.25% | 0.25% | 0.25% | 0.25% | 19% | 25% | 25% | 33% | 21% | 27% | 21% | 27% | 22% | 29% | 22% | 22% | 21% | 21% |
| 6707 | 1.00% | 0.25% | 0.25% | 0.25% | 0.25% | 21% | 27% | 26% | 34% | 24% | 31% | 23% | 30% | 24% | 31% | 24% | 24% | 24% | 24% |
| 6708 | 9.00% | 0.25% | 0.25% | 0.25% | 0.25% | 17% | 22% | 24% | 31% | 19% | 25% | 20% | 26% | 21% | 27% | 20% | 20% | 20% | 20% |
| 6709 | 0.25% | 1.00% | 0.25% | 0.25% | 0.25% | 27% | 35% | 33% | 43% | 24% | 31% | 26% | 34% | 32% | 42% | 28% | 28% | 27% | 27% |
| 6710 | 9.00% | 1.00% | 0.25% | 0.25% | 0.25% | 25% | 33% | 32% | 42% | 22% | 29% | 25% | 33% | 31% | 40% | 26% | 26% | 26% | 26% |
| 6711 | 0.25% | 9.00% | 0.25% | 0.25% | 0.25% | 40% | 52% | 43% | 56% | 28% | 36% | 37% | 48% | 42% | 55% | 37% | 37% | 36% | 36% |
| 6712 | 1.00% | 9.00% | 0.25% | 0.25% | 0.25% | 42% | 55% | 44% | 57% | 31% | 40% | 39% | 51% | 44% | 57% | 39% | 39% | 38% | 38% |
| 6713 | 9.00% | 9.00% | 0.25% | 0.25% | 0.25% | 38% | 49% | 42% | 55% | 26% | 34% | 36% | 47% | 41% | 53% | 35% | 35% | 34% | 34% |
| 6714 | 0.00% | 0.00% | 1.00% | 0.25% | 0.25% | 15% | 20% | 20% | 26% | 17% | 22% | 17% | 22% | 21% | 27% | 17% | 17% | 18% | 18% |
| 6715 | 1.00% | 0.00% | 1.00% | 0.25% | 0.25% | 19% | 25% | 22% | 29% | 22% | 29% | 20% | 26% | 24% | 31% | 21% | 21% | 22% | 22% |
| 6716 | 0.00% | 0.25% | 1.00% | 0.25% | 0.25% | 20% | 26% | 27% | 35% | 23% | 30% | 24% | 31% | 27% | 35% | 23% | 23% | 25% | 25% |
| 6717 | 0.25% | 0.25% | 1.00% | 0.25% | 0.25% | 22% | 29% | 28% | 36% | 25% | 33% | 25% | 33% | 28% | 36% | 25% | 25% | 26% | 26% |
| 6718 | 1.00% | 0.25% | 1.00% | 0.25% | 0.25% | 24% | 31% | 29% | 38% | 28% | 36% | 27% | 35% | 30% | 39% | 27% | 27% | 28% | 28% |
| 6719 | 9.00% | 0.25% | 1.00% | 0.25% | 0.25% | 20% | 26% | 27% | 35% | 23% | 30% | 24% | 31% | 27% | 35% | 23% | 23% | 25% | 25% |
| 6720 | 0.00% | 1.00% | 1.00% | 0.25% | 0.25% | 28% | 36% | 35% | 46% | 26% | 34% | 29% | 38% | 37% | 48% | 30% | 30% | 31% | 31% |
| 6721 | 0.25% | 1.00% | 1.00% | 0.25% | 0.25% | 30% | 39% | 36% | 47% | 28% | 36% | 30% | 39% | 38% | 49% | 31% | 31% | 32% | 32% |
| 6722 | 1.00% | 1.00% | 1.00% | 0.25% | 0.25% | 32% | 42% | 37% | 48% | 31% | 40% | 32% | 42% | 40% | 52% | 33% | 33% | 34% | 34% |
| 6723 | 9.00% | 1.00% | 1.00% | 0.25% | 0.25% | 28% | 36% | 35% | 46% | 26% | 34% | 29% | 38% | 37% | 48% | 30% | 30% | 31% | 31% |
| 6724 | 0.00% | 9.00% | 1.00% | 0.25% | 0.25% | 41% | 53% | 45% | 59% | 30% | 39% | 40% | 52% | 47% | 61% | 39% | 39% | 39% | 39% |
| 6725 | 0.25% | 9.00% | 1.00% | 0.25% | 0.25% | 43% | 56% | 46% | 60% | 32% | 42% | 41% | 53% | 48% | 62% | 40% | 40% | 40% | 40% |
| 6726 | 1.00% | 9.00% | 1.00% | 0.25% | 0.25% | 45% | 59% | 47% | 61% | 35% | 46% | 43% | 56% | 50% | 65% | 42% | 42% | 43% | 43% |
| 6727 | 0.25% | 0.25% | 9.00% | 0.25% | 0.25% | 26% | 34% | 32% | 42% | 29% | 38% | 28% | 36% | 34% | 44% | 29% | 29% | 30% | 30% |
| 6728 | 1.00% | 0.25% | 9.00% | 0.25% | 0.25% | 28% | 36% | 33% | 43% | 32% | 42% | 30% | 39% | 36% | 47% | 31% | 31% | 33% | 33% |
| 6729 | 9.00% | 0.25% | 9.00% | 0.25% | 0.25% | 24% | 31% | 31% | 40% | 27% | 35% | 27% | 35% | 33% | 43% | 27% | 27% | 29% | 29% |
| 6730 | 0.00% | 1.00% | 9.00% | 0.25% | 0.25% | 32% | 42% | 39% | 51% | 30% | 39% | 32% | 42% | 43% | 56% | 34% | 34% | 35% | 35% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6731 | 0.25% | 1.00% | 9.00% | 0.25% | 0.25% | 34% | 44% | 40% | 52% | 32% | 42% | 33% | 43% | 44% | 57% | 35% | 35% | 36% | 36% |
| 6732 | 9.00% | 1.00% | 9.00% | 0.25% | 0.25% | 32% | 42% | 39% | 51% | 30% | 39% | 32% | 42% | 43% | 56% | 34% | 34% | 35% | 35% |
| 6733 | 1.00% | 9.00% | 9.00% | 0.25% | 0.25% | 49% | 64% | 51% | 66% | 39% | 51% | 46% | 60% | 56% | 73% | 46% | 46% | 47% | 47% |
| 6734 | 0.25% | 0.00% | 0.00% | 1.00% | 0.25% | 22% | 29% | 21% | 27% | 20% | 26% | 18% | 23% | 25% | 33% | 21% | 21% | 21% | 21% |
| 6735 | 1.00% | 0.25% | 0.00% | 1.00% | 0.25% | 29% | 38% | 29% | 38% | 29% | 38% | 27% | 35% | 33% | 43% | 29% | 29% | 30% | 30% |
| 6736 | 0.00% | 1.00% | 0.00% | 1.00% | 0.25% | 33% | 43% | 35% | 46% | 27% | 35% | 29% | 38% | 40% | 52% | 32% | 32% | 32% | 32% |
| 6737 | 0.25% | 1.00% | 0.00% | 1.00% | 0.25% | 35% | 46% | 36% | 47% | 29% | 38% | 30% | 39% | 41% | 53% | 33% | 33% | 33% | 33% |
| 6738 | 1.00% | 1.00% | 0.00% | 1.00% | 0.25% | 37% | 48% | 37% | 48% | 32% | 42% | 32% | 42% | 43% | 56% | 35% | 35% | 36% | 36% |
| 6739 | 0.00% | 0.00% | 0.25% | 1.00% | 0.25% | 23% | 30% | 24% | 31% | 23% | 30% | 20% | 26% | 27% | 35% | 23% | 23% | 23% | 23% |
| 6740 | 1.00% | 0.00% | 0.25% | 1.00% | 0.25% | 27% | 35% | 26% | 34% | 28% | 36% | 23% | 30% | 30% | 39% | 27% | 27% | 27% | 27% |
| 6741 | 0.25% | 0.25% | 0.25% | 1.00% | 0.25% | 30% | 39% | 32% | 42% | 31% | 40% | 28% | 36% | 34% | 44% | 31% | 31% | 31% | 31% |
| 6742 | 1.00% | 0.25% | 0.25% | 1.00% | 0.25% | 32% | 42% | 33% | 43% | 34% | 44% | 30% | 39% | 36% | 47% | 33% | 33% | 33% | 33% |
| 6743 | 9.00% | 0.25% | 0.25% | 1.00% | 0.25% | 28% | 36% | 31% | 40% | 29% | 38% | 27% | 35% | 33% | 43% | 29% | 29% | 30% | 30% |
| 6744 | 0.00% | 1.00% | 0.25% | 1.00% | 0.25% | 36% | 47% | 39% | 51% | 32% | 42% | 32% | 42% | 43% | 56% | 36% | 36% | 36% | 36% |
| 6745 | 0.25% | 1.00% | 0.25% | 1.00% | 0.25% | 38% | 49% | 40% | 52% | 34% | 44% | 33% | 43% | 44% | 57% | 37% | 37% | 37% | 37% |
| 6746 | 1.00% | 1.00% | 0.25% | 1.00% | 0.25% | 40% | 52% | 41% | 53% | 37% | 48% | 35% | 46% | 46% | 60% | 39% | 39% | 39% | 39% |
| 6747 | 9.00% | 1.00% | 0.25% | 1.00% | 0.25% | 36% | 47% | 39% | 51% | 32% | 42% | 32% | 42% | 43% | 56% | 36% | 36% | 36% | 36% |
| 6748 | 0.25% | 9.00% | 0.25% | 1.00% | 0.25% | 51% | 66% | 50% | 65% | 38% | 49% | 44% | 57% | 54% | 70% | 46% | 46% | 45% | 45% |
| 6749 | 1.00% | 9.00% | 0.25% | 1.00% | 0.25% | 53% | 69% | 51% | 66% | 41% | 53% | 46% | 60% | 56% | 73% | 48% | 48% | 48% | 48% |
| 6750 | 9.00% | 9.00% | 0.25% | 1.00% | 0.25% | 49% | 64% | 49% | 64% | 36% | 47% | 43% | 56% | 53% | 69% | 45% | 45% | 44% | 44% |
| 6751 | 0.00% | 0.00% | 1.00% | 1.00% | 0.25% | 26% | 34% | 27% | 35% | 27% | 35% | 24% | 31% | 33% | 43% | 27% | 27% | 28% | 28% |
| 6752 | 0.25% | 0.00% | 1.00% | 1.00% | 0.25% | 28% | 36% | 28% | 36% | 29% | 38% | 25% | 33% | 34% | 44% | 28% | 28% | 29% | 29% |
| 6753 | 1.00% | 0.00% | 1.00% | 1.00% | 0.25% | 30% | 39% | 29% | 38% | 32% | 42% | 27% | 35% | 36% | 47% | 30% | 30% | 32% | 32% |
| 6754 | 0.00% | 0.25% | 1.00% | 1.00% | 0.25% | 31% | 40% | 34% | 44% | 33% | 43% | 31% | 40% | 39% | 51% | 33% | 33% | 34% | 34% |
| 6755 | 1.00% | 0.25% | 1.00% | 1.00% | 0.25% | 35% | 46% | 36% | 47% | 38% | 49% | 34% | 44% | 42% | 55% | 36% | 36% | 38% | 38% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6756 | 9.00% | 0.25% | 1.00% | 1.00% | 0.25% | 31% | 40% | 34% | 44% | 33% | 43% | 31% | 40% | 39% | 51% | 33% | 33% | 34% | 34% |
| 6757 | 0.00% | 1.00% | 1.00% | 1.00% | 0.25% | 39% | 51% | 42% | 55% | 36% | 47% | 36% | 47% | 49% | 64% | 39% | 39% | 40% | 40% |
| 6758 | 0.25% | 1.00% | 1.00% | 1.00% | 0.25% | 41% | 53% | 43% | 56% | 38% | 49% | 37% | 48% | 50% | 65% | 41% | 41% | 42% | 42% |
| 6759 | 1.00% | 1.00% | 1.00% | 1.00% | 0.25% | 43% | 56% | 44% | 57% | 41% | 53% | 39% | 51% | 52% | 68% | 43% | 43% | 44% | 44% |
| 6760 | 9.00% | 1.00% | 1.00% | 1.00% | 0.25% | 39% | 51% | 42% | 55% | 36% | 47% | 36% | 47% | 49% | 64% | 39% | 39% | 40% | 40% |
| 6761 | 0.00% | 9.00% | 1.00% | 1.00% | 0.25% | 52% | 68% | 52% | 68% | 40% | 52% | 47% | 61% | 59% | 77% | 48% | 48% | 49% | 49% |
| 6762 | 0.25% | 9.00% | 1.00% | 1.00% | 0.25% | 54% | 70% | 53% | 69% | 42% | 55% | 48% | 62% | 60% | 78% | 50% | 50% | 50% | 50% |
| 6763 | 1.00% | 9.00% | 1.00% | 1.00% | 0.25% | 56% | 73% | 54% | 70% | 45% | 59% | 50% | 65% | 62% | 81% | 52% | 52% | 52% | 52% |
| 6764 | 0.25% | 0.25% | 9.00% | 1.00% | 0.25% | 37% | 48% | 39% | 51% | 39% | 51% | 35% | 46% | 46% | 60% | 38% | 38% | 40% | 40% |
| 6765 | 1.00% | 0.25% | 9.00% | 1.00% | 0.25% | 39% | 51% | 40% | 52% | 42% | 55% | 37% | 48% | 48% | 62% | 40% | 40% | 42% | 42% |
| 6766 | 9.00% | 0.25% | 9.00% | 1.00% | 0.25% | 35% | 46% | 38% | 49% | 37% | 48% | 34% | 44% | 45% | 59% | 37% | 37% | 39% | 39% |
| 6767 | 0.25% | 1.00% | 9.00% | 1.00% | 0.25% | 45% | 59% | 47% | 61% | 42% | 55% | 40% | 52% | 56% | 73% | 45% | 45% | 46% | 46% |
| 6768 | 0.00% | 0.25% | 0.00% | 9.00% | 0.25% | 38% | 49% | 36% | 47% | 34% | 44% | 37% | 48% | 40% | 52% | 36% | 36% | 37% | 37% |
| 6769 | 0.00% | 0.00% | 0.25% | 9.00% | 0.25% | 36% | 47% | 33% | 43% | 33% | 43% | 33% | 43% | 37% | 48% | 34% | 34% | 34% | 34% |
| 6770 | 0.25% | 0.00% | 0.25% | 9.00% | 0.25% | 38% | 49% | 34% | 44% | 35% | 46% | 34% | 44% | 38% | 49% | 36% | 36% | 36% | 36% |
| 6771 | 0.00% | 0.25% | 0.25% | 9.00% | 0.25% | 41% | 53% | 40% | 52% | 39% | 51% | 40% | 52% | 43% | 56% | 40% | 40% | 41% | 41% |
| 6772 | 0.25% | 0.25% | 0.25% | 9.00% | 0.25% | 43% | 56% | 41% | 53% | 41% | 53% | 41% | 53% | 44% | 57% | 42% | 42% | 42% | 42% |
| 6773 | 1.00% | 0.25% | 0.25% | 9.00% | 0.25% | 45% | 59% | 42% | 55% | 44% | 57% | 43% | 56% | 46% | 60% | 44% | 44% | 44% | 44% |
| 6774 | 9.00% | 0.25% | 0.25% | 9.00% | 0.25% | 41% | 53% | 40% | 52% | 39% | 51% | 40% | 52% | 43% | 56% | 40% | 40% | 41% | 41% |
| 6775 | 0.00% | 1.00% | 0.25% | 9.00% | 0.25% | 49% | 64% | 48% | 62% | 42% | 55% | 45% | 59% | 53% | 69% | 46% | 46% | 47% | 47% |
| 6776 | 0.25% | 1.00% | 0.25% | 9.00% | 0.25% | 51% | 66% | 49% | 64% | 44% | 57% | 46% | 60% | 54% | 70% | 48% | 48% | 48% | 48% |
| 6777 | 1.00% | 1.00% | 0.25% | 9.00% | 0.25% | 53% | 69% | 50% | 65% | 47% | 61% | 48% | 62% | 56% | 73% | 50% | 50% | 50% | 50% |
| 6778 | 0.25% | 9.00% | 0.25% | 9.00% | 0.25% | 64% | 83% | 59% | 77% | 48% | 62% | 57% | 74% | 64% | 83% | 57% | 57% | 56% | 56% |
| 6779 | 0.25% | 0.00% | 1.00% | 9.00% | 0.25% | 41% | 53% | 37% | 48% | 39% | 51% | 38% | 49% | 44% | 57% | 39% | 39% | 40% | 40% |
| 6780 | 1.00% | 0.25% | 1.00% | 9.00% | 0.25% | 48% | 62% | 45% | 59% | 48% | 62% | 47% | 61% | 52% | 68% | 47% | 47% | 49% | 49% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6781 | 9.00% | 0.25% | 1.00% | 9.00% | 0.25% | 44% | 57% | 43% | 56% | 43% | 56% | 44% | 57% | 49% | 64% | 43% | 43% | 45% | 45% |
| 6782 | 0.00% | 1.00% | 1.00% | 9.00% | 0.25% | 52% | 68% | 51% | 66% | 46% | 60% | 49% | 64% | 59% | 77% | 50% | 50% | 51% | 51% |
| 6783 | 0.25% | 1.00% | 1.00% | 9.00% | 0.25% | 54% | 70% | 52% | 68% | 48% | 62% | 50% | 65% | 60% | 78% | 51% | 51% | 53% | 53% |
| 6784 | 1.00% | 1.00% | 1.00% | 9.00% | 0.25% | 56% | 73% | 53% | 69% | 51% | 66% | 52% | 68% | 62% | 81% | 53% | 53% | 55% | 55% |
| 6785 | 0.25% | 0.25% | 9.00% | 9.00% | 0.25% | 50% | 65% | 48% | 62% | 49% | 64% | 48% | 62% | 56% | 73% | 49% | 49% | 51% | 51% |
| 6786 | 0.25% | 0.25% | 0.00% | 0.00% | 1.00% | 18% | 23% | 21% | 27% | 19% | 25% | 18% | 23% | 25% | 33% | 19% | 19% | 21% | 21% |
| 6787 | 1.00% | 0.25% | 0.00% | 0.00% | 1.00% | 20% | 26% | 22% | 29% | 22% | 29% | 20% | 26% | 27% | 35% | 21% | 21% | 23% | 23% |
| 6788 | 0.25% | 1.00% | 0.00% | 0.00% | 1.00% | 26% | 34% | 29% | 38% | 22% | 29% | 23% | 30% | 35% | 46% | 26% | 26% | 27% | 27% |
| 6789 | 1.00% | 1.00% | 0.00% | 0.00% | 1.00% | 28% | 36% | 30% | 39% | 25% | 33% | 25% | 33% | 37% | 48% | 28% | 28% | 29% | 29% |
| 6790 | 0.25% | 0.00% | 0.25% | 0.00% | 1.00% | 16% | 21% | 18% | 23% | 18% | 23% | 14% | 18% | 22% | 29% | 17% | 17% | 18% | 18% |
| 6791 | 1.00% | 0.00% | 0.25% | 0.00% | 1.00% | 18% | 23% | 19% | 25% | 21% | 27% | 16% | 21% | 24% | 31% | 19% | 19% | 20% | 20% |
| 6792 | 0.00% | 0.25% | 0.25% | 0.00% | 1.00% | 19% | 25% | 24% | 31% | 22% | 29% | 20% | 26% | 27% | 35% | 22% | 22% | 23% | 23% |
| 6793 | 0.25% | 0.25% | 0.25% | 0.00% | 1.00% | 21% | 27% | 25% | 33% | 24% | 31% | 21% | 27% | 28% | 36% | 23% | 23% | 24% | 24% |
| 6794 | 0.00% | 1.00% | 0.25% | 0.00% | 1.00% | 27% | 35% | 32% | 42% | 25% | 33% | 25% | 33% | 37% | 48% | 28% | 28% | 29% | 29% |
| 6795 | 1.00% | 1.00% | 0.25% | 0.00% | 1.00% | 31% | 40% | 34% | 44% | 30% | 39% | 28% | 36% | 40% | 52% | 32% | 32% | 33% | 33% |
| 6796 | 1.00% | 9.00% | 0.25% | 0.00% | 1.00% | 44% | 57% | 44% | 57% | 34% | 44% | 39% | 51% | 50% | 65% | 41% | 41% | 41% | 41% |
| 6797 | 0.25% | 0.00% | 1.00% | 0.00% | 1.00% | 19% | 25% | 21% | 27% | 22% | 29% | 18% | 23% | 28% | 36% | 21% | 21% | 23% | 23% |
| 6798 | 1.00% | 0.00% | 1.00% | 0.00% | 1.00% | 21% | 27% | 22% | 29% | 25% | 33% | 20% | 26% | 30% | 39% | 23% | 23% | 25% | 25% |
| 6799 | 0.00% | 0.25% | 1.00% | 0.00% | 1.00% | 22% | 29% | 27% | 35% | 26% | 34% | 24% | 31% | 33% | 43% | 25% | 25% | 28% | 28% |
| 6800 | 1.00% | 0.25% | 1.00% | 0.00% | 1.00% | 26% | 34% | 29% | 38% | 31% | 40% | 27% | 35% | 36% | 47% | 29% | 29% | 31% | 31% |
| 6801 | 0.00% | 1.00% | 1.00% | 0.00% | 1.00% | 30% | 39% | 35% | 46% | 29% | 38% | 29% | 38% | 43% | 56% | 31% | 31% | 34% | 34% |
| 6802 | 0.25% | 1.00% | 1.00% | 0.00% | 1.00% | 32% | 42% | 36% | 47% | 31% | 40% | 30% | 39% | 44% | 57% | 33% | 33% | 35% | 35% |
| 6803 | 1.00% | 1.00% | 1.00% | 0.00% | 1.00% | 34% | 44% | 37% | 48% | 34% | 44% | 32% | 42% | 46% | 60% | 35% | 35% | 37% | 37% |
| 6804 | 9.00% | 1.00% | 1.00% | 0.00% | 1.00% | 30% | 39% | 35% | 46% | 29% | 38% | 29% | 38% | 43% | 56% | 31% | 31% | 34% | 34% |
| 6805 | 1.00% | 9.00% | 1.00% | 0.00% | 1.00% | 47% | 61% | 47% | 61% | 38% | 49% | 43% | 56% | 56% | 73% | 44% | 44% | 46% | 46% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6806 | 0.25% | 0.00% | 9.00% | 0.00% | 1.00% | 23% | 30% | 25% | 33% | 26% | 34% | 21% | 27% | 34% | 44% | 25% | 25% | 27% | 27% |
| 6807 | 0.00% | 0.25% | 9.00% | 0.00% | 1.00% | 26% | 34% | 31% | 40% | 30% | 39% | 27% | 35% | 39% | 51% | 29% | 29% | 32% | 32% |
| 6808 | 0.25% | 0.25% | 9.00% | 0.00% | 1.00% | 28% | 36% | 32% | 42% | 32% | 42% | 28% | 36% | 40% | 52% | 31% | 31% | 33% | 33% |
| 6809 | 1.00% | 0.25% | 9.00% | 0.00% | 1.00% | 30% | 39% | 33% | 43% | 35% | 46% | 30% | 39% | 42% | 55% | 33% | 33% | 36% | 36% |
| 6810 | 0.25% | 1.00% | 9.00% | 0.00% | 1.00% | 36% | 47% | 40% | 52% | 35% | 46% | 33% | 43% | 50% | 65% | 37% | 37% | 39% | 39% |
| 6811 | 0.25% | 0.00% | 0.00% | 0.25% | 1.00% | 16% | 21% | 20% | 26% | 15% | 20% | 16% | 21% | 24% | 31% | 17% | 17% | 18% | 18% |
| 6812 | 1.00% | 0.00% | 0.00% | 0.25% | 1.00% | 18% | 23% | 21% | 27% | 18% | 23% | 18% | 23% | 26% | 34% | 19% | 19% | 21% | 21% |
| 6813 | 0.00% | 0.25% | 0.00% | 0.25% | 1.00% | 19% | 25% | 26% | 34% | 19% | 25% | 22% | 29% | 29% | 38% | 21% | 21% | 23% | 23% |
| 6814 | 0.25% | 0.25% | 0.00% | 0.25% | 1.00% | 21% | 27% | 27% | 35% | 21% | 27% | 23% | 30% | 30% | 39% | 23% | 23% | 25% | 25% |
| 6815 | 9.00% | 0.25% | 0.00% | 0.25% | 1.00% | 19% | 25% | 26% | 34% | 19% | 25% | 22% | 29% | 29% | 38% | 21% | 21% | 23% | 23% |
| 6816 | 1.00% | 1.00% | 0.00% | 0.25% | 1.00% | 31% | 40% | 36% | 47% | 27% | 35% | 30% | 39% | 42% | 55% | 31% | 31% | 33% | 33% |
| 6817 | 1.00% | 9.00% | 0.00% | 0.25% | 1.00% | 44% | 57% | 46% | 60% | 31% | 40% | 41% | 53% | 52% | 68% | 40% | 40% | 41% | 41% |
| 6818 | 0.00% | 0.00% | 0.25% | 0.25% | 1.00% | 17% | 22% | 23% | 30% | 18% | 23% | 18% | 23% | 26% | 34% | 19% | 19% | 21% | 21% |
| 6819 | 0.25% | 0.00% | 0.25% | 0.25% | 1.00% | 19% | 25% | 24% | 31% | 20% | 26% | 19% | 25% | 27% | 35% | 21% | 21% | 22% | 22% |
| 6820 | 0.00% | 0.25% | 0.25% | 0.25% | 1.00% | 22% | 29% | 30% | 39% | 24% | 31% | 25% | 33% | 32% | 42% | 25% | 25% | 27% | 27% |
| 6821 | 0.25% | 0.25% | 0.25% | 0.25% | 1.00% | 24% | 31% | 31% | 40% | 26% | 34% | 26% | 34% | 33% | 43% | 27% | 27% | 28% | 28% |
| 6822 | 1.00% | 0.25% | 0.25% | 0.25% | 1.00% | 26% | 34% | 32% | 42% | 29% | 38% | 28% | 36% | 35% | 46% | 29% | 29% | 31% | 31% |
| 6823 | 9.00% | 0.25% | 0.25% | 0.25% | 1.00% | 22% | 29% | 30% | 39% | 24% | 31% | 25% | 33% | 32% | 42% | 25% | 25% | 27% | 27% |
| 6824 | 0.25% | 1.00% | 0.25% | 0.25% | 1.00% | 32% | 42% | 39% | 51% | 29% | 38% | 31% | 40% | 43% | 56% | 33% | 33% | 34% | 34% |
| 6825 | 9.00% | 1.00% | 0.25% | 0.25% | 1.00% | 30% | 39% | 38% | 49% | 27% | 35% | 30% | 39% | 42% | 55% | 32% | 32% | 33% | 33% |
| 6826 | 0.25% | 9.00% | 0.25% | 0.25% | 1.00% | 45% | 59% | 49% | 64% | 33% | 43% | 42% | 55% | 53% | 69% | 42% | 42% | 43% | 43% |
| 6827 | 1.00% | 9.00% | 0.25% | 0.25% | 1.00% | 47% | 61% | 50% | 65% | 36% | 47% | 44% | 57% | 55% | 72% | 44% | 44% | 45% | 45% |
| 6828 | 9.00% | 9.00% | 0.25% | 0.25% | 1.00% | 43% | 56% | 48% | 62% | 31% | 40% | 41% | 53% | 52% | 68% | 41% | 41% | 41% | 41% |
| 6829 | 0.00% | 0.00% | 1.00% | 0.25% | 1.00% | 20% | 26% | 26% | 34% | 22% | 29% | 22% | 29% | 32% | 42% | 23% | 23% | 25% | 25% |
| 6830 | 1.00% | 0.00% | 1.00% | 0.25% | 1.00% | 24% | 31% | 28% | 36% | 27% | 35% | 25% | 33% | 35% | 46% | 26% | 26% | 29% | 29% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6831 | 0.00% | 0.25% | 1.00% | 0.25% | 1.00% | 25% | 33% | 33% | 43% | 28% | 36% | 29% | 38% | 38% | 49% | 29% | 29% | 32% | 32% |
| 6832 | 0.25% | 0.25% | 1.00% | 0.25% | 1.00% | 27% | 35% | 34% | 44% | 30% | 39% | 30% | 39% | 39% | 51% | 30% | 30% | 33% | 33% |
| 6833 | 1.00% | 0.25% | 1.00% | 0.25% | 1.00% | 29% | 38% | 35% | 46% | 33% | 43% | 32% | 42% | 41% | 53% | 32% | 32% | 35% | 35% |
| 6834 | 9.00% | 0.25% | 1.00% | 0.25% | 1.00% | 25% | 33% | 33% | 43% | 28% | 36% | 29% | 38% | 38% | 49% | 29% | 29% | 32% | 32% |
| 6835 | 0.00% | 1.00% | 1.00% | 0.25% | 1.00% | 33% | 43% | 41% | 53% | 31% | 40% | 34% | 44% | 48% | 62% | 35% | 35% | 38% | 38% |
| 6836 | 0.25% | 1.00% | 1.00% | 0.25% | 1.00% | 35% | 46% | 42% | 55% | 33% | 43% | 35% | 46% | 49% | 64% | 37% | 37% | 39% | 39% |
| 6837 | 1.00% | 1.00% | 1.00% | 0.25% | 1.00% | 37% | 48% | 43% | 56% | 36% | 47% | 37% | 48% | 51% | 66% | 39% | 39% | 41% | 41% |
| 6838 | 9.00% | 1.00% | 1.00% | 0.25% | 1.00% | 33% | 43% | 41% | 53% | 31% | 40% | 34% | 44% | 48% | 62% | 35% | 35% | 38% | 38% |
| 6839 | 0.00% | 9.00% | 1.00% | 0.25% | 1.00% | 46% | 60% | 51% | 66% | 35% | 46% | 45% | 59% | 58% | 75% | 44% | 44% | 46% | 46% |
| 6840 | 0.25% | 9.00% | 1.00% | 0.25% | 1.00% | 48% | 62% | 52% | 68% | 37% | 48% | 46% | 60% | 59% | 77% | 46% | 46% | 47% | 47% |
| 6841 | 1.00% | 9.00% | 1.00% | 0.25% | 1.00% | 50% | 65% | 53% | 69% | 40% | 52% | 48% | 62% | 61% | 79% | 48% | 48% | 50% | 50% |
| 6842 | 0.25% | 0.25% | 9.00% | 0.25% | 1.00% | 31% | 40% | 38% | 49% | 34% | 44% | 33% | 43% | 45% | 59% | 34% | 34% | 37% | 37% |
| 6843 | 1.00% | 0.25% | 9.00% | 0.25% | 1.00% | 33% | 43% | 39% | 51% | 37% | 48% | 35% | 46% | 47% | 61% | 36% | 36% | 40% | 40% |
| 6844 | 9.00% | 0.25% | 9.00% | 0.25% | 1.00% | 29% | 38% | 37% | 48% | 32% | 42% | 32% | 42% | 44% | 57% | 33% | 33% | 36% | 36% |
| 6845 | 0.00% | 1.00% | 9.00% | 0.25% | 1.00% | 37% | 48% | 45% | 59% | 35% | 46% | 37% | 48% | 54% | 70% | 39% | 39% | 42% | 42% |
| 6846 | 0.25% | 1.00% | 9.00% | 0.25% | 1.00% | 39% | 51% | 46% | 60% | 37% | 48% | 38% | 49% | 55% | 72% | 41% | 41% | 43% | 43% |
| 6847 | 9.00% | 1.00% | 9.00% | 0.25% | 1.00% | 37% | 48% | 45% | 59% | 35% | 46% | 37% | 48% | 54% | 70% | 39% | 39% | 42% | 42% |
| 6848 | 1.00% | 9.00% | 9.00% | 0.25% | 1.00% | 54% | 70% | 57% | 74% | 44% | 57% | 51% | 66% | 67% | 87% | 52% | 52% | 54% | 54% |
| 6849 | 0.25% | 0.00% | 0.00% | 1.00% | 1.00% | 27% | 35% | 27% | 35% | 25% | 33% | 23% | 30% | 36% | 47% | 26% | 26% | 28% | 28% |
| 6850 | 1.00% | 0.25% | 0.00% | 1.00% | 1.00% | 34% | 44% | 35% | 46% | 34% | 44% | 32% | 42% | 44% | 57% | 34% | 34% | 37% | 37% |
| 6851 | 0.00% | 1.00% | 0.00% | 1.00% | 1.00% | 38% | 49% | 41% | 53% | 32% | 42% | 34% | 44% | 51% | 66% | 37% | 37% | 39% | 39% |
| 6852 | 0.25% | 1.00% | 0.00% | 1.00% | 1.00% | 40% | 52% | 42% | 55% | 34% | 44% | 35% | 46% | 52% | 68% | 39% | 39% | 40% | 40% |
| 6853 | 1.00% | 1.00% | 0.00% | 1.00% | 1.00% | 42% | 55% | 43% | 56% | 37% | 48% | 37% | 48% | 54% | 70% | 41% | 41% | 43% | 43% |
| 6854 | 0.00% | 0.00% | 0.25% | 1.00% | 1.00% | 28% | 36% | 30% | 39% | 28% | 36% | 25% | 33% | 38% | 49% | 29% | 29% | 30% | 30% |
| 6855 | 1.00% | 0.00% | 0.25% | 1.00% | 1.00% | 32% | 42% | 32% | 42% | 33% | 43% | 28% | 36% | 41% | 53% | 32% | 32% | 34% | 34% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6856 | 0.25% | 0.25% | 0.25% | 1.00% | 1.00% | 35% | 46% | 38% | 49% | 36% | 47% | 33% | 43% | 45% | 59% | 36% | 36% | 38% | 38% |
| 6857 | 1.00% | 0.25% | 0.25% | 1.00% | 1.00% | 37% | 48% | 39% | 51% | 39% | 51% | 35% | 46% | 47% | 61% | 38% | 38% | 40% | 40% |
| 6858 | 9.00% | 0.25% | 0.25% | 1.00% | 1.00% | 33% | 43% | 37% | 48% | 34% | 44% | 32% | 42% | 44% | 57% | 35% | 35% | 37% | 37% |
| 6859 | 0.00% | 1.00% | 0.25% | 1.00% | 1.00% | 41% | 53% | 45% | 59% | 37% | 48% | 37% | 48% | 54% | 70% | 41% | 41% | 43% | 43% |
| 6860 | 0.25% | 1.00% | 0.25% | 1.00% | 1.00% | 43% | 56% | 46% | 60% | 39% | 51% | 38% | 49% | 55% | 72% | 43% | 43% | 44% | 44% |
| 6861 | 1.00% | 1.00% | 0.25% | 1.00% | 1.00% | 45% | 59% | 47% | 61% | 42% | 55% | 40% | 52% | 57% | 74% | 45% | 45% | 46% | 46% |
| 6862 | 9.00% | 1.00% | 0.25% | 1.00% | 1.00% | 41% | 53% | 45% | 59% | 37% | 48% | 37% | 48% | 54% | 70% | 41% | 41% | 43% | 43% |
| 6863 | 0.25% | 9.00% | 0.25% | 1.00% | 1.00% | 56% | 73% | 56% | 73% | 43% | 56% | 49% | 64% | 65% | 85% | 52% | 52% | 52% | 52% |
| 6864 | 1.00% | 9.00% | 0.25% | 1.00% | 1.00% | 58% | 75% | 57% | 74% | 46% | 60% | 51% | 66% | 67% | 87% | 54% | 54% | 55% | 55% |
| 6865 | 9.00% | 9.00% | 0.25% | 1.00% | 1.00% | 54% | 70% | 55% | 72% | 41% | 53% | 48% | 62% | 64% | 83% | 50% | 50% | 51% | 51% |
| 6866 | 0.00% | 0.00% | 1.00% | 1.00% | 1.00% | 31% | 40% | 33% | 43% | 32% | 42% | 29% | 38% | 44% | 57% | 32% | 32% | 35% | 35% |
| 6867 | 0.25% | 0.00% | 1.00% | 1.00% | 1.00% | 33% | 43% | 34% | 44% | 34% | 44% | 30% | 39% | 45% | 59% | 34% | 34% | 36% | 36% |
| 6868 | 1.00% | 0.00% | 1.00% | 1.00% | 1.00% | 35% | 46% | 35% | 46% | 37% | 48% | 32% | 42% | 47% | 61% | 36% | 36% | 39% | 39% |
| 6869 | 0.00% | 0.25% | 1.00% | 1.00% | 1.00% | 36% | 47% | 40% | 52% | 38% | 49% | 36% | 47% | 50% | 65% | 38% | 38% | 41% | 41% |
| 6870 | 1.00% | 0.25% | 1.00% | 1.00% | 1.00% | 40% | 52% | 42% | 55% | 43% | 56% | 39% | 51% | 53% | 69% | 42% | 42% | 45% | 45% |
| 6871 | 9.00% | 0.25% | 1.00% | 1.00% | 1.00% | 36% | 47% | 40% | 52% | 38% | 49% | 36% | 47% | 50% | 65% | 38% | 38% | 41% | 41% |
| 6872 | 0.00% | 1.00% | 1.00% | 1.00% | 1.00% | 44% | 57% | 48% | 62% | 41% | 53% | 41% | 53% | 60% | 78% | 44% | 44% | 47% | 47% |
| 6873 | 0.25% | 1.00% | 1.00% | 1.00% | 1.00% | 46% | 60% | 49% | 64% | 43% | 56% | 42% | 55% | 61% | 79% | 46% | 46% | 49% | 49% |
| 6874 | 1.00% | 1.00% | 1.00% | 1.00% | 1.00% | 48% | 62% | 50% | 65% | 46% | 60% | 44% | 57% | 63% | 82% | 48% | 48% | 51% | 51% |
| 6875 | 9.00% | 1.00% | 1.00% | 1.00% | 1.00% | 44% | 57% | 48% | 62% | 41% | 53% | 41% | 53% | 60% | 78% | 44% | 44% | 47% | 47% |
| 6876 | 0.00% | 9.00% | 1.00% | 1.00% | 1.00% | 57% | 74% | 58% | 75% | 45% | 59% | 52% | 68% | 70% | 91% | 53% | 53% | 56% | 56% |
| 6877 | 0.25% | 9.00% | 1.00% | 1.00% | 1.00% | 59% | 77% | 59% | 77% | 47% | 61% | 53% | 69% | 71% | 92% | 55% | 55% | 57% | 57% |
| 6878 | 1.00% | 9.00% | 1.00% | 1.00% | 1.00% | 61% | 79% | 60% | 78% | 50% | 65% | 55% | 72% | 73% | 95% | 57% | 57% | 59% | 59% |
| 6879 | 0.25% | 0.25% | 9.00% | 1.00% | 1.00% | 42% | 55% | 45% | 59% | 44% | 57% | 40% | 52% | 57% | 74% | 44% | 44% | 47% | 47% |
| 6880 | 1.00% | 0.25% | 9.00% | 1.00% | 1.00% | 44% | 57% | 46% | 60% | 47% | 61% | 42% | 55% | 59% | 77% | 46% | 46% | 49% | 49% |

Fig. 25

| Formula # | Gamma Dodecalactone | Methyl Apritone | Propyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6881 | 9.00% | 0.25% | 9.00% | 1.00% | 1.00% | 40% | 52% | 44% | 57% | 42% | 55% | 39% | 51% | 56% | 73% | 42% | 42% | 46% | 46% |
| 6882 | 0.25% | 1.00% | 9.00% | 1.00% | 1.00% | 50% | 65% | 53% | 69% | 47% | 61% | 45% | 59% | 67% | 87% | 50% | 50% | 53% | 53% |
| 6883 | 0.00% | 0.25% | 0.00% | 9.00% | 1.00% | 43% | 56% | 42% | 55% | 39% | 51% | 42% | 55% | 51% | 66% | 41% | 41% | 44% | 44% |
| 6884 | 0.00% | 0.00% | 0.25% | 9.00% | 1.00% | 41% | 53% | 39% | 51% | 38% | 49% | 38% | 49% | 48% | 62% | 39% | 39% | 41% | 41% |
| 6885 | 0.25% | 0.00% | 0.25% | 9.00% | 1.00% | 43% | 56% | 40% | 52% | 40% | 52% | 39% | 51% | 49% | 64% | 41% | 41% | 43% | 43% |
| 6886 | 0.00% | 0.25% | 0.25% | 9.00% | 1.00% | 46% | 60% | 46% | 60% | 44% | 57% | 45% | 59% | 54% | 70% | 45% | 45% | 48% | 48% |
| 6887 | 0.25% | 0.25% | 0.25% | 9.00% | 1.00% | 48% | 62% | 47% | 61% | 46% | 60% | 46% | 60% | 55% | 72% | 47% | 47% | 49% | 49% |
| 6888 | 1.00% | 0.25% | 0.25% | 9.00% | 1.00% | 50% | 65% | 48% | 62% | 49% | 64% | 48% | 62% | 57% | 74% | 49% | 49% | 51% | 51% |
| 6889 | 9.00% | 0.25% | 0.25% | 9.00% | 1.00% | 46% | 60% | 46% | 60% | 44% | 57% | 45% | 59% | 54% | 70% | 45% | 45% | 48% | 48% |
| 6890 | 0.00% | 1.00% | 0.25% | 9.00% | 1.00% | 54% | 70% | 54% | 70% | 47% | 61% | 50% | 65% | 64% | 83% | 52% | 52% | 54% | 54% |
| 6891 | 0.25% | 1.00% | 0.25% | 9.00% | 1.00% | 56% | 73% | 55% | 72% | 49% | 64% | 51% | 66% | 65% | 85% | 53% | 53% | 55% | 55% |
| 6892 | 1.00% | 1.00% | 0.25% | 9.00% | 1.00% | 58% | 75% | 56% | 73% | 52% | 68% | 53% | 69% | 67% | 87% | 55% | 55% | 57% | 57% |
| 6893 | 0.25% | 9.00% | 0.25% | 9.00% | 1.00% | 69% | 90% | 65% | 85% | 53% | 69% | 62% | 81% | 75% | 98% | 62% | 62% | 63% | 63% |
| 6894 | 0.25% | 0.00% | 1.00% | 9.00% | 1.00% | 46% | 60% | 43% | 56% | 44% | 57% | 43% | 56% | 55% | 72% | 44% | 44% | 47% | 47% |
| 6895 | 1.00% | 0.25% | 1.00% | 9.00% | 1.00% | 53% | 69% | 51% | 66% | 53% | 69% | 52% | 68% | 63% | 82% | 52% | 52% | 56% | 56% |
| 6896 | 9.00% | 0.25% | 1.00% | 9.00% | 1.00% | 49% | 64% | 49% | 64% | 48% | 62% | 49% | 64% | 60% | 78% | 49% | 49% | 52% | 52% |
| 6897 | 0.00% | 1.00% | 1.00% | 9.00% | 1.00% | 57% | 74% | 57% | 74% | 51% | 66% | 54% | 70% | 70% | 91% | 55% | 55% | 58% | 58% |
| 6898 | 0.25% | 1.00% | 1.00% | 9.00% | 1.00% | 59% | 77% | 58% | 75% | 53% | 69% | 55% | 72% | 71% | 92% | 57% | 57% | 60% | 60% |
| 6899 | 1.00% | 1.00% | 1.00% | 9.00% | 1.00% | 61% | 79% | 59% | 77% | 56% | 73% | 57% | 74% | 73% | 95% | 59% | 59% | 62% | 62% |
| 6900 | 0.25% | 0.25% | 9.00% | 9.00% | 1.00% | 55% | 72% | 54% | 70% | 54% | 70% | 53% | 69% | 67% | 87% | 54% | 54% | 58% | 58% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6901 | 0.25% | 0.25% | 0.00% | 0.00% | 0.00% | 7% | 8% | 5% | 7% | 5% | 7% | 4% | 5% | 4% | 5% | 6% | 6% | 4% | 4% |
| 6902 | 1.00% | 0.25% | 0.00% | 0.00% | 0.00% | 9% | 11% | 6% | 8% | 8% | 10% | 6% | 8% | 6% | 8% | 8% | 8% | 7% | 7% |
| 6903 | 0.25% | 1.00% | 0.00% | 0.00% | 0.00% | 13% | 17% | 13% | 17% | 9% | 12% | 10% | 13% | 12% | 16% | 12% | 12% | 10% | 10% |
| 6904 | 1.00% | 1.00% | 0.00% | 0.00% | 0.00% | 15% | 20% | 14% | 18% | 12% | 16% | 12% | 16% | 14% | 18% | 14% | 14% | 13% | 13% |
| 6905 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 6906 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 6907 | 0.00% | 0.25% | 0.25% | 0.00% | 0.00% | 10% | 12% | 8% | 10% | 10% | 13% | 10% | 13% | 10% | 13% | 9% | 9% | 10% | 10% |
| 6908 | 0.25% | 0.25% | 0.25% | 0.00% | 0.00% | 12% | 15% | 9% | 12% | 12% | 16% | 11% | 14% | 11% | 14% | 11% | 11% | 11% | 11% |
| 6909 | 0.00% | 1.00% | 0.25% | 0.00% | 0.00% | 16% | 21% | 16% | 21% | 14% | 18% | 16% | 21% | 18% | 23% | 15% | 15% | 16% | 16% |
| 6910 | 1.00% | 1.00% | 0.25% | 0.00% | 0.00% | 20% | 26% | 18% | 23% | 19% | 25% | 19% | 25% | 21% | 27% | 19% | 19% | 20% | 20% |
| 6911 | 1.00% | 9.00% | 0.25% | 0.00% | 0.00% | 31% | 40% | 31% | 40% | 27% | 35% | 29% | 38% | 35% | 46% | 30% | 30% | 30% | 30% |
| 6912 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 6913 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 6914 | 0.00% | 0.25% | 1.00% | 0.00% | 0.00% | 15% | 19% | 15% | 20% | 15% | 20% | 12% | 16% | 15% | 20% | 15% | 15% | 14% | 14% |
| 6915 | 1.00% | 0.25% | 1.00% | 0.00% | 0.00% | 19% | 24% | 17% | 22% | 20% | 26% | 15% | 20% | 18% | 23% | 19% | 19% | 18% | 18% |
| 6916 | 0.00% | 1.00% | 1.00% | 0.00% | 0.00% | 21% | 27% | 23% | 30% | 19% | 25% | 18% | 23% | 23% | 30% | 21% | 21% | 20% | 20% |
| 6917 | 0.25% | 1.00% | 1.00% | 0.00% | 0.00% | 23% | 30% | 24% | 31% | 21% | 27% | 19% | 25% | 24% | 31% | 23% | 23% | 21% | 21% |
| 6918 | 1.00% | 1.00% | 1.00% | 0.00% | 0.00% | 25% | 33% | 25% | 33% | 24% | 31% | 21% | 27% | 26% | 34% | 25% | 25% | 24% | 24% |
| 6919 | 9.00% | 1.00% | 1.00% | 0.00% | 0.00% | 21% | 27% | 23% | 30% | 19% | 25% | 18% | 23% | 23% | 30% | 21% | 21% | 20% | 20% |
| 6920 | 1.00% | 9.00% | 1.00% | 0.00% | 0.00% | 36% | 47% | 38% | 49% | 32% | 42% | 31% | 40% | 40% | 52% | 35% | 35% | 34% | 34% |
| 6921 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 6922 | 0.00% | 0.25% | 9.00% | 0.00% | 0.00% | 25% | 32% | 23% | 30% | 29% | 38% | 19% | 25% | 29% | 38% | 26% | 26% | 26% | 26% |
| 6923 | 0.25% | 0.25% | 9.00% | 0.00% | 0.00% | 27% | 34% | 24% | 31% | 31% | 40% | 20% | 26% | 30% | 39% | 27% | 27% | 27% | 27% |
| 6924 | 1.00% | 0.25% | 9.00% | 0.00% | 0.00% | 29% | 37% | 25% | 33% | 34% | 44% | 22% | 29% | 32% | 42% | 29% | 29% | 29% | 29% |
| 6925 | 0.25% | 1.00% | 9.00% | 0.00% | 0.00% | 33% | 43% | 32% | 42% | 35% | 46% | 26% | 34% | 38% | 49% | 33% | 33% | 33% | 33% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6926 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 6927 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 6928 | 0.00% | 0.25% | 0.00% | 0.25% | 0.00% | 10% | 12% | 13% | 17% | 9% | 12% | 13% | 17% | 10% | 13% | 11% | 11% | 11% | 11% |
| 6929 | 0.25% | 0.25% | 0.00% | 0.25% | 0.00% | 12% | 15% | 14% | 18% | 11% | 14% | 14% | 18% | 11% | 14% | 12% | 12% | 12% | 12% |
| 6930 | 9.00% | 0.25% | 0.00% | 0.25% | 0.00% | 10% | 12% | 13% | 17% | 9% | 12% | 13% | 17% | 10% | 13% | 11% | 11% | 11% | 11% |
| 6931 | 1.00% | 1.00% | 0.00% | 0.25% | 0.00% | 20% | 26% | 23% | 30% | 18% | 23% | 22% | 29% | 21% | 27% | 20% | 20% | 20% | 20% |
| 6932 | 1.00% | 9.00% | 0.00% | 0.25% | 0.00% | 31% | 40% | 36% | 47% | 26% | 34% | 32% | 42% | 35% | 46% | 31% | 31% | 31% | 31% |
| 6933 | 0.00% | 0.00% | 0.25% | 0.25% | 0.00% | 10% | 13% | 13% | 17% | 13% | 17% | 17% | 22% | 14% | 18% | 12% | 12% | 15% | 15% |
| 6934 | 0.25% | 0.00% | 0.25% | 0.25% | 0.00% | 12% | 16% | 14% | 18% | 15% | 20% | 18% | 23% | 15% | 20% | 14% | 14% | 16% | 16% |
| 6935 | 0.00% | 0.25% | 0.25% | 0.25% | 0.00% | 15% | 19% | 17% | 22% | 16% | 21% | 20% | 26% | 17% | 22% | 16% | 16% | 18% | 18% |
| 6936 | 0.25% | 0.25% | 0.25% | 0.25% | 0.00% | 17% | 21% | 18% | 23% | 18% | 23% | 21% | 27% | 18% | 23% | 18% | 18% | 19% | 19% |
| 6937 | 1.00% | 0.25% | 0.25% | 0.25% | 0.00% | 19% | 24% | 19% | 25% | 21% | 27% | 23% | 30% | 20% | 26% | 20% | 20% | 21% | 21% |
| 6938 | 9.00% | 0.25% | 0.25% | 0.25% | 0.00% | 15% | 19% | 17% | 22% | 16% | 21% | 20% | 26% | 17% | 22% | 16% | 16% | 18% | 18% |
| 6939 | 0.25% | 1.00% | 0.25% | 0.25% | 0.00% | 23% | 30% | 26% | 34% | 22% | 29% | 27% | 35% | 26% | 34% | 24% | 24% | 25% | 25% |
| 6940 | 9.00% | 1.00% | 0.25% | 0.25% | 0.00% | 21% | 27% | 25% | 33% | 20% | 26% | 26% | 34% | 25% | 33% | 22% | 22% | 24% | 24% |
| 6941 | 0.25% | 9.00% | 0.25% | 0.25% | 0.00% | 34% | 44% | 39% | 51% | 30% | 39% | 37% | 48% | 40% | 52% | 34% | 34% | 36% | 36% |
| 6942 | 1.00% | 9.00% | 0.25% | 0.25% | 0.00% | 36% | 47% | 40% | 52% | 33% | 43% | 39% | 51% | 42% | 55% | 36% | 36% | 38% | 38% |
| 6943 | 9.00% | 9.00% | 0.25% | 0.25% | 0.00% | 32% | 42% | 38% | 49% | 28% | 36% | 36% | 47% | 39% | 51% | 33% | 33% | 34% | 34% |
| 6944 | 0.00% | 0.00% | 1.00% | 0.25% | 0.00% | 15% | 20% | 20% | 26% | 18% | 23% | 19% | 25% | 19% | 25% | 18% | 18% | 19% | 19% |
| 6945 | 1.00% | 0.00% | 1.00% | 0.25% | 0.00% | 19% | 25% | 22% | 29% | 23% | 30% | 22% | 29% | 22% | 29% | 21% | 21% | 22% | 22% |
| 6946 | 0.00% | 0.25% | 1.00% | 0.25% | 0.00% | 20% | 25% | 24% | 31% | 21% | 27% | 22% | 29% | 22% | 29% | 22% | 22% | 22% | 22% |
| 6947 | 0.25% | 0.25% | 1.00% | 0.25% | 0.00% | 22% | 28% | 25% | 33% | 23% | 30% | 23% | 30% | 23% | 30% | 23% | 23% | 23% | 23% |
| 6948 | 1.00% | 0.25% | 1.00% | 0.25% | 0.00% | 24% | 31% | 26% | 34% | 26% | 34% | 25% | 33% | 25% | 33% | 25% | 25% | 25% | 25% |
| 6949 | 9.00% | 0.25% | 1.00% | 0.25% | 0.00% | 20% | 25% | 24% | 31% | 21% | 27% | 22% | 29% | 22% | 29% | 22% | 22% | 22% | 22% |
| 6950 | 0.00% | 1.00% | 1.00% | 0.25% | 0.00% | 26% | 34% | 32% | 42% | 25% | 33% | 28% | 36% | 30% | 39% | 28% | 28% | 28% | 28% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6951 | 0.25% | 1.00% | 1.00% | 0.25% | 0.00% | 28% | 36% | 33% | 43% | 27% | 35% | 29% | 38% | 31% | 40% | 29% | 29% | 29% | 29% |
| 6952 | 1.00% | 1.00% | 1.00% | 0.25% | 0.00% | 30% | 39% | 34% | 44% | 30% | 39% | 31% | 40% | 33% | 43% | 31% | 31% | 31% | 31% |
| 6953 | 9.00% | 1.00% | 1.00% | 0.25% | 0.00% | 26% | 34% | 32% | 42% | 25% | 33% | 28% | 36% | 30% | 39% | 28% | 28% | 28% | 28% |
| 6954 | 0.00% | 9.00% | 1.00% | 0.25% | 0.00% | 37% | 48% | 45% | 59% | 33% | 43% | 38% | 49% | 44% | 57% | 38% | 38% | 38% | 38% |
| 6955 | 0.25% | 9.00% | 1.00% | 0.25% | 0.00% | 39% | 51% | 46% | 60% | 35% | 46% | 39% | 51% | 45% | 59% | 40% | 40% | 40% | 40% |
| 6956 | 1.00% | 9.00% | 1.00% | 0.25% | 0.00% | 41% | 53% | 47% | 61% | 38% | 49% | 41% | 53% | 47% | 61% | 42% | 42% | 42% | 42% |
| 6957 | 0.25% | 0.25% | 9.00% | 0.25% | 0.00% | 32% | 41% | 33% | 43% | 37% | 48% | 30% | 39% | 37% | 48% | 34% | 34% | 35% | 35% |
| 6958 | 1.00% | 0.25% | 9.00% | 0.25% | 0.00% | 34% | 44% | 34% | 44% | 40% | 52% | 32% | 42% | 39% | 51% | 36% | 36% | 37% | 37% |
| 6959 | 9.00% | 0.25% | 9.00% | 0.25% | 0.00% | 30% | 38% | 32% | 42% | 35% | 46% | 29% | 38% | 36% | 47% | 32% | 32% | 33% | 33% |
| 6960 | 0.00% | 1.00% | 9.00% | 0.25% | 0.00% | 36% | 47% | 40% | 52% | 39% | 51% | 35% | 46% | 44% | 57% | 38% | 38% | 39% | 39% |
| 6961 | 0.25% | 1.00% | 9.00% | 0.25% | 0.00% | 38% | 49% | 41% | 53% | 41% | 53% | 36% | 47% | 45% | 59% | 40% | 40% | 41% | 41% |
| 6962 | 9.00% | 1.00% | 9.00% | 0.25% | 0.00% | 36% | 47% | 40% | 52% | 39% | 51% | 35% | 46% | 44% | 57% | 38% | 38% | 39% | 39% |
| 6963 | 1.00% | 9.00% | 9.00% | 0.25% | 0.00% | 51% | 66% | 55% | 72% | 52% | 68% | 48% | 62% | 61% | 79% | 53% | 53% | 54% | 54% |
| 6964 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 6965 | 1.00% | 0.25% | 0.00% | 1.00% | 0.00% | 29% | 37% | 27% | 35% | 26% | 34% | 26% | 34% | 28% | 36% | 27% | 27% | 27% | 27% |
| 6966 | 0.00% | 1.00% | 0.00% | 1.00% | 0.00% | 31% | 40% | 33% | 43% | 25% | 33% | 29% | 38% | 33% | 43% | 30% | 30% | 29% | 29% |
| 6967 | 0.25% | 1.00% | 0.00% | 1.00% | 0.00% | 33% | 43% | 34% | 44% | 27% | 35% | 30% | 39% | 34% | 44% | 31% | 31% | 30% | 30% |
| 6968 | 1.00% | 1.00% | 0.00% | 1.00% | 0.00% | 35% | 46% | 35% | 46% | 30% | 39% | 32% | 42% | 36% | 47% | 33% | 33% | 33% | 33% |
| 6969 | 0.00% | 0.00% | 0.25% | 1.00% | 0.00% | 25% | 33% | 25% | 33% | 25% | 33% | 27% | 35% | 29% | 38% | 25% | 25% | 27% | 27% |
| 6970 | 1.00% | 0.00% | 0.25% | 1.00% | 0.00% | 29% | 38% | 27% | 35% | 30% | 39% | 30% | 39% | 32% | 42% | 29% | 29% | 31% | 31% |
| 6971 | 0.25% | 0.25% | 0.25% | 1.00% | 0.00% | 32% | 41% | 30% | 39% | 30% | 39% | 31% | 40% | 33% | 43% | 31% | 31% | 31% | 31% |
| 6972 | 1.00% | 0.25% | 0.25% | 1.00% | 0.00% | 34% | 44% | 31% | 40% | 33% | 43% | 33% | 43% | 35% | 46% | 33% | 33% | 34% | 34% |
| 6973 | 9.00% | 0.25% | 0.25% | 1.00% | 0.00% | 30% | 38% | 29% | 38% | 28% | 36% | 30% | 39% | 32% | 42% | 29% | 29% | 30% | 30% |
| 6974 | 0.00% | 1.00% | 0.25% | 1.00% | 0.00% | 36% | 47% | 37% | 48% | 32% | 42% | 36% | 47% | 40% | 52% | 35% | 35% | 36% | 36% |
| 6975 | 0.25% | 1.00% | 0.25% | 1.00% | 0.00% | 38% | 49% | 38% | 49% | 34% | 44% | 37% | 48% | 41% | 53% | 37% | 37% | 37% | 37% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 6976 | 1.00% | 1.00% | 0.25% | 1.00% | 0.00% | 40% | 52% | 39% | 51% | 37% | 48% | 39% | 51% | 43% | 56% | 39% | 39% | 40% | 40% |
| 6977 | 9.00% | 1.00% | 0.25% | 1.00% | 0.00% | 36% | 47% | 37% | 48% | 32% | 42% | 36% | 47% | 40% | 52% | 35% | 35% | 36% | 36% |
| 6978 | 0.25% | 9.00% | 0.25% | 1.00% | 0.00% | 49% | 64% | 51% | 66% | 42% | 55% | 47% | 61% | 55% | 72% | 47% | 47% | 48% | 48% |
| 6979 | 1.00% | 9.00% | 0.25% | 1.00% | 0.00% | 51% | 66% | 52% | 68% | 45% | 59% | 49% | 64% | 57% | 74% | 49% | 49% | 50% | 50% |
| 6980 | 9.00% | 9.00% | 0.25% | 1.00% | 0.00% | 47% | 61% | 50% | 65% | 40% | 52% | 46% | 60% | 54% | 70% | 46% | 46% | 47% | 47% |
| 6981 | 0.00% | 0.00% | 1.00% | 1.00% | 0.00% | 30% | 39% | 32% | 42% | 30% | 39% | 29% | 38% | 34% | 44% | 31% | 31% | 31% | 31% |
| 6982 | 0.25% | 0.00% | 1.00% | 1.00% | 0.00% | 32% | 42% | 33% | 43% | 32% | 42% | 30% | 39% | 35% | 46% | 32% | 32% | 32% | 32% |
| 6983 | 1.00% | 0.00% | 1.00% | 1.00% | 0.00% | 34% | 44% | 34% | 44% | 35% | 46% | 32% | 42% | 37% | 48% | 34% | 34% | 35% | 35% |
| 6984 | 0.00% | 0.25% | 1.00% | 1.00% | 0.00% | 35% | 45% | 36% | 47% | 33% | 43% | 32% | 42% | 37% | 48% | 35% | 35% | 34% | 34% |
| 6985 | 1.00% | 0.25% | 1.00% | 1.00% | 0.00% | 39% | 50% | 38% | 49% | 38% | 49% | 35% | 46% | 40% | 52% | 38% | 38% | 38% | 38% |
| 6986 | 9.00% | 0.25% | 1.00% | 1.00% | 0.00% | 35% | 45% | 36% | 47% | 33% | 43% | 32% | 42% | 37% | 48% | 35% | 35% | 34% | 34% |
| 6987 | 0.00% | 1.00% | 1.00% | 1.00% | 0.00% | 41% | 53% | 44% | 57% | 37% | 48% | 38% | 49% | 45% | 59% | 41% | 41% | 40% | 40% |
| 6988 | 0.25% | 1.00% | 1.00% | 1.00% | 0.00% | 43% | 56% | 45% | 59% | 39% | 51% | 39% | 51% | 46% | 60% | 42% | 42% | 41% | 41% |
| 6989 | 1.00% | 1.00% | 1.00% | 1.00% | 0.00% | 45% | 59% | 46% | 60% | 42% | 55% | 41% | 53% | 48% | 62% | 44% | 44% | 44% | 44% |
| 6990 | 9.00% | 1.00% | 1.00% | 1.00% | 0.00% | 41% | 53% | 44% | 57% | 37% | 48% | 38% | 49% | 45% | 59% | 41% | 41% | 40% | 40% |
| 6991 | 0.00% | 9.00% | 1.00% | 1.00% | 0.00% | 52% | 68% | 57% | 74% | 45% | 59% | 48% | 62% | 59% | 77% | 51% | 51% | 51% | 51% |
| 6992 | 0.25% | 9.00% | 1.00% | 1.00% | 0.00% | 54% | 70% | 58% | 75% | 47% | 61% | 49% | 64% | 60% | 78% | 53% | 53% | 52% | 52% |
| 6993 | 1.00% | 9.00% | 1.00% | 1.00% | 0.00% | 56% | 73% | 59% | 77% | 50% | 65% | 51% | 66% | 62% | 81% | 55% | 55% | 54% | 54% |
| 6994 | 0.25% | 0.25% | 9.00% | 1.00% | 0.00% | 47% | 60% | 45% | 59% | 49% | 64% | 40% | 52% | 52% | 68% | 47% | 47% | 47% | 47% |
| 6995 | 1.00% | 0.25% | 9.00% | 1.00% | 0.00% | 49% | 63% | 46% | 60% | 52% | 68% | 42% | 55% | 54% | 70% | 49% | 49% | 49% | 49% |
| 6996 | 9.00% | 0.25% | 9.00% | 1.00% | 0.00% | 45% | 58% | 44% | 57% | 47% | 61% | 39% | 51% | 51% | 66% | 45% | 45% | 46% | 46% |
| 6997 | 0.25% | 1.00% | 9.00% | 1.00% | 0.00% | 53% | 69% | 53% | 69% | 53% | 69% | 46% | 60% | 60% | 78% | 53% | 53% | 53% | 53% |
| 6998 | 0.00% | 0.25% | 0.00% | 9.00% | 0.00% | 45% | 58% | 39% | 51% | 39% | 51% | 43% | 56% | 38% | 49% | 41% | 41% | 40% | 40% |
| 6999 | 0.00% | 0.00% | 0.25% | 9.00% | 0.00% | 45% | 59% | 39% | 51% | 43% | 56% | 47% | 61% | 42% | 55% | 42% | 42% | 44% | 44% |
| 7000 | 0.25% | 0.00% | 0.25% | 9.00% | 0.00% | 47% | 61% | 40% | 52% | 45% | 59% | 48% | 62% | 43% | 56% | 44% | 44% | 45% | 45% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7001 | 0.00% | 0.25% | 0.25% | 9.00% | 0.00% | 50% | 64% | 43% | 56% | 46% | 60% | 50% | 65% | 45% | 59% | 46% | 46% | 47% | 47% |
| 7002 | 0.25% | 0.25% | 0.25% | 9.00% | 0.00% | 52% | 67% | 44% | 57% | 48% | 62% | 51% | 66% | 46% | 60% | 48% | 48% | 48% | 48% |
| 7003 | 1.00% | 0.25% | 0.25% | 9.00% | 0.00% | 54% | 70% | 45% | 59% | 51% | 66% | 53% | 69% | 48% | 62% | 50% | 50% | 51% | 51% |
| 7004 | 9.00% | 0.25% | 0.25% | 9.00% | 0.00% | 50% | 64% | 43% | 56% | 46% | 60% | 50% | 65% | 45% | 59% | 46% | 46% | 47% | 47% |
| 7005 | 0.00% | 1.00% | 0.25% | 9.00% | 0.00% | 56% | 73% | 51% | 66% | 50% | 65% | 56% | 73% | 53% | 69% | 52% | 52% | 53% | 53% |
| 7006 | 0.25% | 1.00% | 0.25% | 9.00% | 0.00% | 58% | 75% | 52% | 68% | 52% | 68% | 57% | 74% | 54% | 70% | 54% | 54% | 54% | 54% |
| 7007 | 1.00% | 1.00% | 0.25% | 9.00% | 0.00% | 60% | 78% | 53% | 69% | 55% | 72% | 59% | 77% | 56% | 73% | 56% | 56% | 57% | 57% |
| 7008 | 0.25% | 9.00% | 0.25% | 9.00% | 0.00% | 69% | 90% | 65% | 85% | 60% | 78% | 67% | 87% | 68% | 88% | 65% | 65% | 65% | 65% |
| 7009 | 0.25% | 0.00% | 1.00% | 9.00% | 0.00% | 52% | 68% | 47% | 61% | 50% | 65% | 50% | 65% | 48% | 62% | 50% | 50% | 49% | 49% |
| 7010 | 1.00% | 0.25% | 1.00% | 9.00% | 0.00% | 59% | 76% | 52% | 68% | 56% | 73% | 55% | 72% | 53% | 69% | 56% | 56% | 55% | 55% |
| 7011 | 9.00% | 0.25% | 1.00% | 9.00% | 0.00% | 55% | 71% | 50% | 65% | 51% | 66% | 52% | 68% | 50% | 65% | 52% | 52% | 51% | 51% |
| 7012 | 0.00% | 1.00% | 1.00% | 9.00% | 0.00% | 61% | 79% | 58% | 75% | 55% | 72% | 58% | 75% | 58% | 75% | 58% | 58% | 57% | 57% |
| 7013 | 0.25% | 1.00% | 1.00% | 9.00% | 0.00% | 63% | 82% | 59% | 77% | 57% | 74% | 59% | 77% | 59% | 77% | 60% | 60% | 58% | 58% |
| 7014 | 1.00% | 1.00% | 1.00% | 9.00% | 0.00% | 65% | 85% | 60% | 78% | 60% | 78% | 61% | 79% | 61% | 79% | 62% | 62% | 61% | 61% |
| 7015 | 0.25% | 0.25% | 9.00% | 9.00% | 0.00% | 67% | 86% | 59% | 77% | 67% | 87% | 60% | 78% | 65% | 85% | 64% | 64% | 64% | 64% |
| 7016 | 0.25% | 0.25% | 0.00% | 0.00% | 0.25% | 13% | 16% | 12% | 16% | 11% | 14% | 9% | 12% | 11% | 14% | 12% | 12% | 10% | 10% |
| 7017 | 1.00% | 0.25% | 0.00% | 0.00% | 0.25% | 15% | 19% | 13% | 17% | 14% | 18% | 11% | 14% | 13% | 17% | 14% | 14% | 13% | 13% |
| 7018 | 0.25% | 1.00% | 0.00% | 0.00% | 0.25% | 19% | 25% | 20% | 26% | 15% | 20% | 15% | 20% | 19% | 25% | 18% | 18% | 16% | 16% |
| 7019 | 1.00% | 1.00% | 0.00% | 0.00% | 0.25% | 21% | 27% | 21% | 27% | 18% | 23% | 17% | 22% | 21% | 27% | 20% | 20% | 19% | 19% |
| 7020 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 7021 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 7022 | 0.00% | 0.25% | 0.25% | 0.00% | 0.25% | 16% | 20% | 15% | 20% | 16% | 21% | 15% | 20% | 17% | 22% | 16% | 16% | 16% | 16% |
| 7023 | 0.25% | 0.25% | 0.25% | 0.00% | 0.25% | 18% | 23% | 16% | 21% | 18% | 23% | 16% | 21% | 18% | 23% | 17% | 17% | 17% | 17% |
| 7024 | 0.00% | 1.00% | 0.25% | 0.00% | 0.25% | 22% | 29% | 23% | 30% | 20% | 26% | 21% | 27% | 25% | 33% | 22% | 22% | 22% | 22% |
| 7025 | 1.00% | 1.00% | 0.25% | 0.00% | 0.25% | 26% | 34% | 25% | 33% | 25% | 33% | 24% | 31% | 28% | 36% | 25% | 25% | 26% | 26% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7026 | 1.00% | 9.00% | 0.25% | 0.00% | 0.25% | 37% | 48% | 38% | 49% | 33% | 43% | 34% | 44% | 42% | 55% | 36% | 36% | 36% | 36% |
| 7027 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 7028 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 7029 | 0.00% | 0.25% | 1.00% | 0.00% | 0.25% | 21% | 27% | 22% | 29% | 21% | 27% | 17% | 22% | 22% | 29% | 21% | 21% | 20% | 20% |
| 7030 | 1.00% | 0.25% | 1.00% | 0.00% | 0.25% | 25% | 32% | 24% | 31% | 26% | 34% | 20% | 26% | 25% | 33% | 25% | 25% | 24% | 24% |
| 7031 | 0.00% | 1.00% | 1.00% | 0.00% | 0.25% | 27% | 35% | 30% | 39% | 25% | 33% | 23% | 30% | 30% | 39% | 27% | 27% | 26% | 26% |
| 7032 | 0.25% | 1.00% | 1.00% | 0.00% | 0.25% | 29% | 38% | 31% | 40% | 27% | 35% | 24% | 31% | 31% | 40% | 29% | 29% | 27% | 27% |
| 7033 | 1.00% | 1.00% | 1.00% | 0.00% | 0.25% | 31% | 40% | 32% | 42% | 30% | 39% | 26% | 34% | 33% | 43% | 31% | 31% | 30% | 30% |
| 7034 | 9.00% | 1.00% | 1.00% | 0.00% | 0.25% | 27% | 35% | 30% | 39% | 25% | 33% | 23% | 30% | 30% | 39% | 27% | 27% | 26% | 26% |
| 7035 | 1.00% | 9.00% | 1.00% | 0.00% | 0.25% | 42% | 55% | 45% | 59% | 38% | 49% | 36% | 47% | 47% | 61% | 42% | 42% | 40% | 40% |
| 7036 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 7037 | 0.00% | 0.25% | 9.00% | 0.00% | 0.25% | 31% | 40% | 30% | 39% | 35% | 46% | 24% | 31% | 36% | 47% | 32% | 32% | 32% | 32% |
| 7038 | 0.25% | 0.25% | 9.00% | 0.00% | 0.25% | 33% | 42% | 31% | 40% | 37% | 48% | 25% | 33% | 37% | 48% | 34% | 34% | 33% | 33% |
| 7039 | 1.00% | 0.25% | 9.00% | 0.00% | 0.25% | 35% | 45% | 32% | 42% | 40% | 52% | 27% | 35% | 39% | 51% | 36% | 36% | 35% | 35% |
| 7040 | 0.25% | 1.00% | 9.00% | 0.00% | 0.25% | 39% | 51% | 39% | 51% | 41% | 53% | 31% | 40% | 45% | 59% | 40% | 40% | 39% | 39% |
| 7041 | 0.25% | 0.00% | 0.00% | 0.25% | 0.25% | 13% | 17% | 17% | 22% | 14% | 18% | 16% | 21% | 15% | 20% | 15% | 15% | 15% | 15% |
| 7042 | 1.00% | 0.00% | 0.00% | 0.25% | 0.25% | 15% | 20% | 18% | 23% | 17% | 22% | 18% | 23% | 17% | 22% | 17% | 17% | 17% | 17% |
| 7043 | 0.00% | 0.25% | 0.00% | 0.25% | 0.25% | 16% | 20% | 20% | 26% | 15% | 20% | 18% | 23% | 17% | 22% | 17% | 17% | 17% | 17% |
| 7044 | 0.25% | 0.25% | 0.00% | 0.25% | 0.25% | 18% | 23% | 21% | 27% | 17% | 22% | 19% | 25% | 18% | 23% | 19% | 19% | 18% | 18% |
| 7045 | 9.00% | 0.25% | 0.00% | 0.25% | 0.25% | 16% | 20% | 20% | 26% | 15% | 20% | 18% | 23% | 17% | 22% | 17% | 17% | 17% | 17% |
| 7046 | 1.00% | 1.00% | 0.00% | 0.25% | 0.25% | 26% | 34% | 30% | 39% | 24% | 31% | 27% | 35% | 28% | 36% | 27% | 27% | 26% | 26% |
| 7047 | 1.00% | 9.00% | 0.00% | 0.25% | 0.25% | 37% | 48% | 43% | 56% | 32% | 42% | 37% | 48% | 42% | 55% | 37% | 37% | 37% | 37% |
| 7048 | 0.00% | 0.00% | 0.25% | 0.25% | 0.25% | 16% | 21% | 20% | 26% | 19% | 25% | 22% | 29% | 21% | 27% | 18% | 18% | 21% | 21% |
| 7049 | 0.25% | 0.00% | 0.25% | 0.25% | 0.25% | 18% | 23% | 21% | 27% | 21% | 27% | 23% | 30% | 22% | 29% | 20% | 20% | 22% | 22% |
| 7050 | 0.00% | 0.25% | 0.25% | 0.25% | 0.25% | 21% | 27% | 24% | 31% | 22% | 29% | 25% | 33% | 24% | 31% | 22% | 22% | 24% | 24% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7051 | 0.25% | 0.25% | 0.25% | 0.25% | 0.25% | 23% | 29% | 25% | 33% | 24% | 31% | 26% | 34% | 25% | 33% | 24% | 24% | 25% | 25% |
| 7052 | 1.00% | 0.25% | 0.25% | 0.25% | 0.25% | 25% | 32% | 26% | 34% | 27% | 35% | 28% | 36% | 27% | 35% | 26% | 26% | 27% | 27% |
| 7053 | 9.00% | 0.25% | 0.25% | 0.25% | 0.25% | 21% | 27% | 24% | 31% | 22% | 29% | 25% | 33% | 24% | 31% | 22% | 22% | 24% | 24% |
| 7054 | 0.25% | 1.00% | 0.25% | 0.25% | 0.25% | 29% | 38% | 33% | 43% | 28% | 36% | 32% | 42% | 33% | 43% | 30% | 30% | 31% | 31% |
| 7055 | 9.00% | 1.00% | 0.25% | 0.25% | 0.25% | 27% | 35% | 32% | 42% | 26% | 34% | 31% | 40% | 32% | 42% | 28% | 28% | 30% | 30% |
| 7056 | 0.25% | 9.00% | 0.25% | 0.25% | 0.25% | 40% | 52% | 46% | 60% | 36% | 47% | 42% | 55% | 47% | 61% | 41% | 41% | 42% | 42% |
| 7057 | 1.00% | 9.00% | 0.25% | 0.25% | 0.25% | 42% | 55% | 47% | 61% | 39% | 51% | 44% | 57% | 49% | 64% | 43% | 43% | 44% | 44% |
| 7058 | 9.00% | 9.00% | 0.25% | 0.25% | 0.25% | 38% | 49% | 45% | 59% | 34% | 44% | 41% | 53% | 46% | 60% | 39% | 39% | 40% | 40% |
| 7059 | 0.00% | 0.00% | 1.00% | 0.25% | 0.25% | 21% | 27% | 27% | 35% | 24% | 31% | 24% | 31% | 26% | 34% | 24% | 24% | 25% | 25% |
| 7060 | 1.00% | 0.00% | 1.00% | 0.25% | 0.25% | 25% | 33% | 29% | 38% | 29% | 38% | 27% | 35% | 29% | 38% | 28% | 28% | 28% | 28% |
| 7061 | 0.00% | 0.25% | 1.00% | 0.25% | 0.25% | 26% | 33% | 31% | 40% | 27% | 35% | 27% | 35% | 29% | 38% | 28% | 28% | 28% | 28% |
| 7062 | 0.25% | 0.25% | 1.00% | 0.25% | 0.25% | 28% | 36% | 32% | 42% | 29% | 38% | 28% | 36% | 30% | 39% | 30% | 30% | 29% | 29% |
| 7063 | 1.00% | 0.25% | 1.00% | 0.25% | 0.25% | 30% | 38% | 33% | 43% | 32% | 42% | 30% | 39% | 32% | 42% | 32% | 32% | 31% | 31% |
| 7064 | 9.00% | 0.25% | 1.00% | 0.25% | 0.25% | 26% | 33% | 31% | 40% | 27% | 35% | 27% | 35% | 29% | 38% | 28% | 28% | 28% | 28% |
| 7065 | 0.00% | 1.00% | 1.00% | 0.25% | 0.25% | 32% | 42% | 39% | 51% | 31% | 40% | 33% | 43% | 37% | 48% | 34% | 34% | 34% | 34% |
| 7066 | 0.25% | 1.00% | 1.00% | 0.25% | 0.25% | 34% | 44% | 40% | 52% | 33% | 43% | 34% | 44% | 38% | 49% | 36% | 36% | 35% | 35% |
| 7067 | 1.00% | 1.00% | 1.00% | 0.25% | 0.25% | 36% | 47% | 41% | 53% | 36% | 47% | 36% | 47% | 40% | 52% | 38% | 38% | 37% | 37% |
| 7068 | 9.00% | 1.00% | 1.00% | 0.25% | 0.25% | 32% | 42% | 39% | 51% | 31% | 40% | 33% | 43% | 37% | 48% | 34% | 34% | 34% | 34% |
| 7069 | 0.00% | 9.00% | 1.00% | 0.25% | 0.25% | 43% | 56% | 52% | 68% | 39% | 51% | 43% | 56% | 51% | 66% | 45% | 45% | 44% | 44% |
| 7070 | 0.25% | 9.00% | 1.00% | 0.25% | 0.25% | 45% | 59% | 53% | 69% | 41% | 53% | 44% | 57% | 52% | 68% | 46% | 46% | 46% | 46% |
| 7071 | 1.00% | 9.00% | 1.00% | 0.25% | 0.25% | 47% | 61% | 54% | 70% | 44% | 57% | 46% | 60% | 54% | 70% | 48% | 48% | 48% | 48% |
| 7072 | 0.25% | 0.25% | 9.00% | 0.25% | 0.25% | 38% | 49% | 40% | 52% | 43% | 56% | 35% | 46% | 44% | 57% | 40% | 40% | 41% | 41% |
| 7073 | 1.00% | 0.25% | 9.00% | 0.25% | 0.25% | 40% | 51% | 41% | 53% | 46% | 60% | 37% | 48% | 46% | 60% | 42% | 42% | 43% | 43% |
| 7074 | 9.00% | 0.25% | 9.00% | 0.25% | 0.25% | 36% | 46% | 39% | 51% | 41% | 53% | 34% | 44% | 43% | 56% | 39% | 39% | 39% | 39% |
| 7075 | 0.00% | 1.00% | 9.00% | 0.25% | 0.25% | 42% | 55% | 47% | 61% | 45% | 59% | 40% | 52% | 51% | 66% | 45% | 45% | 45% | 45% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7076 | 0.25% | 1.00% | 9.00% | 0.25% | 0.25% | 44% | 57% | 48% | 62% | 47% | 61% | 41% | 53% | 52% | 68% | 46% | 46% | 47% | 47% |
| 7077 | 9.00% | 1.00% | 9.00% | 0.25% | 0.25% | 42% | 55% | 47% | 61% | 45% | 59% | 40% | 52% | 51% | 66% | 45% | 45% | 45% | 45% |
| 7078 | 1.00% | 9.00% | 9.00% | 0.25% | 0.25% | 57% | 74% | 62% | 81% | 58% | 75% | 53% | 69% | 68% | 88% | 59% | 59% | 60% | 60% |
| 7079 | 0.25% | 0.00% | 0.00% | 1.00% | 0.25% | 28% | 36% | 29% | 38% | 26% | 34% | 26% | 34% | 30% | 39% | 28% | 28% | 27% | 27% |
| 7080 | 1.00% | 0.25% | 0.00% | 1.00% | 0.25% | 35% | 45% | 34% | 44% | 32% | 42% | 31% | 40% | 35% | 46% | 34% | 34% | 33% | 33% |
| 7081 | 0.00% | 1.00% | 0.00% | 1.00% | 0.25% | 37% | 48% | 40% | 52% | 31% | 40% | 34% | 44% | 40% | 52% | 36% | 36% | 35% | 35% |
| 7082 | 0.25% | 1.00% | 0.00% | 1.00% | 0.25% | 39% | 51% | 41% | 53% | 33% | 43% | 35% | 46% | 41% | 53% | 38% | 38% | 36% | 36% |
| 7083 | 1.00% | 1.00% | 0.00% | 1.00% | 0.25% | 41% | 53% | 42% | 55% | 36% | 47% | 37% | 48% | 43% | 56% | 40% | 40% | 39% | 39% |
| 7084 | 0.00% | 0.00% | 0.25% | 1.00% | 0.25% | 31% | 40% | 32% | 42% | 31% | 40% | 32% | 42% | 36% | 47% | 31% | 31% | 33% | 33% |
| 7085 | 1.00% | 0.00% | 0.25% | 1.00% | 0.25% | 35% | 46% | 34% | 44% | 36% | 47% | 35% | 46% | 39% | 51% | 35% | 35% | 37% | 37% |
| 7086 | 0.25% | 0.25% | 0.25% | 1.00% | 0.25% | 38% | 49% | 37% | 48% | 36% | 47% | 36% | 47% | 40% | 52% | 37% | 37% | 37% | 37% |
| 7087 | 1.00% | 0.25% | 0.25% | 1.00% | 0.25% | 40% | 51% | 38% | 49% | 39% | 51% | 38% | 49% | 42% | 55% | 39% | 39% | 40% | 40% |
| 7088 | 9.00% | 0.25% | 0.25% | 1.00% | 0.25% | 36% | 46% | 36% | 47% | 34% | 44% | 35% | 46% | 39% | 51% | 35% | 35% | 36% | 36% |
| 7089 | 0.00% | 1.00% | 0.25% | 1.00% | 0.25% | 42% | 55% | 44% | 57% | 38% | 49% | 41% | 53% | 47% | 61% | 41% | 41% | 42% | 42% |
| 7090 | 0.25% | 1.00% | 0.25% | 1.00% | 0.25% | 44% | 57% | 45% | 59% | 40% | 52% | 42% | 55% | 48% | 62% | 43% | 43% | 43% | 43% |
| 7091 | 1.00% | 1.00% | 0.25% | 1.00% | 0.25% | 46% | 60% | 46% | 60% | 43% | 56% | 44% | 57% | 50% | 65% | 45% | 45% | 46% | 46% |
| 7092 | 9.00% | 1.00% | 0.25% | 1.00% | 0.25% | 42% | 55% | 44% | 57% | 38% | 49% | 41% | 53% | 47% | 61% | 41% | 41% | 42% | 42% |
| 7093 | 0.25% | 9.00% | 0.25% | 1.00% | 0.25% | 55% | 72% | 58% | 75% | 48% | 62% | 52% | 68% | 62% | 81% | 54% | 54% | 54% | 54% |
| 7094 | 1.00% | 9.00% | 0.25% | 1.00% | 0.25% | 57% | 74% | 59% | 77% | 51% | 66% | 54% | 70% | 64% | 83% | 56% | 56% | 56% | 56% |
| 7095 | 9.00% | 9.00% | 0.25% | 1.00% | 0.25% | 53% | 69% | 57% | 74% | 46% | 60% | 51% | 66% | 61% | 79% | 52% | 52% | 53% | 53% |
| 7096 | 0.00% | 0.00% | 1.00% | 1.00% | 0.25% | 36% | 47% | 39% | 51% | 36% | 47% | 34% | 44% | 41% | 53% | 37% | 37% | 37% | 37% |
| 7097 | 0.25% | 0.00% | 1.00% | 1.00% | 0.25% | 38% | 49% | 40% | 52% | 38% | 49% | 35% | 46% | 42% | 55% | 39% | 39% | 38% | 38% |
| 7098 | 1.00% | 0.00% | 1.00% | 1.00% | 0.25% | 40% | 52% | 41% | 53% | 41% | 53% | 37% | 48% | 44% | 57% | 41% | 41% | 41% | 41% |
| 7099 | 0.00% | 0.25% | 1.00% | 1.00% | 0.25% | 41% | 53% | 43% | 56% | 39% | 51% | 37% | 48% | 44% | 57% | 41% | 41% | 40% | 40% |
| 7100 | 1.00% | 0.25% | 1.00% | 1.00% | 0.25% | 45% | 58% | 45% | 59% | 44% | 57% | 40% | 52% | 47% | 61% | 45% | 45% | 44% | 44% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7101 | 9.00% | 0.25% | 1.00% | 1.00% | 0.25% | 41% | 53% | 43% | 56% | 39% | 51% | 37% | 48% | 44% | 57% | 41% | 41% | 40% | 40% |
| 7102 | 0.00% | 1.00% | 1.00% | 1.00% | 0.25% | 47% | 61% | 51% | 66% | 43% | 56% | 43% | 56% | 52% | 68% | 47% | 47% | 46% | 46% |
| 7103 | 0.25% | 1.00% | 1.00% | 1.00% | 0.25% | 49% | 64% | 52% | 68% | 45% | 59% | 44% | 57% | 53% | 69% | 49% | 49% | 47% | 47% |
| 7104 | 1.00% | 1.00% | 1.00% | 1.00% | 0.25% | 51% | 66% | 53% | 69% | 48% | 62% | 46% | 60% | 55% | 72% | 51% | 51% | 50% | 50% |
| 7105 | 9.00% | 1.00% | 1.00% | 1.00% | 0.25% | 47% | 61% | 51% | 66% | 43% | 56% | 43% | 56% | 52% | 68% | 47% | 47% | 46% | 46% |
| 7106 | 0.00% | 9.00% | 1.00% | 1.00% | 0.25% | 58% | 75% | 64% | 83% | 51% | 66% | 53% | 69% | 66% | 86% | 58% | 58% | 57% | 57% |
| 7107 | 0.25% | 9.00% | 1.00% | 1.00% | 0.25% | 60% | 78% | 65% | 85% | 53% | 69% | 54% | 70% | 67% | 87% | 59% | 59% | 58% | 58% |
| 7108 | 1.00% | 9.00% | 1.00% | 1.00% | 0.25% | 62% | 81% | 66% | 86% | 56% | 73% | 56% | 73% | 69% | 90% | 61% | 61% | 60% | 60% |
| 7109 | 0.25% | 0.25% | 9.00% | 1.00% | 0.25% | 53% | 68% | 52% | 68% | 55% | 72% | 45% | 59% | 59% | 77% | 53% | 53% | 53% | 53% |
| 7110 | 1.00% | 0.25% | 9.00% | 1.00% | 0.25% | 55% | 71% | 53% | 69% | 58% | 75% | 47% | 61% | 61% | 79% | 55% | 55% | 55% | 55% |
| 7111 | 9.00% | 0.25% | 9.00% | 1.00% | 0.25% | 51% | 66% | 51% | 66% | 53% | 69% | 44% | 57% | 58% | 75% | 52% | 52% | 52% | 52% |
| 7112 | 0.25% | 1.00% | 9.00% | 1.00% | 0.25% | 59% | 77% | 60% | 78% | 59% | 77% | 51% | 66% | 67% | 87% | 59% | 59% | 59% | 59% |
| 7113 | 0.00% | 0.25% | 0.00% | 9.00% | 0.25% | 51% | 66% | 46% | 60% | 45% | 59% | 48% | 62% | 45% | 59% | 47% | 47% | 46% | 46% |
| 7114 | 0.00% | 0.00% | 0.25% | 9.00% | 0.25% | 51% | 66% | 46% | 60% | 49% | 64% | 52% | 68% | 49% | 64% | 49% | 49% | 50% | 50% |
| 7115 | 0.25% | 0.00% | 0.25% | 9.00% | 0.25% | 53% | 69% | 47% | 61% | 51% | 66% | 53% | 69% | 50% | 65% | 50% | 50% | 51% | 51% |
| 7116 | 0.00% | 0.25% | 0.25% | 9.00% | 0.25% | 56% | 72% | 50% | 65% | 52% | 68% | 55% | 72% | 52% | 68% | 53% | 53% | 53% | 53% |
| 7117 | 0.25% | 0.25% | 0.25% | 9.00% | 0.25% | 58% | 75% | 51% | 66% | 54% | 70% | 56% | 73% | 53% | 69% | 54% | 54% | 54% | 54% |
| 7118 | 1.00% | 0.25% | 0.25% | 9.00% | 0.25% | 60% | 77% | 52% | 68% | 57% | 74% | 58% | 75% | 55% | 72% | 56% | 56% | 57% | 57% |
| 7119 | 9.00% | 0.25% | 0.25% | 9.00% | 0.25% | 56% | 72% | 50% | 65% | 52% | 68% | 55% | 72% | 52% | 68% | 53% | 53% | 53% | 53% |
| 7120 | 0.00% | 1.00% | 0.25% | 9.00% | 0.25% | 62% | 81% | 58% | 75% | 56% | 73% | 61% | 79% | 60% | 78% | 59% | 59% | 59% | 59% |
| 7121 | 0.25% | 1.00% | 0.25% | 9.00% | 0.25% | 64% | 83% | 59% | 77% | 58% | 75% | 62% | 81% | 61% | 79% | 60% | 60% | 60% | 60% |
| 7122 | 1.00% | 1.00% | 0.25% | 9.00% | 0.25% | 66% | 86% | 60% | 78% | 61% | 79% | 64% | 83% | 63% | 82% | 62% | 62% | 63% | 63% |
| 7123 | 0.25% | 9.00% | 0.25% | 9.00% | 0.25% | 75% | 98% | 72% | 94% | 66% | 86% | 72% | 94% | 75% | 98% | 71% | 71% | 71% | 71% |
| 7124 | 0.25% | 0.00% | 1.00% | 9.00% | 0.25% | 58% | 75% | 54% | 70% | 56% | 73% | 55% | 72% | 55% | 72% | 56% | 56% | 55% | 55% |
| 7125 | 1.00% | 0.25% | 1.00% | 9.00% | 0.25% | 65% | 84% | 59% | 77% | 62% | 81% | 60% | 78% | 60% | 78% | 62% | 62% | 61% | 61% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7126 | 9.00% | 0.25% | 1.00% | 9.00% | 0.25% | 61% | 79% | 57% | 74% | 57% | 74% | 57% | 74% | 57% | 74% | 58% | 58% | 57% | 57% |
| 7127 | 0.00% | 1.00% | 1.00% | 9.00% | 0.25% | 67% | 87% | 65% | 85% | 61% | 79% | 63% | 82% | 65% | 85% | 64% | 64% | 63% | 63% |
| 7128 | 0.25% | 1.00% | 1.00% | 9.00% | 0.25% | 69% | 90% | 66% | 86% | 63% | 82% | 64% | 83% | 66% | 86% | 66% | 66% | 64% | 64% |
| 7129 | 1.00% | 1.00% | 1.00% | 9.00% | 0.25% | 71% | 92% | 67% | 87% | 66% | 86% | 66% | 86% | 68% | 88% | 68% | 68% | 67% | 67% |
| 7130 | 0.25% | 0.25% | 9.00% | 9.00% | 0.25% | 73% | 94% | 66% | 86% | 73% | 95% | 65% | 85% | 72% | 94% | 71% | 71% | 70% | 70% |
| 7131 | 0.25% | 0.25% | 0.00% | 0.00% | 1.00% | 18% | 23% | 18% | 23% | 16% | 21% | 14% | 18% | 22% | 29% | 17% | 17% | 17% | 17% |
| 7132 | 1.00% | 0.25% | 0.00% | 0.00% | 1.00% | 20% | 25% | 19% | 25% | 19% | 25% | 16% | 21% | 24% | 31% | 19% | 19% | 20% | 20% |
| 7133 | 0.25% | 1.00% | 0.00% | 0.00% | 1.00% | 24% | 31% | 26% | 34% | 20% | 26% | 20% | 26% | 30% | 39% | 23% | 23% | 23% | 23% |
| 7134 | 1.00% | 1.00% | 0.00% | 0.00% | 1.00% | 26% | 34% | 27% | 35% | 23% | 30% | 22% | 29% | 32% | 42% | 25% | 25% | 26% | 26% |
| 7135 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 7136 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 7137 | 0.00% | 0.25% | 0.25% | 0.00% | 1.00% | 21% | 27% | 21% | 27% | 21% | 27% | 20% | 26% | 28% | 36% | 21% | 21% | 23% | 23% |
| 7138 | 0.25% | 0.25% | 0.25% | 0.00% | 1.00% | 23% | 29% | 22% | 29% | 23% | 30% | 21% | 27% | 29% | 38% | 23% | 23% | 24% | 24% |
| 7139 | 0.00% | 1.00% | 0.25% | 0.00% | 1.00% | 27% | 35% | 29% | 38% | 25% | 33% | 26% | 34% | 36% | 47% | 27% | 27% | 29% | 29% |
| 7140 | 1.00% | 1.00% | 0.25% | 0.00% | 1.00% | 31% | 40% | 31% | 40% | 30% | 39% | 29% | 38% | 39% | 51% | 31% | 31% | 33% | 33% |
| 7141 | 1.00% | 9.00% | 0.25% | 0.00% | 1.00% | 42% | 55% | 44% | 57% | 38% | 49% | 39% | 51% | 53% | 69% | 41% | 41% | 43% | 43% |
| 7142 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 7143 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 7144 | 0.00% | 0.25% | 1.00% | 0.00% | 1.00% | 26% | 33% | 28% | 36% | 26% | 34% | 22% | 29% | 33% | 43% | 27% | 27% | 27% | 27% |
| 7145 | 1.00% | 0.25% | 1.00% | 0.00% | 1.00% | 30% | 38% | 30% | 39% | 31% | 40% | 25% | 33% | 36% | 47% | 30% | 30% | 31% | 31% |
| 7146 | 0.00% | 1.00% | 1.00% | 0.00% | 1.00% | 32% | 42% | 36% | 47% | 30% | 39% | 28% | 36% | 41% | 53% | 33% | 33% | 33% | 33% |
| 7147 | 0.25% | 1.00% | 1.00% | 0.00% | 1.00% | 34% | 44% | 37% | 48% | 32% | 42% | 29% | 38% | 42% | 55% | 34% | 34% | 34% | 34% |
| 7148 | 1.00% | 1.00% | 1.00% | 0.00% | 1.00% | 36% | 47% | 38% | 49% | 35% | 46% | 31% | 40% | 44% | 57% | 36% | 36% | 37% | 37% |
| 7149 | 9.00% | 1.00% | 1.00% | 0.00% | 1.00% | 32% | 42% | 36% | 47% | 30% | 39% | 28% | 36% | 41% | 53% | 33% | 33% | 33% | 33% |
| 7150 | 1.00% | 9.00% | 1.00% | 0.00% | 1.00% | 47% | 61% | 51% | 66% | 43% | 56% | 41% | 53% | 58% | 75% | 47% | 47% | 47% | 47% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7151 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 7152 | 0.00% | 0.25% | 9.00% | 0.00% | 1.00% | 36% | 46% | 36% | 47% | 40% | 52% | 29% | 38% | 47% | 61% | 37% | 37% | 39% | 39% |
| 7153 | 0.25% | 0.25% | 9.00% | 0.00% | 1.00% | 38% | 49% | 37% | 48% | 42% | 55% | 30% | 39% | 48% | 62% | 39% | 39% | 40% | 40% |
| 7154 | 1.00% | 0.25% | 9.00% | 0.00% | 1.00% | 40% | 51% | 38% | 49% | 45% | 59% | 32% | 42% | 50% | 65% | 41% | 41% | 42% | 42% |
| 7155 | 0.25% | 1.00% | 9.00% | 0.00% | 1.00% | 44% | 57% | 45% | 59% | 46% | 60% | 36% | 47% | 56% | 73% | 45% | 45% | 46% | 46% |
| 7156 | 0.25% | 0.00% | 0.00% | 0.25% | 1.00% | 18% | 23% | 23% | 30% | 19% | 25% | 21% | 27% | 26% | 34% | 20% | 20% | 22% | 22% |
| 7157 | 1.00% | 0.00% | 0.00% | 0.25% | 1.00% | 20% | 26% | 24% | 31% | 22% | 29% | 23% | 30% | 28% | 36% | 22% | 22% | 24% | 24% |
| 7158 | 0.00% | 0.25% | 0.00% | 0.25% | 1.00% | 21% | 27% | 26% | 34% | 20% | 26% | 23% | 30% | 28% | 36% | 22% | 22% | 24% | 24% |
| 7159 | 0.25% | 0.25% | 0.00% | 0.25% | 1.00% | 23% | 29% | 27% | 35% | 22% | 29% | 24% | 31% | 29% | 38% | 24% | 24% | 25% | 25% |
| 7160 | 9.00% | 0.25% | 0.00% | 0.25% | 1.00% | 21% | 27% | 26% | 34% | 20% | 26% | 23% | 30% | 28% | 36% | 22% | 22% | 24% | 24% |
| 7161 | 1.00% | 1.00% | 0.00% | 0.25% | 1.00% | 31% | 40% | 36% | 47% | 29% | 38% | 32% | 42% | 39% | 51% | 32% | 32% | 33% | 33% |
| 7162 | 1.00% | 9.00% | 0.00% | 0.25% | 1.00% | 42% | 55% | 49% | 64% | 37% | 48% | 42% | 55% | 53% | 69% | 43% | 43% | 44% | 44% |
| 7163 | 0.00% | 0.00% | 0.25% | 0.25% | 1.00% | 21% | 27% | 26% | 34% | 24% | 31% | 27% | 35% | 32% | 42% | 24% | 24% | 28% | 28% |
| 7164 | 0.25% | 0.00% | 0.25% | 0.25% | 1.00% | 23% | 30% | 27% | 35% | 26% | 34% | 28% | 36% | 33% | 43% | 25% | 25% | 29% | 29% |
| 7165 | 0.00% | 0.25% | 0.25% | 0.25% | 1.00% | 26% | 33% | 30% | 39% | 27% | 35% | 30% | 39% | 35% | 46% | 28% | 28% | 31% | 31% |
| 7166 | 0.25% | 0.25% | 0.25% | 0.25% | 1.00% | 28% | 36% | 31% | 40% | 29% | 38% | 31% | 40% | 36% | 47% | 29% | 29% | 32% | 32% |
| 7167 | 1.00% | 0.25% | 0.25% | 0.25% | 1.00% | 30% | 38% | 32% | 42% | 32% | 42% | 33% | 43% | 38% | 49% | 31% | 31% | 34% | 34% |
| 7168 | 9.00% | 0.25% | 0.25% | 0.25% | 1.00% | 26% | 33% | 30% | 39% | 27% | 35% | 30% | 39% | 35% | 46% | 28% | 28% | 31% | 31% |
| 7169 | 0.25% | 1.00% | 0.25% | 0.25% | 1.00% | 34% | 44% | 39% | 51% | 33% | 43% | 37% | 48% | 44% | 57% | 35% | 35% | 38% | 38% |
| 7170 | 9.00% | 1.00% | 0.25% | 0.25% | 1.00% | 32% | 42% | 38% | 49% | 31% | 40% | 36% | 47% | 43% | 56% | 34% | 34% | 37% | 37% |
| 7171 | 0.25% | 9.00% | 0.25% | 0.25% | 1.00% | 45% | 59% | 52% | 68% | 41% | 53% | 47% | 61% | 58% | 75% | 46% | 46% | 49% | 49% |
| 7172 | 1.00% | 9.00% | 0.25% | 0.25% | 1.00% | 47% | 61% | 53% | 69% | 44% | 57% | 49% | 64% | 60% | 78% | 48% | 48% | 51% | 51% |
| 7173 | 9.00% | 9.00% | 0.25% | 0.25% | 1.00% | 43% | 56% | 51% | 66% | 39% | 51% | 46% | 60% | 57% | 74% | 44% | 44% | 47% | 47% |
| 7174 | 0.00% | 0.00% | 1.00% | 0.25% | 1.00% | 26% | 34% | 33% | 43% | 29% | 38% | 29% | 38% | 37% | 48% | 29% | 29% | 32% | 32% |
| 7175 | 1.00% | 0.00% | 1.00% | 0.25% | 1.00% | 30% | 39% | 35% | 46% | 34% | 44% | 32% | 42% | 40% | 52% | 33% | 33% | 35% | 35% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7176 | 0.00% | 0.25% | 1.00% | 0.25% | 1.00% | 31% | 40% | 37% | 48% | 32% | 42% | 32% | 42% | 40% | 52% | 33% | 33% | 35% | 35% |
| 7177 | 0.25% | 0.25% | 1.00% | 0.25% | 1.00% | 33% | 42% | 38% | 49% | 34% | 44% | 33% | 43% | 41% | 53% | 35% | 35% | 36% | 36% |
| 7178 | 1.00% | 0.25% | 1.00% | 0.25% | 1.00% | 35% | 45% | 39% | 51% | 37% | 48% | 35% | 46% | 43% | 56% | 37% | 37% | 38% | 38% |
| 7179 | 9.00% | 0.25% | 1.00% | 0.25% | 1.00% | 31% | 40% | 37% | 48% | 32% | 42% | 32% | 42% | 40% | 52% | 33% | 33% | 35% | 35% |
| 7180 | 0.00% | 1.00% | 1.00% | 0.25% | 1.00% | 37% | 48% | 45% | 59% | 36% | 47% | 38% | 49% | 48% | 62% | 39% | 39% | 41% | 41% |
| 7181 | 0.25% | 1.00% | 1.00% | 0.25% | 1.00% | 39% | 51% | 46% | 60% | 38% | 49% | 39% | 51% | 49% | 64% | 41% | 41% | 42% | 42% |
| 7182 | 1.00% | 1.00% | 1.00% | 0.25% | 1.00% | 41% | 53% | 47% | 61% | 41% | 53% | 41% | 53% | 51% | 66% | 43% | 43% | 44% | 44% |
| 7183 | 9.00% | 1.00% | 1.00% | 0.25% | 1.00% | 37% | 48% | 45% | 59% | 36% | 47% | 38% | 49% | 48% | 62% | 39% | 39% | 41% | 41% |
| 7184 | 0.00% | 9.00% | 1.00% | 0.25% | 1.00% | 48% | 62% | 58% | 75% | 44% | 57% | 48% | 62% | 62% | 81% | 50% | 50% | 51% | 51% |
| 7185 | 0.25% | 9.00% | 1.00% | 0.25% | 1.00% | 50% | 65% | 59% | 77% | 46% | 60% | 49% | 64% | 63% | 82% | 52% | 52% | 53% | 53% |
| 7186 | 1.00% | 9.00% | 1.00% | 0.25% | 1.00% | 52% | 68% | 60% | 78% | 49% | 64% | 51% | 66% | 65% | 85% | 54% | 54% | 55% | 55% |
| 7187 | 0.25% | 0.25% | 9.00% | 0.25% | 1.00% | 43% | 55% | 46% | 60% | 48% | 62% | 40% | 52% | 55% | 72% | 46% | 46% | 48% | 48% |
| 7188 | 1.00% | 0.25% | 9.00% | 0.25% | 1.00% | 45% | 58% | 47% | 61% | 51% | 66% | 42% | 55% | 57% | 74% | 48% | 48% | 50% | 50% |
| 7189 | 9.00% | 0.25% | 9.00% | 0.25% | 1.00% | 41% | 53% | 45% | 59% | 46% | 60% | 39% | 51% | 54% | 70% | 44% | 44% | 46% | 46% |
| 7190 | 0.00% | 1.00% | 9.00% | 0.25% | 1.00% | 47% | 61% | 53% | 69% | 50% | 65% | 45% | 59% | 62% | 81% | 50% | 50% | 52% | 52% |
| 7191 | 0.25% | 1.00% | 9.00% | 0.25% | 1.00% | 49% | 64% | 54% | 70% | 52% | 68% | 46% | 60% | 63% | 82% | 52% | 52% | 54% | 54% |
| 7192 | 9.00% | 1.00% | 9.00% | 0.25% | 1.00% | 47% | 61% | 53% | 69% | 50% | 65% | 45% | 59% | 62% | 81% | 50% | 50% | 52% | 52% |
| 7193 | 1.00% | 9.00% | 9.00% | 0.25% | 1.00% | 62% | 81% | 68% | 88% | 63% | 82% | 58% | 75% | 79% | 100 % | 64% | 64% | 67% | 67% |
| 7194 | 0.25% | 0.00% | 0.00% | 1.00% | 1.00% | 33% | 43% | 35% | 46% | 31% | 40% | 31% | 40% | 41% | 53% | 33% | 33% | 34% | 34% |
| 7195 | 1.00% | 0.25% | 0.00% | 1.00% | 1.00% | 40% | 51% | 40% | 52% | 37% | 48% | 36% | 47% | 46% | 60% | 39% | 39% | 40% | 40% |
| 7196 | 0.00% | 1.00% | 0.00% | 1.00% | 1.00% | 42% | 55% | 46% | 60% | 36% | 47% | 39% | 51% | 51% | 66% | 41% | 41% | 42% | 42% |
| 7197 | 0.25% | 1.00% | 0.00% | 1.00% | 1.00% | 44% | 57% | 47% | 61% | 38% | 49% | 40% | 52% | 52% | 68% | 43% | 43% | 43% | 43% |
| 7198 | 1.00% | 1.00% | 0.00% | 1.00% | 1.00% | 46% | 60% | 48% | 62% | 41% | 53% | 42% | 55% | 54% | 70% | 45% | 45% | 46% | 46% |
| 7199 | 0.00% | 0.00% | 0.25% | 1.00% | 1.00% | 36% | 47% | 38% | 49% | 36% | 47% | 37% | 48% | 47% | 61% | 37% | 37% | 40% | 40% |
| 7200 | 1.00% | 0.00% | 0.25% | 1.00% | 1.00% | 40% | 52% | 40% | 52% | 41% | 53% | 40% | 52% | 50% | 65% | 40% | 40% | 44% | 44% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7201 | 0.25% | 0.25% | 0.25% | 1.00% | 1.00% | 43% | 55% | 43% | 56% | 41% | 53% | 41% | 53% | 51% | 66% | 42% | 42% | 44% | 44% |
| 7202 | 1.00% | 0.25% | 0.25% | 1.00% | 1.00% | 45% | 58% | 44% | 57% | 44% | 57% | 43% | 56% | 53% | 69% | 44% | 44% | 47% | 47% |
| 7203 | 9.00% | 0.25% | 0.25% | 1.00% | 1.00% | 41% | 53% | 42% | 55% | 39% | 51% | 40% | 52% | 50% | 65% | 41% | 41% | 43% | 43% |
| 7204 | 0.00% | 1.00% | 0.25% | 1.00% | 1.00% | 47% | 61% | 50% | 65% | 43% | 56% | 46% | 60% | 58% | 75% | 47% | 47% | 49% | 49% |
| 7205 | 0.25% | 1.00% | 0.25% | 1.00% | 1.00% | 49% | 64% | 51% | 66% | 45% | 59% | 47% | 61% | 59% | 77% | 48% | 48% | 50% | 50% |
| 7206 | 1.00% | 1.00% | 0.25% | 1.00% | 1.00% | 51% | 66% | 52% | 68% | 48% | 62% | 49% | 64% | 61% | 79% | 50% | 50% | 53% | 53% |
| 7207 | 9.00% | 1.00% | 0.25% | 1.00% | 1.00% | 47% | 61% | 50% | 65% | 43% | 56% | 46% | 60% | 58% | 75% | 47% | 47% | 49% | 49% |
| 7208 | 0.25% | 9.00% | 0.25% | 1.00% | 1.00% | 60% | 78% | 64% | 83% | 53% | 69% | 57% | 74% | 73% | 95% | 59% | 59% | 61% | 61% |
| 7209 | 1.00% | 9.00% | 0.25% | 1.00% | 1.00% | 62% | 81% | 65% | 85% | 56% | 73% | 59% | 77% | 75% | 98% | 61% | 61% | 63% | 63% |
| 7210 | 9.00% | 9.00% | 0.25% | 1.00% | 1.00% | 58% | 75% | 63% | 82% | 51% | 66% | 56% | 73% | 72% | 94% | 57% | 57% | 60% | 60% |
| 7211 | 0.00% | 0.00% | 1.00% | 1.00% | 1.00% | 41% | 53% | 45% | 59% | 41% | 53% | 39% | 51% | 52% | 68% | 42% | 42% | 44% | 44% |
| 7212 | 0.25% | 0.00% | 1.00% | 1.00% | 1.00% | 43% | 56% | 46% | 60% | 43% | 56% | 40% | 52% | 53% | 69% | 44% | 44% | 45% | 45% |
| 7213 | 1.00% | 0.00% | 1.00% | 1.00% | 1.00% | 45% | 59% | 47% | 61% | 46% | 60% | 42% | 55% | 55% | 72% | 46% | 46% | 48% | 48% |
| 7214 | 0.00% | 0.25% | 1.00% | 1.00% | 1.00% | 46% | 59% | 49% | 64% | 44% | 57% | 42% | 55% | 55% | 72% | 46% | 46% | 47% | 47% |
| 7215 | 1.00% | 0.25% | 1.00% | 1.00% | 1.00% | 50% | 64% | 51% | 66% | 49% | 64% | 45% | 59% | 58% | 75% | 50% | 50% | 51% | 51% |
| 7216 | 9.00% | 0.25% | 1.00% | 1.00% | 1.00% | 46% | 59% | 49% | 64% | 44% | 57% | 42% | 55% | 55% | 72% | 46% | 46% | 47% | 47% |
| 7217 | 0.00% | 1.00% | 1.00% | 1.00% | 1.00% | 52% | 68% | 57% | 74% | 48% | 62% | 48% | 62% | 63% | 82% | 52% | 52% | 53% | 53% |
| 7218 | 0.25% | 1.00% | 1.00% | 1.00% | 1.00% | 54% | 70% | 58% | 75% | 50% | 65% | 49% | 64% | 64% | 83% | 54% | 54% | 54% | 54% |
| 7219 | 1.00% | 1.00% | 1.00% | 1.00% | 1.00% | 56% | 73% | 59% | 77% | 53% | 69% | 51% | 66% | 66% | 86% | 56% | 56% | 57% | 57% |
| 7220 | 9.00% | 1.00% | 1.00% | 1.00% | 1.00% | 52% | 68% | 57% | 74% | 48% | 62% | 48% | 62% | 63% | 82% | 52% | 52% | 53% | 53% |
| 7221 | 0.00% | 9.00% | 1.00% | 1.00% | 1.00% | 63% | 82% | 70% | 91% | 56% | 73% | 58% | 75% | 77% | 100 % | 63% | 63% | 64% | 64% |
| 7222 | 0.25% | 9.00% | 1.00% | 1.00% | 1.00% | 65% | 85% | 71% | 92% | 58% | 75% | 59% | 77% | 78% | 100 % | 65% | 65% | 65% | 65% |
| 7223 | 1.00% | 9.00% | 1.00% | 1.00% | 1.00% | 67% | 87% | 72% | 94% | 61% | 79% | 61% | 79% | 80% | 100 % | 67% | 67% | 67% | 67% |
| 7224 | 0.25% | 0.25% | 9.00% | 1.00% | 1.00% | 58% | 75% | 58% | 75% | 60% | 78% | 50% | 65% | 70% | 91% | 59% | 59% | 60% | 60% |
| 7225 | 1.00% | 0.25% | 9.00% | 1.00% | 1.00% | 60% | 77% | 59% | 77% | 63% | 82% | 52% | 68% | 72% | 94% | 61% | 61% | 62% | 62% |

Fig. 26

| Formula # | Gamma Dodecalactone | Apritone | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7226 | 9.00% | 0.25% | 9.00% | 1.00% | 1.00% | 56% | 72% | 57% | 74% | 58% | 75% | 49% | 64% | 69% | 90% | 57% | 57% | 59% | 59% |
| 7227 | 0.25% | 1.00% | 9.00% | 1.00% | 1.00% | 64% | 83% | 66% | 86% | 64% | 83% | 56% | 73% | 78% | 100% | 65% | 65% | 66% | 66% |
| 7228 | 0.00% | 0.25% | 0.00% | 9.00% | 1.00% | 56% | 72% | 52% | 68% | 50% | 65% | 53% | 69% | 56% | 73% | 53% | 53% | 53% | 53% |
| 7229 | 0.00% | 0.00% | 0.25% | 9.00% | 1.00% | 56% | 73% | 52% | 68% | 54% | 70% | 57% | 74% | 60% | 78% | 54% | 54% | 57% | 57% |
| 7230 | 0.25% | 0.00% | 0.25% | 9.00% | 1.00% | 58% | 75% | 53% | 69% | 56% | 73% | 58% | 75% | 61% | 79% | 56% | 56% | 58% | 58% |
| 7231 | 0.00% | 0.25% | 0.25% | 9.00% | 1.00% | 61% | 79% | 56% | 73% | 57% | 74% | 60% | 78% | 63% | 82% | 58% | 58% | 60% | 60% |
| 7232 | 0.25% | 0.25% | 0.25% | 9.00% | 1.00% | 63% | 81% | 57% | 74% | 59% | 77% | 61% | 79% | 64% | 83% | 60% | 60% | 61% | 61% |
| 7233 | 1.00% | 0.25% | 0.25% | 9.00% | 1.00% | 65% | 84% | 58% | 75% | 62% | 81% | 63% | 82% | 66% | 86% | 62% | 62% | 64% | 64% |
| 7234 | 9.00% | 0.25% | 0.25% | 9.00% | 1.00% | 61% | 79% | 56% | 73% | 57% | 74% | 60% | 78% | 63% | 82% | 58% | 58% | 60% | 60% |
| 7235 | 0.00% | 1.00% | 0.25% | 9.00% | 1.00% | 67% | 87% | 64% | 83% | 61% | 79% | 66% | 86% | 71% | 92% | 64% | 64% | 66% | 66% |
| 7236 | 0.25% | 1.00% | 0.25% | 9.00% | 1.00% | 69% | 90% | 65% | 85% | 63% | 82% | 67% | 87% | 72% | 94% | 66% | 66% | 67% | 67% |
| 7237 | 1.00% | 1.00% | 0.25% | 9.00% | 1.00% | 71% | 92% | 66% | 86% | 66% | 86% | 69% | 90% | 74% | 96% | 68% | 68% | 70% | 70% |
| 7238 | 0.25% | 9.00% | 0.25% | 9.00% | 1.00% | 80% | 100% | 78% | 100% | 71% | 92% | 77% | 100% | 86% | 100% | 76% | 76% | 78% | 78% |
| 7239 | 0.25% | 0.00% | 1.00% | 9.00% | 1.00% | 63% | 82% | 60% | 78% | 61% | 79% | 60% | 78% | 66% | 86% | 61% | 61% | 62% | 62% |
| 7240 | 1.00% | 0.25% | 1.00% | 9.00% | 1.00% | 70% | 90% | 65% | 85% | 67% | 87% | 65% | 85% | 71% | 92% | 67% | 67% | 68% | 68% |
| 7241 | 9.00% | 0.25% | 1.00% | 9.00% | 1.00% | 66% | 85% | 63% | 82% | 62% | 81% | 62% | 81% | 68% | 88% | 64% | 64% | 64% | 64% |
| 7242 | 0.00% | 1.00% | 1.00% | 9.00% | 1.00% | 72% | 94% | 71% | 92% | 66% | 86% | 68% | 88% | 76% | 99% | 70% | 70% | 70% | 70% |
| 7243 | 0.25% | 1.00% | 1.00% | 9.00% | 1.00% | 74% | 96% | 72% | 94% | 68% | 88% | 69% | 90% | 77% | 100% | 71% | 71% | 71% | 71% |
| 7244 | 1.00% | 1.00% | 1.00% | 9.00% | 1.00% | 76% | 99% | 73% | 95% | 71% | 92% | 71% | 92% | 79% | 100% | 73% | 73% | 74% | 74% |
| 7245 | 0.25% | 0.25% | 9.00% | 9.00% | 1.00% | 78% | 100% | 72% | 94% | 78% | 100% | 70% | 91% | 83% | 100% | 76% | 76% | 77% | 77% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7246 | 0.25% | 0.25% | 0.00% | 0.00% | 0.00% | 7% | 8% | 5% | 7% | 5% | 7% | 4% | 5% | 4% | 5% | 6% | 6% | 4% | 4% |
| 7247 | 1.00% | 0.25% | 0.00% | 0.00% | 0.00% | 9% | 11% | 6% | 8% | 8% | 10% | 6% | 8% | 6% | 8% | 8% | 8% | 7% | 7% |
| 7248 | 0.25% | 1.00% | 0.00% | 0.00% | 0.00% | 13% | 17% | 13% | 17% | 9% | 12% | 10% | 13% | 12% | 16% | 12% | 12% | 10% | 10% |
| 7249 | 1.00% | 1.00% | 0.00% | 0.00% | 0.00% | 15% | 20% | 14% | 18% | 12% | 16% | 12% | 16% | 14% | 18% | 14% | 14% | 13% | 13% |
| 7250 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 7251 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 7252 | 0.00% | 0.25% | 0.25% | 0.00% | 0.00% | 10% | 12% | 8% | 10% | 10% | 13% | 10% | 13% | 10% | 13% | 9% | 9% | 10% | 10% |
| 7253 | 0.25% | 0.25% | 0.25% | 0.00% | 0.00% | 12% | 15% | 9% | 12% | 12% | 16% | 11% | 14% | 11% | 14% | 11% | 11% | 11% | 11% |
| 7254 | 0.00% | 1.00% | 0.25% | 0.00% | 0.00% | 16% | 21% | 16% | 21% | 14% | 18% | 16% | 21% | 18% | 23% | 15% | 15% | 16% | 16% |
| 7255 | 1.00% | 1.00% | 0.25% | 0.00% | 0.00% | 20% | 26% | 18% | 23% | 19% | 25% | 19% | 25% | 21% | 27% | 19% | 19% | 20% | 20% |
| 7256 | 1.00% | 9.00% | 0.25% | 0.00% | 0.00% | 31% | 40% | 31% | 40% | 27% | 35% | 29% | 38% | 35% | 46% | 30% | 30% | 30% | 30% |
| 7257 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 7258 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 7259 | 0.00% | 0.25% | 1.00% | 0.00% | 0.00% | 15% | 19% | 15% | 20% | 15% | 20% | 12% | 16% | 15% | 20% | 15% | 15% | 14% | 14% |
| 7260 | 1.00% | 0.25% | 1.00% | 0.00% | 0.00% | 19% | 24% | 17% | 22% | 20% | 26% | 15% | 20% | 18% | 23% | 19% | 19% | 18% | 18% |
| 7261 | 0.00% | 1.00% | 1.00% | 0.00% | 0.00% | 21% | 27% | 23% | 30% | 19% | 25% | 18% | 23% | 23% | 30% | 21% | 21% | 20% | 20% |
| 7262 | 0.25% | 1.00% | 1.00% | 0.00% | 0.00% | 23% | 30% | 24% | 31% | 21% | 27% | 19% | 25% | 24% | 31% | 23% | 23% | 21% | 21% |
| 7263 | 1.00% | 1.00% | 1.00% | 0.00% | 0.00% | 25% | 33% | 25% | 33% | 24% | 31% | 21% | 27% | 26% | 34% | 25% | 25% | 24% | 24% |
| 7264 | 9.00% | 1.00% | 1.00% | 0.00% | 0.00% | 21% | 27% | 23% | 30% | 19% | 25% | 18% | 23% | 23% | 30% | 21% | 21% | 20% | 20% |
| 7265 | 1.00% | 9.00% | 1.00% | 0.00% | 0.00% | 36% | 47% | 38% | 49% | 32% | 42% | 31% | 40% | 40% | 52% | 35% | 35% | 34% | 34% |
| 7266 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 7267 | 0.00% | 0.25% | 9.00% | 0.00% | 0.00% | 25% | 32% | 23% | 30% | 29% | 38% | 19% | 25% | 29% | 38% | 26% | 26% | 26% | 26% |
| 7268 | 0.25% | 0.25% | 9.00% | 0.00% | 0.00% | 27% | 34% | 24% | 31% | 31% | 40% | 20% | 26% | 30% | 39% | 27% | 27% | 27% | 27% |
| 7269 | 1.00% | 0.25% | 9.00% | 0.00% | 0.00% | 29% | 37% | 25% | 33% | 34% | 44% | 22% | 29% | 32% | 42% | 29% | 29% | 29% | 29% |
| 7270 | 0.25% | 1.00% | 9.00% | 0.00% | 0.00% | 33% | 43% | 32% | 42% | 35% | 46% | 26% | 34% | 38% | 49% | 33% | 33% | 33% | 33% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7271 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 7272 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 7273 | 0.00% | 0.25% | 0.00% | 0.25% | 0.00% | 12% | 15% | 9% | 12% | 8% | 10% | 13% | 17% | 9% | 12% | 10% | 10% | 10% | 10% |
| 7274 | 0.25% | 0.25% | 0.00% | 0.25% | 0.00% | 14% | 18% | 10% | 13% | 10% | 13% | 14% | 18% | 10% | 13% | 11% | 11% | 11% | 11% |
| 7275 | 9.00% | 0.25% | 0.00% | 0.25% | 0.00% | 12% | 15% | 9% | 12% | 8% | 10% | 13% | 17% | 9% | 12% | 10% | 10% | 10% | 10% |
| 7276 | 1.00% | 1.00% | 0.00% | 0.25% | 0.00% | 22% | 29% | 19% | 25% | 17% | 22% | 22% | 29% | 20% | 26% | 19% | 19% | 20% | 20% |
| 7277 | 1.00% | 9.00% | 0.00% | 0.25% | 0.00% | 33% | 43% | 32% | 42% | 25% | 33% | 32% | 42% | 34% | 44% | 30% | 30% | 30% | 30% |
| 7278 | 0.00% | 0.00% | 0.25% | 0.25% | 0.00% | 12% | 16% | 9% | 12% | 12% | 16% | 17% | 22% | 13% | 17% | 11% | 11% | 14% | 14% |
| 7279 | 0.25% | 0.00% | 0.25% | 0.25% | 0.00% | 14% | 18% | 10% | 13% | 14% | 18% | 18% | 23% | 14% | 18% | 13% | 13% | 15% | 15% |
| 7280 | 0.00% | 0.25% | 0.25% | 0.25% | 0.00% | 17% | 21% | 13% | 17% | 15% | 20% | 20% | 26% | 16% | 21% | 15% | 15% | 17% | 17% |
| 7281 | 0.25% | 0.25% | 0.25% | 0.25% | 0.00% | 19% | 24% | 14% | 18% | 17% | 22% | 21% | 27% | 17% | 22% | 17% | 17% | 18% | 18% |
| 7282 | 1.00% | 0.25% | 0.25% | 0.25% | 0.00% | 21% | 27% | 15% | 20% | 20% | 26% | 23% | 30% | 19% | 25% | 19% | 19% | 21% | 21% |
| 7283 | 9.00% | 0.25% | 0.25% | 0.25% | 0.00% | 17% | 21% | 13% | 17% | 15% | 20% | 20% | 26% | 16% | 21% | 15% | 15% | 17% | 17% |
| 7284 | 0.25% | 1.00% | 0.25% | 0.25% | 0.00% | 25% | 33% | 22% | 29% | 21% | 27% | 27% | 35% | 25% | 33% | 23% | 23% | 24% | 24% |
| 7285 | 9.00% | 1.00% | 0.25% | 0.25% | 0.00% | 23% | 30% | 21% | 27% | 19% | 25% | 26% | 34% | 24% | 31% | 21% | 21% | 23% | 23% |
| 7286 | 0.25% | 9.00% | 0.25% | 0.25% | 0.00% | 36% | 47% | 35% | 46% | 29% | 38% | 37% | 48% | 39% | 51% | 33% | 33% | 35% | 35% |
| 7287 | 1.00% | 9.00% | 0.25% | 0.25% | 0.00% | 38% | 49% | 36% | 47% | 32% | 42% | 39% | 51% | 41% | 53% | 35% | 35% | 37% | 37% |
| 7288 | 9.00% | 9.00% | 0.25% | 0.25% | 0.00% | 34% | 44% | 34% | 44% | 27% | 35% | 36% | 47% | 38% | 49% | 32% | 32% | 34% | 34% |
| 7289 | 0.00% | 0.00% | 1.00% | 0.25% | 0.00% | 17% | 22% | 16% | 21% | 17% | 22% | 19% | 25% | 18% | 23% | 17% | 17% | 18% | 18% |
| 7290 | 1.00% | 0.00% | 1.00% | 0.25% | 0.00% | 21% | 27% | 18% | 23% | 22% | 29% | 22% | 29% | 21% | 27% | 20% | 20% | 22% | 22% |
| 7291 | 0.00% | 0.25% | 1.00% | 0.25% | 0.00% | 22% | 28% | 20% | 26% | 20% | 26% | 22% | 29% | 21% | 27% | 21% | 21% | 21% | 21% |
| 7292 | 0.25% | 0.25% | 1.00% | 0.25% | 0.00% | 24% | 31% | 21% | 27% | 22% | 29% | 23% | 30% | 22% | 29% | 22% | 22% | 22% | 22% |
| 7293 | 1.00% | 0.25% | 1.00% | 0.25% | 0.00% | 26% | 33% | 22% | 29% | 25% | 33% | 25% | 33% | 24% | 31% | 24% | 24% | 25% | 25% |
| 7294 | 9.00% | 0.25% | 1.00% | 0.25% | 0.00% | 22% | 28% | 20% | 26% | 20% | 26% | 22% | 29% | 21% | 27% | 21% | 21% | 21% | 21% |
| 7295 | 0.00% | 1.00% | 1.00% | 0.25% | 0.00% | 28% | 36% | 28% | 36% | 24% | 31% | 28% | 36% | 29% | 38% | 27% | 27% | 27% | 27% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7296 | 0.25% | 1.00% | 1.00% | 0.25% | 0.00% | 30% | 39% | 29% | 38% | 26% | 34% | 29% | 38% | 30% | 39% | 28% | 28% | 28% | 28% |
| 7297 | 1.00% | 1.00% | 1.00% | 0.25% | 0.00% | 32% | 42% | 30% | 39% | 29% | 38% | 31% | 40% | 32% | 42% | 30% | 30% | 31% | 31% |
| 7298 | 9.00% | 1.00% | 1.00% | 0.25% | 0.00% | 28% | 36% | 28% | 36% | 24% | 31% | 28% | 36% | 29% | 38% | 27% | 27% | 27% | 27% |
| 7299 | 0.00% | 9.00% | 1.00% | 0.25% | 0.00% | 39% | 51% | 41% | 53% | 32% | 42% | 38% | 49% | 43% | 56% | 37% | 37% | 38% | 38% |
| 7300 | 0.25% | 9.00% | 1.00% | 0.25% | 0.00% | 41% | 53% | 42% | 55% | 34% | 44% | 39% | 51% | 44% | 57% | 39% | 39% | 39% | 39% |
| 7301 | 1.00% | 9.00% | 1.00% | 0.25% | 0.00% | 43% | 56% | 43% | 56% | 37% | 48% | 41% | 53% | 46% | 60% | 41% | 41% | 41% | 41% |
| 7302 | 0.25% | 0.25% | 9.00% | 0.25% | 0.00% | 34% | 44% | 29% | 38% | 36% | 47% | 30% | 39% | 36% | 47% | 33% | 33% | 34% | 34% |
| 7303 | 1.00% | 0.25% | 9.00% | 0.25% | 0.00% | 36% | 46% | 30% | 39% | 39% | 51% | 32% | 42% | 38% | 49% | 35% | 35% | 36% | 36% |
| 7304 | 9.00% | 0.25% | 9.00% | 0.25% | 0.00% | 32% | 41% | 28% | 36% | 34% | 44% | 29% | 38% | 35% | 46% | 31% | 31% | 33% | 33% |
| 7305 | 0.00% | 1.00% | 9.00% | 0.25% | 0.00% | 38% | 49% | 36% | 47% | 38% | 49% | 35% | 46% | 43% | 56% | 37% | 37% | 39% | 39% |
| 7306 | 0.25% | 1.00% | 9.00% | 0.25% | 0.00% | 40% | 52% | 37% | 48% | 40% | 52% | 36% | 47% | 44% | 57% | 39% | 39% | 40% | 40% |
| 7307 | 9.00% | 1.00% | 9.00% | 0.25% | 0.00% | 38% | 49% | 36% | 47% | 38% | 49% | 35% | 46% | 43% | 56% | 37% | 37% | 39% | 39% |
| 7308 | 1.00% | 9.00% | 9.00% | 0.25% | 0.00% | 53% | 69% | 51% | 66% | 51% | 66% | 48% | 62% | 60% | 78% | 52% | 52% | 53% | 53% |
| 7309 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 7310 | 1.00% | 0.25% | 0.00% | 1.00% | 0.00% | 24% | 31% | 18% | 23% | 20% | 26% | 23% | 30% | 21% | 27% | 21% | 21% | 21% | 21% |
| 7311 | 0.00% | 1.00% | 0.00% | 1.00% | 0.00% | 26% | 34% | 24% | 31% | 19% | 25% | 26% | 34% | 26% | 34% | 23% | 23% | 24% | 24% |
| 7312 | 0.25% | 1.00% | 0.00% | 1.00% | 0.00% | 28% | 36% | 25% | 33% | 21% | 27% | 27% | 35% | 27% | 35% | 25% | 25% | 25% | 25% |
| 7313 | 1.00% | 1.00% | 0.00% | 1.00% | 0.00% | 30% | 39% | 26% | 34% | 24% | 31% | 29% | 38% | 29% | 38% | 27% | 27% | 27% | 27% |
| 7314 | 0.00% | 0.00% | 0.25% | 1.00% | 0.00% | 20% | 26% | 16% | 21% | 19% | 25% | 24% | 31% | 22% | 29% | 18% | 18% | 22% | 22% |
| 7315 | 1.00% | 0.00% | 0.25% | 1.00% | 0.00% | 24% | 31% | 18% | 23% | 24% | 31% | 27% | 35% | 25% | 33% | 22% | 22% | 25% | 25% |
| 7316 | 0.25% | 0.25% | 0.25% | 1.00% | 0.00% | 27% | 34% | 21% | 27% | 24% | 31% | 28% | 36% | 26% | 34% | 24% | 24% | 26% | 26% |
| 7317 | 1.00% | 0.25% | 0.25% | 1.00% | 0.00% | 29% | 37% | 22% | 29% | 27% | 35% | 30% | 39% | 28% | 36% | 26% | 26% | 28% | 28% |
| 7318 | 9.00% | 0.25% | 0.25% | 1.00% | 0.00% | 25% | 32% | 20% | 26% | 22% | 29% | 27% | 35% | 25% | 33% | 22% | 22% | 25% | 25% |
| 7319 | 0.00% | 1.00% | 0.25% | 1.00% | 0.00% | 31% | 40% | 28% | 36% | 26% | 34% | 33% | 43% | 33% | 43% | 28% | 28% | 31% | 31% |
| 7320 | 0.25% | 1.00% | 0.25% | 1.00% | 0.00% | 33% | 43% | 29% | 38% | 28% | 36% | 34% | 44% | 34% | 44% | 30% | 30% | 32% | 32% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7321 | 1.00% | 1.00% | 0.25% | 1.00% | 0.00% | 35% | 46% | 30% | 39% | 31% | 40% | 36% | 47% | 36% | 47% | 32% | 32% | 34% | 34% |
| 7322 | 9.00% | 1.00% | 0.25% | 1.00% | 0.00% | 31% | 40% | 28% | 36% | 26% | 34% | 33% | 43% | 33% | 43% | 28% | 28% | 31% | 31% |
| 7323 | 0.25% | 9.00% | 0.25% | 1.00% | 0.00% | 44% | 57% | 42% | 55% | 36% | 47% | 44% | 57% | 48% | 62% | 41% | 41% | 43% | 43% |
| 7324 | 1.00% | 9.00% | 0.25% | 1.00% | 0.00% | 46% | 60% | 43% | 56% | 39% | 51% | 46% | 60% | 50% | 65% | 43% | 43% | 45% | 45% |
| 7325 | 9.00% | 9.00% | 0.25% | 1.00% | 0.00% | 42% | 55% | 41% | 53% | 34% | 44% | 43% | 56% | 47% | 61% | 39% | 39% | 41% | 41% |
| 7326 | 0.00% | 0.00% | 1.00% | 1.00% | 0.00% | 25% | 33% | 23% | 30% | 24% | 31% | 26% | 34% | 27% | 35% | 24% | 24% | 26% | 26% |
| 7327 | 0.25% | 0.00% | 1.00% | 1.00% | 0.00% | 27% | 35% | 24% | 31% | 26% | 34% | 27% | 35% | 28% | 36% | 26% | 26% | 27% | 27% |
| 7328 | 1.00% | 0.00% | 1.00% | 1.00% | 0.00% | 29% | 38% | 25% | 33% | 29% | 38% | 29% | 38% | 30% | 39% | 28% | 28% | 29% | 29% |
| 7329 | 0.00% | 0.25% | 1.00% | 1.00% | 0.00% | 30% | 38% | 27% | 35% | 27% | 35% | 29% | 38% | 30% | 39% | 28% | 28% | 29% | 29% |
| 7330 | 1.00% | 0.25% | 1.00% | 1.00% | 0.00% | 34% | 44% | 29% | 38% | 32% | 42% | 32% | 42% | 33% | 43% | 32% | 32% | 32% | 32% |
| 7331 | 9.00% | 0.25% | 1.00% | 1.00% | 0.00% | 30% | 38% | 27% | 35% | 27% | 35% | 29% | 38% | 30% | 39% | 28% | 28% | 29% | 29% |
| 7332 | 0.00% | 1.00% | 1.00% | 1.00% | 0.00% | 36% | 47% | 35% | 46% | 31% | 40% | 35% | 46% | 38% | 49% | 34% | 34% | 35% | 35% |
| 7333 | 0.25% | 1.00% | 1.00% | 1.00% | 0.00% | 38% | 49% | 36% | 47% | 33% | 43% | 36% | 47% | 39% | 51% | 36% | 36% | 36% | 36% |
| 7334 | 1.00% | 1.00% | 1.00% | 1.00% | 0.00% | 40% | 52% | 37% | 48% | 36% | 47% | 38% | 49% | 41% | 53% | 38% | 38% | 38% | 38% |
| 7335 | 9.00% | 1.00% | 1.00% | 1.00% | 0.00% | 36% | 47% | 35% | 46% | 31% | 40% | 35% | 46% | 38% | 49% | 34% | 34% | 35% | 35% |
| 7336 | 0.00% | 9.00% | 1.00% | 1.00% | 0.00% | 47% | 61% | 48% | 62% | 39% | 51% | 45% | 59% | 52% | 68% | 45% | 45% | 45% | 45% |
| 7337 | 0.25% | 9.00% | 1.00% | 1.00% | 0.00% | 49% | 64% | 49% | 64% | 41% | 53% | 46% | 60% | 53% | 69% | 46% | 46% | 47% | 47% |
| 7338 | 1.00% | 9.00% | 1.00% | 1.00% | 0.00% | 51% | 66% | 50% | 65% | 44% | 57% | 48% | 62% | 55% | 72% | 48% | 48% | 49% | 49% |
| 7339 | 0.25% | 0.25% | 9.00% | 1.00% | 0.00% | 42% | 54% | 36% | 47% | 43% | 56% | 37% | 48% | 45% | 59% | 40% | 40% | 42% | 42% |
| 7340 | 1.00% | 0.25% | 9.00% | 1.00% | 0.00% | 44% | 57% | 37% | 48% | 46% | 60% | 39% | 51% | 47% | 61% | 42% | 42% | 44% | 44% |
| 7341 | 9.00% | 0.25% | 9.00% | 1.00% | 0.00% | 40% | 51% | 35% | 46% | 41% | 53% | 36% | 47% | 44% | 57% | 39% | 39% | 40% | 40% |
| 7342 | 0.25% | 1.00% | 9.00% | 1.00% | 0.00% | 48% | 62% | 44% | 57% | 47% | 61% | 43% | 56% | 53% | 69% | 46% | 46% | 48% | 48% |
| 7343 | 0.00% | 0.25% | 0.00% | 9.00% | 0.00% | 42% | 54% | 36% | 47% | 31% | 40% | 42% | 55% | 38% | 49% | 36% | 36% | 37% | 37% |
| 7344 | 0.00% | 0.00% | 0.25% | 9.00% | 0.00% | 42% | 55% | 36% | 47% | 35% | 46% | 46% | 60% | 42% | 55% | 38% | 38% | 41% | 41% |
| 7345 | 0.25% | 0.00% | 0.25% | 9.00% | 0.00% | 44% | 57% | 37% | 48% | 37% | 48% | 47% | 61% | 43% | 56% | 39% | 39% | 42% | 42% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7346 | 0.00% | 0.25% | 0.25% | 9.00% | 0.00% | 47% | 60% | 40% | 52% | 38% | 49% | 49% | 64% | 45% | 59% | 42% | 42% | 44% | 44% |
| 7347 | 0.25% | 0.25% | 0.25% | 9.00% | 0.00% | 49% | 63% | 41% | 53% | 40% | 52% | 50% | 65% | 46% | 60% | 43% | 43% | 45% | 45% |
| 7348 | 1.00% | 0.25% | 0.25% | 9.00% | 0.00% | 51% | 66% | 42% | 55% | 43% | 56% | 52% | 68% | 48% | 62% | 45% | 45% | 48% | 48% |
| 7349 | 9.00% | 0.25% | 0.25% | 9.00% | 0.00% | 47% | 60% | 40% | 52% | 38% | 49% | 49% | 64% | 45% | 59% | 42% | 42% | 44% | 44% |
| 7350 | 0.00% | 1.00% | 0.25% | 9.00% | 0.00% | 53% | 69% | 48% | 62% | 42% | 55% | 55% | 72% | 53% | 69% | 48% | 48% | 50% | 50% |
| 7351 | 0.25% | 1.00% | 0.25% | 9.00% | 0.00% | 55% | 72% | 49% | 64% | 44% | 57% | 56% | 73% | 54% | 70% | 49% | 49% | 51% | 51% |
| 7352 | 1.00% | 1.00% | 0.25% | 9.00% | 0.00% | 57% | 74% | 50% | 65% | 47% | 61% | 58% | 75% | 56% | 73% | 51% | 51% | 54% | 54% |
| 7353 | 0.25% | 9.00% | 0.25% | 9.00% | 0.00% | 66% | 86% | 62% | 81% | 52% | 68% | 66% | 86% | 68% | 88% | 60% | 60% | 62% | 62% |
| 7354 | 0.25% | 0.00% | 1.00% | 9.00% | 0.00% | 49% | 64% | 44% | 57% | 42% | 55% | 49% | 64% | 48% | 62% | 45% | 45% | 46% | 46% |
| 7355 | 1.00% | 0.25% | 1.00% | 9.00% | 0.00% | 56% | 72% | 49% | 64% | 48% | 62% | 54% | 70% | 53% | 69% | 51% | 51% | 52% | 52% |
| 7356 | 9.00% | 0.25% | 1.00% | 9.00% | 0.00% | 52% | 67% | 47% | 61% | 43% | 56% | 51% | 66% | 50% | 65% | 47% | 47% | 48% | 48% |
| 7357 | 0.00% | 1.00% | 1.00% | 9.00% | 0.00% | 58% | 75% | 55% | 72% | 47% | 61% | 57% | 74% | 58% | 75% | 53% | 53% | 54% | 54% |
| 7358 | 0.25% | 1.00% | 1.00% | 9.00% | 0.00% | 60% | 78% | 56% | 73% | 49% | 64% | 58% | 75% | 59% | 77% | 55% | 55% | 55% | 55% |
| 7359 | 1.00% | 1.00% | 1.00% | 9.00% | 0.00% | 62% | 81% | 57% | 74% | 52% | 68% | 60% | 78% | 61% | 79% | 57% | 57% | 58% | 58% |
| 7360 | 0.25% | 0.25% | 9.00% | 9.00% | 0.00% | 64% | 83% | 56% | 73% | 59% | 77% | 59% | 77% | 65% | 85% | 60% | 60% | 61% | 61% |
| 7361 | 0.25% | 0.25% | 0.00% | 0.00% | 0.25% | 13% | 16% | 12% | 16% | 11% | 14% | 9% | 12% | 11% | 14% | 12% | 12% | 10% | 10% |
| 7362 | 1.00% | 0.25% | 0.00% | 0.00% | 0.25% | 15% | 19% | 13% | 17% | 14% | 18% | 11% | 14% | 13% | 17% | 14% | 14% | 13% | 13% |
| 7363 | 0.25% | 1.00% | 0.00% | 0.00% | 0.25% | 19% | 25% | 20% | 26% | 15% | 20% | 15% | 20% | 19% | 25% | 18% | 18% | 16% | 16% |
| 7364 | 1.00% | 1.00% | 0.00% | 0.00% | 0.25% | 21% | 27% | 21% | 27% | 18% | 23% | 17% | 22% | 21% | 27% | 20% | 20% | 19% | 19% |
| 7365 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 7366 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 7367 | 0.00% | 0.25% | 0.25% | 0.00% | 0.25% | 16% | 20% | 15% | 20% | 16% | 21% | 15% | 20% | 17% | 22% | 16% | 16% | 16% | 16% |
| 7368 | 0.25% | 0.25% | 0.25% | 0.00% | 0.25% | 18% | 23% | 16% | 21% | 18% | 23% | 16% | 21% | 18% | 23% | 17% | 17% | 17% | 17% |
| 7369 | 0.00% | 1.00% | 0.25% | 0.00% | 0.25% | 22% | 29% | 23% | 30% | 20% | 26% | 21% | 27% | 25% | 33% | 22% | 22% | 22% | 22% |
| 7370 | 1.00% | 1.00% | 0.25% | 0.00% | 0.25% | 26% | 34% | 25% | 33% | 25% | 33% | 24% | 31% | 28% | 36% | 25% | 25% | 26% | 26% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7371 | 1.00% | 9.00% | 0.25% | 0.00% | 0.25% | 37% | 48% | 38% | 49% | 33% | 43% | 34% | 44% | 42% | 55% | 36% | 36% | 36% | 36% |
| 7372 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 7373 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 7374 | 0.00% | 0.25% | 1.00% | 0.00% | 0.25% | 21% | 27% | 22% | 29% | 21% | 27% | 17% | 22% | 22% | 29% | 21% | 21% | 20% | 20% |
| 7375 | 1.00% | 0.25% | 1.00% | 0.00% | 0.25% | 25% | 32% | 24% | 31% | 26% | 34% | 20% | 26% | 25% | 33% | 25% | 25% | 24% | 24% |
| 7376 | 0.00% | 1.00% | 1.00% | 0.00% | 0.25% | 27% | 35% | 30% | 39% | 25% | 33% | 23% | 30% | 30% | 39% | 27% | 27% | 26% | 26% |
| 7377 | 0.25% | 1.00% | 1.00% | 0.00% | 0.25% | 29% | 38% | 31% | 40% | 27% | 35% | 24% | 31% | 31% | 40% | 29% | 29% | 27% | 27% |
| 7378 | 1.00% | 1.00% | 1.00% | 0.00% | 0.25% | 31% | 40% | 32% | 42% | 30% | 39% | 26% | 34% | 33% | 43% | 31% | 31% | 30% | 30% |
| 7379 | 9.00% | 1.00% | 1.00% | 0.00% | 0.25% | 27% | 35% | 30% | 39% | 25% | 33% | 23% | 30% | 30% | 39% | 27% | 27% | 26% | 26% |
| 7380 | 1.00% | 9.00% | 1.00% | 0.00% | 0.25% | 42% | 55% | 45% | 59% | 38% | 49% | 36% | 47% | 47% | 61% | 42% | 42% | 40% | 40% |
| 7381 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 7382 | 0.00% | 0.25% | 9.00% | 0.00% | 0.25% | 31% | 40% | 30% | 39% | 35% | 46% | 24% | 31% | 36% | 47% | 32% | 32% | 32% | 32% |
| 7383 | 0.25% | 0.25% | 9.00% | 0.00% | 0.25% | 33% | 42% | 31% | 40% | 37% | 48% | 25% | 33% | 37% | 48% | 34% | 34% | 33% | 33% |
| 7384 | 1.00% | 0.25% | 9.00% | 0.00% | 0.25% | 35% | 45% | 32% | 42% | 40% | 52% | 27% | 35% | 39% | 51% | 36% | 36% | 35% | 35% |
| 7385 | 0.25% | 1.00% | 9.00% | 0.00% | 0.25% | 39% | 51% | 39% | 51% | 41% | 53% | 31% | 40% | 45% | 59% | 40% | 40% | 39% | 39% |
| 7386 | 0.25% | 0.00% | 0.00% | 0.25% | 0.25% | 15% | 20% | 13% | 17% | 13% | 17% | 16% | 21% | 14% | 18% | 14% | 14% | 14% | 14% |
| 7387 | 1.00% | 0.00% | 0.00% | 0.25% | 0.25% | 17% | 22% | 14% | 18% | 16% | 21% | 18% | 23% | 16% | 21% | 16% | 16% | 17% | 17% |
| 7388 | 0.00% | 0.25% | 0.00% | 0.25% | 0.25% | 18% | 23% | 16% | 21% | 14% | 18% | 18% | 23% | 16% | 21% | 16% | 16% | 16% | 16% |
| 7389 | 0.25% | 0.25% | 0.00% | 0.25% | 0.25% | 20% | 25% | 17% | 22% | 16% | 21% | 19% | 25% | 17% | 22% | 18% | 18% | 17% | 17% |
| 7390 | 9.00% | 0.25% | 0.00% | 0.25% | 0.25% | 18% | 23% | 16% | 21% | 14% | 18% | 18% | 23% | 16% | 21% | 16% | 16% | 16% | 16% |
| 7391 | 1.00% | 1.00% | 0.00% | 0.25% | 0.25% | 28% | 36% | 26% | 34% | 23% | 30% | 27% | 35% | 27% | 35% | 26% | 26% | 26% | 26% |
| 7392 | 1.00% | 9.00% | 0.00% | 0.25% | 0.25% | 39% | 51% | 39% | 51% | 31% | 40% | 37% | 48% | 41% | 53% | 36% | 36% | 36% | 36% |
| 7393 | 0.00% | 0.00% | 0.25% | 0.25% | 0.25% | 18% | 23% | 16% | 21% | 18% | 23% | 22% | 29% | 20% | 26% | 17% | 17% | 20% | 20% |
| 7394 | 0.25% | 0.00% | 0.25% | 0.25% | 0.25% | 20% | 26% | 17% | 22% | 20% | 26% | 23% | 30% | 21% | 27% | 19% | 19% | 21% | 21% |
| 7395 | 0.00% | 0.25% | 0.25% | 0.25% | 0.25% | 23% | 29% | 20% | 26% | 21% | 27% | 25% | 33% | 23% | 30% | 21% | 21% | 23% | 23% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7396 | 0.25% | 0.25% | 0.25% | 0.25% | 0.25% | 25% | 32% | 21% | 27% | 23% | 30% | 26% | 34% | 24% | 31% | 23% | 23% | 24% | 24% |
| 7397 | 1.00% | 0.25% | 0.25% | 0.25% | 0.25% | 27% | 34% | 22% | 29% | 26% | 34% | 28% | 36% | 26% | 34% | 25% | 25% | 27% | 27% |
| 7398 | 9.00% | 0.25% | 0.25% | 0.25% | 0.25% | 23% | 29% | 20% | 26% | 21% | 27% | 25% | 33% | 23% | 30% | 21% | 21% | 23% | 23% |
| 7399 | 0.25% | 1.00% | 0.25% | 0.25% | 0.25% | 31% | 40% | 29% | 38% | 27% | 35% | 32% | 42% | 32% | 42% | 29% | 29% | 30% | 30% |
| 7400 | 9.00% | 1.00% | 0.25% | 0.25% | 0.25% | 29% | 38% | 28% | 36% | 25% | 33% | 31% | 40% | 31% | 40% | 27% | 27% | 29% | 29% |
| 7401 | 0.25% | 9.00% | 0.25% | 0.25% | 0.25% | 42% | 55% | 42% | 55% | 35% | 46% | 42% | 55% | 46% | 60% | 40% | 40% | 41% | 41% |
| 7402 | 1.00% | 9.00% | 0.25% | 0.25% | 0.25% | 44% | 57% | 43% | 56% | 38% | 49% | 44% | 57% | 48% | 62% | 42% | 42% | 43% | 43% |
| 7403 | 9.00% | 9.00% | 0.25% | 0.25% | 0.25% | 40% | 52% | 41% | 53% | 33% | 43% | 41% | 53% | 45% | 59% | 38% | 38% | 40% | 40% |
| 7404 | 0.00% | 0.00% | 1.00% | 0.25% | 0.25% | 23% | 30% | 23% | 30% | 23% | 30% | 24% | 31% | 25% | 33% | 23% | 23% | 24% | 24% |
| 7405 | 1.00% | 0.00% | 1.00% | 0.25% | 0.25% | 27% | 35% | 25% | 33% | 28% | 36% | 27% | 35% | 28% | 36% | 27% | 27% | 28% | 28% |
| 7406 | 0.00% | 0.25% | 1.00% | 0.25% | 0.25% | 28% | 36% | 27% | 35% | 26% | 34% | 27% | 35% | 28% | 36% | 27% | 27% | 27% | 27% |
| 7407 | 0.25% | 0.25% | 1.00% | 0.25% | 0.25% | 30% | 38% | 28% | 36% | 28% | 36% | 28% | 36% | 29% | 38% | 29% | 29% | 28% | 28% |
| 7408 | 1.00% | 0.25% | 1.00% | 0.25% | 0.25% | 32% | 41% | 29% | 38% | 31% | 40% | 30% | 39% | 31% | 40% | 31% | 31% | 31% | 31% |
| 7409 | 9.00% | 0.25% | 1.00% | 0.25% | 0.25% | 28% | 36% | 27% | 35% | 26% | 34% | 27% | 35% | 28% | 36% | 27% | 27% | 27% | 27% |
| 7410 | 0.00% | 1.00% | 1.00% | 0.25% | 0.25% | 34% | 44% | 35% | 46% | 30% | 39% | 33% | 43% | 36% | 47% | 33% | 33% | 33% | 33% |
| 7411 | 0.25% | 1.00% | 1.00% | 0.25% | 0.25% | 36% | 47% | 36% | 47% | 32% | 42% | 34% | 44% | 37% | 48% | 35% | 35% | 34% | 34% |
| 7412 | 1.00% | 1.00% | 1.00% | 0.25% | 0.25% | 38% | 49% | 37% | 48% | 35% | 46% | 36% | 47% | 39% | 51% | 37% | 37% | 37% | 37% |
| 7413 | 9.00% | 1.00% | 1.00% | 0.25% | 0.25% | 34% | 44% | 35% | 46% | 30% | 39% | 33% | 43% | 36% | 47% | 33% | 33% | 33% | 33% |
| 7414 | 0.00% | 9.00% | 1.00% | 0.25% | 0.25% | 45% | 59% | 48% | 62% | 38% | 49% | 43% | 56% | 50% | 65% | 44% | 44% | 44% | 44% |
| 7415 | 0.25% | 9.00% | 1.00% | 0.25% | 0.25% | 47% | 61% | 49% | 64% | 40% | 52% | 44% | 57% | 51% | 66% | 45% | 45% | 45% | 45% |
| 7416 | 1.00% | 9.00% | 1.00% | 0.25% | 0.25% | 49% | 64% | 50% | 65% | 43% | 56% | 46% | 60% | 53% | 69% | 47% | 47% | 47% | 47% |
| 7417 | 0.25% | 0.25% | 9.00% | 0.25% | 0.25% | 40% | 51% | 36% | 47% | 42% | 55% | 35% | 46% | 43% | 56% | 39% | 39% | 40% | 40% |
| 7418 | 1.00% | 0.25% | 9.00% | 0.25% | 0.25% | 42% | 54% | 37% | 48% | 45% | 59% | 37% | 48% | 45% | 59% | 41% | 41% | 42% | 42% |
| 7419 | 9.00% | 0.25% | 9.00% | 0.25% | 0.25% | 38% | 49% | 35% | 46% | 40% | 52% | 34% | 44% | 42% | 55% | 38% | 38% | 39% | 39% |
| 7420 | 0.00% | 1.00% | 9.00% | 0.25% | 0.25% | 44% | 57% | 43% | 56% | 44% | 57% | 40% | 52% | 50% | 65% | 44% | 44% | 45% | 45% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7421 | 0.25% | 1.00% | 9.00% | 0.25% | 0.25% | 46% | 60% | 44% | 57% | 46% | 60% | 41% | 53% | 51% | 66% | 45% | 45% | 46% | 46% |
| 7422 | 9.00% | 1.00% | 9.00% | 0.25% | 0.25% | 44% | 57% | 43% | 56% | 44% | 57% | 40% | 52% | 50% | 65% | 44% | 44% | 45% | 45% |
| 7423 | 1.00% | 9.00% | 9.00% | 0.25% | 0.25% | 59% | 77% | 58% | 75% | 57% | 74% | 53% | 69% | 67% | 87% | 58% | 58% | 59% | 59% |
| 7424 | 0.25% | 0.00% | 0.00% | 1.00% | 0.25% | 23% | 30% | 20% | 26% | 20% | 26% | 23% | 30% | 23% | 30% | 21% | 21% | 22% | 22% |
| 7425 | 1.00% | 0.25% | 0.00% | 1.00% | 0.25% | 30% | 38% | 25% | 33% | 26% | 34% | 28% | 36% | 28% | 36% | 27% | 27% | 27% | 27% |
| 7426 | 0.00% | 1.00% | 0.00% | 1.00% | 0.25% | 32% | 42% | 31% | 40% | 25% | 33% | 31% | 40% | 33% | 43% | 29% | 29% | 30% | 30% |
| 7427 | 0.25% | 1.00% | 0.00% | 1.00% | 0.25% | 34% | 44% | 32% | 42% | 27% | 35% | 32% | 42% | 34% | 44% | 31% | 31% | 31% | 31% |
| 7428 | 1.00% | 1.00% | 0.00% | 1.00% | 0.25% | 36% | 47% | 33% | 43% | 30% | 39% | 34% | 44% | 36% | 47% | 33% | 33% | 33% | 33% |
| 7429 | 0.00% | 0.00% | 0.25% | 1.00% | 0.25% | 26% | 34% | 23% | 30% | 25% | 33% | 29% | 38% | 29% | 38% | 25% | 25% | 28% | 28% |
| 7430 | 1.00% | 0.00% | 0.25% | 1.00% | 0.25% | 30% | 39% | 25% | 33% | 30% | 39% | 32% | 42% | 32% | 42% | 28% | 28% | 31% | 31% |
| 7431 | 0.25% | 0.25% | 0.25% | 1.00% | 0.25% | 33% | 42% | 28% | 36% | 30% | 39% | 33% | 43% | 33% | 43% | 30% | 30% | 32% | 32% |
| 7432 | 1.00% | 0.25% | 0.25% | 1.00% | 0.25% | 35% | 45% | 29% | 38% | 33% | 43% | 35% | 46% | 35% | 46% | 32% | 32% | 34% | 34% |
| 7433 | 9.00% | 0.25% | 0.25% | 1.00% | 0.25% | 31% | 40% | 27% | 35% | 28% | 36% | 32% | 42% | 32% | 42% | 29% | 29% | 31% | 31% |
| 7434 | 0.00% | 1.00% | 0.25% | 1.00% | 0.25% | 37% | 48% | 35% | 46% | 32% | 42% | 38% | 49% | 40% | 52% | 35% | 35% | 37% | 37% |
| 7435 | 0.25% | 1.00% | 0.25% | 1.00% | 0.25% | 39% | 51% | 36% | 47% | 34% | 44% | 39% | 51% | 41% | 53% | 36% | 36% | 38% | 38% |
| 7436 | 1.00% | 1.00% | 0.25% | 1.00% | 0.25% | 41% | 53% | 37% | 48% | 37% | 48% | 41% | 53% | 43% | 56% | 38% | 38% | 40% | 40% |
| 7437 | 9.00% | 1.00% | 0.25% | 1.00% | 0.25% | 37% | 48% | 35% | 46% | 32% | 42% | 38% | 49% | 40% | 52% | 35% | 35% | 37% | 37% |
| 7438 | 0.25% | 9.00% | 0.25% | 1.00% | 0.25% | 50% | 65% | 49% | 64% | 42% | 55% | 49% | 64% | 55% | 72% | 47% | 47% | 49% | 49% |
| 7439 | 1.00% | 9.00% | 0.25% | 1.00% | 0.25% | 52% | 68% | 50% | 65% | 45% | 59% | 51% | 66% | 57% | 74% | 49% | 49% | 51% | 51% |
| 7440 | 9.00% | 9.00% | 0.25% | 1.00% | 0.25% | 48% | 62% | 48% | 62% | 40% | 52% | 48% | 62% | 54% | 70% | 45% | 45% | 47% | 47% |
| 7441 | 0.00% | 0.00% | 1.00% | 1.00% | 0.25% | 31% | 40% | 30% | 39% | 30% | 39% | 31% | 40% | 34% | 44% | 30% | 30% | 32% | 32% |
| 7442 | 0.25% | 0.00% | 1.00% | 1.00% | 0.25% | 33% | 43% | 31% | 40% | 32% | 42% | 32% | 42% | 35% | 46% | 32% | 32% | 33% | 33% |
| 7443 | 1.00% | 0.00% | 1.00% | 1.00% | 0.25% | 35% | 46% | 32% | 42% | 35% | 46% | 34% | 44% | 37% | 48% | 34% | 34% | 35% | 35% |
| 7444 | 0.00% | 0.25% | 1.00% | 1.00% | 0.25% | 36% | 46% | 34% | 44% | 33% | 43% | 34% | 44% | 37% | 48% | 34% | 34% | 35% | 35% |
| 7445 | 1.00% | 0.25% | 1.00% | 1.00% | 0.25% | 40% | 51% | 36% | 47% | 38% | 49% | 37% | 48% | 40% | 52% | 38% | 38% | 38% | 38% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7446 | 9.00% | 0.25% | 1.00% | 1.00% | 0.25% | 36% | 46% | 34% | 44% | 33% | 43% | 34% | 44% | 37% | 48% | 34% | 34% | 35% | 35% |
| 7447 | 0.00% | 1.00% | 1.00% | 1.00% | 0.25% | 42% | 55% | 42% | 55% | 37% | 48% | 40% | 52% | 45% | 59% | 40% | 40% | 41% | 41% |
| 7448 | 0.25% | 1.00% | 1.00% | 1.00% | 0.25% | 44% | 57% | 43% | 56% | 39% | 51% | 41% | 53% | 46% | 60% | 42% | 42% | 42% | 42% |
| 7449 | 1.00% | 1.00% | 1.00% | 1.00% | 0.25% | 46% | 60% | 44% | 57% | 42% | 55% | 43% | 56% | 48% | 62% | 44% | 44% | 44% | 44% |
| 7450 | 9.00% | 1.00% | 1.00% | 1.00% | 0.25% | 42% | 55% | 42% | 55% | 37% | 48% | 40% | 52% | 45% | 59% | 40% | 40% | 41% | 41% |
| 7451 | 0.00% | 9.00% | 1.00% | 1.00% | 0.25% | 53% | 69% | 55% | 72% | 45% | 59% | 50% | 65% | 59% | 77% | 51% | 51% | 51% | 51% |
| 7452 | 0.25% | 9.00% | 1.00% | 1.00% | 0.25% | 55% | 72% | 56% | 73% | 47% | 61% | 51% | 66% | 60% | 78% | 53% | 53% | 53% | 53% |
| 7453 | 1.00% | 9.00% | 1.00% | 1.00% | 0.25% | 57% | 74% | 57% | 74% | 50% | 65% | 53% | 69% | 62% | 81% | 55% | 55% | 55% | 55% |
| 7454 | 0.25% | 0.25% | 9.00% | 1.00% | 0.25% | 48% | 62% | 43% | 56% | 49% | 64% | 42% | 55% | 52% | 68% | 47% | 47% | 48% | 48% |
| 7455 | 1.00% | 0.25% | 9.00% | 1.00% | 0.25% | 50% | 64% | 44% | 57% | 52% | 68% | 44% | 57% | 54% | 70% | 49% | 49% | 50% | 50% |
| 7456 | 9.00% | 0.25% | 9.00% | 1.00% | 0.25% | 46% | 59% | 42% | 55% | 47% | 61% | 41% | 53% | 51% | 66% | 45% | 45% | 46% | 46% |
| 7457 | 0.25% | 1.00% | 9.00% | 1.00% | 0.25% | 54% | 70% | 51% | 66% | 53% | 69% | 48% | 62% | 60% | 78% | 53% | 53% | 54% | 54% |
| 7458 | 0.00% | 0.25% | 0.00% | 9.00% | 0.25% | 48% | 62% | 43% | 56% | 37% | 48% | 47% | 61% | 45% | 59% | 43% | 43% | 43% | 43% |
| 7459 | 0.00% | 0.00% | 0.25% | 9.00% | 0.25% | 48% | 62% | 43% | 56% | 41% | 53% | 51% | 66% | 49% | 64% | 44% | 44% | 47% | 47% |
| 7460 | 0.25% | 0.00% | 0.25% | 9.00% | 0.25% | 50% | 65% | 44% | 57% | 43% | 56% | 52% | 68% | 50% | 65% | 46% | 46% | 48% | 48% |
| 7461 | 0.00% | 0.25% | 0.25% | 9.00% | 0.25% | 53% | 68% | 47% | 61% | 44% | 57% | 54% | 70% | 52% | 68% | 48% | 48% | 50% | 50% |
| 7462 | 0.25% | 0.25% | 0.25% | 9.00% | 0.25% | 55% | 71% | 48% | 62% | 46% | 60% | 55% | 72% | 53% | 69% | 50% | 50% | 51% | 51% |
| 7463 | 1.00% | 0.25% | 0.25% | 9.00% | 0.25% | 57% | 73% | 49% | 64% | 49% | 64% | 57% | 74% | 55% | 72% | 52% | 52% | 54% | 54% |
| 7464 | 9.00% | 0.25% | 0.25% | 9.00% | 0.25% | 53% | 68% | 47% | 61% | 44% | 57% | 54% | 70% | 52% | 68% | 48% | 48% | 50% | 50% |
| 7465 | 0.00% | 1.00% | 0.25% | 9.00% | 0.25% | 59% | 77% | 55% | 72% | 48% | 62% | 60% | 78% | 60% | 78% | 54% | 54% | 56% | 56% |
| 7466 | 0.25% | 1.00% | 0.25% | 9.00% | 0.25% | 61% | 79% | 56% | 73% | 50% | 65% | 61% | 79% | 61% | 79% | 56% | 56% | 57% | 57% |
| 7467 | 1.00% | 1.00% | 0.25% | 9.00% | 0.25% | 63% | 82% | 57% | 74% | 53% | 69% | 63% | 82% | 63% | 82% | 58% | 58% | 60% | 60% |
| 7468 | 0.25% | 9.00% | 0.25% | 9.00% | 0.25% | 72% | 94% | 69% | 90% | 58% | 75% | 71% | 92% | 75% | 98% | 66% | 66% | 68% | 68% |
| 7469 | 0.25% | 0.00% | 1.00% | 9.00% | 0.25% | 55% | 72% | 51% | 66% | 48% | 62% | 54% | 70% | 55% | 72% | 51% | 51% | 52% | 52% |
| 7470 | 1.00% | 0.25% | 1.00% | 9.00% | 0.25% | 62% | 80% | 56% | 73% | 54% | 70% | 59% | 77% | 60% | 78% | 57% | 57% | 58% | 58% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7471 | 9.00% | 0.25% | 1.00% | 9.00% | 0.25% | 58% | 75% | 54% | 70% | 49% | 64% | 56% | 73% | 57% | 74% | 54% | 54% | 54% | 54% |
| 7472 | 0.00% | 1.00% | 1.00% | 9.00% | 0.25% | 64% | 83% | 62% | 81% | 53% | 69% | 62% | 81% | 65% | 85% | 60% | 60% | 60% | 60% |
| 7473 | 0.25% | 1.00% | 1.00% | 9.00% | 0.25% | 66% | 86% | 63% | 82% | 55% | 72% | 63% | 82% | 66% | 86% | 61% | 61% | 61% | 61% |
| 7474 | 1.00% | 1.00% | 1.00% | 9.00% | 0.25% | 68% | 88% | 64% | 83% | 58% | 75% | 65% | 85% | 68% | 88% | 63% | 63% | 64% | 64% |
| 7475 | 0.25% | 0.25% | 9.00% | 9.00% | 0.25% | 70% | 90% | 63% | 82% | 65% | 85% | 64% | 83% | 72% | 94% | 66% | 66% | 67% | 67% |
| 7476 | 0.25% | 0.25% | 0.00% | 0.00% | 1.00% | 18% | 23% | 18% | 23% | 16% | 21% | 14% | 18% | 22% | 29% | 17% | 17% | 17% | 17% |
| 7477 | 1.00% | 0.25% | 0.00% | 0.00% | 1.00% | 20% | 25% | 19% | 25% | 19% | 25% | 16% | 21% | 24% | 31% | 19% | 19% | 20% | 20% |
| 7478 | 0.25% | 1.00% | 0.00% | 0.00% | 1.00% | 24% | 31% | 26% | 34% | 20% | 26% | 20% | 26% | 30% | 39% | 23% | 23% | 23% | 23% |
| 7479 | 1.00% | 1.00% | 0.00% | 0.00% | 1.00% | 26% | 34% | 27% | 35% | 23% | 30% | 22% | 29% | 32% | 42% | 25% | 25% | 26% | 26% |
| 7480 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 7481 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 7482 | 0.00% | 0.25% | 0.25% | 0.00% | 1.00% | 21% | 27% | 21% | 27% | 21% | 27% | 20% | 26% | 28% | 36% | 21% | 21% | 23% | 23% |
| 7483 | 0.25% | 0.25% | 0.25% | 0.00% | 1.00% | 23% | 29% | 22% | 29% | 23% | 30% | 21% | 27% | 29% | 38% | 23% | 23% | 24% | 24% |
| 7484 | 0.00% | 1.00% | 0.25% | 0.00% | 1.00% | 27% | 35% | 29% | 38% | 25% | 33% | 26% | 34% | 36% | 47% | 27% | 27% | 29% | 29% |
| 7485 | 1.00% | 1.00% | 0.25% | 0.00% | 1.00% | 31% | 40% | 31% | 40% | 30% | 39% | 29% | 38% | 39% | 51% | 31% | 31% | 33% | 33% |
| 7486 | 1.00% | 9.00% | 0.25% | 0.00% | 1.00% | 42% | 55% | 44% | 57% | 38% | 49% | 39% | 51% | 53% | 69% | 41% | 41% | 43% | 43% |
| 7487 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 7488 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 7489 | 0.00% | 0.25% | 1.00% | 0.00% | 1.00% | 26% | 33% | 28% | 36% | 26% | 34% | 22% | 29% | 33% | 43% | 27% | 27% | 27% | 27% |
| 7490 | 1.00% | 0.25% | 1.00% | 0.00% | 1.00% | 30% | 38% | 30% | 39% | 31% | 40% | 25% | 33% | 36% | 47% | 30% | 30% | 31% | 31% |
| 7491 | 0.00% | 1.00% | 1.00% | 0.00% | 1.00% | 32% | 42% | 36% | 47% | 30% | 39% | 28% | 36% | 41% | 53% | 33% | 33% | 33% | 33% |
| 7492 | 0.25% | 1.00% | 1.00% | 0.00% | 1.00% | 34% | 44% | 37% | 48% | 32% | 42% | 29% | 38% | 42% | 55% | 34% | 34% | 34% | 34% |
| 7493 | 1.00% | 1.00% | 1.00% | 0.00% | 1.00% | 36% | 47% | 38% | 49% | 35% | 46% | 31% | 40% | 44% | 57% | 36% | 36% | 37% | 37% |
| 7494 | 9.00% | 1.00% | 1.00% | 0.00% | 1.00% | 32% | 42% | 36% | 47% | 30% | 39% | 28% | 36% | 41% | 53% | 33% | 33% | 33% | 33% |
| 7495 | 1.00% | 9.00% | 1.00% | 0.00% | 1.00% | 47% | 61% | 51% | 66% | 43% | 56% | 41% | 53% | 58% | 75% | 47% | 47% | 47% | 47% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7496 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 7497 | 0.00% | 0.25% | 9.00% | 0.00% | 1.00% | 36% | 46% | 36% | 47% | 40% | 52% | 29% | 38% | 47% | 61% | 37% | 37% | 39% | 39% |
| 7498 | 0.25% | 0.25% | 9.00% | 0.00% | 1.00% | 38% | 49% | 37% | 48% | 42% | 55% | 30% | 39% | 48% | 62% | 39% | 39% | 40% | 40% |
| 7499 | 1.00% | 0.25% | 9.00% | 0.00% | 1.00% | 40% | 51% | 38% | 49% | 45% | 59% | 32% | 42% | 50% | 65% | 41% | 41% | 42% | 42% |
| 7500 | 0.25% | 1.00% | 9.00% | 0.00% | 1.00% | 44% | 57% | 45% | 59% | 46% | 60% | 36% | 47% | 56% | 73% | 45% | 45% | 46% | 46% |
| 7501 | 0.25% | 0.00% | 0.00% | 0.25% | 1.00% | 20% | 26% | 19% | 25% | 18% | 23% | 21% | 27% | 25% | 33% | 19% | 19% | 21% | 21% |
| 7502 | 1.00% | 0.00% | 0.00% | 0.25% | 1.00% | 22% | 29% | 20% | 26% | 21% | 27% | 23% | 30% | 27% | 35% | 21% | 21% | 24% | 24% |
| 7503 | 0.00% | 0.25% | 0.00% | 0.25% | 1.00% | 23% | 29% | 22% | 29% | 19% | 25% | 23% | 30% | 27% | 35% | 21% | 21% | 23% | 23% |
| 7504 | 0.25% | 0.25% | 0.00% | 0.25% | 1.00% | 25% | 32% | 23% | 30% | 21% | 27% | 24% | 31% | 28% | 36% | 23% | 23% | 24% | 24% |
| 7505 | 9.00% | 0.25% | 0.00% | 0.25% | 1.00% | 23% | 29% | 22% | 29% | 19% | 25% | 23% | 30% | 27% | 35% | 21% | 21% | 23% | 23% |
| 7506 | 1.00% | 1.00% | 0.00% | 0.25% | 1.00% | 33% | 43% | 32% | 42% | 28% | 36% | 32% | 42% | 38% | 49% | 31% | 31% | 33% | 33% |
| 7507 | 1.00% | 9.00% | 0.00% | 0.25% | 1.00% | 44% | 57% | 45% | 59% | 36% | 47% | 42% | 55% | 52% | 68% | 42% | 42% | 43% | 43% |
| 7508 | 0.00% | 0.00% | 0.25% | 0.25% | 1.00% | 23% | 30% | 22% | 29% | 23% | 30% | 27% | 35% | 31% | 40% | 23% | 23% | 27% | 27% |
| 7509 | 0.25% | 0.00% | 0.25% | 0.25% | 1.00% | 25% | 33% | 23% | 30% | 25% | 33% | 28% | 36% | 32% | 42% | 24% | 24% | 28% | 28% |
| 7510 | 0.00% | 0.25% | 0.25% | 0.25% | 1.00% | 28% | 36% | 26% | 34% | 26% | 34% | 30% | 39% | 34% | 44% | 27% | 27% | 30% | 30% |
| 7511 | 0.25% | 0.25% | 0.25% | 0.25% | 1.00% | 30% | 38% | 27% | 35% | 28% | 36% | 31% | 40% | 35% | 46% | 28% | 28% | 31% | 31% |
| 7512 | 1.00% | 0.25% | 0.25% | 0.25% | 1.00% | 32% | 41% | 28% | 36% | 31% | 40% | 33% | 43% | 37% | 48% | 30% | 30% | 34% | 34% |
| 7513 | 9.00% | 0.25% | 0.25% | 0.25% | 1.00% | 28% | 36% | 26% | 34% | 26% | 34% | 30% | 39% | 34% | 44% | 27% | 27% | 30% | 30% |
| 7514 | 0.25% | 1.00% | 0.25% | 0.25% | 1.00% | 36% | 47% | 35% | 46% | 32% | 42% | 37% | 48% | 43% | 56% | 34% | 34% | 37% | 37% |
| 7515 | 9.00% | 1.00% | 0.25% | 0.25% | 1.00% | 34% | 44% | 34% | 44% | 30% | 39% | 36% | 47% | 42% | 55% | 33% | 33% | 36% | 36% |
| 7516 | 0.25% | 9.00% | 0.25% | 0.25% | 1.00% | 47% | 61% | 48% | 62% | 40% | 52% | 47% | 61% | 57% | 74% | 45% | 45% | 48% | 48% |
| 7517 | 1.00% | 9.00% | 0.25% | 0.25% | 1.00% | 49% | 64% | 49% | 64% | 43% | 56% | 49% | 64% | 59% | 77% | 47% | 47% | 50% | 50% |
| 7518 | 9.00% | 9.00% | 0.25% | 0.25% | 1.00% | 45% | 59% | 47% | 61% | 38% | 49% | 46% | 60% | 56% | 73% | 43% | 43% | 47% | 47% |
| 7519 | 0.00% | 0.00% | 1.00% | 0.25% | 1.00% | 28% | 36% | 29% | 38% | 28% | 36% | 29% | 38% | 36% | 47% | 28% | 28% | 31% | 31% |
| 7520 | 1.00% | 0.00% | 1.00% | 0.25% | 1.00% | 32% | 42% | 31% | 40% | 33% | 43% | 32% | 42% | 39% | 51% | 32% | 32% | 35% | 35% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7521 | 0.00% | 0.25% | 1.00% | 0.25% | 1.00% | 33% | 42% | 33% | 43% | 31% | 40% | 32% | 42% | 39% | 51% | 32% | 32% | 34% | 34% |
| 7522 | 0.25% | 0.25% | 1.00% | 0.25% | 1.00% | 35% | 45% | 34% | 44% | 33% | 43% | 33% | 43% | 40% | 52% | 34% | 34% | 35% | 35% |
| 7523 | 1.00% | 0.25% | 1.00% | 0.25% | 1.00% | 37% | 47% | 35% | 46% | 36% | 47% | 35% | 46% | 42% | 55% | 36% | 36% | 38% | 38% |
| 7524 | 9.00% | 0.25% | 1.00% | 0.25% | 1.00% | 33% | 42% | 33% | 43% | 31% | 40% | 32% | 42% | 39% | 51% | 32% | 32% | 34% | 34% |
| 7525 | 0.00% | 1.00% | 1.00% | 0.25% | 1.00% | 39% | 51% | 41% | 53% | 35% | 46% | 38% | 49% | 47% | 61% | 38% | 38% | 40% | 40% |
| 7526 | 0.25% | 1.00% | 1.00% | 0.25% | 1.00% | 41% | 53% | 42% | 55% | 37% | 48% | 39% | 51% | 48% | 62% | 40% | 40% | 41% | 41% |
| 7527 | 1.00% | 1.00% | 1.00% | 0.25% | 1.00% | 43% | 56% | 43% | 56% | 40% | 52% | 41% | 53% | 50% | 65% | 42% | 42% | 44% | 44% |
| 7528 | 9.00% | 1.00% | 1.00% | 0.25% | 1.00% | 39% | 51% | 41% | 53% | 35% | 46% | 38% | 49% | 47% | 61% | 38% | 38% | 40% | 40% |
| 7529 | 0.00% | 9.00% | 1.00% | 0.25% | 1.00% | 50% | 65% | 54% | 70% | 43% | 56% | 48% | 62% | 61% | 79% | 49% | 49% | 51% | 51% |
| 7530 | 0.25% | 9.00% | 1.00% | 0.25% | 1.00% | 52% | 68% | 55% | 72% | 45% | 59% | 49% | 64% | 62% | 81% | 51% | 51% | 52% | 52% |
| 7531 | 1.00% | 9.00% | 1.00% | 0.25% | 1.00% | 54% | 70% | 56% | 73% | 48% | 62% | 51% | 66% | 64% | 83% | 53% | 53% | 54% | 54% |
| 7532 | 0.25% | 0.25% | 9.00% | 0.25% | 1.00% | 45% | 58% | 42% | 55% | 47% | 61% | 40% | 52% | 54% | 70% | 45% | 45% | 47% | 47% |
| 7533 | 1.00% | 0.25% | 9.00% | 0.25% | 1.00% | 47% | 60% | 43% | 56% | 50% | 65% | 42% | 55% | 56% | 73% | 47% | 47% | 49% | 49% |
| 7534 | 9.00% | 0.25% | 9.00% | 0.25% | 1.00% | 43% | 55% | 41% | 53% | 45% | 59% | 39% | 51% | 53% | 69% | 43% | 43% | 46% | 46% |
| 7535 | 0.00% | 1.00% | 9.00% | 0.25% | 1.00% | 49% | 64% | 49% | 64% | 49% | 64% | 45% | 59% | 61% | 79% | 49% | 49% | 52% | 52% |
| 7536 | 0.25% | 1.00% | 9.00% | 0.25% | 1.00% | 51% | 66% | 50% | 65% | 51% | 66% | 46% | 60% | 62% | 81% | 51% | 51% | 53% | 53% |
| 7537 | 9.00% | 1.00% | 9.00% | 0.25% | 1.00% | 49% | 64% | 49% | 64% | 49% | 64% | 45% | 59% | 61% | 79% | 49% | 49% | 52% | 52% |
| 7538 | 1.00% | 9.00% | 9.00% | 0.25% | 1.00% | 64% | 83% | 64% | 83% | 62% | 81% | 58% | 75% | 78% | 100% | 63% | 63% | 66% | 66% |
| 7539 | 0.25% | 0.00% | 0.00% | 1.00% | 1.00% | 28% | 36% | 26% | 34% | 25% | 33% | 28% | 36% | 34% | 44% | 26% | 26% | 29% | 29% |
| 7540 | 1.00% | 0.25% | 0.00% | 1.00% | 1.00% | 35% | 45% | 31% | 40% | 31% | 40% | 33% | 43% | 39% | 51% | 32% | 32% | 34% | 34% |
| 7541 | 0.00% | 1.00% | 0.00% | 1.00% | 1.00% | 37% | 48% | 37% | 48% | 30% | 39% | 36% | 47% | 44% | 57% | 35% | 35% | 37% | 37% |
| 7542 | 0.25% | 1.00% | 0.00% | 1.00% | 1.00% | 39% | 51% | 38% | 49% | 32% | 42% | 37% | 48% | 45% | 59% | 36% | 36% | 38% | 38% |
| 7543 | 1.00% | 1.00% | 0.00% | 1.00% | 1.00% | 41% | 53% | 39% | 51% | 35% | 46% | 39% | 51% | 47% | 61% | 38% | 38% | 40% | 40% |
| 7544 | 0.00% | 0.00% | 0.25% | 1.00% | 1.00% | 31% | 40% | 29% | 38% | 30% | 39% | 34% | 44% | 40% | 52% | 30% | 30% | 35% | 35% |
| 7545 | 1.00% | 0.00% | 0.25% | 1.00% | 1.00% | 35% | 46% | 31% | 40% | 35% | 46% | 37% | 48% | 43% | 56% | 34% | 34% | 38% | 38% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7546 | 0.25% | 0.25% | 0.25% | 1.00% | 1.00% | 38% | 49% | 34% | 44% | 35% | 46% | 38% | 49% | 44% | 57% | 36% | 36% | 39% | 39% |
| 7547 | 1.00% | 0.25% | 0.25% | 1.00% | 1.00% | 40% | 51% | 35% | 46% | 38% | 49% | 40% | 52% | 46% | 60% | 38% | 38% | 41% | 41% |
| 7548 | 9.00% | 0.25% | 0.25% | 1.00% | 1.00% | 36% | 46% | 33% | 43% | 33% | 43% | 37% | 48% | 43% | 56% | 34% | 34% | 38% | 38% |
| 7549 | 0.00% | 1.00% | 0.25% | 1.00% | 1.00% | 42% | 55% | 41% | 53% | 37% | 48% | 43% | 56% | 51% | 66% | 40% | 40% | 44% | 44% |
| 7550 | 0.25% | 1.00% | 0.25% | 1.00% | 1.00% | 44% | 57% | 42% | 55% | 39% | 51% | 44% | 57% | 52% | 68% | 42% | 42% | 45% | 45% |
| 7551 | 1.00% | 1.00% | 0.25% | 1.00% | 1.00% | 46% | 60% | 43% | 56% | 42% | 55% | 46% | 60% | 54% | 70% | 44% | 44% | 47% | 47% |
| 7552 | 9.00% | 1.00% | 0.25% | 1.00% | 1.00% | 42% | 55% | 41% | 53% | 37% | 48% | 43% | 56% | 51% | 66% | 40% | 40% | 44% | 44% |
| 7553 | 0.25% | 9.00% | 0.25% | 1.00% | 1.00% | 55% | 72% | 55% | 72% | 47% | 61% | 54% | 70% | 66% | 86% | 52% | 52% | 56% | 56% |
| 7554 | 1.00% | 9.00% | 0.25% | 1.00% | 1.00% | 57% | 74% | 56% | 73% | 50% | 65% | 56% | 73% | 68% | 88% | 54% | 54% | 58% | 58% |
| 7555 | 9.00% | 9.00% | 0.25% | 1.00% | 1.00% | 53% | 69% | 54% | 70% | 45% | 59% | 53% | 69% | 65% | 85% | 51% | 51% | 54% | 54% |
| 7556 | 0.00% | 0.00% | 1.00% | 1.00% | 1.00% | 36% | 47% | 36% | 47% | 35% | 46% | 36% | 47% | 45% | 59% | 36% | 36% | 39% | 39% |
| 7557 | 0.25% | 0.00% | 1.00% | 1.00% | 1.00% | 38% | 49% | 37% | 48% | 37% | 48% | 37% | 48% | 46% | 60% | 37% | 37% | 40% | 40% |
| 7558 | 1.00% | 0.00% | 1.00% | 1.00% | 1.00% | 40% | 52% | 38% | 49% | 40% | 52% | 39% | 51% | 48% | 62% | 39% | 39% | 42% | 42% |
| 7559 | 0.00% | 0.25% | 1.00% | 1.00% | 1.00% | 41% | 53% | 40% | 52% | 38% | 49% | 39% | 51% | 48% | 62% | 40% | 40% | 42% | 42% |
| 7560 | 1.00% | 0.25% | 1.00% | 1.00% | 1.00% | 45% | 58% | 42% | 55% | 43% | 56% | 42% | 55% | 51% | 66% | 43% | 43% | 45% | 45% |
| 7561 | 9.00% | 0.25% | 1.00% | 1.00% | 1.00% | 41% | 53% | 40% | 52% | 38% | 49% | 39% | 51% | 48% | 62% | 40% | 40% | 42% | 42% |
| 7562 | 0.00% | 1.00% | 1.00% | 1.00% | 1.00% | 47% | 61% | 48% | 62% | 42% | 55% | 45% | 59% | 56% | 73% | 46% | 46% | 48% | 48% |
| 7563 | 0.25% | 1.00% | 1.00% | 1.00% | 1.00% | 49% | 64% | 49% | 64% | 44% | 57% | 46% | 60% | 57% | 74% | 47% | 47% | 49% | 49% |
| 7564 | 1.00% | 1.00% | 1.00% | 1.00% | 1.00% | 51% | 66% | 50% | 65% | 47% | 61% | 48% | 62% | 59% | 77% | 49% | 49% | 51% | 51% |
| 7565 | 9.00% | 1.00% | 1.00% | 1.00% | 1.00% | 47% | 61% | 48% | 62% | 42% | 55% | 45% | 59% | 56% | 73% | 46% | 46% | 48% | 48% |
| 7566 | 0.00% | 9.00% | 1.00% | 1.00% | 1.00% | 58% | 75% | 61% | 79% | 50% | 65% | 55% | 72% | 70% | 91% | 56% | 56% | 58% | 58% |
| 7567 | 0.25% | 9.00% | 1.00% | 1.00% | 1.00% | 60% | 78% | 62% | 81% | 52% | 68% | 56% | 73% | 71% | 92% | 58% | 58% | 60% | 60% |
| 7568 | 1.00% | 9.00% | 1.00% | 1.00% | 1.00% | 62% | 81% | 63% | 82% | 55% | 72% | 58% | 75% | 73% | 95% | 60% | 60% | 62% | 62% |
| 7569 | 0.25% | 0.25% | 9.00% | 1.00% | 1.00% | 53% | 68% | 49% | 64% | 54% | 70% | 47% | 61% | 63% | 82% | 52% | 52% | 55% | 55% |
| 7570 | 1.00% | 0.25% | 9.00% | 1.00% | 1.00% | 55% | 71% | 50% | 65% | 57% | 74% | 49% | 64% | 65% | 85% | 54% | 54% | 57% | 57% |

Fig. 27

| Formula # | Gamma Dodecalactone | Apritone | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7571 | 9.00% | 0.25% | 9.00% | 1.00% | 1.00% | 51% | 66% | 48% | 62% | 52% | 68% | 46% | 60% | 62% | 81% | 50% | 50% | 53% | 53% |
| 7572 | 0.25% | 1.00% | 9.00% | 1.00% | 1.00% | 59% | 77% | 57% | 74% | 58% | 75% | 53% | 69% | 71% | 92% | 58% | 58% | 61% | 61% |
| 7573 | 0.00% | 0.25% | 0.00% | 9.00% | 1.00% | 53% | 68% | 49% | 64% | 42% | 55% | 52% | 68% | 56% | 73% | 48% | 48% | 50% | 50% |
| 7574 | 0.00% | 0.00% | 0.25% | 9.00% | 1.00% | 53% | 69% | 49% | 64% | 46% | 60% | 56% | 73% | 60% | 78% | 49% | 49% | 54% | 54% |
| 7575 | 0.25% | 0.00% | 0.25% | 9.00% | 1.00% | 55% | 72% | 50% | 65% | 48% | 62% | 57% | 74% | 61% | 79% | 51% | 51% | 55% | 55% |
| 7576 | 0.00% | 0.25% | 0.25% | 9.00% | 1.00% | 58% | 75% | 53% | 69% | 49% | 64% | 59% | 77% | 63% | 82% | 53% | 53% | 57% | 57% |
| 7577 | 0.25% | 0.25% | 0.25% | 9.00% | 1.00% | 60% | 77% | 54% | 70% | 51% | 66% | 60% | 78% | 64% | 83% | 55% | 55% | 58% | 58% |
| 7578 | 1.00% | 0.25% | 0.25% | 9.00% | 1.00% | 62% | 80% | 55% | 72% | 54% | 70% | 62% | 81% | 66% | 86% | 57% | 57% | 61% | 61% |
| 7579 | 9.00% | 0.25% | 0.25% | 9.00% | 1.00% | 58% | 75% | 53% | 69% | 49% | 64% | 59% | 77% | 63% | 82% | 53% | 53% | 57% | 57% |
| 7580 | 0.00% | 1.00% | 0.25% | 9.00% | 1.00% | 64% | 83% | 61% | 79% | 53% | 69% | 65% | 85% | 71% | 92% | 59% | 59% | 63% | 63% |
| 7581 | 0.25% | 1.00% | 0.25% | 9.00% | 1.00% | 66% | 86% | 62% | 81% | 55% | 72% | 66% | 86% | 72% | 94% | 61% | 61% | 64% | 64% |
| 7582 | 1.00% | 1.00% | 0.25% | 9.00% | 1.00% | 68% | 88% | 63% | 82% | 58% | 75% | 68% | 88% | 74% | 96% | 63% | 63% | 67% | 67% |
| 7583 | 0.25% | 9.00% | 0.25% | 9.00% | 1.00% | 77% | 100% | 75% | 98% | 63% | 82% | 76% | 99% | 86% | 100% | 72% | 72% | 75% | 75% |
| 7584 | 0.25% | 0.00% | 1.00% | 9.00% | 1.00% | 60% | 78% | 57% | 74% | 53% | 69% | 59% | 77% | 66% | 86% | 57% | 57% | 59% | 59% |
| 7585 | 1.00% | 0.25% | 1.00% | 9.00% | 1.00% | 67% | 86% | 62% | 81% | 59% | 77% | 64% | 83% | 71% | 92% | 63% | 63% | 65% | 65% |
| 7586 | 9.00% | 0.25% | 1.00% | 9.00% | 1.00% | 63% | 81% | 60% | 78% | 54% | 70% | 61% | 79% | 68% | 88% | 59% | 59% | 61% | 61% |
| 7587 | 0.00% | 1.00% | 1.00% | 9.00% | 1.00% | 69% | 90% | 68% | 88% | 58% | 75% | 67% | 87% | 76% | 99% | 65% | 65% | 67% | 67% |
| 7588 | 0.25% | 1.00% | 1.00% | 9.00% | 1.00% | 71% | 92% | 69% | 90% | 60% | 78% | 68% | 88% | 77% | 100% | 67% | 67% | 68% | 68% |
| 7589 | 1.00% | 1.00% | 1.00% | 9.00% | 1.00% | 73% | 95% | 70% | 91% | 63% | 82% | 70% | 91% | 79% | 100% | 69% | 69% | 71% | 71% |
| 7590 | 0.25% | 0.25% | 9.00% | 9.00% | 1.00% | 75% | 97% | 69% | 90% | 70% | 91% | 69% | 90% | 83% | 100% | 71% | 71% | 74% | 74% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7591 | 0.25% | 0.25% | 0.00% | 0.00% | 0.00% | 7% | 8% | 5% | 7% | 5% | 7% | 4% | 5% | 4% | 5% | 6% | 6% | 4% | 4% |
| 7592 | 1.00% | 0.25% | 0.00% | 0.00% | 0.00% | 9% | 11% | 6% | 8% | 8% | 10% | 6% | 8% | 6% | 8% | 8% | 8% | 7% | 7% |
| 7593 | 0.25% | 1.00% | 0.00% | 0.00% | 0.00% | 13% | 17% | 13% | 17% | 9% | 12% | 10% | 13% | 12% | 16% | 12% | 12% | 10% | 10% |
| 7594 | 1.00% | 1.00% | 0.00% | 0.00% | 0.00% | 15% | 20% | 14% | 18% | 12% | 16% | 12% | 16% | 14% | 18% | 14% | 14% | 13% | 13% |
| 7595 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 7596 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 7597 | 0.00% | 0.25% | 0.25% | 0.00% | 0.00% | 10% | 12% | 8% | 10% | 10% | 13% | 10% | 13% | 10% | 13% | 9% | 9% | 10% | 10% |
| 7598 | 0.25% | 0.25% | 0.25% | 0.00% | 0.00% | 12% | 15% | 9% | 12% | 12% | 16% | 11% | 14% | 11% | 14% | 11% | 11% | 11% | 11% |
| 7599 | 0.00% | 1.00% | 0.25% | 0.00% | 0.00% | 16% | 21% | 16% | 21% | 14% | 18% | 16% | 21% | 18% | 23% | 15% | 15% | 16% | 16% |
| 7600 | 1.00% | 1.00% | 0.25% | 0.00% | 0.00% | 20% | 26% | 18% | 23% | 19% | 25% | 19% | 25% | 21% | 27% | 19% | 19% | 20% | 20% |
| 7601 | 1.00% | 9.00% | 0.25% | 0.00% | 0.00% | 31% | 40% | 31% | 40% | 27% | 35% | 29% | 38% | 35% | 46% | 30% | 30% | 30% | 30% |
| 7602 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 7603 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 7604 | 0.00% | 0.25% | 1.00% | 0.00% | 0.00% | 15% | 19% | 15% | 20% | 15% | 20% | 12% | 16% | 15% | 20% | 15% | 15% | 14% | 14% |
| 7605 | 1.00% | 0.25% | 1.00% | 0.00% | 0.00% | 19% | 24% | 17% | 22% | 20% | 26% | 15% | 20% | 18% | 23% | 19% | 19% | 18% | 18% |
| 7606 | 0.00% | 1.00% | 1.00% | 0.00% | 0.00% | 21% | 27% | 23% | 30% | 19% | 25% | 18% | 23% | 23% | 30% | 21% | 21% | 20% | 20% |
| 7607 | 0.25% | 1.00% | 1.00% | 0.00% | 0.00% | 23% | 30% | 24% | 31% | 21% | 27% | 19% | 25% | 24% | 31% | 23% | 23% | 21% | 21% |
| 7608 | 1.00% | 1.00% | 1.00% | 0.00% | 0.00% | 25% | 33% | 25% | 33% | 24% | 31% | 21% | 27% | 26% | 34% | 25% | 25% | 24% | 24% |
| 7609 | 9.00% | 1.00% | 1.00% | 0.00% | 0.00% | 21% | 27% | 23% | 30% | 19% | 25% | 18% | 23% | 23% | 30% | 21% | 21% | 20% | 20% |
| 7610 | 1.00% | 9.00% | 1.00% | 0.00% | 0.00% | 36% | 47% | 38% | 49% | 32% | 42% | 31% | 40% | 40% | 52% | 35% | 35% | 34% | 34% |
| 7611 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 7612 | 0.00% | 0.25% | 9.00% | 0.00% | 0.00% | 25% | 32% | 23% | 30% | 29% | 38% | 19% | 25% | 29% | 38% | 26% | 26% | 26% | 26% |
| 7613 | 0.25% | 0.25% | 9.00% | 0.00% | 0.00% | 27% | 34% | 24% | 31% | 31% | 40% | 20% | 26% | 30% | 39% | 27% | 27% | 27% | 27% |
| 7614 | 1.00% | 0.25% | 9.00% | 0.00% | 0.00% | 29% | 37% | 25% | 33% | 34% | 44% | 22% | 29% | 32% | 42% | 29% | 29% | 29% | 29% |
| 7615 | 0.25% | 1.00% | 9.00% | 0.00% | 0.00% | 33% | 43% | 32% | 42% | 35% | 46% | 26% | 34% | 38% | 49% | 33% | 33% | 33% | 33% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7616 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 7617 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 7618 | 0.00% | 0.25% | 0.00% | 0.25% | 0.00% | 13% | 16% | 12% | 16% | 12% | 16% | 10% | 13% | 10% | 13% | 12% | 12% | 11% | 11% |
| 7619 | 0.25% | 0.25% | 0.00% | 0.25% | 0.00% | 15% | 19% | 13% | 17% | 14% | 18% | 11% | 14% | 11% | 14% | 14% | 14% | 12% | 12% |
| 7620 | 9.00% | 0.25% | 0.00% | 0.25% | 0.00% | 13% | 16% | 12% | 16% | 12% | 16% | 10% | 13% | 10% | 13% | 12% | 12% | 11% | 11% |
| 7621 | 1.00% | 1.00% | 0.00% | 0.25% | 0.00% | 23% | 30% | 22% | 29% | 21% | 27% | 19% | 25% | 21% | 27% | 22% | 22% | 20% | 20% |
| 7622 | 1.00% | 9.00% | 0.00% | 0.25% | 0.00% | 34% | 44% | 35% | 46% | 29% | 38% | 29% | 38% | 35% | 46% | 33% | 33% | 31% | 31% |
| 7623 | 0.00% | 0.00% | 0.25% | 0.25% | 0.00% | 13% | 17% | 12% | 16% | 16% | 21% | 14% | 18% | 14% | 18% | 14% | 14% | 15% | 15% |
| 7624 | 0.25% | 0.00% | 0.25% | 0.25% | 0.00% | 15% | 20% | 13% | 17% | 18% | 23% | 15% | 20% | 15% | 20% | 15% | 15% | 16% | 16% |
| 7625 | 0.00% | 0.25% | 0.25% | 0.25% | 0.00% | 18% | 23% | 16% | 21% | 19% | 25% | 17% | 22% | 17% | 22% | 18% | 18% | 18% | 18% |
| 7626 | 0.25% | 0.25% | 0.25% | 0.25% | 0.00% | 20% | 25% | 17% | 22% | 21% | 27% | 18% | 23% | 18% | 23% | 19% | 19% | 19% | 19% |
| 7627 | 1.00% | 0.25% | 0.25% | 0.25% | 0.00% | 22% | 28% | 18% | 23% | 24% | 31% | 20% | 26% | 20% | 26% | 21% | 21% | 21% | 21% |
| 7628 | 9.00% | 0.25% | 0.25% | 0.25% | 0.00% | 18% | 23% | 16% | 21% | 19% | 25% | 17% | 22% | 17% | 22% | 18% | 18% | 18% | 18% |
| 7629 | 0.25% | 1.00% | 0.25% | 0.25% | 0.00% | 26% | 34% | 25% | 33% | 25% | 33% | 24% | 31% | 26% | 34% | 25% | 25% | 25% | 25% |
| 7630 | 9.00% | 1.00% | 0.25% | 0.25% | 0.00% | 24% | 31% | 24% | 31% | 23% | 30% | 23% | 30% | 25% | 33% | 24% | 24% | 24% | 24% |
| 7631 | 0.25% | 9.00% | 0.25% | 0.25% | 0.00% | 37% | 48% | 38% | 49% | 33% | 43% | 34% | 44% | 40% | 52% | 36% | 36% | 36% | 36% |
| 7632 | 1.00% | 9.00% | 0.25% | 0.25% | 0.00% | 39% | 51% | 39% | 51% | 36% | 47% | 36% | 47% | 42% | 55% | 38% | 38% | 38% | 38% |
| 7633 | 9.00% | 9.00% | 0.25% | 0.25% | 0.00% | 35% | 46% | 37% | 48% | 31% | 40% | 33% | 43% | 39% | 51% | 34% | 34% | 34% | 34% |
| 7634 | 0.00% | 0.00% | 1.00% | 0.25% | 0.00% | 18% | 23% | 19% | 25% | 21% | 27% | 16% | 21% | 19% | 25% | 19% | 19% | 19% | 19% |
| 7635 | 1.00% | 0.00% | 1.00% | 0.25% | 0.00% | 22% | 29% | 21% | 27% | 26% | 34% | 19% | 25% | 22% | 29% | 23% | 23% | 22% | 22% |
| 7636 | 0.00% | 0.25% | 1.00% | 0.25% | 0.00% | 23% | 29% | 23% | 30% | 24% | 31% | 19% | 25% | 22% | 29% | 23% | 23% | 22% | 22% |
| 7637 | 0.25% | 0.25% | 1.00% | 0.25% | 0.00% | 25% | 32% | 24% | 31% | 26% | 34% | 20% | 26% | 23% | 30% | 25% | 25% | 23% | 23% |
| 7638 | 1.00% | 0.25% | 1.00% | 0.25% | 0.00% | 27% | 34% | 25% | 33% | 29% | 38% | 22% | 29% | 25% | 33% | 27% | 27% | 25% | 25% |
| 7639 | 9.00% | 0.25% | 1.00% | 0.25% | 0.00% | 23% | 29% | 23% | 30% | 24% | 31% | 19% | 25% | 22% | 29% | 23% | 23% | 22% | 22% |
| 7640 | 0.00% | 1.00% | 1.00% | 0.25% | 0.00% | 29% | 38% | 31% | 40% | 28% | 36% | 25% | 33% | 30% | 39% | 29% | 29% | 28% | 28% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7641 | 0.25% | 1.00% | 1.00% | 0.25% | 0.00% | 31% | 40% | 32% | 42% | 30% | 39% | 26% | 34% | 31% | 40% | 31% | 31% | 29% | 29% |
| 7642 | 1.00% | 1.00% | 1.00% | 0.25% | 0.00% | 33% | 43% | 33% | 43% | 33% | 43% | 28% | 36% | 33% | 43% | 33% | 33% | 31% | 31% |
| 7643 | 9.00% | 1.00% | 1.00% | 0.25% | 0.00% | 29% | 38% | 31% | 40% | 28% | 36% | 25% | 33% | 30% | 39% | 29% | 29% | 28% | 28% |
| 7644 | 0.00% | 9.00% | 1.00% | 0.25% | 0.00% | 40% | 52% | 44% | 57% | 36% | 47% | 35% | 46% | 44% | 57% | 40% | 40% | 38% | 38% |
| 7645 | 0.25% | 9.00% | 1.00% | 0.25% | 0.00% | 42% | 55% | 45% | 59% | 38% | 49% | 36% | 47% | 45% | 59% | 42% | 42% | 40% | 40% |
| 7646 | 1.00% | 9.00% | 1.00% | 0.25% | 0.00% | 44% | 57% | 46% | 60% | 41% | 53% | 38% | 49% | 47% | 61% | 44% | 44% | 42% | 42% |
| 7647 | 0.25% | 0.25% | 9.00% | 0.25% | 0.00% | 35% | 45% | 32% | 42% | 40% | 52% | 27% | 35% | 37% | 48% | 36% | 36% | 35% | 35% |
| 7648 | 1.00% | 0.25% | 9.00% | 0.25% | 0.00% | 37% | 47% | 33% | 43% | 43% | 56% | 29% | 38% | 39% | 51% | 38% | 38% | 37% | 37% |
| 7649 | 9.00% | 0.25% | 9.00% | 0.25% | 0.00% | 33% | 42% | 31% | 40% | 38% | 49% | 26% | 34% | 36% | 47% | 34% | 34% | 33% | 33% |
| 7650 | 0.00% | 1.00% | 9.00% | 0.25% | 0.00% | 39% | 51% | 39% | 51% | 42% | 55% | 32% | 42% | 44% | 57% | 40% | 40% | 39% | 39% |
| 7651 | 0.25% | 1.00% | 9.00% | 0.25% | 0.00% | 41% | 53% | 40% | 52% | 44% | 57% | 33% | 43% | 45% | 59% | 42% | 42% | 41% | 41% |
| 7652 | 9.00% | 1.00% | 9.00% | 0.25% | 0.00% | 39% | 51% | 39% | 51% | 42% | 55% | 32% | 42% | 44% | 57% | 40% | 40% | 39% | 39% |
| 7653 | 1.00% | 9.00% | 9.00% | 0.25% | 0.00% | 54% | 70% | 54% | 70% | 55% | 72% | 45% | 59% | 61% | 79% | 54% | 54% | 54% | 54% |
| 7654 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 7655 | 1.00% | 0.25% | 0.00% | 1.00% | 0.00% | 34% | 44% | 27% | 35% | 30% | 39% | 28% | 36% | 26% | 34% | 30% | 30% | 28% | 28% |
| 7656 | 0.00% | 1.00% | 0.00% | 1.00% | 0.00% | 36% | 47% | 33% | 43% | 29% | 38% | 31% | 40% | 31% | 40% | 33% | 33% | 30% | 30% |
| 7657 | 0.25% | 1.00% | 0.00% | 1.00% | 0.00% | 38% | 49% | 34% | 44% | 31% | 40% | 32% | 42% | 32% | 42% | 34% | 34% | 32% | 32% |
| 7658 | 1.00% | 1.00% | 0.00% | 1.00% | 0.00% | 40% | 52% | 35% | 46% | 34% | 44% | 34% | 44% | 34% | 44% | 36% | 36% | 34% | 34% |
| 7659 | 0.00% | 0.00% | 0.25% | 1.00% | 0.00% | 30% | 39% | 25% | 33% | 29% | 38% | 29% | 38% | 27% | 35% | 28% | 28% | 28% | 28% |
| 7660 | 1.00% | 0.00% | 0.25% | 1.00% | 0.00% | 34% | 44% | 27% | 35% | 34% | 44% | 32% | 42% | 30% | 39% | 32% | 32% | 32% | 32% |
| 7661 | 0.25% | 0.25% | 0.25% | 1.00% | 0.00% | 37% | 47% | 30% | 39% | 34% | 44% | 33% | 43% | 31% | 40% | 34% | 34% | 33% | 33% |
| 7662 | 1.00% | 0.25% | 0.25% | 1.00% | 0.00% | 39% | 50% | 31% | 40% | 37% | 48% | 35% | 46% | 33% | 43% | 36% | 36% | 35% | 35% |
| 7663 | 9.00% | 0.25% | 0.25% | 1.00% | 0.00% | 35% | 45% | 29% | 38% | 32% | 42% | 32% | 42% | 30% | 39% | 32% | 32% | 31% | 31% |
| 7664 | 0.00% | 1.00% | 0.25% | 1.00% | 0.00% | 41% | 53% | 37% | 48% | 36% | 47% | 38% | 49% | 38% | 49% | 38% | 38% | 37% | 37% |
| 7665 | 0.25% | 1.00% | 0.25% | 1.00% | 0.00% | 43% | 56% | 38% | 49% | 38% | 49% | 39% | 51% | 39% | 51% | 40% | 40% | 39% | 39% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7666 | 1.00% | 1.00% | 0.25% | 1.00% | 0.00% | 45% | 59% | 39% | 51% | 41% | 53% | 41% | 53% | 41% | 53% | 42% | 42% | 41% | 41% |
| 7667 | 9.00% | 1.00% | 0.25% | 1.00% | 0.00% | 41% | 53% | 37% | 48% | 36% | 47% | 38% | 49% | 38% | 49% | 38% | 38% | 37% | 37% |
| 7668 | 0.25% | 9.00% | 0.25% | 1.00% | 0.00% | 54% | 70% | 51% | 66% | 46% | 60% | 49% | 64% | 53% | 69% | 50% | 50% | 49% | 49% |
| 7669 | 1.00% | 9.00% | 0.25% | 1.00% | 0.00% | 56% | 73% | 52% | 68% | 49% | 64% | 51% | 66% | 55% | 72% | 52% | 52% | 52% | 52% |
| 7670 | 9.00% | 9.00% | 0.25% | 1.00% | 0.00% | 52% | 68% | 50% | 65% | 44% | 57% | 48% | 62% | 52% | 68% | 49% | 49% | 48% | 48% |
| 7671 | 0.00% | 0.00% | 1.00% | 1.00% | 0.00% | 35% | 46% | 32% | 42% | 34% | 44% | 31% | 40% | 32% | 42% | 34% | 34% | 32% | 32% |
| 7672 | 0.25% | 0.00% | 1.00% | 1.00% | 0.00% | 37% | 48% | 33% | 43% | 36% | 47% | 32% | 42% | 33% | 43% | 35% | 35% | 34% | 34% |
| 7673 | 1.00% | 0.00% | 1.00% | 1.00% | 0.00% | 39% | 51% | 34% | 44% | 39% | 51% | 34% | 44% | 35% | 46% | 37% | 37% | 36% | 36% |
| 7674 | 0.00% | 0.25% | 1.00% | 1.00% | 0.00% | 40% | 51% | 36% | 47% | 37% | 48% | 34% | 44% | 35% | 46% | 38% | 38% | 35% | 35% |
| 7675 | 1.00% | 0.25% | 1.00% | 1.00% | 0.00% | 44% | 57% | 38% | 49% | 42% | 55% | 37% | 48% | 38% | 49% | 41% | 41% | 39% | 39% |
| 7676 | 9.00% | 0.25% | 1.00% | 1.00% | 0.00% | 40% | 51% | 36% | 47% | 37% | 48% | 34% | 44% | 35% | 46% | 38% | 38% | 35% | 35% |
| 7677 | 0.00% | 1.00% | 1.00% | 1.00% | 0.00% | 46% | 60% | 44% | 57% | 41% | 53% | 40% | 52% | 43% | 56% | 44% | 44% | 41% | 41% |
| 7678 | 0.25% | 1.00% | 1.00% | 1.00% | 0.00% | 48% | 62% | 45% | 59% | 43% | 56% | 41% | 53% | 44% | 57% | 45% | 45% | 43% | 43% |
| 7679 | 1.00% | 1.00% | 1.00% | 1.00% | 0.00% | 50% | 65% | 46% | 60% | 46% | 60% | 43% | 56% | 46% | 60% | 47% | 47% | 45% | 45% |
| 7680 | 9.00% | 1.00% | 1.00% | 1.00% | 0.00% | 46% | 60% | 44% | 57% | 41% | 53% | 40% | 52% | 43% | 56% | 44% | 44% | 41% | 41% |
| 7681 | 0.00% | 9.00% | 1.00% | 1.00% | 0.00% | 57% | 74% | 57% | 74% | 49% | 64% | 50% | 65% | 57% | 74% | 54% | 54% | 52% | 52% |
| 7682 | 0.25% | 9.00% | 1.00% | 1.00% | 0.00% | 59% | 77% | 58% | 75% | 51% | 66% | 51% | 66% | 58% | 75% | 56% | 56% | 53% | 53% |
| 7683 | 1.00% | 9.00% | 1.00% | 1.00% | 0.00% | 61% | 79% | 59% | 77% | 54% | 70% | 53% | 69% | 60% | 78% | 58% | 58% | 56% | 56% |
| 7684 | 0.25% | 0.25% | 9.00% | 1.00% | 0.00% | 52% | 67% | 45% | 59% | 53% | 69% | 42% | 55% | 50% | 65% | 50% | 50% | 48% | 48% |
| 7685 | 1.00% | 0.25% | 9.00% | 1.00% | 0.00% | 54% | 70% | 46% | 60% | 56% | 73% | 44% | 57% | 52% | 68% | 52% | 52% | 51% | 51% |
| 7686 | 9.00% | 0.25% | 9.00% | 1.00% | 0.00% | 50% | 64% | 44% | 57% | 51% | 66% | 41% | 53% | 49% | 64% | 48% | 48% | 47% | 47% |
| 7687 | 0.25% | 1.00% | 9.00% | 1.00% | 0.00% | 58% | 75% | 53% | 69% | 57% | 74% | 48% | 62% | 58% | 75% | 56% | 56% | 54% | 54% |
| 7688 | 0.00% | 0.25% | 0.00% | 9.00% | 0.00% | 47% | 60% | 39% | 51% | 37% | 48% | 41% | 53% | 37% | 48% | 41% | 41% | 38% | 38% |
| 7689 | 0.00% | 0.00% | 0.25% | 9.00% | 0.00% | 47% | 61% | 39% | 51% | 41% | 53% | 45% | 59% | 41% | 53% | 42% | 42% | 42% | 42% |
| 7690 | 0.25% | 0.00% | 0.25% | 9.00% | 0.00% | 49% | 64% | 40% | 52% | 43% | 56% | 46% | 60% | 42% | 55% | 44% | 44% | 44% | 44% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7691 | 0.00% | 0.25% | 0.25% | 9.00% | 0.00% | 52% | 67% | 43% | 56% | 44% | 57% | 48% | 62% | 44% | 57% | 46% | 46% | 45% | 45% |
| 7692 | 0.25% | 0.25% | 0.25% | 9.00% | 0.00% | 54% | 70% | 44% | 57% | 46% | 60% | 49% | 64% | 45% | 59% | 48% | 48% | 47% | 47% |
| 7693 | 1.00% | 0.25% | 0.25% | 9.00% | 0.00% | 56% | 72% | 45% | 59% | 49% | 64% | 51% | 66% | 47% | 61% | 50% | 50% | 49% | 49% |
| 7694 | 9.00% | 0.25% | 0.25% | 9.00% | 0.00% | 52% | 67% | 43% | 56% | 44% | 57% | 48% | 62% | 44% | 57% | 46% | 46% | 45% | 45% |
| 7695 | 0.00% | 1.00% | 0.25% | 9.00% | 0.00% | 58% | 75% | 51% | 66% | 48% | 62% | 54% | 70% | 52% | 68% | 52% | 52% | 51% | 51% |
| 7696 | 0.25% | 1.00% | 0.25% | 9.00% | 0.00% | 60% | 78% | 52% | 68% | 50% | 65% | 55% | 72% | 53% | 69% | 54% | 54% | 53% | 53% |
| 7697 | 1.00% | 1.00% | 0.25% | 9.00% | 0.00% | 62% | 81% | 53% | 69% | 53% | 69% | 57% | 74% | 55% | 72% | 56% | 56% | 55% | 55% |
| 7698 | 0.25% | 9.00% | 0.25% | 9.00% | 0.00% | 71% | 92% | 65% | 85% | 58% | 75% | 65% | 85% | 67% | 87% | 65% | 65% | 63% | 63% |
| 7699 | 0.25% | 0.00% | 1.00% | 9.00% | 0.00% | 54% | 70% | 47% | 61% | 48% | 62% | 48% | 62% | 47% | 61% | 50% | 50% | 48% | 48% |
| 7700 | 1.00% | 0.25% | 1.00% | 9.00% | 0.00% | 61% | 79% | 52% | 68% | 54% | 70% | 53% | 69% | 52% | 68% | 56% | 56% | 53% | 53% |
| 7701 | 9.00% | 0.25% | 1.00% | 9.00% | 0.00% | 57% | 73% | 50% | 65% | 49% | 64% | 50% | 65% | 49% | 64% | 52% | 52% | 49% | 49% |
| 7702 | 0.00% | 1.00% | 1.00% | 9.00% | 0.00% | 63% | 82% | 58% | 75% | 53% | 69% | 56% | 73% | 57% | 74% | 58% | 58% | 55% | 55% |
| 7703 | 0.25% | 1.00% | 1.00% | 9.00% | 0.00% | 65% | 85% | 59% | 77% | 55% | 72% | 57% | 74% | 58% | 75% | 60% | 60% | 57% | 57% |
| 7704 | 1.00% | 1.00% | 1.00% | 9.00% | 0.00% | 67% | 87% | 60% | 78% | 58% | 75% | 59% | 77% | 60% | 78% | 62% | 62% | 59% | 59% |
| 7705 | 0.25% | 0.25% | 9.00% | 9.00% | 0.00% | 69% | 89% | 59% | 77% | 65% | 85% | 58% | 75% | 64% | 83% | 64% | 64% | 62% | 62% |
| 7706 | 0.25% | 0.25% | 0.00% | 0.00% | 0.25% | 13% | 16% | 12% | 16% | 11% | 14% | 9% | 12% | 11% | 14% | 12% | 12% | 10% | 10% |
| 7707 | 1.00% | 0.25% | 0.00% | 0.00% | 0.25% | 15% | 19% | 13% | 17% | 14% | 18% | 11% | 14% | 13% | 17% | 14% | 14% | 13% | 13% |
| 7708 | 0.25% | 1.00% | 0.00% | 0.00% | 0.25% | 19% | 25% | 20% | 26% | 15% | 20% | 15% | 20% | 19% | 25% | 18% | 18% | 16% | 16% |
| 7709 | 1.00% | 1.00% | 0.00% | 0.00% | 0.25% | 21% | 27% | 21% | 27% | 18% | 23% | 17% | 22% | 21% | 27% | 20% | 20% | 19% | 19% |
| 7710 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 7711 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 7712 | 0.00% | 0.25% | 0.25% | 0.00% | 0.25% | 16% | 20% | 15% | 20% | 16% | 21% | 15% | 20% | 17% | 22% | 16% | 16% | 16% | 16% |
| 7713 | 0.25% | 0.25% | 0.25% | 0.00% | 0.25% | 18% | 23% | 16% | 21% | 18% | 23% | 16% | 21% | 18% | 23% | 17% | 17% | 17% | 17% |
| 7714 | 0.00% | 1.00% | 0.25% | 0.00% | 0.25% | 22% | 29% | 23% | 30% | 20% | 26% | 21% | 27% | 25% | 33% | 22% | 22% | 22% | 22% |
| 7715 | 1.00% | 1.00% | 0.25% | 0.00% | 0.25% | 26% | 34% | 25% | 33% | 25% | 33% | 24% | 31% | 28% | 36% | 25% | 25% | 26% | 26% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7716 | 1.00% | 9.00% | 0.25% | 0.00% | 0.25% | 37% | 48% | 38% | 49% | 33% | 43% | 34% | 44% | 42% | 55% | 36% | 36% | 36% | 36% |
| 7717 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 7718 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 7719 | 0.00% | 0.25% | 1.00% | 0.00% | 0.25% | 21% | 27% | 22% | 29% | 21% | 27% | 17% | 22% | 22% | 29% | 21% | 21% | 20% | 20% |
| 7720 | 1.00% | 0.25% | 1.00% | 0.00% | 0.25% | 25% | 32% | 24% | 31% | 26% | 34% | 20% | 26% | 25% | 33% | 25% | 25% | 24% | 24% |
| 7721 | 0.00% | 1.00% | 1.00% | 0.00% | 0.25% | 27% | 35% | 30% | 39% | 25% | 33% | 23% | 30% | 30% | 39% | 27% | 27% | 26% | 26% |
| 7722 | 0.25% | 1.00% | 1.00% | 0.00% | 0.25% | 29% | 38% | 31% | 40% | 27% | 35% | 24% | 31% | 31% | 40% | 29% | 29% | 27% | 27% |
| 7723 | 1.00% | 1.00% | 1.00% | 0.00% | 0.25% | 31% | 40% | 32% | 42% | 30% | 39% | 26% | 34% | 33% | 43% | 31% | 31% | 30% | 30% |
| 7724 | 9.00% | 1.00% | 1.00% | 0.00% | 0.25% | 27% | 35% | 30% | 39% | 25% | 33% | 23% | 30% | 30% | 39% | 27% | 27% | 26% | 26% |
| 7725 | 1.00% | 9.00% | 1.00% | 0.00% | 0.25% | 42% | 55% | 45% | 59% | 38% | 49% | 36% | 47% | 47% | 61% | 42% | 42% | 40% | 40% |
| 7726 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 7727 | 0.00% | 0.25% | 9.00% | 0.00% | 0.25% | 31% | 40% | 30% | 39% | 35% | 46% | 24% | 31% | 36% | 47% | 32% | 32% | 32% | 32% |
| 7728 | 0.25% | 0.25% | 9.00% | 0.00% | 0.25% | 33% | 42% | 31% | 40% | 37% | 48% | 25% | 33% | 37% | 48% | 34% | 34% | 33% | 33% |
| 7729 | 1.00% | 0.25% | 9.00% | 0.00% | 0.25% | 35% | 45% | 32% | 42% | 40% | 52% | 27% | 35% | 39% | 51% | 36% | 36% | 35% | 35% |
| 7730 | 0.25% | 1.00% | 9.00% | 0.00% | 0.25% | 39% | 51% | 39% | 51% | 41% | 53% | 31% | 40% | 45% | 59% | 40% | 40% | 39% | 39% |
| 7731 | 0.25% | 0.00% | 0.00% | 0.25% | 0.25% | 16% | 21% | 16% | 21% | 17% | 22% | 13% | 17% | 15% | 20% | 16% | 16% | 15% | 15% |
| 7732 | 1.00% | 0.00% | 0.00% | 0.25% | 0.25% | 18% | 23% | 17% | 22% | 20% | 26% | 15% | 20% | 17% | 22% | 18% | 18% | 17% | 17% |
| 7733 | 0.00% | 0.25% | 0.00% | 0.25% | 0.25% | 19% | 24% | 19% | 25% | 18% | 23% | 15% | 20% | 17% | 22% | 19% | 19% | 17% | 17% |
| 7734 | 0.25% | 0.25% | 0.00% | 0.25% | 0.25% | 21% | 27% | 20% | 26% | 20% | 26% | 16% | 21% | 18% | 23% | 20% | 20% | 18% | 18% |
| 7735 | 9.00% | 0.25% | 0.00% | 0.25% | 0.25% | 19% | 24% | 19% | 25% | 18% | 23% | 15% | 20% | 17% | 22% | 19% | 19% | 17% | 17% |
| 7736 | 1.00% | 1.00% | 0.00% | 0.25% | 0.25% | 29% | 38% | 29% | 38% | 27% | 35% | 24% | 31% | 28% | 36% | 28% | 28% | 26% | 26% |
| 7737 | 1.00% | 9.00% | 0.00% | 0.25% | 0.25% | 40% | 52% | 42% | 55% | 35% | 46% | 34% | 44% | 42% | 55% | 39% | 39% | 37% | 37% |
| 7738 | 0.00% | 0.00% | 0.25% | 0.25% | 0.25% | 19% | 25% | 19% | 25% | 22% | 29% | 19% | 25% | 21% | 27% | 20% | 20% | 21% | 21% |
| 7739 | 0.25% | 0.00% | 0.25% | 0.25% | 0.25% | 21% | 27% | 20% | 26% | 24% | 31% | 20% | 26% | 22% | 29% | 22% | 22% | 22% | 22% |
| 7740 | 0.00% | 0.25% | 0.25% | 0.25% | 0.25% | 24% | 31% | 23% | 30% | 25% | 33% | 22% | 29% | 24% | 31% | 24% | 24% | 24% | 24% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7741 | 0.25% | 0.25% | 0.25% | 0.25% | 0.25% | 26% | 33% | 24% | 31% | 27% | 35% | 23% | 30% | 25% | 33% | 26% | 26% | 25% | 25% |
| 7742 | 1.00% | 0.25% | 0.25% | 0.25% | 0.25% | 28% | 36% | 25% | 33% | 30% | 39% | 25% | 33% | 27% | 35% | 28% | 28% | 27% | 27% |
| 7743 | 9.00% | 0.25% | 0.25% | 0.25% | 0.25% | 24% | 31% | 23% | 30% | 25% | 33% | 22% | 29% | 24% | 31% | 24% | 24% | 24% | 24% |
| 7744 | 0.25% | 1.00% | 0.25% | 0.25% | 0.25% | 32% | 42% | 32% | 42% | 31% | 40% | 29% | 38% | 33% | 43% | 32% | 32% | 31% | 31% |
| 7745 | 9.00% | 1.00% | 0.25% | 0.25% | 0.25% | 30% | 39% | 31% | 40% | 29% | 38% | 28% | 36% | 32% | 42% | 30% | 30% | 30% | 30% |
| 7746 | 0.25% | 9.00% | 0.25% | 0.25% | 0.25% | 43% | 56% | 45% | 59% | 39% | 51% | 39% | 51% | 47% | 61% | 42% | 42% | 42% | 42% |
| 7747 | 1.00% | 9.00% | 0.25% | 0.25% | 0.25% | 45% | 59% | 46% | 60% | 42% | 55% | 41% | 53% | 49% | 64% | 44% | 44% | 44% | 44% |
| 7748 | 9.00% | 9.00% | 0.25% | 0.25% | 0.25% | 41% | 53% | 44% | 57% | 37% | 48% | 38% | 49% | 46% | 60% | 41% | 41% | 40% | 40% |
| 7749 | 0.00% | 0.00% | 1.00% | 0.25% | 0.25% | 24% | 31% | 26% | 34% | 27% | 35% | 21% | 27% | 26% | 34% | 26% | 26% | 25% | 25% |
| 7750 | 1.00% | 0.00% | 1.00% | 0.25% | 0.25% | 28% | 36% | 28% | 36% | 32% | 42% | 24% | 31% | 29% | 38% | 29% | 29% | 28% | 28% |
| 7751 | 0.00% | 0.25% | 1.00% | 0.25% | 0.25% | 29% | 37% | 30% | 39% | 30% | 39% | 24% | 31% | 29% | 38% | 30% | 30% | 28% | 28% |
| 7752 | 0.25% | 0.25% | 1.00% | 0.25% | 0.25% | 31% | 40% | 31% | 40% | 32% | 42% | 25% | 33% | 30% | 39% | 31% | 31% | 29% | 29% |
| 7753 | 1.00% | 0.25% | 1.00% | 0.25% | 0.25% | 33% | 42% | 32% | 42% | 35% | 46% | 27% | 35% | 32% | 42% | 33% | 33% | 31% | 31% |
| 7754 | 9.00% | 0.25% | 1.00% | 0.25% | 0.25% | 29% | 37% | 30% | 39% | 30% | 39% | 24% | 31% | 29% | 38% | 30% | 30% | 28% | 28% |
| 7755 | 0.00% | 1.00% | 1.00% | 0.25% | 0.25% | 35% | 46% | 38% | 49% | 34% | 44% | 30% | 39% | 37% | 48% | 36% | 36% | 34% | 34% |
| 7756 | 0.25% | 1.00% | 1.00% | 0.25% | 0.25% | 37% | 48% | 39% | 51% | 36% | 47% | 31% | 40% | 38% | 49% | 37% | 37% | 35% | 35% |
| 7757 | 1.00% | 1.00% | 1.00% | 0.25% | 0.25% | 39% | 51% | 40% | 52% | 39% | 51% | 33% | 43% | 40% | 52% | 39% | 39% | 37% | 37% |
| 7758 | 9.00% | 1.00% | 1.00% | 0.25% | 0.25% | 35% | 46% | 38% | 49% | 34% | 44% | 30% | 39% | 37% | 48% | 36% | 36% | 34% | 34% |
| 7759 | 0.00% | 9.00% | 1.00% | 0.25% | 0.25% | 46% | 60% | 51% | 66% | 42% | 55% | 40% | 52% | 51% | 66% | 46% | 46% | 44% | 44% |
| 7760 | 0.25% | 9.00% | 1.00% | 0.25% | 0.25% | 48% | 62% | 52% | 68% | 44% | 57% | 41% | 53% | 52% | 68% | 48% | 48% | 46% | 46% |
| 7761 | 1.00% | 9.00% | 1.00% | 0.25% | 0.25% | 50% | 65% | 53% | 69% | 47% | 61% | 43% | 56% | 54% | 70% | 50% | 50% | 48% | 48% |
| 7762 | 0.25% | 0.25% | 9.00% | 0.25% | 0.25% | 41% | 53% | 39% | 51% | 46% | 60% | 32% | 42% | 44% | 57% | 42% | 42% | 41% | 41% |
| 7763 | 1.00% | 0.25% | 9.00% | 0.25% | 0.25% | 43% | 55% | 40% | 52% | 49% | 64% | 34% | 44% | 46% | 60% | 44% | 44% | 43% | 43% |
| 7764 | 9.00% | 0.25% | 9.00% | 0.25% | 0.25% | 39% | 50% | 38% | 49% | 44% | 57% | 31% | 40% | 43% | 56% | 40% | 40% | 39% | 39% |
| 7765 | 0.00% | 1.00% | 9.00% | 0.25% | 0.25% | 45% | 59% | 46% | 60% | 48% | 62% | 37% | 48% | 51% | 66% | 46% | 46% | 45% | 45% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7766 | 0.25% | 1.00% | 9.00% | 0.25% | 0.25% | 47% | 61% | 47% | 61% | 50% | 65% | 38% | 49% | 52% | 68% | 48% | 48% | 47% | 47% |
| 7767 | 9.00% | 1.00% | 9.00% | 0.25% | 0.25% | 45% | 59% | 46% | 60% | 48% | 62% | 37% | 48% | 51% | 66% | 46% | 46% | 45% | 45% |
| 7768 | 1.00% | 9.00% | 9.00% | 0.25% | 0.25% | 60% | 78% | 61% | 79% | 61% | 79% | 50% | 65% | 68% | 88% | 61% | 61% | 60% | 60% |
| 7769 | 0.25% | 0.00% | 0.00% | 1.00% | 0.25% | 33% | 43% | 29% | 38% | 30% | 39% | 28% | 36% | 28% | 36% | 31% | 31% | 29% | 29% |
| 7770 | 1.00% | 0.25% | 0.00% | 1.00% | 0.25% | 40% | 51% | 34% | 44% | 36% | 47% | 33% | 43% | 33% | 43% | 37% | 37% | 34% | 34% |
| 7771 | 0.00% | 1.00% | 0.00% | 1.00% | 0.25% | 42% | 55% | 40% | 52% | 35% | 46% | 36% | 47% | 38% | 49% | 39% | 39% | 36% | 36% |
| 7772 | 0.25% | 1.00% | 0.00% | 1.00% | 0.25% | 44% | 57% | 41% | 53% | 37% | 48% | 37% | 48% | 39% | 51% | 41% | 41% | 38% | 38% |
| 7773 | 1.00% | 1.00% | 0.00% | 1.00% | 0.25% | 46% | 60% | 42% | 55% | 40% | 52% | 39% | 51% | 41% | 53% | 43% | 43% | 40% | 40% |
| 7774 | 0.00% | 0.00% | 0.25% | 1.00% | 0.25% | 36% | 47% | 32% | 42% | 35% | 46% | 34% | 44% | 34% | 44% | 34% | 34% | 34% | 34% |
| 7775 | 1.00% | 0.00% | 0.25% | 1.00% | 0.25% | 40% | 52% | 34% | 44% | 40% | 52% | 37% | 48% | 37% | 48% | 38% | 38% | 38% | 38% |
| 7776 | 0.25% | 0.25% | 0.25% | 1.00% | 0.25% | 43% | 55% | 37% | 48% | 40% | 52% | 38% | 49% | 38% | 49% | 40% | 40% | 39% | 39% |
| 7777 | 1.00% | 0.25% | 0.25% | 1.00% | 0.25% | 45% | 58% | 38% | 49% | 43% | 56% | 40% | 52% | 40% | 52% | 42% | 42% | 41% | 41% |
| 7778 | 9.00% | 0.25% | 0.25% | 1.00% | 0.25% | 41% | 53% | 36% | 47% | 38% | 49% | 37% | 48% | 37% | 48% | 38% | 38% | 37% | 37% |
| 7779 | 0.00% | 1.00% | 0.25% | 1.00% | 0.25% | 47% | 61% | 44% | 57% | 42% | 55% | 43% | 56% | 45% | 59% | 44% | 44% | 43% | 43% |
| 7780 | 0.25% | 1.00% | 0.25% | 1.00% | 0.25% | 49% | 64% | 45% | 59% | 44% | 57% | 44% | 57% | 46% | 60% | 46% | 46% | 45% | 45% |
| 7781 | 1.00% | 1.00% | 0.25% | 1.00% | 0.25% | 51% | 66% | 46% | 60% | 47% | 61% | 46% | 60% | 48% | 62% | 48% | 48% | 47% | 47% |
| 7782 | 9.00% | 1.00% | 0.25% | 1.00% | 0.25% | 47% | 61% | 44% | 57% | 42% | 55% | 43% | 56% | 45% | 59% | 44% | 44% | 43% | 43% |
| 7783 | 0.25% | 9.00% | 0.25% | 1.00% | 0.25% | 60% | 78% | 58% | 75% | 52% | 68% | 54% | 70% | 60% | 78% | 57% | 57% | 55% | 55% |
| 7784 | 1.00% | 9.00% | 0.25% | 1.00% | 0.25% | 62% | 81% | 59% | 77% | 55% | 72% | 56% | 73% | 62% | 81% | 59% | 59% | 58% | 58% |
| 7785 | 9.00% | 9.00% | 0.25% | 1.00% | 0.25% | 58% | 75% | 57% | 74% | 50% | 65% | 53% | 69% | 59% | 77% | 55% | 55% | 54% | 54% |
| 7786 | 0.00% | 0.00% | 1.00% | 1.00% | 0.25% | 41% | 53% | 39% | 51% | 40% | 52% | 36% | 47% | 39% | 51% | 40% | 40% | 38% | 38% |
| 7787 | 0.25% | 0.00% | 1.00% | 1.00% | 0.25% | 43% | 56% | 40% | 52% | 42% | 55% | 37% | 48% | 40% | 52% | 42% | 42% | 40% | 40% |
| 7788 | 1.00% | 0.00% | 1.00% | 1.00% | 0.25% | 45% | 59% | 41% | 53% | 45% | 59% | 39% | 51% | 42% | 55% | 44% | 44% | 42% | 42% |
| 7789 | 0.00% | 0.25% | 1.00% | 1.00% | 0.25% | 46% | 59% | 43% | 56% | 43% | 56% | 39% | 51% | 42% | 55% | 44% | 44% | 41% | 41% |
| 7790 | 1.00% | 0.25% | 1.00% | 1.00% | 0.25% | 50% | 64% | 45% | 59% | 48% | 62% | 42% | 55% | 45% | 59% | 48% | 48% | 45% | 45% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7791 | 9.00% | 0.25% | 1.00% | 1.00% | 0.25% | 46% | 59% | 43% | 56% | 43% | 56% | 39% | 51% | 42% | 55% | 44% | 44% | 41% | 41% |
| 7792 | 0.00% | 1.00% | 1.00% | 1.00% | 0.25% | 52% | 68% | 51% | 66% | 47% | 61% | 45% | 59% | 50% | 65% | 50% | 50% | 47% | 47% |
| 7793 | 0.25% | 1.00% | 1.00% | 1.00% | 0.25% | 54% | 70% | 52% | 68% | 49% | 64% | 46% | 60% | 51% | 66% | 52% | 52% | 49% | 49% |
| 7794 | 1.00% | 1.00% | 1.00% | 1.00% | 0.25% | 56% | 73% | 53% | 69% | 52% | 68% | 48% | 62% | 53% | 69% | 54% | 54% | 51% | 51% |
| 7795 | 9.00% | 1.00% | 1.00% | 1.00% | 0.25% | 52% | 68% | 51% | 66% | 47% | 61% | 45% | 59% | 50% | 65% | 50% | 50% | 47% | 47% |
| 7796 | 0.00% | 9.00% | 1.00% | 1.00% | 0.25% | 63% | 82% | 64% | 83% | 55% | 72% | 55% | 72% | 64% | 83% | 61% | 61% | 58% | 58% |
| 7797 | 0.25% | 9.00% | 1.00% | 1.00% | 0.25% | 65% | 85% | 65% | 85% | 57% | 74% | 56% | 73% | 65% | 85% | 62% | 62% | 59% | 59% |
| 7798 | 1.00% | 9.00% | 1.00% | 1.00% | 0.25% | 67% | 87% | 66% | 86% | 60% | 78% | 58% | 75% | 67% | 87% | 64% | 64% | 62% | 62% |
| 7799 | 0.25% | 0.25% | 9.00% | 1.00% | 0.25% | 58% | 75% | 52% | 68% | 59% | 77% | 47% | 61% | 57% | 74% | 56% | 56% | 54% | 54% |
| 7800 | 1.00% | 0.25% | 9.00% | 1.00% | 0.25% | 60% | 77% | 53% | 69% | 62% | 81% | 49% | 64% | 59% | 77% | 58% | 58% | 57% | 57% |
| 7801 | 9.00% | 0.25% | 9.00% | 1.00% | 0.25% | 56% | 72% | 51% | 66% | 57% | 74% | 46% | 60% | 56% | 73% | 55% | 55% | 53% | 53% |
| 7802 | 0.25% | 1.00% | 9.00% | 1.00% | 0.25% | 64% | 83% | 60% | 78% | 63% | 82% | 53% | 69% | 65% | 85% | 62% | 62% | 60% | 60% |
| 7803 | 0.00% | 0.25% | 0.00% | 9.00% | 0.25% | 53% | 68% | 46% | 60% | 43% | 56% | 46% | 60% | 44% | 57% | 47% | 47% | 44% | 44% |
| 7804 | 0.00% | 0.00% | 0.25% | 9.00% | 0.25% | 53% | 69% | 46% | 60% | 47% | 61% | 50% | 65% | 48% | 62% | 49% | 49% | 48% | 48% |
| 7805 | 0.25% | 0.00% | 0.25% | 9.00% | 0.25% | 55% | 72% | 47% | 61% | 49% | 64% | 51% | 66% | 49% | 64% | 50% | 50% | 50% | 50% |
| 7806 | 0.00% | 0.25% | 0.25% | 9.00% | 0.25% | 58% | 75% | 50% | 65% | 50% | 65% | 53% | 69% | 51% | 66% | 53% | 53% | 51% | 51% |
| 7807 | 0.25% | 0.25% | 0.25% | 9.00% | 0.25% | 60% | 77% | 51% | 66% | 52% | 68% | 54% | 70% | 52% | 68% | 54% | 54% | 53% | 53% |
| 7808 | 1.00% | 0.25% | 0.25% | 9.00% | 0.25% | 62% | 80% | 52% | 68% | 55% | 72% | 56% | 73% | 54% | 70% | 56% | 56% | 55% | 55% |
| 7809 | 9.00% | 0.25% | 0.25% | 9.00% | 0.25% | 58% | 75% | 50% | 65% | 50% | 65% | 53% | 69% | 51% | 66% | 53% | 53% | 51% | 51% |
| 7810 | 0.00% | 1.00% | 0.25% | 9.00% | 0.25% | 64% | 83% | 58% | 75% | 54% | 70% | 59% | 77% | 59% | 77% | 59% | 59% | 57% | 57% |
| 7811 | 0.25% | 1.00% | 0.25% | 9.00% | 0.25% | 66% | 86% | 59% | 77% | 56% | 73% | 60% | 78% | 60% | 78% | 60% | 60% | 59% | 59% |
| 7812 | 1.00% | 1.00% | 0.25% | 9.00% | 0.25% | 68% | 88% | 60% | 78% | 59% | 77% | 62% | 81% | 62% | 81% | 62% | 62% | 61% | 61% |
| 7813 | 0.25% | 9.00% | 0.25% | 9.00% | 0.25% | 77% | 100% | 72% | 94% | 64% | 83% | 70% | 91% | 74% | 96% | 71% | 71% | 69% | 69% |
| 7814 | 0.25% | 0.00% | 1.00% | 9.00% | 0.25% | 60% | 78% | 54% | 70% | 54% | 70% | 53% | 69% | 54% | 70% | 56% | 56% | 54% | 54% |
| 7815 | 1.00% | 0.25% | 1.00% | 9.00% | 0.25% | 67% | 86% | 59% | 77% | 60% | 78% | 58% | 75% | 59% | 77% | 62% | 62% | 59% | 59% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7816 | 9.00% | 0.25% | 1.00% | 9.00% | 0.25% | 63% | 81% | 57% | 74% | 55% | 72% | 55% | 72% | 56% | 73% | 58% | 58% | 55% | 55% |
| 7817 | 0.00% | 1.00% | 1.00% | 9.00% | 0.25% | 69% | 90% | 65% | 85% | 59% | 77% | 61% | 79% | 64% | 83% | 64% | 64% | 61% | 61% |
| 7818 | 0.25% | 1.00% | 1.00% | 9.00% | 0.25% | 71% | 92% | 66% | 86% | 61% | 79% | 62% | 81% | 65% | 85% | 66% | 66% | 63% | 63% |
| 7819 | 1.00% | 1.00% | 1.00% | 9.00% | 0.25% | 73% | 95% | 67% | 87% | 64% | 83% | 64% | 83% | 67% | 87% | 68% | 68% | 65% | 65% |
| 7820 | 0.25% | 0.25% | 9.00% | 9.00% | 0.25% | 75% | 97% | 66% | 86% | 71% | 92% | 63% | 82% | 71% | 92% | 71% | 71% | 68% | 68% |
| 7821 | 0.25% | 0.25% | 0.00% | 0.00% | 1.00% | 18% | 23% | 18% | 23% | 16% | 21% | 14% | 18% | 22% | 29% | 17% | 17% | 17% | 17% |
| 7822 | 1.00% | 0.25% | 0.00% | 0.00% | 1.00% | 20% | 25% | 19% | 25% | 19% | 25% | 16% | 21% | 24% | 31% | 19% | 19% | 20% | 20% |
| 7823 | 0.25% | 1.00% | 0.00% | 0.00% | 1.00% | 24% | 31% | 26% | 34% | 20% | 26% | 20% | 26% | 30% | 39% | 23% | 23% | 23% | 23% |
| 7824 | 1.00% | 1.00% | 0.00% | 0.00% | 1.00% | 26% | 34% | 27% | 35% | 23% | 30% | 22% | 29% | 32% | 42% | 25% | 25% | 26% | 26% |
| 7825 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 7826 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 7827 | 0.00% | 0.25% | 0.25% | 0.00% | 1.00% | 21% | 27% | 21% | 27% | 21% | 27% | 20% | 26% | 28% | 36% | 21% | 21% | 23% | 23% |
| 7828 | 0.25% | 0.25% | 0.25% | 0.00% | 1.00% | 23% | 29% | 22% | 29% | 23% | 30% | 21% | 27% | 29% | 38% | 23% | 23% | 24% | 24% |
| 7829 | 0.00% | 1.00% | 0.25% | 0.00% | 1.00% | 27% | 35% | 29% | 38% | 25% | 33% | 26% | 34% | 36% | 47% | 27% | 27% | 29% | 29% |
| 7830 | 1.00% | 1.00% | 0.25% | 0.00% | 1.00% | 31% | 40% | 31% | 40% | 30% | 39% | 29% | 38% | 39% | 51% | 31% | 31% | 33% | 33% |
| 7831 | 1.00% | 9.00% | 0.25% | 0.00% | 1.00% | 42% | 55% | 44% | 57% | 38% | 49% | 39% | 51% | 53% | 69% | 41% | 41% | 43% | 43% |
| 7832 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 7833 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 7834 | 0.00% | 0.25% | 1.00% | 0.00% | 1.00% | 26% | 33% | 28% | 36% | 26% | 34% | 22% | 29% | 33% | 43% | 27% | 27% | 27% | 27% |
| 7835 | 1.00% | 0.25% | 1.00% | 0.00% | 1.00% | 30% | 38% | 30% | 39% | 31% | 40% | 25% | 33% | 36% | 47% | 30% | 30% | 31% | 31% |
| 7836 | 0.00% | 1.00% | 1.00% | 0.00% | 1.00% | 32% | 42% | 36% | 47% | 30% | 39% | 28% | 36% | 41% | 53% | 33% | 33% | 33% | 33% |
| 7837 | 0.25% | 1.00% | 1.00% | 0.00% | 1.00% | 34% | 44% | 37% | 48% | 32% | 42% | 29% | 38% | 42% | 55% | 34% | 34% | 34% | 34% |
| 7838 | 1.00% | 1.00% | 1.00% | 0.00% | 1.00% | 36% | 47% | 38% | 49% | 35% | 46% | 31% | 40% | 44% | 57% | 36% | 36% | 37% | 37% |
| 7839 | 9.00% | 1.00% | 1.00% | 0.00% | 1.00% | 32% | 42% | 36% | 47% | 30% | 39% | 28% | 36% | 41% | 53% | 33% | 33% | 33% | 33% |
| 7840 | 1.00% | 9.00% | 1.00% | 0.00% | 1.00% | 47% | 61% | 51% | 66% | 43% | 56% | 41% | 53% | 58% | 75% | 47% | 47% | 47% | 47% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7841 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 7842 | 0.00% | 0.25% | 9.00% | 0.00% | 1.00% | 36% | 46% | 36% | 47% | 40% | 52% | 29% | 38% | 47% | 61% | 37% | 37% | 39% | 39% |
| 7843 | 0.25% | 0.25% | 9.00% | 0.00% | 1.00% | 38% | 49% | 37% | 48% | 42% | 55% | 30% | 39% | 48% | 62% | 39% | 39% | 40% | 40% |
| 7844 | 1.00% | 0.25% | 9.00% | 0.00% | 1.00% | 40% | 51% | 38% | 49% | 45% | 59% | 32% | 42% | 50% | 65% | 41% | 41% | 42% | 42% |
| 7845 | 0.25% | 1.00% | 9.00% | 0.00% | 1.00% | 44% | 57% | 45% | 59% | 46% | 60% | 36% | 47% | 56% | 73% | 45% | 45% | 46% | 46% |
| 7846 | 0.25% | 0.00% | 0.00% | 0.25% | 1.00% | 21% | 27% | 22% | 29% | 22% | 29% | 18% | 23% | 26% | 34% | 22% | 22% | 22% | 22% |
| 7847 | 1.00% | 0.00% | 0.00% | 0.25% | 1.00% | 23% | 30% | 23% | 30% | 25% | 33% | 20% | 26% | 28% | 36% | 24% | 24% | 24% | 24% |
| 7848 | 0.00% | 0.25% | 0.00% | 0.25% | 1.00% | 24% | 31% | 25% | 33% | 23% | 30% | 20% | 26% | 28% | 36% | 24% | 24% | 24% | 24% |
| 7849 | 0.25% | 0.25% | 0.00% | 0.25% | 1.00% | 26% | 33% | 26% | 34% | 25% | 33% | 21% | 27% | 29% | 38% | 26% | 26% | 25% | 25% |
| 7850 | 9.00% | 0.25% | 0.00% | 0.25% | 1.00% | 24% | 31% | 25% | 33% | 23% | 30% | 20% | 26% | 28% | 36% | 24% | 24% | 24% | 24% |
| 7851 | 1.00% | 1.00% | 0.00% | 0.25% | 1.00% | 34% | 44% | 35% | 46% | 32% | 42% | 29% | 38% | 39% | 51% | 34% | 34% | 33% | 33% |
| 7852 | 1.00% | 9.00% | 0.00% | 0.25% | 1.00% | 45% | 59% | 48% | 62% | 40% | 52% | 39% | 51% | 53% | 69% | 44% | 44% | 44% | 44% |
| 7853 | 0.00% | 0.00% | 0.25% | 0.25% | 1.00% | 24% | 31% | 25% | 33% | 27% | 35% | 24% | 31% | 32% | 42% | 25% | 25% | 28% | 28% |
| 7854 | 0.25% | 0.00% | 0.25% | 0.25% | 1.00% | 26% | 34% | 26% | 34% | 29% | 38% | 25% | 33% | 33% | 43% | 27% | 27% | 29% | 29% |
| 7855 | 0.00% | 0.25% | 0.25% | 0.25% | 1.00% | 29% | 37% | 29% | 38% | 30% | 39% | 27% | 35% | 35% | 46% | 29% | 29% | 31% | 31% |
| 7856 | 0.25% | 0.25% | 0.25% | 0.25% | 1.00% | 31% | 40% | 30% | 39% | 32% | 42% | 28% | 36% | 36% | 47% | 31% | 31% | 32% | 32% |
| 7857 | 1.00% | 0.25% | 0.25% | 0.25% | 1.00% | 33% | 42% | 31% | 40% | 35% | 46% | 30% | 39% | 38% | 49% | 33% | 33% | 34% | 34% |
| 7858 | 9.00% | 0.25% | 0.25% | 0.25% | 1.00% | 29% | 37% | 29% | 38% | 30% | 39% | 27% | 35% | 35% | 46% | 29% | 29% | 31% | 31% |
| 7859 | 0.25% | 1.00% | 0.25% | 0.25% | 1.00% | 37% | 48% | 38% | 49% | 36% | 47% | 34% | 44% | 44% | 57% | 37% | 37% | 38% | 38% |
| 7860 | 9.00% | 1.00% | 0.25% | 0.25% | 1.00% | 35% | 46% | 37% | 48% | 34% | 44% | 33% | 43% | 43% | 56% | 35% | 35% | 37% | 37% |
| 7861 | 0.25% | 9.00% | 0.25% | 0.25% | 1.00% | 48% | 62% | 51% | 66% | 44% | 57% | 44% | 57% | 58% | 75% | 48% | 48% | 49% | 49% |
| 7862 | 1.00% | 9.00% | 0.25% | 0.25% | 1.00% | 50% | 65% | 52% | 68% | 47% | 61% | 46% | 60% | 60% | 78% | 50% | 50% | 51% | 51% |
| 7863 | 9.00% | 9.00% | 0.25% | 0.25% | 1.00% | 46% | 60% | 50% | 65% | 42% | 55% | 43% | 56% | 57% | 74% | 46% | 46% | 47% | 47% |
| 7864 | 0.00% | 0.00% | 1.00% | 0.25% | 1.00% | 29% | 38% | 32% | 42% | 32% | 42% | 26% | 34% | 37% | 48% | 31% | 31% | 32% | 32% |
| 7865 | 1.00% | 0.00% | 1.00% | 0.25% | 1.00% | 33% | 43% | 34% | 44% | 37% | 48% | 29% | 38% | 40% | 52% | 35% | 35% | 35% | 35% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7866 | 0.00% | 0.25% | 1.00% | 0.25% | 1.00% | 34% | 44% | 36% | 47% | 35% | 46% | 29% | 38% | 40% | 52% | 35% | 35% | 35% | 35% |
| 7867 | 0.25% | 0.25% | 1.00% | 0.25% | 1.00% | 36% | 46% | 37% | 48% | 37% | 48% | 30% | 39% | 41% | 53% | 37% | 37% | 36% | 36% |
| 7868 | 1.00% | 0.25% | 1.00% | 0.25% | 1.00% | 38% | 49% | 38% | 49% | 40% | 52% | 32% | 42% | 43% | 56% | 39% | 39% | 38% | 38% |
| 7869 | 9.00% | 0.25% | 1.00% | 0.25% | 1.00% | 34% | 44% | 36% | 47% | 35% | 46% | 29% | 38% | 40% | 52% | 35% | 35% | 35% | 35% |
| 7870 | 0.00% | 1.00% | 1.00% | 0.25% | 1.00% | 40% | 52% | 44% | 57% | 39% | 51% | 35% | 46% | 48% | 62% | 41% | 41% | 41% | 41% |
| 7871 | 0.25% | 1.00% | 1.00% | 0.25% | 1.00% | 42% | 55% | 45% | 59% | 41% | 53% | 36% | 47% | 49% | 64% | 43% | 43% | 42% | 42% |
| 7872 | 1.00% | 1.00% | 1.00% | 0.25% | 1.00% | 44% | 57% | 46% | 60% | 44% | 57% | 38% | 49% | 51% | 66% | 45% | 45% | 44% | 44% |
| 7873 | 9.00% | 1.00% | 1.00% | 0.25% | 1.00% | 40% | 52% | 44% | 57% | 39% | 51% | 35% | 46% | 48% | 62% | 41% | 41% | 41% | 41% |
| 7874 | 0.00% | 9.00% | 1.00% | 0.25% | 1.00% | 51% | 66% | 57% | 74% | 47% | 61% | 45% | 59% | 62% | 81% | 52% | 52% | 51% | 51% |
| 7875 | 0.25% | 9.00% | 1.00% | 0.25% | 1.00% | 53% | 69% | 58% | 75% | 49% | 64% | 46% | 60% | 63% | 82% | 53% | 53% | 53% | 53% |
| 7876 | 1.00% | 9.00% | 1.00% | 0.25% | 1.00% | 55% | 72% | 59% | 77% | 52% | 68% | 48% | 62% | 65% | 85% | 55% | 55% | 55% | 55% |
| 7877 | 0.25% | 0.25% | 9.00% | 0.25% | 1.00% | 46% | 59% | 45% | 59% | 51% | 66% | 37% | 48% | 55% | 72% | 47% | 47% | 48% | 48% |
| 7878 | 1.00% | 0.25% | 9.00% | 0.25% | 1.00% | 48% | 62% | 46% | 60% | 54% | 70% | 39% | 51% | 57% | 74% | 49% | 49% | 50% | 50% |
| 7879 | 9.00% | 0.25% | 9.00% | 0.25% | 1.00% | 44% | 57% | 44% | 57% | 49% | 64% | 36% | 47% | 54% | 70% | 46% | 46% | 46% | 46% |
| 7880 | 0.00% | 1.00% | 9.00% | 0.25% | 1.00% | 50% | 65% | 52% | 68% | 53% | 69% | 42% | 55% | 62% | 81% | 52% | 52% | 52% | 52% |
| 7881 | 0.25% | 1.00% | 9.00% | 0.25% | 1.00% | 52% | 68% | 53% | 69% | 55% | 72% | 43% | 56% | 63% | 82% | 53% | 53% | 54% | 54% |
| 7882 | 9.00% | 1.00% | 9.00% | 0.25% | 1.00% | 50% | 65% | 52% | 68% | 53% | 69% | 42% | 55% | 62% | 81% | 52% | 52% | 52% | 52% |
| 7883 | 1.00% | 9.00% | 9.00% | 0.25% | 1.00% | 65% | 85% | 67% | 87% | 66% | 86% | 55% | 72% | 79% | 100 % | 66% | 66% | 67% | 67% |
| 7884 | 0.25% | 0.00% | 0.00% | 1.00% | 1.00% | 38% | 49% | 35% | 46% | 35% | 46% | 33% | 43% | 39% | 51% | 36% | 36% | 36% | 36% |
| 7885 | 1.00% | 0.25% | 0.00% | 1.00% | 1.00% | 45% | 58% | 40% | 52% | 41% | 53% | 38% | 49% | 44% | 57% | 42% | 42% | 41% | 41% |
| 7886 | 0.00% | 1.00% | 0.00% | 1.00% | 1.00% | 47% | 61% | 46% | 60% | 40% | 52% | 41% | 53% | 49% | 64% | 44% | 44% | 43% | 43% |
| 7887 | 0.25% | 1.00% | 0.00% | 1.00% | 1.00% | 49% | 64% | 47% | 61% | 42% | 55% | 42% | 55% | 50% | 65% | 46% | 46% | 45% | 45% |
| 7888 | 1.00% | 1.00% | 0.00% | 1.00% | 1.00% | 51% | 66% | 48% | 62% | 45% | 59% | 44% | 57% | 52% | 68% | 48% | 48% | 47% | 47% |
| 7889 | 0.00% | 0.00% | 0.25% | 1.00% | 1.00% | 41% | 53% | 38% | 49% | 40% | 52% | 39% | 51% | 45% | 59% | 40% | 40% | 41% | 41% |
| 7890 | 1.00% | 0.00% | 0.25% | 1.00% | 1.00% | 45% | 59% | 40% | 52% | 45% | 59% | 42% | 55% | 48% | 62% | 43% | 43% | 45% | 45% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7891 | 0.25% | 0.25% | 0.25% | 1.00% | 1.00% | 48% | 62% | 43% | 56% | 45% | 59% | 43% | 56% | 49% | 64% | 45% | 45% | 46% | 46% |
| 7892 | 1.00% | 0.25% | 0.25% | 1.00% | 1.00% | 50% | 64% | 44% | 57% | 48% | 62% | 45% | 59% | 51% | 66% | 47% | 47% | 48% | 48% |
| 7893 | 9.00% | 0.25% | 0.25% | 1.00% | 1.00% | 46% | 59% | 42% | 55% | 43% | 56% | 42% | 55% | 48% | 62% | 44% | 44% | 44% | 44% |
| 7894 | 0.00% | 1.00% | 0.25% | 1.00% | 1.00% | 52% | 68% | 50% | 65% | 47% | 61% | 48% | 62% | 56% | 73% | 50% | 50% | 50% | 50% |
| 7895 | 0.25% | 1.00% | 0.25% | 1.00% | 1.00% | 54% | 70% | 51% | 66% | 49% | 64% | 49% | 64% | 57% | 74% | 51% | 51% | 52% | 52% |
| 7896 | 1.00% | 1.00% | 0.25% | 1.00% | 1.00% | 56% | 73% | 52% | 68% | 52% | 68% | 51% | 66% | 59% | 77% | 53% | 53% | 54% | 54% |
| 7897 | 9.00% | 1.00% | 0.25% | 1.00% | 1.00% | 52% | 68% | 50% | 65% | 47% | 61% | 48% | 62% | 56% | 73% | 50% | 50% | 50% | 50% |
| 7898 | 0.25% | 9.00% | 0.25% | 1.00% | 1.00% | 65% | 85% | 64% | 83% | 57% | 74% | 59% | 77% | 71% | 92% | 62% | 62% | 62% | 62% |
| 7899 | 1.00% | 9.00% | 0.25% | 1.00% | 1.00% | 67% | 87% | 65% | 85% | 60% | 78% | 61% | 79% | 73% | 95% | 64% | 64% | 65% | 65% |
| 7900 | 9.00% | 9.00% | 0.25% | 1.00% | 1.00% | 63% | 82% | 63% | 82% | 55% | 72% | 58% | 75% | 70% | 91% | 60% | 60% | 61% | 61% |
| 7901 | 0.00% | 0.00% | 1.00% | 1.00% | 1.00% | 46% | 60% | 45% | 59% | 45% | 59% | 41% | 53% | 50% | 65% | 45% | 45% | 45% | 45% |
| 7902 | 0.25% | 0.00% | 1.00% | 1.00% | 1.00% | 48% | 62% | 46% | 60% | 47% | 61% | 42% | 55% | 51% | 66% | 47% | 47% | 47% | 47% |
| 7903 | 1.00% | 0.00% | 1.00% | 1.00% | 1.00% | 50% | 65% | 47% | 61% | 50% | 65% | 44% | 57% | 53% | 69% | 49% | 49% | 49% | 49% |
| 7904 | 0.00% | 0.25% | 1.00% | 1.00% | 1.00% | 51% | 66% | 49% | 64% | 48% | 62% | 44% | 57% | 53% | 69% | 49% | 49% | 48% | 48% |
| 7905 | 1.00% | 0.25% | 1.00% | 1.00% | 1.00% | 55% | 71% | 51% | 66% | 53% | 69% | 47% | 61% | 56% | 73% | 53% | 53% | 52% | 52% |
| 7906 | 9.00% | 0.25% | 1.00% | 1.00% | 1.00% | 51% | 66% | 49% | 64% | 48% | 62% | 44% | 57% | 53% | 69% | 49% | 49% | 48% | 48% |
| 7907 | 0.00% | 1.00% | 1.00% | 1.00% | 1.00% | 57% | 74% | 57% | 74% | 52% | 68% | 50% | 65% | 61% | 79% | 55% | 55% | 54% | 54% |
| 7908 | 0.25% | 1.00% | 1.00% | 1.00% | 1.00% | 59% | 77% | 58% | 75% | 54% | 70% | 51% | 66% | 62% | 81% | 57% | 57% | 56% | 56% |
| 7909 | 1.00% | 1.00% | 1.00% | 1.00% | 1.00% | 61% | 79% | 59% | 77% | 57% | 74% | 53% | 69% | 64% | 83% | 59% | 59% | 58% | 58% |
| 7910 | 9.00% | 1.00% | 1.00% | 1.00% | 1.00% | 57% | 74% | 57% | 74% | 52% | 68% | 50% | 65% | 61% | 79% | 55% | 55% | 54% | 54% |
| 7911 | 0.00% | 9.00% | 1.00% | 1.00% | 1.00% | 68% | 88% | 70% | 91% | 60% | 78% | 60% | 78% | 75% | 98% | 66% | 66% | 65% | 65% |
| 7912 | 0.25% | 9.00% | 1.00% | 1.00% | 1.00% | 70% | 91% | 71% | 92% | 62% | 81% | 61% | 79% | 76% | 99% | 68% | 68% | 66% | 66% |
| 7913 | 1.00% | 9.00% | 1.00% | 1.00% | 1.00% | 72% | 94% | 72% | 94% | 65% | 85% | 63% | 82% | 78% | 100 % | 70% | 70% | 69% | 69% |
| 7914 | 0.25% | 0.25% | 9.00% | 1.00% | 1.00% | 63% | 81% | 58% | 75% | 64% | 83% | 52% | 68% | 68% | 88% | 62% | 62% | 61% | 61% |
| 7915 | 1.00% | 0.25% | 9.00% | 1.00% | 1.00% | 65% | 84% | 59% | 77% | 67% | 87% | 54% | 70% | 70% | 91% | 64% | 64% | 64% | 64% |

Fig. 28

| Formula # | Gamma Dodecalactone | Apritone | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7916 | 9.00% | 0.25% | 9.00% | 1.00% | 1.00% | 61% | 79% | 57% | 74% | 62% | 81% | 51% | 66% | 67% | 87% | 60% | 60% | 60% | 60% |
| 7917 | 0.25% | 1.00% | 9.00% | 1.00% | 1.00% | 69% | 90% | 66% | 86% | 68% | 88% | 58% | 75% | 76% | 99% | 68% | 68% | 67% | 67% |
| 7918 | 0.00% | 0.25% | 0.00% | 9.00% | 1.00% | 58% | 75% | 52% | 68% | 48% | 62% | 51% | 66% | 55% | 72% | 53% | 53% | 51% | 51% |
| 7919 | 0.00% | 0.00% | 0.25% | 9.00% | 1.00% | 58% | 75% | 52% | 68% | 52% | 68% | 55% | 72% | 59% | 77% | 54% | 54% | 55% | 55% |
| 7920 | 0.25% | 0.00% | 0.25% | 9.00% | 1.00% | 60% | 78% | 53% | 69% | 54% | 70% | 56% | 73% | 60% | 78% | 56% | 56% | 57% | 57% |
| 7921 | 0.00% | 0.25% | 0.25% | 9.00% | 1.00% | 63% | 81% | 56% | 73% | 55% | 72% | 58% | 75% | 62% | 81% | 58% | 58% | 58% | 58% |
| 7922 | 0.25% | 0.25% | 0.25% | 9.00% | 1.00% | 65% | 84% | 57% | 74% | 57% | 74% | 59% | 77% | 63% | 82% | 60% | 60% | 60% | 60% |
| 7923 | 1.00% | 0.25% | 0.25% | 9.00% | 1.00% | 67% | 86% | 58% | 75% | 60% | 78% | 61% | 79% | 65% | 85% | 62% | 62% | 62% | 62% |
| 7924 | 9.00% | 0.25% | 0.25% | 9.00% | 1.00% | 63% | 81% | 56% | 73% | 55% | 72% | 58% | 75% | 62% | 81% | 58% | 58% | 58% | 58% |
| 7925 | 0.00% | 1.00% | 0.25% | 9.00% | 1.00% | 69% | 90% | 64% | 83% | 59% | 77% | 64% | 83% | 70% | 91% | 64% | 64% | 64% | 64% |
| 7926 | 0.25% | 1.00% | 0.25% | 9.00% | 1.00% | 71% | 92% | 65% | 85% | 61% | 79% | 65% | 85% | 71% | 92% | 66% | 66% | 66% | 66% |
| 7927 | 1.00% | 1.00% | 0.25% | 9.00% | 1.00% | 73% | 95% | 66% | 86% | 64% | 83% | 67% | 87% | 73% | 95% | 68% | 68% | 68% | 68% |
| 7928 | 0.25% | 9.00% | 0.25% | 9.00% | 1.00% | 82% | 100% | 78% | 100% | 69% | 90% | 75% | 98% | 85% | 100% | 76% | 76% | 76% | 76% |
| 7929 | 0.25% | 0.00% | 1.00% | 9.00% | 1.00% | 65% | 85% | 60% | 78% | 59% | 77% | 58% | 75% | 65% | 85% | 61% | 61% | 61% | 61% |
| 7930 | 1.00% | 0.25% | 1.00% | 9.00% | 1.00% | 72% | 93% | 65% | 85% | 65% | 85% | 63% | 82% | 70% | 91% | 67% | 67% | 66% | 66% |
| 7931 | 9.00% | 0.25% | 1.00% | 9.00% | 1.00% | 68% | 88% | 63% | 82% | 60% | 78% | 60% | 78% | 67% | 87% | 64% | 64% | 62% | 62% |
| 7932 | 0.00% | 1.00% | 1.00% | 9.00% | 1.00% | 74% | 96% | 71% | 92% | 64% | 83% | 66% | 86% | 75% | 98% | 70% | 70% | 68% | 68% |
| 7933 | 0.25% | 1.00% | 1.00% | 9.00% | 1.00% | 76% | 99% | 72% | 94% | 66% | 86% | 67% | 87% | 76% | 99% | 71% | 71% | 70% | 70% |
| 7934 | 1.00% | 1.00% | 1.00% | 9.00% | 1.00% | 78% | 100% | 73% | 95% | 69% | 90% | 69% | 90% | 78% | 100% | 73% | 73% | 72% | 72% |
| 7935 | 0.25% | 0.25% | 9.00% | 9.00% | 1.00% | 80% | 100% | 72% | 94% | 76% | 99% | 68% | 88% | 82% | 100% | 76% | 76% | 75% | 75% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7936 | 0.25% | 0.25% | 0.00% | 0.00% | 0.00% | 7% | 8% | 5% | 7% | 5% | 7% | 4% | 5% | 4% | 5% | 6% | 6% | 4% | 4% |
| 7937 | 1.00% | 0.25% | 0.00% | 0.00% | 0.00% | 9% | 11% | 6% | 8% | 8% | 10% | 6% | 8% | 6% | 8% | 8% | 8% | 7% | 7% |
| 7938 | 0.25% | 1.00% | 0.00% | 0.00% | 0.00% | 13% | 17% | 13% | 17% | 9% | 12% | 10% | 13% | 12% | 16% | 12% | 12% | 10% | 10% |
| 7939 | 1.00% | 1.00% | 0.00% | 0.00% | 0.00% | 15% | 20% | 14% | 18% | 12% | 16% | 12% | 16% | 14% | 18% | 14% | 14% | 13% | 13% |
| 7940 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 7941 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 7942 | 0.00% | 0.25% | 0.25% | 0.00% | 0.00% | 10% | 12% | 8% | 10% | 10% | 13% | 10% | 13% | 10% | 13% | 9% | 9% | 10% | 10% |
| 7943 | 0.25% | 0.25% | 0.25% | 0.00% | 0.00% | 12% | 15% | 9% | 12% | 12% | 16% | 11% | 14% | 11% | 14% | 11% | 11% | 11% | 11% |
| 7944 | 0.00% | 1.00% | 0.25% | 0.00% | 0.00% | 16% | 21% | 16% | 21% | 14% | 18% | 16% | 21% | 18% | 23% | 15% | 15% | 16% | 16% |
| 7945 | 1.00% | 1.00% | 0.25% | 0.00% | 0.00% | 20% | 26% | 18% | 23% | 19% | 25% | 19% | 25% | 21% | 27% | 19% | 19% | 20% | 20% |
| 7946 | 1.00% | 9.00% | 0.25% | 0.00% | 0.00% | 31% | 40% | 31% | 40% | 27% | 35% | 29% | 38% | 35% | 46% | 30% | 30% | 30% | 30% |
| 7947 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 7948 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 7949 | 0.00% | 0.25% | 1.00% | 0.00% | 0.00% | 15% | 19% | 15% | 20% | 15% | 20% | 12% | 16% | 15% | 20% | 15% | 15% | 14% | 14% |
| 7950 | 1.00% | 0.25% | 1.00% | 0.00% | 0.00% | 19% | 24% | 17% | 22% | 20% | 26% | 15% | 20% | 18% | 23% | 19% | 19% | 18% | 18% |
| 7951 | 0.00% | 1.00% | 1.00% | 0.00% | 0.00% | 21% | 27% | 23% | 30% | 19% | 25% | 18% | 23% | 23% | 30% | 21% | 21% | 20% | 20% |
| 7952 | 0.25% | 1.00% | 1.00% | 0.00% | 0.00% | 23% | 30% | 24% | 31% | 21% | 27% | 19% | 25% | 24% | 31% | 23% | 23% | 21% | 21% |
| 7953 | 1.00% | 1.00% | 1.00% | 0.00% | 0.00% | 25% | 33% | 25% | 33% | 24% | 31% | 21% | 27% | 26% | 34% | 25% | 25% | 24% | 24% |
| 7954 | 9.00% | 1.00% | 1.00% | 0.00% | 0.00% | 21% | 27% | 23% | 30% | 19% | 25% | 18% | 23% | 23% | 30% | 21% | 21% | 20% | 20% |
| 7955 | 1.00% | 9.00% | 1.00% | 0.00% | 0.00% | 36% | 47% | 38% | 49% | 32% | 42% | 31% | 40% | 40% | 52% | 35% | 35% | 34% | 34% |
| 7956 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 7957 | 0.00% | 0.25% | 9.00% | 0.00% | 0.00% | 25% | 32% | 23% | 30% | 29% | 38% | 19% | 25% | 29% | 38% | 26% | 26% | 26% | 26% |
| 7958 | 0.25% | 0.25% | 9.00% | 0.00% | 0.00% | 27% | 34% | 24% | 31% | 31% | 40% | 20% | 26% | 30% | 39% | 27% | 27% | 27% | 27% |
| 7959 | 1.00% | 0.25% | 9.00% | 0.00% | 0.00% | 29% | 37% | 25% | 33% | 34% | 44% | 22% | 29% | 32% | 42% | 29% | 29% | 29% | 29% |
| 7960 | 0.25% | 1.00% | 9.00% | 0.00% | 0.00% | 33% | 43% | 32% | 42% | 35% | 46% | 26% | 34% | 38% | 49% | 33% | 33% | 33% | 33% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7961 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 7962 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 7963 | 0.00% | 0.25% | 0.00% | 0.25% | 0.00% | 8% | 10% | 10% | 13% | 5% | 7% | 8% | 10% | 8% | 10% | 8% | 8% | 7% | 7% |
| 7964 | 0.25% | 0.25% | 0.00% | 0.25% | 0.00% | 10% | 12% | 11% | 14% | 7% | 9% | 9% | 12% | 9% | 12% | 9% | 9% | 8% | 8% |
| 7965 | 9.00% | 0.25% | 0.00% | 0.25% | 0.00% | 8% | 10% | 10% | 13% | 5% | 7% | 8% | 10% | 8% | 10% | 8% | 8% | 7% | 7% |
| 7966 | 1.00% | 1.00% | 0.00% | 0.25% | 0.00% | 18% | 23% | 20% | 26% | 14% | 18% | 17% | 22% | 19% | 25% | 17% | 17% | 17% | 17% |
| 7967 | 1.00% | 9.00% | 0.00% | 0.25% | 0.00% | 29% | 38% | 33% | 43% | 22% | 29% | 27% | 35% | 33% | 43% | 28% | 28% | 27% | 27% |
| 7968 | 0.00% | 0.00% | 0.25% | 0.25% | 0.00% | 8% | 10% | 10% | 13% | 9% | 12% | 12% | 16% | 12% | 16% | 9% | 9% | 11% | 11% |
| 7969 | 0.25% | 0.00% | 0.25% | 0.25% | 0.00% | 10% | 13% | 11% | 14% | 11% | 14% | 13% | 17% | 13% | 17% | 11% | 11% | 12% | 12% |
| 7970 | 0.00% | 0.25% | 0.25% | 0.25% | 0.00% | 13% | 16% | 14% | 18% | 12% | 16% | 15% | 20% | 15% | 20% | 13% | 13% | 14% | 14% |
| 7971 | 0.25% | 0.25% | 0.25% | 0.25% | 0.00% | 15% | 19% | 15% | 20% | 14% | 18% | 16% | 21% | 16% | 21% | 15% | 15% | 15% | 15% |
| 7972 | 1.00% | 0.25% | 0.25% | 0.25% | 0.00% | 17% | 21% | 16% | 21% | 17% | 22% | 18% | 23% | 18% | 23% | 17% | 17% | 18% | 18% |
| 7973 | 9.00% | 0.25% | 0.25% | 0.25% | 0.00% | 13% | 16% | 14% | 18% | 12% | 16% | 15% | 20% | 15% | 20% | 13% | 13% | 14% | 14% |
| 7974 | 0.25% | 1.00% | 0.25% | 0.25% | 0.00% | 21% | 27% | 23% | 30% | 18% | 23% | 22% | 29% | 24% | 31% | 21% | 21% | 21% | 21% |
| 7975 | 9.00% | 1.00% | 0.25% | 0.25% | 0.00% | 19% | 25% | 22% | 29% | 16% | 21% | 21% | 27% | 23% | 30% | 19% | 19% | 20% | 20% |
| 7976 | 0.25% | 9.00% | 0.25% | 0.25% | 0.00% | 32% | 42% | 36% | 47% | 26% | 34% | 32% | 42% | 38% | 49% | 31% | 31% | 32% | 32% |
| 7977 | 1.00% | 9.00% | 0.25% | 0.25% | 0.00% | 34% | 44% | 37% | 48% | 29% | 38% | 34% | 44% | 40% | 52% | 33% | 33% | 34% | 34% |
| 7978 | 9.00% | 9.00% | 0.25% | 0.25% | 0.00% | 30% | 39% | 35% | 46% | 24% | 31% | 31% | 40% | 37% | 48% | 30% | 30% | 31% | 31% |
| 7979 | 0.00% | 0.00% | 1.00% | 0.25% | 0.00% | 13% | 17% | 17% | 22% | 14% | 18% | 14% | 18% | 17% | 22% | 15% | 15% | 15% | 15% |
| 7980 | 1.00% | 0.00% | 1.00% | 0.25% | 0.00% | 17% | 22% | 19% | 25% | 19% | 25% | 17% | 22% | 20% | 26% | 18% | 18% | 19% | 19% |
| 7981 | 0.00% | 0.25% | 1.00% | 0.25% | 0.00% | 18% | 23% | 21% | 27% | 17% | 22% | 17% | 22% | 20% | 26% | 19% | 19% | 18% | 18% |
| 7982 | 0.25% | 0.25% | 1.00% | 0.25% | 0.00% | 20% | 25% | 22% | 29% | 19% | 25% | 18% | 23% | 21% | 27% | 20% | 20% | 19% | 19% |
| 7983 | 1.00% | 0.25% | 1.00% | 0.25% | 0.00% | 22% | 28% | 23% | 30% | 22% | 29% | 20% | 26% | 23% | 30% | 22% | 22% | 22% | 22% |
| 7984 | 9.00% | 0.25% | 1.00% | 0.25% | 0.00% | 18% | 23% | 21% | 27% | 17% | 22% | 17% | 22% | 20% | 26% | 19% | 19% | 18% | 18% |
| 7985 | 0.00% | 1.00% | 1.00% | 0.25% | 0.00% | 24% | 31% | 29% | 38% | 21% | 27% | 23% | 30% | 28% | 36% | 25% | 25% | 24% | 24% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 7986 | 0.25% | 1.00% | 1.00% | 0.25% | 0.00% | 26% | 34% | 30% | 39% | 23% | 30% | 24% | 31% | 29% | 38% | 26% | 26% | 25% | 25% |
| 7987 | 1.00% | 1.00% | 1.00% | 0.25% | 0.00% | 28% | 36% | 31% | 40% | 26% | 34% | 26% | 34% | 31% | 40% | 28% | 28% | 28% | 28% |
| 7988 | 9.00% | 1.00% | 1.00% | 0.25% | 0.00% | 24% | 31% | 29% | 38% | 21% | 27% | 23% | 30% | 28% | 36% | 25% | 25% | 24% | 24% |
| 7989 | 0.00% | 9.00% | 1.00% | 0.25% | 0.00% | 35% | 46% | 42% | 55% | 29% | 38% | 33% | 43% | 42% | 55% | 35% | 35% | 35% | 35% |
| 7990 | 0.25% | 9.00% | 1.00% | 0.25% | 0.00% | 37% | 48% | 43% | 56% | 31% | 40% | 34% | 44% | 43% | 56% | 37% | 37% | 36% | 36% |
| 7991 | 1.00% | 9.00% | 1.00% | 0.25% | 0.00% | 39% | 51% | 44% | 57% | 34% | 44% | 36% | 47% | 45% | 59% | 39% | 39% | 38% | 38% |
| 7992 | 0.25% | 0.25% | 9.00% | 0.25% | 0.00% | 30% | 38% | 30% | 39% | 33% | 43% | 25% | 33% | 35% | 46% | 31% | 31% | 31% | 31% |
| 7993 | 1.00% | 0.25% | 9.00% | 0.25% | 0.00% | 32% | 41% | 31% | 40% | 36% | 47% | 27% | 35% | 37% | 48% | 33% | 33% | 33% | 33% |
| 7994 | 9.00% | 0.25% | 9.00% | 0.25% | 0.00% | 28% | 36% | 29% | 38% | 31% | 40% | 24% | 31% | 34% | 44% | 29% | 29% | 30% | 30% |
| 7995 | 0.00% | 1.00% | 9.00% | 0.25% | 0.00% | 34% | 44% | 37% | 48% | 35% | 46% | 30% | 39% | 42% | 55% | 35% | 35% | 36% | 36% |
| 7996 | 0.25% | 1.00% | 9.00% | 0.25% | 0.00% | 36% | 47% | 38% | 49% | 37% | 48% | 31% | 40% | 43% | 56% | 37% | 37% | 37% | 37% |
| 7997 | 9.00% | 1.00% | 9.00% | 0.25% | 0.00% | 34% | 44% | 37% | 48% | 35% | 46% | 30% | 39% | 42% | 55% | 35% | 35% | 36% | 36% |
| 7998 | 1.00% | 9.00% | 9.00% | 0.25% | 0.00% | 49% | 64% | 52% | 68% | 48% | 62% | 43% | 56% | 59% | 77% | 50% | 50% | 50% | 50% |
| 7999 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 8000 | 1.00% | 0.25% | 0.00% | 1.00% | 0.00% | 23% | 29% | 19% | 25% | 20% | 26% | 18% | 23% | 23% | 30% | 21% | 21% | 20% | 20% |
| 8001 | 0.00% | 1.00% | 0.00% | 1.00% | 0.00% | 25% | 33% | 25% | 33% | 19% | 25% | 21% | 27% | 28% | 36% | 23% | 23% | 23% | 23% |
| 8002 | 0.25% | 1.00% | 0.00% | 1.00% | 0.00% | 27% | 35% | 26% | 34% | 21% | 27% | 22% | 29% | 29% | 38% | 25% | 25% | 24% | 24% |
| 8003 | 1.00% | 1.00% | 0.00% | 1.00% | 0.00% | 29% | 38% | 27% | 35% | 24% | 31% | 24% | 31% | 31% | 40% | 27% | 27% | 26% | 26% |
| 8004 | 0.00% | 0.00% | 0.25% | 1.00% | 0.00% | 19% | 25% | 17% | 22% | 19% | 25% | 19% | 25% | 24% | 31% | 18% | 18% | 21% | 21% |
| 8005 | 1.00% | 0.00% | 0.25% | 1.00% | 0.00% | 23% | 30% | 19% | 25% | 24% | 31% | 22% | 29% | 27% | 35% | 22% | 22% | 24% | 24% |
| 8006 | 0.25% | 0.25% | 0.25% | 1.00% | 0.00% | 26% | 33% | 22% | 29% | 24% | 31% | 23% | 30% | 28% | 36% | 24% | 24% | 25% | 25% |
| 8007 | 1.00% | 0.25% | 0.25% | 1.00% | 0.00% | 28% | 36% | 23% | 30% | 27% | 35% | 25% | 33% | 30% | 39% | 26% | 26% | 27% | 27% |
| 8008 | 9.00% | 0.25% | 0.25% | 1.00% | 0.00% | 24% | 31% | 21% | 27% | 22% | 29% | 22% | 29% | 27% | 35% | 22% | 22% | 24% | 24% |
| 8009 | 0.00% | 1.00% | 0.25% | 1.00% | 0.00% | 30% | 39% | 29% | 38% | 26% | 34% | 28% | 36% | 35% | 46% | 28% | 28% | 30% | 30% |
| 8010 | 0.25% | 1.00% | 0.25% | 1.00% | 0.00% | 32% | 42% | 30% | 39% | 28% | 36% | 29% | 38% | 36% | 47% | 30% | 30% | 31% | 31% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8011 | 1.00% | 1.00% | 0.25% | 1.00% | 0.00% | 34% | 44% | 31% | 40% | 31% | 40% | 31% | 40% | 38% | 49% | 32% | 32% | 33% | 33% |
| 8012 | 9.00% | 1.00% | 0.25% | 1.00% | 0.00% | 30% | 39% | 29% | 38% | 26% | 34% | 28% | 36% | 35% | 46% | 28% | 28% | 30% | 30% |
| 8013 | 0.25% | 9.00% | 0.25% | 1.00% | 0.00% | 43% | 56% | 43% | 56% | 36% | 47% | 39% | 51% | 50% | 65% | 41% | 41% | 42% | 42% |
| 8014 | 1.00% | 9.00% | 0.25% | 1.00% | 0.00% | 45% | 59% | 44% | 57% | 39% | 51% | 41% | 53% | 52% | 68% | 43% | 43% | 44% | 44% |
| 8015 | 9.00% | 9.00% | 0.25% | 1.00% | 0.00% | 41% | 53% | 42% | 55% | 34% | 44% | 38% | 49% | 49% | 64% | 39% | 39% | 40% | 40% |
| 8016 | 0.00% | 0.00% | 1.00% | 1.00% | 0.00% | 24% | 31% | 24% | 31% | 24% | 31% | 21% | 27% | 29% | 38% | 24% | 24% | 25% | 25% |
| 8017 | 0.25% | 0.00% | 1.00% | 1.00% | 0.00% | 26% | 34% | 25% | 33% | 26% | 34% | 22% | 29% | 30% | 39% | 26% | 26% | 26% | 26% |
| 8018 | 1.00% | 0.00% | 1.00% | 1.00% | 0.00% | 28% | 36% | 26% | 34% | 29% | 38% | 24% | 31% | 32% | 42% | 28% | 28% | 28% | 28% |
| 8019 | 0.00% | 0.25% | 1.00% | 1.00% | 0.00% | 29% | 37% | 28% | 36% | 27% | 35% | 24% | 31% | 32% | 42% | 28% | 28% | 28% | 28% |
| 8020 | 1.00% | 0.25% | 1.00% | 1.00% | 0.00% | 33% | 42% | 30% | 39% | 32% | 42% | 27% | 35% | 35% | 46% | 32% | 32% | 31% | 31% |
| 8021 | 9.00% | 0.25% | 1.00% | 1.00% | 0.00% | 29% | 37% | 28% | 36% | 27% | 35% | 24% | 31% | 32% | 42% | 28% | 28% | 28% | 28% |
| 8022 | 0.00% | 1.00% | 1.00% | 1.00% | 0.00% | 35% | 46% | 36% | 47% | 31% | 40% | 30% | 39% | 40% | 52% | 34% | 34% | 34% | 34% |
| 8023 | 0.25% | 1.00% | 1.00% | 1.00% | 0.00% | 37% | 48% | 37% | 48% | 33% | 43% | 31% | 40% | 41% | 53% | 36% | 36% | 35% | 35% |
| 8024 | 1.00% | 1.00% | 1.00% | 1.00% | 0.00% | 39% | 51% | 38% | 49% | 36% | 47% | 33% | 43% | 43% | 56% | 38% | 38% | 37% | 37% |
| 8025 | 9.00% | 1.00% | 1.00% | 1.00% | 0.00% | 35% | 46% | 36% | 47% | 31% | 40% | 30% | 39% | 40% | 52% | 34% | 34% | 34% | 34% |
| 8026 | 0.00% | 9.00% | 1.00% | 1.00% | 0.00% | 46% | 60% | 49% | 64% | 39% | 51% | 40% | 52% | 54% | 70% | 45% | 45% | 44% | 44% |
| 8027 | 0.25% | 9.00% | 1.00% | 1.00% | 0.00% | 48% | 62% | 50% | 65% | 41% | 53% | 41% | 53% | 55% | 72% | 46% | 46% | 46% | 46% |
| 8028 | 1.00% | 9.00% | 1.00% | 1.00% | 0.00% | 50% | 65% | 51% | 66% | 44% | 57% | 43% | 56% | 57% | 74% | 48% | 48% | 48% | 48% |
| 8029 | 0.25% | 0.25% | 9.00% | 1.00% | 0.00% | 41% | 53% | 37% | 48% | 43% | 56% | 32% | 42% | 47% | 61% | 40% | 40% | 41% | 41% |
| 8030 | 1.00% | 0.25% | 9.00% | 1.00% | 0.00% | 43% | 55% | 38% | 49% | 46% | 60% | 34% | 44% | 49% | 64% | 42% | 42% | 43% | 43% |
| 8031 | 9.00% | 0.25% | 9.00% | 1.00% | 0.00% | 39% | 50% | 36% | 47% | 41% | 53% | 31% | 40% | 46% | 60% | 39% | 39% | 39% | 39% |
| 8032 | 0.25% | 1.00% | 9.00% | 1.00% | 0.00% | 47% | 61% | 45% | 59% | 47% | 61% | 38% | 49% | 55% | 72% | 46% | 46% | 47% | 47% |
| 8033 | 0.00% | 0.25% | 0.00% | 9.00% | 0.00% | 32% | 41% | 26% | 34% | 25% | 33% | 28% | 36% | 30% | 39% | 28% | 28% | 28% | 28% |
| 8034 | 0.00% | 0.00% | 0.25% | 9.00% | 0.00% | 32% | 42% | 26% | 34% | 29% | 38% | 32% | 42% | 34% | 44% | 29% | 29% | 32% | 32% |
| 8035 | 0.25% | 0.00% | 0.25% | 9.00% | 0.00% | 34% | 44% | 27% | 35% | 31% | 40% | 33% | 43% | 35% | 46% | 31% | 31% | 33% | 33% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8036 | 0.00% | 0.25% | 0.25% | 9.00% | 0.00% | 37% | 47% | 30% | 39% | 32% | 42% | 35% | 46% | 37% | 48% | 33% | 33% | 35% | 35% |
| 8037 | 0.25% | 0.25% | 0.25% | 9.00% | 0.00% | 39% | 50% | 31% | 40% | 34% | 44% | 36% | 47% | 38% | 49% | 35% | 35% | 36% | 36% |
| 8038 | 1.00% | 0.25% | 0.25% | 9.00% | 0.00% | 41% | 53% | 32% | 42% | 37% | 48% | 38% | 49% | 40% | 52% | 37% | 37% | 38% | 38% |
| 8039 | 9.00% | 0.25% | 0.25% | 9.00% | 0.00% | 37% | 47% | 30% | 39% | 32% | 42% | 35% | 46% | 37% | 48% | 33% | 33% | 35% | 35% |
| 8040 | 0.00% | 1.00% | 0.25% | 9.00% | 0.00% | 43% | 56% | 38% | 49% | 36% | 47% | 41% | 53% | 45% | 59% | 39% | 39% | 41% | 41% |
| 8041 | 0.25% | 1.00% | 0.25% | 9.00% | 0.00% | 45% | 59% | 39% | 51% | 38% | 49% | 42% | 55% | 46% | 60% | 41% | 41% | 42% | 42% |
| 8042 | 1.00% | 1.00% | 0.25% | 9.00% | 0.00% | 47% | 61% | 40% | 52% | 41% | 53% | 44% | 57% | 48% | 62% | 43% | 43% | 44% | 44% |
| 8043 | 0.25% | 9.00% | 0.25% | 9.00% | 0.00% | 56% | 73% | 52% | 68% | 46% | 60% | 52% | 68% | 60% | 78% | 51% | 51% | 53% | 53% |
| 8044 | 0.25% | 0.00% | 1.00% | 9.00% | 0.00% | 39% | 51% | 34% | 44% | 36% | 47% | 35% | 46% | 40% | 52% | 36% | 36% | 37% | 37% |
| 8045 | 1.00% | 0.25% | 1.00% | 9.00% | 0.00% | 46% | 59% | 39% | 51% | 42% | 55% | 40% | 52% | 45% | 59% | 42% | 42% | 42% | 42% |
| 8046 | 9.00% | 0.25% | 1.00% | 9.00% | 0.00% | 42% | 54% | 37% | 48% | 37% | 48% | 37% | 48% | 42% | 55% | 39% | 39% | 39% | 39% |
| 8047 | 0.00% | 1.00% | 1.00% | 9.00% | 0.00% | 48% | 62% | 45% | 59% | 41% | 53% | 43% | 56% | 50% | 65% | 45% | 45% | 45% | 45% |
| 8048 | 0.25% | 1.00% | 1.00% | 9.00% | 0.00% | 50% | 65% | 46% | 60% | 43% | 56% | 44% | 57% | 51% | 66% | 46% | 46% | 46% | 46% |
| 8049 | 1.00% | 1.00% | 1.00% | 9.00% | 0.00% | 52% | 68% | 47% | 61% | 46% | 60% | 46% | 60% | 53% | 69% | 48% | 48% | 48% | 48% |
| 8050 | 0.25% | 0.25% | 9.00% | 9.00% | 0.00% | 54% | 70% | 46% | 60% | 53% | 69% | 45% | 59% | 57% | 74% | 51% | 51% | 52% | 52% |
| 8051 | 0.25% | 0.25% | 0.00% | 0.00% | 0.25% | 13% | 16% | 12% | 16% | 11% | 14% | 9% | 12% | 11% | 14% | 12% | 12% | 10% | 10% |
| 8052 | 1.00% | 0.25% | 0.00% | 0.00% | 0.25% | 15% | 19% | 13% | 17% | 14% | 18% | 11% | 14% | 13% | 17% | 14% | 14% | 13% | 13% |
| 8053 | 0.25% | 1.00% | 0.00% | 0.00% | 0.25% | 19% | 25% | 20% | 26% | 15% | 20% | 15% | 20% | 19% | 25% | 18% | 18% | 16% | 16% |
| 8054 | 1.00% | 1.00% | 0.00% | 0.00% | 0.25% | 21% | 27% | 21% | 27% | 18% | 23% | 17% | 22% | 21% | 27% | 20% | 20% | 19% | 19% |
| 8055 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 8056 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 8057 | 0.00% | 0.25% | 0.25% | 0.00% | 0.25% | 16% | 20% | 15% | 20% | 16% | 21% | 15% | 20% | 17% | 22% | 16% | 16% | 16% | 16% |
| 8058 | 0.25% | 0.25% | 0.25% | 0.00% | 0.25% | 18% | 23% | 16% | 21% | 18% | 23% | 16% | 21% | 18% | 23% | 17% | 17% | 17% | 17% |
| 8059 | 0.00% | 1.00% | 0.25% | 0.00% | 0.25% | 22% | 29% | 23% | 30% | 20% | 26% | 21% | 27% | 25% | 33% | 22% | 22% | 22% | 22% |
| 8060 | 1.00% | 1.00% | 0.25% | 0.00% | 0.25% | 26% | 34% | 25% | 33% | 25% | 33% | 24% | 31% | 28% | 36% | 25% | 25% | 26% | 26% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8061 | 1.00% | 9.00% | 0.25% | 0.00% | 0.25% | 37% | 48% | 38% | 49% | 33% | 43% | 34% | 44% | 42% | 55% | 36% | 36% | 36% | 36% |
| 8062 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 8063 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 8064 | 0.00% | 0.25% | 1.00% | 0.00% | 0.25% | 21% | 27% | 22% | 29% | 21% | 27% | 17% | 22% | 22% | 29% | 21% | 21% | 20% | 20% |
| 8065 | 1.00% | 0.25% | 1.00% | 0.00% | 0.25% | 25% | 32% | 24% | 31% | 26% | 34% | 20% | 26% | 25% | 33% | 25% | 25% | 24% | 24% |
| 8066 | 0.00% | 1.00% | 1.00% | 0.00% | 0.25% | 27% | 35% | 30% | 39% | 25% | 33% | 23% | 30% | 30% | 39% | 27% | 27% | 26% | 26% |
| 8067 | 0.25% | 1.00% | 1.00% | 0.00% | 0.25% | 29% | 38% | 31% | 40% | 27% | 35% | 24% | 31% | 31% | 40% | 29% | 29% | 27% | 27% |
| 8068 | 1.00% | 1.00% | 1.00% | 0.00% | 0.25% | 31% | 40% | 32% | 42% | 30% | 39% | 26% | 34% | 33% | 43% | 31% | 31% | 30% | 30% |
| 8069 | 9.00% | 1.00% | 1.00% | 0.00% | 0.25% | 27% | 35% | 30% | 39% | 25% | 33% | 23% | 30% | 30% | 39% | 27% | 27% | 26% | 26% |
| 8070 | 1.00% | 9.00% | 1.00% | 0.00% | 0.25% | 42% | 55% | 45% | 59% | 38% | 49% | 36% | 47% | 47% | 61% | 42% | 42% | 40% | 40% |
| 8071 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 8072 | 0.00% | 0.25% | 9.00% | 0.00% | 0.25% | 31% | 40% | 30% | 39% | 35% | 46% | 24% | 31% | 36% | 47% | 32% | 32% | 32% | 32% |
| 8073 | 0.25% | 0.25% | 9.00% | 0.00% | 0.25% | 33% | 42% | 31% | 40% | 37% | 48% | 25% | 33% | 37% | 48% | 34% | 34% | 33% | 33% |
| 8074 | 1.00% | 0.25% | 9.00% | 0.00% | 0.25% | 35% | 45% | 32% | 42% | 40% | 52% | 27% | 35% | 39% | 51% | 36% | 36% | 35% | 35% |
| 8075 | 0.25% | 1.00% | 9.00% | 0.00% | 0.25% | 39% | 51% | 39% | 51% | 41% | 53% | 31% | 40% | 45% | 59% | 40% | 40% | 39% | 39% |
| 8076 | 0.25% | 0.00% | 0.00% | 0.25% | 0.25% | 11% | 14% | 14% | 18% | 10% | 13% | 11% | 14% | 13% | 17% | 12% | 12% | 11% | 11% |
| 8077 | 1.00% | 0.00% | 0.00% | 0.25% | 0.25% | 13% | 17% | 15% | 20% | 13% | 17% | 13% | 17% | 15% | 20% | 14% | 14% | 14% | 14% |
| 8078 | 0.00% | 0.25% | 0.00% | 0.25% | 0.25% | 14% | 18% | 17% | 22% | 11% | 14% | 13% | 17% | 15% | 20% | 14% | 14% | 13% | 13% |
| 8079 | 0.25% | 0.25% | 0.00% | 0.25% | 0.25% | 16% | 20% | 18% | 23% | 13% | 17% | 14% | 18% | 16% | 21% | 16% | 16% | 14% | 14% |
| 8080 | 9.00% | 0.25% | 0.00% | 0.25% | 0.25% | 14% | 18% | 17% | 22% | 11% | 14% | 13% | 17% | 15% | 20% | 14% | 14% | 13% | 13% |
| 8081 | 1.00% | 1.00% | 0.00% | 0.25% | 0.25% | 24% | 31% | 27% | 35% | 20% | 26% | 22% | 29% | 26% | 34% | 24% | 24% | 23% | 23% |
| 8082 | 1.00% | 9.00% | 0.00% | 0.25% | 0.25% | 35% | 46% | 40% | 52% | 28% | 36% | 32% | 42% | 40% | 52% | 34% | 34% | 33% | 33% |
| 8083 | 0.00% | 0.00% | 0.25% | 0.25% | 0.25% | 14% | 18% | 17% | 22% | 15% | 20% | 17% | 22% | 19% | 25% | 15% | 15% | 17% | 17% |
| 8084 | 0.25% | 0.00% | 0.25% | 0.25% | 0.25% | 16% | 21% | 18% | 23% | 17% | 22% | 18% | 23% | 20% | 26% | 17% | 17% | 18% | 18% |
| 8085 | 0.00% | 0.25% | 0.25% | 0.25% | 0.25% | 19% | 24% | 21% | 27% | 18% | 23% | 20% | 26% | 22% | 29% | 19% | 19% | 20% | 20% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8086 | 0.25% | 0.25% | 0.25% | 0.25% | 0.25% | 21% | 27% | 22% | 29% | 20% | 26% | 21% | 27% | 23% | 30% | 21% | 21% | 21% | 21% |
| 8087 | 1.00% | 0.25% | 0.25% | 0.25% | 0.25% | 23% | 29% | 23% | 30% | 23% | 30% | 23% | 30% | 25% | 33% | 23% | 23% | 24% | 24% |
| 8088 | 9.00% | 0.25% | 0.25% | 0.25% | 0.25% | 19% | 24% | 21% | 27% | 18% | 23% | 20% | 26% | 22% | 29% | 19% | 19% | 20% | 20% |
| 8089 | 0.25% | 1.00% | 0.25% | 0.25% | 0.25% | 27% | 35% | 30% | 39% | 24% | 31% | 27% | 35% | 31% | 40% | 27% | 27% | 27% | 27% |
| 8090 | 9.00% | 1.00% | 0.25% | 0.25% | 0.25% | 25% | 33% | 29% | 38% | 22% | 29% | 26% | 34% | 30% | 39% | 25% | 25% | 26% | 26% |
| 8091 | 0.25% | 9.00% | 0.25% | 0.25% | 0.25% | 38% | 49% | 43% | 56% | 32% | 42% | 37% | 48% | 45% | 59% | 38% | 38% | 38% | 38% |
| 8092 | 1.00% | 9.00% | 0.25% | 0.25% | 0.25% | 40% | 52% | 44% | 57% | 35% | 46% | 39% | 51% | 47% | 61% | 40% | 40% | 40% | 40% |
| 8093 | 9.00% | 9.00% | 0.25% | 0.25% | 0.25% | 36% | 47% | 42% | 55% | 30% | 39% | 36% | 47% | 44% | 57% | 36% | 36% | 37% | 37% |
| 8094 | 0.00% | 0.00% | 1.00% | 0.25% | 0.25% | 19% | 25% | 24% | 31% | 20% | 26% | 19% | 25% | 24% | 31% | 21% | 21% | 21% | 21% |
| 8095 | 1.00% | 0.00% | 1.00% | 0.25% | 0.25% | 23% | 30% | 26% | 34% | 25% | 33% | 22% | 29% | 27% | 35% | 25% | 25% | 25% | 25% |
| 8096 | 0.00% | 0.25% | 1.00% | 0.25% | 0.25% | 24% | 31% | 28% | 36% | 23% | 30% | 22% | 29% | 27% | 35% | 25% | 25% | 24% | 24% |
| 8097 | 0.25% | 0.25% | 1.00% | 0.25% | 0.25% | 26% | 33% | 29% | 38% | 25% | 33% | 23% | 30% | 28% | 36% | 27% | 27% | 25% | 25% |
| 8098 | 1.00% | 0.25% | 1.00% | 0.25% | 0.25% | 28% | 36% | 30% | 39% | 28% | 36% | 25% | 33% | 30% | 39% | 29% | 29% | 28% | 28% |
| 8099 | 9.00% | 0.25% | 1.00% | 0.25% | 0.25% | 24% | 31% | 28% | 36% | 23% | 30% | 22% | 29% | 27% | 35% | 25% | 25% | 24% | 24% |
| 8100 | 0.00% | 1.00% | 1.00% | 0.25% | 0.25% | 30% | 39% | 36% | 47% | 27% | 35% | 28% | 36% | 35% | 46% | 31% | 31% | 30% | 30% |
| 8101 | 0.25% | 1.00% | 1.00% | 0.25% | 0.25% | 32% | 42% | 37% | 48% | 29% | 38% | 29% | 38% | 36% | 47% | 33% | 33% | 31% | 31% |
| 8102 | 1.00% | 1.00% | 1.00% | 0.25% | 0.25% | 34% | 44% | 38% | 49% | 32% | 42% | 31% | 40% | 38% | 49% | 35% | 35% | 34% | 34% |
| 8103 | 9.00% | 1.00% | 1.00% | 0.25% | 0.25% | 30% | 39% | 36% | 47% | 27% | 35% | 28% | 36% | 35% | 46% | 31% | 31% | 30% | 30% |
| 8104 | 0.00% | 9.00% | 1.00% | 0.25% | 0.25% | 41% | 53% | 49% | 64% | 35% | 46% | 38% | 49% | 49% | 64% | 42% | 42% | 41% | 41% |
| 8105 | 0.25% | 9.00% | 1.00% | 0.25% | 0.25% | 43% | 56% | 50% | 65% | 37% | 48% | 39% | 51% | 50% | 65% | 43% | 43% | 42% | 42% |
| 8106 | 1.00% | 9.00% | 1.00% | 0.25% | 0.25% | 45% | 59% | 51% | 66% | 40% | 52% | 41% | 53% | 52% | 68% | 45% | 45% | 44% | 44% |
| 8107 | 0.25% | 0.25% | 9.00% | 0.25% | 0.25% | 36% | 46% | 37% | 48% | 39% | 51% | 30% | 39% | 42% | 55% | 37% | 37% | 37% | 37% |
| 8108 | 1.00% | 0.25% | 9.00% | 0.25% | 0.25% | 38% | 49% | 38% | 49% | 42% | 55% | 32% | 42% | 44% | 57% | 39% | 39% | 39% | 39% |
| 8109 | 9.00% | 0.25% | 9.00% | 0.25% | 0.25% | 34% | 44% | 36% | 47% | 37% | 48% | 29% | 38% | 41% | 53% | 36% | 36% | 36% | 36% |
| 8110 | 0.00% | 1.00% | 9.00% | 0.25% | 0.25% | 40% | 52% | 44% | 57% | 41% | 53% | 35% | 46% | 49% | 64% | 42% | 42% | 42% | 42% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8111 | 0.25% | 1.00% | 9.00% | 0.25% | 0.25% | 42% | 55% | 45% | 59% | 43% | 56% | 36% | 47% | 50% | 65% | 43% | 43% | 43% | 43% |
| 8112 | 9.00% | 1.00% | 9.00% | 0.25% | 0.25% | 40% | 52% | 44% | 57% | 41% | 53% | 35% | 46% | 49% | 64% | 42% | 42% | 42% | 42% |
| 8113 | 1.00% | 9.00% | 9.00% | 0.25% | 0.25% | 55% | 72% | 59% | 77% | 54% | 70% | 48% | 62% | 66% | 86% | 56% | 56% | 56% | 56% |
| 8114 | 0.25% | 0.00% | 0.00% | 1.00% | 0.25% | 22% | 29% | 21% | 27% | 20% | 26% | 18% | 23% | 25% | 33% | 21% | 21% | 21% | 21% |
| 8115 | 1.00% | 0.25% | 0.00% | 1.00% | 0.25% | 29% | 37% | 26% | 34% | 26% | 34% | 23% | 30% | 30% | 39% | 27% | 27% | 26% | 26% |
| 8116 | 0.00% | 1.00% | 0.00% | 1.00% | 0.25% | 31% | 40% | 32% | 42% | 25% | 33% | 26% | 34% | 35% | 46% | 29% | 29% | 29% | 29% |
| 8117 | 0.25% | 1.00% | 0.00% | 1.00% | 0.25% | 33% | 43% | 33% | 43% | 27% | 35% | 27% | 35% | 36% | 47% | 31% | 31% | 30% | 30% |
| 8118 | 1.00% | 1.00% | 0.00% | 1.00% | 0.25% | 35% | 46% | 34% | 44% | 30% | 39% | 29% | 38% | 38% | 49% | 33% | 33% | 32% | 32% |
| 8119 | 0.00% | 0.00% | 0.25% | 1.00% | 0.25% | 25% | 33% | 24% | 31% | 25% | 33% | 24% | 31% | 31% | 40% | 25% | 25% | 27% | 27% |
| 8120 | 1.00% | 0.00% | 0.25% | 1.00% | 0.25% | 29% | 38% | 26% | 34% | 30% | 39% | 27% | 35% | 34% | 44% | 28% | 28% | 30% | 30% |
| 8121 | 0.25% | 0.25% | 0.25% | 1.00% | 0.25% | 32% | 41% | 29% | 38% | 30% | 39% | 28% | 36% | 35% | 46% | 30% | 30% | 31% | 31% |
| 8122 | 1.00% | 0.25% | 0.25% | 1.00% | 0.25% | 34% | 44% | 30% | 39% | 33% | 43% | 30% | 39% | 37% | 48% | 32% | 32% | 33% | 33% |
| 8123 | 9.00% | 0.25% | 0.25% | 1.00% | 0.25% | 30% | 38% | 28% | 36% | 28% | 36% | 27% | 35% | 34% | 44% | 29% | 29% | 30% | 30% |
| 8124 | 0.00% | 1.00% | 0.25% | 1.00% | 0.25% | 36% | 47% | 36% | 47% | 32% | 42% | 33% | 43% | 42% | 55% | 35% | 35% | 36% | 36% |
| 8125 | 0.25% | 1.00% | 0.25% | 1.00% | 0.25% | 38% | 49% | 37% | 48% | 34% | 44% | 34% | 44% | 43% | 56% | 36% | 36% | 37% | 37% |
| 8126 | 1.00% | 1.00% | 0.25% | 1.00% | 0.25% | 40% | 52% | 38% | 49% | 37% | 48% | 36% | 47% | 45% | 59% | 38% | 38% | 39% | 39% |
| 8127 | 9.00% | 1.00% | 0.25% | 1.00% | 0.25% | 36% | 47% | 36% | 47% | 32% | 42% | 33% | 43% | 42% | 55% | 35% | 35% | 36% | 36% |
| 8128 | 0.25% | 9.00% | 0.25% | 1.00% | 0.25% | 49% | 64% | 50% | 65% | 42% | 55% | 44% | 57% | 57% | 74% | 47% | 47% | 48% | 48% |
| 8129 | 1.00% | 9.00% | 0.25% | 1.00% | 0.25% | 51% | 66% | 51% | 66% | 45% | 59% | 46% | 60% | 59% | 77% | 49% | 49% | 50% | 50% |
| 8130 | 9.00% | 9.00% | 0.25% | 1.00% | 0.25% | 47% | 61% | 49% | 64% | 40% | 52% | 43% | 56% | 56% | 73% | 45% | 45% | 46% | 46% |
| 8131 | 0.00% | 0.00% | 1.00% | 1.00% | 0.25% | 30% | 39% | 31% | 40% | 30% | 39% | 26% | 34% | 36% | 47% | 30% | 30% | 31% | 31% |
| 8132 | 0.25% | 0.00% | 1.00% | 1.00% | 0.25% | 32% | 42% | 32% | 42% | 32% | 42% | 27% | 35% | 37% | 48% | 32% | 32% | 32% | 32% |
| 8133 | 1.00% | 0.00% | 1.00% | 1.00% | 0.25% | 34% | 44% | 33% | 43% | 35% | 46% | 29% | 38% | 39% | 51% | 34% | 34% | 34% | 34% |
| 8134 | 0.00% | 0.25% | 1.00% | 1.00% | 0.25% | 35% | 45% | 35% | 46% | 33% | 43% | 29% | 38% | 39% | 51% | 34% | 34% | 34% | 34% |
| 8135 | 1.00% | 0.25% | 1.00% | 1.00% | 0.25% | 39% | 50% | 37% | 48% | 38% | 49% | 32% | 42% | 42% | 55% | 38% | 38% | 37% | 37% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8136 | 9.00% | 0.25% | 1.00% | 1.00% | 0.25% | 35% | 45% | 35% | 46% | 33% | 43% | 29% | 38% | 39% | 51% | 34% | 34% | 34% | 34% |
| 8137 | 0.00% | 1.00% | 1.00% | 1.00% | 0.25% | 41% | 53% | 43% | 56% | 37% | 48% | 35% | 46% | 47% | 61% | 40% | 40% | 40% | 40% |
| 8138 | 0.25% | 1.00% | 1.00% | 1.00% | 0.25% | 43% | 56% | 44% | 57% | 39% | 51% | 36% | 47% | 48% | 62% | 42% | 42% | 41% | 41% |
| 8139 | 1.00% | 1.00% | 1.00% | 1.00% | 0.25% | 45% | 59% | 45% | 59% | 42% | 55% | 38% | 49% | 50% | 65% | 44% | 44% | 43% | 43% |
| 8140 | 9.00% | 1.00% | 1.00% | 1.00% | 0.25% | 41% | 53% | 43% | 56% | 37% | 48% | 35% | 46% | 47% | 61% | 40% | 40% | 40% | 40% |
| 8141 | 0.00% | 9.00% | 1.00% | 1.00% | 0.25% | 52% | 68% | 56% | 73% | 45% | 59% | 45% | 59% | 61% | 79% | 51% | 51% | 50% | 50% |
| 8142 | 0.25% | 9.00% | 1.00% | 1.00% | 0.25% | 54% | 70% | 57% | 74% | 47% | 61% | 46% | 60% | 62% | 81% | 53% | 53% | 52% | 52% |
| 8143 | 1.00% | 9.00% | 1.00% | 1.00% | 0.25% | 56% | 73% | 58% | 75% | 50% | 65% | 48% | 62% | 64% | 83% | 55% | 55% | 54% | 54% |
| 8144 | 0.25% | 0.25% | 9.00% | 1.00% | 0.25% | 47% | 60% | 44% | 57% | 49% | 64% | 37% | 48% | 54% | 70% | 47% | 47% | 47% | 47% |
| 8145 | 1.00% | 0.25% | 9.00% | 1.00% | 0.25% | 49% | 63% | 45% | 59% | 52% | 68% | 39% | 51% | 56% | 73% | 49% | 49% | 49% | 49% |
| 8146 | 9.00% | 0.25% | 9.00% | 1.00% | 0.25% | 45% | 58% | 43% | 56% | 47% | 61% | 36% | 47% | 53% | 69% | 45% | 45% | 45% | 45% |
| 8147 | 0.25% | 1.00% | 9.00% | 1.00% | 0.25% | 53% | 69% | 52% | 68% | 53% | 69% | 43% | 56% | 62% | 81% | 53% | 53% | 53% | 53% |
| 8148 | 0.00% | 0.25% | 0.00% | 9.00% | 0.25% | 38% | 49% | 33% | 43% | 31% | 40% | 33% | 43% | 37% | 48% | 34% | 34% | 34% | 34% |
| 8149 | 0.00% | 0.00% | 0.25% | 9.00% | 0.25% | 38% | 49% | 33% | 43% | 35% | 46% | 37% | 48% | 41% | 53% | 35% | 35% | 38% | 38% |
| 8150 | 0.25% | 0.00% | 0.25% | 9.00% | 0.25% | 40% | 52% | 34% | 44% | 37% | 48% | 38% | 49% | 42% | 55% | 37% | 37% | 39% | 39% |
| 8151 | 0.00% | 0.25% | 0.25% | 9.00% | 0.25% | 43% | 55% | 37% | 48% | 38% | 49% | 40% | 52% | 44% | 57% | 39% | 39% | 41% | 41% |
| 8152 | 0.25% | 0.25% | 0.25% | 9.00% | 0.25% | 45% | 58% | 38% | 49% | 40% | 52% | 41% | 53% | 45% | 59% | 41% | 41% | 42% | 42% |
| 8153 | 1.00% | 0.25% | 0.25% | 9.00% | 0.25% | 47% | 60% | 39% | 51% | 43% | 56% | 43% | 56% | 47% | 61% | 43% | 43% | 44% | 44% |
| 8154 | 9.00% | 0.25% | 0.25% | 9.00% | 0.25% | 43% | 55% | 37% | 48% | 38% | 49% | 40% | 52% | 44% | 57% | 39% | 39% | 41% | 41% |
| 8155 | 0.00% | 1.00% | 0.25% | 9.00% | 0.25% | 49% | 64% | 45% | 59% | 42% | 55% | 46% | 60% | 52% | 68% | 45% | 45% | 47% | 47% |
| 8156 | 0.25% | 1.00% | 0.25% | 9.00% | 0.25% | 51% | 66% | 46% | 60% | 44% | 57% | 47% | 61% | 53% | 69% | 47% | 47% | 48% | 48% |
| 8157 | 1.00% | 1.00% | 0.25% | 9.00% | 0.25% | 53% | 69% | 47% | 61% | 47% | 61% | 49% | 64% | 55% | 72% | 49% | 49% | 50% | 50% |
| 8158 | 0.25% | 9.00% | 0.25% | 9.00% | 0.25% | 62% | 81% | 59% | 77% | 52% | 68% | 57% | 74% | 67% | 87% | 58% | 58% | 59% | 59% |
| 8159 | 0.25% | 0.00% | 1.00% | 9.00% | 0.25% | 45% | 59% | 41% | 53% | 42% | 55% | 40% | 52% | 47% | 61% | 43% | 43% | 43% | 43% |
| 8160 | 1.00% | 0.25% | 1.00% | 9.00% | 0.25% | 52% | 67% | 46% | 60% | 48% | 62% | 45% | 59% | 52% | 68% | 49% | 49% | 48% | 48% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8161 | 9.00% | 0.25% | 1.00% | 9.00% | 0.25% | 48% | 62% | 44% | 57% | 43% | 56% | 42% | 55% | 49% | 64% | 45% | 45% | 45% | 45% |
| 8162 | 0.00% | 1.00% | 1.00% | 9.00% | 0.25% | 54% | 70% | 52% | 68% | 47% | 61% | 48% | 62% | 57% | 74% | 51% | 51% | 51% | 51% |
| 8163 | 0.25% | 1.00% | 1.00% | 9.00% | 0.25% | 56% | 73% | 53% | 69% | 49% | 64% | 49% | 64% | 58% | 75% | 53% | 53% | 52% | 52% |
| 8164 | 1.00% | 1.00% | 1.00% | 9.00% | 0.25% | 58% | 75% | 54% | 70% | 52% | 68% | 51% | 66% | 60% | 78% | 55% | 55% | 54% | 54% |
| 8165 | 0.25% | 0.25% | 9.00% | 9.00% | 0.25% | 60% | 77% | 53% | 69% | 59% | 77% | 50% | 65% | 64% | 83% | 57% | 57% | 58% | 58% |
| 8166 | 0.25% | 0.25% | 0.00% | 0.00% | 1.00% | 18% | 23% | 18% | 23% | 16% | 21% | 14% | 18% | 22% | 29% | 17% | 17% | 17% | 17% |
| 8167 | 1.00% | 0.25% | 0.00% | 0.00% | 1.00% | 20% | 25% | 19% | 25% | 19% | 25% | 16% | 21% | 24% | 31% | 19% | 19% | 20% | 20% |
| 8168 | 0.25% | 1.00% | 0.00% | 0.00% | 1.00% | 24% | 31% | 26% | 34% | 20% | 26% | 20% | 26% | 30% | 39% | 23% | 23% | 23% | 23% |
| 8169 | 1.00% | 1.00% | 0.00% | 0.00% | 1.00% | 26% | 34% | 27% | 35% | 23% | 30% | 22% | 29% | 32% | 42% | 25% | 25% | 26% | 26% |
| 8170 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 8171 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 8172 | 0.00% | 0.25% | 0.25% | 0.00% | 1.00% | 21% | 27% | 21% | 27% | 21% | 27% | 20% | 26% | 28% | 36% | 21% | 21% | 23% | 23% |
| 8173 | 0.25% | 0.25% | 0.25% | 0.00% | 1.00% | 23% | 29% | 22% | 29% | 23% | 30% | 21% | 27% | 29% | 38% | 23% | 23% | 24% | 24% |
| 8174 | 0.00% | 1.00% | 0.25% | 0.00% | 1.00% | 27% | 35% | 29% | 38% | 25% | 33% | 26% | 34% | 36% | 47% | 27% | 27% | 29% | 29% |
| 8175 | 1.00% | 1.00% | 0.25% | 0.00% | 1.00% | 31% | 40% | 31% | 40% | 30% | 39% | 29% | 38% | 39% | 51% | 31% | 31% | 33% | 33% |
| 8176 | 1.00% | 9.00% | 0.25% | 0.00% | 1.00% | 42% | 55% | 44% | 57% | 38% | 49% | 39% | 51% | 53% | 69% | 41% | 41% | 43% | 43% |
| 8177 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 8178 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 8179 | 0.00% | 0.25% | 1.00% | 0.00% | 1.00% | 26% | 33% | 28% | 36% | 26% | 34% | 22% | 29% | 33% | 43% | 27% | 27% | 27% | 27% |
| 8180 | 1.00% | 0.25% | 1.00% | 0.00% | 1.00% | 30% | 38% | 30% | 39% | 31% | 40% | 25% | 33% | 36% | 47% | 30% | 30% | 31% | 31% |
| 8181 | 0.00% | 1.00% | 1.00% | 0.00% | 1.00% | 32% | 42% | 36% | 47% | 30% | 39% | 28% | 36% | 41% | 53% | 33% | 33% | 33% | 33% |
| 8182 | 0.25% | 1.00% | 1.00% | 0.00% | 1.00% | 34% | 44% | 37% | 48% | 32% | 42% | 29% | 38% | 42% | 55% | 34% | 34% | 34% | 34% |
| 8183 | 1.00% | 1.00% | 1.00% | 0.00% | 1.00% | 36% | 47% | 38% | 49% | 35% | 46% | 31% | 40% | 44% | 57% | 36% | 36% | 37% | 37% |
| 8184 | 9.00% | 1.00% | 1.00% | 0.00% | 1.00% | 32% | 42% | 36% | 47% | 30% | 39% | 28% | 36% | 41% | 53% | 33% | 33% | 33% | 33% |
| 8185 | 1.00% | 9.00% | 1.00% | 0.00% | 1.00% | 47% | 61% | 51% | 66% | 43% | 56% | 41% | 53% | 58% | 75% | 47% | 47% | 47% | 47% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8186 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 8187 | 0.00% | 0.25% | 9.00% | 0.00% | 1.00% | 36% | 46% | 36% | 47% | 40% | 52% | 29% | 38% | 47% | 61% | 37% | 37% | 39% | 39% |
| 8188 | 0.25% | 0.25% | 9.00% | 0.00% | 1.00% | 38% | 49% | 37% | 48% | 42% | 55% | 30% | 39% | 48% | 62% | 39% | 39% | 40% | 40% |
| 8189 | 1.00% | 0.25% | 9.00% | 0.00% | 1.00% | 40% | 51% | 38% | 49% | 45% | 59% | 32% | 42% | 50% | 65% | 41% | 41% | 42% | 42% |
| 8190 | 0.25% | 1.00% | 9.00% | 0.00% | 1.00% | 44% | 57% | 45% | 59% | 46% | 60% | 36% | 47% | 56% | 73% | 45% | 45% | 46% | 46% |
| 8191 | 0.25% | 0.00% | 0.00% | 0.25% | 1.00% | 16% | 21% | 20% | 26% | 15% | 20% | 16% | 21% | 24% | 31% | 17% | 17% | 18% | 18% |
| 8192 | 1.00% | 0.00% | 0.00% | 0.25% | 1.00% | 18% | 23% | 21% | 27% | 18% | 23% | 18% | 23% | 26% | 34% | 19% | 19% | 21% | 21% |
| 8193 | 0.00% | 0.25% | 0.00% | 0.25% | 1.00% | 19% | 24% | 23% | 30% | 16% | 21% | 18% | 23% | 26% | 34% | 19% | 19% | 20% | 20% |
| 8194 | 0.25% | 0.25% | 0.00% | 0.25% | 1.00% | 21% | 27% | 24% | 31% | 18% | 23% | 19% | 25% | 27% | 35% | 21% | 21% | 21% | 21% |
| 8195 | 9.00% | 0.25% | 0.00% | 0.25% | 1.00% | 19% | 24% | 23% | 30% | 16% | 21% | 18% | 23% | 26% | 34% | 19% | 19% | 20% | 20% |
| 8196 | 1.00% | 1.00% | 0.00% | 0.25% | 1.00% | 29% | 38% | 33% | 43% | 25% | 33% | 27% | 35% | 37% | 48% | 29% | 29% | 30% | 30% |
| 8197 | 1.00% | 9.00% | 0.00% | 0.25% | 1.00% | 40% | 52% | 46% | 60% | 33% | 43% | 37% | 48% | 51% | 66% | 40% | 40% | 40% | 40% |
| 8198 | 0.00% | 0.00% | 0.25% | 0.25% | 1.00% | 19% | 25% | 23% | 30% | 20% | 26% | 22% | 29% | 30% | 39% | 21% | 21% | 24% | 24% |
| 8199 | 0.25% | 0.00% | 0.25% | 0.25% | 1.00% | 21% | 27% | 24% | 31% | 22% | 29% | 23% | 30% | 31% | 40% | 22% | 22% | 25% | 25% |
| 8200 | 0.00% | 0.25% | 0.25% | 0.25% | 1.00% | 24% | 31% | 27% | 35% | 23% | 30% | 25% | 33% | 33% | 43% | 25% | 25% | 27% | 27% |
| 8201 | 0.25% | 0.25% | 0.25% | 0.25% | 1.00% | 26% | 33% | 28% | 36% | 25% | 33% | 26% | 34% | 34% | 44% | 26% | 26% | 28% | 28% |
| 8202 | 1.00% | 0.25% | 0.25% | 0.25% | 1.00% | 28% | 36% | 29% | 38% | 28% | 36% | 28% | 36% | 36% | 47% | 28% | 28% | 31% | 31% |
| 8203 | 9.00% | 0.25% | 0.25% | 0.25% | 1.00% | 24% | 31% | 27% | 35% | 23% | 30% | 25% | 33% | 33% | 43% | 25% | 25% | 27% | 27% |
| 8204 | 0.25% | 1.00% | 0.25% | 0.25% | 1.00% | 32% | 42% | 36% | 47% | 29% | 38% | 32% | 42% | 42% | 55% | 32% | 32% | 34% | 34% |
| 8205 | 9.00% | 1.00% | 0.25% | 0.25% | 1.00% | 30% | 39% | 35% | 46% | 27% | 35% | 31% | 40% | 41% | 53% | 31% | 31% | 33% | 33% |
| 8206 | 0.25% | 9.00% | 0.25% | 0.25% | 1.00% | 43% | 56% | 49% | 64% | 37% | 48% | 42% | 55% | 56% | 73% | 43% | 43% | 45% | 45% |
| 8207 | 1.00% | 9.00% | 0.25% | 0.25% | 1.00% | 45% | 59% | 50% | 65% | 40% | 52% | 44% | 57% | 58% | 75% | 45% | 45% | 47% | 47% |
| 8208 | 9.00% | 9.00% | 0.25% | 0.25% | 1.00% | 41% | 53% | 48% | 62% | 35% | 46% | 41% | 53% | 55% | 72% | 41% | 41% | 44% | 44% |
| 8209 | 0.00% | 0.00% | 1.00% | 0.25% | 1.00% | 24% | 31% | 30% | 39% | 25% | 33% | 24% | 31% | 35% | 46% | 26% | 26% | 28% | 28% |
| 8210 | 1.00% | 0.00% | 1.00% | 0.25% | 1.00% | 28% | 36% | 32% | 42% | 30% | 39% | 27% | 35% | 38% | 49% | 30% | 30% | 32% | 32% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8211 | 0.00% | 0.25% | 1.00% | 0.25% | 1.00% | 29% | 37% | 34% | 44% | 28% | 36% | 27% | 35% | 38% | 49% | 30% | 30% | 31% | 31% |
| 8212 | 0.25% | 0.25% | 1.00% | 0.25% | 1.00% | 31% | 40% | 35% | 46% | 30% | 39% | 28% | 36% | 39% | 51% | 32% | 32% | 32% | 32% |
| 8213 | 1.00% | 0.25% | 1.00% | 0.25% | 1.00% | 33% | 42% | 36% | 47% | 33% | 43% | 30% | 39% | 41% | 53% | 34% | 34% | 35% | 35% |
| 8214 | 9.00% | 0.25% | 1.00% | 0.25% | 1.00% | 29% | 37% | 34% | 44% | 28% | 36% | 27% | 35% | 38% | 49% | 30% | 30% | 31% | 31% |
| 8215 | 0.00% | 1.00% | 1.00% | 0.25% | 1.00% | 35% | 46% | 42% | 55% | 32% | 42% | 33% | 43% | 46% | 60% | 36% | 36% | 37% | 37% |
| 8216 | 0.25% | 1.00% | 1.00% | 0.25% | 1.00% | 37% | 48% | 43% | 56% | 34% | 44% | 34% | 44% | 47% | 61% | 38% | 38% | 38% | 38% |
| 8217 | 1.00% | 1.00% | 1.00% | 0.25% | 1.00% | 39% | 51% | 44% | 57% | 37% | 48% | 36% | 47% | 49% | 64% | 40% | 40% | 41% | 41% |
| 8218 | 9.00% | 1.00% | 1.00% | 0.25% | 1.00% | 35% | 46% | 42% | 55% | 32% | 42% | 33% | 43% | 46% | 60% | 36% | 36% | 37% | 37% |
| 8219 | 0.00% | 9.00% | 1.00% | 0.25% | 1.00% | 46% | 60% | 55% | 72% | 40% | 52% | 43% | 56% | 60% | 78% | 47% | 47% | 48% | 48% |
| 8220 | 0.25% | 9.00% | 1.00% | 0.25% | 1.00% | 48% | 62% | 56% | 73% | 42% | 55% | 44% | 57% | 61% | 79% | 49% | 49% | 49% | 49% |
| 8221 | 1.00% | 9.00% | 1.00% | 0.25% | 1.00% | 50% | 65% | 57% | 74% | 45% | 59% | 46% | 60% | 63% | 82% | 51% | 51% | 51% | 51% |
| 8222 | 0.25% | 0.25% | 9.00% | 0.25% | 1.00% | 41% | 53% | 43% | 56% | 44% | 57% | 35% | 46% | 53% | 69% | 43% | 43% | 44% | 44% |
| 8223 | 1.00% | 0.25% | 9.00% | 0.25% | 1.00% | 43% | 55% | 44% | 57% | 47% | 61% | 37% | 48% | 55% | 72% | 45% | 45% | 46% | 46% |
| 8224 | 9.00% | 0.25% | 9.00% | 0.25% | 1.00% | 39% | 50% | 42% | 55% | 42% | 55% | 34% | 44% | 52% | 68% | 41% | 41% | 43% | 43% |
| 8225 | 0.00% | 1.00% | 9.00% | 0.25% | 1.00% | 45% | 59% | 50% | 65% | 46% | 60% | 40% | 52% | 60% | 78% | 47% | 47% | 49% | 49% |
| 8226 | 0.25% | 1.00% | 9.00% | 0.25% | 1.00% | 47% | 61% | 51% | 66% | 48% | 62% | 41% | 53% | 61% | 79% | 49% | 49% | 50% | 50% |
| 8227 | 9.00% | 1.00% | 9.00% | 0.25% | 1.00% | 45% | 59% | 50% | 65% | 46% | 60% | 40% | 52% | 60% | 78% | 47% | 47% | 49% | 49% |
| 8228 | 1.00% | 9.00% | 9.00% | 0.25% | 1.00% | 60% | 78% | 65% | 85% | 59% | 77% | 53% | 69% | 77% | 100 % | 61% | 61% | 63% | 63% |
| 8229 | 0.25% | 0.00% | 0.00% | 1.00% | 1.00% | 27% | 35% | 27% | 35% | 25% | 33% | 23% | 30% | 36% | 47% | 26% | 26% | 28% | 28% |
| 8230 | 1.00% | 0.25% | 0.00% | 1.00% | 1.00% | 34% | 44% | 32% | 42% | 31% | 40% | 28% | 36% | 41% | 53% | 32% | 32% | 33% | 33% |
| 8231 | 0.00% | 1.00% | 0.00% | 1.00% | 1.00% | 36% | 47% | 38% | 49% | 30% | 39% | 31% | 40% | 46% | 60% | 35% | 35% | 36% | 36% |
| 8232 | 0.25% | 1.00% | 0.00% | 1.00% | 1.00% | 38% | 49% | 39% | 51% | 32% | 42% | 32% | 42% | 47% | 61% | 36% | 36% | 37% | 37% |
| 8233 | 1.00% | 1.00% | 0.00% | 1.00% | 1.00% | 40% | 52% | 40% | 52% | 35% | 46% | 34% | 44% | 49% | 64% | 38% | 38% | 39% | 39% |
| 8234 | 0.00% | 0.00% | 0.25% | 1.00% | 1.00% | 30% | 39% | 30% | 39% | 30% | 39% | 29% | 38% | 42% | 55% | 30% | 30% | 34% | 34% |
| 8235 | 1.00% | 0.00% | 0.25% | 1.00% | 1.00% | 34% | 44% | 32% | 42% | 35% | 46% | 32% | 42% | 45% | 59% | 34% | 34% | 37% | 37% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8236 | 0.25% | 0.25% | 0.25% | 1.00% | 1.00% | 37% | 47% | 35% | 46% | 35% | 46% | 33% | 43% | 46% | 60% | 36% | 36% | 38% | 38% |
| 8237 | 1.00% | 0.25% | 0.25% | 1.00% | 1.00% | 39% | 50% | 36% | 47% | 38% | 49% | 35% | 46% | 48% | 62% | 38% | 38% | 40% | 40% |
| 8238 | 9.00% | 0.25% | 0.25% | 1.00% | 1.00% | 35% | 45% | 34% | 44% | 33% | 43% | 32% | 42% | 45% | 59% | 34% | 34% | 37% | 37% |
| 8239 | 0.00% | 1.00% | 0.25% | 1.00% | 1.00% | 41% | 53% | 42% | 55% | 37% | 48% | 38% | 49% | 53% | 69% | 40% | 40% | 43% | 43% |
| 8240 | 0.25% | 1.00% | 0.25% | 1.00% | 1.00% | 43% | 56% | 43% | 56% | 39% | 51% | 39% | 51% | 54% | 70% | 42% | 42% | 44% | 44% |
| 8241 | 1.00% | 1.00% | 0.25% | 1.00% | 1.00% | 45% | 59% | 44% | 57% | 42% | 55% | 41% | 53% | 56% | 73% | 44% | 44% | 46% | 46% |
| 8242 | 9.00% | 1.00% | 0.25% | 1.00% | 1.00% | 41% | 53% | 42% | 55% | 37% | 48% | 38% | 49% | 53% | 69% | 40% | 40% | 43% | 43% |
| 8243 | 0.25% | 9.00% | 0.25% | 1.00% | 1.00% | 54% | 70% | 56% | 73% | 47% | 61% | 49% | 64% | 68% | 88% | 52% | 52% | 55% | 55% |
| 8244 | 1.00% | 9.00% | 0.25% | 1.00% | 1.00% | 56% | 73% | 57% | 74% | 50% | 65% | 51% | 66% | 70% | 91% | 54% | 54% | 57% | 57% |
| 8245 | 9.00% | 9.00% | 0.25% | 1.00% | 1.00% | 52% | 68% | 55% | 72% | 45% | 59% | 48% | 62% | 67% | 87% | 51% | 51% | 53% | 53% |
| 8246 | 0.00% | 0.00% | 1.00% | 1.00% | 1.00% | 35% | 46% | 37% | 48% | 35% | 46% | 31% | 40% | 47% | 61% | 36% | 36% | 38% | 38% |
| 8247 | 0.25% | 0.00% | 1.00% | 1.00% | 1.00% | 37% | 48% | 38% | 49% | 37% | 48% | 32% | 42% | 48% | 62% | 37% | 37% | 39% | 39% |
| 8248 | 1.00% | 0.00% | 1.00% | 1.00% | 1.00% | 39% | 51% | 39% | 51% | 40% | 52% | 34% | 44% | 50% | 65% | 39% | 39% | 41% | 41% |
| 8249 | 0.00% | 0.25% | 1.00% | 1.00% | 1.00% | 40% | 51% | 41% | 53% | 38% | 49% | 34% | 44% | 50% | 65% | 40% | 40% | 41% | 41% |
| 8250 | 1.00% | 0.25% | 1.00% | 1.00% | 1.00% | 44% | 57% | 43% | 56% | 43% | 56% | 37% | 48% | 53% | 69% | 43% | 43% | 44% | 44% |
| 8251 | 9.00% | 0.25% | 1.00% | 1.00% | 1.00% | 40% | 51% | 41% | 53% | 38% | 49% | 34% | 44% | 50% | 65% | 40% | 40% | 41% | 41% |
| 8252 | 0.00% | 1.00% | 1.00% | 1.00% | 1.00% | 46% | 60% | 49% | 64% | 42% | 55% | 40% | 52% | 58% | 75% | 46% | 46% | 47% | 47% |
| 8253 | 0.25% | 1.00% | 1.00% | 1.00% | 1.00% | 48% | 62% | 50% | 65% | 44% | 57% | 41% | 53% | 59% | 77% | 47% | 47% | 48% | 48% |
| 8254 | 1.00% | 1.00% | 1.00% | 1.00% | 1.00% | 50% | 65% | 51% | 66% | 47% | 61% | 43% | 56% | 61% | 79% | 49% | 49% | 50% | 50% |
| 8255 | 9.00% | 1.00% | 1.00% | 1.00% | 1.00% | 46% | 60% | 49% | 64% | 42% | 55% | 40% | 52% | 58% | 75% | 46% | 46% | 47% | 47% |
| 8256 | 0.00% | 9.00% | 1.00% | 1.00% | 1.00% | 57% | 74% | 62% | 81% | 50% | 65% | 50% | 65% | 72% | 94% | 56% | 56% | 57% | 57% |
| 8257 | 0.25% | 9.00% | 1.00% | 1.00% | 1.00% | 59% | 77% | 63% | 82% | 52% | 68% | 51% | 66% | 73% | 95% | 58% | 58% | 59% | 59% |
| 8258 | 1.00% | 9.00% | 1.00% | 1.00% | 1.00% | 61% | 79% | 64% | 83% | 55% | 72% | 53% | 69% | 75% | 98% | 60% | 60% | 61% | 61% |
| 8259 | 0.25% | 0.25% | 9.00% | 1.00% | 1.00% | 52% | 67% | 50% | 65% | 54% | 70% | 42% | 55% | 65% | 85% | 52% | 52% | 54% | 54% |
| 8260 | 1.00% | 0.25% | 9.00% | 1.00% | 1.00% | 54% | 70% | 51% | 66% | 57% | 74% | 44% | 57% | 67% | 87% | 54% | 54% | 56% | 56% |

Fig. 29

| Formula # | Gamma Dodecalactone | Apritone | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8261 | 9.00% | 0.25% | 9.00% | 1.00% | 1.00% | 50% | 64% | 49% | 64% | 52% | 68% | 41% | 53% | 64% | 83% | 50% | 50% | 52% | 52% |
| 8262 | 0.25% | 1.00% | 9.00% | 1.00% | 1.00% | 58% | 75% | 58% | 75% | 58% | 75% | 48% | 62% | 73% | 95% | 58% | 58% | 60% | 60% |
| 8263 | 0.00% | 0.25% | 0.00% | 9.00% | 1.00% | 43% | 55% | 39% | 51% | 36% | 47% | 38% | 49% | 48% | 62% | 39% | 39% | 41% | 41% |
| 8264 | 0.00% | 0.00% | 0.25% | 9.00% | 1.00% | 43% | 56% | 39% | 51% | 40% | 52% | 42% | 55% | 52% | 68% | 41% | 41% | 45% | 45% |
| 8265 | 0.25% | 0.00% | 0.25% | 9.00% | 1.00% | 45% | 59% | 40% | 52% | 42% | 55% | 43% | 56% | 53% | 69% | 42% | 42% | 46% | 46% |
| 8266 | 0.00% | 0.25% | 0.25% | 9.00% | 1.00% | 48% | 62% | 43% | 56% | 43% | 56% | 45% | 59% | 55% | 72% | 45% | 45% | 48% | 48% |
| 8267 | 0.25% | 0.25% | 0.25% | 9.00% | 1.00% | 50% | 64% | 44% | 57% | 45% | 59% | 46% | 60% | 56% | 73% | 46% | 46% | 49% | 49% |
| 8268 | 1.00% | 0.25% | 0.25% | 9.00% | 1.00% | 52% | 67% | 45% | 59% | 48% | 62% | 48% | 62% | 58% | 75% | 48% | 48% | 51% | 51% |
| 8269 | 9.00% | 0.25% | 0.25% | 9.00% | 1.00% | 48% | 62% | 43% | 56% | 43% | 56% | 45% | 59% | 55% | 72% | 45% | 45% | 48% | 48% |
| 8270 | 0.00% | 1.00% | 0.25% | 9.00% | 1.00% | 54% | 70% | 51% | 66% | 47% | 61% | 51% | 66% | 63% | 82% | 51% | 51% | 54% | 54% |
| 8271 | 0.25% | 1.00% | 0.25% | 9.00% | 1.00% | 56% | 73% | 52% | 68% | 49% | 64% | 52% | 68% | 64% | 83% | 52% | 52% | 55% | 55% |
| 8272 | 1.00% | 1.00% | 0.25% | 9.00% | 1.00% | 58% | 75% | 53% | 69% | 52% | 68% | 54% | 70% | 66% | 86% | 54% | 54% | 57% | 57% |
| 8273 | 0.25% | 9.00% | 0.25% | 9.00% | 1.00% | 67% | 87% | 65% | 85% | 57% | 74% | 62% | 81% | 78% | 101 % | 63% | 63% | 66% | 66% |
| 8274 | 0.25% | 0.00% | 1.00% | 9.00% | 1.00% | 50% | 65% | 47% | 61% | 47% | 61% | 45% | 59% | 58% | 75% | 48% | 48% | 50% | 50% |
| 8275 | 1.00% | 0.25% | 1.00% | 9.00% | 1.00% | 57% | 73% | 52% | 68% | 53% | 69% | 50% | 65% | 63% | 82% | 54% | 54% | 55% | 55% |
| 8276 | 9.00% | 0.25% | 1.00% | 9.00% | 1.00% | 53% | 68% | 50% | 65% | 48% | 62% | 47% | 61% | 60% | 78% | 50% | 50% | 52% | 52% |
| 8277 | 0.00% | 1.00% | 1.00% | 9.00% | 1.00% | 59% | 77% | 58% | 75% | 52% | 68% | 53% | 69% | 68% | 88% | 56% | 56% | 58% | 58% |
| 8278 | 0.25% | 1.00% | 1.00% | 9.00% | 1.00% | 61% | 79% | 59% | 77% | 54% | 70% | 54% | 70% | 69% | 90% | 58% | 58% | 59% | 59% |
| 8279 | 1.00% | 1.00% | 1.00% | 9.00% | 1.00% | 63% | 82% | 60% | 78% | 57% | 74% | 56% | 73% | 71% | 92% | 60% | 60% | 61% | 61% |
| 8280 | 0.25% | 0.25% | 9.00% | 9.00% | 1.00% | 65% | 84% | 59% | 77% | 64% | 83% | 55% | 72% | 75% | 98% | 63% | 63% | 65% | 65% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8281 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 8282 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 8283 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 8284 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 8285 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 8286 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 8287 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 8288 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 8289 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 8290 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 8291 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 8292 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 8293 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 8294 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 8295 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 8296 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 8297 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 8298 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 8299 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 8300 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 8301 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 8302 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 8303 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 8304 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 8305 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8306 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 8307 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 8308 | 0.00% | 0.25% | 0.00% | 0.25% | 0.00% | 9% | 12% | 14% | 18% | 10% | 13% | 15% | 20% | 11% | 14% | 11% | 11% | 12% | 12% |
| 8309 | 0.25% | 0.25% | 0.00% | 0.25% | 0.00% | 11% | 14% | 15% | 20% | 12% | 16% | 16% | 21% | 12% | 16% | 13% | 13% | 13% | 13% |
| 8310 | 9.00% | 0.25% | 0.00% | 0.25% | 0.00% | 9% | 12% | 14% | 18% | 10% | 13% | 15% | 20% | 11% | 14% | 11% | 11% | 12% | 12% |
| 8311 | 1.00% | 1.00% | 0.00% | 0.25% | 0.00% | 16% | 21% | 19% | 25% | 19% | 25% | 21% | 27% | 17% | 22% | 18% | 18% | 19% | 19% |
| 8312 | 1.00% | 9.00% | 0.00% | 0.25% | 0.00% | 24% | 31% | 27% | 35% | 25% | 33% | 28% | 36% | 24% | 31% | 25% | 25% | 26% | 26% |
| 8313 | 0.00% | 0.00% | 0.25% | 0.25% | 0.00% | 10% | 13% | 13% | 17% | 13% | 17% | 17% | 22% | 14% | 18% | 12% | 12% | 15% | 15% |
| 8314 | 0.25% | 0.00% | 0.25% | 0.25% | 0.00% | 12% | 16% | 14% | 18% | 15% | 20% | 18% | 23% | 15% | 20% | 14% | 14% | 16% | 16% |
| 8315 | 0.00% | 0.25% | 0.25% | 0.25% | 0.00% | 14% | 18% | 18% | 23% | 17% | 22% | 22% | 29% | 18% | 23% | 16% | 16% | 19% | 19% |
| 8316 | 0.25% | 0.25% | 0.25% | 0.25% | 0.00% | 16% | 21% | 19% | 25% | 19% | 25% | 23% | 30% | 19% | 25% | 18% | 18% | 20% | 20% |
| 8317 | 1.00% | 0.25% | 0.25% | 0.25% | 0.00% | 18% | 23% | 20% | 26% | 22% | 29% | 25% | 33% | 21% | 27% | 20% | 20% | 23% | 23% |
| 8318 | 9.00% | 0.25% | 0.25% | 0.25% | 0.00% | 14% | 18% | 18% | 23% | 17% | 22% | 22% | 29% | 18% | 23% | 16% | 16% | 19% | 19% |
| 8319 | 0.25% | 1.00% | 0.25% | 0.25% | 0.00% | 19% | 25% | 22% | 29% | 23% | 30% | 26% | 34% | 22% | 29% | 21% | 21% | 24% | 24% |
| 8320 | 9.00% | 1.00% | 0.25% | 0.25% | 0.00% | 17% | 22% | 21% | 27% | 21% | 27% | 25% | 33% | 21% | 27% | 20% | 20% | 22% | 22% |
| 8321 | 0.25% | 9.00% | 0.25% | 0.25% | 0.00% | 27% | 35% | 30% | 39% | 29% | 38% | 33% | 43% | 29% | 38% | 29% | 29% | 30% | 30% |
| 8322 | 1.00% | 9.00% | 0.25% | 0.25% | 0.00% | 29% | 38% | 31% | 40% | 32% | 42% | 35% | 46% | 31% | 40% | 31% | 31% | 33% | 33% |
| 8323 | 9.00% | 9.00% | 0.25% | 0.25% | 0.00% | 25% | 33% | 29% | 38% | 27% | 35% | 32% | 42% | 28% | 36% | 27% | 27% | 29% | 29% |
| 8324 | 0.00% | 0.00% | 1.00% | 0.25% | 0.00% | 15% | 20% | 20% | 26% | 18% | 23% | 19% | 25% | 19% | 25% | 18% | 18% | 19% | 19% |
| 8325 | 1.00% | 0.00% | 1.00% | 0.25% | 0.00% | 19% | 25% | 22% | 29% | 23% | 30% | 22% | 29% | 22% | 29% | 21% | 21% | 22% | 22% |
| 8326 | 0.00% | 0.25% | 1.00% | 0.25% | 0.00% | 19% | 25% | 25% | 33% | 22% | 29% | 24% | 31% | 23% | 30% | 22% | 22% | 23% | 23% |
| 8327 | 0.25% | 0.25% | 1.00% | 0.25% | 0.00% | 21% | 27% | 26% | 34% | 24% | 31% | 25% | 33% | 24% | 31% | 24% | 24% | 24% | 24% |
| 8328 | 1.00% | 0.25% | 1.00% | 0.25% | 0.00% | 23% | 30% | 27% | 35% | 27% | 35% | 27% | 35% | 26% | 34% | 26% | 26% | 27% | 27% |
| 8329 | 9.00% | 0.25% | 1.00% | 0.25% | 0.00% | 19% | 25% | 25% | 33% | 22% | 29% | 24% | 31% | 23% | 30% | 22% | 22% | 23% | 23% |
| 8330 | 0.00% | 1.00% | 1.00% | 0.25% | 0.00% | 22% | 29% | 28% | 36% | 26% | 34% | 27% | 35% | 26% | 34% | 25% | 25% | 26% | 26% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8331 | 0.25% | 1.00% | 1.00% | 0.25% | 0.00% | 24% | 31% | 29% | 38% | 28% | 36% | 28% | 36% | 27% | 35% | 27% | 27% | 28% | 28% |
| 8332 | 1.00% | 1.00% | 1.00% | 0.25% | 0.00% | 26% | 34% | 30% | 39% | 31% | 40% | 30% | 39% | 29% | 38% | 29% | 29% | 30% | 30% |
| 8333 | 9.00% | 1.00% | 1.00% | 0.25% | 0.00% | 22% | 29% | 28% | 36% | 26% | 34% | 27% | 35% | 26% | 34% | 25% | 25% | 26% | 26% |
| 8334 | 0.00% | 9.00% | 1.00% | 0.25% | 0.00% | 30% | 39% | 36% | 47% | 32% | 42% | 34% | 44% | 33% | 43% | 33% | 33% | 33% | 33% |
| 8335 | 0.25% | 9.00% | 1.00% | 0.25% | 0.00% | 32% | 42% | 37% | 48% | 34% | 44% | 35% | 46% | 34% | 44% | 34% | 34% | 34% | 34% |
| 8336 | 1.00% | 9.00% | 1.00% | 0.25% | 0.00% | 34% | 44% | 38% | 49% | 37% | 48% | 37% | 48% | 36% | 47% | 36% | 36% | 37% | 37% |
| 8337 | 0.25% | 0.25% | 9.00% | 0.25% | 0.00% | 31% | 40% | 34% | 44% | 38% | 49% | 32% | 42% | 38% | 49% | 34% | 34% | 36% | 36% |
| 8338 | 1.00% | 0.25% | 9.00% | 0.25% | 0.00% | 33% | 43% | 35% | 46% | 41% | 53% | 34% | 44% | 40% | 52% | 36% | 36% | 38% | 38% |
| 8339 | 9.00% | 0.25% | 9.00% | 0.25% | 0.00% | 29% | 38% | 33% | 43% | 36% | 47% | 31% | 40% | 37% | 48% | 33% | 33% | 35% | 35% |
| 8340 | 0.00% | 1.00% | 9.00% | 0.25% | 0.00% | 32% | 42% | 36% | 47% | 40% | 52% | 34% | 44% | 40% | 52% | 36% | 36% | 38% | 38% |
| 8341 | 0.25% | 1.00% | 9.00% | 0.25% | 0.00% | 34% | 44% | 37% | 48% | 42% | 55% | 35% | 46% | 41% | 53% | 38% | 38% | 39% | 39% |
| 8342 | 9.00% | 1.00% | 9.00% | 0.25% | 0.00% | 32% | 42% | 36% | 47% | 40% | 52% | 34% | 44% | 40% | 52% | 36% | 36% | 38% | 38% |
| 8343 | 1.00% | 9.00% | 9.00% | 0.25% | 0.00% | 44% | 57% | 46% | 60% | 51% | 66% | 44% | 57% | 50% | 65% | 47% | 47% | 48% | 48% |
| 8344 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 8345 | 1.00% | 0.25% | 0.00% | 1.00% | 0.00% | 28% | 36% | 28% | 36% | 27% | 35% | 28% | 36% | 29% | 38% | 28% | 28% | 28% | 28% |
| 8346 | 0.00% | 1.00% | 0.00% | 1.00% | 0.00% | 27% | 35% | 29% | 38% | 26% | 34% | 28% | 36% | 29% | 38% | 27% | 27% | 28% | 28% |
| 8347 | 0.25% | 1.00% | 0.00% | 1.00% | 0.00% | 29% | 38% | 30% | 39% | 28% | 36% | 29% | 38% | 30% | 39% | 29% | 29% | 29% | 29% |
| 8348 | 1.00% | 1.00% | 0.00% | 1.00% | 0.00% | 31% | 40% | 31% | 40% | 31% | 40% | 31% | 40% | 32% | 42% | 31% | 31% | 31% | 31% |
| 8349 | 0.00% | 0.00% | 0.25% | 1.00% | 0.00% | 25% | 33% | 25% | 33% | 25% | 33% | 27% | 35% | 29% | 38% | 25% | 25% | 27% | 27% |
| 8350 | 1.00% | 0.00% | 0.25% | 1.00% | 0.00% | 29% | 38% | 27% | 35% | 30% | 39% | 30% | 39% | 32% | 42% | 29% | 29% | 31% | 31% |
| 8351 | 0.25% | 0.25% | 0.25% | 1.00% | 0.00% | 31% | 40% | 31% | 40% | 31% | 40% | 33% | 43% | 34% | 44% | 31% | 31% | 33% | 33% |
| 8352 | 1.00% | 0.25% | 0.25% | 1.00% | 0.00% | 33% | 43% | 32% | 42% | 34% | 44% | 35% | 46% | 36% | 47% | 33% | 33% | 35% | 35% |
| 8353 | 9.00% | 0.25% | 0.25% | 1.00% | 0.00% | 29% | 38% | 30% | 39% | 29% | 38% | 32% | 42% | 33% | 43% | 29% | 29% | 31% | 31% |
| 8354 | 0.00% | 1.00% | 0.25% | 1.00% | 0.00% | 32% | 42% | 33% | 43% | 33% | 43% | 35% | 46% | 36% | 47% | 33% | 33% | 35% | 35% |
| 8355 | 0.25% | 1.00% | 0.25% | 1.00% | 0.00% | 34% | 44% | 34% | 44% | 35% | 46% | 36% | 47% | 37% | 48% | 34% | 34% | 36% | 36% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8356 | 1.00% | 1.00% | 0.25% | 1.00% | 0.00% | 36% | 47% | 35% | 46% | 38% | 49% | 38% | 49% | 39% | 51% | 36% | 36% | 38% | 38% |
| 8357 | 9.00% | 1.00% | 0.25% | 1.00% | 0.00% | 32% | 42% | 33% | 43% | 33% | 43% | 35% | 46% | 36% | 47% | 33% | 33% | 35% | 35% |
| 8358 | 0.25% | 9.00% | 0.25% | 1.00% | 0.00% | 42% | 55% | 42% | 55% | 41% | 53% | 43% | 56% | 44% | 57% | 42% | 42% | 43% | 43% |
| 8359 | 1.00% | 9.00% | 0.25% | 1.00% | 0.00% | 44% | 57% | 43% | 56% | 44% | 57% | 45% | 59% | 46% | 60% | 44% | 44% | 45% | 45% |
| 8360 | 9.00% | 9.00% | 0.25% | 1.00% | 0.00% | 40% | 52% | 41% | 53% | 39% | 51% | 42% | 55% | 43% | 56% | 40% | 40% | 41% | 41% |
| 8361 | 0.00% | 0.00% | 1.00% | 1.00% | 0.00% | 30% | 39% | 32% | 42% | 30% | 39% | 29% | 38% | 34% | 44% | 31% | 31% | 31% | 31% |
| 8362 | 0.25% | 0.00% | 1.00% | 1.00% | 0.00% | 32% | 42% | 33% | 43% | 32% | 42% | 30% | 39% | 35% | 46% | 32% | 32% | 32% | 32% |
| 8363 | 1.00% | 0.00% | 1.00% | 1.00% | 0.00% | 34% | 44% | 34% | 44% | 35% | 46% | 32% | 42% | 37% | 48% | 34% | 34% | 35% | 35% |
| 8364 | 0.00% | 0.25% | 1.00% | 1.00% | 0.00% | 34% | 44% | 37% | 48% | 34% | 44% | 34% | 44% | 38% | 49% | 35% | 35% | 35% | 35% |
| 8365 | 1.00% | 0.25% | 1.00% | 1.00% | 0.00% | 38% | 49% | 39% | 51% | 39% | 51% | 37% | 48% | 41% | 53% | 39% | 39% | 39% | 39% |
| 8366 | 9.00% | 0.25% | 1.00% | 1.00% | 0.00% | 34% | 44% | 37% | 48% | 34% | 44% | 34% | 44% | 38% | 49% | 35% | 35% | 35% | 35% |
| 8367 | 0.00% | 1.00% | 1.00% | 1.00% | 0.00% | 37% | 48% | 40% | 52% | 38% | 49% | 37% | 48% | 41% | 53% | 38% | 38% | 39% | 39% |
| 8368 | 0.25% | 1.00% | 1.00% | 1.00% | 0.00% | 39% | 51% | 41% | 53% | 40% | 52% | 38% | 49% | 42% | 55% | 40% | 40% | 40% | 40% |
| 8369 | 1.00% | 1.00% | 1.00% | 1.00% | 0.00% | 41% | 53% | 42% | 55% | 43% | 56% | 40% | 52% | 44% | 57% | 42% | 42% | 42% | 42% |
| 8370 | 9.00% | 1.00% | 1.00% | 1.00% | 0.00% | 37% | 48% | 40% | 52% | 38% | 49% | 37% | 48% | 41% | 53% | 38% | 38% | 39% | 39% |
| 8371 | 0.00% | 9.00% | 1.00% | 1.00% | 0.00% | 45% | 59% | 48% | 62% | 44% | 57% | 44% | 57% | 48% | 62% | 46% | 46% | 45% | 45% |
| 8372 | 0.25% | 9.00% | 1.00% | 1.00% | 0.00% | 47% | 61% | 49% | 64% | 46% | 60% | 45% | 59% | 49% | 64% | 47% | 47% | 47% | 47% |
| 8373 | 1.00% | 9.00% | 1.00% | 1.00% | 0.00% | 49% | 64% | 50% | 65% | 49% | 64% | 47% | 61% | 51% | 66% | 49% | 49% | 49% | 49% |
| 8374 | 0.25% | 0.25% | 9.00% | 1.00% | 0.00% | 46% | 60% | 46% | 60% | 50% | 65% | 42% | 55% | 53% | 69% | 47% | 47% | 48% | 48% |
| 8375 | 1.00% | 0.25% | 9.00% | 1.00% | 0.00% | 48% | 62% | 47% | 61% | 53% | 69% | 44% | 57% | 55% | 72% | 49% | 49% | 51% | 51% |
| 8376 | 9.00% | 0.25% | 9.00% | 1.00% | 0.00% | 44% | 57% | 45% | 59% | 48% | 62% | 41% | 53% | 52% | 68% | 46% | 46% | 47% | 47% |
| 8377 | 0.25% | 1.00% | 9.00% | 1.00% | 0.00% | 49% | 64% | 49% | 64% | 54% | 70% | 45% | 59% | 56% | 73% | 51% | 51% | 52% | 52% |
| 8378 | 0.00% | 0.25% | 0.00% | 9.00% | 0.00% | 44% | 57% | 40% | 52% | 40% | 52% | 45% | 59% | 39% | 51% | 41% | 41% | 41% | 41% |
| 8379 | 0.00% | 0.00% | 0.25% | 9.00% | 0.00% | 45% | 59% | 39% | 51% | 43% | 56% | 47% | 61% | 42% | 55% | 42% | 42% | 44% | 44% |
| 8380 | 0.25% | 0.00% | 0.25% | 9.00% | 0.00% | 47% | 61% | 40% | 52% | 45% | 59% | 48% | 62% | 43% | 56% | 44% | 44% | 45% | 45% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8381 | 0.00% | 0.25% | 0.25% | 9.00% | 0.00% | 49% | 64% | 44% | 57% | 47% | 61% | 52% | 68% | 46% | 60% | 47% | 47% | 48% | 48% |
| 8382 | 0.25% | 0.25% | 0.25% | 9.00% | 0.00% | 51% | 66% | 45% | 59% | 49% | 64% | 53% | 69% | 47% | 61% | 48% | 48% | 50% | 50% |
| 8383 | 1.00% | 0.25% | 0.25% | 9.00% | 0.00% | 53% | 69% | 46% | 60% | 52% | 68% | 55% | 72% | 49% | 64% | 50% | 50% | 52% | 52% |
| 8384 | 9.00% | 0.25% | 0.25% | 9.00% | 0.00% | 49% | 64% | 44% | 57% | 47% | 61% | 52% | 68% | 46% | 60% | 47% | 47% | 48% | 48% |
| 8385 | 0.00% | 1.00% | 0.25% | 9.00% | 0.00% | 52% | 68% | 47% | 61% | 51% | 66% | 55% | 72% | 49% | 64% | 50% | 50% | 52% | 52% |
| 8386 | 0.25% | 1.00% | 0.25% | 9.00% | 0.00% | 54% | 70% | 48% | 62% | 53% | 69% | 56% | 73% | 50% | 65% | 52% | 52% | 53% | 53% |
| 8387 | 1.00% | 1.00% | 0.25% | 9.00% | 0.00% | 56% | 73% | 49% | 64% | 56% | 73% | 58% | 75% | 52% | 68% | 54% | 54% | 55% | 55% |
| 8388 | 0.25% | 9.00% | 0.25% | 9.00% | 0.00% | 62% | 81% | 56% | 73% | 59% | 77% | 63% | 82% | 57% | 74% | 59% | 59% | 60% | 60% |
| 8389 | 0.25% | 0.00% | 1.00% | 9.00% | 0.00% | 52% | 68% | 47% | 61% | 50% | 65% | 50% | 65% | 48% | 62% | 50% | 50% | 49% | 49% |
| 8390 | 1.00% | 0.25% | 1.00% | 9.00% | 0.00% | 58% | 75% | 53% | 69% | 57% | 74% | 57% | 74% | 54% | 70% | 56% | 56% | 56% | 56% |
| 8391 | 9.00% | 0.25% | 1.00% | 9.00% | 0.00% | 54% | 70% | 51% | 66% | 52% | 68% | 54% | 70% | 51% | 66% | 52% | 52% | 52% | 52% |
| 8392 | 0.00% | 1.00% | 1.00% | 9.00% | 0.00% | 57% | 74% | 54% | 70% | 56% | 73% | 57% | 74% | 54% | 70% | 56% | 56% | 56% | 56% |
| 8393 | 0.25% | 1.00% | 1.00% | 9.00% | 0.00% | 59% | 77% | 55% | 72% | 58% | 75% | 58% | 75% | 55% | 72% | 57% | 57% | 57% | 57% |
| 8394 | 1.00% | 1.00% | 1.00% | 9.00% | 0.00% | 61% | 79% | 56% | 73% | 61% | 79% | 60% | 78% | 57% | 74% | 59% | 59% | 59% | 59% |
| 8395 | 0.25% | 0.25% | 9.00% | 9.00% | 0.00% | 66% | 86% | 60% | 78% | 68% | 88% | 62% | 81% | 66% | 86% | 65% | 65% | 65% | 65% |
| 8396 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 8397 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 8398 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 8399 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 8400 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 8401 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 8402 | 0.00% | 0.25% | 0.25% | 0.00% | 0.25% | 15% | 20% | 16% | 21% | 17% | 22% | 17% | 22% | 18% | 23% | 16% | 16% | 17% | 17% |
| 8403 | 0.25% | 0.25% | 0.25% | 0.00% | 0.25% | 17% | 22% | 17% | 22% | 19% | 25% | 18% | 23% | 19% | 25% | 18% | 18% | 19% | 19% |
| 8404 | 0.00% | 1.00% | 0.25% | 0.00% | 0.25% | 18% | 23% | 19% | 25% | 21% | 27% | 20% | 26% | 21% | 27% | 19% | 19% | 21% | 21% |
| 8405 | 1.00% | 1.00% | 0.25% | 0.00% | 0.25% | 22% | 29% | 21% | 27% | 26% | 34% | 23% | 30% | 24% | 31% | 23% | 23% | 24% | 24% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8406 | 1.00% | 9.00% | 0.25% | 0.00% | 0.25% | 30% | 39% | 29% | 38% | 32% | 42% | 30% | 39% | 31% | 40% | 30% | 30% | 31% | 31% |
| 8407 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 8408 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 8409 | 0.00% | 0.25% | 1.00% | 0.00% | 0.25% | 20% | 26% | 23% | 30% | 22% | 29% | 19% | 25% | 23% | 30% | 22% | 22% | 21% | 21% |
| 8410 | 1.00% | 0.25% | 1.00% | 0.00% | 0.25% | 24% | 31% | 25% | 33% | 27% | 35% | 22% | 29% | 26% | 34% | 25% | 25% | 25% | 25% |
| 8411 | 0.00% | 1.00% | 1.00% | 0.00% | 0.25% | 23% | 30% | 26% | 34% | 26% | 34% | 22% | 29% | 26% | 34% | 25% | 25% | 25% | 25% |
| 8412 | 0.25% | 1.00% | 1.00% | 0.00% | 0.25% | 25% | 33% | 27% | 35% | 28% | 36% | 23% | 30% | 27% | 35% | 27% | 27% | 26% | 26% |
| 8413 | 1.00% | 1.00% | 1.00% | 0.00% | 0.25% | 27% | 35% | 28% | 36% | 31% | 40% | 25% | 33% | 29% | 38% | 29% | 29% | 28% | 28% |
| 8414 | 9.00% | 1.00% | 1.00% | 0.00% | 0.25% | 23% | 30% | 26% | 34% | 26% | 34% | 22% | 29% | 26% | 34% | 25% | 25% | 25% | 25% |
| 8415 | 1.00% | 9.00% | 1.00% | 0.00% | 0.25% | 35% | 46% | 36% | 47% | 37% | 48% | 32% | 42% | 36% | 47% | 36% | 36% | 35% | 35% |
| 8416 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 8417 | 0.00% | 0.25% | 9.00% | 0.00% | 0.25% | 30% | 39% | 31% | 40% | 36% | 47% | 26% | 34% | 37% | 48% | 32% | 32% | 33% | 33% |
| 8418 | 0.25% | 0.25% | 9.00% | 0.00% | 0.25% | 32% | 42% | 32% | 42% | 38% | 49% | 27% | 35% | 38% | 49% | 34% | 34% | 34% | 34% |
| 8419 | 1.00% | 0.25% | 9.00% | 0.00% | 0.25% | 34% | 44% | 33% | 43% | 41% | 53% | 29% | 38% | 40% | 52% | 36% | 36% | 37% | 37% |
| 8420 | 0.25% | 1.00% | 9.00% | 0.00% | 0.25% | 35% | 46% | 35% | 46% | 42% | 55% | 30% | 39% | 41% | 53% | 37% | 37% | 38% | 38% |
| 8421 | 0.25% | 0.00% | 0.00% | 0.25% | 0.25% | 13% | 17% | 17% | 22% | 14% | 18% | 16% | 21% | 15% | 20% | 15% | 15% | 15% | 15% |
| 8422 | 1.00% | 0.00% | 0.00% | 0.25% | 0.25% | 15% | 20% | 18% | 23% | 17% | 22% | 18% | 23% | 17% | 22% | 17% | 17% | 17% | 17% |
| 8423 | 0.00% | 0.25% | 0.00% | 0.25% | 0.25% | 15% | 20% | 21% | 27% | 16% | 21% | 20% | 26% | 18% | 23% | 17% | 17% | 18% | 18% |
| 8424 | 0.25% | 0.25% | 0.00% | 0.25% | 0.25% | 17% | 22% | 22% | 29% | 18% | 23% | 21% | 27% | 19% | 25% | 19% | 19% | 19% | 19% |
| 8425 | 9.00% | 0.25% | 0.00% | 0.25% | 0.25% | 15% | 20% | 21% | 27% | 16% | 21% | 20% | 26% | 18% | 23% | 17% | 17% | 18% | 18% |
| 8426 | 1.00% | 1.00% | 0.00% | 0.25% | 0.25% | 22% | 29% | 26% | 34% | 25% | 33% | 26% | 34% | 24% | 31% | 24% | 24% | 25% | 25% |
| 8427 | 1.00% | 9.00% | 0.00% | 0.25% | 0.25% | 30% | 39% | 34% | 44% | 31% | 40% | 33% | 43% | 31% | 40% | 32% | 32% | 32% | 32% |
| 8428 | 0.00% | 0.00% | 0.25% | 0.25% | 0.25% | 16% | 21% | 20% | 26% | 19% | 25% | 22% | 29% | 21% | 27% | 18% | 18% | 21% | 21% |
| 8429 | 0.25% | 0.00% | 0.25% | 0.25% | 0.25% | 18% | 23% | 21% | 27% | 21% | 27% | 23% | 30% | 22% | 29% | 20% | 20% | 22% | 22% |
| 8430 | 0.00% | 0.25% | 0.25% | 0.25% | 0.25% | 20% | 26% | 25% | 33% | 23% | 30% | 27% | 35% | 25% | 33% | 23% | 23% | 25% | 25% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8431 | 0.25% | 0.25% | 0.25% | 0.25% | 0.25% | 22% | 29% | 26% | 34% | 25% | 33% | 28% | 36% | 26% | 34% | 24% | 24% | 26% | 26% |
| 8432 | 1.00% | 0.25% | 0.25% | 0.25% | 0.25% | 24% | 31% | 27% | 35% | 28% | 36% | 30% | 39% | 28% | 36% | 26% | 26% | 29% | 29% |
| 8433 | 9.00% | 0.25% | 0.25% | 0.25% | 0.25% | 20% | 26% | 25% | 33% | 23% | 30% | 27% | 35% | 25% | 33% | 23% | 23% | 25% | 25% |
| 8434 | 0.25% | 1.00% | 0.25% | 0.25% | 0.25% | 25% | 33% | 29% | 38% | 29% | 38% | 31% | 40% | 29% | 38% | 28% | 28% | 30% | 30% |
| 8435 | 9.00% | 1.00% | 0.25% | 0.25% | 0.25% | 23% | 30% | 28% | 36% | 27% | 35% | 30% | 39% | 28% | 36% | 26% | 26% | 28% | 28% |
| 8436 | 0.25% | 9.00% | 0.25% | 0.25% | 0.25% | 33% | 43% | 37% | 48% | 35% | 46% | 38% | 49% | 36% | 47% | 35% | 35% | 36% | 36% |
| 8437 | 1.00% | 9.00% | 0.25% | 0.25% | 0.25% | 35% | 46% | 38% | 49% | 38% | 49% | 40% | 52% | 38% | 49% | 37% | 37% | 39% | 39% |
| 8438 | 9.00% | 9.00% | 0.25% | 0.25% | 0.25% | 31% | 40% | 36% | 47% | 33% | 43% | 37% | 48% | 35% | 46% | 33% | 33% | 35% | 35% |
| 8439 | 0.00% | 0.00% | 1.00% | 0.25% | 0.25% | 21% | 27% | 27% | 35% | 24% | 31% | 24% | 31% | 26% | 34% | 24% | 24% | 25% | 25% |
| 8440 | 1.00% | 0.00% | 1.00% | 0.25% | 0.25% | 25% | 33% | 29% | 38% | 29% | 38% | 27% | 35% | 29% | 38% | 28% | 28% | 28% | 28% |
| 8441 | 0.00% | 0.25% | 1.00% | 0.25% | 0.25% | 25% | 33% | 32% | 42% | 28% | 36% | 29% | 38% | 30% | 39% | 28% | 28% | 29% | 29% |
| 8442 | 0.25% | 0.25% | 1.00% | 0.25% | 0.25% | 27% | 35% | 33% | 43% | 30% | 39% | 30% | 39% | 31% | 40% | 30% | 30% | 30% | 30% |
| 8443 | 1.00% | 0.25% | 1.00% | 0.25% | 0.25% | 29% | 38% | 34% | 44% | 33% | 43% | 32% | 42% | 33% | 43% | 32% | 32% | 33% | 33% |
| 8444 | 9.00% | 0.25% | 1.00% | 0.25% | 0.25% | 25% | 33% | 32% | 42% | 28% | 36% | 29% | 38% | 30% | 39% | 28% | 28% | 29% | 29% |
| 8445 | 0.00% | 1.00% | 1.00% | 0.25% | 0.25% | 28% | 36% | 35% | 46% | 32% | 42% | 32% | 42% | 33% | 43% | 32% | 32% | 32% | 32% |
| 8446 | 0.25% | 1.00% | 1.00% | 0.25% | 0.25% | 30% | 39% | 36% | 47% | 34% | 44% | 33% | 43% | 34% | 44% | 33% | 33% | 34% | 34% |
| 8447 | 1.00% | 1.00% | 1.00% | 0.25% | 0.25% | 32% | 42% | 37% | 48% | 37% | 48% | 35% | 46% | 36% | 47% | 35% | 35% | 36% | 36% |
| 8448 | 9.00% | 1.00% | 1.00% | 0.25% | 0.25% | 28% | 36% | 35% | 46% | 32% | 42% | 32% | 42% | 33% | 43% | 32% | 32% | 32% | 32% |
| 8449 | 0.00% | 9.00% | 1.00% | 0.25% | 0.25% | 36% | 47% | 43% | 56% | 38% | 49% | 39% | 51% | 40% | 52% | 39% | 39% | 39% | 39% |
| 8450 | 0.25% | 9.00% | 1.00% | 0.25% | 0.25% | 38% | 49% | 44% | 57% | 40% | 52% | 40% | 52% | 41% | 53% | 41% | 41% | 40% | 40% |
| 8451 | 1.00% | 9.00% | 1.00% | 0.25% | 0.25% | 40% | 52% | 45% | 59% | 43% | 56% | 42% | 55% | 43% | 56% | 43% | 43% | 43% | 43% |
| 8452 | 0.25% | 0.25% | 9.00% | 0.25% | 0.25% | 37% | 48% | 41% | 53% | 44% | 57% | 37% | 48% | 45% | 59% | 41% | 41% | 42% | 42% |
| 8453 | 1.00% | 0.25% | 9.00% | 0.25% | 0.25% | 39% | 51% | 42% | 55% | 47% | 61% | 39% | 51% | 47% | 61% | 43% | 43% | 44% | 44% |
| 8454 | 9.00% | 0.25% | 9.00% | 0.25% | 0.25% | 35% | 46% | 40% | 52% | 42% | 55% | 36% | 47% | 44% | 57% | 39% | 39% | 41% | 41% |
| 8455 | 0.00% | 1.00% | 9.00% | 0.25% | 0.25% | 38% | 49% | 43% | 56% | 46% | 60% | 39% | 51% | 47% | 61% | 42% | 42% | 44% | 44% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8456 | 0.25% | 1.00% | 9.00% | 0.25% | 0.25% | 40% | 52% | 44% | 57% | 48% | 62% | 40% | 52% | 48% | 62% | 44% | 44% | 45% | 45% |
| 8457 | 9.00% | 1.00% | 9.00% | 0.25% | 0.25% | 38% | 49% | 43% | 56% | 46% | 60% | 39% | 51% | 47% | 61% | 42% | 42% | 44% | 44% |
| 8458 | 1.00% | 9.00% | 9.00% | 0.25% | 0.25% | 50% | 65% | 53% | 69% | 57% | 74% | 49% | 64% | 57% | 74% | 53% | 53% | 54% | 54% |
| 8459 | 0.25% | 0.00% | 0.00% | 1.00% | 0.25% | 28% | 36% | 29% | 38% | 26% | 34% | 26% | 34% | 30% | 39% | 28% | 28% | 27% | 27% |
| 8460 | 1.00% | 0.25% | 0.00% | 1.00% | 0.25% | 34% | 44% | 35% | 46% | 33% | 43% | 33% | 43% | 36% | 47% | 34% | 34% | 34% | 34% |
| 8461 | 0.00% | 1.00% | 0.00% | 1.00% | 0.25% | 33% | 43% | 36% | 47% | 32% | 42% | 33% | 43% | 36% | 47% | 34% | 34% | 34% | 34% |
| 8462 | 0.25% | 1.00% | 0.00% | 1.00% | 0.25% | 35% | 46% | 37% | 48% | 34% | 44% | 34% | 44% | 37% | 48% | 35% | 35% | 35% | 35% |
| 8463 | 1.00% | 1.00% | 0.00% | 1.00% | 0.25% | 37% | 48% | 38% | 49% | 37% | 48% | 36% | 47% | 39% | 51% | 37% | 37% | 37% | 37% |
| 8464 | 0.00% | 0.00% | 0.25% | 1.00% | 0.25% | 31% | 40% | 32% | 42% | 31% | 40% | 32% | 42% | 36% | 47% | 31% | 31% | 33% | 33% |
| 8465 | 1.00% | 0.00% | 0.25% | 1.00% | 0.25% | 35% | 46% | 34% | 44% | 36% | 47% | 35% | 46% | 39% | 51% | 35% | 35% | 37% | 37% |
| 8466 | 0.25% | 0.25% | 0.25% | 1.00% | 0.25% | 37% | 48% | 38% | 49% | 37% | 48% | 38% | 49% | 41% | 53% | 37% | 37% | 39% | 39% |
| 8467 | 1.00% | 0.25% | 0.25% | 1.00% | 0.25% | 39% | 51% | 39% | 51% | 40% | 52% | 40% | 52% | 43% | 56% | 39% | 39% | 41% | 41% |
| 8468 | 9.00% | 0.25% | 0.25% | 1.00% | 0.25% | 35% | 46% | 37% | 48% | 35% | 46% | 37% | 48% | 40% | 52% | 36% | 36% | 37% | 37% |
| 8469 | 0.00% | 1.00% | 0.25% | 1.00% | 0.25% | 38% | 49% | 40% | 52% | 39% | 51% | 40% | 52% | 43% | 56% | 39% | 39% | 41% | 41% |
| 8470 | 0.25% | 1.00% | 0.25% | 1.00% | 0.25% | 40% | 52% | 41% | 53% | 41% | 53% | 41% | 53% | 44% | 57% | 41% | 41% | 42% | 42% |
| 8471 | 1.00% | 1.00% | 0.25% | 1.00% | 0.25% | 42% | 55% | 42% | 55% | 44% | 57% | 43% | 56% | 46% | 60% | 43% | 43% | 44% | 44% |
| 8472 | 9.00% | 1.00% | 0.25% | 1.00% | 0.25% | 38% | 49% | 40% | 52% | 39% | 51% | 40% | 52% | 43% | 56% | 39% | 39% | 41% | 41% |
| 8473 | 0.25% | 9.00% | 0.25% | 1.00% | 0.25% | 48% | 62% | 49% | 64% | 47% | 61% | 48% | 62% | 51% | 66% | 48% | 48% | 49% | 49% |
| 8474 | 1.00% | 9.00% | 0.25% | 1.00% | 0.25% | 50% | 65% | 50% | 65% | 50% | 65% | 50% | 65% | 53% | 69% | 50% | 50% | 51% | 51% |
| 8475 | 9.00% | 9.00% | 0.25% | 1.00% | 0.25% | 46% | 60% | 48% | 62% | 45% | 59% | 47% | 61% | 50% | 65% | 46% | 46% | 47% | 47% |
| 8476 | 0.00% | 0.00% | 1.00% | 1.00% | 0.25% | 36% | 47% | 39% | 51% | 36% | 47% | 34% | 44% | 41% | 53% | 37% | 37% | 37% | 37% |
| 8477 | 0.25% | 0.00% | 1.00% | 1.00% | 0.25% | 38% | 49% | 40% | 52% | 38% | 49% | 35% | 46% | 42% | 55% | 39% | 39% | 38% | 38% |
| 8478 | 1.00% | 0.00% | 1.00% | 1.00% | 0.25% | 40% | 52% | 41% | 53% | 41% | 53% | 37% | 48% | 44% | 57% | 41% | 41% | 41% | 41% |
| 8479 | 0.00% | 0.25% | 1.00% | 1.00% | 0.25% | 40% | 52% | 44% | 57% | 40% | 52% | 39% | 51% | 45% | 59% | 41% | 41% | 41% | 41% |
| 8480 | 1.00% | 0.25% | 1.00% | 1.00% | 0.25% | 44% | 57% | 46% | 60% | 45% | 59% | 42% | 55% | 48% | 62% | 45% | 45% | 45% | 45% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8481 | 9.00% | 0.25% | 1.00% | 1.00% | 0.25% | 40% | 52% | 44% | 57% | 40% | 52% | 39% | 51% | 45% | 59% | 41% | 41% | 41% | 41% |
| 8482 | 0.00% | 1.00% | 1.00% | 1.00% | 0.25% | 43% | 56% | 47% | 61% | 44% | 57% | 42% | 55% | 48% | 62% | 45% | 45% | 45% | 45% |
| 8483 | 0.25% | 1.00% | 1.00% | 1.00% | 0.25% | 45% | 59% | 48% | 62% | 46% | 60% | 43% | 56% | 49% | 64% | 46% | 46% | 46% | 46% |
| 8484 | 1.00% | 1.00% | 1.00% | 1.00% | 0.25% | 47% | 61% | 49% | 64% | 49% | 64% | 45% | 59% | 51% | 66% | 48% | 48% | 48% | 48% |
| 8485 | 9.00% | 1.00% | 1.00% | 1.00% | 0.25% | 43% | 56% | 47% | 61% | 44% | 57% | 42% | 55% | 48% | 62% | 45% | 45% | 45% | 45% |
| 8486 | 0.00% | 9.00% | 1.00% | 1.00% | 0.25% | 51% | 66% | 55% | 72% | 50% | 65% | 49% | 64% | 55% | 72% | 52% | 52% | 51% | 51% |
| 8487 | 0.25% | 9.00% | 1.00% | 1.00% | 0.25% | 53% | 69% | 56% | 73% | 52% | 68% | 50% | 65% | 56% | 73% | 54% | 54% | 53% | 53% |
| 8488 | 1.00% | 9.00% | 1.00% | 1.00% | 0.25% | 55% | 72% | 57% | 74% | 55% | 72% | 52% | 68% | 58% | 75% | 56% | 56% | 55% | 55% |
| 8489 | 0.25% | 0.25% | 9.00% | 1.00% | 0.25% | 52% | 68% | 53% | 69% | 56% | 73% | 47% | 61% | 60% | 78% | 54% | 54% | 54% | 54% |
| 8490 | 1.00% | 0.25% | 9.00% | 1.00% | 0.25% | 54% | 70% | 54% | 70% | 59% | 77% | 49% | 64% | 62% | 81% | 56% | 56% | 57% | 57% |
| 8491 | 9.00% | 0.25% | 9.00% | 1.00% | 0.25% | 50% | 65% | 52% | 68% | 54% | 70% | 46% | 60% | 59% | 77% | 52% | 52% | 53% | 53% |
| 8492 | 0.25% | 1.00% | 9.00% | 1.00% | 0.25% | 55% | 72% | 56% | 73% | 60% | 78% | 50% | 65% | 63% | 82% | 57% | 57% | 58% | 58% |
| 8493 | 0.00% | 0.25% | 0.00% | 9.00% | 0.25% | 50% | 65% | 47% | 61% | 46% | 60% | 50% | 65% | 46% | 60% | 48% | 48% | 47% | 47% |
| 8494 | 0.00% | 0.00% | 0.25% | 9.00% | 0.25% | 51% | 66% | 46% | 60% | 49% | 64% | 52% | 68% | 49% | 64% | 49% | 49% | 50% | 50% |
| 8495 | 0.25% | 0.00% | 0.25% | 9.00% | 0.25% | 53% | 69% | 47% | 61% | 51% | 66% | 53% | 69% | 50% | 65% | 50% | 50% | 51% | 51% |
| 8496 | 0.00% | 0.25% | 0.25% | 9.00% | 0.25% | 55% | 72% | 51% | 66% | 53% | 69% | 57% | 74% | 53% | 69% | 53% | 53% | 54% | 54% |
| 8497 | 0.25% | 0.25% | 0.25% | 9.00% | 0.25% | 57% | 74% | 52% | 68% | 55% | 72% | 58% | 75% | 54% | 70% | 55% | 55% | 56% | 56% |
| 8498 | 1.00% | 0.25% | 0.25% | 9.00% | 0.25% | 59% | 77% | 53% | 69% | 58% | 75% | 60% | 78% | 56% | 73% | 57% | 57% | 58% | 58% |
| 8499 | 9.00% | 0.25% | 0.25% | 9.00% | 0.25% | 55% | 72% | 51% | 66% | 53% | 69% | 57% | 74% | 53% | 69% | 53% | 53% | 54% | 54% |
| 8500 | 0.00% | 1.00% | 0.25% | 9.00% | 0.25% | 58% | 75% | 54% | 70% | 57% | 74% | 60% | 78% | 56% | 73% | 56% | 56% | 58% | 58% |
| 8501 | 0.25% | 1.00% | 0.25% | 9.00% | 0.25% | 60% | 78% | 55% | 72% | 59% | 77% | 61% | 79% | 57% | 74% | 58% | 58% | 59% | 59% |
| 8502 | 1.00% | 1.00% | 0.25% | 9.00% | 0.25% | 62% | 81% | 56% | 73% | 62% | 81% | 63% | 82% | 59% | 77% | 60% | 60% | 61% | 61% |
| 8503 | 0.25% | 9.00% | 0.25% | 9.00% | 0.25% | 68% | 88% | 63% | 82% | 65% | 85% | 68% | 88% | 64% | 83% | 65% | 65% | 66% | 66% |
| 8504 | 0.25% | 0.00% | 1.00% | 9.00% | 0.25% | 58% | 75% | 54% | 70% | 56% | 73% | 55% | 72% | 55% | 72% | 56% | 56% | 55% | 55% |
| 8505 | 1.00% | 0.25% | 1.00% | 9.00% | 0.25% | 64% | 83% | 60% | 78% | 63% | 82% | 62% | 81% | 61% | 79% | 62% | 62% | 62% | 62% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8506 | 9.00% | 0.25% | 1.00% | 9.00% | 0.25% | 60% | 78% | 58% | 75% | 58% | 75% | 59% | 77% | 58% | 75% | 59% | 59% | 58% | 58% |
| 8507 | 0.00% | 1.00% | 1.00% | 9.00% | 0.25% | 63% | 82% | 61% | 79% | 62% | 81% | 62% | 81% | 61% | 79% | 62% | 62% | 62% | 62% |
| 8508 | 0.25% | 1.00% | 1.00% | 9.00% | 0.25% | 65% | 85% | 62% | 81% | 64% | 83% | 63% | 82% | 62% | 81% | 64% | 64% | 63% | 63% |
| 8509 | 1.00% | 1.00% | 1.00% | 9.00% | 0.25% | 67% | 87% | 63% | 82% | 67% | 87% | 65% | 85% | 64% | 83% | 66% | 66% | 65% | 65% |
| 8510 | 0.25% | 0.25% | 9.00% | 9.00% | 0.25% | 72% | 94% | 67% | 87% | 74% | 96% | 67% | 87% | 73% | 95% | 71% | 71% | 71% | 71% |
| 8511 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 8512 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 8513 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 8514 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 8515 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 8516 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 8517 | 0.00% | 0.25% | 0.25% | 0.00% | 1.00% | 20% | 26% | 22% | 29% | 22% | 29% | 22% | 29% | 29% | 38% | 21% | 21% | 24% | 24% |
| 8518 | 0.25% | 0.25% | 0.25% | 0.00% | 1.00% | 22% | 29% | 23% | 30% | 24% | 31% | 23% | 30% | 30% | 39% | 23% | 23% | 26% | 26% |
| 8519 | 0.00% | 1.00% | 0.25% | 0.00% | 1.00% | 23% | 30% | 25% | 33% | 26% | 34% | 25% | 33% | 32% | 42% | 25% | 25% | 28% | 28% |
| 8520 | 1.00% | 1.00% | 0.25% | 0.00% | 1.00% | 27% | 35% | 27% | 35% | 31% | 40% | 28% | 36% | 35% | 46% | 28% | 28% | 31% | 31% |
| 8521 | 1.00% | 9.00% | 0.25% | 0.00% | 1.00% | 35% | 46% | 35% | 46% | 37% | 48% | 35% | 46% | 42% | 55% | 36% | 36% | 38% | 38% |
| 8522 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 8523 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 8524 | 0.00% | 0.25% | 1.00% | 0.00% | 1.00% | 25% | 33% | 29% | 38% | 27% | 35% | 24% | 31% | 34% | 44% | 27% | 27% | 28% | 28% |
| 8525 | 1.00% | 0.25% | 1.00% | 0.00% | 1.00% | 29% | 38% | 31% | 40% | 32% | 42% | 27% | 35% | 37% | 48% | 31% | 31% | 32% | 32% |
| 8526 | 0.00% | 1.00% | 1.00% | 0.00% | 1.00% | 28% | 36% | 32% | 42% | 31% | 40% | 27% | 35% | 37% | 48% | 30% | 30% | 32% | 32% |
| 8527 | 0.25% | 1.00% | 1.00% | 0.00% | 1.00% | 30% | 39% | 33% | 43% | 33% | 43% | 28% | 36% | 38% | 49% | 32% | 32% | 33% | 33% |
| 8528 | 1.00% | 1.00% | 1.00% | 0.00% | 1.00% | 32% | 42% | 34% | 44% | 36% | 47% | 30% | 39% | 40% | 52% | 34% | 34% | 35% | 35% |
| 8529 | 9.00% | 1.00% | 1.00% | 0.00% | 1.00% | 28% | 36% | 32% | 42% | 31% | 40% | 27% | 35% | 37% | 48% | 30% | 30% | 32% | 32% |
| 8530 | 1.00% | 9.00% | 1.00% | 0.00% | 1.00% | 40% | 52% | 42% | 55% | 42% | 55% | 37% | 48% | 47% | 61% | 41% | 41% | 42% | 42% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8531 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 8532 | 0.00% | 0.25% | 9.00% | 0.00% | 1.00% | 35% | 46% | 37% | 48% | 41% | 53% | 31% | 40% | 48% | 62% | 38% | 38% | 40% | 40% |
| 8533 | 0.25% | 0.25% | 9.00% | 0.00% | 1.00% | 37% | 48% | 38% | 49% | 43% | 56% | 32% | 42% | 49% | 64% | 39% | 39% | 41% | 41% |
| 8534 | 1.00% | 0.25% | 9.00% | 0.00% | 1.00% | 39% | 51% | 39% | 51% | 46% | 60% | 34% | 44% | 51% | 66% | 41% | 41% | 44% | 44% |
| 8535 | 0.25% | 1.00% | 9.00% | 0.00% | 1.00% | 40% | 52% | 41% | 53% | 47% | 61% | 35% | 46% | 52% | 68% | 43% | 43% | 45% | 45% |
| 8536 | 0.25% | 0.00% | 0.00% | 0.25% | 1.00% | 18% | 23% | 23% | 30% | 19% | 25% | 21% | 27% | 26% | 34% | 20% | 20% | 22% | 22% |
| 8537 | 1.00% | 0.00% | 0.00% | 0.25% | 1.00% | 20% | 26% | 24% | 31% | 22% | 29% | 23% | 30% | 28% | 36% | 22% | 22% | 24% | 24% |
| 8538 | 0.00% | 0.25% | 0.00% | 0.25% | 1.00% | 20% | 26% | 27% | 35% | 21% | 27% | 25% | 33% | 29% | 38% | 23% | 23% | 25% | 25% |
| 8539 | 0.25% | 0.25% | 0.00% | 0.25% | 1.00% | 22% | 29% | 28% | 36% | 23% | 30% | 26% | 34% | 30% | 39% | 24% | 24% | 26% | 26% |
| 8540 | 9.00% | 0.25% | 0.00% | 0.25% | 1.00% | 20% | 26% | 27% | 35% | 21% | 27% | 25% | 33% | 29% | 38% | 23% | 23% | 25% | 25% |
| 8541 | 1.00% | 1.00% | 0.00% | 0.25% | 1.00% | 27% | 35% | 32% | 42% | 30% | 39% | 31% | 40% | 35% | 46% | 30% | 30% | 32% | 32% |
| 8542 | 1.00% | 9.00% | 0.00% | 0.25% | 1.00% | 35% | 46% | 40% | 52% | 36% | 47% | 38% | 49% | 42% | 55% | 37% | 37% | 39% | 39% |
| 8543 | 0.00% | 0.00% | 0.25% | 0.25% | 1.00% | 21% | 27% | 26% | 34% | 24% | 31% | 27% | 35% | 32% | 42% | 24% | 24% | 28% | 28% |
| 8544 | 0.25% | 0.00% | 0.25% | 0.25% | 1.00% | 23% | 30% | 27% | 35% | 26% | 34% | 28% | 36% | 33% | 43% | 25% | 25% | 29% | 29% |
| 8545 | 0.00% | 0.25% | 0.25% | 0.25% | 1.00% | 25% | 33% | 31% | 40% | 28% | 36% | 32% | 42% | 36% | 47% | 28% | 28% | 32% | 32% |
| 8546 | 0.25% | 0.25% | 0.25% | 0.25% | 1.00% | 27% | 35% | 32% | 42% | 30% | 39% | 33% | 43% | 37% | 48% | 30% | 30% | 33% | 33% |
| 8547 | 1.00% | 0.25% | 0.25% | 0.25% | 1.00% | 29% | 38% | 33% | 43% | 33% | 43% | 35% | 46% | 39% | 51% | 32% | 32% | 36% | 36% |
| 8548 | 9.00% | 0.25% | 0.25% | 0.25% | 1.00% | 25% | 33% | 31% | 40% | 28% | 36% | 32% | 42% | 36% | 47% | 28% | 28% | 32% | 32% |
| 8549 | 0.25% | 1.00% | 0.25% | 0.25% | 1.00% | 30% | 39% | 35% | 46% | 34% | 44% | 36% | 47% | 40% | 52% | 33% | 33% | 37% | 37% |
| 8550 | 9.00% | 1.00% | 0.25% | 0.25% | 1.00% | 28% | 36% | 34% | 44% | 32% | 42% | 35% | 46% | 39% | 51% | 31% | 31% | 35% | 35% |
| 8551 | 0.25% | 9.00% | 0.25% | 0.25% | 1.00% | 38% | 49% | 43% | 56% | 40% | 52% | 43% | 56% | 47% | 61% | 40% | 40% | 43% | 43% |
| 8552 | 1.00% | 9.00% | 0.25% | 0.25% | 1.00% | 40% | 52% | 44% | 57% | 43% | 56% | 45% | 59% | 49% | 64% | 42% | 42% | 46% | 46% |
| 8553 | 9.00% | 9.00% | 0.25% | 0.25% | 1.00% | 36% | 47% | 42% | 55% | 38% | 49% | 42% | 55% | 46% | 60% | 39% | 39% | 42% | 42% |
| 8554 | 0.00% | 0.00% | 1.00% | 0.25% | 1.00% | 26% | 34% | 33% | 43% | 29% | 38% | 29% | 38% | 37% | 48% | 29% | 29% | 32% | 32% |
| 8555 | 1.00% | 0.00% | 1.00% | 0.25% | 1.00% | 30% | 39% | 35% | 46% | 34% | 44% | 32% | 42% | 40% | 52% | 33% | 33% | 35% | 35% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8556 | 0.00% | 0.25% | 1.00% | 0.25% | 1.00% | 30% | 39% | 38% | 49% | 33% | 43% | 34% | 44% | 41% | 53% | 34% | 34% | 36% | 36% |
| 8557 | 0.25% | 0.25% | 1.00% | 0.25% | 1.00% | 32% | 42% | 39% | 51% | 35% | 46% | 35% | 46% | 42% | 55% | 35% | 35% | 37% | 37% |
| 8558 | 1.00% | 0.25% | 1.00% | 0.25% | 1.00% | 34% | 44% | 40% | 52% | 38% | 49% | 37% | 48% | 44% | 57% | 37% | 37% | 40% | 40% |
| 8559 | 9.00% | 0.25% | 1.00% | 0.25% | 1.00% | 30% | 39% | 38% | 49% | 33% | 43% | 34% | 44% | 41% | 53% | 34% | 34% | 36% | 36% |
| 8560 | 0.00% | 1.00% | 1.00% | 0.25% | 1.00% | 33% | 43% | 41% | 53% | 37% | 48% | 37% | 48% | 44% | 57% | 37% | 37% | 39% | 39% |
| 8561 | 0.25% | 1.00% | 1.00% | 0.25% | 1.00% | 35% | 46% | 42% | 55% | 39% | 51% | 38% | 49% | 45% | 59% | 39% | 39% | 41% | 41% |
| 8562 | 1.00% | 1.00% | 1.00% | 0.25% | 1.00% | 37% | 48% | 43% | 56% | 42% | 55% | 40% | 52% | 47% | 61% | 41% | 41% | 43% | 43% |
| 8563 | 9.00% | 1.00% | 1.00% | 0.25% | 1.00% | 33% | 43% | 41% | 53% | 37% | 48% | 37% | 48% | 44% | 57% | 37% | 37% | 39% | 39% |
| 8564 | 0.00% | 9.00% | 1.00% | 0.25% | 1.00% | 41% | 53% | 49% | 64% | 43% | 56% | 44% | 57% | 51% | 66% | 44% | 44% | 46% | 46% |
| 8565 | 0.25% | 9.00% | 1.00% | 0.25% | 1.00% | 43% | 56% | 50% | 65% | 45% | 59% | 45% | 59% | 52% | 68% | 46% | 46% | 47% | 47% |
| 8566 | 1.00% | 9.00% | 1.00% | 0.25% | 1.00% | 45% | 59% | 51% | 66% | 48% | 62% | 47% | 61% | 54% | 70% | 48% | 48% | 50% | 50% |
| 8567 | 0.25% | 0.25% | 9.00% | 0.25% | 1.00% | 42% | 55% | 47% | 61% | 49% | 64% | 42% | 55% | 56% | 73% | 46% | 46% | 49% | 49% |
| 8568 | 1.00% | 0.25% | 9.00% | 0.25% | 1.00% | 44% | 57% | 48% | 62% | 52% | 68% | 44% | 57% | 58% | 75% | 48% | 48% | 51% | 51% |
| 8569 | 9.00% | 0.25% | 9.00% | 0.25% | 1.00% | 40% | 52% | 46% | 60% | 47% | 61% | 41% | 53% | 55% | 72% | 44% | 44% | 48% | 48% |
| 8570 | 0.00% | 1.00% | 9.00% | 0.25% | 1.00% | 43% | 56% | 49% | 64% | 51% | 66% | 44% | 57% | 58% | 75% | 48% | 48% | 51% | 51% |
| 8571 | 0.25% | 1.00% | 9.00% | 0.25% | 1.00% | 45% | 59% | 50% | 65% | 53% | 69% | 45% | 59% | 59% | 77% | 49% | 49% | 52% | 52% |
| 8572 | 9.00% | 1.00% | 9.00% | 0.25% | 1.00% | 43% | 56% | 49% | 64% | 51% | 66% | 44% | 57% | 58% | 75% | 48% | 48% | 51% | 51% |
| 8573 | 1.00% | 9.00% | 9.00% | 0.25% | 1.00% | 55% | 72% | 59% | 77% | 62% | 81% | 54% | 70% | 68% | 88% | 59% | 59% | 61% | 61% |
| 8574 | 0.25% | 0.00% | 0.00% | 1.00% | 1.00% | 33% | 43% | 35% | 46% | 31% | 40% | 31% | 40% | 41% | 53% | 33% | 33% | 34% | 34% |
| 8575 | 1.00% | 0.25% | 0.00% | 1.00% | 1.00% | 39% | 51% | 41% | 53% | 38% | 49% | 38% | 49% | 47% | 61% | 39% | 39% | 41% | 41% |
| 8576 | 0.00% | 1.00% | 0.00% | 1.00% | 1.00% | 38% | 49% | 42% | 55% | 37% | 48% | 38% | 49% | 47% | 61% | 39% | 39% | 41% | 41% |
| 8577 | 0.25% | 1.00% | 0.00% | 1.00% | 1.00% | 40% | 52% | 43% | 56% | 39% | 51% | 39% | 51% | 48% | 62% | 41% | 41% | 42% | 42% |
| 8578 | 1.00% | 1.00% | 0.00% | 1.00% | 1.00% | 42% | 55% | 44% | 57% | 42% | 55% | 41% | 53% | 50% | 65% | 43% | 43% | 44% | 44% |
| 8579 | 0.00% | 0.00% | 0.25% | 1.00% | 1.00% | 36% | 47% | 38% | 49% | 36% | 47% | 37% | 48% | 47% | 61% | 37% | 37% | 40% | 40% |
| 8580 | 1.00% | 0.00% | 0.25% | 1.00% | 1.00% | 40% | 52% | 40% | 52% | 41% | 53% | 40% | 52% | 50% | 65% | 40% | 40% | 44% | 44% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8581 | 0.25% | 0.25% | 0.25% | 1.00% | 1.00% | 42% | 55% | 44% | 57% | 42% | 55% | 43% | 56% | 52% | 68% | 43% | 43% | 46% | 46% |
| 8582 | 1.00% | 0.25% | 0.25% | 1.00% | 1.00% | 44% | 57% | 45% | 59% | 45% | 59% | 45% | 59% | 54% | 70% | 45% | 45% | 48% | 48% |
| 8583 | 9.00% | 0.25% | 0.25% | 1.00% | 1.00% | 40% | 52% | 43% | 56% | 40% | 52% | 42% | 55% | 51% | 66% | 41% | 41% | 44% | 44% |
| 8584 | 0.00% | 1.00% | 0.25% | 1.00% | 1.00% | 43% | 56% | 46% | 60% | 44% | 57% | 45% | 59% | 54% | 70% | 44% | 44% | 48% | 48% |
| 8585 | 0.25% | 1.00% | 0.25% | 1.00% | 1.00% | 45% | 59% | 47% | 61% | 46% | 60% | 46% | 60% | 55% | 72% | 46% | 46% | 49% | 49% |
| 8586 | 1.00% | 1.00% | 0.25% | 1.00% | 1.00% | 47% | 61% | 48% | 62% | 49% | 64% | 48% | 62% | 57% | 74% | 48% | 48% | 51% | 51% |
| 8587 | 9.00% | 1.00% | 0.25% | 1.00% | 1.00% | 43% | 56% | 46% | 60% | 44% | 57% | 45% | 59% | 54% | 70% | 44% | 44% | 48% | 48% |
| 8588 | 0.25% | 9.00% | 0.25% | 1.00% | 1.00% | 53% | 69% | 55% | 72% | 52% | 68% | 53% | 69% | 62% | 81% | 53% | 53% | 56% | 56% |
| 8589 | 1.00% | 9.00% | 0.25% | 1.00% | 1.00% | 55% | 72% | 56% | 73% | 55% | 72% | 55% | 72% | 64% | 83% | 55% | 55% | 58% | 58% |
| 8590 | 9.00% | 9.00% | 0.25% | 1.00% | 1.00% | 51% | 66% | 54% | 70% | 50% | 65% | 52% | 68% | 61% | 79% | 52% | 52% | 54% | 54% |
| 8591 | 0.00% | 0.00% | 1.00% | 1.00% | 1.00% | 41% | 53% | 45% | 59% | 41% | 53% | 39% | 51% | 52% | 68% | 42% | 42% | 44% | 44% |
| 8592 | 0.25% | 0.00% | 1.00% | 1.00% | 1.00% | 43% | 56% | 46% | 60% | 43% | 56% | 40% | 52% | 53% | 69% | 44% | 44% | 45% | 45% |
| 8593 | 1.00% | 0.00% | 1.00% | 1.00% | 1.00% | 45% | 59% | 47% | 61% | 46% | 60% | 42% | 55% | 55% | 72% | 46% | 46% | 48% | 48% |
| 8594 | 0.00% | 0.25% | 1.00% | 1.00% | 1.00% | 45% | 59% | 50% | 65% | 45% | 59% | 44% | 57% | 56% | 73% | 47% | 47% | 48% | 48% |
| 8595 | 1.00% | 0.25% | 1.00% | 1.00% | 1.00% | 49% | 64% | 52% | 68% | 50% | 65% | 47% | 61% | 59% | 77% | 50% | 50% | 52% | 52% |
| 8596 | 9.00% | 0.25% | 1.00% | 1.00% | 1.00% | 45% | 59% | 50% | 65% | 45% | 59% | 44% | 57% | 56% | 73% | 47% | 47% | 48% | 48% |
| 8597 | 0.00% | 1.00% | 1.00% | 1.00% | 1.00% | 48% | 62% | 53% | 69% | 49% | 64% | 47% | 61% | 59% | 77% | 50% | 50% | 52% | 52% |
| 8598 | 0.25% | 1.00% | 1.00% | 1.00% | 1.00% | 50% | 65% | 54% | 70% | 51% | 66% | 48% | 62% | 60% | 78% | 52% | 52% | 53% | 53% |
| 8599 | 1.00% | 1.00% | 1.00% | 1.00% | 1.00% | 52% | 68% | 55% | 72% | 54% | 70% | 50% | 65% | 62% | 81% | 54% | 54% | 55% | 55% |
| 8600 | 9.00% | 1.00% | 1.00% | 1.00% | 1.00% | 48% | 62% | 53% | 69% | 49% | 64% | 47% | 61% | 59% | 77% | 50% | 50% | 52% | 52% |
| 8601 | 0.00% | 9.00% | 1.00% | 1.00% | 1.00% | 56% | 73% | 61% | 79% | 55% | 72% | 54% | 70% | 66% | 86% | 57% | 57% | 58% | 58% |
| 8602 | 0.25% | 9.00% | 1.00% | 1.00% | 1.00% | 58% | 75% | 62% | 81% | 57% | 74% | 55% | 72% | 67% | 87% | 59% | 59% | 60% | 60% |
| 8603 | 1.00% | 9.00% | 1.00% | 1.00% | 1.00% | 60% | 78% | 63% | 82% | 60% | 78% | 57% | 74% | 69% | 90% | 61% | 61% | 62% | 62% |
| 8604 | 0.25% | 0.25% | 9.00% | 1.00% | 1.00% | 57% | 74% | 59% | 77% | 61% | 79% | 52% | 68% | 71% | 92% | 59% | 59% | 61% | 61% |
| 8605 | 1.00% | 0.25% | 9.00% | 1.00% | 1.00% | 59% | 77% | 60% | 78% | 64% | 83% | 54% | 70% | 73% | 95% | 61% | 61% | 64% | 64% |

Fig. 30

| Formula # | Gamma Dodecalactone | Propyl Dihydrojasmonate | Methyl Dihydrojasmolate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8606 | 9.00% | 0.25% | 9.00% | 1.00% | 1.00% | 55% | 72% | 58% | 75% | 59% | 77% | 51% | 66% | 70% | 91% | 57% | 57% | 60% | 60% |
| 8607 | 0.25% | 1.00% | 9.00% | 1.00% | 1.00% | 60% | 78% | 62% | 81% | 65% | 85% | 55% | 72% | 74% | 96% | 62% | 62% | 65% | 65% |
| 8608 | 0.00% | 0.25% | 0.00% | 9.00% | 1.00% | 55% | 72% | 53% | 69% | 51% | 66% | 55% | 72% | 57% | 74% | 53% | 53% | 54% | 54% |
| 8609 | 0.00% | 0.00% | 0.25% | 9.00% | 1.00% | 56% | 73% | 52% | 68% | 54% | 70% | 57% | 74% | 60% | 78% | 54% | 54% | 57% | 57% |
| 8610 | 0.25% | 0.00% | 0.25% | 9.00% | 1.00% | 58% | 75% | 53% | 69% | 56% | 73% | 58% | 75% | 61% | 79% | 56% | 56% | 58% | 58% |
| 8611 | 0.00% | 0.25% | 0.25% | 9.00% | 1.00% | 60% | 78% | 57% | 74% | 58% | 75% | 62% | 81% | 64% | 83% | 58% | 58% | 61% | 61% |
| 8612 | 0.25% | 0.25% | 0.25% | 9.00% | 1.00% | 62% | 81% | 58% | 75% | 60% | 78% | 63% | 82% | 65% | 85% | 60% | 60% | 63% | 63% |
| 8613 | 1.00% | 0.25% | 0.25% | 9.00% | 1.00% | 64% | 83% | 59% | 77% | 63% | 82% | 65% | 85% | 67% | 87% | 62% | 62% | 65% | 65% |
| 8614 | 9.00% | 0.25% | 0.25% | 9.00% | 1.00% | 60% | 78% | 57% | 74% | 58% | 75% | 62% | 81% | 64% | 83% | 58% | 58% | 61% | 61% |
| 8615 | 0.00% | 1.00% | 0.25% | 9.00% | 1.00% | 63% | 82% | 60% | 78% | 62% | 81% | 65% | 85% | 67% | 87% | 62% | 62% | 65% | 65% |
| 8616 | 0.25% | 1.00% | 0.25% | 9.00% | 1.00% | 65% | 85% | 61% | 79% | 64% | 83% | 66% | 86% | 68% | 88% | 63% | 63% | 66% | 66% |
| 8617 | 1.00% | 1.00% | 0.25% | 9.00% | 1.00% | 67% | 87% | 62% | 81% | 67% | 87% | 68% | 88% | 70% | 91% | 65% | 65% | 68% | 68% |
| 8618 | 0.25% | 9.00% | 0.25% | 9.00% | 1.00% | 73% | 95% | 69% | 90% | 70% | 91% | 73% | 95% | 75% | 98% | 71% | 71% | 73% | 73% |
| 8619 | 0.25% | 0.00% | 1.00% | 9.00% | 1.00% | 63% | 82% | 60% | 78% | 61% | 79% | 60% | 78% | 66% | 86% | 61% | 61% | 62% | 62% |
| 8620 | 1.00% | 0.25% | 1.00% | 9.00% | 1.00% | 69% | 90% | 66% | 86% | 68% | 88% | 67% | 87% | 72% | 94% | 68% | 68% | 69% | 69% |
| 8621 | 9.00% | 0.25% | 1.00% | 9.00% | 1.00% | 65% | 85% | 64% | 83% | 63% | 82% | 64% | 83% | 69% | 90% | 64% | 64% | 65% | 65% |
| 8622 | 0.00% | 1.00% | 1.00% | 9.00% | 1.00% | 68% | 88% | 67% | 87% | 67% | 87% | 67% | 87% | 72% | 94% | 67% | 67% | 69% | 69% |
| 8623 | 0.25% | 1.00% | 1.00% | 9.00% | 1.00% | 70% | 91% | 68% | 88% | 69% | 90% | 68% | 88% | 73% | 95% | 69% | 69% | 70% | 70% |
| 8624 | 1.00% | 1.00% | 1.00% | 9.00% | 1.00% | 72% | 94% | 69% | 90% | 72% | 94% | 70% | 91% | 75% | 98% | 71% | 71% | 72% | 72% |
| 8625 | 0.25% | 0.25% | 9.00% | 9.00% | 1.00% | 77% | 100% | 73% | 100% | 79% | 100% | 72% | 100% | 84% | 100% | 76% | 76% | 78% | 78% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8626 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 8627 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 8628 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 8629 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 8630 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 8631 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 8632 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 8633 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 8634 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 8635 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 8636 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 8637 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 8638 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 8639 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 8640 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 8641 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 8642 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 8643 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 8644 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 8645 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 8646 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 8647 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 8648 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 8649 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 8650 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8651 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 8652 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 8653 | 0.00% | 0.25% | 0.00% | 0.25% | 0.00% | 7% | 9% | 11% | 14% | 6% | 8% | 10% | 13% | 9% | 12% | 8% | 8% | 8% | 8% |
| 8654 | 0.25% | 0.25% | 0.00% | 0.25% | 0.00% | 9% | 12% | 12% | 16% | 8% | 10% | 11% | 14% | 10% | 13% | 10% | 10% | 10% | 10% |
| 8655 | 9.00% | 0.25% | 0.00% | 0.25% | 0.00% | 7% | 9% | 11% | 14% | 6% | 8% | 10% | 13% | 9% | 12% | 8% | 8% | 8% | 8% |
| 8656 | 1.00% | 1.00% | 0.00% | 0.25% | 0.00% | 14% | 18% | 16% | 21% | 15% | 20% | 16% | 21% | 15% | 20% | 15% | 15% | 15% | 15% |
| 8657 | 1.00% | 9.00% | 0.00% | 0.25% | 0.00% | 22% | 29% | 24% | 31% | 21% | 27% | 23% | 30% | 22% | 29% | 22% | 22% | 22% | 22% |
| 8658 | 0.00% | 0.00% | 0.25% | 0.25% | 0.00% | 8% | 10% | 10% | 13% | 9% | 12% | 12% | 16% | 12% | 16% | 9% | 9% | 11% | 11% |
| 8659 | 0.25% | 0.00% | 0.25% | 0.25% | 0.00% | 10% | 13% | 11% | 14% | 11% | 14% | 13% | 17% | 13% | 17% | 11% | 11% | 12% | 12% |
| 8660 | 0.00% | 0.25% | 0.25% | 0.25% | 0.00% | 12% | 16% | 15% | 20% | 13% | 17% | 17% | 22% | 16% | 21% | 13% | 13% | 15% | 15% |
| 8661 | 0.25% | 0.25% | 0.25% | 0.25% | 0.00% | 14% | 18% | 16% | 21% | 15% | 20% | 18% | 23% | 17% | 22% | 15% | 15% | 17% | 17% |
| 8662 | 1.00% | 0.25% | 0.25% | 0.25% | 0.00% | 16% | 21% | 17% | 22% | 18% | 23% | 20% | 26% | 19% | 25% | 17% | 17% | 19% | 19% |
| 8663 | 9.00% | 0.25% | 0.25% | 0.25% | 0.00% | 12% | 16% | 15% | 20% | 13% | 17% | 17% | 22% | 16% | 21% | 13% | 13% | 15% | 15% |
| 8664 | 0.25% | 1.00% | 0.25% | 0.25% | 0.00% | 17% | 22% | 19% | 25% | 19% | 25% | 21% | 27% | 20% | 26% | 18% | 18% | 20% | 20% |
| 8665 | 9.00% | 1.00% | 0.25% | 0.25% | 0.00% | 15% | 20% | 18% | 23% | 17% | 22% | 20% | 26% | 19% | 25% | 17% | 17% | 19% | 19% |
| 8666 | 0.25% | 9.00% | 0.25% | 0.25% | 0.00% | 25% | 33% | 27% | 35% | 25% | 33% | 28% | 36% | 27% | 35% | 26% | 26% | 27% | 27% |
| 8667 | 1.00% | 9.00% | 0.25% | 0.25% | 0.00% | 27% | 35% | 28% | 36% | 28% | 36% | 30% | 39% | 29% | 38% | 28% | 28% | 29% | 29% |
| 8668 | 9.00% | 9.00% | 0.25% | 0.25% | 0.00% | 23% | 30% | 26% | 34% | 23% | 30% | 27% | 35% | 26% | 34% | 24% | 24% | 25% | 25% |
| 8669 | 0.00% | 0.00% | 1.00% | 0.25% | 0.00% | 13% | 17% | 17% | 22% | 14% | 18% | 14% | 18% | 17% | 22% | 15% | 15% | 15% | 15% |
| 8670 | 1.00% | 0.00% | 1.00% | 0.25% | 0.00% | 17% | 22% | 19% | 25% | 19% | 25% | 17% | 22% | 20% | 26% | 18% | 18% | 19% | 19% |
| 8671 | 0.00% | 0.25% | 1.00% | 0.25% | 0.00% | 17% | 22% | 22% | 29% | 18% | 23% | 19% | 25% | 21% | 27% | 19% | 19% | 19% | 19% |
| 8672 | 0.25% | 0.25% | 1.00% | 0.25% | 0.00% | 19% | 25% | 23% | 30% | 20% | 26% | 20% | 26% | 22% | 29% | 21% | 21% | 21% | 21% |
| 8673 | 1.00% | 0.25% | 1.00% | 0.25% | 0.00% | 21% | 27% | 24% | 31% | 23% | 30% | 22% | 29% | 24% | 31% | 23% | 23% | 23% | 23% |
| 8674 | 9.00% | 0.25% | 1.00% | 0.25% | 0.00% | 17% | 22% | 22% | 29% | 18% | 23% | 19% | 25% | 21% | 27% | 19% | 19% | 19% | 19% |
| 8675 | 0.00% | 1.00% | 1.00% | 0.25% | 0.00% | 20% | 26% | 25% | 33% | 22% | 29% | 22% | 29% | 24% | 31% | 22% | 22% | 23% | 23% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8676 | 0.25% | 1.00% | 1.00% | 0.25% | 0.00% | 22% | 29% | 26% | 34% | 24% | 31% | 23% | 30% | 25% | 33% | 24% | 24% | 24% | 24% |
| 8677 | 1.00% | 1.00% | 1.00% | 0.25% | 0.00% | 24% | 31% | 27% | 35% | 27% | 35% | 25% | 33% | 27% | 35% | 26% | 26% | 26% | 26% |
| 8678 | 9.00% | 1.00% | 1.00% | 0.25% | 0.00% | 20% | 26% | 25% | 33% | 22% | 29% | 22% | 29% | 24% | 31% | 22% | 22% | 23% | 23% |
| 8679 | 0.00% | 9.00% | 1.00% | 0.25% | 0.00% | 28% | 36% | 33% | 43% | 28% | 36% | 29% | 38% | 31% | 40% | 30% | 30% | 29% | 29% |
| 8680 | 0.25% | 9.00% | 1.00% | 0.25% | 0.00% | 30% | 39% | 34% | 44% | 30% | 39% | 30% | 39% | 32% | 42% | 31% | 31% | 31% | 31% |
| 8681 | 1.00% | 9.00% | 1.00% | 0.25% | 0.00% | 32% | 42% | 35% | 46% | 33% | 43% | 32% | 42% | 34% | 44% | 33% | 33% | 33% | 33% |
| 8682 | 0.25% | 0.25% | 9.00% | 0.25% | 0.00% | 29% | 38% | 31% | 40% | 34% | 44% | 27% | 35% | 36% | 47% | 31% | 31% | 32% | 32% |
| 8683 | 1.00% | 0.25% | 9.00% | 0.25% | 0.00% | 31% | 40% | 32% | 42% | 37% | 48% | 29% | 38% | 38% | 49% | 33% | 33% | 35% | 35% |
| 8684 | 9.00% | 0.25% | 9.00% | 0.25% | 0.00% | 27% | 35% | 30% | 39% | 32% | 42% | 26% | 34% | 35% | 46% | 30% | 30% | 31% | 31% |
| 8685 | 0.00% | 1.00% | 9.00% | 0.25% | 0.00% | 30% | 39% | 33% | 43% | 36% | 47% | 29% | 38% | 38% | 49% | 33% | 33% | 34% | 34% |
| 8686 | 0.25% | 1.00% | 9.00% | 0.25% | 0.00% | 32% | 42% | 34% | 44% | 38% | 49% | 30% | 39% | 39% | 51% | 35% | 35% | 36% | 36% |
| 8687 | 9.00% | 1.00% | 9.00% | 0.25% | 0.00% | 30% | 39% | 33% | 43% | 36% | 47% | 29% | 38% | 38% | 49% | 33% | 33% | 34% | 34% |
| 8688 | 1.00% | 9.00% | 9.00% | 0.25% | 0.00% | 42% | 55% | 43% | 56% | 47% | 61% | 39% | 51% | 48% | 62% | 44% | 44% | 45% | 45% |
| 8689 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 8690 | 1.00% | 0.25% | 0.00% | 1.00% | 0.00% | 22% | 29% | 20% | 26% | 21% | 27% | 20% | 26% | 24% | 31% | 21% | 21% | 22% | 22% |
| 8691 | 0.00% | 1.00% | 0.00% | 1.00% | 0.00% | 21% | 27% | 21% | 27% | 20% | 26% | 20% | 26% | 24% | 31% | 21% | 21% | 21% | 21% |
| 8692 | 0.25% | 1.00% | 0.00% | 1.00% | 0.00% | 23% | 30% | 22% | 29% | 22% | 29% | 21% | 27% | 25% | 33% | 22% | 22% | 23% | 23% |
| 8693 | 1.00% | 1.00% | 0.00% | 1.00% | 0.00% | 25% | 33% | 23% | 30% | 25% | 33% | 23% | 30% | 27% | 35% | 24% | 24% | 25% | 25% |
| 8694 | 0.00% | 0.00% | 0.25% | 1.00% | 0.00% | 19% | 25% | 17% | 22% | 19% | 25% | 19% | 25% | 24% | 31% | 18% | 18% | 21% | 21% |
| 8695 | 1.00% | 0.00% | 0.25% | 1.00% | 0.00% | 23% | 30% | 19% | 25% | 24% | 31% | 22% | 29% | 27% | 35% | 22% | 22% | 24% | 24% |
| 8696 | 0.25% | 0.25% | 0.25% | 1.00% | 0.00% | 25% | 33% | 23% | 30% | 25% | 33% | 25% | 33% | 29% | 38% | 24% | 24% | 26% | 26% |
| 8697 | 1.00% | 0.25% | 0.25% | 1.00% | 0.00% | 27% | 35% | 24% | 31% | 28% | 36% | 27% | 35% | 31% | 40% | 26% | 26% | 29% | 29% |
| 8698 | 9.00% | 0.25% | 0.25% | 1.00% | 0.00% | 23% | 30% | 22% | 29% | 23% | 30% | 24% | 31% | 28% | 36% | 23% | 23% | 25% | 25% |
| 8699 | 0.00% | 1.00% | 0.25% | 1.00% | 0.00% | 26% | 34% | 25% | 33% | 27% | 35% | 27% | 35% | 31% | 40% | 26% | 26% | 28% | 28% |
| 8700 | 0.25% | 1.00% | 0.25% | 1.00% | 0.00% | 28% | 36% | 26% | 34% | 29% | 38% | 28% | 36% | 32% | 42% | 28% | 28% | 30% | 30% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8701 | 1.00% | 1.00% | 0.25% | 1.00% | 0.00% | 30% | 39% | 27% | 35% | 32% | 42% | 30% | 39% | 34% | 44% | 30% | 30% | 32% | 32% |
| 8702 | 9.00% | 1.00% | 0.25% | 1.00% | 0.00% | 26% | 34% | 25% | 33% | 27% | 35% | 27% | 35% | 31% | 40% | 26% | 26% | 28% | 28% |
| 8703 | 0.25% | 9.00% | 0.25% | 1.00% | 0.00% | 36% | 47% | 34% | 44% | 35% | 46% | 35% | 46% | 39% | 51% | 35% | 35% | 36% | 36% |
| 8704 | 1.00% | 9.00% | 0.25% | 1.00% | 0.00% | 38% | 49% | 35% | 46% | 38% | 49% | 37% | 48% | 41% | 53% | 37% | 37% | 39% | 39% |
| 8705 | 9.00% | 9.00% | 0.25% | 1.00% | 0.00% | 34% | 44% | 33% | 43% | 33% | 43% | 34% | 44% | 38% | 49% | 33% | 33% | 35% | 35% |
| 8706 | 0.00% | 0.00% | 1.00% | 1.00% | 0.00% | 24% | 31% | 24% | 31% | 24% | 31% | 21% | 27% | 29% | 38% | 24% | 24% | 25% | 25% |
| 8707 | 0.25% | 0.00% | 1.00% | 1.00% | 0.00% | 26% | 34% | 25% | 33% | 26% | 34% | 22% | 29% | 30% | 39% | 26% | 26% | 26% | 26% |
| 8708 | 1.00% | 0.00% | 1.00% | 1.00% | 0.00% | 28% | 36% | 26% | 34% | 29% | 38% | 24% | 31% | 32% | 42% | 28% | 28% | 28% | 28% |
| 8709 | 0.00% | 0.25% | 1.00% | 1.00% | 0.00% | 28% | 36% | 29% | 38% | 28% | 36% | 26% | 34% | 33% | 43% | 28% | 28% | 29% | 29% |
| 8710 | 1.00% | 0.25% | 1.00% | 1.00% | 0.00% | 32% | 42% | 31% | 40% | 33% | 43% | 29% | 38% | 36% | 47% | 32% | 32% | 33% | 33% |
| 8711 | 9.00% | 0.25% | 1.00% | 1.00% | 0.00% | 28% | 36% | 29% | 38% | 28% | 36% | 26% | 34% | 33% | 43% | 28% | 28% | 29% | 29% |
| 8712 | 0.00% | 1.00% | 1.00% | 1.00% | 0.00% | 31% | 40% | 32% | 42% | 32% | 42% | 29% | 38% | 36% | 47% | 32% | 32% | 32% | 32% |
| 8713 | 0.25% | 1.00% | 1.00% | 1.00% | 0.00% | 33% | 43% | 33% | 43% | 34% | 44% | 30% | 39% | 37% | 48% | 33% | 33% | 34% | 34% |
| 8714 | 1.00% | 1.00% | 1.00% | 1.00% | 0.00% | 35% | 46% | 34% | 44% | 37% | 48% | 32% | 42% | 39% | 51% | 35% | 35% | 36% | 36% |
| 8715 | 9.00% | 1.00% | 1.00% | 1.00% | 0.00% | 31% | 40% | 32% | 42% | 32% | 42% | 29% | 38% | 36% | 47% | 32% | 32% | 32% | 32% |
| 8716 | 0.00% | 9.00% | 1.00% | 1.00% | 0.00% | 39% | 51% | 40% | 52% | 38% | 49% | 36% | 47% | 43% | 56% | 39% | 39% | 39% | 39% |
| 8717 | 0.25% | 9.00% | 1.00% | 1.00% | 0.00% | 41% | 53% | 41% | 53% | 40% | 52% | 37% | 48% | 44% | 57% | 41% | 41% | 40% | 40% |
| 8718 | 1.00% | 9.00% | 1.00% | 1.00% | 0.00% | 43% | 56% | 42% | 55% | 43% | 56% | 39% | 51% | 46% | 60% | 43% | 43% | 43% | 43% |
| 8719 | 0.25% | 0.25% | 9.00% | 1.00% | 0.00% | 40% | 52% | 38% | 49% | 44% | 57% | 34% | 44% | 48% | 62% | 41% | 41% | 42% | 42% |
| 8720 | 1.00% | 0.25% | 9.00% | 1.00% | 0.00% | 42% | 55% | 39% | 51% | 47% | 61% | 36% | 47% | 50% | 65% | 43% | 43% | 44% | 44% |
| 8721 | 9.00% | 0.25% | 9.00% | 1.00% | 0.00% | 38% | 49% | 37% | 48% | 42% | 55% | 33% | 43% | 47% | 61% | 39% | 39% | 41% | 41% |
| 8722 | 0.25% | 1.00% | 9.00% | 1.00% | 0.00% | 43% | 56% | 41% | 53% | 48% | 62% | 37% | 48% | 51% | 66% | 44% | 44% | 45% | 45% |
| 8723 | 0.00% | 0.25% | 0.00% | 9.00% | 0.00% | 31% | 40% | 27% | 35% | 26% | 34% | 30% | 39% | 31% | 40% | 28% | 28% | 29% | 29% |
| 8724 | 0.00% | 0.00% | 0.25% | 9.00% | 0.00% | 32% | 42% | 26% | 34% | 29% | 38% | 32% | 42% | 34% | 44% | 29% | 29% | 32% | 32% |
| 8725 | 0.25% | 0.00% | 0.25% | 9.00% | 0.00% | 34% | 44% | 27% | 35% | 31% | 40% | 33% | 43% | 35% | 46% | 31% | 31% | 33% | 33% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8726 | 0.00% | 0.25% | 0.25% | 9.00% | 0.00% | 36% | 47% | 31% | 40% | 33% | 43% | 37% | 48% | 38% | 49% | 33% | 33% | 36% | 36% |
| 8727 | 0.25% | 0.25% | 0.25% | 9.00% | 0.00% | 38% | 49% | 32% | 42% | 35% | 46% | 38% | 49% | 39% | 51% | 35% | 35% | 37% | 37% |
| 8728 | 1.00% | 0.25% | 0.25% | 9.00% | 0.00% | 40% | 52% | 33% | 43% | 38% | 49% | 40% | 52% | 41% | 53% | 37% | 37% | 40% | 40% |
| 8729 | 9.00% | 0.25% | 0.25% | 9.00% | 0.00% | 36% | 47% | 31% | 40% | 33% | 43% | 37% | 48% | 38% | 49% | 33% | 33% | 36% | 36% |
| 8730 | 0.00% | 1.00% | 0.25% | 9.00% | 0.00% | 39% | 51% | 34% | 44% | 37% | 48% | 40% | 52% | 41% | 53% | 37% | 37% | 39% | 39% |
| 8731 | 0.25% | 1.00% | 0.25% | 9.00% | 0.00% | 41% | 53% | 35% | 46% | 39% | 51% | 41% | 53% | 42% | 55% | 38% | 38% | 41% | 41% |
| 8732 | 1.00% | 1.00% | 0.25% | 9.00% | 0.00% | 43% | 56% | 36% | 47% | 42% | 55% | 43% | 56% | 44% | 57% | 40% | 40% | 43% | 43% |
| 8733 | 0.25% | 9.00% | 0.25% | 9.00% | 0.00% | 49% | 64% | 43% | 56% | 45% | 59% | 48% | 62% | 49% | 64% | 46% | 46% | 47% | 47% |
| 8734 | 0.25% | 0.00% | 1.00% | 9.00% | 0.00% | 39% | 51% | 34% | 44% | 36% | 47% | 35% | 46% | 40% | 52% | 36% | 36% | 37% | 37% |
| 8735 | 1.00% | 0.25% | 1.00% | 9.00% | 0.00% | 45% | 59% | 40% | 52% | 43% | 56% | 42% | 55% | 46% | 60% | 43% | 43% | 44% | 44% |
| 8736 | 9.00% | 0.25% | 1.00% | 9.00% | 0.00% | 41% | 53% | 38% | 49% | 38% | 49% | 39% | 51% | 43% | 56% | 39% | 39% | 40% | 40% |
| 8737 | 0.00% | 1.00% | 1.00% | 9.00% | 0.00% | 44% | 57% | 41% | 53% | 42% | 55% | 42% | 55% | 46% | 60% | 42% | 42% | 43% | 43% |
| 8738 | 0.25% | 1.00% | 1.00% | 9.00% | 0.00% | 46% | 60% | 42% | 55% | 44% | 57% | 43% | 56% | 47% | 61% | 44% | 44% | 45% | 45% |
| 8739 | 1.00% | 1.00% | 1.00% | 9.00% | 0.00% | 48% | 62% | 43% | 56% | 47% | 61% | 45% | 59% | 49% | 64% | 46% | 46% | 47% | 47% |
| 8740 | 0.25% | 0.25% | 9.00% | 9.00% | 0.00% | 53% | 69% | 47% | 61% | 54% | 70% | 47% | 61% | 58% | 75% | 51% | 51% | 53% | 53% |
| 8741 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 8742 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 8743 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 8744 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 8745 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 8746 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 8747 | 0.00% | 0.25% | 0.25% | 0.00% | 0.25% | 15% | 20% | 16% | 21% | 17% | 22% | 17% | 22% | 18% | 23% | 16% | 16% | 17% | 17% |
| 8748 | 0.25% | 0.25% | 0.25% | 0.00% | 0.25% | 17% | 22% | 17% | 22% | 19% | 25% | 18% | 23% | 19% | 25% | 18% | 18% | 19% | 19% |
| 8749 | 0.00% | 1.00% | 0.25% | 0.00% | 0.25% | 18% | 23% | 19% | 25% | 21% | 27% | 20% | 26% | 21% | 27% | 19% | 19% | 21% | 21% |
| 8750 | 1.00% | 1.00% | 0.25% | 0.00% | 0.25% | 22% | 29% | 21% | 27% | 26% | 34% | 23% | 30% | 24% | 31% | 23% | 23% | 24% | 24% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8751 | 1.00% | 9.00% | 0.25% | 0.00% | 0.25% | 30% | 39% | 29% | 38% | 32% | 42% | 30% | 39% | 31% | 40% | 30% | 30% | 31% | 31% |
| 8752 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 8753 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 8754 | 0.00% | 0.25% | 1.00% | 0.00% | 0.25% | 20% | 26% | 23% | 30% | 22% | 29% | 19% | 25% | 23% | 30% | 22% | 22% | 21% | 21% |
| 8755 | 1.00% | 0.25% | 1.00% | 0.00% | 0.25% | 24% | 31% | 25% | 33% | 27% | 35% | 22% | 29% | 26% | 34% | 25% | 25% | 25% | 25% |
| 8756 | 0.00% | 1.00% | 1.00% | 0.00% | 0.25% | 23% | 30% | 26% | 34% | 26% | 34% | 22% | 29% | 26% | 34% | 25% | 25% | 25% | 25% |
| 8757 | 0.25% | 1.00% | 1.00% | 0.00% | 0.25% | 25% | 33% | 27% | 35% | 28% | 36% | 23% | 30% | 27% | 35% | 27% | 27% | 26% | 26% |
| 8758 | 1.00% | 1.00% | 1.00% | 0.00% | 0.25% | 27% | 35% | 28% | 36% | 31% | 40% | 25% | 33% | 29% | 38% | 29% | 29% | 28% | 28% |
| 8759 | 9.00% | 1.00% | 1.00% | 0.00% | 0.25% | 23% | 30% | 26% | 34% | 26% | 34% | 22% | 29% | 26% | 34% | 25% | 25% | 25% | 25% |
| 8760 | 1.00% | 9.00% | 1.00% | 0.00% | 0.25% | 35% | 46% | 36% | 47% | 37% | 48% | 32% | 42% | 36% | 47% | 36% | 36% | 35% | 35% |
| 8761 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 8762 | 0.00% | 0.25% | 9.00% | 0.00% | 0.25% | 30% | 39% | 31% | 40% | 36% | 47% | 26% | 34% | 37% | 48% | 32% | 32% | 33% | 33% |
| 8763 | 0.25% | 0.25% | 9.00% | 0.00% | 0.25% | 32% | 42% | 32% | 42% | 38% | 49% | 27% | 35% | 38% | 49% | 34% | 34% | 34% | 34% |
| 8764 | 1.00% | 0.25% | 9.00% | 0.00% | 0.25% | 34% | 44% | 33% | 43% | 41% | 53% | 29% | 38% | 40% | 52% | 36% | 36% | 37% | 37% |
| 8765 | 0.25% | 1.00% | 9.00% | 0.00% | 0.25% | 35% | 46% | 35% | 46% | 42% | 55% | 30% | 39% | 41% | 53% | 37% | 37% | 38% | 38% |
| 8766 | 0.25% | 0.00% | 0.00% | 0.25% | 0.25% | 11% | 14% | 14% | 18% | 10% | 13% | 11% | 14% | 13% | 17% | 12% | 12% | 11% | 11% |
| 8767 | 1.00% | 0.00% | 0.00% | 0.25% | 0.25% | 13% | 17% | 15% | 20% | 13% | 17% | 13% | 17% | 15% | 20% | 14% | 14% | 14% | 14% |
| 8768 | 0.00% | 0.25% | 0.00% | 0.25% | 0.25% | 13% | 17% | 18% | 23% | 12% | 16% | 15% | 20% | 16% | 21% | 14% | 14% | 14% | 14% |
| 8769 | 0.25% | 0.25% | 0.00% | 0.25% | 0.25% | 15% | 20% | 19% | 25% | 14% | 18% | 16% | 21% | 17% | 22% | 16% | 16% | 16% | 16% |
| 8770 | 9.00% | 0.25% | 0.00% | 0.25% | 0.25% | 13% | 17% | 18% | 23% | 12% | 16% | 15% | 20% | 16% | 21% | 14% | 14% | 14% | 14% |
| 8771 | 1.00% | 1.00% | 0.00% | 0.25% | 0.25% | 20% | 26% | 23% | 30% | 21% | 27% | 21% | 27% | 22% | 29% | 21% | 21% | 21% | 21% |
| 8772 | 1.00% | 9.00% | 0.00% | 0.25% | 0.25% | 28% | 36% | 31% | 40% | 27% | 35% | 28% | 36% | 29% | 38% | 29% | 29% | 28% | 28% |
| 8773 | 0.00% | 0.00% | 0.25% | 0.25% | 0.25% | 14% | 18% | 17% | 22% | 15% | 20% | 17% | 22% | 19% | 25% | 15% | 15% | 17% | 17% |
| 8774 | 0.25% | 0.00% | 0.25% | 0.25% | 0.25% | 16% | 21% | 18% | 23% | 17% | 22% | 18% | 23% | 20% | 26% | 17% | 17% | 18% | 18% |
| 8775 | 0.00% | 0.25% | 0.25% | 0.25% | 0.25% | 18% | 23% | 22% | 29% | 19% | 25% | 22% | 29% | 23% | 30% | 20% | 20% | 21% | 21% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8776 | 0.25% | 0.25% | 0.25% | 0.25% | 0.25% | 20% | 26% | 23% | 30% | 21% | 27% | 23% | 30% | 24% | 31% | 21% | 21% | 23% | 23% |
| 8777 | 1.00% | 0.25% | 0.25% | 0.25% | 0.25% | 22% | 29% | 24% | 31% | 24% | 31% | 25% | 33% | 26% | 34% | 23% | 23% | 25% | 25% |
| 8778 | 9.00% | 0.25% | 0.25% | 0.25% | 0.25% | 18% | 23% | 22% | 29% | 19% | 25% | 22% | 29% | 23% | 30% | 20% | 20% | 21% | 21% |
| 8779 | 0.25% | 1.00% | 0.25% | 0.25% | 0.25% | 23% | 30% | 26% | 34% | 25% | 33% | 26% | 34% | 27% | 35% | 25% | 25% | 26% | 26% |
| 8780 | 9.00% | 1.00% | 0.25% | 0.25% | 0.25% | 21% | 27% | 25% | 33% | 23% | 30% | 25% | 33% | 26% | 34% | 23% | 23% | 25% | 25% |
| 8781 | 0.25% | 9.00% | 0.25% | 0.25% | 0.25% | 31% | 40% | 34% | 44% | 31% | 40% | 33% | 43% | 34% | 44% | 32% | 32% | 33% | 33% |
| 8782 | 1.00% | 9.00% | 0.25% | 0.25% | 0.25% | 33% | 43% | 35% | 46% | 34% | 44% | 35% | 46% | 36% | 47% | 34% | 34% | 35% | 35% |
| 8783 | 9.00% | 9.00% | 0.25% | 0.25% | 0.25% | 29% | 38% | 33% | 43% | 29% | 38% | 32% | 42% | 33% | 43% | 30% | 30% | 31% | 31% |
| 8784 | 0.00% | 0.00% | 1.00% | 0.25% | 0.25% | 19% | 25% | 24% | 31% | 20% | 26% | 19% | 25% | 24% | 31% | 21% | 21% | 21% | 21% |
| 8785 | 1.00% | 0.00% | 1.00% | 0.25% | 0.25% | 23% | 30% | 26% | 34% | 25% | 33% | 22% | 29% | 27% | 35% | 25% | 25% | 25% | 25% |
| 8786 | 0.00% | 0.25% | 1.00% | 0.25% | 0.25% | 23% | 30% | 29% | 38% | 24% | 31% | 24% | 31% | 28% | 36% | 25% | 25% | 25% | 25% |
| 8787 | 0.25% | 0.25% | 1.00% | 0.25% | 0.25% | 25% | 33% | 30% | 39% | 26% | 34% | 25% | 33% | 29% | 38% | 27% | 27% | 27% | 27% |
| 8788 | 1.00% | 0.25% | 1.00% | 0.25% | 0.25% | 27% | 35% | 31% | 40% | 29% | 38% | 27% | 35% | 31% | 40% | 29% | 29% | 29% | 29% |
| 8789 | 9.00% | 0.25% | 1.00% | 0.25% | 0.25% | 23% | 30% | 29% | 38% | 24% | 31% | 24% | 31% | 28% | 36% | 25% | 25% | 25% | 25% |
| 8790 | 0.00% | 1.00% | 1.00% | 0.25% | 0.25% | 26% | 34% | 32% | 42% | 28% | 36% | 27% | 35% | 31% | 40% | 29% | 29% | 29% | 29% |
| 8791 | 0.25% | 1.00% | 1.00% | 0.25% | 0.25% | 28% | 36% | 33% | 43% | 30% | 39% | 28% | 36% | 32% | 42% | 30% | 30% | 30% | 30% |
| 8792 | 1.00% | 1.00% | 1.00% | 0.25% | 0.25% | 30% | 39% | 34% | 44% | 33% | 43% | 30% | 39% | 34% | 44% | 32% | 32% | 32% | 32% |
| 8793 | 9.00% | 1.00% | 1.00% | 0.25% | 0.25% | 26% | 34% | 32% | 42% | 28% | 36% | 27% | 35% | 31% | 40% | 29% | 29% | 29% | 29% |
| 8794 | 0.00% | 9.00% | 1.00% | 0.25% | 0.25% | 34% | 44% | 40% | 52% | 34% | 44% | 34% | 44% | 38% | 49% | 36% | 36% | 35% | 35% |
| 8795 | 0.25% | 9.00% | 1.00% | 0.25% | 0.25% | 36% | 47% | 41% | 53% | 36% | 47% | 35% | 46% | 39% | 51% | 38% | 38% | 37% | 37% |
| 8796 | 1.00% | 9.00% | 1.00% | 0.25% | 0.25% | 38% | 49% | 42% | 55% | 39% | 51% | 37% | 48% | 41% | 53% | 40% | 40% | 39% | 39% |
| 8797 | 0.25% | 0.25% | 9.00% | 0.25% | 0.25% | 35% | 46% | 38% | 49% | 40% | 52% | 32% | 42% | 43% | 56% | 38% | 38% | 38% | 38% |
| 8798 | 1.00% | 0.25% | 9.00% | 0.25% | 0.25% | 37% | 48% | 39% | 51% | 43% | 56% | 34% | 44% | 45% | 59% | 40% | 40% | 41% | 41% |
| 8799 | 9.00% | 0.25% | 9.00% | 0.25% | 0.25% | 33% | 43% | 37% | 48% | 38% | 49% | 31% | 40% | 42% | 55% | 36% | 36% | 37% | 37% |
| 8800 | 0.00% | 1.00% | 9.00% | 0.25% | 0.25% | 36% | 47% | 40% | 52% | 42% | 55% | 34% | 44% | 45% | 59% | 39% | 39% | 40% | 40% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8801 | 0.25% | 1.00% | 9.00% | 0.25% | 0.25% | 38% | 49% | 41% | 53% | 44% | 57% | 35% | 46% | 46% | 60% | 41% | 41% | 42% | 42% |
| 8802 | 9.00% | 1.00% | 9.00% | 0.25% | 0.25% | 36% | 47% | 40% | 52% | 42% | 55% | 34% | 44% | 45% | 59% | 39% | 39% | 40% | 40% |
| 8803 | 1.00% | 9.00% | 9.00% | 0.25% | 0.25% | 48% | 62% | 50% | 65% | 53% | 69% | 44% | 57% | 55% | 72% | 50% | 50% | 51% | 51% |
| 8804 | 0.25% | 0.00% | 0.00% | 1.00% | 0.25% | 22% | 29% | 21% | 27% | 20% | 26% | 18% | 23% | 25% | 33% | 21% | 21% | 21% | 21% |
| 8805 | 1.00% | 0.25% | 0.00% | 1.00% | 0.25% | 28% | 36% | 27% | 35% | 27% | 35% | 25% | 33% | 31% | 40% | 27% | 27% | 28% | 28% |
| 8806 | 0.00% | 1.00% | 0.00% | 1.00% | 0.25% | 27% | 35% | 28% | 36% | 26% | 34% | 25% | 33% | 31% | 40% | 27% | 27% | 27% | 27% |
| 8807 | 0.25% | 1.00% | 0.00% | 1.00% | 0.25% | 29% | 38% | 29% | 38% | 28% | 36% | 26% | 34% | 32% | 42% | 29% | 29% | 29% | 29% |
| 8808 | 1.00% | 1.00% | 0.00% | 1.00% | 0.25% | 31% | 40% | 30% | 39% | 31% | 40% | 28% | 36% | 34% | 44% | 31% | 31% | 31% | 31% |
| 8809 | 0.00% | 0.00% | 0.25% | 1.00% | 0.25% | 25% | 33% | 24% | 31% | 25% | 33% | 24% | 31% | 31% | 40% | 25% | 25% | 27% | 27% |
| 8810 | 1.00% | 0.00% | 0.25% | 1.00% | 0.25% | 29% | 38% | 26% | 34% | 30% | 39% | 27% | 35% | 34% | 44% | 28% | 28% | 30% | 30% |
| 8811 | 0.25% | 0.25% | 0.25% | 1.00% | 0.25% | 31% | 40% | 30% | 39% | 31% | 40% | 30% | 39% | 36% | 47% | 31% | 31% | 32% | 32% |
| 8812 | 1.00% | 0.25% | 0.25% | 1.00% | 0.25% | 33% | 43% | 31% | 40% | 34% | 44% | 32% | 42% | 38% | 49% | 33% | 33% | 35% | 35% |
| 8813 | 9.00% | 0.25% | 0.25% | 1.00% | 0.25% | 29% | 38% | 29% | 38% | 29% | 38% | 29% | 38% | 35% | 46% | 29% | 29% | 31% | 31% |
| 8814 | 0.00% | 1.00% | 0.25% | 1.00% | 0.25% | 32% | 42% | 32% | 42% | 33% | 43% | 32% | 42% | 38% | 49% | 32% | 32% | 34% | 34% |
| 8815 | 0.25% | 1.00% | 0.25% | 1.00% | 0.25% | 34% | 44% | 33% | 43% | 35% | 46% | 33% | 43% | 39% | 51% | 34% | 34% | 36% | 36% |
| 8816 | 1.00% | 1.00% | 0.25% | 1.00% | 0.25% | 36% | 47% | 34% | 44% | 38% | 49% | 35% | 46% | 41% | 53% | 36% | 36% | 38% | 38% |
| 8817 | 9.00% | 1.00% | 0.25% | 1.00% | 0.25% | 32% | 42% | 32% | 42% | 33% | 43% | 32% | 42% | 38% | 49% | 32% | 32% | 34% | 34% |
| 8818 | 0.25% | 9.00% | 0.25% | 1.00% | 0.25% | 42% | 55% | 41% | 53% | 41% | 53% | 40% | 52% | 46% | 60% | 41% | 41% | 42% | 42% |
| 8819 | 1.00% | 9.00% | 0.25% | 1.00% | 0.25% | 44% | 57% | 42% | 55% | 44% | 57% | 42% | 55% | 48% | 62% | 43% | 43% | 45% | 45% |
| 8820 | 9.00% | 9.00% | 0.25% | 1.00% | 0.25% | 40% | 52% | 40% | 52% | 39% | 51% | 39% | 51% | 45% | 59% | 40% | 40% | 41% | 41% |
| 8821 | 0.00% | 0.00% | 1.00% | 1.00% | 0.25% | 30% | 39% | 31% | 40% | 30% | 39% | 26% | 34% | 36% | 47% | 30% | 30% | 31% | 31% |
| 8822 | 0.25% | 0.00% | 1.00% | 1.00% | 0.25% | 32% | 42% | 32% | 42% | 32% | 42% | 27% | 35% | 37% | 48% | 32% | 32% | 32% | 32% |
| 8823 | 1.00% | 0.00% | 1.00% | 1.00% | 0.25% | 34% | 44% | 33% | 43% | 35% | 46% | 29% | 38% | 39% | 51% | 34% | 34% | 34% | 34% |
| 8824 | 0.00% | 0.25% | 1.00% | 1.00% | 0.25% | 34% | 44% | 36% | 47% | 34% | 44% | 31% | 40% | 40% | 52% | 35% | 35% | 35% | 35% |
| 8825 | 1.00% | 0.25% | 1.00% | 1.00% | 0.25% | 38% | 49% | 38% | 49% | 39% | 51% | 34% | 44% | 43% | 56% | 38% | 38% | 39% | 39% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8826 | 9.00% | 0.25% | 1.00% | 1.00% | 0.25% | 34% | 44% | 36% | 47% | 34% | 44% | 31% | 40% | 40% | 52% | 35% | 35% | 35% | 35% |
| 8827 | 0.00% | 1.00% | 1.00% | 1.00% | 0.25% | 37% | 48% | 39% | 51% | 38% | 49% | 34% | 44% | 43% | 56% | 38% | 38% | 38% | 38% |
| 8828 | 0.25% | 1.00% | 1.00% | 1.00% | 0.25% | 39% | 51% | 40% | 52% | 40% | 52% | 35% | 46% | 44% | 57% | 40% | 40% | 40% | 40% |
| 8829 | 1.00% | 1.00% | 1.00% | 1.00% | 0.25% | 41% | 53% | 41% | 53% | 43% | 56% | 37% | 48% | 46% | 60% | 42% | 42% | 42% | 42% |
| 8830 | 9.00% | 1.00% | 1.00% | 1.00% | 0.25% | 37% | 48% | 39% | 51% | 38% | 49% | 34% | 44% | 43% | 56% | 38% | 38% | 38% | 38% |
| 8831 | 0.00% | 9.00% | 1.00% | 1.00% | 0.25% | 45% | 59% | 47% | 61% | 44% | 57% | 41% | 53% | 50% | 65% | 45% | 45% | 45% | 45% |
| 8832 | 0.25% | 9.00% | 1.00% | 1.00% | 0.25% | 47% | 61% | 48% | 62% | 46% | 60% | 42% | 55% | 51% | 66% | 47% | 47% | 46% | 46% |
| 8833 | 1.00% | 9.00% | 1.00% | 1.00% | 0.25% | 49% | 64% | 49% | 64% | 49% | 64% | 44% | 57% | 53% | 69% | 49% | 49% | 49% | 49% |
| 8834 | 0.25% | 0.25% | 9.00% | 1.00% | 0.25% | 46% | 60% | 45% | 59% | 50% | 65% | 39% | 51% | 55% | 72% | 47% | 47% | 48% | 48% |
| 8835 | 1.00% | 0.25% | 9.00% | 1.00% | 0.25% | 48% | 62% | 46% | 60% | 53% | 69% | 41% | 53% | 57% | 74% | 49% | 49% | 50% | 50% |
| 8836 | 9.00% | 0.25% | 9.00% | 1.00% | 0.25% | 44% | 57% | 44% | 57% | 48% | 62% | 38% | 49% | 54% | 70% | 45% | 45% | 47% | 47% |
| 8837 | 0.25% | 1.00% | 9.00% | 1.00% | 0.25% | 49% | 64% | 48% | 62% | 54% | 70% | 42% | 55% | 58% | 75% | 50% | 50% | 51% | 51% |
| 8838 | 0.00% | 0.25% | 0.00% | 9.00% | 0.25% | 37% | 48% | 34% | 44% | 32% | 42% | 35% | 46% | 38% | 49% | 34% | 34% | 35% | 35% |
| 8839 | 0.00% | 0.00% | 0.25% | 9.00% | 0.25% | 38% | 49% | 33% | 43% | 35% | 46% | 37% | 48% | 41% | 53% | 35% | 35% | 38% | 38% |
| 8840 | 0.25% | 0.00% | 0.25% | 9.00% | 0.25% | 40% | 52% | 34% | 44% | 37% | 48% | 38% | 49% | 42% | 55% | 37% | 37% | 39% | 39% |
| 8841 | 0.00% | 0.25% | 0.25% | 9.00% | 0.25% | 42% | 55% | 38% | 49% | 39% | 51% | 42% | 55% | 45% | 59% | 40% | 40% | 42% | 42% |
| 8842 | 0.25% | 0.25% | 0.25% | 9.00% | 0.25% | 44% | 57% | 39% | 51% | 41% | 53% | 43% | 56% | 46% | 60% | 41% | 41% | 43% | 43% |
| 8843 | 1.00% | 0.25% | 0.25% | 9.00% | 0.25% | 46% | 60% | 40% | 52% | 44% | 57% | 45% | 59% | 48% | 62% | 43% | 43% | 46% | 46% |
| 8844 | 9.00% | 0.25% | 0.25% | 9.00% | 0.25% | 42% | 55% | 38% | 49% | 39% | 51% | 42% | 55% | 45% | 59% | 40% | 40% | 42% | 42% |
| 8845 | 0.00% | 1.00% | 0.25% | 9.00% | 0.25% | 45% | 59% | 41% | 53% | 43% | 56% | 45% | 59% | 48% | 62% | 43% | 43% | 45% | 45% |
| 8846 | 0.25% | 1.00% | 0.25% | 9.00% | 0.25% | 47% | 61% | 42% | 55% | 45% | 59% | 46% | 60% | 49% | 64% | 45% | 45% | 47% | 47% |
| 8847 | 1.00% | 1.00% | 0.25% | 9.00% | 0.25% | 49% | 64% | 43% | 56% | 48% | 62% | 48% | 62% | 51% | 66% | 47% | 47% | 49% | 49% |
| 8848 | 0.25% | 9.00% | 0.25% | 9.00% | 0.25% | 55% | 72% | 50% | 65% | 51% | 66% | 53% | 69% | 56% | 73% | 52% | 52% | 53% | 53% |
| 8849 | 0.25% | 0.00% | 1.00% | 9.00% | 0.25% | 45% | 59% | 41% | 53% | 42% | 55% | 40% | 52% | 47% | 61% | 43% | 43% | 43% | 43% |
| 8850 | 1.00% | 0.25% | 1.00% | 9.00% | 0.25% | 51% | 66% | 47% | 61% | 49% | 64% | 47% | 61% | 53% | 69% | 49% | 49% | 50% | 50% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8851 | 9.00% | 0.25% | 1.00% | 9.00% | 0.25% | 47% | 61% | 45% | 59% | 44% | 57% | 44% | 57% | 50% | 65% | 45% | 45% | 46% | 46% |
| 8852 | 0.00% | 1.00% | 1.00% | 9.00% | 0.25% | 50% | 65% | 48% | 62% | 48% | 62% | 47% | 61% | 53% | 69% | 49% | 49% | 49% | 49% |
| 8853 | 0.25% | 1.00% | 1.00% | 9.00% | 0.25% | 52% | 68% | 49% | 64% | 50% | 65% | 48% | 62% | 54% | 70% | 50% | 50% | 51% | 51% |
| 8854 | 1.00% | 1.00% | 1.00% | 9.00% | 0.25% | 54% | 70% | 50% | 65% | 53% | 69% | 50% | 65% | 56% | 73% | 52% | 52% | 53% | 53% |
| 8855 | 0.25% | 0.25% | 9.00% | 9.00% | 0.25% | 59% | 77% | 54% | 70% | 60% | 78% | 52% | 68% | 65% | 85% | 58% | 58% | 59% | 59% |
| 8856 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 8857 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 8858 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 8859 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 8860 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 8861 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 8862 | 0.00% | 0.25% | 0.25% | 0.00% | 1.00% | 20% | 26% | 22% | 29% | 22% | 29% | 22% | 29% | 29% | 38% | 21% | 21% | 24% | 24% |
| 8863 | 0.25% | 0.25% | 0.25% | 0.00% | 1.00% | 22% | 29% | 23% | 30% | 24% | 31% | 23% | 30% | 30% | 39% | 23% | 23% | 26% | 26% |
| 8864 | 0.00% | 1.00% | 0.25% | 0.00% | 1.00% | 23% | 30% | 25% | 33% | 26% | 34% | 25% | 33% | 32% | 42% | 25% | 25% | 28% | 28% |
| 8865 | 1.00% | 1.00% | 0.25% | 0.00% | 1.00% | 27% | 35% | 27% | 35% | 31% | 40% | 28% | 36% | 35% | 46% | 28% | 28% | 31% | 31% |
| 8866 | 1.00% | 9.00% | 0.25% | 0.00% | 1.00% | 35% | 46% | 35% | 46% | 37% | 48% | 35% | 46% | 42% | 55% | 36% | 36% | 38% | 38% |
| 8867 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 8868 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 8869 | 0.00% | 0.25% | 1.00% | 0.00% | 1.00% | 25% | 33% | 29% | 38% | 27% | 35% | 24% | 31% | 34% | 44% | 27% | 27% | 28% | 28% |
| 8870 | 1.00% | 0.25% | 1.00% | 0.00% | 1.00% | 29% | 38% | 31% | 40% | 32% | 42% | 27% | 35% | 37% | 48% | 31% | 31% | 32% | 32% |
| 8871 | 0.00% | 1.00% | 1.00% | 0.00% | 1.00% | 28% | 36% | 32% | 42% | 31% | 40% | 27% | 35% | 37% | 48% | 30% | 30% | 32% | 32% |
| 8872 | 0.25% | 1.00% | 1.00% | 0.00% | 1.00% | 30% | 39% | 33% | 43% | 33% | 43% | 28% | 36% | 38% | 49% | 32% | 32% | 33% | 33% |
| 8873 | 1.00% | 1.00% | 1.00% | 0.00% | 1.00% | 32% | 42% | 34% | 44% | 36% | 47% | 30% | 39% | 40% | 52% | 34% | 34% | 35% | 35% |
| 8874 | 9.00% | 1.00% | 1.00% | 0.00% | 1.00% | 28% | 36% | 32% | 42% | 31% | 40% | 27% | 35% | 37% | 48% | 30% | 30% | 32% | 32% |
| 8875 | 1.00% | 9.00% | 1.00% | 0.00% | 1.00% | 40% | 52% | 42% | 55% | 42% | 55% | 37% | 48% | 47% | 61% | 41% | 41% | 42% | 42% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8876 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 8877 | 0.00% | 0.25% | 9.00% | 0.00% | 1.00% | 35% | 46% | 37% | 48% | 41% | 53% | 31% | 40% | 48% | 62% | 38% | 38% | 40% | 40% |
| 8878 | 0.25% | 0.25% | 9.00% | 0.00% | 1.00% | 37% | 48% | 38% | 49% | 43% | 56% | 32% | 42% | 49% | 64% | 39% | 39% | 41% | 41% |
| 8879 | 1.00% | 0.25% | 9.00% | 0.00% | 1.00% | 39% | 51% | 39% | 51% | 46% | 60% | 34% | 44% | 51% | 66% | 41% | 41% | 44% | 44% |
| 8880 | 0.25% | 1.00% | 9.00% | 0.00% | 1.00% | 40% | 52% | 41% | 53% | 47% | 61% | 35% | 46% | 52% | 68% | 43% | 43% | 45% | 45% |
| 8881 | 0.25% | 0.00% | 0.00% | 0.25% | 1.00% | 16% | 21% | 20% | 26% | 15% | 20% | 16% | 21% | 24% | 31% | 17% | 17% | 18% | 18% |
| 8882 | 1.00% | 0.00% | 0.00% | 0.25% | 1.00% | 18% | 23% | 21% | 27% | 18% | 23% | 18% | 23% | 26% | 34% | 19% | 19% | 21% | 21% |
| 8883 | 0.00% | 0.25% | 0.00% | 0.25% | 1.00% | 18% | 23% | 24% | 31% | 17% | 22% | 20% | 26% | 27% | 35% | 20% | 20% | 21% | 21% |
| 8884 | 0.25% | 0.25% | 0.00% | 0.25% | 1.00% | 20% | 26% | 25% | 33% | 19% | 25% | 21% | 27% | 28% | 36% | 21% | 21% | 23% | 23% |
| 8885 | 9.00% | 0.25% | 0.00% | 0.25% | 1.00% | 18% | 23% | 24% | 31% | 17% | 22% | 20% | 26% | 27% | 35% | 20% | 20% | 21% | 21% |
| 8886 | 1.00% | 1.00% | 0.00% | 0.25% | 1.00% | 25% | 33% | 29% | 38% | 26% | 34% | 26% | 34% | 33% | 43% | 27% | 27% | 28% | 28% |
| 8887 | 1.00% | 9.00% | 0.00% | 0.25% | 1.00% | 33% | 43% | 37% | 48% | 32% | 42% | 33% | 43% | 40% | 52% | 34% | 34% | 35% | 35% |
| 8888 | 0.00% | 0.00% | 0.25% | 0.25% | 1.00% | 19% | 25% | 23% | 30% | 20% | 26% | 22% | 29% | 30% | 39% | 21% | 21% | 24% | 24% |
| 8889 | 0.25% | 0.00% | 0.25% | 0.25% | 1.00% | 21% | 27% | 24% | 31% | 22% | 29% | 23% | 30% | 31% | 40% | 22% | 22% | 25% | 25% |
| 8890 | 0.00% | 0.25% | 0.25% | 0.25% | 1.00% | 23% | 30% | 28% | 36% | 24% | 31% | 27% | 35% | 34% | 44% | 25% | 25% | 28% | 28% |
| 8891 | 0.25% | 0.25% | 0.25% | 0.25% | 1.00% | 25% | 33% | 29% | 38% | 26% | 34% | 28% | 36% | 35% | 46% | 27% | 27% | 30% | 30% |
| 8892 | 1.00% | 0.25% | 0.25% | 0.25% | 1.00% | 27% | 35% | 30% | 39% | 29% | 38% | 30% | 39% | 37% | 48% | 29% | 29% | 32% | 32% |
| 8893 | 9.00% | 0.25% | 0.25% | 0.25% | 1.00% | 23% | 30% | 28% | 36% | 24% | 31% | 27% | 35% | 34% | 44% | 25% | 25% | 28% | 28% |
| 8894 | 0.25% | 1.00% | 0.25% | 0.25% | 1.00% | 28% | 36% | 32% | 42% | 30% | 39% | 31% | 40% | 38% | 49% | 30% | 30% | 33% | 33% |
| 8895 | 9.00% | 1.00% | 0.25% | 0.25% | 1.00% | 26% | 34% | 31% | 40% | 28% | 36% | 30% | 39% | 37% | 48% | 28% | 28% | 32% | 32% |
| 8896 | 0.25% | 9.00% | 0.25% | 0.25% | 1.00% | 36% | 47% | 40% | 52% | 36% | 47% | 38% | 49% | 45% | 59% | 37% | 37% | 40% | 40% |
| 8897 | 1.00% | 9.00% | 0.25% | 0.25% | 1.00% | 38% | 49% | 41% | 53% | 39% | 51% | 40% | 52% | 47% | 61% | 39% | 39% | 42% | 42% |
| 8898 | 9.00% | 9.00% | 0.25% | 0.25% | 1.00% | 34% | 44% | 39% | 51% | 34% | 44% | 37% | 48% | 44% | 57% | 36% | 36% | 38% | 38% |
| 8899 | 0.00% | 0.00% | 1.00% | 0.25% | 1.00% | 24% | 31% | 30% | 39% | 25% | 33% | 24% | 31% | 35% | 46% | 26% | 26% | 28% | 28% |
| 8900 | 1.00% | 0.00% | 1.00% | 0.25% | 1.00% | 28% | 36% | 32% | 42% | 30% | 39% | 27% | 35% | 38% | 49% | 30% | 30% | 32% | 32% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8901 | 0.00% | 0.25% | 1.00% | 0.25% | 1.00% | 28% | 36% | 35% | 46% | 29% | 38% | 29% | 38% | 39% | 51% | 31% | 31% | 32% | 32% |
| 8902 | 0.25% | 0.25% | 1.00% | 0.25% | 1.00% | 30% | 39% | 36% | 47% | 31% | 40% | 30% | 39% | 40% | 52% | 32% | 32% | 34% | 34% |
| 8903 | 1.00% | 0.25% | 1.00% | 0.25% | 1.00% | 32% | 42% | 37% | 48% | 34% | 44% | 32% | 42% | 42% | 55% | 34% | 34% | 36% | 36% |
| 8904 | 9.00% | 0.25% | 1.00% | 0.25% | 1.00% | 28% | 36% | 35% | 46% | 29% | 38% | 29% | 38% | 39% | 51% | 31% | 31% | 32% | 32% |
| 8905 | 0.00% | 1.00% | 1.00% | 0.25% | 1.00% | 31% | 40% | 38% | 49% | 33% | 43% | 32% | 42% | 42% | 55% | 34% | 34% | 36% | 36% |
| 8906 | 0.25% | 1.00% | 1.00% | 0.25% | 1.00% | 33% | 43% | 39% | 51% | 35% | 46% | 33% | 43% | 43% | 56% | 36% | 36% | 37% | 37% |
| 8907 | 1.00% | 1.00% | 1.00% | 0.25% | 1.00% | 35% | 46% | 40% | 52% | 38% | 49% | 35% | 46% | 45% | 59% | 38% | 38% | 39% | 39% |
| 8908 | 9.00% | 1.00% | 1.00% | 0.25% | 1.00% | 31% | 40% | 38% | 49% | 33% | 43% | 32% | 42% | 42% | 55% | 34% | 34% | 36% | 36% |
| 8909 | 0.00% | 9.00% | 1.00% | 0.25% | 1.00% | 39% | 51% | 46% | 60% | 39% | 51% | 39% | 51% | 49% | 64% | 41% | 41% | 42% | 42% |
| 8910 | 0.25% | 9.00% | 1.00% | 0.25% | 1.00% | 41% | 53% | 47% | 61% | 41% | 53% | 40% | 52% | 50% | 65% | 43% | 43% | 44% | 44% |
| 8911 | 1.00% | 9.00% | 1.00% | 0.25% | 1.00% | 43% | 56% | 48% | 62% | 44% | 57% | 42% | 55% | 52% | 68% | 45% | 45% | 46% | 46% |
| 8912 | 0.25% | 0.25% | 9.00% | 0.25% | 1.00% | 40% | 52% | 44% | 57% | 45% | 59% | 37% | 48% | 54% | 70% | 43% | 43% | 45% | 45% |
| 8913 | 1.00% | 0.25% | 9.00% | 0.25% | 1.00% | 42% | 55% | 45% | 59% | 48% | 62% | 39% | 51% | 56% | 73% | 45% | 45% | 48% | 48% |
| 8914 | 9.00% | 0.25% | 9.00% | 0.25% | 1.00% | 38% | 49% | 43% | 56% | 43% | 56% | 36% | 47% | 53% | 69% | 41% | 41% | 44% | 44% |
| 8915 | 0.00% | 1.00% | 9.00% | 0.25% | 1.00% | 41% | 53% | 46% | 60% | 47% | 61% | 39% | 51% | 56% | 73% | 45% | 45% | 47% | 47% |
| 8916 | 0.25% | 1.00% | 9.00% | 0.25% | 1.00% | 43% | 56% | 47% | 61% | 49% | 64% | 40% | 52% | 57% | 74% | 46% | 46% | 49% | 49% |
| 8917 | 9.00% | 1.00% | 9.00% | 0.25% | 1.00% | 41% | 53% | 46% | 60% | 47% | 61% | 39% | 51% | 56% | 73% | 45% | 45% | 47% | 47% |
| 8918 | 1.00% | 9.00% | 9.00% | 0.25% | 1.00% | 53% | 69% | 56% | 73% | 58% | 75% | 49% | 64% | 66% | 86% | 56% | 56% | 58% | 58% |
| 8919 | 0.25% | 0.00% | 0.00% | 1.00% | 1.00% | 27% | 35% | 27% | 35% | 25% | 33% | 23% | 30% | 36% | 47% | 26% | 26% | 28% | 28% |
| 8920 | 1.00% | 0.25% | 0.00% | 1.00% | 1.00% | 33% | 43% | 33% | 43% | 32% | 42% | 30% | 39% | 42% | 55% | 33% | 33% | 35% | 35% |
| 8921 | 0.00% | 1.00% | 0.00% | 1.00% | 1.00% | 32% | 42% | 34% | 44% | 31% | 40% | 30% | 39% | 42% | 55% | 32% | 32% | 34% | 34% |
| 8922 | 0.25% | 1.00% | 0.00% | 1.00% | 1.00% | 34% | 44% | 35% | 46% | 33% | 43% | 31% | 40% | 43% | 56% | 34% | 34% | 36% | 36% |
| 8923 | 1.00% | 1.00% | 0.00% | 1.00% | 1.00% | 36% | 47% | 36% | 47% | 36% | 47% | 33% | 43% | 45% | 59% | 36% | 36% | 38% | 38% |
| 8924 | 0.00% | 0.00% | 0.25% | 1.00% | 1.00% | 30% | 39% | 30% | 39% | 30% | 39% | 29% | 38% | 42% | 55% | 30% | 30% | 34% | 34% |
| 8925 | 1.00% | 0.00% | 0.25% | 1.00% | 1.00% | 34% | 44% | 32% | 42% | 35% | 46% | 32% | 42% | 45% | 59% | 34% | 34% | 37% | 37% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8926 | 0.25% | 0.25% | 0.25% | 1.00% | 1.00% | 36% | 47% | 36% | 47% | 36% | 47% | 35% | 46% | 47% | 61% | 36% | 36% | 39% | 39% |
| 8927 | 1.00% | 0.25% | 0.25% | 1.00% | 1.00% | 38% | 49% | 37% | 48% | 39% | 51% | 37% | 48% | 49% | 64% | 38% | 38% | 42% | 42% |
| 8928 | 9.00% | 0.25% | 0.25% | 1.00% | 1.00% | 34% | 44% | 35% | 46% | 34% | 44% | 34% | 44% | 46% | 60% | 34% | 34% | 38% | 38% |
| 8929 | 0.00% | 1.00% | 0.25% | 1.00% | 1.00% | 37% | 48% | 38% | 49% | 38% | 49% | 37% | 48% | 49% | 64% | 38% | 38% | 41% | 41% |
| 8930 | 0.25% | 1.00% | 0.25% | 1.00% | 1.00% | 39% | 51% | 39% | 51% | 40% | 52% | 38% | 49% | 50% | 65% | 39% | 39% | 43% | 43% |
| 8931 | 1.00% | 1.00% | 0.25% | 1.00% | 1.00% | 41% | 53% | 40% | 52% | 43% | 56% | 40% | 52% | 52% | 68% | 41% | 41% | 45% | 45% |
| 8932 | 9.00% | 1.00% | 0.25% | 1.00% | 1.00% | 37% | 48% | 38% | 49% | 38% | 49% | 37% | 48% | 49% | 64% | 38% | 38% | 41% | 41% |
| 8933 | 0.25% | 9.00% | 0.25% | 1.00% | 1.00% | 47% | 61% | 47% | 61% | 46% | 60% | 45% | 59% | 57% | 74% | 47% | 47% | 49% | 49% |
| 8934 | 1.00% | 9.00% | 0.25% | 1.00% | 1.00% | 49% | 64% | 48% | 62% | 49% | 64% | 47% | 61% | 59% | 77% | 49% | 49% | 52% | 52% |
| 8935 | 9.00% | 9.00% | 0.25% | 1.00% | 1.00% | 45% | 59% | 46% | 60% | 44% | 57% | 44% | 57% | 56% | 73% | 45% | 45% | 48% | 48% |
| 8936 | 0.00% | 0.00% | 1.00% | 1.00% | 1.00% | 35% | 46% | 37% | 48% | 35% | 46% | 31% | 40% | 47% | 61% | 36% | 36% | 38% | 38% |
| 8937 | 0.25% | 0.00% | 1.00% | 1.00% | 1.00% | 37% | 48% | 38% | 49% | 37% | 48% | 32% | 42% | 48% | 62% | 37% | 37% | 39% | 39% |
| 8938 | 1.00% | 0.00% | 1.00% | 1.00% | 1.00% | 39% | 51% | 39% | 51% | 40% | 52% | 34% | 44% | 50% | 65% | 39% | 39% | 41% | 41% |
| 8939 | 0.00% | 0.25% | 1.00% | 1.00% | 1.00% | 39% | 51% | 42% | 55% | 39% | 51% | 36% | 47% | 51% | 66% | 40% | 40% | 42% | 42% |
| 8940 | 1.00% | 0.25% | 1.00% | 1.00% | 1.00% | 43% | 56% | 44% | 57% | 44% | 57% | 39% | 51% | 54% | 70% | 44% | 44% | 46% | 46% |
| 8941 | 9.00% | 0.25% | 1.00% | 1.00% | 1.00% | 39% | 51% | 42% | 55% | 39% | 51% | 36% | 47% | 51% | 66% | 40% | 40% | 42% | 42% |
| 8942 | 0.00% | 1.00% | 1.00% | 1.00% | 1.00% | 42% | 55% | 45% | 59% | 43% | 56% | 39% | 51% | 54% | 70% | 43% | 43% | 45% | 45% |
| 8943 | 0.25% | 1.00% | 1.00% | 1.00% | 1.00% | 44% | 57% | 46% | 60% | 45% | 59% | 40% | 52% | 55% | 72% | 45% | 45% | 47% | 47% |
| 8944 | 1.00% | 1.00% | 1.00% | 1.00% | 1.00% | 46% | 60% | 47% | 61% | 48% | 62% | 42% | 55% | 57% | 74% | 47% | 47% | 49% | 49% |
| 8945 | 9.00% | 1.00% | 1.00% | 1.00% | 1.00% | 42% | 55% | 45% | 59% | 43% | 56% | 39% | 51% | 54% | 70% | 43% | 43% | 45% | 45% |
| 8946 | 0.00% | 9.00% | 1.00% | 1.00% | 1.00% | 50% | 65% | 53% | 69% | 49% | 64% | 46% | 60% | 61% | 79% | 51% | 51% | 52% | 52% |
| 8947 | 0.25% | 9.00% | 1.00% | 1.00% | 1.00% | 52% | 68% | 54% | 70% | 51% | 66% | 47% | 61% | 62% | 81% | 52% | 52% | 53% | 53% |
| 8948 | 1.00% | 9.00% | 1.00% | 1.00% | 1.00% | 54% | 70% | 55% | 72% | 54% | 70% | 49% | 64% | 64% | 83% | 54% | 54% | 56% | 56% |
| 8949 | 0.25% | 0.25% | 9.00% | 1.00% | 1.00% | 51% | 66% | 51% | 66% | 55% | 72% | 44% | 57% | 66% | 86% | 52% | 52% | 55% | 55% |
| 8950 | 1.00% | 0.25% | 9.00% | 1.00% | 1.00% | 53% | 69% | 52% | 68% | 58% | 75% | 46% | 60% | 68% | 88% | 54% | 54% | 57% | 57% |

Fig. 31

| Formula # | Gamma Dodecalactone | Propyl Dihydrojasmonate | Methyl Dihydrojasmolate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8951 | 9.00% | 0.25% | 9.00% | 1.00% | 1.00% | 49% | 64% | 50% | 65% | 53% | 69% | 43% | 56% | 65% | 85% | 51% | 51% | 54% | 54% |
| 8952 | 0.25% | 1.00% | 9.00% | 1.00% | 1.00% | 54% | 70% | 54% | 70% | 59% | 77% | 47% | 61% | 69% | 90% | 56% | 56% | 58% | 58% |
| 8953 | 0.00% | 0.25% | 0.00% | 9.00% | 1.00% | 42% | 55% | 40% | 52% | 37% | 48% | 40% | 52% | 49% | 64% | 40% | 40% | 42% | 42% |
| 8954 | 0.00% | 0.00% | 0.25% | 9.00% | 1.00% | 43% | 56% | 39% | 51% | 40% | 52% | 42% | 55% | 52% | 68% | 41% | 41% | 45% | 45% |
| 8955 | 0.25% | 0.00% | 0.25% | 9.00% | 1.00% | 45% | 59% | 40% | 52% | 42% | 55% | 43% | 56% | 53% | 69% | 42% | 42% | 46% | 46% |
| 8956 | 0.00% | 0.25% | 0.25% | 9.00% | 1.00% | 47% | 61% | 44% | 57% | 44% | 57% | 47% | 61% | 56% | 73% | 45% | 45% | 49% | 49% |
| 8957 | 0.25% | 0.25% | 0.25% | 9.00% | 1.00% | 49% | 64% | 45% | 59% | 46% | 60% | 48% | 62% | 57% | 74% | 47% | 47% | 50% | 50% |
| 8958 | 1.00% | 0.25% | 0.25% | 9.00% | 1.00% | 51% | 66% | 46% | 60% | 49% | 64% | 50% | 65% | 59% | 77% | 49% | 49% | 53% | 53% |
| 8959 | 9.00% | 0.25% | 0.25% | 9.00% | 1.00% | 47% | 61% | 44% | 57% | 44% | 57% | 47% | 61% | 56% | 73% | 45% | 45% | 49% | 49% |
| 8960 | 0.00% | 1.00% | 0.25% | 9.00% | 1.00% | 50% | 65% | 47% | 61% | 48% | 62% | 50% | 65% | 59% | 77% | 48% | 48% | 52% | 52% |
| 8961 | 0.25% | 1.00% | 0.25% | 9.00% | 1.00% | 52% | 68% | 48% | 62% | 50% | 65% | 51% | 66% | 60% | 78% | 50% | 50% | 54% | 54% |
| 8962 | 1.00% | 1.00% | 0.25% | 9.00% | 1.00% | 54% | 70% | 49% | 64% | 53% | 69% | 53% | 69% | 62% | 81% | 52% | 52% | 56% | 56% |
| 8963 | 0.25% | 9.00% | 0.25% | 9.00% | 1.00% | 60% | 78% | 56% | 73% | 56% | 73% | 58% | 75% | 67% | 87% | 57% | 57% | 60% | 60% |
| 8964 | 0.25% | 0.00% | 1.00% | 9.00% | 1.00% | 50% | 65% | 47% | 61% | 47% | 61% | 45% | 59% | 58% | 75% | 48% | 48% | 50% | 50% |
| 8965 | 1.00% | 0.25% | 1.00% | 9.00% | 1.00% | 56% | 73% | 53% | 69% | 54% | 70% | 52% | 68% | 64% | 83% | 54% | 54% | 57% | 57% |
| 8966 | 9.00% | 0.25% | 1.00% | 9.00% | 1.00% | 52% | 68% | 51% | 66% | 49% | 64% | 49% | 64% | 61% | 79% | 51% | 51% | 53% | 53% |
| 8967 | 0.00% | 1.00% | 1.00% | 9.00% | 1.00% | 55% | 72% | 54% | 70% | 53% | 69% | 52% | 68% | 64% | 83% | 54% | 54% | 56% | 56% |
| 8968 | 0.25% | 1.00% | 1.00% | 9.00% | 1.00% | 57% | 74% | 55% | 72% | 55% | 72% | 53% | 69% | 65% | 85% | 56% | 56% | 58% | 58% |
| 8969 | 1.00% | 1.00% | 1.00% | 9.00% | 1.00% | 59% | 77% | 56% | 73% | 58% | 75% | 55% | 72% | 67% | 87% | 58% | 58% | 60% | 60% |
| 8970 | 0.25% | 0.25% | 9.00% | 9.00% | 1.00% | 64% | 83% | 60% | 78% | 65% | 85% | 57% | 74% | 76% | 99% | 63% | 63% | 66% | 66% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8971 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 8972 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 8973 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 8974 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 8975 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 8976 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 8977 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 8978 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 8979 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 8980 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 8981 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 8982 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 8983 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 8984 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 8985 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 8986 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 8987 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 8988 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 8989 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 8990 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 8991 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 8992 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 8993 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 8994 | 1.00% | 0.25% | 9.00% | 0.00% | 0.00% | 28% | 36% | 26% | 34% | 35% | 46% | 24% | 31% | 33% | 43% | 30% | 30% | 31% | 31% |
| 8995 | 0.25% | 1.00% | 9.00% | 0.00% | 0.00% | 29% | 38% | 28% | 36% | 36% | 47% | 25% | 33% | 34% | 44% | 31% | 31% | 32% | 32% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 8996 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 8997 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 8998 | 0.00% | 0.25% | 0.00% | 0.25% | 0.00% | 11% | 14% | 10% | 13% | 9% | 12% | 15% | 20% | 10% | 13% | 10% | 10% | 11% | 11% |
| 8999 | 0.25% | 0.25% | 0.00% | 0.25% | 0.00% | 13% | 17% | 11% | 14% | 11% | 14% | 16% | 21% | 11% | 14% | 12% | 12% | 13% | 13% |
| 9000 | 9.00% | 0.25% | 0.00% | 0.25% | 0.00% | 11% | 14% | 10% | 13% | 9% | 12% | 15% | 20% | 10% | 13% | 10% | 10% | 11% | 11% |
| 9001 | 1.00% | 1.00% | 0.00% | 0.25% | 0.00% | 18% | 23% | 15% | 20% | 18% | 23% | 21% | 27% | 16% | 21% | 17% | 17% | 18% | 18% |
| 9002 | 1.00% | 9.00% | 0.00% | 0.25% | 0.00% | 26% | 34% | 23% | 30% | 24% | 31% | 28% | 36% | 23% | 30% | 24% | 24% | 25% | 25% |
| 9003 | 0.00% | 0.00% | 0.25% | 0.25% | 0.00% | 12% | 16% | 9% | 12% | 12% | 16% | 17% | 22% | 13% | 17% | 11% | 11% | 14% | 14% |
| 9004 | 0.25% | 0.00% | 0.25% | 0.25% | 0.00% | 14% | 18% | 10% | 13% | 14% | 18% | 18% | 23% | 14% | 18% | 13% | 13% | 15% | 15% |
| 9005 | 0.00% | 0.25% | 0.25% | 0.25% | 0.00% | 16% | 21% | 14% | 18% | 16% | 21% | 22% | 29% | 17% | 22% | 15% | 15% | 18% | 18% |
| 9006 | 0.25% | 0.25% | 0.25% | 0.25% | 0.00% | 18% | 23% | 15% | 20% | 18% | 23% | 23% | 30% | 18% | 23% | 17% | 17% | 20% | 20% |
| 9007 | 1.00% | 0.25% | 0.25% | 0.25% | 0.00% | 20% | 26% | 16% | 21% | 21% | 27% | 25% | 33% | 20% | 26% | 19% | 19% | 22% | 22% |
| 9008 | 9.00% | 0.25% | 0.25% | 0.25% | 0.00% | 16% | 21% | 14% | 18% | 16% | 21% | 22% | 29% | 17% | 22% | 15% | 15% | 18% | 18% |
| 9009 | 0.25% | 1.00% | 0.25% | 0.25% | 0.00% | 21% | 27% | 18% | 23% | 22% | 29% | 26% | 34% | 21% | 27% | 20% | 20% | 23% | 23% |
| 9010 | 9.00% | 1.00% | 0.25% | 0.25% | 0.00% | 19% | 25% | 17% | 22% | 20% | 26% | 25% | 33% | 20% | 26% | 19% | 19% | 22% | 22% |
| 9011 | 0.25% | 9.00% | 0.25% | 0.25% | 0.00% | 29% | 38% | 26% | 34% | 28% | 36% | 33% | 43% | 28% | 36% | 28% | 28% | 30% | 30% |
| 9012 | 1.00% | 9.00% | 0.25% | 0.25% | 0.00% | 31% | 40% | 27% | 35% | 31% | 40% | 35% | 46% | 30% | 39% | 30% | 30% | 32% | 32% |
| 9013 | 9.00% | 9.00% | 0.25% | 0.25% | 0.00% | 27% | 35% | 25% | 33% | 26% | 34% | 32% | 42% | 27% | 35% | 26% | 26% | 28% | 28% |
| 9014 | 0.00% | 0.00% | 1.00% | 0.25% | 0.00% | 17% | 22% | 16% | 21% | 17% | 22% | 19% | 25% | 18% | 23% | 17% | 17% | 18% | 18% |
| 9015 | 1.00% | 0.00% | 1.00% | 0.25% | 0.00% | 21% | 27% | 18% | 23% | 22% | 29% | 22% | 29% | 21% | 27% | 20% | 20% | 22% | 22% |
| 9016 | 0.00% | 0.25% | 1.00% | 0.25% | 0.00% | 21% | 27% | 21% | 27% | 21% | 27% | 24% | 31% | 22% | 29% | 21% | 21% | 22% | 22% |
| 9017 | 0.25% | 0.25% | 1.00% | 0.25% | 0.00% | 23% | 30% | 22% | 29% | 23% | 30% | 25% | 33% | 23% | 30% | 23% | 23% | 24% | 24% |
| 9018 | 1.00% | 0.25% | 1.00% | 0.25% | 0.00% | 25% | 33% | 23% | 30% | 26% | 34% | 27% | 35% | 25% | 33% | 25% | 25% | 26% | 26% |
| 9019 | 9.00% | 0.25% | 1.00% | 0.25% | 0.00% | 21% | 27% | 21% | 27% | 21% | 27% | 24% | 31% | 22% | 29% | 21% | 21% | 22% | 22% |
| 9020 | 0.00% | 1.00% | 1.00% | 0.25% | 0.00% | 24% | 31% | 24% | 31% | 25% | 33% | 27% | 35% | 25% | 33% | 24% | 24% | 26% | 26% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9021 | 0.25% | 1.00% | 1.00% | 0.25% | 0.00% | 26% | 34% | 25% | 33% | 27% | 35% | 28% | 36% | 26% | 34% | 26% | 26% | 27% | 27% |
| 9022 | 1.00% | 1.00% | 1.00% | 0.25% | 0.00% | 28% | 36% | 26% | 34% | 30% | 39% | 30% | 39% | 28% | 36% | 28% | 28% | 29% | 29% |
| 9023 | 9.00% | 1.00% | 1.00% | 0.25% | 0.00% | 24% | 31% | 24% | 31% | 25% | 33% | 27% | 35% | 25% | 33% | 24% | 24% | 26% | 26% |
| 9024 | 0.00% | 9.00% | 1.00% | 0.25% | 0.00% | 32% | 42% | 32% | 42% | 31% | 40% | 34% | 44% | 32% | 42% | 32% | 32% | 32% | 32% |
| 9025 | 0.25% | 9.00% | 1.00% | 0.25% | 0.00% | 34% | 44% | 33% | 43% | 33% | 43% | 35% | 46% | 33% | 43% | 33% | 33% | 34% | 34% |
| 9026 | 1.00% | 9.00% | 1.00% | 0.25% | 0.00% | 36% | 47% | 34% | 44% | 36% | 47% | 37% | 48% | 35% | 46% | 35% | 35% | 36% | 36% |
| 9027 | 0.25% | 0.25% | 9.00% | 0.25% | 0.00% | 33% | 43% | 30% | 39% | 37% | 48% | 32% | 42% | 37% | 48% | 33% | 33% | 35% | 35% |
| 9028 | 1.00% | 0.25% | 9.00% | 0.25% | 0.00% | 35% | 46% | 31% | 40% | 40% | 52% | 34% | 44% | 39% | 51% | 35% | 35% | 38% | 38% |
| 9029 | 9.00% | 0.25% | 9.00% | 0.25% | 0.00% | 31% | 40% | 29% | 38% | 35% | 46% | 31% | 40% | 36% | 47% | 32% | 32% | 34% | 34% |
| 9030 | 0.00% | 1.00% | 9.00% | 0.25% | 0.00% | 34% | 44% | 32% | 42% | 39% | 51% | 34% | 44% | 39% | 51% | 35% | 35% | 37% | 37% |
| 9031 | 0.25% | 1.00% | 9.00% | 0.25% | 0.00% | 36% | 47% | 33% | 43% | 41% | 53% | 35% | 46% | 40% | 52% | 37% | 37% | 39% | 39% |
| 9032 | 9.00% | 1.00% | 9.00% | 0.25% | 0.00% | 34% | 44% | 32% | 42% | 39% | 51% | 34% | 44% | 39% | 51% | 35% | 35% | 37% | 37% |
| 9033 | 1.00% | 9.00% | 9.00% | 0.25% | 0.00% | 46% | 60% | 42% | 55% | 50% | 65% | 44% | 57% | 49% | 64% | 46% | 46% | 48% | 48% |
| 9034 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 9035 | 1.00% | 0.25% | 0.00% | 1.00% | 0.00% | 23% | 30% | 19% | 25% | 21% | 27% | 25% | 33% | 22% | 29% | 21% | 21% | 23% | 23% |
| 9036 | 0.00% | 1.00% | 0.00% | 1.00% | 0.00% | 22% | 29% | 20% | 26% | 20% | 26% | 25% | 33% | 22% | 29% | 21% | 21% | 22% | 22% |
| 9037 | 0.25% | 1.00% | 0.00% | 1.00% | 0.00% | 24% | 31% | 21% | 27% | 22% | 29% | 26% | 34% | 23% | 30% | 22% | 22% | 24% | 24% |
| 9038 | 1.00% | 1.00% | 0.00% | 1.00% | 0.00% | 26% | 34% | 22% | 29% | 25% | 33% | 28% | 36% | 25% | 33% | 24% | 24% | 26% | 26% |
| 9039 | 0.00% | 0.00% | 0.25% | 1.00% | 0.00% | 20% | 26% | 16% | 21% | 19% | 25% | 24% | 31% | 22% | 29% | 18% | 18% | 22% | 22% |
| 9040 | 1.00% | 0.00% | 0.25% | 1.00% | 0.00% | 24% | 31% | 18% | 23% | 24% | 31% | 27% | 35% | 25% | 33% | 22% | 22% | 25% | 25% |
| 9041 | 0.25% | 0.25% | 0.25% | 1.00% | 0.00% | 26% | 34% | 22% | 29% | 25% | 33% | 30% | 39% | 27% | 35% | 24% | 24% | 27% | 27% |
| 9042 | 1.00% | 0.25% | 0.25% | 1.00% | 0.00% | 28% | 36% | 23% | 30% | 28% | 36% | 32% | 42% | 29% | 38% | 26% | 26% | 30% | 30% |
| 9043 | 9.00% | 0.25% | 0.25% | 1.00% | 0.00% | 24% | 31% | 21% | 27% | 23% | 30% | 29% | 38% | 26% | 34% | 23% | 23% | 26% | 26% |
| 9044 | 0.00% | 1.00% | 0.25% | 1.00% | 0.00% | 27% | 35% | 24% | 31% | 27% | 35% | 32% | 42% | 29% | 38% | 26% | 26% | 29% | 29% |
| 9045 | 0.25% | 1.00% | 0.25% | 1.00% | 0.00% | 29% | 38% | 25% | 33% | 29% | 38% | 33% | 43% | 30% | 39% | 28% | 28% | 31% | 31% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9046 | 1.00% | 1.00% | 0.25% | 1.00% | 0.00% | 31% | 40% | 26% | 34% | 32% | 42% | 35% | 46% | 32% | 42% | 30% | 30% | 33% | 33% |
| 9047 | 9.00% | 1.00% | 0.25% | 1.00% | 0.00% | 27% | 35% | 24% | 31% | 27% | 35% | 32% | 42% | 29% | 38% | 26% | 26% | 29% | 29% |
| 9048 | 0.25% | 9.00% | 0.25% | 1.00% | 0.00% | 37% | 48% | 33% | 43% | 35% | 46% | 40% | 52% | 37% | 48% | 35% | 35% | 37% | 37% |
| 9049 | 1.00% | 9.00% | 0.25% | 1.00% | 0.00% | 39% | 51% | 34% | 44% | 38% | 49% | 42% | 55% | 39% | 51% | 37% | 37% | 40% | 40% |
| 9050 | 9.00% | 9.00% | 0.25% | 1.00% | 0.00% | 35% | 46% | 32% | 42% | 33% | 43% | 39% | 51% | 36% | 47% | 33% | 33% | 36% | 36% |
| 9051 | 0.00% | 0.00% | 1.00% | 1.00% | 0.00% | 25% | 33% | 23% | 30% | 24% | 31% | 26% | 34% | 27% | 35% | 24% | 24% | 26% | 26% |
| 9052 | 0.25% | 0.00% | 1.00% | 1.00% | 0.00% | 27% | 35% | 24% | 31% | 26% | 34% | 27% | 35% | 28% | 36% | 26% | 26% | 27% | 27% |
| 9053 | 1.00% | 0.00% | 1.00% | 1.00% | 0.00% | 29% | 38% | 25% | 33% | 29% | 38% | 29% | 38% | 30% | 39% | 28% | 28% | 29% | 29% |
| 9054 | 0.00% | 0.25% | 1.00% | 1.00% | 0.00% | 29% | 38% | 28% | 36% | 28% | 36% | 31% | 40% | 31% | 40% | 28% | 28% | 30% | 30% |
| 9055 | 1.00% | 0.25% | 1.00% | 1.00% | 0.00% | 33% | 43% | 30% | 39% | 33% | 43% | 34% | 44% | 34% | 44% | 32% | 32% | 34% | 34% |
| 9056 | 9.00% | 0.25% | 1.00% | 1.00% | 0.00% | 29% | 38% | 28% | 36% | 28% | 36% | 31% | 40% | 31% | 40% | 28% | 28% | 30% | 30% |
| 9057 | 0.00% | 1.00% | 1.00% | 1.00% | 0.00% | 32% | 42% | 31% | 40% | 32% | 42% | 34% | 44% | 34% | 44% | 32% | 32% | 33% | 33% |
| 9058 | 0.25% | 1.00% | 1.00% | 1.00% | 0.00% | 34% | 44% | 32% | 42% | 34% | 44% | 35% | 46% | 35% | 46% | 33% | 33% | 35% | 35% |
| 9059 | 1.00% | 1.00% | 1.00% | 1.00% | 0.00% | 36% | 47% | 33% | 43% | 37% | 48% | 37% | 48% | 37% | 48% | 35% | 35% | 37% | 37% |
| 9060 | 9.00% | 1.00% | 1.00% | 1.00% | 0.00% | 32% | 42% | 31% | 40% | 32% | 42% | 34% | 44% | 34% | 44% | 32% | 32% | 33% | 33% |
| 9061 | 0.00% | 9.00% | 1.00% | 1.00% | 0.00% | 40% | 52% | 39% | 51% | 38% | 49% | 41% | 53% | 41% | 53% | 39% | 39% | 40% | 40% |
| 9062 | 0.25% | 9.00% | 1.00% | 1.00% | 0.00% | 42% | 55% | 40% | 52% | 40% | 52% | 42% | 55% | 42% | 55% | 41% | 41% | 41% | 41% |
| 9063 | 1.00% | 9.00% | 1.00% | 1.00% | 0.00% | 44% | 57% | 41% | 53% | 43% | 56% | 44% | 57% | 44% | 57% | 43% | 43% | 44% | 44% |
| 9064 | 0.25% | 0.25% | 9.00% | 1.00% | 0.00% | 41% | 53% | 37% | 48% | 44% | 57% | 39% | 51% | 46% | 60% | 41% | 41% | 43% | 43% |
| 9065 | 1.00% | 0.25% | 9.00% | 1.00% | 0.00% | 43% | 56% | 38% | 49% | 47% | 61% | 41% | 53% | 48% | 62% | 43% | 43% | 45% | 45% |
| 9066 | 9.00% | 0.25% | 9.00% | 1.00% | 0.00% | 39% | 51% | 36% | 47% | 42% | 55% | 38% | 49% | 45% | 59% | 39% | 39% | 42% | 42% |
| 9067 | 0.25% | 1.00% | 9.00% | 1.00% | 0.00% | 44% | 57% | 40% | 52% | 48% | 62% | 42% | 55% | 49% | 64% | 44% | 44% | 46% | 46% |
| 9068 | 0.00% | 0.25% | 0.00% | 9.00% | 0.00% | 41% | 53% | 37% | 48% | 32% | 42% | 44% | 57% | 39% | 51% | 37% | 37% | 38% | 38% |
| 9069 | 0.00% | 0.00% | 0.25% | 9.00% | 0.00% | 42% | 55% | 36% | 47% | 35% | 46% | 46% | 60% | 42% | 55% | 38% | 38% | 41% | 41% |
| 9070 | 0.25% | 0.00% | 0.25% | 9.00% | 0.00% | 44% | 57% | 37% | 48% | 37% | 48% | 47% | 61% | 43% | 56% | 39% | 39% | 42% | 42% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9071 | 0.00% | 0.25% | 0.25% | 9.00% | 0.00% | 46% | 60% | 41% | 53% | 39% | 51% | 51% | 66% | 46% | 60% | 42% | 42% | 45% | 45% |
| 9072 | 0.25% | 0.25% | 0.25% | 9.00% | 0.00% | 48% | 62% | 42% | 55% | 41% | 53% | 52% | 68% | 47% | 61% | 44% | 44% | 47% | 47% |
| 9073 | 1.00% | 0.25% | 0.25% | 9.00% | 0.00% | 50% | 65% | 43% | 56% | 44% | 57% | 54% | 70% | 49% | 64% | 46% | 46% | 49% | 49% |
| 9074 | 9.00% | 0.25% | 0.25% | 9.00% | 0.00% | 46% | 60% | 41% | 53% | 39% | 51% | 51% | 66% | 46% | 60% | 42% | 42% | 45% | 45% |
| 9075 | 0.00% | 1.00% | 0.25% | 9.00% | 0.00% | 49% | 64% | 44% | 57% | 43% | 56% | 54% | 70% | 49% | 64% | 45% | 45% | 49% | 49% |
| 9076 | 0.25% | 1.00% | 0.25% | 9.00% | 0.00% | 51% | 66% | 45% | 59% | 45% | 59% | 55% | 72% | 50% | 65% | 47% | 47% | 50% | 50% |
| 9077 | 1.00% | 1.00% | 0.25% | 9.00% | 0.00% | 53% | 69% | 46% | 60% | 48% | 62% | 57% | 74% | 52% | 68% | 49% | 49% | 52% | 52% |
| 9078 | 0.25% | 9.00% | 0.25% | 9.00% | 0.00% | 59% | 77% | 53% | 69% | 51% | 66% | 62% | 81% | 57% | 74% | 54% | 54% | 57% | 57% |
| 9079 | 0.25% | 0.00% | 1.00% | 9.00% | 0.00% | 49% | 64% | 44% | 57% | 42% | 55% | 49% | 64% | 48% | 62% | 45% | 45% | 46% | 46% |
| 9080 | 1.00% | 0.25% | 1.00% | 9.00% | 0.00% | 55% | 72% | 50% | 65% | 49% | 64% | 56% | 73% | 54% | 70% | 51% | 51% | 53% | 53% |
| 9081 | 9.00% | 0.25% | 1.00% | 9.00% | 0.00% | 51% | 66% | 48% | 62% | 44% | 57% | 53% | 69% | 51% | 66% | 48% | 48% | 49% | 49% |
| 9082 | 0.00% | 1.00% | 1.00% | 9.00% | 0.00% | 54% | 70% | 51% | 66% | 48% | 62% | 56% | 73% | 54% | 70% | 51% | 51% | 53% | 53% |
| 9083 | 0.25% | 1.00% | 1.00% | 9.00% | 0.00% | 56% | 73% | 52% | 68% | 50% | 65% | 57% | 74% | 55% | 72% | 53% | 53% | 54% | 54% |
| 9084 | 1.00% | 1.00% | 1.00% | 9.00% | 0.00% | 58% | 75% | 53% | 69% | 53% | 69% | 59% | 77% | 57% | 74% | 55% | 55% | 56% | 56% |
| 9085 | 0.25% | 0.25% | 9.00% | 9.00% | 0.00% | 63% | 82% | 57% | 74% | 60% | 78% | 61% | 79% | 66% | 86% | 60% | 60% | 62% | 62% |
| 9086 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 9087 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 9088 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 9089 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 9090 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 9091 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 9092 | 0.00% | 0.25% | 0.25% | 0.00% | 0.25% | 15% | 20% | 16% | 21% | 17% | 22% | 17% | 22% | 18% | 23% | 16% | 16% | 17% | 17% |
| 9093 | 0.25% | 0.25% | 0.25% | 0.00% | 0.25% | 17% | 22% | 17% | 22% | 19% | 25% | 18% | 23% | 19% | 25% | 18% | 18% | 19% | 19% |
| 9094 | 0.00% | 1.00% | 0.25% | 0.00% | 0.25% | 18% | 23% | 19% | 25% | 21% | 27% | 20% | 26% | 21% | 27% | 19% | 19% | 21% | 21% |
| 9095 | 1.00% | 1.00% | 0.25% | 0.00% | 0.25% | 22% | 29% | 21% | 27% | 26% | 34% | 23% | 30% | 24% | 31% | 23% | 23% | 24% | 24% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9096 | 1.00% | 9.00% | 0.25% | 0.00% | 0.25% | 30% | 39% | 29% | 38% | 32% | 42% | 30% | 39% | 31% | 40% | 30% | 30% | 31% | 31% |
| 9097 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 9098 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 9099 | 0.00% | 0.25% | 1.00% | 0.00% | 0.25% | 20% | 26% | 23% | 30% | 22% | 29% | 19% | 25% | 23% | 30% | 22% | 22% | 21% | 21% |
| 9100 | 1.00% | 0.25% | 1.00% | 0.00% | 0.25% | 24% | 31% | 25% | 33% | 27% | 35% | 22% | 29% | 26% | 34% | 25% | 25% | 25% | 25% |
| 9101 | 0.00% | 1.00% | 1.00% | 0.00% | 0.25% | 23% | 30% | 26% | 34% | 26% | 34% | 22% | 29% | 26% | 34% | 25% | 25% | 25% | 25% |
| 9102 | 0.25% | 1.00% | 1.00% | 0.00% | 0.25% | 25% | 33% | 27% | 35% | 28% | 36% | 23% | 30% | 27% | 35% | 27% | 27% | 26% | 26% |
| 9103 | 1.00% | 1.00% | 1.00% | 0.00% | 0.25% | 27% | 35% | 28% | 36% | 31% | 40% | 25% | 33% | 29% | 38% | 29% | 29% | 28% | 28% |
| 9104 | 9.00% | 1.00% | 1.00% | 0.00% | 0.25% | 23% | 30% | 26% | 34% | 26% | 34% | 22% | 29% | 26% | 34% | 25% | 25% | 25% | 25% |
| 9105 | 1.00% | 9.00% | 1.00% | 0.00% | 0.25% | 35% | 46% | 36% | 47% | 37% | 48% | 32% | 42% | 36% | 47% | 36% | 36% | 35% | 35% |
| 9106 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 9107 | 0.00% | 0.25% | 9.00% | 0.00% | 0.25% | 30% | 39% | 31% | 40% | 36% | 47% | 26% | 34% | 37% | 48% | 32% | 32% | 33% | 33% |
| 9108 | 0.25% | 0.25% | 9.00% | 0.00% | 0.25% | 32% | 42% | 32% | 42% | 38% | 49% | 27% | 35% | 38% | 49% | 34% | 34% | 34% | 34% |
| 9109 | 1.00% | 0.25% | 9.00% | 0.00% | 0.25% | 34% | 44% | 33% | 43% | 41% | 53% | 29% | 38% | 40% | 52% | 36% | 36% | 37% | 37% |
| 9110 | 0.25% | 1.00% | 9.00% | 0.00% | 0.25% | 35% | 46% | 35% | 46% | 42% | 55% | 30% | 39% | 41% | 53% | 37% | 37% | 38% | 38% |
| 9111 | 0.25% | 0.00% | 0.00% | 0.25% | 0.25% | 15% | 20% | 13% | 17% | 13% | 17% | 16% | 21% | 14% | 18% | 14% | 14% | 14% | 14% |
| 9112 | 1.00% | 0.00% | 0.00% | 0.25% | 0.25% | 17% | 22% | 14% | 18% | 16% | 21% | 18% | 23% | 16% | 21% | 16% | 16% | 17% | 17% |
| 9113 | 0.00% | 0.25% | 0.00% | 0.25% | 0.25% | 17% | 22% | 17% | 22% | 15% | 20% | 20% | 26% | 17% | 22% | 16% | 16% | 17% | 17% |
| 9114 | 0.25% | 0.25% | 0.00% | 0.25% | 0.25% | 19% | 25% | 18% | 23% | 17% | 22% | 21% | 27% | 18% | 23% | 18% | 18% | 19% | 19% |
| 9115 | 9.00% | 0.25% | 0.00% | 0.25% | 0.25% | 17% | 22% | 17% | 22% | 15% | 20% | 20% | 26% | 17% | 22% | 16% | 16% | 17% | 17% |
| 9116 | 1.00% | 1.00% | 0.00% | 0.25% | 0.25% | 24% | 31% | 22% | 29% | 24% | 31% | 26% | 34% | 23% | 30% | 23% | 23% | 24% | 24% |
| 9117 | 1.00% | 9.00% | 0.00% | 0.25% | 0.25% | 32% | 42% | 30% | 39% | 30% | 39% | 33% | 43% | 30% | 39% | 31% | 31% | 31% | 31% |
| 9118 | 0.00% | 0.00% | 0.25% | 0.25% | 0.25% | 18% | 23% | 16% | 21% | 18% | 23% | 22% | 29% | 20% | 26% | 17% | 17% | 20% | 20% |
| 9119 | 0.25% | 0.00% | 0.25% | 0.25% | 0.25% | 20% | 26% | 17% | 22% | 20% | 26% | 23% | 30% | 21% | 27% | 19% | 19% | 21% | 21% |
| 9120 | 0.00% | 0.25% | 0.25% | 0.25% | 0.25% | 22% | 29% | 21% | 27% | 22% | 29% | 27% | 35% | 24% | 31% | 22% | 22% | 24% | 24% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9121 | 0.25% | 0.25% | 0.25% | 0.25% | 0.25% | 24% | 31% | 22% | 29% | 24% | 31% | 28% | 36% | 25% | 33% | 23% | 23% | 26% | 26% |
| 9122 | 1.00% | 0.25% | 0.25% | 0.25% | 0.25% | 26% | 34% | 23% | 30% | 27% | 35% | 30% | 39% | 27% | 35% | 25% | 25% | 28% | 28% |
| 9123 | 9.00% | 0.25% | 0.25% | 0.25% | 0.25% | 22% | 29% | 21% | 27% | 22% | 29% | 27% | 35% | 24% | 31% | 22% | 22% | 24% | 24% |
| 9124 | 0.25% | 1.00% | 0.25% | 0.25% | 0.25% | 27% | 35% | 25% | 33% | 28% | 36% | 31% | 40% | 28% | 36% | 27% | 27% | 29% | 29% |
| 9125 | 9.00% | 1.00% | 0.25% | 0.25% | 0.25% | 25% | 33% | 24% | 31% | 26% | 34% | 30% | 39% | 27% | 35% | 25% | 25% | 28% | 28% |
| 9126 | 0.25% | 9.00% | 0.25% | 0.25% | 0.25% | 35% | 46% | 33% | 43% | 34% | 44% | 38% | 49% | 35% | 46% | 34% | 34% | 36% | 36% |
| 9127 | 1.00% | 9.00% | 0.25% | 0.25% | 0.25% | 37% | 48% | 34% | 44% | 37% | 48% | 40% | 52% | 37% | 48% | 36% | 36% | 38% | 38% |
| 9128 | 9.00% | 9.00% | 0.25% | 0.25% | 0.25% | 33% | 43% | 32% | 42% | 32% | 42% | 37% | 48% | 34% | 44% | 32% | 32% | 34% | 34% |
| 9129 | 0.00% | 0.00% | 1.00% | 0.25% | 0.25% | 23% | 30% | 23% | 30% | 23% | 30% | 24% | 31% | 25% | 33% | 23% | 23% | 24% | 24% |
| 9130 | 1.00% | 0.00% | 1.00% | 0.25% | 0.25% | 27% | 35% | 25% | 33% | 28% | 36% | 27% | 35% | 28% | 36% | 27% | 27% | 28% | 28% |
| 9131 | 0.00% | 0.25% | 1.00% | 0.25% | 0.25% | 27% | 35% | 28% | 36% | 27% | 35% | 29% | 38% | 29% | 38% | 27% | 27% | 28% | 28% |
| 9132 | 0.25% | 0.25% | 1.00% | 0.25% | 0.25% | 29% | 38% | 29% | 38% | 29% | 38% | 30% | 39% | 30% | 39% | 29% | 29% | 30% | 30% |
| 9133 | 1.00% | 0.25% | 1.00% | 0.25% | 0.25% | 31% | 40% | 30% | 39% | 32% | 42% | 32% | 42% | 32% | 42% | 31% | 31% | 32% | 32% |
| 9134 | 9.00% | 0.25% | 1.00% | 0.25% | 0.25% | 27% | 35% | 28% | 36% | 27% | 35% | 29% | 38% | 29% | 38% | 27% | 27% | 28% | 28% |
| 9135 | 0.00% | 1.00% | 1.00% | 0.25% | 0.25% | 30% | 39% | 31% | 40% | 31% | 40% | 32% | 42% | 32% | 42% | 31% | 31% | 32% | 32% |
| 9136 | 0.25% | 1.00% | 1.00% | 0.25% | 0.25% | 32% | 42% | 32% | 42% | 33% | 43% | 33% | 43% | 33% | 43% | 32% | 32% | 33% | 33% |
| 9137 | 1.00% | 1.00% | 1.00% | 0.25% | 0.25% | 34% | 44% | 33% | 43% | 36% | 47% | 35% | 46% | 35% | 46% | 34% | 34% | 35% | 35% |
| 9138 | 9.00% | 1.00% | 1.00% | 0.25% | 0.25% | 30% | 39% | 31% | 40% | 31% | 40% | 32% | 42% | 32% | 42% | 31% | 31% | 32% | 32% |
| 9139 | 0.00% | 9.00% | 1.00% | 0.25% | 0.25% | 38% | 49% | 39% | 51% | 37% | 48% | 39% | 51% | 39% | 51% | 38% | 38% | 38% | 38% |
| 9140 | 0.25% | 9.00% | 1.00% | 0.25% | 0.25% | 40% | 52% | 40% | 52% | 39% | 51% | 40% | 52% | 40% | 52% | 40% | 40% | 40% | 40% |
| 9141 | 1.00% | 9.00% | 1.00% | 0.25% | 0.25% | 42% | 55% | 41% | 53% | 42% | 55% | 42% | 55% | 42% | 55% | 42% | 42% | 42% | 42% |
| 9142 | 0.25% | 0.25% | 9.00% | 0.25% | 0.25% | 39% | 51% | 37% | 48% | 43% | 56% | 37% | 48% | 44% | 57% | 40% | 40% | 41% | 41% |
| 9143 | 1.00% | 0.25% | 9.00% | 0.25% | 0.25% | 41% | 53% | 38% | 49% | 46% | 60% | 39% | 51% | 46% | 60% | 42% | 42% | 44% | 44% |
| 9144 | 9.00% | 0.25% | 9.00% | 0.25% | 0.25% | 37% | 48% | 36% | 47% | 41% | 53% | 36% | 47% | 43% | 56% | 38% | 38% | 40% | 40% |
| 9145 | 0.00% | 1.00% | 9.00% | 0.25% | 0.25% | 40% | 52% | 39% | 51% | 45% | 59% | 39% | 51% | 46% | 60% | 41% | 41% | 43% | 43% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9146 | 0.25% | 1.00% | 9.00% | 0.25% | 0.25% | 42% | 55% | 40% | 52% | 47% | 61% | 40% | 52% | 47% | 61% | 43% | 43% | 45% | 45% |
| 9147 | 9.00% | 1.00% | 9.00% | 0.25% | 0.25% | 40% | 52% | 39% | 51% | 45% | 59% | 39% | 51% | 46% | 60% | 41% | 41% | 43% | 43% |
| 9148 | 1.00% | 9.00% | 9.00% | 0.25% | 0.25% | 52% | 68% | 49% | 64% | 56% | 73% | 49% | 64% | 56% | 73% | 52% | 52% | 54% | 54% |
| 9149 | 0.25% | 0.00% | 0.00% | 1.00% | 0.25% | 23% | 30% | 20% | 26% | 20% | 26% | 23% | 30% | 23% | 30% | 21% | 21% | 22% | 22% |
| 9150 | 1.00% | 0.25% | 0.00% | 1.00% | 0.25% | 29% | 38% | 26% | 34% | 27% | 35% | 30% | 39% | 29% | 38% | 27% | 27% | 29% | 29% |
| 9151 | 0.00% | 1.00% | 0.00% | 1.00% | 0.25% | 28% | 36% | 27% | 35% | 26% | 34% | 30% | 39% | 29% | 38% | 27% | 27% | 28% | 28% |
| 9152 | 0.25% | 1.00% | 0.00% | 1.00% | 0.25% | 30% | 39% | 28% | 36% | 28% | 36% | 31% | 40% | 30% | 39% | 29% | 29% | 30% | 30% |
| 9153 | 1.00% | 1.00% | 0.00% | 1.00% | 0.25% | 32% | 42% | 29% | 38% | 31% | 40% | 33% | 43% | 32% | 42% | 31% | 31% | 32% | 32% |
| 9154 | 0.00% | 0.00% | 0.25% | 1.00% | 0.25% | 26% | 34% | 23% | 30% | 25% | 33% | 29% | 38% | 29% | 38% | 25% | 25% | 28% | 28% |
| 9155 | 1.00% | 0.00% | 0.25% | 1.00% | 0.25% | 30% | 39% | 25% | 33% | 30% | 39% | 32% | 42% | 32% | 42% | 28% | 28% | 31% | 31% |
| 9156 | 0.25% | 0.25% | 0.25% | 1.00% | 0.25% | 32% | 42% | 29% | 38% | 31% | 40% | 35% | 46% | 34% | 44% | 31% | 31% | 33% | 33% |
| 9157 | 1.00% | 0.25% | 0.25% | 1.00% | 0.25% | 34% | 44% | 30% | 39% | 34% | 44% | 37% | 48% | 36% | 47% | 33% | 33% | 36% | 36% |
| 9158 | 9.00% | 0.25% | 0.25% | 1.00% | 0.25% | 30% | 39% | 28% | 36% | 29% | 38% | 34% | 44% | 33% | 43% | 29% | 29% | 32% | 32% |
| 9159 | 0.00% | 1.00% | 0.25% | 1.00% | 0.25% | 33% | 43% | 31% | 40% | 33% | 43% | 37% | 48% | 36% | 47% | 32% | 32% | 35% | 35% |
| 9160 | 0.25% | 1.00% | 0.25% | 1.00% | 0.25% | 35% | 46% | 32% | 42% | 35% | 46% | 38% | 49% | 37% | 48% | 34% | 34% | 37% | 37% |
| 9161 | 1.00% | 1.00% | 0.25% | 1.00% | 0.25% | 37% | 48% | 33% | 43% | 38% | 49% | 40% | 52% | 39% | 51% | 36% | 36% | 39% | 39% |
| 9162 | 9.00% | 1.00% | 0.25% | 1.00% | 0.25% | 33% | 43% | 31% | 40% | 33% | 43% | 37% | 48% | 36% | 47% | 32% | 32% | 35% | 35% |
| 9163 | 0.25% | 9.00% | 0.25% | 1.00% | 0.25% | 43% | 56% | 40% | 52% | 41% | 53% | 45% | 59% | 44% | 57% | 41% | 41% | 43% | 43% |
| 9164 | 1.00% | 9.00% | 0.25% | 1.00% | 0.25% | 45% | 59% | 41% | 53% | 44% | 57% | 47% | 61% | 46% | 60% | 43% | 43% | 46% | 46% |
| 9165 | 9.00% | 9.00% | 0.25% | 1.00% | 0.25% | 41% | 53% | 39% | 51% | 39% | 51% | 44% | 57% | 43% | 56% | 40% | 40% | 42% | 42% |
| 9166 | 0.00% | 0.00% | 1.00% | 1.00% | 0.25% | 31% | 40% | 30% | 39% | 30% | 39% | 31% | 40% | 34% | 44% | 30% | 30% | 32% | 32% |
| 9167 | 0.25% | 0.00% | 1.00% | 1.00% | 0.25% | 33% | 43% | 31% | 40% | 32% | 42% | 32% | 42% | 35% | 46% | 32% | 32% | 33% | 33% |
| 9168 | 1.00% | 0.00% | 1.00% | 1.00% | 0.25% | 35% | 46% | 32% | 42% | 35% | 46% | 34% | 44% | 37% | 48% | 34% | 34% | 35% | 35% |
| 9169 | 0.00% | 0.25% | 1.00% | 1.00% | 0.25% | 35% | 46% | 35% | 46% | 34% | 44% | 36% | 47% | 38% | 49% | 35% | 35% | 36% | 36% |
| 9170 | 1.00% | 0.25% | 1.00% | 1.00% | 0.25% | 39% | 51% | 37% | 48% | 39% | 51% | 39% | 51% | 41% | 53% | 38% | 38% | 40% | 40% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9171 | 9.00% | 0.25% | 1.00% | 1.00% | 0.25% | 35% | 46% | 35% | 46% | 34% | 44% | 36% | 47% | 38% | 49% | 35% | 35% | 36% | 36% |
| 9172 | 0.00% | 1.00% | 1.00% | 1.00% | 0.25% | 38% | 49% | 38% | 49% | 38% | 49% | 39% | 51% | 41% | 53% | 38% | 38% | 39% | 39% |
| 9173 | 0.25% | 1.00% | 1.00% | 1.00% | 0.25% | 40% | 52% | 39% | 51% | 40% | 52% | 40% | 52% | 42% | 55% | 40% | 40% | 41% | 41% |
| 9174 | 1.00% | 1.00% | 1.00% | 1.00% | 0.25% | 42% | 55% | 40% | 52% | 43% | 56% | 42% | 55% | 44% | 57% | 42% | 42% | 43% | 43% |
| 9175 | 9.00% | 1.00% | 1.00% | 1.00% | 0.25% | 38% | 49% | 38% | 49% | 38% | 49% | 39% | 51% | 41% | 53% | 38% | 38% | 39% | 39% |
| 9176 | 0.00% | 9.00% | 1.00% | 1.00% | 0.25% | 46% | 60% | 46% | 60% | 44% | 57% | 46% | 60% | 48% | 62% | 45% | 45% | 46% | 46% |
| 9177 | 0.25% | 9.00% | 1.00% | 1.00% | 0.25% | 48% | 62% | 47% | 61% | 46% | 60% | 47% | 61% | 49% | 64% | 47% | 47% | 47% | 47% |
| 9178 | 1.00% | 9.00% | 1.00% | 1.00% | 0.25% | 50% | 65% | 48% | 62% | 49% | 64% | 49% | 64% | 51% | 66% | 49% | 49% | 50% | 50% |
| 9179 | 0.25% | 0.25% | 9.00% | 1.00% | 0.25% | 47% | 61% | 44% | 57% | 50% | 65% | 44% | 57% | 53% | 69% | 47% | 47% | 49% | 49% |
| 9180 | 1.00% | 0.25% | 9.00% | 1.00% | 0.25% | 49% | 64% | 45% | 59% | 53% | 69% | 46% | 60% | 55% | 72% | 49% | 49% | 51% | 51% |
| 9181 | 9.00% | 0.25% | 9.00% | 1.00% | 0.25% | 45% | 59% | 43% | 56% | 48% | 62% | 43% | 56% | 52% | 68% | 45% | 45% | 48% | 48% |
| 9182 | 0.25% | 1.00% | 9.00% | 1.00% | 0.25% | 50% | 65% | 47% | 61% | 54% | 70% | 47% | 61% | 56% | 73% | 50% | 50% | 52% | 52% |
| 9183 | 0.00% | 0.25% | 0.00% | 9.00% | 0.25% | 47% | 61% | 44% | 57% | 38% | 49% | 49% | 64% | 46% | 60% | 43% | 43% | 44% | 44% |
| 9184 | 0.00% | 0.00% | 0.25% | 9.00% | 0.25% | 48% | 62% | 43% | 56% | 41% | 53% | 51% | 66% | 49% | 64% | 44% | 44% | 47% | 47% |
| 9185 | 0.25% | 0.00% | 0.25% | 9.00% | 0.25% | 50% | 65% | 44% | 57% | 43% | 56% | 52% | 68% | 50% | 65% | 46% | 46% | 48% | 48% |
| 9186 | 0.00% | 0.25% | 0.25% | 9.00% | 0.25% | 52% | 68% | 48% | 62% | 45% | 59% | 56% | 73% | 53% | 69% | 48% | 48% | 51% | 51% |
| 9187 | 0.25% | 0.25% | 0.25% | 9.00% | 0.25% | 54% | 70% | 49% | 64% | 47% | 61% | 57% | 74% | 54% | 70% | 50% | 50% | 53% | 53% |
| 9188 | 1.00% | 0.25% | 0.25% | 9.00% | 0.25% | 56% | 73% | 50% | 65% | 50% | 65% | 59% | 77% | 56% | 73% | 52% | 52% | 55% | 55% |
| 9189 | 9.00% | 0.25% | 0.25% | 9.00% | 0.25% | 52% | 68% | 48% | 62% | 45% | 59% | 56% | 73% | 53% | 69% | 48% | 48% | 51% | 51% |
| 9190 | 0.00% | 1.00% | 0.25% | 9.00% | 0.25% | 55% | 72% | 51% | 66% | 49% | 64% | 59% | 77% | 56% | 73% | 52% | 52% | 55% | 55% |
| 9191 | 0.25% | 1.00% | 0.25% | 9.00% | 0.25% | 57% | 74% | 52% | 68% | 51% | 66% | 60% | 78% | 57% | 74% | 53% | 53% | 56% | 56% |
| 9192 | 1.00% | 1.00% | 0.25% | 9.00% | 0.25% | 59% | 77% | 53% | 69% | 54% | 70% | 62% | 81% | 59% | 77% | 55% | 55% | 58% | 58% |
| 9193 | 0.25% | 9.00% | 0.25% | 9.00% | 0.25% | 65% | 85% | 60% | 78% | 57% | 74% | 67% | 87% | 64% | 83% | 61% | 61% | 63% | 63% |
| 9194 | 0.25% | 0.00% | 1.00% | 9.00% | 0.25% | 55% | 72% | 51% | 66% | 48% | 62% | 54% | 70% | 55% | 72% | 51% | 51% | 52% | 52% |
| 9195 | 1.00% | 0.25% | 1.00% | 9.00% | 0.25% | 61% | 79% | 57% | 74% | 55% | 72% | 61% | 79% | 61% | 79% | 58% | 58% | 59% | 59% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9196 | 9.00% | 0.25% | 1.00% | 9.00% | 0.25% | 57% | 74% | 55% | 72% | 50% | 65% | 58% | 75% | 58% | 75% | 54% | 54% | 55% | 55% |
| 9197 | 0.00% | 1.00% | 1.00% | 9.00% | 0.25% | 60% | 78% | 58% | 75% | 54% | 70% | 61% | 79% | 61% | 79% | 57% | 57% | 59% | 59% |
| 9198 | 0.25% | 1.00% | 1.00% | 9.00% | 0.25% | 62% | 81% | 59% | 77% | 56% | 73% | 62% | 81% | 62% | 81% | 59% | 59% | 60% | 60% |
| 9199 | 1.00% | 1.00% | 1.00% | 9.00% | 0.25% | 64% | 83% | 60% | 78% | 59% | 77% | 64% | 83% | 64% | 83% | 61% | 61% | 62% | 62% |
| 9200 | 0.25% | 0.25% | 9.00% | 9.00% | 0.25% | 69% | 90% | 64% | 83% | 66% | 86% | 66% | 86% | 73% | 95% | 66% | 66% | 68% | 68% |
| 9201 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 9202 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 9203 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 9204 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 9205 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 9206 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 9207 | 0.00% | 0.25% | 0.25% | 0.00% | 1.00% | 20% | 26% | 22% | 29% | 22% | 29% | 22% | 29% | 29% | 38% | 21% | 21% | 24% | 24% |
| 9208 | 0.25% | 0.25% | 0.25% | 0.00% | 1.00% | 22% | 29% | 23% | 30% | 24% | 31% | 23% | 30% | 30% | 39% | 23% | 23% | 26% | 26% |
| 9209 | 0.00% | 1.00% | 0.25% | 0.00% | 1.00% | 23% | 30% | 25% | 33% | 26% | 34% | 25% | 33% | 32% | 42% | 25% | 25% | 28% | 28% |
| 9210 | 1.00% | 1.00% | 0.25% | 0.00% | 1.00% | 27% | 35% | 27% | 35% | 31% | 40% | 28% | 36% | 35% | 46% | 28% | 28% | 31% | 31% |
| 9211 | 1.00% | 9.00% | 0.25% | 0.00% | 1.00% | 35% | 46% | 35% | 46% | 37% | 48% | 35% | 46% | 42% | 55% | 36% | 36% | 38% | 38% |
| 9212 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 9213 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 9214 | 0.00% | 0.25% | 1.00% | 0.00% | 1.00% | 25% | 33% | 29% | 38% | 27% | 35% | 24% | 31% | 34% | 44% | 27% | 27% | 28% | 28% |
| 9215 | 1.00% | 0.25% | 1.00% | 0.00% | 1.00% | 29% | 38% | 31% | 40% | 32% | 42% | 27% | 35% | 37% | 48% | 31% | 31% | 32% | 32% |
| 9216 | 0.00% | 1.00% | 1.00% | 0.00% | 1.00% | 28% | 36% | 32% | 42% | 31% | 40% | 27% | 35% | 37% | 48% | 30% | 30% | 32% | 32% |
| 9217 | 0.25% | 1.00% | 1.00% | 0.00% | 1.00% | 30% | 39% | 33% | 43% | 33% | 43% | 28% | 36% | 38% | 49% | 32% | 32% | 33% | 33% |
| 9218 | 1.00% | 1.00% | 1.00% | 0.00% | 1.00% | 32% | 42% | 34% | 44% | 36% | 47% | 30% | 39% | 40% | 52% | 34% | 34% | 35% | 35% |
| 9219 | 9.00% | 1.00% | 1.00% | 0.00% | 1.00% | 28% | 36% | 32% | 42% | 31% | 40% | 27% | 35% | 37% | 48% | 30% | 30% | 32% | 32% |
| 9220 | 1.00% | 9.00% | 1.00% | 0.00% | 1.00% | 40% | 52% | 42% | 55% | 42% | 55% | 37% | 48% | 47% | 61% | 41% | 41% | 42% | 42% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9221 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 9222 | 0.00% | 0.25% | 9.00% | 0.00% | 1.00% | 35% | 46% | 37% | 48% | 41% | 53% | 31% | 40% | 48% | 62% | 38% | 38% | 40% | 40% |
| 9223 | 0.25% | 0.25% | 9.00% | 0.00% | 1.00% | 37% | 48% | 38% | 49% | 43% | 56% | 32% | 42% | 49% | 64% | 39% | 39% | 41% | 41% |
| 9224 | 1.00% | 0.25% | 9.00% | 0.00% | 1.00% | 39% | 51% | 39% | 51% | 46% | 60% | 34% | 44% | 51% | 66% | 41% | 41% | 44% | 44% |
| 9225 | 0.25% | 1.00% | 9.00% | 0.00% | 1.00% | 40% | 52% | 41% | 53% | 47% | 61% | 35% | 46% | 52% | 68% | 43% | 43% | 45% | 45% |
| 9226 | 0.25% | 0.00% | 0.00% | 0.25% | 1.00% | 20% | 26% | 19% | 25% | 18% | 23% | 21% | 27% | 25% | 33% | 19% | 19% | 21% | 21% |
| 9227 | 1.00% | 0.00% | 0.00% | 0.25% | 1.00% | 22% | 29% | 20% | 26% | 21% | 27% | 23% | 30% | 27% | 35% | 21% | 21% | 24% | 24% |
| 9228 | 0.00% | 0.25% | 0.00% | 0.25% | 1.00% | 22% | 29% | 23% | 30% | 20% | 26% | 25% | 33% | 28% | 36% | 22% | 22% | 24% | 24% |
| 9229 | 0.25% | 0.25% | 0.00% | 0.25% | 1.00% | 24% | 31% | 24% | 31% | 22% | 29% | 26% | 34% | 29% | 38% | 23% | 23% | 26% | 26% |
| 9230 | 9.00% | 0.25% | 0.00% | 0.25% | 1.00% | 22% | 29% | 23% | 30% | 20% | 26% | 25% | 33% | 28% | 36% | 22% | 22% | 24% | 24% |
| 9231 | 1.00% | 1.00% | 0.00% | 0.25% | 1.00% | 29% | 38% | 28% | 36% | 29% | 38% | 31% | 40% | 34% | 44% | 29% | 29% | 31% | 31% |
| 9232 | 1.00% | 9.00% | 0.00% | 0.25% | 1.00% | 37% | 48% | 36% | 47% | 35% | 46% | 38% | 49% | 41% | 53% | 36% | 36% | 38% | 38% |
| 9233 | 0.00% | 0.00% | 0.25% | 0.25% | 1.00% | 23% | 30% | 22% | 29% | 23% | 30% | 27% | 35% | 31% | 40% | 23% | 23% | 27% | 27% |
| 9234 | 0.25% | 0.00% | 0.25% | 0.25% | 1.00% | 25% | 33% | 23% | 30% | 25% | 33% | 28% | 36% | 32% | 42% | 24% | 24% | 28% | 28% |
| 9235 | 0.00% | 0.25% | 0.25% | 0.25% | 1.00% | 27% | 35% | 27% | 35% | 27% | 35% | 32% | 42% | 35% | 46% | 27% | 27% | 31% | 31% |
| 9236 | 0.25% | 0.25% | 0.25% | 0.25% | 1.00% | 29% | 38% | 28% | 36% | 29% | 38% | 33% | 43% | 36% | 47% | 29% | 29% | 33% | 33% |
| 9237 | 1.00% | 0.25% | 0.25% | 0.25% | 1.00% | 31% | 40% | 29% | 38% | 32% | 42% | 35% | 46% | 38% | 49% | 31% | 31% | 35% | 35% |
| 9238 | 9.00% | 0.25% | 0.25% | 0.25% | 1.00% | 27% | 35% | 27% | 35% | 27% | 35% | 32% | 42% | 35% | 46% | 27% | 27% | 31% | 31% |
| 9239 | 0.25% | 1.00% | 0.25% | 0.25% | 1.00% | 32% | 42% | 31% | 40% | 33% | 43% | 36% | 47% | 39% | 51% | 32% | 32% | 36% | 36% |
| 9240 | 9.00% | 1.00% | 0.25% | 0.25% | 1.00% | 30% | 39% | 30% | 39% | 31% | 40% | 35% | 46% | 38% | 49% | 30% | 30% | 35% | 35% |
| 9241 | 0.25% | 9.00% | 0.25% | 0.25% | 1.00% | 40% | 52% | 39% | 51% | 39% | 51% | 43% | 56% | 46% | 60% | 39% | 39% | 43% | 43% |
| 9242 | 1.00% | 9.00% | 0.25% | 0.25% | 1.00% | 42% | 55% | 40% | 52% | 42% | 55% | 45% | 59% | 48% | 62% | 41% | 41% | 45% | 45% |
| 9243 | 9.00% | 9.00% | 0.25% | 0.25% | 1.00% | 38% | 49% | 38% | 49% | 37% | 48% | 42% | 55% | 45% | 59% | 38% | 38% | 41% | 41% |
| 9244 | 0.00% | 0.00% | 1.00% | 0.25% | 1.00% | 28% | 36% | 29% | 38% | 28% | 36% | 29% | 38% | 36% | 47% | 28% | 28% | 31% | 31% |
| 9245 | 1.00% | 0.00% | 1.00% | 0.25% | 1.00% | 32% | 42% | 31% | 40% | 33% | 43% | 32% | 42% | 39% | 51% | 32% | 32% | 35% | 35% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9246 | 0.00% | 0.25% | 1.00% | 0.25% | 1.00% | 32% | 42% | 34% | 44% | 32% | 42% | 34% | 44% | 40% | 52% | 33% | 33% | 35% | 35% |
| 9247 | 0.25% | 0.25% | 1.00% | 0.25% | 1.00% | 34% | 44% | 35% | 46% | 34% | 44% | 35% | 46% | 41% | 53% | 34% | 34% | 37% | 37% |
| 9248 | 1.00% | 0.25% | 1.00% | 0.25% | 1.00% | 36% | 47% | 36% | 47% | 37% | 48% | 37% | 48% | 43% | 56% | 36% | 36% | 39% | 39% |
| 9249 | 9.00% | 0.25% | 1.00% | 0.25% | 1.00% | 32% | 42% | 34% | 44% | 32% | 42% | 34% | 44% | 40% | 52% | 33% | 33% | 35% | 35% |
| 9250 | 0.00% | 1.00% | 1.00% | 0.25% | 1.00% | 35% | 46% | 37% | 48% | 36% | 47% | 37% | 48% | 43% | 56% | 36% | 36% | 39% | 39% |
| 9251 | 0.25% | 1.00% | 1.00% | 0.25% | 1.00% | 37% | 48% | 38% | 49% | 38% | 49% | 38% | 49% | 44% | 57% | 38% | 38% | 40% | 40% |
| 9252 | 1.00% | 1.00% | 1.00% | 0.25% | 1.00% | 39% | 51% | 39% | 51% | 41% | 53% | 40% | 52% | 46% | 60% | 40% | 40% | 42% | 42% |
| 9253 | 9.00% | 1.00% | 1.00% | 0.25% | 1.00% | 35% | 46% | 37% | 48% | 36% | 47% | 37% | 48% | 43% | 56% | 36% | 36% | 39% | 39% |
| 9254 | 0.00% | 9.00% | 1.00% | 0.25% | 1.00% | 43% | 56% | 45% | 59% | 42% | 55% | 44% | 57% | 50% | 65% | 43% | 43% | 45% | 45% |
| 9255 | 0.25% | 9.00% | 1.00% | 0.25% | 1.00% | 45% | 59% | 46% | 60% | 44% | 57% | 45% | 59% | 51% | 66% | 45% | 45% | 47% | 47% |
| 9256 | 1.00% | 9.00% | 1.00% | 0.25% | 1.00% | 47% | 61% | 47% | 61% | 47% | 61% | 47% | 61% | 53% | 69% | 47% | 47% | 49% | 49% |
| 9257 | 0.25% | 0.25% | 9.00% | 0.25% | 1.00% | 44% | 57% | 43% | 56% | 48% | 62% | 42% | 55% | 55% | 72% | 45% | 45% | 48% | 48% |
| 9258 | 1.00% | 0.25% | 9.00% | 0.25% | 1.00% | 46% | 60% | 44% | 57% | 51% | 66% | 44% | 57% | 57% | 74% | 47% | 47% | 51% | 51% |
| 9259 | 9.00% | 0.25% | 9.00% | 0.25% | 1.00% | 42% | 55% | 42% | 55% | 46% | 60% | 41% | 53% | 54% | 70% | 43% | 43% | 47% | 47% |
| 9260 | 0.00% | 1.00% | 9.00% | 0.25% | 1.00% | 45% | 59% | 45% | 59% | 50% | 65% | 44% | 57% | 57% | 74% | 47% | 47% | 50% | 50% |
| 9261 | 0.25% | 1.00% | 9.00% | 0.25% | 1.00% | 47% | 61% | 46% | 60% | 52% | 68% | 45% | 59% | 58% | 75% | 48% | 48% | 52% | 52% |
| 9262 | 9.00% | 1.00% | 9.00% | 0.25% | 1.00% | 45% | 59% | 45% | 59% | 50% | 65% | 44% | 57% | 57% | 74% | 47% | 47% | 50% | 50% |
| 9263 | 1.00% | 9.00% | 9.00% | 0.25% | 1.00% | 57% | 74% | 55% | 72% | 61% | 79% | 54% | 70% | 67% | 87% | 58% | 58% | 61% | 61% |
| 9264 | 0.25% | 0.00% | 0.00% | 1.00% | 1.00% | 28% | 36% | 26% | 34% | 25% | 33% | 28% | 36% | 34% | 44% | 26% | 26% | 29% | 29% |
| 9265 | 1.00% | 0.25% | 0.00% | 1.00% | 1.00% | 34% | 44% | 32% | 42% | 32% | 42% | 35% | 46% | 40% | 52% | 33% | 33% | 36% | 36% |
| 9266 | 0.00% | 1.00% | 0.00% | 1.00% | 1.00% | 33% | 43% | 33% | 43% | 31% | 40% | 35% | 46% | 40% | 52% | 32% | 32% | 35% | 35% |
| 9267 | 0.25% | 1.00% | 0.00% | 1.00% | 1.00% | 35% | 46% | 34% | 44% | 33% | 43% | 36% | 47% | 41% | 53% | 34% | 34% | 37% | 37% |
| 9268 | 1.00% | 1.00% | 0.00% | 1.00% | 1.00% | 37% | 48% | 35% | 46% | 36% | 47% | 38% | 49% | 43% | 56% | 36% | 36% | 39% | 39% |
| 9269 | 0.00% | 0.00% | 0.25% | 1.00% | 1.00% | 31% | 40% | 29% | 38% | 30% | 39% | 34% | 44% | 40% | 52% | 30% | 30% | 35% | 35% |
| 9270 | 1.00% | 0.00% | 0.25% | 1.00% | 1.00% | 35% | 46% | 31% | 40% | 35% | 46% | 37% | 48% | 43% | 56% | 34% | 34% | 38% | 38% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9271 | 0.25% | 0.25% | 0.25% | 1.00% | 1.00% | 37% | 48% | 35% | 46% | 36% | 47% | 40% | 52% | 45% | 59% | 36% | 36% | 40% | 40% |
| 9272 | 1.00% | 0.25% | 0.25% | 1.00% | 1.00% | 39% | 51% | 36% | 47% | 39% | 51% | 42% | 55% | 47% | 61% | 38% | 38% | 43% | 43% |
| 9273 | 9.00% | 0.25% | 0.25% | 1.00% | 1.00% | 35% | 46% | 34% | 44% | 34% | 44% | 39% | 51% | 44% | 57% | 34% | 34% | 39% | 39% |
| 9274 | 0.00% | 1.00% | 0.25% | 1.00% | 1.00% | 38% | 49% | 37% | 48% | 38% | 49% | 42% | 55% | 47% | 61% | 38% | 38% | 42% | 42% |
| 9275 | 0.25% | 1.00% | 0.25% | 1.00% | 1.00% | 40% | 52% | 38% | 49% | 40% | 52% | 43% | 56% | 48% | 62% | 39% | 39% | 44% | 44% |
| 9276 | 1.00% | 1.00% | 0.25% | 1.00% | 1.00% | 42% | 55% | 39% | 51% | 43% | 56% | 45% | 59% | 50% | 65% | 41% | 41% | 46% | 46% |
| 9277 | 9.00% | 1.00% | 0.25% | 1.00% | 1.00% | 38% | 49% | 37% | 48% | 38% | 49% | 42% | 55% | 47% | 61% | 38% | 38% | 42% | 42% |
| 9278 | 0.25% | 9.00% | 0.25% | 1.00% | 1.00% | 48% | 62% | 46% | 60% | 46% | 60% | 50% | 65% | 55% | 72% | 47% | 47% | 50% | 50% |
| 9279 | 1.00% | 9.00% | 0.25% | 1.00% | 1.00% | 50% | 65% | 47% | 61% | 49% | 64% | 52% | 68% | 57% | 74% | 49% | 49% | 53% | 53% |
| 9280 | 9.00% | 9.00% | 0.25% | 1.00% | 1.00% | 46% | 60% | 45% | 59% | 44% | 57% | 49% | 64% | 54% | 70% | 45% | 45% | 49% | 49% |
| 9281 | 0.00% | 0.00% | 1.00% | 1.00% | 1.00% | 36% | 47% | 36% | 47% | 35% | 46% | 36% | 47% | 45% | 59% | 36% | 36% | 39% | 39% |
| 9282 | 0.25% | 0.00% | 1.00% | 1.00% | 1.00% | 38% | 49% | 37% | 48% | 37% | 48% | 37% | 48% | 46% | 60% | 37% | 37% | 40% | 40% |
| 9283 | 1.00% | 0.00% | 1.00% | 1.00% | 1.00% | 40% | 52% | 38% | 49% | 40% | 52% | 39% | 51% | 48% | 62% | 39% | 39% | 42% | 42% |
| 9284 | 0.00% | 0.25% | 1.00% | 1.00% | 1.00% | 40% | 52% | 41% | 53% | 39% | 51% | 41% | 53% | 49% | 64% | 40% | 40% | 43% | 43% |
| 9285 | 1.00% | 0.25% | 1.00% | 1.00% | 1.00% | 44% | 57% | 43% | 56% | 44% | 57% | 44% | 57% | 52% | 68% | 44% | 44% | 47% | 47% |
| 9286 | 9.00% | 0.25% | 1.00% | 1.00% | 1.00% | 40% | 52% | 41% | 53% | 39% | 51% | 41% | 53% | 49% | 64% | 40% | 40% | 43% | 43% |
| 9287 | 0.00% | 1.00% | 1.00% | 1.00% | 1.00% | 43% | 56% | 44% | 57% | 43% | 56% | 44% | 57% | 52% | 68% | 43% | 43% | 46% | 46% |
| 9288 | 0.25% | 1.00% | 1.00% | 1.00% | 1.00% | 45% | 59% | 45% | 59% | 45% | 59% | 45% | 59% | 53% | 69% | 45% | 45% | 48% | 48% |
| 9289 | 1.00% | 1.00% | 1.00% | 1.00% | 1.00% | 47% | 61% | 46% | 60% | 48% | 62% | 47% | 61% | 55% | 72% | 47% | 47% | 50% | 50% |
| 9290 | 9.00% | 1.00% | 1.00% | 1.00% | 1.00% | 43% | 56% | 44% | 57% | 43% | 56% | 44% | 57% | 52% | 68% | 43% | 43% | 46% | 46% |
| 9291 | 0.00% | 9.00% | 1.00% | 1.00% | 1.00% | 51% | 66% | 52% | 68% | 49% | 64% | 51% | 66% | 59% | 77% | 51% | 51% | 53% | 53% |
| 9292 | 0.25% | 9.00% | 1.00% | 1.00% | 1.00% | 53% | 69% | 53% | 69% | 51% | 66% | 52% | 68% | 60% | 78% | 52% | 52% | 54% | 54% |
| 9293 | 1.00% | 9.00% | 1.00% | 1.00% | 1.00% | 55% | 72% | 54% | 70% | 54% | 70% | 54% | 70% | 62% | 81% | 54% | 54% | 57% | 57% |
| 9294 | 0.25% | 0.25% | 9.00% | 1.00% | 1.00% | 52% | 68% | 50% | 65% | 55% | 72% | 49% | 64% | 64% | 83% | 52% | 52% | 56% | 56% |
| 9295 | 1.00% | 0.25% | 9.00% | 1.00% | 1.00% | 54% | 70% | 51% | 66% | 58% | 75% | 51% | 66% | 66% | 86% | 54% | 54% | 58% | 58% |

Fig. 32

| Formula # | Gamma Dodecalactone | Propyl Dihydrojasmonate | Methyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9296 | 9.00% | 0.25% | 9.00% | 1.00% | 1.00% | 50% | 65% | 49% | 64% | 53% | 69% | 48% | 62% | 63% | 82% | 51% | 51% | 55% | 55% |
| 9297 | 0.25% | 1.00% | 9.00% | 1.00% | 1.00% | 55% | 72% | 53% | 69% | 59% | 77% | 52% | 68% | 67% | 87% | 56% | 56% | 59% | 59% |
| 9298 | 0.00% | 0.25% | 0.00% | 9.00% | 1.00% | 52% | 68% | 50% | 65% | 43% | 56% | 54% | 70% | 57% | 74% | 48% | 48% | 51% | 51% |
| 9299 | 0.00% | 0.00% | 0.25% | 9.00% | 1.00% | 53% | 69% | 49% | 64% | 46% | 60% | 56% | 73% | 60% | 78% | 49% | 49% | 54% | 54% |
| 9300 | 0.25% | 0.00% | 0.25% | 9.00% | 1.00% | 55% | 72% | 50% | 65% | 48% | 62% | 57% | 74% | 61% | 79% | 51% | 51% | 55% | 55% |
| 9301 | 0.00% | 0.25% | 0.25% | 9.00% | 1.00% | 57% | 74% | 54% | 70% | 50% | 65% | 61% | 79% | 64% | 83% | 54% | 54% | 58% | 58% |
| 9302 | 0.25% | 0.25% | 0.25% | 9.00% | 1.00% | 59% | 77% | 55% | 72% | 52% | 68% | 62% | 81% | 65% | 85% | 55% | 55% | 60% | 60% |
| 9303 | 1.00% | 0.25% | 0.25% | 9.00% | 1.00% | 61% | 79% | 56% | 73% | 55% | 72% | 64% | 83% | 67% | 87% | 57% | 57% | 62% | 62% |
| 9304 | 9.00% | 0.25% | 0.25% | 9.00% | 1.00% | 57% | 74% | 54% | 70% | 50% | 65% | 61% | 79% | 64% | 83% | 54% | 54% | 58% | 58% |
| 9305 | 0.00% | 1.00% | 0.25% | 9.00% | 1.00% | 60% | 78% | 57% | 74% | 54% | 70% | 64% | 83% | 67% | 87% | 57% | 57% | 62% | 62% |
| 9306 | 0.25% | 1.00% | 0.25% | 9.00% | 1.00% | 62% | 81% | 58% | 75% | 56% | 73% | 65% | 85% | 68% | 88% | 59% | 59% | 63% | 63% |
| 9307 | 1.00% | 1.00% | 0.25% | 9.00% | 1.00% | 64% | 83% | 59% | 77% | 59% | 77% | 67% | 87% | 70% | 91% | 61% | 61% | 65% | 65% |
| 9308 | 0.25% | 9.00% | 0.25% | 9.00% | 1.00% | 70% | 91% | 66% | 86% | 62% | 81% | 72% | 94% | 75% | 98% | 66% | 66% | 70% | 70% |
| 9309 | 0.25% | 0.00% | 1.00% | 9.00% | 1.00% | 60% | 78% | 57% | 74% | 53% | 69% | 59% | 77% | 66% | 86% | 57% | 57% | 59% | 59% |
| 9310 | 1.00% | 0.25% | 1.00% | 9.00% | 1.00% | 66% | 86% | 63% | 82% | 60% | 78% | 66% | 86% | 72% | 94% | 63% | 63% | 66% | 66% |
| 9311 | 9.00% | 0.25% | 1.00% | 9.00% | 1.00% | 62% | 81% | 61% | 79% | 55% | 72% | 63% | 82% | 69% | 90% | 59% | 59% | 62% | 62% |
| 9312 | 0.00% | 1.00% | 1.00% | 9.00% | 1.00% | 65% | 85% | 64% | 83% | 59% | 77% | 66% | 86% | 72% | 94% | 63% | 63% | 66% | 66% |
| 9313 | 0.25% | 1.00% | 1.00% | 9.00% | 1.00% | 67% | 87% | 65% | 85% | 61% | 79% | 67% | 87% | 73% | 95% | 64% | 64% | 67% | 67% |
| 9314 | 1.00% | 1.00% | 1.00% | 9.00% | 1.00% | 69% | 90% | 66% | 86% | 64% | 83% | 69% | 90% | 75% | 98% | 66% | 66% | 69% | 69% |
| 9315 | 0.25% | 0.25% | 9.00% | 9.00% | 1.00% | 74% | 100% | 70% | 100% | 71% | 100% | 71% | 100% | 84% | 100% | 72% | 72% | 75% | 75% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9316 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 9317 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 9318 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 9319 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 9320 | 0.25% | 0.00% | 0.25% | 0.00% | 0.00% | 7% | 9% | 5% | 7% | 9% | 12% | 8% | 10% | 8% | 10% | 7% | 7% | 8% | 8% |
| 9321 | 1.00% | 0.00% | 0.25% | 0.00% | 0.00% | 9% | 12% | 6% | 8% | 12% | 16% | 10% | 13% | 10% | 13% | 9% | 9% | 11% | 11% |
| 9322 | 0.00% | 0.25% | 0.25% | 0.00% | 0.00% | 9% | 12% | 9% | 12% | 11% | 14% | 12% | 16% | 11% | 14% | 10% | 10% | 11% | 11% |
| 9323 | 0.25% | 0.25% | 0.25% | 0.00% | 0.00% | 11% | 14% | 10% | 13% | 13% | 17% | 13% | 17% | 12% | 16% | 11% | 11% | 13% | 13% |
| 9324 | 0.00% | 1.00% | 0.25% | 0.00% | 0.00% | 12% | 16% | 12% | 16% | 15% | 20% | 15% | 20% | 14% | 18% | 13% | 13% | 15% | 15% |
| 9325 | 1.00% | 1.00% | 0.25% | 0.00% | 0.00% | 16% | 21% | 14% | 18% | 20% | 26% | 18% | 23% | 17% | 22% | 17% | 17% | 18% | 18% |
| 9326 | 1.00% | 9.00% | 0.25% | 0.00% | 0.00% | 24% | 31% | 22% | 29% | 26% | 34% | 25% | 33% | 24% | 31% | 24% | 24% | 25% | 25% |
| 9327 | 0.25% | 0.00% | 1.00% | 0.00% | 0.00% | 12% | 16% | 12% | 16% | 14% | 18% | 10% | 13% | 13% | 17% | 13% | 13% | 12% | 12% |
| 9328 | 1.00% | 0.00% | 1.00% | 0.00% | 0.00% | 14% | 18% | 13% | 17% | 17% | 22% | 12% | 16% | 15% | 20% | 15% | 15% | 15% | 15% |
| 9329 | 0.00% | 0.25% | 1.00% | 0.00% | 0.00% | 14% | 18% | 16% | 21% | 16% | 21% | 14% | 18% | 16% | 21% | 15% | 15% | 15% | 15% |
| 9330 | 1.00% | 0.25% | 1.00% | 0.00% | 0.00% | 18% | 23% | 18% | 23% | 21% | 27% | 17% | 22% | 19% | 25% | 19% | 19% | 19% | 19% |
| 9331 | 0.00% | 1.00% | 1.00% | 0.00% | 0.00% | 17% | 22% | 19% | 25% | 20% | 26% | 17% | 22% | 19% | 25% | 19% | 19% | 19% | 19% |
| 9332 | 0.25% | 1.00% | 1.00% | 0.00% | 0.00% | 19% | 25% | 20% | 26% | 22% | 29% | 18% | 23% | 20% | 26% | 20% | 20% | 20% | 20% |
| 9333 | 1.00% | 1.00% | 1.00% | 0.00% | 0.00% | 21% | 27% | 21% | 27% | 25% | 33% | 20% | 26% | 22% | 29% | 22% | 22% | 22% | 22% |
| 9334 | 9.00% | 1.00% | 1.00% | 0.00% | 0.00% | 17% | 22% | 19% | 25% | 20% | 26% | 17% | 22% | 19% | 25% | 19% | 19% | 19% | 19% |
| 9335 | 1.00% | 9.00% | 1.00% | 0.00% | 0.00% | 29% | 38% | 29% | 38% | 31% | 40% | 27% | 35% | 29% | 38% | 30% | 30% | 29% | 29% |
| 9336 | 0.25% | 0.00% | 9.00% | 0.00% | 0.00% | 22% | 29% | 20% | 26% | 28% | 36% | 17% | 22% | 27% | 35% | 23% | 23% | 24% | 24% |
| 9337 | 0.00% | 0.25% | 9.00% | 0.00% | 0.00% | 24% | 31% | 24% | 31% | 30% | 39% | 21% | 27% | 30% | 39% | 26% | 26% | 27% | 27% |
| 9338 | 0.25% | 0.25% | 9.00% | 0.00% | 0.00% | 26% | 34% | 25% | 33% | 32% | 42% | 22% | 29% | 31% | 40% | 28% | 28% | 28% | 28% |
| 9339 | 1.00% | 0.25% | 9.00% | 0.00% | 0.00% | 28% | 36% | 26% | 34% | 35% | 46% | 24% | 31% | 33% | 43% | 30% | 30% | 31% | 31% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9340 | 0.25% | 1.00% | 9.00% | 0.00% | 0.00% | 29% | 38% | 28% | 36% | 36% | 47% | 25% | 33% | 34% | 44% | 31% | 31% | 32% | 32% |
| 9341 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 9342 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 9343 | 0.00% | 0.25% | 0.00% | 0.25% | 0.00% | 12% | 16% | 13% | 17% | 13% | 17% | 12% | 16% | 11% | 14% | 13% | 13% | 12% | 12% |
| 9344 | 0.25% | 0.25% | 0.00% | 0.25% | 0.00% | 14% | 18% | 14% | 18% | 15% | 20% | 13% | 17% | 12% | 16% | 14% | 14% | 13% | 13% |
| 9345 | 9.00% | 0.25% | 0.00% | 0.25% | 0.00% | 12% | 16% | 13% | 17% | 13% | 17% | 12% | 16% | 11% | 14% | 13% | 13% | 12% | 12% |
| 9346 | 1.00% | 1.00% | 0.00% | 0.25% | 0.00% | 19% | 25% | 18% | 23% | 22% | 29% | 18% | 23% | 17% | 22% | 20% | 20% | 19% | 19% |
| 9347 | 1.00% | 9.00% | 0.00% | 0.25% | 0.00% | 27% | 35% | 26% | 34% | 28% | 36% | 25% | 33% | 24% | 31% | 27% | 27% | 26% | 26% |
| 9348 | 0.00% | 0.00% | 0.25% | 0.25% | 0.00% | 13% | 17% | 12% | 16% | 16% | 21% | 14% | 18% | 14% | 18% | 14% | 14% | 15% | 15% |
| 9349 | 0.25% | 0.00% | 0.25% | 0.25% | 0.00% | 15% | 20% | 13% | 17% | 18% | 23% | 15% | 20% | 15% | 20% | 15% | 15% | 16% | 16% |
| 9350 | 0.00% | 0.25% | 0.25% | 0.25% | 0.00% | 17% | 22% | 17% | 22% | 20% | 26% | 19% | 25% | 18% | 23% | 18% | 18% | 19% | 19% |
| 9351 | 0.25% | 0.25% | 0.25% | 0.25% | 0.00% | 19% | 25% | 18% | 23% | 22% | 29% | 20% | 26% | 19% | 25% | 20% | 20% | 20% | 20% |
| 9352 | 1.00% | 0.25% | 0.25% | 0.25% | 0.00% | 21% | 27% | 19% | 25% | 25% | 33% | 22% | 29% | 21% | 27% | 22% | 22% | 23% | 23% |
| 9353 | 9.00% | 0.25% | 0.25% | 0.25% | 0.00% | 17% | 22% | 17% | 22% | 20% | 26% | 19% | 25% | 18% | 23% | 18% | 18% | 19% | 19% |
| 9354 | 0.25% | 1.00% | 0.25% | 0.25% | 0.00% | 22% | 29% | 21% | 27% | 26% | 34% | 23% | 30% | 22% | 29% | 23% | 23% | 24% | 24% |
| 9355 | 9.00% | 1.00% | 0.25% | 0.25% | 0.00% | 20% | 26% | 20% | 26% | 24% | 31% | 22% | 29% | 21% | 27% | 21% | 21% | 22% | 22% |
| 9356 | 0.25% | 9.00% | 0.25% | 0.25% | 0.00% | 30% | 39% | 29% | 38% | 32% | 42% | 30% | 39% | 29% | 38% | 30% | 30% | 30% | 30% |
| 9357 | 1.00% | 9.00% | 0.25% | 0.25% | 0.00% | 32% | 42% | 30% | 39% | 35% | 46% | 32% | 42% | 31% | 40% | 32% | 32% | 33% | 33% |
| 9358 | 9.00% | 9.00% | 0.25% | 0.25% | 0.00% | 28% | 36% | 28% | 36% | 30% | 39% | 29% | 38% | 28% | 36% | 29% | 29% | 29% | 29% |
| 9359 | 0.00% | 0.00% | 1.00% | 0.25% | 0.00% | 18% | 23% | 19% | 25% | 21% | 27% | 16% | 21% | 19% | 25% | 19% | 19% | 19% | 19% |
| 9360 | 1.00% | 0.00% | 1.00% | 0.25% | 0.00% | 22% | 29% | 21% | 27% | 26% | 34% | 19% | 25% | 22% | 29% | 23% | 23% | 22% | 22% |
| 9361 | 0.00% | 0.25% | 1.00% | 0.25% | 0.00% | 22% | 29% | 24% | 31% | 25% | 33% | 21% | 27% | 23% | 30% | 24% | 24% | 23% | 23% |
| 9362 | 0.25% | 0.25% | 1.00% | 0.25% | 0.00% | 24% | 31% | 25% | 33% | 27% | 35% | 22% | 29% | 24% | 31% | 25% | 25% | 24% | 24% |
| 9363 | 1.00% | 0.25% | 1.00% | 0.25% | 0.00% | 26% | 34% | 26% | 34% | 30% | 39% | 24% | 31% | 26% | 34% | 27% | 27% | 27% | 27% |
| 9364 | 9.00% | 0.25% | 1.00% | 0.25% | 0.00% | 22% | 29% | 24% | 31% | 25% | 33% | 21% | 27% | 23% | 30% | 24% | 24% | 23% | 23% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9365 | 0.00% | 1.00% | 1.00% | 0.25% | 0.00% | 25% | 33% | 27% | 35% | 29% | 38% | 24% | 31% | 26% | 34% | 27% | 27% | 26% | 26% |
| 9366 | 0.25% | 1.00% | 1.00% | 0.25% | 0.00% | 27% | 35% | 28% | 36% | 31% | 40% | 25% | 33% | 27% | 35% | 29% | 29% | 28% | 28% |
| 9367 | 1.00% | 1.00% | 1.00% | 0.25% | 0.00% | 29% | 38% | 29% | 38% | 34% | 44% | 27% | 35% | 29% | 38% | 31% | 31% | 30% | 30% |
| 9368 | 9.00% | 1.00% | 1.00% | 0.25% | 0.00% | 25% | 33% | 27% | 35% | 29% | 38% | 24% | 31% | 26% | 34% | 27% | 27% | 26% | 26% |
| 9369 | 0.00% | 9.00% | 1.00% | 0.25% | 0.00% | 33% | 43% | 35% | 46% | 35% | 46% | 31% | 40% | 33% | 43% | 34% | 34% | 33% | 33% |
| 9370 | 0.25% | 9.00% | 1.00% | 0.25% | 0.00% | 35% | 46% | 36% | 47% | 37% | 48% | 32% | 42% | 34% | 44% | 36% | 36% | 34% | 34% |
| 9371 | 1.00% | 9.00% | 1.00% | 0.25% | 0.00% | 37% | 48% | 37% | 48% | 40% | 52% | 34% | 44% | 36% | 47% | 38% | 38% | 37% | 37% |
| 9372 | 0.25% | 0.25% | 9.00% | 0.25% | 0.00% | 34% | 44% | 33% | 43% | 41% | 53% | 29% | 38% | 38% | 49% | 36% | 36% | 36% | 36% |
| 9373 | 1.00% | 0.25% | 9.00% | 0.25% | 0.00% | 36% | 47% | 34% | 44% | 44% | 57% | 31% | 40% | 40% | 52% | 38% | 38% | 38% | 38% |
| 9374 | 9.00% | 0.25% | 9.00% | 0.25% | 0.00% | 32% | 42% | 32% | 42% | 39% | 51% | 28% | 36% | 37% | 48% | 34% | 34% | 35% | 35% |
| 9375 | 0.00% | 1.00% | 9.00% | 0.25% | 0.00% | 35% | 46% | 35% | 46% | 43% | 56% | 31% | 40% | 40% | 52% | 38% | 38% | 38% | 38% |
| 9376 | 0.25% | 1.00% | 9.00% | 0.25% | 0.00% | 37% | 48% | 36% | 47% | 45% | 59% | 32% | 42% | 41% | 53% | 39% | 39% | 39% | 39% |
| 9377 | 9.00% | 1.00% | 9.00% | 0.25% | 0.00% | 35% | 46% | 35% | 46% | 43% | 56% | 31% | 40% | 40% | 52% | 38% | 38% | 38% | 38% |
| 9378 | 1.00% | 9.00% | 9.00% | 0.25% | 0.00% | 47% | 61% | 45% | 59% | 54% | 70% | 41% | 53% | 50% | 65% | 49% | 49% | 48% | 48% |
| 9379 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 9380 | 1.00% | 0.25% | 0.00% | 1.00% | 0.00% | 33% | 43% | 28% | 36% | 31% | 40% | 30% | 39% | 27% | 35% | 31% | 31% | 29% | 29% |
| 9381 | 0.00% | 1.00% | 0.00% | 1.00% | 0.00% | 32% | 42% | 29% | 38% | 30% | 39% | 30% | 39% | 27% | 35% | 30% | 30% | 29% | 29% |
| 9382 | 0.25% | 1.00% | 0.00% | 1.00% | 0.00% | 34% | 44% | 30% | 39% | 32% | 42% | 31% | 40% | 28% | 36% | 32% | 32% | 30% | 30% |
| 9383 | 1.00% | 1.00% | 0.00% | 1.00% | 0.00% | 36% | 47% | 31% | 40% | 35% | 46% | 33% | 43% | 30% | 39% | 34% | 34% | 33% | 33% |
| 9384 | 0.00% | 0.00% | 0.25% | 1.00% | 0.00% | 30% | 39% | 25% | 33% | 29% | 38% | 29% | 38% | 27% | 35% | 28% | 28% | 28% | 28% |
| 9385 | 1.00% | 0.00% | 0.25% | 1.00% | 0.00% | 34% | 44% | 27% | 35% | 34% | 44% | 32% | 42% | 30% | 39% | 32% | 32% | 32% | 32% |
| 9386 | 0.25% | 0.25% | 0.25% | 1.00% | 0.00% | 36% | 47% | 31% | 40% | 35% | 46% | 35% | 46% | 32% | 42% | 34% | 34% | 34% | 34% |
| 9387 | 1.00% | 0.25% | 0.25% | 1.00% | 0.00% | 38% | 49% | 32% | 42% | 38% | 49% | 37% | 48% | 34% | 44% | 36% | 36% | 36% | 36% |
| 9388 | 9.00% | 0.25% | 0.25% | 1.00% | 0.00% | 34% | 44% | 30% | 39% | 33% | 43% | 34% | 44% | 31% | 40% | 32% | 32% | 33% | 33% |
| 9389 | 0.00% | 1.00% | 0.25% | 1.00% | 0.00% | 37% | 48% | 33% | 43% | 37% | 48% | 37% | 48% | 34% | 44% | 36% | 36% | 36% | 36% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9390 | 0.25% | 1.00% | 0.25% | 1.00% | 0.00% | 39% | 51% | 34% | 44% | 39% | 51% | 38% | 49% | 35% | 46% | 37% | 37% | 37% | 37% |
| 9391 | 1.00% | 1.00% | 0.25% | 1.00% | 0.00% | 41% | 53% | 35% | 46% | 42% | 55% | 40% | 52% | 37% | 48% | 39% | 39% | 40% | 40% |
| 9392 | 9.00% | 1.00% | 0.25% | 1.00% | 0.00% | 37% | 48% | 33% | 43% | 37% | 48% | 37% | 48% | 34% | 44% | 36% | 36% | 36% | 36% |
| 9393 | 0.25% | 9.00% | 0.25% | 1.00% | 0.00% | 47% | 61% | 42% | 55% | 45% | 59% | 45% | 59% | 42% | 55% | 45% | 45% | 44% | 44% |
| 9394 | 1.00% | 9.00% | 0.25% | 1.00% | 0.00% | 49% | 64% | 43% | 56% | 48% | 62% | 47% | 61% | 44% | 57% | 47% | 47% | 46% | 46% |
| 9395 | 9.00% | 9.00% | 0.25% | 1.00% | 0.00% | 45% | 59% | 41% | 53% | 43% | 56% | 44% | 57% | 41% | 53% | 43% | 43% | 43% | 43% |
| 9396 | 0.00% | 0.00% | 1.00% | 1.00% | 0.00% | 35% | 46% | 32% | 42% | 34% | 44% | 31% | 40% | 32% | 42% | 34% | 34% | 32% | 32% |
| 9397 | 0.25% | 0.00% | 1.00% | 1.00% | 0.00% | 37% | 48% | 33% | 43% | 36% | 47% | 32% | 42% | 33% | 43% | 35% | 35% | 34% | 34% |
| 9398 | 1.00% | 0.00% | 1.00% | 1.00% | 0.00% | 39% | 51% | 34% | 44% | 39% | 51% | 34% | 44% | 35% | 46% | 37% | 37% | 36% | 36% |
| 9399 | 0.00% | 0.25% | 1.00% | 1.00% | 0.00% | 39% | 51% | 37% | 48% | 38% | 49% | 36% | 47% | 36% | 47% | 38% | 38% | 37% | 37% |
| 9400 | 1.00% | 0.25% | 1.00% | 1.00% | 0.00% | 43% | 56% | 39% | 51% | 43% | 56% | 39% | 51% | 39% | 51% | 42% | 42% | 40% | 40% |
| 9401 | 9.00% | 0.25% | 1.00% | 1.00% | 0.00% | 39% | 51% | 37% | 48% | 38% | 49% | 36% | 47% | 36% | 47% | 38% | 38% | 37% | 37% |
| 9402 | 0.00% | 1.00% | 1.00% | 1.00% | 0.00% | 42% | 55% | 40% | 52% | 42% | 55% | 39% | 51% | 39% | 51% | 41% | 41% | 40% | 40% |
| 9403 | 0.25% | 1.00% | 1.00% | 1.00% | 0.00% | 44% | 57% | 41% | 53% | 44% | 57% | 40% | 52% | 40% | 52% | 43% | 43% | 41% | 41% |
| 9404 | 1.00% | 1.00% | 1.00% | 1.00% | 0.00% | 46% | 60% | 42% | 55% | 47% | 61% | 42% | 55% | 42% | 55% | 45% | 45% | 44% | 44% |
| 9405 | 9.00% | 1.00% | 1.00% | 1.00% | 0.00% | 42% | 55% | 40% | 52% | 42% | 55% | 39% | 51% | 39% | 51% | 41% | 41% | 40% | 40% |
| 9406 | 0.00% | 9.00% | 1.00% | 1.00% | 0.00% | 50% | 65% | 48% | 62% | 48% | 62% | 46% | 60% | 46% | 60% | 49% | 49% | 47% | 47% |
| 9407 | 0.25% | 9.00% | 1.00% | 1.00% | 0.00% | 52% | 68% | 49% | 64% | 50% | 65% | 47% | 61% | 47% | 61% | 50% | 50% | 48% | 48% |
| 9408 | 1.00% | 9.00% | 1.00% | 1.00% | 0.00% | 54% | 70% | 50% | 65% | 53% | 69% | 49% | 64% | 49% | 64% | 52% | 52% | 50% | 50% |
| 9409 | 0.25% | 0.25% | 9.00% | 1.00% | 0.00% | 51% | 66% | 46% | 60% | 54% | 70% | 44% | 57% | 51% | 66% | 50% | 50% | 50% | 50% |
| 9410 | 1.00% | 0.25% | 9.00% | 1.00% | 0.00% | 53% | 69% | 47% | 61% | 57% | 74% | 46% | 60% | 53% | 69% | 52% | 52% | 52% | 52% |
| 9411 | 9.00% | 0.25% | 9.00% | 1.00% | 0.00% | 49% | 64% | 45% | 59% | 52% | 68% | 43% | 56% | 50% | 65% | 49% | 49% | 48% | 48% |
| 9412 | 0.25% | 1.00% | 9.00% | 1.00% | 0.00% | 54% | 70% | 49% | 64% | 58% | 75% | 47% | 61% | 54% | 70% | 54% | 54% | 53% | 53% |
| 9413 | 0.00% | 0.25% | 0.00% | 9.00% | 0.00% | 46% | 60% | 40% | 52% | 38% | 49% | 43% | 56% | 38% | 49% | 41% | 41% | 40% | 40% |
| 9414 | 0.00% | 0.00% | 0.25% | 9.00% | 0.00% | 47% | 61% | 39% | 51% | 41% | 53% | 45% | 59% | 41% | 53% | 42% | 42% | 42% | 42% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9415 | 0.25% | 0.00% | 0.25% | 9.00% | 0.00% | 49% | 64% | 40% | 52% | 43% | 56% | 46% | 60% | 42% | 55% | 44% | 44% | 44% | 44% |
| 9416 | 0.00% | 0.25% | 0.25% | 9.00% | 0.00% | 51% | 66% | 44% | 57% | 45% | 59% | 50% | 65% | 45% | 59% | 47% | 47% | 47% | 47% |
| 9417 | 0.25% | 0.25% | 0.25% | 9.00% | 0.00% | 53% | 69% | 45% | 59% | 47% | 61% | 51% | 66% | 46% | 60% | 48% | 48% | 48% | 48% |
| 9418 | 1.00% | 0.25% | 0.25% | 9.00% | 0.00% | 55% | 72% | 46% | 60% | 50% | 65% | 53% | 69% | 48% | 62% | 50% | 50% | 50% | 50% |
| 9419 | 9.00% | 0.25% | 0.25% | 9.00% | 0.00% | 51% | 66% | 44% | 57% | 45% | 59% | 50% | 65% | 45% | 59% | 47% | 47% | 47% | 47% |
| 9420 | 0.00% | 1.00% | 0.25% | 9.00% | 0.00% | 54% | 70% | 47% | 61% | 49% | 64% | 53% | 69% | 48% | 62% | 50% | 50% | 50% | 50% |
| 9421 | 0.25% | 1.00% | 0.25% | 9.00% | 0.00% | 56% | 73% | 48% | 62% | 51% | 66% | 54% | 70% | 49% | 64% | 52% | 52% | 51% | 51% |
| 9422 | 1.00% | 1.00% | 0.25% | 9.00% | 0.00% | 58% | 75% | 49% | 64% | 54% | 70% | 56% | 73% | 51% | 66% | 54% | 54% | 54% | 54% |
| 9423 | 0.25% | 9.00% | 0.25% | 9.00% | 0.00% | 64% | 83% | 56% | 73% | 57% | 74% | 61% | 79% | 56% | 73% | 59% | 59% | 58% | 58% |
| 9424 | 0.25% | 0.00% | 1.00% | 9.00% | 0.00% | 54% | 70% | 47% | 61% | 48% | 62% | 48% | 62% | 47% | 61% | 50% | 50% | 48% | 48% |
| 9425 | 1.00% | 0.25% | 1.00% | 9.00% | 0.00% | 60% | 78% | 53% | 69% | 55% | 72% | 55% | 72% | 53% | 69% | 56% | 56% | 54% | 54% |
| 9426 | 9.00% | 0.25% | 1.00% | 9.00% | 0.00% | 56% | 73% | 51% | 66% | 50% | 65% | 52% | 68% | 50% | 65% | 52% | 52% | 51% | 51% |
| 9427 | 0.00% | 1.00% | 1.00% | 9.00% | 0.00% | 59% | 77% | 54% | 70% | 54% | 70% | 55% | 72% | 53% | 69% | 56% | 56% | 54% | 54% |
| 9428 | 0.25% | 1.00% | 1.00% | 9.00% | 0.00% | 61% | 79% | 55% | 72% | 56% | 73% | 56% | 73% | 54% | 70% | 57% | 57% | 55% | 55% |
| 9429 | 1.00% | 1.00% | 1.00% | 9.00% | 0.00% | 63% | 82% | 56% | 73% | 59% | 77% | 58% | 75% | 56% | 73% | 59% | 59% | 58% | 58% |
| 9430 | 0.25% | 0.25% | 9.00% | 9.00% | 0.00% | 68% | 88% | 60% | 78% | 66% | 86% | 60% | 78% | 65% | 85% | 65% | 65% | 64% | 64% |
| 9431 | 0.25% | 0.25% | 0.00% | 0.00% | 0.25% | 12% | 16% | 13% | 17% | 12% | 16% | 11% | 14% | 12% | 16% | 12% | 12% | 12% | 12% |
| 9432 | 1.00% | 0.25% | 0.00% | 0.00% | 0.25% | 14% | 18% | 14% | 18% | 15% | 20% | 13% | 17% | 14% | 18% | 14% | 14% | 14% | 14% |
| 9433 | 0.25% | 1.00% | 0.00% | 0.00% | 0.25% | 15% | 20% | 16% | 21% | 16% | 21% | 14% | 18% | 15% | 20% | 16% | 16% | 15% | 15% |
| 9434 | 1.00% | 1.00% | 0.00% | 0.00% | 0.25% | 17% | 22% | 17% | 22% | 19% | 25% | 16% | 21% | 17% | 22% | 18% | 18% | 17% | 17% |
| 9435 | 0.25% | 0.00% | 0.25% | 0.00% | 0.25% | 13% | 17% | 12% | 16% | 15% | 20% | 13% | 17% | 15% | 20% | 13% | 13% | 14% | 14% |
| 9436 | 1.00% | 0.00% | 0.25% | 0.00% | 0.25% | 15% | 20% | 13% | 17% | 18% | 23% | 15% | 20% | 17% | 22% | 15% | 15% | 17% | 17% |
| 9437 | 0.00% | 0.25% | 0.25% | 0.00% | 0.25% | 15% | 20% | 16% | 21% | 17% | 22% | 17% | 22% | 18% | 23% | 16% | 16% | 17% | 17% |
| 9438 | 0.25% | 0.25% | 0.25% | 0.00% | 0.25% | 17% | 22% | 17% | 22% | 19% | 25% | 18% | 23% | 19% | 25% | 18% | 18% | 19% | 19% |
| 9439 | 0.00% | 1.00% | 0.25% | 0.00% | 0.25% | 18% | 23% | 19% | 25% | 21% | 27% | 20% | 26% | 21% | 27% | 19% | 19% | 21% | 21% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9440 | 1.00% | 1.00% | 0.25% | 0.00% | 0.25% | 22% | 29% | 21% | 27% | 26% | 34% | 23% | 30% | 24% | 31% | 23% | 23% | 24% | 24% |
| 9441 | 1.00% | 9.00% | 0.25% | 0.00% | 0.25% | 30% | 39% | 29% | 38% | 32% | 42% | 30% | 39% | 31% | 40% | 30% | 30% | 31% | 31% |
| 9442 | 0.25% | 0.00% | 1.00% | 0.00% | 0.25% | 18% | 23% | 19% | 25% | 20% | 26% | 15% | 20% | 20% | 26% | 19% | 19% | 18% | 18% |
| 9443 | 1.00% | 0.00% | 1.00% | 0.00% | 0.25% | 20% | 26% | 20% | 26% | 23% | 30% | 17% | 22% | 22% | 29% | 21% | 21% | 21% | 21% |
| 9444 | 0.00% | 0.25% | 1.00% | 0.00% | 0.25% | 20% | 26% | 23% | 30% | 22% | 29% | 19% | 25% | 23% | 30% | 22% | 22% | 21% | 21% |
| 9445 | 1.00% | 0.25% | 1.00% | 0.00% | 0.25% | 24% | 31% | 25% | 33% | 27% | 35% | 22% | 29% | 26% | 34% | 25% | 25% | 25% | 25% |
| 9446 | 0.00% | 1.00% | 1.00% | 0.00% | 0.25% | 23% | 30% | 26% | 34% | 26% | 34% | 22% | 29% | 26% | 34% | 25% | 25% | 25% | 25% |
| 9447 | 0.25% | 1.00% | 1.00% | 0.00% | 0.25% | 25% | 33% | 27% | 35% | 28% | 36% | 23% | 30% | 27% | 35% | 27% | 27% | 26% | 26% |
| 9448 | 1.00% | 1.00% | 1.00% | 0.00% | 0.25% | 27% | 35% | 28% | 36% | 31% | 40% | 25% | 33% | 29% | 38% | 29% | 29% | 28% | 28% |
| 9449 | 9.00% | 1.00% | 1.00% | 0.00% | 0.25% | 23% | 30% | 26% | 34% | 26% | 34% | 22% | 29% | 26% | 34% | 25% | 25% | 25% | 25% |
| 9450 | 1.00% | 9.00% | 1.00% | 0.00% | 0.25% | 35% | 46% | 36% | 47% | 37% | 48% | 32% | 42% | 36% | 47% | 36% | 36% | 35% | 35% |
| 9451 | 0.25% | 0.00% | 9.00% | 0.00% | 0.25% | 28% | 36% | 27% | 35% | 34% | 44% | 22% | 29% | 34% | 44% | 30% | 30% | 30% | 30% |
| 9452 | 0.00% | 0.25% | 9.00% | 0.00% | 0.25% | 30% | 39% | 31% | 40% | 36% | 47% | 26% | 34% | 37% | 48% | 32% | 32% | 33% | 33% |
| 9453 | 0.25% | 0.25% | 9.00% | 0.00% | 0.25% | 32% | 42% | 32% | 42% | 38% | 49% | 27% | 35% | 38% | 49% | 34% | 34% | 34% | 34% |
| 9454 | 1.00% | 0.25% | 9.00% | 0.00% | 0.25% | 34% | 44% | 33% | 43% | 41% | 53% | 29% | 38% | 40% | 52% | 36% | 36% | 37% | 37% |
| 9455 | 0.25% | 1.00% | 9.00% | 0.00% | 0.25% | 35% | 46% | 35% | 46% | 42% | 55% | 30% | 39% | 41% | 53% | 37% | 37% | 38% | 38% |
| 9456 | 0.25% | 0.00% | 0.00% | 0.25% | 0.25% | 16% | 21% | 16% | 21% | 17% | 22% | 13% | 17% | 15% | 20% | 16% | 16% | 15% | 15% |
| 9457 | 1.00% | 0.00% | 0.00% | 0.25% | 0.25% | 18% | 23% | 17% | 22% | 20% | 26% | 15% | 20% | 17% | 22% | 18% | 18% | 17% | 17% |
| 9458 | 0.00% | 0.25% | 0.00% | 0.25% | 0.25% | 18% | 23% | 20% | 26% | 19% | 25% | 17% | 22% | 18% | 23% | 19% | 19% | 18% | 18% |
| 9459 | 0.25% | 0.25% | 0.00% | 0.25% | 0.25% | 20% | 26% | 21% | 27% | 21% | 27% | 18% | 23% | 19% | 25% | 21% | 21% | 19% | 19% |
| 9460 | 9.00% | 0.25% | 0.00% | 0.25% | 0.25% | 18% | 23% | 20% | 26% | 19% | 25% | 17% | 22% | 18% | 23% | 19% | 19% | 18% | 18% |
| 9461 | 1.00% | 1.00% | 0.00% | 0.25% | 0.25% | 25% | 33% | 25% | 33% | 28% | 36% | 23% | 30% | 24% | 31% | 26% | 26% | 25% | 25% |
| 9462 | 1.00% | 9.00% | 0.00% | 0.25% | 0.25% | 33% | 43% | 33% | 43% | 34% | 44% | 30% | 39% | 31% | 40% | 33% | 33% | 32% | 32% |
| 9463 | 0.00% | 0.00% | 0.25% | 0.25% | 0.25% | 19% | 25% | 19% | 25% | 22% | 29% | 19% | 25% | 21% | 27% | 20% | 20% | 21% | 21% |
| 9464 | 0.25% | 0.00% | 0.25% | 0.25% | 0.25% | 21% | 27% | 20% | 26% | 24% | 31% | 20% | 26% | 22% | 29% | 22% | 22% | 22% | 22% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9465 | 0.00% | 0.25% | 0.25% | 0.25% | 0.25% | 23% | 30% | 24% | 31% | 26% | 34% | 24% | 31% | 25% | 33% | 24% | 24% | 25% | 25% |
| 9466 | 0.25% | 0.25% | 0.25% | 0.25% | 0.25% | 25% | 33% | 25% | 33% | 28% | 36% | 25% | 33% | 26% | 34% | 26% | 26% | 26% | 26% |
| 9467 | 1.00% | 0.25% | 0.25% | 0.25% | 0.25% | 27% | 35% | 26% | 34% | 31% | 40% | 27% | 35% | 28% | 36% | 28% | 28% | 29% | 29% |
| 9468 | 9.00% | 0.25% | 0.25% | 0.25% | 0.25% | 23% | 30% | 24% | 31% | 26% | 34% | 24% | 31% | 25% | 33% | 24% | 24% | 25% | 25% |
| 9469 | 0.25% | 1.00% | 0.25% | 0.25% | 0.25% | 28% | 36% | 28% | 36% | 32% | 42% | 28% | 36% | 29% | 38% | 29% | 29% | 30% | 30% |
| 9470 | 9.00% | 1.00% | 0.25% | 0.25% | 0.25% | 26% | 34% | 27% | 35% | 30% | 39% | 27% | 35% | 28% | 36% | 28% | 28% | 28% | 28% |
| 9471 | 0.25% | 9.00% | 0.25% | 0.25% | 0.25% | 36% | 47% | 36% | 47% | 38% | 49% | 35% | 46% | 36% | 47% | 37% | 37% | 36% | 36% |
| 9472 | 1.00% | 9.00% | 0.25% | 0.25% | 0.25% | 38% | 49% | 37% | 48% | 41% | 53% | 37% | 48% | 38% | 49% | 39% | 39% | 39% | 39% |
| 9473 | 9.00% | 9.00% | 0.25% | 0.25% | 0.25% | 34% | 44% | 35% | 46% | 36% | 47% | 34% | 44% | 35% | 46% | 35% | 35% | 35% | 35% |
| 9474 | 0.00% | 0.00% | 1.00% | 0.25% | 0.25% | 24% | 31% | 26% | 34% | 27% | 35% | 21% | 27% | 26% | 34% | 26% | 26% | 25% | 25% |
| 9475 | 1.00% | 0.00% | 1.00% | 0.25% | 0.25% | 28% | 36% | 28% | 36% | 32% | 42% | 24% | 31% | 29% | 38% | 29% | 29% | 28% | 28% |
| 9476 | 0.00% | 0.25% | 1.00% | 0.25% | 0.25% | 28% | 36% | 31% | 40% | 31% | 40% | 26% | 34% | 30% | 39% | 30% | 30% | 29% | 29% |
| 9477 | 0.25% | 0.25% | 1.00% | 0.25% | 0.25% | 30% | 39% | 32% | 42% | 33% | 43% | 27% | 35% | 31% | 40% | 32% | 32% | 30% | 30% |
| 9478 | 1.00% | 0.25% | 1.00% | 0.25% | 0.25% | 32% | 42% | 33% | 43% | 36% | 47% | 29% | 38% | 33% | 43% | 34% | 34% | 33% | 33% |
| 9479 | 9.00% | 0.25% | 1.00% | 0.25% | 0.25% | 28% | 36% | 31% | 40% | 31% | 40% | 26% | 34% | 30% | 39% | 30% | 30% | 29% | 29% |
| 9480 | 0.00% | 1.00% | 1.00% | 0.25% | 0.25% | 31% | 40% | 34% | 44% | 35% | 46% | 29% | 38% | 33% | 43% | 33% | 33% | 32% | 32% |
| 9481 | 0.25% | 1.00% | 1.00% | 0.25% | 0.25% | 33% | 43% | 35% | 46% | 37% | 48% | 30% | 39% | 34% | 44% | 35% | 35% | 34% | 34% |
| 9482 | 1.00% | 1.00% | 1.00% | 0.25% | 0.25% | 35% | 46% | 36% | 47% | 40% | 52% | 32% | 42% | 36% | 47% | 37% | 37% | 36% | 36% |
| 9483 | 9.00% | 1.00% | 1.00% | 0.25% | 0.25% | 31% | 40% | 34% | 44% | 35% | 46% | 29% | 38% | 33% | 43% | 33% | 33% | 32% | 32% |
| 9484 | 0.00% | 9.00% | 1.00% | 0.25% | 0.25% | 39% | 51% | 42% | 55% | 41% | 53% | 36% | 47% | 40% | 52% | 41% | 41% | 39% | 39% |
| 9485 | 0.25% | 9.00% | 1.00% | 0.25% | 0.25% | 41% | 53% | 43% | 56% | 43% | 56% | 37% | 48% | 41% | 53% | 42% | 42% | 40% | 40% |
| 9486 | 1.00% | 9.00% | 1.00% | 0.25% | 0.25% | 43% | 56% | 44% | 57% | 46% | 60% | 39% | 51% | 43% | 56% | 44% | 44% | 43% | 43% |
| 9487 | 0.25% | 0.25% | 9.00% | 0.25% | 0.25% | 40% | 52% | 40% | 52% | 47% | 61% | 34% | 44% | 45% | 59% | 42% | 42% | 42% | 42% |
| 9488 | 1.00% | 0.25% | 9.00% | 0.25% | 0.25% | 42% | 55% | 41% | 53% | 50% | 65% | 36% | 47% | 47% | 61% | 44% | 44% | 44% | 44% |
| 9489 | 9.00% | 0.25% | 9.00% | 0.25% | 0.25% | 38% | 49% | 39% | 51% | 45% | 59% | 33% | 43% | 44% | 57% | 41% | 41% | 41% | 41% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9490 | 0.00% | 1.00% | 9.00% | 0.25% | 0.25% | 41% | 53% | 42% | 55% | 49% | 64% | 36% | 47% | 47% | 61% | 44% | 44% | 44% | 44% |
| 9491 | 0.25% | 1.00% | 9.00% | 0.25% | 0.25% | 43% | 56% | 43% | 56% | 51% | 66% | 37% | 48% | 48% | 62% | 46% | 46% | 45% | 45% |
| 9492 | 9.00% | 1.00% | 9.00% | 0.25% | 0.25% | 41% | 53% | 42% | 55% | 49% | 64% | 36% | 47% | 47% | 61% | 44% | 44% | 44% | 44% |
| 9493 | 1.00% | 9.00% | 9.00% | 0.25% | 0.25% | 53% | 69% | 52% | 68% | 60% | 78% | 46% | 60% | 57% | 74% | 55% | 55% | 54% | 54% |
| 9494 | 0.25% | 0.00% | 0.00% | 1.00% | 0.25% | 33% | 43% | 29% | 38% | 30% | 39% | 28% | 36% | 28% | 36% | 31% | 31% | 29% | 29% |
| 9495 | 1.00% | 0.25% | 0.00% | 1.00% | 0.25% | 39% | 51% | 35% | 46% | 37% | 48% | 35% | 46% | 34% | 44% | 37% | 37% | 35% | 35% |
| 9496 | 0.00% | 1.00% | 0.00% | 1.00% | 0.25% | 38% | 49% | 36% | 47% | 36% | 47% | 35% | 46% | 34% | 44% | 37% | 37% | 35% | 35% |
| 9497 | 0.25% | 1.00% | 0.00% | 1.00% | 0.25% | 40% | 52% | 37% | 48% | 38% | 49% | 36% | 47% | 35% | 46% | 38% | 38% | 36% | 36% |
| 9498 | 1.00% | 1.00% | 0.00% | 1.00% | 0.25% | 42% | 55% | 38% | 49% | 41% | 53% | 38% | 49% | 37% | 48% | 40% | 40% | 39% | 39% |
| 9499 | 0.00% | 0.00% | 0.25% | 1.00% | 0.25% | 36% | 47% | 32% | 42% | 35% | 46% | 34% | 44% | 34% | 44% | 34% | 34% | 34% | 34% |
| 9500 | 1.00% | 0.00% | 0.25% | 1.00% | 0.25% | 40% | 52% | 34% | 44% | 40% | 52% | 37% | 48% | 37% | 48% | 38% | 38% | 38% | 38% |
| 9501 | 0.25% | 0.25% | 0.25% | 1.00% | 0.25% | 42% | 55% | 38% | 49% | 41% | 53% | 40% | 52% | 39% | 51% | 40% | 40% | 40% | 40% |
| 9502 | 1.00% | 0.25% | 0.25% | 1.00% | 0.25% | 44% | 57% | 39% | 51% | 44% | 57% | 42% | 55% | 41% | 53% | 42% | 42% | 42% | 42% |
| 9503 | 9.00% | 0.25% | 0.25% | 1.00% | 0.25% | 40% | 52% | 37% | 48% | 39% | 51% | 39% | 51% | 38% | 49% | 39% | 39% | 39% | 39% |
| 9504 | 0.00% | 1.00% | 0.25% | 1.00% | 0.25% | 43% | 56% | 40% | 52% | 43% | 56% | 42% | 55% | 41% | 53% | 42% | 42% | 42% | 42% |
| 9505 | 0.25% | 1.00% | 0.25% | 1.00% | 0.25% | 45% | 59% | 41% | 53% | 45% | 59% | 43% | 56% | 42% | 55% | 44% | 44% | 43% | 43% |
| 9506 | 1.00% | 1.00% | 0.25% | 1.00% | 0.25% | 47% | 61% | 42% | 55% | 48% | 62% | 45% | 59% | 44% | 57% | 46% | 46% | 46% | 46% |
| 9507 | 9.00% | 1.00% | 0.25% | 1.00% | 0.25% | 43% | 56% | 40% | 52% | 43% | 56% | 42% | 55% | 41% | 53% | 42% | 42% | 42% | 42% |
| 9508 | 0.25% | 9.00% | 0.25% | 1.00% | 0.25% | 53% | 69% | 49% | 64% | 51% | 66% | 50% | 65% | 49% | 64% | 51% | 51% | 50% | 50% |
| 9509 | 1.00% | 9.00% | 0.25% | 1.00% | 0.25% | 55% | 72% | 50% | 65% | 54% | 70% | 52% | 68% | 51% | 66% | 53% | 53% | 52% | 52% |
| 9510 | 9.00% | 9.00% | 0.25% | 1.00% | 0.25% | 51% | 66% | 48% | 62% | 49% | 64% | 49% | 64% | 48% | 62% | 49% | 49% | 49% | 49% |
| 9511 | 0.00% | 0.00% | 1.00% | 1.00% | 0.25% | 41% | 53% | 39% | 51% | 40% | 52% | 36% | 47% | 39% | 51% | 40% | 40% | 38% | 38% |
| 9512 | 0.25% | 0.00% | 1.00% | 1.00% | 0.25% | 43% | 56% | 40% | 52% | 42% | 55% | 37% | 48% | 40% | 52% | 42% | 42% | 40% | 40% |
| 9513 | 1.00% | 0.00% | 1.00% | 1.00% | 0.25% | 45% | 59% | 41% | 53% | 45% | 59% | 39% | 51% | 42% | 55% | 44% | 44% | 42% | 42% |
| 9514 | 0.00% | 0.25% | 1.00% | 1.00% | 0.25% | 45% | 59% | 44% | 57% | 44% | 57% | 41% | 53% | 43% | 56% | 44% | 44% | 43% | 43% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9515 | 1.00% | 0.25% | 1.00% | 1.00% | 0.25% | 49% | 64% | 46% | 60% | 49% | 64% | 44% | 57% | 46% | 60% | 48% | 48% | 46% | 46% |
| 9516 | 9.00% | 0.25% | 1.00% | 1.00% | 0.25% | 45% | 59% | 44% | 57% | 44% | 57% | 41% | 53% | 43% | 56% | 44% | 44% | 43% | 43% |
| 9517 | 0.00% | 1.00% | 1.00% | 1.00% | 0.25% | 48% | 62% | 47% | 61% | 48% | 62% | 44% | 57% | 46% | 60% | 48% | 48% | 46% | 46% |
| 9518 | 0.25% | 1.00% | 1.00% | 1.00% | 0.25% | 50% | 65% | 48% | 62% | 50% | 65% | 45% | 59% | 47% | 61% | 49% | 49% | 47% | 47% |
| 9519 | 1.00% | 1.00% | 1.00% | 1.00% | 0.25% | 52% | 68% | 49% | 64% | 53% | 69% | 47% | 61% | 49% | 64% | 51% | 51% | 50% | 50% |
| 9520 | 9.00% | 1.00% | 1.00% | 1.00% | 0.25% | 48% | 62% | 47% | 61% | 48% | 62% | 44% | 57% | 46% | 60% | 48% | 48% | 46% | 46% |
| 9521 | 0.00% | 9.00% | 1.00% | 1.00% | 0.25% | 56% | 73% | 55% | 72% | 54% | 70% | 51% | 66% | 53% | 69% | 55% | 55% | 53% | 53% |
| 9522 | 0.25% | 9.00% | 1.00% | 1.00% | 0.25% | 58% | 75% | 56% | 73% | 56% | 73% | 52% | 68% | 54% | 70% | 57% | 57% | 54% | 54% |
| 9523 | 1.00% | 9.00% | 1.00% | 1.00% | 0.25% | 60% | 78% | 57% | 74% | 59% | 77% | 54% | 70% | 56% | 73% | 59% | 59% | 56% | 56% |
| 9524 | 0.25% | 0.25% | 9.00% | 1.00% | 0.25% | 57% | 74% | 53% | 69% | 60% | 78% | 49% | 64% | 58% | 75% | 57% | 57% | 56% | 56% |
| 9525 | 1.00% | 0.25% | 9.00% | 1.00% | 0.25% | 59% | 77% | 54% | 70% | 63% | 82% | 51% | 66% | 60% | 78% | 59% | 59% | 58% | 58% |
| 9526 | 9.00% | 0.25% | 9.00% | 1.00% | 0.25% | 55% | 72% | 52% | 68% | 58% | 75% | 48% | 62% | 57% | 74% | 55% | 55% | 54% | 54% |
| 9527 | 0.25% | 1.00% | 9.00% | 1.00% | 0.25% | 60% | 78% | 56% | 73% | 64% | 83% | 52% | 68% | 61% | 79% | 60% | 60% | 59% | 59% |
| 9528 | 0.00% | 0.25% | 0.00% | 9.00% | 0.25% | 52% | 68% | 47% | 61% | 44% | 57% | 48% | 62% | 45% | 59% | 48% | 48% | 46% | 46% |
| 9529 | 0.00% | 0.00% | 0.25% | 9.00% | 0.25% | 53% | 69% | 46% | 60% | 47% | 61% | 50% | 65% | 48% | 62% | 49% | 49% | 48% | 48% |
| 9530 | 0.25% | 0.00% | 0.25% | 9.00% | 0.25% | 55% | 72% | 47% | 61% | 49% | 64% | 51% | 66% | 49% | 64% | 50% | 50% | 50% | 50% |
| 9531 | 0.00% | 0.25% | 0.25% | 9.00% | 0.25% | 57% | 74% | 51% | 66% | 51% | 66% | 55% | 72% | 52% | 68% | 53% | 53% | 53% | 53% |
| 9532 | 0.25% | 0.25% | 0.25% | 9.00% | 0.25% | 59% | 77% | 52% | 68% | 53% | 69% | 56% | 73% | 53% | 69% | 55% | 55% | 54% | 54% |
| 9533 | 1.00% | 0.25% | 0.25% | 9.00% | 0.25% | 61% | 79% | 53% | 69% | 56% | 73% | 58% | 75% | 55% | 72% | 57% | 57% | 56% | 56% |
| 9534 | 9.00% | 0.25% | 0.25% | 9.00% | 0.25% | 57% | 74% | 51% | 66% | 51% | 66% | 55% | 72% | 52% | 68% | 53% | 53% | 53% | 53% |
| 9535 | 0.00% | 1.00% | 0.25% | 9.00% | 0.25% | 60% | 78% | 54% | 70% | 55% | 72% | 58% | 75% | 55% | 72% | 56% | 56% | 56% | 56% |
| 9536 | 0.25% | 1.00% | 0.25% | 9.00% | 0.25% | 62% | 81% | 55% | 72% | 57% | 74% | 59% | 77% | 56% | 73% | 58% | 58% | 57% | 57% |
| 9537 | 1.00% | 1.00% | 0.25% | 9.00% | 0.25% | 64% | 83% | 56% | 73% | 60% | 78% | 61% | 79% | 58% | 75% | 60% | 60% | 60% | 60% |
| 9538 | 0.25% | 9.00% | 0.25% | 9.00% | 0.25% | 70% | 91% | 63% | 82% | 63% | 82% | 66% | 86% | 63% | 82% | 65% | 65% | 64% | 64% |
| 9539 | 0.25% | 0.00% | 1.00% | 9.00% | 0.25% | 60% | 78% | 54% | 70% | 54% | 70% | 53% | 69% | 54% | 70% | 56% | 56% | 54% | 54% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9540 | 1.00% | 0.25% | 1.00% | 9.00% | 0.25% | 66% | 86% | 60% | 78% | 61% | 79% | 60% | 78% | 60% | 78% | 62% | 62% | 60% | 60% |
| 9541 | 9.00% | 0.25% | 1.00% | 9.00% | 0.25% | 62% | 81% | 58% | 75% | 56% | 73% | 57% | 74% | 57% | 74% | 59% | 59% | 57% | 57% |
| 9542 | 0.00% | 1.00% | 1.00% | 9.00% | 0.25% | 65% | 85% | 61% | 79% | 60% | 78% | 60% | 78% | 60% | 78% | 62% | 62% | 60% | 60% |
| 9543 | 0.25% | 1.00% | 1.00% | 9.00% | 0.25% | 67% | 87% | 62% | 81% | 62% | 81% | 61% | 79% | 61% | 79% | 64% | 64% | 61% | 61% |
| 9544 | 1.00% | 1.00% | 1.00% | 9.00% | 0.25% | 69% | 90% | 63% | 82% | 65% | 85% | 63% | 82% | 63% | 82% | 66% | 66% | 64% | 64% |
| 9545 | 0.25% | 0.25% | 9.00% | 9.00% | 0.25% | 74% | 96% | 67% | 87% | 72% | 94% | 65% | 85% | 72% | 94% | 71% | 71% | 70% | 70% |
| 9546 | 0.25% | 0.25% | 0.00% | 0.00% | 1.00% | 17% | 22% | 19% | 25% | 17% | 22% | 16% | 21% | 23% | 30% | 18% | 18% | 19% | 19% |
| 9547 | 1.00% | 0.25% | 0.00% | 0.00% | 1.00% | 19% | 25% | 20% | 26% | 20% | 26% | 18% | 23% | 25% | 33% | 20% | 20% | 21% | 21% |
| 9548 | 0.25% | 1.00% | 0.00% | 0.00% | 1.00% | 20% | 26% | 22% | 29% | 21% | 27% | 19% | 25% | 26% | 34% | 21% | 21% | 22% | 22% |
| 9549 | 1.00% | 1.00% | 0.00% | 0.00% | 1.00% | 22% | 29% | 23% | 30% | 24% | 31% | 21% | 27% | 28% | 36% | 23% | 23% | 24% | 24% |
| 9550 | 0.25% | 0.00% | 0.25% | 0.00% | 1.00% | 18% | 23% | 18% | 23% | 20% | 26% | 18% | 23% | 26% | 34% | 19% | 19% | 21% | 21% |
| 9551 | 1.00% | 0.00% | 0.25% | 0.00% | 1.00% | 20% | 26% | 19% | 25% | 23% | 30% | 20% | 26% | 28% | 36% | 21% | 21% | 24% | 24% |
| 9552 | 0.00% | 0.25% | 0.25% | 0.00% | 1.00% | 20% | 26% | 22% | 29% | 22% | 29% | 22% | 29% | 29% | 38% | 21% | 21% | 24% | 24% |
| 9553 | 0.25% | 0.25% | 0.25% | 0.00% | 1.00% | 22% | 29% | 23% | 30% | 24% | 31% | 23% | 30% | 30% | 39% | 23% | 23% | 26% | 26% |
| 9554 | 0.00% | 1.00% | 0.25% | 0.00% | 1.00% | 23% | 30% | 25% | 33% | 26% | 34% | 25% | 33% | 32% | 42% | 25% | 25% | 28% | 28% |
| 9555 | 1.00% | 1.00% | 0.25% | 0.00% | 1.00% | 27% | 35% | 27% | 35% | 31% | 40% | 28% | 36% | 35% | 46% | 28% | 28% | 31% | 31% |
| 9556 | 1.00% | 9.00% | 0.25% | 0.00% | 1.00% | 35% | 46% | 35% | 46% | 37% | 48% | 35% | 46% | 42% | 55% | 36% | 36% | 38% | 38% |
| 9557 | 0.25% | 0.00% | 1.00% | 0.00% | 1.00% | 23% | 30% | 25% | 33% | 25% | 33% | 20% | 26% | 31% | 40% | 24% | 24% | 25% | 25% |
| 9558 | 1.00% | 0.00% | 1.00% | 0.00% | 1.00% | 25% | 33% | 26% | 34% | 28% | 36% | 22% | 29% | 33% | 43% | 26% | 26% | 28% | 28% |
| 9559 | 0.00% | 0.25% | 1.00% | 0.00% | 1.00% | 25% | 33% | 29% | 38% | 27% | 35% | 24% | 31% | 34% | 44% | 27% | 27% | 28% | 28% |
| 9560 | 1.00% | 0.25% | 1.00% | 0.00% | 1.00% | 29% | 38% | 31% | 40% | 32% | 42% | 27% | 35% | 37% | 48% | 31% | 31% | 32% | 32% |
| 9561 | 0.00% | 1.00% | 1.00% | 0.00% | 1.00% | 28% | 36% | 32% | 42% | 31% | 40% | 27% | 35% | 37% | 48% | 30% | 30% | 32% | 32% |
| 9562 | 0.25% | 1.00% | 1.00% | 0.00% | 1.00% | 30% | 39% | 33% | 43% | 33% | 43% | 28% | 36% | 38% | 49% | 32% | 32% | 33% | 33% |
| 9563 | 1.00% | 1.00% | 1.00% | 0.00% | 1.00% | 32% | 42% | 34% | 44% | 36% | 47% | 30% | 39% | 40% | 52% | 34% | 34% | 35% | 35% |
| 9564 | 9.00% | 1.00% | 1.00% | 0.00% | 1.00% | 28% | 36% | 32% | 42% | 31% | 40% | 27% | 35% | 37% | 48% | 30% | 30% | 32% | 32% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9565 | 1.00% | 9.00% | 1.00% | 0.00% | 1.00% | 40% | 52% | 42% | 55% | 42% | 55% | 37% | 48% | 47% | 61% | 41% | 41% | 42% | 42% |
| 9566 | 0.25% | 0.00% | 9.00% | 0.00% | 1.00% | 33% | 43% | 33% | 43% | 39% | 51% | 27% | 35% | 45% | 59% | 35% | 35% | 37% | 37% |
| 9567 | 0.00% | 0.25% | 9.00% | 0.00% | 1.00% | 35% | 46% | 37% | 48% | 41% | 53% | 31% | 40% | 48% | 62% | 38% | 38% | 40% | 40% |
| 9568 | 0.25% | 0.25% | 9.00% | 0.00% | 1.00% | 37% | 48% | 38% | 49% | 43% | 56% | 32% | 42% | 49% | 64% | 39% | 39% | 41% | 41% |
| 9569 | 1.00% | 0.25% | 9.00% | 0.00% | 1.00% | 39% | 51% | 39% | 51% | 46% | 60% | 34% | 44% | 51% | 66% | 41% | 41% | 44% | 44% |
| 9570 | 0.25% | 1.00% | 9.00% | 0.00% | 1.00% | 40% | 52% | 41% | 53% | 47% | 61% | 35% | 46% | 52% | 68% | 43% | 43% | 45% | 45% |
| 9571 | 0.25% | 0.00% | 0.00% | 0.25% | 1.00% | 21% | 27% | 22% | 29% | 22% | 29% | 18% | 23% | 26% | 34% | 22% | 22% | 22% | 22% |
| 9572 | 1.00% | 0.00% | 0.00% | 0.25% | 1.00% | 23% | 30% | 23% | 30% | 25% | 33% | 20% | 26% | 28% | 36% | 24% | 24% | 24% | 24% |
| 9573 | 0.00% | 0.25% | 0.00% | 0.25% | 1.00% | 23% | 30% | 26% | 34% | 24% | 31% | 22% | 29% | 29% | 38% | 24% | 24% | 25% | 25% |
| 9574 | 0.25% | 0.25% | 0.00% | 0.25% | 1.00% | 25% | 33% | 27% | 35% | 26% | 34% | 23% | 30% | 30% | 39% | 26% | 26% | 26% | 26% |
| 9575 | 9.00% | 0.25% | 0.00% | 0.25% | 1.00% | 23% | 30% | 26% | 34% | 24% | 31% | 22% | 29% | 29% | 38% | 24% | 24% | 25% | 25% |
| 9576 | 1.00% | 1.00% | 0.00% | 0.25% | 1.00% | 30% | 39% | 31% | 40% | 33% | 43% | 28% | 36% | 35% | 46% | 31% | 31% | 32% | 32% |
| 9577 | 1.00% | 9.00% | 0.00% | 0.25% | 1.00% | 38% | 49% | 39% | 51% | 39% | 51% | 35% | 46% | 42% | 55% | 39% | 39% | 39% | 39% |
| 9578 | 0.00% | 0.00% | 0.25% | 0.25% | 1.00% | 24% | 31% | 25% | 33% | 27% | 35% | 24% | 31% | 32% | 42% | 25% | 25% | 28% | 28% |
| 9579 | 0.25% | 0.00% | 0.25% | 0.25% | 1.00% | 26% | 34% | 26% | 34% | 29% | 38% | 25% | 33% | 33% | 43% | 27% | 27% | 29% | 29% |
| 9580 | 0.00% | 0.25% | 0.25% | 0.25% | 1.00% | 28% | 36% | 30% | 39% | 31% | 40% | 29% | 38% | 36% | 47% | 30% | 30% | 32% | 32% |
| 9581 | 0.25% | 0.25% | 0.25% | 0.25% | 1.00% | 30% | 39% | 31% | 40% | 33% | 43% | 30% | 39% | 37% | 48% | 31% | 31% | 33% | 33% |
| 9582 | 1.00% | 0.25% | 0.25% | 0.25% | 1.00% | 32% | 42% | 32% | 42% | 36% | 47% | 32% | 42% | 39% | 51% | 33% | 33% | 36% | 36% |
| 9583 | 9.00% | 0.25% | 0.25% | 0.25% | 1.00% | 28% | 36% | 30% | 39% | 31% | 40% | 29% | 38% | 36% | 47% | 30% | 30% | 32% | 32% |
| 9584 | 0.25% | 1.00% | 0.25% | 0.25% | 1.00% | 33% | 43% | 34% | 44% | 37% | 48% | 33% | 43% | 40% | 52% | 35% | 35% | 37% | 37% |
| 9585 | 9.00% | 1.00% | 0.25% | 0.25% | 1.00% | 31% | 40% | 33% | 43% | 35% | 46% | 32% | 42% | 39% | 51% | 33% | 33% | 35% | 35% |
| 9586 | 0.25% | 9.00% | 0.25% | 0.25% | 1.00% | 41% | 53% | 42% | 55% | 43% | 56% | 40% | 52% | 47% | 61% | 42% | 42% | 43% | 43% |
| 9587 | 1.00% | 9.00% | 0.25% | 0.25% | 1.00% | 43% | 56% | 43% | 56% | 46% | 60% | 42% | 55% | 49% | 64% | 44% | 44% | 46% | 46% |
| 9588 | 9.00% | 9.00% | 0.25% | 0.25% | 1.00% | 39% | 51% | 41% | 53% | 41% | 53% | 39% | 51% | 46% | 60% | 40% | 40% | 42% | 42% |
| 9589 | 0.00% | 0.00% | 1.00% | 0.25% | 1.00% | 29% | 38% | 32% | 42% | 32% | 42% | 26% | 34% | 37% | 48% | 31% | 31% | 32% | 32% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9590 | 1.00% | 0.00% | 1.00% | 0.25% | 1.00% | 33% | 43% | 34% | 44% | 37% | 48% | 29% | 38% | 40% | 52% | 35% | 35% | 35% | 35% |
| 9591 | 0.00% | 0.25% | 1.00% | 0.25% | 1.00% | 33% | 43% | 37% | 48% | 36% | 47% | 31% | 40% | 41% | 53% | 35% | 35% | 36% | 36% |
| 9592 | 0.25% | 0.25% | 1.00% | 0.25% | 1.00% | 35% | 46% | 38% | 49% | 38% | 49% | 32% | 42% | 42% | 55% | 37% | 37% | 37% | 37% |
| 9593 | 1.00% | 0.25% | 1.00% | 0.25% | 1.00% | 37% | 48% | 39% | 51% | 41% | 53% | 34% | 44% | 44% | 57% | 39% | 39% | 40% | 40% |
| 9594 | 9.00% | 0.25% | 1.00% | 0.25% | 1.00% | 33% | 43% | 37% | 48% | 36% | 47% | 31% | 40% | 41% | 53% | 35% | 35% | 36% | 36% |
| 9595 | 0.00% | 1.00% | 1.00% | 0.25% | 1.00% | 36% | 47% | 40% | 52% | 40% | 52% | 34% | 44% | 44% | 57% | 39% | 39% | 39% | 39% |
| 9596 | 0.25% | 1.00% | 1.00% | 0.25% | 1.00% | 38% | 49% | 41% | 53% | 42% | 55% | 35% | 46% | 45% | 59% | 40% | 40% | 41% | 41% |
| 9597 | 1.00% | 1.00% | 1.00% | 0.25% | 1.00% | 40% | 52% | 42% | 55% | 45% | 59% | 37% | 48% | 47% | 61% | 42% | 42% | 43% | 43% |
| 9598 | 9.00% | 1.00% | 1.00% | 0.25% | 1.00% | 36% | 47% | 40% | 52% | 40% | 52% | 34% | 44% | 44% | 57% | 39% | 39% | 39% | 39% |
| 9599 | 0.00% | 9.00% | 1.00% | 0.25% | 1.00% | 44% | 57% | 48% | 62% | 46% | 60% | 41% | 53% | 51% | 66% | 46% | 46% | 46% | 46% |
| 9600 | 0.25% | 9.00% | 1.00% | 0.25% | 1.00% | 46% | 60% | 49% | 64% | 48% | 62% | 42% | 55% | 52% | 68% | 48% | 48% | 47% | 47% |
| 9601 | 1.00% | 9.00% | 1.00% | 0.25% | 1.00% | 48% | 62% | 50% | 65% | 51% | 66% | 44% | 57% | 54% | 70% | 50% | 50% | 50% | 50% |
| 9602 | 0.25% | 0.25% | 9.00% | 0.25% | 1.00% | 45% | 59% | 46% | 60% | 52% | 68% | 39% | 51% | 56% | 73% | 48% | 48% | 49% | 49% |
| 9603 | 1.00% | 0.25% | 9.00% | 0.25% | 1.00% | 47% | 61% | 47% | 61% | 55% | 72% | 41% | 53% | 58% | 75% | 50% | 50% | 51% | 51% |
| 9604 | 9.00% | 0.25% | 9.00% | 0.25% | 1.00% | 43% | 56% | 45% | 59% | 50% | 65% | 38% | 49% | 55% | 72% | 46% | 46% | 48% | 48% |
| 9605 | 0.00% | 1.00% | 9.00% | 0.25% | 1.00% | 46% | 60% | 48% | 62% | 54% | 70% | 41% | 53% | 58% | 75% | 49% | 49% | 51% | 51% |
| 9606 | 0.25% | 1.00% | 9.00% | 0.25% | 1.00% | 48% | 62% | 49% | 64% | 56% | 73% | 42% | 55% | 59% | 77% | 51% | 51% | 52% | 52% |
| 9607 | 9.00% | 1.00% | 9.00% | 0.25% | 1.00% | 46% | 60% | 48% | 62% | 54% | 70% | 41% | 53% | 58% | 75% | 49% | 49% | 51% | 51% |
| 9608 | 1.00% | 9.00% | 9.00% | 0.25% | 1.00% | 58% | 75% | 58% | 75% | 65% | 85% | 51% | 66% | 68% | 88% | 60% | 60% | 61% | 61% |
| 9609 | 0.25% | 0.00% | 0.00% | 1.00% | 1.00% | 38% | 49% | 35% | 46% | 35% | 46% | 33% | 43% | 39% | 51% | 36% | 36% | 36% | 36% |
| 9610 | 1.00% | 0.25% | 0.00% | 1.00% | 1.00% | 44% | 57% | 41% | 53% | 42% | 55% | 40% | 52% | 45% | 59% | 42% | 42% | 42% | 42% |
| 9611 | 0.00% | 1.00% | 0.00% | 1.00% | 1.00% | 43% | 56% | 42% | 55% | 41% | 53% | 40% | 52% | 45% | 59% | 42% | 42% | 42% | 42% |
| 9612 | 0.25% | 1.00% | 0.00% | 1.00% | 1.00% | 45% | 59% | 43% | 56% | 43% | 56% | 41% | 53% | 46% | 60% | 44% | 44% | 43% | 43% |
| 9613 | 1.00% | 1.00% | 0.00% | 1.00% | 1.00% | 47% | 61% | 44% | 57% | 46% | 60% | 43% | 56% | 48% | 62% | 46% | 46% | 46% | 46% |
| 9614 | 0.00% | 0.00% | 0.25% | 1.00% | 1.00% | 41% | 53% | 38% | 49% | 40% | 52% | 39% | 51% | 45% | 59% | 40% | 40% | 41% | 41% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9615 | 1.00% | 0.00% | 0.25% | 1.00% | 1.00% | 45% | 59% | 40% | 52% | 45% | 59% | 42% | 55% | 48% | 62% | 43% | 43% | 45% | 45% |
| 9616 | 0.25% | 0.25% | 0.25% | 1.00% | 1.00% | 47% | 61% | 44% | 57% | 46% | 60% | 45% | 59% | 50% | 65% | 46% | 46% | 47% | 47% |
| 9617 | 1.00% | 0.25% | 0.25% | 1.00% | 1.00% | 49% | 64% | 45% | 59% | 49% | 64% | 47% | 61% | 52% | 68% | 48% | 48% | 49% | 49% |
| 9618 | 9.00% | 0.25% | 0.25% | 1.00% | 1.00% | 45% | 59% | 43% | 56% | 44% | 57% | 44% | 57% | 49% | 64% | 44% | 44% | 46% | 46% |
| 9619 | 0.00% | 1.00% | 0.25% | 1.00% | 1.00% | 48% | 62% | 46% | 60% | 48% | 62% | 47% | 61% | 52% | 68% | 47% | 47% | 49% | 49% |
| 9620 | 0.25% | 1.00% | 0.25% | 1.00% | 1.00% | 50% | 65% | 47% | 61% | 50% | 65% | 48% | 62% | 53% | 69% | 49% | 49% | 50% | 50% |
| 9621 | 1.00% | 1.00% | 0.25% | 1.00% | 1.00% | 52% | 68% | 48% | 62% | 53% | 69% | 50% | 65% | 55% | 72% | 51% | 51% | 53% | 53% |
| 9622 | 9.00% | 1.00% | 0.25% | 1.00% | 1.00% | 48% | 62% | 46% | 60% | 48% | 62% | 47% | 61% | 52% | 68% | 47% | 47% | 49% | 49% |
| 9623 | 0.25% | 9.00% | 0.25% | 1.00% | 1.00% | 58% | 75% | 55% | 72% | 56% | 73% | 55% | 72% | 60% | 78% | 56% | 56% | 57% | 57% |
| 9624 | 1.00% | 9.00% | 0.25% | 1.00% | 1.00% | 60% | 78% | 56% | 73% | 59% | 77% | 57% | 74% | 62% | 81% | 58% | 58% | 59% | 59% |
| 9625 | 9.00% | 9.00% | 0.25% | 1.00% | 1.00% | 56% | 73% | 54% | 70% | 54% | 70% | 54% | 70% | 59% | 77% | 55% | 55% | 56% | 56% |
| 9626 | 0.00% | 0.00% | 1.00% | 1.00% | 1.00% | 46% | 60% | 45% | 59% | 45% | 59% | 41% | 53% | 50% | 65% | 45% | 45% | 45% | 45% |
| 9627 | 0.25% | 0.00% | 1.00% | 1.00% | 1.00% | 48% | 62% | 46% | 60% | 47% | 61% | 42% | 55% | 51% | 66% | 47% | 47% | 47% | 47% |
| 9628 | 1.00% | 0.00% | 1.00% | 1.00% | 1.00% | 50% | 65% | 47% | 61% | 50% | 65% | 44% | 57% | 53% | 69% | 49% | 49% | 49% | 49% |
| 9629 | 0.00% | 0.25% | 1.00% | 1.00% | 1.00% | 50% | 65% | 50% | 65% | 49% | 64% | 46% | 60% | 54% | 70% | 50% | 50% | 50% | 50% |
| 9630 | 1.00% | 0.25% | 1.00% | 1.00% | 1.00% | 54% | 70% | 52% | 68% | 54% | 70% | 49% | 64% | 57% | 74% | 53% | 53% | 53% | 53% |
| 9631 | 9.00% | 0.25% | 1.00% | 1.00% | 1.00% | 50% | 65% | 50% | 65% | 49% | 64% | 46% | 60% | 54% | 70% | 50% | 50% | 50% | 50% |
| 9632 | 0.00% | 1.00% | 1.00% | 1.00% | 1.00% | 53% | 69% | 53% | 69% | 53% | 69% | 49% | 64% | 57% | 74% | 53% | 53% | 53% | 53% |
| 9633 | 0.25% | 1.00% | 1.00% | 1.00% | 1.00% | 55% | 72% | 54% | 70% | 55% | 72% | 50% | 65% | 58% | 75% | 55% | 55% | 54% | 54% |
| 9634 | 1.00% | 1.00% | 1.00% | 1.00% | 1.00% | 57% | 74% | 55% | 72% | 58% | 75% | 52% | 68% | 60% | 78% | 57% | 57% | 57% | 57% |
| 9635 | 9.00% | 1.00% | 1.00% | 1.00% | 1.00% | 53% | 69% | 53% | 69% | 53% | 69% | 49% | 64% | 57% | 74% | 53% | 53% | 53% | 53% |
| 9636 | 0.00% | 9.00% | 1.00% | 1.00% | 1.00% | 61% | 79% | 61% | 79% | 59% | 77% | 56% | 73% | 64% | 83% | 60% | 60% | 60% | 60% |
| 9637 | 0.25% | 9.00% | 1.00% | 1.00% | 1.00% | 63% | 82% | 62% | 81% | 61% | 79% | 57% | 74% | 65% | 85% | 62% | 62% | 61% | 61% |
| 9638 | 1.00% | 9.00% | 1.00% | 1.00% | 1.00% | 65% | 85% | 63% | 82% | 64% | 83% | 59% | 77% | 67% | 87% | 64% | 64% | 63% | 63% |
| 9639 | 0.25% | 0.25% | 9.00% | 1.00% | 1.00% | 62% | 81% | 59% | 77% | 65% | 85% | 54% | 70% | 69% | 90% | 62% | 62% | 63% | 63% |

Fig. 33

| Formula # | Gamma Dodecalactone | Propyl Dihydrojasmonate | Methyl Dihydrojasmolate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9640 | 1.00% | 0.25% | 9.00% | 1.00% | 1.00% | 64% | 83% | 60% | 78% | 68% | 88% | 56% | 73% | 71% | 92% | 64% | 64% | 65% | 65% |
| 9641 | 9.00% | 0.25% | 9.00% | 1.00% | 1.00% | 60% | 78% | 58% | 75% | 63% | 82% | 53% | 69% | 68% | 88% | 60% | 60% | 61% | 61% |
| 9642 | 0.25% | 1.00% | 9.00% | 1.00% | 1.00% | 65% | 85% | 62% | 81% | 69% | 90% | 57% | 74% | 72% | 94% | 65% | 65% | 66% | 66% |
| 9643 | 0.00% | 0.25% | 0.00% | 9.00% | 1.00% | 57% | 74% | 53% | 69% | 49% | 64% | 53% | 69% | 56% | 73% | 53% | 53% | 53% | 53% |
| 9644 | 0.00% | 0.00% | 0.25% | 9.00% | 1.00% | 58% | 75% | 52% | 68% | 52% | 68% | 55% | 72% | 59% | 77% | 54% | 54% | 55% | 55% |
| 9645 | 0.25% | 0.00% | 0.25% | 9.00% | 1.00% | 60% | 78% | 53% | 69% | 54% | 70% | 56% | 73% | 60% | 78% | 56% | 56% | 57% | 57% |
| 9646 | 0.00% | 0.25% | 0.25% | 9.00% | 1.00% | 62% | 81% | 57% | 74% | 56% | 73% | 60% | 78% | 63% | 82% | 58% | 58% | 60% | 60% |
| 9647 | 0.25% | 0.25% | 0.25% | 9.00% | 1.00% | 64% | 83% | 58% | 75% | 58% | 75% | 61% | 79% | 64% | 83% | 60% | 60% | 61% | 61% |
| 9648 | 1.00% | 0.25% | 0.25% | 9.00% | 1.00% | 66% | 86% | 59% | 77% | 61% | 79% | 63% | 82% | 66% | 86% | 62% | 62% | 63% | 63% |
| 9649 | 9.00% | 0.25% | 0.25% | 9.00% | 1.00% | 62% | 81% | 57% | 74% | 56% | 73% | 60% | 78% | 63% | 82% | 58% | 58% | 60% | 60% |
| 9650 | 0.00% | 1.00% | 0.25% | 9.00% | 1.00% | 65% | 85% | 60% | 78% | 60% | 78% | 63% | 82% | 66% | 86% | 62% | 62% | 63% | 63% |
| 9651 | 0.25% | 1.00% | 0.25% | 9.00% | 1.00% | 67% | 87% | 61% | 79% | 62% | 81% | 64% | 83% | 67% | 87% | 63% | 63% | 64% | 64% |
| 9652 | 1.00% | 1.00% | 0.25% | 9.00% | 1.00% | 69% | 90% | 62% | 81% | 65% | 85% | 66% | 86% | 69% | 90% | 65% | 65% | 67% | 67% |
| 9653 | 0.25% | 9.00% | 0.25% | 9.00% | 1.00% | 75% | 100% | 69% | 100% | 68% | 100% | 71% | 100% | 74% | 100% | 71% | 71% | 71% | 71% |
| 9654 | 0.25% | 0.00% | 1.00% | 9.00% | 1.00% | 65% | 85% | 60% | 78% | 59% | 77% | 58% | 75% | 65% | 85% | 61% | 61% | 61% | 61% |
| 9655 | 1.00% | 0.25% | 1.00% | 9.00% | 1.00% | 71% | 92% | 66% | 86% | 66% | 86% | 65% | 85% | 71% | 92% | 68% | 68% | 67% | 67% |
| 9656 | 9.00% | 0.25% | 1.00% | 9.00% | 1.00% | 67% | 87% | 64% | 83% | 61% | 79% | 62% | 81% | 68% | 88% | 64% | 64% | 64% | 64% |
| 9657 | 0.00% | 1.00% | 1.00% | 9.00% | 1.00% | 70% | 91% | 67% | 87% | 65% | 85% | 65% | 85% | 71% | 92% | 67% | 67% | 67% | 67% |
| 9658 | 0.25% | 1.00% | 1.00% | 9.00% | 1.00% | 72% | 94% | 68% | 88% | 67% | 87% | 66% | 86% | 72% | 94% | 69% | 69% | 68% | 68% |
| 9659 | 1.00% | 1.00% | 1.00% | 9.00% | 1.00% | 74% | 100% | 69% | 100% | 70% | 100% | 68% | 100% | 74% | 100% | 71% | 71% | 71% | 71% |
| 9660 | 0.25% | 0.25% | 9.00% | 9.00% | 1.00% | 79% | 100% | 73% | 100% | 77% | 100% | 70% | 100% | 83% | 100% | 76% | 76% | 77% | 77% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9661 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 9662 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 9663 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 9664 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 9665 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 9666 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 9667 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 9668 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 9669 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 9670 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 9671 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 9672 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 9673 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 9674 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 9675 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 9676 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 9677 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 9678 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 9679 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 9680 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 9681 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 9682 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 9683 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 9684 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 9685 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9686 | 0.25% | 0.00% | 0.00% | 0.25% | 0.00% | 7% | 9% | 10% | 13% | 8% | 10% | 11% | 14% | 8% | 10% | 8% | 8% | 9% | 9% |
| 9687 | 1.00% | 0.00% | 0.00% | 0.25% | 0.00% | 9% | 12% | 11% | 14% | 11% | 14% | 13% | 17% | 10% | 13% | 10% | 10% | 11% | 11% |
| 9688 | 0.00% | 0.25% | 0.00% | 0.25% | 0.00% | 9% | 12% | 14% | 18% | 10% | 13% | 15% | 20% | 11% | 14% | 11% | 11% | 12% | 12% |
| 9689 | 0.25% | 0.25% | 0.00% | 0.25% | 0.00% | 11% | 14% | 15% | 20% | 12% | 16% | 16% | 21% | 12% | 16% | 13% | 13% | 13% | 13% |
| 9690 | 9.00% | 0.25% | 0.00% | 0.25% | 0.00% | 9% | 12% | 14% | 18% | 10% | 13% | 15% | 20% | 11% | 14% | 11% | 11% | 12% | 12% |
| 9691 | 1.00% | 1.00% | 0.00% | 0.25% | 0.00% | 16% | 21% | 19% | 25% | 19% | 25% | 21% | 27% | 17% | 22% | 18% | 18% | 19% | 19% |
| 9692 | 1.00% | 9.00% | 0.00% | 0.25% | 0.00% | 24% | 31% | 27% | 35% | 25% | 33% | 28% | 36% | 24% | 31% | 25% | 25% | 26% | 26% |
| 9693 | 0.00% | 0.00% | 0.25% | 0.25% | 0.00% | 9% | 12% | 15% | 20% | 10% | 13% | 13% | 17% | 12% | 16% | 11% | 11% | 12% | 12% |
| 9694 | 0.25% | 0.00% | 0.25% | 0.25% | 0.00% | 11% | 14% | 16% | 21% | 12% | 16% | 14% | 18% | 13% | 17% | 13% | 13% | 13% | 13% |
| 9695 | 0.00% | 0.25% | 0.25% | 0.25% | 0.00% | 13% | 17% | 20% | 26% | 14% | 18% | 18% | 23% | 16% | 21% | 16% | 16% | 16% | 16% |
| 9696 | 0.25% | 0.25% | 0.25% | 0.25% | 0.00% | 15% | 20% | 21% | 27% | 16% | 21% | 19% | 25% | 17% | 22% | 17% | 17% | 17% | 17% |
| 9697 | 1.00% | 0.25% | 0.25% | 0.25% | 0.00% | 17% | 22% | 22% | 29% | 19% | 25% | 21% | 27% | 19% | 25% | 19% | 19% | 20% | 20% |
| 9698 | 9.00% | 0.25% | 0.25% | 0.25% | 0.00% | 13% | 17% | 20% | 26% | 14% | 18% | 18% | 23% | 16% | 21% | 16% | 16% | 16% | 16% |
| 9699 | 0.25% | 1.00% | 0.25% | 0.25% | 0.00% | 18% | 23% | 24% | 31% | 20% | 26% | 22% | 29% | 20% | 26% | 21% | 21% | 21% | 21% |
| 9700 | 9.00% | 1.00% | 0.25% | 0.25% | 0.00% | 16% | 21% | 23% | 30% | 18% | 23% | 21% | 27% | 19% | 25% | 19% | 19% | 19% | 19% |
| 9701 | 0.25% | 9.00% | 0.25% | 0.25% | 0.00% | 26% | 34% | 32% | 42% | 26% | 34% | 29% | 38% | 27% | 35% | 28% | 28% | 27% | 27% |
| 9702 | 1.00% | 9.00% | 0.25% | 0.25% | 0.00% | 28% | 36% | 33% | 43% | 29% | 38% | 31% | 40% | 29% | 38% | 30% | 30% | 30% | 30% |
| 9703 | 9.00% | 9.00% | 0.25% | 0.25% | 0.00% | 24% | 31% | 31% | 40% | 24% | 31% | 28% | 36% | 26% | 34% | 26% | 26% | 26% | 26% |
| 9704 | 0.00% | 0.00% | 1.00% | 0.25% | 0.00% | 14% | 18% | 18% | 23% | 16% | 21% | 19% | 25% | 16% | 21% | 16% | 16% | 17% | 17% |
| 9705 | 1.00% | 0.00% | 1.00% | 0.25% | 0.00% | 18% | 23% | 20% | 26% | 21% | 27% | 22% | 29% | 19% | 25% | 20% | 20% | 21% | 21% |
| 9706 | 0.00% | 0.25% | 1.00% | 0.25% | 0.00% | 18% | 23% | 23% | 30% | 20% | 26% | 24% | 31% | 20% | 26% | 20% | 20% | 21% | 21% |
| 9707 | 0.25% | 0.25% | 1.00% | 0.25% | 0.00% | 20% | 26% | 24% | 31% | 22% | 29% | 25% | 33% | 21% | 27% | 22% | 22% | 23% | 23% |
| 9708 | 1.00% | 0.25% | 1.00% | 0.25% | 0.00% | 22% | 29% | 25% | 33% | 25% | 33% | 27% | 35% | 23% | 30% | 24% | 24% | 25% | 25% |
| 9709 | 9.00% | 0.25% | 1.00% | 0.25% | 0.00% | 18% | 23% | 23% | 30% | 20% | 26% | 24% | 31% | 20% | 26% | 20% | 20% | 21% | 21% |
| 9710 | 0.00% | 1.00% | 1.00% | 0.25% | 0.00% | 21% | 27% | 26% | 34% | 24% | 31% | 27% | 35% | 23% | 30% | 24% | 24% | 25% | 25% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9711 | 0.25% | 1.00% | 1.00% | 0.25% | 0.00% | 23% | 30% | 27% | 35% | 26% | 34% | 28% | 36% | 24% | 31% | 25% | 25% | 26% | 26% |
| 9712 | 1.00% | 1.00% | 1.00% | 0.25% | 0.00% | 25% | 33% | 28% | 36% | 29% | 38% | 30% | 39% | 26% | 34% | 27% | 27% | 28% | 28% |
| 9713 | 9.00% | 1.00% | 1.00% | 0.25% | 0.00% | 21% | 27% | 26% | 34% | 24% | 31% | 27% | 35% | 23% | 30% | 24% | 24% | 25% | 25% |
| 9714 | 0.00% | 9.00% | 1.00% | 0.25% | 0.00% | 29% | 38% | 34% | 44% | 30% | 39% | 34% | 44% | 30% | 39% | 31% | 31% | 31% | 31% |
| 9715 | 0.25% | 9.00% | 1.00% | 0.25% | 0.00% | 31% | 40% | 35% | 46% | 32% | 42% | 35% | 46% | 31% | 40% | 33% | 33% | 33% | 33% |
| 9716 | 1.00% | 9.00% | 1.00% | 0.25% | 0.00% | 33% | 43% | 36% | 47% | 35% | 46% | 37% | 48% | 33% | 43% | 35% | 35% | 35% | 35% |
| 9717 | 0.25% | 0.25% | 9.00% | 0.25% | 0.00% | 30% | 39% | 29% | 38% | 27% | 35% | 36% | 47% | 31% | 40% | 29% | 29% | 31% | 31% |
| 9718 | 1.00% | 0.25% | 9.00% | 0.25% | 0.00% | 32% | 42% | 30% | 39% | 30% | 39% | 38% | 49% | 33% | 43% | 31% | 31% | 34% | 34% |
| 9719 | 9.00% | 0.25% | 9.00% | 0.25% | 0.00% | 28% | 36% | 28% | 36% | 25% | 33% | 35% | 46% | 30% | 39% | 27% | 27% | 30% | 30% |
| 9720 | 0.00% | 1.00% | 9.00% | 0.25% | 0.00% | 31% | 40% | 31% | 40% | 29% | 38% | 38% | 49% | 33% | 43% | 30% | 30% | 33% | 33% |
| 9721 | 0.25% | 1.00% | 9.00% | 0.25% | 0.00% | 33% | 43% | 32% | 42% | 31% | 40% | 39% | 51% | 34% | 44% | 32% | 32% | 35% | 35% |
| 9722 | 9.00% | 1.00% | 9.00% | 0.25% | 0.00% | 31% | 40% | 31% | 40% | 29% | 38% | 38% | 49% | 33% | 43% | 30% | 30% | 33% | 33% |
| 9723 | 1.00% | 9.00% | 9.00% | 0.25% | 0.00% | 43% | 56% | 41% | 53% | 40% | 52% | 48% | 62% | 43% | 56% | 41% | 41% | 44% | 44% |
| 9724 | 0.25% | 0.00% | 0.00% | 1.00% | 0.00% | 22% | 29% | 22% | 29% | 20% | 26% | 21% | 27% | 23% | 30% | 21% | 21% | 21% | 21% |
| 9725 | 1.00% | 0.25% | 0.00% | 1.00% | 0.00% | 28% | 36% | 28% | 36% | 27% | 35% | 28% | 36% | 29% | 38% | 28% | 28% | 28% | 28% |
| 9726 | 0.00% | 1.00% | 0.00% | 1.00% | 0.00% | 27% | 35% | 29% | 38% | 26% | 34% | 28% | 36% | 29% | 38% | 27% | 27% | 28% | 28% |
| 9727 | 0.25% | 1.00% | 0.00% | 1.00% | 0.00% | 29% | 38% | 30% | 39% | 28% | 36% | 29% | 38% | 30% | 39% | 29% | 29% | 29% | 29% |
| 9728 | 1.00% | 1.00% | 0.00% | 1.00% | 0.00% | 31% | 40% | 31% | 40% | 31% | 40% | 31% | 40% | 32% | 42% | 31% | 31% | 31% | 31% |
| 9729 | 0.00% | 0.00% | 0.25% | 1.00% | 0.00% | 24% | 31% | 27% | 35% | 22% | 29% | 23% | 30% | 27% | 35% | 24% | 24% | 24% | 24% |
| 9730 | 1.00% | 0.00% | 0.25% | 1.00% | 0.00% | 28% | 36% | 29% | 38% | 27% | 35% | 26% | 34% | 30% | 39% | 28% | 28% | 28% | 28% |
| 9731 | 0.25% | 0.25% | 0.25% | 1.00% | 0.00% | 30% | 39% | 33% | 43% | 28% | 36% | 29% | 38% | 32% | 42% | 30% | 30% | 30% | 30% |
| 9732 | 1.00% | 0.25% | 0.25% | 1.00% | 0.00% | 32% | 42% | 34% | 44% | 31% | 40% | 31% | 40% | 34% | 44% | 32% | 32% | 32% | 32% |
| 9733 | 9.00% | 0.25% | 0.25% | 1.00% | 0.00% | 28% | 36% | 32% | 42% | 26% | 34% | 28% | 36% | 31% | 40% | 29% | 29% | 28% | 28% |
| 9734 | 0.00% | 1.00% | 0.25% | 1.00% | 0.00% | 31% | 40% | 35% | 46% | 30% | 39% | 31% | 40% | 34% | 44% | 32% | 32% | 32% | 32% |
| 9735 | 0.25% | 1.00% | 0.25% | 1.00% | 0.00% | 33% | 43% | 36% | 47% | 32% | 42% | 32% | 42% | 35% | 46% | 34% | 34% | 33% | 33% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9736 | 1.00% | 1.00% | 0.25% | 1.00% | 0.00% | 35% | 46% | 37% | 48% | 35% | 46% | 34% | 44% | 37% | 48% | 36% | 36% | 35% | 35% |
| 9737 | 9.00% | 1.00% | 0.25% | 1.00% | 0.00% | 31% | 40% | 35% | 46% | 30% | 39% | 31% | 40% | 34% | 44% | 32% | 32% | 32% | 32% |
| 9738 | 0.25% | 9.00% | 0.25% | 1.00% | 0.00% | 41% | 53% | 44% | 57% | 38% | 49% | 39% | 51% | 42% | 55% | 41% | 41% | 40% | 40% |
| 9739 | 1.00% | 9.00% | 0.25% | 1.00% | 0.00% | 43% | 56% | 45% | 59% | 41% | 53% | 41% | 53% | 44% | 57% | 43% | 43% | 42% | 42% |
| 9740 | 9.00% | 9.00% | 0.25% | 1.00% | 0.00% | 39% | 51% | 43% | 56% | 36% | 47% | 38% | 49% | 41% | 53% | 39% | 39% | 38% | 38% |
| 9741 | 0.00% | 0.00% | 1.00% | 1.00% | 0.00% | 29% | 38% | 30% | 39% | 28% | 36% | 29% | 38% | 31% | 40% | 29% | 29% | 29% | 29% |
| 9742 | 0.25% | 0.00% | 1.00% | 1.00% | 0.00% | 31% | 40% | 31% | 40% | 30% | 39% | 30% | 39% | 32% | 42% | 31% | 31% | 31% | 31% |
| 9743 | 1.00% | 0.00% | 1.00% | 1.00% | 0.00% | 33% | 43% | 32% | 42% | 33% | 43% | 32% | 42% | 34% | 44% | 33% | 33% | 33% | 33% |
| 9744 | 0.00% | 0.25% | 1.00% | 1.00% | 0.00% | 33% | 43% | 35% | 46% | 32% | 42% | 34% | 44% | 35% | 46% | 33% | 33% | 34% | 34% |
| 9745 | 1.00% | 0.25% | 1.00% | 1.00% | 0.00% | 37% | 48% | 37% | 48% | 37% | 48% | 37% | 48% | 38% | 49% | 37% | 37% | 37% | 37% |
| 9746 | 9.00% | 0.25% | 1.00% | 1.00% | 0.00% | 33% | 43% | 35% | 46% | 32% | 42% | 34% | 44% | 35% | 46% | 33% | 33% | 34% | 34% |
| 9747 | 0.00% | 1.00% | 1.00% | 1.00% | 0.00% | 36% | 47% | 38% | 49% | 36% | 47% | 37% | 48% | 38% | 49% | 37% | 37% | 37% | 37% |
| 9748 | 0.25% | 1.00% | 1.00% | 1.00% | 0.00% | 38% | 49% | 39% | 51% | 38% | 49% | 38% | 49% | 39% | 51% | 38% | 38% | 38% | 38% |
| 9749 | 1.00% | 1.00% | 1.00% | 1.00% | 0.00% | 40% | 52% | 40% | 52% | 41% | 53% | 40% | 52% | 41% | 53% | 40% | 40% | 41% | 41% |
| 9750 | 9.00% | 1.00% | 1.00% | 1.00% | 0.00% | 36% | 47% | 38% | 49% | 36% | 47% | 37% | 48% | 38% | 49% | 37% | 37% | 37% | 37% |
| 9751 | 0.00% | 9.00% | 1.00% | 1.00% | 0.00% | 44% | 57% | 46% | 60% | 42% | 55% | 44% | 57% | 45% | 59% | 44% | 44% | 44% | 44% |
| 9752 | 0.25% | 9.00% | 1.00% | 1.00% | 0.00% | 46% | 60% | 47% | 61% | 44% | 57% | 45% | 59% | 46% | 60% | 46% | 46% | 45% | 45% |
| 9753 | 1.00% | 9.00% | 1.00% | 1.00% | 0.00% | 48% | 62% | 48% | 62% | 47% | 61% | 47% | 61% | 48% | 62% | 48% | 48% | 47% | 47% |
| 9754 | 0.25% | 0.25% | 9.00% | 1.00% | 0.00% | 45% | 59% | 41% | 53% | 39% | 51% | 46% | 60% | 46% | 60% | 42% | 42% | 44% | 44% |
| 9755 | 1.00% | 0.25% | 9.00% | 1.00% | 0.00% | 47% | 61% | 42% | 55% | 42% | 55% | 48% | 62% | 48% | 62% | 44% | 44% | 46% | 46% |
| 9756 | 9.00% | 0.25% | 9.00% | 1.00% | 0.00% | 43% | 56% | 40% | 52% | 37% | 48% | 45% | 59% | 45% | 59% | 40% | 40% | 42% | 42% |
| 9757 | 0.25% | 1.00% | 9.00% | 1.00% | 0.00% | 48% | 62% | 44% | 57% | 43% | 56% | 49% | 64% | 49% | 64% | 45% | 45% | 47% | 47% |
| 9758 | 0.00% | 0.25% | 0.00% | 9.00% | 0.00% | 44% | 57% | 40% | 52% | 40% | 52% | 45% | 59% | 39% | 51% | 41% | 41% | 41% | 41% |
| 9759 | 0.00% | 0.00% | 0.25% | 9.00% | 0.00% | 44% | 57% | 41% | 53% | 40% | 52% | 43% | 56% | 40% | 52% | 42% | 42% | 41% | 41% |
| 9760 | 0.25% | 0.00% | 0.25% | 9.00% | 0.00% | 46% | 60% | 42% | 55% | 42% | 55% | 44% | 57% | 41% | 53% | 43% | 43% | 42% | 42% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9761 | 0.00% | 0.25% | 0.25% | 9.00% | 0.00% | 48% | 62% | 46% | 60% | 44% | 57% | 48% | 62% | 44% | 57% | 46% | 46% | 45% | 45% |
| 9762 | 0.25% | 0.25% | 0.25% | 9.00% | 0.00% | 50% | 65% | 47% | 61% | 46% | 60% | 49% | 64% | 45% | 59% | 48% | 48% | 47% | 47% |
| 9763 | 1.00% | 0.25% | 0.25% | 9.00% | 0.00% | 52% | 68% | 48% | 62% | 49% | 64% | 51% | 66% | 47% | 61% | 50% | 50% | 49% | 49% |
| 9764 | 9.00% | 0.25% | 0.25% | 9.00% | 0.00% | 48% | 62% | 46% | 60% | 44% | 57% | 48% | 62% | 44% | 57% | 46% | 46% | 45% | 45% |
| 9765 | 0.00% | 1.00% | 0.25% | 9.00% | 0.00% | 51% | 66% | 49% | 64% | 48% | 62% | 51% | 66% | 47% | 61% | 49% | 49% | 49% | 49% |
| 9766 | 0.25% | 1.00% | 0.25% | 9.00% | 0.00% | 53% | 69% | 50% | 65% | 50% | 65% | 52% | 68% | 48% | 62% | 51% | 51% | 50% | 50% |
| 9767 | 1.00% | 1.00% | 0.25% | 9.00% | 0.00% | 55% | 72% | 51% | 66% | 53% | 69% | 54% | 70% | 50% | 65% | 53% | 53% | 52% | 52% |
| 9768 | 0.25% | 9.00% | 0.25% | 9.00% | 0.00% | 61% | 79% | 58% | 75% | 56% | 73% | 59% | 77% | 55% | 72% | 58% | 58% | 57% | 57% |
| 9769 | 0.25% | 0.00% | 1.00% | 9.00% | 0.00% | 51% | 66% | 45% | 59% | 48% | 62% | 50% | 65% | 45% | 59% | 48% | 48% | 48% | 48% |
| 9770 | 1.00% | 0.25% | 1.00% | 9.00% | 0.00% | 57% | 74% | 51% | 66% | 55% | 72% | 57% | 74% | 51% | 66% | 54% | 54% | 54% | 54% |
| 9771 | 9.00% | 0.25% | 1.00% | 9.00% | 0.00% | 53% | 69% | 49% | 64% | 50% | 65% | 54% | 70% | 48% | 62% | 51% | 51% | 51% | 51% |
| 9772 | 0.00% | 1.00% | 1.00% | 9.00% | 0.00% | 56% | 73% | 52% | 68% | 54% | 70% | 57% | 74% | 51% | 66% | 54% | 54% | 54% | 54% |
| 9773 | 0.25% | 1.00% | 1.00% | 9.00% | 0.00% | 58% | 75% | 53% | 69% | 56% | 73% | 58% | 75% | 52% | 68% | 56% | 56% | 55% | 55% |
| 9774 | 1.00% | 1.00% | 1.00% | 9.00% | 0.00% | 60% | 78% | 54% | 70% | 59% | 77% | 60% | 78% | 54% | 70% | 58% | 58% | 58% | 58% |
| 9775 | 0.25% | 0.25% | 9.00% | 9.00% | 0.00% | 65% | 85% | 55% | 72% | 57% | 74% | 66% | 86% | 59% | 77% | 59% | 59% | 61% | 61% |
| 9776 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 9777 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 9778 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 9779 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 9780 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 9781 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 9782 | 0.00% | 0.25% | 0.25% | 0.00% | 0.25% | 15% | 20% | 18% | 23% | 15% | 20% | 16% | 21% | 17% | 22% | 16% | 16% | 16% | 16% |
| 9783 | 0.25% | 0.25% | 0.25% | 0.00% | 0.25% | 17% | 22% | 19% | 25% | 17% | 22% | 17% | 22% | 18% | 23% | 18% | 18% | 17% | 17% |
| 9784 | 0.00% | 1.00% | 0.25% | 0.00% | 0.25% | 18% | 23% | 21% | 27% | 19% | 25% | 19% | 25% | 20% | 26% | 19% | 19% | 19% | 19% |
| 9785 | 1.00% | 1.00% | 0.25% | 0.00% | 0.25% | 22% | 29% | 23% | 30% | 24% | 31% | 22% | 29% | 23% | 30% | 23% | 23% | 23% | 23% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9786 | 1.00% | 9.00% | 0.25% | 0.00% | 0.25% | 30% | 39% | 31% | 40% | 30% | 39% | 29% | 38% | 30% | 39% | 30% | 30% | 30% | 30% |
| 9787 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 9788 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 9789 | 0.00% | 0.25% | 1.00% | 0.00% | 0.25% | 20% | 26% | 21% | 27% | 21% | 27% | 22% | 29% | 21% | 27% | 21% | 21% | 21% | 21% |
| 9790 | 1.00% | 0.25% | 1.00% | 0.00% | 0.25% | 24% | 31% | 23% | 30% | 26% | 34% | 25% | 33% | 24% | 31% | 24% | 24% | 25% | 25% |
| 9791 | 0.00% | 1.00% | 1.00% | 0.00% | 0.25% | 23% | 30% | 24% | 31% | 25% | 33% | 25% | 33% | 24% | 31% | 24% | 24% | 25% | 25% |
| 9792 | 0.25% | 1.00% | 1.00% | 0.00% | 0.25% | 25% | 33% | 25% | 33% | 27% | 35% | 26% | 34% | 25% | 33% | 26% | 26% | 26% | 26% |
| 9793 | 1.00% | 1.00% | 1.00% | 0.00% | 0.25% | 27% | 35% | 26% | 34% | 30% | 39% | 28% | 36% | 27% | 35% | 28% | 28% | 28% | 28% |
| 9794 | 9.00% | 1.00% | 1.00% | 0.00% | 0.25% | 23% | 30% | 24% | 31% | 25% | 33% | 25% | 33% | 24% | 31% | 24% | 24% | 25% | 25% |
| 9795 | 1.00% | 9.00% | 1.00% | 0.00% | 0.25% | 35% | 46% | 34% | 44% | 36% | 47% | 35% | 46% | 34% | 44% | 35% | 35% | 35% | 35% |
| 9796 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 9797 | 0.00% | 0.25% | 9.00% | 0.00% | 0.25% | 30% | 39% | 26% | 34% | 26% | 34% | 33% | 43% | 31% | 40% | 27% | 27% | 30% | 30% |
| 9798 | 0.25% | 0.25% | 9.00% | 0.00% | 0.25% | 32% | 42% | 27% | 35% | 28% | 36% | 34% | 44% | 32% | 42% | 29% | 29% | 31% | 31% |
| 9799 | 1.00% | 0.25% | 9.00% | 0.00% | 0.25% | 34% | 44% | 28% | 36% | 31% | 40% | 36% | 47% | 34% | 44% | 31% | 31% | 34% | 34% |
| 9800 | 0.25% | 1.00% | 9.00% | 0.00% | 0.25% | 35% | 46% | 30% | 39% | 32% | 42% | 37% | 48% | 35% | 46% | 32% | 32% | 35% | 35% |
| 9801 | 0.25% | 0.00% | 0.00% | 0.25% | 0.25% | 14% | 18% | 17% | 22% | 15% | 20% | 19% | 25% | 16% | 21% | 15% | 15% | 17% | 17% |
| 9802 | 1.00% | 0.00% | 0.00% | 0.25% | 0.25% | 16% | 21% | 18% | 23% | 18% | 23% | 21% | 27% | 18% | 23% | 17% | 17% | 19% | 19% |
| 9803 | 0.00% | 0.25% | 0.00% | 0.25% | 0.25% | 16% | 21% | 21% | 27% | 17% | 22% | 23% | 30% | 19% | 25% | 18% | 18% | 20% | 20% |
| 9804 | 0.25% | 0.25% | 0.00% | 0.25% | 0.25% | 18% | 23% | 22% | 29% | 19% | 25% | 24% | 31% | 20% | 26% | 20% | 20% | 21% | 21% |
| 9805 | 9.00% | 0.25% | 0.00% | 0.25% | 0.25% | 16% | 21% | 21% | 27% | 17% | 22% | 23% | 30% | 19% | 25% | 18% | 18% | 20% | 20% |
| 9806 | 1.00% | 1.00% | 0.00% | 0.25% | 0.25% | 23% | 30% | 26% | 34% | 26% | 34% | 29% | 38% | 25% | 33% | 25% | 25% | 27% | 27% |
| 9807 | 1.00% | 9.00% | 0.00% | 0.25% | 0.25% | 31% | 40% | 34% | 44% | 32% | 42% | 36% | 47% | 32% | 42% | 32% | 32% | 33% | 33% |
| 9808 | 0.00% | 0.00% | 0.25% | 0.25% | 0.25% | 16% | 21% | 22% | 29% | 17% | 22% | 21% | 27% | 20% | 26% | 18% | 18% | 19% | 19% |
| 9809 | 0.25% | 0.00% | 0.25% | 0.25% | 0.25% | 18% | 23% | 23% | 30% | 19% | 25% | 22% | 29% | 21% | 27% | 20% | 20% | 21% | 21% |
| 9810 | 0.00% | 0.25% | 0.25% | 0.25% | 0.25% | 20% | 26% | 27% | 35% | 21% | 27% | 26% | 34% | 24% | 31% | 23% | 23% | 24% | 24% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9811 | 0.25% | 0.25% | 0.25% | 0.25% | 0.25% | 22% | 29% | 28% | 36% | 23% | 30% | 27% | 35% | 25% | 33% | 24% | 24% | 25% | 25% |
| 9812 | 1.00% | 0.25% | 0.25% | 0.25% | 0.25% | 24% | 31% | 29% | 38% | 26% | 34% | 29% | 38% | 27% | 35% | 26% | 26% | 27% | 27% |
| 9813 | 9.00% | 0.25% | 0.25% | 0.25% | 0.25% | 20% | 26% | 27% | 35% | 21% | 27% | 26% | 34% | 24% | 31% | 23% | 23% | 24% | 24% |
| 9814 | 0.25% | 1.00% | 0.25% | 0.25% | 0.25% | 25% | 33% | 31% | 40% | 27% | 35% | 30% | 39% | 28% | 36% | 28% | 28% | 28% | 28% |
| 9815 | 9.00% | 1.00% | 0.25% | 0.25% | 0.25% | 23% | 30% | 30% | 39% | 25% | 33% | 29% | 38% | 27% | 35% | 26% | 26% | 27% | 27% |
| 9816 | 0.25% | 9.00% | 0.25% | 0.25% | 0.25% | 33% | 43% | 39% | 51% | 33% | 43% | 37% | 48% | 35% | 46% | 35% | 35% | 35% | 35% |
| 9817 | 1.00% | 9.00% | 0.25% | 0.25% | 0.25% | 35% | 46% | 40% | 52% | 36% | 47% | 39% | 51% | 37% | 48% | 37% | 37% | 37% | 37% |
| 9818 | 9.00% | 9.00% | 0.25% | 0.25% | 0.25% | 31% | 40% | 38% | 49% | 31% | 40% | 36% | 47% | 34% | 44% | 33% | 33% | 34% | 34% |
| 9819 | 0.00% | 0.00% | 1.00% | 0.25% | 0.25% | 21% | 27% | 25% | 33% | 23% | 30% | 27% | 35% | 24% | 31% | 23% | 23% | 25% | 25% |
| 9820 | 1.00% | 0.00% | 1.00% | 0.25% | 0.25% | 25% | 33% | 27% | 35% | 28% | 36% | 30% | 39% | 27% | 35% | 27% | 27% | 28% | 28% |
| 9821 | 0.00% | 0.25% | 1.00% | 0.25% | 0.25% | 25% | 33% | 30% | 39% | 27% | 35% | 32% | 42% | 28% | 36% | 27% | 27% | 29% | 29% |
| 9822 | 0.25% | 0.25% | 1.00% | 0.25% | 0.25% | 27% | 35% | 31% | 40% | 29% | 38% | 33% | 43% | 29% | 38% | 29% | 29% | 30% | 30% |
| 9823 | 1.00% | 0.25% | 1.00% | 0.25% | 0.25% | 29% | 38% | 32% | 42% | 32% | 42% | 35% | 46% | 31% | 40% | 31% | 31% | 33% | 33% |
| 9824 | 9.00% | 0.25% | 1.00% | 0.25% | 0.25% | 25% | 33% | 30% | 39% | 27% | 35% | 32% | 42% | 28% | 36% | 27% | 27% | 29% | 29% |
| 9825 | 0.00% | 1.00% | 1.00% | 0.25% | 0.25% | 28% | 36% | 33% | 43% | 31% | 40% | 35% | 46% | 31% | 40% | 31% | 31% | 32% | 32% |
| 9826 | 0.25% | 1.00% | 1.00% | 0.25% | 0.25% | 30% | 39% | 34% | 44% | 33% | 43% | 36% | 47% | 32% | 42% | 32% | 32% | 34% | 34% |
| 9827 | 1.00% | 1.00% | 1.00% | 0.25% | 0.25% | 32% | 42% | 35% | 46% | 36% | 47% | 38% | 49% | 34% | 44% | 34% | 34% | 36% | 36% |
| 9828 | 9.00% | 1.00% | 1.00% | 0.25% | 0.25% | 28% | 36% | 33% | 43% | 31% | 40% | 35% | 46% | 31% | 40% | 31% | 31% | 32% | 32% |
| 9829 | 0.00% | 9.00% | 1.00% | 0.25% | 0.25% | 36% | 47% | 41% | 53% | 37% | 48% | 42% | 55% | 38% | 49% | 38% | 38% | 39% | 39% |
| 9830 | 0.25% | 9.00% | 1.00% | 0.25% | 0.25% | 38% | 49% | 42% | 55% | 39% | 51% | 43% | 56% | 39% | 51% | 40% | 40% | 40% | 40% |
| 9831 | 1.00% | 9.00% | 1.00% | 0.25% | 0.25% | 40% | 52% | 43% | 56% | 42% | 55% | 45% | 59% | 41% | 53% | 42% | 42% | 43% | 43% |
| 9832 | 0.25% | 0.25% | 9.00% | 0.25% | 0.25% | 37% | 48% | 36% | 47% | 34% | 44% | 44% | 57% | 39% | 51% | 36% | 36% | 39% | 39% |
| 9833 | 1.00% | 0.25% | 9.00% | 0.25% | 0.25% | 39% | 51% | 37% | 48% | 37% | 48% | 46% | 60% | 41% | 53% | 38% | 38% | 41% | 41% |
| 9834 | 9.00% | 0.25% | 9.00% | 0.25% | 0.25% | 35% | 46% | 35% | 46% | 32% | 42% | 43% | 56% | 38% | 49% | 34% | 34% | 38% | 38% |
| 9835 | 0.00% | 1.00% | 9.00% | 0.25% | 0.25% | 38% | 49% | 38% | 49% | 36% | 47% | 46% | 60% | 41% | 53% | 37% | 37% | 41% | 41% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9836 | 0.25% | 1.00% | 9.00% | 0.25% | 0.25% | 40% | 52% | 39% | 51% | 38% | 49% | 47% | 61% | 42% | 55% | 39% | 39% | 42% | 42% |
| 9837 | 9.00% | 1.00% | 9.00% | 0.25% | 0.25% | 38% | 49% | 38% | 49% | 36% | 47% | 46% | 60% | 41% | 53% | 37% | 37% | 41% | 41% |
| 9838 | 1.00% | 9.00% | 9.00% | 0.25% | 0.25% | 50% | 65% | 48% | 62% | 47% | 61% | 56% | 73% | 51% | 66% | 48% | 48% | 51% | 51% |
| 9839 | 0.25% | 0.00% | 0.00% | 1.00% | 0.25% | 29% | 38% | 29% | 38% | 27% | 35% | 29% | 38% | 31% | 40% | 28% | 28% | 29% | 29% |
| 9840 | 1.00% | 0.25% | 0.00% | 1.00% | 0.25% | 35% | 46% | 35% | 46% | 34% | 44% | 36% | 47% | 37% | 48% | 35% | 35% | 36% | 36% |
| 9841 | 0.00% | 1.00% | 0.00% | 1.00% | 0.25% | 34% | 44% | 36% | 47% | 33% | 43% | 36% | 47% | 37% | 48% | 34% | 34% | 35% | 35% |
| 9842 | 0.25% | 1.00% | 0.00% | 1.00% | 0.25% | 36% | 47% | 37% | 48% | 35% | 46% | 37% | 48% | 38% | 49% | 36% | 36% | 37% | 37% |
| 9843 | 1.00% | 1.00% | 0.00% | 1.00% | 0.25% | 38% | 49% | 38% | 49% | 38% | 49% | 39% | 51% | 40% | 52% | 38% | 38% | 39% | 39% |
| 9844 | 0.00% | 0.00% | 0.25% | 1.00% | 0.25% | 31% | 40% | 34% | 44% | 29% | 38% | 31% | 40% | 35% | 46% | 31% | 31% | 32% | 32% |
| 9845 | 1.00% | 0.00% | 0.25% | 1.00% | 0.25% | 35% | 46% | 36% | 47% | 34% | 44% | 34% | 44% | 38% | 49% | 35% | 35% | 35% | 35% |
| 9846 | 0.25% | 0.25% | 0.25% | 1.00% | 0.25% | 37% | 48% | 40% | 52% | 35% | 46% | 37% | 48% | 40% | 52% | 37% | 37% | 37% | 37% |
| 9847 | 1.00% | 0.25% | 0.25% | 1.00% | 0.25% | 39% | 51% | 41% | 53% | 38% | 49% | 39% | 51% | 42% | 55% | 39% | 39% | 40% | 40% |
| 9848 | 9.00% | 0.25% | 0.25% | 1.00% | 0.25% | 35% | 46% | 39% | 51% | 33% | 43% | 36% | 47% | 39% | 51% | 36% | 36% | 36% | 36% |
| 9849 | 0.00% | 1.00% | 0.25% | 1.00% | 0.25% | 38% | 49% | 42% | 55% | 37% | 48% | 39% | 51% | 42% | 55% | 39% | 39% | 39% | 39% |
| 9850 | 0.25% | 1.00% | 0.25% | 1.00% | 0.25% | 40% | 52% | 43% | 56% | 39% | 51% | 40% | 52% | 43% | 56% | 41% | 41% | 41% | 41% |
| 9851 | 1.00% | 1.00% | 0.25% | 1.00% | 0.25% | 42% | 55% | 44% | 57% | 42% | 55% | 42% | 55% | 45% | 59% | 43% | 43% | 43% | 43% |
| 9852 | 9.00% | 1.00% | 0.25% | 1.00% | 0.25% | 38% | 49% | 42% | 55% | 37% | 48% | 39% | 51% | 42% | 55% | 39% | 39% | 39% | 39% |
| 9853 | 0.25% | 9.00% | 0.25% | 1.00% | 0.25% | 48% | 62% | 51% | 66% | 45% | 59% | 47% | 61% | 50% | 65% | 48% | 48% | 47% | 47% |
| 9854 | 1.00% | 9.00% | 0.25% | 1.00% | 0.25% | 50% | 65% | 52% | 68% | 48% | 62% | 49% | 64% | 52% | 68% | 50% | 50% | 50% | 50% |
| 9855 | 9.00% | 9.00% | 0.25% | 1.00% | 0.25% | 46% | 60% | 50% | 65% | 43% | 56% | 46% | 60% | 49% | 64% | 46% | 46% | 46% | 46% |
| 9856 | 0.00% | 0.00% | 1.00% | 1.00% | 0.25% | 36% | 47% | 37% | 48% | 35% | 46% | 37% | 48% | 39% | 51% | 36% | 36% | 37% | 37% |
| 9857 | 0.25% | 0.00% | 1.00% | 1.00% | 0.25% | 38% | 49% | 38% | 49% | 37% | 48% | 38% | 49% | 40% | 52% | 38% | 38% | 38% | 38% |
| 9858 | 1.00% | 0.00% | 1.00% | 1.00% | 0.25% | 40% | 52% | 39% | 51% | 40% | 52% | 40% | 52% | 42% | 55% | 40% | 40% | 41% | 41% |
| 9859 | 0.00% | 0.25% | 1.00% | 1.00% | 0.25% | 40% | 52% | 42% | 55% | 39% | 51% | 42% | 55% | 43% | 56% | 40% | 40% | 41% | 41% |
| 9860 | 1.00% | 0.25% | 1.00% | 1.00% | 0.25% | 44% | 57% | 44% | 57% | 44% | 57% | 45% | 59% | 46% | 60% | 44% | 44% | 45% | 45% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9861 | 9.00% | 0.25% | 1.00% | 1.00% | 0.25% | 40% | 52% | 42% | 55% | 39% | 51% | 42% | 55% | 43% | 56% | 40% | 40% | 41% | 41% |
| 9862 | 0.00% | 1.00% | 1.00% | 1.00% | 0.25% | 43% | 56% | 45% | 59% | 43% | 56% | 45% | 59% | 46% | 60% | 44% | 44% | 45% | 45% |
| 9863 | 0.25% | 1.00% | 1.00% | 1.00% | 0.25% | 45% | 59% | 46% | 60% | 45% | 59% | 46% | 60% | 47% | 61% | 45% | 45% | 46% | 46% |
| 9864 | 1.00% | 1.00% | 1.00% | 1.00% | 0.25% | 47% | 61% | 47% | 61% | 48% | 62% | 48% | 62% | 49% | 64% | 47% | 47% | 48% | 48% |
| 9865 | 9.00% | 1.00% | 1.00% | 1.00% | 0.25% | 43% | 56% | 45% | 59% | 43% | 56% | 45% | 59% | 46% | 60% | 44% | 44% | 45% | 45% |
| 9866 | 0.00% | 9.00% | 1.00% | 1.00% | 0.25% | 51% | 66% | 53% | 69% | 49% | 64% | 52% | 68% | 53% | 69% | 51% | 51% | 51% | 51% |
| 9867 | 0.25% | 9.00% | 1.00% | 1.00% | 0.25% | 53% | 69% | 54% | 70% | 51% | 66% | 53% | 69% | 54% | 70% | 53% | 53% | 53% | 53% |
| 9868 | 1.00% | 9.00% | 1.00% | 1.00% | 0.25% | 55% | 72% | 55% | 72% | 54% | 70% | 55% | 72% | 56% | 73% | 55% | 55% | 55% | 55% |
| 9869 | 0.25% | 0.25% | 9.00% | 1.00% | 0.25% | 52% | 68% | 48% | 62% | 46% | 60% | 54% | 70% | 54% | 70% | 49% | 49% | 51% | 51% |
| 9870 | 1.00% | 0.25% | 9.00% | 1.00% | 0.25% | 54% | 70% | 49% | 64% | 49% | 64% | 56% | 73% | 56% | 73% | 51% | 51% | 54% | 54% |
| 9871 | 9.00% | 0.25% | 9.00% | 1.00% | 0.25% | 50% | 65% | 47% | 61% | 44% | 57% | 53% | 69% | 53% | 69% | 47% | 47% | 50% | 50% |
| 9872 | 0.25% | 1.00% | 9.00% | 1.00% | 0.25% | 55% | 72% | 51% | 66% | 50% | 65% | 57% | 74% | 57% | 74% | 52% | 52% | 55% | 55% |
| 9873 | 0.00% | 0.25% | 0.00% | 9.00% | 0.25% | 51% | 66% | 47% | 61% | 47% | 61% | 53% | 69% | 47% | 61% | 48% | 48% | 49% | 49% |
| 9874 | 0.00% | 0.00% | 0.25% | 9.00% | 0.25% | 51% | 66% | 48% | 62% | 47% | 61% | 51% | 66% | 48% | 62% | 49% | 49% | 49% | 49% |
| 9875 | 0.25% | 0.00% | 0.25% | 9.00% | 0.25% | 53% | 69% | 49% | 64% | 49% | 64% | 52% | 68% | 49% | 64% | 50% | 50% | 50% | 50% |
| 9876 | 0.00% | 0.25% | 0.25% | 9.00% | 0.25% | 55% | 72% | 53% | 69% | 51% | 66% | 56% | 73% | 52% | 68% | 53% | 53% | 53% | 53% |
| 9877 | 0.25% | 0.25% | 0.25% | 9.00% | 0.25% | 57% | 74% | 54% | 70% | 53% | 69% | 57% | 74% | 53% | 69% | 55% | 55% | 54% | 54% |
| 9878 | 1.00% | 0.25% | 0.25% | 9.00% | 0.25% | 59% | 77% | 55% | 72% | 56% | 73% | 59% | 77% | 55% | 72% | 57% | 57% | 57% | 57% |
| 9879 | 9.00% | 0.25% | 0.25% | 9.00% | 0.25% | 55% | 72% | 53% | 69% | 51% | 66% | 56% | 73% | 52% | 68% | 53% | 53% | 53% | 53% |
| 9880 | 0.00% | 1.00% | 0.25% | 9.00% | 0.25% | 58% | 75% | 56% | 73% | 55% | 72% | 59% | 77% | 55% | 72% | 56% | 56% | 56% | 56% |
| 9881 | 0.25% | 1.00% | 0.25% | 9.00% | 0.25% | 60% | 78% | 57% | 74% | 57% | 74% | 60% | 78% | 56% | 73% | 58% | 58% | 58% | 58% |
| 9882 | 1.00% | 1.00% | 0.25% | 9.00% | 0.25% | 62% | 81% | 58% | 75% | 60% | 78% | 62% | 81% | 58% | 75% | 60% | 60% | 60% | 60% |
| 9883 | 0.25% | 9.00% | 0.25% | 9.00% | 0.25% | 68% | 88% | 65% | 85% | 63% | 82% | 67% | 87% | 63% | 82% | 65% | 65% | 64% | 64% |
| 9884 | 0.25% | 0.00% | 1.00% | 9.00% | 0.25% | 58% | 75% | 52% | 68% | 55% | 72% | 58% | 75% | 53% | 69% | 55% | 55% | 55% | 55% |
| 9885 | 1.00% | 0.25% | 1.00% | 9.00% | 0.25% | 64% | 83% | 58% | 75% | 62% | 81% | 65% | 85% | 59% | 77% | 61% | 61% | 62% | 62% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9886 | 9.00% | 0.25% | 1.00% | 9.00% | 0.25% | 60% | 78% | 56% | 73% | 57% | 74% | 62% | 81% | 56% | 73% | 58% | 58% | 58% | 58% |
| 9887 | 0.00% | 1.00% | 1.00% | 9.00% | 0.25% | 63% | 82% | 59% | 77% | 61% | 79% | 65% | 85% | 59% | 77% | 61% | 61% | 62% | 62% |
| 9888 | 0.25% | 1.00% | 1.00% | 9.00% | 0.25% | 65% | 85% | 60% | 78% | 63% | 82% | 66% | 86% | 60% | 78% | 63% | 63% | 63% | 63% |
| 9889 | 1.00% | 1.00% | 1.00% | 9.00% | 0.25% | 67% | 87% | 61% | 79% | 66% | 86% | 68% | 88% | 62% | 81% | 65% | 65% | 65% | 65% |
| 9890 | 0.25% | 0.25% | 9.00% | 9.00% | 0.25% | 72% | 94% | 62% | 81% | 64% | 83% | 74% | 96% | 67% | 87% | 66% | 66% | 68% | 68% |
| 9891 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 9892 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 9893 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 9894 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 9895 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 9896 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 9897 | 0.00% | 0.25% | 0.25% | 0.00% | 1.00% | 23% | 30% | 27% | 35% | 24% | 31% | 22% | 29% | 28% | 36% | 25% | 25% | 25% | 25% |
| 9898 | 0.25% | 0.25% | 0.25% | 0.00% | 1.00% | 25% | 33% | 28% | 36% | 26% | 34% | 23% | 30% | 29% | 38% | 26% | 26% | 26% | 26% |
| 9899 | 0.00% | 1.00% | 0.25% | 0.00% | 1.00% | 26% | 34% | 30% | 39% | 28% | 36% | 25% | 33% | 31% | 40% | 28% | 28% | 28% | 28% |
| 9900 | 1.00% | 1.00% | 0.25% | 0.00% | 1.00% | 30% | 39% | 32% | 42% | 33% | 43% | 28% | 36% | 34% | 44% | 32% | 32% | 32% | 32% |
| 9901 | 1.00% | 9.00% | 0.25% | 0.00% | 1.00% | 38% | 49% | 40% | 52% | 39% | 51% | 35% | 46% | 41% | 53% | 39% | 39% | 38% | 38% |
| 9902 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 9903 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 9904 | 0.00% | 0.25% | 1.00% | 0.00% | 1.00% | 28% | 36% | 30% | 39% | 30% | 39% | 28% | 36% | 32% | 42% | 29% | 29% | 30% | 30% |
| 9905 | 1.00% | 0.25% | 1.00% | 0.00% | 1.00% | 32% | 42% | 32% | 42% | 35% | 46% | 31% | 40% | 35% | 46% | 33% | 33% | 34% | 34% |
| 9906 | 0.00% | 1.00% | 1.00% | 0.00% | 1.00% | 31% | 40% | 33% | 43% | 34% | 44% | 31% | 40% | 35% | 46% | 33% | 33% | 33% | 33% |
| 9907 | 0.25% | 1.00% | 1.00% | 0.00% | 1.00% | 33% | 43% | 34% | 44% | 36% | 47% | 32% | 42% | 36% | 47% | 34% | 34% | 35% | 35% |
| 9908 | 1.00% | 1.00% | 1.00% | 0.00% | 1.00% | 35% | 46% | 35% | 46% | 39% | 51% | 34% | 44% | 38% | 49% | 36% | 36% | 37% | 37% |
| 9909 | 9.00% | 1.00% | 1.00% | 0.00% | 1.00% | 31% | 40% | 33% | 43% | 34% | 44% | 31% | 40% | 35% | 46% | 33% | 33% | 33% | 33% |
| 9910 | 1.00% | 9.00% | 1.00% | 0.00% | 1.00% | 43% | 56% | 43% | 56% | 45% | 59% | 41% | 53% | 45% | 59% | 44% | 44% | 44% | 44% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9911 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 9912 | 0.00% | 0.25% | 9.00% | 0.00% | 1.00% | 38% | 49% | 35% | 46% | 35% | 46% | 39% | 51% | 42% | 55% | 36% | 36% | 39% | 39% |
| 9913 | 0.25% | 0.25% | 9.00% | 0.00% | 1.00% | 40% | 52% | 36% | 47% | 37% | 48% | 40% | 52% | 43% | 56% | 38% | 38% | 40% | 40% |
| 9914 | 1.00% | 0.25% | 9.00% | 0.00% | 1.00% | 42% | 55% | 37% | 48% | 40% | 52% | 42% | 55% | 45% | 59% | 40% | 40% | 42% | 42% |
| 9915 | 0.25% | 1.00% | 9.00% | 0.00% | 1.00% | 43% | 56% | 39% | 51% | 41% | 53% | 43% | 56% | 46% | 60% | 41% | 41% | 43% | 43% |
| 9916 | 0.25% | 0.00% | 0.00% | 0.25% | 1.00% | 22% | 29% | 26% | 34% | 24% | 31% | 25% | 33% | 27% | 35% | 24% | 24% | 25% | 25% |
| 9917 | 1.00% | 0.00% | 0.00% | 0.25% | 1.00% | 24% | 31% | 27% | 35% | 27% | 35% | 27% | 35% | 29% | 38% | 26% | 26% | 28% | 28% |
| 9918 | 0.00% | 0.25% | 0.00% | 0.25% | 1.00% | 24% | 31% | 30% | 39% | 26% | 34% | 29% | 38% | 30% | 39% | 27% | 27% | 28% | 28% |
| 9919 | 0.25% | 0.25% | 0.00% | 0.25% | 1.00% | 26% | 34% | 31% | 40% | 28% | 36% | 30% | 39% | 31% | 40% | 28% | 28% | 30% | 30% |
| 9920 | 9.00% | 0.25% | 0.00% | 0.25% | 1.00% | 24% | 31% | 30% | 39% | 26% | 34% | 29% | 38% | 30% | 39% | 27% | 27% | 28% | 28% |
| 9921 | 1.00% | 1.00% | 0.00% | 0.25% | 1.00% | 31% | 40% | 35% | 46% | 35% | 46% | 35% | 46% | 36% | 47% | 34% | 34% | 35% | 35% |
| 9922 | 1.00% | 9.00% | 0.00% | 0.25% | 1.00% | 39% | 51% | 43% | 56% | 41% | 53% | 42% | 55% | 43% | 56% | 41% | 41% | 42% | 42% |
| 9923 | 0.00% | 0.00% | 0.25% | 0.25% | 1.00% | 24% | 31% | 31% | 40% | 26% | 34% | 27% | 35% | 31% | 40% | 27% | 27% | 28% | 28% |
| 9924 | 0.25% | 0.00% | 0.25% | 0.25% | 1.00% | 26% | 34% | 32% | 42% | 28% | 36% | 28% | 36% | 32% | 42% | 29% | 29% | 29% | 29% |
| 9925 | 0.00% | 0.25% | 0.25% | 0.25% | 1.00% | 28% | 36% | 36% | 47% | 30% | 39% | 32% | 42% | 35% | 46% | 31% | 31% | 32% | 32% |
| 9926 | 0.25% | 0.25% | 0.25% | 0.25% | 1.00% | 30% | 39% | 37% | 48% | 32% | 42% | 33% | 43% | 36% | 47% | 33% | 33% | 34% | 34% |
| 9927 | 1.00% | 0.25% | 0.25% | 0.25% | 1.00% | 32% | 42% | 38% | 49% | 35% | 46% | 35% | 46% | 38% | 49% | 35% | 35% | 36% | 36% |
| 9928 | 9.00% | 0.25% | 0.25% | 0.25% | 1.00% | 28% | 36% | 36% | 47% | 30% | 39% | 32% | 42% | 35% | 46% | 31% | 31% | 32% | 32% |
| 9929 | 0.25% | 1.00% | 0.25% | 0.25% | 1.00% | 33% | 43% | 40% | 52% | 36% | 47% | 36% | 47% | 39% | 51% | 36% | 36% | 37% | 37% |
| 9930 | 9.00% | 1.00% | 0.25% | 0.25% | 1.00% | 31% | 40% | 39% | 51% | 34% | 44% | 35% | 46% | 38% | 49% | 35% | 35% | 36% | 36% |
| 9931 | 0.25% | 9.00% | 0.25% | 0.25% | 1.00% | 41% | 53% | 48% | 62% | 42% | 55% | 43% | 56% | 46% | 60% | 44% | 44% | 44% | 44% |
| 9932 | 1.00% | 9.00% | 0.25% | 0.25% | 1.00% | 43% | 56% | 49% | 64% | 45% | 59% | 45% | 59% | 48% | 62% | 46% | 46% | 46% | 46% |
| 9933 | 9.00% | 9.00% | 0.25% | 0.25% | 1.00% | 39% | 51% | 47% | 61% | 40% | 52% | 42% | 55% | 45% | 59% | 42% | 42% | 42% | 42% |
| 9934 | 0.00% | 0.00% | 1.00% | 0.25% | 1.00% | 29% | 38% | 34% | 44% | 32% | 42% | 33% | 43% | 35% | 46% | 32% | 32% | 33% | 33% |
| 9935 | 1.00% | 0.00% | 1.00% | 0.25% | 1.00% | 33% | 43% | 36% | 47% | 37% | 48% | 36% | 47% | 38% | 49% | 35% | 35% | 37% | 37% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9936 | 0.00% | 0.25% | 1.00% | 0.25% | 1.00% | 33% | 43% | 39% | 51% | 36% | 47% | 38% | 49% | 39% | 51% | 36% | 36% | 38% | 38% |
| 9937 | 0.25% | 0.25% | 1.00% | 0.25% | 1.00% | 35% | 46% | 40% | 52% | 38% | 49% | 39% | 51% | 40% | 52% | 38% | 38% | 39% | 39% |
| 9938 | 1.00% | 0.25% | 1.00% | 0.25% | 1.00% | 37% | 48% | 41% | 53% | 41% | 53% | 41% | 53% | 42% | 55% | 40% | 40% | 41% | 41% |
| 9939 | 9.00% | 0.25% | 1.00% | 0.25% | 1.00% | 33% | 43% | 39% | 51% | 36% | 47% | 38% | 49% | 39% | 51% | 36% | 36% | 38% | 38% |
| 9940 | 0.00% | 1.00% | 1.00% | 0.25% | 1.00% | 36% | 47% | 42% | 55% | 40% | 52% | 41% | 53% | 42% | 55% | 39% | 39% | 41% | 41% |
| 9941 | 0.25% | 1.00% | 1.00% | 0.25% | 1.00% | 38% | 49% | 43% | 56% | 42% | 55% | 42% | 55% | 43% | 56% | 41% | 41% | 42% | 42% |
| 9942 | 1.00% | 1.00% | 1.00% | 0.25% | 1.00% | 40% | 52% | 44% | 57% | 45% | 59% | 44% | 57% | 45% | 59% | 43% | 43% | 45% | 45% |
| 9943 | 9.00% | 1.00% | 1.00% | 0.25% | 1.00% | 36% | 47% | 42% | 55% | 40% | 52% | 41% | 53% | 42% | 55% | 39% | 39% | 41% | 41% |
| 9944 | 0.00% | 9.00% | 1.00% | 0.25% | 1.00% | 44% | 57% | 50% | 65% | 46% | 60% | 48% | 62% | 49% | 64% | 47% | 47% | 48% | 48% |
| 9945 | 0.25% | 9.00% | 1.00% | 0.25% | 1.00% | 46% | 60% | 51% | 66% | 48% | 62% | 49% | 64% | 50% | 65% | 48% | 48% | 49% | 49% |
| 9946 | 1.00% | 9.00% | 1.00% | 0.25% | 1.00% | 48% | 62% | 52% | 68% | 51% | 66% | 51% | 66% | 52% | 68% | 50% | 50% | 51% | 51% |
| 9947 | 0.25% | 0.25% | 9.00% | 0.25% | 1.00% | 45% | 59% | 45% | 59% | 43% | 56% | 50% | 65% | 50% | 65% | 44% | 44% | 48% | 48% |
| 9948 | 1.00% | 0.25% | 9.00% | 0.25% | 1.00% | 47% | 61% | 46% | 60% | 46% | 60% | 52% | 68% | 52% | 68% | 46% | 46% | 50% | 50% |
| 9949 | 9.00% | 0.25% | 9.00% | 0.25% | 1.00% | 43% | 56% | 44% | 57% | 41% | 53% | 49% | 64% | 49% | 64% | 43% | 43% | 46% | 46% |
| 9950 | 0.00% | 1.00% | 9.00% | 0.25% | 1.00% | 46% | 60% | 47% | 61% | 45% | 59% | 52% | 68% | 52% | 68% | 46% | 46% | 50% | 50% |
| 9951 | 0.25% | 1.00% | 9.00% | 0.25% | 1.00% | 48% | 62% | 48% | 62% | 47% | 61% | 53% | 69% | 53% | 69% | 48% | 48% | 51% | 51% |
| 9952 | 9.00% | 1.00% | 9.00% | 0.25% | 1.00% | 46% | 60% | 47% | 61% | 45% | 59% | 52% | 68% | 52% | 68% | 46% | 46% | 50% | 50% |
| 9953 | 1.00% | 9.00% | 9.00% | 0.25% | 1.00% | 58% | 75% | 57% | 74% | 56% | 73% | 62% | 81% | 62% | 81% | 57% | 57% | 60% | 60% |
| 9954 | 0.25% | 0.00% | 0.00% | 1.00% | 1.00% | 37% | 48% | 38% | 49% | 36% | 47% | 35% | 46% | 42% | 55% | 37% | 37% | 38% | 38% |
| 9955 | 1.00% | 0.25% | 0.00% | 1.00% | 1.00% | 43% | 56% | 44% | 57% | 43% | 56% | 42% | 55% | 48% | 62% | 43% | 43% | 44% | 44% |
| 9956 | 0.00% | 1.00% | 0.00% | 1.00% | 1.00% | 42% | 55% | 45% | 59% | 42% | 55% | 42% | 55% | 48% | 62% | 43% | 43% | 44% | 44% |
| 9957 | 0.25% | 1.00% | 0.00% | 1.00% | 1.00% | 44% | 57% | 46% | 60% | 44% | 57% | 43% | 56% | 49% | 64% | 45% | 45% | 45% | 45% |
| 9958 | 1.00% | 1.00% | 0.00% | 1.00% | 1.00% | 46% | 60% | 47% | 61% | 47% | 61% | 45% | 59% | 51% | 66% | 47% | 47% | 48% | 48% |
| 9959 | 0.00% | 0.00% | 0.25% | 1.00% | 1.00% | 39% | 51% | 43% | 56% | 38% | 49% | 37% | 48% | 46% | 60% | 40% | 40% | 40% | 40% |
| 9960 | 1.00% | 0.00% | 0.25% | 1.00% | 1.00% | 43% | 56% | 45% | 59% | 43% | 56% | 40% | 52% | 49% | 64% | 44% | 44% | 44% | 44% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9961 | 0.25% | 0.25% | 0.25% | 1.00% | 1.00% | 45% | 59% | 49% | 64% | 44% | 57% | 43% | 56% | 51% | 66% | 46% | 46% | 46% | 46% |
| 9962 | 1.00% | 0.25% | 0.25% | 1.00% | 1.00% | 47% | 61% | 50% | 65% | 47% | 61% | 45% | 59% | 53% | 69% | 48% | 48% | 48% | 48% |
| 9963 | 9.00% | 0.25% | 0.25% | 1.00% | 1.00% | 43% | 56% | 48% | 62% | 42% | 55% | 42% | 55% | 50% | 65% | 44% | 44% | 45% | 45% |
| 9964 | 0.00% | 1.00% | 0.25% | 1.00% | 1.00% | 46% | 60% | 51% | 66% | 46% | 60% | 45% | 59% | 53% | 69% | 48% | 48% | 48% | 48% |
| 9965 | 0.25% | 1.00% | 0.25% | 1.00% | 1.00% | 48% | 62% | 52% | 68% | 48% | 62% | 46% | 60% | 54% | 70% | 49% | 49% | 49% | 49% |
| 9966 | 1.00% | 1.00% | 0.25% | 1.00% | 1.00% | 50% | 65% | 53% | 69% | 51% | 66% | 48% | 62% | 56% | 73% | 51% | 51% | 52% | 52% |
| 9967 | 9.00% | 1.00% | 0.25% | 1.00% | 1.00% | 46% | 60% | 51% | 66% | 46% | 60% | 45% | 59% | 53% | 69% | 48% | 48% | 48% | 48% |
| 9968 | 0.25% | 9.00% | 0.25% | 1.00% | 1.00% | 56% | 73% | 60% | 78% | 54% | 70% | 53% | 69% | 61% | 79% | 57% | 57% | 56% | 56% |
| 9969 | 1.00% | 9.00% | 0.25% | 1.00% | 1.00% | 58% | 75% | 61% | 79% | 57% | 74% | 55% | 72% | 63% | 82% | 59% | 59% | 58% | 58% |
| 9970 | 9.00% | 9.00% | 0.25% | 1.00% | 1.00% | 54% | 70% | 59% | 77% | 52% | 68% | 52% | 68% | 60% | 78% | 55% | 55% | 55% | 55% |
| 9971 | 0.00% | 0.00% | 1.00% | 1.00% | 1.00% | 44% | 57% | 46% | 60% | 44% | 57% | 43% | 56% | 50% | 65% | 45% | 45% | 46% | 46% |
| 9972 | 0.25% | 0.00% | 1.00% | 1.00% | 1.00% | 46% | 60% | 47% | 61% | 46% | 60% | 44% | 57% | 51% | 66% | 46% | 46% | 47% | 47% |
| 9973 | 1.00% | 0.00% | 1.00% | 1.00% | 1.00% | 48% | 62% | 48% | 62% | 49% | 64% | 46% | 60% | 53% | 69% | 48% | 48% | 49% | 49% |
| 9974 | 0.00% | 0.25% | 1.00% | 1.00% | 1.00% | 48% | 62% | 51% | 66% | 48% | 62% | 48% | 62% | 54% | 70% | 49% | 49% | 50% | 50% |
| 9975 | 1.00% | 0.25% | 1.00% | 1.00% | 1.00% | 52% | 68% | 53% | 69% | 53% | 69% | 51% | 66% | 57% | 74% | 53% | 53% | 54% | 54% |
| 9976 | 9.00% | 0.25% | 1.00% | 1.00% | 1.00% | 48% | 62% | 51% | 66% | 48% | 62% | 48% | 62% | 54% | 70% | 49% | 49% | 50% | 50% |
| 9977 | 0.00% | 1.00% | 1.00% | 1.00% | 1.00% | 51% | 66% | 54% | 70% | 52% | 68% | 51% | 66% | 57% | 74% | 52% | 52% | 53% | 53% |
| 9978 | 0.25% | 1.00% | 1.00% | 1.00% | 1.00% | 53% | 69% | 55% | 72% | 54% | 70% | 52% | 68% | 58% | 75% | 54% | 54% | 55% | 55% |
| 9979 | 1.00% | 1.00% | 1.00% | 1.00% | 1.00% | 55% | 72% | 56% | 73% | 57% | 74% | 54% | 70% | 60% | 78% | 56% | 56% | 57% | 57% |
| 9980 | 9.00% | 1.00% | 1.00% | 1.00% | 1.00% | 51% | 66% | 54% | 70% | 52% | 68% | 51% | 66% | 57% | 74% | 52% | 52% | 53% | 53% |
| 9981 | 0.00% | 9.00% | 1.00% | 1.00% | 1.00% | 59% | 77% | 62% | 81% | 58% | 75% | 58% | 75% | 64% | 83% | 60% | 60% | 60% | 60% |
| 9982 | 0.25% | 9.00% | 1.00% | 1.00% | 1.00% | 61% | 79% | 63% | 82% | 60% | 78% | 59% | 77% | 65% | 85% | 61% | 61% | 61% | 61% |
| 9983 | 1.00% | 9.00% | 1.00% | 1.00% | 1.00% | 63% | 82% | 64% | 83% | 63% | 82% | 61% | 79% | 67% | 87% | 63% | 63% | 64% | 64% |
| 9984 | 0.25% | 0.25% | 9.00% | 1.00% | 1.00% | 60% | 78% | 57% | 74% | 55% | 72% | 60% | 78% | 65% | 85% | 57% | 57% | 60% | 60% |
| 9985 | 1.00% | 0.25% | 9.00% | 1.00% | 1.00% | 62% | 81% | 58% | 75% | 58% | 75% | 62% | 81% | 67% | 87% | 59% | 59% | 62% | 62% |

Fig. 34

| Formula # | Delta Dodecalactone | Propyl Dihydrojasmonate | Methyl Dihydrojasmonate | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 9986 | 9.00% | 0.25% | 9.00% | 1.00% | 1.00% | 58% | 75% | 56% | 73% | 53% | 69% | 59% | 77% | 64% | 83% | 56% | 56% | 59% | 59% |
| 9987 | 0.25% | 1.00% | 9.00% | 1.00% | 1.00% | 63% | 82% | 60% | 78% | 59% | 77% | 63% | 82% | 68% | 88% | 61% | 61% | 63% | 63% |
| 9988 | 0.00% | 0.25% | 0.00% | 9.00% | 1.00% | 59% | 77% | 56% | 73% | 56% | 73% | 59% | 77% | 58% | 75% | 57% | 57% | 58% | 58% |
| 9989 | 0.00% | 0.00% | 0.25% | 9.00% | 1.00% | 59% | 77% | 57% | 74% | 56% | 73% | 57% | 74% | 59% | 77% | 57% | 57% | 57% | 57% |
| 9990 | 0.25% | 0.00% | 0.25% | 9.00% | 1.00% | 61% | 79% | 58% | 75% | 58% | 75% | 58% | 75% | 60% | 78% | 59% | 59% | 59% | 59% |
| 9991 | 0.00% | 0.25% | 0.25% | 9.00% | 1.00% | 63% | 82% | 62% | 81% | 60% | 78% | 62% | 81% | 63% | 82% | 62% | 62% | 62% | 62% |
| 9992 | 0.25% | 0.25% | 0.25% | 9.00% | 1.00% | 65% | 85% | 63% | 82% | 62% | 81% | 63% | 82% | 64% | 83% | 63% | 63% | 63% | 63% |
| 9993 | 1.00% | 0.25% | 0.25% | 9.00% | 1.00% | 67% | 87% | 64% | 83% | 65% | 85% | 65% | 85% | 66% | 86% | 65% | 65% | 65% | 65% |
| 9994 | 9.00% | 0.25% | 0.25% | 9.00% | 1.00% | 63% | 82% | 62% | 81% | 60% | 78% | 62% | 81% | 63% | 82% | 62% | 62% | 62% | 62% |
| 9995 | 0.00% | 1.00% | 0.25% | 9.00% | 1.00% | 66% | 86% | 65% | 85% | 64% | 83% | 65% | 85% | 66% | 86% | 65% | 65% | 65% | 65% |
| 9996 | 0.25% | 1.00% | 0.25% | 9.00% | 1.00% | 68% | 88% | 66% | 86% | 66% | 86% | 66% | 86% | 67% | 87% | 67% | 67% | 66% | 66% |
| 9997 | 1.00% | 1.00% | 0.25% | 9.00% | 1.00% | 70% | 91% | 67% | 87% | 69% | 90% | 68% | 88% | 69% | 90% | 69% | 69% | 69% | 69% |
| 9998 | 0.25% | 9.00% | 0.25% | 9.00% | 1.00% | 76% | 99% | 74% | 96% | 72% | 94% | 73% | 95% | 74% | 96% | 74% | 74% | 73% | 73% |
| 9999 | 0.25% | 0.00% | 1.00% | 9.00% | 1.00% | 66% | 86% | 61% | 79% | 64% | 83% | 64% | 83% | 64% | 83% | 64% | 64% | 64% | 64% |
| 10000 | 1.00% | 0.25% | 1.00% | 9.00% | 1.00% | 72% | 94% | 67% | 87% | 71% | 92% | 71% | 92% | 70% | 91% | 70% | 70% | 71% | 71% |
| 10001 | 9.00% | 0.25% | 1.00% | 9.00% | 1.00% | 68% | 88% | 65% | 85% | 66% | 86% | 68% | 88% | 67% | 87% | 66% | 66% | 67% | 67% |
| 10002 | 0.00% | 1.00% | 1.00% | 9.00% | 1.00% | 71% | 92% | 68% | 88% | 70% | 91% | 71% | 92% | 70% | 91% | 70% | 70% | 70% | 70% |
| 10003 | 0.25% | 1.00% | 1.00% | 9.00% | 1.00% | 73% | 95% | 69% | 90% | 72% | 94% | 72% | 94% | 71% | 92% | 71% | 71% | 72% | 72% |
| 10004 | 1.00% | 1.00% | 1.00% | 9.00% | 1.00% | 75% | 98% | 70% | 91% | 75% | 98% | 74% | 96% | 73% | 95% | 73% | 73% | 74% | 74% |
| 10005 | 0.25% | 0.25% | 9.00% | 9.00% | 1.00% | 80% | 100% | 71% | 100% | 73% | 100% | 80% | 100% | 78% | 100% | 75% | 75% | 77% | 77% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10006 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 10007 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 10008 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 10009 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 10010 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 10011 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 10012 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 10013 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 10014 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 10015 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 10016 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 10017 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 10018 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 10019 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 10020 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 10021 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 10022 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 10023 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 10024 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 10025 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 10026 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 10027 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 10028 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 10029 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 10030 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10031 | 0.25% | 0.00% | 0.00% | 0.25% | 0.00% | 5% | 7% | 7% | 9% | 4% | 5% | 6% | 8% | 6% | 8% | 5% | 5% | 5% | 5% |
| 10032 | 1.00% | 0.00% | 0.00% | 0.25% | 0.00% | 7% | 9% | 8% | 10% | 7% | 9% | 8% | 10% | 8% | 10% | 7% | 7% | 8% | 8% |
| 10033 | 0.00% | 0.25% | 0.00% | 0.25% | 0.00% | 7% | 9% | 11% | 14% | 6% | 8% | 10% | 13% | 9% | 12% | 8% | 8% | 8% | 8% |
| 10034 | 0.25% | 0.25% | 0.00% | 0.25% | 0.00% | 9% | 12% | 12% | 16% | 8% | 10% | 11% | 14% | 10% | 13% | 10% | 10% | 10% | 10% |
| 10035 | 9.00% | 0.25% | 0.00% | 0.25% | 0.00% | 7% | 9% | 11% | 14% | 6% | 8% | 10% | 13% | 9% | 12% | 8% | 8% | 8% | 8% |
| 10036 | 1.00% | 1.00% | 0.00% | 0.25% | 0.00% | 14% | 18% | 16% | 21% | 15% | 20% | 16% | 21% | 15% | 20% | 15% | 15% | 15% | 15% |
| 10037 | 1.00% | 9.00% | 0.00% | 0.25% | 0.00% | 22% | 29% | 24% | 31% | 21% | 27% | 23% | 30% | 22% | 29% | 22% | 22% | 22% | 22% |
| 10038 | 0.00% | 0.00% | 0.25% | 0.25% | 0.00% | 7% | 9% | 12% | 16% | 6% | 8% | 8% | 10% | 10% | 13% | 8% | 8% | 8% | 8% |
| 10039 | 0.25% | 0.00% | 0.25% | 0.25% | 0.00% | 9% | 12% | 13% | 17% | 8% | 10% | 9% | 12% | 11% | 14% | 10% | 10% | 9% | 9% |
| 10040 | 0.00% | 0.25% | 0.25% | 0.25% | 0.00% | 11% | 14% | 17% | 22% | 10% | 13% | 13% | 17% | 14% | 18% | 13% | 13% | 12% | 12% |
| 10041 | 0.25% | 0.25% | 0.25% | 0.25% | 0.00% | 13% | 17% | 18% | 23% | 12% | 16% | 14% | 18% | 15% | 20% | 14% | 14% | 14% | 14% |
| 10042 | 1.00% | 0.25% | 0.25% | 0.25% | 0.00% | 15% | 20% | 19% | 25% | 15% | 20% | 16% | 21% | 17% | 22% | 16% | 16% | 16% | 16% |
| 10043 | 9.00% | 0.25% | 0.25% | 0.25% | 0.00% | 11% | 14% | 17% | 22% | 10% | 13% | 13% | 17% | 14% | 18% | 13% | 13% | 12% | 12% |
| 10044 | 0.25% | 1.00% | 0.25% | 0.25% | 0.00% | 16% | 21% | 21% | 27% | 16% | 21% | 17% | 22% | 18% | 23% | 18% | 18% | 17% | 17% |
| 10045 | 9.00% | 1.00% | 0.25% | 0.25% | 0.00% | 14% | 18% | 20% | 26% | 14% | 18% | 16% | 21% | 17% | 22% | 16% | 16% | 16% | 16% |
| 10046 | 0.25% | 9.00% | 0.25% | 0.25% | 0.00% | 24% | 31% | 29% | 38% | 22% | 29% | 24% | 31% | 25% | 33% | 25% | 25% | 24% | 24% |
| 10047 | 1.00% | 9.00% | 0.25% | 0.25% | 0.00% | 26% | 34% | 30% | 39% | 25% | 33% | 26% | 34% | 27% | 35% | 27% | 27% | 26% | 26% |
| 10048 | 9.00% | 9.00% | 0.25% | 0.25% | 0.00% | 22% | 29% | 28% | 36% | 20% | 26% | 23% | 30% | 24% | 31% | 23% | 23% | 22% | 22% |
| 10049 | 0.00% | 0.00% | 1.00% | 0.25% | 0.00% | 12% | 16% | 15% | 20% | 12% | 16% | 14% | 18% | 14% | 18% | 13% | 13% | 13% | 13% |
| 10050 | 1.00% | 0.00% | 1.00% | 0.25% | 0.00% | 16% | 21% | 17% | 22% | 17% | 22% | 17% | 22% | 17% | 22% | 17% | 17% | 17% | 17% |
| 10051 | 0.00% | 0.25% | 1.00% | 0.25% | 0.00% | 16% | 21% | 20% | 26% | 16% | 21% | 19% | 25% | 18% | 23% | 17% | 17% | 18% | 18% |
| 10052 | 0.25% | 0.25% | 1.00% | 0.25% | 0.00% | 18% | 23% | 21% | 27% | 18% | 23% | 20% | 26% | 19% | 25% | 19% | 19% | 19% | 19% |
| 10053 | 1.00% | 0.25% | 1.00% | 0.25% | 0.00% | 20% | 26% | 22% | 29% | 21% | 27% | 22% | 29% | 21% | 27% | 21% | 21% | 21% | 21% |
| 10054 | 9.00% | 0.25% | 1.00% | 0.25% | 0.00% | 16% | 21% | 20% | 26% | 16% | 21% | 19% | 25% | 18% | 23% | 17% | 17% | 18% | 18% |
| 10055 | 0.00% | 1.00% | 1.00% | 0.25% | 0.00% | 19% | 25% | 23% | 30% | 20% | 26% | 22% | 29% | 21% | 27% | 21% | 21% | 21% | 21% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10056 | 0.25% | 1.00% | 1.00% | 0.25% | 0.00% | 21% | 27% | 24% | 31% | 22% | 29% | 23% | 30% | 22% | 29% | 22% | 22% | 22% | 22% |
| 10057 | 1.00% | 1.00% | 1.00% | 0.25% | 0.00% | 23% | 30% | 25% | 33% | 25% | 33% | 25% | 33% | 24% | 31% | 24% | 24% | 25% | 25% |
| 10058 | 9.00% | 1.00% | 1.00% | 0.25% | 0.00% | 19% | 25% | 23% | 30% | 20% | 26% | 22% | 29% | 21% | 27% | 21% | 21% | 21% | 21% |
| 10059 | 0.00% | 9.00% | 1.00% | 0.25% | 0.00% | 27% | 35% | 31% | 40% | 26% | 34% | 29% | 38% | 28% | 36% | 28% | 28% | 28% | 28% |
| 10060 | 0.25% | 9.00% | 1.00% | 0.25% | 0.00% | 29% | 38% | 32% | 42% | 28% | 36% | 30% | 39% | 29% | 38% | 30% | 30% | 29% | 29% |
| 10061 | 1.00% | 9.00% | 1.00% | 0.25% | 0.00% | 31% | 40% | 33% | 43% | 31% | 40% | 32% | 42% | 31% | 40% | 32% | 32% | 31% | 31% |
| 10062 | 0.25% | 0.25% | 9.00% | 0.25% | 0.00% | 28% | 36% | 26% | 34% | 23% | 30% | 31% | 40% | 29% | 38% | 26% | 26% | 28% | 28% |
| 10063 | 1.00% | 0.25% | 9.00% | 0.25% | 0.00% | 30% | 39% | 27% | 35% | 26% | 34% | 33% | 43% | 31% | 40% | 28% | 28% | 30% | 30% |
| 10064 | 9.00% | 0.25% | 9.00% | 0.25% | 0.00% | 26% | 34% | 25% | 33% | 21% | 27% | 30% | 39% | 28% | 36% | 24% | 24% | 26% | 26% |
| 10065 | 0.00% | 1.00% | 9.00% | 0.25% | 0.00% | 29% | 38% | 28% | 36% | 25% | 33% | 33% | 43% | 31% | 40% | 27% | 27% | 30% | 30% |
| 10066 | 0.25% | 1.00% | 9.00% | 0.25% | 0.00% | 31% | 40% | 29% | 38% | 27% | 35% | 34% | 44% | 32% | 42% | 29% | 29% | 31% | 31% |
| 10067 | 9.00% | 1.00% | 9.00% | 0.25% | 0.00% | 29% | 38% | 28% | 36% | 25% | 33% | 33% | 43% | 31% | 40% | 27% | 27% | 30% | 30% |
| 10068 | 1.00% | 9.00% | 9.00% | 0.25% | 0.00% | 41% | 53% | 38% | 49% | 36% | 47% | 43% | 56% | 41% | 53% | 38% | 38% | 40% | 40% |
| 10069 | 0.25% | 0.00% | 0.00% | 1.00% | 0.00% | 16% | 21% | 14% | 18% | 14% | 18% | 13% | 17% | 18% | 23% | 15% | 15% | 15% | 15% |
| 10070 | 1.00% | 0.25% | 0.00% | 1.00% | 0.00% | 22% | 29% | 20% | 26% | 21% | 27% | 20% | 26% | 24% | 31% | 21% | 21% | 22% | 22% |
| 10071 | 0.00% | 1.00% | 0.00% | 1.00% | 0.00% | 21% | 27% | 21% | 27% | 20% | 26% | 20% | 26% | 24% | 31% | 21% | 21% | 21% | 21% |
| 10072 | 0.25% | 1.00% | 0.00% | 1.00% | 0.00% | 23% | 30% | 22% | 29% | 22% | 29% | 21% | 27% | 25% | 33% | 22% | 22% | 23% | 23% |
| 10073 | 1.00% | 1.00% | 0.00% | 1.00% | 0.00% | 25% | 33% | 23% | 30% | 25% | 33% | 23% | 30% | 27% | 35% | 24% | 24% | 25% | 25% |
| 10074 | 0.00% | 0.00% | 0.25% | 1.00% | 0.00% | 18% | 23% | 19% | 25% | 16% | 21% | 15% | 20% | 22% | 29% | 18% | 18% | 18% | 18% |
| 10075 | 1.00% | 0.00% | 0.25% | 1.00% | 0.00% | 22% | 29% | 21% | 27% | 21% | 27% | 18% | 23% | 25% | 33% | 21% | 21% | 21% | 21% |
| 10076 | 0.25% | 0.25% | 0.25% | 1.00% | 0.00% | 24% | 31% | 25% | 33% | 22% | 29% | 21% | 27% | 27% | 35% | 24% | 24% | 23% | 23% |
| 10077 | 1.00% | 0.25% | 0.25% | 1.00% | 0.00% | 26% | 34% | 26% | 34% | 25% | 33% | 23% | 30% | 29% | 38% | 26% | 26% | 26% | 26% |
| 10078 | 9.00% | 0.25% | 0.25% | 1.00% | 0.00% | 22% | 29% | 24% | 31% | 20% | 26% | 20% | 26% | 26% | 34% | 22% | 22% | 22% | 22% |
| 10079 | 0.00% | 1.00% | 0.25% | 1.00% | 0.00% | 25% | 33% | 27% | 35% | 24% | 31% | 23% | 30% | 29% | 38% | 25% | 25% | 25% | 25% |
| 10080 | 0.25% | 1.00% | 0.25% | 1.00% | 0.00% | 27% | 35% | 28% | 36% | 26% | 34% | 24% | 31% | 30% | 39% | 27% | 27% | 27% | 27% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10081 | 1.00% | 1.00% | 0.25% | 1.00% | 0.00% | 29% | 38% | 29% | 38% | 29% | 38% | 26% | 34% | 32% | 42% | 29% | 29% | 29% | 29% |
| 10082 | 9.00% | 1.00% | 0.25% | 1.00% | 0.00% | 25% | 33% | 27% | 35% | 24% | 31% | 23% | 30% | 29% | 38% | 25% | 25% | 25% | 25% |
| 10083 | 0.25% | 9.00% | 0.25% | 1.00% | 0.00% | 35% | 46% | 36% | 47% | 32% | 42% | 31% | 40% | 37% | 48% | 34% | 34% | 33% | 33% |
| 10084 | 1.00% | 9.00% | 0.25% | 1.00% | 0.00% | 37% | 48% | 37% | 48% | 35% | 46% | 33% | 43% | 39% | 51% | 36% | 36% | 36% | 36% |
| 10085 | 9.00% | 9.00% | 0.25% | 1.00% | 0.00% | 33% | 43% | 35% | 46% | 30% | 39% | 30% | 39% | 36% | 47% | 33% | 33% | 32% | 32% |
| 10086 | 0.00% | 0.00% | 1.00% | 1.00% | 0.00% | 23% | 30% | 22% | 29% | 22% | 29% | 21% | 27% | 26% | 34% | 22% | 22% | 23% | 23% |
| 10087 | 0.25% | 0.00% | 1.00% | 1.00% | 0.00% | 25% | 33% | 23% | 30% | 24% | 31% | 22% | 29% | 27% | 35% | 24% | 24% | 24% | 24% |
| 10088 | 1.00% | 0.00% | 1.00% | 1.00% | 0.00% | 27% | 35% | 24% | 31% | 27% | 35% | 24% | 31% | 29% | 38% | 26% | 26% | 27% | 27% |
| 10089 | 0.00% | 0.25% | 1.00% | 1.00% | 0.00% | 27% | 35% | 27% | 35% | 26% | 34% | 26% | 34% | 30% | 39% | 27% | 27% | 27% | 27% |
| 10090 | 1.00% | 0.25% | 1.00% | 1.00% | 0.00% | 31% | 40% | 29% | 38% | 31% | 40% | 29% | 38% | 33% | 43% | 30% | 30% | 31% | 31% |
| 10091 | 9.00% | 0.25% | 1.00% | 1.00% | 0.00% | 27% | 35% | 27% | 35% | 26% | 34% | 26% | 34% | 30% | 39% | 27% | 27% | 27% | 27% |
| 10092 | 0.00% | 1.00% | 1.00% | 1.00% | 0.00% | 30% | 39% | 30% | 39% | 30% | 39% | 29% | 38% | 33% | 43% | 30% | 30% | 31% | 31% |
| 10093 | 0.25% | 1.00% | 1.00% | 1.00% | 0.00% | 32% | 42% | 31% | 40% | 32% | 42% | 30% | 39% | 34% | 44% | 32% | 32% | 32% | 32% |
| 10094 | 1.00% | 1.00% | 1.00% | 1.00% | 0.00% | 34% | 44% | 32% | 42% | 35% | 46% | 32% | 42% | 36% | 47% | 34% | 34% | 34% | 34% |
| 10095 | 9.00% | 1.00% | 1.00% | 1.00% | 0.00% | 30% | 39% | 30% | 39% | 30% | 39% | 29% | 38% | 33% | 43% | 30% | 30% | 31% | 31% |
| 10096 | 0.00% | 9.00% | 1.00% | 1.00% | 0.00% | 38% | 49% | 38% | 49% | 36% | 47% | 36% | 47% | 40% | 52% | 37% | 37% | 37% | 37% |
| 10097 | 0.25% | 9.00% | 1.00% | 1.00% | 0.00% | 40% | 52% | 39% | 51% | 38% | 49% | 37% | 48% | 41% | 53% | 39% | 39% | 39% | 39% |
| 10098 | 1.00% | 9.00% | 1.00% | 1.00% | 0.00% | 42% | 55% | 40% | 52% | 41% | 53% | 39% | 51% | 43% | 56% | 41% | 41% | 41% | 41% |
| 10099 | 0.25% | 0.25% | 9.00% | 1.00% | 0.00% | 39% | 51% | 33% | 43% | 33% | 43% | 38% | 49% | 41% | 53% | 35% | 35% | 37% | 37% |
| 10100 | 1.00% | 0.25% | 9.00% | 1.00% | 0.00% | 41% | 53% | 34% | 44% | 36% | 47% | 40% | 52% | 43% | 56% | 37% | 37% | 40% | 40% |
| 10101 | 9.00% | 0.25% | 9.00% | 1.00% | 0.00% | 37% | 48% | 32% | 42% | 31% | 40% | 37% | 48% | 40% | 52% | 33% | 33% | 36% | 36% |
| 10102 | 0.25% | 1.00% | 9.00% | 1.00% | 0.00% | 42% | 55% | 36% | 47% | 37% | 48% | 41% | 53% | 44% | 57% | 38% | 38% | 41% | 41% |
| 10103 | 0.00% | 0.25% | 0.00% | 9.00% | 0.00% | 31% | 40% | 27% | 35% | 26% | 34% | 30% | 39% | 31% | 40% | 28% | 28% | 29% | 29% |
| 10104 | 0.00% | 0.00% | 0.25% | 9.00% | 0.00% | 31% | 40% | 28% | 36% | 26% | 34% | 28% | 36% | 32% | 42% | 28% | 28% | 29% | 29% |
| 10105 | 0.25% | 0.00% | 0.25% | 9.00% | 0.00% | 33% | 43% | 29% | 38% | 28% | 36% | 29% | 38% | 33% | 43% | 30% | 30% | 30% | 30% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10106 | 0.00% | 0.25% | 0.25% | 9.00% | 0.00% | 35% | 46% | 33% | 43% | 30% | 39% | 33% | 43% | 36% | 47% | 33% | 33% | 33% | 33% |
| 10107 | 0.25% | 0.25% | 0.25% | 9.00% | 0.00% | 37% | 48% | 34% | 44% | 32% | 42% | 34% | 44% | 37% | 48% | 34% | 34% | 34% | 34% |
| 10108 | 1.00% | 0.25% | 0.25% | 9.00% | 0.00% | 39% | 51% | 35% | 46% | 35% | 46% | 36% | 47% | 39% | 51% | 36% | 36% | 37% | 37% |
| 10109 | 9.00% | 0.25% | 0.25% | 9.00% | 0.00% | 35% | 46% | 33% | 43% | 30% | 39% | 33% | 43% | 36% | 47% | 33% | 33% | 33% | 33% |
| 10110 | 0.00% | 1.00% | 0.25% | 9.00% | 0.00% | 38% | 49% | 36% | 47% | 34% | 44% | 36% | 47% | 39% | 51% | 36% | 36% | 36% | 36% |
| 10111 | 0.25% | 1.00% | 0.25% | 9.00% | 0.00% | 40% | 52% | 37% | 48% | 36% | 47% | 37% | 48% | 40% | 52% | 38% | 38% | 38% | 38% |
| 10112 | 1.00% | 1.00% | 0.25% | 9.00% | 0.00% | 42% | 55% | 38% | 49% | 39% | 51% | 39% | 51% | 42% | 55% | 40% | 40% | 40% | 40% |
| 10113 | 0.25% | 9.00% | 0.25% | 9.00% | 0.00% | 48% | 62% | 45% | 59% | 42% | 55% | 44% | 57% | 47% | 61% | 45% | 45% | 44% | 44% |
| 10114 | 0.25% | 0.00% | 1.00% | 9.00% | 0.00% | 38% | 49% | 32% | 42% | 34% | 44% | 35% | 46% | 37% | 48% | 35% | 35% | 35% | 35% |
| 10115 | 1.00% | 0.25% | 1.00% | 9.00% | 0.00% | 44% | 57% | 38% | 49% | 41% | 53% | 42% | 55% | 43% | 56% | 41% | 41% | 42% | 42% |
| 10116 | 9.00% | 0.25% | 1.00% | 9.00% | 0.00% | 40% | 52% | 36% | 47% | 36% | 47% | 39% | 51% | 40% | 52% | 37% | 37% | 38% | 38% |
| 10117 | 0.00% | 1.00% | 1.00% | 9.00% | 0.00% | 43% | 56% | 39% | 51% | 40% | 52% | 42% | 55% | 43% | 56% | 41% | 41% | 42% | 42% |
| 10118 | 0.25% | 1.00% | 1.00% | 9.00% | 0.00% | 45% | 59% | 40% | 52% | 42% | 55% | 43% | 56% | 44% | 57% | 42% | 42% | 43% | 43% |
| 10119 | 1.00% | 1.00% | 1.00% | 9.00% | 0.00% | 47% | 61% | 41% | 53% | 45% | 59% | 45% | 59% | 46% | 60% | 44% | 44% | 45% | 45% |
| 10120 | 0.25% | 0.25% | 9.00% | 9.00% | 0.00% | 52% | 68% | 42% | 55% | 43% | 56% | 51% | 66% | 51% | 66% | 46% | 46% | 48% | 48% |
| 10121 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 10122 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 10123 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 10124 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 10125 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 10126 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 10127 | 0.00% | 0.25% | 0.25% | 0.00% | 0.25% | 15% | 20% | 18% | 23% | 15% | 20% | 16% | 21% | 17% | 22% | 16% | 16% | 16% | 16% |
| 10128 | 0.25% | 0.25% | 0.25% | 0.00% | 0.25% | 17% | 22% | 19% | 25% | 17% | 22% | 17% | 22% | 18% | 23% | 18% | 18% | 17% | 17% |
| 10129 | 0.00% | 1.00% | 0.25% | 0.00% | 0.25% | 18% | 23% | 21% | 27% | 19% | 25% | 19% | 25% | 20% | 26% | 19% | 19% | 19% | 19% |
| 10130 | 1.00% | 1.00% | 0.25% | 0.00% | 0.25% | 22% | 29% | 23% | 30% | 24% | 31% | 22% | 29% | 23% | 30% | 23% | 23% | 23% | 23% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10131 | 1.00% | 9.00% | 0.25% | 0.00% | 0.25% | 30% | 39% | 31% | 40% | 30% | 39% | 29% | 38% | 30% | 39% | 30% | 30% | 30% | 30% |
| 10132 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 10133 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 10134 | 0.00% | 0.25% | 1.00% | 0.00% | 0.25% | 20% | 26% | 21% | 27% | 21% | 27% | 22% | 29% | 21% | 27% | 21% | 21% | 21% | 21% |
| 10135 | 1.00% | 0.25% | 1.00% | 0.00% | 0.25% | 24% | 31% | 23% | 30% | 26% | 34% | 25% | 33% | 24% | 31% | 24% | 24% | 25% | 25% |
| 10136 | 0.00% | 1.00% | 1.00% | 0.00% | 0.25% | 23% | 30% | 24% | 31% | 25% | 33% | 25% | 33% | 24% | 31% | 24% | 24% | 25% | 25% |
| 10137 | 0.25% | 1.00% | 1.00% | 0.00% | 0.25% | 25% | 33% | 25% | 33% | 27% | 35% | 26% | 34% | 25% | 33% | 26% | 26% | 26% | 26% |
| 10138 | 1.00% | 1.00% | 1.00% | 0.00% | 0.25% | 27% | 35% | 26% | 34% | 30% | 39% | 28% | 36% | 27% | 35% | 28% | 28% | 28% | 28% |
| 10139 | 9.00% | 1.00% | 1.00% | 0.00% | 0.25% | 23% | 30% | 24% | 31% | 25% | 33% | 25% | 33% | 24% | 31% | 24% | 24% | 25% | 25% |
| 10140 | 1.00% | 9.00% | 1.00% | 0.00% | 0.25% | 35% | 46% | 34% | 44% | 36% | 47% | 35% | 46% | 34% | 44% | 35% | 35% | 35% | 35% |
| 10141 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 10142 | 0.00% | 0.25% | 9.00% | 0.00% | 0.25% | 30% | 39% | 26% | 34% | 26% | 34% | 33% | 43% | 31% | 40% | 27% | 27% | 30% | 30% |
| 10143 | 0.25% | 0.25% | 9.00% | 0.00% | 0.25% | 32% | 42% | 27% | 35% | 28% | 36% | 34% | 44% | 32% | 42% | 29% | 29% | 31% | 31% |
| 10144 | 1.00% | 0.25% | 9.00% | 0.00% | 0.25% | 34% | 44% | 28% | 36% | 31% | 40% | 36% | 47% | 34% | 44% | 31% | 31% | 34% | 34% |
| 10145 | 0.25% | 1.00% | 9.00% | 0.00% | 0.25% | 35% | 46% | 30% | 39% | 32% | 42% | 37% | 48% | 35% | 46% | 32% | 32% | 35% | 35% |
| 10146 | 0.25% | 0.00% | 0.00% | 0.25% | 0.25% | 12% | 16% | 14% | 18% | 11% | 14% | 14% | 18% | 14% | 18% | 12% | 12% | 13% | 13% |
| 10147 | 1.00% | 0.00% | 0.00% | 0.25% | 0.25% | 14% | 18% | 15% | 20% | 14% | 18% | 16% | 21% | 16% | 21% | 14% | 14% | 15% | 15% |
| 10148 | 0.00% | 0.25% | 0.00% | 0.25% | 0.25% | 14% | 18% | 18% | 23% | 13% | 17% | 18% | 23% | 17% | 22% | 15% | 15% | 16% | 16% |
| 10149 | 0.25% | 0.25% | 0.00% | 0.25% | 0.25% | 16% | 21% | 19% | 25% | 15% | 20% | 19% | 25% | 18% | 23% | 17% | 17% | 17% | 17% |
| 10150 | 9.00% | 0.25% | 0.00% | 0.25% | 0.25% | 14% | 18% | 18% | 23% | 13% | 17% | 18% | 23% | 17% | 22% | 15% | 15% | 16% | 16% |
| 10151 | 1.00% | 1.00% | 0.00% | 0.25% | 0.25% | 21% | 27% | 23% | 30% | 22% | 29% | 24% | 31% | 23% | 30% | 22% | 22% | 23% | 23% |
| 10152 | 1.00% | 9.00% | 0.00% | 0.25% | 0.25% | 29% | 38% | 31% | 40% | 28% | 36% | 31% | 40% | 30% | 39% | 29% | 29% | 30% | 30% |
| 10153 | 0.00% | 0.00% | 0.25% | 0.25% | 0.25% | 14% | 18% | 19% | 25% | 13% | 17% | 16% | 21% | 18% | 23% | 15% | 15% | 16% | 16% |
| 10154 | 0.25% | 0.00% | 0.25% | 0.25% | 0.25% | 16% | 21% | 20% | 26% | 15% | 20% | 17% | 22% | 19% | 25% | 17% | 17% | 17% | 17% |
| 10155 | 0.00% | 0.25% | 0.25% | 0.25% | 0.25% | 18% | 23% | 24% | 31% | 17% | 22% | 21% | 27% | 22% | 29% | 20% | 20% | 20% | 20% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10156 | 0.25% | 0.25% | 0.25% | 0.25% | 0.25% | 20% | 26% | 25% | 33% | 19% | 25% | 22% | 29% | 23% | 30% | 21% | 21% | 21% | 21% |
| 10157 | 1.00% | 0.25% | 0.25% | 0.25% | 0.25% | 22% | 29% | 26% | 34% | 22% | 29% | 24% | 31% | 25% | 33% | 23% | 23% | 24% | 24% |
| 10158 | 9.00% | 0.25% | 0.25% | 0.25% | 0.25% | 18% | 23% | 24% | 31% | 17% | 22% | 21% | 27% | 22% | 29% | 20% | 20% | 20% | 20% |
| 10159 | 0.25% | 1.00% | 0.25% | 0.25% | 0.25% | 23% | 30% | 28% | 36% | 23% | 30% | 25% | 33% | 26% | 34% | 25% | 25% | 25% | 25% |
| 10160 | 9.00% | 1.00% | 0.25% | 0.25% | 0.25% | 21% | 27% | 27% | 35% | 21% | 27% | 24% | 31% | 25% | 33% | 23% | 23% | 23% | 23% |
| 10161 | 0.25% | 9.00% | 0.25% | 0.25% | 0.25% | 31% | 40% | 36% | 47% | 29% | 38% | 32% | 42% | 33% | 43% | 32% | 32% | 31% | 31% |
| 10162 | 1.00% | 9.00% | 0.25% | 0.25% | 0.25% | 33% | 43% | 37% | 48% | 32% | 42% | 34% | 44% | 35% | 46% | 34% | 34% | 34% | 34% |
| 10163 | 9.00% | 9.00% | 0.25% | 0.25% | 0.25% | 29% | 38% | 35% | 46% | 27% | 35% | 31% | 40% | 32% | 42% | 30% | 30% | 30% | 30% |
| 10164 | 0.00% | 0.00% | 1.00% | 0.25% | 0.25% | 19% | 25% | 22% | 29% | 19% | 25% | 22% | 29% | 22% | 29% | 20% | 20% | 21% | 21% |
| 10165 | 1.00% | 0.00% | 1.00% | 0.25% | 0.25% | 23% | 30% | 24% | 31% | 24% | 31% | 25% | 33% | 25% | 33% | 24% | 24% | 25% | 25% |
| 10166 | 0.00% | 0.25% | 1.00% | 0.25% | 0.25% | 23% | 30% | 27% | 35% | 23% | 30% | 27% | 35% | 26% | 34% | 24% | 24% | 25% | 25% |
| 10167 | 0.25% | 0.25% | 1.00% | 0.25% | 0.25% | 25% | 33% | 28% | 36% | 25% | 33% | 28% | 36% | 27% | 35% | 26% | 26% | 27% | 27% |
| 10168 | 1.00% | 0.25% | 1.00% | 0.25% | 0.25% | 27% | 35% | 29% | 38% | 28% | 36% | 30% | 39% | 29% | 38% | 28% | 28% | 29% | 29% |
| 10169 | 9.00% | 0.25% | 1.00% | 0.25% | 0.25% | 23% | 30% | 27% | 35% | 23% | 30% | 27% | 35% | 26% | 34% | 24% | 24% | 25% | 25% |
| 10170 | 0.00% | 1.00% | 1.00% | 0.25% | 0.25% | 26% | 34% | 30% | 39% | 27% | 35% | 30% | 39% | 29% | 38% | 28% | 28% | 29% | 29% |
| 10171 | 0.25% | 1.00% | 1.00% | 0.25% | 0.25% | 28% | 36% | 31% | 40% | 29% | 38% | 31% | 40% | 30% | 39% | 29% | 29% | 30% | 30% |
| 10172 | 1.00% | 1.00% | 1.00% | 0.25% | 0.25% | 30% | 39% | 32% | 42% | 32% | 42% | 33% | 43% | 32% | 42% | 31% | 31% | 32% | 32% |
| 10173 | 9.00% | 1.00% | 1.00% | 0.25% | 0.25% | 26% | 34% | 30% | 39% | 27% | 35% | 30% | 39% | 29% | 38% | 28% | 28% | 29% | 29% |
| 10174 | 0.00% | 9.00% | 1.00% | 0.25% | 0.25% | 34% | 44% | 38% | 49% | 33% | 43% | 37% | 48% | 36% | 47% | 35% | 35% | 35% | 35% |
| 10175 | 0.25% | 9.00% | 1.00% | 0.25% | 0.25% | 36% | 47% | 39% | 51% | 35% | 46% | 38% | 49% | 37% | 48% | 37% | 37% | 37% | 37% |
| 10176 | 1.00% | 9.00% | 1.00% | 0.25% | 0.25% | 38% | 49% | 40% | 52% | 38% | 49% | 40% | 52% | 39% | 51% | 39% | 39% | 39% | 39% |
| 10177 | 0.25% | 0.25% | 9.00% | 0.25% | 0.25% | 35% | 46% | 33% | 43% | 30% | 39% | 39% | 51% | 37% | 48% | 33% | 33% | 35% | 35% |
| 10178 | 1.00% | 0.25% | 9.00% | 0.25% | 0.25% | 37% | 48% | 34% | 44% | 33% | 43% | 41% | 53% | 39% | 51% | 35% | 35% | 38% | 38% |
| 10179 | 9.00% | 0.25% | 9.00% | 0.25% | 0.25% | 33% | 43% | 32% | 42% | 28% | 36% | 38% | 49% | 36% | 47% | 31% | 31% | 34% | 34% |
| 10180 | 0.00% | 1.00% | 9.00% | 0.25% | 0.25% | 36% | 47% | 35% | 46% | 32% | 42% | 41% | 53% | 39% | 51% | 34% | 34% | 37% | 37% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10181 | 0.25% | 1.00% | 9.00% | 0.25% | 0.25% | 38% | 49% | 36% | 47% | 34% | 44% | 42% | 55% | 40% | 52% | 36% | 36% | 39% | 39% |
| 10182 | 9.00% | 1.00% | 9.00% | 0.25% | 0.25% | 36% | 47% | 35% | 46% | 32% | 42% | 41% | 53% | 39% | 51% | 34% | 34% | 37% | 37% |
| 10183 | 1.00% | 9.00% | 9.00% | 0.25% | 0.25% | 48% | 62% | 45% | 59% | 43% | 56% | 51% | 66% | 49% | 64% | 45% | 45% | 48% | 48% |
| 10184 | 0.25% | 0.00% | 0.00% | 1.00% | 0.25% | 23% | 30% | 21% | 27% | 21% | 27% | 21% | 27% | 26% | 34% | 22% | 22% | 23% | 23% |
| 10185 | 1.00% | 0.25% | 0.00% | 1.00% | 0.25% | 29% | 38% | 27% | 35% | 28% | 36% | 28% | 36% | 32% | 42% | 28% | 28% | 29% | 29% |
| 10186 | 0.00% | 1.00% | 0.00% | 1.00% | 0.25% | 28% | 36% | 28% | 36% | 27% | 35% | 28% | 36% | 32% | 42% | 28% | 28% | 29% | 29% |
| 10187 | 0.25% | 1.00% | 0.00% | 1.00% | 0.25% | 30% | 39% | 29% | 38% | 29% | 38% | 29% | 38% | 33% | 43% | 29% | 29% | 30% | 30% |
| 10188 | 1.00% | 1.00% | 0.00% | 1.00% | 0.25% | 32% | 42% | 30% | 39% | 32% | 42% | 31% | 40% | 35% | 46% | 31% | 31% | 33% | 33% |
| 10189 | 0.00% | 0.00% | 0.25% | 1.00% | 0.25% | 25% | 33% | 26% | 34% | 23% | 30% | 23% | 30% | 30% | 39% | 25% | 25% | 25% | 25% |
| 10190 | 1.00% | 0.00% | 0.25% | 1.00% | 0.25% | 29% | 38% | 28% | 36% | 28% | 36% | 26% | 34% | 33% | 43% | 28% | 28% | 29% | 29% |
| 10191 | 0.25% | 0.25% | 0.25% | 1.00% | 0.25% | 31% | 40% | 32% | 42% | 29% | 38% | 29% | 38% | 35% | 46% | 31% | 31% | 31% | 31% |
| 10192 | 1.00% | 0.25% | 0.25% | 1.00% | 0.25% | 33% | 43% | 33% | 43% | 32% | 42% | 31% | 40% | 37% | 48% | 33% | 33% | 33% | 33% |
| 10193 | 9.00% | 0.25% | 0.25% | 1.00% | 0.25% | 29% | 38% | 31% | 40% | 27% | 35% | 28% | 36% | 34% | 44% | 29% | 29% | 30% | 30% |
| 10194 | 0.00% | 1.00% | 0.25% | 1.00% | 0.25% | 32% | 42% | 34% | 44% | 31% | 40% | 31% | 40% | 37% | 48% | 32% | 32% | 33% | 33% |
| 10195 | 0.25% | 1.00% | 0.25% | 1.00% | 0.25% | 34% | 44% | 35% | 46% | 33% | 43% | 32% | 42% | 38% | 49% | 34% | 34% | 34% | 34% |
| 10196 | 1.00% | 1.00% | 0.25% | 1.00% | 0.25% | 36% | 47% | 36% | 47% | 36% | 47% | 34% | 44% | 40% | 52% | 36% | 36% | 37% | 37% |
| 10197 | 9.00% | 1.00% | 0.25% | 1.00% | 0.25% | 32% | 42% | 34% | 44% | 31% | 40% | 31% | 40% | 37% | 48% | 32% | 32% | 33% | 33% |
| 10198 | 0.25% | 9.00% | 0.25% | 1.00% | 0.25% | 42% | 55% | 43% | 56% | 39% | 51% | 39% | 51% | 45% | 59% | 41% | 41% | 41% | 41% |
| 10199 | 1.00% | 9.00% | 0.25% | 1.00% | 0.25% | 44% | 57% | 44% | 57% | 42% | 55% | 41% | 53% | 47% | 61% | 43% | 43% | 43% | 43% |
| 10200 | 9.00% | 9.00% | 0.25% | 1.00% | 0.25% | 40% | 52% | 42% | 55% | 37% | 48% | 38% | 49% | 44% | 57% | 40% | 40% | 40% | 40% |
| 10201 | 0.00% | 0.00% | 1.00% | 1.00% | 0.25% | 30% | 39% | 29% | 38% | 29% | 38% | 29% | 38% | 34% | 44% | 29% | 29% | 31% | 31% |
| 10202 | 0.25% | 0.00% | 1.00% | 1.00% | 0.25% | 32% | 42% | 30% | 39% | 31% | 40% | 30% | 39% | 35% | 46% | 31% | 31% | 32% | 32% |
| 10203 | 1.00% | 0.00% | 1.00% | 1.00% | 0.25% | 34% | 44% | 31% | 40% | 34% | 44% | 32% | 42% | 37% | 48% | 33% | 33% | 34% | 34% |
| 10204 | 0.00% | 0.25% | 1.00% | 1.00% | 0.25% | 34% | 44% | 34% | 44% | 33% | 43% | 34% | 44% | 38% | 49% | 34% | 34% | 35% | 35% |
| 10205 | 1.00% | 0.25% | 1.00% | 1.00% | 0.25% | 38% | 49% | 36% | 47% | 38% | 49% | 37% | 48% | 41% | 53% | 37% | 37% | 39% | 39% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10206 | 9.00% | 0.25% | 1.00% | 1.00% | 0.25% | 34% | 44% | 34% | 44% | 33% | 43% | 34% | 44% | 38% | 49% | 34% | 34% | 35% | 35% |
| 10207 | 0.00% | 1.00% | 1.00% | 1.00% | 0.25% | 37% | 48% | 37% | 48% | 37% | 48% | 37% | 48% | 41% | 53% | 37% | 37% | 38% | 38% |
| 10208 | 0.25% | 1.00% | 1.00% | 1.00% | 0.25% | 39% | 51% | 38% | 49% | 39% | 51% | 38% | 49% | 42% | 55% | 39% | 39% | 40% | 40% |
| 10209 | 1.00% | 1.00% | 1.00% | 1.00% | 0.25% | 41% | 53% | 39% | 51% | 42% | 55% | 40% | 52% | 44% | 57% | 41% | 41% | 42% | 42% |
| 10210 | 9.00% | 1.00% | 1.00% | 1.00% | 0.25% | 37% | 48% | 37% | 48% | 37% | 48% | 37% | 48% | 41% | 53% | 37% | 37% | 38% | 38% |
| 10211 | 0.00% | 9.00% | 1.00% | 1.00% | 0.25% | 45% | 59% | 45% | 59% | 43% | 56% | 44% | 57% | 48% | 62% | 44% | 44% | 45% | 45% |
| 10212 | 0.25% | 9.00% | 1.00% | 1.00% | 0.25% | 47% | 61% | 46% | 60% | 45% | 59% | 45% | 59% | 49% | 64% | 46% | 46% | 46% | 46% |
| 10213 | 1.00% | 9.00% | 1.00% | 1.00% | 0.25% | 49% | 64% | 47% | 61% | 48% | 62% | 47% | 61% | 51% | 66% | 48% | 48% | 49% | 49% |
| 10214 | 0.25% | 0.25% | 9.00% | 1.00% | 0.25% | 46% | 60% | 40% | 52% | 40% | 52% | 46% | 60% | 49% | 64% | 42% | 42% | 45% | 45% |
| 10215 | 1.00% | 0.25% | 9.00% | 1.00% | 0.25% | 48% | 62% | 41% | 53% | 43% | 56% | 48% | 62% | 51% | 66% | 44% | 44% | 47% | 47% |
| 10216 | 9.00% | 0.25% | 9.00% | 1.00% | 0.25% | 44% | 57% | 39% | 51% | 38% | 49% | 45% | 59% | 48% | 62% | 40% | 40% | 44% | 44% |
| 10217 | 0.25% | 1.00% | 9.00% | 1.00% | 0.25% | 49% | 64% | 43% | 56% | 44% | 57% | 49% | 64% | 52% | 68% | 45% | 45% | 48% | 48% |
| 10218 | 0.00% | 0.25% | 0.00% | 9.00% | 0.25% | 38% | 49% | 34% | 44% | 33% | 43% | 38% | 49% | 39% | 51% | 35% | 35% | 37% | 37% |
| 10219 | 0.00% | 0.00% | 0.25% | 9.00% | 0.25% | 38% | 49% | 35% | 46% | 33% | 43% | 36% | 47% | 40% | 52% | 35% | 35% | 36% | 36% |
| 10220 | 0.25% | 0.00% | 0.25% | 9.00% | 0.25% | 40% | 52% | 36% | 47% | 35% | 46% | 37% | 48% | 41% | 53% | 37% | 37% | 38% | 38% |
| 10221 | 0.00% | 0.25% | 0.25% | 9.00% | 0.25% | 42% | 55% | 40% | 52% | 37% | 48% | 41% | 53% | 44% | 57% | 40% | 40% | 41% | 41% |
| 10222 | 0.25% | 0.25% | 0.25% | 9.00% | 0.25% | 44% | 57% | 41% | 53% | 39% | 51% | 42% | 55% | 45% | 59% | 41% | 41% | 42% | 42% |
| 10223 | 1.00% | 0.25% | 0.25% | 9.00% | 0.25% | 46% | 60% | 42% | 55% | 42% | 55% | 44% | 57% | 47% | 61% | 43% | 43% | 44% | 44% |
| 10224 | 9.00% | 0.25% | 0.25% | 9.00% | 0.25% | 42% | 55% | 40% | 52% | 37% | 48% | 41% | 53% | 44% | 57% | 40% | 40% | 41% | 41% |
| 10225 | 0.00% | 1.00% | 0.25% | 9.00% | 0.25% | 45% | 59% | 43% | 56% | 41% | 53% | 44% | 57% | 47% | 61% | 43% | 43% | 44% | 44% |
| 10226 | 0.25% | 1.00% | 0.25% | 9.00% | 0.25% | 47% | 61% | 44% | 57% | 43% | 56% | 45% | 59% | 48% | 62% | 45% | 45% | 45% | 45% |
| 10227 | 1.00% | 1.00% | 0.25% | 9.00% | 0.25% | 49% | 64% | 45% | 59% | 46% | 60% | 47% | 61% | 50% | 65% | 47% | 47% | 48% | 48% |
| 10228 | 0.25% | 9.00% | 0.25% | 9.00% | 0.25% | 55% | 72% | 52% | 68% | 49% | 64% | 52% | 68% | 55% | 72% | 52% | 52% | 52% | 52% |
| 10229 | 0.25% | 0.00% | 1.00% | 9.00% | 0.25% | 45% | 59% | 39% | 51% | 41% | 53% | 43% | 56% | 45% | 59% | 42% | 42% | 43% | 43% |
| 10230 | 1.00% | 0.25% | 1.00% | 9.00% | 0.25% | 51% | 66% | 45% | 59% | 48% | 62% | 50% | 65% | 51% | 66% | 48% | 48% | 50% | 50% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10231 | 9.00% | 0.25% | 1.00% | 9.00% | 0.25% | 47% | 61% | 43% | 56% | 43% | 56% | 47% | 61% | 48% | 62% | 44% | 44% | 46% | 46% |
| 10232 | 0.00% | 1.00% | 1.00% | 9.00% | 0.25% | 50% | 65% | 46% | 60% | 47% | 61% | 50% | 65% | 51% | 66% | 48% | 48% | 49% | 49% |
| 10233 | 0.25% | 1.00% | 1.00% | 9.00% | 0.25% | 52% | 68% | 47% | 61% | 49% | 64% | 51% | 66% | 52% | 68% | 49% | 49% | 51% | 51% |
| 10234 | 1.00% | 1.00% | 1.00% | 9.00% | 0.25% | 54% | 70% | 48% | 62% | 52% | 68% | 53% | 69% | 54% | 70% | 51% | 51% | 53% | 53% |
| 10235 | 0.25% | 0.25% | 9.00% | 9.00% | 0.25% | 59% | 77% | 49% | 64% | 50% | 65% | 59% | 77% | 59% | 77% | 53% | 53% | 56% | 56% |
| 10236 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 10237 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 10238 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 10239 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 10240 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 10241 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 10242 | 0.00% | 0.25% | 0.25% | 0.00% | 1.00% | 23% | 30% | 27% | 35% | 24% | 31% | 22% | 29% | 28% | 36% | 25% | 25% | 25% | 25% |
| 10243 | 0.25% | 0.25% | 0.25% | 0.00% | 1.00% | 25% | 33% | 28% | 36% | 26% | 34% | 23% | 30% | 29% | 38% | 26% | 26% | 26% | 26% |
| 10244 | 0.00% | 1.00% | 0.25% | 0.00% | 1.00% | 26% | 34% | 30% | 39% | 28% | 36% | 25% | 33% | 31% | 40% | 28% | 28% | 28% | 28% |
| 10245 | 1.00% | 1.00% | 0.25% | 0.00% | 1.00% | 30% | 39% | 32% | 42% | 33% | 43% | 28% | 36% | 34% | 44% | 32% | 32% | 32% | 32% |
| 10246 | 1.00% | 9.00% | 0.25% | 0.00% | 1.00% | 38% | 49% | 40% | 52% | 39% | 51% | 35% | 46% | 41% | 53% | 39% | 39% | 38% | 38% |
| 10247 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 10248 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 10249 | 0.00% | 0.25% | 1.00% | 0.00% | 1.00% | 28% | 36% | 30% | 39% | 30% | 39% | 28% | 36% | 32% | 42% | 29% | 29% | 30% | 30% |
| 10250 | 1.00% | 0.25% | 1.00% | 0.00% | 1.00% | 32% | 42% | 32% | 42% | 35% | 46% | 31% | 40% | 35% | 46% | 33% | 33% | 34% | 34% |
| 10251 | 0.00% | 1.00% | 1.00% | 0.00% | 1.00% | 31% | 40% | 33% | 43% | 34% | 44% | 31% | 40% | 35% | 46% | 33% | 33% | 33% | 33% |
| 10252 | 0.25% | 1.00% | 1.00% | 0.00% | 1.00% | 33% | 43% | 34% | 44% | 36% | 47% | 32% | 42% | 36% | 47% | 34% | 34% | 35% | 35% |
| 10253 | 1.00% | 1.00% | 1.00% | 0.00% | 1.00% | 35% | 46% | 35% | 46% | 39% | 51% | 34% | 44% | 38% | 49% | 36% | 36% | 37% | 37% |
| 10254 | 9.00% | 1.00% | 1.00% | 0.00% | 1.00% | 31% | 40% | 33% | 43% | 34% | 44% | 31% | 40% | 35% | 46% | 33% | 33% | 33% | 33% |
| 10255 | 1.00% | 9.00% | 1.00% | 0.00% | 1.00% | 43% | 56% | 43% | 56% | 45% | 59% | 41% | 53% | 45% | 59% | 44% | 44% | 44% | 44% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10256 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 10257 | 0.00% | 0.25% | 9.00% | 0.00% | 1.00% | 38% | 49% | 35% | 46% | 35% | 46% | 39% | 51% | 42% | 55% | 36% | 36% | 39% | 39% |
| 10258 | 0.25% | 0.25% | 9.00% | 0.00% | 1.00% | 40% | 52% | 36% | 47% | 37% | 48% | 40% | 52% | 43% | 56% | 38% | 38% | 40% | 40% |
| 10259 | 1.00% | 0.25% | 9.00% | 0.00% | 1.00% | 42% | 55% | 37% | 48% | 40% | 52% | 42% | 55% | 45% | 59% | 40% | 40% | 42% | 42% |
| 10260 | 0.25% | 1.00% | 9.00% | 0.00% | 1.00% | 43% | 56% | 39% | 51% | 41% | 53% | 43% | 56% | 46% | 60% | 41% | 41% | 43% | 43% |
| 10261 | 0.25% | 0.00% | 0.00% | 0.25% | 1.00% | 20% | 26% | 23% | 30% | 20% | 26% | 20% | 26% | 25% | 33% | 21% | 21% | 22% | 22% |
| 10262 | 1.00% | 0.00% | 0.00% | 0.25% | 1.00% | 22% | 29% | 24% | 31% | 23% | 30% | 22% | 29% | 27% | 35% | 23% | 23% | 24% | 24% |
| 10263 | 0.00% | 0.25% | 0.00% | 0.25% | 1.00% | 22% | 29% | 27% | 35% | 22% | 29% | 24% | 31% | 28% | 36% | 24% | 24% | 25% | 25% |
| 10264 | 0.25% | 0.25% | 0.00% | 0.25% | 1.00% | 24% | 31% | 28% | 36% | 24% | 31% | 25% | 33% | 29% | 38% | 25% | 25% | 26% | 26% |
| 10265 | 9.00% | 0.25% | 0.00% | 0.25% | 1.00% | 22% | 29% | 27% | 35% | 22% | 29% | 24% | 31% | 28% | 36% | 24% | 24% | 25% | 25% |
| 10266 | 1.00% | 1.00% | 0.00% | 0.25% | 1.00% | 29% | 38% | 32% | 42% | 31% | 40% | 30% | 39% | 34% | 44% | 31% | 31% | 32% | 32% |
| 10267 | 1.00% | 9.00% | 0.00% | 0.25% | 1.00% | 37% | 48% | 40% | 52% | 37% | 48% | 37% | 48% | 41% | 53% | 38% | 38% | 38% | 38% |
| 10268 | 0.00% | 0.00% | 0.25% | 0.25% | 1.00% | 22% | 29% | 28% | 36% | 22% | 29% | 22% | 29% | 29% | 38% | 24% | 24% | 24% | 24% |
| 10269 | 0.25% | 0.00% | 0.25% | 0.25% | 1.00% | 24% | 31% | 29% | 38% | 24% | 31% | 23% | 30% | 30% | 39% | 26% | 26% | 26% | 26% |
| 10270 | 0.00% | 0.25% | 0.25% | 0.25% | 1.00% | 26% | 34% | 33% | 43% | 26% | 34% | 27% | 35% | 33% | 43% | 28% | 28% | 29% | 29% |
| 10271 | 0.25% | 0.25% | 0.25% | 0.25% | 1.00% | 28% | 36% | 34% | 44% | 28% | 36% | 28% | 36% | 34% | 44% | 30% | 30% | 30% | 30% |
| 10272 | 1.00% | 0.25% | 0.25% | 0.25% | 1.00% | 30% | 39% | 35% | 46% | 31% | 40% | 30% | 39% | 36% | 47% | 32% | 32% | 32% | 32% |
| 10273 | 9.00% | 0.25% | 0.25% | 0.25% | 1.00% | 26% | 34% | 33% | 43% | 26% | 34% | 27% | 35% | 33% | 43% | 28% | 28% | 29% | 29% |
| 10274 | 0.25% | 1.00% | 0.25% | 0.25% | 1.00% | 31% | 40% | 37% | 48% | 32% | 42% | 31% | 40% | 37% | 48% | 33% | 33% | 33% | 33% |
| 10275 | 9.00% | 1.00% | 0.25% | 0.25% | 1.00% | 29% | 38% | 36% | 47% | 30% | 39% | 30% | 39% | 36% | 47% | 32% | 32% | 32% | 32% |
| 10276 | 0.25% | 9.00% | 0.25% | 0.25% | 1.00% | 39% | 51% | 45% | 59% | 38% | 49% | 38% | 49% | 44% | 57% | 41% | 41% | 40% | 40% |
| 10277 | 1.00% | 9.00% | 0.25% | 0.25% | 1.00% | 41% | 53% | 46% | 60% | 41% | 53% | 40% | 52% | 46% | 60% | 43% | 43% | 42% | 42% |
| 10278 | 9.00% | 9.00% | 0.25% | 0.25% | 1.00% | 37% | 48% | 44% | 57% | 36% | 47% | 37% | 48% | 43% | 56% | 39% | 39% | 39% | 39% |
| 10279 | 0.00% | 0.00% | 1.00% | 0.25% | 1.00% | 27% | 35% | 31% | 40% | 28% | 36% | 28% | 36% | 33% | 43% | 29% | 29% | 30% | 30% |
| 10280 | 1.00% | 0.00% | 1.00% | 0.25% | 1.00% | 31% | 40% | 33% | 43% | 33% | 43% | 31% | 40% | 36% | 47% | 32% | 32% | 33% | 33% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10281 | 0.00% | 0.25% | 1.00% | 0.25% | 1.00% | 31% | 40% | 36% | 47% | 32% | 42% | 33% | 43% | 37% | 48% | 33% | 33% | 34% | 34% |
| 10282 | 0.25% | 0.25% | 1.00% | 0.25% | 1.00% | 33% | 43% | 37% | 48% | 34% | 44% | 34% | 44% | 38% | 49% | 35% | 35% | 35% | 35% |
| 10283 | 1.00% | 0.25% | 1.00% | 0.25% | 1.00% | 35% | 46% | 38% | 49% | 37% | 48% | 36% | 47% | 40% | 52% | 37% | 37% | 38% | 38% |
| 10284 | 9.00% | 0.25% | 1.00% | 0.25% | 1.00% | 31% | 40% | 36% | 47% | 32% | 42% | 33% | 43% | 37% | 48% | 33% | 33% | 34% | 34% |
| 10285 | 0.00% | 1.00% | 1.00% | 0.25% | 1.00% | 34% | 44% | 39% | 51% | 36% | 47% | 36% | 47% | 40% | 52% | 36% | 36% | 37% | 37% |
| 10286 | 0.25% | 1.00% | 1.00% | 0.25% | 1.00% | 36% | 47% | 40% | 52% | 38% | 49% | 37% | 48% | 41% | 53% | 38% | 38% | 39% | 39% |
| 10287 | 1.00% | 1.00% | 1.00% | 0.25% | 1.00% | 38% | 49% | 41% | 53% | 41% | 53% | 39% | 51% | 43% | 56% | 40% | 40% | 41% | 41% |
| 10288 | 9.00% | 1.00% | 1.00% | 0.25% | 1.00% | 34% | 44% | 39% | 51% | 36% | 47% | 36% | 47% | 40% | 52% | 36% | 36% | 37% | 37% |
| 10289 | 0.00% | 9.00% | 1.00% | 0.25% | 1.00% | 42% | 55% | 47% | 61% | 42% | 55% | 43% | 56% | 47% | 61% | 44% | 44% | 44% | 44% |
| 10290 | 0.25% | 9.00% | 1.00% | 0.25% | 1.00% | 44% | 57% | 48% | 62% | 44% | 57% | 44% | 57% | 48% | 62% | 45% | 45% | 45% | 45% |
| 10291 | 1.00% | 9.00% | 1.00% | 0.25% | 1.00% | 46% | 60% | 49% | 64% | 47% | 61% | 46% | 60% | 50% | 65% | 47% | 47% | 48% | 48% |
| 10292 | 0.25% | 0.25% | 9.00% | 0.25% | 1.00% | 43% | 56% | 42% | 55% | 39% | 51% | 45% | 59% | 48% | 62% | 41% | 41% | 44% | 44% |
| 10293 | 1.00% | 0.25% | 9.00% | 0.25% | 1.00% | 45% | 59% | 43% | 56% | 42% | 55% | 47% | 61% | 50% | 65% | 43% | 43% | 46% | 46% |
| 10294 | 9.00% | 0.25% | 9.00% | 0.25% | 1.00% | 41% | 53% | 41% | 53% | 37% | 48% | 44% | 57% | 47% | 61% | 40% | 40% | 43% | 43% |
| 10295 | 0.00% | 1.00% | 9.00% | 0.25% | 1.00% | 44% | 57% | 44% | 57% | 41% | 53% | 47% | 61% | 50% | 65% | 43% | 43% | 46% | 46% |
| 10296 | 0.25% | 1.00% | 9.00% | 0.25% | 1.00% | 46% | 60% | 45% | 59% | 43% | 56% | 48% | 62% | 51% | 66% | 45% | 45% | 47% | 47% |
| 10297 | 9.00% | 1.00% | 9.00% | 0.25% | 1.00% | 44% | 57% | 44% | 57% | 41% | 53% | 47% | 61% | 50% | 65% | 43% | 43% | 46% | 46% |
| 10298 | 1.00% | 9.00% | 9.00% | 0.25% | 1.00% | 56% | 73% | 54% | 70% | 52% | 68% | 57% | 74% | 60% | 78% | 54% | 54% | 56% | 56% |
| 10299 | 0.25% | 0.00% | 0.00% | 1.00% | 1.00% | 31% | 40% | 30% | 39% | 30% | 39% | 27% | 35% | 37% | 48% | 30% | 30% | 31% | 31% |
| 10300 | 1.00% | 0.25% | 0.00% | 1.00% | 1.00% | 37% | 48% | 36% | 47% | 37% | 48% | 34% | 44% | 43% | 56% | 37% | 37% | 38% | 38% |
| 10301 | 0.00% | 1.00% | 0.00% | 1.00% | 1.00% | 36% | 47% | 37% | 48% | 36% | 47% | 34% | 44% | 43% | 56% | 36% | 36% | 38% | 38% |
| 10302 | 0.25% | 1.00% | 0.00% | 1.00% | 1.00% | 38% | 49% | 38% | 49% | 38% | 49% | 35% | 46% | 44% | 57% | 38% | 38% | 39% | 39% |
| 10303 | 1.00% | 1.00% | 0.00% | 1.00% | 1.00% | 40% | 52% | 39% | 51% | 41% | 53% | 37% | 48% | 46% | 60% | 40% | 40% | 41% | 41% |
| 10304 | 0.00% | 0.00% | 0.25% | 1.00% | 1.00% | 33% | 43% | 35% | 46% | 32% | 42% | 29% | 38% | 41% | 53% | 33% | 33% | 34% | 34% |
| 10305 | 1.00% | 0.00% | 0.25% | 1.00% | 1.00% | 37% | 48% | 37% | 48% | 37% | 48% | 32% | 42% | 44% | 57% | 37% | 37% | 38% | 38% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10306 | 0.25% | 0.25% | 0.25% | 1.00% | 1.00% | 39% | 51% | 41% | 53% | 38% | 49% | 35% | 46% | 46% | 60% | 39% | 39% | 40% | 40% |
| 10307 | 1.00% | 0.25% | 0.25% | 1.00% | 1.00% | 41% | 53% | 42% | 55% | 41% | 53% | 37% | 48% | 48% | 62% | 41% | 41% | 42% | 42% |
| 10308 | 9.00% | 0.25% | 0.25% | 1.00% | 1.00% | 37% | 48% | 40% | 52% | 36% | 47% | 34% | 44% | 45% | 59% | 38% | 38% | 38% | 38% |
| 10309 | 0.00% | 1.00% | 0.25% | 1.00% | 1.00% | 40% | 52% | 43% | 56% | 40% | 52% | 37% | 48% | 48% | 62% | 41% | 41% | 42% | 42% |
| 10310 | 0.25% | 1.00% | 0.25% | 1.00% | 1.00% | 42% | 55% | 44% | 57% | 42% | 55% | 38% | 49% | 49% | 64% | 43% | 43% | 43% | 43% |
| 10311 | 1.00% | 1.00% | 0.25% | 1.00% | 1.00% | 44% | 57% | 45% | 59% | 45% | 59% | 40% | 52% | 51% | 66% | 45% | 45% | 45% | 45% |
| 10312 | 9.00% | 1.00% | 0.25% | 1.00% | 1.00% | 40% | 52% | 43% | 56% | 40% | 52% | 37% | 48% | 48% | 62% | 41% | 41% | 42% | 42% |
| 10313 | 0.25% | 9.00% | 0.25% | 1.00% | 1.00% | 50% | 65% | 52% | 68% | 48% | 62% | 45% | 59% | 56% | 73% | 50% | 50% | 50% | 50% |
| 10314 | 1.00% | 9.00% | 0.25% | 1.00% | 1.00% | 52% | 68% | 53% | 69% | 51% | 66% | 47% | 61% | 58% | 75% | 52% | 52% | 52% | 52% |
| 10315 | 9.00% | 9.00% | 0.25% | 1.00% | 1.00% | 48% | 62% | 51% | 66% | 46% | 60% | 44% | 57% | 55% | 72% | 48% | 48% | 48% | 48% |
| 10316 | 0.00% | 0.00% | 1.00% | 1.00% | 1.00% | 38% | 49% | 38% | 49% | 38% | 49% | 35% | 46% | 45% | 59% | 38% | 38% | 39% | 39% |
| 10317 | 0.25% | 0.00% | 1.00% | 1.00% | 1.00% | 40% | 52% | 39% | 51% | 40% | 52% | 36% | 47% | 46% | 60% | 40% | 40% | 41% | 41% |
| 10318 | 1.00% | 0.00% | 1.00% | 1.00% | 1.00% | 42% | 55% | 40% | 52% | 43% | 56% | 38% | 49% | 48% | 62% | 42% | 42% | 43% | 43% |
| 10319 | 0.00% | 0.25% | 1.00% | 1.00% | 1.00% | 42% | 55% | 43% | 56% | 42% | 55% | 40% | 52% | 49% | 64% | 42% | 42% | 44% | 44% |
| 10320 | 1.00% | 0.25% | 1.00% | 1.00% | 1.00% | 46% | 60% | 45% | 59% | 47% | 61% | 43% | 56% | 52% | 68% | 46% | 46% | 47% | 47% |
| 10321 | 9.00% | 0.25% | 1.00% | 1.00% | 1.00% | 42% | 55% | 43% | 56% | 42% | 55% | 40% | 52% | 49% | 64% | 42% | 42% | 44% | 44% |
| 10322 | 0.00% | 1.00% | 1.00% | 1.00% | 1.00% | 45% | 59% | 46% | 60% | 46% | 60% | 43% | 56% | 52% | 68% | 46% | 46% | 47% | 47% |
| 10323 | 0.25% | 1.00% | 1.00% | 1.00% | 1.00% | 47% | 61% | 47% | 61% | 48% | 62% | 44% | 57% | 53% | 69% | 47% | 47% | 48% | 48% |
| 10324 | 1.00% | 1.00% | 1.00% | 1.00% | 1.00% | 49% | 64% | 48% | 62% | 51% | 66% | 46% | 60% | 55% | 72% | 49% | 49% | 51% | 51% |
| 10325 | 9.00% | 1.00% | 1.00% | 1.00% | 1.00% | 45% | 59% | 46% | 60% | 46% | 60% | 43% | 56% | 52% | 68% | 46% | 46% | 47% | 47% |
| 10326 | 0.00% | 9.00% | 1.00% | 1.00% | 1.00% | 53% | 69% | 54% | 70% | 52% | 68% | 50% | 65% | 59% | 77% | 53% | 53% | 54% | 54% |
| 10327 | 0.25% | 9.00% | 1.00% | 1.00% | 1.00% | 55% | 72% | 55% | 72% | 54% | 70% | 51% | 66% | 60% | 78% | 55% | 55% | 55% | 55% |
| 10328 | 1.00% | 9.00% | 1.00% | 1.00% | 1.00% | 57% | 74% | 56% | 73% | 57% | 74% | 53% | 69% | 62% | 81% | 57% | 57% | 57% | 57% |
| 10329 | 0.25% | 0.25% | 9.00% | 1.00% | 1.00% | 54% | 70% | 49% | 64% | 49% | 64% | 52% | 68% | 60% | 78% | 51% | 51% | 54% | 54% |
| 10330 | 1.00% | 0.25% | 9.00% | 1.00% | 1.00% | 56% | 73% | 50% | 65% | 52% | 68% | 54% | 70% | 62% | 81% | 53% | 53% | 56% | 56% |

Fig. 35

| Formula # | Delta Dodecalactone | Propyl Dihydrojasmonate | Methyl Dihydrojasmonate | IR3535 | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10331 | 9.00% | 0.25% | 9.00% | 1.00% | 1.00% | 52% | 68% | 48% | 62% | 47% | 61% | 51% | 66% | 59% | 77% | 49% | 49% | 52% | 52% |
| 10332 | 0.25% | 1.00% | 9.00% | 1.00% | 1.00% | 57% | 74% | 52% | 68% | 53% | 69% | 55% | 72% | 63% | 82% | 54% | 54% | 57% | 57% |
| 10333 | 0.00% | 0.25% | 0.00% | 9.00% | 1.00% | 46% | 60% | 43% | 56% | 42% | 55% | 44% | 57% | 50% | 65% | 44% | 44% | 45% | 45% |
| 10334 | 0.00% | 0.00% | 0.25% | 9.00% | 1.00% | 46% | 60% | 44% | 57% | 42% | 55% | 42% | 55% | 51% | 66% | 44% | 44% | 45% | 45% |
| 10335 | 0.25% | 0.00% | 0.25% | 9.00% | 1.00% | 48% | 62% | 45% | 59% | 44% | 57% | 43% | 56% | 52% | 68% | 46% | 46% | 46% | 46% |
| 10336 | 0.00% | 0.25% | 0.25% | 9.00% | 1.00% | 50% | 65% | 49% | 64% | 46% | 60% | 47% | 61% | 55% | 72% | 48% | 48% | 49% | 49% |
| 10337 | 0.25% | 0.25% | 0.25% | 9.00% | 1.00% | 52% | 68% | 50% | 65% | 48% | 62% | 48% | 62% | 56% | 73% | 50% | 50% | 51% | 51% |
| 10338 | 1.00% | 0.25% | 0.25% | 9.00% | 1.00% | 54% | 70% | 51% | 66% | 51% | 66% | 50% | 65% | 58% | 75% | 52% | 52% | 53% | 53% |
| 10339 | 9.00% | 0.25% | 0.25% | 9.00% | 1.00% | 50% | 65% | 49% | 64% | 46% | 60% | 47% | 61% | 55% | 72% | 48% | 48% | 49% | 49% |
| 10340 | 0.00% | 1.00% | 0.25% | 9.00% | 1.00% | 53% | 69% | 52% | 68% | 50% | 65% | 50% | 65% | 58% | 75% | 52% | 52% | 53% | 53% |
| 10341 | 0.25% | 1.00% | 0.25% | 9.00% | 1.00% | 55% | 72% | 53% | 69% | 52% | 68% | 51% | 66% | 59% | 77% | 53% | 53% | 54% | 54% |
| 10342 | 1.00% | 1.00% | 0.25% | 9.00% | 1.00% | 57% | 74% | 54% | 70% | 55% | 72% | 53% | 69% | 61% | 79% | 55% | 55% | 56% | 56% |
| 10343 | 0.25% | 9.00% | 0.25% | 9.00% | 1.00% | 63% | 82% | 61% | 79% | 58% | 75% | 58% | 75% | 66% | 86% | 61% | 61% | 61% | 61% |
| 10344 | 0.25% | 0.00% | 1.00% | 9.00% | 1.00% | 53% | 69% | 48% | 62% | 50% | 65% | 49% | 64% | 56% | 73% | 50% | 50% | 52% | 52% |
| 10345 | 1.00% | 0.25% | 1.00% | 9.00% | 1.00% | 59% | 77% | 54% | 70% | 57% | 74% | 56% | 73% | 62% | 81% | 57% | 57% | 58% | 58% |
| 10346 | 9.00% | 0.25% | 1.00% | 9.00% | 1.00% | 55% | 72% | 52% | 68% | 52% | 68% | 53% | 69% | 59% | 77% | 53% | 53% | 55% | 55% |
| 10347 | 0.00% | 1.00% | 1.00% | 9.00% | 1.00% | 58% | 75% | 55% | 72% | 56% | 73% | 56% | 73% | 62% | 81% | 56% | 56% | 58% | 58% |
| 10348 | 0.25% | 1.00% | 1.00% | 9.00% | 1.00% | 60% | 78% | 56% | 73% | 58% | 75% | 57% | 74% | 63% | 82% | 58% | 58% | 59% | 59% |
| 10349 | 1.00% | 1.00% | 1.00% | 9.00% | 1.00% | 62% | 81% | 57% | 74% | 61% | 79% | 59% | 77% | 65% | 85% | 60% | 60% | 62% | 62% |
| 10350 | 0.25% | 0.25% | 9.00% | 9.00% | 1.00% | 67% | 87% | 58% | 75% | 59% | 77% | 65% | 85% | 70% | 91% | 61% | 61% | 65% | 65% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10351 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 10352 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 10353 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 10354 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 10355 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 10356 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 10357 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 10358 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 10359 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 10360 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 10361 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 10362 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 10363 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 10364 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 10365 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 10366 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 10367 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 10368 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 10369 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 10370 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 10371 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 10372 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 10373 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 10374 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 10375 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10376 | 0.25% | 0.00% | 0.00% | 0.25% | 0.00% | 9% | 12% | 6% | 8% | 7% | 9% | 11% | 14% | 7% | 9% | 7% | 7% | 8% | 8% |
| 10377 | 1.00% | 0.00% | 0.00% | 0.25% | 0.00% | 11% | 14% | 7% | 9% | 10% | 13% | 13% | 17% | 9% | 12% | 9% | 9% | 11% | 11% |
| 10378 | 0.00% | 0.25% | 0.00% | 0.25% | 0.00% | 11% | 14% | 10% | 13% | 9% | 12% | 15% | 20% | 10% | 13% | 10% | 10% | 11% | 11% |
| 10379 | 0.25% | 0.25% | 0.00% | 0.25% | 0.00% | 13% | 17% | 11% | 14% | 11% | 14% | 16% | 21% | 11% | 14% | 12% | 12% | 13% | 13% |
| 10380 | 9.00% | 0.25% | 0.00% | 0.25% | 0.00% | 11% | 14% | 10% | 13% | 9% | 12% | 15% | 20% | 10% | 13% | 10% | 10% | 11% | 11% |
| 10381 | 1.00% | 1.00% | 0.00% | 0.25% | 0.00% | 18% | 23% | 15% | 20% | 18% | 23% | 21% | 27% | 16% | 21% | 17% | 17% | 18% | 18% |
| 10382 | 1.00% | 9.00% | 0.00% | 0.25% | 0.00% | 26% | 34% | 23% | 30% | 24% | 31% | 28% | 36% | 23% | 30% | 24% | 24% | 25% | 25% |
| 10383 | 0.00% | 0.00% | 0.25% | 0.25% | 0.00% | 11% | 14% | 11% | 14% | 9% | 12% | 13% | 17% | 11% | 14% | 10% | 10% | 11% | 11% |
| 10384 | 0.25% | 0.00% | 0.25% | 0.25% | 0.00% | 13% | 17% | 12% | 16% | 11% | 14% | 14% | 18% | 12% | 16% | 12% | 12% | 12% | 12% |
| 10385 | 0.00% | 0.25% | 0.25% | 0.25% | 0.00% | 15% | 20% | 16% | 21% | 13% | 17% | 18% | 23% | 15% | 20% | 15% | 15% | 15% | 15% |
| 10386 | 0.25% | 0.25% | 0.25% | 0.25% | 0.00% | 17% | 22% | 17% | 22% | 15% | 20% | 19% | 25% | 16% | 21% | 16% | 16% | 17% | 17% |
| 10387 | 1.00% | 0.25% | 0.25% | 0.25% | 0.00% | 19% | 25% | 18% | 23% | 18% | 23% | 21% | 27% | 18% | 23% | 18% | 18% | 19% | 19% |
| 10388 | 9.00% | 0.25% | 0.25% | 0.25% | 0.00% | 15% | 20% | 16% | 21% | 13% | 17% | 18% | 23% | 15% | 20% | 15% | 15% | 15% | 15% |
| 10389 | 0.25% | 1.00% | 0.25% | 0.25% | 0.00% | 20% | 26% | 20% | 26% | 19% | 25% | 22% | 29% | 19% | 25% | 20% | 20% | 20% | 20% |
| 10390 | 9.00% | 1.00% | 0.25% | 0.25% | 0.00% | 18% | 23% | 19% | 25% | 17% | 22% | 21% | 27% | 18% | 23% | 18% | 18% | 19% | 19% |
| 10391 | 0.25% | 9.00% | 0.25% | 0.25% | 0.00% | 28% | 36% | 28% | 36% | 25% | 33% | 29% | 38% | 26% | 34% | 27% | 27% | 27% | 27% |
| 10392 | 1.00% | 9.00% | 0.25% | 0.25% | 0.00% | 30% | 39% | 29% | 38% | 28% | 36% | 31% | 40% | 28% | 36% | 29% | 29% | 29% | 29% |
| 10393 | 9.00% | 9.00% | 0.25% | 0.25% | 0.00% | 26% | 34% | 27% | 35% | 23% | 30% | 28% | 36% | 25% | 33% | 25% | 25% | 25% | 25% |
| 10394 | 0.00% | 0.00% | 1.00% | 0.25% | 0.00% | 16% | 21% | 14% | 18% | 15% | 20% | 19% | 25% | 15% | 20% | 15% | 15% | 16% | 16% |
| 10395 | 1.00% | 0.00% | 1.00% | 0.25% | 0.00% | 20% | 26% | 16% | 21% | 20% | 26% | 22% | 29% | 18% | 23% | 19% | 19% | 20% | 20% |
| 10396 | 0.00% | 0.25% | 1.00% | 0.25% | 0.00% | 20% | 26% | 19% | 25% | 19% | 25% | 24% | 31% | 19% | 25% | 19% | 19% | 21% | 21% |
| 10397 | 0.25% | 0.25% | 1.00% | 0.25% | 0.00% | 22% | 29% | 20% | 26% | 21% | 27% | 25% | 33% | 20% | 26% | 21% | 21% | 22% | 22% |
| 10398 | 1.00% | 0.25% | 1.00% | 0.25% | 0.00% | 24% | 31% | 21% | 27% | 24% | 31% | 27% | 35% | 22% | 29% | 23% | 23% | 24% | 24% |
| 10399 | 9.00% | 0.25% | 1.00% | 0.25% | 0.00% | 20% | 26% | 19% | 25% | 19% | 25% | 24% | 31% | 19% | 25% | 19% | 19% | 21% | 21% |
| 10400 | 0.00% | 1.00% | 1.00% | 0.25% | 0.00% | 23% | 30% | 22% | 29% | 23% | 30% | 27% | 35% | 22% | 29% | 23% | 23% | 24% | 24% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10401 | 0.25% | 1.00% | 1.00% | 0.25% | 0.00% | 25% | 33% | 23% | 30% | 25% | 33% | 28% | 36% | 23% | 30% | 24% | 24% | 25% | 25% |
| 10402 | 1.00% | 1.00% | 1.00% | 0.25% | 0.00% | 27% | 35% | 24% | 31% | 28% | 36% | 30% | 39% | 25% | 33% | 26% | 26% | 28% | 28% |
| 10403 | 9.00% | 1.00% | 1.00% | 0.25% | 0.00% | 23% | 30% | 22% | 29% | 23% | 30% | 27% | 35% | 22% | 29% | 23% | 23% | 24% | 24% |
| 10404 | 0.00% | 9.00% | 1.00% | 0.25% | 0.00% | 31% | 40% | 30% | 39% | 29% | 38% | 34% | 44% | 29% | 38% | 30% | 30% | 31% | 31% |
| 10405 | 0.25% | 9.00% | 1.00% | 0.25% | 0.00% | 33% | 43% | 31% | 40% | 31% | 40% | 35% | 46% | 30% | 39% | 32% | 32% | 32% | 32% |
| 10406 | 1.00% | 9.00% | 1.00% | 0.25% | 0.00% | 35% | 46% | 32% | 42% | 34% | 44% | 37% | 48% | 32% | 42% | 34% | 34% | 34% | 34% |
| 10407 | 0.25% | 0.25% | 9.00% | 0.25% | 0.00% | 32% | 42% | 25% | 33% | 26% | 34% | 36% | 47% | 30% | 39% | 28% | 28% | 31% | 31% |
| 10408 | 1.00% | 0.25% | 9.00% | 0.25% | 0.00% | 34% | 44% | 26% | 34% | 29% | 38% | 38% | 49% | 32% | 42% | 30% | 30% | 33% | 33% |
| 10409 | 9.00% | 0.25% | 9.00% | 0.25% | 0.00% | 30% | 39% | 24% | 31% | 24% | 31% | 35% | 46% | 29% | 38% | 26% | 26% | 29% | 29% |
| 10410 | 0.00% | 1.00% | 9.00% | 0.25% | 0.00% | 33% | 43% | 27% | 35% | 28% | 36% | 38% | 49% | 32% | 42% | 29% | 29% | 33% | 33% |
| 10411 | 0.25% | 1.00% | 9.00% | 0.25% | 0.00% | 35% | 46% | 28% | 36% | 30% | 39% | 39% | 51% | 33% | 43% | 31% | 31% | 34% | 34% |
| 10412 | 9.00% | 1.00% | 9.00% | 0.25% | 0.00% | 33% | 43% | 27% | 35% | 28% | 36% | 38% | 49% | 32% | 42% | 29% | 29% | 33% | 33% |
| 10413 | 1.00% | 9.00% | 9.00% | 0.25% | 0.00% | 45% | 59% | 37% | 48% | 39% | 51% | 48% | 62% | 42% | 55% | 40% | 40% | 43% | 43% |
| 10414 | 0.25% | 0.00% | 0.00% | 1.00% | 0.00% | 17% | 22% | 13% | 17% | 14% | 18% | 18% | 23% | 16% | 21% | 15% | 15% | 16% | 16% |
| 10415 | 1.00% | 0.25% | 0.00% | 1.00% | 0.00% | 23% | 30% | 19% | 25% | 21% | 27% | 25% | 33% | 22% | 29% | 21% | 21% | 23% | 23% |
| 10416 | 0.00% | 1.00% | 0.00% | 1.00% | 0.00% | 22% | 29% | 20% | 26% | 20% | 26% | 25% | 33% | 22% | 29% | 21% | 21% | 22% | 22% |
| 10417 | 0.25% | 1.00% | 0.00% | 1.00% | 0.00% | 24% | 31% | 21% | 27% | 22% | 29% | 26% | 34% | 23% | 30% | 22% | 22% | 24% | 24% |
| 10418 | 1.00% | 1.00% | 0.00% | 1.00% | 0.00% | 26% | 34% | 22% | 29% | 25% | 33% | 28% | 36% | 25% | 33% | 24% | 24% | 26% | 26% |
| 10419 | 0.00% | 0.00% | 0.25% | 1.00% | 0.00% | 19% | 25% | 18% | 23% | 16% | 21% | 20% | 26% | 20% | 26% | 18% | 18% | 19% | 19% |
| 10420 | 1.00% | 0.00% | 0.25% | 1.00% | 0.00% | 23% | 30% | 20% | 26% | 21% | 27% | 23% | 30% | 23% | 30% | 21% | 21% | 22% | 22% |
| 10421 | 0.25% | 0.25% | 0.25% | 1.00% | 0.00% | 25% | 33% | 24% | 31% | 22% | 29% | 26% | 34% | 25% | 33% | 24% | 24% | 24% | 24% |
| 10422 | 1.00% | 0.25% | 0.25% | 1.00% | 0.00% | 27% | 35% | 25% | 33% | 25% | 33% | 28% | 36% | 27% | 35% | 26% | 26% | 27% | 27% |
| 10423 | 9.00% | 0.25% | 0.25% | 1.00% | 0.00% | 23% | 30% | 23% | 30% | 20% | 26% | 25% | 33% | 24% | 31% | 22% | 22% | 23% | 23% |
| 10424 | 0.00% | 1.00% | 0.25% | 1.00% | 0.00% | 26% | 34% | 26% | 34% | 24% | 31% | 28% | 36% | 27% | 35% | 25% | 25% | 26% | 26% |
| 10425 | 0.25% | 1.00% | 0.25% | 1.00% | 0.00% | 28% | 36% | 27% | 35% | 26% | 34% | 29% | 38% | 28% | 36% | 27% | 27% | 28% | 28% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10426 | 1.00% | 1.00% | 0.25% | 1.00% | 0.00% | 30% | 39% | 28% | 36% | 29% | 38% | 31% | 40% | 30% | 39% | 29% | 29% | 30% | 30% |
| 10427 | 9.00% | 1.00% | 0.25% | 1.00% | 0.00% | 26% | 34% | 26% | 34% | 24% | 31% | 28% | 36% | 27% | 35% | 25% | 25% | 26% | 26% |
| 10428 | 0.25% | 9.00% | 0.25% | 1.00% | 0.00% | 36% | 47% | 35% | 46% | 32% | 42% | 36% | 47% | 35% | 46% | 34% | 34% | 34% | 34% |
| 10429 | 1.00% | 9.00% | 0.25% | 1.00% | 0.00% | 38% | 49% | 36% | 47% | 35% | 46% | 38% | 49% | 37% | 48% | 36% | 36% | 37% | 37% |
| 10430 | 9.00% | 9.00% | 0.25% | 1.00% | 0.00% | 34% | 44% | 34% | 44% | 30% | 39% | 35% | 46% | 34% | 44% | 33% | 33% | 33% | 33% |
| 10431 | 0.00% | 0.00% | 1.00% | 1.00% | 0.00% | 24% | 31% | 21% | 27% | 22% | 29% | 26% | 34% | 24% | 31% | 22% | 22% | 24% | 24% |
| 10432 | 0.25% | 0.00% | 1.00% | 1.00% | 0.00% | 26% | 34% | 22% | 29% | 24% | 31% | 27% | 35% | 25% | 33% | 24% | 24% | 25% | 25% |
| 10433 | 1.00% | 0.00% | 1.00% | 1.00% | 0.00% | 28% | 36% | 23% | 30% | 27% | 35% | 29% | 38% | 27% | 35% | 26% | 26% | 28% | 28% |
| 10434 | 0.00% | 0.25% | 1.00% | 1.00% | 0.00% | 28% | 36% | 26% | 34% | 26% | 34% | 31% | 40% | 28% | 36% | 27% | 27% | 28% | 28% |
| 10435 | 1.00% | 0.25% | 1.00% | 1.00% | 0.00% | 32% | 42% | 28% | 36% | 31% | 40% | 34% | 44% | 31% | 40% | 30% | 30% | 32% | 32% |
| 10436 | 9.00% | 0.25% | 1.00% | 1.00% | 0.00% | 28% | 36% | 26% | 34% | 26% | 34% | 31% | 40% | 28% | 36% | 27% | 27% | 28% | 28% |
| 10437 | 0.00% | 1.00% | 1.00% | 1.00% | 0.00% | 31% | 40% | 29% | 38% | 30% | 39% | 34% | 44% | 31% | 40% | 30% | 30% | 32% | 32% |
| 10438 | 0.25% | 1.00% | 1.00% | 1.00% | 0.00% | 33% | 43% | 30% | 39% | 32% | 42% | 35% | 46% | 32% | 42% | 32% | 32% | 33% | 33% |
| 10439 | 1.00% | 1.00% | 1.00% | 1.00% | 0.00% | 35% | 46% | 31% | 40% | 35% | 46% | 37% | 48% | 34% | 44% | 34% | 34% | 35% | 35% |
| 10440 | 9.00% | 1.00% | 1.00% | 1.00% | 0.00% | 31% | 40% | 29% | 38% | 30% | 39% | 34% | 44% | 31% | 40% | 30% | 30% | 32% | 32% |
| 10441 | 0.00% | 9.00% | 1.00% | 1.00% | 0.00% | 39% | 51% | 37% | 48% | 36% | 47% | 41% | 53% | 38% | 49% | 37% | 37% | 38% | 38% |
| 10442 | 0.25% | 9.00% | 1.00% | 1.00% | 0.00% | 41% | 53% | 38% | 49% | 38% | 49% | 42% | 55% | 39% | 51% | 39% | 39% | 40% | 40% |
| 10443 | 1.00% | 9.00% | 1.00% | 1.00% | 0.00% | 43% | 56% | 39% | 51% | 41% | 53% | 44% | 57% | 41% | 53% | 41% | 41% | 42% | 42% |
| 10444 | 0.25% | 0.25% | 9.00% | 1.00% | 0.00% | 40% | 52% | 32% | 42% | 33% | 43% | 43% | 56% | 39% | 51% | 35% | 35% | 38% | 38% |
| 10445 | 1.00% | 0.25% | 9.00% | 1.00% | 0.00% | 42% | 55% | 33% | 43% | 36% | 47% | 45% | 59% | 41% | 53% | 37% | 37% | 41% | 41% |
| 10446 | 9.00% | 0.25% | 9.00% | 1.00% | 0.00% | 38% | 49% | 31% | 40% | 31% | 40% | 42% | 55% | 38% | 49% | 33% | 33% | 37% | 37% |
| 10447 | 0.25% | 1.00% | 9.00% | 1.00% | 0.00% | 43% | 56% | 35% | 46% | 37% | 48% | 46% | 60% | 42% | 55% | 38% | 38% | 42% | 42% |
| 10448 | 0.00% | 0.25% | 0.00% | 9.00% | 0.00% | 41% | 53% | 37% | 48% | 32% | 42% | 44% | 57% | 39% | 51% | 37% | 37% | 38% | 38% |
| 10449 | 0.00% | 0.00% | 0.25% | 9.00% | 0.00% | 41% | 53% | 38% | 49% | 32% | 42% | 42% | 55% | 40% | 52% | 37% | 37% | 38% | 38% |
| 10450 | 0.25% | 0.00% | 0.25% | 9.00% | 0.00% | 43% | 56% | 39% | 51% | 34% | 44% | 43% | 56% | 41% | 53% | 39% | 39% | 39% | 39% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10451 | 0.00% | 0.25% | 0.25% | 9.00% | 0.00% | 45% | 59% | 43% | 56% | 36% | 47% | 47% | 61% | 44% | 57% | 41% | 41% | 42% | 42% |
| 10452 | 0.25% | 0.25% | 0.25% | 9.00% | 0.00% | 47% | 61% | 44% | 57% | 38% | 49% | 48% | 62% | 45% | 59% | 43% | 43% | 44% | 44% |
| 10453 | 1.00% | 0.25% | 0.25% | 9.00% | 0.00% | 49% | 64% | 45% | 59% | 41% | 53% | 50% | 65% | 47% | 61% | 45% | 45% | 46% | 46% |
| 10454 | 9.00% | 0.25% | 0.25% | 9.00% | 0.00% | 45% | 59% | 43% | 56% | 36% | 47% | 47% | 61% | 44% | 57% | 41% | 41% | 42% | 42% |
| 10455 | 0.00% | 1.00% | 0.25% | 9.00% | 0.00% | 48% | 62% | 46% | 60% | 40% | 52% | 50% | 65% | 47% | 61% | 45% | 45% | 46% | 46% |
| 10456 | 0.25% | 1.00% | 0.25% | 9.00% | 0.00% | 50% | 65% | 47% | 61% | 42% | 55% | 51% | 66% | 48% | 62% | 46% | 46% | 47% | 47% |
| 10457 | 1.00% | 1.00% | 0.25% | 9.00% | 0.00% | 52% | 68% | 48% | 62% | 45% | 59% | 53% | 69% | 50% | 65% | 48% | 48% | 49% | 49% |
| 10458 | 0.25% | 9.00% | 0.25% | 9.00% | 0.00% | 58% | 75% | 55% | 72% | 48% | 62% | 58% | 75% | 55% | 72% | 54% | 54% | 54% | 54% |
| 10459 | 0.25% | 0.00% | 1.00% | 9.00% | 0.00% | 48% | 62% | 42% | 55% | 40% | 52% | 49% | 64% | 45% | 59% | 43% | 43% | 45% | 45% |
| 10460 | 1.00% | 0.25% | 1.00% | 9.00% | 0.00% | 54% | 70% | 48% | 62% | 47% | 61% | 56% | 73% | 51% | 66% | 50% | 50% | 51% | 51% |
| 10461 | 9.00% | 0.25% | 1.00% | 9.00% | 0.00% | 50% | 65% | 46% | 60% | 42% | 55% | 53% | 69% | 48% | 62% | 46% | 46% | 48% | 48% |
| 10462 | 0.00% | 1.00% | 1.00% | 9.00% | 0.00% | 53% | 69% | 49% | 64% | 46% | 60% | 56% | 73% | 51% | 66% | 49% | 49% | 51% | 51% |
| 10463 | 0.25% | 1.00% | 1.00% | 9.00% | 0.00% | 55% | 72% | 50% | 65% | 48% | 62% | 57% | 74% | 52% | 68% | 51% | 51% | 52% | 52% |
| 10464 | 1.00% | 1.00% | 1.00% | 9.00% | 0.00% | 57% | 74% | 51% | 66% | 51% | 66% | 59% | 77% | 54% | 70% | 53% | 53% | 55% | 55% |
| 10465 | 0.25% | 0.25% | 9.00% | 9.00% | 0.00% | 62% | 81% | 52% | 68% | 49% | 64% | 65% | 85% | 59% | 77% | 54% | 54% | 58% | 58% |
| 10466 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 10467 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 10468 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 10469 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 10470 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 10471 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 10472 | 0.00% | 0.25% | 0.25% | 0.00% | 0.25% | 15% | 20% | 18% | 23% | 15% | 20% | 16% | 21% | 17% | 22% | 16% | 16% | 16% | 16% |
| 10473 | 0.25% | 0.25% | 0.25% | 0.00% | 0.25% | 17% | 22% | 19% | 25% | 17% | 22% | 17% | 22% | 18% | 23% | 18% | 18% | 17% | 17% |
| 10474 | 0.00% | 1.00% | 0.25% | 0.00% | 0.25% | 18% | 23% | 21% | 27% | 19% | 25% | 19% | 25% | 20% | 26% | 19% | 19% | 19% | 19% |
| 10475 | 1.00% | 1.00% | 0.25% | 0.00% | 0.25% | 22% | 29% | 23% | 30% | 24% | 31% | 22% | 29% | 23% | 30% | 23% | 23% | 23% | 23% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10476 | 1.00% | 9.00% | 0.25% | 0.00% | 0.25% | 30% | 39% | 31% | 40% | 30% | 39% | 29% | 38% | 30% | 39% | 30% | 30% | 30% | 30% |
| 10477 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 10478 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 10479 | 0.00% | 0.25% | 1.00% | 0.00% | 0.25% | 20% | 26% | 21% | 27% | 21% | 27% | 22% | 29% | 21% | 27% | 21% | 21% | 21% | 21% |
| 10480 | 1.00% | 0.25% | 1.00% | 0.00% | 0.25% | 24% | 31% | 23% | 30% | 26% | 34% | 25% | 33% | 24% | 31% | 24% | 24% | 25% | 25% |
| 10481 | 0.00% | 1.00% | 1.00% | 0.00% | 0.25% | 23% | 30% | 24% | 31% | 25% | 33% | 25% | 33% | 24% | 31% | 24% | 24% | 25% | 25% |
| 10482 | 0.25% | 1.00% | 1.00% | 0.00% | 0.25% | 25% | 33% | 25% | 33% | 27% | 35% | 26% | 34% | 25% | 33% | 26% | 26% | 26% | 26% |
| 10483 | 1.00% | 1.00% | 1.00% | 0.00% | 0.25% | 27% | 35% | 26% | 34% | 30% | 39% | 28% | 36% | 27% | 35% | 28% | 28% | 28% | 28% |
| 10484 | 9.00% | 1.00% | 1.00% | 0.00% | 0.25% | 23% | 30% | 24% | 31% | 25% | 33% | 25% | 33% | 24% | 31% | 24% | 24% | 25% | 25% |
| 10485 | 1.00% | 9.00% | 1.00% | 0.00% | 0.25% | 35% | 46% | 34% | 44% | 36% | 47% | 35% | 46% | 34% | 44% | 35% | 35% | 35% | 35% |
| 10486 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 10487 | 0.00% | 0.25% | 9.00% | 0.00% | 0.25% | 30% | 39% | 26% | 34% | 26% | 34% | 33% | 43% | 31% | 40% | 27% | 27% | 30% | 30% |
| 10488 | 0.25% | 0.25% | 9.00% | 0.00% | 0.25% | 32% | 42% | 27% | 35% | 28% | 36% | 34% | 44% | 32% | 42% | 29% | 29% | 31% | 31% |
| 10489 | 1.00% | 0.25% | 9.00% | 0.00% | 0.25% | 34% | 44% | 28% | 36% | 31% | 40% | 36% | 47% | 34% | 44% | 31% | 31% | 34% | 34% |
| 10490 | 0.25% | 1.00% | 9.00% | 0.00% | 0.25% | 35% | 46% | 30% | 39% | 32% | 42% | 37% | 48% | 35% | 46% | 32% | 32% | 35% | 35% |
| 10491 | 0.25% | 0.00% | 0.00% | 0.25% | 0.25% | 16% | 21% | 13% | 17% | 14% | 18% | 19% | 25% | 15% | 20% | 14% | 14% | 16% | 16% |
| 10492 | 1.00% | 0.00% | 0.00% | 0.25% | 0.25% | 18% | 23% | 14% | 18% | 17% | 22% | 21% | 27% | 17% | 22% | 16% | 16% | 18% | 18% |
| 10493 | 0.00% | 0.25% | 0.00% | 0.25% | 0.25% | 18% | 23% | 17% | 22% | 16% | 21% | 23% | 30% | 18% | 23% | 17% | 17% | 19% | 19% |
| 10494 | 0.25% | 0.25% | 0.00% | 0.25% | 0.25% | 20% | 26% | 18% | 23% | 18% | 23% | 24% | 31% | 19% | 25% | 19% | 19% | 20% | 20% |
| 10495 | 9.00% | 0.25% | 0.00% | 0.25% | 0.25% | 18% | 23% | 17% | 22% | 16% | 21% | 23% | 30% | 18% | 23% | 17% | 17% | 19% | 19% |
| 10496 | 1.00% | 1.00% | 0.00% | 0.25% | 0.25% | 25% | 33% | 22% | 29% | 25% | 33% | 29% | 38% | 24% | 31% | 24% | 24% | 26% | 26% |
| 10497 | 1.00% | 9.00% | 0.00% | 0.25% | 0.25% | 33% | 43% | 30% | 39% | 31% | 40% | 36% | 47% | 31% | 40% | 31% | 31% | 33% | 33% |
| 10498 | 0.00% | 0.00% | 0.25% | 0.25% | 0.25% | 18% | 23% | 18% | 23% | 16% | 21% | 21% | 27% | 19% | 25% | 17% | 17% | 19% | 19% |
| 10499 | 0.25% | 0.00% | 0.25% | 0.25% | 0.25% | 20% | 26% | 19% | 25% | 18% | 23% | 22% | 29% | 20% | 26% | 19% | 19% | 20% | 20% |
| 10500 | 0.00% | 0.25% | 0.25% | 0.25% | 0.25% | 22% | 29% | 23% | 30% | 20% | 26% | 26% | 34% | 23% | 30% | 22% | 22% | 23% | 23% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10501 | 0.25% | 0.25% | 0.25% | 0.25% | 0.25% | 24% | 31% | 24% | 31% | 22% | 29% | 27% | 35% | 24% | 31% | 23% | 23% | 24% | 24% |
| 10502 | 1.00% | 0.25% | 0.25% | 0.25% | 0.25% | 26% | 34% | 25% | 33% | 25% | 33% | 29% | 38% | 26% | 34% | 25% | 25% | 27% | 27% |
| 10503 | 9.00% | 0.25% | 0.25% | 0.25% | 0.25% | 22% | 29% | 23% | 30% | 20% | 26% | 26% | 34% | 23% | 30% | 22% | 22% | 23% | 23% |
| 10504 | 0.25% | 1.00% | 0.25% | 0.25% | 0.25% | 27% | 35% | 27% | 35% | 26% | 34% | 30% | 39% | 27% | 35% | 27% | 27% | 28% | 28% |
| 10505 | 9.00% | 1.00% | 0.25% | 0.25% | 0.25% | 25% | 33% | 26% | 34% | 24% | 31% | 29% | 38% | 26% | 34% | 25% | 25% | 26% | 26% |
| 10506 | 0.25% | 9.00% | 0.25% | 0.25% | 0.25% | 35% | 46% | 35% | 46% | 32% | 42% | 37% | 48% | 34% | 44% | 34% | 34% | 34% | 34% |
| 10507 | 1.00% | 9.00% | 0.25% | 0.25% | 0.25% | 37% | 48% | 36% | 47% | 35% | 46% | 39% | 51% | 36% | 47% | 36% | 36% | 37% | 37% |
| 10508 | 9.00% | 9.00% | 0.25% | 0.25% | 0.25% | 33% | 43% | 34% | 44% | 30% | 39% | 36% | 47% | 33% | 43% | 32% | 32% | 33% | 33% |
| 10509 | 0.00% | 0.00% | 1.00% | 0.25% | 0.25% | 23% | 30% | 21% | 27% | 22% | 29% | 27% | 35% | 23% | 30% | 22% | 22% | 24% | 24% |
| 10510 | 1.00% | 0.00% | 1.00% | 0.25% | 0.25% | 27% | 35% | 23% | 30% | 27% | 35% | 30% | 39% | 26% | 34% | 26% | 26% | 28% | 28% |
| 10511 | 0.00% | 0.25% | 1.00% | 0.25% | 0.25% | 27% | 35% | 26% | 34% | 26% | 34% | 32% | 42% | 27% | 35% | 26% | 26% | 28% | 28% |
| 10512 | 0.25% | 0.25% | 1.00% | 0.25% | 0.25% | 29% | 38% | 27% | 35% | 28% | 36% | 33% | 43% | 28% | 36% | 28% | 28% | 30% | 30% |
| 10513 | 1.00% | 0.25% | 1.00% | 0.25% | 0.25% | 31% | 40% | 28% | 36% | 31% | 40% | 35% | 46% | 30% | 39% | 30% | 30% | 32% | 32% |
| 10514 | 9.00% | 0.25% | 1.00% | 0.25% | 0.25% | 27% | 35% | 26% | 34% | 26% | 34% | 32% | 42% | 27% | 35% | 26% | 26% | 28% | 28% |
| 10515 | 0.00% | 1.00% | 1.00% | 0.25% | 0.25% | 30% | 39% | 29% | 38% | 30% | 39% | 35% | 46% | 30% | 39% | 30% | 30% | 32% | 32% |
| 10516 | 0.25% | 1.00% | 1.00% | 0.25% | 0.25% | 32% | 42% | 30% | 39% | 32% | 42% | 36% | 47% | 31% | 40% | 31% | 31% | 33% | 33% |
| 10517 | 1.00% | 1.00% | 1.00% | 0.25% | 0.25% | 34% | 44% | 31% | 40% | 35% | 46% | 38% | 49% | 33% | 43% | 33% | 33% | 35% | 35% |
| 10518 | 9.00% | 1.00% | 1.00% | 0.25% | 0.25% | 30% | 39% | 29% | 38% | 30% | 39% | 35% | 46% | 30% | 39% | 30% | 30% | 32% | 32% |
| 10519 | 0.00% | 9.00% | 1.00% | 0.25% | 0.25% | 38% | 49% | 37% | 48% | 36% | 47% | 42% | 55% | 37% | 48% | 37% | 37% | 38% | 38% |
| 10520 | 0.25% | 9.00% | 1.00% | 0.25% | 0.25% | 40% | 52% | 38% | 49% | 38% | 49% | 43% | 56% | 38% | 49% | 39% | 39% | 40% | 40% |
| 10521 | 1.00% | 9.00% | 1.00% | 0.25% | 0.25% | 42% | 55% | 39% | 51% | 41% | 53% | 45% | 59% | 40% | 52% | 41% | 41% | 42% | 42% |
| 10522 | 0.25% | 0.25% | 9.00% | 0.25% | 0.25% | 39% | 51% | 32% | 42% | 33% | 43% | 44% | 57% | 38% | 49% | 35% | 35% | 38% | 38% |
| 10523 | 1.00% | 0.25% | 9.00% | 0.25% | 0.25% | 41% | 53% | 33% | 43% | 36% | 47% | 46% | 60% | 40% | 52% | 37% | 37% | 41% | 41% |
| 10524 | 9.00% | 0.25% | 9.00% | 0.25% | 0.25% | 37% | 48% | 31% | 40% | 31% | 40% | 43% | 56% | 37% | 48% | 33% | 33% | 37% | 37% |
| 10525 | 0.00% | 1.00% | 9.00% | 0.25% | 0.25% | 40% | 52% | 34% | 44% | 35% | 46% | 46% | 60% | 40% | 52% | 36% | 36% | 40% | 40% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10526 | 0.25% | 1.00% | 9.00% | 0.25% | 0.25% | 42% | 55% | 35% | 46% | 37% | 48% | 47% | 61% | 41% | 53% | 38% | 38% | 42% | 42% |
| 10527 | 9.00% | 1.00% | 9.00% | 0.25% | 0.25% | 40% | 52% | 34% | 44% | 35% | 46% | 46% | 60% | 40% | 52% | 36% | 36% | 40% | 40% |
| 10528 | 1.00% | 9.00% | 9.00% | 0.25% | 0.25% | 52% | 68% | 44% | 57% | 46% | 60% | 56% | 73% | 50% | 65% | 47% | 47% | 51% | 51% |
| 10529 | 0.25% | 0.00% | 0.00% | 1.00% | 0.25% | 24% | 31% | 20% | 26% | 21% | 27% | 26% | 34% | 24% | 31% | 22% | 22% | 24% | 24% |
| 10530 | 1.00% | 0.25% | 0.00% | 1.00% | 0.25% | 30% | 39% | 26% | 34% | 28% | 36% | 33% | 43% | 30% | 39% | 28% | 28% | 30% | 30% |
| 10531 | 0.00% | 1.00% | 0.00% | 1.00% | 0.25% | 29% | 38% | 27% | 35% | 27% | 35% | 33% | 43% | 30% | 39% | 28% | 28% | 30% | 30% |
| 10532 | 0.25% | 1.00% | 0.00% | 1.00% | 0.25% | 31% | 40% | 28% | 36% | 29% | 38% | 34% | 44% | 31% | 40% | 29% | 29% | 31% | 31% |
| 10533 | 1.00% | 1.00% | 0.00% | 1.00% | 0.25% | 33% | 43% | 29% | 38% | 32% | 42% | 36% | 47% | 33% | 43% | 31% | 31% | 34% | 34% |
| 10534 | 0.00% | 0.00% | 0.25% | 1.00% | 0.25% | 26% | 34% | 25% | 33% | 23% | 30% | 28% | 36% | 28% | 36% | 25% | 25% | 26% | 26% |
| 10535 | 1.00% | 0.00% | 0.25% | 1.00% | 0.25% | 30% | 39% | 27% | 35% | 28% | 36% | 31% | 40% | 31% | 40% | 28% | 28% | 30% | 30% |
| 10536 | 0.25% | 0.25% | 0.25% | 1.00% | 0.25% | 32% | 42% | 31% | 40% | 29% | 38% | 34% | 44% | 33% | 43% | 31% | 31% | 32% | 32% |
| 10537 | 1.00% | 0.25% | 0.25% | 1.00% | 0.25% | 34% | 44% | 32% | 42% | 32% | 42% | 36% | 47% | 35% | 46% | 33% | 33% | 34% | 34% |
| 10538 | 9.00% | 0.25% | 0.25% | 1.00% | 0.25% | 30% | 39% | 30% | 39% | 27% | 35% | 33% | 43% | 32% | 42% | 29% | 29% | 31% | 31% |
| 10539 | 0.00% | 1.00% | 0.25% | 1.00% | 0.25% | 33% | 43% | 33% | 43% | 31% | 40% | 36% | 47% | 35% | 46% | 32% | 32% | 34% | 34% |
| 10540 | 0.25% | 1.00% | 0.25% | 1.00% | 0.25% | 35% | 46% | 34% | 44% | 33% | 43% | 37% | 48% | 36% | 47% | 34% | 34% | 35% | 35% |
| 10541 | 1.00% | 1.00% | 0.25% | 1.00% | 0.25% | 37% | 48% | 35% | 46% | 36% | 47% | 39% | 51% | 38% | 49% | 36% | 36% | 38% | 38% |
| 10542 | 9.00% | 1.00% | 0.25% | 1.00% | 0.25% | 33% | 43% | 33% | 43% | 31% | 40% | 36% | 47% | 35% | 46% | 32% | 32% | 34% | 34% |
| 10543 | 0.25% | 9.00% | 0.25% | 1.00% | 0.25% | 43% | 56% | 42% | 55% | 39% | 51% | 44% | 57% | 43% | 56% | 41% | 41% | 42% | 42% |
| 10544 | 1.00% | 9.00% | 0.25% | 1.00% | 0.25% | 45% | 59% | 43% | 56% | 42% | 55% | 46% | 60% | 45% | 59% | 43% | 43% | 44% | 44% |
| 10545 | 9.00% | 9.00% | 0.25% | 1.00% | 0.25% | 41% | 53% | 41% | 53% | 37% | 48% | 43% | 56% | 42% | 55% | 40% | 40% | 41% | 41% |
| 10546 | 0.00% | 0.00% | 1.00% | 1.00% | 0.25% | 31% | 40% | 28% | 36% | 29% | 38% | 34% | 44% | 32% | 42% | 29% | 29% | 32% | 32% |
| 10547 | 0.25% | 0.00% | 1.00% | 1.00% | 0.25% | 33% | 43% | 29% | 38% | 31% | 40% | 35% | 46% | 33% | 43% | 31% | 31% | 33% | 33% |
| 10548 | 1.00% | 0.00% | 1.00% | 1.00% | 0.25% | 35% | 46% | 30% | 39% | 34% | 44% | 37% | 48% | 35% | 46% | 33% | 33% | 35% | 35% |
| 10549 | 0.00% | 0.25% | 1.00% | 1.00% | 0.25% | 35% | 46% | 33% | 43% | 33% | 43% | 39% | 51% | 36% | 47% | 34% | 34% | 36% | 36% |
| 10550 | 1.00% | 0.25% | 1.00% | 1.00% | 0.25% | 39% | 51% | 35% | 46% | 38% | 49% | 42% | 55% | 39% | 51% | 37% | 37% | 40% | 40% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10551 | 9.00% | 0.25% | 1.00% | 1.00% | 0.25% | 35% | 46% | 33% | 43% | 33% | 43% | 39% | 51% | 36% | 47% | 34% | 34% | 36% | 36% |
| 10552 | 0.00% | 1.00% | 1.00% | 1.00% | 0.25% | 38% | 49% | 36% | 47% | 37% | 48% | 42% | 55% | 39% | 51% | 37% | 37% | 39% | 39% |
| 10553 | 0.25% | 1.00% | 1.00% | 1.00% | 0.25% | 40% | 52% | 37% | 48% | 39% | 51% | 43% | 56% | 40% | 52% | 39% | 39% | 41% | 41% |
| 10554 | 1.00% | 1.00% | 1.00% | 1.00% | 0.25% | 42% | 55% | 38% | 49% | 42% | 55% | 45% | 59% | 42% | 55% | 41% | 41% | 43% | 43% |
| 10555 | 9.00% | 1.00% | 1.00% | 1.00% | 0.25% | 38% | 49% | 36% | 47% | 37% | 48% | 42% | 55% | 39% | 51% | 37% | 37% | 39% | 39% |
| 10556 | 0.00% | 9.00% | 1.00% | 1.00% | 0.25% | 46% | 60% | 44% | 57% | 43% | 56% | 49% | 64% | 46% | 60% | 44% | 44% | 46% | 46% |
| 10557 | 0.25% | 9.00% | 1.00% | 1.00% | 0.25% | 48% | 62% | 45% | 59% | 45% | 59% | 50% | 65% | 47% | 61% | 46% | 46% | 47% | 47% |
| 10558 | 1.00% | 9.00% | 1.00% | 1.00% | 0.25% | 50% | 65% | 46% | 60% | 48% | 62% | 52% | 68% | 49% | 64% | 48% | 48% | 50% | 50% |
| 10559 | 0.25% | 0.25% | 9.00% | 1.00% | 0.25% | 47% | 61% | 39% | 51% | 40% | 52% | 51% | 66% | 47% | 61% | 42% | 42% | 46% | 46% |
| 10560 | 1.00% | 0.25% | 9.00% | 1.00% | 0.25% | 49% | 64% | 40% | 52% | 43% | 56% | 53% | 69% | 49% | 64% | 44% | 44% | 48% | 48% |
| 10561 | 9.00% | 0.25% | 9.00% | 1.00% | 0.25% | 45% | 59% | 38% | 49% | 38% | 49% | 50% | 65% | 46% | 60% | 40% | 40% | 45% | 45% |
| 10562 | 0.25% | 1.00% | 9.00% | 1.00% | 0.25% | 50% | 65% | 42% | 55% | 44% | 57% | 54% | 70% | 50% | 65% | 45% | 45% | 49% | 49% |
| 10563 | 0.00% | 0.25% | 0.00% | 9.00% | 0.25% | 48% | 62% | 44% | 57% | 39% | 51% | 52% | 68% | 47% | 61% | 44% | 44% | 46% | 46% |
| 10564 | 0.00% | 0.00% | 0.25% | 9.00% | 0.25% | 48% | 62% | 45% | 59% | 39% | 51% | 50% | 65% | 48% | 62% | 44% | 44% | 46% | 46% |
| 10565 | 0.25% | 0.00% | 0.25% | 9.00% | 0.25% | 50% | 65% | 46% | 60% | 41% | 53% | 51% | 66% | 49% | 64% | 46% | 46% | 47% | 47% |
| 10566 | 0.00% | 0.25% | 0.25% | 9.00% | 0.25% | 52% | 68% | 50% | 65% | 43% | 56% | 55% | 72% | 52% | 68% | 48% | 48% | 50% | 50% |
| 10567 | 0.25% | 0.25% | 0.25% | 9.00% | 0.25% | 54% | 70% | 51% | 66% | 45% | 59% | 56% | 73% | 53% | 69% | 50% | 50% | 51% | 51% |
| 10568 | 1.00% | 0.25% | 0.25% | 9.00% | 0.25% | 56% | 73% | 52% | 68% | 48% | 62% | 58% | 75% | 55% | 72% | 52% | 52% | 54% | 54% |
| 10569 | 9.00% | 0.25% | 0.25% | 9.00% | 0.25% | 52% | 68% | 50% | 65% | 43% | 56% | 55% | 72% | 52% | 68% | 48% | 48% | 50% | 50% |
| 10570 | 0.00% | 1.00% | 0.25% | 9.00% | 0.25% | 55% | 72% | 53% | 69% | 47% | 61% | 58% | 75% | 55% | 72% | 52% | 52% | 53% | 53% |
| 10571 | 0.25% | 1.00% | 0.25% | 9.00% | 0.25% | 57% | 74% | 54% | 70% | 49% | 64% | 59% | 77% | 56% | 73% | 53% | 53% | 55% | 55% |
| 10572 | 1.00% | 1.00% | 0.25% | 9.00% | 0.25% | 59% | 77% | 55% | 72% | 52% | 68% | 61% | 79% | 58% | 75% | 55% | 55% | 57% | 57% |
| 10573 | 0.25% | 9.00% | 0.25% | 9.00% | 0.25% | 65% | 85% | 62% | 81% | 55% | 72% | 66% | 86% | 63% | 82% | 61% | 61% | 61% | 61% |
| 10574 | 0.25% | 0.00% | 1.00% | 9.00% | 0.25% | 55% | 72% | 49% | 64% | 47% | 61% | 57% | 74% | 53% | 69% | 50% | 50% | 52% | 52% |
| 10575 | 1.00% | 0.25% | 1.00% | 9.00% | 0.25% | 61% | 79% | 55% | 72% | 54% | 70% | 64% | 83% | 59% | 77% | 57% | 57% | 59% | 59% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10576 | 9.00% | 0.25% | 1.00% | 9.00% | 0.25% | 57% | 74% | 53% | 69% | 49% | 64% | 61% | 79% | 56% | 73% | 53% | 53% | 55% | 55% |
| 10577 | 0.00% | 1.00% | 1.00% | 9.00% | 0.25% | 60% | 78% | 56% | 73% | 53% | 69% | 64% | 83% | 59% | 77% | 56% | 56% | 59% | 59% |
| 10578 | 0.25% | 1.00% | 1.00% | 9.00% | 0.25% | 62% | 81% | 57% | 74% | 55% | 72% | 65% | 85% | 60% | 78% | 58% | 58% | 60% | 60% |
| 10579 | 1.00% | 1.00% | 1.00% | 9.00% | 0.25% | 64% | 83% | 58% | 75% | 58% | 75% | 67% | 87% | 62% | 81% | 60% | 60% | 62% | 62% |
| 10580 | 0.25% | 0.25% | 9.00% | 9.00% | 0.25% | 69% | 90% | 59% | 77% | 56% | 73% | 73% | 95% | 67% | 87% | 61% | 61% | 65% | 65% |
| 10581 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 10582 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 10583 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 10584 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 10585 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 10586 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 10587 | 0.00% | 0.25% | 0.25% | 0.00% | 1.00% | 23% | 30% | 27% | 35% | 24% | 31% | 22% | 29% | 28% | 36% | 25% | 25% | 25% | 25% |
| 10588 | 0.25% | 0.25% | 0.25% | 0.00% | 1.00% | 25% | 33% | 28% | 36% | 26% | 34% | 23% | 30% | 29% | 38% | 26% | 26% | 26% | 26% |
| 10589 | 0.00% | 1.00% | 0.25% | 0.00% | 1.00% | 26% | 34% | 30% | 39% | 28% | 36% | 25% | 33% | 31% | 40% | 28% | 28% | 28% | 28% |
| 10590 | 1.00% | 1.00% | 0.25% | 0.00% | 1.00% | 30% | 39% | 32% | 42% | 33% | 43% | 28% | 36% | 34% | 44% | 32% | 32% | 32% | 32% |
| 10591 | 1.00% | 9.00% | 0.25% | 0.00% | 1.00% | 38% | 49% | 40% | 52% | 39% | 51% | 35% | 46% | 41% | 53% | 39% | 39% | 38% | 38% |
| 10592 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 10593 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 10594 | 0.00% | 0.25% | 1.00% | 0.00% | 1.00% | 28% | 36% | 30% | 39% | 30% | 39% | 28% | 36% | 32% | 42% | 29% | 29% | 30% | 30% |
| 10595 | 1.00% | 0.25% | 1.00% | 0.00% | 1.00% | 32% | 42% | 32% | 42% | 35% | 46% | 31% | 40% | 35% | 46% | 33% | 33% | 34% | 34% |
| 10596 | 0.00% | 1.00% | 1.00% | 0.00% | 1.00% | 31% | 40% | 33% | 43% | 34% | 44% | 31% | 40% | 35% | 46% | 33% | 33% | 33% | 33% |
| 10597 | 0.25% | 1.00% | 1.00% | 0.00% | 1.00% | 33% | 43% | 34% | 44% | 36% | 47% | 32% | 42% | 36% | 47% | 34% | 34% | 35% | 35% |
| 10598 | 1.00% | 1.00% | 1.00% | 0.00% | 1.00% | 35% | 46% | 35% | 46% | 39% | 51% | 34% | 44% | 38% | 49% | 36% | 36% | 37% | 37% |
| 10599 | 9.00% | 1.00% | 1.00% | 0.00% | 1.00% | 31% | 40% | 33% | 43% | 34% | 44% | 31% | 40% | 35% | 46% | 33% | 33% | 33% | 33% |
| 10600 | 1.00% | 9.00% | 1.00% | 0.00% | 1.00% | 43% | 56% | 43% | 56% | 45% | 59% | 41% | 53% | 45% | 59% | 44% | 44% | 44% | 44% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10601 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 10602 | 0.00% | 0.25% | 9.00% | 0.00% | 1.00% | 38% | 49% | 35% | 46% | 35% | 46% | 39% | 51% | 42% | 55% | 36% | 36% | 39% | 39% |
| 10603 | 0.25% | 0.25% | 9.00% | 0.00% | 1.00% | 40% | 52% | 36% | 47% | 37% | 48% | 40% | 52% | 43% | 56% | 38% | 38% | 40% | 40% |
| 10604 | 1.00% | 0.25% | 9.00% | 0.00% | 1.00% | 42% | 55% | 37% | 48% | 40% | 52% | 42% | 55% | 45% | 59% | 40% | 40% | 42% | 42% |
| 10605 | 0.25% | 1.00% | 9.00% | 0.00% | 1.00% | 43% | 56% | 39% | 51% | 41% | 53% | 43% | 56% | 46% | 60% | 41% | 41% | 43% | 43% |
| 10606 | 0.25% | 0.00% | 0.00% | 0.25% | 1.00% | 24% | 31% | 22% | 29% | 23% | 30% | 25% | 33% | 26% | 34% | 23% | 23% | 25% | 25% |
| 10607 | 1.00% | 0.00% | 0.00% | 0.25% | 1.00% | 26% | 34% | 23% | 30% | 26% | 34% | 27% | 35% | 28% | 36% | 25% | 25% | 27% | 27% |
| 10608 | 0.00% | 0.25% | 0.00% | 0.25% | 1.00% | 26% | 34% | 26% | 34% | 25% | 33% | 29% | 38% | 29% | 38% | 26% | 26% | 28% | 28% |
| 10609 | 0.25% | 0.25% | 0.00% | 0.25% | 1.00% | 28% | 36% | 27% | 35% | 27% | 35% | 30% | 39% | 30% | 39% | 27% | 27% | 29% | 29% |
| 10610 | 9.00% | 0.25% | 0.00% | 0.25% | 1.00% | 26% | 34% | 26% | 34% | 25% | 33% | 29% | 38% | 29% | 38% | 26% | 26% | 28% | 28% |
| 10611 | 1.00% | 1.00% | 0.00% | 0.25% | 1.00% | 33% | 43% | 31% | 40% | 34% | 44% | 35% | 46% | 35% | 46% | 33% | 33% | 35% | 35% |
| 10612 | 1.00% | 9.00% | 0.00% | 0.25% | 1.00% | 41% | 53% | 39% | 51% | 40% | 52% | 42% | 55% | 42% | 55% | 40% | 40% | 41% | 41% |
| 10613 | 0.00% | 0.00% | 0.25% | 0.25% | 1.00% | 26% | 34% | 27% | 35% | 25% | 33% | 27% | 35% | 30% | 39% | 26% | 26% | 27% | 27% |
| 10614 | 0.25% | 0.00% | 0.25% | 0.25% | 1.00% | 28% | 36% | 28% | 36% | 27% | 35% | 28% | 36% | 31% | 40% | 28% | 28% | 29% | 29% |
| 10615 | 0.00% | 0.25% | 0.25% | 0.25% | 1.00% | 30% | 39% | 32% | 42% | 29% | 38% | 32% | 42% | 34% | 44% | 30% | 30% | 32% | 32% |
| 10616 | 0.25% | 0.25% | 0.25% | 0.25% | 1.00% | 32% | 42% | 33% | 43% | 31% | 40% | 33% | 43% | 35% | 46% | 32% | 32% | 33% | 33% |
| 10617 | 1.00% | 0.25% | 0.25% | 0.25% | 1.00% | 34% | 44% | 34% | 44% | 34% | 44% | 35% | 46% | 37% | 48% | 34% | 34% | 35% | 35% |
| 10618 | 9.00% | 0.25% | 0.25% | 0.25% | 1.00% | 30% | 39% | 32% | 42% | 29% | 38% | 32% | 42% | 34% | 44% | 30% | 30% | 32% | 32% |
| 10619 | 0.25% | 1.00% | 0.25% | 0.25% | 1.00% | 35% | 46% | 36% | 47% | 35% | 46% | 36% | 47% | 38% | 49% | 35% | 35% | 36% | 36% |
| 10620 | 9.00% | 1.00% | 0.25% | 0.25% | 1.00% | 33% | 43% | 35% | 46% | 33% | 43% | 35% | 46% | 37% | 48% | 34% | 34% | 35% | 35% |
| 10621 | 0.25% | 9.00% | 0.25% | 0.25% | 1.00% | 43% | 56% | 44% | 57% | 41% | 53% | 43% | 56% | 45% | 59% | 43% | 43% | 43% | 43% |
| 10622 | 1.00% | 9.00% | 0.25% | 0.25% | 1.00% | 45% | 59% | 45% | 59% | 44% | 57% | 45% | 59% | 47% | 61% | 45% | 45% | 45% | 45% |
| 10623 | 9.00% | 9.00% | 0.25% | 0.25% | 1.00% | 41% | 53% | 43% | 56% | 39% | 51% | 42% | 55% | 44% | 57% | 41% | 41% | 42% | 42% |
| 10624 | 0.00% | 0.00% | 1.00% | 0.25% | 1.00% | 31% | 40% | 30% | 39% | 31% | 40% | 33% | 43% | 34% | 44% | 31% | 31% | 33% | 33% |
| 10625 | 1.00% | 0.00% | 1.00% | 0.25% | 1.00% | 35% | 46% | 32% | 42% | 36% | 47% | 36% | 47% | 37% | 48% | 34% | 34% | 36% | 36% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10626 | 0.00% | 0.25% | 1.00% | 0.25% | 1.00% | 35% | 46% | 35% | 46% | 35% | 46% | 38% | 49% | 38% | 49% | 35% | 35% | 37% | 37% |
| 10627 | 0.25% | 0.25% | 1.00% | 0.25% | 1.00% | 37% | 48% | 36% | 47% | 37% | 48% | 39% | 51% | 39% | 51% | 37% | 37% | 38% | 38% |
| 10628 | 1.00% | 0.25% | 1.00% | 0.25% | 1.00% | 39% | 51% | 37% | 48% | 40% | 52% | 41% | 53% | 41% | 53% | 39% | 39% | 41% | 41% |
| 10629 | 9.00% | 0.25% | 1.00% | 0.25% | 1.00% | 35% | 46% | 35% | 46% | 35% | 46% | 38% | 49% | 38% | 49% | 35% | 35% | 37% | 37% |
| 10630 | 0.00% | 1.00% | 1.00% | 0.25% | 1.00% | 38% | 49% | 38% | 49% | 39% | 51% | 41% | 53% | 41% | 53% | 38% | 38% | 40% | 40% |
| 10631 | 0.25% | 1.00% | 1.00% | 0.25% | 1.00% | 40% | 52% | 39% | 51% | 41% | 53% | 42% | 55% | 42% | 55% | 40% | 40% | 42% | 42% |
| 10632 | 1.00% | 1.00% | 1.00% | 0.25% | 1.00% | 42% | 55% | 40% | 52% | 44% | 57% | 44% | 57% | 44% | 57% | 42% | 42% | 44% | 44% |
| 10633 | 9.00% | 1.00% | 1.00% | 0.25% | 1.00% | 38% | 49% | 38% | 49% | 39% | 51% | 41% | 53% | 41% | 53% | 38% | 38% | 40% | 40% |
| 10634 | 0.00% | 9.00% | 1.00% | 0.25% | 1.00% | 46% | 60% | 46% | 60% | 45% | 59% | 48% | 62% | 48% | 62% | 46% | 46% | 47% | 47% |
| 10635 | 0.25% | 9.00% | 1.00% | 0.25% | 1.00% | 48% | 62% | 47% | 61% | 47% | 61% | 49% | 64% | 49% | 64% | 47% | 47% | 48% | 48% |
| 10636 | 1.00% | 9.00% | 1.00% | 0.25% | 1.00% | 50% | 65% | 48% | 62% | 50% | 65% | 51% | 66% | 51% | 66% | 49% | 49% | 51% | 51% |
| 10637 | 0.25% | 0.25% | 9.00% | 0.25% | 1.00% | 47% | 61% | 41% | 53% | 42% | 55% | 50% | 65% | 49% | 64% | 43% | 43% | 47% | 47% |
| 10638 | 1.00% | 0.25% | 9.00% | 0.25% | 1.00% | 49% | 64% | 42% | 55% | 45% | 59% | 52% | 68% | 51% | 66% | 45% | 45% | 49% | 49% |
| 10639 | 9.00% | 0.25% | 9.00% | 0.25% | 1.00% | 45% | 59% | 40% | 52% | 40% | 52% | 49% | 64% | 48% | 62% | 42% | 42% | 46% | 46% |
| 10640 | 0.00% | 1.00% | 9.00% | 0.25% | 1.00% | 48% | 62% | 43% | 56% | 44% | 57% | 52% | 68% | 51% | 66% | 45% | 45% | 49% | 49% |
| 10641 | 0.25% | 1.00% | 9.00% | 0.25% | 1.00% | 50% | 65% | 44% | 57% | 46% | 60% | 53% | 69% | 52% | 68% | 47% | 47% | 50% | 50% |
| 10642 | 9.00% | 1.00% | 9.00% | 0.25% | 1.00% | 48% | 62% | 43% | 56% | 44% | 57% | 52% | 68% | 51% | 66% | 45% | 45% | 49% | 49% |
| 10643 | 1.00% | 9.00% | 9.00% | 0.25% | 1.00% | 60% | 78% | 53% | 69% | 55% | 72% | 62% | 81% | 61% | 79% | 56% | 56% | 59% | 59% |
| 10644 | 0.25% | 0.00% | 0.00% | 1.00% | 1.00% | 32% | 42% | 29% | 38% | 30% | 39% | 32% | 42% | 35% | 46% | 30% | 30% | 32% | 32% |
| 10645 | 1.00% | 0.25% | 0.00% | 1.00% | 1.00% | 38% | 49% | 35% | 46% | 37% | 48% | 39% | 51% | 41% | 53% | 37% | 37% | 39% | 39% |
| 10646 | 0.00% | 1.00% | 0.00% | 1.00% | 1.00% | 37% | 48% | 36% | 47% | 36% | 47% | 39% | 51% | 41% | 53% | 36% | 36% | 39% | 39% |
| 10647 | 0.25% | 1.00% | 0.00% | 1.00% | 1.00% | 39% | 51% | 37% | 48% | 38% | 49% | 40% | 52% | 42% | 55% | 38% | 38% | 40% | 40% |
| 10648 | 1.00% | 1.00% | 0.00% | 1.00% | 1.00% | 41% | 53% | 38% | 49% | 41% | 53% | 42% | 55% | 44% | 57% | 40% | 40% | 42% | 42% |
| 10649 | 0.00% | 0.00% | 0.25% | 1.00% | 1.00% | 34% | 44% | 34% | 44% | 32% | 42% | 34% | 44% | 39% | 51% | 33% | 33% | 35% | 35% |
| 10650 | 1.00% | 0.00% | 0.25% | 1.00% | 1.00% | 38% | 49% | 36% | 47% | 37% | 48% | 37% | 48% | 42% | 55% | 37% | 37% | 39% | 39% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10651 | 0.25% | 0.25% | 0.25% | 1.00% | 1.00% | 40% | 52% | 40% | 52% | 38% | 49% | 40% | 52% | 44% | 57% | 39% | 39% | 41% | 41% |
| 10652 | 1.00% | 0.25% | 0.25% | 1.00% | 1.00% | 42% | 55% | 41% | 53% | 41% | 53% | 42% | 55% | 46% | 60% | 41% | 41% | 43% | 43% |
| 10653 | 9.00% | 0.25% | 0.25% | 1.00% | 1.00% | 38% | 49% | 39% | 51% | 36% | 47% | 39% | 51% | 43% | 56% | 38% | 38% | 39% | 39% |
| 10654 | 0.00% | 1.00% | 0.25% | 1.00% | 1.00% | 41% | 53% | 42% | 55% | 40% | 52% | 42% | 55% | 46% | 60% | 41% | 41% | 43% | 43% |
| 10655 | 0.25% | 1.00% | 0.25% | 1.00% | 1.00% | 43% | 56% | 43% | 56% | 42% | 55% | 43% | 56% | 47% | 61% | 43% | 43% | 44% | 44% |
| 10656 | 1.00% | 1.00% | 0.25% | 1.00% | 1.00% | 45% | 59% | 44% | 57% | 45% | 59% | 45% | 59% | 49% | 64% | 45% | 45% | 46% | 46% |
| 10657 | 9.00% | 1.00% | 0.25% | 1.00% | 1.00% | 41% | 53% | 42% | 55% | 40% | 52% | 42% | 55% | 46% | 60% | 41% | 41% | 43% | 43% |
| 10658 | 0.25% | 9.00% | 0.25% | 1.00% | 1.00% | 51% | 66% | 51% | 66% | 48% | 62% | 50% | 65% | 54% | 70% | 50% | 50% | 51% | 51% |
| 10659 | 1.00% | 9.00% | 0.25% | 1.00% | 1.00% | 53% | 69% | 52% | 68% | 51% | 66% | 52% | 68% | 56% | 73% | 52% | 52% | 53% | 53% |
| 10660 | 9.00% | 9.00% | 0.25% | 1.00% | 1.00% | 49% | 64% | 50% | 65% | 46% | 60% | 49% | 64% | 53% | 69% | 48% | 48% | 49% | 49% |
| 10661 | 0.00% | 0.00% | 1.00% | 1.00% | 1.00% | 39% | 51% | 37% | 48% | 38% | 49% | 40% | 52% | 43% | 56% | 38% | 38% | 40% | 40% |
| 10662 | 0.25% | 0.00% | 1.00% | 1.00% | 1.00% | 41% | 53% | 38% | 49% | 40% | 52% | 41% | 53% | 44% | 57% | 40% | 40% | 42% | 42% |
| 10663 | 1.00% | 0.00% | 1.00% | 1.00% | 1.00% | 43% | 56% | 39% | 51% | 43% | 56% | 43% | 56% | 46% | 60% | 42% | 42% | 44% | 44% |
| 10664 | 0.00% | 0.25% | 1.00% | 1.00% | 1.00% | 43% | 56% | 42% | 55% | 42% | 55% | 45% | 59% | 47% | 61% | 42% | 42% | 45% | 45% |
| 10665 | 1.00% | 0.25% | 1.00% | 1.00% | 1.00% | 47% | 61% | 44% | 57% | 47% | 61% | 48% | 62% | 50% | 65% | 46% | 46% | 48% | 48% |
| 10666 | 9.00% | 0.25% | 1.00% | 1.00% | 1.00% | 43% | 56% | 42% | 55% | 42% | 55% | 45% | 59% | 47% | 61% | 42% | 42% | 45% | 45% |
| 10667 | 0.00% | 1.00% | 1.00% | 1.00% | 1.00% | 46% | 60% | 45% | 59% | 46% | 60% | 48% | 62% | 50% | 65% | 46% | 46% | 48% | 48% |
| 10668 | 0.25% | 1.00% | 1.00% | 1.00% | 1.00% | 48% | 62% | 46% | 60% | 48% | 62% | 49% | 64% | 51% | 66% | 47% | 47% | 49% | 49% |
| 10669 | 1.00% | 1.00% | 1.00% | 1.00% | 1.00% | 50% | 65% | 47% | 61% | 51% | 66% | 51% | 66% | 53% | 69% | 49% | 49% | 52% | 52% |
| 10670 | 9.00% | 1.00% | 1.00% | 1.00% | 1.00% | 46% | 60% | 45% | 59% | 46% | 60% | 48% | 62% | 50% | 65% | 46% | 46% | 48% | 48% |
| 10671 | 0.00% | 9.00% | 1.00% | 1.00% | 1.00% | 54% | 70% | 53% | 69% | 52% | 68% | 55% | 72% | 57% | 74% | 53% | 53% | 55% | 55% |
| 10672 | 0.25% | 9.00% | 1.00% | 1.00% | 1.00% | 56% | 73% | 54% | 70% | 54% | 70% | 56% | 73% | 58% | 75% | 55% | 55% | 56% | 56% |
| 10673 | 1.00% | 9.00% | 1.00% | 1.00% | 1.00% | 58% | 75% | 55% | 72% | 57% | 74% | 58% | 75% | 60% | 78% | 57% | 57% | 58% | 58% |
| 10674 | 0.25% | 0.25% | 9.00% | 1.00% | 1.00% | 55% | 72% | 48% | 62% | 49% | 64% | 57% | 74% | 58% | 75% | 51% | 51% | 55% | 55% |
| 10675 | 1.00% | 0.25% | 9.00% | 1.00% | 1.00% | 57% | 74% | 49% | 64% | 52% | 68% | 59% | 77% | 60% | 78% | 53% | 53% | 57% | 57% |

Fig. 36

| Formula # | Delta Dodecalactone | Propyl Dihydrojasmonate | Methyl Dihydrojasmonate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10676 | 9.00% | 0.25% | 9.00% | 1.00% | 1.00% | 53% | 69% | 47% | 61% | 47% | 61% | 56% | 73% | 57% | 74% | 49% | 49% | 53% | 53% |
| 10677 | 0.25% | 1.00% | 9.00% | 1.00% | 1.00% | 58% | 75% | 51% | 66% | 53% | 69% | 60% | 78% | 61% | 79% | 54% | 54% | 58% | 58% |
| 10678 | 0.00% | 0.25% | 0.00% | 9.00% | 1.00% | 56% | 73% | 53% | 69% | 48% | 62% | 58% | 75% | 58% | 75% | 52% | 52% | 55% | 55% |
| 10679 | 0.00% | 0.00% | 0.25% | 9.00% | 1.00% | 56% | 73% | 54% | 70% | 48% | 62% | 56% | 73% | 59% | 77% | 53% | 53% | 54% | 54% |
| 10680 | 0.25% | 0.00% | 0.25% | 9.00% | 1.00% | 58% | 75% | 55% | 72% | 50% | 65% | 57% | 74% | 60% | 78% | 54% | 54% | 56% | 56% |
| 10681 | 0.00% | 0.25% | 0.25% | 9.00% | 1.00% | 60% | 78% | 59% | 77% | 52% | 68% | 61% | 79% | 63% | 82% | 57% | 57% | 59% | 59% |
| 10682 | 0.25% | 0.25% | 0.25% | 9.00% | 1.00% | 62% | 81% | 60% | 78% | 54% | 70% | 62% | 81% | 64% | 83% | 59% | 59% | 60% | 60% |
| 10683 | 1.00% | 0.25% | 0.25% | 9.00% | 1.00% | 64% | 83% | 61% | 79% | 57% | 74% | 64% | 83% | 66% | 86% | 61% | 61% | 62% | 62% |
| 10684 | 9.00% | 0.25% | 0.25% | 9.00% | 1.00% | 60% | 78% | 59% | 77% | 52% | 68% | 61% | 79% | 63% | 82% | 57% | 57% | 59% | 59% |
| 10685 | 0.00% | 1.00% | 0.25% | 9.00% | 1.00% | 63% | 82% | 62% | 81% | 56% | 73% | 64% | 83% | 66% | 86% | 60% | 60% | 62% | 62% |
| 10686 | 0.25% | 1.00% | 0.25% | 9.00% | 1.00% | 65% | 85% | 63% | 82% | 58% | 75% | 65% | 85% | 67% | 87% | 62% | 62% | 63% | 63% |
| 10687 | 1.00% | 1.00% | 0.25% | 9.00% | 1.00% | 67% | 87% | 64% | 83% | 61% | 79% | 67% | 87% | 69% | 90% | 64% | 64% | 66% | 66% |
| 10688 | 0.25% | 9.00% | 0.25% | 9.00% | 1.00% | 73% | 95% | 71% | 92% | 64% | 83% | 72% | 94% | 74% | 96% | 69% | 69% | 70% | 70% |
| 10689 | 0.25% | 0.00% | 1.00% | 9.00% | 1.00% | 63% | 82% | 58% | 75% | 56% | 73% | 63% | 82% | 64% | 83% | 59% | 59% | 61% | 61% |
| 10690 | 1.00% | 0.25% | 1.00% | 9.00% | 1.00% | 69% | 90% | 64% | 83% | 63% | 82% | 70% | 91% | 70% | 91% | 65% | 65% | 68% | 68% |
| 10691 | 9.00% | 0.25% | 1.00% | 9.00% | 1.00% | 65% | 85% | 62% | 81% | 58% | 75% | 67% | 87% | 67% | 87% | 62% | 62% | 64% | 64% |
| 10692 | 0.00% | 1.00% | 1.00% | 9.00% | 1.00% | 68% | 88% | 65% | 85% | 62% | 81% | 70% | 91% | 70% | 91% | 65% | 65% | 67% | 67% |
| 10693 | 0.25% | 1.00% | 1.00% | 9.00% | 1.00% | 70% | 91% | 66% | 86% | 64% | 83% | 71% | 92% | 71% | 92% | 67% | 67% | 69% | 69% |
| 10694 | 1.00% | 1.00% | 1.00% | 9.00% | 1.00% | 72% | 94% | 67% | 87% | 67% | 87% | 73% | 95% | 73% | 95% | 69% | 69% | 71% | 71% |
| 10695 | 0.25% | 0.25% | 9.00% | 9.00% | 1.00% | 77% | 100% | 68% | 88% | 65% | 85% | 79% | 100% | 78% | 100% | 70% | 70% | 74% | 74% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10696 | 0.25% | 0.25% | 0.00% | 0.00% | 0.00% | 6% | 8% | 6% | 8% | 6% | 8% | 6% | 8% | 5% | 7% | 6% | 6% | 6% | 6% |
| 10697 | 1.00% | 0.25% | 0.00% | 0.00% | 0.00% | 8% | 10% | 7% | 9% | 9% | 12% | 8% | 10% | 7% | 9% | 8% | 8% | 8% | 8% |
| 10698 | 0.25% | 1.00% | 0.00% | 0.00% | 0.00% | 9% | 12% | 9% | 12% | 10% | 13% | 9% | 12% | 8% | 10% | 9% | 9% | 9% | 9% |
| 10699 | 1.00% | 1.00% | 0.00% | 0.00% | 0.00% | 11% | 14% | 10% | 13% | 13% | 17% | 11% | 14% | 10% | 13% | 11% | 11% | 11% | 11% |
| 10700 | 0.25% | 0.00% | 0.25% | 0.00% | 0.00% | 6% | 8% | 7% | 9% | 6% | 8% | 4% | 5% | 6% | 8% | 6% | 6% | 5% | 5% |
| 10701 | 1.00% | 0.00% | 0.25% | 0.00% | 0.00% | 8% | 10% | 8% | 10% | 9% | 12% | 6% | 8% | 8% | 10% | 8% | 8% | 8% | 8% |
| 10702 | 0.00% | 0.25% | 0.25% | 0.00% | 0.00% | 8% | 10% | 11% | 14% | 8% | 10% | 8% | 10% | 9% | 12% | 9% | 9% | 8% | 8% |
| 10703 | 0.25% | 0.25% | 0.25% | 0.00% | 0.00% | 10% | 13% | 12% | 16% | 10% | 13% | 9% | 12% | 10% | 13% | 11% | 11% | 10% | 10% |
| 10704 | 0.00% | 1.00% | 0.25% | 0.00% | 0.00% | 11% | 14% | 14% | 18% | 12% | 16% | 11% | 14% | 12% | 16% | 12% | 12% | 12% | 12% |
| 10705 | 1.00% | 1.00% | 0.25% | 0.00% | 0.00% | 15% | 20% | 16% | 21% | 17% | 22% | 14% | 18% | 15% | 20% | 16% | 16% | 15% | 15% |
| 10706 | 1.00% | 9.00% | 0.25% | 0.00% | 0.00% | 23% | 30% | 24% | 31% | 23% | 30% | 21% | 27% | 22% | 29% | 23% | 23% | 22% | 22% |
| 10707 | 0.25% | 0.00% | 1.00% | 0.00% | 0.00% | 11% | 14% | 10% | 13% | 12% | 16% | 10% | 13% | 10% | 13% | 11% | 11% | 11% | 11% |
| 10708 | 1.00% | 0.00% | 1.00% | 0.00% | 0.00% | 13% | 17% | 11% | 14% | 15% | 20% | 12% | 16% | 12% | 16% | 13% | 13% | 13% | 13% |
| 10709 | 0.00% | 0.25% | 1.00% | 0.00% | 0.00% | 13% | 17% | 14% | 18% | 14% | 18% | 14% | 18% | 13% | 17% | 14% | 14% | 14% | 14% |
| 10710 | 1.00% | 0.25% | 1.00% | 0.00% | 0.00% | 17% | 22% | 16% | 21% | 19% | 25% | 17% | 22% | 16% | 21% | 17% | 17% | 17% | 17% |
| 10711 | 0.00% | 1.00% | 1.00% | 0.00% | 0.00% | 16% | 21% | 17% | 22% | 18% | 23% | 17% | 22% | 16% | 21% | 17% | 17% | 17% | 17% |
| 10712 | 0.25% | 1.00% | 1.00% | 0.00% | 0.00% | 18% | 23% | 18% | 23% | 20% | 26% | 18% | 23% | 17% | 22% | 19% | 19% | 18% | 18% |
| 10713 | 1.00% | 1.00% | 1.00% | 0.00% | 0.00% | 20% | 26% | 19% | 25% | 23% | 30% | 20% | 26% | 19% | 25% | 21% | 21% | 21% | 21% |
| 10714 | 9.00% | 1.00% | 1.00% | 0.00% | 0.00% | 16% | 21% | 17% | 22% | 18% | 23% | 17% | 22% | 16% | 21% | 17% | 17% | 17% | 17% |
| 10715 | 1.00% | 9.00% | 1.00% | 0.00% | 0.00% | 28% | 36% | 27% | 35% | 29% | 38% | 27% | 35% | 26% | 34% | 28% | 28% | 27% | 27% |
| 10716 | 0.25% | 0.00% | 9.00% | 0.00% | 0.00% | 21% | 27% | 15% | 20% | 17% | 22% | 21% | 27% | 20% | 26% | 18% | 18% | 19% | 19% |
| 10717 | 0.00% | 0.25% | 9.00% | 0.00% | 0.00% | 23% | 30% | 19% | 25% | 19% | 25% | 25% | 33% | 23% | 30% | 20% | 20% | 22% | 22% |
| 10718 | 0.25% | 0.25% | 9.00% | 0.00% | 0.00% | 25% | 33% | 20% | 26% | 21% | 27% | 26% | 34% | 24% | 31% | 22% | 22% | 24% | 24% |
| 10719 | 1.00% | 0.25% | 9.00% | 0.00% | 0.00% | 27% | 35% | 21% | 27% | 24% | 31% | 28% | 36% | 26% | 34% | 24% | 24% | 26% | 26% |
| 10720 | 0.25% | 1.00% | 9.00% | 0.00% | 0.00% | 28% | 36% | 23% | 30% | 25% | 33% | 29% | 38% | 27% | 35% | 25% | 25% | 27% | 27% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10721 | 0.25% | 0.00% | 0.00% | 0.25% | 0.00% | 10% | 13% | 9% | 12% | 11% | 14% | 8% | 10% | 8% | 10% | 10% | 10% | 9% | 9% |
| 10722 | 1.00% | 0.00% | 0.00% | 0.25% | 0.00% | 12% | 16% | 10% | 13% | 14% | 18% | 10% | 13% | 10% | 13% | 12% | 12% | 11% | 11% |
| 10723 | 0.00% | 0.25% | 0.00% | 0.25% | 0.00% | 12% | 16% | 13% | 17% | 13% | 17% | 12% | 16% | 11% | 14% | 13% | 13% | 12% | 12% |
| 10724 | 0.25% | 0.25% | 0.00% | 0.25% | 0.00% | 14% | 18% | 14% | 18% | 15% | 20% | 13% | 17% | 12% | 16% | 14% | 14% | 13% | 13% |
| 10725 | 9.00% | 0.25% | 0.00% | 0.25% | 0.00% | 12% | 16% | 13% | 17% | 13% | 17% | 12% | 16% | 11% | 14% | 13% | 13% | 12% | 12% |
| 10726 | 1.00% | 1.00% | 0.00% | 0.25% | 0.00% | 19% | 25% | 18% | 23% | 22% | 29% | 18% | 23% | 17% | 22% | 20% | 20% | 19% | 19% |
| 10727 | 1.00% | 9.00% | 0.00% | 0.25% | 0.00% | 27% | 35% | 26% | 34% | 28% | 36% | 25% | 33% | 24% | 31% | 27% | 27% | 26% | 26% |
| 10728 | 0.00% | 0.00% | 0.25% | 0.25% | 0.00% | 12% | 16% | 14% | 18% | 13% | 17% | 10% | 13% | 12% | 16% | 13% | 13% | 12% | 12% |
| 10729 | 0.25% | 0.00% | 0.25% | 0.25% | 0.00% | 14% | 18% | 15% | 20% | 15% | 20% | 11% | 14% | 13% | 17% | 15% | 15% | 13% | 13% |
| 10730 | 0.00% | 0.25% | 0.25% | 0.25% | 0.00% | 16% | 21% | 19% | 25% | 17% | 22% | 15% | 20% | 16% | 21% | 17% | 17% | 16% | 16% |
| 10731 | 0.25% | 0.25% | 0.25% | 0.25% | 0.00% | 18% | 23% | 20% | 26% | 19% | 25% | 16% | 21% | 17% | 22% | 19% | 19% | 17% | 17% |
| 10732 | 1.00% | 0.25% | 0.25% | 0.25% | 0.00% | 20% | 26% | 21% | 27% | 22% | 29% | 18% | 23% | 19% | 25% | 21% | 21% | 20% | 20% |
| 10733 | 9.00% | 0.25% | 0.25% | 0.25% | 0.00% | 16% | 21% | 19% | 25% | 17% | 22% | 15% | 20% | 16% | 21% | 17% | 17% | 16% | 16% |
| 10734 | 0.25% | 1.00% | 0.25% | 0.25% | 0.00% | 21% | 27% | 23% | 30% | 23% | 30% | 19% | 25% | 20% | 26% | 22% | 22% | 21% | 21% |
| 10735 | 9.00% | 1.00% | 0.25% | 0.25% | 0.00% | 19% | 25% | 22% | 29% | 21% | 27% | 18% | 23% | 19% | 25% | 21% | 21% | 19% | 19% |
| 10736 | 0.25% | 9.00% | 0.25% | 0.25% | 0.00% | 29% | 38% | 31% | 40% | 29% | 38% | 26% | 34% | 27% | 35% | 30% | 30% | 27% | 27% |
| 10737 | 1.00% | 9.00% | 0.25% | 0.25% | 0.00% | 31% | 40% | 32% | 42% | 32% | 42% | 28% | 36% | 29% | 38% | 32% | 32% | 30% | 30% |
| 10738 | 9.00% | 9.00% | 0.25% | 0.25% | 0.00% | 27% | 35% | 30% | 39% | 27% | 35% | 25% | 33% | 26% | 34% | 28% | 28% | 26% | 26% |
| 10739 | 0.00% | 0.00% | 1.00% | 0.25% | 0.00% | 17% | 22% | 17% | 22% | 19% | 25% | 16% | 21% | 16% | 21% | 18% | 18% | 17% | 17% |
| 10740 | 1.00% | 0.00% | 1.00% | 0.25% | 0.00% | 21% | 27% | 19% | 25% | 24% | 31% | 19% | 25% | 19% | 25% | 21% | 21% | 21% | 21% |
| 10741 | 0.00% | 0.25% | 1.00% | 0.25% | 0.00% | 21% | 27% | 22% | 29% | 23% | 30% | 21% | 27% | 20% | 26% | 22% | 22% | 21% | 21% |
| 10742 | 0.25% | 0.25% | 1.00% | 0.25% | 0.00% | 23% | 30% | 23% | 30% | 25% | 33% | 22% | 29% | 21% | 27% | 24% | 24% | 23% | 23% |
| 10743 | 1.00% | 0.25% | 1.00% | 0.25% | 0.00% | 25% | 33% | 24% | 31% | 28% | 36% | 24% | 31% | 23% | 30% | 26% | 26% | 25% | 25% |
| 10744 | 9.00% | 0.25% | 1.00% | 0.25% | 0.00% | 21% | 27% | 22% | 29% | 23% | 30% | 21% | 27% | 20% | 26% | 22% | 22% | 21% | 21% |
| 10745 | 0.00% | 1.00% | 1.00% | 0.25% | 0.00% | 24% | 31% | 25% | 33% | 27% | 35% | 24% | 31% | 23% | 30% | 25% | 25% | 25% | 25% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10746 | 0.25% | 1.00% | 1.00% | 0.25% | 0.00% | 26% | 34% | 26% | 34% | 29% | 38% | 25% | 33% | 24% | 31% | 27% | 27% | 26% | 26% |
| 10747 | 1.00% | 1.00% | 1.00% | 0.25% | 0.00% | 28% | 36% | 27% | 35% | 32% | 42% | 27% | 35% | 26% | 34% | 29% | 29% | 28% | 28% |
| 10748 | 9.00% | 1.00% | 1.00% | 0.25% | 0.00% | 24% | 31% | 25% | 33% | 27% | 35% | 24% | 31% | 23% | 30% | 25% | 25% | 25% | 25% |
| 10749 | 0.00% | 9.00% | 1.00% | 0.25% | 0.00% | 32% | 42% | 33% | 43% | 33% | 43% | 31% | 40% | 30% | 39% | 33% | 33% | 31% | 31% |
| 10750 | 0.25% | 9.00% | 1.00% | 0.25% | 0.00% | 34% | 44% | 34% | 44% | 35% | 46% | 32% | 42% | 31% | 40% | 34% | 34% | 33% | 33% |
| 10751 | 1.00% | 9.00% | 1.00% | 0.25% | 0.00% | 36% | 47% | 35% | 46% | 38% | 49% | 34% | 44% | 33% | 43% | 36% | 36% | 35% | 35% |
| 10752 | 0.25% | 0.25% | 9.00% | 0.25% | 0.00% | 33% | 43% | 28% | 36% | 30% | 39% | 33% | 43% | 31% | 40% | 30% | 30% | 31% | 31% |
| 10753 | 1.00% | 0.25% | 9.00% | 0.25% | 0.00% | 35% | 46% | 29% | 38% | 33% | 43% | 35% | 46% | 33% | 43% | 32% | 32% | 34% | 34% |
| 10754 | 9.00% | 0.25% | 9.00% | 0.25% | 0.00% | 31% | 40% | 27% | 35% | 28% | 36% | 32% | 42% | 30% | 39% | 29% | 29% | 30% | 30% |
| 10755 | 0.00% | 1.00% | 9.00% | 0.25% | 0.00% | 34% | 44% | 30% | 39% | 32% | 42% | 35% | 46% | 33% | 43% | 32% | 32% | 33% | 33% |
| 10756 | 0.25% | 1.00% | 9.00% | 0.25% | 0.00% | 36% | 47% | 31% | 40% | 34% | 44% | 36% | 47% | 34% | 44% | 34% | 34% | 35% | 35% |
| 10757 | 9.00% | 1.00% | 9.00% | 0.25% | 0.00% | 34% | 44% | 30% | 39% | 32% | 42% | 35% | 46% | 33% | 43% | 32% | 32% | 33% | 33% |
| 10758 | 1.00% | 9.00% | 9.00% | 0.25% | 0.00% | 46% | 60% | 40% | 52% | 43% | 56% | 45% | 59% | 43% | 56% | 43% | 43% | 44% | 44% |
| 10759 | 0.25% | 0.00% | 0.00% | 1.00% | 0.00% | 27% | 35% | 22% | 29% | 24% | 31% | 23% | 30% | 21% | 27% | 24% | 24% | 23% | 23% |
| 10760 | 1.00% | 0.25% | 0.00% | 1.00% | 0.00% | 33% | 43% | 28% | 36% | 31% | 40% | 30% | 39% | 27% | 35% | 31% | 31% | 29% | 29% |
| 10761 | 0.00% | 1.00% | 0.00% | 1.00% | 0.00% | 32% | 42% | 29% | 38% | 30% | 39% | 30% | 39% | 27% | 35% | 30% | 30% | 29% | 29% |
| 10762 | 0.25% | 1.00% | 0.00% | 1.00% | 0.00% | 34% | 44% | 30% | 39% | 32% | 42% | 31% | 40% | 28% | 36% | 32% | 32% | 30% | 30% |
| 10763 | 1.00% | 1.00% | 0.00% | 1.00% | 0.00% | 36% | 47% | 31% | 40% | 35% | 46% | 33% | 43% | 30% | 39% | 34% | 34% | 33% | 33% |
| 10764 | 0.00% | 0.00% | 0.25% | 1.00% | 0.00% | 29% | 38% | 27% | 35% | 26% | 34% | 25% | 33% | 25% | 33% | 27% | 27% | 25% | 25% |
| 10765 | 1.00% | 0.00% | 0.25% | 1.00% | 0.00% | 33% | 43% | 29% | 38% | 31% | 40% | 28% | 36% | 28% | 36% | 31% | 31% | 29% | 29% |
| 10766 | 0.25% | 0.25% | 0.25% | 1.00% | 0.00% | 35% | 46% | 33% | 43% | 32% | 42% | 31% | 40% | 30% | 39% | 33% | 33% | 31% | 31% |
| 10767 | 1.00% | 0.25% | 0.25% | 1.00% | 0.00% | 37% | 48% | 34% | 44% | 35% | 46% | 33% | 43% | 32% | 42% | 35% | 35% | 33% | 33% |
| 10768 | 9.00% | 0.25% | 0.25% | 1.00% | 0.00% | 33% | 43% | 32% | 42% | 30% | 39% | 30% | 39% | 29% | 38% | 32% | 32% | 30% | 30% |
| 10769 | 0.00% | 1.00% | 0.25% | 1.00% | 0.00% | 36% | 47% | 35% | 46% | 34% | 44% | 33% | 43% | 32% | 42% | 35% | 35% | 33% | 33% |
| 10770 | 0.25% | 1.00% | 0.25% | 1.00% | 0.00% | 38% | 49% | 36% | 47% | 36% | 47% | 34% | 44% | 33% | 43% | 37% | 37% | 34% | 34% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10771 | 1.00% | 1.00% | 0.25% | 1.00% | 0.00% | 40% | 52% | 37% | 48% | 39% | 51% | 36% | 47% | 35% | 46% | 39% | 39% | 37% | 37% |
| 10772 | 9.00% | 1.00% | 0.25% | 1.00% | 0.00% | 36% | 47% | 35% | 46% | 34% | 44% | 33% | 43% | 32% | 42% | 35% | 35% | 33% | 33% |
| 10773 | 0.25% | 9.00% | 0.25% | 1.00% | 0.00% | 46% | 60% | 44% | 57% | 42% | 55% | 41% | 53% | 40% | 52% | 44% | 44% | 41% | 41% |
| 10774 | 1.00% | 9.00% | 0.25% | 1.00% | 0.00% | 48% | 62% | 45% | 59% | 45% | 59% | 43% | 56% | 42% | 55% | 46% | 46% | 43% | 43% |
| 10775 | 9.00% | 9.00% | 0.25% | 1.00% | 0.00% | 44% | 57% | 43% | 56% | 40% | 52% | 40% | 52% | 39% | 51% | 42% | 42% | 40% | 40% |
| 10776 | 0.00% | 0.00% | 1.00% | 1.00% | 0.00% | 34% | 44% | 30% | 39% | 32% | 42% | 31% | 40% | 29% | 38% | 32% | 32% | 31% | 31% |
| 10777 | 0.25% | 0.00% | 1.00% | 1.00% | 0.00% | 36% | 47% | 31% | 40% | 34% | 44% | 32% | 42% | 30% | 39% | 34% | 34% | 32% | 32% |
| 10778 | 1.00% | 0.00% | 1.00% | 1.00% | 0.00% | 38% | 49% | 32% | 42% | 37% | 48% | 34% | 44% | 32% | 42% | 36% | 36% | 34% | 34% |
| 10779 | 0.00% | 0.25% | 1.00% | 1.00% | 0.00% | 38% | 49% | 35% | 46% | 36% | 47% | 36% | 47% | 33% | 43% | 36% | 36% | 35% | 35% |
| 10780 | 1.00% | 0.25% | 1.00% | 1.00% | 0.00% | 42% | 55% | 37% | 48% | 41% | 53% | 39% | 51% | 36% | 47% | 40% | 40% | 39% | 39% |
| 10781 | 9.00% | 0.25% | 1.00% | 1.00% | 0.00% | 38% | 49% | 35% | 46% | 36% | 47% | 36% | 47% | 33% | 43% | 36% | 36% | 35% | 35% |
| 10782 | 0.00% | 1.00% | 1.00% | 1.00% | 0.00% | 41% | 53% | 38% | 49% | 40% | 52% | 39% | 51% | 36% | 47% | 40% | 40% | 38% | 38% |
| 10783 | 0.25% | 1.00% | 1.00% | 1.00% | 0.00% | 43% | 56% | 39% | 51% | 42% | 55% | 40% | 52% | 37% | 48% | 41% | 41% | 40% | 40% |
| 10784 | 1.00% | 1.00% | 1.00% | 1.00% | 0.00% | 45% | 59% | 40% | 52% | 45% | 59% | 42% | 55% | 39% | 51% | 43% | 43% | 42% | 42% |
| 10785 | 9.00% | 1.00% | 1.00% | 1.00% | 0.00% | 41% | 53% | 38% | 49% | 40% | 52% | 39% | 51% | 36% | 47% | 40% | 40% | 38% | 38% |
| 10786 | 0.00% | 9.00% | 1.00% | 1.00% | 0.00% | 49% | 64% | 46% | 60% | 46% | 60% | 46% | 60% | 43% | 56% | 47% | 47% | 45% | 45% |
| 10787 | 0.25% | 9.00% | 1.00% | 1.00% | 0.00% | 51% | 66% | 47% | 61% | 48% | 62% | 47% | 61% | 44% | 57% | 49% | 49% | 46% | 46% |
| 10788 | 1.00% | 9.00% | 1.00% | 1.00% | 0.00% | 53% | 69% | 48% | 62% | 51% | 66% | 49% | 64% | 46% | 60% | 51% | 51% | 49% | 49% |
| 10789 | 0.25% | 0.25% | 9.00% | 1.00% | 0.00% | 50% | 65% | 41% | 53% | 43% | 56% | 48% | 62% | 44% | 57% | 45% | 45% | 45% | 45% |
| 10790 | 1.00% | 0.25% | 9.00% | 1.00% | 0.00% | 52% | 68% | 42% | 55% | 46% | 60% | 50% | 65% | 46% | 60% | 47% | 47% | 47% | 47% |
| 10791 | 9.00% | 0.25% | 9.00% | 1.00% | 0.00% | 48% | 62% | 40% | 52% | 41% | 53% | 47% | 61% | 43% | 56% | 43% | 43% | 44% | 44% |
| 10792 | 0.25% | 1.00% | 9.00% | 1.00% | 0.00% | 53% | 69% | 44% | 57% | 47% | 61% | 51% | 66% | 47% | 61% | 48% | 48% | 48% | 48% |
| 10793 | 0.00% | 0.25% | 0.00% | 9.00% | 0.00% | 46% | 60% | 40% | 52% | 38% | 49% | 43% | 56% | 38% | 49% | 41% | 41% | 40% | 40% |
| 10794 | 0.00% | 0.00% | 0.25% | 9.00% | 0.00% | 46% | 60% | 41% | 53% | 38% | 49% | 41% | 53% | 39% | 51% | 42% | 42% | 39% | 39% |
| 10795 | 0.25% | 0.00% | 0.25% | 9.00% | 0.00% | 48% | 62% | 42% | 55% | 40% | 52% | 42% | 55% | 40% | 52% | 43% | 43% | 41% | 41% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10796 | 0.00% | 0.25% | 0.25% | 9.00% | 0.00% | 50% | 65% | 46% | 60% | 42% | 55% | 46% | 60% | 43% | 56% | 46% | 46% | 44% | 44% |
| 10797 | 0.25% | 0.25% | 0.25% | 9.00% | 0.00% | 52% | 68% | 47% | 61% | 44% | 57% | 47% | 61% | 44% | 57% | 48% | 48% | 45% | 45% |
| 10798 | 1.00% | 0.25% | 0.25% | 9.00% | 0.00% | 54% | 70% | 48% | 62% | 47% | 61% | 49% | 64% | 46% | 60% | 50% | 50% | 47% | 47% |
| 10799 | 9.00% | 0.25% | 0.25% | 9.00% | 0.00% | 50% | 65% | 46% | 60% | 42% | 55% | 46% | 60% | 43% | 56% | 46% | 46% | 44% | 44% |
| 10800 | 0.00% | 1.00% | 0.25% | 9.00% | 0.00% | 53% | 69% | 49% | 64% | 46% | 60% | 49% | 64% | 46% | 60% | 49% | 49% | 47% | 47% |
| 10801 | 0.25% | 1.00% | 0.25% | 9.00% | 0.00% | 55% | 72% | 50% | 65% | 48% | 62% | 50% | 65% | 47% | 61% | 51% | 51% | 48% | 48% |
| 10802 | 1.00% | 1.00% | 0.25% | 9.00% | 0.00% | 57% | 74% | 51% | 66% | 51% | 66% | 52% | 68% | 49% | 64% | 53% | 53% | 51% | 51% |
| 10803 | 0.25% | 9.00% | 0.25% | 9.00% | 0.00% | 63% | 82% | 58% | 75% | 54% | 70% | 57% | 74% | 54% | 70% | 58% | 58% | 55% | 55% |
| 10804 | 0.25% | 0.00% | 1.00% | 9.00% | 0.00% | 53% | 69% | 45% | 59% | 46% | 60% | 48% | 62% | 44% | 57% | 48% | 48% | 46% | 46% |
| 10805 | 1.00% | 0.25% | 1.00% | 9.00% | 0.00% | 59% | 77% | 51% | 66% | 53% | 69% | 55% | 72% | 50% | 65% | 54% | 54% | 53% | 53% |
| 10806 | 9.00% | 0.25% | 1.00% | 9.00% | 0.00% | 55% | 72% | 49% | 64% | 48% | 62% | 52% | 68% | 47% | 61% | 51% | 51% | 49% | 49% |
| 10807 | 0.00% | 1.00% | 1.00% | 9.00% | 0.00% | 58% | 75% | 52% | 68% | 52% | 68% | 55% | 72% | 50% | 65% | 54% | 54% | 52% | 52% |
| 10808 | 0.25% | 1.00% | 1.00% | 9.00% | 0.00% | 60% | 78% | 53% | 69% | 54% | 70% | 56% | 73% | 51% | 66% | 56% | 56% | 54% | 54% |
| 10809 | 1.00% | 1.00% | 1.00% | 9.00% | 0.00% | 62% | 81% | 54% | 70% | 57% | 74% | 58% | 75% | 53% | 69% | 58% | 58% | 56% | 56% |
| 10810 | 0.25% | 0.25% | 9.00% | 9.00% | 0.00% | 67% | 87% | 55% | 72% | 55% | 72% | 64% | 83% | 58% | 75% | 59% | 59% | 59% | 59% |
| 10811 | 0.25% | 0.25% | 0.00% | 0.00% | 0.25% | 13% | 17% | 13% | 17% | 13% | 17% | 14% | 18% | 13% | 17% | 13% | 13% | 13% | 13% |
| 10812 | 1.00% | 0.25% | 0.00% | 0.00% | 0.25% | 15% | 20% | 14% | 18% | 16% | 21% | 16% | 21% | 15% | 20% | 15% | 15% | 16% | 16% |
| 10813 | 0.25% | 1.00% | 0.00% | 0.00% | 0.25% | 16% | 21% | 16% | 21% | 17% | 22% | 17% | 22% | 16% | 21% | 16% | 16% | 17% | 17% |
| 10814 | 1.00% | 1.00% | 0.00% | 0.00% | 0.25% | 18% | 23% | 17% | 22% | 20% | 26% | 19% | 25% | 18% | 23% | 18% | 18% | 19% | 19% |
| 10815 | 0.25% | 0.00% | 0.25% | 0.00% | 0.25% | 13% | 17% | 14% | 18% | 13% | 17% | 12% | 16% | 14% | 18% | 13% | 13% | 13% | 13% |
| 10816 | 1.00% | 0.00% | 0.25% | 0.00% | 0.25% | 15% | 20% | 15% | 20% | 16% | 21% | 14% | 18% | 16% | 21% | 15% | 15% | 15% | 15% |
| 10817 | 0.00% | 0.25% | 0.25% | 0.00% | 0.25% | 15% | 20% | 18% | 23% | 15% | 20% | 16% | 21% | 17% | 22% | 16% | 16% | 16% | 16% |
| 10818 | 0.25% | 0.25% | 0.25% | 0.00% | 0.25% | 17% | 22% | 19% | 25% | 17% | 22% | 17% | 22% | 18% | 23% | 18% | 18% | 17% | 17% |
| 10819 | 0.00% | 1.00% | 0.25% | 0.00% | 0.25% | 18% | 23% | 21% | 27% | 19% | 25% | 19% | 25% | 20% | 26% | 19% | 19% | 19% | 19% |
| 10820 | 1.00% | 1.00% | 0.25% | 0.00% | 0.25% | 22% | 29% | 23% | 30% | 24% | 31% | 22% | 29% | 23% | 30% | 23% | 23% | 23% | 23% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10821 | 1.00% | 9.00% | 0.25% | 0.00% | 0.25% | 30% | 39% | 31% | 40% | 30% | 39% | 29% | 38% | 30% | 39% | 30% | 30% | 30% | 30% |
| 10822 | 0.25% | 0.00% | 1.00% | 0.00% | 0.25% | 18% | 23% | 17% | 22% | 19% | 25% | 18% | 23% | 18% | 23% | 18% | 18% | 18% | 18% |
| 10823 | 1.00% | 0.00% | 1.00% | 0.00% | 0.25% | 20% | 26% | 18% | 23% | 22% | 29% | 20% | 26% | 20% | 26% | 20% | 20% | 21% | 21% |
| 10824 | 0.00% | 0.25% | 1.00% | 0.00% | 0.25% | 20% | 26% | 21% | 27% | 21% | 27% | 22% | 29% | 21% | 27% | 21% | 21% | 21% | 21% |
| 10825 | 1.00% | 0.25% | 1.00% | 0.00% | 0.25% | 24% | 31% | 23% | 30% | 26% | 34% | 25% | 33% | 24% | 31% | 24% | 24% | 25% | 25% |
| 10826 | 0.00% | 1.00% | 1.00% | 0.00% | 0.25% | 23% | 30% | 24% | 31% | 25% | 33% | 25% | 33% | 24% | 31% | 24% | 24% | 25% | 25% |
| 10827 | 0.25% | 1.00% | 1.00% | 0.00% | 0.25% | 25% | 33% | 25% | 33% | 27% | 35% | 26% | 34% | 25% | 33% | 26% | 26% | 26% | 26% |
| 10828 | 1.00% | 1.00% | 1.00% | 0.00% | 0.25% | 27% | 35% | 26% | 34% | 30% | 39% | 28% | 36% | 27% | 35% | 28% | 28% | 28% | 28% |
| 10829 | 9.00% | 1.00% | 1.00% | 0.00% | 0.25% | 23% | 30% | 24% | 31% | 25% | 33% | 25% | 33% | 24% | 31% | 24% | 24% | 25% | 25% |
| 10830 | 1.00% | 9.00% | 1.00% | 0.00% | 0.25% | 35% | 46% | 34% | 44% | 36% | 47% | 35% | 46% | 34% | 44% | 35% | 35% | 35% | 35% |
| 10831 | 0.25% | 0.00% | 9.00% | 0.00% | 0.25% | 28% | 36% | 22% | 29% | 24% | 31% | 29% | 38% | 28% | 36% | 25% | 25% | 27% | 27% |
| 10832 | 0.00% | 0.25% | 9.00% | 0.00% | 0.25% | 30% | 39% | 26% | 34% | 26% | 34% | 33% | 43% | 31% | 40% | 27% | 27% | 30% | 30% |
| 10833 | 0.25% | 0.25% | 9.00% | 0.00% | 0.25% | 32% | 42% | 27% | 35% | 28% | 36% | 34% | 44% | 32% | 42% | 29% | 29% | 31% | 31% |
| 10834 | 1.00% | 0.25% | 9.00% | 0.00% | 0.25% | 34% | 44% | 28% | 36% | 31% | 40% | 36% | 47% | 34% | 44% | 31% | 31% | 34% | 34% |
| 10835 | 0.25% | 1.00% | 9.00% | 0.00% | 0.25% | 35% | 46% | 30% | 39% | 32% | 42% | 37% | 48% | 35% | 46% | 32% | 32% | 35% | 35% |
| 10836 | 0.25% | 0.00% | 0.00% | 0.25% | 0.25% | 17% | 22% | 16% | 21% | 18% | 23% | 16% | 21% | 16% | 21% | 17% | 17% | 17% | 17% |
| 10837 | 1.00% | 0.00% | 0.00% | 0.25% | 0.25% | 19% | 25% | 17% | 22% | 21% | 27% | 18% | 23% | 18% | 23% | 19% | 19% | 19% | 19% |
| 10838 | 0.00% | 0.25% | 0.00% | 0.25% | 0.25% | 19% | 25% | 20% | 26% | 20% | 26% | 20% | 26% | 19% | 25% | 20% | 20% | 20% | 20% |
| 10839 | 0.25% | 0.25% | 0.00% | 0.25% | 0.25% | 21% | 27% | 21% | 27% | 22% | 29% | 21% | 27% | 20% | 26% | 21% | 21% | 21% | 21% |
| 10840 | 9.00% | 0.25% | 0.00% | 0.25% | 0.25% | 19% | 25% | 20% | 26% | 20% | 26% | 20% | 26% | 19% | 25% | 20% | 20% | 20% | 20% |
| 10841 | 1.00% | 1.00% | 0.00% | 0.25% | 0.25% | 26% | 34% | 25% | 33% | 29% | 38% | 26% | 34% | 25% | 33% | 27% | 27% | 27% | 27% |
| 10842 | 1.00% | 9.00% | 0.00% | 0.25% | 0.25% | 34% | 44% | 33% | 43% | 35% | 46% | 33% | 43% | 32% | 42% | 34% | 34% | 33% | 33% |
| 10843 | 0.00% | 0.00% | 0.25% | 0.25% | 0.25% | 19% | 25% | 21% | 27% | 20% | 26% | 18% | 23% | 20% | 26% | 20% | 20% | 19% | 19% |
| 10844 | 0.25% | 0.00% | 0.25% | 0.25% | 0.25% | 21% | 27% | 22% | 29% | 22% | 29% | 19% | 25% | 21% | 27% | 22% | 22% | 21% | 21% |
| 10845 | 0.00% | 0.25% | 0.25% | 0.25% | 0.25% | 23% | 30% | 26% | 34% | 24% | 31% | 23% | 30% | 24% | 31% | 24% | 24% | 24% | 24% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10846 | 0.25% | 0.25% | 0.25% | 0.25% | 0.25% | 25% | 33% | 27% | 35% | 26% | 34% | 24% | 31% | 25% | 33% | 26% | 26% | 25% | 25% |
| 10847 | 1.00% | 0.25% | 0.25% | 0.25% | 0.25% | 27% | 35% | 28% | 36% | 29% | 38% | 26% | 34% | 27% | 35% | 28% | 28% | 27% | 27% |
| 10848 | 9.00% | 0.25% | 0.25% | 0.25% | 0.25% | 23% | 30% | 26% | 34% | 24% | 31% | 23% | 30% | 24% | 31% | 24% | 24% | 24% | 24% |
| 10849 | 0.25% | 1.00% | 0.25% | 0.25% | 0.25% | 28% | 36% | 30% | 39% | 30% | 39% | 27% | 35% | 28% | 36% | 29% | 29% | 28% | 28% |
| 10850 | 9.00% | 1.00% | 0.25% | 0.25% | 0.25% | 26% | 34% | 29% | 38% | 28% | 36% | 26% | 34% | 27% | 35% | 28% | 28% | 27% | 27% |
| 10851 | 0.25% | 9.00% | 0.25% | 0.25% | 0.25% | 36% | 47% | 38% | 49% | 36% | 47% | 34% | 44% | 35% | 46% | 37% | 37% | 35% | 35% |
| 10852 | 1.00% | 9.00% | 0.25% | 0.25% | 0.25% | 38% | 49% | 39% | 51% | 39% | 51% | 36% | 47% | 37% | 48% | 39% | 39% | 37% | 37% |
| 10853 | 9.00% | 9.00% | 0.25% | 0.25% | 0.25% | 34% | 44% | 37% | 48% | 34% | 44% | 33% | 43% | 34% | 44% | 35% | 35% | 34% | 34% |
| 10854 | 0.00% | 0.00% | 1.00% | 0.25% | 0.25% | 24% | 31% | 24% | 31% | 26% | 34% | 24% | 31% | 24% | 31% | 25% | 25% | 25% | 25% |
| 10855 | 1.00% | 0.00% | 1.00% | 0.25% | 0.25% | 28% | 36% | 26% | 34% | 31% | 40% | 27% | 35% | 27% | 35% | 28% | 28% | 28% | 28% |
| 10856 | 0.00% | 0.25% | 1.00% | 0.25% | 0.25% | 28% | 36% | 29% | 38% | 30% | 39% | 29% | 38% | 28% | 36% | 29% | 29% | 29% | 29% |
| 10857 | 0.25% | 0.25% | 1.00% | 0.25% | 0.25% | 30% | 39% | 30% | 39% | 32% | 42% | 30% | 39% | 29% | 38% | 31% | 31% | 30% | 30% |
| 10858 | 1.00% | 0.25% | 1.00% | 0.25% | 0.25% | 32% | 42% | 31% | 40% | 35% | 46% | 32% | 42% | 31% | 40% | 33% | 33% | 33% | 33% |
| 10859 | 9.00% | 0.25% | 1.00% | 0.25% | 0.25% | 28% | 36% | 29% | 38% | 30% | 39% | 29% | 38% | 28% | 36% | 29% | 29% | 29% | 29% |
| 10860 | 0.00% | 1.00% | 1.00% | 0.25% | 0.25% | 31% | 40% | 32% | 42% | 34% | 44% | 32% | 42% | 31% | 40% | 32% | 32% | 32% | 32% |
| 10861 | 0.25% | 1.00% | 1.00% | 0.25% | 0.25% | 33% | 43% | 33% | 43% | 36% | 47% | 33% | 43% | 32% | 42% | 34% | 34% | 34% | 34% |
| 10862 | 1.00% | 1.00% | 1.00% | 0.25% | 0.25% | 35% | 46% | 34% | 44% | 39% | 51% | 35% | 46% | 34% | 44% | 36% | 36% | 36% | 36% |
| 10863 | 9.00% | 1.00% | 1.00% | 0.25% | 0.25% | 31% | 40% | 32% | 42% | 34% | 44% | 32% | 42% | 31% | 40% | 32% | 32% | 32% | 32% |
| 10864 | 0.00% | 9.00% | 1.00% | 0.25% | 0.25% | 39% | 51% | 40% | 52% | 40% | 52% | 39% | 51% | 38% | 49% | 40% | 40% | 39% | 39% |
| 10865 | 0.25% | 9.00% | 1.00% | 0.25% | 0.25% | 41% | 53% | 41% | 53% | 42% | 55% | 40% | 52% | 39% | 51% | 41% | 41% | 40% | 40% |
| 10866 | 1.00% | 9.00% | 1.00% | 0.25% | 0.25% | 43% | 56% | 42% | 55% | 45% | 59% | 42% | 55% | 41% | 53% | 43% | 43% | 43% | 43% |
| 10867 | 0.25% | 0.25% | 9.00% | 0.25% | 0.25% | 40% | 52% | 35% | 46% | 37% | 48% | 41% | 53% | 39% | 51% | 37% | 37% | 39% | 39% |
| 10868 | 1.00% | 0.25% | 9.00% | 0.25% | 0.25% | 42% | 55% | 36% | 47% | 40% | 52% | 43% | 56% | 41% | 53% | 39% | 39% | 41% | 41% |
| 10869 | 9.00% | 0.25% | 9.00% | 0.25% | 0.25% | 38% | 49% | 34% | 44% | 35% | 46% | 40% | 52% | 38% | 49% | 36% | 36% | 38% | 38% |
| 10870 | 0.00% | 1.00% | 9.00% | 0.25% | 0.25% | 41% | 53% | 37% | 48% | 39% | 51% | 43% | 56% | 41% | 53% | 39% | 39% | 41% | 41% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10871 | 0.25% | 1.00% | 9.00% | 0.25% | 0.25% | 43% | 56% | 38% | 49% | 41% | 53% | 44% | 57% | 42% | 55% | 41% | 41% | 42% | 42% |
| 10872 | 9.00% | 1.00% | 9.00% | 0.25% | 0.25% | 41% | 53% | 37% | 48% | 39% | 51% | 43% | 56% | 41% | 53% | 39% | 39% | 41% | 41% |
| 10873 | 1.00% | 9.00% | 9.00% | 0.25% | 0.25% | 53% | 69% | 47% | 61% | 50% | 65% | 53% | 69% | 51% | 66% | 50% | 50% | 51% | 51% |
| 10874 | 0.25% | 0.00% | 0.00% | 1.00% | 0.25% | 34% | 44% | 29% | 38% | 31% | 40% | 31% | 40% | 29% | 38% | 31% | 31% | 30% | 30% |
| 10875 | 1.00% | 0.25% | 0.00% | 1.00% | 0.25% | 40% | 52% | 35% | 46% | 38% | 49% | 38% | 49% | 35% | 46% | 38% | 38% | 37% | 37% |
| 10876 | 0.00% | 1.00% | 0.00% | 1.00% | 0.25% | 39% | 51% | 36% | 47% | 37% | 48% | 38% | 49% | 35% | 46% | 37% | 37% | 37% | 37% |
| 10877 | 0.25% | 1.00% | 0.00% | 1.00% | 0.25% | 41% | 53% | 37% | 48% | 39% | 51% | 39% | 51% | 36% | 47% | 39% | 39% | 38% | 38% |
| 10878 | 1.00% | 1.00% | 0.00% | 1.00% | 0.25% | 43% | 56% | 38% | 49% | 42% | 55% | 41% | 53% | 38% | 49% | 41% | 41% | 40% | 40% |
| 10879 | 0.00% | 0.00% | 0.25% | 1.00% | 0.25% | 36% | 47% | 34% | 44% | 33% | 43% | 33% | 43% | 33% | 43% | 34% | 34% | 33% | 33% |
| 10880 | 1.00% | 0.00% | 0.25% | 1.00% | 0.25% | 40% | 52% | 36% | 47% | 38% | 49% | 36% | 47% | 36% | 47% | 38% | 38% | 37% | 37% |
| 10881 | 0.25% | 0.25% | 0.25% | 1.00% | 0.25% | 42% | 55% | 40% | 52% | 39% | 51% | 39% | 51% | 38% | 49% | 40% | 40% | 39% | 39% |
| 10882 | 1.00% | 0.25% | 0.25% | 1.00% | 0.25% | 44% | 57% | 41% | 53% | 42% | 55% | 41% | 53% | 40% | 52% | 42% | 42% | 41% | 41% |
| 10883 | 9.00% | 0.25% | 0.25% | 1.00% | 0.25% | 40% | 52% | 39% | 51% | 37% | 48% | 38% | 49% | 37% | 48% | 39% | 39% | 37% | 37% |
| 10884 | 0.00% | 1.00% | 0.25% | 1.00% | 0.25% | 43% | 56% | 42% | 55% | 41% | 53% | 41% | 53% | 40% | 52% | 42% | 42% | 41% | 41% |
| 10885 | 0.25% | 1.00% | 0.25% | 1.00% | 0.25% | 45% | 59% | 43% | 56% | 43% | 56% | 42% | 55% | 41% | 53% | 44% | 44% | 42% | 42% |
| 10886 | 1.00% | 1.00% | 0.25% | 1.00% | 0.25% | 47% | 61% | 44% | 57% | 46% | 60% | 44% | 57% | 43% | 56% | 46% | 46% | 44% | 44% |
| 10887 | 9.00% | 1.00% | 0.25% | 1.00% | 0.25% | 43% | 56% | 42% | 55% | 41% | 53% | 41% | 53% | 40% | 52% | 42% | 42% | 41% | 41% |
| 10888 | 0.25% | 9.00% | 0.25% | 1.00% | 0.25% | 53% | 69% | 51% | 66% | 49% | 64% | 49% | 64% | 48% | 62% | 51% | 51% | 49% | 49% |
| 10889 | 1.00% | 9.00% | 0.25% | 1.00% | 0.25% | 55% | 72% | 52% | 68% | 52% | 68% | 51% | 66% | 50% | 65% | 53% | 53% | 51% | 51% |
| 10890 | 9.00% | 9.00% | 0.25% | 1.00% | 0.25% | 51% | 66% | 50% | 65% | 47% | 61% | 48% | 62% | 47% | 61% | 49% | 49% | 47% | 47% |
| 10891 | 0.00% | 0.00% | 1.00% | 1.00% | 0.25% | 41% | 53% | 37% | 48% | 39% | 51% | 39% | 51% | 37% | 48% | 39% | 39% | 38% | 38% |
| 10892 | 0.25% | 0.00% | 1.00% | 1.00% | 0.25% | 43% | 56% | 38% | 49% | 41% | 53% | 40% | 52% | 38% | 49% | 41% | 41% | 40% | 40% |
| 10893 | 1.00% | 0.00% | 1.00% | 1.00% | 0.25% | 45% | 59% | 39% | 51% | 44% | 57% | 42% | 55% | 40% | 52% | 43% | 43% | 42% | 42% |
| 10894 | 0.00% | 0.25% | 1.00% | 1.00% | 0.25% | 45% | 59% | 42% | 55% | 43% | 56% | 44% | 57% | 41% | 53% | 43% | 43% | 43% | 43% |
| 10895 | 1.00% | 0.25% | 1.00% | 1.00% | 0.25% | 49% | 64% | 44% | 57% | 48% | 62% | 47% | 61% | 44% | 57% | 47% | 47% | 46% | 46% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10896 | 9.00% | 0.25% | 1.00% | 1.00% | 0.25% | 45% | 59% | 42% | 55% | 43% | 56% | 44% | 57% | 41% | 53% | 43% | 43% | 43% | 43% |
| 10897 | 0.00% | 1.00% | 1.00% | 1.00% | 0.25% | 48% | 62% | 45% | 59% | 47% | 61% | 47% | 61% | 44% | 57% | 47% | 47% | 46% | 46% |
| 10898 | 0.25% | 1.00% | 1.00% | 1.00% | 0.25% | 50% | 65% | 46% | 60% | 49% | 64% | 48% | 62% | 45% | 59% | 48% | 48% | 47% | 47% |
| 10899 | 1.00% | 1.00% | 1.00% | 1.00% | 0.25% | 52% | 68% | 47% | 61% | 52% | 68% | 50% | 65% | 47% | 61% | 50% | 50% | 50% | 50% |
| 10900 | 9.00% | 1.00% | 1.00% | 1.00% | 0.25% | 48% | 62% | 45% | 59% | 47% | 61% | 47% | 61% | 44% | 57% | 47% | 47% | 46% | 46% |
| 10901 | 0.00% | 9.00% | 1.00% | 1.00% | 0.25% | 56% | 73% | 53% | 69% | 53% | 69% | 54% | 70% | 51% | 66% | 54% | 54% | 53% | 53% |
| 10902 | 0.25% | 9.00% | 1.00% | 1.00% | 0.25% | 58% | 75% | 54% | 70% | 55% | 72% | 55% | 72% | 52% | 68% | 56% | 56% | 54% | 54% |
| 10903 | 1.00% | 9.00% | 1.00% | 1.00% | 0.25% | 60% | 78% | 55% | 72% | 58% | 75% | 57% | 74% | 54% | 70% | 58% | 58% | 56% | 56% |
| 10904 | 0.25% | 0.25% | 9.00% | 1.00% | 0.25% | 57% | 74% | 48% | 62% | 50% | 65% | 56% | 73% | 52% | 68% | 52% | 52% | 53% | 53% |
| 10905 | 1.00% | 0.25% | 9.00% | 1.00% | 0.25% | 59% | 77% | 49% | 64% | 53% | 69% | 58% | 75% | 54% | 70% | 54% | 54% | 55% | 55% |
| 10906 | 9.00% | 0.25% | 9.00% | 1.00% | 0.25% | 55% | 72% | 47% | 61% | 48% | 62% | 55% | 72% | 51% | 66% | 50% | 50% | 51% | 51% |
| 10907 | 0.25% | 1.00% | 9.00% | 1.00% | 0.25% | 60% | 78% | 51% | 66% | 54% | 70% | 59% | 77% | 55% | 72% | 55% | 55% | 56% | 56% |
| 10908 | 0.00% | 0.25% | 0.00% | 9.00% | 0.25% | 53% | 69% | 47% | 61% | 45% | 59% | 51% | 66% | 46% | 60% | 48% | 48% | 47% | 47% |
| 10909 | 0.00% | 0.00% | 0.25% | 9.00% | 0.25% | 53% | 69% | 48% | 62% | 45% | 59% | 49% | 64% | 47% | 61% | 49% | 49% | 47% | 47% |
| 10910 | 0.25% | 0.00% | 0.25% | 9.00% | 0.25% | 55% | 72% | 49% | 64% | 47% | 61% | 50% | 65% | 48% | 62% | 50% | 50% | 48% | 48% |
| 10911 | 0.00% | 0.25% | 0.25% | 9.00% | 0.25% | 57% | 74% | 53% | 69% | 49% | 64% | 54% | 70% | 51% | 66% | 53% | 53% | 51% | 51% |
| 10912 | 0.25% | 0.25% | 0.25% | 9.00% | 0.25% | 59% | 77% | 54% | 70% | 51% | 66% | 55% | 72% | 52% | 68% | 55% | 55% | 53% | 53% |
| 10913 | 1.00% | 0.25% | 0.25% | 9.00% | 0.25% | 61% | 79% | 55% | 72% | 54% | 70% | 57% | 74% | 54% | 70% | 57% | 57% | 55% | 55% |
| 10914 | 9.00% | 0.25% | 0.25% | 9.00% | 0.25% | 57% | 74% | 53% | 69% | 49% | 64% | 54% | 70% | 51% | 66% | 53% | 53% | 51% | 51% |
| 10915 | 0.00% | 1.00% | 0.25% | 9.00% | 0.25% | 60% | 78% | 56% | 73% | 53% | 69% | 57% | 74% | 54% | 70% | 56% | 56% | 55% | 55% |
| 10916 | 0.25% | 1.00% | 0.25% | 9.00% | 0.25% | 62% | 81% | 57% | 74% | 55% | 72% | 58% | 75% | 55% | 72% | 58% | 58% | 56% | 56% |
| 10917 | 1.00% | 1.00% | 0.25% | 9.00% | 0.25% | 64% | 83% | 58% | 75% | 58% | 75% | 60% | 78% | 57% | 74% | 60% | 60% | 58% | 58% |
| 10918 | 0.25% | 9.00% | 0.25% | 9.00% | 0.25% | 70% | 91% | 65% | 85% | 61% | 79% | 65% | 85% | 62% | 81% | 65% | 65% | 63% | 63% |
| 10919 | 0.25% | 0.00% | 1.00% | 9.00% | 0.25% | 60% | 78% | 52% | 68% | 53% | 69% | 56% | 73% | 52% | 68% | 55% | 55% | 54% | 54% |
| 10920 | 1.00% | 0.25% | 1.00% | 9.00% | 0.25% | 66% | 86% | 58% | 75% | 60% | 78% | 63% | 82% | 58% | 75% | 61% | 61% | 60% | 60% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10921 | 9.00% | 0.25% | 1.00% | 9.00% | 0.25% | 62% | 81% | 56% | 73% | 55% | 72% | 60% | 78% | 55% | 72% | 58% | 58% | 57% | 57% |
| 10922 | 0.00% | 1.00% | 1.00% | 9.00% | 0.25% | 65% | 85% | 59% | 77% | 59% | 77% | 63% | 82% | 58% | 75% | 61% | 61% | 60% | 60% |
| 10923 | 0.25% | 1.00% | 1.00% | 9.00% | 0.25% | 67% | 87% | 60% | 78% | 61% | 79% | 64% | 83% | 59% | 77% | 63% | 63% | 61% | 61% |
| 10924 | 1.00% | 1.00% | 1.00% | 9.00% | 0.25% | 69% | 90% | 61% | 79% | 64% | 83% | 66% | 86% | 61% | 79% | 65% | 65% | 64% | 64% |
| 10925 | 0.25% | 0.25% | 9.00% | 9.00% | 0.25% | 74% | 96% | 62% | 81% | 62% | 81% | 72% | 94% | 66% | 86% | 66% | 66% | 67% | 67% |
| 10926 | 0.25% | 0.25% | 0.00% | 0.00% | 1.00% | 21% | 27% | 22% | 29% | 22% | 29% | 20% | 26% | 24% | 31% | 22% | 22% | 22% | 22% |
| 10927 | 1.00% | 0.25% | 0.00% | 0.00% | 1.00% | 23% | 30% | 23% | 30% | 25% | 33% | 22% | 29% | 26% | 34% | 24% | 24% | 24% | 24% |
| 10928 | 0.25% | 1.00% | 0.00% | 0.00% | 1.00% | 24% | 31% | 25% | 33% | 26% | 34% | 23% | 30% | 27% | 35% | 25% | 25% | 25% | 25% |
| 10929 | 1.00% | 1.00% | 0.00% | 0.00% | 1.00% | 26% | 34% | 26% | 34% | 29% | 38% | 25% | 33% | 29% | 38% | 27% | 27% | 28% | 28% |
| 10930 | 0.25% | 0.00% | 0.25% | 0.00% | 1.00% | 21% | 27% | 23% | 30% | 22% | 29% | 18% | 23% | 25% | 33% | 22% | 22% | 22% | 22% |
| 10931 | 1.00% | 0.00% | 0.25% | 0.00% | 1.00% | 23% | 30% | 24% | 31% | 25% | 33% | 20% | 26% | 27% | 35% | 24% | 24% | 24% | 24% |
| 10932 | 0.00% | 0.25% | 0.25% | 0.00% | 1.00% | 23% | 30% | 27% | 35% | 24% | 31% | 22% | 29% | 28% | 36% | 25% | 25% | 25% | 25% |
| 10933 | 0.25% | 0.25% | 0.25% | 0.00% | 1.00% | 25% | 33% | 28% | 36% | 26% | 34% | 23% | 30% | 29% | 38% | 26% | 26% | 26% | 26% |
| 10934 | 0.00% | 1.00% | 0.25% | 0.00% | 1.00% | 26% | 34% | 30% | 39% | 28% | 36% | 25% | 33% | 31% | 40% | 28% | 28% | 28% | 28% |
| 10935 | 1.00% | 1.00% | 0.25% | 0.00% | 1.00% | 30% | 39% | 32% | 42% | 33% | 43% | 28% | 36% | 34% | 44% | 32% | 32% | 32% | 32% |
| 10936 | 1.00% | 9.00% | 0.25% | 0.00% | 1.00% | 38% | 49% | 40% | 52% | 39% | 51% | 35% | 46% | 41% | 53% | 39% | 39% | 38% | 38% |
| 10937 | 0.25% | 0.00% | 1.00% | 0.00% | 1.00% | 26% | 34% | 26% | 34% | 28% | 36% | 24% | 31% | 29% | 38% | 27% | 27% | 27% | 27% |
| 10938 | 1.00% | 0.00% | 1.00% | 0.00% | 1.00% | 28% | 36% | 27% | 35% | 31% | 40% | 26% | 34% | 31% | 40% | 29% | 29% | 29% | 29% |
| 10939 | 0.00% | 0.25% | 1.00% | 0.00% | 1.00% | 28% | 36% | 30% | 39% | 30% | 39% | 28% | 36% | 32% | 42% | 29% | 29% | 30% | 30% |
| 10940 | 1.00% | 0.25% | 1.00% | 0.00% | 1.00% | 32% | 42% | 32% | 42% | 35% | 46% | 31% | 40% | 35% | 46% | 33% | 33% | 34% | 34% |
| 10941 | 0.00% | 1.00% | 1.00% | 0.00% | 1.00% | 31% | 40% | 33% | 43% | 34% | 44% | 31% | 40% | 35% | 46% | 33% | 33% | 33% | 33% |
| 10942 | 0.25% | 1.00% | 1.00% | 0.00% | 1.00% | 33% | 43% | 34% | 44% | 36% | 47% | 32% | 42% | 36% | 47% | 34% | 34% | 35% | 35% |
| 10943 | 1.00% | 1.00% | 1.00% | 0.00% | 1.00% | 35% | 46% | 35% | 46% | 39% | 51% | 34% | 44% | 38% | 49% | 36% | 36% | 37% | 37% |
| 10944 | 9.00% | 1.00% | 1.00% | 0.00% | 1.00% | 31% | 40% | 33% | 43% | 34% | 44% | 31% | 40% | 35% | 46% | 33% | 33% | 33% | 33% |
| 10945 | 1.00% | 9.00% | 1.00% | 0.00% | 1.00% | 43% | 56% | 43% | 56% | 45% | 59% | 41% | 53% | 45% | 59% | 44% | 44% | 44% | 44% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10946 | 0.25% | 0.00% | 9.00% | 0.00% | 1.00% | 36% | 47% | 31% | 40% | 33% | 43% | 35% | 46% | 39% | 51% | 33% | 33% | 36% | 36% |
| 10947 | 0.00% | 0.25% | 9.00% | 0.00% | 1.00% | 38% | 49% | 35% | 46% | 35% | 46% | 39% | 51% | 42% | 55% | 36% | 36% | 39% | 39% |
| 10948 | 0.25% | 0.25% | 9.00% | 0.00% | 1.00% | 40% | 52% | 36% | 47% | 37% | 48% | 40% | 52% | 43% | 56% | 38% | 38% | 40% | 40% |
| 10949 | 1.00% | 0.25% | 9.00% | 0.00% | 1.00% | 42% | 55% | 37% | 48% | 40% | 52% | 42% | 55% | 45% | 59% | 40% | 40% | 42% | 42% |
| 10950 | 0.25% | 1.00% | 9.00% | 0.00% | 1.00% | 43% | 56% | 39% | 51% | 41% | 53% | 43% | 56% | 46% | 60% | 41% | 41% | 43% | 43% |
| 10951 | 0.25% | 0.00% | 0.00% | 0.25% | 1.00% | 25% | 33% | 25% | 33% | 27% | 35% | 22% | 29% | 27% | 35% | 26% | 26% | 25% | 25% |
| 10952 | 1.00% | 0.00% | 0.00% | 0.25% | 1.00% | 27% | 35% | 26% | 34% | 30% | 39% | 24% | 31% | 29% | 38% | 28% | 28% | 28% | 28% |
| 10953 | 0.00% | 0.25% | 0.00% | 0.25% | 1.00% | 27% | 35% | 29% | 38% | 29% | 38% | 26% | 34% | 30% | 39% | 28% | 28% | 28% | 28% |
| 10954 | 0.25% | 0.25% | 0.00% | 0.25% | 1.00% | 29% | 38% | 30% | 39% | 31% | 40% | 27% | 35% | 31% | 40% | 30% | 30% | 30% | 30% |
| 10955 | 9.00% | 0.25% | 0.00% | 0.25% | 1.00% | 27% | 35% | 29% | 38% | 29% | 38% | 26% | 34% | 30% | 39% | 28% | 28% | 28% | 28% |
| 10956 | 1.00% | 1.00% | 0.00% | 0.25% | 1.00% | 34% | 44% | 34% | 44% | 38% | 49% | 32% | 42% | 36% | 47% | 35% | 35% | 35% | 35% |
| 10957 | 1.00% | 9.00% | 0.00% | 0.25% | 1.00% | 42% | 55% | 42% | 55% | 44% | 57% | 39% | 51% | 43% | 56% | 43% | 43% | 42% | 42% |
| 10958 | 0.00% | 0.00% | 0.25% | 0.25% | 1.00% | 27% | 35% | 30% | 39% | 29% | 38% | 24% | 31% | 31% | 40% | 29% | 29% | 28% | 28% |
| 10959 | 0.25% | 0.00% | 0.25% | 0.25% | 1.00% | 29% | 38% | 31% | 40% | 31% | 40% | 25% | 33% | 32% | 42% | 30% | 30% | 29% | 29% |
| 10960 | 0.00% | 0.25% | 0.25% | 0.25% | 1.00% | 31% | 40% | 35% | 46% | 33% | 43% | 29% | 38% | 35% | 46% | 33% | 33% | 32% | 32% |
| 10961 | 0.25% | 0.25% | 0.25% | 0.25% | 1.00% | 33% | 43% | 36% | 47% | 35% | 46% | 30% | 39% | 36% | 47% | 35% | 35% | 34% | 34% |
| 10962 | 1.00% | 0.25% | 0.25% | 0.25% | 1.00% | 35% | 46% | 37% | 48% | 38% | 49% | 32% | 42% | 38% | 49% | 37% | 37% | 36% | 36% |
| 10963 | 9.00% | 0.25% | 0.25% | 0.25% | 1.00% | 31% | 40% | 35% | 46% | 33% | 43% | 29% | 38% | 35% | 46% | 33% | 33% | 32% | 32% |
| 10964 | 0.25% | 1.00% | 0.25% | 0.25% | 1.00% | 36% | 47% | 39% | 51% | 39% | 51% | 33% | 43% | 39% | 51% | 38% | 38% | 37% | 37% |
| 10965 | 9.00% | 1.00% | 0.25% | 0.25% | 1.00% | 34% | 44% | 38% | 49% | 37% | 48% | 32% | 42% | 38% | 49% | 36% | 36% | 36% | 36% |
| 10966 | 0.25% | 9.00% | 0.25% | 0.25% | 1.00% | 44% | 57% | 47% | 61% | 45% | 59% | 40% | 52% | 46% | 60% | 45% | 45% | 44% | 44% |
| 10967 | 1.00% | 9.00% | 0.25% | 0.25% | 1.00% | 46% | 60% | 48% | 62% | 48% | 62% | 42% | 55% | 48% | 62% | 47% | 47% | 46% | 46% |
| 10968 | 9.00% | 9.00% | 0.25% | 0.25% | 1.00% | 42% | 55% | 46% | 60% | 43% | 56% | 39% | 51% | 45% | 59% | 44% | 44% | 42% | 42% |
| 10969 | 0.00% | 0.00% | 1.00% | 0.25% | 1.00% | 32% | 42% | 33% | 43% | 35% | 46% | 30% | 39% | 35% | 46% | 33% | 33% | 33% | 33% |
| 10970 | 1.00% | 0.00% | 1.00% | 0.25% | 1.00% | 36% | 47% | 35% | 46% | 40% | 52% | 33% | 43% | 38% | 49% | 37% | 37% | 37% | 37% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10971 | 0.00% | 0.25% | 1.00% | 0.25% | 1.00% | 36% | 47% | 38% | 49% | 39% | 51% | 35% | 46% | 39% | 51% | 38% | 38% | 38% | 38% |
| 10972 | 0.25% | 0.25% | 1.00% | 0.25% | 1.00% | 38% | 49% | 39% | 51% | 41% | 53% | 36% | 47% | 40% | 52% | 39% | 39% | 39% | 39% |
| 10973 | 1.00% | 0.25% | 1.00% | 0.25% | 1.00% | 40% | 52% | 40% | 52% | 44% | 57% | 38% | 49% | 42% | 55% | 41% | 41% | 41% | 41% |
| 10974 | 9.00% | 0.25% | 1.00% | 0.25% | 1.00% | 36% | 47% | 38% | 49% | 39% | 51% | 35% | 46% | 39% | 51% | 38% | 38% | 38% | 38% |
| 10975 | 0.00% | 1.00% | 1.00% | 0.25% | 1.00% | 39% | 51% | 41% | 53% | 43% | 56% | 38% | 49% | 42% | 55% | 41% | 41% | 41% | 41% |
| 10976 | 0.25% | 1.00% | 1.00% | 0.25% | 1.00% | 41% | 53% | 42% | 55% | 45% | 59% | 39% | 51% | 43% | 56% | 43% | 43% | 42% | 42% |
| 10977 | 1.00% | 1.00% | 1.00% | 0.25% | 1.00% | 43% | 56% | 43% | 56% | 48% | 62% | 41% | 53% | 45% | 59% | 45% | 45% | 45% | 45% |
| 10978 | 9.00% | 1.00% | 1.00% | 0.25% | 1.00% | 39% | 51% | 41% | 53% | 43% | 56% | 38% | 49% | 42% | 55% | 41% | 41% | 41% | 41% |
| 10979 | 0.00% | 9.00% | 1.00% | 0.25% | 1.00% | 47% | 61% | 49% | 64% | 49% | 64% | 45% | 59% | 49% | 64% | 48% | 48% | 48% | 48% |
| 10980 | 0.25% | 9.00% | 1.00% | 0.25% | 1.00% | 49% | 64% | 50% | 65% | 51% | 66% | 46% | 60% | 50% | 65% | 50% | 50% | 49% | 49% |
| 10981 | 1.00% | 9.00% | 1.00% | 0.25% | 1.00% | 51% | 66% | 51% | 66% | 54% | 70% | 48% | 62% | 52% | 68% | 52% | 52% | 51% | 51% |
| 10982 | 0.25% | 0.25% | 9.00% | 0.25% | 1.00% | 48% | 62% | 44% | 57% | 46% | 60% | 47% | 61% | 50% | 65% | 46% | 46% | 48% | 48% |
| 10983 | 1.00% | 0.25% | 9.00% | 0.25% | 1.00% | 50% | 65% | 45% | 59% | 49% | 64% | 49% | 64% | 52% | 68% | 48% | 48% | 50% | 50% |
| 10984 | 9.00% | 0.25% | 9.00% | 0.25% | 1.00% | 46% | 60% | 43% | 56% | 44% | 57% | 46% | 60% | 49% | 64% | 44% | 44% | 46% | 46% |
| 10985 | 0.00% | 1.00% | 9.00% | 0.25% | 1.00% | 49% | 64% | 46% | 60% | 48% | 62% | 49% | 64% | 52% | 68% | 48% | 48% | 50% | 50% |
| 10986 | 0.25% | 1.00% | 9.00% | 0.25% | 1.00% | 51% | 66% | 47% | 61% | 50% | 65% | 50% | 65% | 53% | 69% | 49% | 49% | 51% | 51% |
| 10987 | 9.00% | 1.00% | 9.00% | 0.25% | 1.00% | 49% | 64% | 46% | 60% | 48% | 62% | 49% | 64% | 52% | 68% | 48% | 48% | 50% | 50% |
| 10988 | 1.00% | 9.00% | 9.00% | 0.25% | 1.00% | 61% | 79% | 56% | 73% | 59% | 77% | 59% | 77% | 62% | 81% | 59% | 59% | 60% | 60% |
| 10989 | 0.25% | 0.00% | 0.00% | 1.00% | 1.00% | 42% | 55% | 38% | 49% | 40% | 52% | 37% | 48% | 40% | 52% | 40% | 40% | 39% | 39% |
| 10990 | 1.00% | 0.25% | 0.00% | 1.00% | 1.00% | 48% | 62% | 44% | 57% | 47% | 61% | 44% | 57% | 46% | 60% | 46% | 46% | 46% | 46% |
| 10991 | 0.00% | 1.00% | 0.00% | 1.00% | 1.00% | 47% | 61% | 45% | 59% | 46% | 60% | 44% | 57% | 46% | 60% | 46% | 46% | 45% | 45% |
| 10992 | 0.25% | 1.00% | 0.00% | 1.00% | 1.00% | 49% | 64% | 46% | 60% | 48% | 62% | 45% | 59% | 47% | 61% | 48% | 48% | 47% | 47% |
| 10993 | 1.00% | 1.00% | 0.00% | 1.00% | 1.00% | 51% | 66% | 47% | 61% | 51% | 66% | 47% | 61% | 49% | 64% | 50% | 50% | 49% | 49% |
| 10994 | 0.00% | 0.00% | 0.25% | 1.00% | 1.00% | 44% | 57% | 43% | 56% | 42% | 55% | 39% | 51% | 44% | 57% | 43% | 43% | 42% | 42% |
| 10995 | 1.00% | 0.00% | 0.25% | 1.00% | 1.00% | 48% | 62% | 45% | 59% | 47% | 61% | 42% | 55% | 47% | 61% | 47% | 47% | 45% | 45% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 10996 | 0.25% | 0.25% | 0.25% | 1.00% | 1.00% | 50% | 65% | 49% | 64% | 48% | 62% | 45% | 59% | 49% | 64% | 49% | 49% | 47% | 47% |
| 10997 | 1.00% | 0.25% | 0.25% | 1.00% | 1.00% | 52% | 68% | 50% | 65% | 51% | 66% | 47% | 61% | 51% | 66% | 51% | 51% | 50% | 50% |
| 10998 | 9.00% | 0.25% | 0.25% | 1.00% | 1.00% | 48% | 62% | 48% | 62% | 46% | 60% | 44% | 57% | 48% | 62% | 47% | 47% | 46% | 46% |
| 10999 | 0.00% | 1.00% | 0.25% | 1.00% | 1.00% | 51% | 66% | 51% | 66% | 50% | 65% | 47% | 61% | 51% | 66% | 51% | 51% | 49% | 49% |
| 11000 | 0.25% | 1.00% | 0.25% | 1.00% | 1.00% | 53% | 69% | 52% | 68% | 52% | 68% | 48% | 62% | 52% | 68% | 52% | 52% | 51% | 51% |
| 11001 | 1.00% | 1.00% | 0.25% | 1.00% | 1.00% | 55% | 72% | 53% | 69% | 55% | 72% | 50% | 65% | 54% | 70% | 54% | 54% | 53% | 53% |
| 11002 | 9.00% | 1.00% | 0.25% | 1.00% | 1.00% | 51% | 66% | 51% | 66% | 50% | 65% | 47% | 61% | 51% | 66% | 51% | 51% | 49% | 49% |
| 11003 | 0.25% | 9.00% | 0.25% | 1.00% | 1.00% | 61% | 79% | 60% | 78% | 58% | 75% | 55% | 72% | 59% | 77% | 60% | 60% | 57% | 57% |
| 11004 | 1.00% | 9.00% | 0.25% | 1.00% | 1.00% | 63% | 82% | 61% | 79% | 61% | 79% | 57% | 74% | 61% | 79% | 62% | 62% | 60% | 60% |
| 11005 | 9.00% | 9.00% | 0.25% | 1.00% | 1.00% | 59% | 77% | 59% | 77% | 56% | 73% | 54% | 70% | 58% | 75% | 58% | 58% | 56% | 56% |
| 11006 | 0.00% | 0.00% | 1.00% | 1.00% | 1.00% | 49% | 64% | 46% | 60% | 48% | 62% | 45% | 59% | 48% | 62% | 48% | 48% | 47% | 47% |
| 11007 | 0.25% | 0.00% | 1.00% | 1.00% | 1.00% | 51% | 66% | 47% | 61% | 50% | 65% | 46% | 60% | 49% | 64% | 49% | 49% | 48% | 48% |
| 11008 | 1.00% | 0.00% | 1.00% | 1.00% | 1.00% | 53% | 69% | 48% | 62% | 53% | 69% | 48% | 62% | 51% | 66% | 51% | 51% | 51% | 51% |
| 11009 | 0.00% | 0.25% | 1.00% | 1.00% | 1.00% | 53% | 69% | 51% | 66% | 52% | 68% | 50% | 65% | 52% | 68% | 52% | 52% | 51% | 51% |
| 11010 | 1.00% | 0.25% | 1.00% | 1.00% | 1.00% | 57% | 74% | 53% | 69% | 57% | 74% | 53% | 69% | 55% | 72% | 56% | 56% | 55% | 55% |
| 11011 | 9.00% | 0.25% | 1.00% | 1.00% | 1.00% | 53% | 69% | 51% | 66% | 52% | 68% | 50% | 65% | 52% | 68% | 52% | 52% | 51% | 51% |
| 11012 | 0.00% | 1.00% | 1.00% | 1.00% | 1.00% | 56% | 73% | 54% | 70% | 56% | 73% | 53% | 69% | 55% | 72% | 55% | 55% | 55% | 55% |
| 11013 | 0.25% | 1.00% | 1.00% | 1.00% | 1.00% | 58% | 75% | 55% | 72% | 58% | 75% | 54% | 70% | 56% | 73% | 57% | 57% | 56% | 56% |
| 11014 | 1.00% | 1.00% | 1.00% | 1.00% | 1.00% | 60% | 78% | 56% | 73% | 61% | 79% | 56% | 73% | 58% | 75% | 59% | 59% | 58% | 58% |
| 11015 | 9.00% | 1.00% | 1.00% | 1.00% | 1.00% | 56% | 73% | 54% | 70% | 56% | 73% | 53% | 69% | 55% | 72% | 55% | 55% | 55% | 55% |
| 11016 | 0.00% | 9.00% | 1.00% | 1.00% | 1.00% | 64% | 83% | 62% | 81% | 62% | 81% | 60% | 78% | 62% | 81% | 63% | 63% | 61% | 61% |
| 11017 | 0.25% | 9.00% | 1.00% | 1.00% | 1.00% | 66% | 86% | 63% | 82% | 64% | 83% | 61% | 79% | 63% | 82% | 64% | 64% | 63% | 63% |
| 11018 | 1.00% | 9.00% | 1.00% | 1.00% | 1.00% | 68% | 88% | 64% | 83% | 67% | 87% | 63% | 82% | 65% | 85% | 66% | 66% | 65% | 65% |
| 11019 | 0.25% | 0.25% | 9.00% | 1.00% | 1.00% | 65% | 85% | 57% | 74% | 59% | 77% | 62% | 81% | 63% | 82% | 60% | 60% | 61% | 61% |
| 11020 | 1.00% | 0.25% | 9.00% | 1.00% | 1.00% | 67% | 87% | 58% | 75% | 62% | 81% | 64% | 83% | 65% | 85% | 62% | 62% | 64% | 64% |

Fig. 37

| Formula # | Delta Dodecalactone | Propyl Dihydrojasmonate | Methyl Dihydrojasmonate | Picaridin | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11021 | 9.00% | 0.25% | 9.00% | 1.00% | 1.00% | 63% | 82% | 56% | 73% | 57% | 74% | 61% | 79% | 62% | 81% | 59% | 59% | 60% | 60% |
| 11022 | 0.25% | 1.00% | 9.00% | 1.00% | 1.00% | 68% | 88% | 60% | 78% | 63% | 82% | 65% | 85% | 66% | 86% | 64% | 64% | 65% | 65% |
| 11023 | 0.00% | 0.25% | 0.00% | 9.00% | 1.00% | 61% | 79% | 56% | 73% | 54% | 70% | 57% | 74% | 57% | 74% | 57% | 57% | 56% | 56% |
| 11024 | 0.00% | 0.00% | 0.25% | 9.00% | 1.00% | 61% | 79% | 57% | 74% | 54% | 70% | 55% | 72% | 58% | 75% | 57% | 57% | 56% | 56% |
| 11025 | 0.25% | 0.00% | 0.25% | 9.00% | 1.00% | 63% | 82% | 58% | 75% | 56% | 73% | 56% | 73% | 59% | 77% | 59% | 59% | 57% | 57% |
| 11026 | 0.00% | 0.25% | 0.25% | 9.00% | 1.00% | 65% | 85% | 62% | 81% | 58% | 75% | 60% | 78% | 62% | 81% | 62% | 62% | 60% | 60% |
| 11027 | 0.25% | 0.25% | 0.25% | 9.00% | 1.00% | 67% | 87% | 63% | 82% | 60% | 78% | 61% | 79% | 63% | 82% | 63% | 63% | 61% | 61% |
| 11028 | 1.00% | 0.25% | 0.25% | 9.00% | 1.00% | 69% | 90% | 64% | 83% | 63% | 82% | 63% | 82% | 65% | 85% | 65% | 65% | 64% | 64% |
| 11029 | 9.00% | 0.25% | 0.25% | 9.00% | 1.00% | 65% | 85% | 62% | 81% | 58% | 75% | 60% | 78% | 62% | 81% | 62% | 62% | 60% | 60% |
| 11030 | 0.00% | 1.00% | 0.25% | 9.00% | 1.00% | 68% | 88% | 65% | 85% | 62% | 81% | 63% | 82% | 65% | 85% | 65% | 65% | 63% | 63% |
| 11031 | 0.25% | 1.00% | 0.25% | 9.00% | 1.00% | 70% | 91% | 66% | 86% | 64% | 83% | 64% | 83% | 66% | 86% | 67% | 67% | 65% | 65% |
| 11032 | 1.00% | 1.00% | 0.25% | 9.00% | 1.00% | 72% | 94% | 67% | 87% | 67% | 87% | 66% | 86% | 68% | 88% | 69% | 69% | 67% | 67% |
| 11033 | 0.25% | 9.00% | 0.25% | 9.00% | 1.00% | 78% | 100% | 74% | 100% | 70% | 100% | 71% | 100% | 73% | 100% | 74% | 74% | 71% | 71% |
| 11034 | 0.25% | 0.00% | 1.00% | 9.00% | 1.00% | 68% | 88% | 61% | 79% | 62% | 81% | 62% | 81% | 63% | 82% | 64% | 64% | 62% | 62% |
| 11035 | 1.00% | 0.25% | 1.00% | 9.00% | 1.00% | 74% | 96% | 67% | 87% | 69% | 90% | 69% | 90% | 69% | 90% | 70% | 70% | 69% | 69% |
| 11036 | 9.00% | 0.25% | 1.00% | 9.00% | 1.00% | 70% | 91% | 65% | 85% | 64% | 83% | 66% | 86% | 66% | 86% | 66% | 66% | 65% | 65% |
| 11037 | 0.00% | 1.00% | 1.00% | 9.00% | 1.00% | 73% | 95% | 68% | 88% | 68% | 88% | 69% | 90% | 69% | 90% | 70% | 70% | 69% | 69% |
| 11038 | 0.25% | 1.00% | 1.00% | 9.00% | 1.00% | 75% | 98% | 69% | 90% | 70% | 91% | 70% | 91% | 70% | 91% | 71% | 71% | 70% | 70% |
| 11039 | 1.00% | 1.00% | 1.00% | 9.00% | 1.00% | 77% | 100% | 70% | 91% | 73% | 95% | 72% | 94% | 72% | 94% | 73% | 73% | 72% | 72% |
| 11040 | 0.25% | 0.25% | 9.00% | 9.00% | 1.00% | 82% | 100% | 71% | 100% | 71% | 100% | 78% | 100% | 77% | 100% | 75% | 75% | 75% | 75% |

Fig. 38

| Formula # | gamma Butyrolactone | Hexyl Apritone | Undecyl Dihydrojasmolate | Delta Dodecalactone | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11041 | 0.25% | 0.25% | 0.00% | 0.00% | 0.00% | 5% | 5% | 6% | 6% | 5% | 5% | 6% | 6% | 6% | 6% | 4% | 4% | 7% | 7% |
| 11042 | 0.25% | 0.00% | 0.25% | 0.00% | 0.00% | 6% | 6% | 7% | 7% | 6% | 6% | 6% | 6% | 6% | 6% | 6% | 6% | 8% | 8% |
| 11043 | 0.00% | 1.00% | 0.25% | 0.00% | 0.00% | 12% | 12% | 11% | 11% | 11% | 11% | 13% | 13% | 10% | 10% | 11% | 11% | 14% | 14% |
| 11044 | 1.00% | 0.00% | 1.00% | 0.00% | 0.00% | 8% | 8% | 7% | 7% | 7% | 7% | 9% | 9% | 9% | 9% | 7% | 7% | 7% | 7% |
| 11045 | 0.00% | 0.25% | 1.00% | 0.00% | 0.00% | 13% | 13% | 12% | 12% | 11% | 11% | 14% | 14% | 13% | 13% | 11% | 11% | 13% | 13% |
| 11046 | 9.00% | 1.00% | 1.00% | 0.00% | 0.00% | 15% | 15% | 14% | 14% | 14% | 14% | 16% | 16% | 15% | 15% | 13% | 13% | 16% | 16% |
| 11047 | 0.25% | 1.00% | 9.00% | 0.00% | 0.00% | 14% | 14% | 15% | 15% | 17% | 17% | 18% | 18% | 15% | 15% | 14% | 14% | 18% | 18% |
| 11048 | 1.00% | 1.00% | 0.00% | 0.25% | 0.00% | 13% | 13% | 12% | 12% | 13% | 13% | 16% | 16% | 14% | 14% | 12% | 12% | 15% | 15% |
| 11049 | 1.00% | 0.25% | 0.25% | 0.25% | 0.00% | 18% | 18% | 18% | 18% | 16% | 16% | 21% | 21% | 19% | 19% | 17% | 17% | 21% | 21% |
| 11050 | 9.00% | 9.00% | 0.25% | 0.25% | 0.00% | 18% | 18% | 21% | 21% | 20% | 20% | 23% | 23% | 20% | 20% | 19% | 19% | 26% | 26% |
| 11051 | 9.00% | 0.25% | 1.00% | 0.25% | 0.00% | 21% | 21% | 21% | 21% | 19% | 19% | 23% | 23% | 23% | 23% | 19% | 19% | 23% | 23% |
| 11052 | 0.25% | 9.00% | 1.00% | 0.25% | 0.00% | 19% | 19% | 21% | 21% | 22% | 22% | 24% | 24% | 22% | 22% | 19% | 19% | 25% | 25% |
| 11053 | 0.25% | 1.00% | 9.00% | 0.25% | 0.00% | 21% | 21% | 22% | 22% | 24% | 24% | 26% | 26% | 23% | 23% | 21% | 21% | 26% | 26% |
| 11054 | 0.25% | 1.00% | 0.00% | 1.00% | 0.00% | 21% | 21% | 22% | 22% | 23% | 23% | 21% | 21% | 25% | 25% | 20% | 20% | 23% | 23% |
| 11055 | 9.00% | 0.25% | 0.25% | 1.00% | 0.00% | 27% | 27% | 29% | 29% | 26% | 26% | 27% | 27% | 31% | 31% | 26% | 26% | 30% | 30% |
| 11056 | 1.00% | 9.00% | 0.25% | 1.00% | 0.00% | 25% | 25% | 28% | 28% | 28% | 28% | 29% | 29% | 30% | 30% | 26% | 26% | 31% | 31% |
| 11057 | 0.00% | 9.00% | 1.00% | 1.00% | 0.00% | 27% | 27% | 29% | 29% | 30% | 30% | 30% | 30% | 32% | 32% | 27% | 27% | 31% | 31% |
| 11058 | 0.25% | 1.00% | 9.00% | 1.00% | 0.00% | 29% | 29% | 31% | 31% | 33% | 33% | 32% | 32% | 34% | 34% | 29% | 29% | 33% | 33% |
| 11059 | 1.00% | 0.25% | 0.25% | 9.00% | 0.00% | 41% | 41% | 40% | 40% | 32% | 32% | 46% | 46% | 41% | 41% | 40% | 40% | 44% | 44% |
| 11060 | 0.25% | 0.00% | 1.00% | 9.00% | 0.00% | 38% | 38% | 37% | 37% | 31% | 31% | 41% | 41% | 39% | 39% | 37% | 37% | 39% | 39% |
| 11061 | 0.25% | 0.25% | 9.00% | 9.00% | 0.00% | 43% | 43% | 44% | 44% | 38% | 38% | 50% | 50% | 45% | 45% | 43% | 43% | 48% | 48% |
| 11062 | 0.25% | 0.00% | 1.00% | 0.00% | 0.25% | 10% | 10% | 9% | 9% | 9% | 9% | 9% | 9% | 11% | 11% | 9% | 9% | 9% | 9% |
| 11063 | 1.00% | 1.00% | 1.00% | 0.00% | 0.25% | 16% | 16% | 13% | 13% | 14% | 14% | 17% | 17% | 16% | 16% | 14% | 14% | 15% | 15% |
| 11064 | 1.00% | 0.25% | 9.00% | 0.00% | 0.25% | 15% | 15% | 15% | 15% | 15% | 15% | 19% | 19% | 17% | 17% | 15% | 15% | 17% | 17% |
| 11065 | 9.00% | 0.25% | 0.00% | 0.25% | 0.25% | 15% | 15% | 15% | 15% | 13% | 13% | 16% | 16% | 17% | 17% | 14% | 14% | 17% | 17% |
| 11066 | 1.00% | 9.00% | 0.25% | 0.25% | 0.25% | 19% | 19% | 20% | 20% | 20% | 20% | 24% | 24% | 21% | 21% | 20% | 20% | 25% | 25% |

Fig. 38

| Formula # | gamma Butyrolactone | Hexyl Apritone | Undecyl Dihydrojasmolate | Delta Dodecalactone | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11067 | 1.00% | 0.25% | 1.00% | 0.25% | 0.25% | 22% | 22% | 20% | 20% | 19% | 19% | 24% | 24% | 24% | 24% | 20% | 20% | 22% | 22% |
| 11068 | 0.00% | 9.00% | 1.00% | 0.25% | 0.25% | 21% | 21% | 21% | 21% | 22% | 22% | 25% | 25% | 23% | 23% | 21% | 21% | 25% | 25% |
| 11069 | 0.00% | 1.00% | 0.00% | 1.00% | 0.25% | 23% | 23% | 22% | 22% | 23% | 23% | 22% | 22% | 26% | 26% | 22% | 22% | 23% | 23% |
| 11070 | 1.00% | 0.25% | 0.25% | 1.00% | 0.25% | 28% | 28% | 28% | 28% | 26% | 26% | 28% | 28% | 32% | 32% | 27% | 27% | 29% | 29% |
| 11071 | 0.25% | 9.00% | 0.25% | 1.00% | 0.25% | 27% | 27% | 30% | 30% | 30% | 30% | 29% | 29% | 32% | 32% | 28% | 28% | 33% | 33% |
| 11072 | 9.00% | 1.00% | 1.00% | 1.00% | 0.25% | 32% | 32% | 31% | 31% | 31% | 31% | 31% | 31% | 36% | 36% | 30% | 30% | 32% | 32% |
| 11073 | 9.00% | 0.25% | 9.00% | 1.00% | 0.25% | 31% | 31% | 33% | 33% | 32% | 32% | 33% | 33% | 37% | 37% | 31% | 31% | 34% | 34% |
| 11074 | 0.25% | 0.25% | 0.25% | 9.00% | 0.25% | 43% | 43% | 42% | 42% | 34% | 34% | 46% | 46% | 43% | 43% | 42% | 42% | 46% | 46% |
| 11075 | 0.25% | 9.00% | 0.25% | 9.00% | 0.25% | 42% | 42% | 43% | 43% | 37% | 37% | 48% | 48% | 43% | 43% | 43% | 43% | 49% | 49% |
| 11076 | 0.25% | 0.00% | 0.25% | 0.00% | 1.00% | 9% | 9% | 8% | 8% | 7% | 7% | 8% | 8% | 8% | 8% | 8% | 8% | 11% | 11% |
| 11077 | 1.00% | 9.00% | 0.25% | 0.00% | 1.00% | 13% | 13% | 13% | 13% | 13% | 13% | 17% | 17% | 13% | 13% | 13% | 13% | 19% | 19% |
| 11078 | 0.25% | 1.00% | 1.00% | 0.00% | 1.00% | 17% | 17% | 14% | 14% | 15% | 15% | 17% | 17% | 16% | 16% | 14% | 14% | 18% | 18% |
| 11079 | 0.25% | 0.25% | 9.00% | 0.00% | 1.00% | 16% | 16% | 16% | 16% | 16% | 16% | 19% | 19% | 17% | 17% | 15% | 15% | 20% | 20% |
| 11080 | 0.25% | 0.25% | 0.00% | 0.25% | 1.00% | 15% | 15% | 14% | 14% | 13% | 13% | 16% | 16% | 16% | 16% | 13% | 13% | 18% | 18% |
| 11081 | 0.25% | 9.00% | 0.25% | 0.25% | 1.00% | 20% | 20% | 21% | 21% | 21% | 21% | 24% | 24% | 21% | 21% | 20% | 20% | 28% | 28% |
| 11082 | 0.25% | 0.25% | 1.00% | 0.25% | 1.00% | 23% | 23% | 21% | 21% | 20% | 20% | 24% | 24% | 24% | 24% | 20% | 20% | 25% | 25% |
| 11083 | 9.00% | 1.00% | 1.00% | 0.25% | 1.00% | 25% | 25% | 22% | 22% | 22% | 22% | 26% | 26% | 25% | 25% | 22% | 22% | 27% | 27% |
| 11084 | 9.00% | 0.25% | 9.00% | 0.25% | 1.00% | 24% | 24% | 24% | 24% | 23% | 23% | 28% | 28% | 26% | 26% | 23% | 23% | 29% | 29% |
| 11085 | 1.00% | 0.25% | 0.00% | 1.00% | 1.00% | 23% | 23% | 22% | 22% | 21% | 21% | 23% | 23% | 27% | 27% | 21% | 21% | 24% | 24% |
| 11086 | 0.25% | 0.25% | 0.25% | 1.00% | 1.00% | 29% | 29% | 29% | 29% | 27% | 27% | 28% | 28% | 32% | 32% | 27% | 27% | 32% | 32% |
| 11087 | 1.00% | 0.00% | 1.00% | 1.00% | 1.00% | 26% | 26% | 24% | 24% | 24% | 24% | 25% | 25% | 30% | 30% | 24% | 24% | 25% | 25% |
| 11088 | 1.00% | 1.00% | 1.00% | 1.00% | 1.00% | 32% | 32% | 29% | 29% | 30% | 30% | 32% | 32% | 35% | 35% | 29% | 29% | 32% | 32% |
| 11089 | 1.00% | 0.25% | 9.00% | 1.00% | 1.00% | 31% | 31% | 31% | 31% | 31% | 31% | 34% | 34% | 36% | 36% | 30% | 30% | 34% | 34% |
| 11090 | 0.00% | 0.25% | 0.25% | 9.00% | 1.00% | 44% | 44% | 41% | 41% | 33% | 33% | 47% | 47% | 42% | 42% | 42% | 42% | 47% | 47% |

Fig. 39

| Formula # | gamma Butyrolactone | Hexyl Apritone | Undecyl Dihydrojasmolate | Apritone | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11091 | 0.25% | 0.25% | 0.00% | 0.00% | 0.00% | 5% | 5% | 6% | 6% | 5% | 5% | 6% | 6% | 6% | 6% | 4% | 4% | 7% | 7% |
| 11092 | 0.25% | 0.00% | 0.25% | 0.00% | 0.00% | 6% | 6% | 7% | 7% | 6% | 6% | 6% | 6% | 6% | 6% | 6% | 6% | 8% | 8% |
| 11093 | 0.00% | 1.00% | 0.25% | 0.00% | 0.00% | 12% | 12% | 11% | 11% | 11% | 11% | 13% | 13% | 10% | 10% | 11% | 11% | 14% | 14% |
| 11094 | 1.00% | 0.00% | 1.00% | 0.00% | 0.00% | 8% | 8% | 7% | 7% | 7% | 7% | 9% | 9% | 9% | 9% | 7% | 7% | 7% | 7% |
| 11095 | 0.00% | 0.25% | 1.00% | 0.00% | 0.00% | 13% | 13% | 12% | 12% | 11% | 11% | 14% | 14% | 13% | 13% | 11% | 11% | 13% | 13% |
| 11096 | 9.00% | 1.00% | 1.00% | 0.00% | 0.00% | 15% | 15% | 14% | 14% | 14% | 14% | 16% | 16% | 15% | 15% | 13% | 13% | 16% | 16% |
| 11097 | 0.25% | 1.00% | 9.00% | 0.00% | 0.00% | 14% | 14% | 15% | 15% | 17% | 17% | 18% | 18% | 15% | 15% | 14% | 14% | 18% | 18% |
| 11098 | 1.00% | 1.00% | 0.00% | 0.25% | 0.00% | 11% | 11% | 9% | 9% | 9% | 9% | 11% | 11% | 9% | 9% | 10% | 10% | 11% | 11% |
| 11099 | 1.00% | 0.25% | 0.25% | 0.25% | 0.00% | 16% | 16% | 15% | 15% | 12% | 12% | 16% | 16% | 14% | 14% | 15% | 15% | 17% | 17% |
| 11100 | 9.00% | 9.00% | 0.25% | 0.25% | 0.00% | 15% | 15% | 18% | 18% | 16% | 16% | 18% | 18% | 15% | 15% | 16% | 16% | 22% | 22% |
| 11101 | 9.00% | 0.25% | 1.00% | 0.25% | 0.00% | 18% | 18% | 18% | 18% | 15% | 15% | 18% | 18% | 18% | 18% | 16% | 16% | 19% | 19% |
| 11102 | 0.25% | 9.00% | 1.00% | 0.25% | 0.00% | 17% | 17% | 18% | 18% | 18% | 18% | 19% | 19% | 17% | 17% | 17% | 17% | 21% | 21% |
| 11103 | 0.25% | 1.00% | 9.00% | 0.25% | 0.00% | 19% | 19% | 19% | 19% | 20% | 20% | 21% | 21% | 18% | 18% | 19% | 19% | 22% | 22% |
| 11104 | 0.25% | 1.00% | 0.00% | 1.00% | 0.00% | 17% | 17% | 18% | 18% | 14% | 14% | 16% | 16% | 17% | 17% | 16% | 16% | 18% | 18% |
| 11105 | 9.00% | 0.25% | 0.25% | 1.00% | 0.00% | 23% | 23% | 25% | 25% | 17% | 17% | 22% | 22% | 23% | 23% | 22% | 22% | 25% | 25% |
| 11106 | 1.00% | 9.00% | 0.25% | 1.00% | 0.00% | 21% | 21% | 24% | 24% | 19% | 19% | 24% | 24% | 22% | 22% | 22% | 22% | 26% | 26% |
| 11107 | 0.00% | 9.00% | 1.00% | 1.00% | 0.00% | 23% | 23% | 25% | 25% | 21% | 21% | 25% | 25% | 24% | 24% | 23% | 23% | 26% | 26% |
| 11108 | 0.25% | 1.00% | 9.00% | 1.00% | 0.00% | 25% | 25% | 27% | 27% | 24% | 24% | 27% | 27% | 26% | 26% | 25% | 25% | 28% | 28% |
| 11109 | 1.00% | 0.25% | 0.25% | 9.00% | 0.00% | 33% | 33% | 36% | 36% | 24% | 24% | 32% | 32% | 36% | 36% | 32% | 32% | 36% | 36% |
| 11110 | 0.25% | 0.00% | 1.00% | 9.00% | 0.00% | 30% | 30% | 33% | 33% | 23% | 23% | 27% | 27% | 34% | 34% | 29% | 29% | 31% | 31% |
| 11111 | 0.25% | 0.25% | 9.00% | 9.00% | 0.00% | 35% | 35% | 40% | 40% | 30% | 30% | 36% | 36% | 40% | 40% | 35% | 35% | 40% | 40% |
| 11112 | 0.25% | 0.00% | 1.00% | 0.00% | 0.25% | 10% | 10% | 9% | 9% | 9% | 9% | 9% | 9% | 11% | 11% | 9% | 9% | 9% | 9% |
| 11113 | 1.00% | 1.00% | 1.00% | 0.00% | 0.25% | 16% | 16% | 13% | 13% | 14% | 14% | 17% | 17% | 16% | 16% | 14% | 14% | 15% | 15% |
| 11114 | 1.00% | 0.25% | 9.00% | 0.00% | 0.25% | 15% | 15% | 15% | 15% | 15% | 15% | 19% | 19% | 17% | 17% | 15% | 15% | 17% | 17% |
| 11115 | 9.00% | 0.25% | 0.00% | 0.25% | 0.25% | 12% | 12% | 12% | 12% | 9% | 9% | 11% | 11% | 12% | 12% | 11% | 11% | 13% | 13% |
| 11116 | 1.00% | 9.00% | 0.25% | 0.25% | 0.25% | 17% | 17% | 17% | 17% | 16% | 16% | 19% | 19% | 16% | 16% | 18% | 18% | 21% | 21% |

Fig. 39

| Formula # | gamma Butyrolactone | Hexyl Apritone | Undecyl Dihydrojasmolate | Apritone | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11117 | 1.00% | 0.25% | 1.00% | 0.25% | 0.25% | 20% | 20% | 17% | 17% | 15% | 15% | 19% | 19% | 19% | 19% | 18% | 18% | 18% | 18% |
| 11118 | 0.00% | 9.00% | 1.00% | 0.25% | 0.25% | 19% | 19% | 18% | 18% | 18% | 18% | 20% | 20% | 18% | 18% | 19% | 19% | 21% | 21% |
| 11119 | 0.00% | 1.00% | 0.00% | 1.00% | 0.25% | 19% | 19% | 18% | 18% | 14% | 14% | 17% | 17% | 18% | 18% | 18% | 18% | 18% | 18% |
| 11120 | 1.00% | 0.25% | 0.25% | 1.00% | 0.25% | 24% | 24% | 24% | 24% | 17% | 17% | 23% | 23% | 24% | 24% | 23% | 23% | 24% | 24% |
| 11121 | 0.25% | 9.00% | 0.25% | 1.00% | 0.25% | 23% | 23% | 26% | 26% | 21% | 21% | 24% | 24% | 24% | 24% | 24% | 24% | 28% | 28% |
| 11122 | 9.00% | 1.00% | 1.00% | 1.00% | 0.25% | 28% | 28% | 27% | 27% | 22% | 22% | 26% | 26% | 28% | 28% | 26% | 26% | 27% | 27% |
| 11123 | 9.00% | 0.25% | 9.00% | 1.00% | 0.25% | 27% | 27% | 29% | 29% | 23% | 23% | 28% | 28% | 29% | 29% | 27% | 27% | 29% | 29% |
| 11124 | 0.25% | 0.25% | 0.25% | 9.00% | 0.25% | 35% | 35% | 38% | 38% | 26% | 26% | 32% | 32% | 38% | 38% | 34% | 34% | 38% | 38% |
| 11125 | 0.25% | 9.00% | 0.25% | 9.00% | 0.25% | 34% | 34% | 39% | 39% | 29% | 29% | 34% | 34% | 38% | 38% | 35% | 35% | 41% | 41% |
| 11126 | 0.25% | 0.00% | 0.25% | 0.00% | 1.00% | 9% | 9% | 8% | 8% | 7% | 7% | 8% | 8% | 8% | 8% | 8% | 8% | 11% | 11% |
| 11127 | 1.00% | 9.00% | 0.25% | 0.00% | 1.00% | 13% | 13% | 13% | 13% | 13% | 13% | 17% | 17% | 13% | 13% | 13% | 13% | 19% | 19% |
| 11128 | 0.25% | 1.00% | 1.00% | 0.00% | 1.00% | 17% | 17% | 14% | 14% | 15% | 15% | 17% | 17% | 16% | 16% | 14% | 14% | 18% | 18% |
| 11129 | 0.25% | 0.25% | 9.00% | 0.00% | 1.00% | 16% | 16% | 16% | 16% | 16% | 16% | 19% | 19% | 17% | 17% | 15% | 15% | 20% | 20% |
| 11130 | 0.25% | 0.25% | 0.00% | 0.25% | 1.00% | 13% | 13% | 11% | 11% | 9% | 9% | 11% | 11% | 11% | 11% | 11% | 11% | 14% | 14% |
| 11131 | 0.25% | 9.00% | 0.25% | 0.25% | 1.00% | 18% | 18% | 18% | 18% | 17% | 17% | 19% | 19% | 16% | 16% | 18% | 18% | 24% | 24% |
| 11132 | 0.25% | 0.25% | 1.00% | 0.25% | 1.00% | 21% | 21% | 18% | 18% | 16% | 16% | 19% | 19% | 19% | 19% | 18% | 18% | 21% | 21% |
| 11133 | 9.00% | 1.00% | 1.00% | 0.25% | 1.00% | 22% | 22% | 19% | 19% | 18% | 18% | 21% | 21% | 20% | 20% | 19% | 19% | 23% | 23% |
| 11134 | 9.00% | 0.25% | 9.00% | 0.25% | 1.00% | 21% | 21% | 21% | 21% | 19% | 19% | 23% | 23% | 21% | 21% | 20% | 20% | 25% | 25% |
| 11135 | 1.00% | 0.25% | 0.00% | 1.00% | 1.00% | 19% | 19% | 18% | 18% | 12% | 12% | 18% | 18% | 19% | 19% | 17% | 17% | 19% | 19% |
| 11136 | 0.25% | 0.25% | 0.25% | 1.00% | 1.00% | 25% | 25% | 25% | 25% | 18% | 18% | 23% | 23% | 24% | 24% | 23% | 23% | 27% | 27% |
| 11137 | 1.00% | 0.00% | 1.00% | 1.00% | 1.00% | 22% | 22% | 20% | 20% | 15% | 15% | 20% | 20% | 22% | 22% | 20% | 20% | 20% | 20% |
| 11138 | 1.00% | 1.00% | 1.00% | 1.00% | 1.00% | 28% | 28% | 25% | 25% | 21% | 21% | 27% | 27% | 27% | 27% | 25% | 25% | 27% | 27% |
| 11139 | 1.00% | 0.25% | 9.00% | 1.00% | 1.00% | 27% | 27% | 27% | 27% | 22% | 22% | 29% | 29% | 28% | 28% | 26% | 26% | 29% | 29% |
| 11140 | 0.00% | 0.25% | 0.25% | 9.00% | 1.00% | 36% | 36% | 37% | 37% | 25% | 25% | 33% | 33% | 37% | 37% | 34% | 34% | 39% | 39% |

Fig. 40

| Formula # | gamma Butyrolactone | Hexyl Apritone | Undecyl Dihydrojasmolate | Para-menthane-3,8-diol | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11141 | 0.25% | 0.25% | 0.00% | 0.00% | 0.00% | 5% | 5% | 6% | 6% | 5% | 5% | 6% | 6% | 6% | 6% | 4% | 4% | 7% | 7% |
| 11142 | 0.25% | 0.00% | 0.25% | 0.00% | 0.00% | 6% | 6% | 7% | 7% | 6% | 6% | 6% | 6% | 6% | 6% | 6% | 6% | 8% | 8% |
| 11143 | 0.00% | 1.00% | 0.25% | 0.00% | 0.00% | 12% | 12% | 11% | 11% | 11% | 11% | 13% | 13% | 10% | 10% | 11% | 11% | 14% | 14% |
| 11144 | 1.00% | 0.00% | 1.00% | 0.00% | 0.00% | 8% | 8% | 7% | 7% | 7% | 7% | 9% | 9% | 9% | 9% | 7% | 7% | 7% | 7% |
| 11145 | 0.00% | 0.25% | 1.00% | 0.00% | 0.00% | 13% | 13% | 12% | 12% | 11% | 11% | 14% | 14% | 13% | 13% | 11% | 11% | 13% | 13% |
| 11146 | 9.00% | 1.00% | 1.00% | 0.00% | 0.00% | 15% | 15% | 14% | 14% | 14% | 14% | 16% | 16% | 15% | 15% | 13% | 13% | 16% | 16% |
| 11147 | 0.25% | 1.00% | 9.00% | 0.00% | 0.00% | 14% | 14% | 15% | 15% | 17% | 17% | 18% | 18% | 15% | 15% | 14% | 14% | 18% | 18% |
| 11148 | 1.00% | 1.00% | 0.00% | 0.25% | 0.00% | 11% | 11% | 14% | 14% | 12% | 12% | 18% | 18% | 13% | 13% | 10% | 10% | 14% | 14% |
| 11149 | 1.00% | 0.25% | 0.25% | 0.25% | 0.00% | 16% | 16% | 20% | 20% | 15% | 15% | 23% | 23% | 18% | 18% | 15% | 15% | 20% | 20% |
| 11150 | 9.00% | 9.00% | 0.25% | 0.25% | 0.00% | 16% | 16% | 23% | 23% | 19% | 19% | 25% | 25% | 19% | 19% | 17% | 17% | 25% | 25% |
| 11151 | 9.00% | 0.25% | 1.00% | 0.25% | 0.00% | 19% | 19% | 23% | 23% | 18% | 18% | 25% | 25% | 22% | 22% | 17% | 17% | 22% | 22% |
| 11152 | 0.25% | 9.00% | 1.00% | 0.25% | 0.00% | 17% | 17% | 23% | 23% | 21% | 21% | 26% | 26% | 21% | 21% | 17% | 17% | 24% | 24% |
| 11153 | 0.25% | 1.00% | 9.00% | 0.25% | 0.00% | 19% | 19% | 24% | 24% | 23% | 23% | 28% | 28% | 22% | 22% | 19% | 19% | 25% | 25% |
| 11154 | 0.25% | 1.00% | 0.00% | 1.00% | 0.00% | 26% | 26% | 27% | 27% | 25% | 25% | 27% | 27% | 28% | 28% | 25% | 25% | 27% | 27% |
| 11155 | 9.00% | 0.25% | 0.25% | 1.00% | 0.00% | 32% | 32% | 34% | 34% | 28% | 28% | 33% | 33% | 34% | 34% | 31% | 31% | 34% | 34% |
| 11156 | 1.00% | 9.00% | 0.25% | 1.00% | 0.00% | 30% | 30% | 33% | 33% | 30% | 30% | 35% | 35% | 33% | 33% | 31% | 31% | 35% | 35% |
| 11157 | 0.00% | 9.00% | 1.00% | 1.00% | 0.00% | 32% | 32% | 34% | 34% | 32% | 32% | 36% | 36% | 35% | 35% | 32% | 32% | 35% | 35% |
| 11158 | 0.25% | 1.00% | 9.00% | 1.00% | 0.00% | 34% | 34% | 36% | 36% | 35% | 35% | 38% | 38% | 37% | 37% | 34% | 34% | 37% | 37% |
| 11159 | 1.00% | 0.25% | 0.25% | 9.00% | 0.00% | 51% | 51% | 46% | 46% | 45% | 45% | 53% | 53% | 46% | 46% | 50% | 50% | 45% | 45% |
| 11160 | 0.25% | 0.00% | 1.00% | 9.00% | 0.00% | 48% | 48% | 43% | 43% | 44% | 44% | 48% | 48% | 44% | 44% | 47% | 47% | 40% | 40% |
| 11161 | 0.25% | 0.25% | 9.00% | 9.00% | 0.00% | 53% | 53% | 50% | 50% | 51% | 51% | 57% | 57% | 50% | 50% | 53% | 53% | 49% | 49% |
| 11162 | 0.25% | 0.00% | 1.00% | 0.00% | 0.25% | 10% | 10% | 9% | 9% | 9% | 9% | 9% | 9% | 11% | 11% | 9% | 9% | 9% | 9% |
| 11163 | 1.00% | 1.00% | 1.00% | 0.00% | 0.25% | 16% | 16% | 13% | 13% | 14% | 14% | 17% | 17% | 16% | 16% | 14% | 14% | 15% | 15% |
| 11164 | 1.00% | 0.25% | 9.00% | 0.00% | 0.25% | 15% | 15% | 15% | 15% | 15% | 15% | 19% | 19% | 17% | 17% | 15% | 15% | 17% | 17% |
| 11165 | 9.00% | 0.25% | 0.00% | 0.25% | 0.25% | 13% | 13% | 17% | 17% | 12% | 12% | 18% | 18% | 16% | 16% | 12% | 12% | 16% | 16% |
| 11166 | 1.00% | 9.00% | 0.25% | 0.25% | 0.25% | 17% | 17% | 22% | 22% | 19% | 19% | 26% | 26% | 20% | 20% | 18% | 18% | 24% | 24% |

Fig. 40

| Formula # | gamma Butyrolactone | Hexyl Apritone | Undecyl Dihydrojasmolate | Para-menthane-3,8-diol | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11167 | 1.00% | 0.25% | 1.00% | 0.25% | 0.25% | 20% | 20% | 22% | 22% | 18% | 18% | 26% | 26% | 23% | 23% | 18% | 18% | 21% | 21% |
| 11168 | 0.00% | 9.00% | 1.00% | 0.25% | 0.25% | 19% | 19% | 23% | 23% | 21% | 21% | 27% | 27% | 22% | 22% | 19% | 19% | 24% | 24% |
| 11169 | 0.00% | 1.00% | 0.00% | 1.00% | 0.25% | 28% | 28% | 27% | 27% | 25% | 25% | 28% | 28% | 29% | 29% | 27% | 27% | 27% | 27% |
| 11170 | 1.00% | 0.25% | 0.25% | 1.00% | 0.25% | 33% | 33% | 33% | 33% | 28% | 28% | 34% | 34% | 35% | 35% | 32% | 32% | 33% | 33% |
| 11171 | 0.25% | 9.00% | 0.25% | 1.00% | 0.25% | 32% | 32% | 35% | 35% | 32% | 32% | 35% | 35% | 35% | 35% | 33% | 33% | 37% | 37% |
| 11172 | 9.00% | 1.00% | 1.00% | 1.00% | 0.25% | 37% | 37% | 36% | 36% | 33% | 33% | 37% | 37% | 39% | 39% | 35% | 35% | 36% | 36% |
| 11173 | 9.00% | 0.25% | 9.00% | 1.00% | 0.25% | 36% | 36% | 38% | 38% | 34% | 34% | 39% | 39% | 40% | 40% | 36% | 36% | 38% | 38% |
| 11174 | 0.25% | 0.25% | 0.25% | 9.00% | 0.25% | 53% | 53% | 48% | 48% | 47% | 47% | 53% | 53% | 48% | 48% | 52% | 52% | 47% | 47% |
| 11175 | 0.25% | 9.00% | 0.25% | 9.00% | 0.25% | 52% | 52% | 49% | 49% | 50% | 50% | 55% | 55% | 48% | 48% | 53% | 53% | 50% | 50% |
| 11176 | 0.25% | 0.00% | 0.25% | 0.00% | 1.00% | 9% | 9% | 8% | 8% | 7% | 7% | 8% | 8% | 8% | 8% | 8% | 8% | 11% | 11% |
| 11177 | 1.00% | 9.00% | 0.25% | 0.00% | 1.00% | 13% | 13% | 13% | 13% | 13% | 13% | 17% | 17% | 13% | 13% | 13% | 13% | 19% | 19% |
| 11178 | 0.25% | 1.00% | 1.00% | 0.00% | 1.00% | 17% | 17% | 14% | 14% | 15% | 15% | 17% | 17% | 16% | 16% | 14% | 14% | 18% | 18% |
| 11179 | 0.25% | 0.25% | 9.00% | 0.00% | 1.00% | 16% | 16% | 16% | 16% | 16% | 16% | 19% | 19% | 17% | 17% | 15% | 15% | 20% | 20% |
| 11180 | 0.25% | 0.25% | 0.00% | 0.25% | 1.00% | 13% | 13% | 16% | 16% | 12% | 12% | 18% | 18% | 15% | 15% | 11% | 11% | 17% | 17% |
| 11181 | 0.25% | 9.00% | 0.25% | 0.25% | 1.00% | 18% | 18% | 23% | 23% | 20% | 20% | 26% | 26% | 20% | 20% | 18% | 18% | 27% | 27% |
| 11182 | 0.25% | 0.25% | 1.00% | 0.25% | 1.00% | 21% | 21% | 23% | 23% | 19% | 19% | 26% | 26% | 23% | 23% | 18% | 18% | 24% | 24% |
| 11183 | 9.00% | 1.00% | 1.00% | 0.25% | 1.00% | 23% | 23% | 24% | 24% | 21% | 21% | 28% | 28% | 24% | 24% | 20% | 20% | 26% | 26% |
| 11184 | 9.00% | 0.25% | 9.00% | 0.25% | 1.00% | 22% | 22% | 26% | 26% | 22% | 22% | 30% | 30% | 25% | 25% | 21% | 21% | 28% | 28% |
| 11185 | 1.00% | 0.25% | 0.00% | 1.00% | 1.00% | 28% | 28% | 27% | 27% | 23% | 23% | 29% | 29% | 30% | 30% | 26% | 26% | 28% | 28% |
| 11186 | 0.25% | 0.25% | 0.25% | 1.00% | 1.00% | 34% | 34% | 34% | 34% | 29% | 29% | 34% | 34% | 35% | 35% | 32% | 32% | 36% | 36% |
| 11187 | 1.00% | 0.00% | 1.00% | 1.00% | 1.00% | 31% | 31% | 29% | 29% | 26% | 26% | 31% | 31% | 33% | 33% | 29% | 29% | 29% | 29% |
| 11188 | 1.00% | 1.00% | 1.00% | 1.00% | 1.00% | 37% | 37% | 34% | 34% | 32% | 32% | 38% | 38% | 38% | 38% | 34% | 34% | 36% | 36% |
| 11189 | 1.00% | 0.25% | 9.00% | 1.00% | 1.00% | 36% | 36% | 36% | 36% | 33% | 33% | 40% | 40% | 39% | 39% | 35% | 35% | 38% | 38% |
| 11190 | 0.00% | 0.25% | 0.25% | 9.00% | 1.00% | 54% | 54% | 47% | 47% | 46% | 46% | 54% | 54% | 47% | 47% | 52% | 52% | 48% | 48% |

Fig. 41

| Formula # | gamma Butyrolactone | Hexyl Apritone | Undecyl Dihydrojasmolate | DEET | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11191 | 0.25% | 0.25% | 0.00% | 0.00% | 0.00% | 5% | 5% | 6% | 6% | 5% | 5% | 6% | 6% | 6% | 6% | 4% | 4% | 7% | 7% |
| 11192 | 0.25% | 0.00% | 0.25% | 0.00% | 0.00% | 6% | 6% | 7% | 7% | 6% | 6% | 6% | 6% | 6% | 6% | 6% | 6% | 8% | 8% |
| 11193 | 0.00% | 1.00% | 0.25% | 0.00% | 0.00% | 12% | 12% | 11% | 11% | 11% | 11% | 13% | 13% | 10% | 10% | 11% | 11% | 14% | 14% |
| 11194 | 1.00% | 0.00% | 1.00% | 0.00% | 0.00% | 8% | 8% | 7% | 7% | 7% | 7% | 9% | 9% | 9% | 9% | 7% | 7% | 7% | 7% |
| 11195 | 0.00% | 0.25% | 1.00% | 0.00% | 0.00% | 13% | 13% | 12% | 12% | 11% | 11% | 14% | 14% | 13% | 13% | 11% | 11% | 13% | 13% |
| 11196 | 9.00% | 1.00% | 1.00% | 0.00% | 0.00% | 15% | 15% | 14% | 14% | 14% | 14% | 16% | 16% | 15% | 15% | 13% | 13% | 16% | 16% |
| 11197 | 0.25% | 1.00% | 9.00% | 0.00% | 0.00% | 14% | 14% | 15% | 15% | 17% | 17% | 18% | 18% | 15% | 15% | 14% | 14% | 18% | 18% |
| 11198 | 1.00% | 1.00% | 0.00% | 0.25% | 0.00% | 13% | 13% | 10% | 10% | 11% | 11% | 18% | 18% | 12% | 12% | 12% | 12% | 15% | 15% |
| 11199 | 1.00% | 0.25% | 0.25% | 0.25% | 0.00% | 18% | 18% | 16% | 16% | 14% | 14% | 23% | 23% | 17% | 17% | 17% | 17% | 21% | 21% |
| 11200 | 9.00% | 9.00% | 0.25% | 0.25% | 0.00% | 18% | 18% | 19% | 19% | 18% | 18% | 25% | 25% | 18% | 18% | 19% | 19% | 26% | 26% |
| 11201 | 9.00% | 0.25% | 1.00% | 0.25% | 0.00% | 21% | 21% | 19% | 19% | 17% | 17% | 25% | 25% | 21% | 21% | 19% | 19% | 23% | 23% |
| 11202 | 0.25% | 9.00% | 1.00% | 0.25% | 0.00% | 19% | 19% | 19% | 19% | 20% | 20% | 26% | 26% | 20% | 20% | 19% | 19% | 25% | 25% |
| 11203 | 0.25% | 1.00% | 9.00% | 0.25% | 0.00% | 21% | 21% | 20% | 20% | 22% | 22% | 28% | 28% | 21% | 21% | 21% | 21% | 26% | 26% |
| 11204 | 0.25% | 1.00% | 0.00% | 1.00% | 0.00% | 21% | 21% | 18% | 18% | 19% | 19% | 24% | 24% | 21% | 21% | 20% | 20% | 24% | 24% |
| 11205 | 9.00% | 0.25% | 0.25% | 1.00% | 0.00% | 27% | 27% | 25% | 25% | 22% | 22% | 30% | 30% | 27% | 27% | 26% | 26% | 31% | 31% |
| 11206 | 1.00% | 9.00% | 0.25% | 1.00% | 0.00% | 25% | 25% | 24% | 24% | 24% | 24% | 32% | 32% | 26% | 26% | 26% | 26% | 32% | 32% |
| 11207 | 0.00% | 9.00% | 1.00% | 1.00% | 0.00% | 27% | 27% | 25% | 25% | 26% | 26% | 33% | 33% | 28% | 28% | 27% | 27% | 32% | 32% |
| 11208 | 0.25% | 1.00% | 9.00% | 1.00% | 0.00% | 29% | 29% | 27% | 27% | 29% | 29% | 35% | 35% | 30% | 30% | 29% | 29% | 34% | 34% |
| 11209 | 1.00% | 0.25% | 0.25% | 9.00% | 0.00% | 48% | 48% | 43% | 43% | 37% | 37% | 52% | 52% | 46% | 46% | 47% | 47% | 40% | 40% |
| 11210 | 0.25% | 0.00% | 1.00% | 9.00% | 0.00% | 45% | 45% | 40% | 40% | 36% | 36% | 47% | 47% | 44% | 44% | 44% | 44% | 35% | 35% |
| 11211 | 0.25% | 0.25% | 9.00% | 9.00% | 0.00% | 50% | 50% | 47% | 47% | 43% | 43% | 56% | 56% | 50% | 50% | 50% | 50% | 44% | 44% |
| 11212 | 0.25% | 0.00% | 1.00% | 0.00% | 0.25% | 10% | 10% | 9% | 9% | 9% | 9% | 9% | 9% | 11% | 11% | 9% | 9% | 9% | 9% |
| 11213 | 1.00% | 1.00% | 1.00% | 0.00% | 0.25% | 16% | 16% | 13% | 13% | 14% | 14% | 17% | 17% | 16% | 16% | 14% | 14% | 15% | 15% |
| 11214 | 1.00% | 0.25% | 9.00% | 0.00% | 0.25% | 15% | 15% | 15% | 15% | 15% | 15% | 19% | 19% | 17% | 17% | 15% | 15% | 17% | 17% |
| 11215 | 9.00% | 0.25% | 0.00% | 0.25% | 0.25% | 15% | 15% | 13% | 13% | 11% | 11% | 18% | 18% | 15% | 15% | 14% | 14% | 17% | 17% |
| 11216 | 1.00% | 9.00% | 0.25% | 0.25% | 0.25% | 19% | 19% | 18% | 18% | 18% | 18% | 26% | 26% | 19% | 19% | 20% | 20% | 25% | 25% |

Fig. 41

| Formula # | gamma Butyrolactone | Hexyl Apritone | Undecyl Dihydrojasmolate | DEET | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11217 | 1.00% | 0.25% | 1.00% | 0.25% | 0.25% | 22% | 22% | 18% | 18% | 17% | 17% | 26% | 26% | 22% | 22% | 20% | 20% | 22% | 22% |
| 11218 | 0.00% | 9.00% | 1.00% | 0.25% | 0.25% | 21% | 21% | 19% | 19% | 20% | 20% | 27% | 27% | 21% | 21% | 21% | 21% | 25% | 25% |
| 11219 | 0.00% | 1.00% | 0.00% | 1.00% | 0.25% | 23% | 23% | 18% | 18% | 19% | 19% | 25% | 25% | 22% | 22% | 22% | 22% | 24% | 24% |
| 11220 | 1.00% | 0.25% | 0.25% | 1.00% | 0.25% | 28% | 28% | 24% | 24% | 22% | 22% | 31% | 31% | 28% | 28% | 27% | 27% | 30% | 30% |
| 11221 | 0.25% | 9.00% | 0.25% | 1.00% | 0.25% | 27% | 27% | 26% | 26% | 26% | 26% | 32% | 32% | 28% | 28% | 28% | 28% | 34% | 34% |
| 11222 | 9.00% | 1.00% | 1.00% | 1.00% | 0.25% | 32% | 32% | 27% | 27% | 27% | 27% | 34% | 34% | 32% | 32% | 30% | 30% | 33% | 33% |
| 11223 | 9.00% | 0.25% | 9.00% | 1.00% | 0.25% | 31% | 31% | 29% | 29% | 28% | 28% | 36% | 36% | 33% | 33% | 31% | 31% | 35% | 35% |
| 11224 | 0.25% | 0.25% | 0.25% | 9.00% | 0.25% | 50% | 50% | 45% | 45% | 39% | 39% | 52% | 52% | 48% | 48% | 49% | 49% | 42% | 42% |
| 11225 | 0.25% | 9.00% | 0.25% | 9.00% | 0.25% | 49% | 49% | 46% | 46% | 42% | 42% | 54% | 54% | 48% | 48% | 50% | 50% | 45% | 45% |
| 11226 | 0.25% | 0.00% | 0.25% | 0.00% | 1.00% | 9% | 9% | 8% | 8% | 7% | 7% | 8% | 8% | 8% | 8% | 8% | 8% | 11% | 11% |
| 11227 | 1.00% | 9.00% | 0.25% | 0.00% | 1.00% | 13% | 13% | 13% | 13% | 13% | 13% | 17% | 17% | 13% | 13% | 13% | 13% | 19% | 19% |
| 11228 | 0.25% | 1.00% | 1.00% | 0.00% | 1.00% | 17% | 17% | 14% | 14% | 15% | 15% | 17% | 17% | 16% | 16% | 14% | 14% | 18% | 18% |
| 11229 | 0.25% | 0.25% | 9.00% | 0.00% | 1.00% | 16% | 16% | 16% | 16% | 16% | 16% | 19% | 19% | 17% | 17% | 15% | 15% | 20% | 20% |
| 11230 | 0.25% | 0.25% | 0.00% | 0.25% | 1.00% | 15% | 15% | 12% | 12% | 11% | 11% | 18% | 18% | 14% | 14% | 13% | 13% | 18% | 18% |
| 11231 | 0.25% | 9.00% | 0.25% | 0.25% | 1.00% | 20% | 20% | 19% | 19% | 19% | 19% | 26% | 26% | 19% | 19% | 20% | 20% | 28% | 28% |
| 11232 | 0.25% | 0.25% | 1.00% | 0.25% | 1.00% | 23% | 23% | 19% | 19% | 18% | 18% | 26% | 26% | 22% | 22% | 20% | 20% | 25% | 25% |
| 11233 | 9.00% | 1.00% | 1.00% | 0.25% | 1.00% | 25% | 25% | 20% | 20% | 20% | 20% | 28% | 28% | 23% | 23% | 22% | 22% | 27% | 27% |
| 11234 | 9.00% | 0.25% | 9.00% | 0.25% | 1.00% | 24% | 24% | 22% | 22% | 21% | 21% | 30% | 30% | 24% | 24% | 23% | 23% | 29% | 29% |
| 11235 | 1.00% | 0.25% | 0.00% | 1.00% | 1.00% | 23% | 23% | 18% | 18% | 17% | 17% | 26% | 26% | 23% | 23% | 21% | 21% | 25% | 25% |
| 11236 | 0.25% | 0.25% | 0.25% | 1.00% | 1.00% | 29% | 29% | 25% | 25% | 23% | 23% | 31% | 31% | 28% | 28% | 27% | 27% | 33% | 33% |
| 11237 | 1.00% | 0.00% | 1.00% | 1.00% | 1.00% | 26% | 26% | 20% | 20% | 20% | 20% | 28% | 28% | 26% | 26% | 24% | 24% | 26% | 26% |
| 11238 | 1.00% | 1.00% | 1.00% | 1.00% | 1.00% | 32% | 32% | 25% | 25% | 26% | 26% | 35% | 35% | 31% | 31% | 29% | 29% | 33% | 33% |
| 11239 | 1.00% | 0.25% | 9.00% | 1.00% | 1.00% | 31% | 31% | 27% | 27% | 27% | 27% | 37% | 37% | 32% | 32% | 30% | 30% | 35% | 35% |
| 11240 | 0.00% | 0.25% | 0.25% | 9.00% | 1.00% | 51% | 51% | 44% | 44% | 38% | 38% | 53% | 53% | 47% | 47% | 49% | 49% | 43% | 43% |

Fig. 42

| Formula # | gamma Butyrolactone | Hexyl Apritone | Undecyl Dihydrojasmolate | Propyl Dihydrojasmolate | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11241 | 0.25% | 0.25% | 0.00% | 0.00% | 0.00% | 5% | 5% | 6% | 6% | 5% | 5% | 6% | 6% | 6% | 6% | 4% | 4% | 7% | 7% |
| 11242 | 0.25% | 0.00% | 0.25% | 0.00% | 0.00% | 6% | 6% | 7% | 7% | 6% | 6% | 6% | 6% | 6% | 6% | 6% | 6% | 8% | 8% |
| 11243 | 0.00% | 1.00% | 0.25% | 0.00% | 0.00% | 12% | 12% | 11% | 11% | 11% | 11% | 13% | 13% | 10% | 10% | 11% | 11% | 14% | 14% |
| 11244 | 1.00% | 0.00% | 1.00% | 0.00% | 0.00% | 8% | 8% | 7% | 7% | 7% | 7% | 9% | 9% | 9% | 9% | 7% | 7% | 7% | 7% |
| 11245 | 0.00% | 0.25% | 1.00% | 0.00% | 0.00% | 13% | 13% | 12% | 12% | 11% | 11% | 14% | 14% | 13% | 13% | 11% | 11% | 13% | 13% |
| 11246 | 9.00% | 1.00% | 1.00% | 0.00% | 0.00% | 15% | 15% | 14% | 14% | 14% | 14% | 16% | 16% | 15% | 15% | 13% | 13% | 16% | 16% |
| 11247 | 0.25% | 1.00% | 9.00% | 0.00% | 0.00% | 14% | 14% | 15% | 15% | 17% | 17% | 18% | 18% | 15% | 15% | 14% | 14% | 18% | 18% |
| 11248 | 1.00% | 1.00% | 0.00% | 0.25% | 0.00% | 9% | 9% | 9% | 9% | 11% | 11% | 11% | 11% | 9% | 9% | 8% | 8% | 12% | 12% |
| 11249 | 1.00% | 0.25% | 0.25% | 0.25% | 0.00% | 14% | 14% | 15% | 15% | 14% | 14% | 16% | 16% | 14% | 14% | 13% | 13% | 18% | 18% |
| 11250 | 9.00% | 9.00% | 0.25% | 0.25% | 0.00% | 14% | 14% | 18% | 18% | 18% | 18% | 18% | 18% | 15% | 15% | 15% | 15% | 23% | 23% |
| 11251 | 9.00% | 0.25% | 1.00% | 0.25% | 0.00% | 17% | 17% | 18% | 18% | 17% | 17% | 18% | 18% | 18% | 18% | 15% | 15% | 20% | 20% |
| 11252 | 0.25% | 9.00% | 1.00% | 0.25% | 0.00% | 15% | 15% | 18% | 18% | 20% | 20% | 19% | 19% | 17% | 17% | 15% | 15% | 22% | 22% |
| 11253 | 0.25% | 1.00% | 9.00% | 0.25% | 0.00% | 17% | 17% | 19% | 19% | 22% | 22% | 21% | 21% | 18% | 18% | 17% | 17% | 23% | 23% |
| 11254 | 0.25% | 1.00% | 0.00% | 1.00% | 0.00% | 12% | 12% | 13% | 13% | 16% | 16% | 14% | 14% | 15% | 15% | 11% | 11% | 16% | 16% |
| 11255 | 9.00% | 0.25% | 0.25% | 1.00% | 0.00% | 18% | 18% | 20% | 20% | 19% | 19% | 20% | 20% | 21% | 21% | 17% | 17% | 23% | 23% |
| 11256 | 1.00% | 9.00% | 0.25% | 1.00% | 0.00% | 16% | 16% | 19% | 19% | 21% | 21% | 22% | 22% | 20% | 20% | 17% | 17% | 24% | 24% |
| 11257 | 0.00% | 9.00% | 1.00% | 1.00% | 0.00% | 18% | 18% | 20% | 20% | 23% | 23% | 23% | 23% | 22% | 22% | 18% | 18% | 24% | 24% |
| 11258 | 0.25% | 1.00% | 9.00% | 1.00% | 0.00% | 20% | 20% | 22% | 22% | 26% | 26% | 25% | 25% | 24% | 24% | 20% | 20% | 26% | 26% |
| 11259 | 1.00% | 0.25% | 0.25% | 9.00% | 0.00% | 21% | 21% | 22% | 22% | 22% | 22% | 23% | 23% | 26% | 26% | 20% | 20% | 25% | 25% |
| 11260 | 0.25% | 0.00% | 1.00% | 9.00% | 0.00% | 18% | 18% | 19% | 19% | 21% | 21% | 18% | 18% | 24% | 24% | 17% | 17% | 20% | 20% |
| 11261 | 0.25% | 0.25% | 9.00% | 9.00% | 0.00% | 23% | 23% | 26% | 26% | 28% | 28% | 27% | 27% | 30% | 30% | 23% | 23% | 29% | 29% |
| 11262 | 0.25% | 0.00% | 1.00% | 0.00% | 0.25% | 10% | 10% | 9% | 9% | 9% | 9% | 9% | 9% | 11% | 11% | 9% | 9% | 9% | 9% |
| 11263 | 1.00% | 1.00% | 1.00% | 0.00% | 0.25% | 16% | 16% | 13% | 13% | 14% | 14% | 17% | 17% | 16% | 16% | 14% | 14% | 15% | 15% |
| 11264 | 1.00% | 0.25% | 9.00% | 0.00% | 0.25% | 15% | 15% | 15% | 15% | 15% | 15% | 19% | 19% | 17% | 17% | 15% | 15% | 17% | 17% |
| 11265 | 9.00% | 0.25% | 0.00% | 0.25% | 0.25% | 11% | 11% | 12% | 12% | 11% | 11% | 11% | 11% | 12% | 12% | 10% | 10% | 14% | 14% |
| 11266 | 1.00% | 9.00% | 0.25% | 0.25% | 0.25% | 15% | 15% | 17% | 17% | 18% | 18% | 19% | 19% | 16% | 16% | 16% | 16% | 22% | 22% |

Fig. 42

| Formula # | gamma Butyrolactone | Hexyl Apritone | Undecyl Dihydrojasmolate | Propyl Dihydrojasmolate | Acetic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11267 | 1.00% | 0.25% | 1.00% | 0.25% | 0.25% | 18% | 18% | 17% | 17% | 17% | 17% | 19% | 19% | 19% | 19% | 16% | 16% | 19% | 19% |
| 11268 | 0.00% | 9.00% | 1.00% | 0.25% | 0.25% | 17% | 17% | 18% | 18% | 20% | 20% | 20% | 20% | 18% | 18% | 17% | 17% | 22% | 22% |
| 11269 | 0.00% | 1.00% | 0.00% | 1.00% | 0.25% | 14% | 14% | 13% | 13% | 16% | 16% | 15% | 15% | 16% | 16% | 13% | 13% | 16% | 16% |
| 11270 | 1.00% | 0.25% | 0.25% | 1.00% | 0.25% | 19% | 19% | 19% | 19% | 19% | 19% | 21% | 21% | 22% | 22% | 18% | 18% | 22% | 22% |
| 11271 | 0.25% | 9.00% | 0.25% | 1.00% | 0.25% | 18% | 18% | 21% | 21% | 23% | 23% | 22% | 22% | 22% | 22% | 19% | 19% | 26% | 26% |
| 11272 | 9.00% | 1.00% | 1.00% | 1.00% | 0.25% | 23% | 23% | 22% | 22% | 24% | 24% | 24% | 24% | 26% | 26% | 21% | 21% | 25% | 25% |
| 11273 | 9.00% | 0.25% | 9.00% | 1.00% | 0.25% | 22% | 22% | 24% | 24% | 25% | 25% | 26% | 26% | 27% | 27% | 22% | 22% | 27% | 27% |
| 11274 | 0.25% | 0.25% | 0.25% | 9.00% | 0.25% | 23% | 23% | 24% | 24% | 24% | 24% | 23% | 23% | 28% | 28% | 22% | 22% | 27% | 27% |
| 11275 | 0.25% | 9.00% | 0.25% | 9.00% | 0.25% | 22% | 22% | 25% | 25% | 27% | 27% | 25% | 25% | 28% | 28% | 23% | 23% | 30% | 30% |
| 11276 | 0.25% | 0.00% | 0.25% | 0.00% | 1.00% | 9% | 9% | 8% | 8% | 7% | 7% | 8% | 8% | 8% | 8% | 8% | 8% | 11% | 11% |
| 11277 | 1.00% | 9.00% | 0.25% | 0.00% | 1.00% | 13% | 13% | 13% | 13% | 13% | 13% | 17% | 17% | 13% | 13% | 13% | 13% | 19% | 19% |
| 11278 | 0.25% | 1.00% | 1.00% | 0.00% | 1.00% | 17% | 17% | 14% | 14% | 15% | 15% | 17% | 17% | 16% | 16% | 14% | 14% | 18% | 18% |
| 11279 | 0.25% | 0.25% | 9.00% | 0.00% | 1.00% | 16% | 16% | 16% | 16% | 16% | 16% | 19% | 19% | 17% | 17% | 15% | 15% | 20% | 20% |
| 11280 | 0.25% | 0.25% | 0.00% | 0.25% | 1.00% | 11% | 11% | 11% | 11% | 11% | 11% | 11% | 11% | 11% | 11% | 9% | 9% | 15% | 15% |
| 11281 | 0.25% | 9.00% | 0.25% | 0.25% | 1.00% | 16% | 16% | 18% | 18% | 19% | 19% | 19% | 19% | 16% | 16% | 16% | 16% | 25% | 25% |
| 11282 | 0.25% | 0.25% | 1.00% | 0.25% | 1.00% | 19% | 19% | 18% | 18% | 18% | 18% | 19% | 19% | 19% | 19% | 16% | 16% | 22% | 22% |
| 11283 | 9.00% | 1.00% | 1.00% | 0.25% | 1.00% | 21% | 21% | 19% | 19% | 20% | 20% | 21% | 21% | 20% | 20% | 18% | 18% | 24% | 24% |
| 11284 | 9.00% | 0.25% | 9.00% | 0.25% | 1.00% | 20% | 20% | 21% | 21% | 21% | 21% | 23% | 23% | 21% | 21% | 19% | 19% | 26% | 26% |
| 11285 | 1.00% | 0.25% | 0.00% | 1.00% | 1.00% | 14% | 14% | 13% | 13% | 14% | 14% | 16% | 16% | 17% | 17% | 12% | 12% | 17% | 17% |
| 11286 | 0.25% | 0.25% | 0.25% | 1.00% | 1.00% | 20% | 20% | 20% | 20% | 20% | 20% | 21% | 21% | 22% | 22% | 18% | 18% | 25% | 25% |
| 11287 | 1.00% | 0.00% | 1.00% | 1.00% | 1.00% | 17% | 17% | 15% | 15% | 17% | 17% | 18% | 18% | 20% | 20% | 15% | 15% | 18% | 18% |
| 11288 | 1.00% | 1.00% | 1.00% | 1.00% | 1.00% | 23% | 23% | 20% | 20% | 23% | 23% | 25% | 25% | 25% | 25% | 20% | 20% | 25% | 25% |
| 11289 | 1.00% | 0.25% | 9.00% | 1.00% | 1.00% | 22% | 22% | 22% | 22% | 24% | 24% | 27% | 27% | 26% | 26% | 21% | 21% | 27% | 27% |
| 11290 | 0.00% | 0.25% | 0.25% | 9.00% | 1.00% | 24% | 24% | 23% | 23% | 23% | 23% | 24% | 24% | 27% | 27% | 22% | 22% | 28% | 28% |

Fig. 43

| Formula # | delta valerolactone | Hexyl Apritone | Undecyl Dihydrojasmonate | Methyl Dihydrojasmolate | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11291 | 0.25% | 0.25% | 0.00% | 0.00% | 0.00% | 5% | 5% | 5% | 5% | 4% | 4% | 6% | 6% | 5% | 5% | 4% | 4% | 6% | 6% |
| 11292 | 0.25% | 0.00% | 0.25% | 0.00% | 0.00% | 3% | 3% | 5% | 5% | 4% | 4% | 4% | 4% | 2% | 2% | 4% | 4% | 4% | 4% |
| 11293 | 0.00% | 1.00% | 0.25% | 0.00% | 0.00% | 9% | 9% | 10% | 10% | 10% | 10% | 11% | 11% | 7% | 7% | 9% | 9% | 11% | 11% |
| 11294 | 1.00% | 0.00% | 1.00% | 0.00% | 0.00% | 7% | 7% | 5% | 5% | 5% | 5% | 5% | 5% | 6% | 6% | 4% | 4% | 6% | 6% |
| 11295 | 0.00% | 0.25% | 1.00% | 0.00% | 0.00% | 11% | 11% | 9% | 9% | 9% | 9% | 10% | 10% | 10% | 10% | 8% | 8% | 11% | 11% |
| 11296 | 9.00% | 1.00% | 1.00% | 0.00% | 0.00% | 14% | 14% | 10% | 10% | 13% | 13% | 12% | 12% | 11% | 11% | 10% | 10% | 13% | 13% |
| 11297 | 0.25% | 1.00% | 9.00% | 0.00% | 0.00% | 11% | 11% | 11% | 11% | 11% | 11% | 12% | 12% | 11% | 11% | 11% | 11% | 13% | 13% |
| 11298 | 1.00% | 1.00% | 0.00% | 0.25% | 0.00% | 12% | 12% | 10% | 10% | 13% | 13% | 15% | 15% | 13% | 13% | 10% | 10% | 14% | 14% |
| 11299 | 1.00% | 0.25% | 0.25% | 0.25% | 0.00% | 14% | 14% | 15% | 15% | 15% | 15% | 18% | 18% | 15% | 15% | 13% | 13% | 17% | 17% |
| 11300 | 9.00% | 9.00% | 0.25% | 0.25% | 0.00% | 14% | 14% | 16% | 16% | 20% | 20% | 20% | 20% | 15% | 15% | 15% | 15% | 20% | 20% |
| 11301 | 9.00% | 0.25% | 1.00% | 0.25% | 0.00% | 18% | 18% | 14% | 14% | 18% | 18% | 18% | 18% | 18% | 18% | 14% | 14% | 18% | 18% |
| 11302 | 0.25% | 9.00% | 1.00% | 0.25% | 0.00% | 15% | 15% | 14% | 14% | 19% | 19% | 19% | 19% | 17% | 17% | 14% | 14% | 20% | 20% |
| 11303 | 0.25% | 1.00% | 9.00% | 0.25% | 0.00% | 16% | 16% | 15% | 15% | 18% | 18% | 19% | 19% | 18% | 18% | 16% | 16% | 19% | 19% |
| 11304 | 0.25% | 1.00% | 0.00% | 1.00% | 0.00% | 16% | 16% | 16% | 16% | 18% | 18% | 16% | 16% | 17% | 17% | 15% | 15% | 18% | 18% |
| 11305 | 9.00% | 0.25% | 0.25% | 1.00% | 0.00% | 20% | 20% | 22% | 22% | 22% | 22% | 20% | 20% | 20% | 20% | 19% | 19% | 22% | 22% |
| 11306 | 1.00% | 9.00% | 0.25% | 1.00% | 0.00% | 18% | 18% | 23% | 23% | 23% | 23% | 22% | 22% | 20% | 20% | 19% | 19% | 25% | 25% |
| 11307 | 0.00% | 9.00% | 1.00% | 1.00% | 0.00% | 20% | 20% | 21% | 21% | 24% | 24% | 21% | 21% | 22% | 22% | 19% | 19% | 25% | 25% |
| 11308 | 0.25% | 1.00% | 9.00% | 1.00% | 0.00% | 21% | 21% | 22% | 22% | 23% | 23% | 21% | 21% | 23% | 23% | 21% | 21% | 24% | 24% |
| 11309 | 1.00% | 0.25% | 0.25% | 9.00% | 0.00% | 29% | 29% | 30% | 30% | 34% | 34% | 27% | 27% | 34% | 34% | 28% | 28% | 32% | 32% |
| 11310 | 0.25% | 0.00% | 1.00% | 9.00% | 0.00% | 26% | 26% | 23% | 23% | 31% | 31% | 20% | 20% | 31% | 31% | 24% | 24% | 26% | 26% |
| 11311 | 0.25% | 0.25% | 9.00% | 9.00% | 0.00% | 30% | 30% | 30% | 30% | 35% | 35% | 27% | 27% | 37% | 37% | 30% | 30% | 33% | 33% |
| 11312 | 0.25% | 0.00% | 1.00% | 0.00% | 0.25% | 6% | 6% | 4% | 4% | 6% | 6% | 4% | 4% | 6% | 6% | 4% | 4% | 6% | 6% |
| 11313 | 1.00% | 1.00% | 1.00% | 0.00% | 0.25% | 13% | 13% | 10% | 10% | 12% | 12% | 12% | 12% | 12% | 12% | 9% | 9% | 14% | 14% |
| 11314 | 1.00% | 0.25% | 9.00% | 0.00% | 0.25% | 11% | 11% | 12% | 12% | 10% | 10% | 12% | 12% | 13% | 13% | 10% | 10% | 14% | 14% |
| 11315 | 9.00% | 0.25% | 0.00% | 0.25% | 0.25% | 12% | 12% | 10% | 10% | 14% | 14% | 14% | 14% | 14% | 14% | 10% | 10% | 14% | 14% |
| 11316 | 1.00% | 9.00% | 0.25% | 0.25% | 0.25% | 13% | 13% | 16% | 16% | 19% | 19% | 20% | 20% | 16% | 16% | 14% | 14% | 21% | 21% |

Fig. 43

| Formula # | delta valerolactone | Hexyl Apritone | Undecyl Dihydrojasmonate | Methyl Dihydrojasmolate | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11317 | 1.00% | 0.25% | 1.00% | 0.25% | 0.25% | 17% | 17% | 14% | 14% | 17% | 17% | 18% | 18% | 19% | 19% | 13% | 13% | 19% | 19% |
| 11318 | 0.00% | 9.00% | 1.00% | 0.25% | 0.25% | 15% | 15% | 14% | 14% | 20% | 20% | 19% | 19% | 18% | 18% | 14% | 14% | 21% | 21% |
| 11319 | 0.00% | 1.00% | 0.00% | 1.00% | 0.25% | 16% | 16% | 16% | 16% | 19% | 19% | 16% | 16% | 18% | 18% | 15% | 15% | 19% | 19% |
| 11320 | 1.00% | 0.25% | 0.25% | 1.00% | 0.25% | 19% | 19% | 22% | 22% | 21% | 21% | 20% | 20% | 21% | 21% | 18% | 18% | 23% | 23% |
| 11321 | 0.25% | 9.00% | 0.25% | 1.00% | 0.25% | 17% | 17% | 22% | 22% | 24% | 24% | 21% | 21% | 20% | 20% | 19% | 19% | 25% | 25% |
| 11322 | 9.00% | 1.00% | 1.00% | 1.00% | 0.25% | 24% | 24% | 21% | 21% | 26% | 26% | 21% | 21% | 24% | 24% | 20% | 20% | 25% | 25% |
| 11323 | 9.00% | 0.25% | 9.00% | 1.00% | 0.25% | 22% | 22% | 23% | 23% | 24% | 24% | 21% | 21% | 25% | 25% | 21% | 21% | 25% | 25% |
| 11324 | 0.25% | 0.25% | 0.25% | 9.00% | 0.25% | 28% | 28% | 29% | 29% | 35% | 35% | 26% | 26% | 34% | 34% | 28% | 28% | 32% | 32% |
| 11325 | 0.25% | 9.00% | 0.25% | 9.00% | 0.25% | 27% | 27% | 30% | 30% | 38% | 38% | 28% | 28% | 34% | 34% | 29% | 29% | 35% | 35% |
| 11326 | 0.25% | 0.00% | 0.25% | 0.00% | 1.00% | 3% | 3% | 6% | 6% | 5% | 5% | 4% | 4% | 2% | 2% | 4% | 4% | 4% | 4% |
| 11327 | 1.00% | 9.00% | 0.25% | 0.00% | 1.00% | 8% | 8% | 13% | 13% | 12% | 12% | 13% | 13% | 8% | 8% | 9% | 9% | 14% | 14% |
| 11328 | 0.25% | 1.00% | 1.00% | 0.00% | 1.00% | 12% | 12% | 10% | 10% | 12% | 12% | 11% | 11% | 10% | 10% | 9% | 9% | 12% | 12% |
| 11329 | 0.25% | 0.25% | 9.00% | 0.00% | 1.00% | 10% | 10% | 12% | 12% | 10% | 10% | 11% | 11% | 11% | 11% | 10% | 10% | 12% | 12% |
| 11330 | 0.25% | 0.25% | 0.00% | 0.25% | 1.00% | 10% | 10% | 10% | 10% | 12% | 12% | 13% | 13% | 12% | 12% | 9% | 9% | 12% | 12% |
| 11331 | 0.25% | 9.00% | 0.25% | 0.25% | 1.00% | 12% | 12% | 16% | 16% | 19% | 19% | 19% | 19% | 14% | 14% | 14% | 14% | 19% | 19% |
| 11332 | 0.25% | 0.25% | 1.00% | 0.25% | 1.00% | 16% | 16% | 14% | 14% | 17% | 17% | 17% | 17% | 17% | 17% | 13% | 13% | 17% | 17% |
| 11333 | 9.00% | 1.00% | 1.00% | 0.25% | 1.00% | 19% | 19% | 15% | 15% | 21% | 21% | 19% | 19% | 18% | 18% | 15% | 15% | 19% | 19% |
| 11334 | 9.00% | 0.25% | 9.00% | 0.25% | 1.00% | 17% | 17% | 17% | 17% | 19% | 19% | 19% | 19% | 19% | 19% | 16% | 16% | 19% | 19% |
| 11335 | 1.00% | 0.25% | 0.00% | 1.00% | 1.00% | 16% | 16% | 18% | 18% | 17% | 17% | 16% | 16% | 18% | 18% | 14% | 14% | 18% | 18% |
| 11336 | 0.25% | 0.25% | 0.25% | 1.00% | 1.00% | 18% | 18% | 22% | 22% | 21% | 21% | 19% | 19% | 19% | 19% | 18% | 18% | 21% | 21% |
| 11337 | 1.00% | 0.00% | 1.00% | 1.00% | 1.00% | 17% | 17% | 17% | 17% | 18% | 18% | 14% | 14% | 18% | 18% | 14% | 14% | 17% | 17% |
| 11338 | 1.00% | 1.00% | 1.00% | 1.00% | 1.00% | 23% | 23% | 22% | 22% | 24% | 24% | 21% | 21% | 23% | 23% | 19% | 19% | 24% | 24% |
| 11339 | 1.00% | 0.25% | 9.00% | 1.00% | 1.00% | 21% | 21% | 24% | 24% | 22% | 22% | 21% | 21% | 24% | 24% | 20% | 20% | 24% | 24% |
| 11340 | 0.00% | 0.25% | 0.25% | 9.00% | 1.00% | 28% | 28% | 30% | 30% | 35% | 35% | 26% | 26% | 33% | 33% | 28% | 28% | 31% | 31% |

Fig. 44

| Formula # | delta valerolactone | Hexyl Apritone | Undecyl Dihydrojasmonate | Propyl Dihydrojasmonate | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11341 | 0.25% | 0.25% | 0.00% | 0.00% | 0.00% | 5% | 5% | 5% | 5% | 4% | 4% | 6% | 6% | 5% | 5% | 4% | 4% | 6% | 6% |
| 11342 | 0.25% | 0.00% | 0.25% | 0.00% | 0.00% | 3% | 3% | 5% | 5% | 4% | 4% | 4% | 4% | 2% | 2% | 4% | 4% | 4% | 4% |
| 11343 | 0.00% | 1.00% | 0.25% | 0.00% | 0.00% | 9% | 9% | 10% | 10% | 10% | 10% | 11% | 11% | 7% | 7% | 9% | 9% | 11% | 11% |
| 11344 | 1.00% | 0.00% | 1.00% | 0.00% | 0.00% | 7% | 7% | 5% | 5% | 5% | 5% | 5% | 5% | 6% | 6% | 4% | 4% | 6% | 6% |
| 11345 | 0.00% | 0.25% | 1.00% | 0.00% | 0.00% | 11% | 11% | 9% | 9% | 9% | 9% | 10% | 10% | 10% | 10% | 8% | 8% | 11% | 11% |
| 11346 | 9.00% | 1.00% | 1.00% | 0.00% | 0.00% | 14% | 14% | 10% | 10% | 13% | 13% | 12% | 12% | 11% | 11% | 10% | 10% | 13% | 13% |
| 11347 | 0.25% | 1.00% | 9.00% | 0.00% | 0.00% | 11% | 11% | 11% | 11% | 11% | 11% | 12% | 12% | 11% | 11% | 11% | 11% | 13% | 13% |
| 11348 | 1.00% | 1.00% | 0.00% | 0.25% | 0.00% | 11% | 11% | 11% | 11% | 10% | 10% | 13% | 13% | 10% | 10% | 9% | 9% | 13% | 13% |
| 11349 | 1.00% | 0.25% | 0.25% | 0.25% | 0.00% | 13% | 13% | 16% | 16% | 12% | 12% | 16% | 16% | 12% | 12% | 12% | 12% | 16% | 16% |
| 11350 | 9.00% | 9.00% | 0.25% | 0.25% | 0.00% | 13% | 13% | 17% | 17% | 17% | 17% | 18% | 18% | 12% | 12% | 14% | 14% | 19% | 19% |
| 11351 | 9.00% | 0.25% | 1.00% | 0.25% | 0.00% | 17% | 17% | 15% | 15% | 15% | 15% | 16% | 16% | 15% | 15% | 13% | 13% | 17% | 17% |
| 11352 | 0.25% | 9.00% | 1.00% | 0.25% | 0.00% | 14% | 14% | 15% | 15% | 16% | 16% | 17% | 17% | 14% | 14% | 13% | 13% | 19% | 19% |
| 11353 | 0.25% | 1.00% | 9.00% | 0.25% | 0.00% | 15% | 15% | 16% | 16% | 15% | 15% | 17% | 17% | 15% | 15% | 15% | 15% | 18% | 18% |
| 11354 | 0.25% | 1.00% | 0.00% | 1.00% | 0.00% | 13% | 13% | 13% | 13% | 14% | 14% | 15% | 15% | 12% | 12% | 12% | 12% | 16% | 16% |
| 11355 | 9.00% | 0.25% | 0.25% | 1.00% | 0.00% | 17% | 17% | 19% | 19% | 18% | 18% | 19% | 19% | 15% | 15% | 16% | 16% | 20% | 20% |
| 11356 | 1.00% | 9.00% | 0.25% | 1.00% | 0.00% | 15% | 15% | 20% | 20% | 19% | 19% | 21% | 21% | 15% | 15% | 16% | 16% | 23% | 23% |
| 11357 | 0.00% | 9.00% | 1.00% | 1.00% | 0.00% | 17% | 17% | 18% | 18% | 20% | 20% | 20% | 20% | 17% | 17% | 16% | 16% | 23% | 23% |
| 11358 | 0.25% | 1.00% | 9.00% | 1.00% | 0.00% | 18% | 18% | 19% | 19% | 19% | 19% | 20% | 20% | 18% | 18% | 18% | 18% | 22% | 22% |
| 11359 | 1.00% | 0.25% | 0.25% | 9.00% | 0.00% | 24% | 24% | 27% | 27% | 22% | 22% | 26% | 26% | 22% | 22% | 23% | 23% | 26% | 26% |
| 11360 | 0.25% | 0.00% | 1.00% | 9.00% | 0.00% | 21% | 21% | 20% | 20% | 19% | 19% | 19% | 19% | 19% | 19% | 19% | 19% | 20% | 20% |
| 11361 | 0.25% | 0.25% | 9.00% | 9.00% | 0.00% | 25% | 25% | 27% | 27% | 23% | 23% | 26% | 26% | 25% | 25% | 25% | 25% | 27% | 27% |
| 11362 | 0.25% | 0.00% | 1.00% | 0.00% | 0.25% | 6% | 6% | 4% | 4% | 6% | 6% | 4% | 4% | 6% | 6% | 4% | 4% | 6% | 6% |
| 11363 | 1.00% | 1.00% | 1.00% | 0.00% | 0.25% | 13% | 13% | 10% | 10% | 12% | 12% | 12% | 12% | 12% | 12% | 9% | 9% | 14% | 14% |
| 11364 | 1.00% | 0.25% | 9.00% | 0.00% | 0.25% | 11% | 11% | 12% | 12% | 10% | 10% | 12% | 12% | 13% | 13% | 10% | 10% | 14% | 14% |
| 11365 | 9.00% | 0.25% | 0.00% | 0.25% | 0.25% | 11% | 11% | 11% | 11% | 11% | 11% | 12% | 12% | 11% | 11% | 9% | 9% | 13% | 13% |
| 11366 | 1.00% | 9.00% | 0.25% | 0.25% | 0.25% | 12% | 12% | 17% | 17% | 16% | 16% | 18% | 18% | 13% | 13% | 13% | 13% | 20% | 20% |

Fig. 44

| Formula # | delta valerolactone | Hexyl Apritone | Undecyl Dihydrojasmonate | Propyl Dihydrojasmonate | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11367 | 1.00% | 0.25% | 1.00% | 0.25% | 0.25% | 16% | 16% | 15% | 15% | 14% | 14% | 16% | 16% | 16% | 16% | 12% | 12% | 18% | 18% |
| 11368 | 0.00% | 9.00% | 1.00% | 0.25% | 0.25% | 14% | 14% | 15% | 15% | 17% | 17% | 17% | 17% | 15% | 15% | 13% | 13% | 20% | 20% |
| 11369 | 0.00% | 1.00% | 0.00% | 1.00% | 0.25% | 13% | 13% | 13% | 13% | 15% | 15% | 15% | 15% | 13% | 13% | 12% | 12% | 17% | 17% |
| 11370 | 1.00% | 0.25% | 0.25% | 1.00% | 0.25% | 16% | 16% | 19% | 19% | 17% | 17% | 19% | 19% | 16% | 16% | 15% | 15% | 21% | 21% |
| 11371 | 0.25% | 9.00% | 0.25% | 1.00% | 0.25% | 14% | 14% | 19% | 19% | 20% | 20% | 20% | 20% | 15% | 15% | 16% | 16% | 23% | 23% |
| 11372 | 9.00% | 1.00% | 1.00% | 1.00% | 0.25% | 21% | 21% | 18% | 18% | 22% | 22% | 20% | 20% | 19% | 19% | 17% | 17% | 23% | 23% |
| 11373 | 9.00% | 0.25% | 9.00% | 1.00% | 0.25% | 19% | 19% | 20% | 20% | 20% | 20% | 20% | 20% | 20% | 20% | 18% | 18% | 23% | 23% |
| 11374 | 0.25% | 0.25% | 0.25% | 9.00% | 0.25% | 23% | 23% | 26% | 26% | 23% | 23% | 25% | 25% | 22% | 22% | 23% | 23% | 26% | 26% |
| 11375 | 0.25% | 9.00% | 0.25% | 9.00% | 0.25% | 22% | 22% | 27% | 27% | 26% | 26% | 27% | 27% | 22% | 22% | 24% | 24% | 29% | 29% |
| 11376 | 0.25% | 0.00% | 0.25% | 0.00% | 1.00% | 3% | 3% | 6% | 6% | 5% | 5% | 4% | 4% | 2% | 2% | 4% | 4% | 4% | 4% |
| 11377 | 1.00% | 9.00% | 0.25% | 0.00% | 1.00% | 8% | 8% | 13% | 13% | 12% | 12% | 13% | 13% | 8% | 8% | 9% | 9% | 14% | 14% |
| 11378 | 0.25% | 1.00% | 1.00% | 0.00% | 1.00% | 12% | 12% | 10% | 10% | 12% | 12% | 11% | 11% | 10% | 10% | 9% | 9% | 12% | 12% |
| 11379 | 0.25% | 0.25% | 9.00% | 0.00% | 1.00% | 10% | 10% | 12% | 12% | 10% | 10% | 11% | 11% | 11% | 11% | 10% | 10% | 12% | 12% |
| 11380 | 0.25% | 0.25% | 0.00% | 0.25% | 1.00% | 9% | 9% | 11% | 11% | 9% | 9% | 11% | 11% | 9% | 9% | 8% | 8% | 11% | 11% |
| 11381 | 0.25% | 9.00% | 0.25% | 0.25% | 1.00% | 11% | 11% | 17% | 17% | 16% | 16% | 17% | 17% | 11% | 11% | 13% | 13% | 18% | 18% |
| 11382 | 0.25% | 0.25% | 1.00% | 0.25% | 1.00% | 15% | 15% | 15% | 15% | 14% | 14% | 15% | 15% | 14% | 14% | 12% | 12% | 16% | 16% |
| 11383 | 9.00% | 1.00% | 1.00% | 0.25% | 1.00% | 18% | 18% | 16% | 16% | 18% | 18% | 17% | 17% | 15% | 15% | 14% | 14% | 18% | 18% |
| 11384 | 9.00% | 0.25% | 9.00% | 0.25% | 1.00% | 16% | 16% | 18% | 18% | 16% | 16% | 17% | 17% | 16% | 16% | 15% | 15% | 18% | 18% |
| 11385 | 1.00% | 0.25% | 0.00% | 1.00% | 1.00% | 13% | 13% | 15% | 15% | 13% | 13% | 15% | 15% | 13% | 13% | 11% | 11% | 16% | 16% |
| 11386 | 0.25% | 0.25% | 0.25% | 1.00% | 1.00% | 15% | 15% | 19% | 19% | 17% | 17% | 18% | 18% | 14% | 14% | 15% | 15% | 19% | 19% |
| 11387 | 1.00% | 0.00% | 1.00% | 1.00% | 1.00% | 14% | 14% | 14% | 14% | 14% | 14% | 13% | 13% | 13% | 13% | 11% | 11% | 15% | 15% |
| 11388 | 1.00% | 1.00% | 1.00% | 1.00% | 1.00% | 20% | 20% | 19% | 19% | 20% | 20% | 20% | 20% | 18% | 18% | 16% | 16% | 22% | 22% |
| 11389 | 1.00% | 0.25% | 9.00% | 1.00% | 1.00% | 18% | 18% | 21% | 21% | 18% | 18% | 20% | 20% | 19% | 19% | 17% | 17% | 22% | 22% |
| 11390 | 0.00% | 0.25% | 0.25% | 9.00% | 1.00% | 23% | 23% | 27% | 27% | 23% | 23% | 25% | 25% | 21% | 21% | 23% | 23% | 25% | 25% |

Fig. 45

| Formula # | delta valerolactone | Hexyl Apritone | Undecyl Dihydrojasmonate | Picaridin | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11391 | 0.25% | 0.25% | 0.00% | 0.00% | 0.00% | 5% | 5% | 5% | 5% | 4% | 4% | 6% | 6% | 5% | 5% | 4% | 4% | 6% | 6% |
| 11392 | 0.25% | 0.00% | 0.25% | 0.00% | 0.00% | 3% | 3% | 5% | 5% | 4% | 4% | 4% | 4% | 2% | 2% | 4% | 4% | 4% | 4% |
| 11393 | 0.00% | 1.00% | 0.25% | 0.00% | 0.00% | 9% | 9% | 10% | 10% | 10% | 10% | 11% | 11% | 7% | 7% | 9% | 9% | 11% | 11% |
| 11394 | 1.00% | 0.00% | 1.00% | 0.00% | 0.00% | 7% | 7% | 5% | 5% | 5% | 5% | 5% | 5% | 6% | 6% | 4% | 4% | 6% | 6% |
| 11395 | 0.00% | 0.25% | 1.00% | 0.00% | 0.00% | 11% | 11% | 9% | 9% | 9% | 9% | 10% | 10% | 10% | 10% | 8% | 8% | 11% | 11% |
| 11396 | 9.00% | 1.00% | 1.00% | 0.00% | 0.00% | 14% | 14% | 10% | 10% | 13% | 13% | 12% | 12% | 11% | 11% | 10% | 10% | 13% | 13% |
| 11397 | 0.25% | 1.00% | 9.00% | 0.00% | 0.00% | 11% | 11% | 11% | 11% | 11% | 11% | 12% | 12% | 11% | 11% | 11% | 11% | 13% | 13% |
| 11398 | 1.00% | 1.00% | 0.00% | 0.25% | 0.00% | 15% | 15% | 14% | 14% | 15% | 15% | 15% | 15% | 13% | 13% | 13% | 13% | 15% | 15% |
| 11399 | 1.00% | 0.25% | 0.25% | 0.25% | 0.00% | 17% | 17% | 19% | 19% | 17% | 17% | 18% | 18% | 15% | 15% | 16% | 16% | 18% | 18% |
| 11400 | 9.00% | 9.00% | 0.25% | 0.25% | 0.00% | 17% | 17% | 20% | 20% | 22% | 22% | 20% | 20% | 15% | 15% | 18% | 18% | 21% | 21% |
| 11401 | 9.00% | 0.25% | 1.00% | 0.25% | 0.00% | 21% | 21% | 18% | 18% | 20% | 20% | 18% | 18% | 18% | 18% | 17% | 17% | 19% | 19% |
| 11402 | 0.25% | 9.00% | 1.00% | 0.25% | 0.00% | 18% | 18% | 18% | 18% | 21% | 21% | 19% | 19% | 17% | 17% | 17% | 17% | 21% | 21% |
| 11403 | 0.25% | 1.00% | 9.00% | 0.25% | 0.00% | 19% | 19% | 19% | 19% | 20% | 20% | 19% | 19% | 18% | 18% | 19% | 19% | 20% | 20% |
| 11404 | 0.25% | 1.00% | 0.00% | 1.00% | 0.00% | 31% | 31% | 26% | 26% | 28% | 28% | 29% | 29% | 25% | 25% | 30% | 30% | 26% | 26% |
| 11405 | 9.00% | 0.25% | 0.25% | 1.00% | 0.00% | 35% | 35% | 32% | 32% | 32% | 32% | 33% | 33% | 28% | 28% | 34% | 34% | 30% | 30% |
| 11406 | 1.00% | 9.00% | 0.25% | 1.00% | 0.00% | 33% | 33% | 33% | 33% | 33% | 33% | 35% | 35% | 28% | 28% | 34% | 34% | 33% | 33% |
| 11407 | 0.00% | 9.00% | 1.00% | 1.00% | 0.00% | 35% | 35% | 31% | 31% | 34% | 34% | 34% | 34% | 30% | 30% | 34% | 34% | 33% | 33% |
| 11408 | 0.25% | 1.00% | 9.00% | 1.00% | 0.00% | 36% | 36% | 32% | 32% | 33% | 33% | 34% | 34% | 31% | 31% | 36% | 36% | 32% | 32% |
| 11409 | 1.00% | 0.25% | 0.25% | 9.00% | 0.00% | 51% | 51% | 46% | 46% | 42% | 42% | 49% | 49% | 42% | 42% | 50% | 50% | 43% | 43% |
| 11410 | 0.25% | 0.00% | 1.00% | 9.00% | 0.00% | 48% | 48% | 39% | 39% | 39% | 39% | 42% | 42% | 39% | 39% | 46% | 46% | 37% | 37% |
| 11411 | 0.25% | 0.25% | 9.00% | 9.00% | 0.00% | 52% | 52% | 46% | 46% | 43% | 43% | 49% | 49% | 45% | 45% | 52% | 52% | 44% | 44% |
| 11412 | 0.25% | 0.00% | 1.00% | 0.00% | 0.25% | 6% | 6% | 4% | 4% | 6% | 6% | 4% | 4% | 6% | 6% | 4% | 4% | 6% | 6% |
| 11413 | 1.00% | 1.00% | 1.00% | 0.00% | 0.25% | 13% | 13% | 10% | 10% | 12% | 12% | 12% | 12% | 12% | 12% | 9% | 9% | 14% | 14% |
| 11414 | 1.00% | 0.25% | 9.00% | 0.00% | 0.25% | 11% | 11% | 12% | 12% | 10% | 10% | 12% | 12% | 13% | 13% | 10% | 10% | 14% | 14% |
| 11415 | 9.00% | 0.25% | 0.00% | 0.25% | 0.25% | 15% | 15% | 14% | 14% | 16% | 16% | 14% | 14% | 14% | 14% | 13% | 13% | 15% | 15% |
| 11416 | 1.00% | 9.00% | 0.25% | 0.25% | 0.25% | 16% | 16% | 20% | 20% | 21% | 21% | 20% | 20% | 16% | 16% | 17% | 17% | 22% | 22% |
| 11417 | 1.00% | 0.25% | 1.00% | 0.25% | 0.25% | 20% | 20% | 18% | 18% | 19% | 19% | 18% | 18% | 19% | 19% | 16% | 16% | 20% | 20% |
| 11418 | 0.00% | 9.00% | 1.00% | 0.25% | 0.25% | 18% | 18% | 18% | 18% | 22% | 22% | 19% | 19% | 18% | 18% | 17% | 17% | 22% | 22% |
| 11419 | 0.00% | 1.00% | 0.00% | 1.00% | 0.25% | 31% | 31% | 26% | 26% | 29% | 29% | 29% | 29% | 26% | 26% | 30% | 30% | 27% | 27% |
| 11420 | 1.00% | 0.25% | 0.25% | 1.00% | 0.25% | 34% | 34% | 32% | 32% | 31% | 31% | 33% | 33% | 29% | 29% | 33% | 33% | 31% | 31% |
| 11421 | 0.25% | 9.00% | 0.25% | 1.00% | 0.25% | 32% | 32% | 32% | 32% | 34% | 34% | 34% | 34% | 28% | 28% | 34% | 34% | 33% | 33% |
| 11422 | 9.00% | 1.00% | 1.00% | 1.00% | 0.25% | 39% | 39% | 31% | 31% | 36% | 36% | 34% | 34% | 32% | 32% | 35% | 35% | 33% | 33% |

Fig. 45

| Formula # | delta valerolactone | Hexyl Apritone | Undecyl Dihydrojasmonate | Picaridin | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11423 | 9.00% | 0.25% | 9.00% | 1.00% | 0.25% | 37% | 37% | 33% | 33% | 34% | 34% | 34% | 34% | 33% | 33% | 36% | 36% | 33% | 33% |
| 11424 | 0.25% | 0.25% | 0.25% | 9.00% | 0.25% | 50% | 50% | 45% | 45% | 43% | 43% | 48% | 48% | 42% | 42% | 50% | 50% | 43% | 43% |
| 11425 | 0.25% | 9.00% | 0.25% | 9.00% | 0.25% | 49% | 49% | 46% | 46% | 46% | 46% | 50% | 50% | 42% | 42% | 51% | 51% | 46% | 46% |
| 11426 | 0.25% | 0.00% | 0.25% | 0.00% | 1.00% | 3% | 3% | 6% | 6% | 5% | 5% | 4% | 4% | 2% | 2% | 4% | 4% | 4% | 4% |
| 11427 | 1.00% | 9.00% | 0.25% | 0.00% | 1.00% | 8% | 8% | 13% | 13% | 12% | 12% | 13% | 13% | 8% | 8% | 9% | 9% | 14% | 14% |
| 11428 | 0.25% | 1.00% | 1.00% | 0.00% | 1.00% | 12% | 12% | 10% | 10% | 12% | 12% | 11% | 11% | 10% | 10% | 9% | 9% | 12% | 12% |
| 11429 | 0.25% | 0.25% | 9.00% | 0.00% | 1.00% | 10% | 10% | 12% | 12% | 10% | 10% | 11% | 11% | 11% | 11% | 10% | 10% | 12% | 12% |
| 11430 | 0.25% | 0.25% | 0.00% | 0.25% | 1.00% | 13% | 13% | 14% | 14% | 14% | 14% | 13% | 13% | 12% | 12% | 12% | 12% | 13% | 13% |
| 11431 | 0.25% | 9.00% | 0.25% | 0.25% | 1.00% | 15% | 15% | 20% | 20% | 21% | 21% | 19% | 19% | 14% | 14% | 17% | 17% | 20% | 20% |
| 11432 | 0.25% | 0.25% | 1.00% | 0.25% | 1.00% | 19% | 19% | 18% | 18% | 19% | 19% | 17% | 17% | 17% | 17% | 16% | 16% | 18% | 18% |
| 11433 | 9.00% | 1.00% | 1.00% | 0.25% | 1.00% | 22% | 22% | 19% | 19% | 23% | 23% | 19% | 19% | 18% | 18% | 18% | 18% | 20% | 20% |
| 11434 | 9.00% | 0.25% | 9.00% | 0.25% | 1.00% | 20% | 20% | 21% | 21% | 21% | 21% | 19% | 19% | 19% | 19% | 19% | 19% | 20% | 20% |
| 11435 | 1.00% | 0.25% | 0.00% | 1.00% | 1.00% | 31% | 31% | 28% | 28% | 27% | 27% | 29% | 29% | 26% | 26% | 29% | 29% | 26% | 26% |
| 11436 | 0.25% | 0.25% | 0.25% | 1.00% | 1.00% | 33% | 33% | 32% | 32% | 31% | 31% | 32% | 32% | 27% | 27% | 33% | 33% | 29% | 29% |
| 11437 | 1.00% | 0.00% | 1.00% | 1.00% | 1.00% | 32% | 32% | 27% | 27% | 28% | 28% | 27% | 27% | 26% | 26% | 29% | 29% | 25% | 25% |
| 11438 | 1.00% | 1.00% | 1.00% | 1.00% | 1.00% | 38% | 38% | 32% | 32% | 34% | 34% | 34% | 34% | 31% | 31% | 34% | 34% | 32% | 32% |
| 11439 | 1.00% | 0.25% | 9.00% | 1.00% | 1.00% | 36% | 36% | 34% | 34% | 32% | 32% | 34% | 34% | 32% | 32% | 35% | 35% | 32% | 32% |
| 11440 | 0.00% | 0.25% | 0.25% | 9.00% | 1.00% | 50% | 50% | 46% | 46% | 43% | 43% | 48% | 48% | 41% | 41% | 50% | 50% | 42% | 42% |

Fig. 46

| Formula # | delta valerolactone | Hexyl Apritone | Undecyl Dihydrojasmonate | IR3535 | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11441 | 0.25% | 0.25% | 0.00% | 0.00% | 0.00% | 5% | 5% | 5% | 5% | 4% | 4% | 6% | 6% | 5% | 5% | 4% | 4% | 6% | 6% |
| 11442 | 0.25% | 0.00% | 0.25% | 0.00% | 0.00% | 3% | 3% | 5% | 5% | 4% | 4% | 4% | 4% | 2% | 2% | 4% | 4% | 4% | 4% |
| 11443 | 0.00% | 1.00% | 0.25% | 0.00% | 0.00% | 9% | 9% | 10% | 10% | 10% | 10% | 11% | 11% | 7% | 7% | 9% | 9% | 11% | 11% |
| 11444 | 1.00% | 0.00% | 1.00% | 0.00% | 0.00% | 7% | 7% | 5% | 5% | 5% | 5% | 5% | 5% | 6% | 6% | 4% | 4% | 6% | 6% |
| 11445 | 0.00% | 0.25% | 1.00% | 0.00% | 0.00% | 11% | 11% | 9% | 9% | 9% | 9% | 10% | 10% | 10% | 10% | 8% | 8% | 11% | 11% |
| 11446 | 9.00% | 1.00% | 1.00% | 0.00% | 0.00% | 14% | 14% | 10% | 10% | 13% | 13% | 12% | 12% | 11% | 11% | 10% | 10% | 13% | 13% |
| 11447 | 0.25% | 1.00% | 9.00% | 0.00% | 0.00% | 11% | 11% | 11% | 11% | 11% | 11% | 12% | 12% | 11% | 11% | 11% | 11% | 13% | 13% |
| 11448 | 1.00% | 1.00% | 0.00% | 0.25% | 0.00% | 10% | 10% | 12% | 12% | 8% | 8% | 13% | 13% | 11% | 11% | 8% | 8% | 13% | 13% |
| 11449 | 1.00% | 0.25% | 0.25% | 0.25% | 0.00% | 12% | 12% | 17% | 17% | 10% | 10% | 16% | 16% | 13% | 13% | 11% | 11% | 16% | 16% |
| 11450 | 9.00% | 9.00% | 0.25% | 0.25% | 0.00% | 12% | 12% | 18% | 18% | 15% | 15% | 18% | 18% | 13% | 13% | 13% | 13% | 19% | 19% |
| 11451 | 9.00% | 0.25% | 1.00% | 0.25% | 0.00% | 16% | 16% | 16% | 16% | 13% | 13% | 16% | 16% | 16% | 16% | 12% | 12% | 17% | 17% |
| 11452 | 0.25% | 9.00% | 1.00% | 0.25% | 0.00% | 13% | 13% | 16% | 16% | 14% | 14% | 17% | 17% | 15% | 15% | 12% | 12% | 19% | 19% |
| 11453 | 0.25% | 1.00% | 9.00% | 0.25% | 0.00% | 14% | 14% | 17% | 17% | 13% | 13% | 17% | 17% | 16% | 16% | 14% | 14% | 18% | 18% |
| 11454 | 0.25% | 1.00% | 0.00% | 1.00% | 0.00% | 20% | 20% | 18% | 18% | 18% | 18% | 19% | 19% | 22% | 22% | 19% | 19% | 22% | 22% |
| 11455 | 9.00% | 0.25% | 0.25% | 1.00% | 0.00% | 24% | 24% | 24% | 24% | 22% | 22% | 23% | 23% | 25% | 25% | 23% | 23% | 26% | 26% |
| 11456 | 1.00% | 9.00% | 0.25% | 1.00% | 0.00% | 22% | 22% | 25% | 25% | 23% | 23% | 25% | 25% | 25% | 25% | 23% | 23% | 29% | 29% |
| 11457 | 0.00% | 9.00% | 1.00% | 1.00% | 0.00% | 24% | 24% | 23% | 23% | 24% | 24% | 24% | 24% | 27% | 27% | 23% | 23% | 29% | 29% |
| 11458 | 0.25% | 1.00% | 9.00% | 1.00% | 0.00% | 25% | 25% | 24% | 24% | 23% | 23% | 24% | 24% | 28% | 28% | 25% | 25% | 28% | 28% |
| 11459 | 1.00% | 0.25% | 0.25% | 9.00% | 0.00% | 36% | 36% | 33% | 33% | 30% | 30% | 36% | 36% | 35% | 35% | 35% | 35% | 35% | 35% |
| 11460 | 0.25% | 0.00% | 1.00% | 9.00% | 0.00% | 33% | 33% | 26% | 26% | 27% | 27% | 29% | 29% | 32% | 32% | 31% | 31% | 29% | 29% |
| 11461 | 0.25% | 0.25% | 9.00% | 9.00% | 0.00% | 37% | 37% | 33% | 33% | 31% | 31% | 36% | 36% | 38% | 38% | 37% | 37% | 36% | 36% |
| 11462 | 0.25% | 0.00% | 1.00% | 0.00% | 0.25% | 6% | 6% | 4% | 4% | 6% | 6% | 4% | 4% | 6% | 6% | 4% | 4% | 6% | 6% |
| 11463 | 1.00% | 1.00% | 1.00% | 0.00% | 0.25% | 13% | 13% | 10% | 10% | 12% | 12% | 12% | 12% | 12% | 12% | 9% | 9% | 14% | 14% |
| 11464 | 1.00% | 0.25% | 9.00% | 0.00% | 0.25% | 11% | 11% | 12% | 12% | 10% | 10% | 12% | 12% | 13% | 13% | 10% | 10% | 14% | 14% |
| 11465 | 9.00% | 0.25% | 0.00% | 0.25% | 0.25% | 10% | 10% | 12% | 12% | 9% | 9% | 12% | 12% | 12% | 12% | 8% | 8% | 13% | 13% |
| 11466 | 1.00% | 9.00% | 0.25% | 0.25% | 0.25% | 11% | 11% | 18% | 18% | 14% | 14% | 18% | 18% | 14% | 14% | 12% | 12% | 20% | 20% |
| 11467 | 1.00% | 0.25% | 1.00% | 0.25% | 0.25% | 15% | 15% | 16% | 16% | 12% | 12% | 16% | 16% | 17% | 17% | 11% | 11% | 18% | 18% |
| 11468 | 0.00% | 9.00% | 1.00% | 0.25% | 0.25% | 13% | 13% | 16% | 16% | 15% | 15% | 17% | 17% | 16% | 16% | 12% | 12% | 20% | 20% |
| 11469 | 0.00% | 1.00% | 0.00% | 1.00% | 0.25% | 20% | 20% | 18% | 18% | 19% | 19% | 19% | 19% | 23% | 23% | 19% | 19% | 23% | 23% |
| 11470 | 1.00% | 0.25% | 0.25% | 1.00% | 0.25% | 23% | 23% | 24% | 24% | 21% | 21% | 23% | 23% | 26% | 26% | 22% | 22% | 27% | 27% |
| 11471 | 0.25% | 9.00% | 0.25% | 1.00% | 0.25% | 21% | 21% | 24% | 24% | 24% | 24% | 24% | 24% | 25% | 25% | 23% | 23% | 29% | 29% |
| 11472 | 9.00% | 1.00% | 1.00% | 1.00% | 0.25% | 28% | 28% | 23% | 23% | 26% | 26% | 24% | 24% | 29% | 29% | 24% | 24% | 29% | 29% |

Fig. 46

| Formula # | delta valerolactone | Hexyl Apritone | Undecyl Dihydrojasmonate | IR3535 | Arachidic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11473 | 9.00% | 0.25% | 9.00% | 1.00% | 0.25% | 26% | 26% | 25% | 25% | 24% | 24% | 24% | 24% | 30% | 30% | 25% | 25% | 29% | 29% |
| 11474 | 0.25% | 0.25% | 0.25% | 9.00% | 0.25% | 35% | 35% | 32% | 32% | 31% | 31% | 35% | 35% | 35% | 35% | 35% | 35% | 35% | 35% |
| 11475 | 0.25% | 9.00% | 0.25% | 9.00% | 0.25% | 34% | 34% | 33% | 33% | 34% | 34% | 37% | 37% | 35% | 35% | 36% | 36% | 38% | 38% |
| 11476 | 0.25% | 0.00% | 0.25% | 0.00% | 1.00% | 3% | 3% | 6% | 6% | 5% | 5% | 4% | 4% | 2% | 2% | 4% | 4% | 4% | 4% |
| 11477 | 1.00% | 9.00% | 0.25% | 0.00% | 1.00% | 8% | 8% | 13% | 13% | 12% | 12% | 13% | 13% | 8% | 8% | 9% | 9% | 14% | 14% |
| 11478 | 0.25% | 1.00% | 1.00% | 0.00% | 1.00% | 12% | 12% | 10% | 10% | 12% | 12% | 11% | 11% | 10% | 10% | 9% | 9% | 12% | 12% |
| 11479 | 0.25% | 0.25% | 9.00% | 0.00% | 1.00% | 10% | 10% | 12% | 12% | 10% | 10% | 11% | 11% | 11% | 11% | 10% | 10% | 12% | 12% |
| 11480 | 0.25% | 0.25% | 0.00% | 0.25% | 1.00% | 8% | 8% | 12% | 12% | 7% | 7% | 11% | 11% | 10% | 10% | 7% | 7% | 11% | 11% |
| 11481 | 0.25% | 9.00% | 0.25% | 0.25% | 1.00% | 10% | 10% | 18% | 18% | 14% | 14% | 17% | 17% | 12% | 12% | 12% | 12% | 18% | 18% |
| 11482 | 0.25% | 0.25% | 1.00% | 0.25% | 1.00% | 14% | 14% | 16% | 16% | 12% | 12% | 15% | 15% | 15% | 15% | 11% | 11% | 16% | 16% |
| 11483 | 9.00% | 1.00% | 1.00% | 0.25% | 1.00% | 17% | 17% | 17% | 17% | 16% | 16% | 17% | 17% | 16% | 16% | 13% | 13% | 18% | 18% |
| 11484 | 9.00% | 0.25% | 9.00% | 0.25% | 1.00% | 15% | 15% | 19% | 19% | 14% | 14% | 17% | 17% | 17% | 17% | 14% | 14% | 18% | 18% |
| 11485 | 1.00% | 0.25% | 0.00% | 1.00% | 1.00% | 20% | 20% | 20% | 20% | 17% | 17% | 19% | 19% | 23% | 23% | 18% | 18% | 22% | 22% |
| 11486 | 0.25% | 0.25% | 0.25% | 1.00% | 1.00% | 22% | 22% | 24% | 24% | 21% | 21% | 22% | 22% | 24% | 24% | 22% | 22% | 25% | 25% |
| 11487 | 1.00% | 0.00% | 1.00% | 1.00% | 1.00% | 21% | 21% | 19% | 19% | 18% | 18% | 17% | 17% | 23% | 23% | 18% | 18% | 21% | 21% |
| 11488 | 1.00% | 1.00% | 1.00% | 1.00% | 1.00% | 27% | 27% | 24% | 24% | 24% | 24% | 24% | 24% | 28% | 28% | 23% | 23% | 28% | 28% |
| 11489 | 1.00% | 0.25% | 9.00% | 1.00% | 1.00% | 25% | 25% | 26% | 26% | 22% | 22% | 24% | 24% | 29% | 29% | 24% | 24% | 28% | 28% |
| 11490 | 0.00% | 0.25% | 0.25% | 9.00% | 1.00% | 35% | 35% | 33% | 33% | 31% | 31% | 35% | 35% | 34% | 34% | 35% | 35% | 34% | 34% |

Fig. 47

| Formula # | Delta Dodecalactone | Methyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11491 | 0.15% | 0.15% | 0.00% | 0.00% | 0.00% | 6% | 6% | 6% | 6% | 7% | 7% | 9% | 9% | 10% | 10% | 8% | 8% | 8% | 8% |
| 11492 | 0.15% | 0.00% | 0.15% | 0.00% | 0.00% | 7% | 7% | 7% | 7% | 5% | 5% | 8% | 8% | 8% | 8% | 9% | 9% | 7% | 7% |
| 11493 | 0.00% | 20.00% | 0.15% | 0.00% | 0.00% | 28% | 28% | 25% | 25% | 32% | 32% | 24% | 24% | 31% | 31% | 27% | 27% | 31% | 31% |
| 11494 | 20.00% | 0.00% | 20.00% | 0.00% | 0.00% | 70% | 70% | 60% | 60% | 58% | 58% | 68% | 68% | 65% | 65% | 63% | 63% | 69% | 69% |
| 11495 | 0.00% | 0.15% | 20.00% | 0.00% | 0.00% | 34% | 34% | 29% | 29% | 26% | 26% | 27% | 27% | 32% | 32% | 35% | 35% | 33% | 33% |
| 11496 | 40.00% | 20.00% | 20.00% | 0.00% | 0.00% | 100% | 100% | 91% | 91% | 98% | 98% | 96% | 96% | 100% | 100% | 94% | 94% | 100% | 100% |
| 11497 | 0.15% | 20.00% | 40.00% | 0.00% | 0.00% | 69% | 69% | 61% | 61% | 65% | 65% | 60% | 60% | 71% | 71% | 64% | 64% | 69% | 69% |
| 11498 | 20.00% | 20.00% | 0.00% | 0.15% | 0.00% | 66% | 66% | 58% | 58% | 68% | 68% | 71% | 71% | 70% | 70% | 59% | 59% | 72% | 72% |
| 11499 | 20.00% | 0.15% | 0.15% | 0.15% | 0.00% | 46% | 46% | 41% | 41% | 44% | 44% | 54% | 54% | 47% | 47% | 43% | 43% | 48% | 48% |
| 11500 | 40.00% | 40.00% | 0.15% | 0.15% | 0.00% | 92% | 92% | 86% | 86% | 95% | 95% | 99% | 99% | 94% | 94% | 73% | 73% | 87% | 87% |
| 11501 | 40.00% | 0.15% | 20.00% | 0.15% | 0.00% | 82% | 82% | 74% | 74% | 74% | 74% | 82% | 82% | 79% | 79% | 79% | 79% | 80% | 80% |
| 11502 | 0.15% | 40.00% | 20.00% | 0.15% | 0.00% | 80% | 80% | 72% | 72% | 72% | 72% | 77% | 77% | 83% | 83% | 67% | 67% | 77% | 77% |
| 11503 | 0.15% | 20.00% | 40.00% | 0.15% | 0.00% | 72% | 72% | 64% | 64% | 67% | 67% | 65% | 65% | 75% | 75% | 69% | 69% | 73% | 73% |
| 11504 | 0.15% | 20.00% | 0.00% | 20.00% | 0.00% | 77% | 77% | 67% | 67% | 76% | 76% | 75% | 75% | 77% | 77% | 48% | 48% | 74% | 74% |
| 11505 | 40.00% | 0.15% | 0.15% | 20.00% | 0.00% | 98% | 98% | 88% | 88% | 95% | 95% | 100% | 100% | 91% | 91% | 66% | 66% | 88% | 88% |
| 11506 | 20.00% | 40.00% | 0.15% | 20.00% | 0.00% | 100% | 100% | 100% | 100% | 100% | 100% | 100% | 100% | 100% | 100% | 80% | 80% | 100% | 100% |
| 11507 | 0.00% | 40.00% | 20.00% | 20.00% | 0.00% | 100% | 100% | 100% | 100% | 100% | 100% | 100% | 100% | 100% | 100% | 77% | 77% | 100% | 100% |
| 11508 | 0.15% | 20.00% | 40.00% | 20.00% | 0.00% | 100% | 100% | 100% | 100% | 100% | 100% | 100% | 100% | 100% | 100% | 84% | 84% | 100% | 100% |
| 11509 | 20.00% | 0.15% | 0.15% | 40.00% | 0.00% | 98% | 98% | 86% | 86% | 92% | 92% | 100% | 100% | 92% | 92% | 78% | 78% | 96% | 96% |
| 11510 | 0.15% | 0.00% | 20.00% | 40.00% | 0.00% | 91% | 91% | 79% | 79% | 75% | 75% | 84% | 84% | 83% | 83% | 77% | 77% | 87% | 87% |
| 11511 | 0.15% | 0.15% | 40.00% | 40.00% | 0.00% | 100% | 100% | 89% | 89% | 89% | 89% | 95% | 95% | 95% | 95% | 84% | 84% | 95% | 95% |
| 11512 | 0.15% | 0.00% | 20.00% | 0.00% | 0.15% | 37% | 37% | 32% | 32% | 26% | 26% | 31% | 31% | 35% | 35% | 38% | 38% | 36% | 36% |
| 11513 | 20.00% | 20.00% | 20.00% | 0.00% | 0.15% | 96% | 96% | 83% | 83% | 89% | 89% | 91% | 91% | 95% | 95% | 87% | 87% | 99% | 99% |
| 11514 | 20.00% | 0.15% | 40.00% | 0.00% | 0.15% | 81% | 81% | 71% | 71% | 73% | 73% | 80% | 80% | 78% | 78% | 71% | 71% | 78% | 78% |
| 11515 | 40.00% | 0.15% | 0.00% | 0.15% | 0.15% | 51% | 51% | 48% | 48% | 53% | 53% | 59% | 59% | 52% | 52% | 48% | 48% | 51% | 51% |
| 11516 | 20.00% | 40.00% | 0.15% | 0.15% | 0.15% | 86% | 86% | 78% | 78% | 86% | 86% | 94% | 94% | 89% | 89% | 66% | 66% | 84% | 84% |
| 11517 | 20.00% | 0.15% | 20.00% | 0.15% | 0.15% | 76% | 76% | 66% | 66% | 65% | 65% | 77% | 77% | 74% | 74% | 72% | 72% | 77% | 77% |
| 11518 | 0.00% | 40.00% | 20.00% | 0.15% | 0.15% | 77% | 77% | 69% | 69% | 70% | 70% | 72% | 72% | 78% | 78% | 63% | 63% | 73% | 73% |
| 11519 | 0.00% | 20.00% | 0.00% | 20.00% | 0.15% | 74% | 74% | 64% | 64% | 74% | 74% | 70% | 70% | 72% | 72% | 44% | 44% | 70% | 70% |
| 11520 | 20.00% | 0.15% | 0.15% | 20.00% | 0.15% | 92% | 92% | 80% | 80% | 86% | 86% | 97% | 97% | 86% | 86% | 59% | 59% | 85% | 85% |
| 11521 | 0.15% | 40.00% | 0.15% | 20.00% | 0.15% | 97% | 97% | 87% | 87% | 94% | 94% | 98% | 98% | 96% | 96% | 55% | 55% | 86% | 86% |
| 11522 | 40.00% | 20.00% | 20.00% | 20.00% | 0.15% | 100% | 100% | 100% | 100% | 100% | 100% | 100% | 100% | 100% | 100% | 100% | 100% | 100% | 100% |

Fig. 47

| Formula # | Delta Dodecalactone | Methyl Dihydrojasmolate | Apritone | Para-menthane-3,8-diol | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11523 | 40.00% | 0.15% | 40.00% | 20.00% | 0.15% | 100% | 100% | 100% | 100% | 100% | 100% | 100% | 100% | 100% | 100% | 99% | 99% | 100% | 100% |
| 11524 | 0.15% | 0.15% | 0.15% | 40.00% | 0.15% | 65% | 65% | 58% | 58% | 60% | 60% | 66% | 66% | 62% | 62% | 53% | 53% | 63% | 63% |
| 11525 | 0.15% | 40.00% | 0.15% | 40.00% | 0.15% | 100% | 100% | 94% | 94% | 100% | 100% | 100% | 100% | 100% | 100% | 75% | 75% | 98% | 98% |
| 11526 | 0.15% | 0.00% | 0.15% | 0.00% | 20.00% | 13% | 13% | 10% | 10% | 12% | 12% | 14% | 14% | 13% | 13% | 15% | 15% | 13% | 13% |
| 11527 | 20.00% | 40.00% | 0.15% | 0.00% | 20.00% | 88% | 88% | 77% | 77% | 90% | 90% | 94% | 94% | 89% | 89% | 66% | 66% | 85% | 85% |
| 11528 | 0.15% | 20.00% | 20.00% | 0.00% | 20.00% | 67% | 67% | 56% | 56% | 62% | 62% | 58% | 58% | 68% | 68% | 66% | 66% | 70% | 70% |
| 11529 | 0.15% | 0.15% | 40.00% | 0.00% | 20.00% | 52% | 52% | 44% | 44% | 46% | 46% | 47% | 47% | 51% | 51% | 50% | 50% | 49% | 49% |
| 11530 | 0.15% | 0.15% | 0.00% | 0.15% | 20.00% | 15% | 15% | 12% | 12% | 16% | 16% | 20% | 20% | 19% | 19% | 19% | 19% | 18% | 18% |
| 11531 | 0.15% | 40.00% | 0.15% | 0.15% | 20.00% | 57% | 57% | 51% | 51% | 59% | 59% | 61% | 61% | 62% | 62% | 45% | 45% | 55% | 55% |
| 11532 | 0.15% | 0.15% | 20.00% | 0.15% | 20.00% | 47% | 47% | 39% | 39% | 38% | 38% | 44% | 44% | 47% | 47% | 51% | 51% | 48% | 48% |
| 11533 | 40.00% | 20.00% | 20.00% | 0.15% | 20.00% | 100% | 100% | 97% | 97% | 100% | 100% | 100% | 100% | 100% | 100% | 100% | 100% | 100% | 100% |
| 11534 | 40.00% | 0.15% | 40.00% | 0.15% | 20.00% | 96% | 96% | 85% | 85% | 91% | 91% | 96% | 96% | 92% | 92% | 89% | 89% | 91% | 91% |
| 11535 | 20.00% | 0.15% | 0.00% | 20.00% | 20.00% | 94% | 94% | 79% | 79% | 90% | 90% | 100% | 100% | 88% | 88% | 60% | 60% | 88% | 88% |
| 11536 | 0.15% | 0.15% | 0.15% | 20.00% | 20.00% | 63% | 63% | 53% | 53% | 59% | 59% | 64% | 64% | 59% | 59% | 38% | 38% | 56% | 56% |
| 11537 | 20.00% | 0.00% | 20.00% | 20.00% | 20.00% | 100% | 100% | 100% | 100% | 100% | 100% | 100% | 100% | 100% | 100% | 89% | 89% | 100% | 100% |
| 11538 | 20.00% | 20.00% | 20.00% | 20.00% | 20.00% | 100% | 100% | 100% | 100% | 100% | 100% | 100% | 100% | 100% | 100% | 100% | 100% | 100% | 100% |
| 11539 | 20.00% | 0.15% | 40.00% | 20.00% | 20.00% | 100% | 100% | 100% | 100% | 100% | 100% | 100% | 100% | 100% | 100% | 96% | 96% | 100% | 100% |
| 11540 | 0.00% | 0.15% | 0.15% | 40.00% | 20.00% | 66% | 66% | 56% | 56% | 63% | 63% | 65% | 65% | 60% | 60% | 53% | 53% | 63% | 63% |

Fig. 48

| Formula # | Gamma Dodecalactone | Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11541 | 0.15% | 0.15% | 0.00% | 0.00% | 0.00% | 6% | 6% | 8% | 8% | 5% | 5% | 4% | 4% | 6% | 6% | 8% | 8% | 6% | 6% |
| 11542 | 0.15% | 0.00% | 0.15% | 0.00% | 0.00% | 4% | 4% | 8% | 8% | 7% | 7% | 4% | 4% | 5% | 5% | 6% | 6% | 7% | 7% |
| 11543 | 0.00% | 20.00% | 0.15% | 0.00% | 0.00% | 33% | 33% | 30% | 30% | 26% | 26% | 26% | 26% | 29% | 29% | 34% | 34% | 33% | 33% |
| 11544 | 20.00% | 0.00% | 20.00% | 0.00% | 0.00% | 49% | 49% | 46% | 46% | 53% | 53% | 46% | 46% | 59% | 59% | 41% | 41% | 52% | 52% |
| 11545 | 0.00% | 0.15% | 20.00% | 0.00% | 0.00% | 20% | 20% | 20% | 20% | 23% | 23% | 20% | 20% | 24% | 24% | 15% | 15% | 21% | 21% |
| 11546 | 40.00% | 20.00% | 20.00% | 0.00% | 0.00% | 89% | 89% | 82% | 82% | 82% | 82% | 83% | 83% | 92% | 92% | 79% | 79% | 90% | 90% |
| 11547 | 0.15% | 20.00% | 40.00% | 0.00% | 0.00% | 60% | 60% | 53% | 53% | 54% | 54% | 52% | 52% | 62% | 62% | 51% | 51% | 60% | 60% |
| 11548 | 20.00% | 20.00% | 0.00% | 0.15% | 0.00% | 69% | 69% | 58% | 58% | 57% | 57% | 58% | 58% | 68% | 68% | 69% | 69% | 69% | 69% |
| 11549 | 20.00% | 0.15% | 0.15% | 0.15% | 0.00% | 41% | 41% | 37% | 37% | 41% | 41% | 38% | 38% | 43% | 43% | 43% | 43% | 44% | 44% |
| 11550 | 40.00% | 40.00% | 0.15% | 0.15% | 0.00% | 86% | 86% | 78% | 78% | 78% | 78% | 81% | 81% | 82% | 82% | 81% | 81% | 85% | 85% |
| 11551 | 40.00% | 0.15% | 20.00% | 0.15% | 0.00% | 65% | 65% | 60% | 60% | 65% | 65% | 67% | 67% | 69% | 69% | 58% | 58% | 68% | 68% |
| 11552 | 0.15% | 40.00% | 20.00% | 0.15% | 0.00% | 65% | 65% | 59% | 59% | 59% | 59% | 58% | 58% | 65% | 65% | 58% | 58% | 64% | 64% |
| 11553 | 0.15% | 20.00% | 40.00% | 0.15% | 0.00% | 65% | 65% | 55% | 55% | 57% | 57% | 58% | 58% | 65% | 65% | 58% | 58% | 66% | 66% |
| 11554 | 0.15% | 20.00% | 0.00% | 20.00% | 0.00% | 80% | 80% | 65% | 65% | 57% | 57% | 73% | 73% | 74% | 74% | 71% | 71% | 70% | 70% |
| 11555 | 40.00% | 0.15% | 0.15% | 20.00% | 0.00% | 89% | 89% | 77% | 77% | 77% | 77% | 92% | 92% | 87% | 87% | 77% | 77% | 82% | 82% |
| 11556 | 20.00% | 40.00% | 0.15% | 20.00% | 0.00% | 100% | 100% | 100% | 100% | 100% | 100% | 100% | 100% | 100% | 100% | 100% | 100% | 100% | 100% |
| 11557 | 0.00% | 40.00% | 20.00% | 20.00% | 0.00% | 100% | 100% | 85% | 85% | 85% | 85% | 97% | 97% | 100% | 100% | 82% | 82% | 90% | 90% |
| 11558 | 0.15% | 20.00% | 40.00% | 20.00% | 0.00% | 100% | 100% | 86% | 86% | 86% | 86% | 99% | 99% | 100% | 100% | 86% | 86% | 96% | 96% |
| 11559 | 20.00% | 0.15% | 0.15% | 40.00% | 0.00% | 91% | 91% | 81% | 81% | 83% | 83% | 90% | 90% | 92% | 92% | 73% | 73% | 83% | 83% |
| 11560 | 0.15% | 0.00% | 20.00% | 40.00% | 0.00% | 75% | 75% | 68% | 68% | 69% | 69% | 78% | 78% | 78% | 78% | 52% | 52% | 68% | 68% |
| 11561 | 0.15% | 0.15% | 40.00% | 40.00% | 0.00% | 86% | 86% | 75% | 75% | 79% | 79% | 88% | 88% | 88% | 88% | 60% | 60% | 77% | 77% |
| 11562 | 0.15% | 0.00% | 20.00% | 0.00% | 0.15% | 21% | 21% | 23% | 23% | 25% | 25% | 21% | 21% | 27% | 27% | 16% | 16% | 24% | 24% |
| 11563 | 20.00% | 20.00% | 20.00% | 0.00% | 0.15% | 82% | 82% | 74% | 74% | 76% | 76% | 71% | 71% | 88% | 88% | 74% | 74% | 83% | 83% |
| 11564 | 20.00% | 0.15% | 40.00% | 0.00% | 0.15% | 61% | 61% | 54% | 54% | 64% | 64% | 57% | 57% | 70% | 70% | 50% | 50% | 62% | 62% |
| 11565 | 40.00% | 0.15% | 0.00% | 0.15% | 0.15% | 49% | 49% | 44% | 44% | 45% | 45% | 50% | 50% | 48% | 48% | 48% | 48% | 50% | 50% |
| 11566 | 20.00% | 40.00% | 0.15% | 0.15% | 0.15% | 79% | 79% | 70% | 70% | 72% | 72% | 69% | 69% | 78% | 78% | 76% | 76% | 78% | 78% |
| 11567 | 20.00% | 0.15% | 20.00% | 0.15% | 0.15% | 58% | 58% | 52% | 52% | 59% | 59% | 55% | 55% | 65% | 65% | 53% | 53% | 61% | 61% |
| 11568 | 0.00% | 40.00% | 20.00% | 0.15% | 0.15% | 63% | 63% | 55% | 55% | 57% | 57% | 57% | 57% | 62% | 62% | 55% | 55% | 61% | 61% |
| 11569 | 0.00% | 20.00% | 0.00% | 20.00% | 0.15% | 78% | 78% | 61% | 61% | 55% | 55% | 72% | 72% | 71% | 71% | 68% | 68% | 67% | 67% |
| 11570 | 20.00% | 0.15% | 0.15% | 20.00% | 0.15% | 82% | 82% | 69% | 69% | 71% | 71% | 80% | 80% | 83% | 83% | 72% | 72% | 75% | 75% |
| 11571 | 0.15% | 40.00% | 0.15% | 20.00% | 0.15% | 90% | 90% | 77% | 77% | 72% | 72% | 84% | 84% | 84% | 84% | 78% | 78% | 79% | 79% |
| 11572 | 40.00% | 20.00% | 20.00% | 20.00% | 0.15% | 100% | 100% | 100% | 100% | 100% | 100% | 100% | 100% | 100% | 100% | 100% | 100% | 100% | 100% |

Fig. 48

| Formula # | Gamma Dodecalactone | Apritone | Propyl Dihydrojasmolate | DEET | Lactic Acid | **MOSQUITO** Expected Repellency | **MOSQUITO** Actual Repellency | **TICK** Expected Repellency | **TICK** Expected Actual Repellency | **BITING FLY** Expected Repellency | **BITING FLY** Actual Repellency | **BITING MIDGE** Expected Repellency | **BITING MIDGE** Actual Repellency | **BED BUG** Expected Repellency | **BED BUG** Actual Repellency | **LICE** Expected Repellency | **LICE** Actual Repellency | **MITES** Expected Repellency | **MITES** Actual Repellency |
|---|---|---|---|---|---|---|---|---|---|---|---|---|---|---|---|---|---|---|---|
| 11573 | 40.00% | 0.15% | 40.00% | 20.00% | 0.15% | 100% | 100% | 96% | 96% | 100% | 100% | 100% | 100% | 100% | 100% | 91% | 91% | 100% | 100% |
| 11574 | 0.15% | 0.15% | 0.15% | 40.00% | 0.15% | 63% | 63% | 58% | 58% | 55% | 55% | 65% | 65% | 60% | 60% | 48% | 48% | 55% | 55% |
| 11575 | 0.15% | 40.00% | 0.15% | 40.00% | 0.15% | 100% | 100% | 90% | 90% | 85% | 85% | 95% | 95% | 94% | 94% | 80% | 80% | 88% | 88% |
| 11576 | 0.15% | 0.00% | 0.15% | 0.00% | 20.00% | 10% | 10% | 11% | 11% | 14% | 14% | 10% | 10% | 10% | 10% | 12% | 12% | 13% | 13% |
| 11577 | 20.00% | 40.00% | 0.15% | 0.00% | 20.00% | 79% | 79% | 70% | 70% | 75% | 75% | 68% | 68% | 79% | 79% | 74% | 74% | 77% | 77% |
| 11578 | 0.15% | 20.00% | 20.00% | 0.00% | 20.00% | 58% | 58% | 52% | 52% | 53% | 53% | 50% | 50% | 59% | 59% | 53% | 53% | 59% | 59% |
| 11579 | 0.15% | 0.15% | 40.00% | 0.00% | 20.00% | 37% | 37% | 32% | 32% | 41% | 41% | 36% | 36% | 41% | 41% | 29% | 29% | 38% | 38% |
| 11580 | 0.15% | 0.15% | 0.00% | 0.15% | 20.00% | 17% | 17% | 13% | 13% | 15% | 15% | 16% | 16% | 14% | 14% | 21% | 21% | 18% | 18% |
| 11581 | 0.15% | 40.00% | 0.15% | 0.15% | 20.00% | 55% | 55% | 48% | 48% | 49% | 49% | 48% | 48% | 49% | 49% | 55% | 55% | 54% | 54% |
| 11582 | 0.15% | 0.15% | 20.00% | 0.15% | 20.00% | 34% | 34% | 30% | 30% | 36% | 36% | 34% | 34% | 36% | 36% | 32% | 32% | 37% | 37% |
| 11583 | 40.00% | 20.00% | 20.00% | 0.15% | 20.00% | 100% | 100% | 87% | 87% | 92% | 92% | 95% | 95% | 100% | 100% | 92% | 92% | 100% | 100% |
| 11584 | 40.00% | 0.15% | 40.00% | 0.15% | 20.00% | 79% | 79% | 67% | 67% | 80% | 80% | 81% | 81% | 82% | 82% | 68% | 68% | 81% | 81% |
| 11585 | 20.00% | 0.15% | 0.00% | 20.00% | 20.00% | 86% | 86% | 68% | 68% | 73% | 73% | 83% | 83% | 86% | 86% | 75% | 75% | 77% | 77% |
| 11586 | 0.15% | 0.15% | 0.15% | 20.00% | 20.00% | 58% | 58% | 47% | 47% | 48% | 48% | 59% | 59% | 54% | 54% | 51% | 51% | 51% | 51% |
| 11587 | 20.00% | 0.00% | 20.00% | 20.00% | 20.00% | 100% | 100% | 82% | 82% | 92% | 92% | 99% | 99% | 100% | 100% | 82% | 82% | 94% | 94% |
| 11588 | 20.00% | 20.00% | 20.00% | 20.00% | 20.00% | 100% | 100% | 100% | 100% | 100% | 100% | 100% | 100% | 100% | 100% | 100% | 100% | 100% | 100% |
| 11589 | 20.00% | 0.15% | 40.00% | 20.00% | 20.00% | 100% | 100% | 89% | 89% | 100% | 100% | 100% | 100% | 100% | 100% | 90% | 90% | 100% | 100% |
| 11590 | 0.00% | 0.15% | 0.15% | 40.00% | 20.00% | 65% | 65% | 55% | 55% | 58% | 58% | 68% | 68% | 60% | 60% | 49% | 49% | 56% | 56% |

SYNERGISTIC FORMULATIONS FOR CONTROL AND REPELLENCY OF BITING ARTHROPODS

RELATED APPLICATIONS

This application is a continuation-in-part of U.S. application Ser. No. 14/540,612, filed Nov. 13, 2014, which claims the benefit of U.S. Application No. 61/962,663, filed Nov. 13, 2013, both of which are incorporated herein by reference in their entirety.

BACKGROUND OF THE DISCLOSURE

1. Field of the Disclosure

This disclosure relates to repellent formulations of compounds used synergistically as agents to control and repel biting arthropods, and especially biting insects.

2. Description of the Related Art

Many mammals, including humans, have suffered the action of mosquitoes and other biting insects. The blood sucking of mosquitoes results in an itching sensation and often a rash. Also, many mosquitoes cause potentially life-threatening illness. *Aedes aegypti* can cause dengue fever and yellow fever, *Anopheles quadrimaculatus* can cause malaria and *Culex quinquefasciatus* can cause West Nile disease. One possible solution to these problems is applying an insect repelling agent to the skin as a topical repellent. Applying arthropod or insect repellents to fabric, like mosquito netting, is another way of reducing arthropod, insect or mosquito bites.

DEET®, namely N,N-Diethyl-m-toluamide, is widely used against biting arthropods and insects, but is characterized by an unseemly bad smell, is not particularly long lasting in its effect and it dissolves plastics. Moreover, several safety questions have been raised concerning the use of DEET® and some governments have restricted the amount of the active component that may be employed in formulations. This itself presents a further problem since the efficacy of DEET® declines over time and therefore it needs to be formulated at higher than effective dosages in order to maintain its effectiveness. Furthermore, some insects and pests have developed resistance to DEET® due to its wide spread usage. Other repellents, such as para-menthane-3,8-diol (PMD), are relatively expensive.

As such, there is a need to provide a biting insect repellent formulation that can reduce or eliminate the use of standard repellents like DEET®, PMD or sec-butyl-2-(2-hydroxyethyl) piperidine carboxylate ("Picaridin").

Testing has shown that many novel biting arthropod or insect repellents developed at Bedoukian Research, Inc. ("BRI") perform much better than conventional repellents like DEET®, PMD, and Picaridin when tested in vitro using warm blood as the attractant on *Aedes aegypti*. However, conventional repellents consistently outperform the BRI materials when tested on humans. Most interesting is that while the BRI repellents perform similarly or have less repellency on humans compared with their laboratory performance, most conventional repellents (for example DEET and PMD) perform far better on human skin than in the lab.

While searching for the mechanism for these phenomena, we have found that there is a synergistic effect with compounds found on human/animal skin and compounds structurally similar to those compounds, or those compounds and related materials found in plants and these conventional repellents DEET®, PMD, Picaridin, or other nitrogen containing repellent compounds. Additionally, we will show synergy of conventional repellents with one another.

SUMMARY OF THE DISCLOSURE

In accordance with this disclosure, control and repellency of biting arthropods, and particularly biting insects, is obtained by contact of the biting arthropods with novel biting arthropod repellent formulations based on skin or plant derived compounds and compounds structurally similar to them, acting synergistically with one another or with conventional repellents such as DEET®, PMD, Picaridin, or other nitrogen containing repellent compounds such as amides, amines and nitrogen containing heterocyclic compounds, or such conventional repellents in synergistic combinations with one another.

BRIEF DESCRIPTION OF THE DRAWINGS

FIG. 1 shows the results of laboratory testing for additive repellency of certain combinations of compounds in accordance with this disclosure.

FIG. 2 shows the results of human testing for dose response curves of certain individual compounds in accordance with this disclosure.

FIG. 3 shows the results of human testing for dose response curves of certain combinations of compounds in accordance with this disclosure.

FIG. 4 shows the results of ED50 comparisons of certain combinations of compounds, based on the dose of DEET or PMD, in accordance with this disclosure.

FIG. 5 shows the results of additive comparisons of certain combinations of compounds, based on the dose of DEET or PMD, in accordance with this disclosure.

FIG. 6 shows testing results for formulations (i.e., formulas 1-345) having specified combinations of delta-dodecalactone, propyl dihydrojasmonate, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

FIG. 7 shows testing results for formulations (i.e., Formulas 346-690) having specified combinations of delta-dodecalactone, propyl dihydrojasmonate, methyl dihydrojasmolate, IR3535, and lactic acid. The formulations exhibit synergistic repellency against mosquitoes, ticks, biting flies, biting midges and bed bugs. No synergistic repellency is observed for lice or mites.

FIG. 8 shows testing results for formulations (i.e., Formulas 691-1035) having specified combinations of delta-dodecalactone, propyl dihydrojasmonate, methyl dihydrojasmolate, DEET, and lactic acid. The formulations exhibit synergistic repellency against mosquitoes, ticks, biting flies, biting midges and bed bugs. No synergistic repellency is observed for lice or mites.

FIG. 9 shows testing results for formulations (i.e., Formulas 1036-1380) having specified combinations of delta-dodecalactone, propyl dihydrojasmonate, methyl dihydrojasmolate, Picaridin, and lactic acid. The formulations exhibit synergistic repellency against mosquitoes, ticks, biting flies, biting midges and bed bugs. No synergistic repellency is observed for lice or mites.

FIG. 10 shows testing results for formulations (i.e., Formulas 1381-1725) having specified combinations of gamma-dodecalactone, propyl dihydrojasmonate, methyl dihydrojasmonate, para-methane-3,8-diol, and lactic acid. The formulations exhibit synergistic repellency against mosquitoes, ticks, biting flies, biting midges and bed bugs. No synergistic repellency is observed for lice or mites.

FIG. 11 shows testing results for formulations (i.e., Formulas 1726-2070) having specified combinations of gamma-dodecalactone, propyl dihydrojasmonate, methyl dihydrojasmonate, DEET, and lactic acid. The formulations exhibit synergistic repellency against mosquitoes, ticks, biting flies, biting midges and bed bugs. No synergistic repellency is observed for lice or mites.

FIG. 12 shows testing results for formulations (i.e., Formulas 2071-2415) having specified combinations of gamma-dodecalactone, propyl dihydrojasmonate, methyl dihydrojasmonate, Picaridin, and lactic acid. The formulations exhibit synergistic repellency against mosquitoes, ticks, biting flies, biting midges and bed bugs. No synergistic repellency is observed for lice or mites.

FIG. 13 shows testing results for formulations (i.e., Formulas 2416-2760) having specified combinations of gamma-dodecalactone, propyl dihydrojasmonate, methyl dihydrojasmonate, IR3535, and lactic acid. The formulations exhibit synergistic repellency against mosquitoes, ticks, biting flies, biting midges and bed bugs. No synergistic repellency is observed for lice or mites.

FIG. 14 shows testing results for formulations (i.e., Formulas 2761-3105) having specified combinations of delta-dodecalactone, propyl dihydrojasmolate, apritone, para-menthane-3,8-diol, and lactic acid. The formulations exhibit synergistic repellency against mosquitoes, ticks, biting flies, biting midges and bed bugs. No synergistic repellency is observed for lice or mites.

FIG. 15 shows testing results for formulations (i.e., Formulas 3106-3450) having specified combinations of delta-dodecalactone, propyl dihydrojasmolate, apritone, DEET, and lactic acid. The formulations exhibit synergistic repellency against mosquitoes, ticks, biting flies, biting midges and bed bugs. No synergistic repellency is observed for lice or mites.

FIG. 16 shows testing results for formulations (i.e., Formulas 3451-3795) having specified combinations of delta-dodecalactone, propyl dihydrojasmolate, apritone, IR3535, and lactic acid. The formulations exhibit synergistic repellency against mosquitoes, ticks, biting flies, biting midges and bed bugs. No synergistic repellency is observed for lice or mites.

FIG. 17 shows testing results for formulations (i.e., Formulas 3796-4140) having specified combinations of delta-dodecalactone, propyl dihydrojasmolate, apritone, Picaridin, and lactic acid. The formulations exhibit synergistic repellency against mosquitoes, ticks, biting flies, biting midges and bed bugs. No synergistic repellency is observed for lice or mites.

FIG. 18 shows testing results for formulations (i.e., Formulas 4141-4485) having specified combinations of delta-dodecalactone, methyl apritone, methyl dihydrojasmonate, para-menthane-3,8-diol, and lactic acid. The formulations exhibit synergistic repellency against mosquitoes, ticks, biting flies, biting midges and bed bugs. No synergistic repellency is observed for lice or mites.

FIG. 19 shows testing results for formulations (i.e., Formulas 4486-4830) having specified combinations of delta-dodecalactone, methyl apritone, methyl dihydrojasmonate, DEET, and lactic acid. The formulations exhibit synergistic repellency against mosquitoes, ticks, biting flies, biting midges and bed bugs. No synergistic repellency is observed for lice or mites.

FIG. 20 shows testing results for formulations (i.e., Formulas 4831-5175) having specified combinations of delta-dodecalactone, methyl apritone, methyl dihydrojasmonate, Picaridin, and lactic acid. The formulations exhibit synergistic repellency against mosquitoes, ticks, biting flies, biting midges and bed bugs. No synergistic repellency is observed for lice or mites.

FIG. 21 shows testing results for formulations (i.e., Formulas 5176-5520) having specified combinations of delta-dodecalactone, methyl apritone, methyl dihydrojasmonate, IR3535, and lactic acid. The formulations exhibit synergistic repellency against mosquitoes, ticks, biting flies, biting midges and bed bugs. No synergistic repellency is observed for lice or mites.

FIG. 22 shows testing results for formulations (i.e., Formulas 5521-5865) having specified combinations of gamma-dodecalactone, methyl apritone, propyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

FIG. 23 shows testing results for formulations (i.e., Formulas 5866-6210) having specified combinations of gamma-dodecalactone, methyl apritone, propyl dihydrojasmolate, DEET, and lactic acid. The formulations exhibit synergistic repellency against mosquitoes, ticks, biting flies, biting midges and bed bugs. No synergistic repellency is observed for lice or mites.

FIG. 24 shows testing results for formulations (i.e., Formulas 6211-6555) having specified combinations of gamma-dodecalactone, methyl apritone, propyl dihydrojasmolate, Picaridin, and lactic acid. The formulations exhibit synergistic repellency against mosquitoes, ticks, biting flies, biting midges and bed bugs. No synergistic repellency is observed for lice or mites.

FIG. 25 shows testing results for formulations (i.e., Formulas 6556-6900) having specified combinations of gamma-dodecalactone, methyl apritone, propyl dihydrojasmolate, IR3535, and lactic acid. The formulations exhibit synergistic repellency against mosquitoes, ticks, biting flies, biting midges and bed bugs. No synergistic repellency is observed for lice or mites.

FIG. 26 shows testing results for formulations (i.e., Formulas 6901-7245) having specified combinations of gamma-dodecalactone, apritone, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

FIG. 27 shows testing results for formulations (i.e., Formulas 7246-7590) having specified combinations of gamma-dodecalactone, apritone, methyl dihydrojasmolate, DEET, and lactic acid. The formulations exhibit synergistic repellency against mosquitoes, ticks, biting flies, biting midges and bed bugs. No synergistic repellency is observed for lice or mites.

FIG. 28 shows testing results for formulations (i.e., Formulas 7591-7935) having specified combinations of gamma-dodecalactone, apritone, methyl dihydrojasmolate, Picaridin, and lactic acid. The formulations exhibit synergistic repellency against mosquitoes, ticks, biting flies, biting midges and bed bugs. No synergistic repellency is observed for lice or mites.

FIG. 29 shows testing results for formulations (i.e., Formulas 7936-8280) having specified combinations of gamma-dodecalactone, apritone, methyl dihydrojasmolate, IR3535, and lactic acid. The formulations exhibit synergistic repellency against mosquitoes, ticks, biting flies, biting midges and bed bugs. No synergistic repellency is observed for lice or mites.

FIG. 30 shows testing results for formulations (i.e., Formulas 8281-8625) having specified combinations of gamma-dodecalactone, propyl dihydrojasmonate, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

FIG. 31 shows testing results for formulations (i.e., Formulas 8626-8970) having specified combinations of gamma-dodecalactone, propyl dihydrojasmonate, methyl dihydrojasmolate, IR3535, and lactic acid. The formulations exhibit synergistic repellency against mosquitoes, ticks, biting flies, biting midges and bed bugs. No synergistic repellency is observed for lice or mites.

FIG. 32 shows testing results for formulations (i.e., Formulas 8971-9315) having specified combinations of gamma-dodecalactone, propyl dihydrojasmonate, methyl dihydrojasmolate, DEET, and lactic acid. The formulations exhibit synergistic repellency against mosquitoes, ticks, biting flies, biting midges and bed bugs. No synergistic repellency is observed for lice or mites.

FIG. 33 shows testing results for formulations (i.e., Formulas 9316-9660) having specified combinations of gamma-dodecalactone, propyl dihydrojasmonate, methyl dihydrojasmolate, Picaridin, and lactic acid. The formulations exhibit synergistic repellency against mosquitoes, ticks, biting flies, biting midges and bed bugs. No synergistic repellency is observed for lice or mites.

FIG. 34 shows testing results for formulations (i.e., Formulas 9661-10005) having specified combinations of delta-dodecalactone, propyl dihydrojasmonate, methyl dihydrojasmonate, para-menthane-3,8-diol, and lactic acid. The formulations exhibit synergistic repellency against mosquitoes, ticks, biting flies, biting midges and bed bugs. No synergistic repellency is observed for lice or mites.

FIG. 35 shows testing results for formulations (i.e., Formulas 10006-10350) having specified combinations of delta-dodecalactone, propyl dihydrojasmonate, methyl dihydrojasmonate, IR3535, and lactic acid. The formulations exhibit synergistic repellency against mosquitoes, ticks, biting flies, biting midges and bed bugs. No synergistic repellency is observed for lice or mites.

FIG. 36 shows testing results for formulations (i.e., Formulas 10351-10695) having specified combinations of delta-dodecalactone, propyl dihydrojasmonate, methyl dihydrojasmonate, DEET, and lactic acid. The formulations exhibit synergistic repellency against mosquitoes, ticks, biting flies, biting midges and bed bugs. No synergistic repellency is observed for lice or mites.

FIG. 37 shows testing results for formulations (i.e., Formulas 10696-11040) having specified combinations of delta-dodecalactone, propyl dihydrojasmonate, methyl dihydrojasmonate, Picaridin, and lactic acid. The formulations exhibit synergistic repellency against mosquitoes, ticks, biting flies, biting midges and bed bugs. No synergistic repellency is observed for lice or mites.

FIG. 38 shows comparative testing results for formulations (i.e., Formulas 11041-11090) having specified combinations of gamma butyrolactone, hexyl apritone, undecyl dihydrojasmolate, delta dodecalactone, and acetic acid. The formulations exhibit additive repellency against mosquitoes, ticks, biting flies, bed bugs, biting midges, lice and mites. No synergistic repellency is observed for any biting arthropods.

FIG. 39 shows comparative testing results for formulations (i.e., Formulas 11091-11140) having specified combinations of gamma butyrolactone, hexyl apritone, undecyl dihydrojasmolate, apritone, and acetic acid. The formulations exhibit additive repellency against mosquitoes, ticks, biting flies, biting midges, bed bugs, lice and mites. No synergistic repellency is observed for any biting arthropods.

FIG. 40 shows comparative testing results for formulations (i.e., Formulas 11141-11190) having specified combinations of gamma butyrolactone, hexyl apritone, undecyl dihydrojasmolate, para-menthane-3,8-diol, and acetic acid. The formulations exhibit additive repellency against mosquitoes, ticks, biting flies, biting midges, bed bugs, lice and mites. No synergistic repellency is observed for any biting arthropods.

FIG. 41 shows comparative testing results for formulations (i.e., Formulas 11191-11240) having specified combinations of gamma butyrolactone, hexyl apritone, undecyl dihydrojasmolate, DEET, and acetic acid. The formulations exhibit additive repellency against mosquitoes, ticks, biting flies, biting midges, bed bugs, lice and mites. No synergistic repellency is observed for any biting arthropods.

FIG. 42 shows comparative testing results for formulations (i.e., Formulas 11241-11290) having specified combinations of gamma butyrolactone, hexyl apritone, undecyl dihydrojasmolate, propyl dihydrojasmolate, and acetic acid. The formulations exhibit additive repellency against mosquitoes, ticks, biting flies, biting midges, bed bugs, lice and mites. No synergistic repellency is observed for any biting arthropods.

FIG. 43 shows comparative testing results for formulations (i.e., Formulas 11291-11340) having specified combinations of delta valerolactone, hexyl apritone, undecyl dihydrojasmonate, methyl dihydrojasmolate, and arachidic acid. The formulations exhibit additive repellency against mosquitoes, ticks, biting flies, biting midges, bed bugs, lice and mites. No synergistic repellency is observed for any biting arthropods.

FIG. 44 shows comparative testing results for formulations (i.e., Formulas 11341-11390) having specified combinations of delta valerolactone, hexyl apritone, undecyl dihydrojasmonate, propyl dihydrojasmonate, and arachidic acid. The formulations exhibit additive repellency against mosquitoes, ticks, biting flies, biting midges, bed bugs, lice and mites. No synergistic repellency is observed for any biting arthropods.

FIG. 45 shows comparative testing results for formulations (i.e., Formulas 11391-11440) having specified combinations of delta valerolactone, hexyl apritone, undecyl dihydrojasmonate, Picaridin, and arachidic acid. The formulations exhibit additive repellency against mosquitoes, ticks, biting flies, biting midges, bed bugs, lice and mites. No synergistic repellency is observed for any biting arthropods.

FIG. 46 shows comparative testing results for formulations (i.e., Formulas 11441-11490) having specified combinations of delta valerolactone, hexyl apritone, undecyl dihydrojasmonate, IR3535, and arachidic acid. The formulations exhibit additive repellency against mosquitoes, ticks, biting flies, biting midges, bed bugs, lice and mites. No synergistic repellency is observed for any biting arthropods.

FIG. 47 shows comparative testing results for formulations (i.e., Formulas 11491-11540) having specified combinations of delta dodecalactone, methyl dihydrojasmolate, apritone, para-menthane-3,8-diol, and lactic acid. The formulations exhibit additive repellency against mosquitoes, ticks, biting flies, biting midges, bed bugs, lice and mites. No synergistic repellency is observed for any biting arthropods.

FIG. 48 shows comparative test results for formulations (i.e., Formulas 11541-11590) having specified combinations of gamma dodecalactone, propyl dihydrojasmolate, apritone, DEET, and lactic acid. The formulations exhibit additive repellency against mosquitoes, ticks, biting flies, biting midges, bed bugs, lice and mites. No synergistic repellency is observed for any biting arthropods.

DESCRIPTION OF THE PREFERRED EMBODIMENTS

Control and repellency of biting arthropods, and especially biting insects, is obtained by contact of the biting arthropods with novel biting arthropod repellent formulations based on biting arthropod repellents found on human/animal skin or in plants taken from the certain chemical families (such as, for example ketones, cyclic ketones, esters, gamma or delta lactones and branched and/or unsaturated carboxylic acids similar to those found on human/animal skin or in plants) acting synergistically with one another, or acting synergistically with conventional repellents like DEET®, PMD, Picaridin, or nitrogen containing repellent compounds such as amides, amines and nitrogen containing heterocyclic compounds, such as pyrazines. The disclosure also consists of synergistic combinations of such conventional repellents with one another.

The synergistic biting arthropod and especially biting insect, repellent formulation of this disclosure may comprise synergistic formulations of:

(I) any synergistic combination of two or more compounds (a), wherein compounds (a) are selected from the group comprising or consisting of:

(1) alkyl ketones, saturated or unsaturated, branched or unbranched, containing from about 6 to about 18, preferably about 10 to about 18 carbon atoms, or any range of carbon atoms within said range, including geranyl acetone, farnesyl acetone, 6-methyl-5-hepten-2-one, 2-undecanone, and 2-tridecanone;

(2) compounds of the structure (A)

(A)

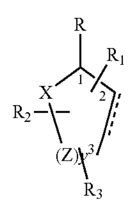

wherein

R is selected from —OH, ═O, —OC(O)$R_4$, —O$R_6$, and —$(OR_6)_2$, wherein each $R_6$ is independently selected from an alkyl group containing from about 1 to about 4 carbon atoms and $R_4$ is a branched or straight chain, saturated or unsaturated, hydrocarbyl group with zero to two double bonds and from about 1 to about 15 carbon atoms;

X is O or $CH_2$, with the proviso that when X is O, R can only be ═O; each Z is independently selected from (CH) and $(CH_2)$;

y is a numeral selected from 1 and 2;

$R_1$ is selected from H or a branched or straight chain, saturated or unsaturated hydrocarbyl group with zero to two double bonds and from about 1 to about 15 carbon atoms or any range of carbon atoms with said range;

$R_2$ is selected from H and a branched or straight chain, saturated or unsaturated hydrocarbyl group with zero to three double bonds and from about 1 to about 15 carbon atoms or any range of carbon atoms with said range;

$R_3$ is selected from H, a branched or straight chain, saturated or unsaturated hydrocarbyl group with zero to three double bonds and from about 1 to about 15 carbon atoms or any range of carbon atoms with said range, —$(CH_2)_n$OH, —C(O)O$R_5$, —$CH_2$C(O)O$R_7$, —$CH_2$C(O)$R_8$, —C(O)N$R_9R_{10}$, and —$CH_2$C(O)N$R_{11}R_{12}$ where each of $R_5$, $R_7$, $R_8$, $R_9$, $R_{10}$, $R_{11}$ and $R_{12}$ is independently selected from H and a branched or straight chain, saturated or unsaturated hydrocarbyl group with zero to three double bonds and from about 1 to about 15 carbon atoms or any range of carbon atoms with said range, and n is n integer of from 1 to 12 or any range of integers within said range;

the bond between the 2 and 3 positions in the ring structure may be a single or a double bond; and wherein the compounds of structure (A) contain from about 11 to about 20 carbon atoms or any range of carbon atoms with said range, except where R is ═O, X ═$CH_2$ and y is 1 the compounds of structure (A) contain from about 13 to about 20 carbon atoms or any range of carbon atoms with said range, and includes optical isomers, diastereomers and enantiomers of the compounds of structure (A); and (3) branched or unbranched, straight chain or cyclic, saturated or unsaturated, carboxylic acids containing from about 3 to about 18 carbon atoms or any range of carbon atoms within said range, specifically including lactic acid, salicylic acid, and geranic acid, 3-methyl-2-decenoic acid, and including any and all isomers thereof; and (4) esters of branched or unbranched, straight chain or cyclic, saturated or unsaturated, carboxylic acids containing a total of from about 3 to about 18 carbon atoms or any range of carbon atoms within said range including esters of salicylic acid, specifically including methyl salicylate, amyl and isoamyl salicylate, hexyl salicylate and cis-3-hexenyl salicylate;

(II) one or more of the compounds (a) in combination with one or more of the repellents DEET®, PMD, Picaridin, or other nitrogen containing repellents selected from amines, amides and nitrogen containing heterocyclic compounds; and/or (III) any synergistic combination of two or more of the repellents DEET®, PMD, Picaridin, or other nitrogen containing repellents selected from amines, amides and nitrogen containing heterocyclic compounds.

The disclosure also comprises control of such biting arthropods, especially biting insects, by bringing the biting arthropods into contact with one of said synergistic arthropod repellent formulations.

As examples of alkyl ketones of compounds (a) there may be mentioned geranyl acetone (6,10-dimethyl-5,9-undecadien-2-one), farnesyl acetone (5,9,13-pentadecatrien-2-one, 6,10,14-trimethyl-) methyl undecyl ketone (2-tridecanone), methyl decyl ketone (2-dodecanone), alpha-ionone (4-(2,6,6-trimethyl-2-cyclohexenyl)-3-buten-2-one), beta ionone (4-(2,6,6-trimethyl-1-cyclohexenyl)-3-buten-2-one), alpha-isomethylionone (3-methyl-4-(2,6,6-trimethyl-2-cyclohexen-1-yl)-3-buten-2-one), isobutylionone ((E)-5-methyl-1-(2,6,6-trimethyl-1-cyclohex-2-enyl) hex-1-en-3-one), isolongifolen-9-one ((1R)-2,2,7,7-tetramethyltricyclo

[6.2.1.01,6] undec-5-en-4-one), dimethylionone ((E)-2-methyl-1-(2,2,6-trimethyl-1-cyclohex-3-enyl)pent-1-en-3-one), isolongifolanone (2,2,7,7-tetramethyltricyclo [6.2.1.01,6]undecan-5-one), pseudoionone (6,10-dimethyl-3,5,9-undecatrien-2-one), 2-cyclopentylcyclopentanone, methyl nonyl ketone (2-undecanone), and 3-decen-2-one. Especially preferred are methyl decyl ketone, methyl undecyl ketone, methyl nonyl ketone, geranyl acetone, farnesyl acetone, ionone, and isolongifolenone.

Representative examples of alkyl ketones of compounds (a) include, but are not limited to, geranyl acetone having the formula

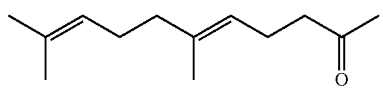

and a methyl ketone with variable chain length (e.g., R is a hydrocarbon group having from about 1 to about 18 carbon atoms)

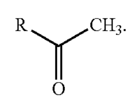

Representative preferred examples of alkyl ketones of compounds (a) include, but are not limited to, geranyl acetone, farnesyl acetone, methyl undecyl ketone, and methyl nonyl ketone.

Representative examples of compounds of structure (A) of compounds (a) include, but are not limited to,

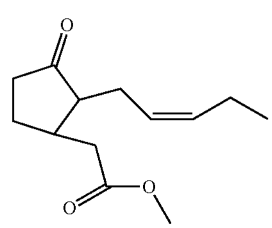

(Z)-methyl 2-(3-oxo-2-(pent-2-enyl)cyclopentyl)acetate
Chemical Formula: $C_{13}H_{20}O_3$
Molecular Weight: 224.30
Methyl Jasmonate

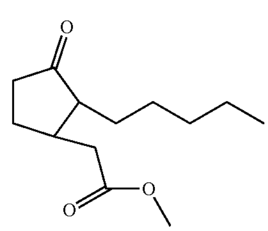

methyl 2-(3-oxo-2-(pentylcyclopentyl)acetate
Chemical Formula: $C_{13}H_{22}O_3$
Molecular Weight: 226.31
Methyl Dihydro Jasmonate -continued

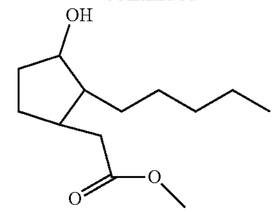

methyl 2-(3-hydroxy-2-pentylcyclopentyl)acetate
Chemical Formula: $C_{13}H_{24}O_3$
Molecular Weight: 228.33
Methyl Dihydro Jasmolate

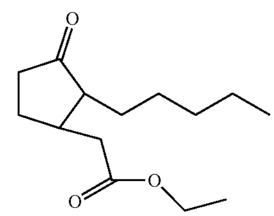

ethyl 2-(3-oxo-2-(pentylcyclopentyl)acetate
Chemical Formula: $C_{14}H_{24}O_3$
Molecular Weight: 240.34
Ethyl Dihydro Jasmonate

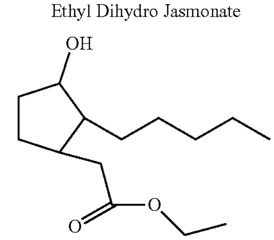

ethyl 2-(3-hydroxy-2-pentylcyclopentyl)acetate
Chemical Formula: $C_{14}H_{26}O_3$
Molecular Weight: 242.35
Ethyl Dihydro Jasmolate

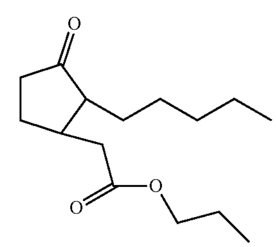

propyl 2-(3-oxo-2-pentylcyclopentyl)acetate
Chemical Formula: $C_{15}H_{26}O_3$
Molecular Weight: 254.37
Propyl Dihydro Jasmonate

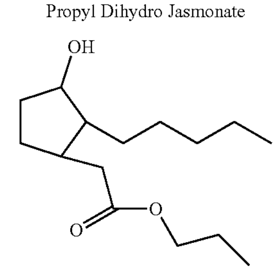

propyl 2-(3-hydroxy-2-pentylcyclopentyl)acetate
Chemical Formula: $C_{15}H_{28}O_3$
Molecular Weight: 256.38
Propyl Dihydro Jasmolate -continued

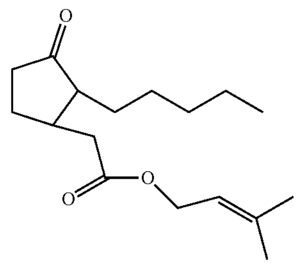

3-methylbut-2-enyl 2-(3-oxo-2-(pentylcyclopentyl)acetate
Chemical Formula: $C_{17}H_{28}O_3$
Molecular Weight: 280.40
Prenyl Dihydro Jasmonate

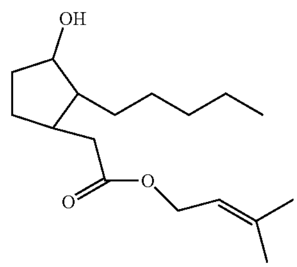

3-methylbut-2-enyl 2-(3-hydroxy-2-pentylcyclopentyl)acetate
Chemical Formula: $C_{17}H_{30}O_3$
Molecular Weight: 282.42
Prenyl Dihydro Jasmolate

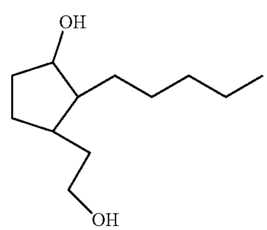

3-(2-hydroxyethyl)-2-pentylcyclopentanol
Chemical Formula: $C_{12}H_{24}O_2$
Molecular Weight: 200.32
MethylDihydroJasmodiol

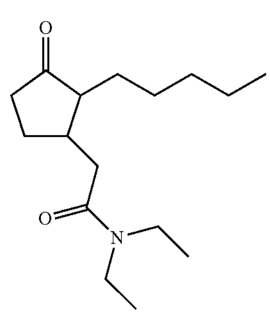

N,N-diethyl-2-(3-oxo-2-pentylcyclopentyl)acetamide
Chemical Formula: $C_{16}H_{29}NO_2$
Molecular Weight: 267.41
MDJ Amide -continued

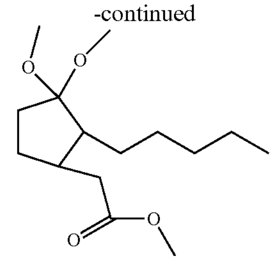

methyl 2-(3,3-dimethoxy-2-pentylcyclopentyl)acetate
Chemical Formula: $C_{15}H_{28}O_4$
Molecular Weight: 272.38
Methyl Dihydro Jasmonate Dimethyl Ketal

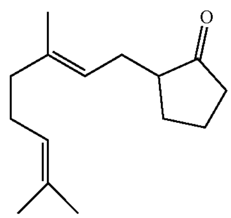

(E)-2-(3,7-dimethylocta-2,6-dienyl)cyclopentanone
Chemical Formula: $C_{15}H_{24}O$
Molecular Weight: 220.35
Apritone

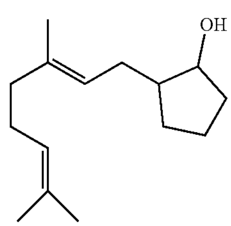

(E)-2-(3,7-dimethylocta-2,6-dienyl)cyclopentanol
Chemical Formula: $C_{15}H_{26}O$
Molecular Weight: 222.37
Apritol

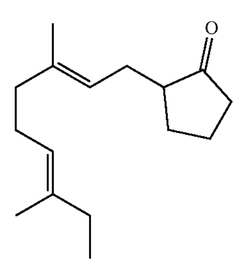

2-((2E,6E)-3,7-dimethylnona-2,6-dienyl)cyclopentanone
Chemical Formula: $C_{16}H_{26}O$
Molecular Weight: 234.38
Methyl Apritone -continued

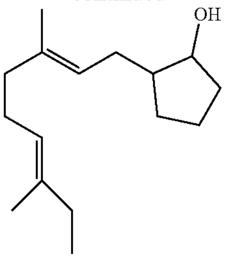

2-((2E,6E)-3,7-dimethylnona-2,6-dienyl)cyclopentanol
Chemical Formula: $C_{16}H_{28}O$
Molecular Weight: 226.39
Methyl Apritol

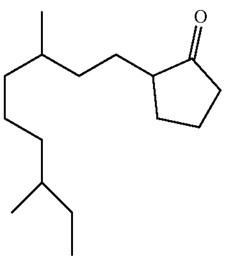

2-(3,7-dimethylnonyl)cyclopentanone
Chemical Formula: $C_{16}H_{30}O$
Molecular Weight: 238.41
Tetrahydromethyl Apritone

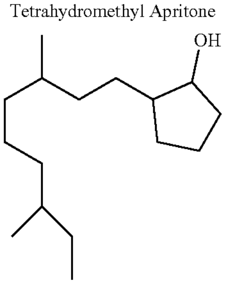

2-(3,7-dimethylnonyl)cyclopentanol
Chemical Formula: $C_{16}H_{32}O$
Molecular Weight: 240.42
Tetrahydromethyl Apritol

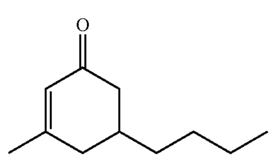

Chemical Formula: C11H18O
Molecular Weight: 166.26
3-methyl-5-butyl-2-cyclohexenone

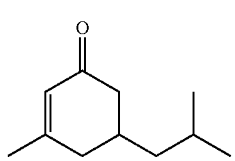

Chemical Formula: C11H18O
Molecular Weight: 166.26
3-methyl-5-isobutyl-2-cyclohexenone -continued

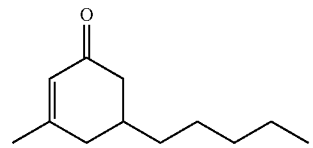

Chemical Formula: C12H20O
Molecular Weight: 180.29
3-methyl-5-pentyl-2-cyclohexenone

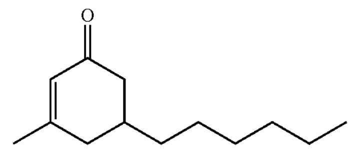

Chemical Formula: C13H22O
Molecular Weight: 194.31
3-methyl-5-hexyl-2-cyclohexenone

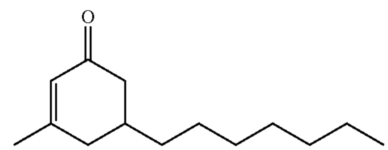

Chemical Formula: C14H24O
Molecular Weight: 208.34
3-methyl-5-heptyl-2-cyclohexenone

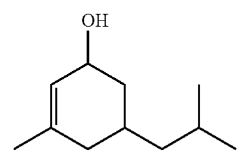

Chemical Formula: C11H20O
Molecular Weight: 168.28
3-methyl-5-isobutyl-2-cyclohexen-1-ol

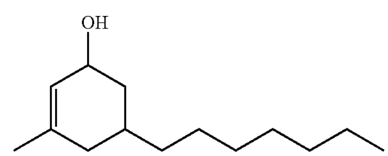

3-methyl-5-heptyl-2-cyclohexen-1-ol
Chemical Formula: C14H26O
Molecular Weight: 210.36

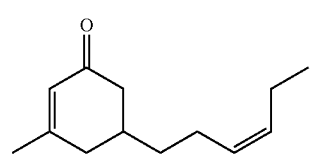

Chemical Formula: C13H20O
Molecular Weight: 192.30
3-methyl-5-(z-3-hexenyl)-2-cyclohexenone

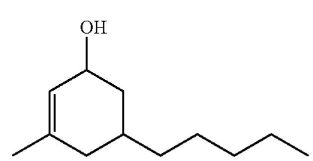

3-methyl-5-pentyl-2-cyclohexen-1-ol
Chemical Formula: C13H20O
Molecular Weight: 182.30

-continued

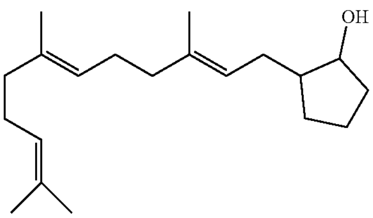

2-((2E,6E)-3,7,11-trimethyldodeca-2,6,10-trienyl)cyclopentanol
Chemical Formula: $C_{20}H_{34}O$
Molecular Weight: 290.48
Farnesylcyclopentanol

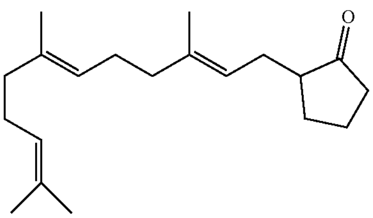

2-((2E,6E)-3,7,11-trimethyldodeca-2,6,10-trienyl)cyclopentanone
Chemical Formula: $C_{20}H_{32}O$
Molecular Weight: 288.47
Farnesylcyclopentanone

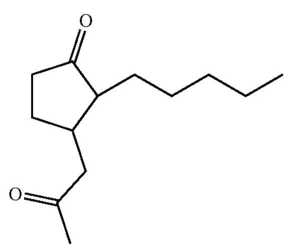

3-(2-oxopropyl)-2-pentylcyclopentanone
Chemical Formula: $C_{13}H_{22}O_2$
Molecular Weight: 210.31
Amyl Cyclopentanone Propanone

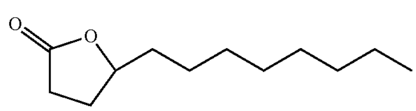

5-octyldihydrofuran-2(3H)-one
Chemical Formula: $C_{12}H_{22}O_2$
Molecular Weight: 198.30
gamma-dodecalactone

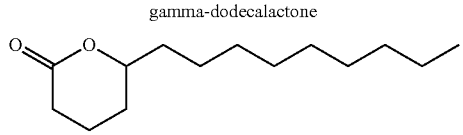

6-nontetrahydro-2H-pyran-2-one
Chemical Formula: $C_{14}H_{26}O_2$
Molecular Weight: 226.36
Delta-Tetradecalactone

Gamma Methyl Dodecalactone
2(3H)-Furanone, 5-octydihydro-5-methyl-

-continued

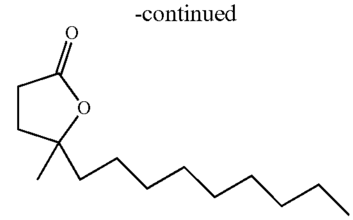

Gamma Methyl Dodecalactone
2(3H)-Furanone, 5-octydihydro-5-methyl-

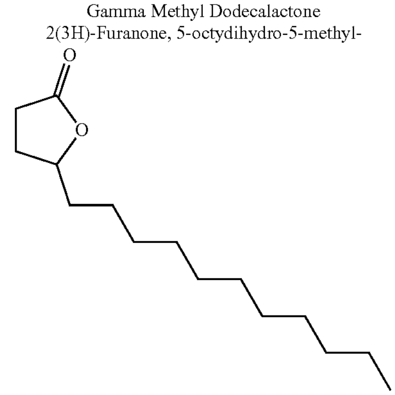

Chemical Formula: $C_{15}H_{28}O_2$
Molecular Weight: 240.38
Gamma Pentadecalactone

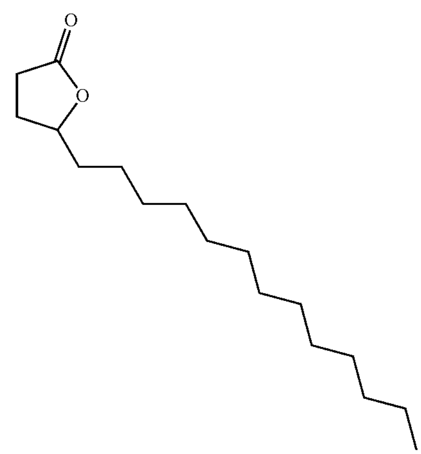

gamma Heptadecalactone
Chemical Formula: $C_{17}H_{32}O_2$
Molecular Weight: 268.24

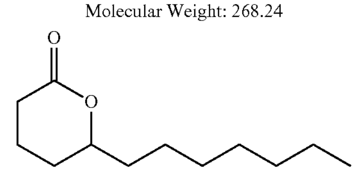

delta-Dodecalactone

Especially preferred compounds of structure (A) of compounds (a) include methyl apritone, methyl dihydrojasmonate, propyl dihydrojasmonate, gamma-dodecalactone, delta-dodecalactone, gamma-tridecalactone, gamma-tetradecalactone, gamma methyl dodecalactone, gamma methyl tridecalactone, 3-methyl-5-pentyl-2-cyclohexenone, 3-methyl-5-pentyl-2-cyclohexenol, 3-methyl-5-hexyl-2-cyclohexenone, and 3-methyl-5-heptyl-2-cyclohexenone.

Representative examples of carboxylic acids of compounds (a) include, but are not limited to, lactic acid, salicylic acid, geranic acid, citronellic acid, 3-methyl-2- decenoic acid, and any isomers thereof. Preferred carboxylic acids of compounds (a) include the following having the formula:

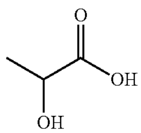

Lactic acid

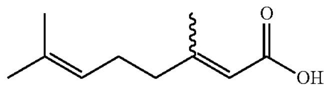

Geranic acid

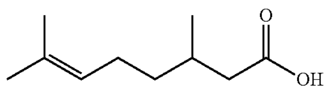

Citronellic Acid

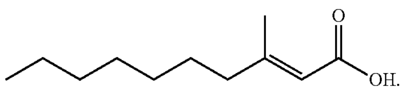

3-methyl-2-decenoic acid

Representative examples of esters of carboxylic acids of compounds (a) include, but are not limited to, methyl lactate, ethyl lactate, propyl lactate, butyl lactate, amyl lactate, isoamyl lactate, hexyl lactate, cis-3-hexenyl lactate, methyl geranate, ethyl geranate, isoamyl geranate, methyl citronellate, ethyl citronellate, methyl salicylate, ethyl salicylate, amyl salicylate, isoamyl salicylate, hexyl salicylate, cis-3-hexenyl salicylate, and any isomers thereof.

The synergistic formulations of this disclosure may be employed against any biting arthropod desired to be repelled or controlled. Such biting arthropods and insects include mosquitoes, bed bugs, biting flies, ticks, ants, fleas, biting midges, and spiders.

The synergistic formulations of compound (a) may be any combination that exhibits a synergistic effect against any biting arthropod to be repelled or controlled. Illustrative synergistic formulations of compound (a) include, for example, any combinations of (1) alkyl ketones, any combinations of (2) compounds of the structure (A), any combinations of (3) carboxylic acids, any combinations of (4) esters of carboxylic acids, any combinations between any of the (1) alkyl ketones, (2) compounds of the structure (A), (3) carboxylic acids, and/or (4) esters of carboxylic acids, and/or any combinations between any of the (1) alkyl ketones, (2) compounds of the structure (A), (3) carboxylic acids, and/or (4) esters of carboxylic acids and repellents DEET®, PMD, Picaridin, or other nitrogen containing repellents selected from amines, amides and nitrogen containing heterocyclic compounds.

The active compounds of the synergistic formulations may be formulated into any suitable formulations such as for example, including but not limited to, solutions, oils, creams, lotions, shampoos, aerosols or the like. Traditional inert carriers such as, including but not limited to, alcohols, esters and petroleum distillates, could be used to produce formulations of the active compounds to be used as repellent formulations. Another series of carriers are the biodegradable oils, including but not limited to, the Olestra® family of oils, isopropyl myristate and squalene.

When the formulation will be used as an aerosol, it is preferable to add a propellant. Suitable propellants include, but are not limited to, propane, butane, isobutane, dimethyl ether, carbon dioxide, nitrous oxide, nitrogen, and combinations thereof.

The total amount of active biting arthropod repellent compound utilized in any biting arthropod control or repellent formulation will depend upon the type of formulation used and the particular biting arthropod against which the formulation is employed but will generally range from about 0.1% to about 30% by weight in a carrier, or from about 0.5% to about 30% by weight in a carrier, or from about 0.5% to about 25% by weight in a carrier, or from about 0.5% to about 20% by weight in a carrier.

The active control compounds of the synergistic formulations may be applied to surfaces of or impregnated in clothing or fabric. The active ingredients may be applied to fabrics such as, but not limited to, mosquito nets. The amount of active material can be about 0.025 g/ft$^2$ to about 3.6 g/ft$^2$.

The synergistic formulations of active repellent ingredients may also be applied to outdoor materials such as, but not limited to, lawns, trees, shrubbery, or flooring to prevent the biting arthropods from resting there.

The formulations described above can be prepared by any convenient means, e.g., by mixing the active compound or active compounds with one or more other carriers or vehicles such as, including but not limited to, those described herein before.

Preferred embodiments of this disclosure are described in the following clauses.

1. A method for the control or repellency of biting arthropods, the method comprising bringing the biting arthropods into contact with a biting arthropod repellent formulation wherein the biting arthropod formulation comprises a synergistic formulation selected from:

(I) any synergistic combination of compounds (a), wherein compounds (a) are selected from the group consisting of: methyl jasmonate, methyl dihydrojasmonate, methyl dihydrojasmolate, ethyl dihydrojasmonate, ethyl dihydrojasmolate, propyl dihydrojasmonate, propyl dihydrojasmolate, prenyl dihydrojasmonate, prenyl dihydrojasmolate, methyl dihydrojasmodiol, methyl dihydrojasmonate amide, methyl dihydrojasmonate dimethyl ketal, apritone, apritol, methyl apritone, methyl apritol, tetrahydromethyl apritone, tetrahydromethyl apritol, 3-methyl-5-butyl-2-cyclohexenone, 3-methyl-5-isobutyl-2-cyclohexenone, 3-methyl-5-pentyl-2-cyclohexenone, 3-methyl-5-hexyl-2-cyclohexenone, 3-methyl-5-heptyl-2-cyclohexenone, 3-methyl-5-isobutyl-2-cyclohexen-1-ol, 3-methyl-5-heptyl-2-cyclohexen-1-ol, 3-methyl-5-(z-3-hexenyl)-2-cyclohexenone, 3-methyl-5-pentyl-2-cyclohexen-1-ol, farnesyl cyclopentanol, farnesyl cyclopentanone, amyl cyclopentanone propanone, gamma-dodecalactone, delta-dodecalactone, gamma-tridecalactone, gamma-tetradecalactone, delta-tetradecalactone, gamma methyl dodecalactone, gamma methyl tridecalactone, gamma-pentadecalactone, and gamma-heptadecalactone;

wherein the compounds (a) are present in an amount of at least about 0.01% by weight;

(II) any synergistic combination of one or more of the compounds (a) in combination with one or more of the repellents N,N-Diethyl-3-methylbenzamide, para-Menthane-3,8-diol (PMD), Picaridin, or other nitrogen containing repellents selected from amines, amides and nitrogen containing heterocyclic compounds;

wherein the one or more of the repellents N,N-Diethyl-3-methylbenzamide, PMD, Picaridin or other nitrogen containing repellents, and the one or more compounds (a) are present in an amount from about 0.5 to about 25% by weight or greater, and in a weight ratio of the one or more repellents N,N-Diethyl-3-methylbenzamide, PMD, Picaridin or other nitrogen containing repellents to the one or more compounds (a) from about 0.1:4 to about 4:0.1; and wherein the synergistic formulation comprising a combination of compounds and/or repellants of (I) or (II) produces, when biting arthropods are brought into contact with the synergistic formulation, a combined control or repellency of the biting arthropod effect from the combination of compounds and/or repellants of (I) or (II), greater than the sum of the separate control or repellency of biting arthropod effects from the separate compounds and/or repellants of (I) or (II), at essentially the same concentrations.

2. A method for the control or repellency of biting arthropods, the method comprising bringing the biting arthropods into contact with a biting arthropod repellent formulation wherein the biting arthropod formulation comprises a synergistic formulation selected from:

(I) any synergistic combination of compounds (a), wherein compounds (a) are selected from the group consisting of:

geranyl acetone (6,10-dimethyl-5,9-undecadien-2-one), farnesyl acetone (5,9,13-pentadecatrien-2-one), 6,10,14-trimethyl-)methyl undecyl ketone (2-tridecanone), methyl decyl ketone (2-dodecanone), alpha-ionone (4-(2,6,6-trimethyl-2-cyclohexenyl)-3-buten-2-one), beta ionone (4-(2,6,6-trimethyl-1-cyclohexenyl)-3-buten-2-one), alpha-isomethylionone (3-methyl-4-(2,6,6-trimethyl-2-cyclohexen-1-yl)-3-buten-2-one), isobutylionone ((E)-5-methyl-1-(2,6,6-trimethyl-1-cyclohex-2-enyl) hex-1-en-3-one), isolongifolen-9-one ((1R)-2,2,7,7-tetramethyltricyclo[6.2.1.01,6] undec-5-en-4-one), dimethylionone ((E)-2-methyl-1-(2,2,6-trimethyl-1-cyclohex-3-enyl)pent-1-en-3-one), isolongifolanone (2,2,7,7-tetramethyltricyclo [6.2.1.01,6]undecan-5-one), pseudoionone (6,10-dimethyl-3,5,9-undecatrien-2-one), 2-cyclopentylcyclopentanone, methyl nonyl ketone (2-undecanone), and 3-decen-2-one; apritone, methyl apritone, methyl dihydrojasmonate, methyl dihydrojasmolate, propyl dihydrojasmonate, gamma-dodecalactone, delta-dodecalactone, gamma-tridecalactone, gamma-tetradecalactone, gamma methyl dodecalactone, gamma methyl tridecalactone, 3-methyl-5-pentyl-2-cyclohexenone, 3-methyl-5-pentyl-2-cyclohexenol, 3-methyl-5-hexyl-2-cyclohexenone, 3-methyl-5-heptyl-2-cyclohexenone, and nootkatone; lactic acid, salicylic acid, geranic acid, citronellic acid, 3-methyl-2-decenoic acid, and any isomers thereof; methyl lactate, ethyl lactate, propyl lactate, butyl lactate, amyl lactate, isoamyl lactate, hexyl lactate, cis-3-hexenyl lactate, methyl geranate, ethyl geranate, isoamyl geranate, methyl citronellate, ethyl citronellate, methyl salicylate, ethyl salicylate, amyl salicylate, isoamyl salicylate, hexyl salicylate, cis-3-hexenyl salicylate, and any isomers thereof;

wherein the compounds (a) are present in an amount of at least about 0.01% by weight;

(II) any synergistic combination of one or more of the compounds (a) in combination with one or more of the repellents N,N-Diethyl-3-methylbenzamide, para-Menthane-3,8-diol (PMD), Picaridin, or other nitrogen containing repellents selected from amines, amides and nitrogen containing heterocyclic compounds;

wherein the one or more of the repellents N,N-Diethyl-3-methylbenzamide, PMD, Picaridin or other nitrogen containing repellents, and the one or more compounds (a) are present in an amount from about 0.5 to about 25% by weight or greater, and in a weight ratio of the one or more repellents N,N-Diethyl-3-methylbenzamide, PMD, Picaridin or other nitrogen containing repellents to the one or more compounds (a) from about 0.1:4 to about 4:0.1; and wherein the synergistic formulation comprising a combination of compounds and/or repellants of (I) or (II) produces, when biting arthropods are brought into contact with the synergistic formulation, a combined control or repellency of the biting arthropod effect from the combination of compounds and/or repellants of (I) or (II), greater than the sum of the separate control or repellency of biting arthropod effects from the separate compounds and/or repellants of (I) or (II), at essentially the same concentrations.

3. The method of clause 2 wherein the synergistic formulation comprises: lactic acid in combination with one or more compounds (a), and one or more of the repellents N,N-Diethyl-3-methylbenzamide, PMD, Picaridin, or other nitrogen containing repellents selected from amines, amides and nitrogen containing heterocyclic compounds.

4. The method of clause 2 wherein the synergistic formulation comprises: geranyl acetone in combination with one or more compounds (a); or geranyl acetone in combination one or more of the repellents N,N-Diethyl-3-methylbenzamide, PMD, Picaridin, or other nitrogen containing repellents selected from amines, amides and nitrogen containing heterocyclic compounds.

5. The method of clause 2 wherein the synergistic formulation comprises: gamma or delta dodecalactone in combination with one or more compounds (a); or gamma or delta dodecalactone in combination one or more of the repellents N,N-Diethyl-3-methylbenzamide, PMD, Picaridin, or other nitrogen containing repellents selected from amines, amides and nitrogen containing heterocyclic compounds.

6. The method of clause 1 wherein the synergistic formulation comprises: two or more repellents N,N-Diethyl-3-methylbenzamide, PMD, Picaridin, or other nitrogen containing repellents selected from amines, amides and nitrogen containing heterocyclic compounds.

7. A biting arthropod repellent formulation consisting essentially of a synergistic formulation selected from:

(I) any synergistic combination of compounds (a), wherein compounds (a) are selected from the group consisting of: of methyl jasmonate, methyl dihydrojasmonate, methyl dihydrojasmolate, ethyl dihydrojasmonate, ethyl dihydrojasmolate, propyl dihydrojasmonate, propyl dihydrojasmolate, prenyl dihydrojasmonate, prenyl dihydrojasmolate, methyl dihydrojasmodiol, methyl dihydrojasmonate amide, methyl dihydrojasmonate dimethyl ketal, apritone, apritol, methyl apritone, methyl apritol, tetrahydromethyl apritone, tetrahydromethyl apritol, 3-methyl-5-butyl-2-cyclohexenone, 3-methyl-5-isobutyl-2-cyclohexenone, 3-methyl-5-pentyl-2-cyclohexenone, 3-methyl-5-hexyl-2-cyclohexenone, 3-methyl-5-heptyl-2-cyclohexenone, 3-methyl-5-isobutyl-2-cyclohexen-1-ol, 3-methyl-5-heptyl-2-cyclohexen-1-ol, 3-methyl-5-(z-3-hexenyl)-2-cyclohexenone, 3-methyl-5-pentyl-2-cyclohexen-1-ol, farnesyl cyclopentanol, farnesyl cyclopentanone, amyl cyclopentanone propanone, gamma-dodecalactone, delta-dodecalactone, gamma-tridecalactone, gamma-tetradecalactone, delta-tetradecalactone, gamma methyl dodecalactone, gamma methyl tridecalactone, gamma-pentadecalactone, and gamma-heptadecalactone;

wherein the compounds (a) are present in an amount of at least about 0.01% by weight;

(II) any synergistic combination of one or more of the compounds (a) in combination with one or more of the repellents N,N-Diethyl-3-methylbenzamide, para-Menthane-3,8-diol (PMD), Picaridin, or other nitrogen containing repellents selected from amines, amides and nitrogen containing heterocyclic compounds;

wherein one or more of the repellents N,N-Diethyl-3-methylbenzamide, PMD, Picaridin or other nitrogen containing repellents, and the one or more compounds (a) are present in an amount from about 0.5 to about 25% by weight or greater, and in a weight ratio of the one or more repellents N,N-Diethyl-3-methylbenzamide, PMD, Picaridin or other nitrogen containing repellents to the one or more compounds (a) from about 0.1:4 to about 4:0.1; and wherein the synergistic formulation comprising a combination of compounds and/or repellants of (I) or (II) produces, when biting arthropods are brought into contact with the synergistic formulation, a combined control or repellency of the biting arthropod effect from the combination of compounds and/or repellants of (I) or (II), greater than the sum of the separate control or repellency of biting arthropod effects from the separate compounds and/or repellants of (I) or (II), at essentially the same concentrations.

8. A biting arthropod repellent formulation consisting essentially of a synergistic formulation selected from:

(I) any synergistic combination of compounds (a), wherein compounds (a) are selected from the group consisting of:

geranyl acetone (6,10-dimethyl-5,9-undecadien-2-one), farnesyl acetone (5,9,13-pentadecatrien-2-one), 6,10,14-trimethyl-)methyl undecyl ketone (2-tridecanone), methyl decyl ketone (2-dodecanone), alpha-ionone (4-(2,6,6-trimethyl-2-cyclohexenyl)-3-buten-2-one), beta ionone (4-(2,6,6-trimethyl-1-cyclohexenyl)-3-buten-2-one), alpha-isomethylionone (3-methyl-4-(2,6,6-trimethyl-2-cyclohexen-1-yl)-3-buten-2-one), isobutylionone ((E)-5-methyl-1-(2,6,6-trimethyl-1-cyclohex-2-enyl) hex-1-en-3-one), isolongifolen-9-one ((1R)-2,2,7,7-tetramethyltricyclo[6.2.1.01,6] undec-5-en-4-one), dimethylionone ((E)-2-methyl-1-(2,2,6-trimethyl-1-cyclohex-3-enyl)pent-1-en-3-one), isolongifolanone (2,2,7,7-tetramethyltricyclo [6.2.1.01,6]undecan-5-one), pseudoionone (6,10-dimethyl-3,5,9-undecatrien-2-one), 2-cyclopentylcyclopentanone, methyl nonyl ketone (2-undecanone), and 3-decen-2-one; apritone, methyl apritone, methyl dihydrojasmonate, methyl dihydrojasmolate, propyl dihydrojasmonate, gamma-dodecalactone, delta-dodecalactone, gamma-tridecalactone, gamma-tetradecalactone, gamma methyl dodecalactone, gamma methyl tridecalactone, 3-methyl-5-pentyl-2-cyclohexenone, 3-methyl-5-pentyl-2-cyclohexenol, 3-methyl-5-hexyl-2-cyclohexenone, 3-methyl-5-heptyl-2-cyclohexenone, and nootkatone; lactic acid, salicylic acid, geranic acid, citronellic acid, 3-methyl-2-decenoic acid, and any isomers thereof; methyl lactate, ethyl lactate, propyl lactate, butyl lactate, amyl lactate, isoamyl lactate, hexyl lactate, cis-3-hexenyl lactate, methyl geranate, ethyl geranate, isoamyl geranate, methyl citronellate, ethyl citronellate, methyl salicylate, ethyl salicylate, amyl salicylate, isoamyl salicylate, hexyl salicylate, cis-3-hexenyl salicylate, and any isomers thereof;

wherein the compounds (a) are present in an amount of at least about 0.01% by weight;

(II) any synergistic combination of one or more of the compounds (a) in combination with one or more of the repellents N,N-Diethyl-3-methylbenzamide, para-Menthane-3,8-diol (PMD), Picaridin, or other nitrogen containing repellents selected from amines, amides and nitrogen containing heterocyclic compounds;

wherein the one or more of the repellents N,N-Diethyl-3-methylbenzamide, PMD, Picaridin or other nitrogen containing repellents, and the one or more compounds (a) are present in an amount from about 0.5 to about 25% by weight or greater, and in a weight ratio of the one or more repellents N,N-Diethyl-3-methylbenzamide, PMD, Picaridin or other nitrogen containing repellents to the one or more compounds (a) from about 0.1:4 to about 4:0.1; and wherein the synergistic formulation comprising a combination of compounds and/or repellants of (I) or (II) produces, when biting arthropods are brought into contact with the synergistic formulation, a combined control or repellency of the biting arthropod effect from the combination of compounds and/or repellants of (I) or (II), greater than the sum of the separate control or repellency of biting arthropod effects from the separate compounds and/or repellants of (I) or (II), at essentially the same concentrations.

9. The formulation of clause 8 wherein the synergistic formulation comprises: lactic acid in synergistic combination with one or more compounds (a), and one or more of the repellents N,N-Diethyl-3-methylbenzamide, PMD, Picaridin, or other nitrogen containing repellents selected from amines, amides and nitrogen containing heterocyclic compounds.

10. The formulation of clause 8 wherein the synergistic formulation comprises: geranyl acetone in synergistic combination with one or more compounds (a); or geranyl acetone in synergistic combination one or more of the repellents N,N-Diethyl-3-methylbenzamide, PMD, Picaridin, or other nitrogen containing repellents selected from amines, amides and nitrogen containing heterocyclic compounds.

11. The formulation of clause 8 wherein the synergistic formulation comprises: gamma or delta dodecalactone in synergistic combination with one or more compounds (a); or gamma or delta dodecalactone in synergistic combination one or more of the repellents N,N-Diethyl-3-methylbenzamide, PMD, Picaridin, or other nitrogen containing repellents selected from amines, amides and nitrogen containing heterocyclic compounds.

12. The formulation of clause 7 wherein the amount of N,N-Diethyl-3-methylbenzamide and one or more compounds (a) in an effective dose required to repel about 100% of a biting arthropod is less than the amount of N,N-Diethyl-3-methylbenzamide alone in an effective dose required to repel about 100% of the biting arthropod.

13. The formulation of clause 12 wherein N,N-Diethyl-3-methylbenzamide and one or more compounds (a) are present in an amount from about 2.5 to about 20% by weight, and in a weight ratio of N,N-Diethyl-3-methylbenzamide to one or more compounds (a) from about 0.2:1 to about 1:0.2.

14. The formulation of clause 12 wherein N,N-Diethyl-3-methylbenzamide and one or more compounds (a) are present in an amount from about 5 to about 15% by weight, and in a weight ratio of N,N-Diethyl-3-methylbenzamide to one or more compounds (a) from about 0.3:1 to about 1:0.3.

15. The formulation of clause 12 wherein N,N-Diethyl-3-methylbenzamide and one or more compounds (a) are present in an amount from about 10 to about 25% by weight or greater, and in a weight ratio of N,N-Diethyl-3-methylbenzamide to one or more compounds (a) from about 0.1:2 to about 2:0.1.

16. The formulation of clause 7 wherein the amount of PMD and one or more compounds (a) in an effective dose required to repel about 100% of a biting arthropod is less than the amount of PMD alone in an effective dose required to repel about 100% of the biting arthropod.

17. The formulation of clause 16 wherein PMD and one or more compounds (a) are present in an amount from about 2.5 to about 20% by weight, and in a weight ratio of PMD to one or more compounds (a) from about 0.2:1 to about 1:0.2.

18. The formulation of clause 16 wherein PMD and one or more compounds (a) are present in an amount from about 5 to about 15% by weight, and in a weight ratio of PMD to one or more compounds (a) from about 0.3:1 to about 1:0.3.

19. The formulation of clause 7 wherein the amount of Picaridin and one or more compounds (a) in an effective dose required to repel about 100% of a biting arthropod is less than the amount of Picaridin alone in an effective dose required to repel about 100% of the biting arthropod.

20. The formulation of clause 19 wherein Picaridin and one or more compounds (a) are present in an amount from about 2.5 to about 20% by weight, and in a weight ratio of Picaridin to one or more compounds (a) from about 0.2:1 to about 1:0.2.

21. The formulation of clause 19 wherein Picaridin and one or more compounds (a) are present in an amount from about 5 to about 15% by weight, and in a weight ratio of Picaridin to one or more compounds (a) from about 0.3:1 to about 1:0.3.

22. The formulation of clause 7 wherein the amount of a nitrogen containing repellent selected from an amine, amide and nitrogen containing heterocyclic compound, and one or more compounds (a) in an effective dose required to repel about 100% of a biting arthropod is less than the amount of nitrogen containing repellent alone in an effective dose required to repel about 100% of the biting arthropod.

23. The formulation of clause 22 wherein the nitrogen containing repellent and one or more compounds (a) are present in an amount from about 2.5 to about 20% by weight, and in a weight ratio of nitrogen containing repellent to one or more compounds (a) from about 0.2:1 to about 1:0.2.

24. The formulation of clause 22 wherein the nitrogen containing repellent and one or more compounds (a) are present in an amount from about 5 to about 15% by weight, and in a weight ratio of nitrogen containing repellent to one or more compounds (a) from about 0.3:1 to about 1:0.3.

25. The formulation of clause 8 wherein the amount of N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, in an effective dose required to repel about 100% of a biting arthropod is less than the amount of N,N-Diethyl-3-methylbenzamide alone in an effective dose required to repel about 100% of the biting arthropod.

26. The formulation of clause 25 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 0.5 to about 25% by weight, and in a weight ratio of N,N-Diethyl-3-methylbenzamide to one or more compounds (a) from about 0.1:2 to about 2:0.1.

27. The formulation of clause 25 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 2.5 to about 20% by weight, and in a weight ratio of N,N-Diethyl-3-methylbenzamide to one or more compounds (a) from about 0.2:1 to about 1:0.2.

28. The formulation of clause 25 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 5 to about 15% by weight, and in a weight ratio of N,N-Diethyl-3-methylbenzamide to one or more compounds (a) from about 0.3:1 to about 1:0.3.

29. The formulation of clause 8 wherein the amount of PMD and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, in an effective dose required to repel about 100% of a biting arthropod is less than the amount of PMD alone in an effective dose required to repel about 100% of the biting arthropod.

30. The formulation of clause 29 wherein PMD and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 0.5 to about 25% by weight, and in a weight ratio of PMD to one or more compounds (a) from about 0.1:2 to about 2:0.1.

31. The formulation of clause 30 wherein PMD and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 2.5 to about 20% by weight, and in a weight ratio of PMD to one or more compounds (a) from about 0.2:1 to about 1:0.2.

32. The formulation of clause 307 wherein PMD and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 5 to about 15% by weight, and in a weight ratio of PMD to one or more compounds (a) from about 0.3:1 to about 1:0.3.

33. The formulation of clause 8 wherein the amount of Picaridin and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, in an effective dose required to repel about 100% of a biting arthropod is less than the amount of Picaridin alone in an effective dose required to repel about 100% of the biting arthropod.

34. The formulation of clause 33 wherein Picaridin and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 0.5 to about 25% by weight, and in a weight ratio of Picaridin to one or more compounds (a) from about 0.1:2 to about 2:0.1.

35. The formulation of clause 33 wherein Picaridin and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 2.5 to about 20% by weight, and in a weight ratio of Picaridin to one or more compounds (a) from about 0.2:1 to about 1:0.2.

36. The formulation of clause 33 wherein Picaridin and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 5 to about 15% by weight, and in a weight ratio of Picaridin to one or more compounds (a) from about 0.3:1 to about 1:0.3.

37. The formulation of clause 8 wherein the amount of a nitrogen containing repellent selected from an amine, amide and nitrogen containing heterocyclic compound, and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, in an effective dose required to repel about 100% of a biting arthropod is less than the amount of nitrogen containing repellent alone in an effective dose required to repel about 100% of the biting arthropod.

38. The formulation of clause 37 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 0.5 to about 25% by weight, and in a weight ratio of nitrogen containing repellent to one or more compounds (a) from about 0.1:2 to about 2:0.1.

39. The formulation of clause 37 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 2.5 to about 20% by weight, and in a weight ratio of nitrogen containing repellent to one or more compounds (a) from about 0.2:1 to about 1:0.2.

40. The formulation of clause 37 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, apritone, methyl apritone, lactic acid, 3-methyl-5-propyl-2-cyclohexenone, 3-methyl-5-butyl-2-cyclohexenone, 3-methyl-5-pentyl-2-cyclohexenone, 3-methyl-5-hexyl-2-cyclohexenone, and nootkatone, are present in an amount from about 5 to about 15% by weight, and in a weight ratio of nitrogen containing repellent to one or more compounds (a) from about 0.3:1 to about 1:0.3.

41. The formulation of clause 8 wherein the amount of N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, and lactic acid, in an effective dose required to repel about 100% of a biting arthropod is less than the amount of N,N-Diethyl-3-methylbenzamide alone in an effective dose required to repel about 100% of the biting arthropod.

42. The formulation of clause 41 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 0.5 to about 25% by weight, and in a weight ratio of N,N-Diethyl-3-methylbenzamide to one or more compounds (a) from about 0.1:2 to about 2:0.1.

43. The formulation of clause 41 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 2.5 to about 20% by weight, and in a weight ratio of N,N-Diethyl-3-methylbenzamide to one or more compounds (a) from about 0.2:1 to about 1:0.2.

44. The formulation of clause 41 wherein N,N-Diethyl-3-methylbenzamide and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 5 to about 15% by weight, and in a weight ratio of N,N-Diethyl-3-methylbenzamide to one or more compounds (a) from about 0.3:1 to about 1:0.3.

45. The formulation of clause 8 wherein the amount of PMD and one or more compounds (a) in an effective dose required to repel about 100% of a biting arthropod is less than the amount of PMD alone in an effective dose required to repel about 100% of the biting arthropod.

46. The formulation of clause 457 wherein PMD and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 0.5 to about 25% by weight, and in a weight ratio of PMD to one or more compounds (a) from about 0.1:2 to about 2:0.1.

47. The formulation of clause 45 wherein PMD and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 2.5 to about 20% by weight, and in a weight ratio of PMD to one or more compounds (a) from about 0.2:1 to about 1:0.2.

48. The formulation of clause 45 wherein PMD and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 5 to about 15% by weight, and in a weight ratio of PMD to one or more compounds (a) from about 0.3:1 to about 1:0.3.

49. The formulation of clause 8 wherein the amount of Picaridin and one or more compounds (a) selected from the group consisting of propyl dihydrojasmonate, methyl dihydrojasmonate, methyl dihydrojasmolate, gamma-dodecalactone, delta-dodecalactone, and lactic acid, in an effective dose required to repel about 100% of a biting arthropod is less than the amount of Picaridin alone in an effective dose required to repel about 100% of the biting arthropod.

50. The formulation of clause 49 wherein Picaridin and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 0.5 to about 25% by weight, and in a weight ratio of Picaridin to one or more compounds (a) from about 0.1:2 to about 2:0.1.

51. The formulation of clause 49 wherein Picaridin and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 2.5 to about 20% by weight, and in a weight ratio of Picaridin to one or more compounds (a) from about 0.2:1 to about 1:0.2.

52. The formulation of clause 49 wherein Picaridin and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 5 to about 15% by weight, and in a weight ratio of Picaridin to one or more compounds (a) from about 0.3:1 to about 1:0.3.

53. The formulation of clause 8 wherein the amount of a nitrogen containing repellent selected from an amine, amide and nitrogen containing heterocyclic compound, and one or more compounds (a) selected from the group consisting of propyl dihydrojasmonate, methyl dihydrojasmonate, methyl dihydrojasmolate, gamma-dodecalactone, delta-dodecalactone, and lactic acid, in an effective dose required to repel about 100% of a biting arthropod is less than the amount of nitrogen containing repellent alone in an effective dose required to repel about 100% of the biting arthropod.

54. The formulation of clause 53 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 0.5 to about 25% by weight, and in a weight ratio of nitrogen containing repellent to one or more compounds (a) from about 0.1:2 to about 2:0.1.

55. The formulation of clause 53 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 2.5 to about 20% by weight, and in a weight ratio of nitrogen containing repellent to one or more compounds (a) from about 0.2:1 to about 1:0.2.

56. The formulation of clause 53 wherein the nitrogen containing repellent and one or more compounds (a) selected from the group consisting of propyl dihydrojasmonate, methyl dihydrojasmonate, methyl dihydrojasmolate, gamma-dodecalactone, delta-dodecalactone, and lactic acid, are present in an amount from about 5 to about 15% by weight, and in a weight ratio of nitrogen containing repellent to one or more compounds (a) from about 0.3:1 to about 1:0.3.

57. The method of clause 1 wherein the combined control or repellency of the biting arthropod effect, and the separate control or repellency of biting arthropod effects, are repellency or protection time.

58. The method of clause 2 wherein the combined control or repellency of the biting arthropod effect, and the separate control or repellency of biting arthropod effects, are repellency or protection time.

59. The formulation of clause 7 wherein the combined control or repellency of the biting arthropod effect, and the separate control or repellency of biting arthropod effects, are repellency or protection time.

60. The formulation of clause 8 wherein the combined control or repellency of the biting arthropod effect, and the separate control or repellency of biting arthropod effects, are repellency or protection time.

While the disclosure has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

EXAMPLES

Dose response curves were generated for both standard repellents as well as compounds of this disclosure.

Stage 1: Laboratory Screening

A modified K & D chamber or "Gupta Box" was used to screen 4 compounds plus an untreated control, simultaneously. Five replicates of 250 adult female mosquitoes each were placed in clear plastic cages (Gupta boxes) with access to five warmed, blood-filled, membrane-covered wells. The mosquitoes used were *Aedes aegypti*. Membranes were treated with repellent dilutions or diluent only. Five replicates were tested, rotating positions within the chamber. Each replicate used a fresh batch of mosquitoes, blood and treated membranes. The number of mosquitoes probing each well was recorded at two minute intervals for 20 minutes. The total numbers of probes on each well were tallied at the end of the observation period and the average percentage repellency relative to the control was calculated for each formulation.

To compare formulations from different tests, the control probes were adjusted to 100 for each test and the formula then applied to each formulation to adjust accordingly.

Stage 2: "Arm in Cage" Testing

A Modified WHO—Nigel Hill protocol was used for Dose Response curve generation. Three concurrent repetitions were conducted with 4 subjects (2 male, 2 female). Approximately 60 non blood-fed, female *Aedes aegypti* mosquitoes were placed in a 12"×12"×12" (28316.85 $cm^3$) plexi and screen cage.

Subjects had an area of approximately 230 $cm^2$ marked off, between wrist and elbow, which was treated at a rate of ~1.56 $\mu L/cm^2$. Arms were inserted into the first cage for 30 seconds, with number of landings (with intent to bite) recorded at the end of the time interval. The same procedure was used for the 2nd and 3rd cage in succession. Control arm was inserted first, followed by the opposite arm treated with ethanol only (as a treatment control). The 'treatment arm' is then treated with dose 1 and inserted, then dose 2, dose 3, and so on. After complete protection was achieved, control arm was reinserted to verify continued activity.

Percent repellency was calculated by utilizing the formula [{(C-T)/C}*100]. Where C=the number of mosquitoes landing with intent to bite on the ethanol only treated arm, and T=the number of mosquitoes landing with intent to bite on the 'repellent' treated arm. LDP Line® software (Bakr, E 2007) was used to determine ED50 (effective dose to repel 50%) and compare materials.

Determination of Synergy:

Following the Definition of Synergy (the interaction or cooperation of two or more organizations, substances, or other agents to produce a combined effect greater than the sum of their separate effects), an 'additive measure' was used to determine synergy in the laboratory testing, as well as in the human testing. To determine significant differences between treatments, we used the Log Dose Probit method and generated LDP lines (for human dose response curves) to determine the ED50 (the effective dose required to achieve 50% repellency) of individual compounds and then we combined the compounds to determine if significantly less amount of material was needed to create the same effect. Significance was determined by the use of 95% confidence intervals. If confidence intervals did not overlap, there was a significant difference in treatments.

For laboratory testing, additive repellency was determined by adding the adjusted percent repellency for each dose used in the combination treatment. This "Expected additive repellency" was then compared to the "actual repellency" seen when the combination was tested in the Gupta box.

For human testing, the LDP Line software was used to determine "additive repellency" differences. After generating the dose response curves, we combined the percent dose required to generate an ED25 (25% repellency) for each of the individual components and entered that % dose (i.e., 0.035% DEET+0.128% PMD=0.163%) into the dose response curve (using the LDP Line program) for the combination to determine if the addition of the two materials would be less than, greater than or equal to theoretical additive repellency number of 50%.

FIG. 1 shows the results of laboratory testing for additive repellency of certain combinations of compounds in accordance with this disclosure.

FIG. 2 shows the results of human testing for dose response curves of certain individual compounds in accordance with this disclosure.

FIG. 3 shows the results of human testing for dose response curves of certain combinations of compounds in accordance with this disclosure.

FIG. 4 shows the results of ED50 comparisons of certain combinations of compounds, based on the dose of DEET or PMD, in accordance with this disclosure. For both DEET and PMD, when compounds of this disclosure were added to the conventional repellent, the ED50 was significantly decreased; indicating that greater repellency was achieved with significantly less of the conventional repellent. This was also true for the combination of the two conventional repellents, DEET+PMD.

FIG. 5 shows the results of additive comparisons of certain combinations of compounds, based on the dose of DEET or PMD, in accordance with this disclosure. LDP Line software was used to determine "additive repellency" differences. After generating the dose response curves, the percent dose required to generate an ED25 (25% repellency) for each of the individual components was combined and that % dose (i.e. 0.035% DEET+0.128% PMD=0.163%) entered into the dose response curve (using the LDP Line program) for the combination to determine if the addition of the two materials would be less than, greater than or equal to the theoretical additive repellency number of 50%. For both DEET and PMD, when compounds of this disclosure were added to the conventional repellent, the additive effect was greater than the theoretical 50% 'expected' by the addition of the doses that generated 25% repellency. This was also true for the combination of the two conventional repellents, DEET+PMD.

Additional experimental data shows the control and repellency results for biting arthropods (i.e., biting flies, ticks, bed bugs, mosquitoes, biting midges, mites and lice) of synergistic and additive comparisons of certain combinations of compounds.

In particular, FIGS. 6-37 show experimental data for the synergistic control and repellency of specified biting arthropods (i.e., biting flies, ticks, bed bugs, mosquitoes, and biting midges) using synergistic biting arthropod control or repellent formulations having specified combinations of two or more of methyl dihydrojasmolate, propyl dihydrojasmolate, methyl dihydrojasmonate, propyl dihydrojasmonate, delta-dodecalactone, gamma-dodecalactone, apritone, methyl apritone, lactic acid, DEET, Picaridin, para-menthane-3,8-diol, and IR3535 (i.e., a nitrogen containing repellent), in accordance with this disclosure. The synergistic combinations are present in an amount from about 0.5% by weight to about 20% by weight, based on the total weight of the synergistic biting arthropod control or repellent formulation. FIGS. 6-37 also show comparative experimental data for the additive control and repellency of specified biting arthropods (i.e., mites and lice).

Also, in particular, FIGS. 38-48 show comparative experimental data for the additive control and repellency of specified biting arthropods (i.e., biting flies, ticks, bed bugs, mosquitoes, and biting midges) using additive biting arthropod control or repellent formulations having specified combinations of two or more of hexyl apritone, delta-valerolactone, gamma-butyrolactone, undecyl dihydrojasmonate, undecyl dihydrojasmolate, acetic acid, arachidic acid, methyl dihydrojasmolate, propyl dihydrojasmolate, propyl dihydrojasmonate, delta-dodecalactone, gamma-dodecalactone, apritone, lactic acid, DEET, Picaridin, para-menthane-3,8-diol, and IR3535 (i.e., a nitrogen containing repellent). The additive combinations are present in an amount of less than 0.5% by weight or greater than 20% by weight, based on the total weight of the additive biting arthropod control or repellent formulation. FIGS. 38-48 also show comparative experimental data for the additive control and repellency of specified biting arthropods (i.e., mites and lice).

Biting Flies

The following test protocol is employed to demonstrate the efficacy of compounds used to control or repel biting flies (e.g., sand flies, stable flies and house flies). Five replicates of 100 mixed-sex flies each are placed in screened cages. The cages are placed in such a way that the flies have access to five warmed, blood-filled membrane walls. The membranes are treated with the indicated compounds at the indicated concentrations in isopropyl alcohol, or isopropyl alcohol as a control. There are five replicates for testing with a positional rotation of the repellent at each replicate. Fresh batches of flies are used for each replicate. Thus each test sample is tested on each of the five wells, which allows any positional bias to be eliminated. The number of flies probing each well is recorded at two minute intervals for twenty minutes. The total number of probes on each well are tallied at the end of the twenty minute observation period and the average percentage repellency is calculated for each compound. An analysis of variance is conducted to compare the average number of probes on each treatment membrane. The number of probes for the control is taken as the 100% baseline and the percentage for the test compounds is the percent for the number of probes for the test compound compared to the number of control probes. FIGS. 6-48 show the overall repellency results of the compounds tested.

Further, to demonstrate the efficacy of compounds used to control or repel biting flies (e.g., sand flies, stable flies and house flies), another test procedure is used in which three replicates of 50 flies are released into 1×1×1 ft. screened cages. The bottom of each cage is lined with brown craft paper and divided into 4 equal quadrants. Each quadrant houses a makeshift filter paper food tray. Two of the four filter papers are treated with repellent and two treated with isopropanol. Control cages contain filter papers that are treated with 4 filter papers of isopropanol only. The number of flies resting on filter paper per quadrant is recorded every 30 minutes for a total of 6 hours. Cages are rotated to eliminate positional bias. FIGS. 6-48 show the overall repellency of the compounds tested. Each of the test samples are diluted in isopropyl alcohol.

FIGS. 6-37 show experimental data for the synergistic control and repellency of biting flies using synergistic biting arthropod control or repellent formulations, in accordance with this disclosure.

FIGS. 38-48 show comparative experimental data for the additive control and repellency of biting flies using additive biting arthropod control or repellent formulations.

Ticks

The following test protocol is employed to demonstrate the efficacy of compounds used to control or repel ticks (e.g., Brown Dog ticks). Strips of filter paper, 1" by 3", are placed on a sheet of aluminum foil treated with 1 ml each of the indicated test samples and allowed to dry. The end of each treated strip is stapled to an untreated filter paper strip of the same dimensions. The stapled strips are suspended in a vertical position above a tray, with the treated half attached to a horizontal glass rod by a metal clip. The untreated half is lowered when the strip is vertically positioned. Brown Dog Ticks, *Rhipicephalus sanguineus*, mixed sexes, are purchased from a supplier. Five replicates of five ticks for each treatment regimen plus five additional replicates for the control are employed. Ticks shipped to the test site are given at least one day to acclimate to “shipping stress” before they are used for testing. Those tick specimens which appeared sluggish or moribund are not used. Suitable ticks are removed from their containers and allowed to quest on the free end of the test strip. Once present on the strip they are watched as they crawl up the strip until they contact the treated paper. If the tick, once in contact with the treated zone, either turned around, stopped without proceeding further, or dropped off, the tick is classified as repelled. If it continued to crawl onto the treated strip, even after it stopped briefly, that tick is classified as not repelled. A maximum observation time of 1 minute per replicate is allowed for ticks to respond after reaching the treated area, but during the test, if more time is needed, the maximum observation time may be adjusted at the discretion of the study coordinator. At the end of the observation time, the number of ticks repelled is recorded. Tick behavior is recorded when applicable, such as whether increased number of affected or repelled ticks occur in successive replicates over time. After the completion of each treatment parameter, the testing chamber is ventilated for five minutes by turning on the exhaust fan and opening the door leading into the chamber. Ticks are used only once. Average number of ticks displaying each behavior category including repellency calculated and compared to the control replicates. FIGS. 6-48 show the overall repellency results of the compounds tested.

Also, the following protocol is employed to test compounds used for toxicity (mortality) against ticks. There are 5 replicates of 5 dog ticks for each treatment. Five replicates of 5 ticks do not receive any treatment and serve as controls. Filter paper strips are laid on a sheet of aluminum foil and enough of each of the indicated test samples is applied to thoroughly saturate the paper. The paper is then rolled and placed inside a glass shell vial as to line the sides of the vial. A small paper disc, also saturated with the test sample, is then placed at the bottom of the vial. Brown Dog Ticks, *Rhipicephalus sanguineus*, are then introduced into the vials which are covered with aluminum foil, the inside of which is painted with some of the test sample. The ticks remain in the vials, constantly exposed to the test samples, for the duration of the test. A small hole is poked through the foil for ventilation. Each control replicate is subjected to the same procedures outlined above, except that they are not treated. The controls are placed in the same area as the test replicates for the duration of the test. Mortality observations are made at 24 hours. Ticks are classified as alive (able to move normally), moribund (those classified as moribund will show some movement, but will not be able to crawl in a coordinated manner, or will be unable to right themselves if placed on their backs), or dead (no movement after physical stimuli). All dead ticks are confirmed by probing or agitation to make sure that they are unable to move; any that show movement visible to the naked eye are recorded as moribund. The results are given in FIGS. 6-48.

FIGS. 6-37 show experimental data for the synergistic control and repellency of ticks using synergistic biting arthropod control or repellent formulations, in accordance with this disclosure.

FIGS. 38-48 show comparative experimental data for the additive control and repellency of ticks using additive biting arthropod control or repellent formulations.

Bed Bugs

The following protocol is employed to test compounds used to control or repel bed bugs. Two semicircle discs of paper, one treated (1 ml of acetone solution of each indicated compound is applied to each disc) and one untreated (1 ml of acetone only), are placed in the lid of a Petri dish. Control arenas are set up in a similar fashion with two untreated discs of paper. Five replicates of 10 bed bugs are released into the centers of the lids and are thus presented with a choice of treated vs. untreated substrate (or untreated vs. untreated in the control arenas). The distribution of the bed bugs is recorded at 2 hours post-treatment. Paired t-tests are conducted for each treatment to ascertain whether or not there is a statistically significant difference in the numbers of bed bugs on the treated vs. untreated discs. Repellency, as avoidance, is given in FIGS. 6-48. FIGS. 6-48 show the overall repellency results of the compounds tested.

FIGS. 6-37 show experimental data for the synergistic control and repellency of bed bugs using synergistic biting arthropod control or repellent formulations, in accordance with this disclosure.

FIGS. 38-48 show comparative experimental data for the additive control and repellency of bed bugs using additive biting arthropod control or repellent formulations.

Mosquitoes

The following protocol is employed to test compounds used to control or repel mosquitoes. Five replicates of 250 adult female mosquitoes each are placed in clear plastic cages with access to five warmed, blood-filled, membrane-covered wells. The mosquitoes are *Aedes aegypti* unless otherwise noted. Membranes are treated with the indicated compound. Five replicates are tested. Each replicate uses a fresh batch of mosquitoes, blood and treated membranes. The number of mosquitoes probing each well is recorded at two minute intervals for 20 minutes. The total numbers of probes on each well are tallied at the end of the observation period and the average percentage repellency relative to the control is calculated for each formulation. FIGS. 6-48 show the overall repellency results of the compounds tested.

FIGS. 6-37 show experimental data for the synergistic control and repellency of mosquitoes using synergistic biting arthropod control or repellent formulations, in accordance with this disclosure.

FIGS. 38-48 show comparative experimental data for the additive control and repellency of mosquitoes using additive biting arthropod control or repellent formulations.

Biting Midges

The following protocol is employed to test compounds used to control or repel biting midges. Control against biting midges is determined by the protocol as generally described in *J. Med. Entomol.* 43 (6), 1248-1252 (2006). Volunteers wearing short pants are seated. Using a skin-marking template and a washable-ink marker, skin areas represented by 3- by 4-cm floor opening of six cells of a K&D module are outlined on the outer, top and inner thigh position of each leg of the volunteers. The six treated cell rectangles each represent a random block, and each volunteer has three blocks on each of two thighs. All treatments against the biting midges *Culicoides impunctatus* are pipetted onto a 4- by 5-cm rectangular area (so the area of skin covered by a treatment exceeds the template marks by 0.5 cm in every direction) of the subjects' skin with 55 ul of isopropyl alcohol/treatment containing 10% or 5% compound/ul isopropyl alcohol. Treating a slightly larger area ensures that the areas beneath each K&D module contains only treated skin. Skin treated with isopropyl alcohol alone serves as control. In all tests adjacent cells of the K&D module are supplied with ten biting midges. The biting midge charged K&D module is positioned over the treated skin areas and the trap doors of the K&D module above the areas are opened. After a five minute skin exposure the trap doors are closed. The number of biting midge bites is recorded for each cell. The percent repellency is calculated. FIGS. 6-48 show the overall repellency results of the compounds tested. The percent repellency is the percent compared to the repellency for the control which is taken as 100%.

FIGS. 6-37 show experimental data for the synergistic control and repellency of biting midges using synergistic biting arthropod control or repellent formulations, in accordance with this disclosure.

FIGS. 38-48 show comparative experimental data for the additive control and repellency of biting midges using additive biting arthropod control or repellent formulations.

Lice

The following protocol is employed to test compounds used to control or repel lice. Two semicircle discs of paper, one treated (1 ml of acetone solution of each indicated compound is applied to each disc) and one untreated (1 ml of acetone only), are placed in the lid of a Petri dish. Control arenas are set up in a similar fashion with two untreated discs of paper. Five replicates of 10 lice are released into the centers of the lids and are thus presented with a choice of treated vs. untreated substrate (or untreated vs. untreated in the control arenas). The distribution of the lice is recorded at 2 hours post-treatment. Paired t-tests are conducted for each treatment to ascertain whether or not there is a statistically significant difference in the numbers of lice on the treated vs. untreated discs. Repellency, as avoidance, is given in FIGS. 6-48. FIGS. 6-48 show the overall repellency results of the compounds tested.

FIGS. 6-48 show comparative experimental data for the additive control and repellency of lice using additive biting arthropod control or repellent formulations.

Mites

The following protocol is employed to test compounds used to control or repel mites. Two semicircle discs of paper, one treated (1 ml of acetone solution of each indicated compound is applied to each disc) and one untreated (1 ml of acetone only), are placed in the lid of a Petri dish. Control arenas are set up in a similar fashion with two untreated discs of paper. Five replicates of 10 mites are released into the centers of the lids and are thus presented with a choice of treated vs. untreated substrate (or untreated vs. untreated in the control arenas). The distribution of the mites is recorded at 2 hours post-treatment. Paired t-tests are conducted for each treatment to ascertain whether or not there is a statistically significant difference in the numbers of mites on the treated vs. untreated discs. Repellency, as avoidance, is given in FIGS. 6-48. FIGS. 6-48 show the overall repellency results of the compounds tested.

FIGS. 6-48 show comparative experimental data for the additive control and repellency of mites using additive biting arthropod control or repellent formulations.

In accordance with this disclosure, FIG. 6 shows testing results for formulations (i.e., formulas 1-345) having specified combinations of delta-dodecalactone, propyl dihydrojasmonate, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 7 shows testing results for formulations (i.e., Formulas 346-690) having specified combinations of delta-dodecalactone, propyl dihydrojasmonate, methyl dihydrojasmolate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 8 shows testing results for formulations (i.e., Formulas 691-1035) having specified combinations of delta-dodecalactone, propyl dihydrojasmonate, methyl dihydrojasmolate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 9 shows testing results for formulations (i.e., Formulas 1036-1380) having specified combinations of delta-dodecalactone, propyl dihydrojasmonate, methyl dihydrojasmolate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 10 shows testing results for formulations (i.e., Formulas 1381-1725) having specified combinations of gamma-dodecalactone, propyl dihydrojasmonate, methyl dihydrojasmonate, para-methane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 11 shows testing results for formulations (i.e., Formulas 1726-2070) having specified combinations of gamma-dodecalactone, propyl dihydrojasmonate, methyl dihydrojasmonate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 12 shows testing results for formulations (i.e., Formulas 2071-2415) having specified combinations of gamma-dodecalactone, propyl dihydrojasmonate, methyl dihydrojasmonate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 13 shows testing results for formulations (i.e., Formulas 2416-2760) having specified combinations of gamma-dodecalactone, propyl dihydrojasmonate, methyl dihydrojasmonate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 14 shows testing results for formulations (i.e., Formulas 2761-3105) having specified combinations of delta-dodecalactone, propyl dihydrojasmolate, apritone, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 15 shows testing results for formulations (i.e., Formulas 3106-3450) having specified combinations of delta-dodecalactone, propyl dihydrojasmolate, apritone, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 16 shows testing results for formulations (i.e., Formulas 3451-3795) having specified combinations of delta-dodecalactone, propyl dihydrojasmolate, apritone, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 17 shows testing results for formulations (i.e., Formulas 3796-4140) having specified combinations of delta-dodecalactone, propyl dihydrojasmolate, apritone, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 18 shows testing results for formulations (i.e., Formulas 4141-4485) having specified combinations of delta-dodecalactone, methyl apritone, methyl dihydrojasmonate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 19 shows testing results for formulations (i.e., Formulas 4486-4830) having specified combinations of delta-dodecalactone, methyl apritone, methyl dihydrojasmonate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 20 shows testing results for formulations (i.e., Formulas 4831-5175) having specified combinations of delta-dodecalactone, methyl apritone, methyl dihydrojasmonate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 21 shows testing results for formulations (i.e., Formulas 5176-5520) having specified combinations of delta-dodecalactone, methyl apritone, methyl dihydrojasmonate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 22 shows testing results for formulations (i.e., Formulas 5521-5865) having specified combinations of gamma-dodecalactone, methyl apritone, propyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 23 shows testing results for formulations (i.e., Formulas 5866-6210) having specified combinations of gamma-dodecalactone, methyl apritone, propyl dihydrojasmolate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 24 shows testing results for formulations (i.e., Formulas 6211-6555) having specified combinations of gamma-dodecalactone, methyl apritone, propyl dihydrojasmolate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 25 shows testing results for formulations (i.e., Formulas 6556-6900) having specified combinations of gamma-dodecalactone, methyl apritone, propyl dihydrojasmolate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 26 shows testing results for formulations (i.e., Formulas 6901-7245) having specified combinations of gamma-dodecalactone, apritone, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 27 shows testing results for formulations (i.e., Formulas 7246-7590) having specified combinations of gamma-dodecalactone, apritone, methyl dihydrojasmolate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 28 shows testing results for formulations (i.e., Formulas 7591-7935) having specified combinations of gamma-dodecalactone, apritone, methyl dihydrojasmolate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 29 shows testing results for formulations (i.e., Formulas 7936-8280) having specified combinations of gamma-dodecalactone, apritone, methyl dihydrojasmolate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 30 shows testing results for formulations (i.e., Formulas 8281-8625) having specified combinations of gamma-dodecalactone, propyl dihydrojasmonate, methyl dihydrojasmolate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 31 shows testing results for formulations (i.e., Formulas 8626-8970) having specified combinations of gamma-dodecalactone, propyl dihydrojasmonate, methyl dihydrojasmolate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 32 shows testing results for formulations (i.e., Formulas 8971-9315) having specified combinations of gamma-dodecalactone, propyl dihydrojasmonate, methyl dihydrojasmolate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 33 shows testing results for formulations (i.e., Formulas 9316-9660) having specified combinations of gamma-dodecalactone, propyl dihydrojasmonate, methyl dihydrojasmolate, Picaridin, and lactic acid. The formulations exhibit synergistic repellency against mosquitoes, ticks, biting flies, biting midges and bed bugs. No synergistic repellency is observed for lice or mites.

In accordance with this disclosure, FIG. 34 shows testing results for formulations (i.e., Formulas 9661-10005) having specified combinations of delta-dodecalactone, propyl dihydrojasmonate, methyl dihydrojasmonate, para-menthane-3,8-diol, and lactic acid. The formulations exhibit synergistic repellency against mosquitoes, ticks, biting flies, biting midges and bed bugs. No synergistic repellency is observed for lice or mites.

In accordance with this disclosure, FIG. 35 shows testing results for formulations (i.e., Formulas 10006-10350) having specified combinations of delta-dodecalactone, propyl dihydrojasmonate, methyl dihydrojasmonate, IR3535, and lactic acid. The formulations exhibit synergistic repellency against mosquitoes, ticks, biting flies, biting midges and bed bugs. No synergistic repellency is observed for lice or mites.

In accordance with this disclosure, FIG. 36 shows testing results for formulations (i.e., Formulas 10351-10695) having specified combinations of delta-dodecalactone, propyl dihydrojasmonate, methyl dihydrojasmonate, DEET, and lactic acid. The formulations exhibit synergistic repellency against mosquitoes, ticks, biting flies, biting midges and bed bugs. No synergistic repellency is observed for lice or mites.

In accordance with this disclosure, FIG. 37 shows testing results for formulations (i.e., Formulas 10696-11040) having specified combinations of delta-dodecalactone, propyl dihydrojasmonate, methyl dihydrojasmonate, Picaridin, and lactic acid. The formulations exhibit synergistic repellency against mosquitoes, ticks, biting flies, biting midges and bed bugs. No synergistic repellency is observed for lice or mites.

For comparison purposes, FIG. 38 shows comparative testing results for formulations (i.e., Formulas 11041-11090) having specified combinations of gamma butyrolactone, hexyl apritone, undecyl dihydrojasmolate, delta dodecalactone, and acetic acid. The formulations exhibit additive repellency against mosquitoes, ticks, biting flies, bed bugs, biting midges, lice and mites. No synergistic repellency is observed for any biting arthropods.

For comparison purposes, FIG. 39 shows comparative testing results for formulations (i.e., Formulas 11091-11140) having specified combinations of gamma butyrolactone, hexyl apritone, undecyl dihydrojasmolate, apritone, and acetic acid. The formulations exhibit additive repellency against mosquitoes, ticks, biting flies, biting midges, bed bugs, lice and mites. No synergistic repellency is observed for any biting arthropods.

For comparison purposes, FIG. 40 shows comparative testing results for formulations (i.e., Formulas 11141-11190) having specified combinations of gamma butyrolactone, hexyl apritone, undecyl dihydrojasmolate, para-menthane-3,8-diol, and acetic acid. The formulations exhibit additive repellency against mosquitoes, ticks, biting flies, biting midges, bed bugs, lice and mites. No synergistic repellency is observed for any biting arthropods.

For comparison purposes, FIG. 41 shows comparative testing results for formulations (i.e., Formulas 11191-11240) having specified combinations of gamma butyrolactone, hexyl apritone, undecyl dihydrojasmolate, DEET, and acetic acid. The formulations exhibit additive repellency against mosquitoes, ticks, biting flies, biting midges, bed bugs, lice and mites. No synergistic repellency is observed for any biting arthropods.

For comparison purposes, FIG. 42 shows comparative testing results for formulations (i.e., Formulas 11241-11290) having specified combinations of gamma butyrolactone, hexyl apritone, undecyl dihydrojasmolate, propyl dihydrojasmolate, and acetic acid. The formulations exhibit additive repellency against mosquitoes, ticks, biting flies, biting midges, bed bugs, lice and mites. No synergistic repellency is observed for any biting arthropods.

For comparison purposes, FIG. 43 shows comparative testing results for formulations (i.e., Formulas 11291-11340) having specified combinations of delta valerolactone, hexyl apritone, undecyl dihydrojasmonate, methyl dihydrojasmolate, and arachidic acid. The formulations exhibit additive repellency against mosquitoes, ticks, biting flies, biting midges, bed bugs, lice and mites. No synergistic repellency is observed for any biting arthropods.

For comparison purposes, FIG. 44 shows comparative testing results for formulations (i.e., Formulas 11341-11390) having specified combinations of delta valerolactone, hexyl apritone, undecyl dihydrojasmonate, propyl dihydrojasmonate, and arachidic acid. The formulations exhibit additive repellency against mosquitoes, ticks, biting flies, biting midges, bed bugs, lice and mites. No synergistic repellency is observed for any biting arthropods.

For comparison purposes, FIG. 45 shows comparative testing results for formulations (i.e., Formulas 11391-11440) having specified combinations of delta valerolactone, hexyl apritone, undecyl dihydrojasmonate, Picaridin, and arachidic acid. The formulations exhibit additive repellency against mosquitoes, ticks, biting flies, biting midges, bed bugs, lice and mites. No synergistic repellency is observed for any biting arthropods.

For comparison purposes, FIG. 46 shows comparative testing results for formulations (i.e., Formulas 11441-11490) having specified combinations of delta valerolactone, hexyl apritone, undecyl dihydrojasmonate, IR3535, and arachidic acid. The formulations exhibit additive repellency against mosquitoes, ticks, biting flies, biting midges, bed bugs, lice and mites. No synergistic repellency is observed for any biting arthropods.

For comparison purposes, FIG. 47 shows comparative testing results for formulations (i.e., Formulas 11491-11540) having specified combinations of delta dodecalactone, methyl dihydrojasmolate, apritone, para-menthane-3,8-diol, and lactic acid. The formulations exhibit additive repellency against mosquitoes, ticks, biting flies, biting midges, bed bugs, lice and mites. No synergistic repellency is observed for any biting arthropods.

For comparison purposes, FIG. 48 shows comparative test results for formulations (i.e., Formulas 11541-11590) having specified combinations of gamma dodecalactone, propyl dihydrojasmolate, apritone, DEET, and lactic acid. The formulations exhibit additive repellency against mosquitoes, ticks, biting flies, biting midges, bed bugs, lice and mites. No synergistic repellency is observed for any biting arthropods.

What is claimed is:

1. A method for the repellency of biting arthropods, the method comprising bringing the biting arthropods into contact with a synergistic biting arthropod repellent formulation, wherein the synergistic biting arthropod formulation consists essentially of:

(I) any synergistic combination of two or more compounds (a), wherein compounds (a) are selected from the group consisting of methyl dihydrojasmolate, propyl dihydrojasmolate, methyl dihydrojasmonate, propyl dihydrojasmonate, delta-dodecalactone, gamma-dodecalactone, apritone, methyl apritone, and lactic acid; or (II) any synergistic combination of one or more of the compounds (a) with one or more repellents selected from the group consisting of N,N-diethyl-3-methylbenzamide (DEET®), para-menthane-3,8-diol (PMD), 1-(1-methylpropoxycarbonyl)-2-(2-hydroxyethyl)piperidine (Picaridin), and ethyl butylacetylaminopropionate (IR3535®);

wherein the synergistic combination of two or more compounds (a) is present in an amount from about 0.5% by weight to about 20% by weight, based on the total weight of the synergistic biting arthropod repellent formulation; and wherein the synergistic combination of one or more of the compounds (a) with one or more of the repellents is present in an amount from about 0.5% by weight to about 20% by weight, based on the total weight of the synergistic biting arthropod repellent formulation;

wherein the biting arthropods are selected from the group consisting of mosquitoes, bed bugs, biting flies, ticks, and biting midges;

wherein the synergistic combination consisting essentially of a combination of two or more compounds (a) of (I) or a combination of one or more compounds (a) and one or more repellants of (II) produces, when biting arthropods are brought into contact with the synergistic formulation, a combined repellency effect, greater than the sum of the separate repellency effects, at essentially the same concentrations.

2. The method of claim 1 wherein the synergistic formulation consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with N,N-diethyl-3-methylbenzamide (DEET®); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with N,N-diethyl-3-methylbenzamide (DEET®); or two or more of delta-dodecalactone, propyl dihydrojasmolate, apritone, or lactic acid; or one or more of delta-dodecalactone, propyl dihydrojasmolate, apritone, or lactic acid, in combination with N,N-diethyl-3-methylbenzamide (DEET®); or two or more of delta-dodecalactone, methyl apritone, methyl dihydrojasmonate, or lactic acid; or one or more of delta-dodecalactone, methyl apritone, methyl dihydrojasmonate, or lactic acid, in combination with N,N-diethyl-3-methylbenzamide (DEET®); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with N,N-diethyl-3-methylbenzamide (DEET®); or two or more of gamma-dodecalactone, apritone, methyl dihydrojasmolate, or lactic acid; or one or more of gamma-dodecalactone, apritone, methyl dihydrojasmolate, or lactic acid, in combination with N,N-diethyl-3-methylbenzamide (DEET®); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with N,N-diethyl-3-methylbenzamide (DEET®); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with N,N-diethyl-3-methylbenzamide (DEET®).

3. The method of claim 1 wherein the synergistic formulation consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with para-menthane-3,8-diol (PMD); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with para-methane-3,8-diol (PMD); or two or more of delta-dodecalactone, propyl dihydrojasmolate, apritone, or lactic acid; or one or more of delta-dodecalactone, propyl dihydrojasmolate, apritone, or lactic acid, in combination with para-menthane-3,8-diol (PMD); or two or more of delta-dodecalactone, methyl apritone, methyl dihydrojasmonate, or lactic acid; or one or more of delta-dodecalactone, methyl apritone, methyl dihydrojasmonate, or lactic acid, in combination with para-menthane-3,8-diol (PMD); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with para-menthane-3,8-diol (PMD); or two or more of gamma-dodecalactone, apritone, methyl dihydrojasmolate, or lactic acid; or one or more of gamma-dodecalactone, apritone, methyl dihydrojasmolate, or lactic acid, in combination with para-menthane-3,8-diol (PMD); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with para-menthane-3,8-diol (PMD); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with para-menthane-3,8-diol (PMD).

4. The method of claim 1 wherein the synergistic formulation consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with 1-(1-methylpropoxycarbonyl)-2-(2-hydroxyethyl)piperidine (Picaridin); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with 1-(1-methylpropoxycarbonyl)-2-(2-hydroxyethyl)piperidine (Picaridin); or two or more of delta-dodecalactone, propyl dihydrojasmolate, apritone, or lactic acid; or one or more of delta-dodecalactone, propyl dihydrojasmolate, apritone, or lactic acid, in combination with 1-(1-methylpropoxycarbonyl)-2-(2-hydroxyethyl)piperidine (Picaridin); or two or more of delta-dodecalactone, methyl apritone, methyl dihydrojasmonate, or lactic acid; or one or more of delta-dodecalactone, methyl apritone, methyl dihydrojasmonate, or lactic acid, in combination with 1-(1-methylpropoxycarbonyl)-2-(2-hydroxyethyl)piperidine (Picaridin); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with 1-(1-methylpropoxycarbonyl)-2-(2-hydroxyethyl)piperidine (Picaridin); or two or more of gamma-dodecalactone, apritone, methyl dihydrojasmolate, or lactic acid; or one or more of gamma-dodecalactone, apritone, methyl dihydrojasmolate, or lactic acid, in combination with 1-(1-methylpropoxycarbonyl)-2-(2-hydroxyethyl)piperidine (Picaridin); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with 1-(1-methylpropoxycarbonyl)-2-(2-hydroxyethyl)piperidine (Picaridin); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with 1-(1-methylpropoxycarbonyl)-2-(2-hydroxyethyl)piperidine (Picaridin).

5. The method of claim 1 wherein the synergistic formulation consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with ethyl butylacetylaminopropionate (IR3535®); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with ethyl butylacetylaminopropionate (IR3535®); or two or more of delta-dodecalactone, propyl dihydrojasmolate, apritone, or lactic acid; or one or more of delta-dodecalactone, propyl dihydrojasmolate, apritone, or lactic acid, in combination with ethyl butylacetylaminopropionate (IR3535®); or two or more of delta-dodecalactone, methyl apritone, methyl dihydrojasmonate, or lactic acid; or one or more delta-dodecalactone, methyl apritone, methyl dihydrojasmonate, or lactic acid, in combination with ethyl butylacetylaminopropionate (IR3535®); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with ethyl butylacetylaminopropionate (IR3535®); or two or more of gamma-dodecalactone, apritone, methyl dihydrojasmolate, or lactic acid; or one or more of gamma-dodecalactone, apritone, methyl dihydrojasmolate, or lactic acid, in combination with ethyl butylacetylaminopropionate (IR3535®); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with ethyl butylacetylaminopropionate (IR3535®); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with ethyl butylacetylaminopropionate (IR3535®).

6. The method of claim 1 wherein the synergistic formulation consists essentially of: three or more of methyl dihydrojasmolate, propyl dihydrojasmolate, methyl dihydrojasmonate, propyl dihydrojasmonate, delta-dodecalactone, gamma-dodecalactone, apritone, methyl apritone, or lactic acid.

7. The method of claim 1 wherein the synergistic formulation consists essentially of: two or more of methyl dihydrojasmolate, propyl dihydrojasmolate, methyl dihydrojasmonate, propyl dihydrojasmonate, delta-dodecalactone, gamma-dodecalactone, apritone, methyl apritone, or lactic acid, in combination with one or more of N,N-diethyl-3-methylbenzamide (DEET®), para-menthane-3,8-diol (PMD), 1-(1-methylpropoxycarbonyl)-2-(2-hydroxyethyl) piperidine (Picaridin), or ethyl butylacetylaminopropionate (IR3535®).

8. The method of claim 1 wherein the synergistic formulation consists essentially of:

delta-dodecalactone in combination with one or more of methyl dihydrojasmolate, propyl dihydrojasmolate, methyl dihydrojasmonate, propyl dihydrojasmonate, gamma-dodecalactone, apritone, methyl apritone, or lactic acid;

delta-dodecalactone in combination with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®);

delta-dodecalactone in combination with one or more of methyl dihydrojasmolate, propyl dihydrojasmolate, methyl dihydrojasmonate, propyl dihydrojasmonate, gamma-dodecalactone, apritone, methyl apritone, or lactic acid, and with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®);

gamma-dodecalactone in combination with one or more of methyl dihydrojasmolate, propyl dihydrojasmolate, methyl dihydrojasmonate, propyl dihydrojasmonate, delta-dodecalactone, apritone, methyl apritone, or lactic acid;

gamma-dodecalactone in combination with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®); and gamma-dodecalactone in combination with one or more of methyl dihydrojasmolate, propyl dihydrojasmolate, methyl dihydrojasmonate, propyl dihydrojasmonate, delta-dodecalactone, apritone, methyl apritone, or lactic acid, and with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®).

9. A synergistic biting arthropod repellent formulation consisting essentially of:

(I) any synergistic combination of two or more compounds (a), wherein compounds (a) are selected from the group consisting of methyl dihydrojasmolate, propyl dihydrojasmolate, methyl dihydrojasmonate, propyl dihydrojasmonate, delta-dodecalactone, gamma-dodecalactone, apritone, methyl apritone, and lactic acid; or (II) any synergistic combination of one or more of the compounds (a) with one or more repellents selected from the group consisting of N,N-diethyl-3-methylbenzamide (DEET®), para-menthane-3,8-diol (PMD), 1-(1-methylpropoxycarbonyl)-2-(2-hydroxyethyl)piperidine (Picaridin), and ethyl butylacetylaminopropionate (IR3535®);

wherein the synergistic combination of two or more compounds (a) is present in an amount from about 0.5% by weight to about 20% by weight, based on the total weight of the synergistic biting arthropod repellent formulation; and wherein the synergistic combination of one or more of the compounds (a) with one or more of the repellents is present in an amount from about 0.5% by weight to about 20% by weight, based on the total weight of the synergistic biting arthropod repellent formulation;

wherein the biting arthropods are selected from the group consisting of mosquitoes, bed bugs, biting flies, ticks, and biting midges;

wherein the synergistic combination consisting essentially of a combination of two or more compounds (a) of (I) or a combination of one or more compounds (a) and one or more repellants of (II) produces, when biting arthropods are brought into contact with the synergistic formulation, a combined repellency effect, greater than the sum of the separate repellency effects, at essentially the same concentrations.

10. The formulation of claim 9 which consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with N,N-diethyl-3-methylbenzamide (DEET®); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with N,N-diethyl-3-methylbenzamide (DEET®); or two or more of delta-dodecalactone, propyl dihydrojasmolate, apritone, or lactic acid; or one or more of delta-dodecalactone, propyl dihydrojasmolate, apritone, or lactic acid, in combination with N,N-diethyl-3-methylbenzamide (DEET®); or two or more of delta-dodecalactone, methyl apritone, methyl dihydrojasmonate, or lactic acid; or one or more of delta-dodecalactone, methyl apritone, methyl dihydrojasmonate, or lactic acid, in combination with N,N-diethyl-3-methylbenzamide (DEET®); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with N,N-diethyl-3-methylbenzamide (DEET®); or two or more of gamma-dodecalactone, apritone, methyl dihydrojasmolate, or lactic acid; or one or more of gamma-dodecalactone, apritone, methyl dihydrojasmolate, or lactic acid, in combination with N,N-diethyl-3-methylbenzamide (DEET®); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with N,N-diethyl-3-methylbenzamide (DEET®); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with N,N-diethyl-3-methylbenzamide (DEET®).

11. The formulation of claim 9 which consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with para-menthane-3,8-diol (PMD); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with para-methane-3,8-diol (PMD); or two or more of delta-dodecalactone, propyl dihydrojasmolate, apritone, or lactic acid; or one or more of delta-dodecalactone, propyl dihydrojasmolate, apritone, or lactic acid, in combination with para-menthane-3,8-diol (PMD); or two or more of delta-dodecalactone, methyl apritone, methyl dihydrojasmonate, or lactic acid; or one or more of delta-dodecalactone, methyl apritone, methyl dihydrojasmonate, or lactic acid, in combination with para-menthane-3,8-diol (PMD); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with para-menthane-3,8-diol (PMD); or two or more of gamma-dodecalactone, apritone, methyl dihydrojasmolate, or lactic acid; or one or more of gamma-dodecalactone, apritone, methyl dihydrojasmolate, or lactic acid, in combination with para-menthane-3,8-diol (PMD); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with para-menthane-3,8-diol (PMD); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with para-menthane-3,8-diol (PMD).

12. The formulation of claim 9 which consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with 1-(1-methylpropoxycarbonyl)-2-(2-hydroxyethyl)piperidine (Picaridin); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with 1-(1-methylpropoxycarbonyl)-2-(2-hydroxyethyl)piperidine (Picaridin); or two or more of delta-dodecalactone, propyl dihydrojasmolate, apritone, or lactic acid; or one or more of delta-dodecalactone, propyl dihydrojasmolate, apritone, or lactic acid, in combination with 1-(1-methylpropoxycarbonyl)-2-(2-hydroxyethyl)piperidine (Picaridin); or two or more of delta-dodecalactone, methyl apritone, methyl dihydrojasmonate, or lactic acid; or one or more of delta-dodecalactone, methyl apritone, methyl dihydrojasmonate, or lactic acid, in combination with 1-(1-methylpropoxycarbonyl)-2-(2-hydroxyethyl)piperidine (Picaridin); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with 1-(1-methylpropoxycarbonyl)-2-(2-hydroxyethyl)piperidine (Picaridin); or two or more of gamma-dodecalactone, apritone, methyl dihydrojasmolate, or lactic acid; or one or more of gamma-dodecalactone, apritone, methyl dihydrojasmolate, or lactic acid, in combination with 1-(1-methylpropoxycarbonyl)-2-(2-hydroxyethyl)piperidine (Picaridin); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with 1-(1-methylpropoxycarbonyl)-2-(2-hydroxyethyl)piperidine (Picaridin); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with 1-(1-methylpropoxycarbonyl)-2-(2-hydroxyethyl)piperidine (Picaridin).

13. The formulation of claim 9 which consists essentially of:

two or more of delta-dodecalactone, propyl dihydrojasmonate, methyl dihydrojasmolate, or lactic acid; or one or more of delta-dodecalactone, propyl dihydrojasmonate, methyl dihydrojasmolate, or lactic acid, in combination with ethyl butylacetylaminopropionate (IR3535®); or two or more of gamma-dodecalactone, propyl dihydrojasmonate, methyl dihydrojasmonate, or lactic acid; or one or more of gamma-dodecalactone, propyl dihydrojasmonate, methyl dihydrojasmonate, or lactic acid, in combination with ethyl butylacetylaminopropionate (IR3535®); or two or more of delta-dodecalactone, propyl dihydrojasmolate, apritone, or lactic acid; or one or more of delta-dodecalactone, propyl dihydrojasmolate, apritone, or lactic acid, in combination with ethyl butylacetylaminopropionate (IR3535®); or two or more of delta-dodecalactone, methyl apritone, methyl dihydrojasmonate, or lactic acid; or one or more delta-dodecalactone, methyl apritone, methyl dihydrojasmonate, or lactic acid, in combination with ethyl butylacetylaminopropionate (IR3535®); or two or more of gamma-dodecalactone, methyl apritone, propyl dihydrojasmolate, or lactic acid; or one or more of gamma-dodecalactone, methyl apritone, propyl dihydrojasmolate, or lactic acid, in combination with ethyl butylacetylaminopropionate (IR3535®); or two or more of gamma-dodecalactone, apritone, methyl dihydrojasmolate, or lactic acid; or one or more of gamma-dodecalactone, apritone, methyl dihydrojasmolate, or lactic acid, in combination with ethyl butylacetylaminopropionate (IR3535®); or two or more of gamma-dodecalactone, propyl dihydrojasmonate, methyl dihydrojasmolate, or lactic acid; or one or more of gamma-dodecalactone, propyl dihydrojasmonate, methyl dihydrojasmolate, or lactic acid, in combination with ethyl butylacetylaminopropionate (IR3535®); or two or more of delta-dodecalactone, propyl dihydrojasmonate, methyl dihydrojasmonate, or lactic acid; or one or more of delta-dodecalactone, propyl dihydrojasmonate, methyl dihydrojasmonate, or lactic acid, in combination with ethyl butylacetylaminopropionate (IR3535®).

14. The formulation of claim 9 which consists essentially of: three or more of methyl dihydrojasmolate, propyl dihydrojasmolate, methyl dihydrojasmonate, propyl dihydrojasmonate, delta-dodecalactone, gamma-dodecalactone, apritone, methyl apritone, or lactic acid.

15. The formulation of claim 9 which consists essentially of: two or more of methyl dihydrojasmolate, propyl dihydrojasmolate, methyl dihydrojasmonate, propyl dihydrojasmonate, delta-dodecalactone, gamma-dodecalactone, apritone, methyl apritone, or lactic acid, in combination with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®).

16. The formulation of claim 9 which consists essentially of:

delta-dodecalactone in combination with one or more of methyl dihydrojasmolate, propyl dihydrojasmolate, methyl dihydrojasmonate, propyl dihydrojasmonate, gamma-dodecalactone, apritone, methyl apritone, or lactic acid;

delta-dodecalactone in combination with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®);

delta-dodecalactone in combination with one or more of methyl dihydrojasmolate, propyl dihydrojasmolate, methyl dihydrojasmonate, propyl dihydrojasmonate, gamma-dodecalactone, apritone, methyl apritone, or lactic acid, and with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®);

gamma-dodecalactone in combination with one or more of methyl dihydrojasmolate, propyl dihydrojasmolate, methyl dihydrojasmonate, propyl dihydrojasmonate, delta-dodecalactone, apritone, methyl apritone, or lactic acid;

gamma-dodecalactone in combination with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®); and gamma-dodecalactone in combination with one or more of methyl dihydrojasmolate, propyl dihydrojasmolate, methyl dihydrojasmonate, propyl dihydrojasmonate, delta-dodecalactone, apritone, methyl apritone, or lactic acid, and with one or more of N,N-diethyl-3-methylbenzamide (DEET®), para-menthane-3,8-diol (PMD), 1-(1-methylpropoxycarbonyl)-2-(2-hydroxyethyl)piperidine (Picaridin), or ethyl butylacetylaminopropionate (IR3535®).

17. The method of claim 1 wherein the synergistic formulation contains an inert carrier.

18. The method of claim 1 wherein the synergistic formulation contains a propellent.

19. The method of claim 1 wherein the synergistic formulation is formulated into a solution, oil, cream, lotion, shampoo, or aerosol.

20. The formulation of claim 9 which contains an inert carrier.

21. The formulation of claim 9 which contains a propellent.

22. The formulation of claim 9 which is formulated into a solution, oil, cream, lotion, shampoo, or aerosol.

* * * * *